US012745233B2

(12) United States Patent
Badic et al.

(10) Patent No.: US 12,745,233 B2
(45) Date of Patent: Sep. 22, 2026

(54) METHODS AND DEVICES FOR WIRELESS COMMUNICATIONS

(71) Applicant: INTEL CORPORATION, Santa Clara, CA (US)

(72) Inventors: Biljana Badic, Munich (DE); Steven A. Bowers, Portland, OR (US); Yang-Seok Choi, Portland, OR (US); Miltiadis Filippou, Munich (DE); Bertram Gunzelman, Koenigsbrunn (DE); Nageen Himayat, Danville, CA (US); Ingolf Karls, Feldkirchen (DE); Nirlesh Kumar Koshta, Bangalore (IN); Rajkumar Krishnaperumal, Bangalore (IN); Markus Dominik Mueck, Unterhaching (DE); Hosein Nikopour, San Jose, CA (US); Pradeep Pangi, Bangalore (IN); Jerome Parron, Fuerth (DE); Bernhard Raaf, Neuried (DE); Sabine Roessel, Munich (DE); Dario Sabella, Gassino Torinese (IT); Bernd Schaller, Nuremberg (DE); Domagoj Siprak, Munich (DE); Christopher Stobart, Nuremberg (DE); Shashanka Totadamane Ramappa, Shimoga (IN); Sudeep Manithara Vamanan, Nuremberg (DE); Zhibin Yu, Unterhaching (DE); Jing Zhu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/772,315

(22) Filed: Jul. 15, 2024

(65) Prior Publication Data

US 2024/0373418 A1 Nov. 7, 2024

Related U.S. Application Data

(63) Continuation of application No. 18/182,419, filed on Mar. 13, 2023, now abandoned, which is a (Continued)

(30) Foreign Application Priority Data

Dec. 30, 2017 (IN) ............................ 201741047375

(51) Int. Cl.
*H04W 72/12* (2023.01)
*H04B 17/318* (2015.01)
(Continued)

(52) U.S. Cl.
CPC .......... *H04W 72/12* (2013.01); *H04B 17/318* (2015.01); *H04W 4/023* (2013.01); (Continued)

(58) Field of Classification Search
CPC . H04W 24/08; H04W 72/0453; H04W 24/02; H04W 88/06; H04W 24/10; (Continued)

(56) References Cited

U.S. PATENT DOCUMENTS

2011/0317571 A1* 12/2011 Kokkinen ............ H04W 24/00 370/252
2012/0163180 A1* 6/2012 Goel .................... H04L 45/306 370/238

(Continued)

*Primary Examiner* — Kwasi Karikari
(74) *Attorney, Agent, or Firm* — Viering, Jentschura & Partner mbB

(57) ABSTRACT

A local server includes a controller configured to select a processing function for processing offload, and receive, from a traffic filter, target data that originates from a local network; and a processing platform comprising one or more processors and configured to apply the processing function to the target data to obtain processed data; and wherein the (Continued)

controller is further configured to send the processed data to a remote server for remote processing.

14 Claims, 261 Drawing Sheets

Related U.S. Application Data continuation of application No. 16/830,423, filed on Mar. 26, 2020, now Pat. No. 11,641,644, which is a continuation of application No. PCT/US2018/039890, filed on Jun. 28, 2018.

(60) Provisional application No. 62/612,327, filed on Dec. 30, 2017.

(51) Int. Cl.

| | |
|---|---|
| ***H04W 4/02*** | (2018.01) |
| ***H04W 16/32*** | (2009.01) |
| ***H04W 52/02*** | (2009.01) |
| ***H04W 76/10*** | (2018.01) |

(52) U.S. Cl.
CPC ........... *H04W 4/025* (2013.01); *H04W 16/32* (2013.01); *H04W 52/0209* (2013.01); *H04W 76/10* (2018.02)

(58) Field of Classification Search
CPC ... H04W 8/02; H04W 28/02; H04W 28/0268; H04W 4/18; H04W 8/20; H04W 4/02; H04W 4/029; H04W 12/06; H04W 4/80; H04W 4/21; H04W 8/18; H04W 4/50
See application file for complete search history.

(56) References Cited

U.S. PATENT DOCUMENTS

2014/0315536 A1* 10/2014 Chow ..................... H04W 4/50 455/419
2016/0127967 A1* 5/2016 Liu ......................... H04L 47/20 455/438

* cited by examiner

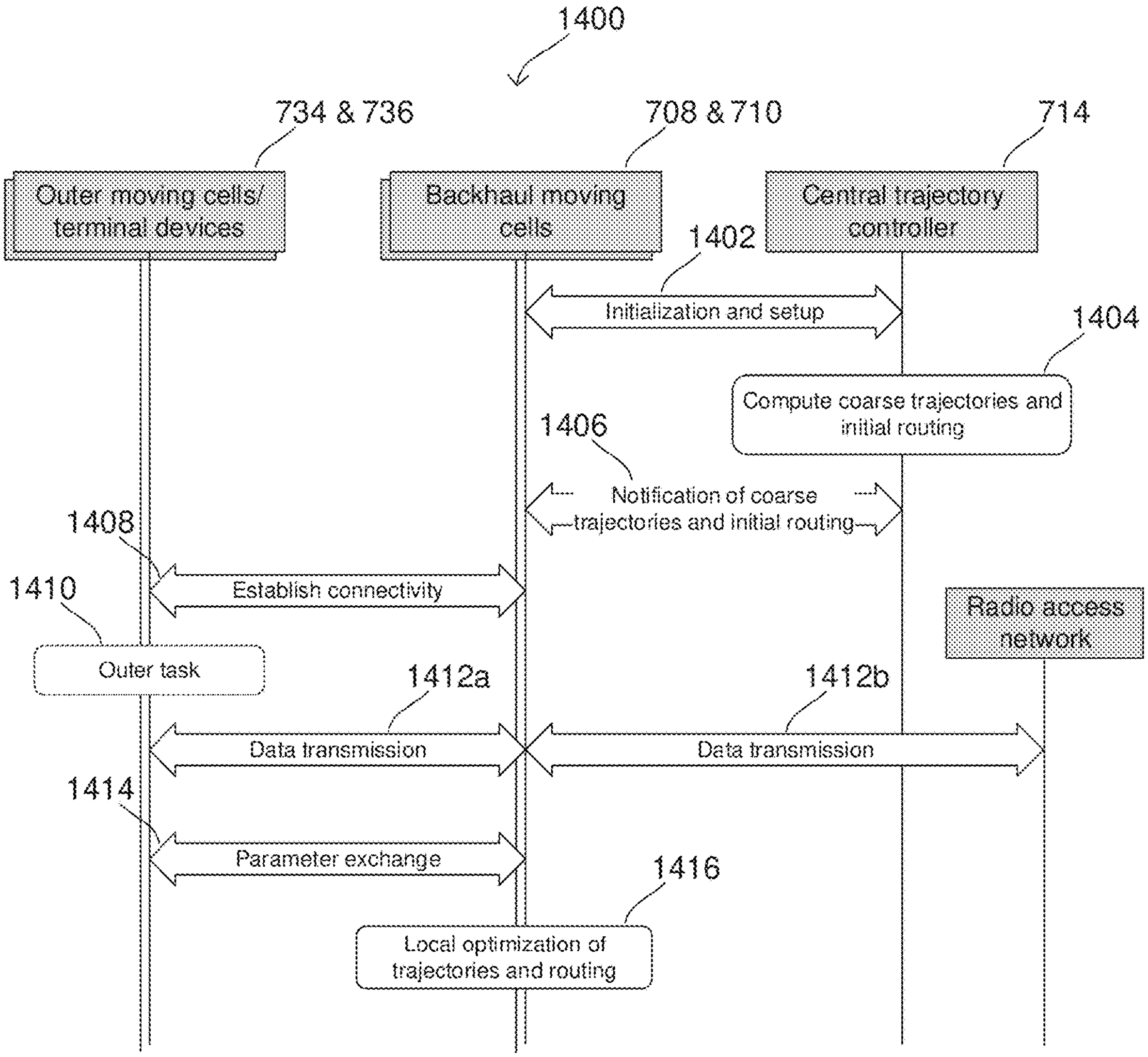

FIG 14
1400
734 & 736
708 & 710
714
Outer moving cells/ terminal devices
Backhaul moving cells
Central trajectory controller
1402
Initialization and setup
1404
Compute coarse trajectories and initial routing
1406
Notification of coarse trajectories and initial routing
1408
Establish connectivity
1410
Outer task
Radio access network
1412a
1412b
Data transmission
Data transmission
1414
Parameter exchange
1416
Local optimization of trajectories and routing

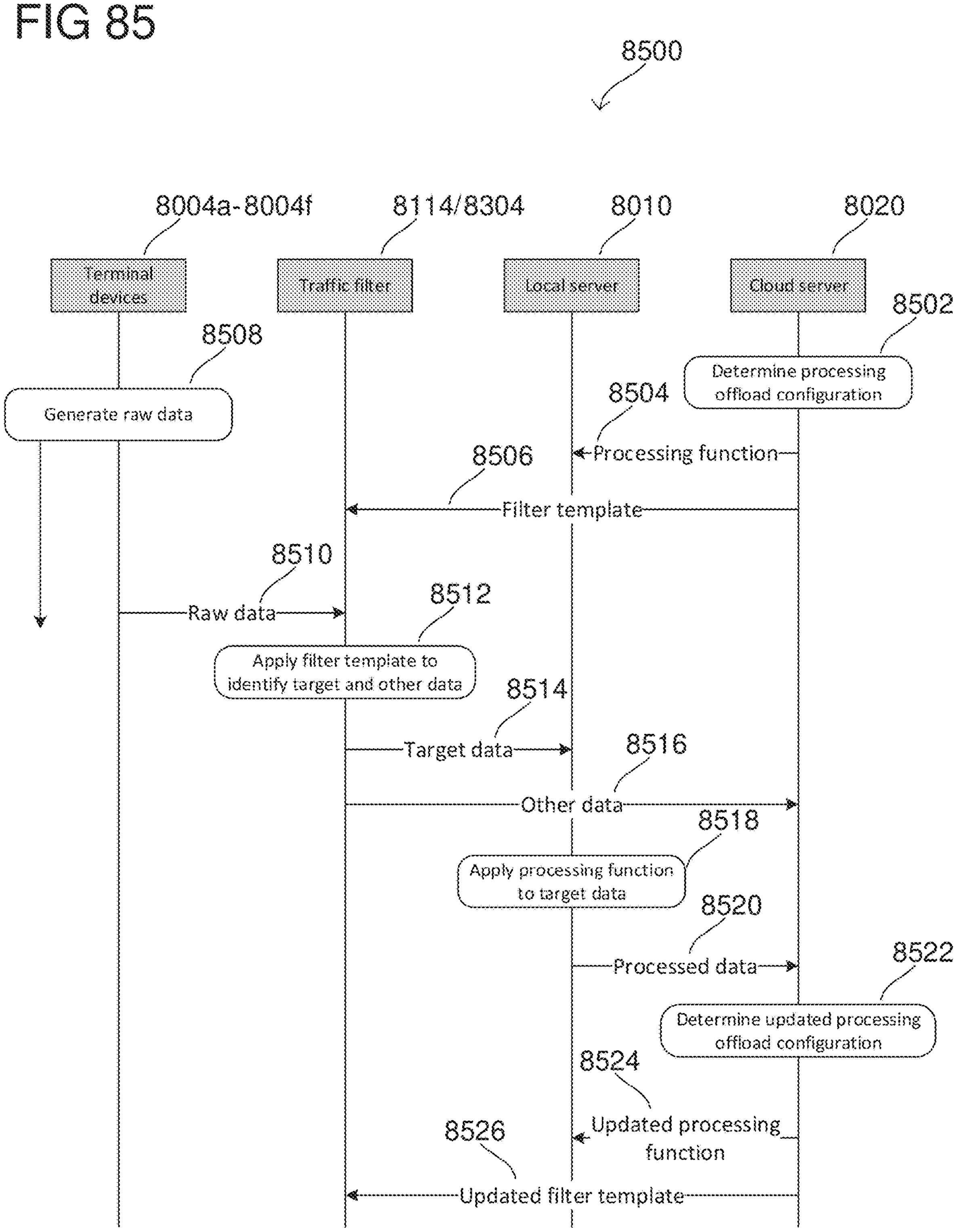

Terminal devices
Traffic filter
Local server
Cloud server

8502 Determine processing offload configuration
8508 Generate raw data
8504 Processing function
8506 Filter template
8510 Raw data
8512 Apply filter template to identify target and other data
8514 Target data
8516 Other data
8518 Apply processing function to target data
8520 Processed data
8522 Determine updated processing offload configuration
8524 Updated processing function
8526 Updated filter template

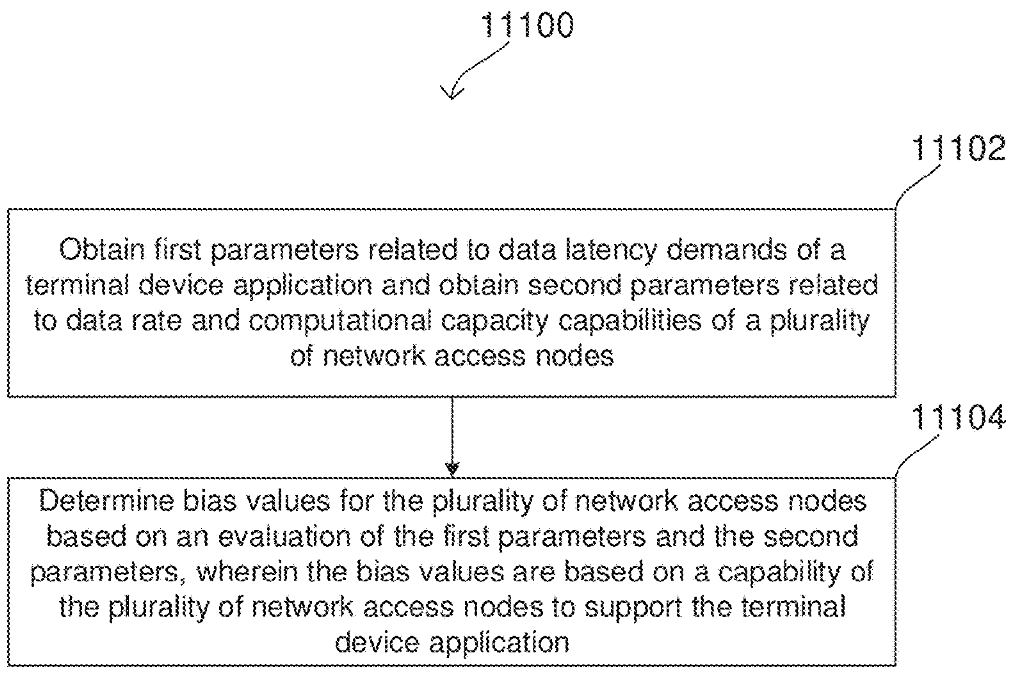

Obtain first parameters related to data latency demands of a terminal device application and obtain second parameters related to data rate and computational capacity capabilities of a plurality of network access nodes

11104

Determine bias values for the plurality of network access nodes based on an evaluation of the first parameters and the second parameters, wherein the bias values are based on a capability of the plurality of network access nodes to support the terminal device application

12600

12700

FIG 132
13200
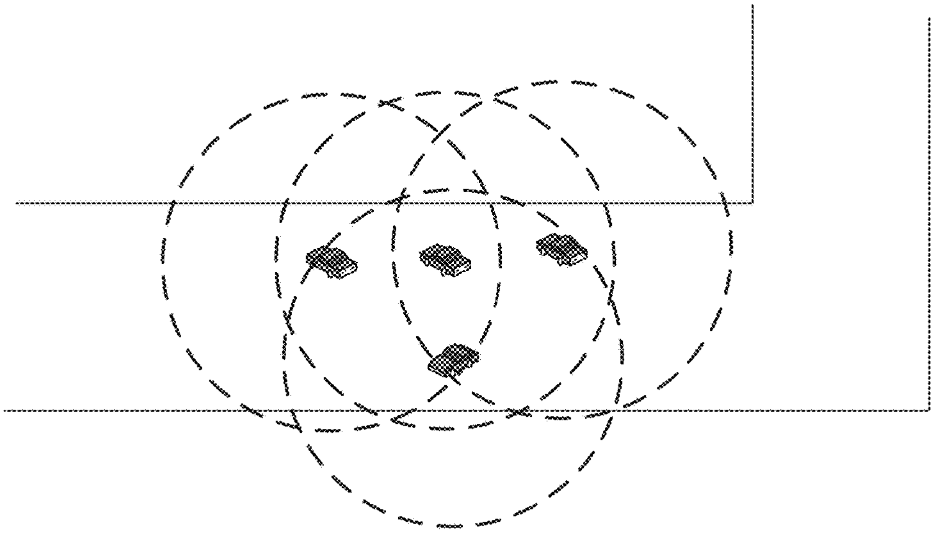
13250
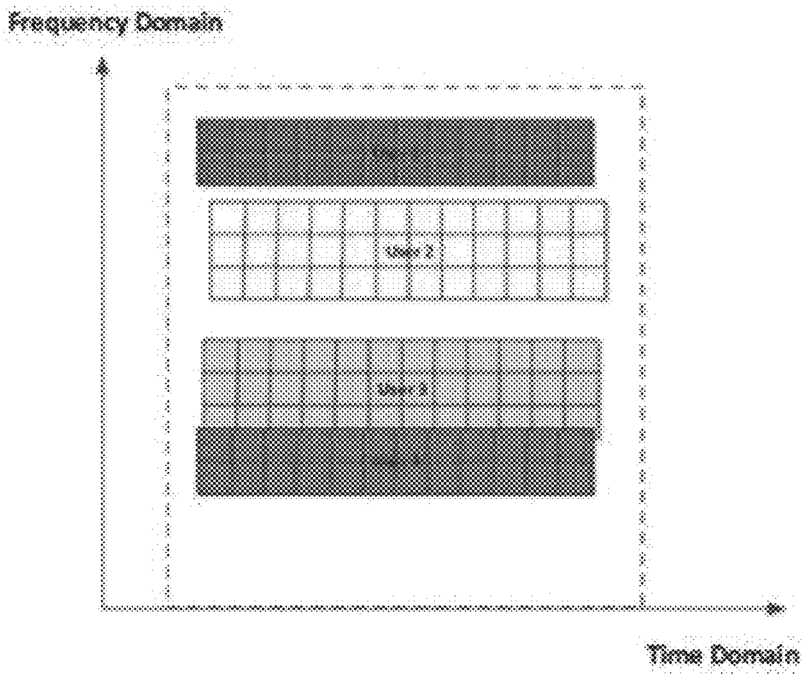

FIG 133
13300
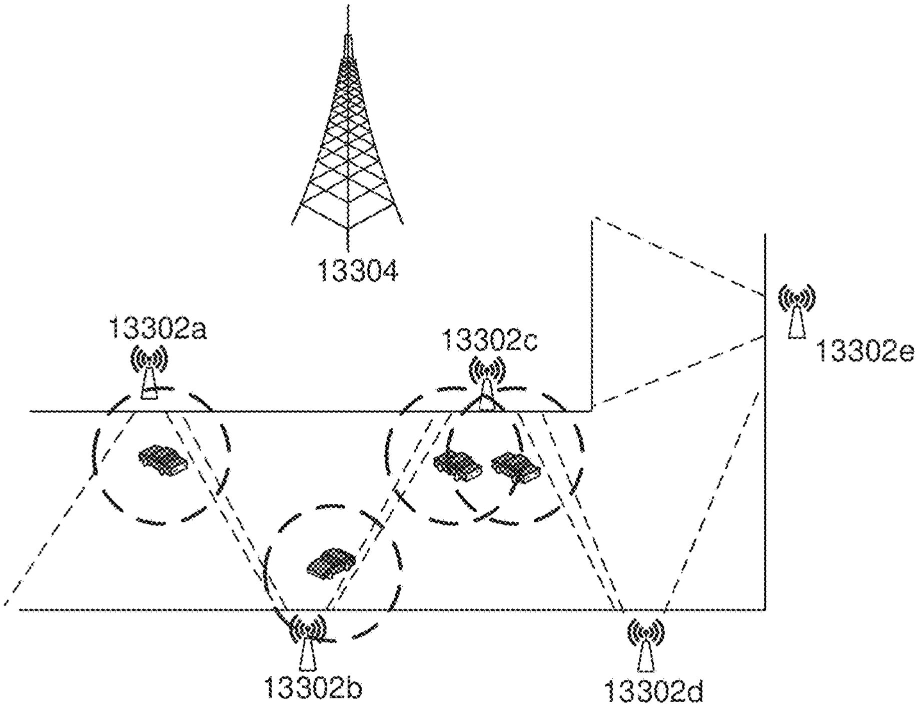
13350
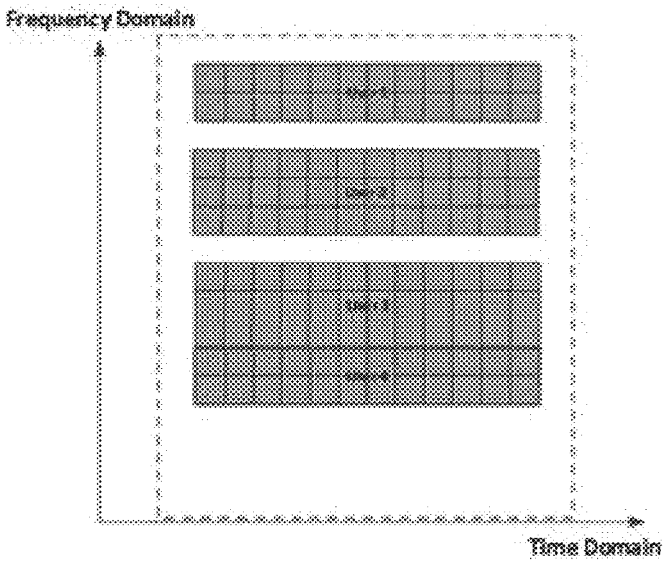

FIG 137
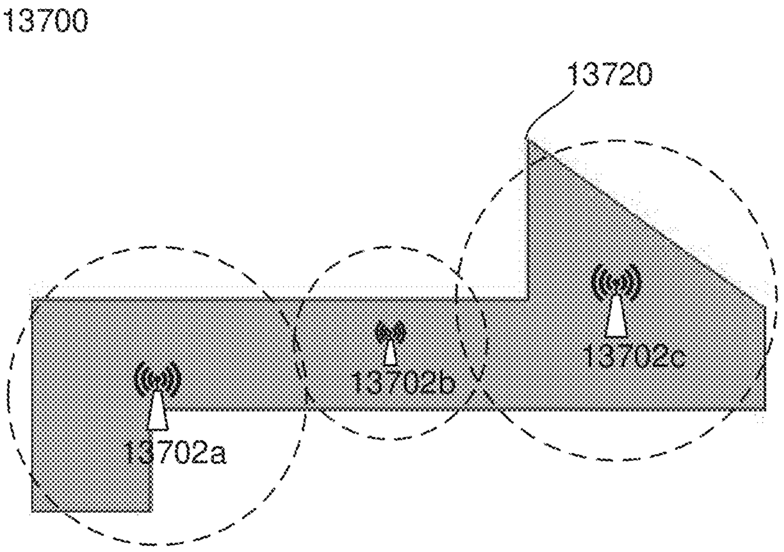
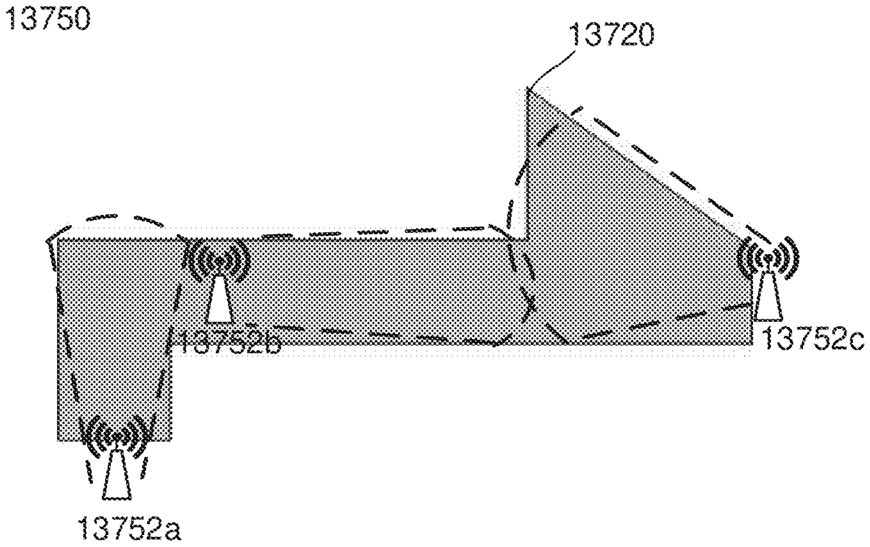

13900

14000

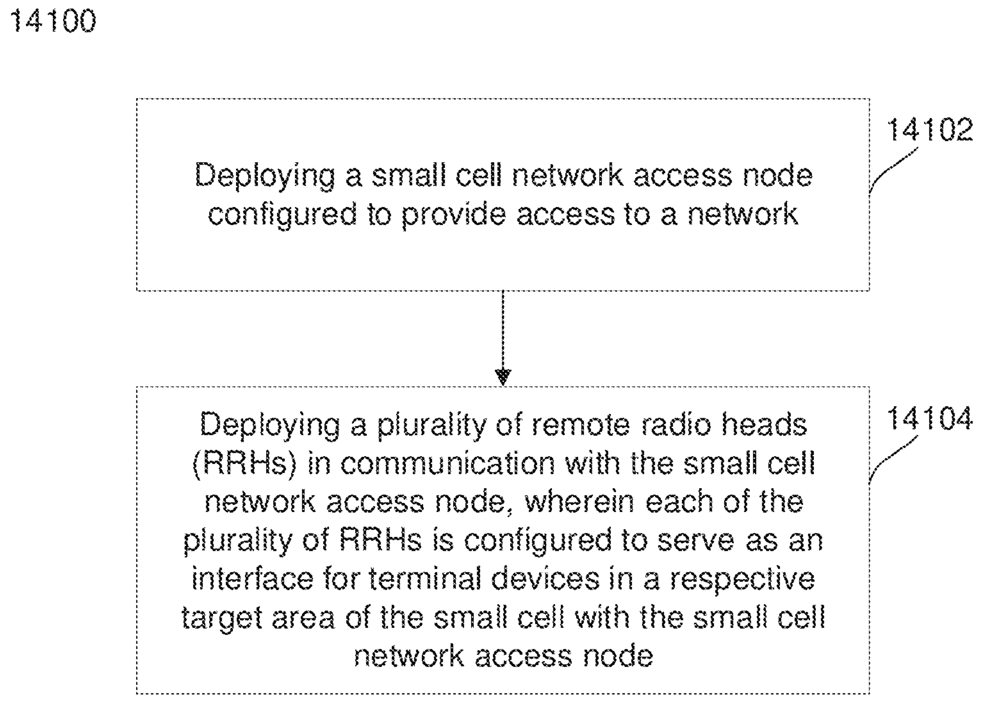

Deploying a small cell network access node configured to provide access to a network

14102

Deploying a plurality of remote radio heads (RRHs) in communication with the small cell network access node, wherein each of the plurality of RRHs is configured to serve as an interface for terminal devices in a respective target area of the small cell with the small cell network access node

14104

14300

14400

14500

14600
14602 Reconfig-uration Controller
RAT 1 A
RAT 1 C
RAT 1 D
RAT 1 E
14702
RAT 2 A
RAT 2 B
RAT 2 C
RAT 2 D
RAT 2 E
RAT 3 A
RAT 3 B
RAT 3 C
RAT 3 D
RAT 3 E
14704
Replace-ment RAT 1 B
14604 Shared Compu-tational/ Memory Resources

14900

15100

FIG 153
15300
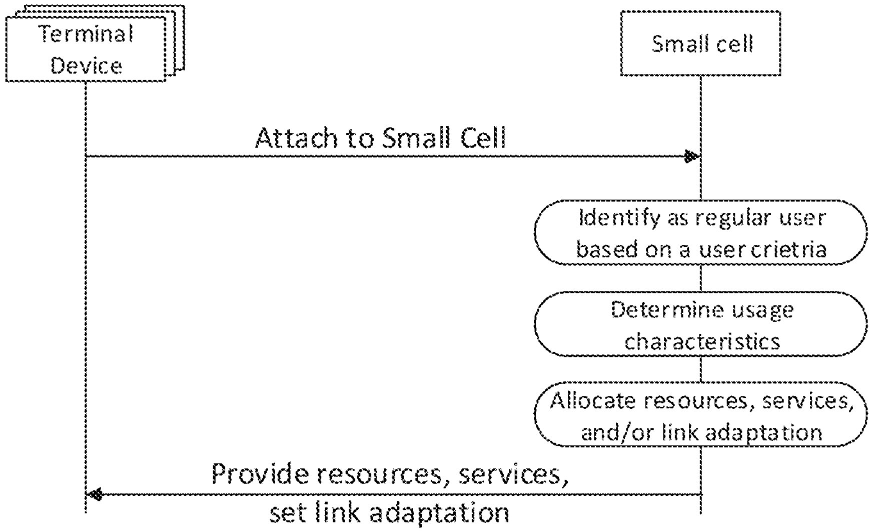
15350
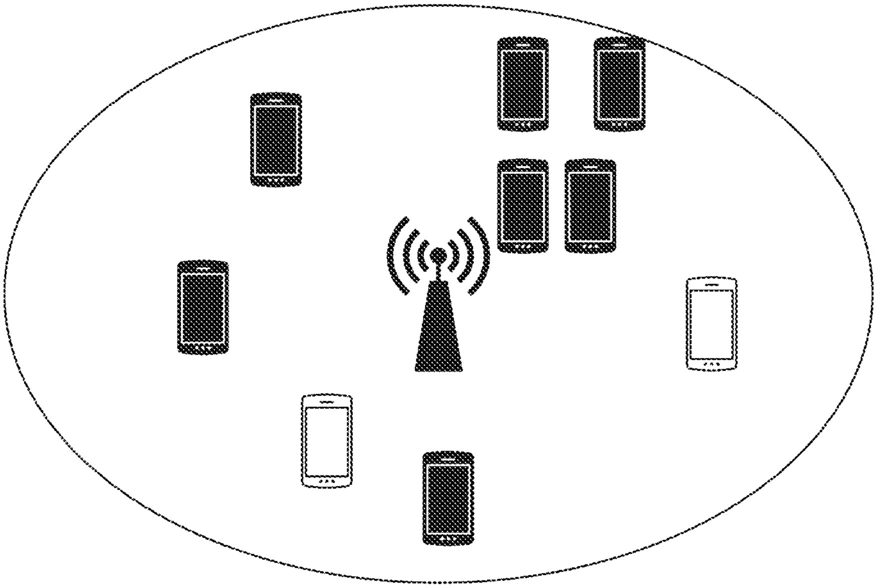

FIG 155
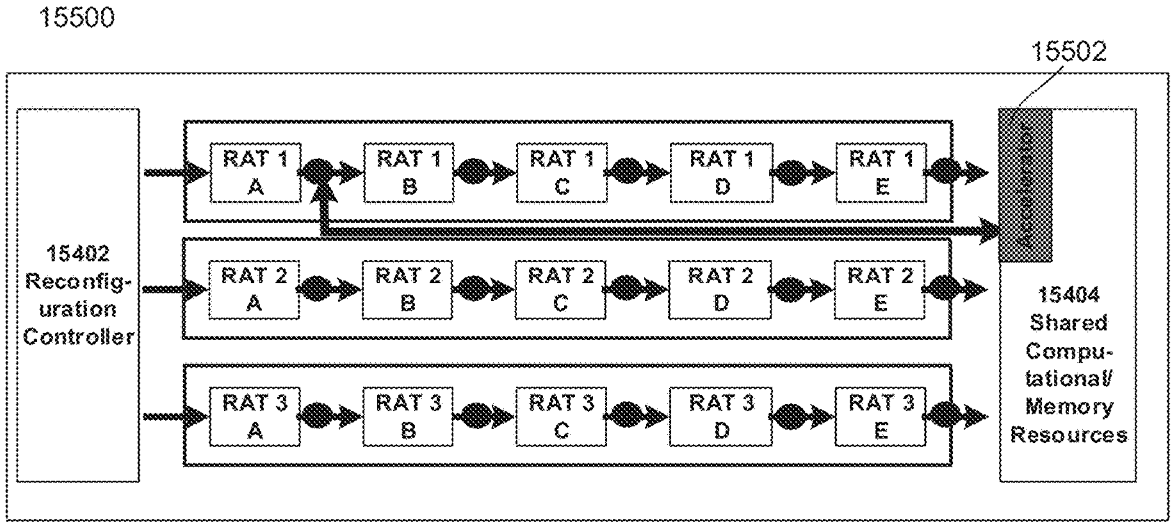
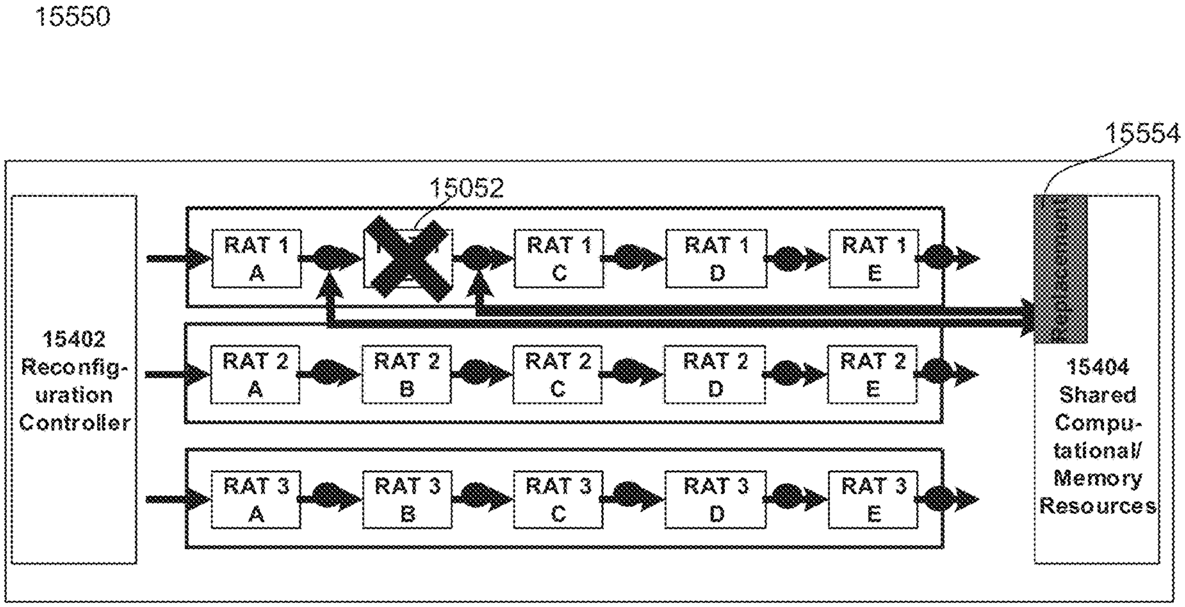

16400

16700

Baseband IC
19302

L1, L2 Controller

On Chip Memory

TX Data Path

RX Data Path

Measurements

Baseband RF Interface IC
19304

Control

RFIC
19306

TX

RX

RFIC
19308

Control

RX

TX

ET
19310

LNA
19314

LNA
19316

ET
19312

PA
19318

Duplexer
19322

Duplexer
19324

PA
19320

Antenna tuner
19326

504

506

20400
504
506
RFIC
19306
Delay Compensation Setting 20404
TX
Evaluation/Generate New
Compensation Setting
20410
AM signal
ET
19310
PM signal
PA
19318
TX signal
Switch
20402
Duplexer
19322
Antenna System
Baseband IC
19302
Feedback
RX
Measurement
20408
RX signal
Internal
TX-RX
Loopback
20406

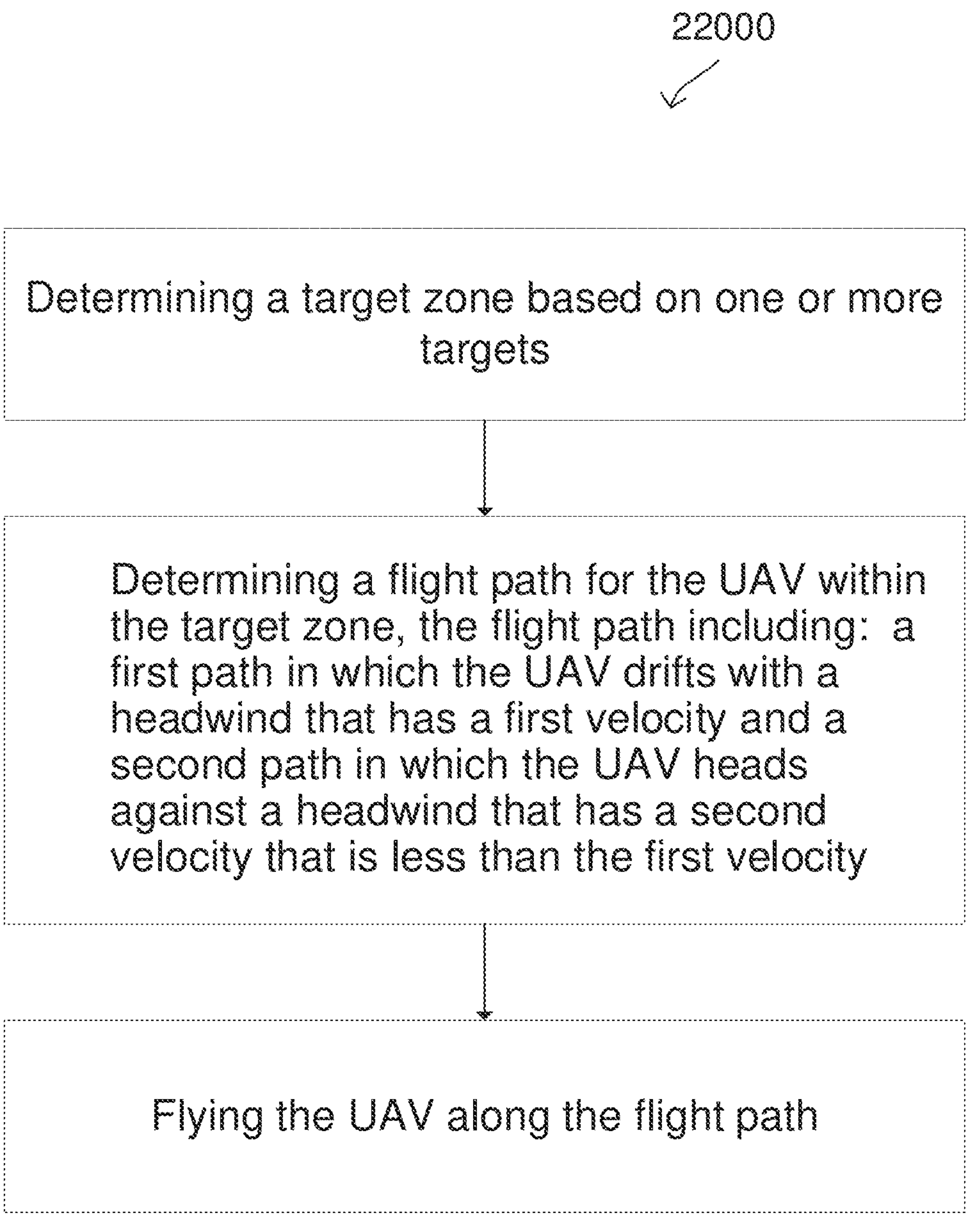

Determining a target zone based on one or more targets

Determining a flight path for the UAV within the target zone, the flight path including: a first path in which the UAV drifts with a headwind that has a first velocity and a second path in which the UAV heads against a headwind that has a second velocity that is less than the first velocity Flying the UAV along the flight path

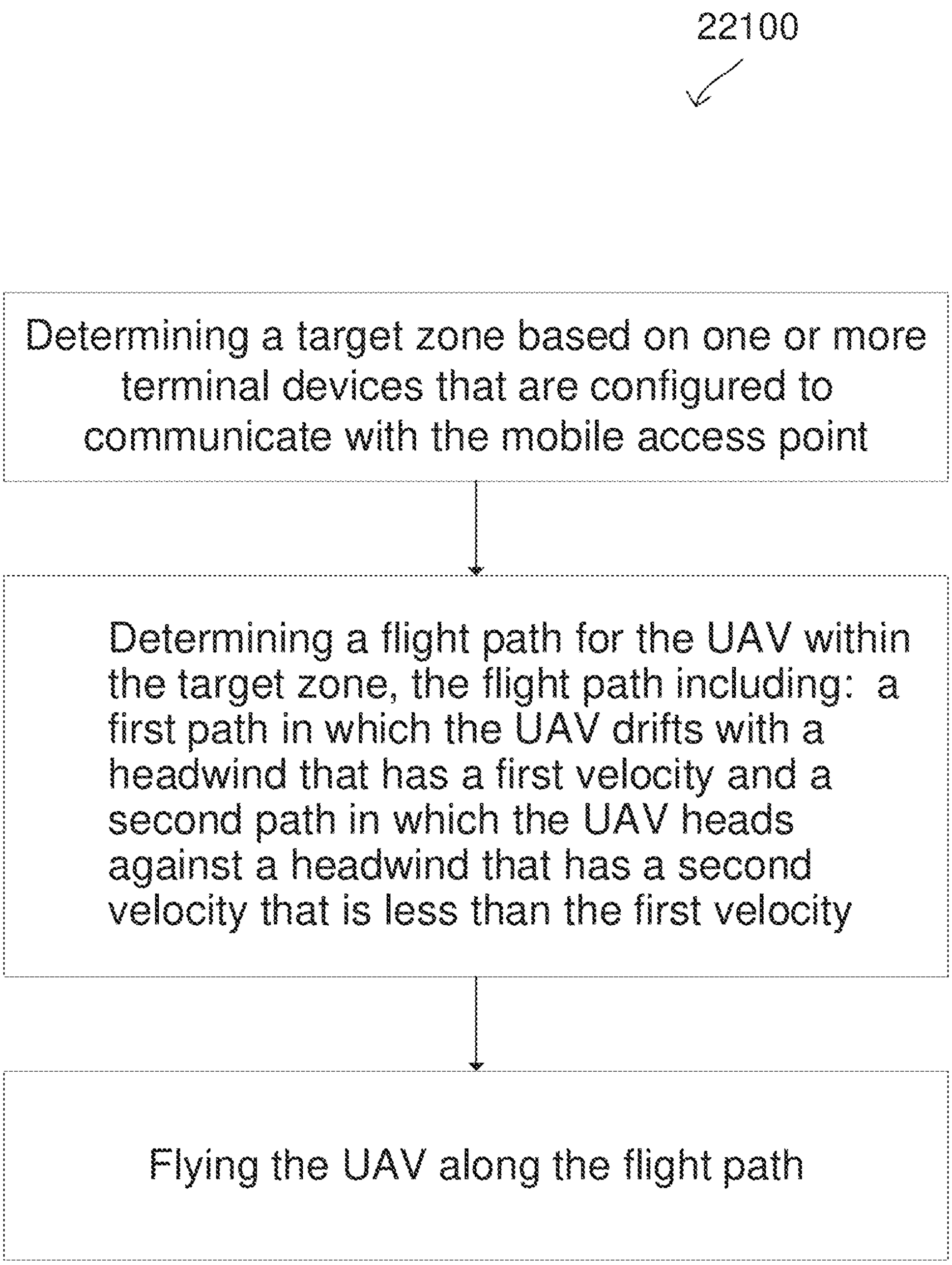

Determining a target zone based on one or more terminal devices that are configured to communicate with the mobile access point Determining a flight path for the UAV within the target zone, the flight path including: a first path in which the UAV drifts with a headwind that has a first velocity and a second path in which the UAV heads against a headwind that has a second velocity that is less than the first velocity Flying the UAV along the flight path

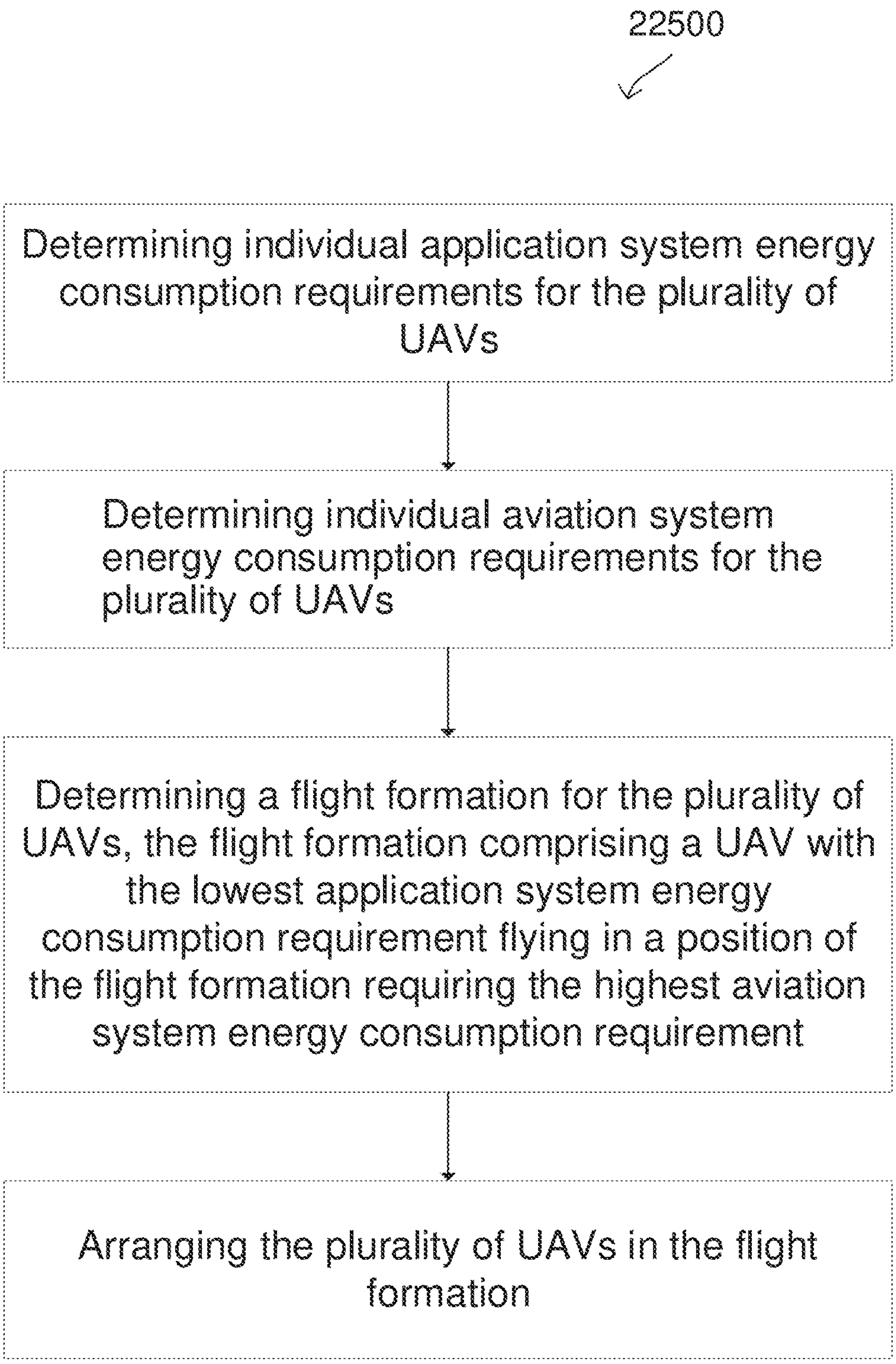

Determining individual application system energy consumption requirements for the plurality of UAVs Determining individual aviation system energy consumption requirements for the plurality of UAVs Determining a flight formation for the plurality of UAVs, the flight formation comprising a UAV with the lowest application system energy consumption requirement flying in a position of the flight formation requiring the highest aviation system energy consumption requirement Arranging the plurality of UAVs in the flight formation

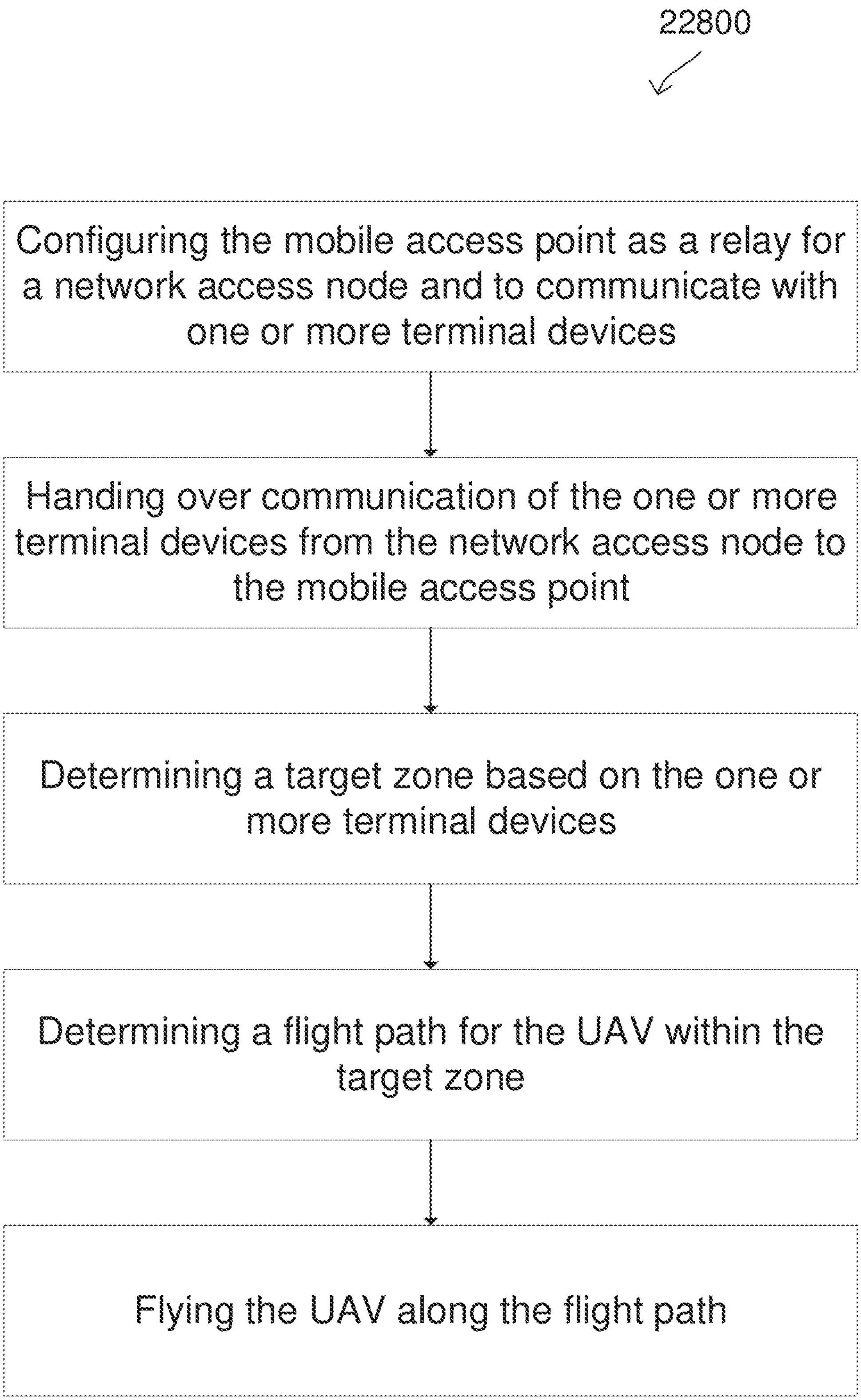

Configuring the mobile access point as a relay for a network access node and to communicate with one or more terminal devices Handing over communication of the one or more terminal devices from the network access node to the mobile access point Determining a target zone based on the one or more terminal devices Determining a flight path for the UAV within the target zone Flying the UAV along the flight path

23300

Determining a flight path for the UAV comprising a descent

Flying the UAV in the descent along the flight path at a velocity that air passing over the airfoil turns the rotatable structure and the generator to generate electricity Storing the electricity in the battery

23500

Fixing the UAV to a structure in a wind with air passing over the airfoil that turns the rotatable structure and the generator to generate electricity Storing the electricity in the battery

23700

Fixing the UAV to a further unmanned aerial vehicle (UAV)

↓

Transporting the UAV with the further UAV with air passing over the airfoil that turns the rotatable structure and the generator to generate electricity

↓

Storing the electricity in the battery

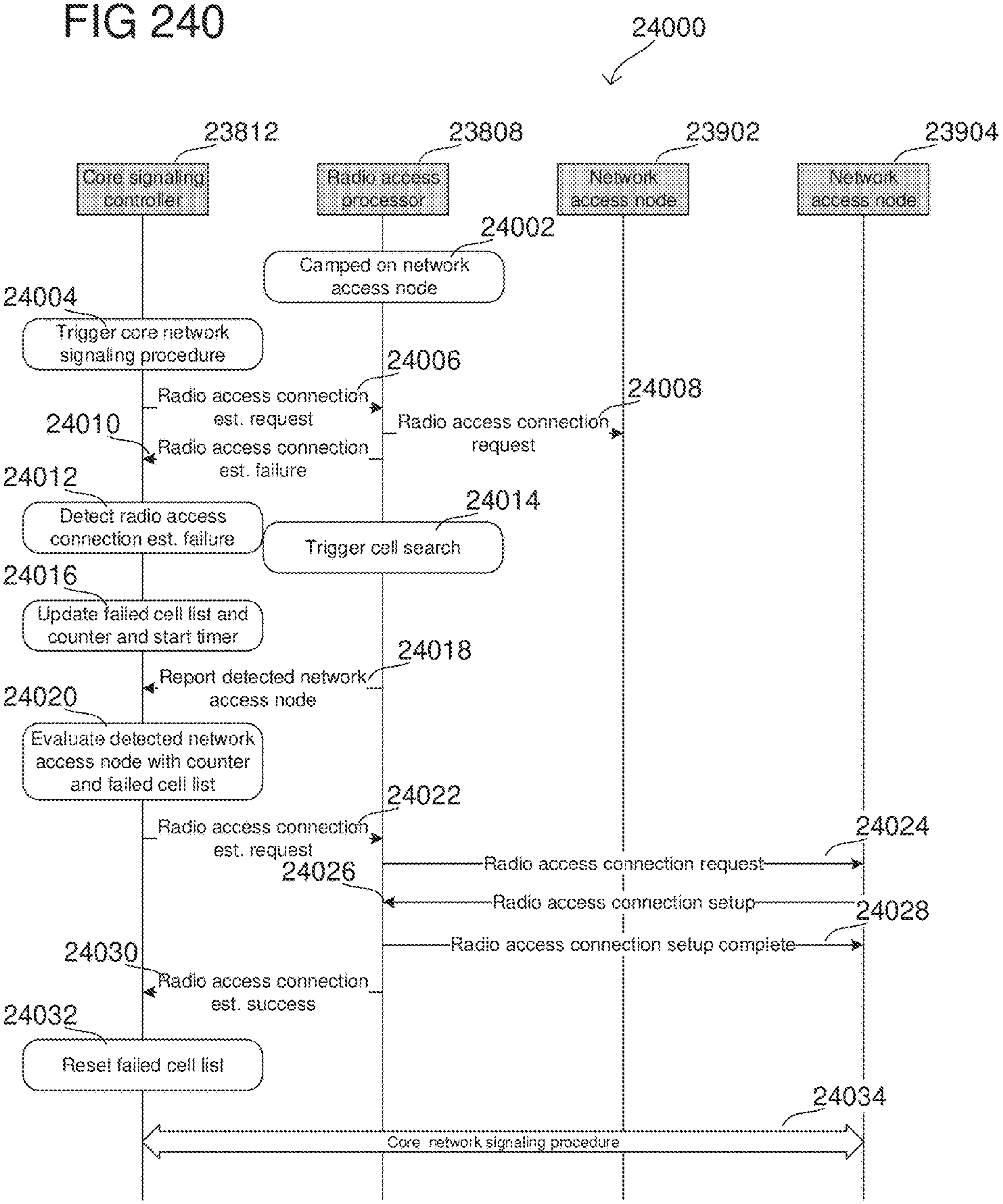

FIG 240
24000
23812
Core signaling controller
23808
Radio access processor
23902
Network access node
23904
Network access node
24002
Camped on network access node
24004
Trigger core network signaling procedure
24006
Radio access connection est. request
24008
Radio access connection request
24010
Radio access connection est. failure
24012
Detect radio access connection est. failure
24014
Trigger cell search
24016
Update failed cell list and counter and start timer
24018
Report detected network access node
24020
Evaluate detected network access node with counter and failed cell list
24022
Radio access connection est. request
24024
Radio access connection request
24026
Radio access connection setup
24028
Radio access connection setup complete
24030
Radio access connection est. success
24032
Reset failed cell list
24034
Core network signaling procedure

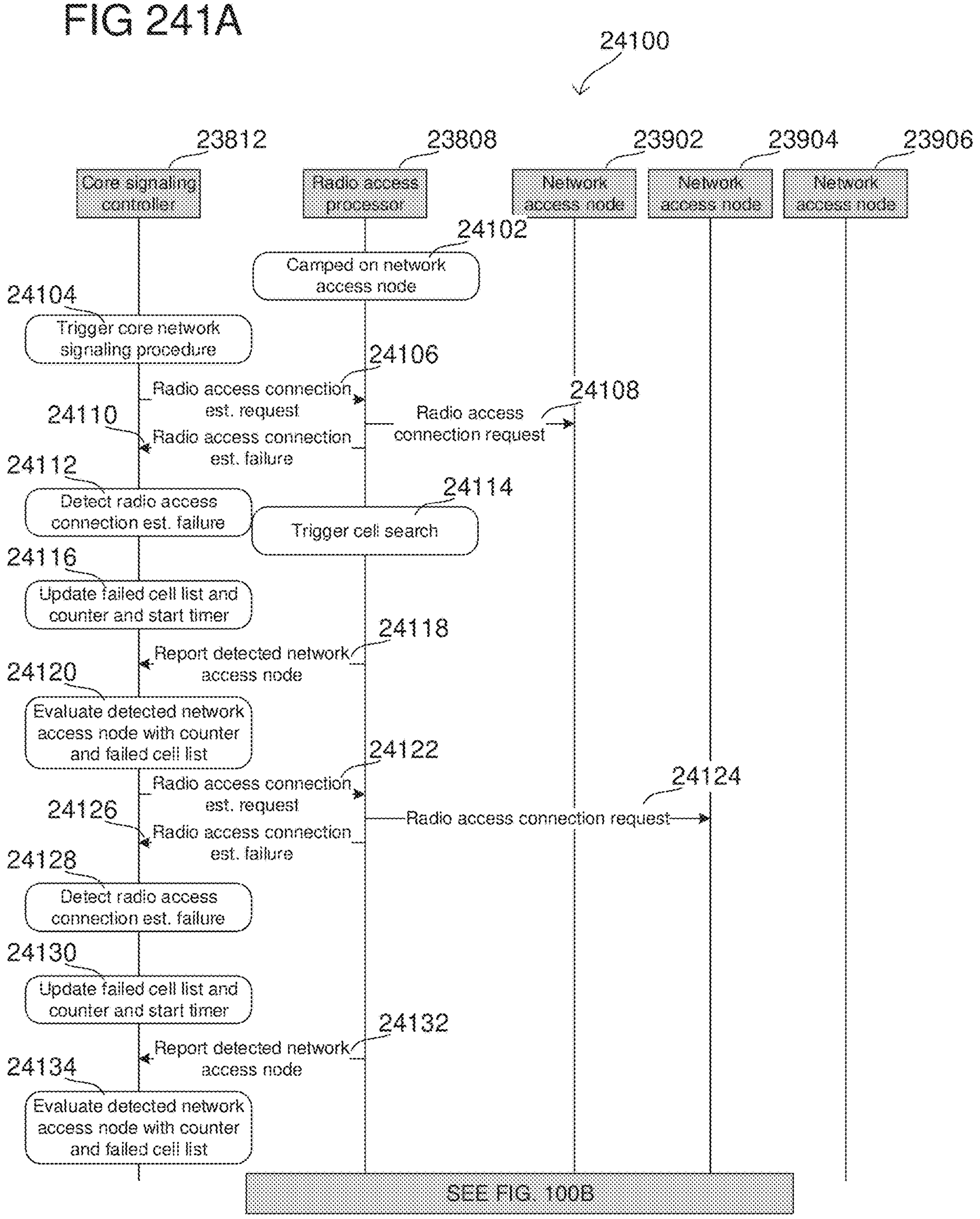

FIG 241A
24100
23812
23808
23902
23904
23906
Core signaling controller
Radio access processor
Network access node
Network access node
Network access node
24102
Camped on network access node
24104
Trigger core network signaling procedure
24106
Radio access connection est. request
24108
Radio access connection request
24110
Radio access connection est. failure
24112
Detect radio access connection est. failure
24114
Trigger cell search
24116
Update failed cell list and counter and start timer
24118
Report detected network access node
24120
Evaluate detected network access node with counter and failed cell list
24122
Radio access connection est. request
24124
Radio access connection request
24126
Radio access connection est. failure
24128
Detect radio access connection est. failure
24130
Update failed cell list and counter and start timer
24132
Report detected network access node
24134
Evaluate detected network access node with counter and failed cell list
SEE FIG. 100B

METHODS AND DEVICES FOR WIRELESS COMMUNICATIONS

CROSS-REFERENCE TO RELATED APPLICATIONS

This is a continuation of U.S. application Ser. No. 18/182,419, which was filed on Mar. 13, 2023, which is a continuation of U.S. application Ser. No. 16/830,423, filed on Mar. 26, 2020, which claims priority to PCT Application PCT/US2018/039890, filed on Jun. 28, 2018, which claims priority to U.S. Patent Application Ser. No. 62/612,327, filed Dec. 30, 2017, and to Indian Patent Application Serial No. 201741047375, filed Dec. 30, 2017, all of which are incorporated herein by reference in their entirety.

TECHNICAL FIELD

Various aspects relate generally to methods and devices for wireless communications.

BACKGROUND

Developments in radio communication networks have led to various new types of network architectures. Some of these network architectures relate to heterogenous networks, where both larger macro cells and small cells are deployed in a coverage area. The macro cells may serve large coverage areas while the small cells serve more limited spaces. Other network architectures including moving cells, such as cells that can use mobility to improve coverage to their served terminal devices. Additional networks may use vehicular communication devices, where vehicles can be equipped with connectivity functionality to wirelessly communicate with each other and the underlying network.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which:

FIG. 14 shows an exemplary trajectory control procedure for backhaul moving cells according to some aspects;

FIG. 85 shows an exemplary procedure for dynamic local server processing offload according to some aspects;

FIG. 111 shows an exemplary method of determining bias values according to some aspects;

FIG. 132 illustrates problems identified in V2X communications in some aspects.

FIG. 133 shows an exemplary network configuration and frequency, time, and power graph in some aspects

FIG. 137 shows exemplary small cell configurations in some aspects.

FIG. 141 shows an exemplary flowchart describing a method for deploying a small cell communication arrangement in some aspects.

FIG. 144 shows an exemplary message sequence chart (MSC) illustrating a terminal device RX calibration in some aspects.

FIG. 145 shows an exemplary message sequence chart (MSC) illustrating a terminal device TX calibration in some aspects.

FIG. 146-147 show exemplary diagrams for an software reconfiguration based replacement of defective source components in some aspects.

FIG. 148 shows an exemplary diagram illustrating a hardware replacement of defective source components in a terminal device in some aspects.

FIG. 149 shows an exemplary diagram for a hardware reconfiguration based replacement of defective source components in some aspects.

FIG. 150 shows an exemplary flowchart describing a method for calibrating a communication device in some aspects.

FIG. 151 shows an exemplary flowchart describing replacing a component of a communication device in some aspects.

FIG. 152 shows an exemplary flowchart describing a method for selecting a RAT link for transmitting a message in some aspects.

FIG. 153 shows an exemplary MSC with a corresponding small cell network in some aspects.

FIG. 154-155 show exemplary diagrams for small cell reconfiguration in some aspects.

FIG. 156 shows an exemplary small cell network with a plurality of specialized small cells in some aspects.

FIG. 157 shows an exemplary MSC for the signaling of a small cell network in some aspects.

Figure 158:
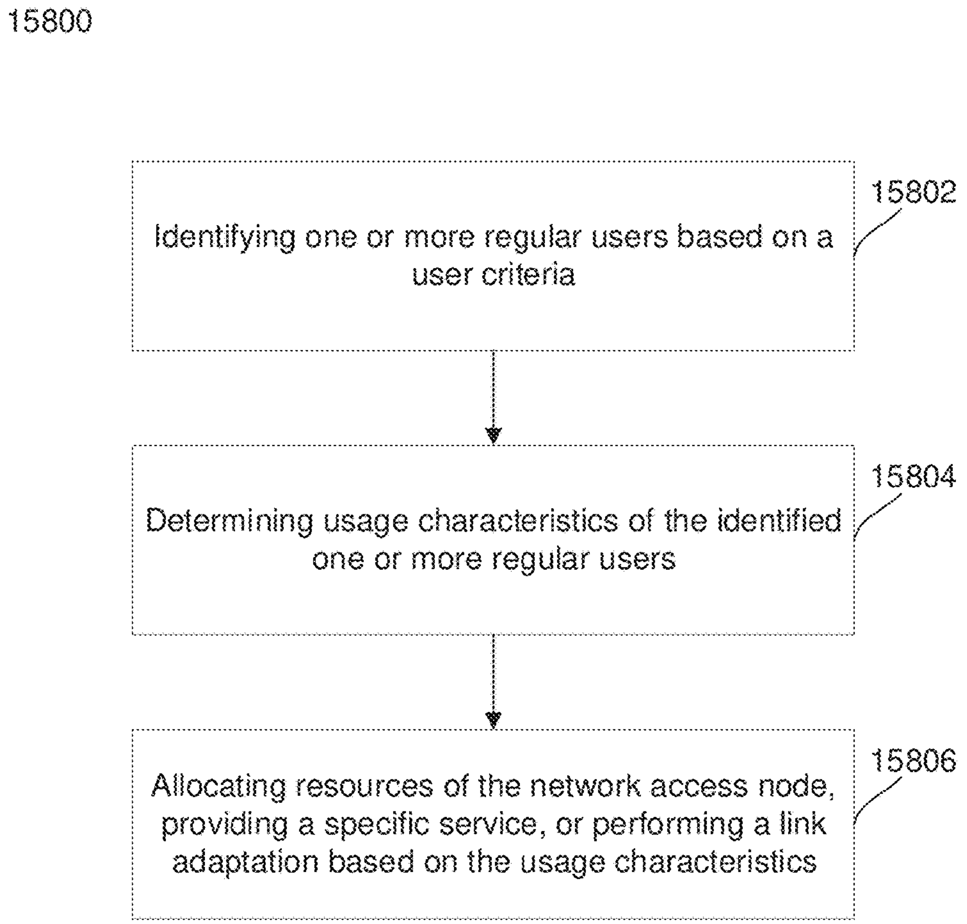

FIG. 158 shows an exemplary flowchart describing a method for a network access node to interact with users in some aspects.

Figure 159:
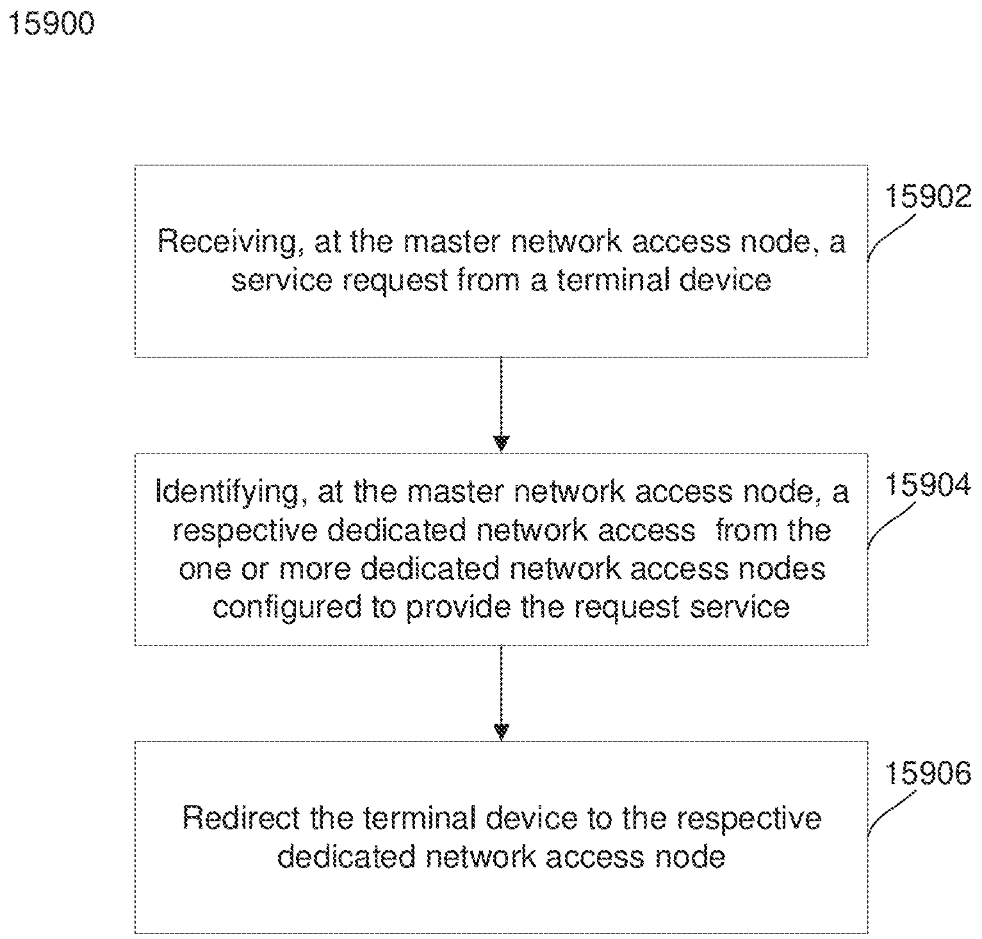

FIG. 159 shows an exemplary flowchart describing management of a network access node arrangement including a master network access node and one or more dedicated network access nodes in some aspects.

Figure 160:
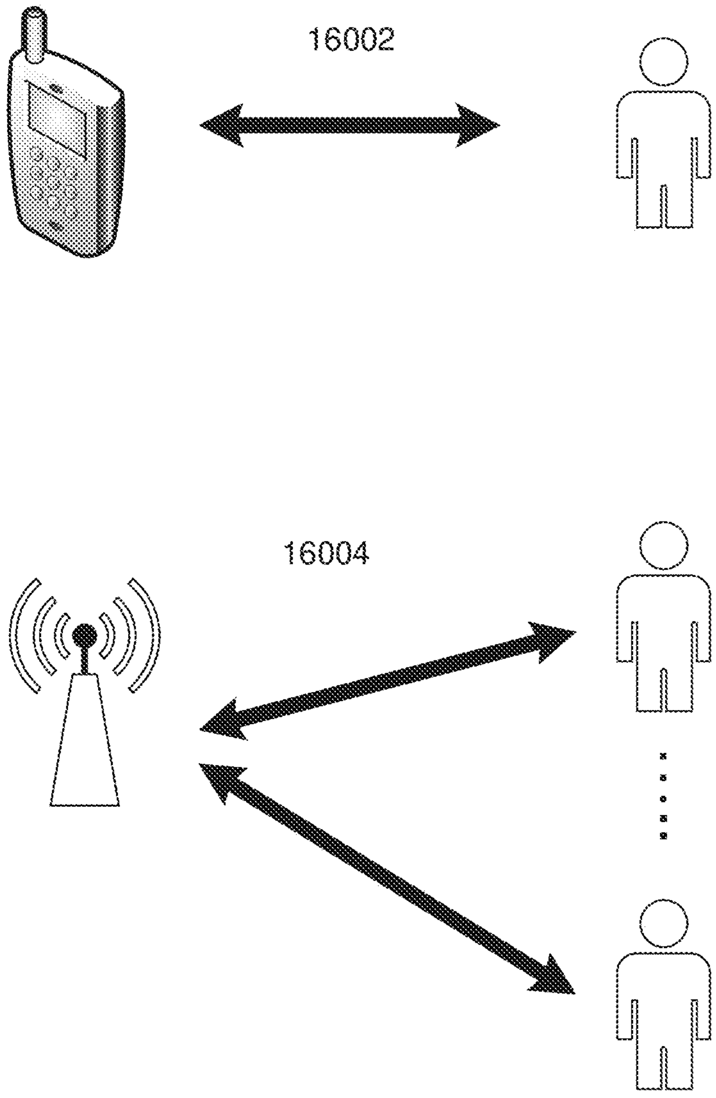

FIG. 160 shows a diagram highlighting differences between reconfiguring a single terminal device compared to reconfiguring a small cell in some aspects.

Figure 161:
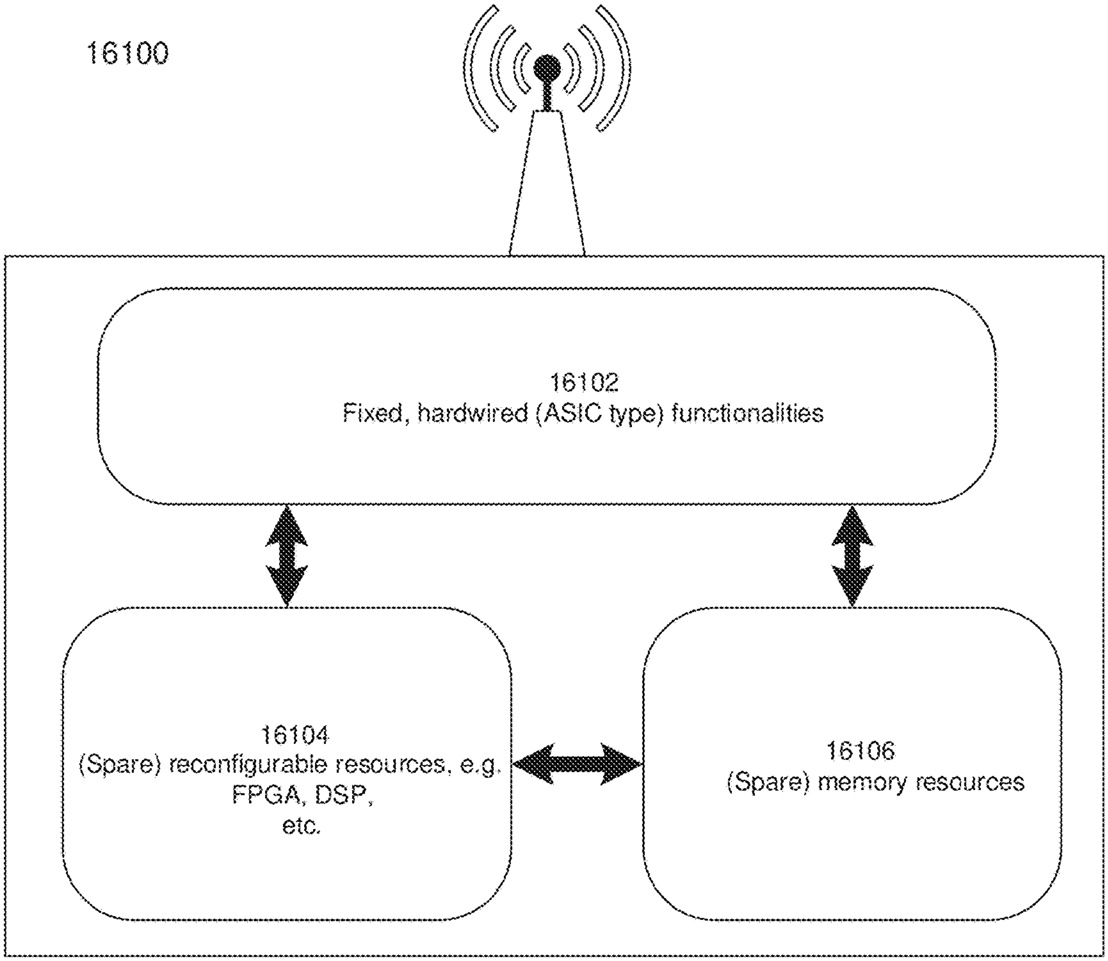

FIG. 161 shows an exemplary small cell architecture according to some aspects.

Figure 162:
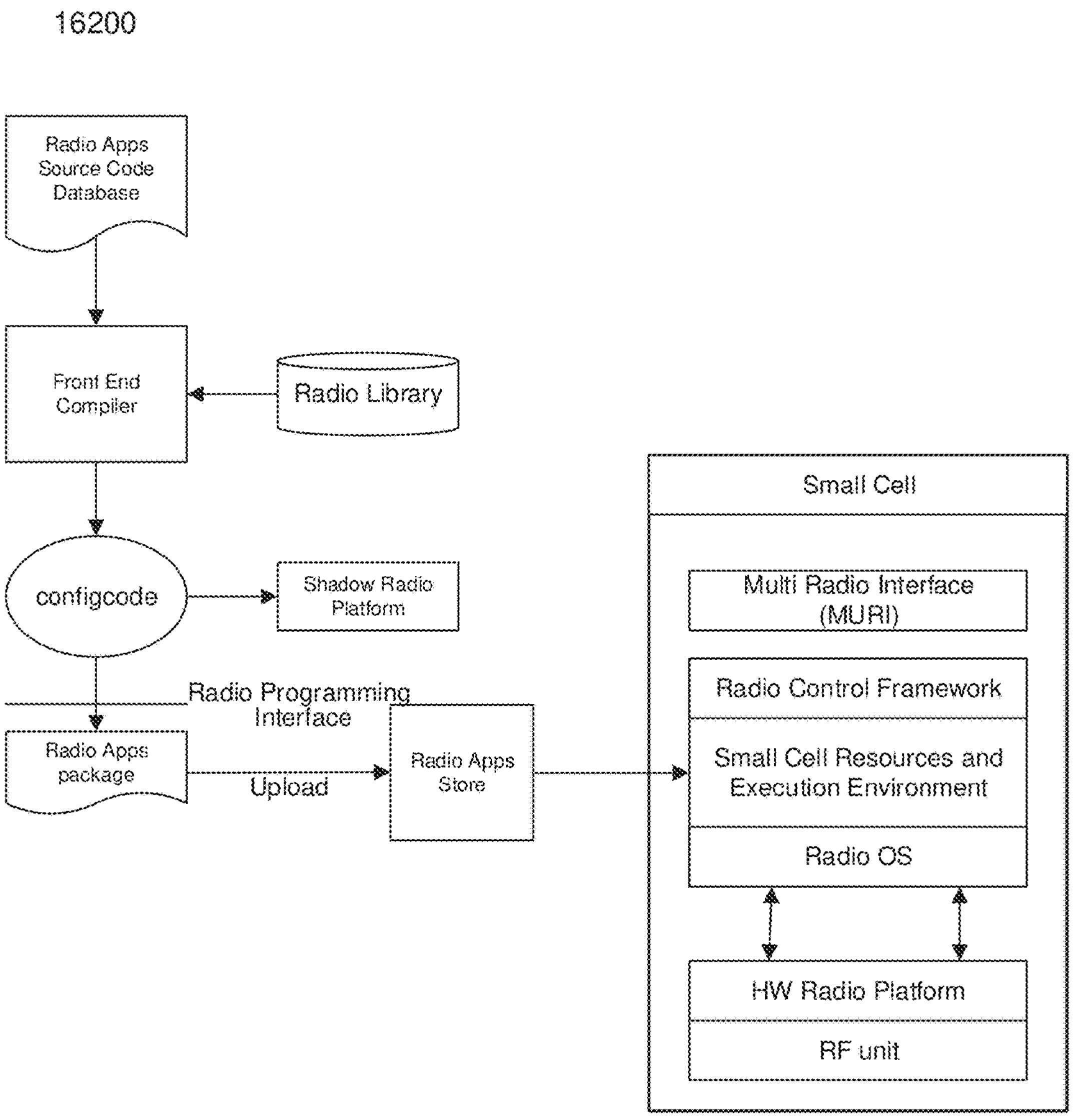

FIG. 162 shows an exemplary overall system architecture for providing updates to the small cell in some aspects.

Figure 163:
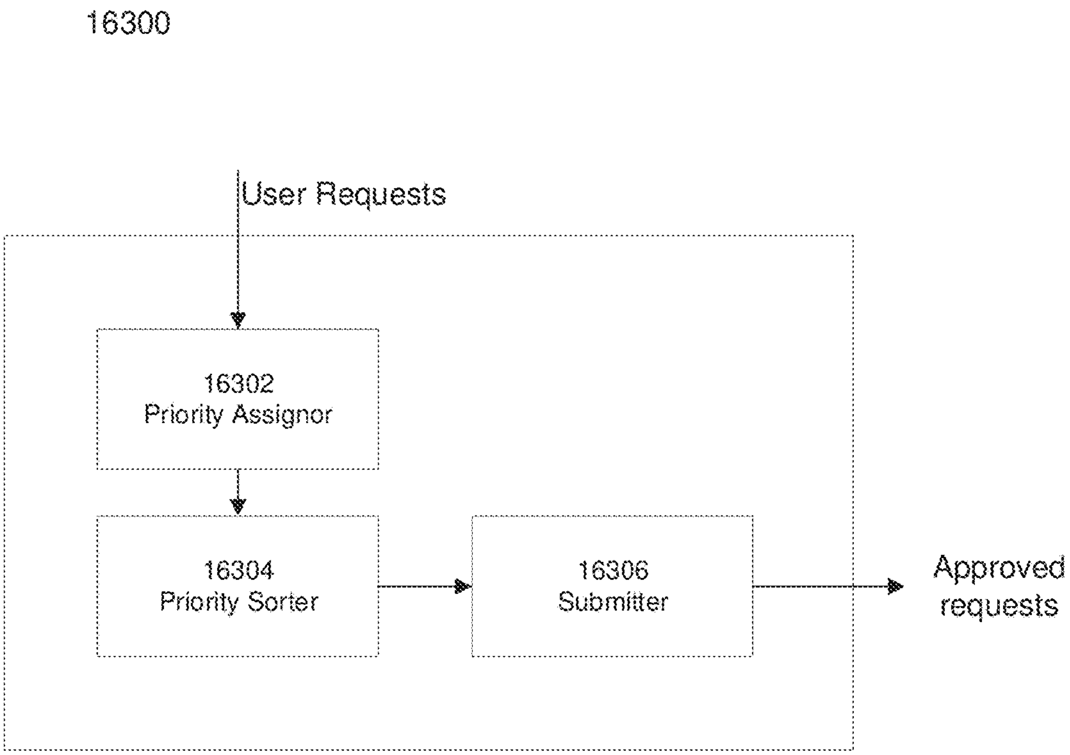

FIG. 163 shows an exemplary small cell priority determiner in some aspects.

Figure 164:
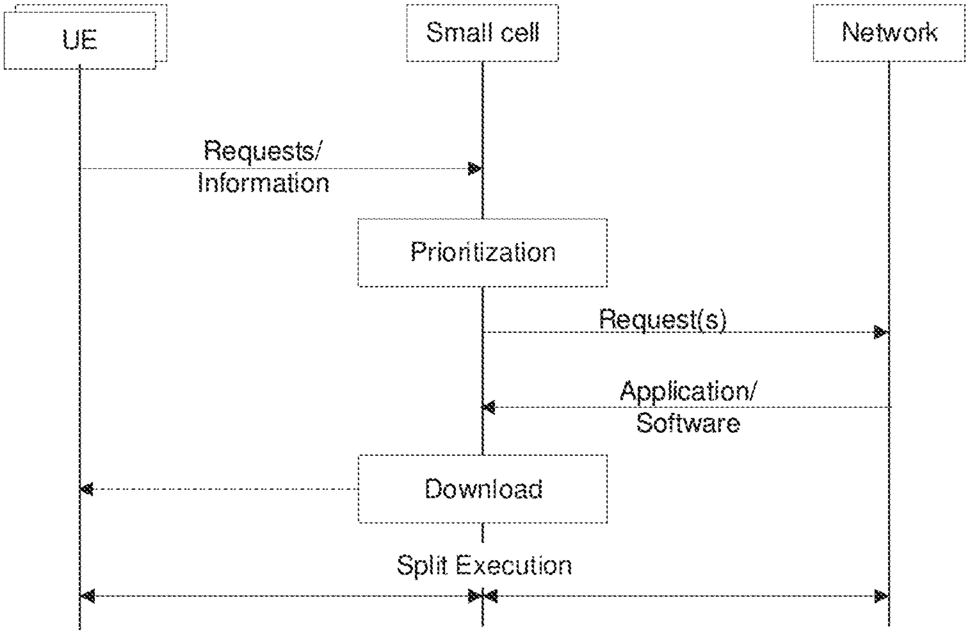

FIG. 164 shows an exemplary MSC describing a signaling process for a small cell network in some aspects.

Figure 165:
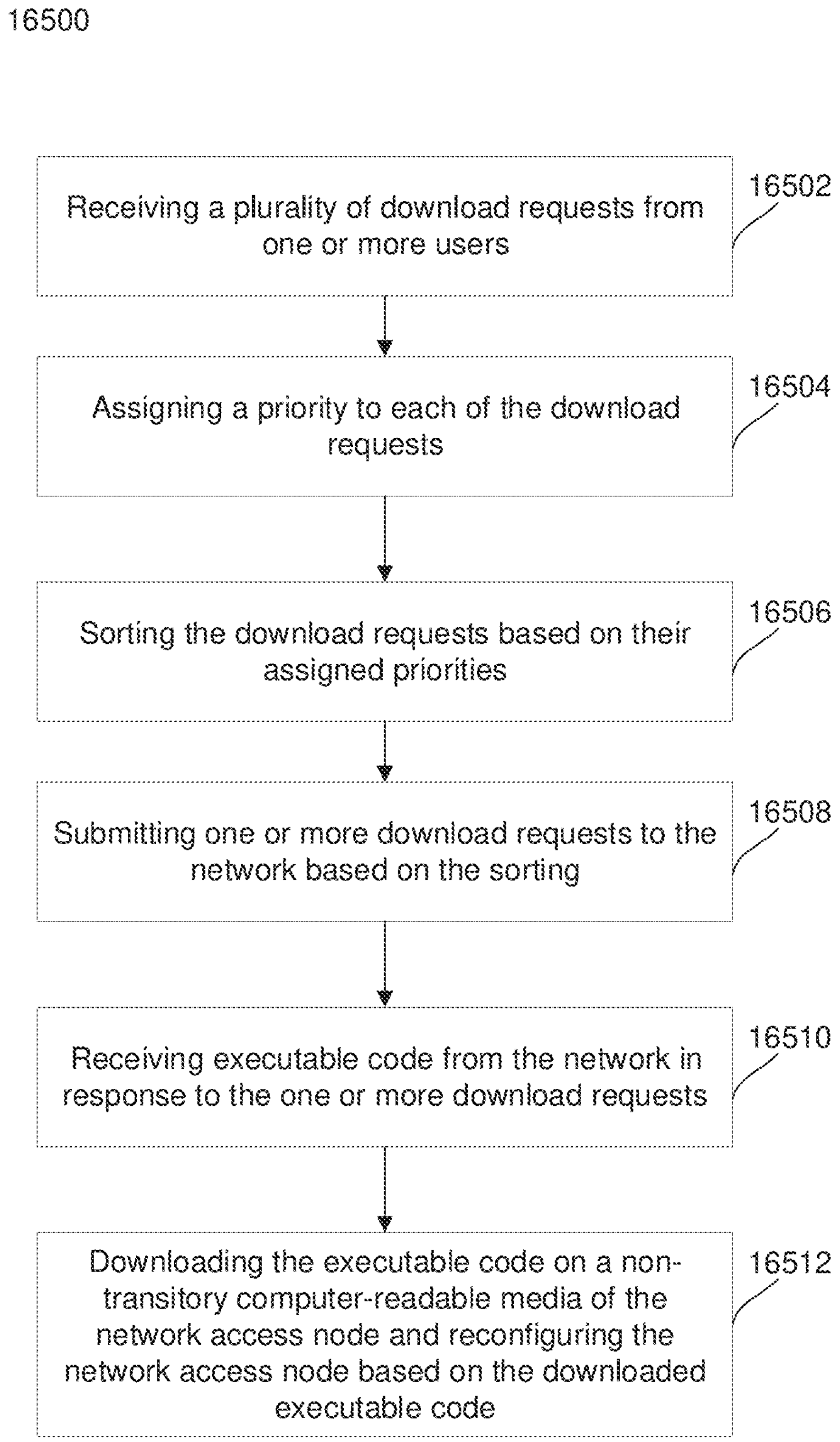

FIG. 165 shows an exemplary flowchart describing a method for configuring a network access node in some aspects.

Figure 166:
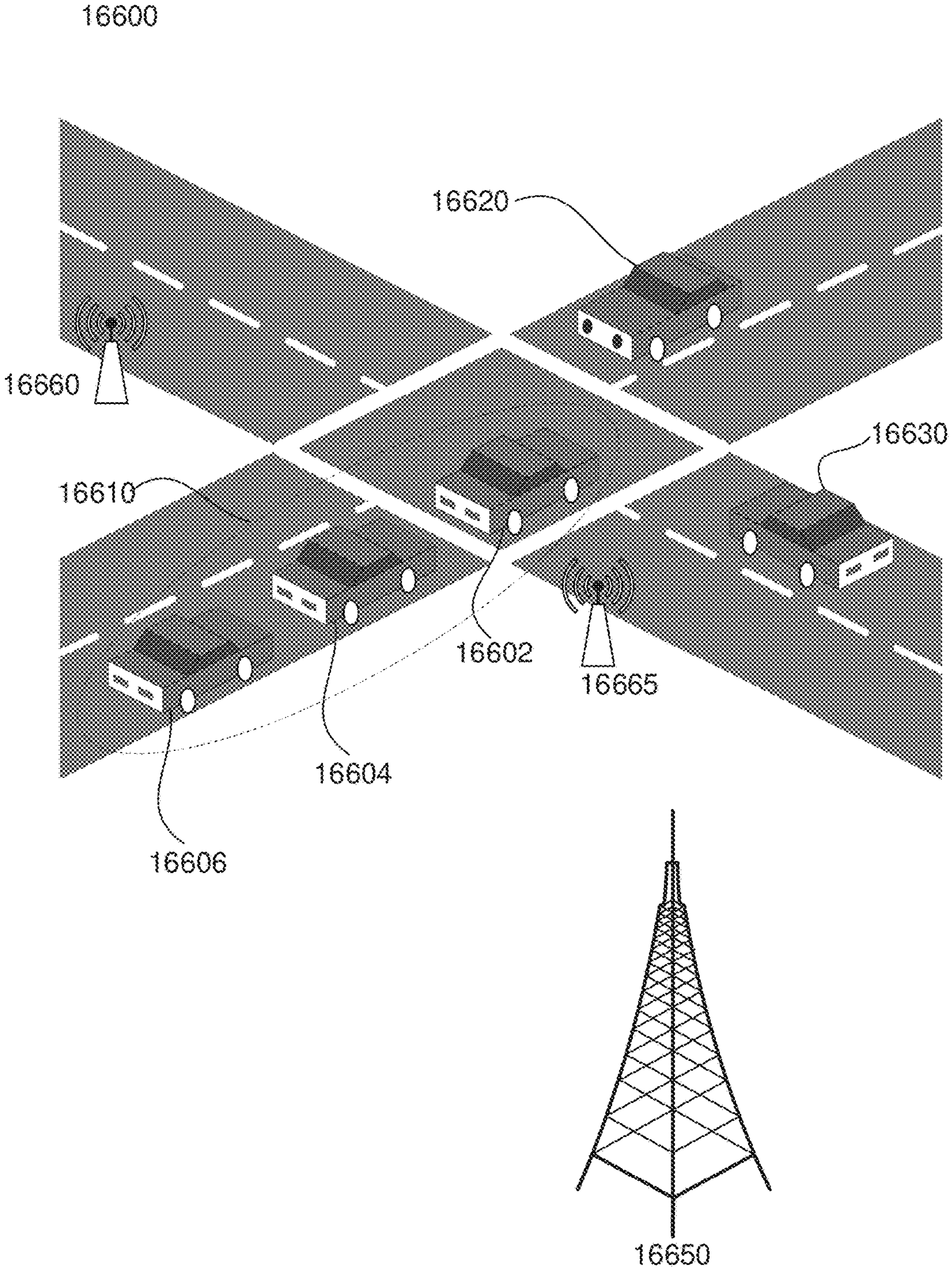

FIG. 166 shows an exemplary an exemplary V2X network environment in some aspects.

Figure 167:
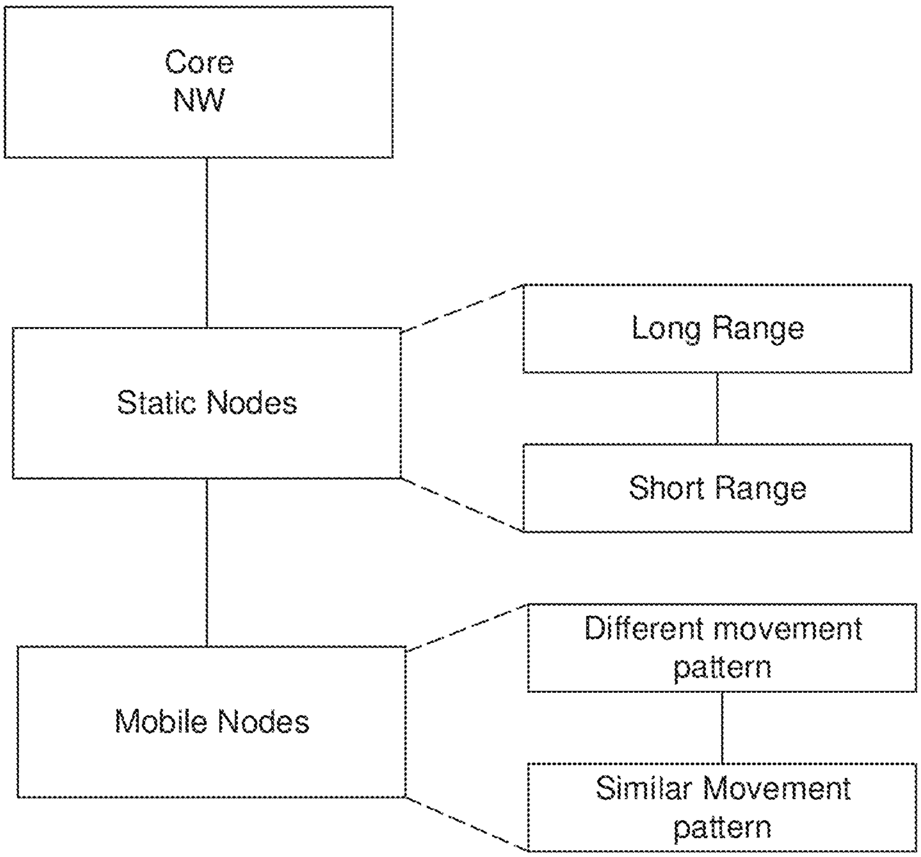

FIG. 167 shows an exemplary diagram describing an exemplary hierarchical setup in some aspects.

Figure 168A:
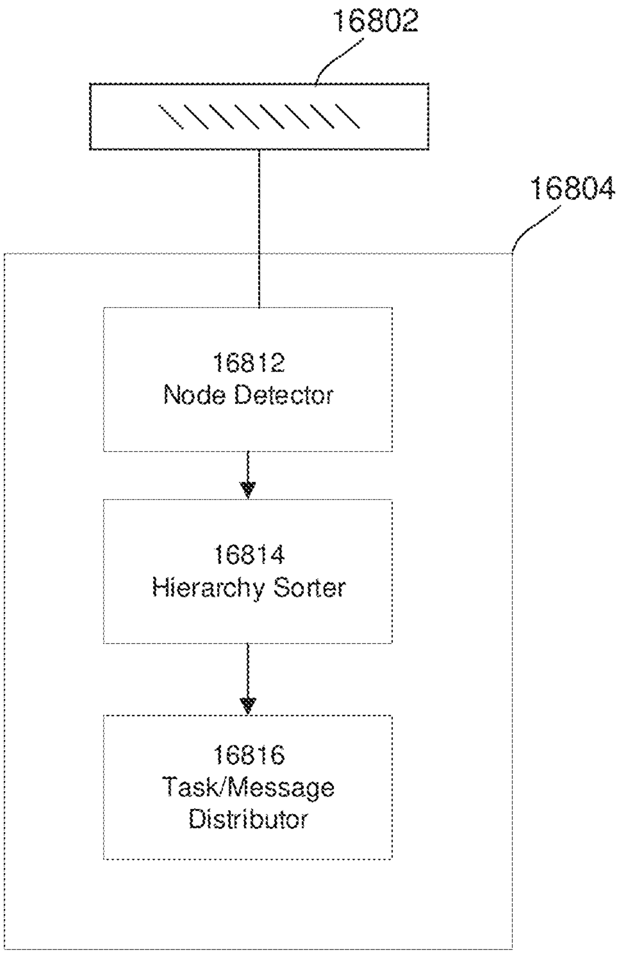

FIG. 168A shows an exemplary internal configuration for a hierarchy determiner of a terminal device in some aspects.

Figure 168B:
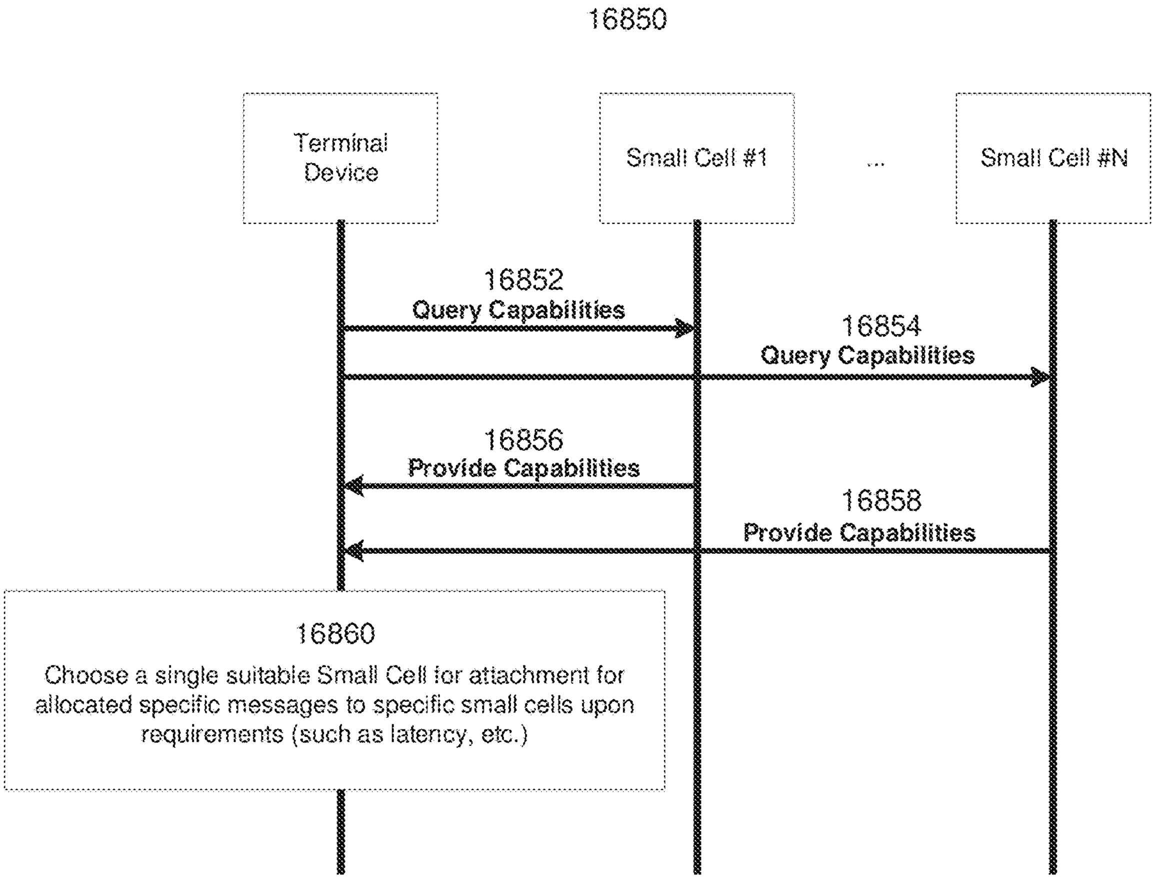

FIG. 168B shows an exemplary an exemplary MSC describing a method for identifying capabilities of one or more small cells for determining a small cell hierarchy in some aspects.

Figure 168C:
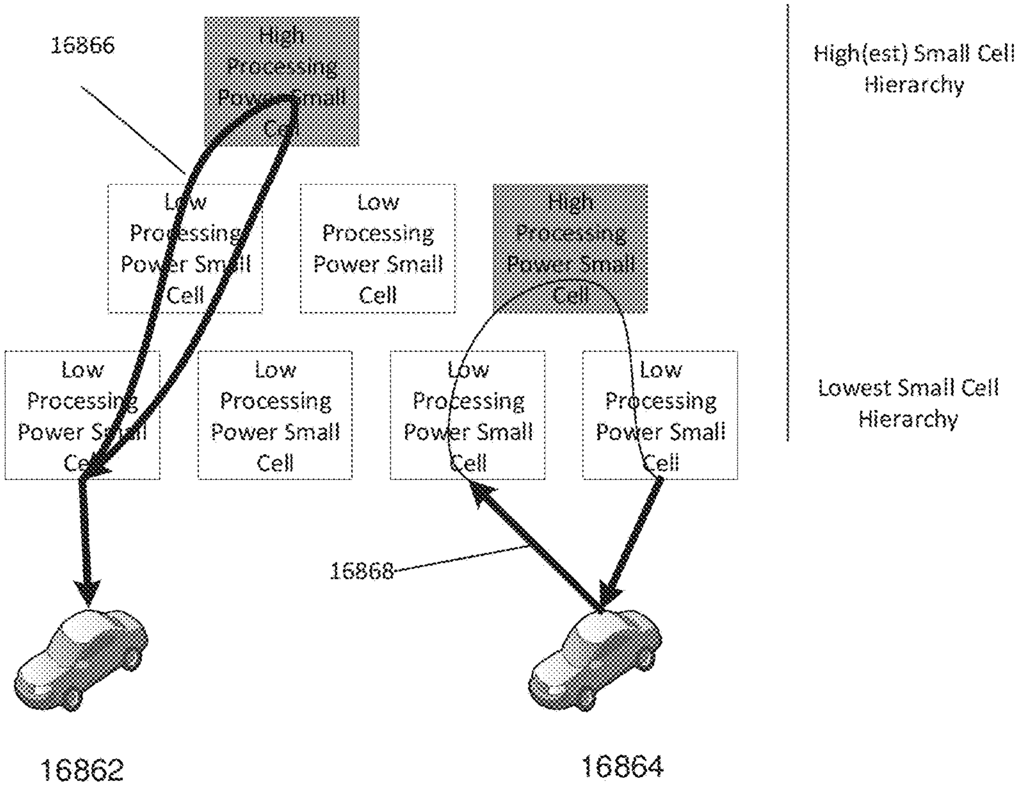

FIG. 168C shows an exemplary diagram describing a process for meeting latency requirements in some aspects.

Figure 168D:
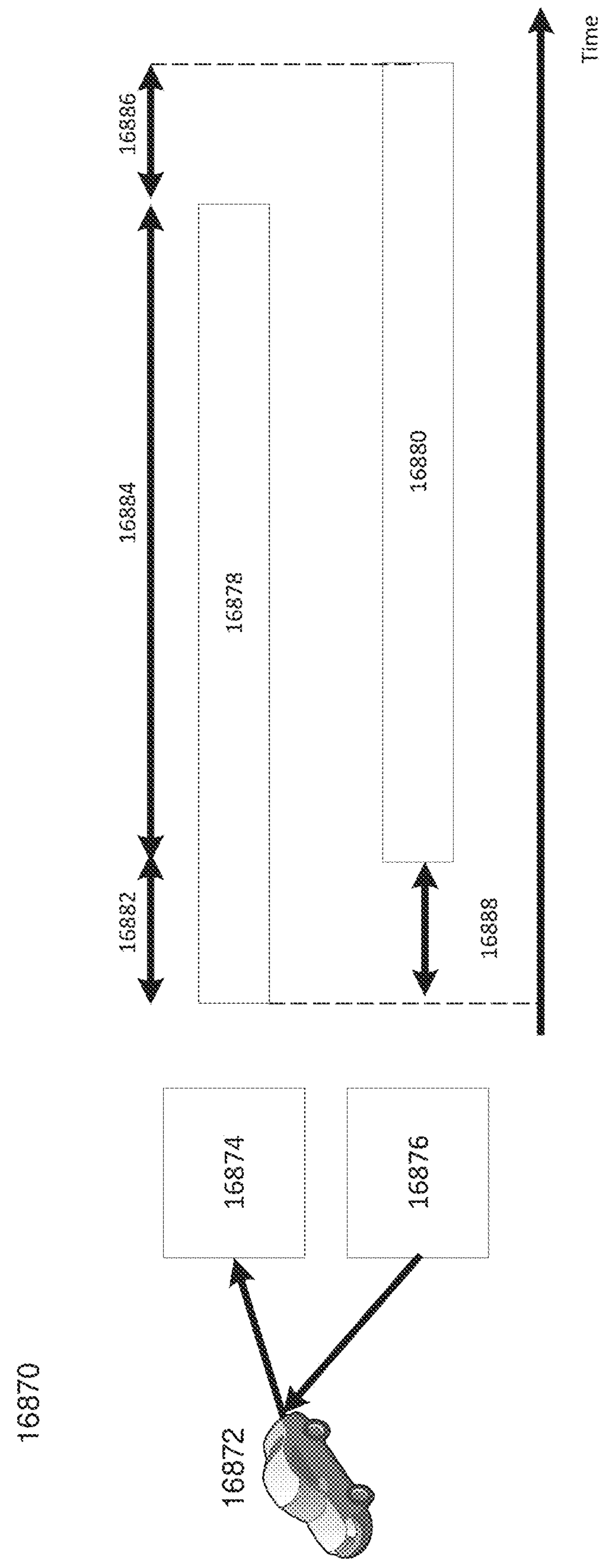

FIG. 168D shows an exemplary small cell network configuration in some aspects.

Figure 169:
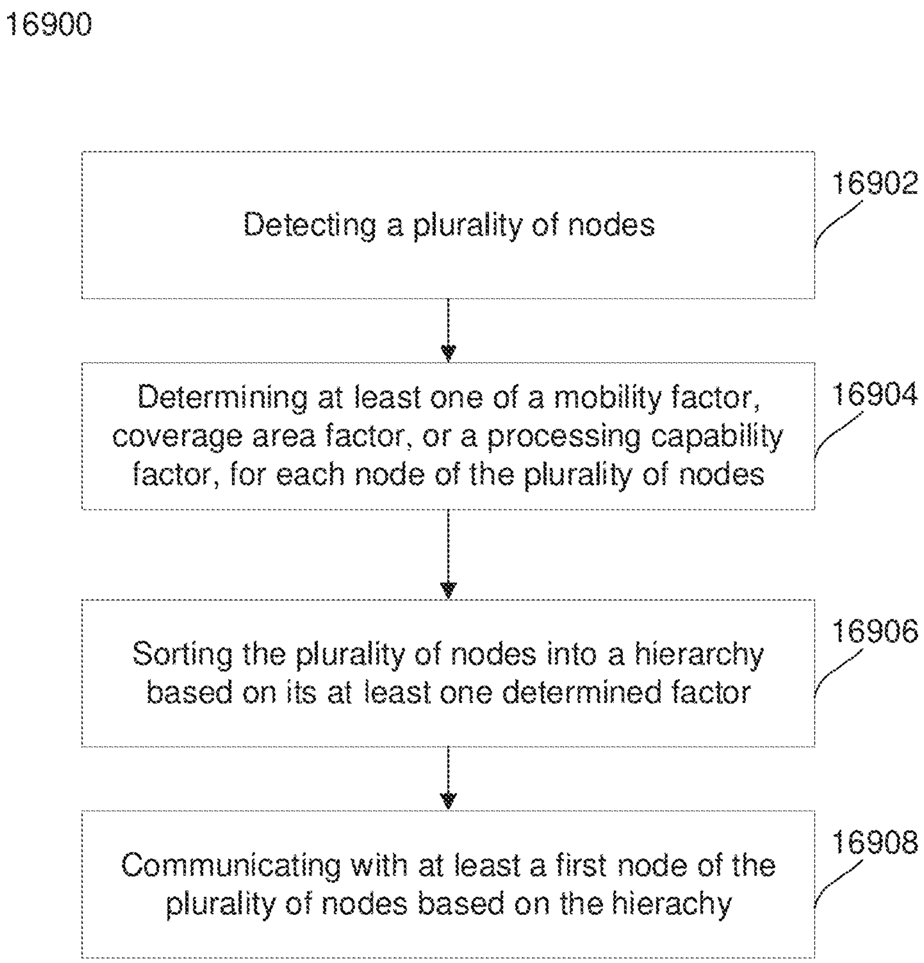

FIG. 169 shows an exemplary flowchart describing a method for creating a hierarchy of nodes for use in wireless communications in some aspects.

Figure 170:
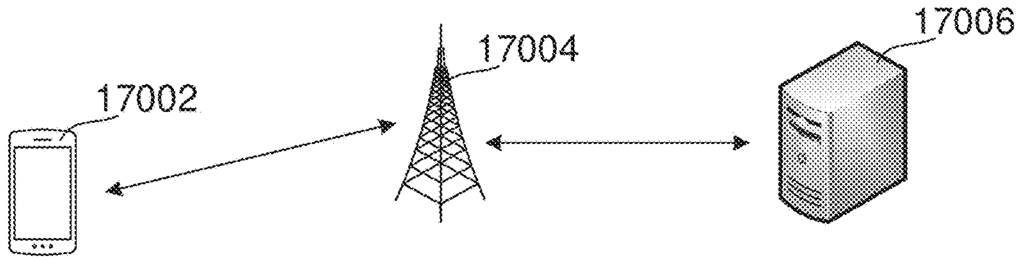
Figure 171:
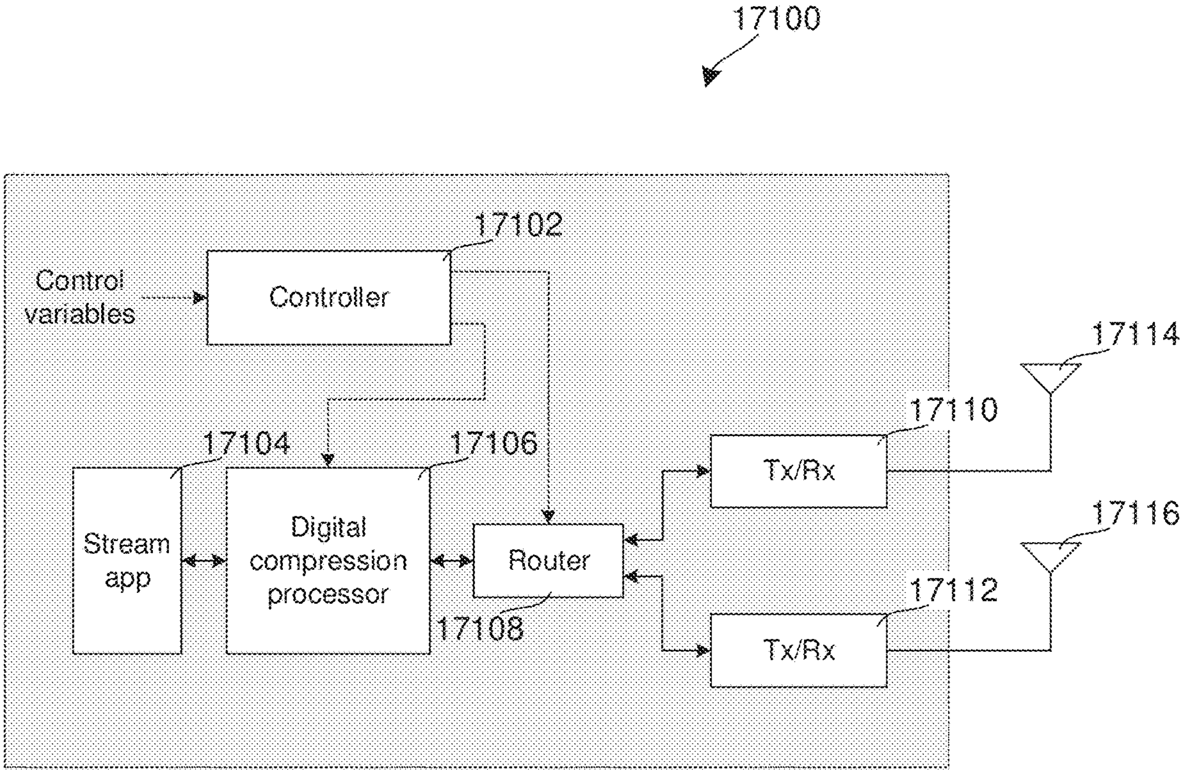
Figure 172:
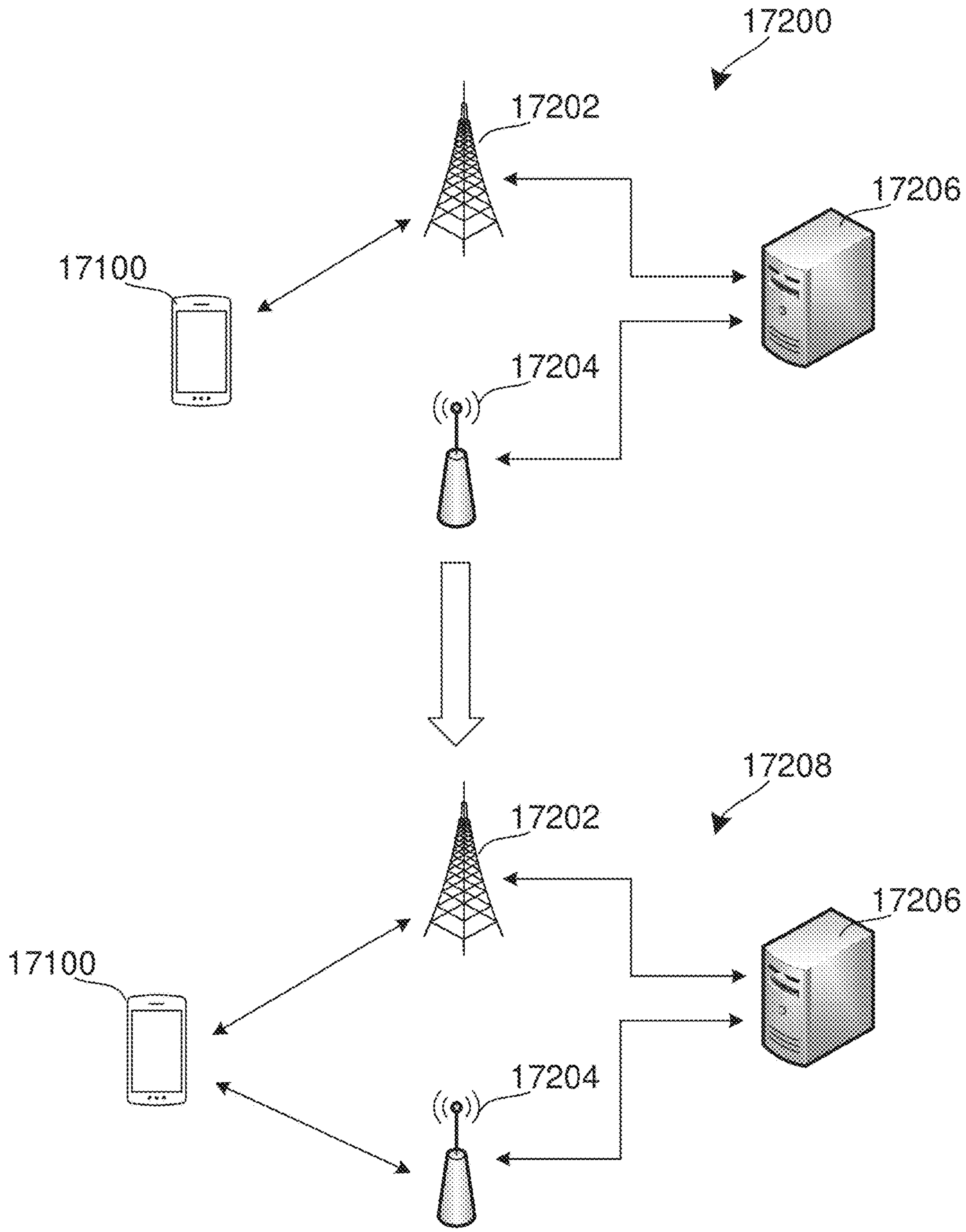
Figure 173:
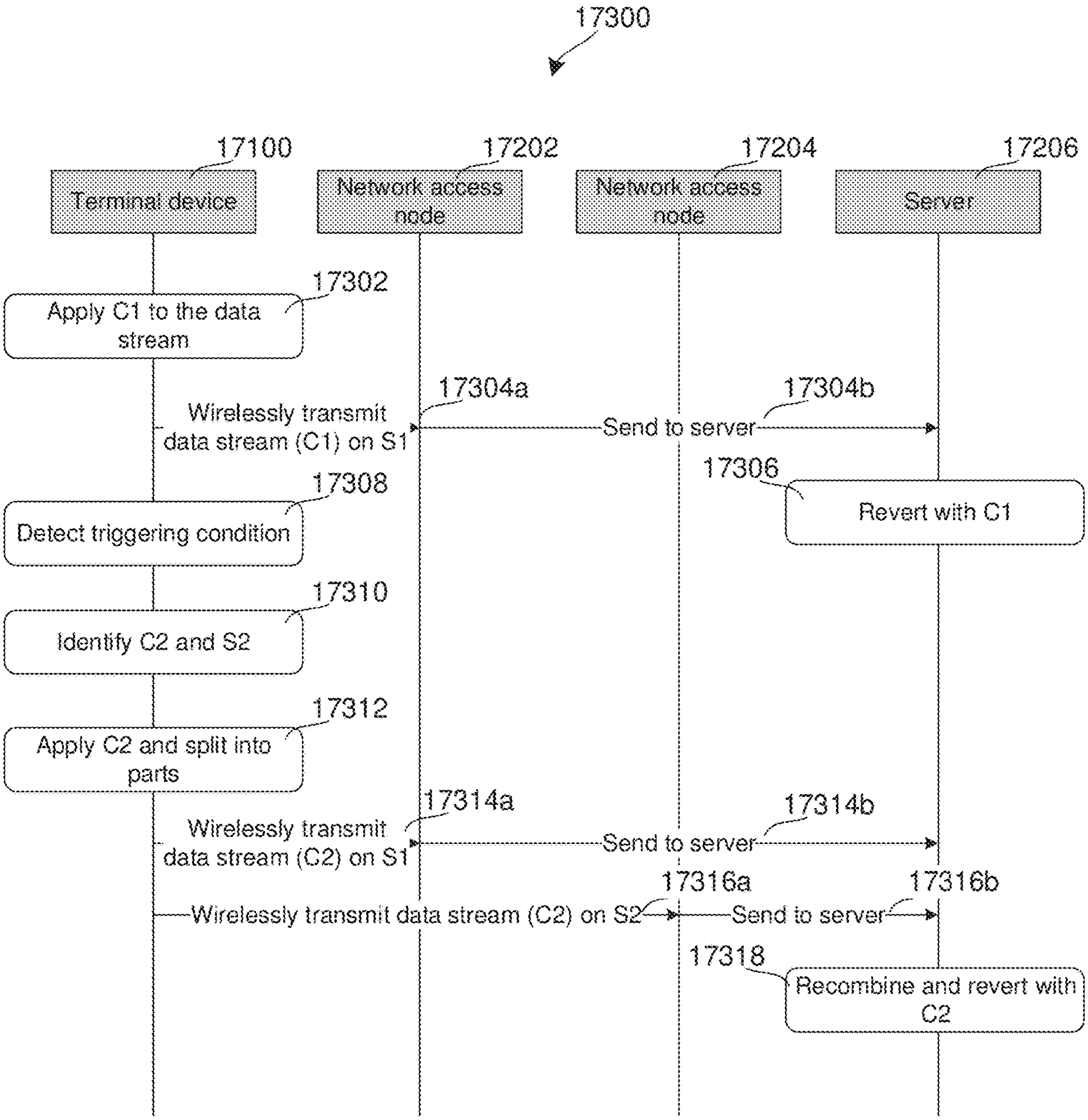
Figure 174:
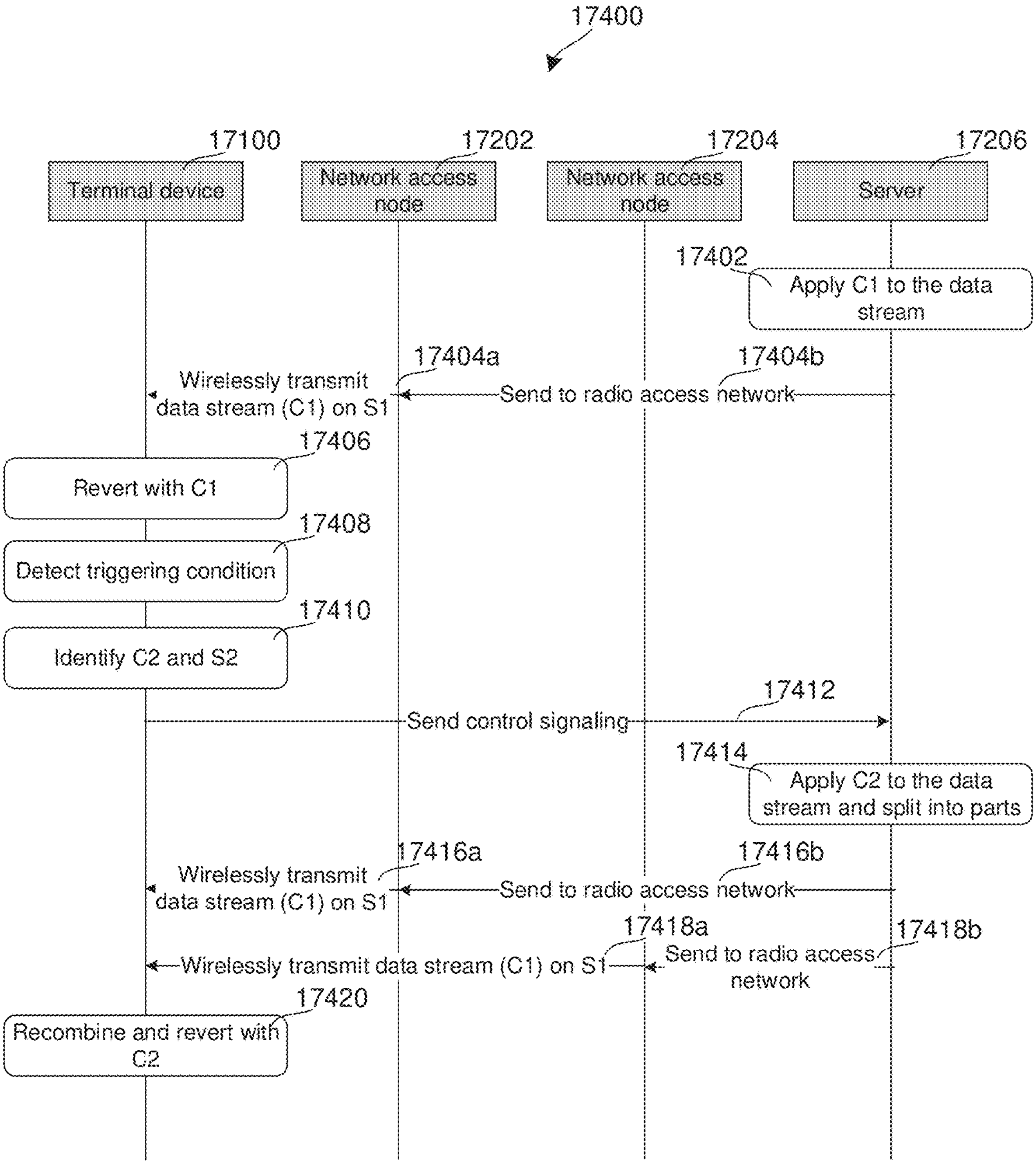
Figure 175:
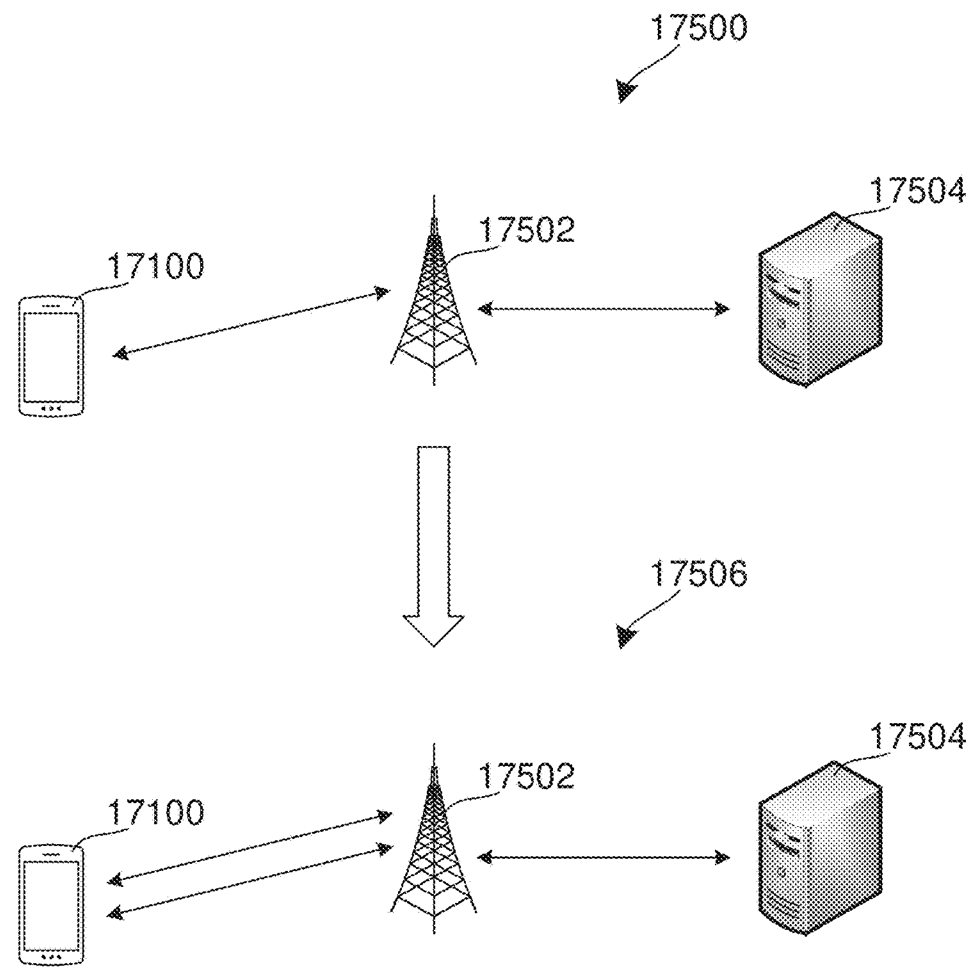
Figure 176:
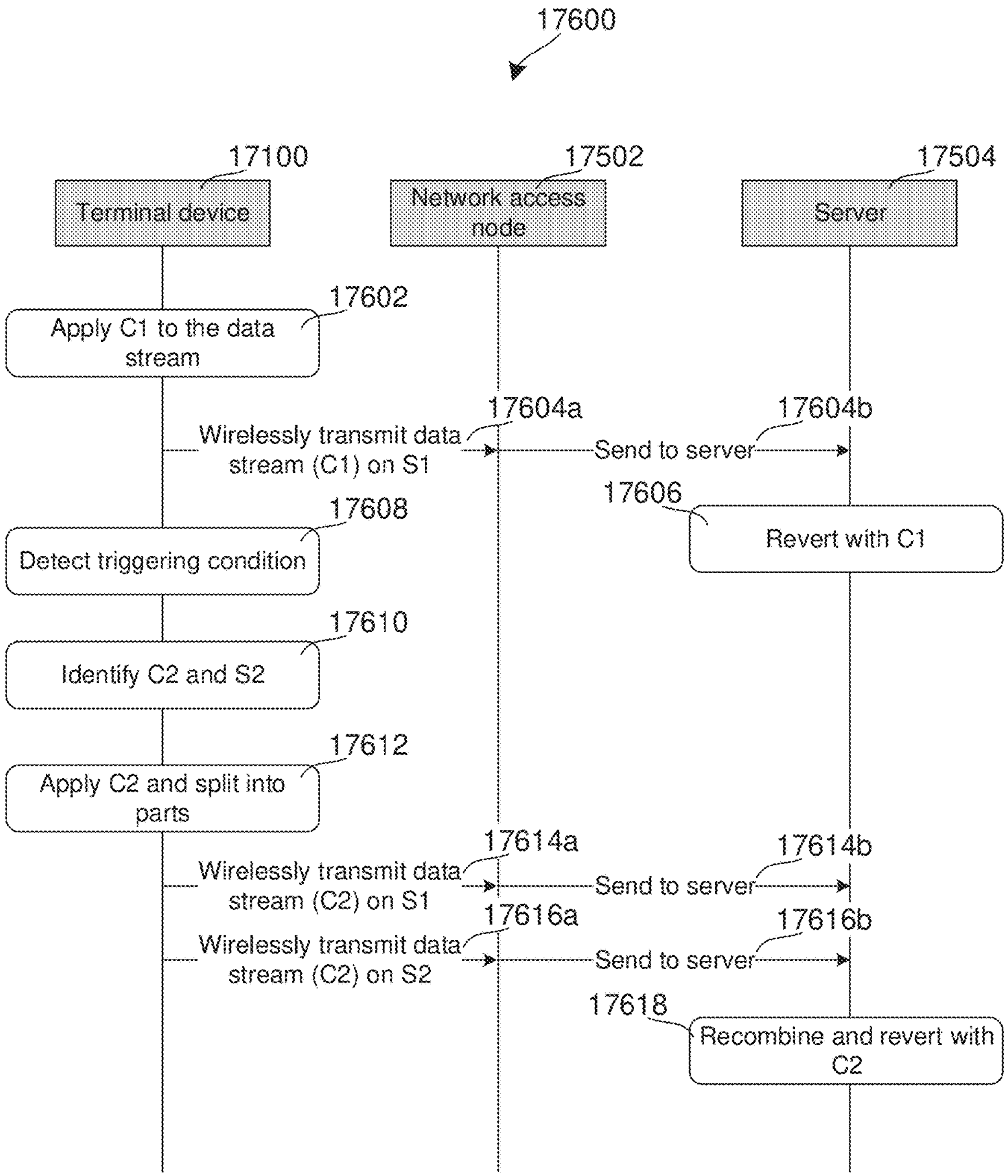
Figure 177:
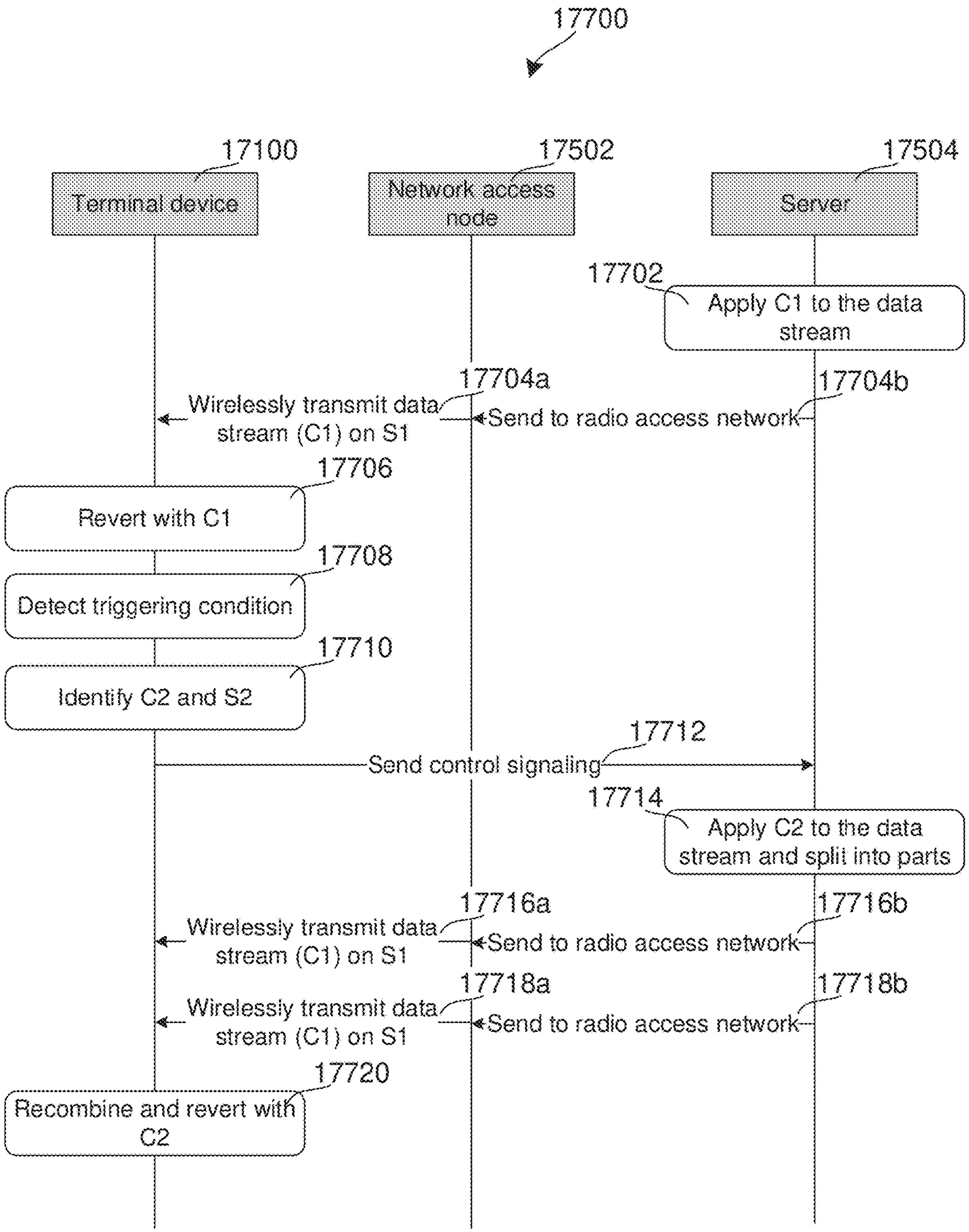
Figure 178:
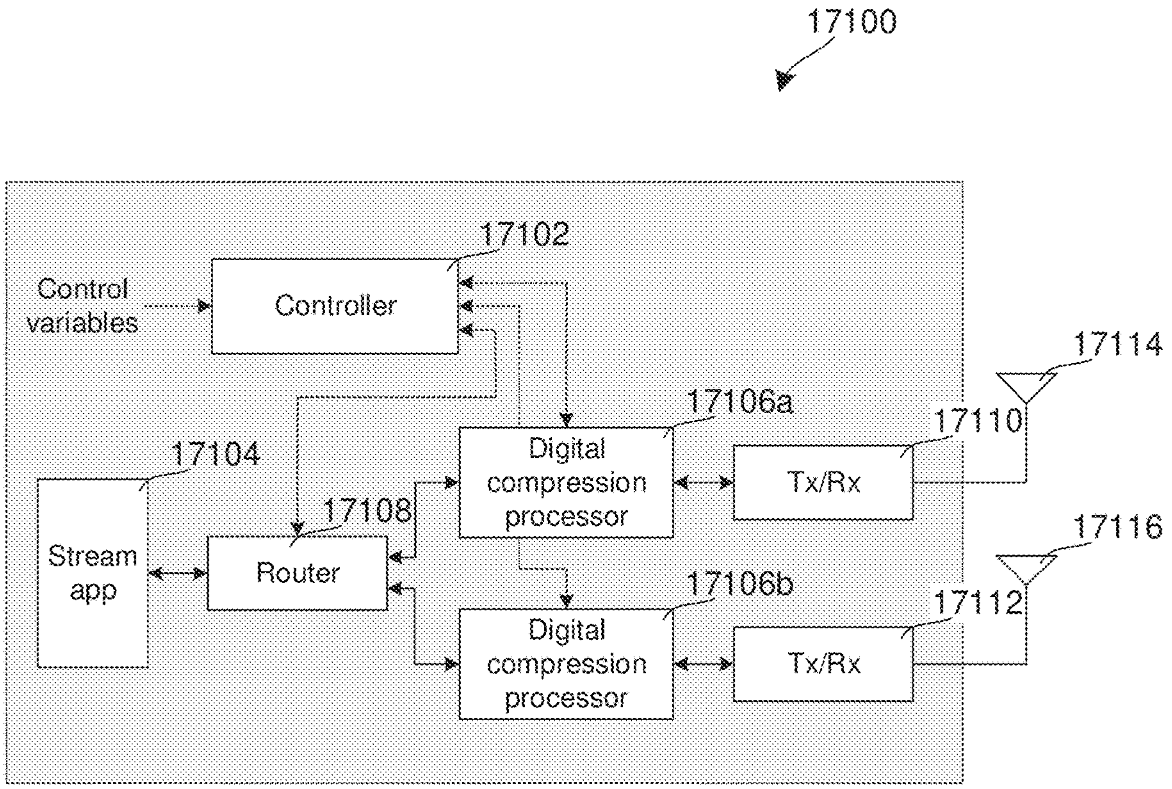
Figure 179:
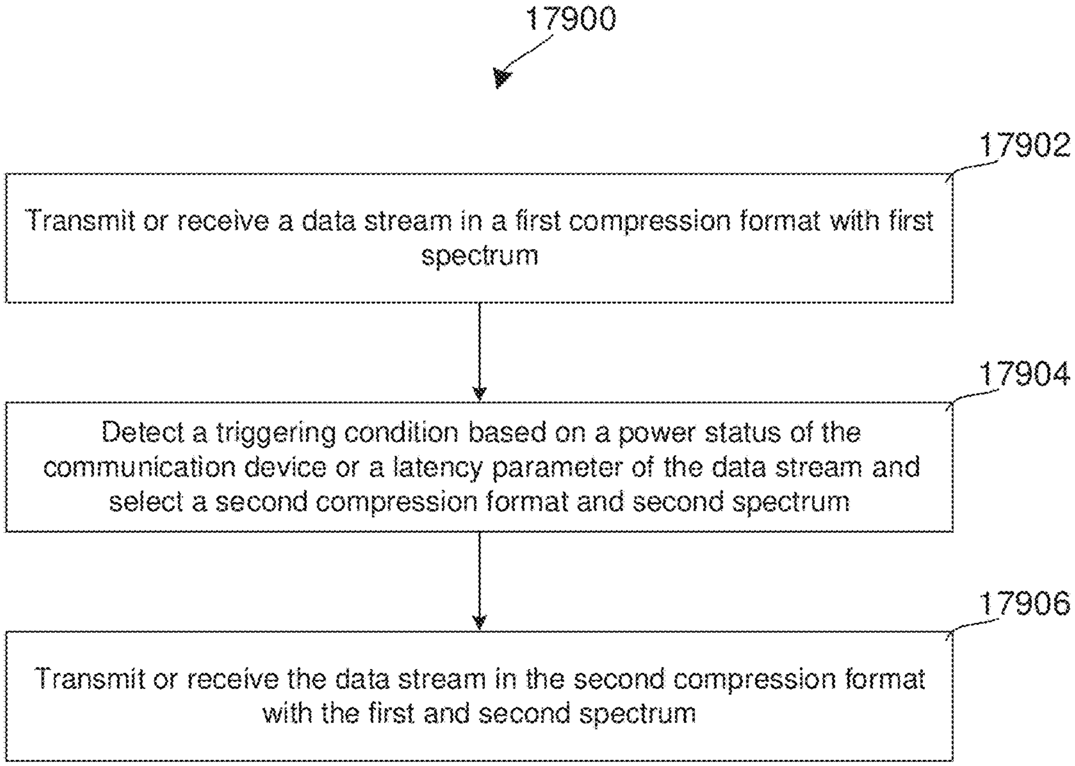
Figure 180:
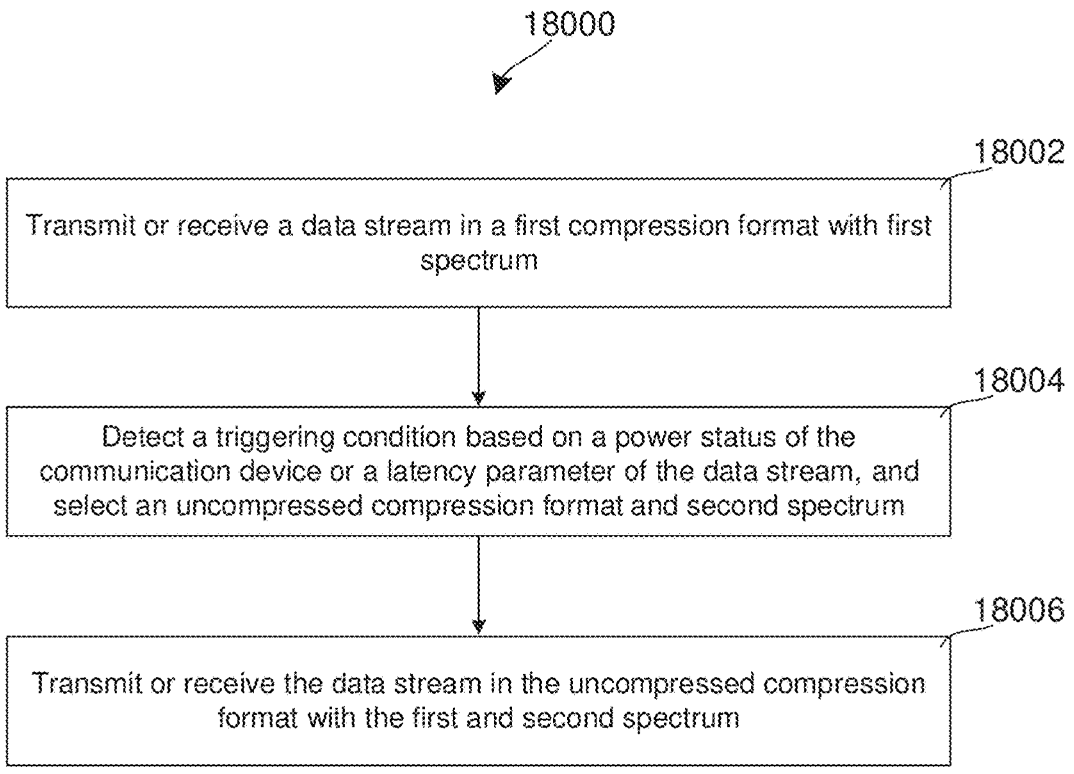
Figure 181:
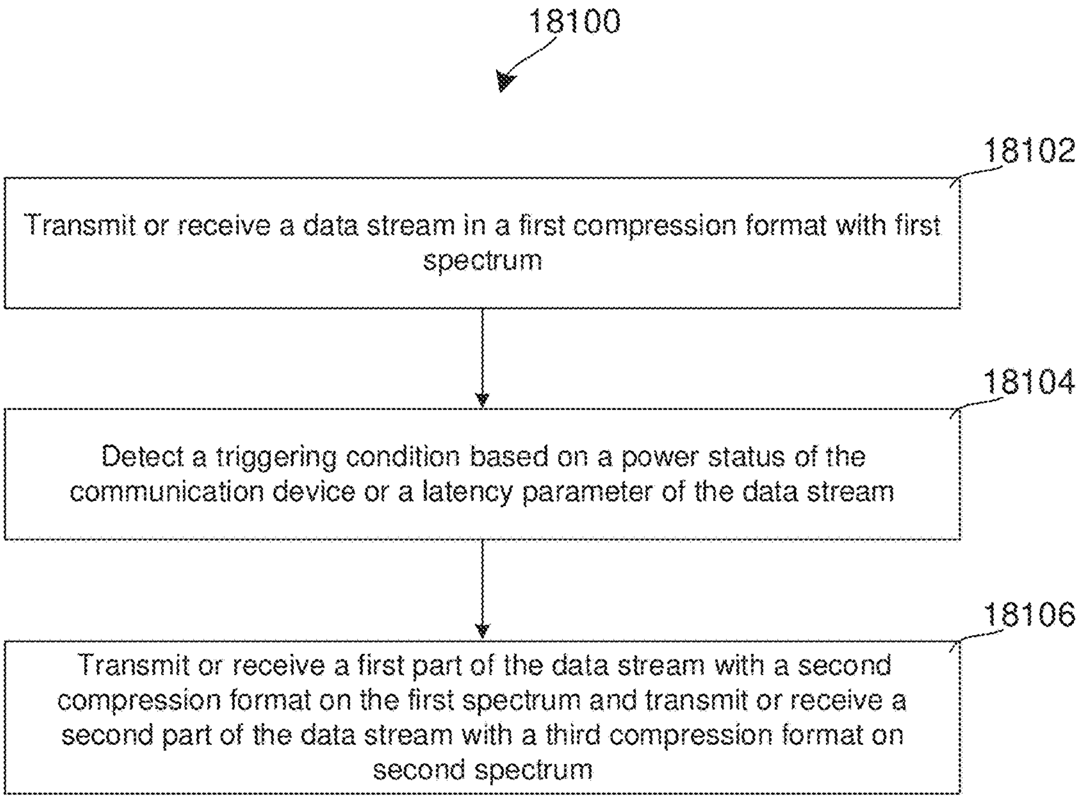
Figure 182:
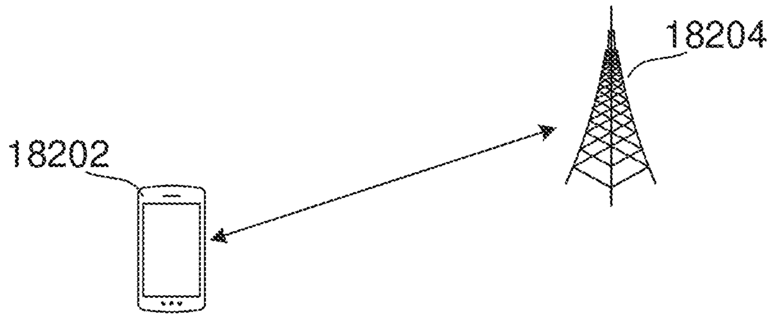
Figure 183:
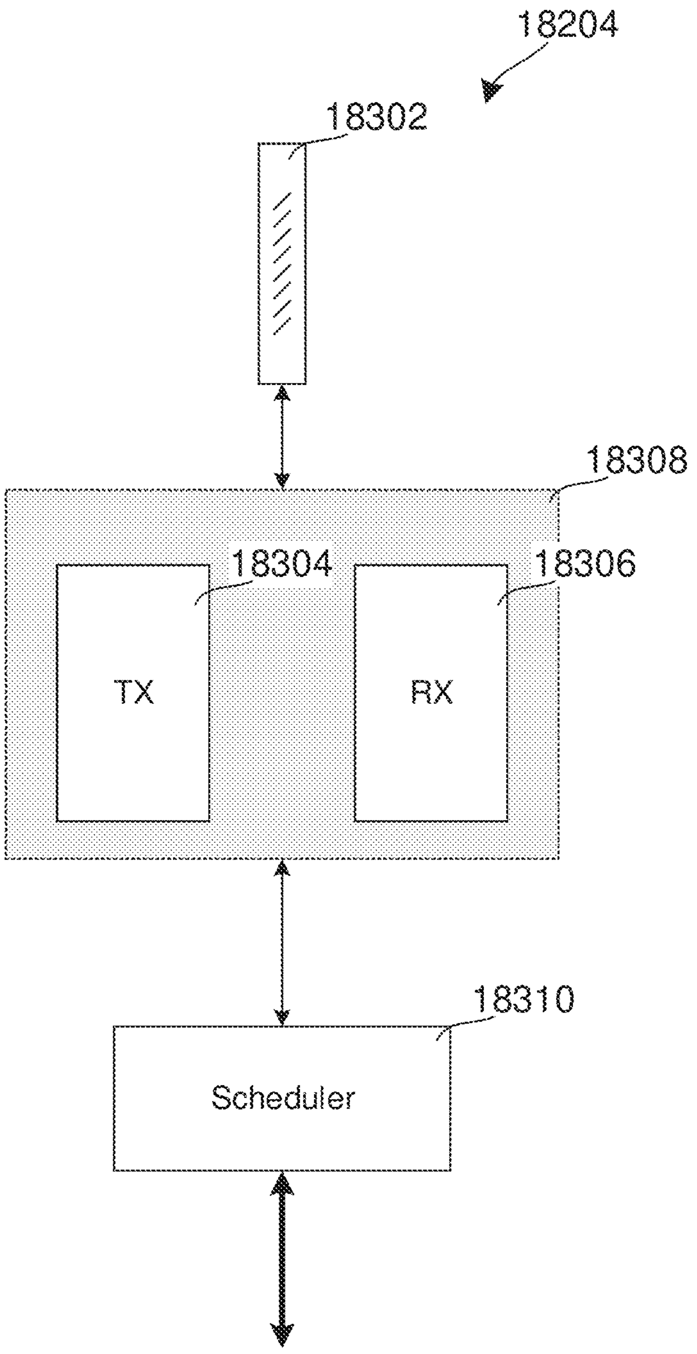
Figure 184:
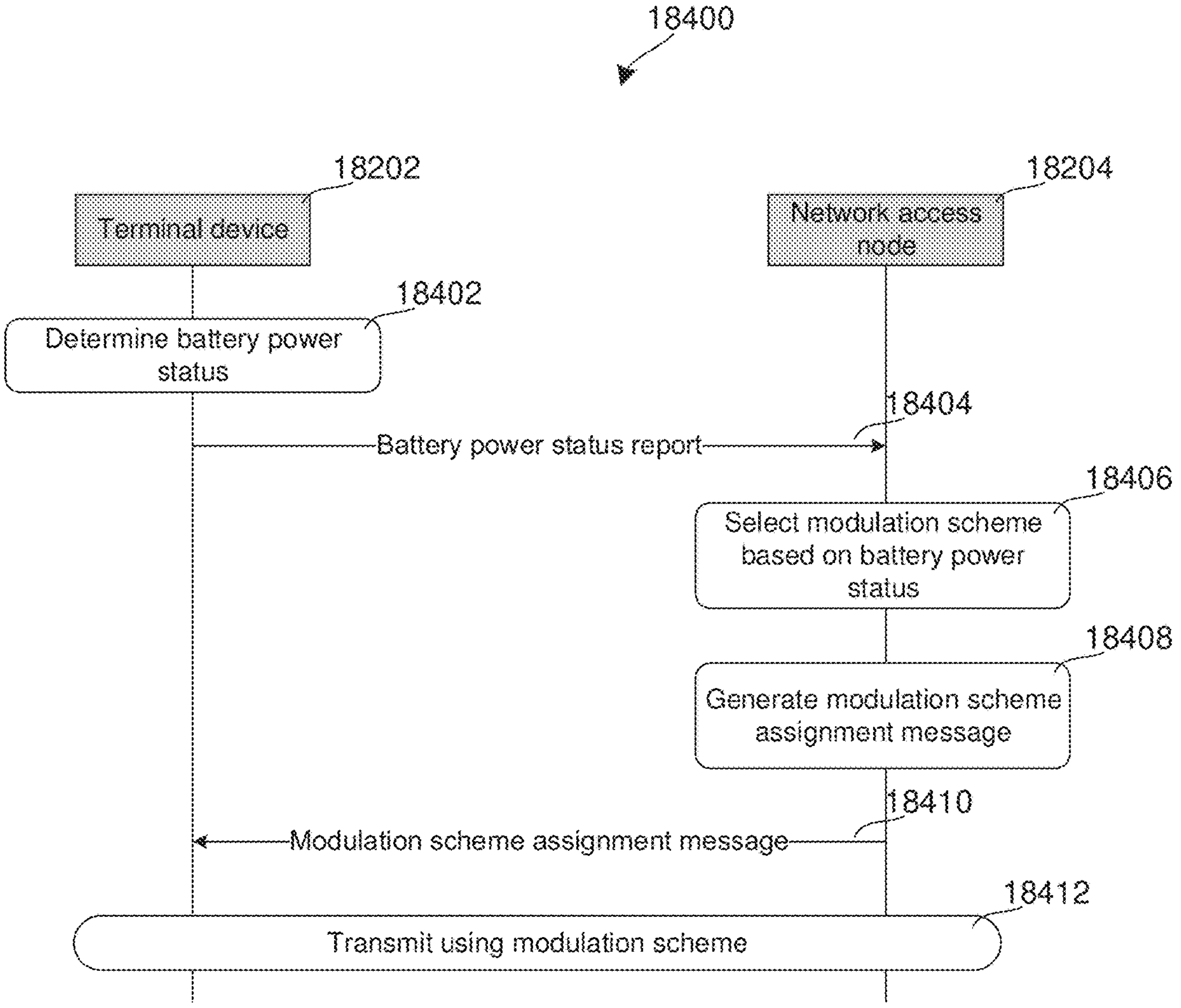
Figure 185:
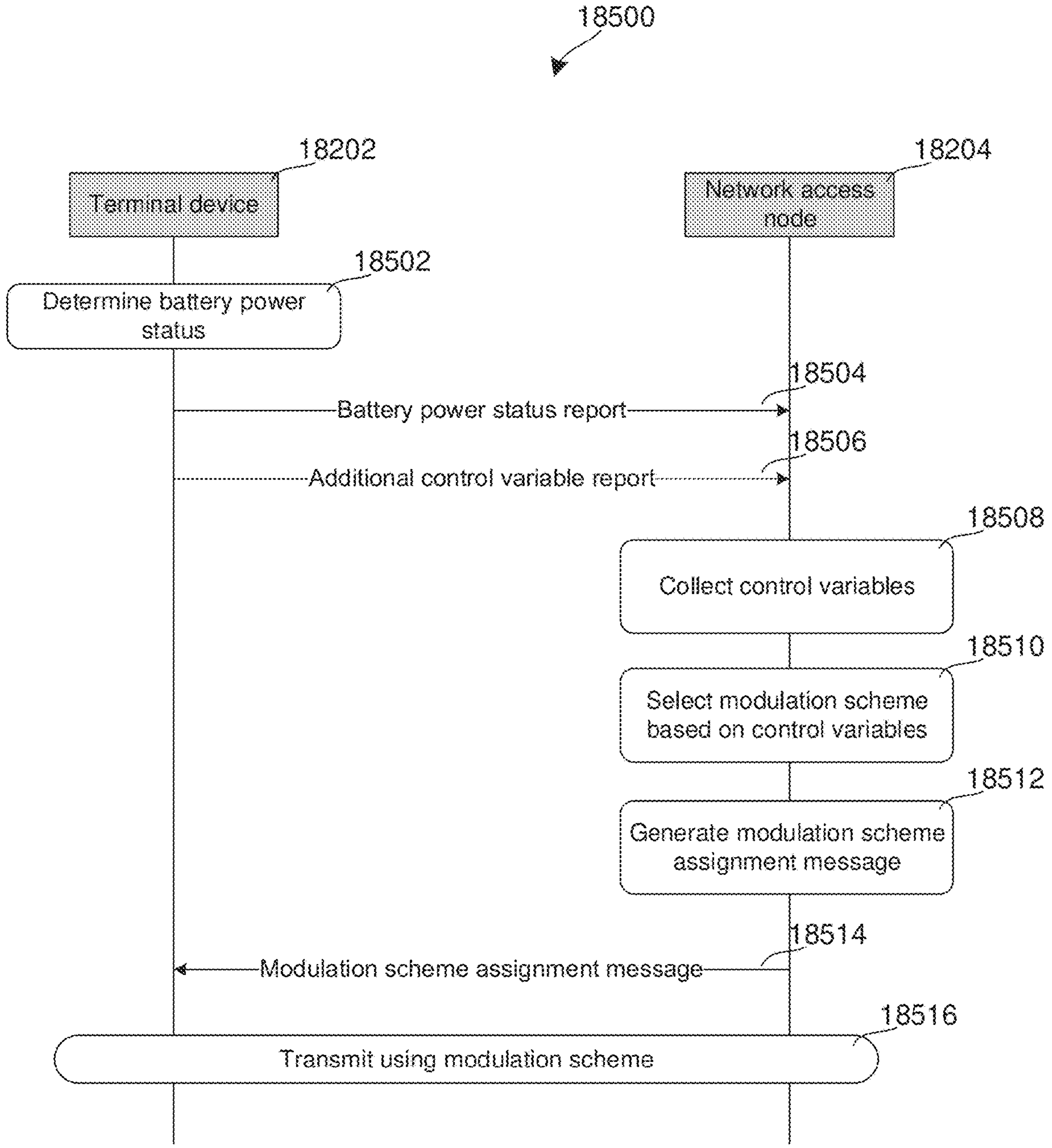
Figure 186:
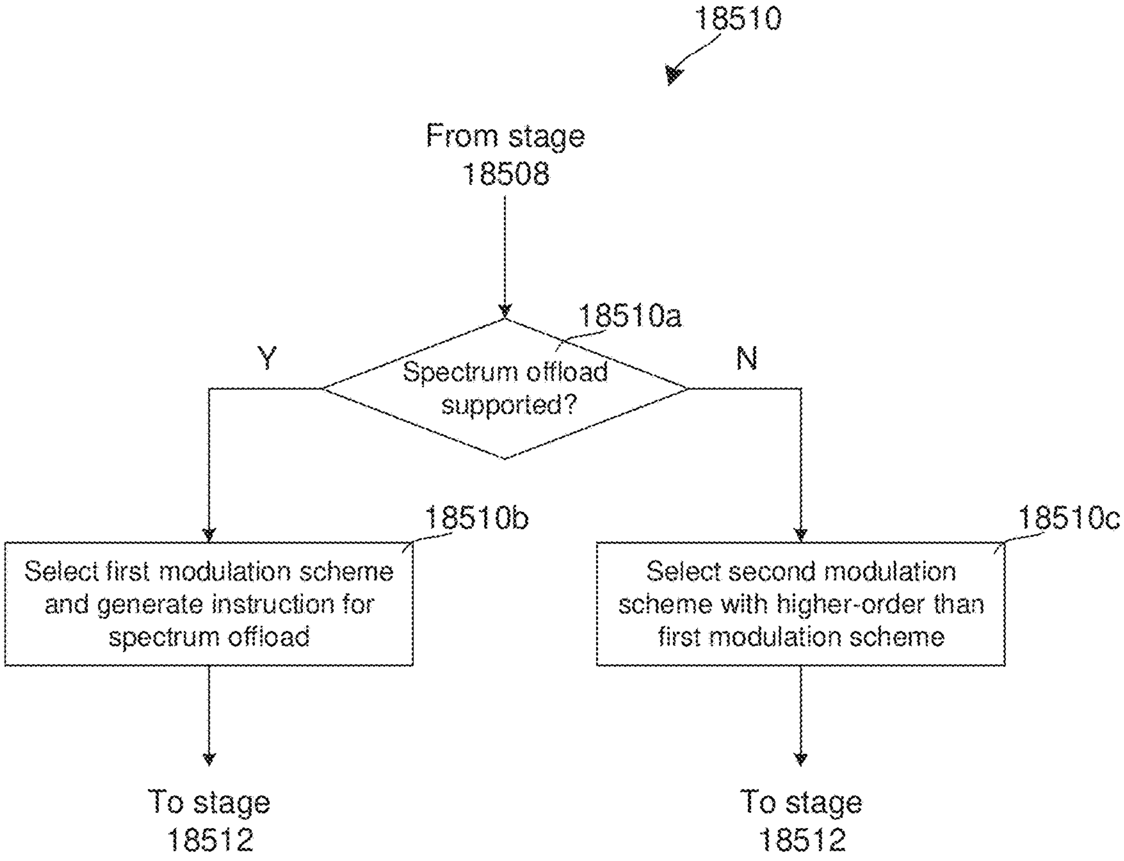
Figure 187:
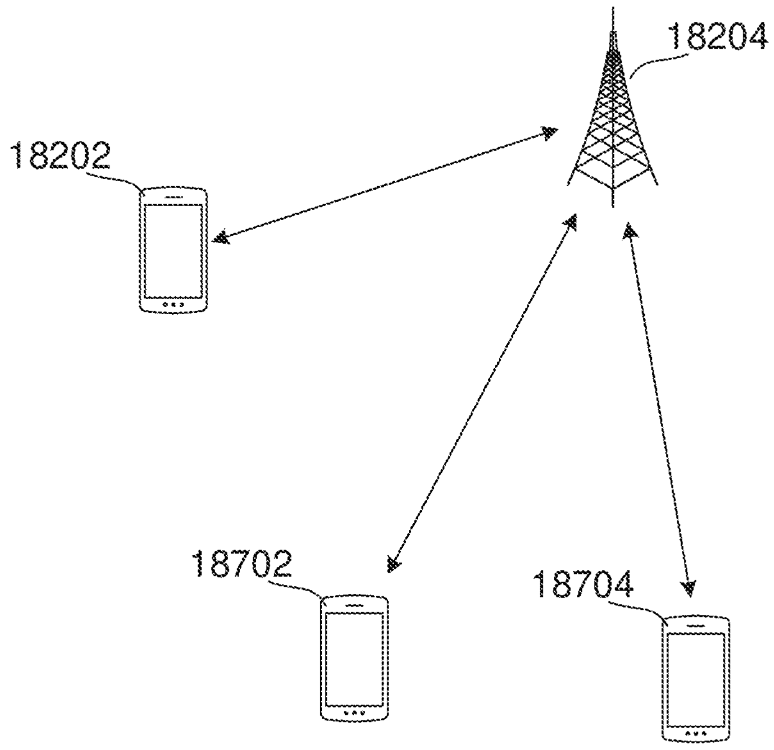
Figure 188:
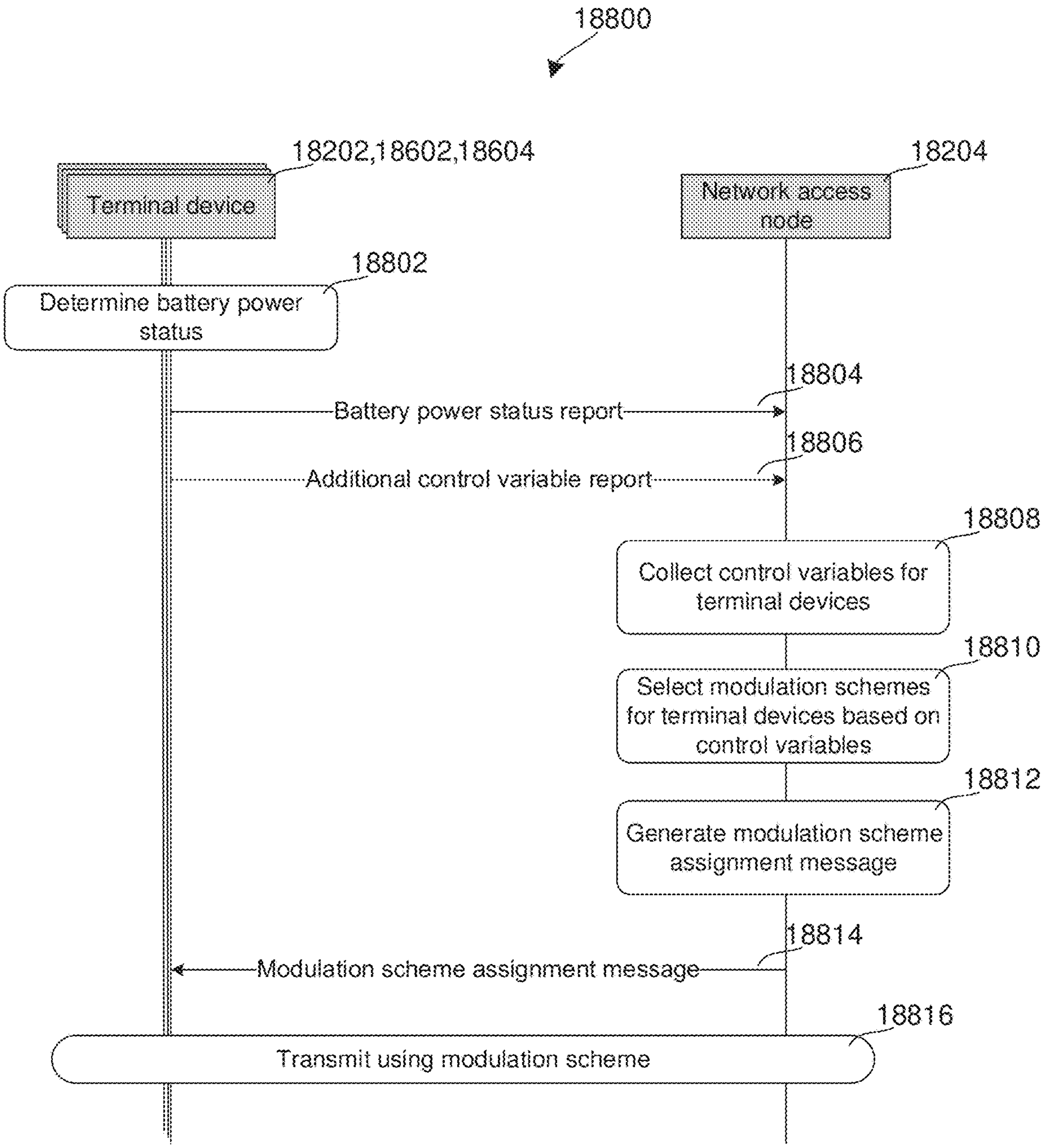
Figure 189:
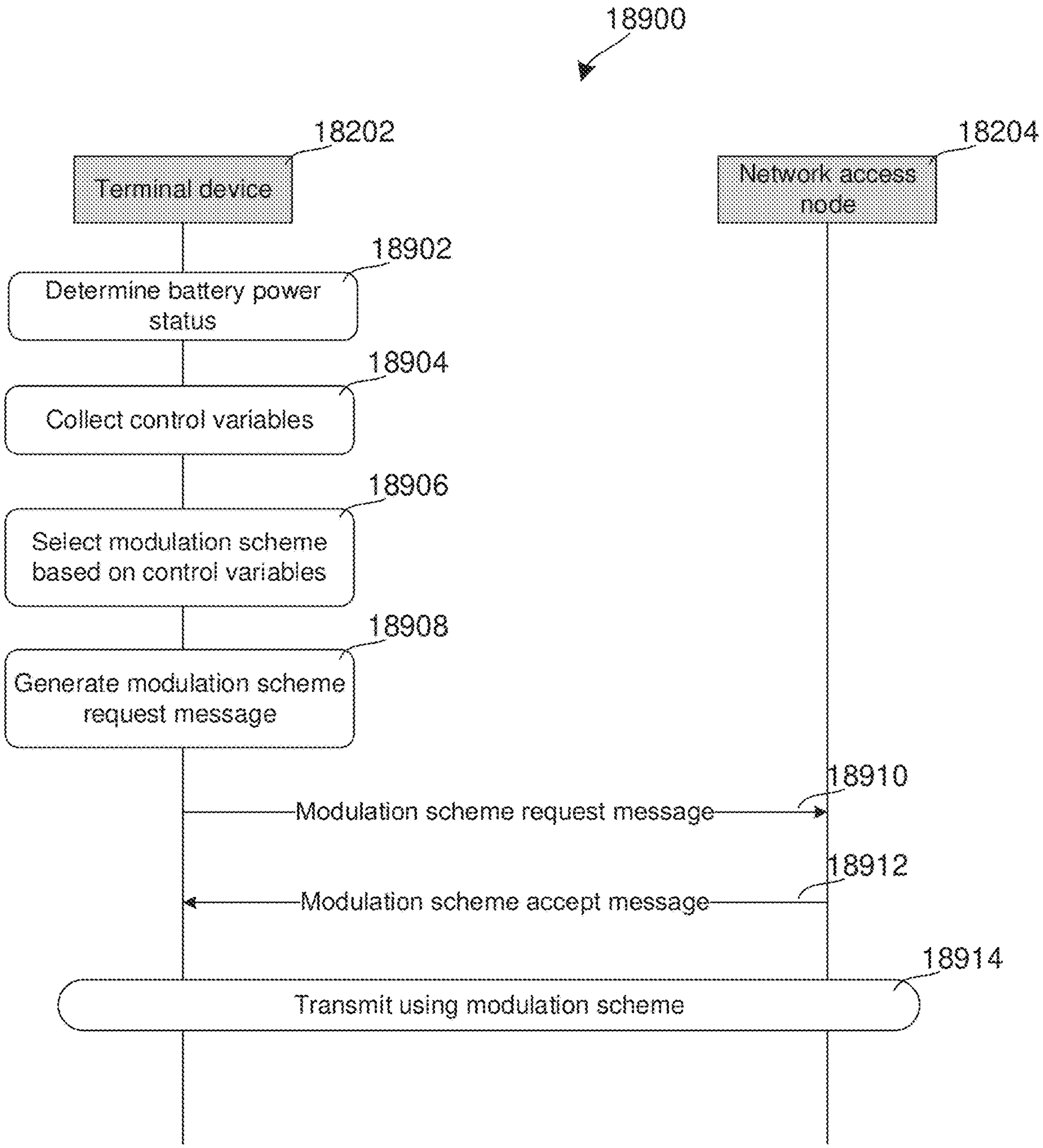
Figure 190:
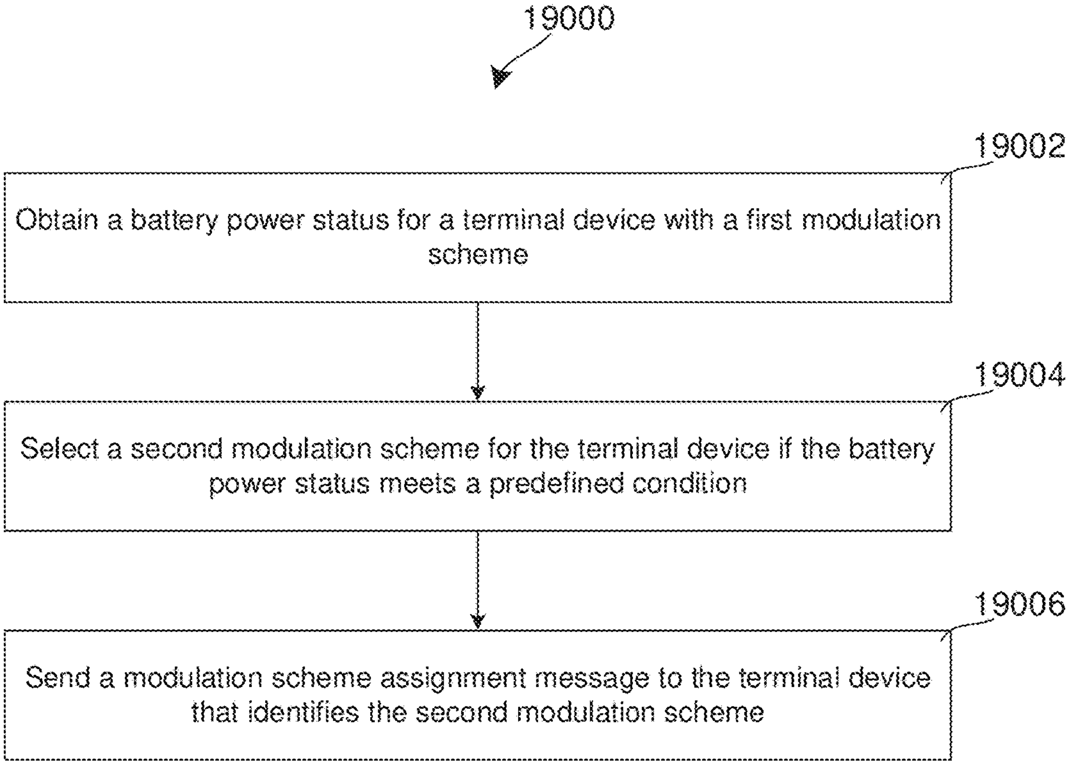
Figure 191:
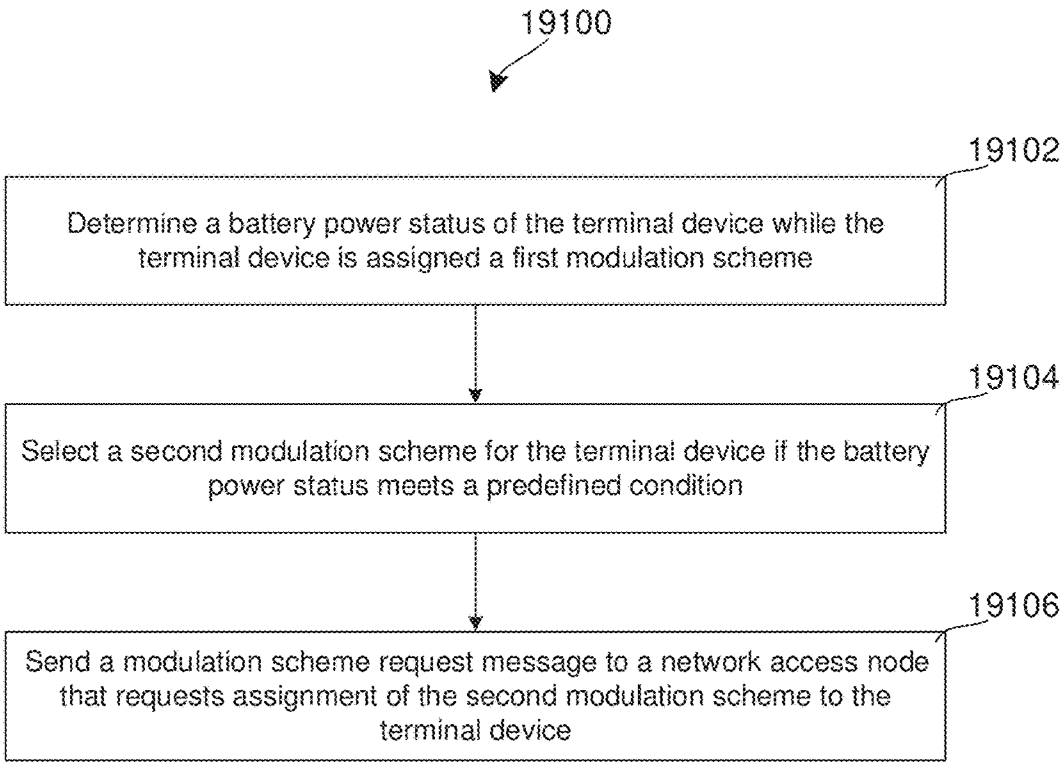
Figure 192:
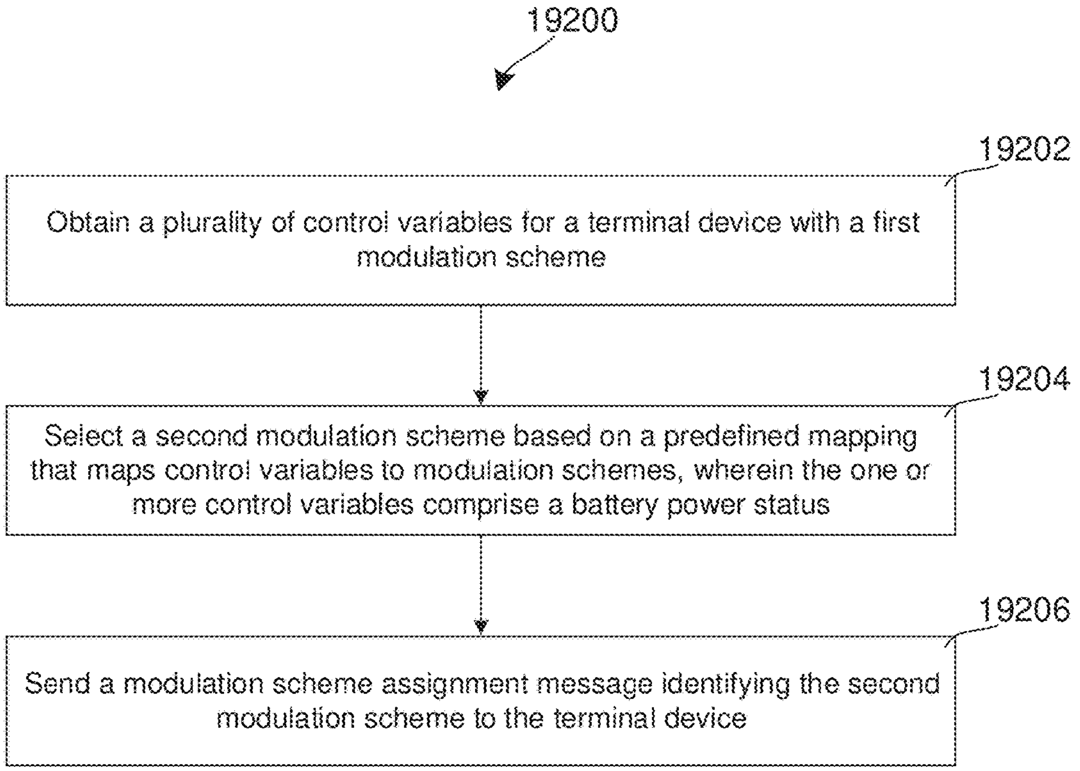
Figure 193:
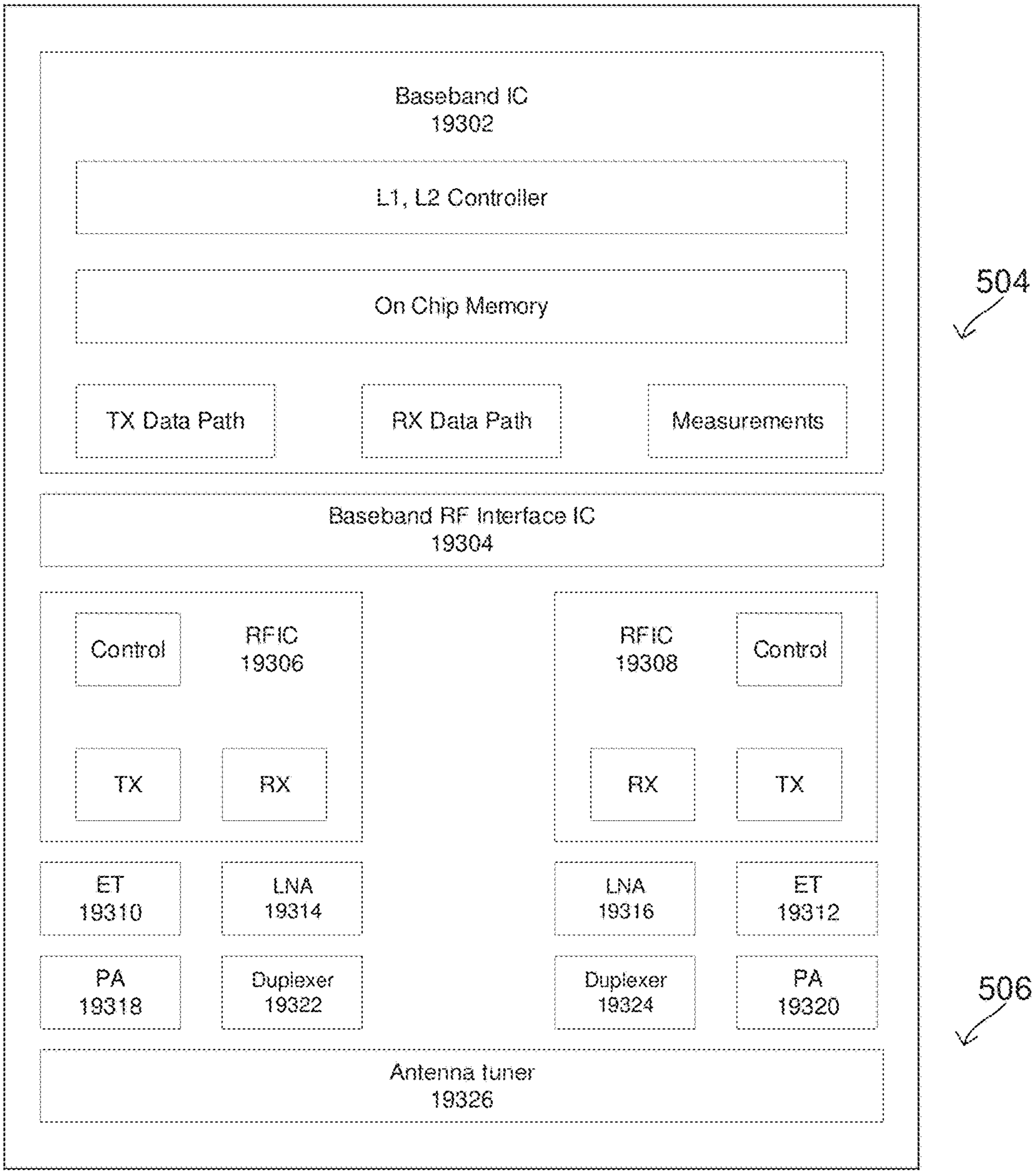

FIG. 170 shows an example of a transmitting and receiving streams of user plane data according to some aspects;

FIG. 171 shows an exemplary internal configuration of a terminal device according to some aspects;

FIG. 172 shows an exemplary network scenario of dynamic compression selection with multiple network access nodes according to some aspects;

FIGS. 173 and 174 show exemplary procedures for dynamic compression selection in uplink and downlink according to some aspects;

FIG. 175 shows an exemplary network scenario of dynamic compression selection with one network access node according to some aspects;

FIGS. 176 and 177 show exemplary procedures for dynamic compression selection in uplink and downlink according to some aspects;

FIG. 178 shows an exemplary internal configuration of a terminal device according to some aspects;

FIGS. 179-181 show exemplary methods of transferring a data stream at a communication device according to some aspects;

FIG. 182 shows an example of a network communication scenario according to some aspects;

FIG. 183 shows an exemplary internal configuration of a network access node according to some aspects;

FIG. 184 shows an exemplary procedure for a modulation scheme selection function according to some aspects;

FIG. 185 shows an exemplary procedure for a modulation scheme selection function with additional control variables according to some aspects;

FIG. 186 shows an exemplary procedure for a modulation scheme selection function with spectrum offload according to some aspects;

FIG. 187 shows an exemplary network scenario for a modulation scheme selection function with multiple terminal devices according to some aspects;

FIG. 188 shows an exemplary procedure for a modulation scheme selection function with multiple terminal devices according to some aspects;

FIG. 189 shows an exemplary procedure for a modulation scheme selection function at a terminal device according to some aspects;

FIG. 190 shows an exemplary procedure for operating a network access node according to some aspects;

FIG. 191 shows an exemplary procedure for operating a terminal device according to some aspects;

FIG. 192 shows an exemplary procedure for operating a network access node according to some aspects;

FIG. 193 shows an exemplary internal configuration of a radio communication arrangement, and an antenna system according to some aspects.

Figure 194:
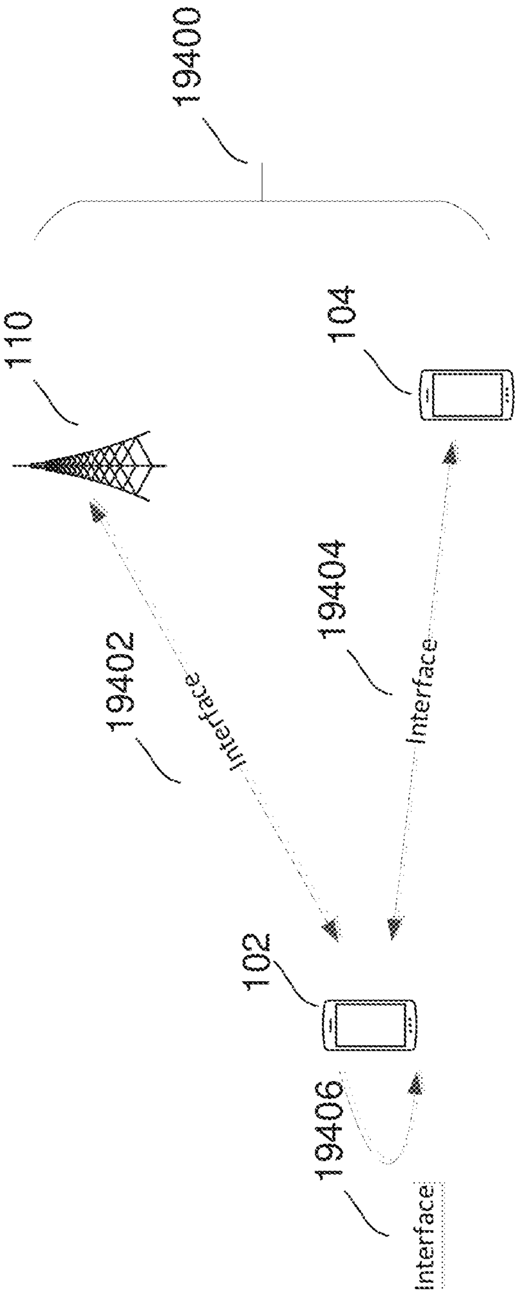

FIG. 194 shows an exemplary network scenario in accordance with some aspects.

Figure 195:
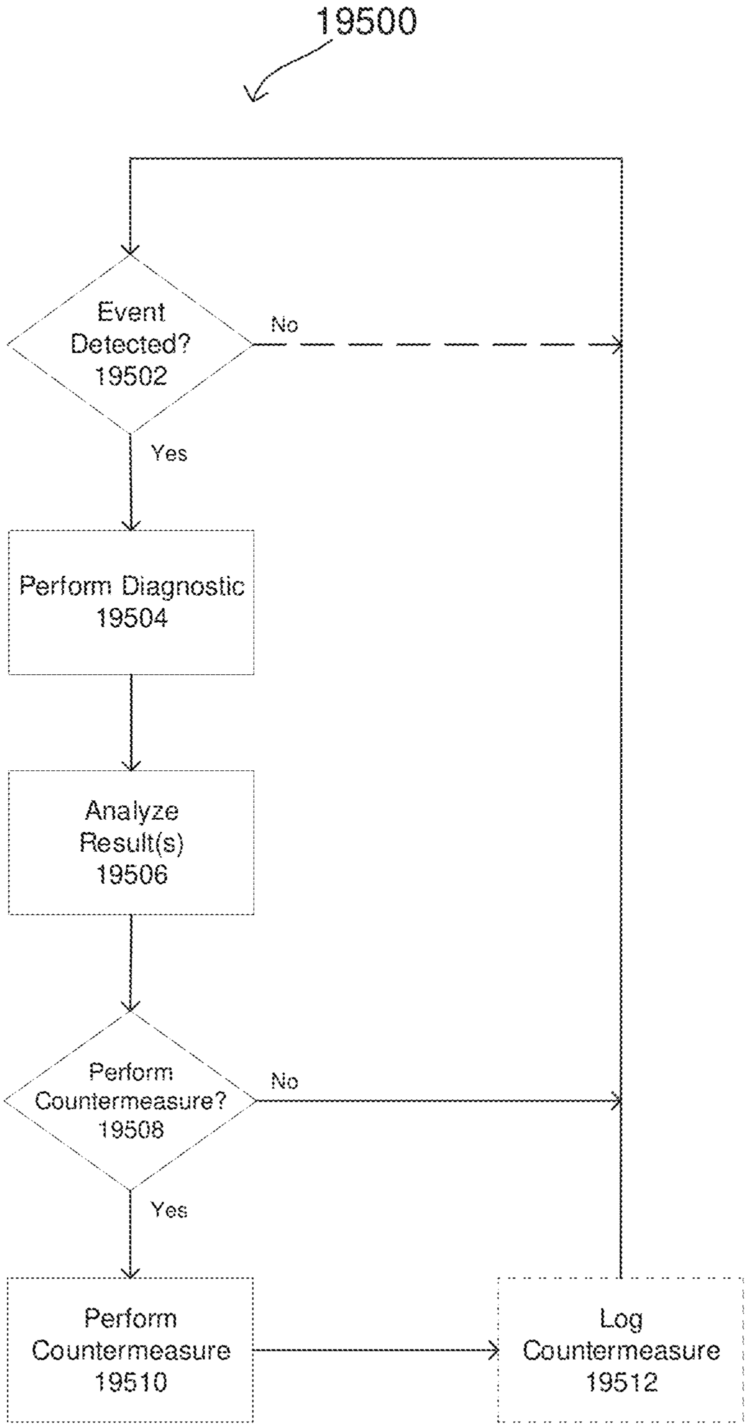

FIG. 195 shows an exemplary flow diagram for a device under test according to some aspects.

Figure 196:
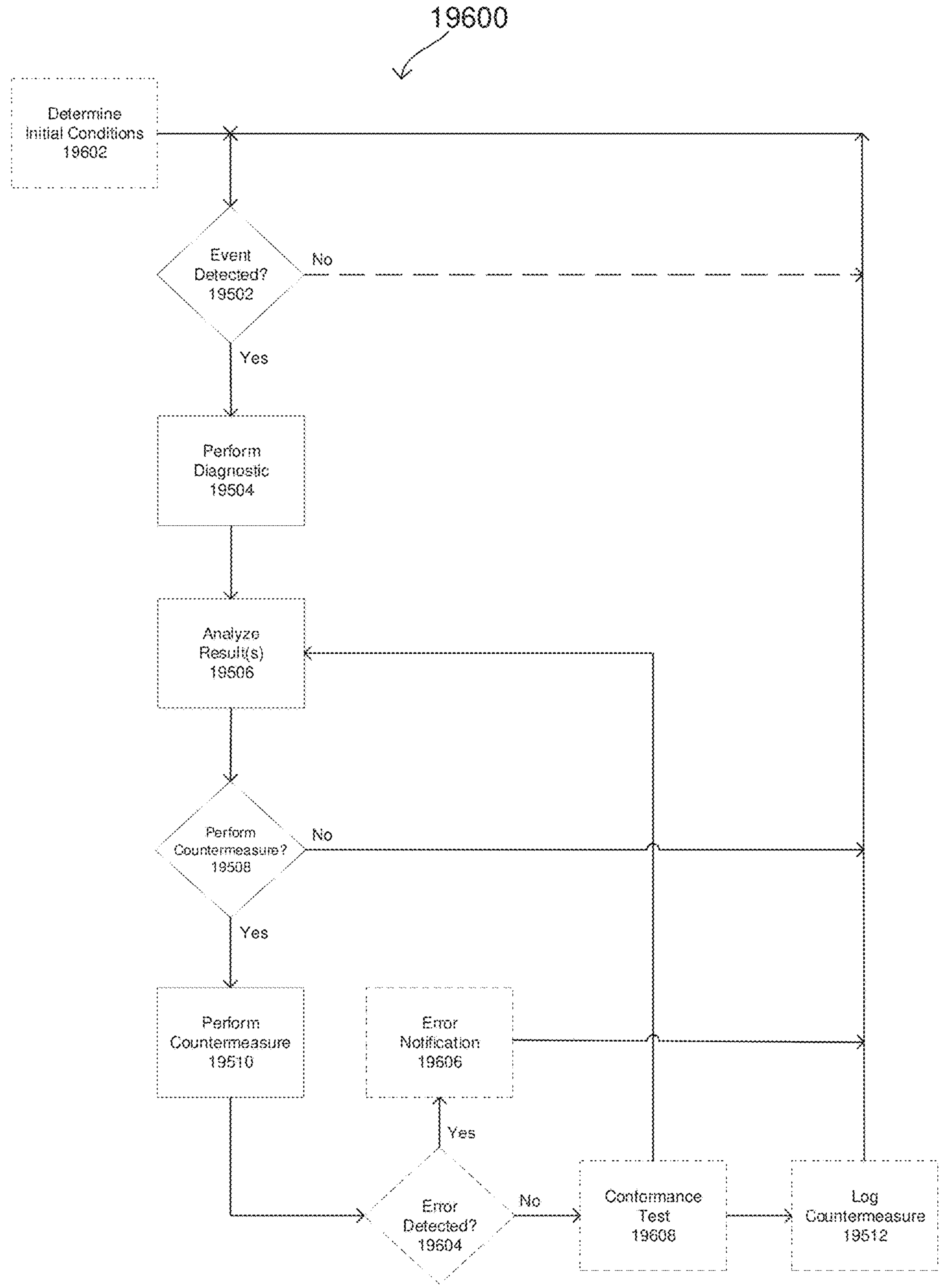

FIG. 196 shows an exemplary flow diagram for a device under test according to some aspects.

Figure 197:
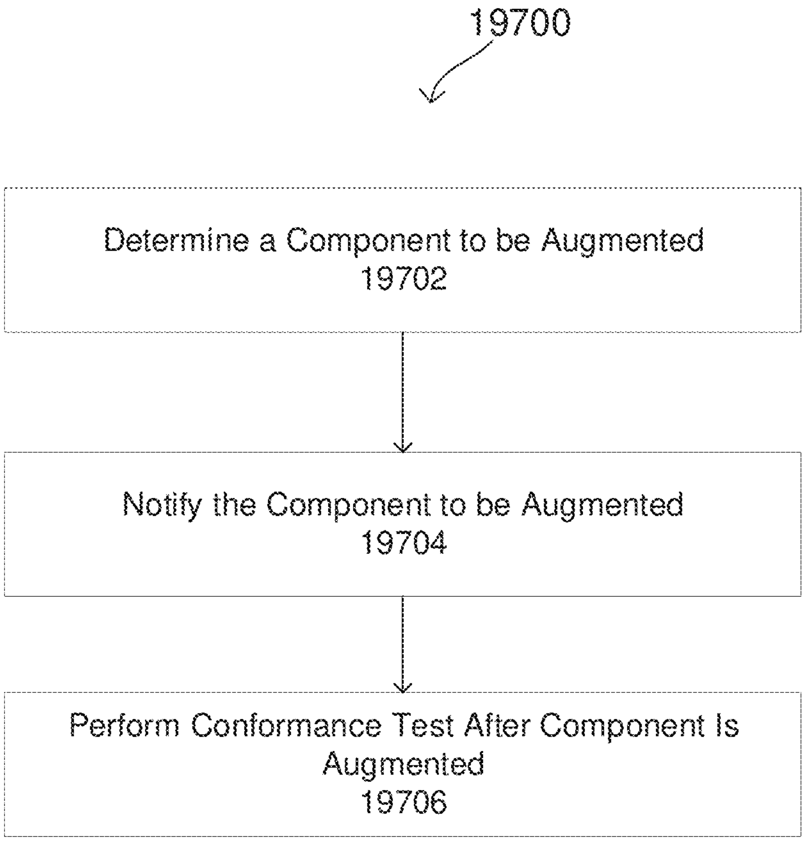

FIG. 197 shows an exemplary process for performing a conformance test of a device under test according to some aspects.

Figure 198:
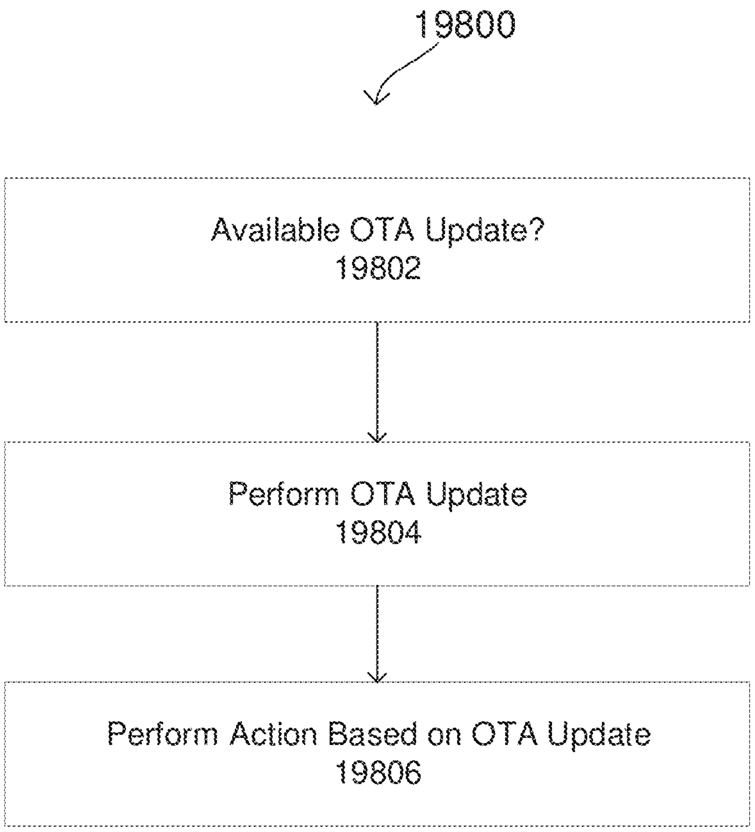

FIG. 198 shows an exemplary process for performing an OTA update process according to some aspects.

Figure 199:
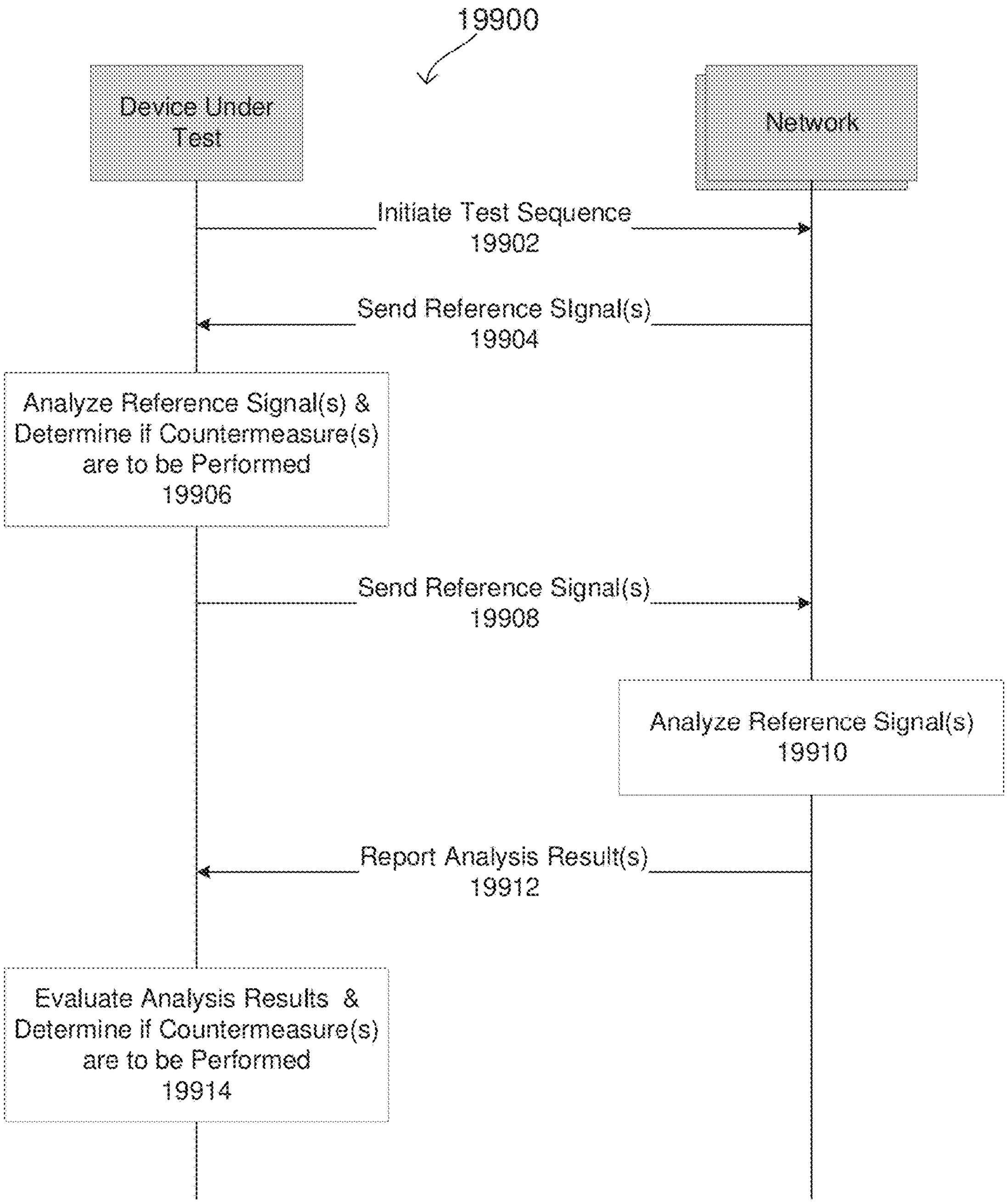

FIG. 199 is an exemplary message sequence chart according to some aspects.

Figure 200:
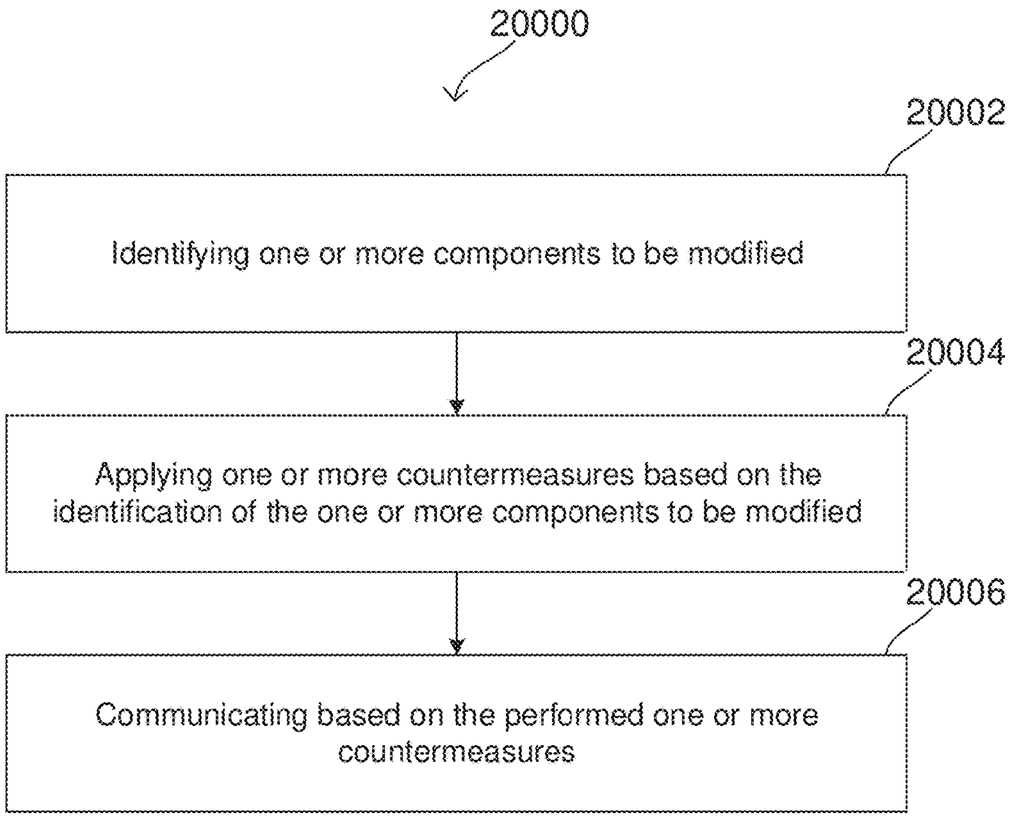

FIG. 200 shows an exemplary method for communicating over a radio communication network in accordance with some aspects.

Figure 201:
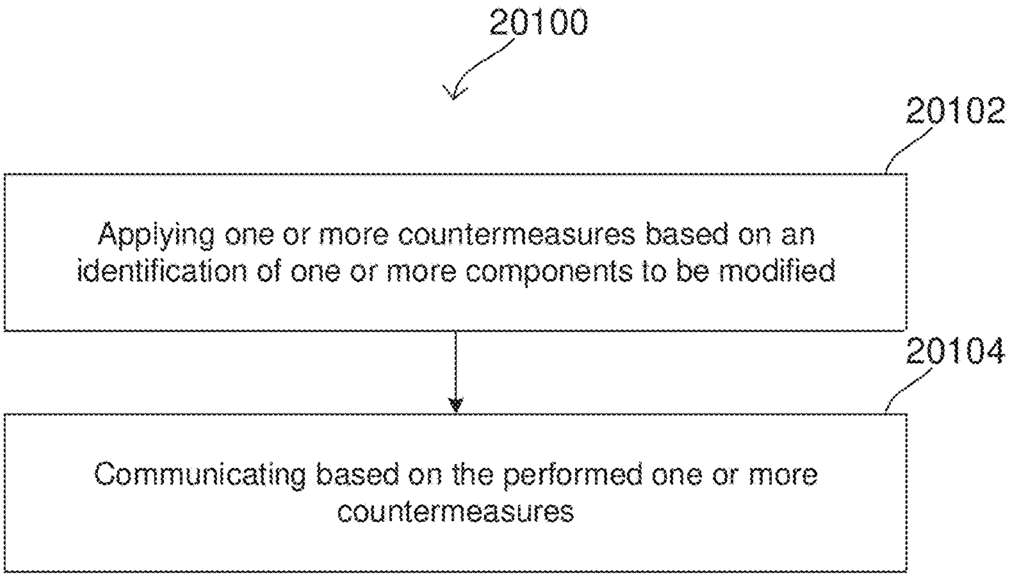

FIG. 201 shows an exemplary method for communicating over a radio communication network in accordance with some aspects.

Figure 202:
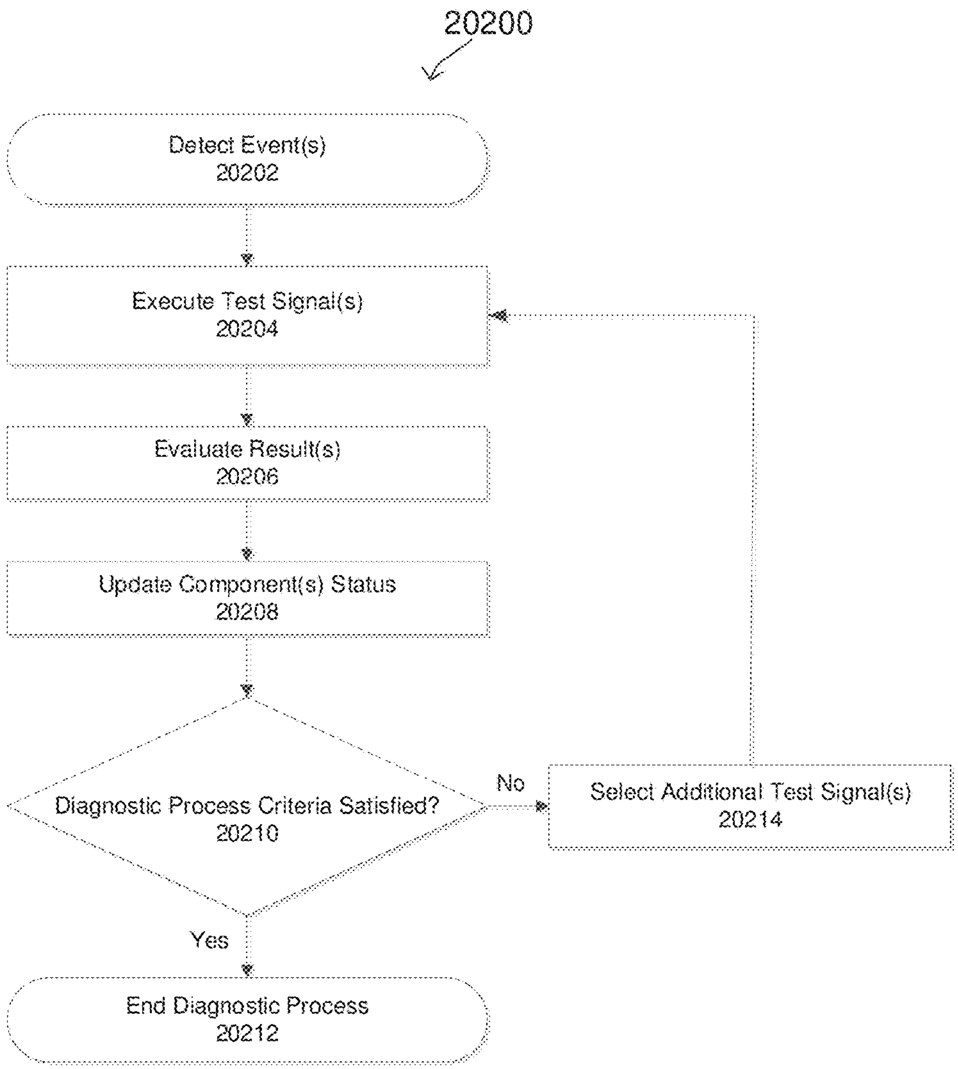

FIG. 202 shows an exemplary decision chart for an in-field diagnostic process according to some aspects.

Figure 203:
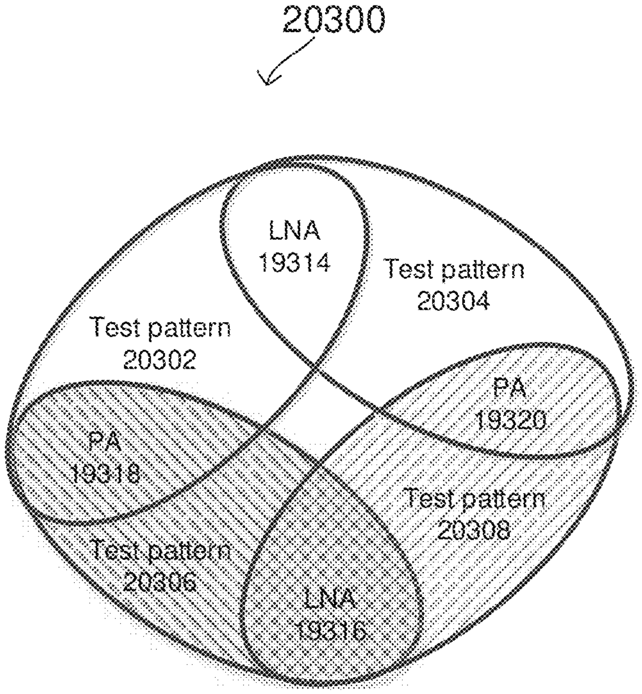

FIG. 203 shows an exemplary evaluation of an in-field diagnostic process in accordance with some aspects.

Figure 204:
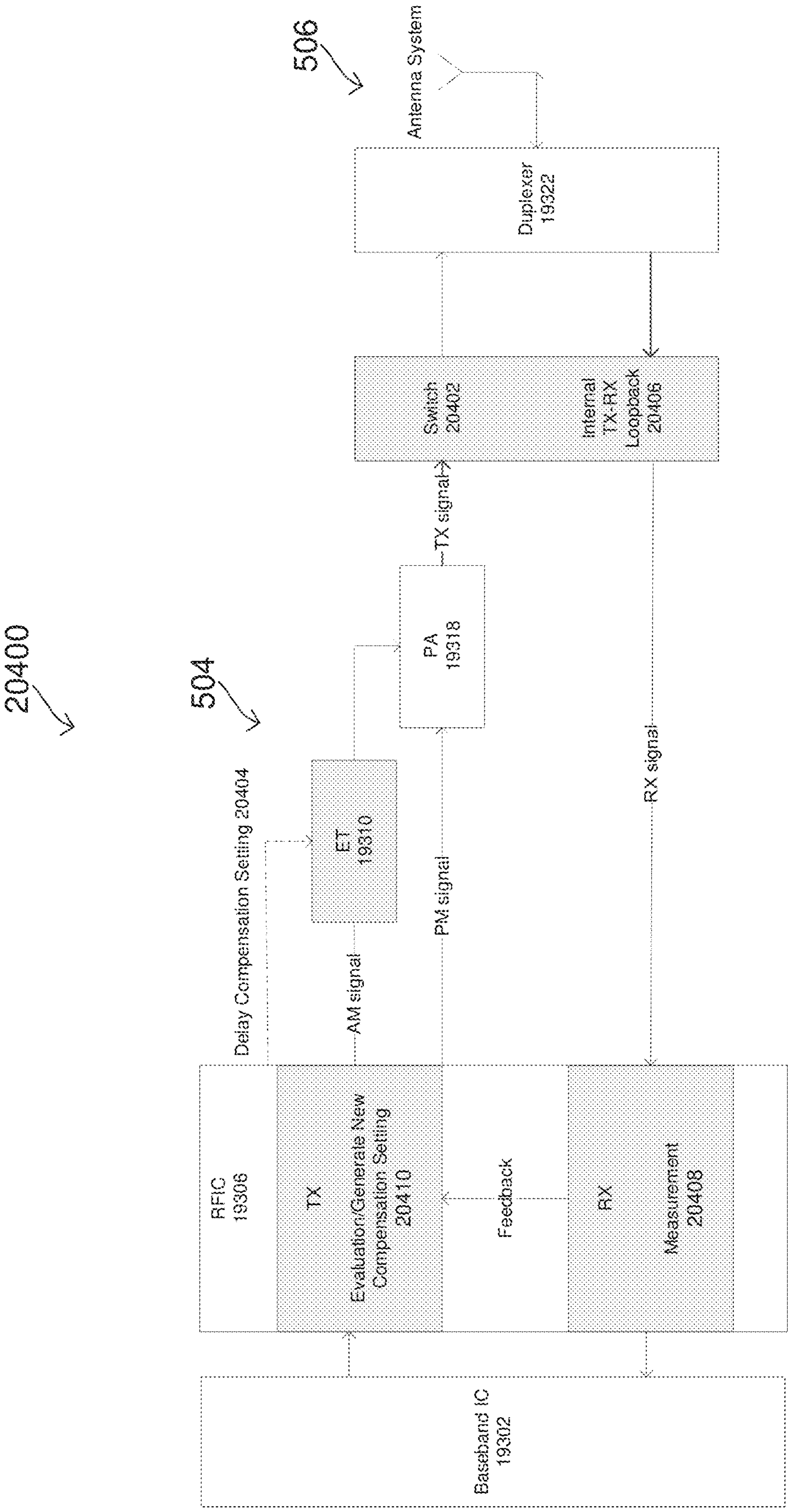

FIG. 204 shows an exemplary internal configuration of a radio communication arrangement, and an antenna system according to some aspects.

Figure 205:
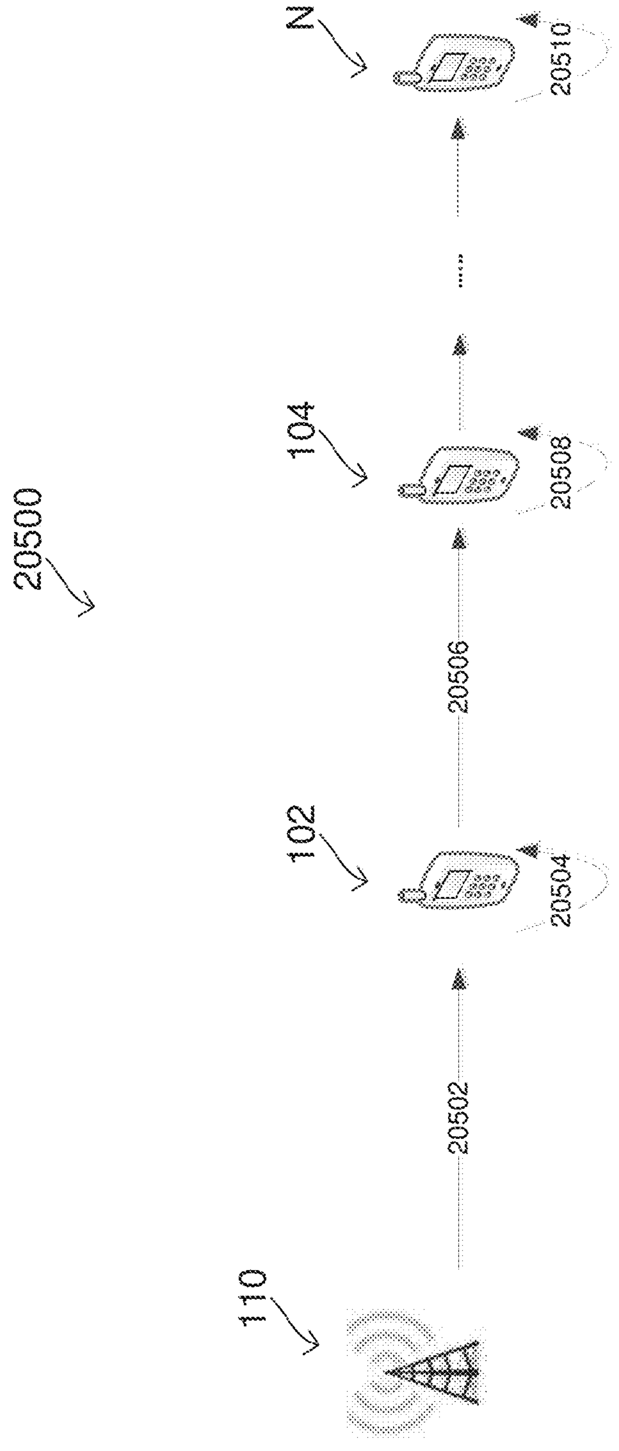

FIG. 205 shows an exemplary network scenario in accordance with some aspects.

Figure 206:
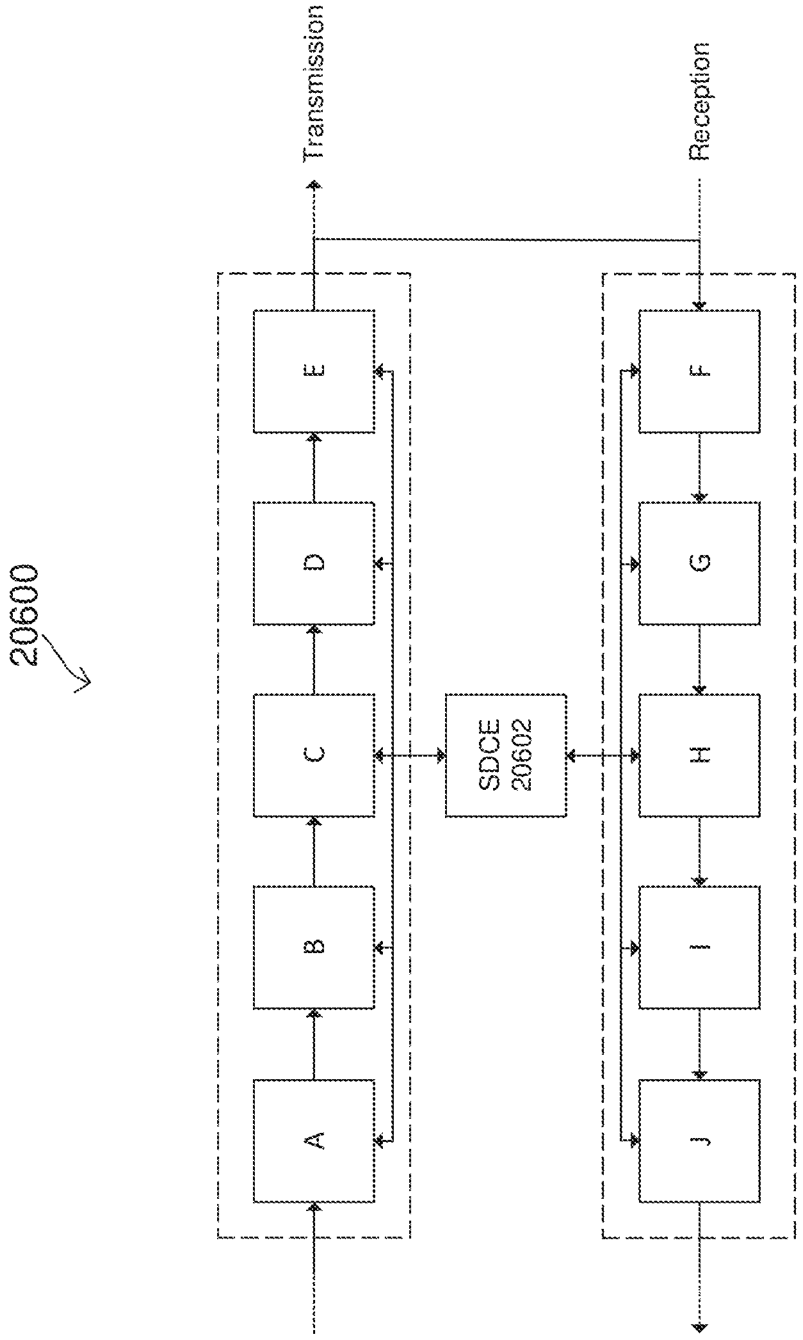

FIG. 206 shows an exemplary logical architecture of a radio communication arrangement in accordance with some aspects.

Figure 207:
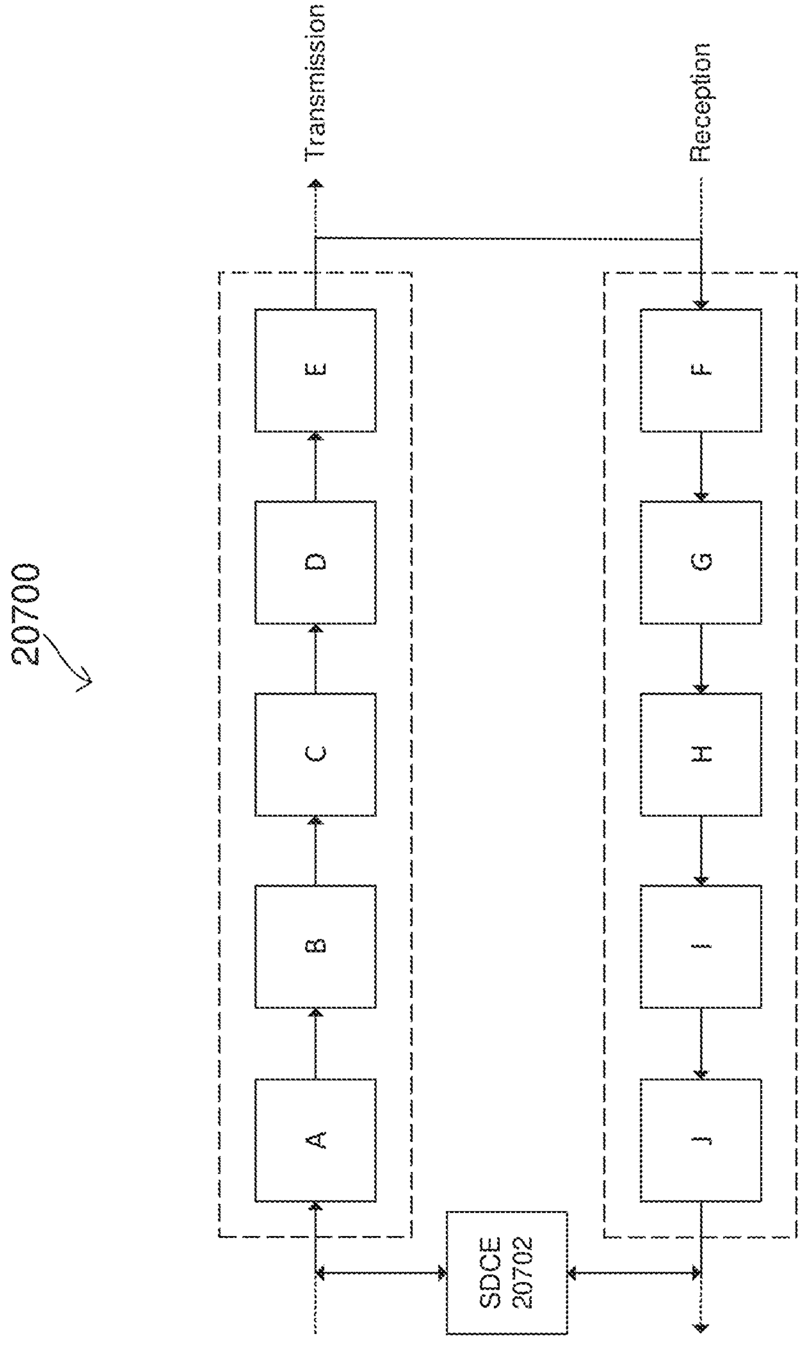

FIG. 207 shows an exemplary logical architecture of a radio communication arrangement in accordance with some aspects.

Figure 208:
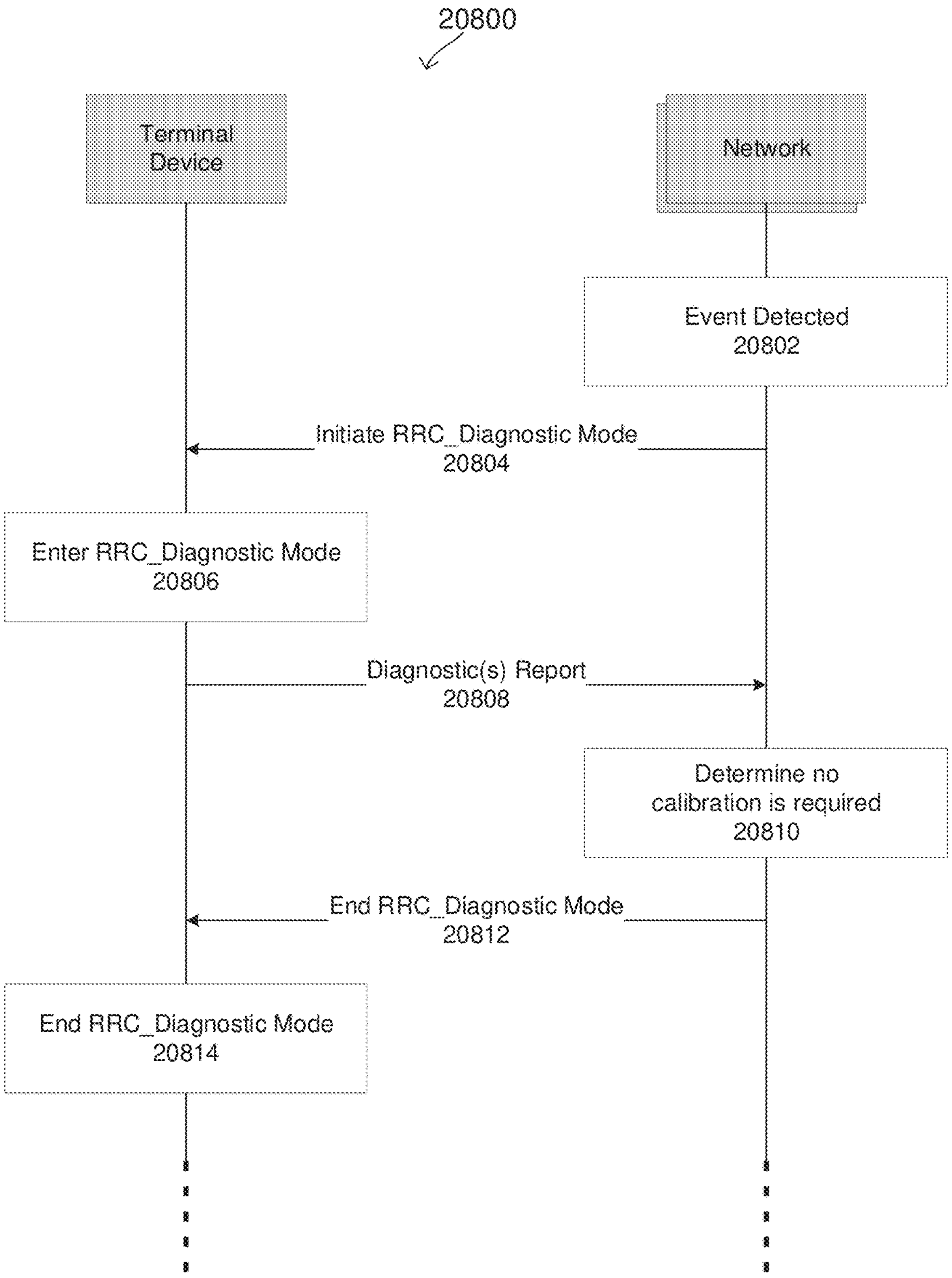

FIG. 208 is an exemplary message sequence chart in accordance with some aspects.

Figure 209:
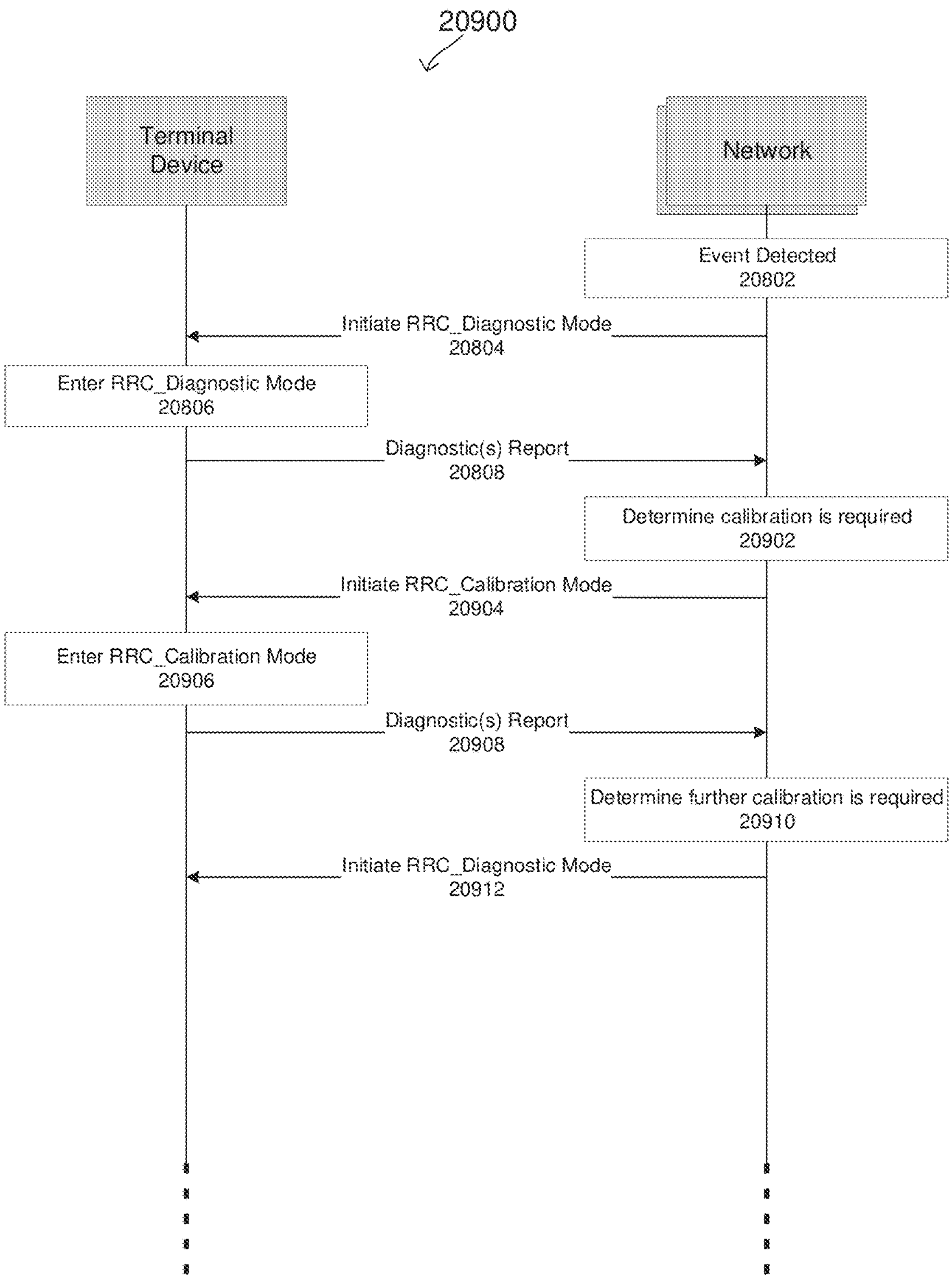

FIG. 209 is an exemplary message sequence chart in accordance with some aspects.

Figure 210:
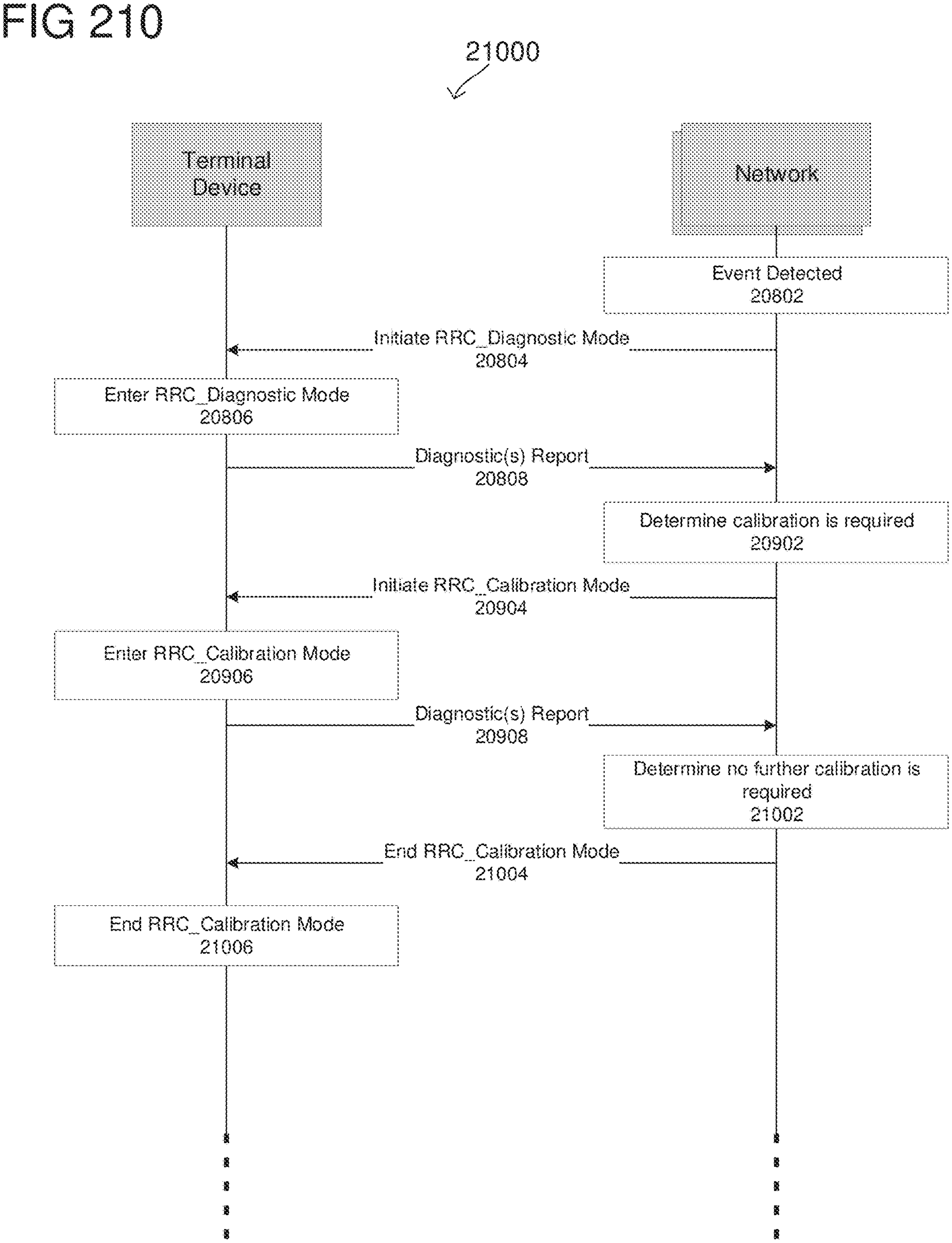

FIG. 210 is an exemplary message sequence chart in accordance with some aspects.

Figure 211:
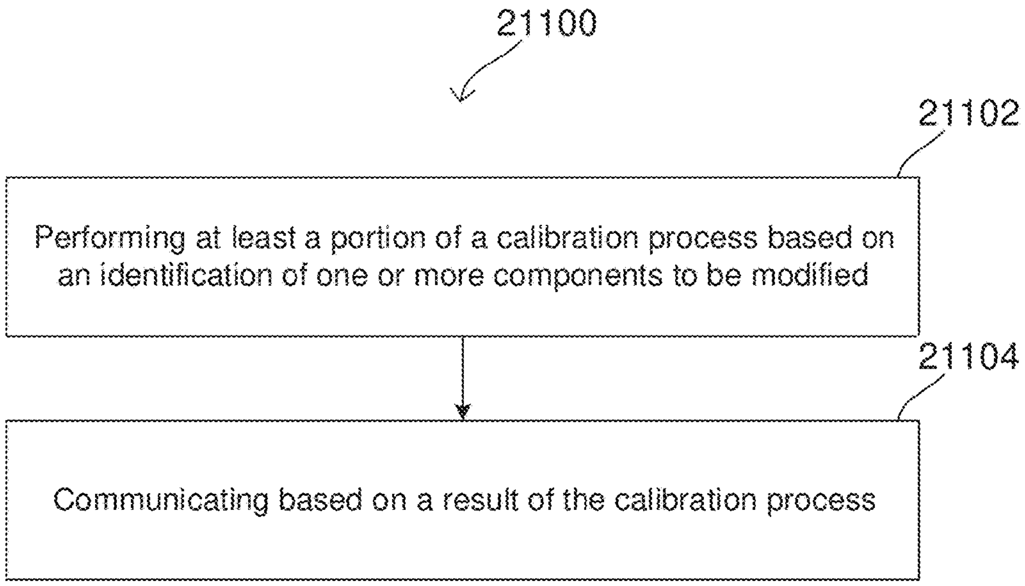

FIG. 211 shows an exemplary method for communicating over a radio communication network in accordance with some aspects.

Figure 212:
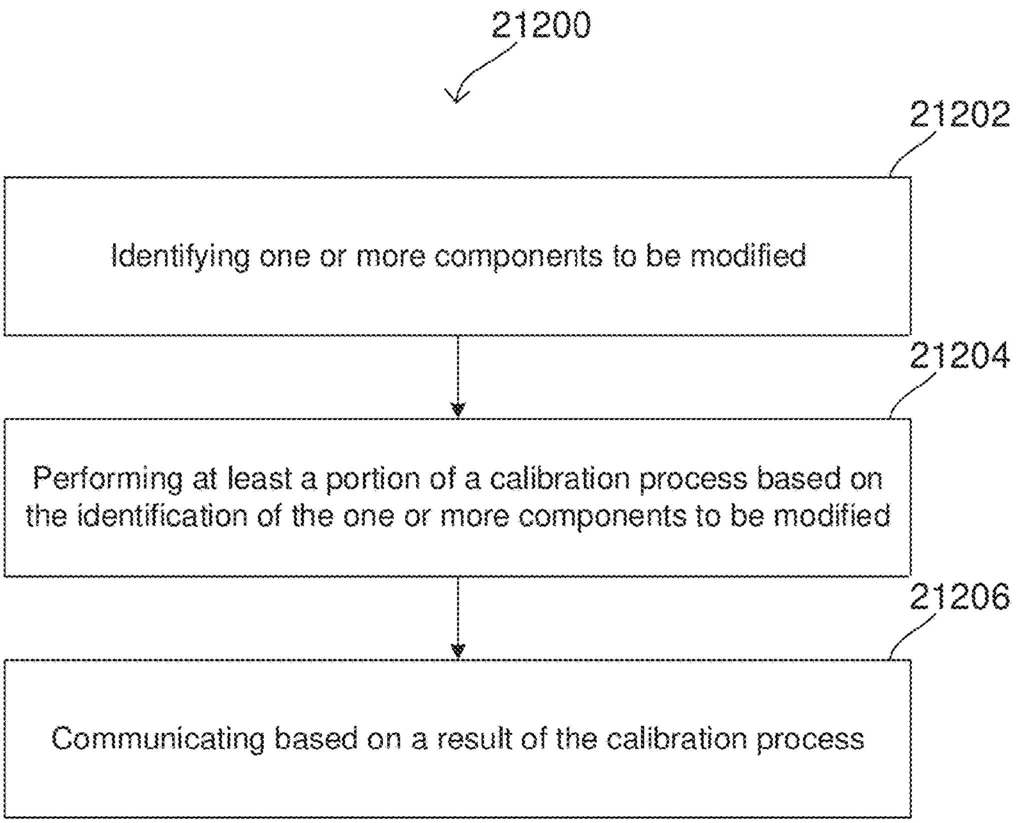

FIG. 212 shows an exemplary method for communicating over a radio communication network in accordance with some aspects.

Figure 213:
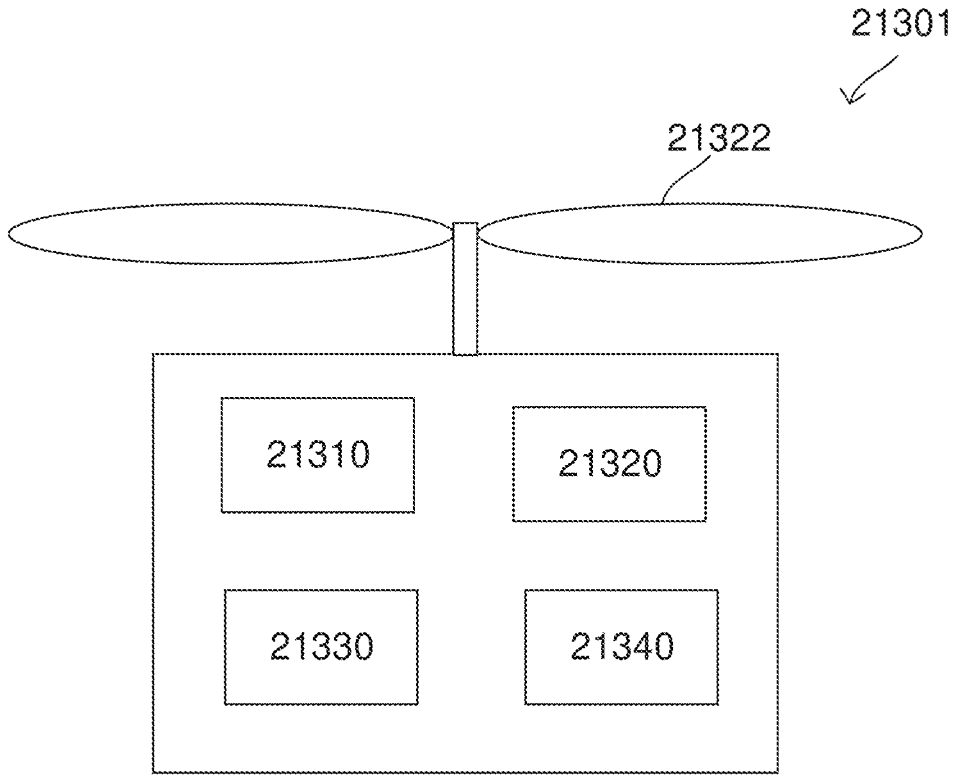
Figure 214:
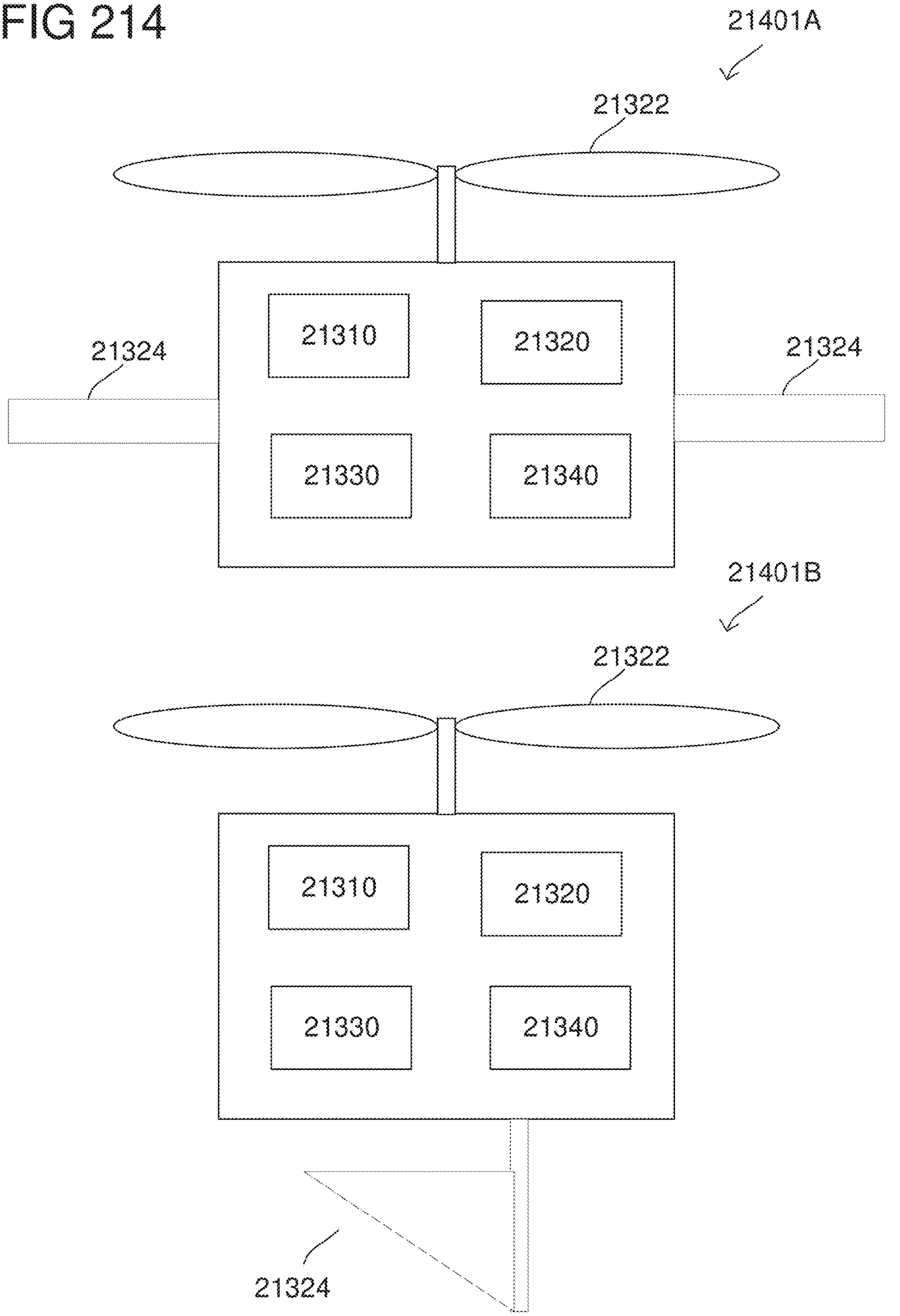
Figure 215:
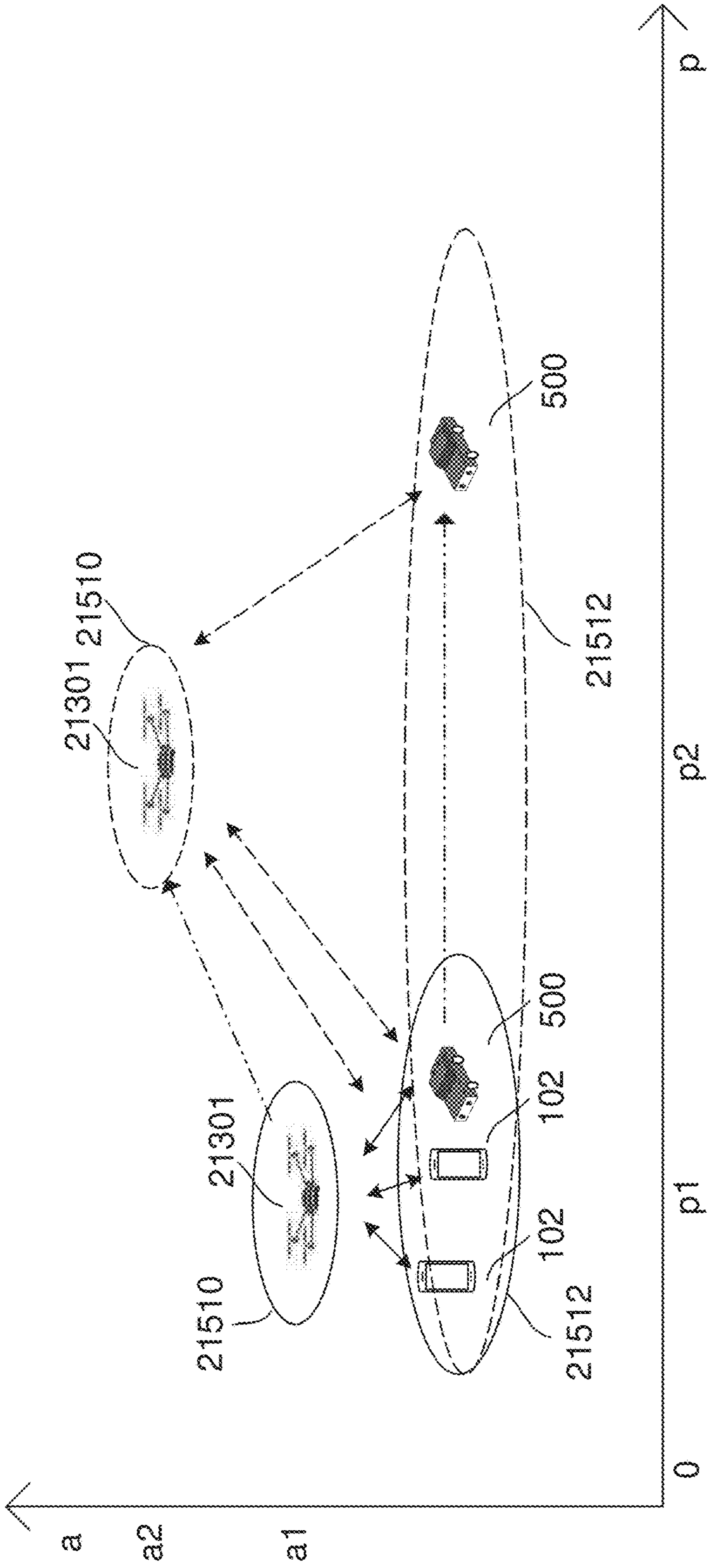
Figure 216:
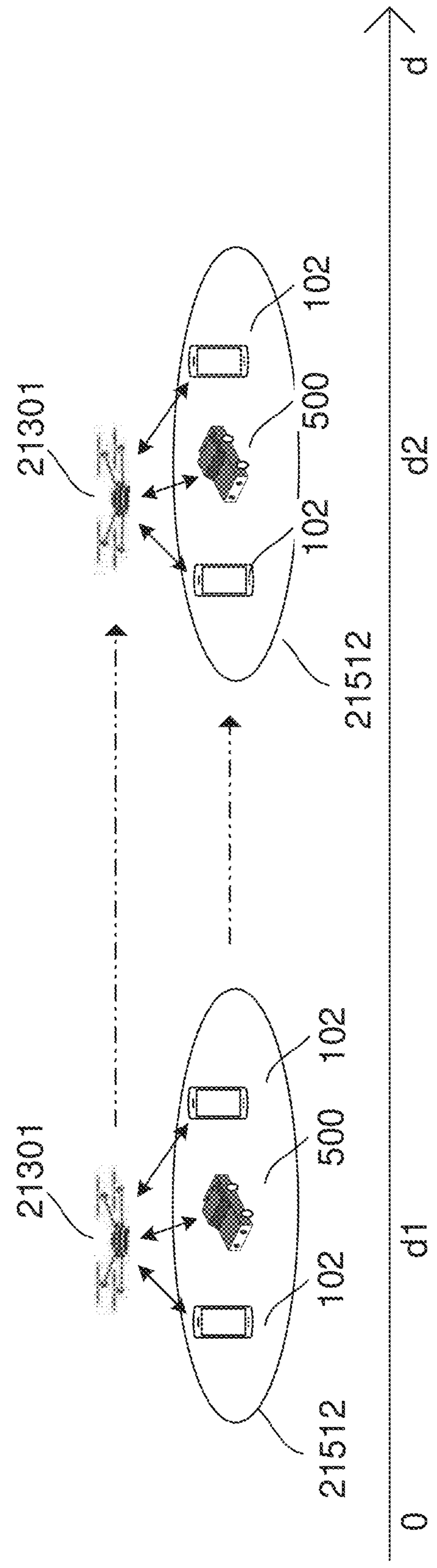
Figure 217:
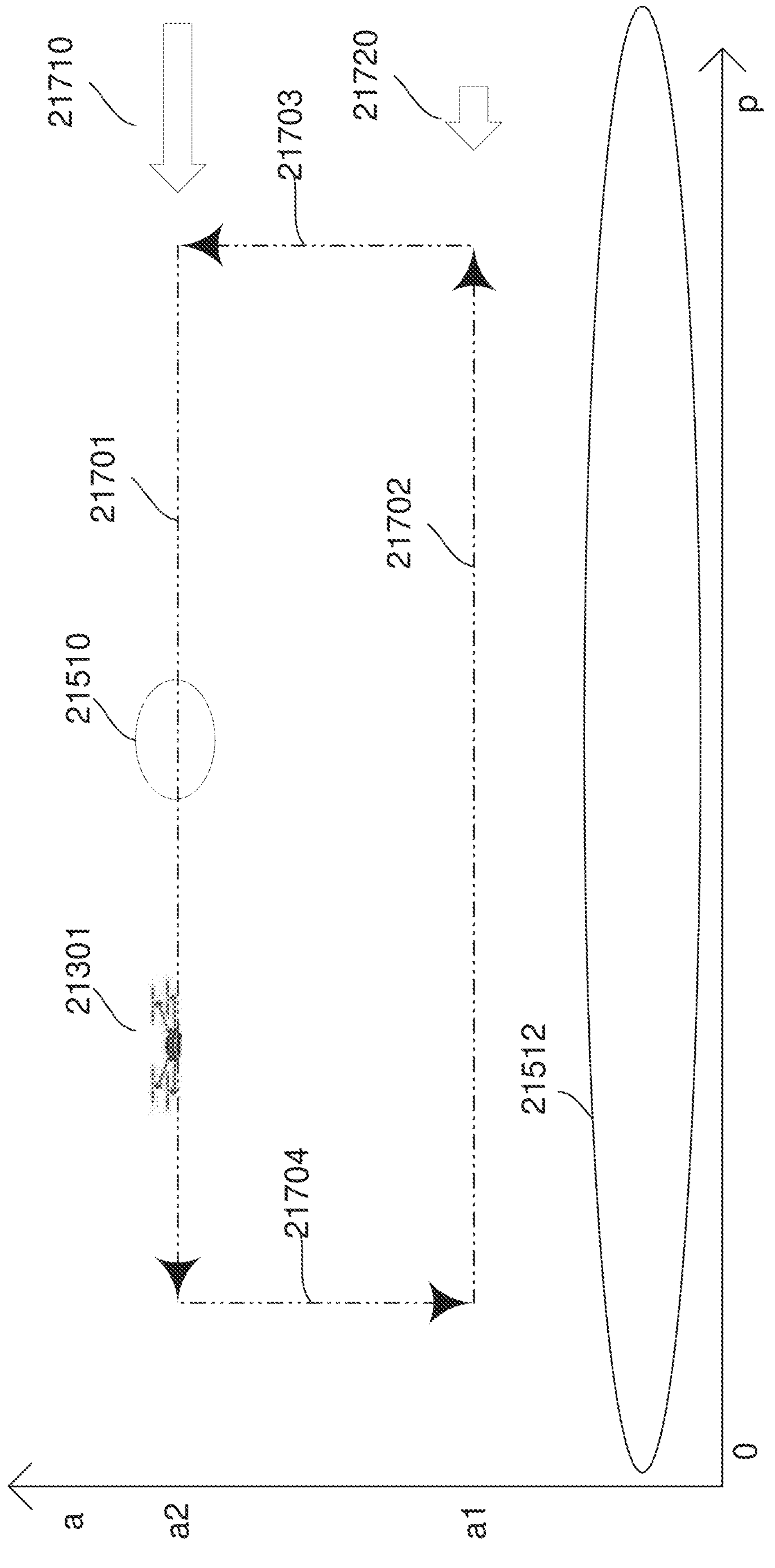
Figure 218:
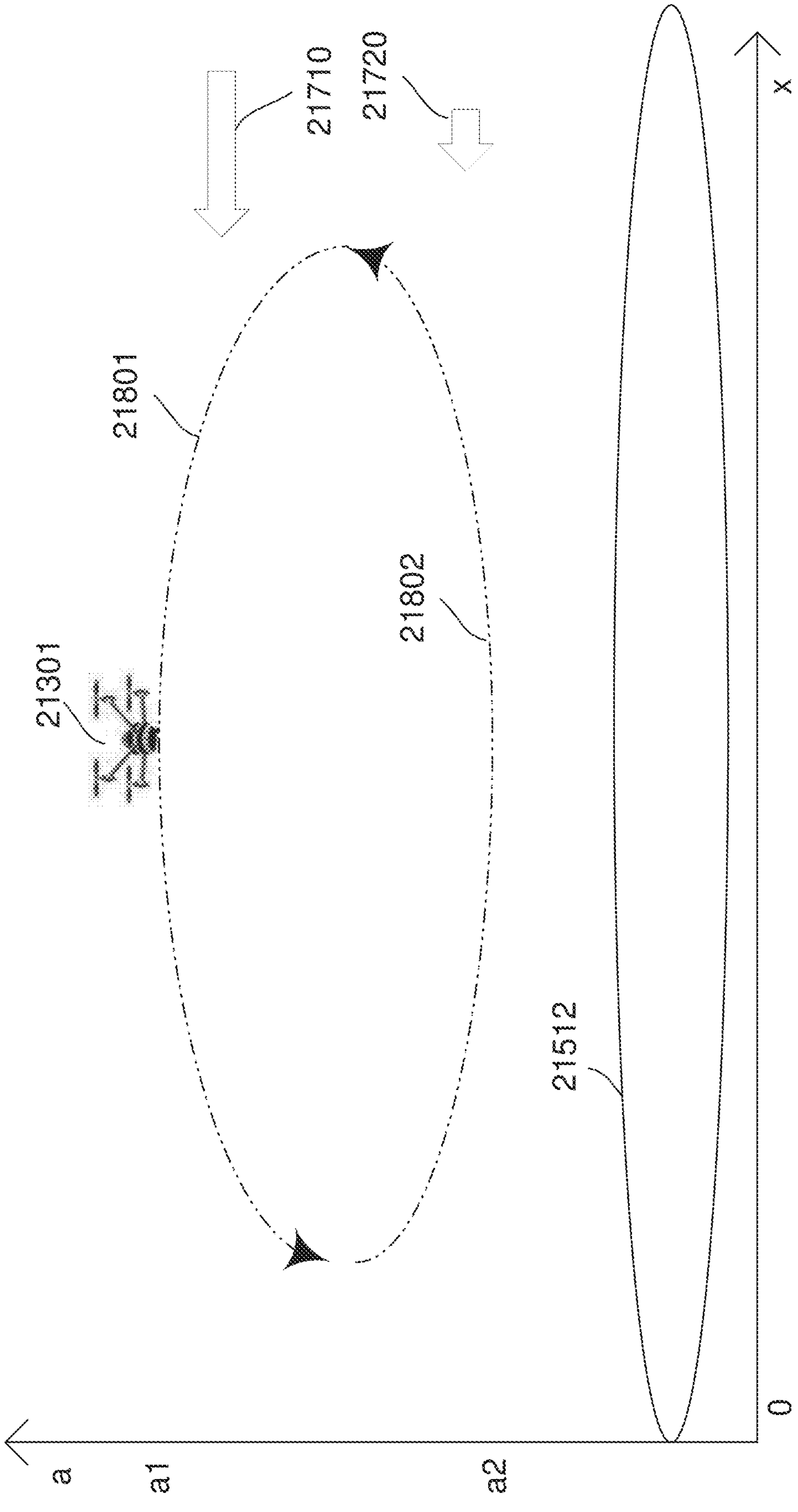
Figure 219:
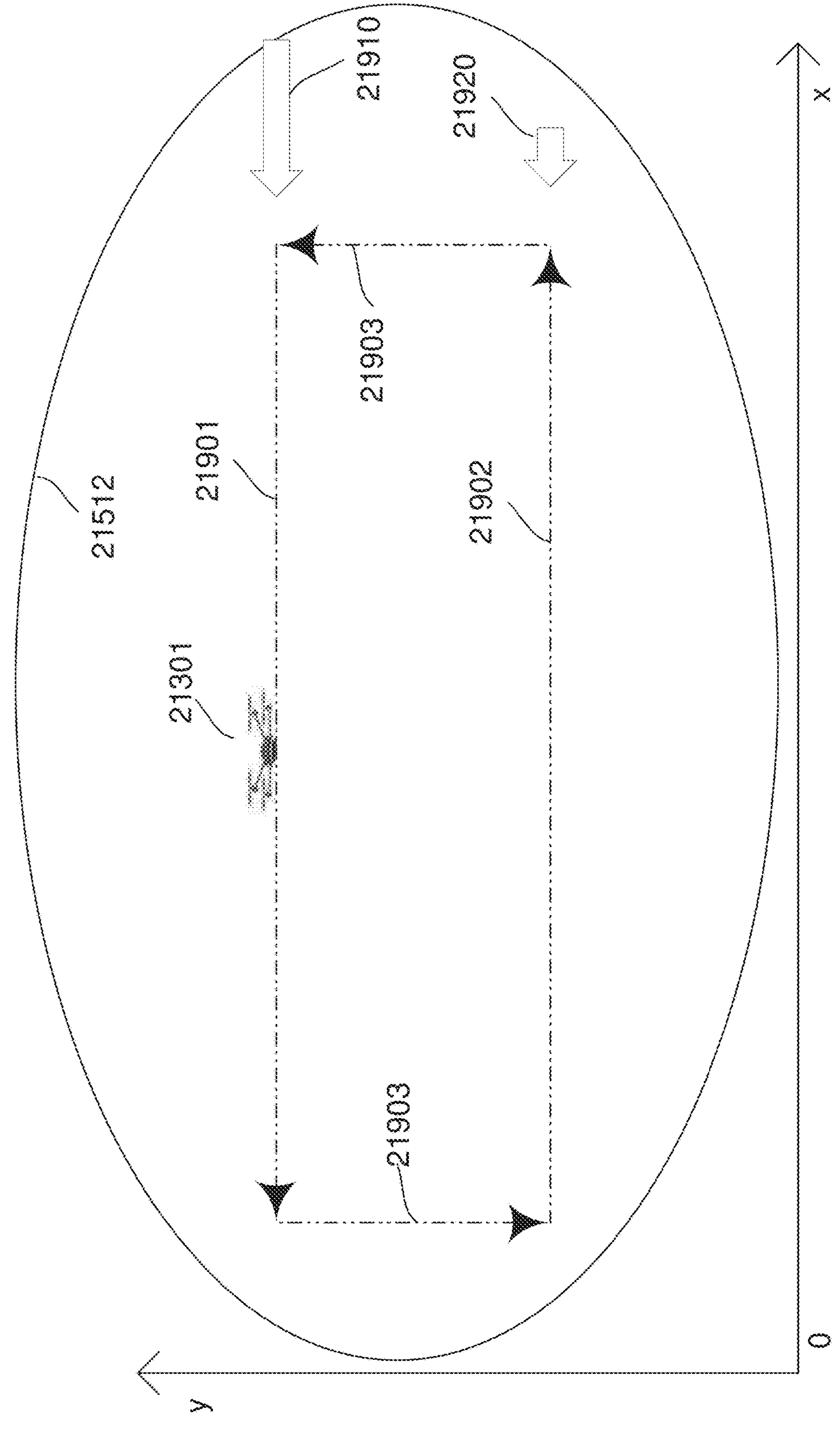
Figure 222:
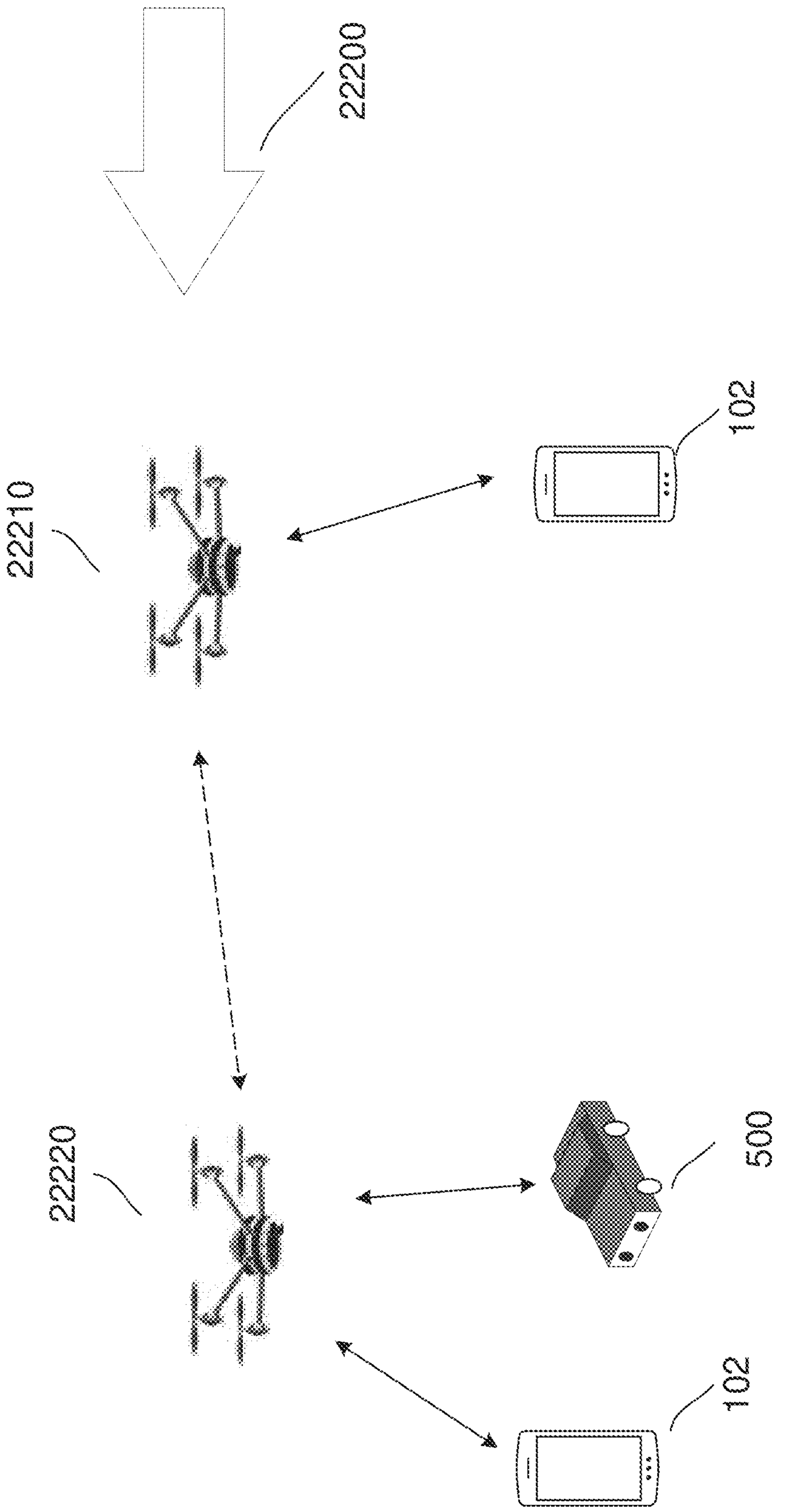
Figure 223:
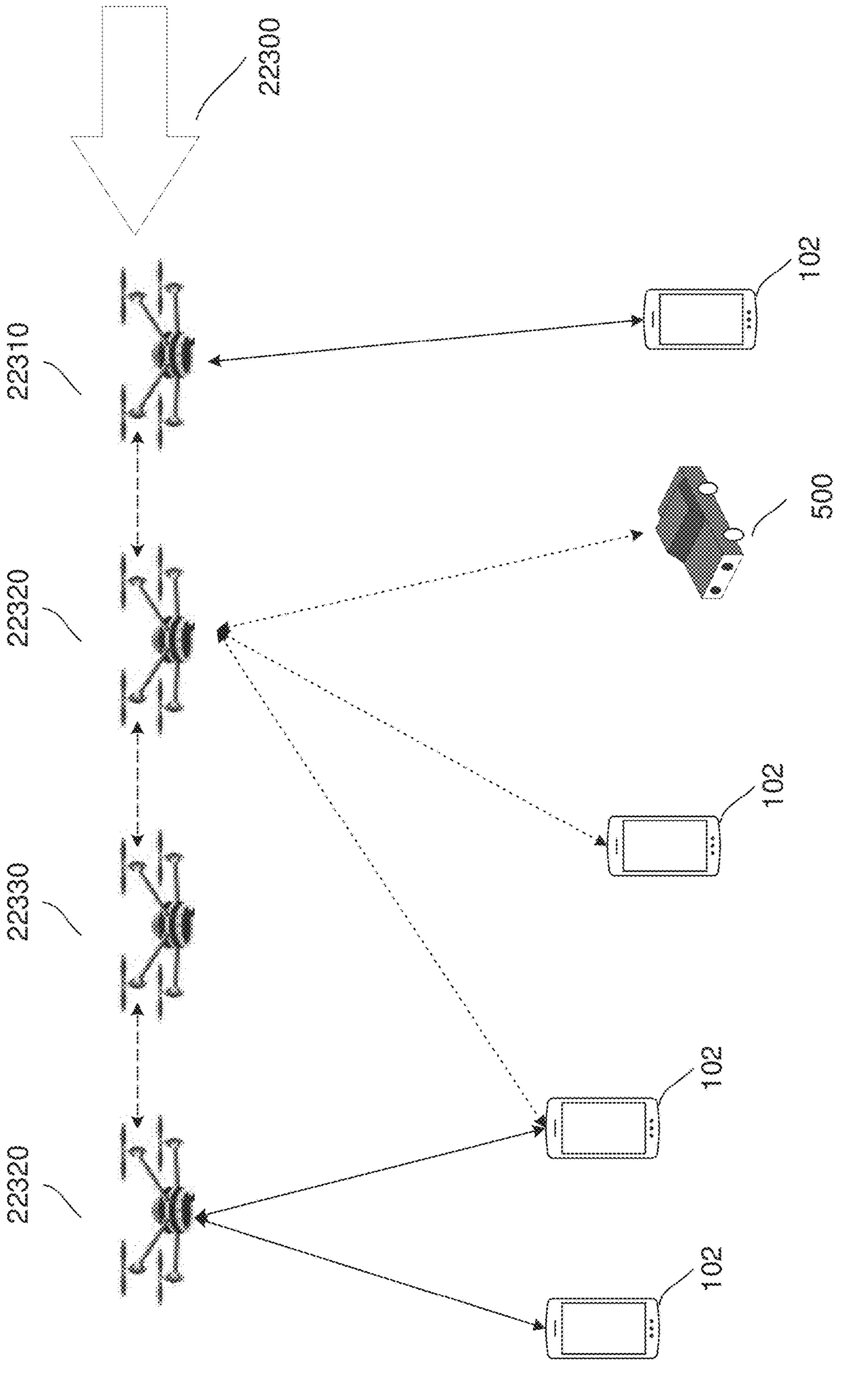
Figure 224:
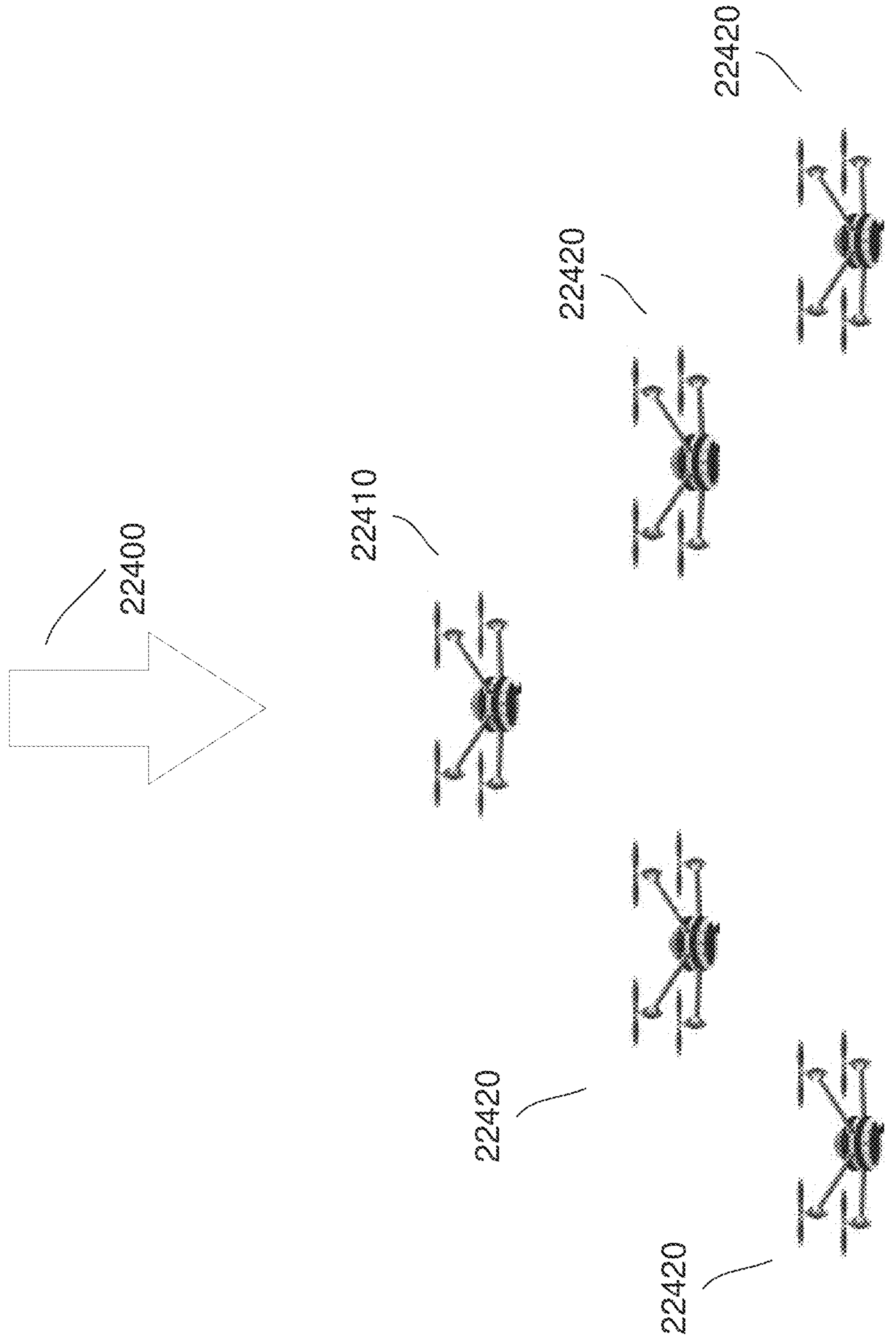
Figure 226:
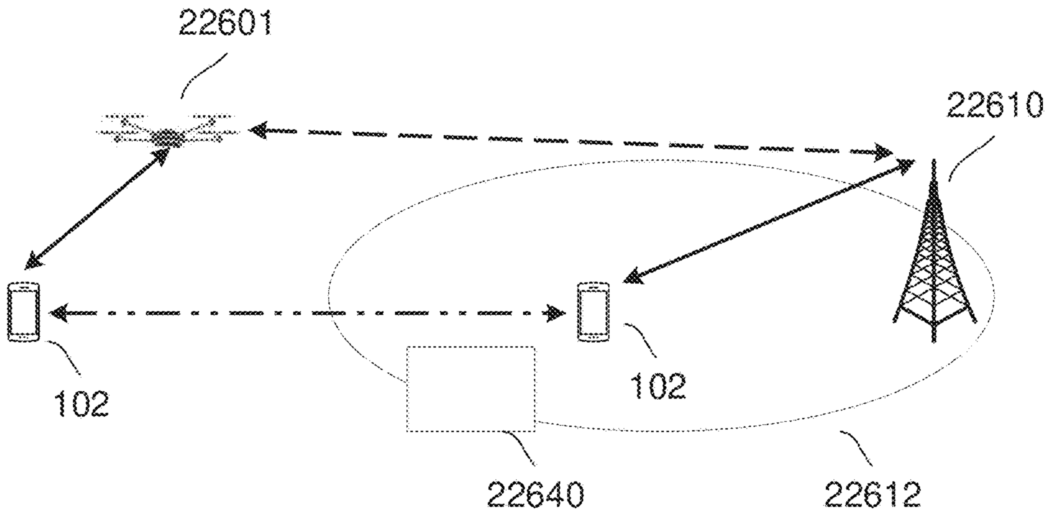
Figure 227:
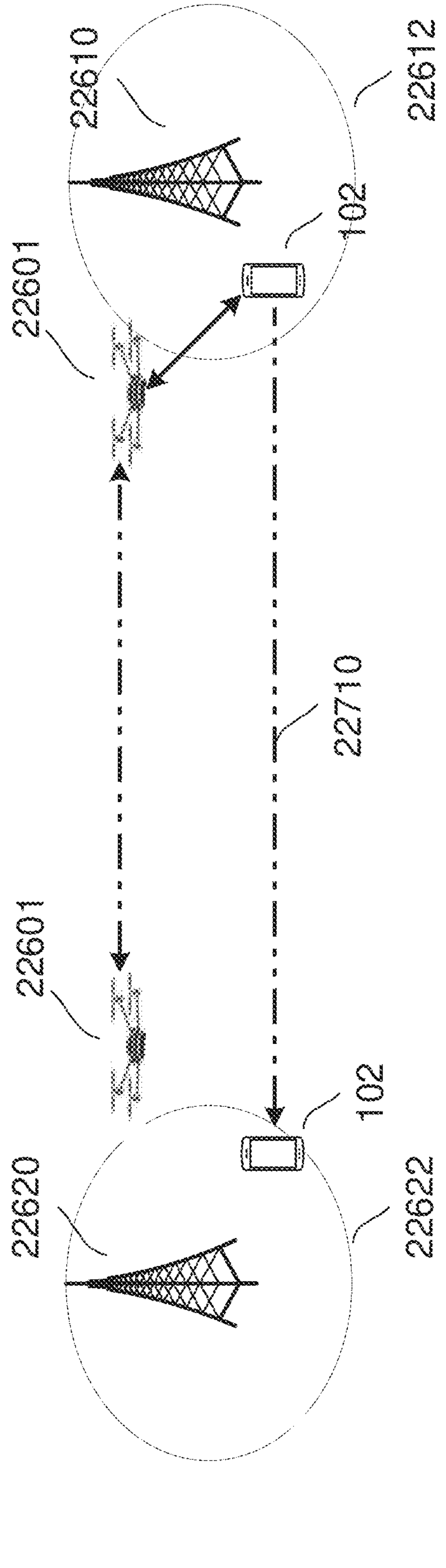
Figure 229:
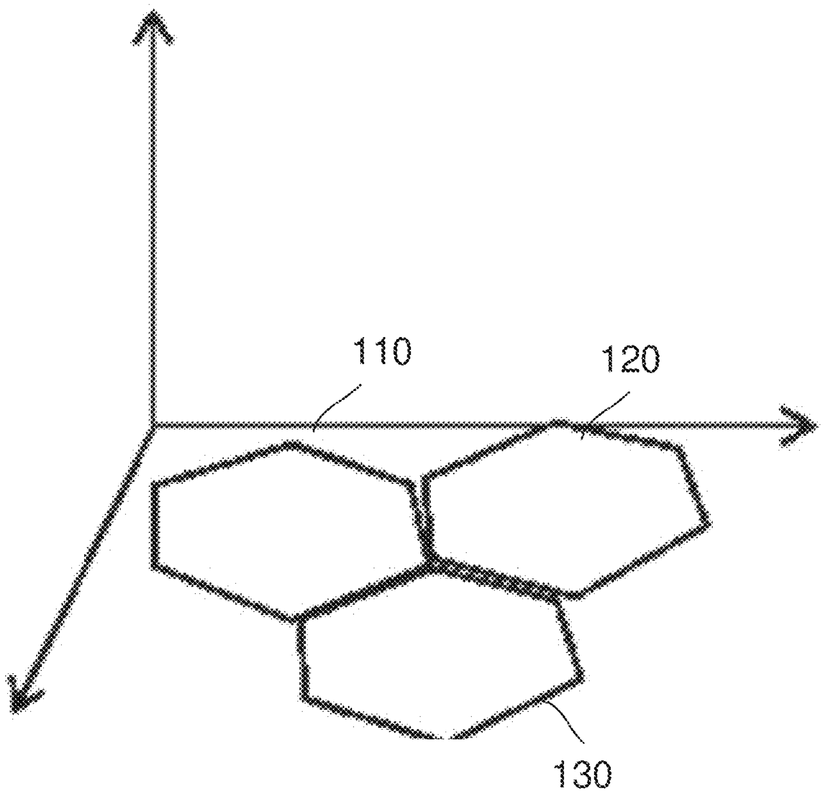
Figure 230:
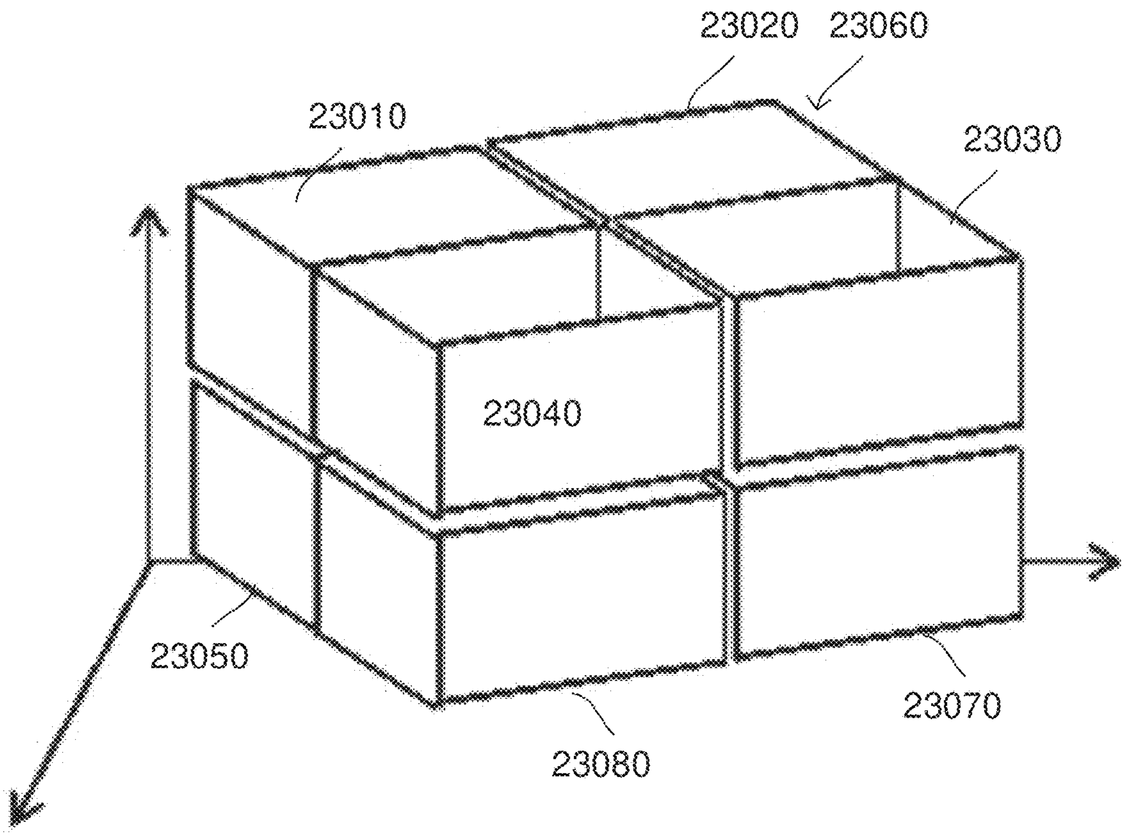
Figure 231:
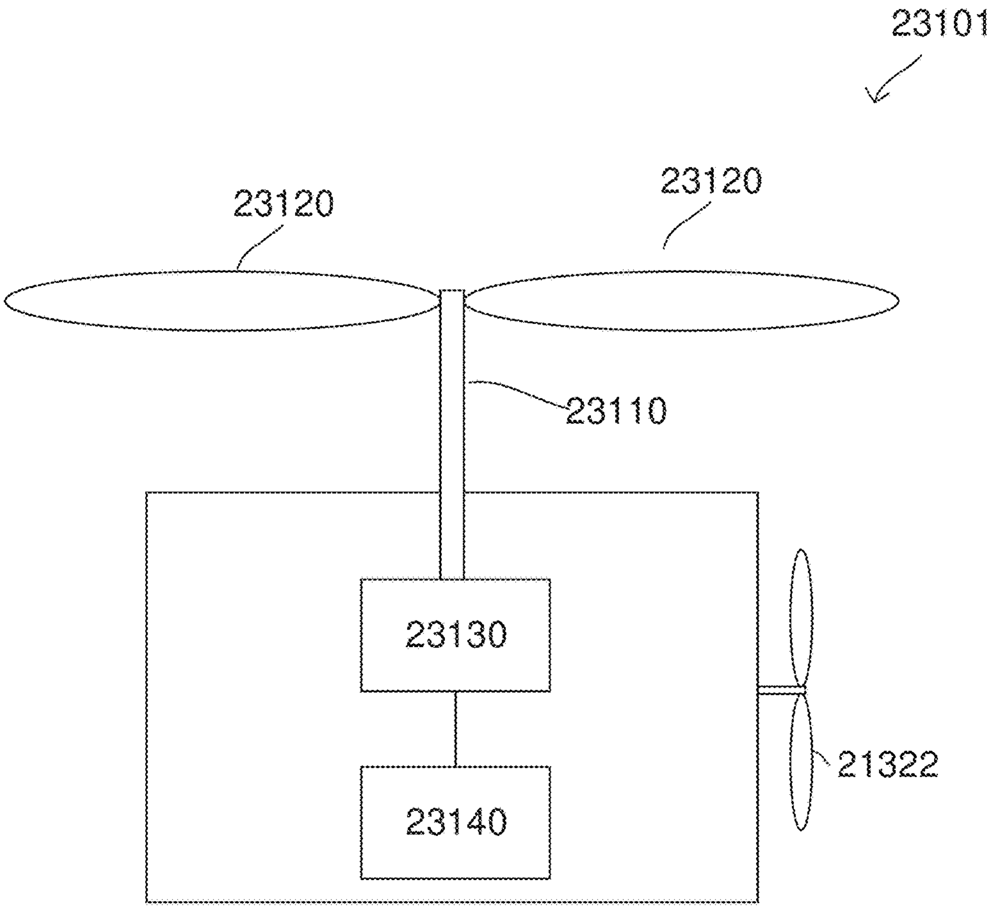
Figure 232:
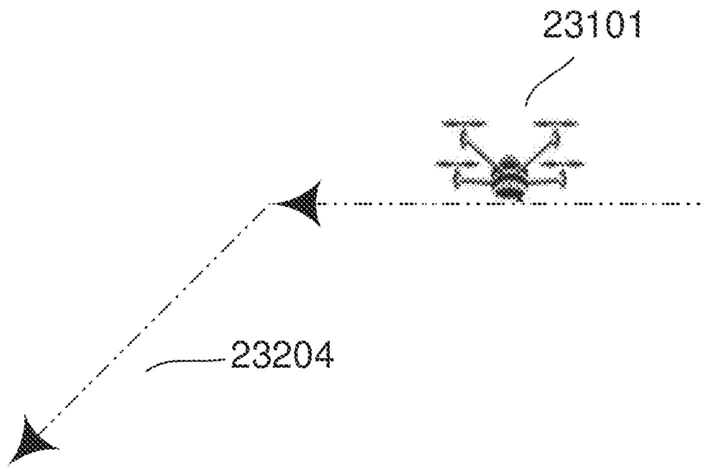
Figure 233:
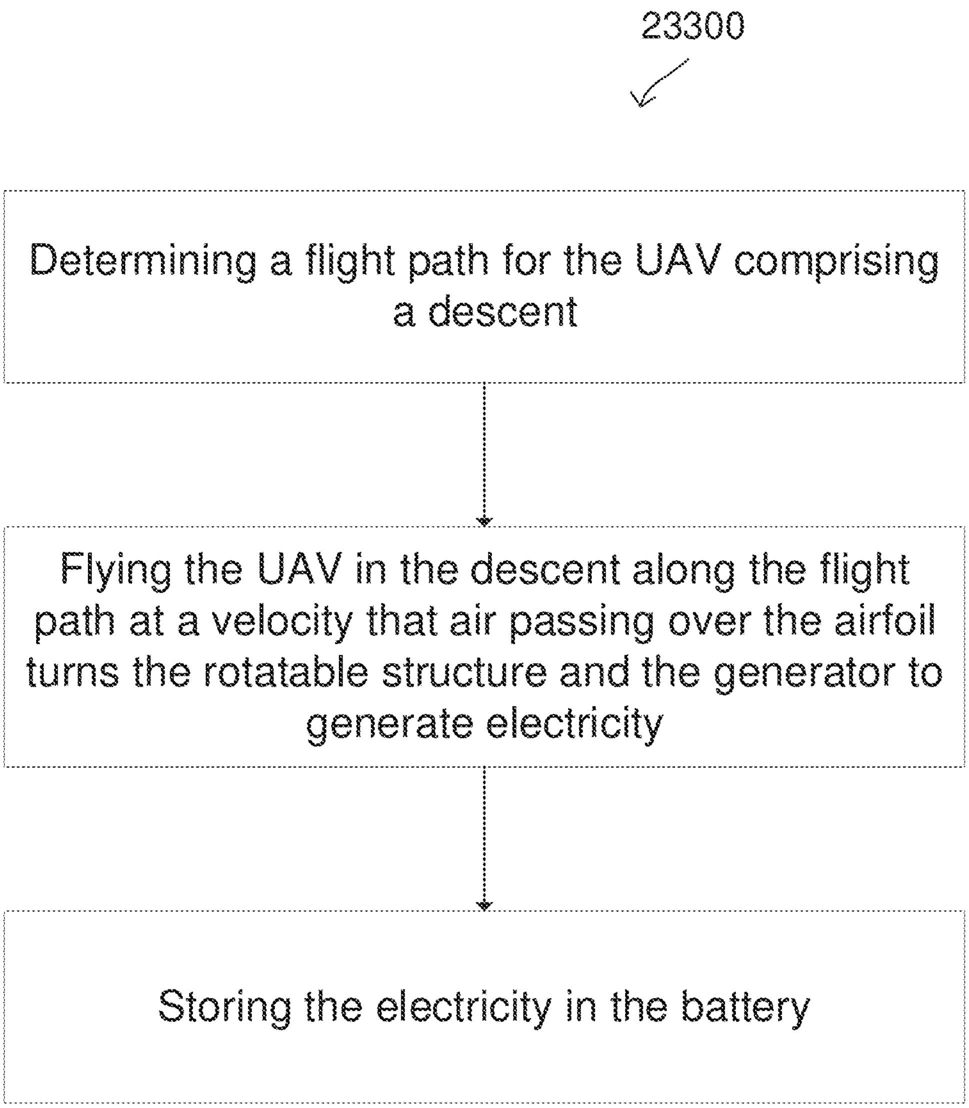
Figure 234:
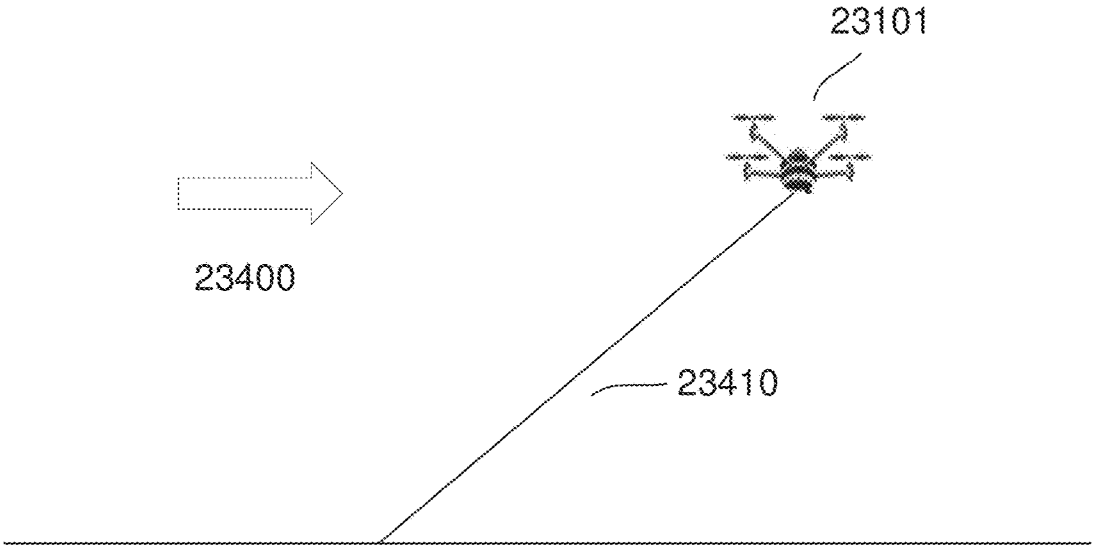
Figure 235:
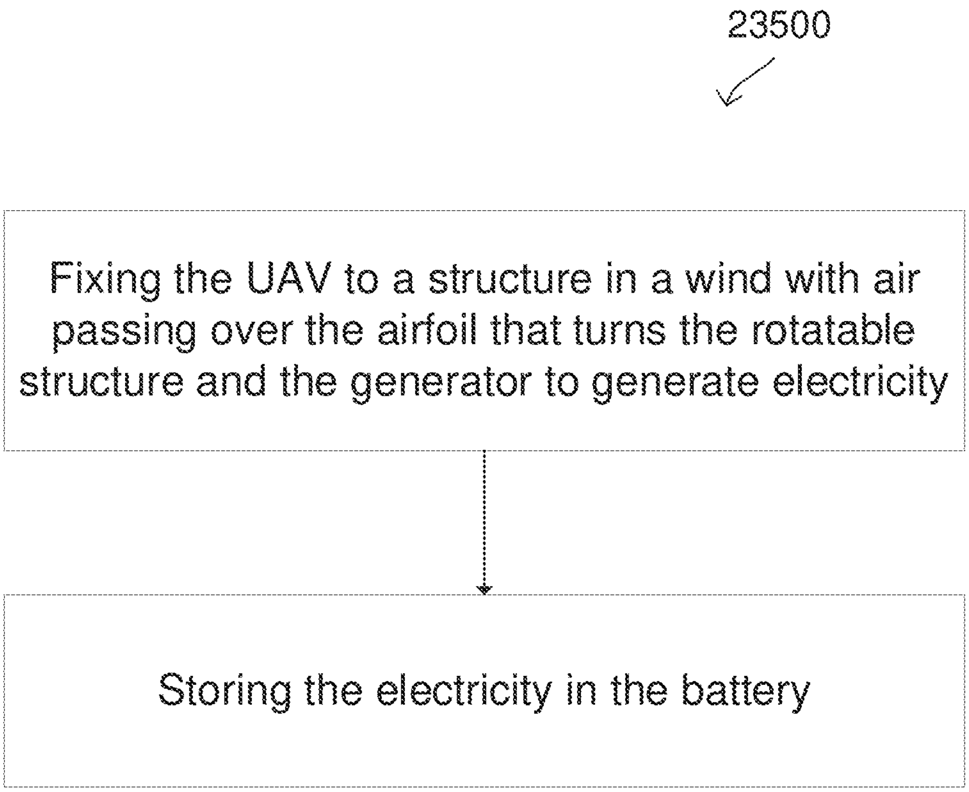
Figure 236:
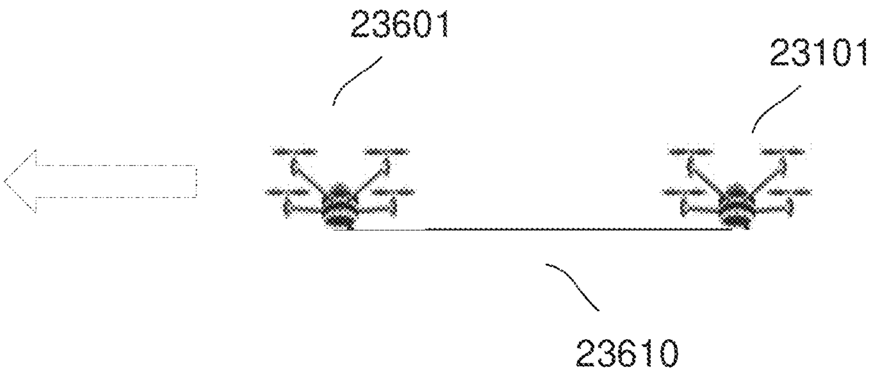
Figure 237:
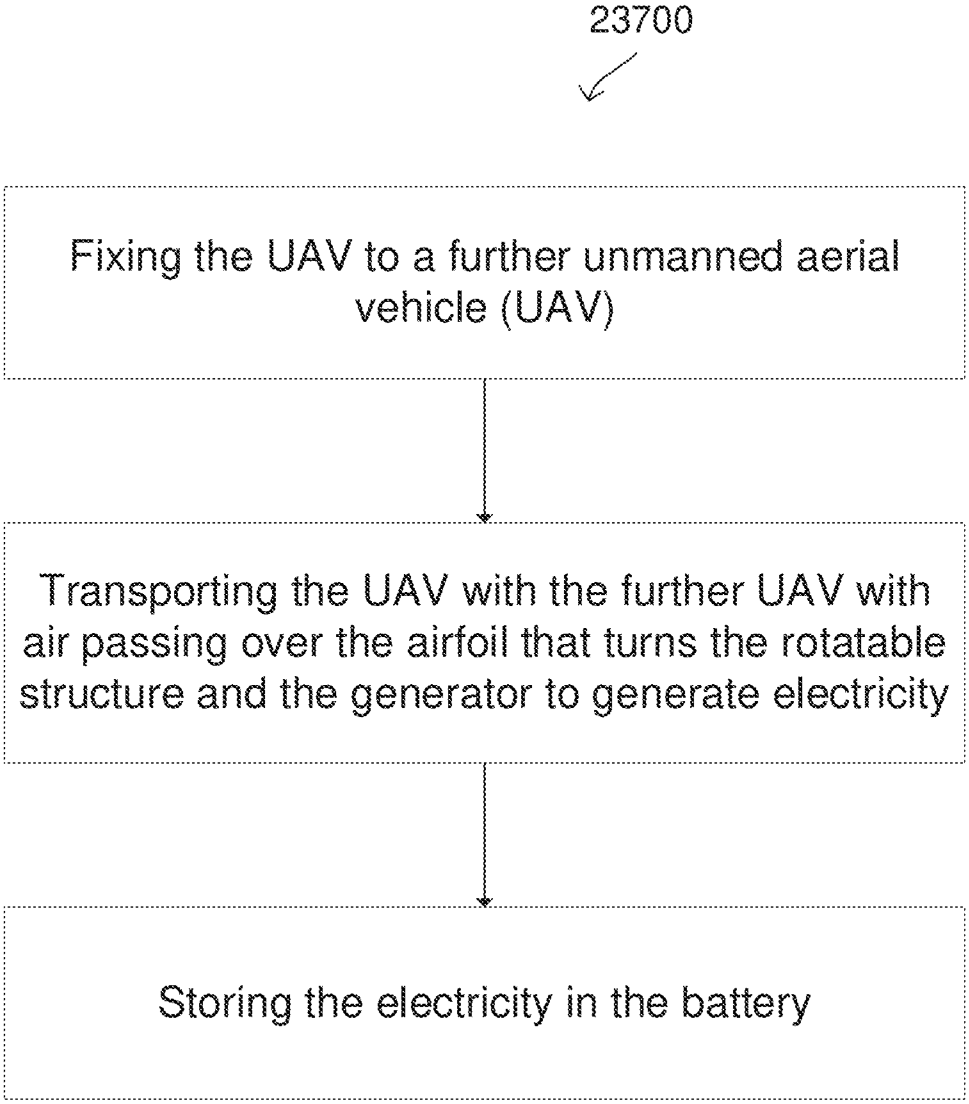
Figure 238:
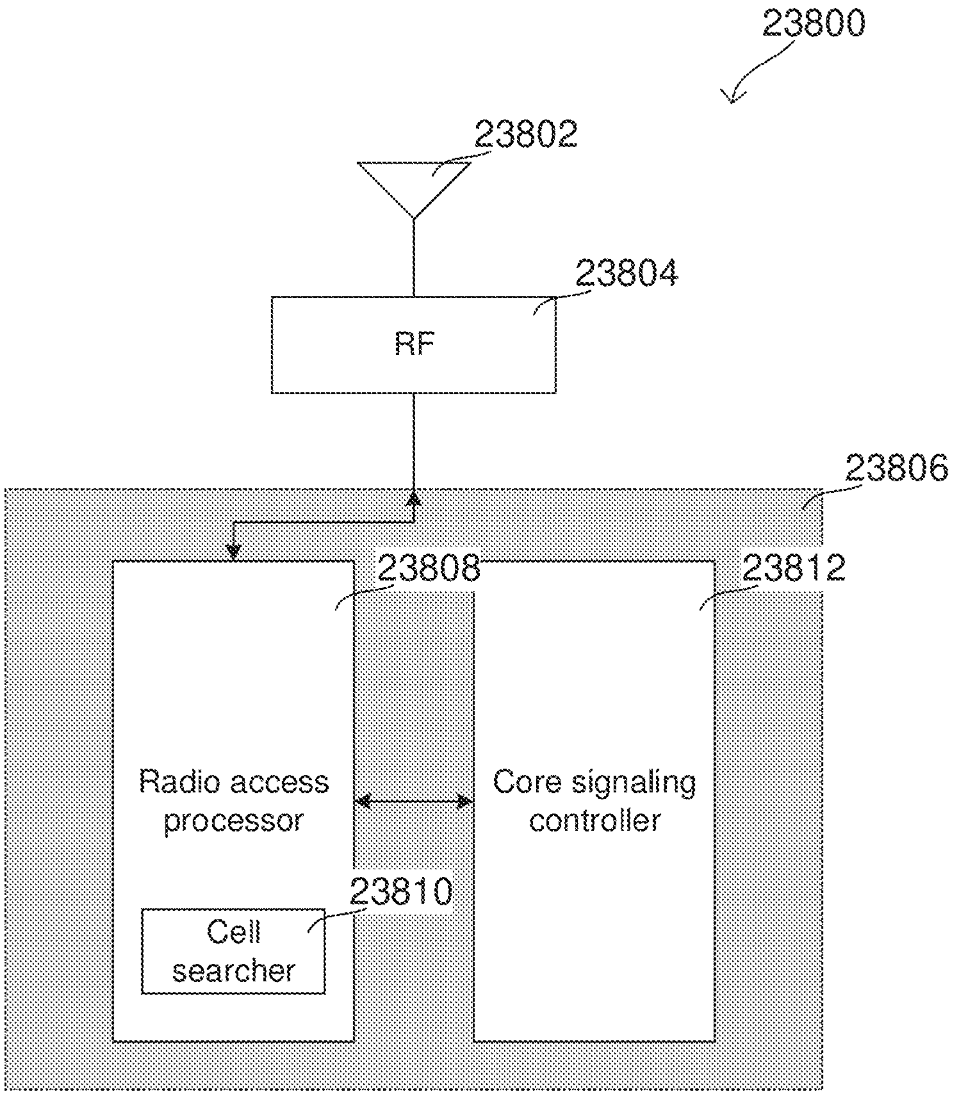
Figure 239:
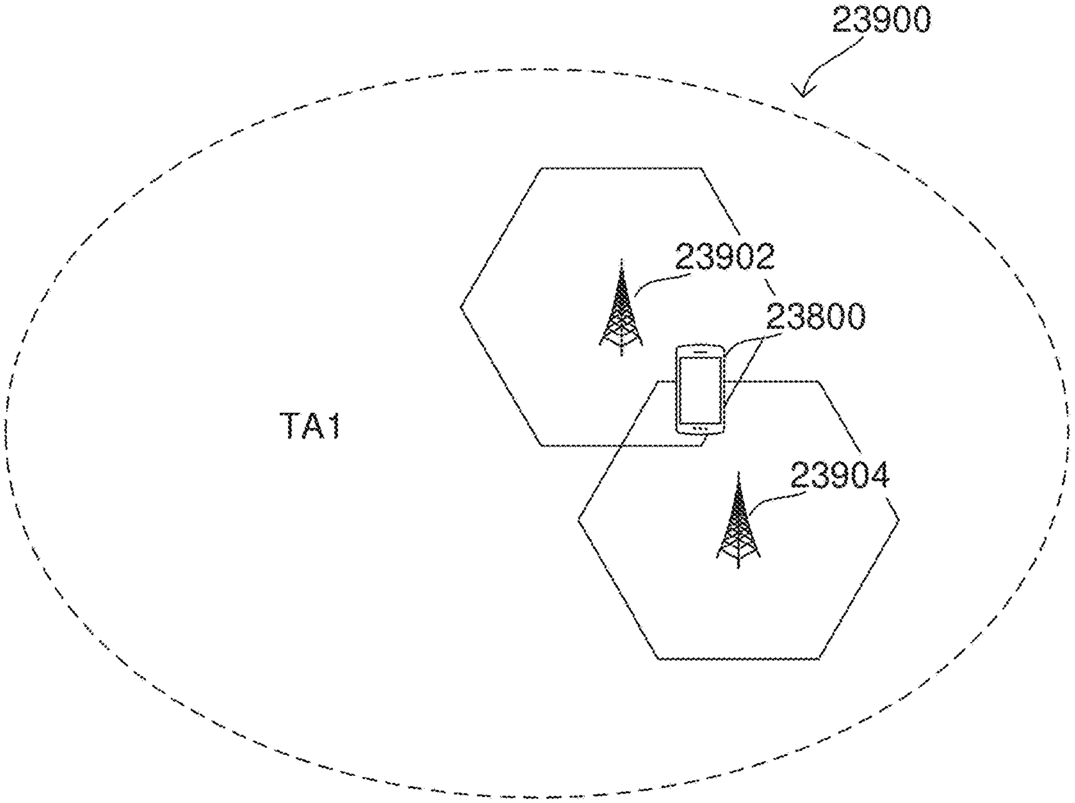
Figure 241B:
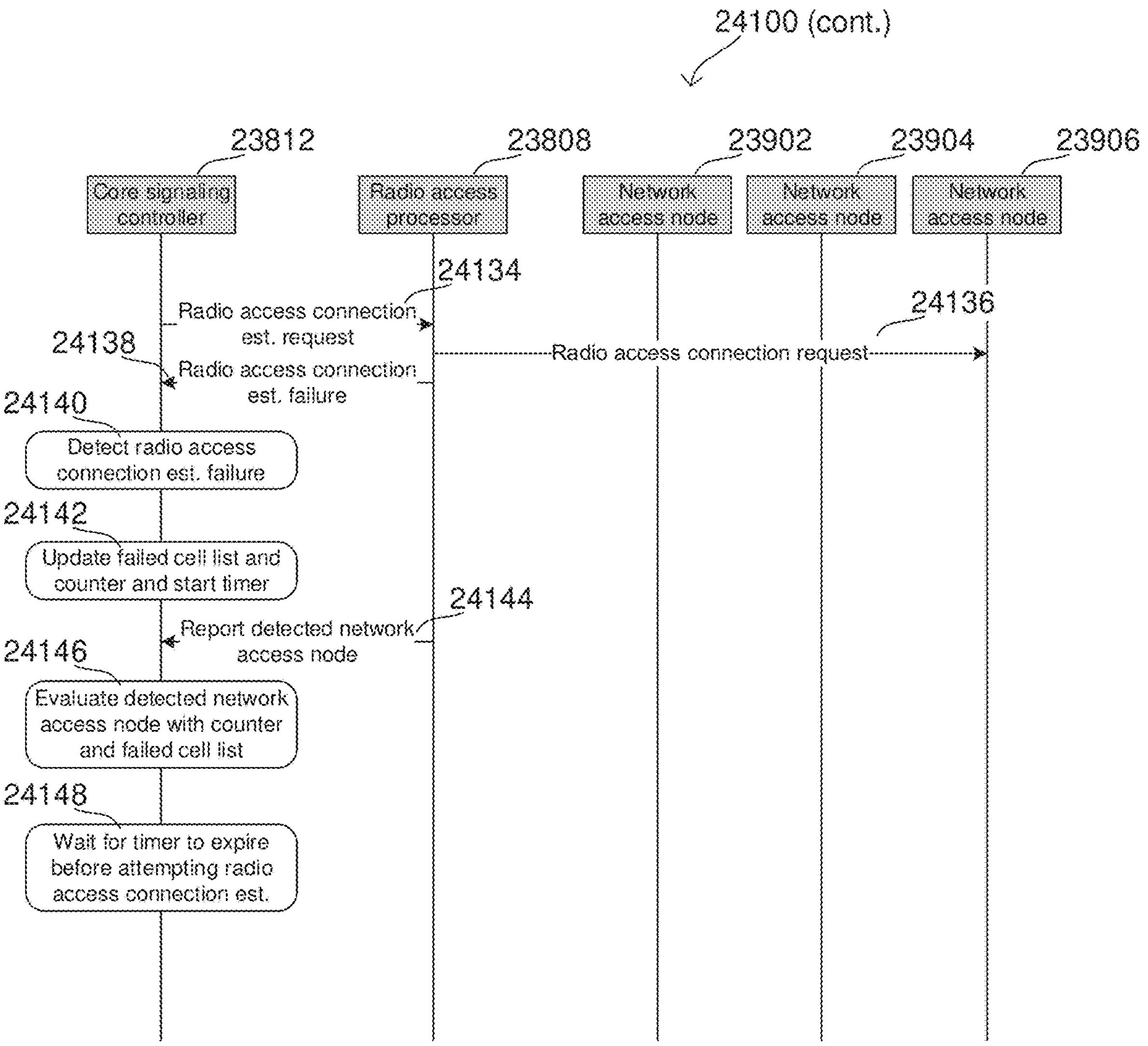
Figure 242:
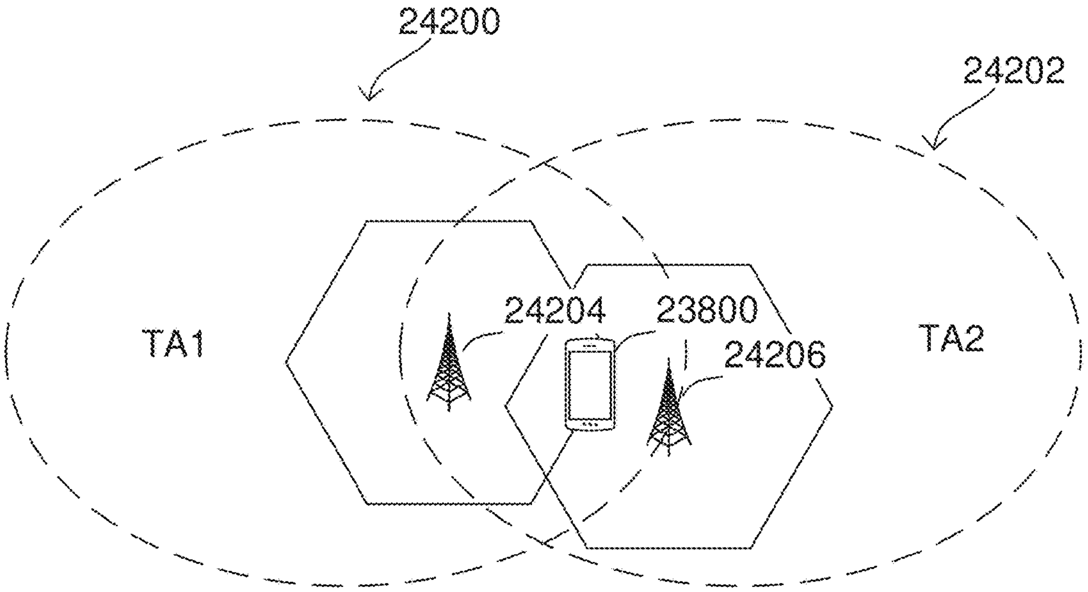
Figure 243:
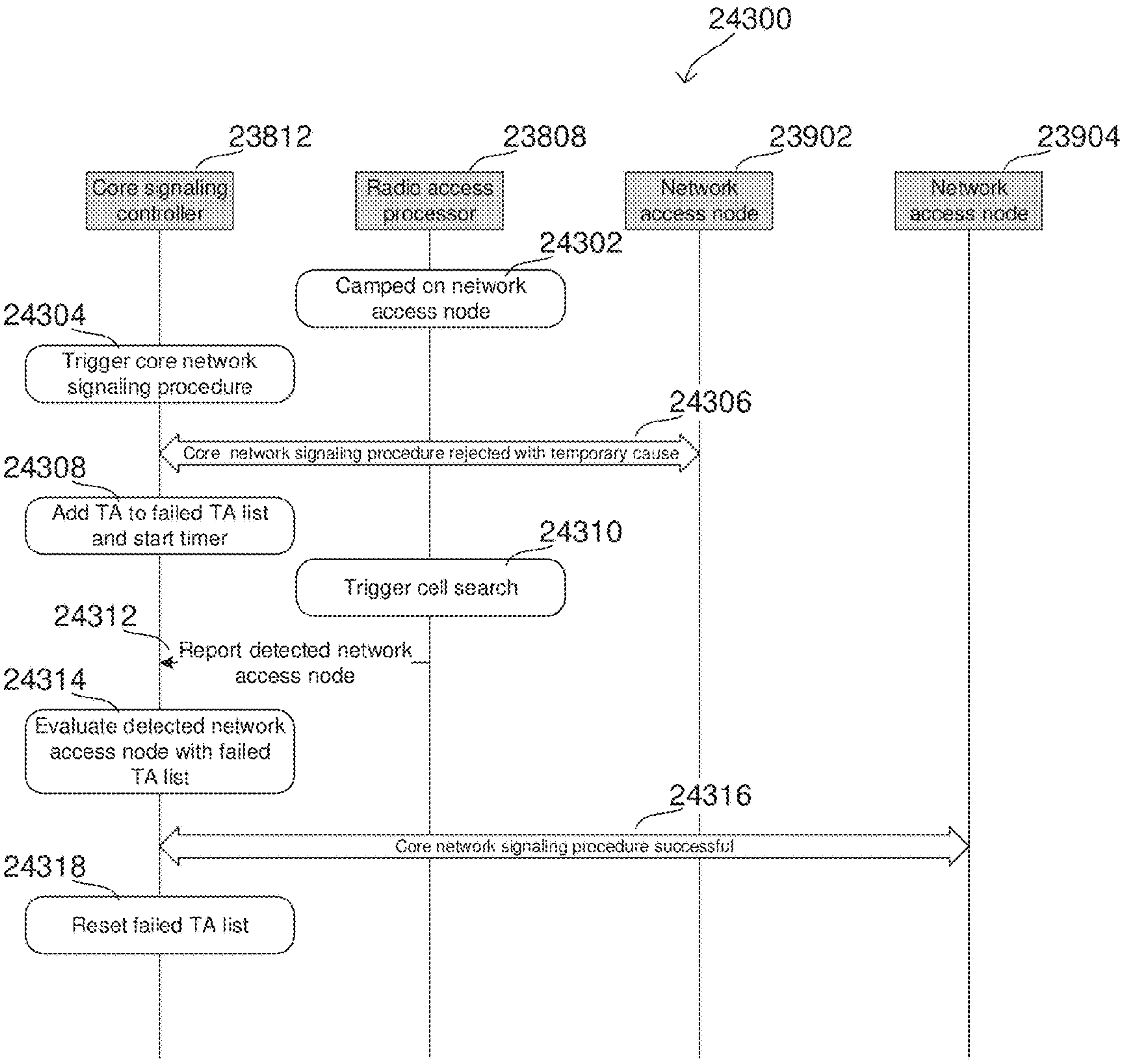
Figure 244:
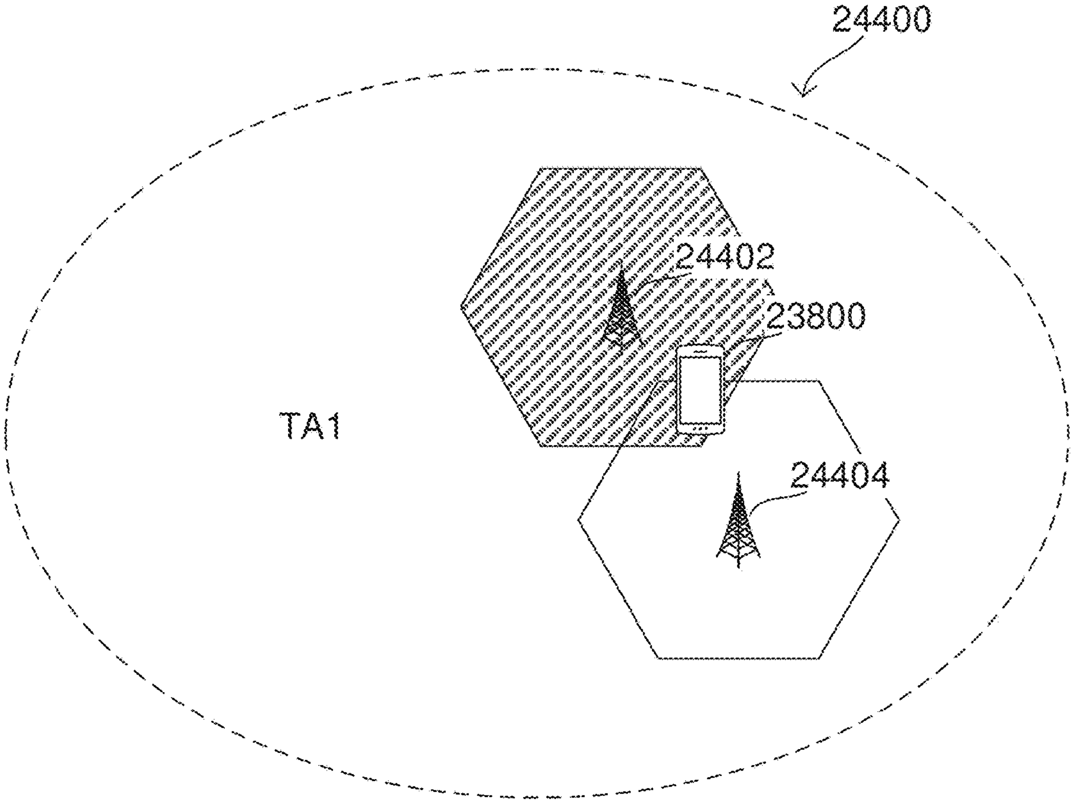
Figure 245:
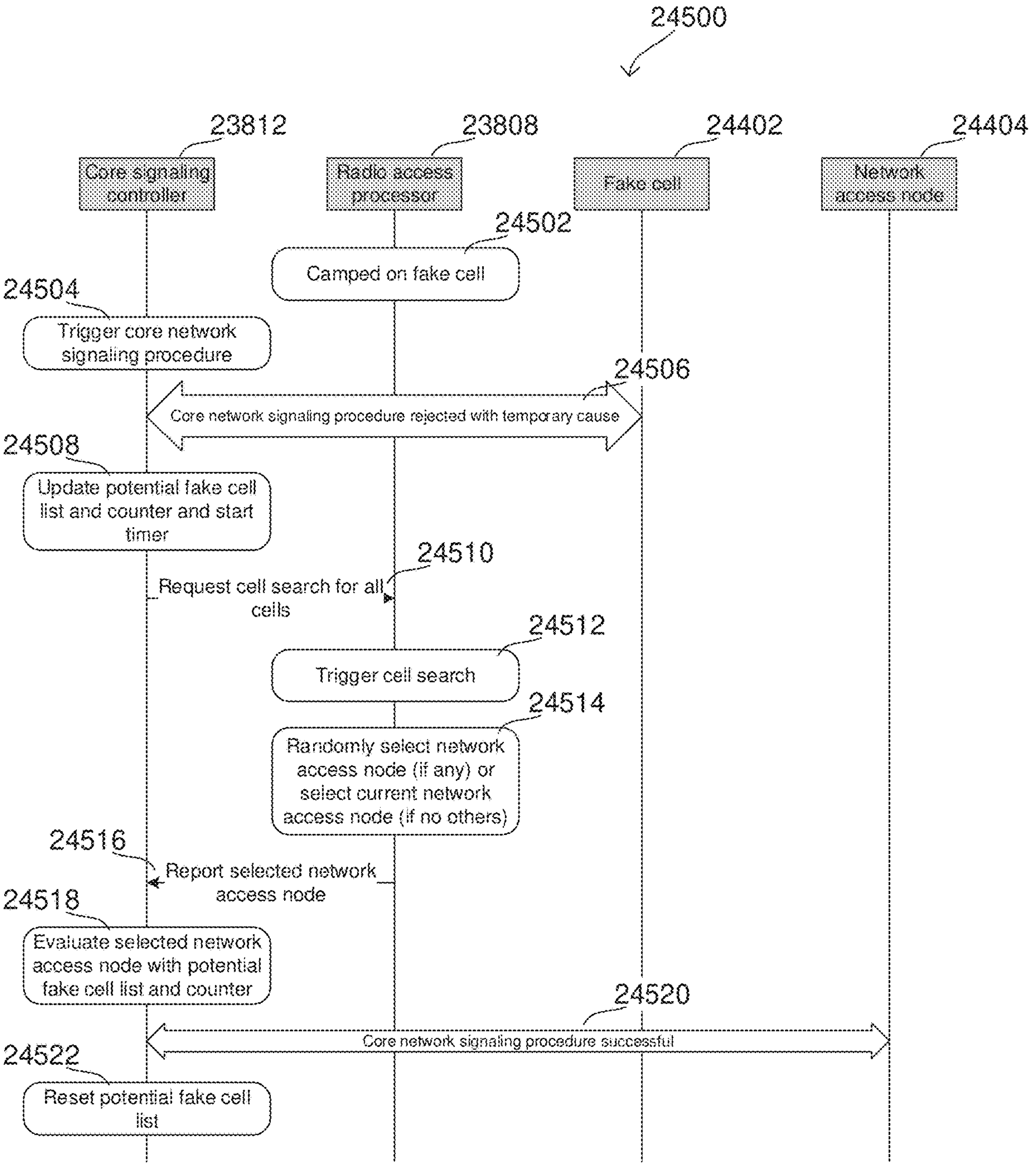
Figure 246:
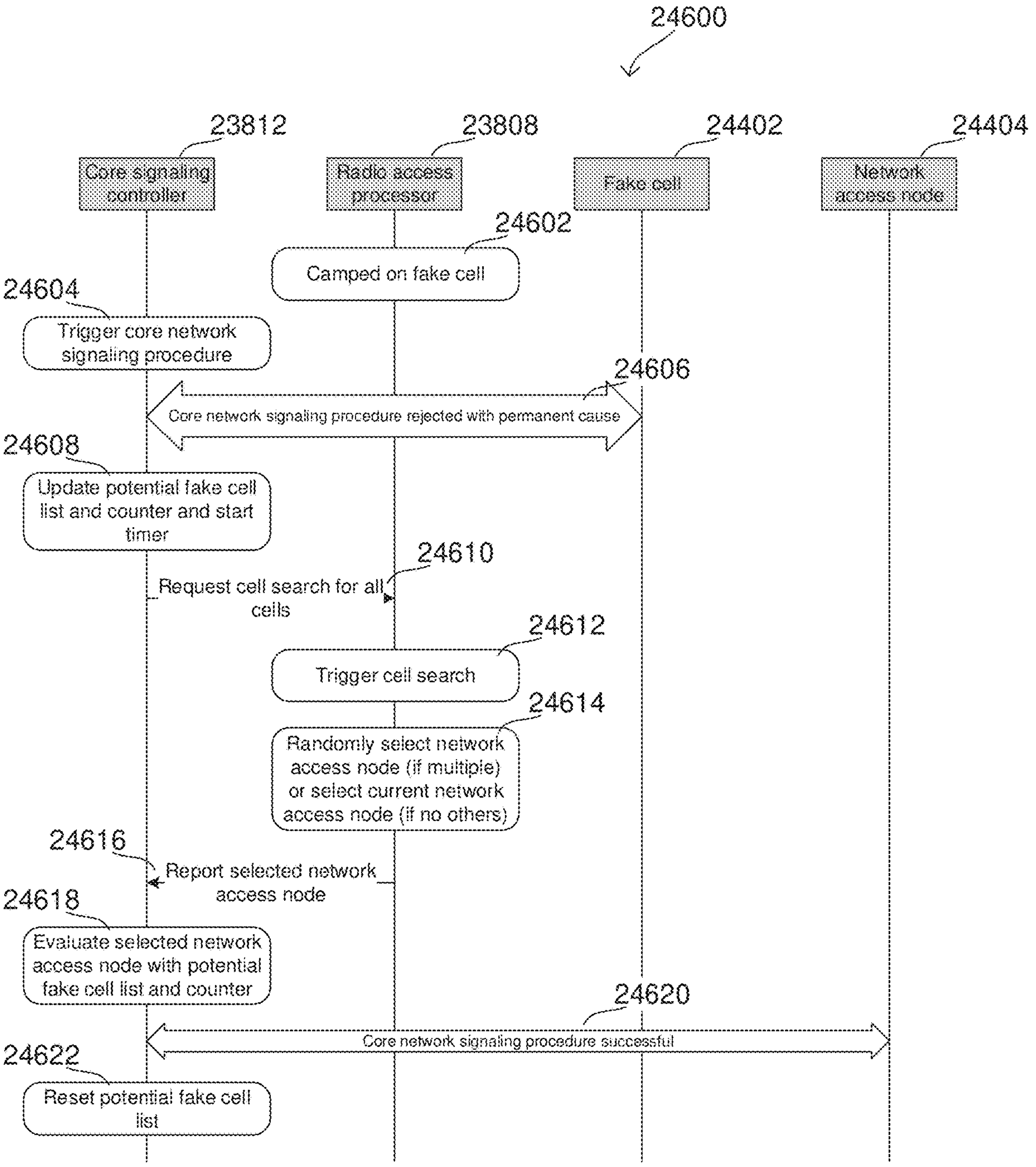
Figure 247:
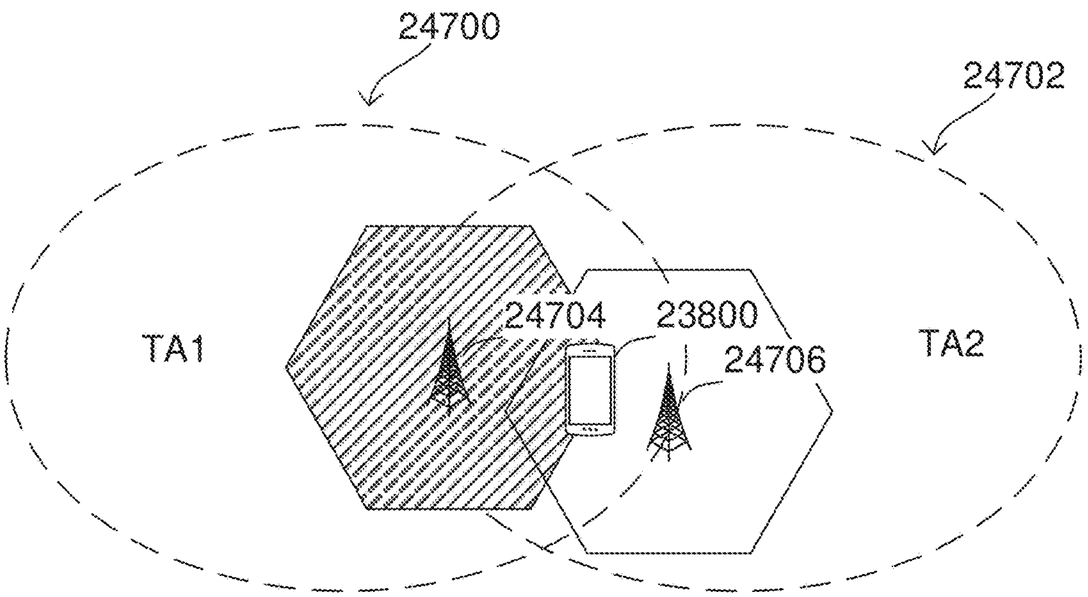
Figure 248:
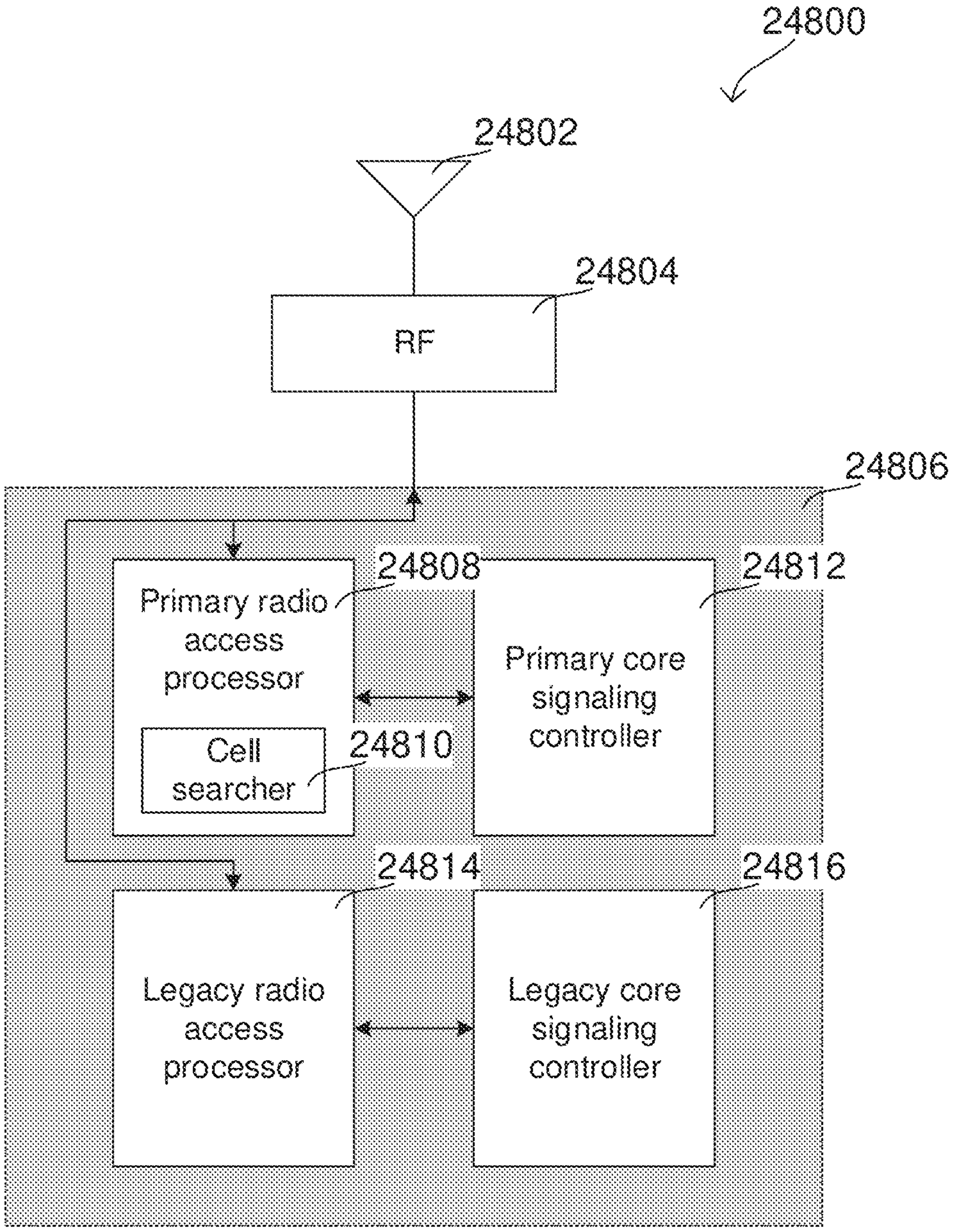
Figure 249:
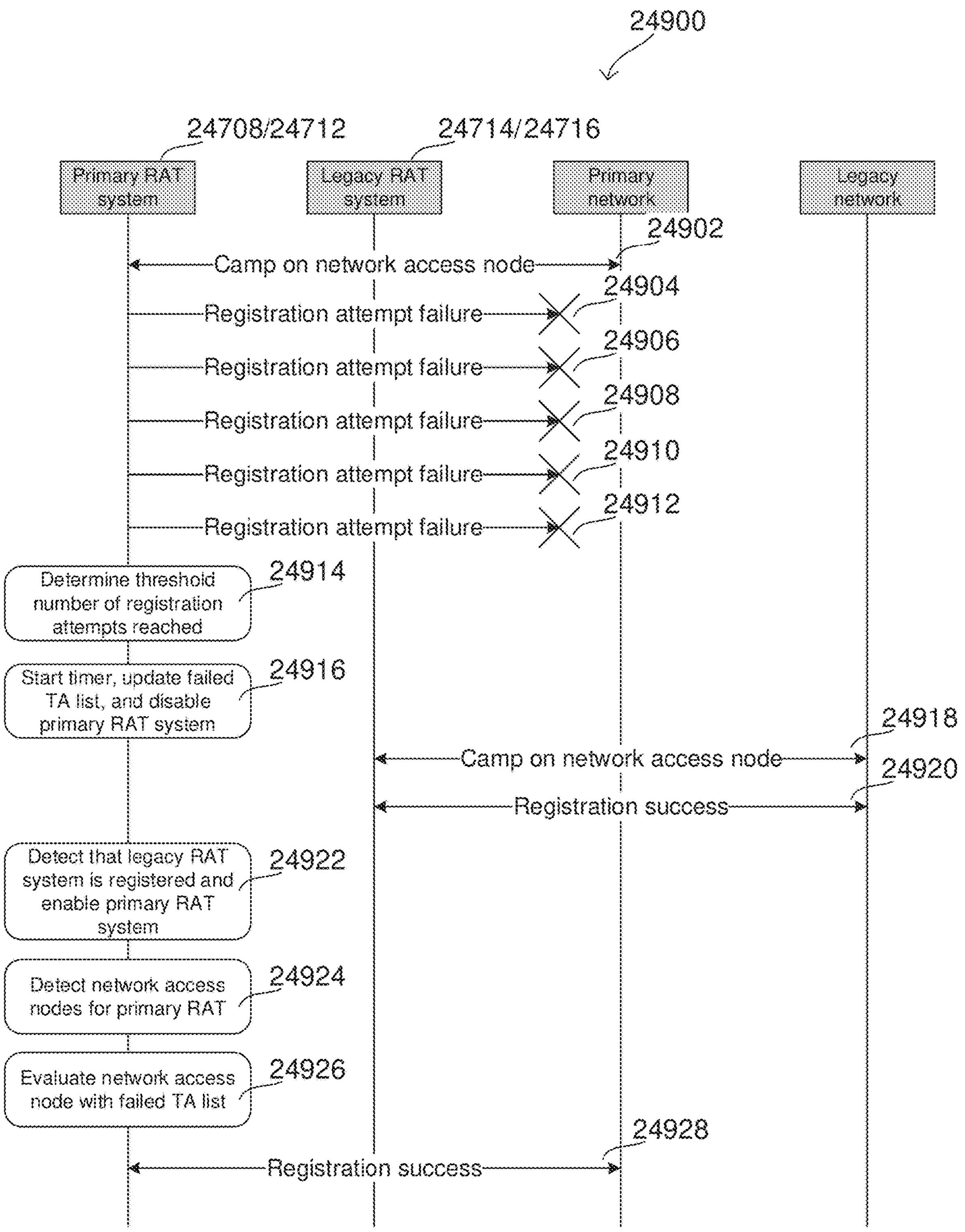
Figure 250A:
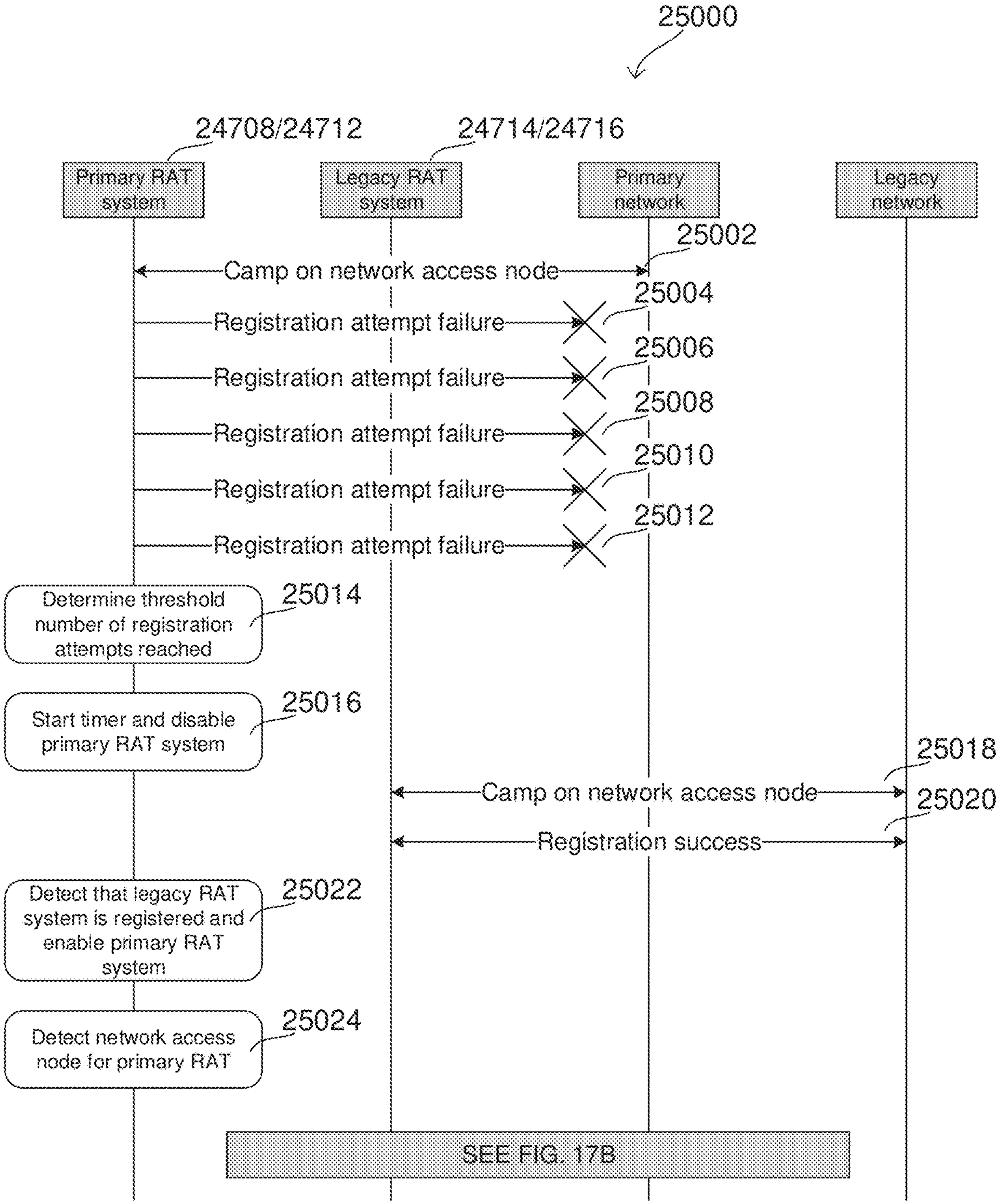
Figure 250B:
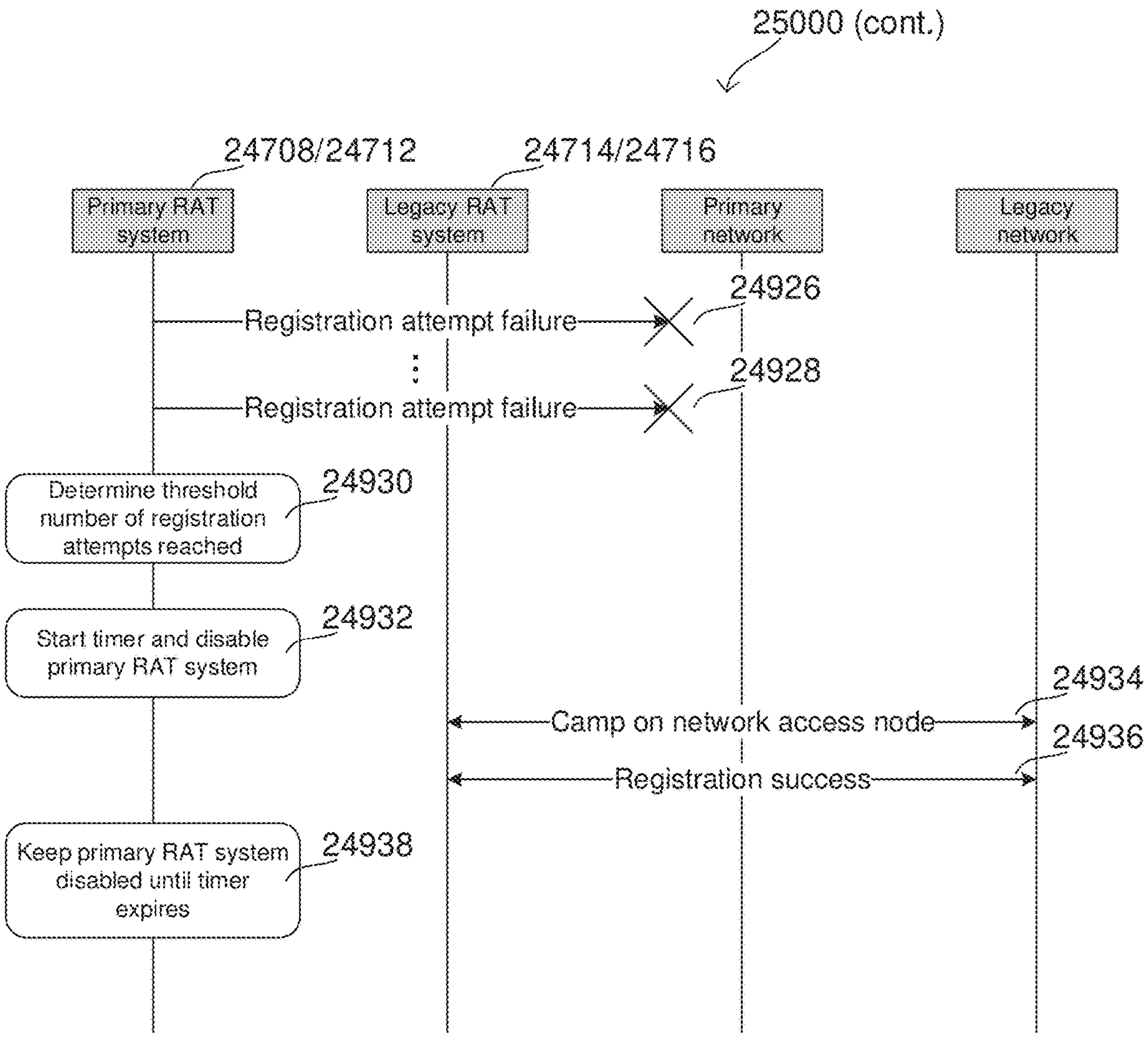
Figure 251:
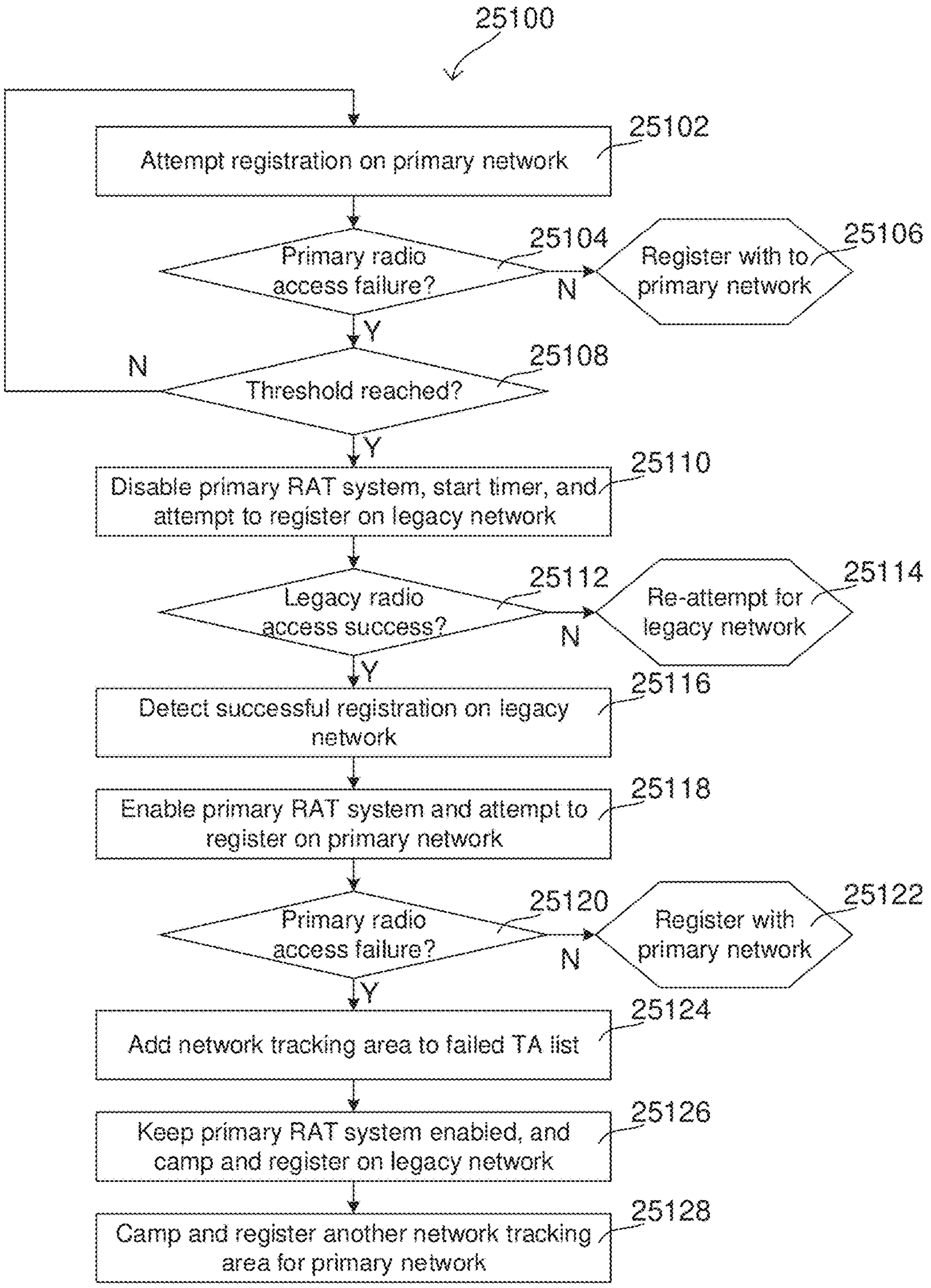
Figure 252:
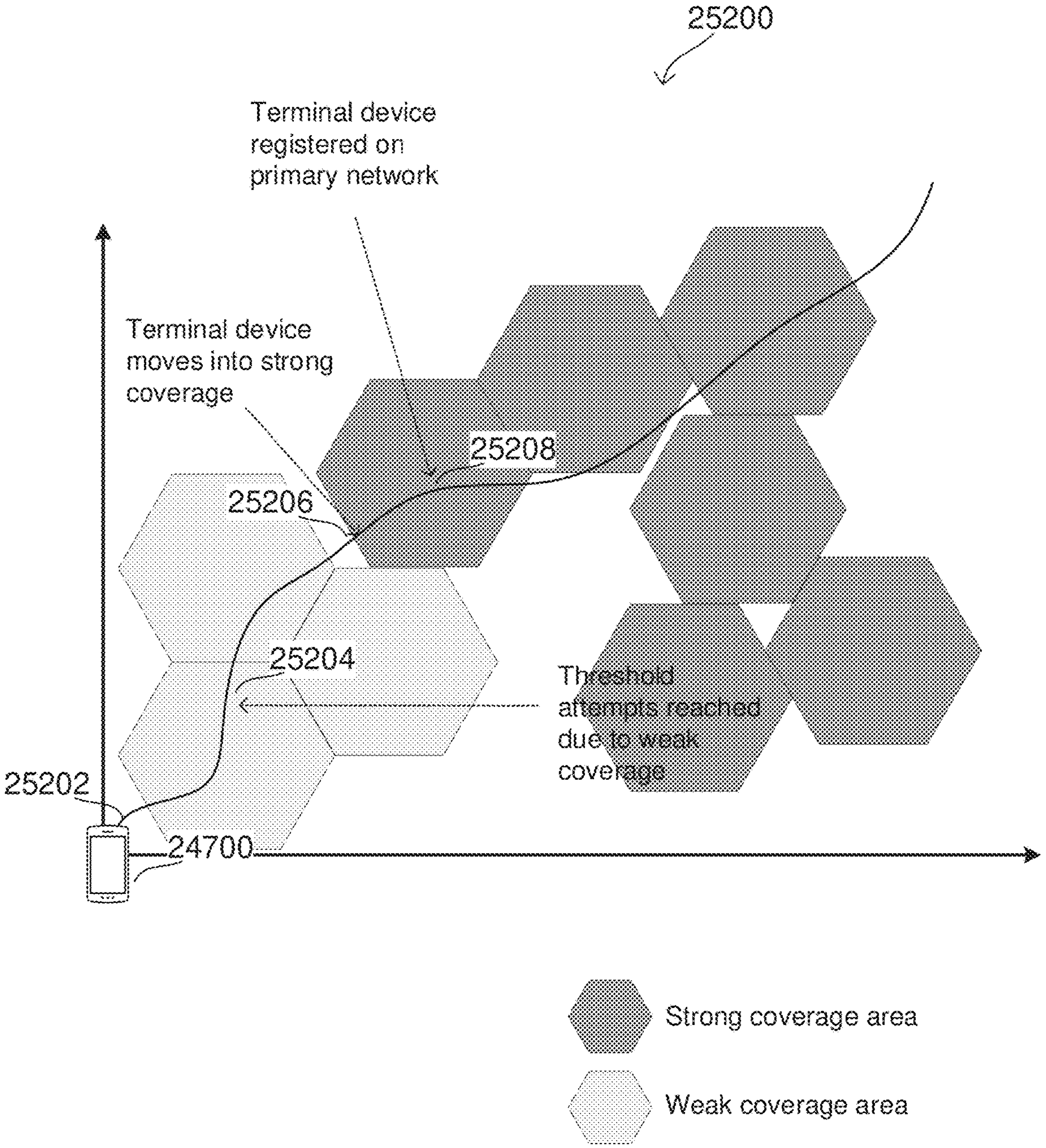
Figure 253:
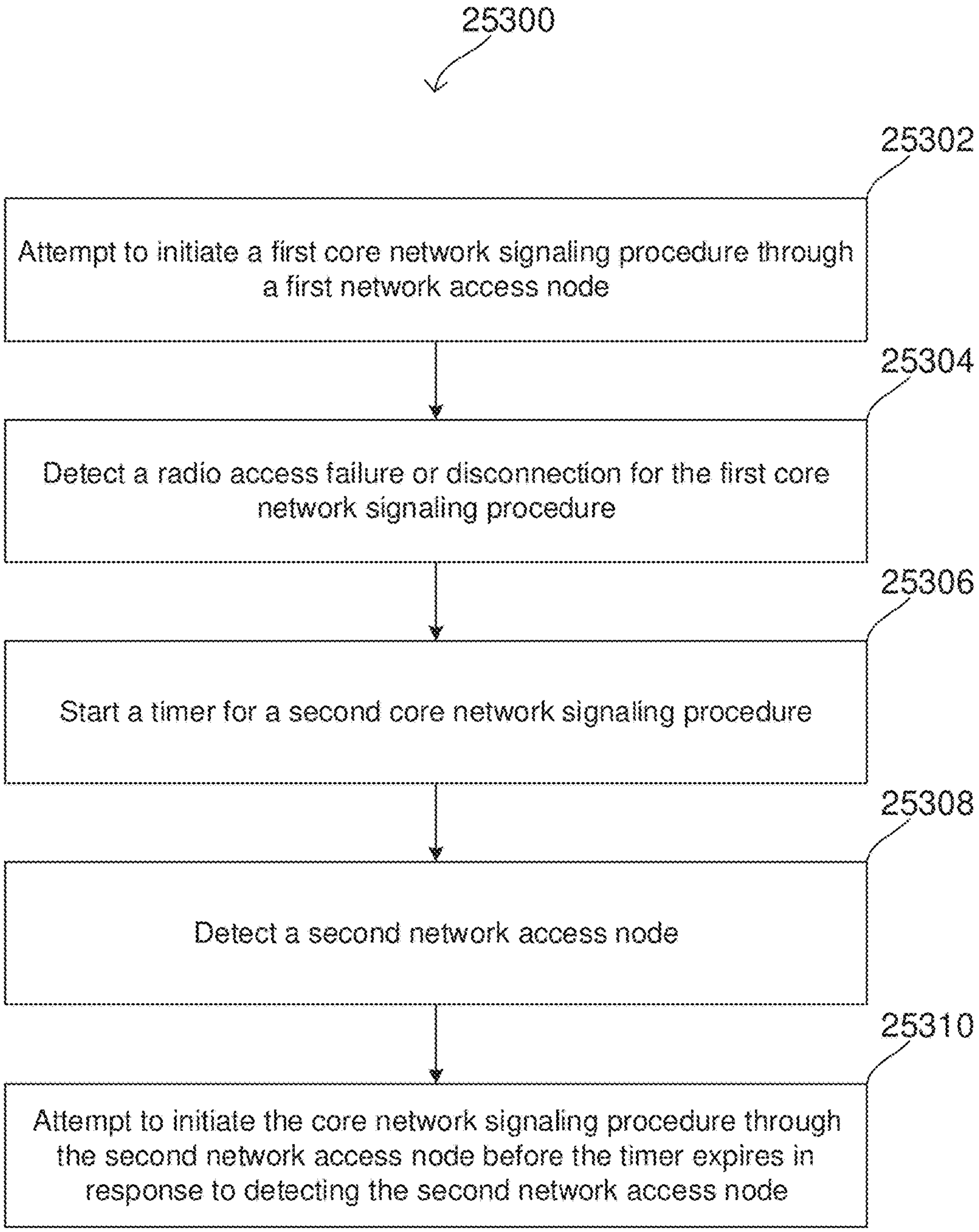
Figure 254:
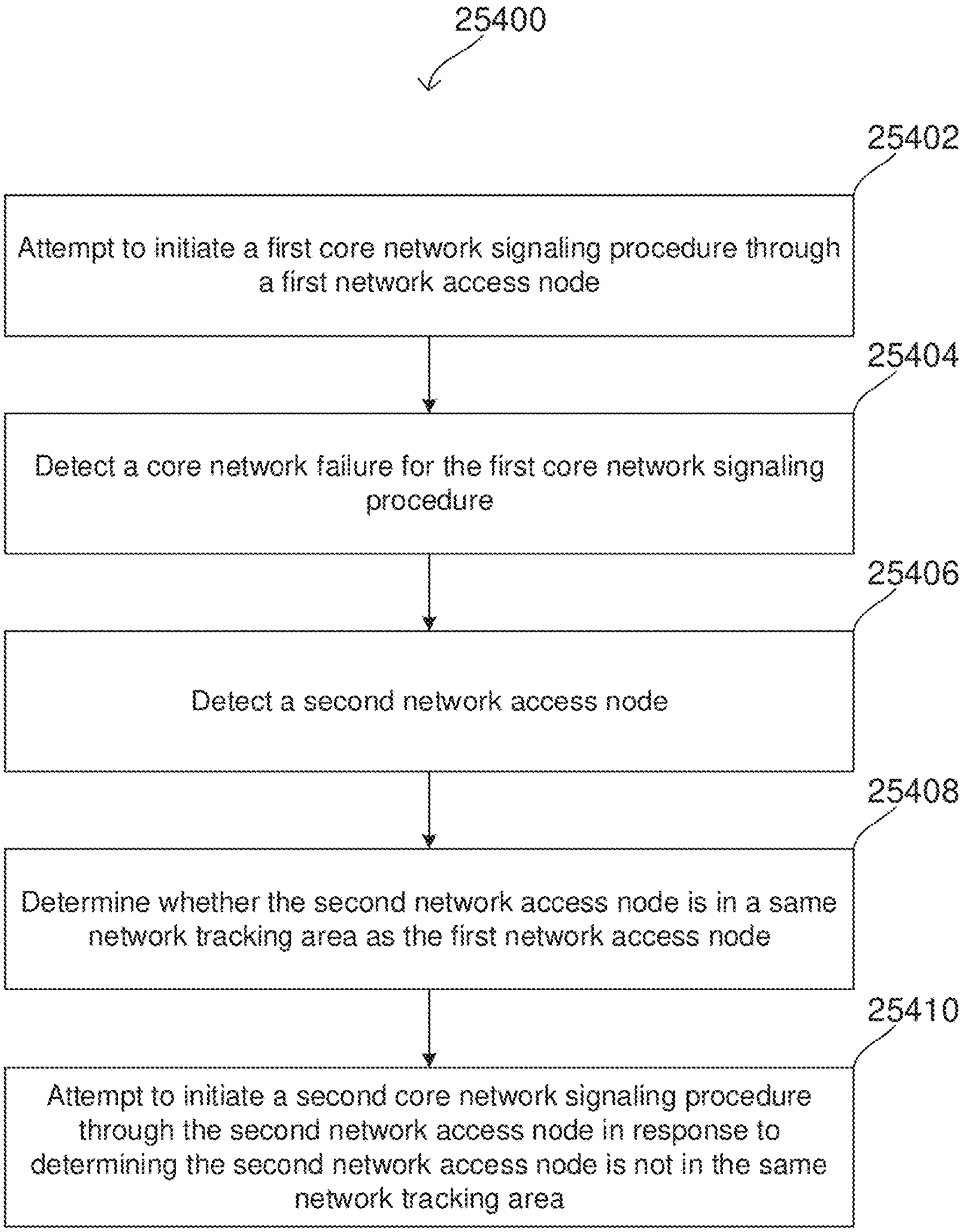
Figure 255:
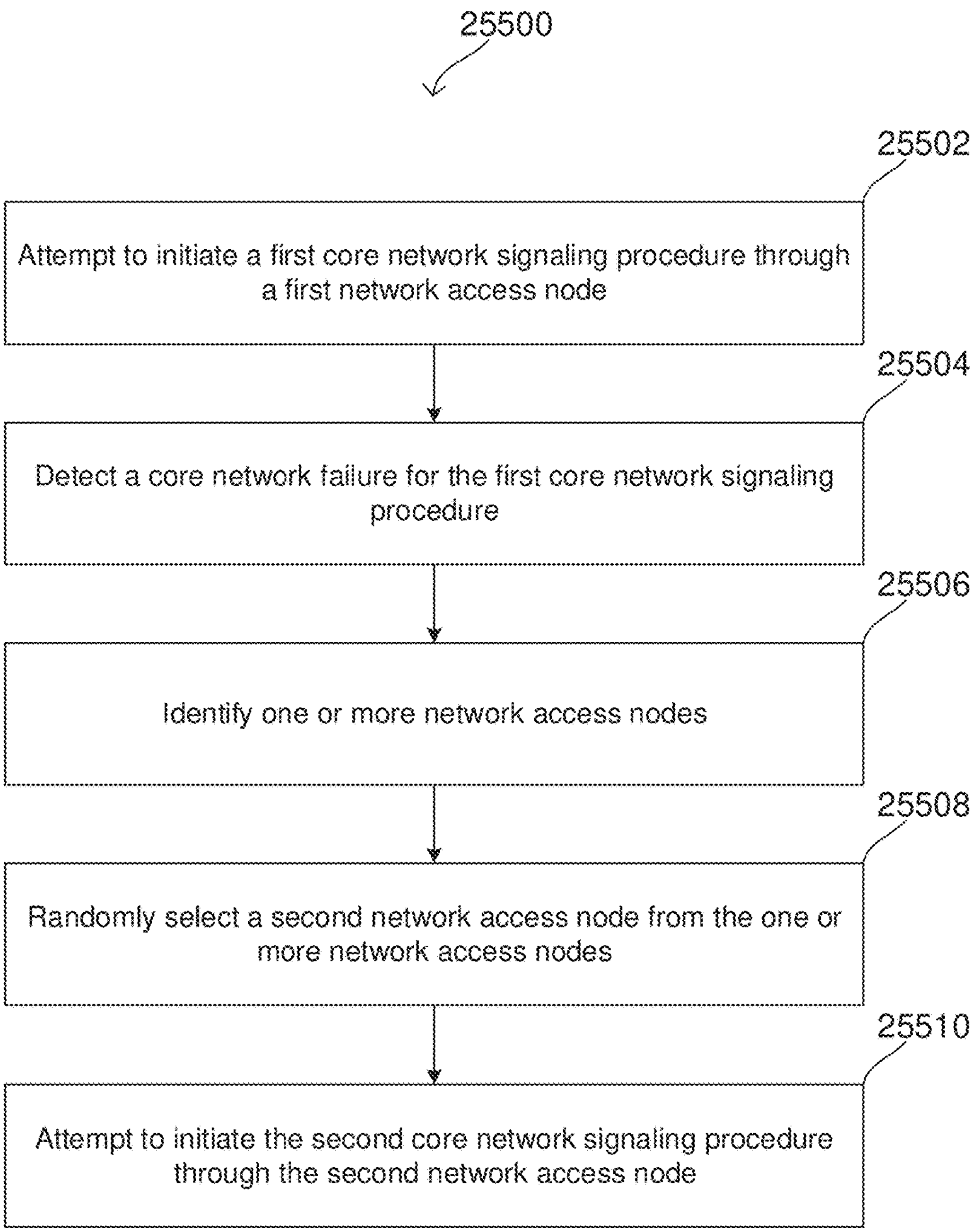
Figure 256:
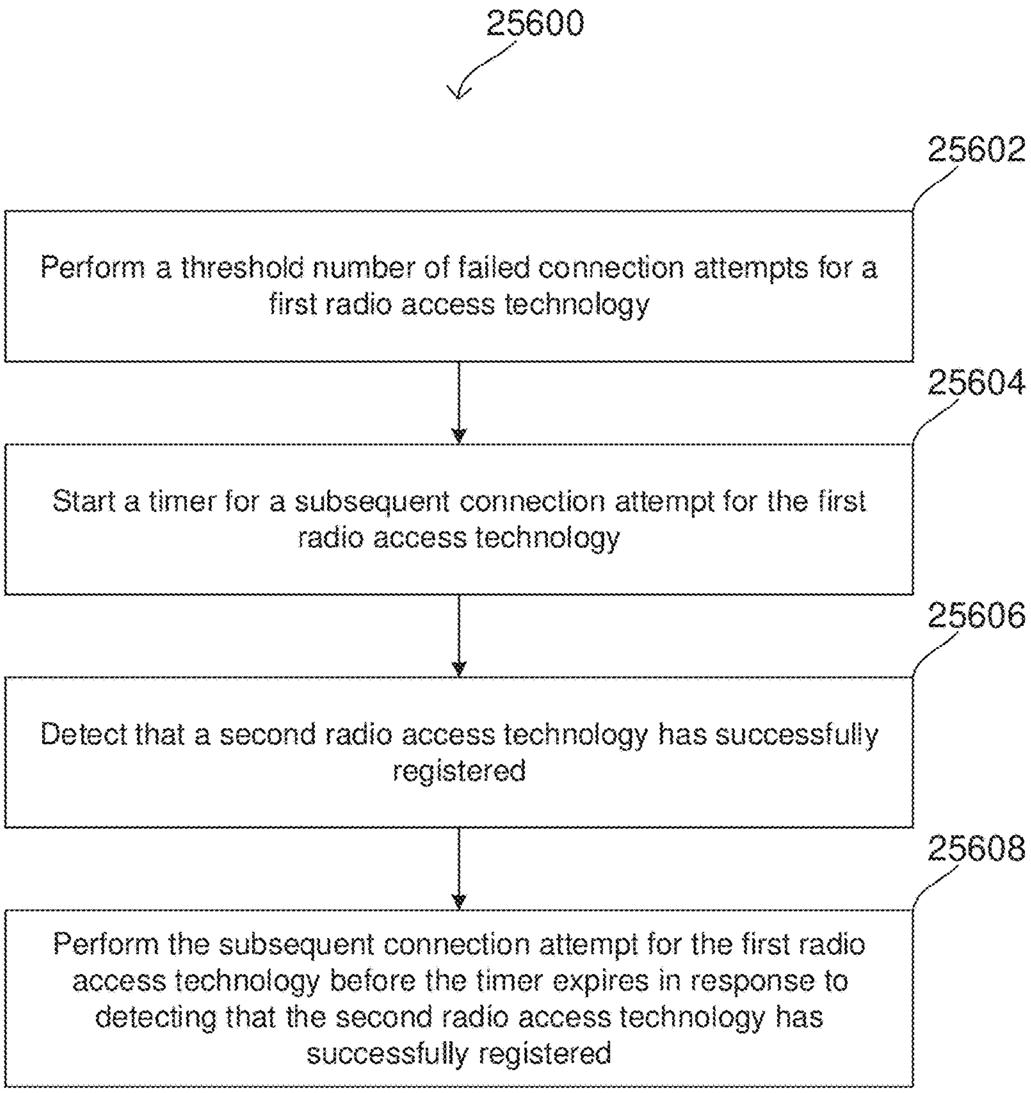

FIG. 213 shows an exemplary unmanned aerial vehicle according to some aspects;

FIG. 214 shows an exemplary unmanned aerial vehicle with a flight structure according to some aspects;

FIG. 215 shows an exemplary change in a target zone and target location according to some aspects;

FIG. 216 shows an exemplary change in a target zone and target location according to some aspects;

FIG. 217 shows an exemplary flight path according to some aspects;

FIG. 218 shows an exemplary flight path according to some aspects;

FIG. 219 shows an exemplary flight path according to some aspects;

FIG. 220 shows an exemplary method for flying on a flight path according to some aspects;

FIG. 221 shows an exemplary method for flying on a flight path according to some aspects;

FIG. 222 shows an exemplary flight formation according to some aspects;

FIG. 223 shows an exemplary flight formation according to some aspects;

FIG. 224 shows an exemplary flight formation according to some aspects;

FIG. 225 shows an exemplary method for arranging a flight formation according to some aspects;

FIG. 226 shows an exemplary relay for a network access node according to some aspects;

FIG. 227 shows an exemplary relay for a network access node according to some aspects;

FIG. 228 shows an exemplary method for controlling a relay for a network access node according to some aspects;

FIG. 229 shows an exemplary two-dimensional cell network according to some aspects;

FIG. 230 shows an exemplary three-dimensional cell network according to some aspects;

FIG. 231 shows an exemplary unmanned aerial vehicle according to some aspects;

FIG. 232 shows an exemplary flight path for charging an unmanned aerial vehicle according to some aspects;

FIG. 233 shows an exemplary method for charging an unmanned aerial vehicle according to some aspects;

FIG. 234 shows an exemplary structure for charging an unmanned aerial vehicle according to some aspects;

FIG. 235 shows an exemplary method for charging an unmanned aerial vehicle according to some aspects;

FIG. 236 shows an exemplary arrangement for charging an unmanned aerial vehicle according to some aspects;

FIG. 237 shows an exemplary method for charging an unmanned aerial vehicle according to some aspects;

FIG. 238 shows an exemplary internal configuration of a terminal device according to some aspects;

FIG. 239 shows an exemplary network scenario in a network tracking area according to some aspects;

FIG. 240 show a first exemplary message sequence chart involving a core network signaling procedure according to some aspects;

FIGS. 241A and 241B show a second exemplary message sequence chart involving a core network signaling procedure according to some aspects;

FIG. 242 shows an exemplary network scenario in multiple network tracking areas according to some aspects;

FIG. 243 shows an exemplary message sequence chart for a core network signaling procedure according to some aspects;

FIG. 244 shows an exemplary network scenario with a fake cell according to some aspects;

FIG. 245 shows an exemplary message sequence chart for a core network signaling procedure with a fake cell according to some aspects;

FIG. 246 shows an exemplary message sequence chart for a core network signaling procedure with a rejection according to some aspects;

FIG. 247 shows an exemplary network scenario in multiple tracking areas with a fake cell according to some aspects;

FIG. 248 shows an exemplary internal configuration of a terminal device according to some aspects;

FIG. 249 shows an exemplary message sequence chart for a failed registration attempt according to some aspects;

FIGS. 250A and 250B shows an exemplary message sequence chart for multiple failed registration attempts according to some aspects;

FIG. 251 shows an exemplary procedure for failed registration attempts according to some aspects;

FIG. 252 shows an exemplary diagram illustrating terminal device registration according to some aspects;

FIG. 253 shows a first exemplary method of operating a communication device according to some aspects;

FIG. 254 shows a first exemplary method of operating a communication device according to some aspects;

FIG. 255 shows a first exemplary method of operating a communication device according to some aspects; and FIG. 256 shows a first exemplary method of operating a communication device according to some aspects.

DESCRIPTION

The following detailed description refers to the accompanying drawings that show, by way of illustration, specific details and aspects of aspects in which the disclosure may be practiced.

The word "exemplary" is used herein to mean "serving as an example, instance, or illustration". Any aspect or design described herein as "exemplary" is not necessarily to be construed as preferred or advantageous over other aspects or designs.

The words "plurality" and "multiple" in the description or the claims expressly refer to a quantity greater than one. The terms "group (of)", "set [of]", "collection (of)", "series (of)", "sequence (of)", "grouping (of)", among others, and the like in the description or in the claims refer to a quantity equal to or greater than one, i.e. one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e. a subset of a set that contains less elements than the set.

Any vector and/or matrix notation utilized herein is exemplary in nature and is employed solely for purposes of explanation. Accordingly, aspects of this disclosure accompanied by vector and/or matrix notation are not limited to being implemented solely using vectors and/or matrices, and that the associated processes and computations may be equivalently performed with respect to sets, sequences, groups, among others, of data, observations, information, signals, samples, symbols, elements, among others.

As used herein, "memory" are understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Furthermore, registers, shift registers, processor registers, data buffers, among others, are also embraced herein by the term memory. A single component referred to as "memory" or "a memory" may be composed of more than one different type of memory, and thus may refer to a collective component comprising one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipments (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications. Without loss of generality, in some cases terminal devices can also include application-layer components, such as application processors or other general processing components, that are directed to functionality other than wireless communications. Terminal devices can optionally support wired communications in addition to wireless communications. Furthermore, terminal devices can include vehicular communication devices that function as terminal devices.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels. Furthermore, the term "cell" may be utilized to refer to any of a macrocell, microcell, femtocell, picocell, among others Certain communication devices can act as both terminal devices and network access nodes, such as a terminal device that provides network connectivity for other terminal devices.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. Various exemplary radio communication technologies that the aspects described herein may utilize include, but are not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, among others), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, among others), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (12V) communication technologies, 3GPP cellular V2X, DSRC (Dedicated Short Range Communications) communication systems such as Intelligent-Transport-Systems and others, the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), among others. Aspects described herein can be used in the context of any spectrum management scheme including dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (e.g., allocated for example in US (FCC Part 15)), 863-868.6 MHz (e.g., allocated for example in European Union (ETSI EN 300 220)), 915.9-929.7 MHz (e.g., allocated for example in Japan), 917-923.5 MHz (e.g., allocated for example in South Korea), 755-779 MHz and 779-787 MHz (e.g., allocated for example in China), 790-960 MHz, 1710-2025 MHz, 2110-2200 MHz, 2300-2400 MHz, 2.4-2.4835 GHz (e.g., it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3.55-3.7 GHz (e.g., allocated for example in the US for Citizen Broadband Radio Service), 5.15-5.25 GHz and 5.25-5.35 GHz and 5.47-5.725 GHz and 5.725-5.85 GHz bands (e.g., allocated for example in the US (FCC part 15), consists four U-NII bands in total 500 MHz spectrum), 5.725-5.875 GHz (e.g., allocated for example in EU (ETSI EN 301 893)), 5.47-5.65 GHz (e.g., allocated for example in South Korea, 5925-7125 MHz and 5925-6425 MHz band (e.g., under consideration in US and EU, respectively, where next generation Wi-Fi system may also include the 6 GHz spectrum as operating band), IMT-advanced spectrum, IMT-2020 spectrum (expected to include 3600-3800 MHz, 3.5 GHz bands, 700 MHz bands, bands within the 24.25-86 GHz range, among others), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, among others), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (e.g., where this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, among others applications.

Aspects described herein can also implement a hierarchical application of the scheme is possible, e.g. by introducing a hierarchical prioritization of usage for different types of users (e.g., low/medium/high priority, among others), based on a prioritized access to the spectrum e.g. with highest priority to tier-1 users, followed by tier-2, then tier-3, and so forth users. Aspects described herein can also be applied to different Single Carrier or OFDM flavors (CP-OFDM, SC-FDMA, SC-OFDM, filter bank-based multicarrier (FBMC), OFDMA, among others) and in particular 3GPP NR (New Radio) by allocating the OFDM carrier data bit vectors to the corresponding symbol resources.]. Some of the features in this disclosure are defined for the network side, such as Access Points, eNodeBs, among others In some cases, a User Equipment (UE) may also take this role and act as an Access Points, eNodeBs, or the like. some or all features defined for network equipment may be implemented by a UE.

For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax) (e.g., according to an IEEE 802.16 radio communication standard, e.g., WiMax fixed or WiMax mobile), for example, and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

The terms "radio communication network" and "wireless network" as utilized herein encompasses both an access section of a network (e.g., a radio access network (RAN) section) and a core section of a network (e.g., a core network section). The term "radio idle mode" or "radio idle state" used herein in reference to a terminal device refers to a radio control state in which the terminal device is not allocated at least one dedicated communication channel of a mobile communication network. The term "radio connected mode" or "radio connected state" used in reference to a terminal device refers to a radio control state in which the terminal device is allocated at least one dedicated uplink communication channel of a radio communication network.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup or hash tables and other array indexing or searching operations.

General Network and Device Description

Figure 1:
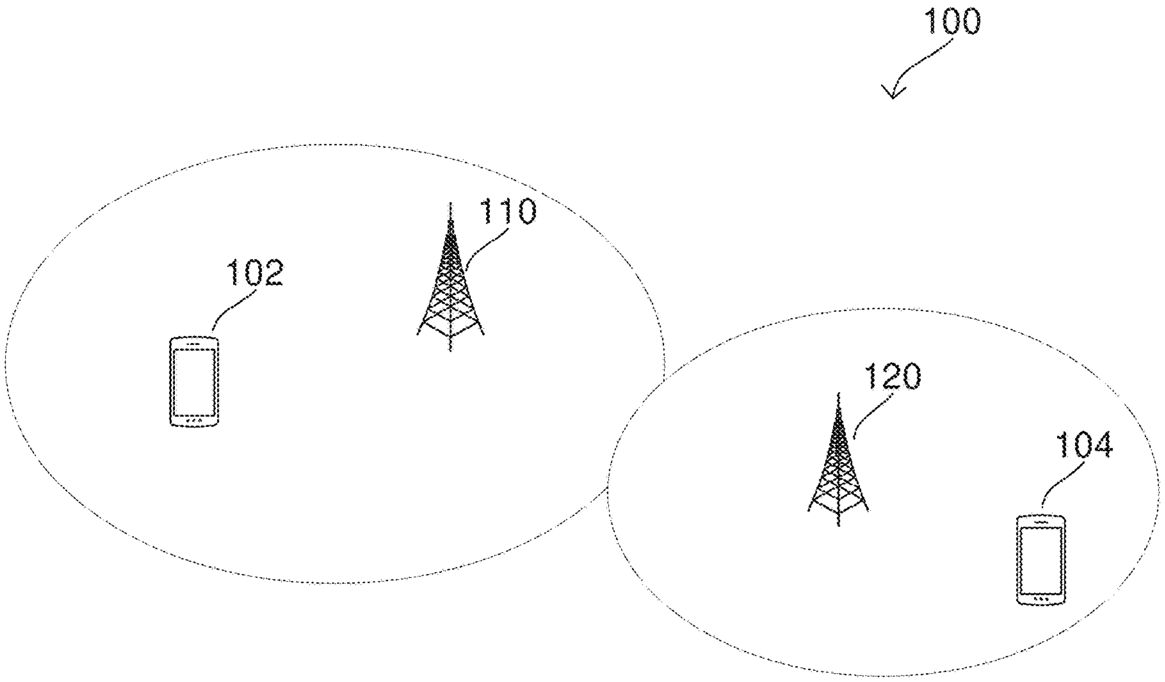
FIG. 1 shows an exemplary radio communication network according to some aspects.
Figure 2:
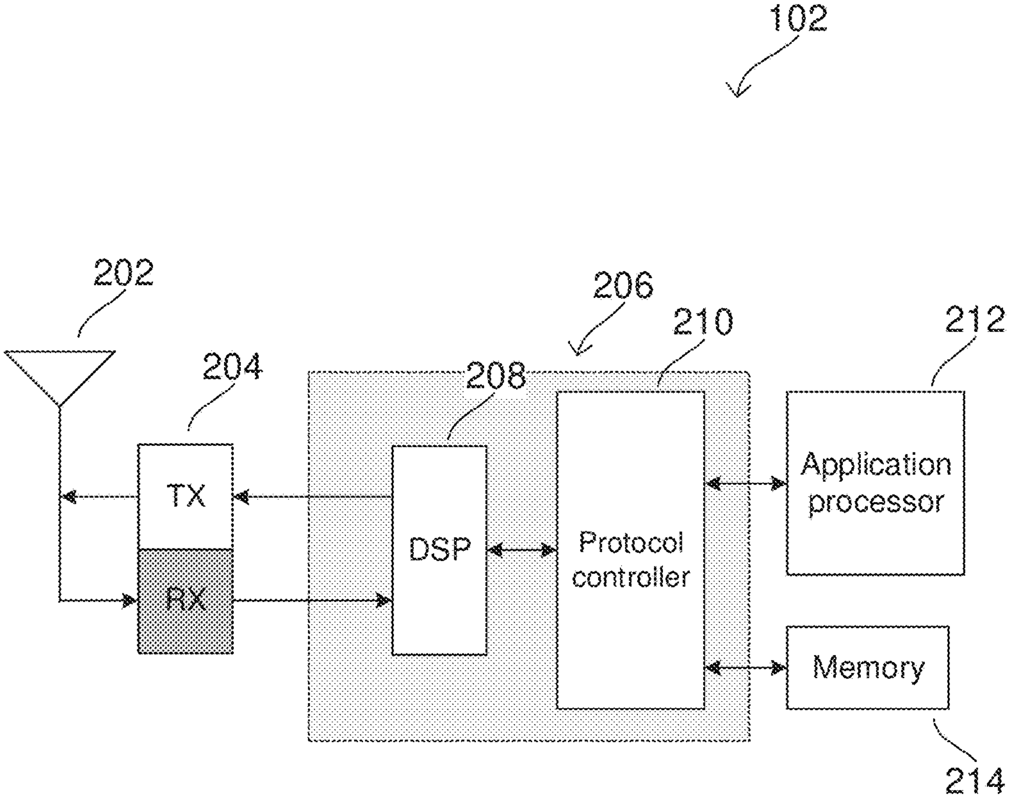
FIG. 2 shows an exemplary internal configuration of a terminal device according to some aspects.

FIGS. 1 and 2 depict an exemplary network and device architecture for wireless communications. In particular, FIG. 1 shows exemplary radio communication network 100 according to some aspects, which may include terminal devices 102 and 104 and network access nodes 110 and 102. Radio communication network 100 may communicate with terminal devices 102 and 104 via network access nodes 110 and 102 over a radio access network. Although certain examples described herein may refer to a particular radio access network context (e.g., LTE, UMTS, GSM, other 3rd Generation Partnership Project (3GPP) networks, WLAN/WiFi, Bluetooth, 5G, mmWave, etc.), these examples are demonstrative and may therefore be readily applied to any other type or configuration of radio access network. The number of network access nodes and terminal devices in radio communication network 100 is exemplary and is scalable to any amount.

In an exemplary cellular context, network access nodes 110 and 102 may be base stations (e.g., eNodeBs, NodeBs, Base Transceiver Stations (BTSs), or any other type of base station), while terminal devices 102 and 104 may be cellular terminal devices (e.g., Mobile Stations (MSs), User Equipments (UEs), or any type of cellular terminal device). Network access nodes 110 and 102 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 102 may be access points (APs, e.g., WLAN or WiFi APs), while terminal device 102 and 104 may be short range terminal devices (e.g., stations (STAs)). Network access nodes 110 and 102 may interface (e.g., via an internal or external router) with one or more external data networks.

Network access nodes 110 and 102 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 102 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 102 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable, such as for a cellular context) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 102 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, WiFi, mmWave, etc., any of which may be applicable to radio communication network 100.

FIG. 2 shows an internal configuration of terminal device 102 according to some aspects, which may include antenna system 202, radio frequency (RF) transceiver 204, baseband modem 206 (including digital signal processor 208 and protocol controller 210), application processor 212, and memory 214. Although not explicitly shown in FIG. 2, in some aspects terminal device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 102 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 102 shown in FIG. 2 depicts only a single instance of such components.

Terminal device 102 may transmit and receive wireless signals with antenna system 202, which may be a single antenna or an antenna array that includes multiple antennas. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of terminal device 102 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 210 may be structurally embodied as a processor configured to execute protocol stack software (retrieved from a controller memory) and subsequently control the radio communication components of terminal device 102 to transmit and receive communication signals in accordance with the corresponding protocol stack control logic defined in the protocol stack software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

In some aspects, terminal device 102 may be configured to transmit and receive data according to multiple radio communication technologies. Accordingly, in some aspects one or more of antenna system 202, RF transceiver 204, digital signal processor 208, and protocol controller 210 may include separate components or instances dedicated to different radio communication technologies and/or unified components that are shared between different radio communication technologies. For example, in some aspects protocol controller 210 may be configured to execute multiple protocol stacks, each dedicated to a different radio communication technology and either at the same processor or different processors. In some aspects, digital signal processor 208 may include separate processors and/or hardware accelerators that are dedicated to different respective radio communication technologies, and/or one or more processors and/or hardware accelerators that are shared between multiple radio communication technologies. In some aspects, RF transceiver 204 may include separate RF circuitry sections dedicated to different respective radio communication technologies, and/or RF circuitry sections shared between multiple radio communication technologies. In some aspects, antenna system 202 may include separate antennas dedicated to different respective radio communication technologies, and/or antennas shared between multiple radio communication technologies. Accordingly, while antenna system 202, RF transceiver 204, digital signal processor 208, and protocol controller 210 are shown as individual components in FI, in some aspects antenna system 202, RF transceiver 204, digital signal processor 208, and/or protocol controller 210 can encompass separate components dedicated to different radio communication technologies.

Terminal device 102 may also include application processor 212 and memory 214. Application processor 212 may be a CPU, and may be configured to handle the layers above the protocol stack, including the transport and application layers. Application processor 212 may be configured to execute various applications and/or programs of terminal device 102 at an application layer of terminal device 102, such as an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may embody a memory component of terminal device 102, such as a hard drive or another such permanent memory device. Although not explicitly depicted in FIG. 2, the various other components of terminal device 102 shown in FIG. 2 may additionally each include integrated permanent and non-permanent and/or volatile & non-volatile memory components, such as for storing software program code, buffering data, etc.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select between the available network access nodes in order to maintain a strong radio access connection with the radio access network of radio communication network 100. For example, terminal device 102 may establish a radio access connection with network access node 110 while terminal device 104 may establish a radio access connection with network access node 112. In the event that the current radio access connection degrades, terminal devices 102 or 104 may seek a new radio access connection with another network access node of radio communication network 100; for example, terminal device 104 may move from the coverage area of network access node 112 into the coverage area of network access node 110. As a result, the radio access connection with network access node 112 may degrade, which terminal device 104 may detect via radio measurements such as signal strength, signal quality, or error rate-related measurements of network access node 112. Depending on the mobility procedures defined in the appropriate network protocols for radio communication network 100, terminal device 104 may seek a new radio access connection (which may be, for example, triggered at terminal device 104 or by the radio access network), such as by performing radio measurements on neighboring network access nodes to determine whether any neighboring network access nodes can provide a suitable radio access connection. As terminal device 104 may have moved into the coverage area of network access node 110, terminal device 104 may identify network access node 110 (which may be selected by terminal device 104 or selected by the radio access network) and transfer to a new radio access connection with network access node 110. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

Figure 3:
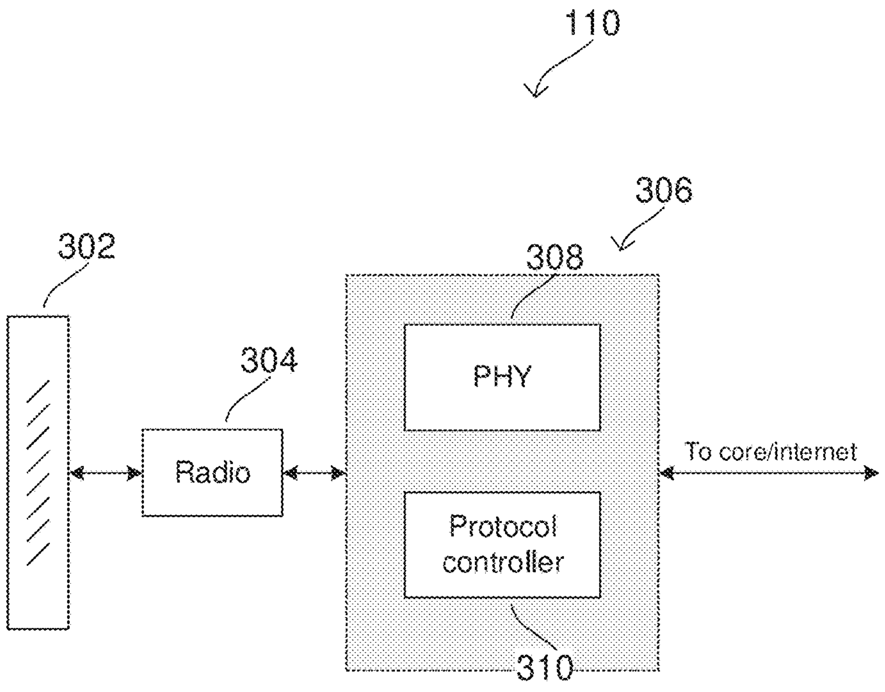
FIG. 3 shows an exemplary internal configuration of a network access node according to some aspects.

FIG. 3 shows an exemplary internal configuration of a network access node, such as network access node 110, according to some aspects. As shown in FIG. 3, network access node 110 may include antenna system 302, radio transceiver 304, and baseband subsystem 306 (including physical layer processor 308 and protocol controller 310). In an abridged overview of the operation of network access node 110, network access node 110 may transmit and receive wireless signals via antenna system 302, which may be an antenna array including multiple antennas. Radio transceiver 304 may perform transmit and receive RF processing to convert outgoing baseband samples from baseband subsystem 306 into analog radio signals to provide to antenna system 302 for radio transmission and to convert incoming analog radio signals received from antenna system 302 into baseband samples to provide to baseband subsystem 306. Physical layer processor 308 may be configured to perform transmit and receive PHY processing on baseband samples received from radio transceiver 304 to provide to controller 310 and on baseband samples received from controller 310 to provide to radio transceiver 304. Controller 310 may control the communication functionality of network access node 110 according to the corresponding radio communication technology protocols, which may include exercising control over antenna system 302, radio transceiver 304, and physical layer processor 308. Each of radio transceiver 304, physical layer processor 308, and controller 310 may be structurally realized with hardware (e.g., with one or more digitally-configured hardware circuits or FPGAs), as software (e.g., as one or more processors executing program code defining arithmetic, control, and I/O instructions stored in a non-transitory computer-readable storage medium), or as a mixed combination of hardware and software. In some aspects, radio transceiver 304 may be a radio transceiver including digital and analog radio frequency processing and amplification circuitry. In some aspects, radio transceiver 304 may be a software-defined radio (SDR) component implemented as a processor configured to execute software-defined instructions that specify radio frequency processing routines. In some aspects, physical layer processor 308 may include a processor and one or more hardware accelerators, wherein the processor is configured to control physical layer processing and offload certain processing tasks to the one or more hardware accelerators. In some aspects, controller 310 may be a controller configured to execute software-defined instructions that specify upper-layer control functions. In some aspects, controller 310 may be limited to radio communication protocol stack layer functions, while in other aspects controller 310 may also be configured for transport, internet, and application layer functions.

Network access node 110 may thus provide the functionality of network access nodes in radio communication networks by providing a radio access network to enable served terminal devices to access communication data. For example, network access node 110 may also interface with a core network, one or more other network access nodes, or various other data networks and servers via a wired or wireless backhaul interface.

Figure 4:
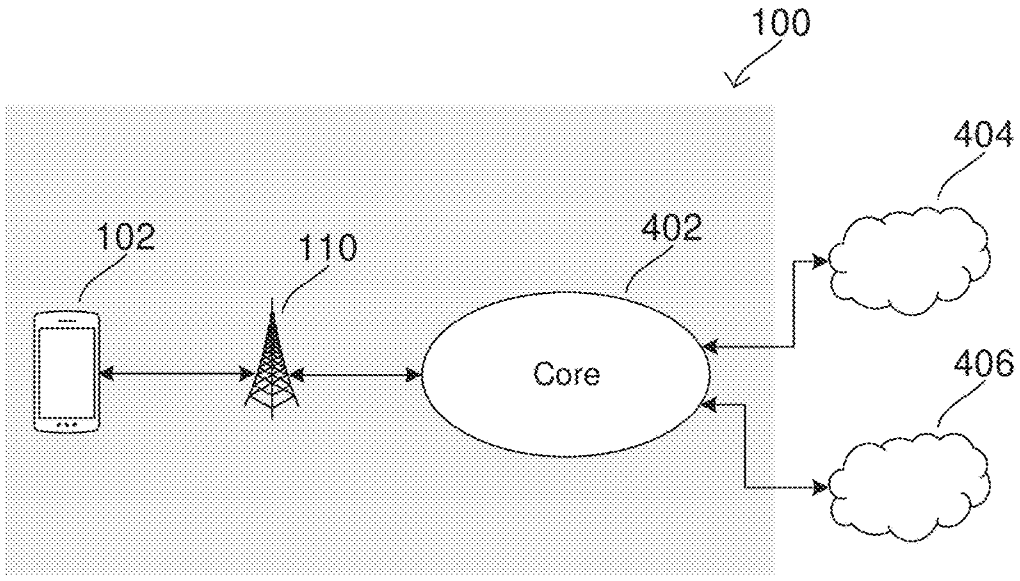
FIG. 4 shows an exemplary radio communication network with a core network according to some aspects.

As previously indicated, network access nodes 112 and 114 may interface with a core network. FIG. 4 shows an exemplary configuration in accordance with some aspects where network access node 110 interfaces with core network 402, which may be, for example, a cellular core network. Core network 402 may provide a variety of functions to manage operation of radio communication network 100, such as data routing, authenticating and managing users/subscribers, interfacing with external networks, and various other network control tasks. Core network 402 may therefore provide an infrastructure to route data between terminal device 104 and various external networks such as data network 404 and data network 406. Terminal device 104 may thus rely on the radio access network provided by network access node 110 to wirelessly transmit and receive data with network access node 110, which may then provide the data to core network 402 for further routing to external locations such as data networks 404 and 406 (which may be packet data networks (PDNs)). Terminal device 104 may therefore establish a data connection with data network 404 and/or data network 406 that relies on network access node 110 and core network 402 for data transfer and routing.

Figure 5:
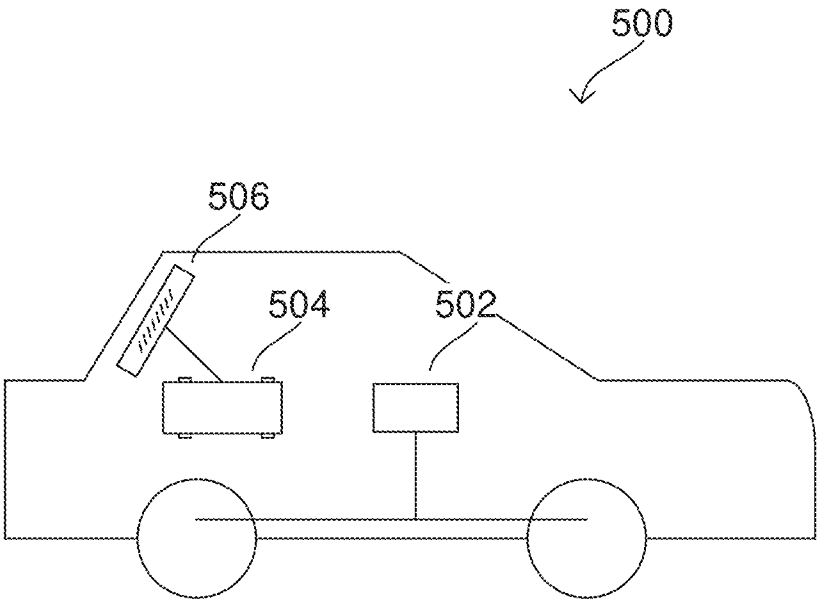
FIG. 5 shows an exemplary vehicular communication device according to some aspects.

Terminal devices may in some cases be configured as vehicular communication devices (or other movable communication devices). FIG. 5 shows an exemplary internal configuration of a vehicular communication device 500 according to some aspects. As shown in FIG. 5, vehicular communication device 500 may include steering and movement system 502, radio communication arrangement 504, and antenna system 506. One or more components of vehicular communication device 500 may be arranged around a vehicular housing of vehicular communication device 500, mounted on or outside of the vehicular housing, enclosed within the vehicular housing, and/or any other arrangement relative to the vehicular housing where the components move with vehicular communication device 500 as it travels. The vehicular housing, such as an automobile body, plane or helicopter fuselage, boat hull, or similar type of vehicular body dependent on the type of vehicle that vehicular communication device 500 is. Steering and movement system 502 may include components of vehicular communication device 500 related to steering and movement of vehicular communication device 500. In some aspects where vehicular communication device 500 is an automobile, steering and movement system 502 may include wheels and axles, an engine, a transmission, brakes, a steering wheel, associated electrical circuitry and wiring, and any other components used in the driving of an automobile. In some aspects where vehicular communication device 500 is an aerial vehicle, steering and movement system 502 may include one or more of rotors, propellers, jet engines, wings, rudders or wing flaps, air brakes, a yoke or cyclic, associated electrical circuitry and wiring, and any other components used in the flying of an aerial vehicle. In some aspects where vehicular communication device 500 is an aquatic or sub-aquatic vehicle, steering and movement system 502 may include any one or more of rudders, engines, propellers, a steering wheel, associated electrical circuitry and wiring, and any other components used in the steering or movement of an aquatic vehicle. In some aspects, steering and movement system 502 may also include autonomous driving functionality, and accordingly may also include a central processor configured to perform autonomous driving computations and decisions and an array of sensors for movement and obstacle sensing. The autonomous driving components of steering and movement system 502 may also interface with radio communication arrangement 504 to facilitate communication with other nearby vehicular communication devices and/or central networking components that perform decisions and computations for autonomous driving.

Radio communication arrangement 504 and antenna system 506 may perform the radio communication functionalities of vehicular communication device 500, which can include transmitting and receiving communications with a radio communication network and/or transmitting and receiving communications directly with other vehicular communication devices and terminal devices. For example, radio communication arrangement 504 and antenna system 506 may be configured to transmit and receive communications with one or more network access nodes, such as, in the exemplary context of Dedicated Short Range Communications (DSRC) and LTE Vehicle to Vehicle (V2V)/Vehicle to Everything (V2X), Roadside Units (RSUs) and base stations.

Figure 6:
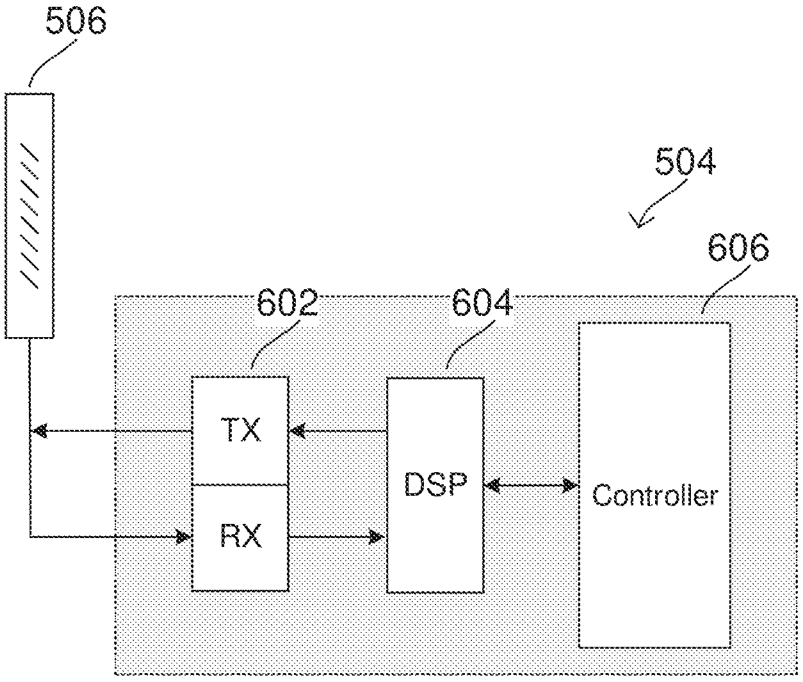
FIG. 6 shows an exemplary internal configuration of vehicular communication device according to some aspects.

FIG. 6 shows an exemplary internal configuration of antenna system 506 and radio communication arrangement 504 according to some aspects. As shown in FIG. 6, radio communication arrangement 504 may include RF transceiver 602, digital signal processor 604, and controller 606. Although not explicitly shown in FIG. 6, in some aspects radio communication arrangement 504 may include one or more additional hardware and/or software components (such as processors/microprocessors, controllers/microcontrollers, other specialty or generic hardware/processors/circuits, etc.), peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Controller 606 may be responsible for execution of upper-layer protocol stack functions, while digital signal processor 604 may be responsible for physical layer processing. RF transceiver 602 may be responsible for RF processing and amplification related to transmission and reception of wireless radio signals via antenna system 506.

Antenna system 506 may be a single antenna or an antenna array that includes multiple antennas. Antenna system 506 may additionally include analog antenna combination and/or beamforming circuitry. In the receive (RX) path, RF transceiver 602 may receive analog radio signals from antenna system 506 and perform analog and digital RF front-end processing on the analog radio signals to produce baseband samples (e.g., In-Phase/Quadrature (IQ) samples) to provide to digital signal processor 604. In some aspects, RF transceiver 602 can include analog and digital reception components such as amplifiers (e.g., a Low Noise Amplifiers (LNAs)), filters, RF demodulators (e.g., RF IQ demodulators)), and analog-to-digital converters (ADCs), which RF transceiver 602 may utilize to convert the received radio signals to baseband samples. In the transmit (TX) path, RF transceiver 602 may receive baseband samples from digital signal processor 604 and perform analog and digital RF front-end processing on the baseband samples to produce analog radio signals to provide to antenna system 506 for wireless transmission. In some aspects, RF transceiver 602 can include analog and digital transmission components such as amplifiers (e.g., Power Amplifiers (PAs), filters, RF modulators (e.g., RF IQ modulators), and digital-to-analog converters (DACs) to mix the baseband samples received from baseband modem 206, which RF transceiver 602 may use to produce the analog radio signals for wireless transmission by antenna system 506.

Digital signal processor 604 may be configured to perform physical layer (PHY) transmission and reception processing to, in the transmit path, prepare outgoing transmit data provided by controller 606 for transmission via RF transceiver 602, and, in the receive path, prepare incoming received data provided by RF transceiver 602 for processing by controller 606. Digital signal processor 604 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 604 may include one or more processors configured to retrieve and execute program code that algorithmically defines control and processing logic for physical layer processing operations. In some aspects, digital signal processor 604 may execute processing functions with software via the execution of executable instructions. In some aspects, digital signal processor 604 may include one or more hardware accelerators, where the one or more processors of digital signal processor 604 may offload certain processing tasks to these hardware accelerators. In some aspects, the processor and hardware accelerator components of digital signal processor 604 may be realized as a coupled integrated circuit.

While digital signal processor 604 may be responsible for lower-layer physical processing functions, controller 606 may be responsible for upper-layer protocol stack functions. Controller 606 may include one or more processors configured to retrieve and execute program code that algorithmically defines the upper-layer protocol stack logic for one or more radio communication technologies, which can include Data Link Layer/Layer 2 and Network Layer/Layer 3 functions. Controller 606 may be configured to perform both user-plane and control-plane functions to facilitate the transfer of application layer data to and from radio communication arrangement 504 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by controller 606 may include executable instructions that define the logic of such functions.

In some aspects, controller 606 may be coupled to an application processor, which may handle the layers above the protocol stack including transport and application layers. The application processor may act as a source for some outgoing data transmitted by radio communication arrangement 504 and a sink for some incoming data received by radio communication arrangement 504. In the transmit path, controller 606 may therefore receive and process outgoing data provided by the application processor according to the layer-specific functions of the protocol stack, and provide the resulting data to digital signal processor 604. Digital signal processor 604 may then perform physical layer processing on the received data to produce baseband samples, which digital signal processor may provide to RF transceiver 602. RF transceiver 602 may then process the baseband samples to convert the baseband samples to analog radio signals, which RF transceiver 602 may wirelessly transmit via antenna system 506. In the receive path, RF transceiver 602 may receive analog radio signals from antenna system 506 and process the analog RF signal to obtain baseband samples. RF transceiver 602 may provide the baseband samples to digital signal processor 604, which may perform physical layer processing on the baseband samples. Digital signal processor 604 may then provide the resulting data to controller 606, which may process the resulting data according to the layer-specific functions of the protocol stack and provide the resulting incoming data to the application processor.

In some aspects, radio communication arrangement 504 may be configured to transmit and receive data according to multiple radio communication technologies. Accordingly, in some aspects one or more of antenna system 506, RF transceiver 602, digital signal processor 604, and controller 606 may include separate components or instances dedicated to different radio communication technologies and/or unified components that are shared between different radio communication technologies. For example, in some aspects controller 606 may be configured to execute multiple protocol stacks, each dedicated to a different radio communication technology and either at the same processor or different processors. In some aspects, digital signal processor 604 may include separate processors and/or hardware accelerators that are dedicated to different respective radio communication technologies, and/or one or more processors and/or hardware accelerators that are shared between multiple radio communication technologies. In some aspects, RF transceiver 602 may include separate RF circuitry sections dedicated to different respective radio communication technologies, and/or RF circuitry sections shared between multiple radio communication technologies. In some aspects, antenna system 506 may include separate antennas dedicated to different respective radio communication technologies, and/or antennas shared between multiple radio communication technologies. Accordingly, while antenna system 506, RF transceiver 602, digital signal processor 604, and controller 606 are shown as individual components in FIG. 6, in some aspects antenna system 506, RF transceiver 602, digital signal processor 604, and/or controller 606 can encompass separate components dedicated to different radio communication technologies.

Trajectory Control for Forward Sensing/Access and Backhaul Moving Cells

Many radio access networks deploy their cells as stationary entities. Examples include base stations deployed at fixed locations throughout a mobile broadband coverage area and access points placed at a fixed location in a residential or commercial are. Given their fixed locations, these cells may not be able to move to dynamically respond to the positioning of their served terminal devices. While various types of aerial cells (such as cell-equipped drones) have been proposed, these aerial cells are still developing.

In accordance with aspects of this disclosure, a set of moving cells providing sensing, access, and/or backhaul services may optimize their positioning within a coverage area. As further described herein, in some aspects, there may be a set of backhaul moving cells that provide backhaul to outer moving cells, where trajectories of both the backhaul and outer moving cells can be controlled by a central trajectory controller. In other aspects, the set of backhaul moving cells may provide backhaul to end devices (e.g., outer moving cells or terminal devices) that do not have trajectories which are controllable by the central controller.

Figure 7:
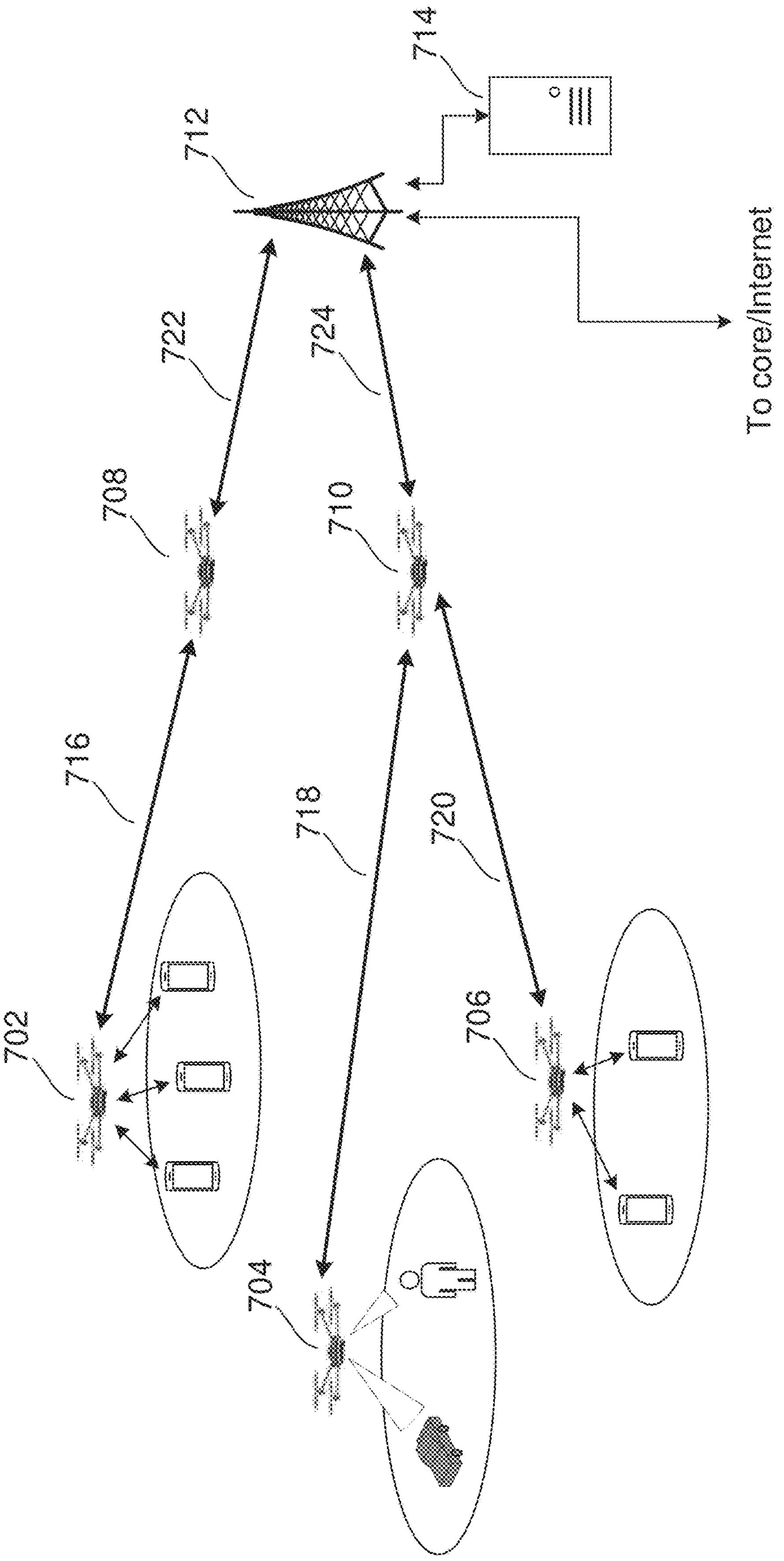
FIG. 7 shows an exemplary network scenario with backhaul and outer moving cells according to some aspects.

FIG. 7 shows an exemplary network diagram according to some aspects, which relates to aspects where there are both backhaul and outer moving cells with trajectories that are controllable by a central trajectory controller. As shown in FIG. 7, a set of outer moving cells 702-706 may be configured to perform an outer task for their respective target areas. The outer task can be sensing, where the outer moving cells 702-706 perform sensing with local sensors (e.g., audio, video, image, position, radar, light, environmental, or any other type of sensing component) to obtain sensing data for their respective target areas. Additionally or alternatively, the outer task can be access, where outer moving cells 702-706 provide fronthaul access to terminal devices (as shown in FIG. 7) located in their respective target areas. In some aspects, each of moving cells 702-706 may perform the same outer task, while in other aspects some of moving cells 702-706 may perform different outer tasks (e.g., some perform sensing while others perform access). The number of outer moving cells in FIG. 7 is exemplary and is scalable to any quantity.

The outer moving cells 702-706 may generate uplink data for transmission back to the network. In the case of sensing outer moving cells, the sensing outer moving cells may generate sensing data that is sent back to a server for storage and/or processing (e.g., to evaluate and interpret the sensing data, such as for surveillance/monitoring, control of moving vehicles, or other analytics). In the case of access outer moving cells, their respectively served terminal devices may generate communication data (e.g., control and user data) that is sent back to the radio access, core, and/or external data networks. This sensing and communication data may be the uplink data.

As shown in FIG. 7, outer moving cells 702-706 may use backhaul moving cells 708 and 710 for backhaul. Accordingly, outer moving cells 702-706 may transmit their uplink data to backhaul moving cells 708 and 710 on fronthaul links 716-720. Backhaul moving cells 708 and 710 may then receive this uplink data and transmit the uplink data to network access node 712 on backhaul links 722 and 724 (e.g., may relay the uplink data to network access node 712, which can include any type of relaying scheme including those with decoding and error correction). Network access node 712 may then use and/or route the uplink data as appropriate. For example, network access node 712 may locally use uplink communication data related to access stratum control data (e.g., at its protocol stack), route uplink communication data related to non-access stratum control data to core network control nodes, and route sensing data and uplink communication data through the core network on the path towards its destination (e.g., a cloud server for processing sensing data, or an external data network associated with user data). In some aspects, network access node 712 may be stationary, while in other aspects network access node 712 may be mobile. The number of backhaul moving cells in FIG. 7 is exemplary and is scalable to any quantity.

The positions of outer moving cells 702-706 and backhaul moving cells 708 and 710 could impact communication and/or sensing performance. For example, when performing sensing or access, outer moving cells 702-706 may each have target areas to perform sensing on or to provide access to (where their respective target areas can be geographically fixed or dynamic). Outer moving cells 702-706 may therefore not be completely free to move to any location, as they may be expected to stay at a position that allows them to effectively serve their respective target areas. However, in some cases the optimal position to serve the target area may not be the optimal position to transmit uplink data to backhaul moving cells 708-710. This can occur, for example, when the line-of-sight (LOS) path from the optimal serving position to backhaul moving cells 708 and 710 is blocked by some object, or when the optimal serving position is far from backhaul moving cells 708 and 710. This could in turn lead to low link strength for fronthaul links 712-720.

Backhaul moving cells 708 and 710 may experience similar positioning issues. For example, as shown in FIG. 7, backhaul moving cell 710 may provide backhaul to outer moving cells 704 and 706. As outer moving cells 704 and 706 serve different target areas, they may be located in different positions. The optimal backhaul position for backhaul moving cell 710 to serve outer moving cell 704 (e.g., a position that maximizes link strength for fronthaul link 718), however, is unlikely to be the same as the optimal backhaul position for backhaul moving cell 710 to serve outer moving cell 706 (e.g., a position that optimizes fronthaul link 720). Furthermore, even though backhaul moving cell 710 may be able to obtain better reception performance from outer moving cells 704 and 706 when positioned closer to them, this positioning may mean that backhaul moving cell 710 is located far from network access node 712. The relaying transmission from backhaul moving cell 710 to network access node 712 may therefore suffer with this positioning, as backhaul links 722 and 724 may be longer in distance.

Accordingly, as shown in FIG. 7, central trajectory controller 714 may also be deployed as part of the network architecture. In some aspects central trajectory controller 714 may be deployed as part of network access node 712. In other aspects, central trajectory controller 714 may be deployed separately and could be proximate to network access node 712, such as in a Mobile Edge Computing (MEC) platform. In other aspects, central trajectory controller 714 may be deployed as a server in the core network, or as a server in an external data network (e.g., part of the Internet or cloud). Although shown as a single component of FIG. 7, in some aspects central trajectory controller 714 may be deployed as multiple separate physical components that are logically interconnected with each other to form a virtualized central trajectory controller.

As will be described, central trajectory controller 714 may be configured to determine trajectories (e.g., fixed position or dynamic movement path) for outer moving cells 702-706 and backhaul moving cells 708 and 710. Outer moving cells 702-706 and backhaul moving cells 708 and 710 may cooperate in this trajectory determination to locally optimize their trajectories. As used herein, the term "optimize" refers to attempting to move towards an optimal value and/or reaching an optimal value, and may or may not include actually reaching the optimal value. Optimizing thus includes incrementing a function towards a maximum value (e.g., a local or absolute maximum value) or decrementing a function towards a minimum value (e.g., a local or absolute minimum value), such as by using incremental or decremental steps. As further described below, the underlying logic of this trajectory determination can be embodied in trajectory algorithms, where central trajectory controller 714 may execute a central trajectory algorithm, outer moving cells 702-706 may execute an outer trajectory algorithm, and backhaul moving cells 708-710 may execute a backhaul trajectory algorithm. These trajectory algorithms can determine trajectories for outer moving cells 702-706 and backhaul moving cells 708-710 may therefore be based on multiple factors, such as the current locations of outer moving cells 702-706 and their respective target areas, the current locations of backhaul moving cells 708 and 710 and their respective target areas, the location of network access node 712, and the channel conditions and transmit capabilities of the involved devices. The logic of these trajectory algorithms is described in detail below.

Figure 8:
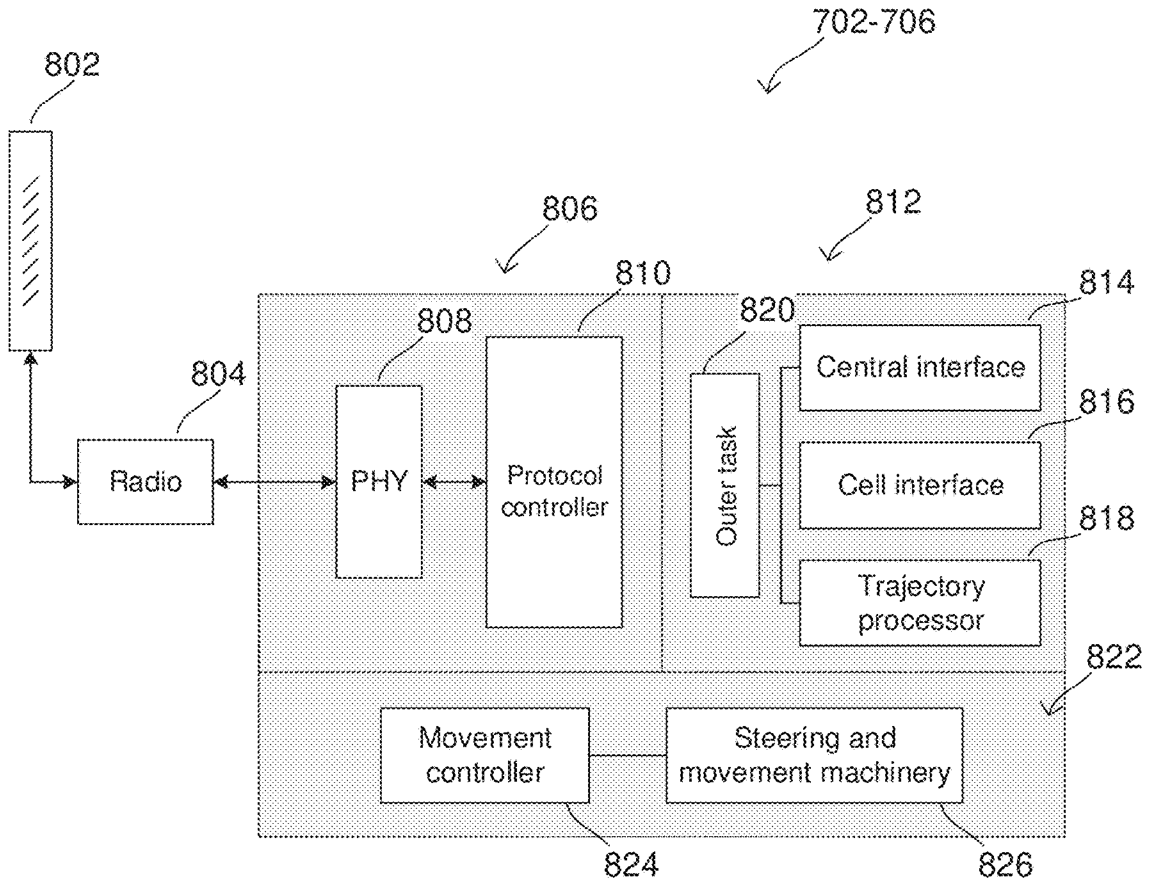
FIG. 8 shows an exemplary internal configuration of an outer moving cell according to some aspects.
Figure 9:
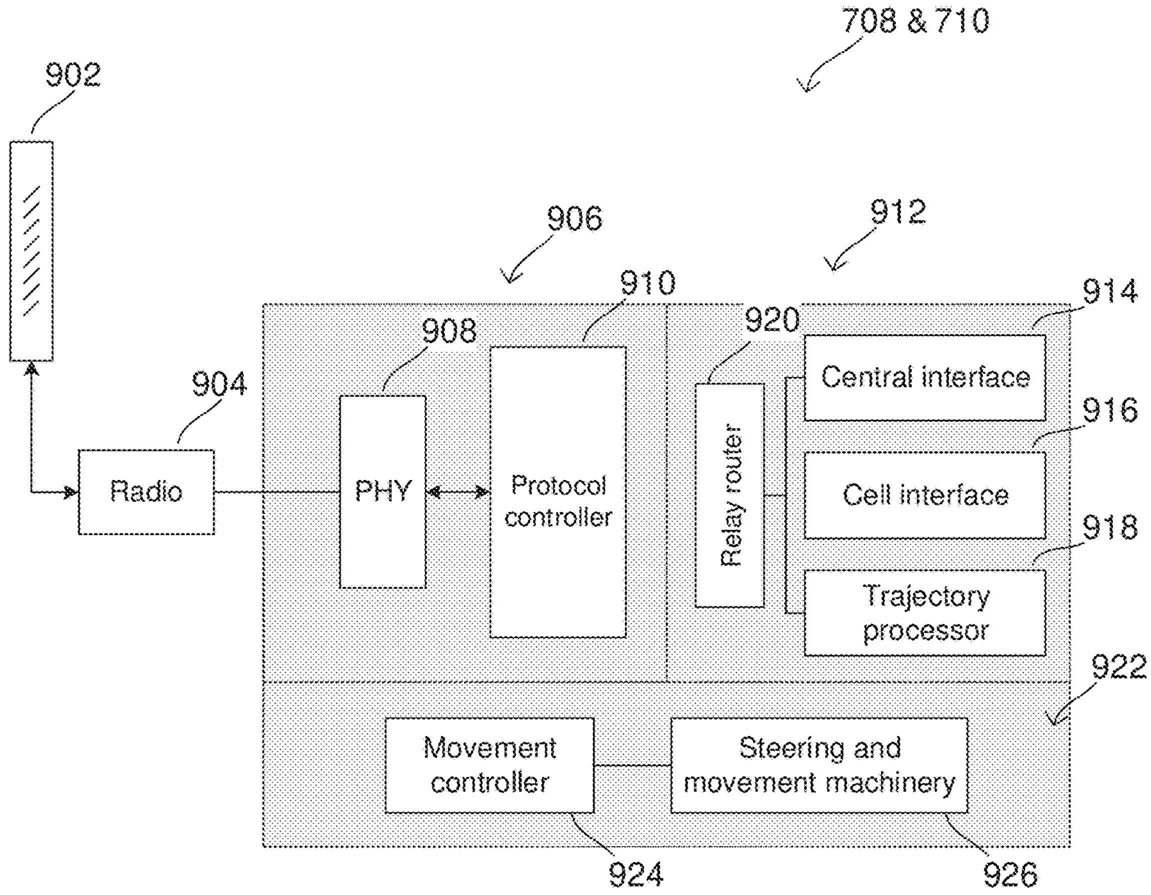
FIG. 9 shows an exemplary internal configuration of a backhaul moving cell according to some aspects.
Figure 10:
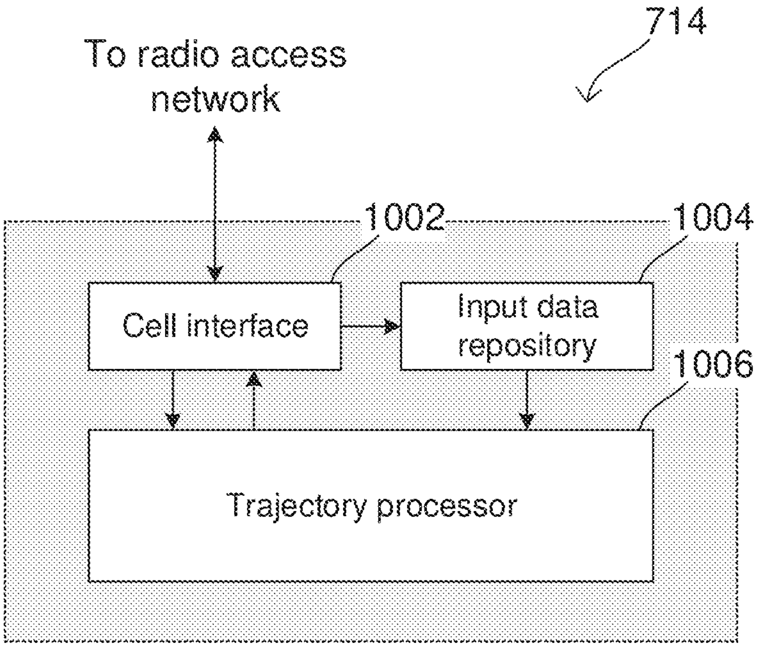
FIG. 10 shows an exemplary internal configuration of a central trajectory controller according to some aspects.

FIGS. 8-10 show exemplary internal configurations of outer moving cells 702-706, backhaul moving cells 708 and 710 and central trajectory controller 714 according to some aspects. With initial reference to FIG. 8, outer moving cells 702-706 may include antenna system 802, radio transceiver 804, baseband subsystem 806 (including physical layer processor 808 and protocol controller 810), trajectory platform 812, and movement system 822. Antenna system 802, radio transceiver 804, and baseband subsystem 806 may be configured in a similar or same manner as antenna system 302, radio transceiver 304, and baseband subsystem 306 as shown and described for network access node 110 in FIG. 3.

Antenna system 802, radio transceiver 804, and baseband subsystem 806 may therefore be configured to perform radio communications to and from outer moving cells 702-706, which can include wirelessly communicating with other moving cells, terminal devices, and network access nodes.

Trajectory platform 812 may be responsible for determining the trajectories of outer moving cells 702-706, including communicating with other moving cells and central trajectory controller 714 to obtain input data and executing an outer trajectory algorithm on the input data to obtain trajectories for outer moving cells 702-706. As shown in FIG. 8, trajectory platform 812 may include central interface 814, cell interface 816, and trajectory processor 818, and outer task subsystem 820. In some aspects, central interface 814 and cell interface 816 may each be application-layer processors that are configured to transmit and receive data (on logical software-level connections) with central trajectory processor 714 and other moving cells, respectively. For example, when transmitting data to central trajectory controller 714, central interface 814 may be configured to generate packets from the data (e.g., according to a predefined format used by central interface 814 and its peer interface at central trajectory controller 714) and provide the packets to the protocol stack running at protocol controller 810. Protocol controller 810 and physical layer processor 808 may then process the packets according to the protocol stack and physical layer protocols and transmit the data as wireless radio signals via radio transceiver 804 and antenna system 802. When receiving data from central trajectory controller 714, antenna system 802 and radio transceiver 804 may receive the data in the form of wireless radio signals, and provide corresponding baseband data to baseband modem. Physical layer processor 808 and protocol controller 810 may then process the baseband data to recover packets transmitted by the peer interface at central trajectory controller 714, which protocol controller 810 may provide to central interface 814. Cell interface 816 may similarly transmit data to a peer interface at other moving cells.

Trajectory processor 818 may be a processor configured to execute an outer trajectory algorithm that determines the trajectory for outer moving cells 702-706. As used herein, trajectories can refer to static positions, sequences of static positions (e.g., a time-stamped sequence of static positions), or paths or contours. Trajectory processor 818 may be configured to retrieve executable instructions defining the outer trajectory algorithm from a memory (not explicitly shown) and to execute these instructions. Trajectory processor 818 may be configured to execute the outer trajectory algorithm on input data to determine updated trajectories for outer moving cells 702-706. The logic of this outer trajectory algorithm is described herein both in prose below and visually by the drawings.

Outer task subsystem 820 may be configured to perform the outer task for outer moving cells 702-706. In some aspects where outer moving cells 702-706 are configured to perform sensing, outer task subsystem 820 may include one or more sensors. These sensors can be, without limitation, audio, video, image, position, radar, light, environmental, or another type of sensor. Outer task subsystem 820 may also include at least one processor configured to provide sensing data obtained from the sensors to baseband subsystem 806 for transmission. In some aspects where outer moving cells 702-706 are configured to provide access to terminal devices, outer task subsystem 820 may include one or more processors configured to transmit, receive, and relay data from the terminal devices (via baseband subsystem 806, which may handle the protocol stack and physical layer communication functionality). While FIG. 8 shows outer task subsystem 820 as part of trajectory platform 812, in some aspects outer task subsystem 820 may be included as part of baseband subsystem 806.

Movement system 822 may be responsible for controlling and executing movement of outer moving cells 702-706. As shown in FIG. 8, movement system 822 may include movement controller 824 and steering and movement machinery 826. Movement controller 824 may be configured to control the overall movement of outer moving cells 702-706 (e.g., through execution of a movement control function), and may provide control signals to steering and movement machinery 826 that specify the movement. In some aspects, movement controller 824 may be autonomous, and therefore may be configured to execute an autonomous movement control function where movement controller 824 directs movement of outer moving cells 702-706 without primary human/operator control. Steering and movement machinery 826 may then execute the movement specified in the control signals. In some aspects where outer moving cells 702-706 are terrestrial vehicles, steering and movement machinery 826 may include, for example, wheels and axles, an engine, a transmission, brakes, a steering wheel, associated electrical circuitry and wiring, and any other components used in the driving of an automobile or other land-based vehicle. In some aspects where outer moving cells 702-706 are aerial vehicles, including but not limited to drones, steering and movement machinery 826 may include, for example, one or more of rotors, propellers, jet engines, wings, rudders or wing flaps, air brakes, a yoke or cyclic, associated electrical circuitry and wiring, and any other components used in the flying of an aerial vehicle. In some aspects where outer moving cells 702-706 are aquatic or sub-aquatic vehicles, steering and movement machinery 826 may include, for example, any one or more of rudders, engines, propellers, a steering wheel, associated electrical circuitry and wiring, and any other components used in the steering or movement of an aquatic vehicle.

FIG. 9 shows an exemplary internal configuration of backhaul moving cells 708 and 710 according to some aspects. As shown in FIG. 9, backhaul moving cells 708 and 710 may include similar components to outer moving cells 702-706. Antenna system 902, radio transceiver 904, baseband subsystem 906, central interface 914, cell interface 916, movement controller 924, and steering and movement machinery 926 may be respectively configured in the manner of antenna system 802, radio transceiver 804, baseband subsystem 806, central interface 814, cell interface 816, movement controller 824, and steering and movement machinery 826 as shown and described for FIG. 8.

Trajectory processor 918 may be configured to execute a backhaul trajectory algorithm that controls the trajectory of backhaul moving cells 708 and 710. This backhaul trajectory algorithm is described herein in prose and visually by the figures.

As shown in FIG. 9, backhaul moving cells 708 and 710 may also include relay router 920. As previously indicated, backhaul moving cells 708 and 710 may be configured to provide backhaul services to outer moving cells 702-706, which can include receiving uplink data from outer moving cells 702-706 (on fronthaul links 716-720) and relaying the uplink data to the radio access network (e.g., to network access node 712 on backhaul links 722 and 724). Relay router 920 may be configured to handle this relaying functionality, and may interact with cell interface 916 to identify the uplink data for relaying and subsequently transmit the uplink data to the radio access network via baseband subsystem 906. Although shown as part of trajectory platform 912 in FIG. 9, in some aspects relay router 920 may also be part (e.g., fully or partially) of baseband subsystem 906.

FIG. 10 shows an exemplary internal configuration of central trajectory controller 714 according to some aspects. As shown in FIG. 10, central trajectory controller 714 may include cell interface 1002, input data repository 1004, and trajectory processor 1006. In some aspects, cell interface 1002 may be an application-layer processor configured to transmit and receive data (on logical software-level connections) with its peer central interfaces 814 and 914 in outer moving cells 702-706 and backhaul moving cells 708 and 710. Cell interface 1002 may therefore send packets on the interface shown in FIG. 10, which may pass through an Internet backhaul, core network, and/or radio access network (depending on the deployment location of central trajectory controller 714). The radio access network (e.g., network access node 712) may transmit the packets as wireless radio signals. Outer moving cells 702-706 and backhaul moving cells 708 and 710 may be configured to receive and process the wireless radio signals to recover the data packets at their peer central interfaces 814 and 914.

Input data repository 1004 may be a server-type component including a controller and a memory. Input data repository 1004 may be configured to collect input data for input to a central trajectory algorithm executed by trajectory processor 1006. The central trajectory algorithm may be configured to determine coarse trajectories for outer moving cells 702-706 and backhaul moving cells 708 and 710. These coarse trajectories may be the high-level, planned trajectories provided by central trajectory controller 714, and may be determined by central trajectory controller 714 to optimize the fronthaul and backhaul links provided by backhaul moving cells 708 and 710 while also enabling outer moving cells 702-706 to perform their respective forward tasks. Outer moving cells 702-706 and backhaul moving cells 708 and 710 may refine these coarse trajectories using their outer and backhaul trajectory algorithms to obtain updated trajectories. In some aspects, the central trajectory algorithm may also be configured to determine initial routings for outer moving cells 702-706 and backhaul moving cells 708 and 710. These initial routings may specify the backhaul path between outer moving cells 702-706 and the radio access network via backhaul moving cells 708 and 710, or in other words, which of backhaul moving cells 708 and 710 outer moving cells 702-706 should transmit their uplink data to. This central trajectory algorithm is described herein in prose and visually by the figures.

Figure 11:
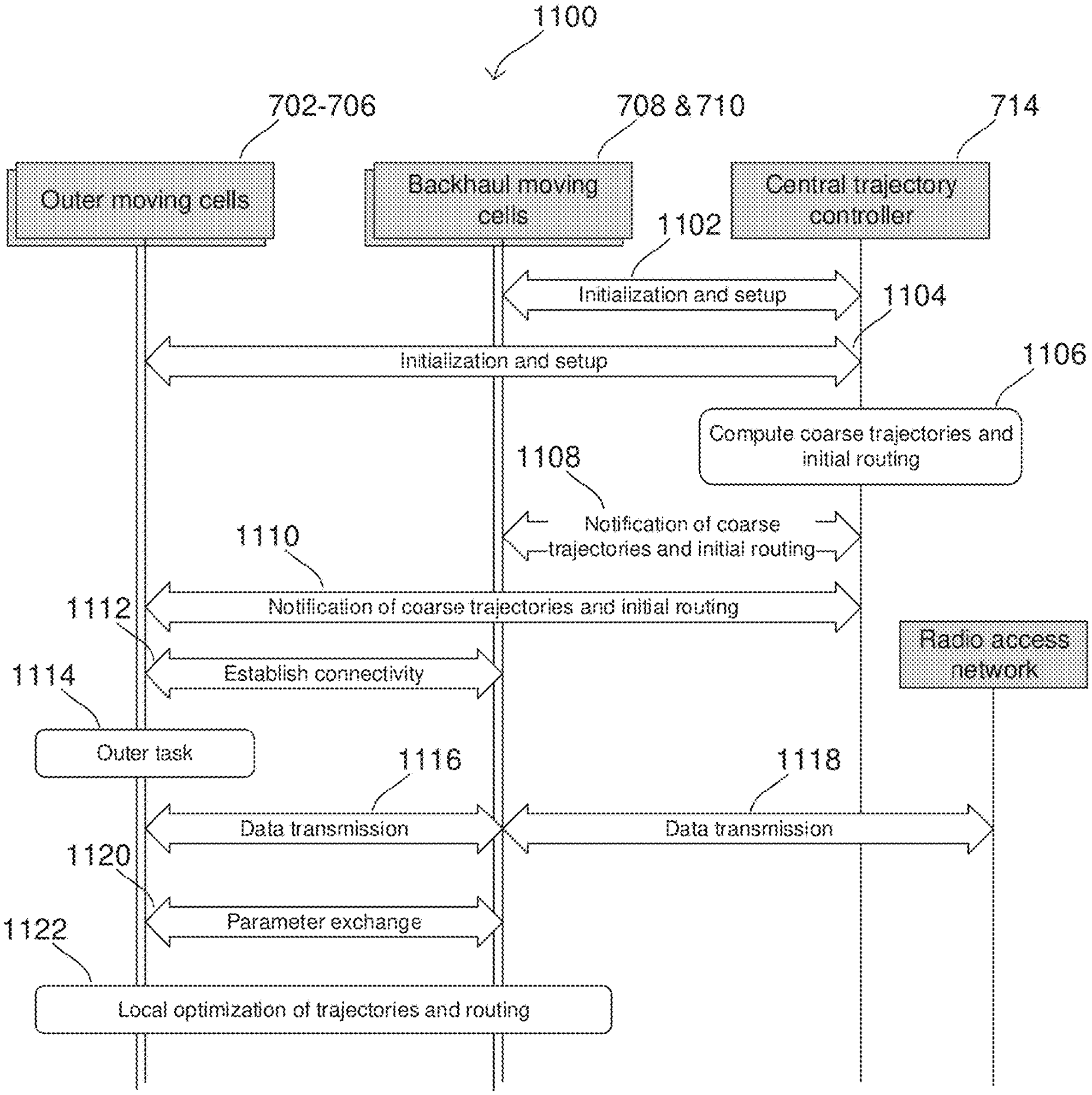
FIG. 11 shows an exemplary trajectory control procedure for backhaul and outer moving cells according to some aspects.

The signaling flow and operation involved in trajectory control for outer and backhaul moving cells will now be described. FIG. 11 shows exemplary message sequence chart 1100 according to some aspects. As shown in FIG. 11, outer moving cells 702-706, backhaul moving cells 708 and 710, and central trajectory controller 714 may be involved in the trajectory control for outer and backhaul moving cells. Central trajectory controller 714 may first perform initialization and setup with backhaul moving cells 708 and 710 and outer moving cells 702-706 in stages 1102 and 1104, respectively. For example, in stage 1102, cell interface 1002 of central trajectory controller 714 may exchange signaling (according to a predefined initialization and setup procedure) with the central interfaces 914 of backhaul moving cells 708 and 710. Cell interface 1002 may therefore may establish signaling connections with backhaul moving cells 708 and 710. Likewise, in stage 1104, cell interface 1002 of central trajectory controller 714 may exchange signaling (according to a predefined initialization and setup procedure) with the central interfaces 814 of outer moving cells 702-706, and may therefore establish signaling connections with backhaul moving cells 702-706. As previously discussed regarding FIG. 7, central trajectory controller 714 may interface with network access node 712 (e.g., as part of network access node 712, as an edge computing component, as part of the core network behind network access node 712, or from an external network location), and may exchange this signaling with central interfaces 814 and 914 over data bearers that use the radio access network provided by network access node 712. Further references to communication between cell interface 1002 and central interfaces 814 and 914 are understood as referring to data exchange over such data bearers.

In addition to establishing signaling connections with outer moving cells 702-706 and backhaul moving cells 708 and 710 in stages 1102 and 1104, central trajectory controller 714 may also obtain input data for computing coarse trajectories and initial routings as part of the initialization and setup with outer moving cells 702-706 and backhaul moving cells 708 and 710. For example, as part of stages 1102 and 1104, central interfaces 814 and 914 may send input data including data rate requirements (e.g., for sending sensing data or access data from served terminal devices) of outer moving cells 702-706, the positions (e.g., geographical locations) of outer moving cells 702-706 and backhaul moving cells 708 and 710, the target areas assigned to outer moving cells 702-706 (e.g., for sensing or access), recent radio measurements obtained by outer moving cells 702-706 and backhaul moving cells 708-710 (e.g., obtained by their respective baseband subsystems 806 and 906), and/or details about the radio capabilities of outer moving cells 702-706 and backhaul moving cells 708-710 (e.g., transmit power capabilities, effective operation range, etc.). Cell interface 1002 of central trajectory controller 714 may receive this input data and provide it to input data repository 1004, which may store the input data for subsequent use by trajectory processor 1006. In some aspects, cell interface 1002 may also be configured to communicate with network access node 712, and may, for example, receive input data such as radio measurements by network access node 712 (e.g., of signals transmitted by outer moving cells 702-706 and backhaul moving cells 708-710).

Central trajectory controller 714 may be configured to use this input data for the central trajectory algorithm executed by trajectory processor 1006. In some aspects, the central trajectory algorithm may also use, as input data, a statistical model of the radio environment between outer moving cells 702-706, backhaul moving cells 708 and 710, and the radio access network (e.g., network access node 712 optionally in addition to one or more additional network access nodes). Various aspects of this disclosure may use statistical models of varying complexity. For example, in some aspects the statistical model can be a basic propagation model (e.g., a free-space pathloss model) that evaluates the distance between devices and their current radio conditions to estimate the channel conditions between the devices (e.g., that models the radio environment based on the distance between devices and their current radio conditions). In other aspects, the statistical model can be based on a radio map (e.g., a radio environment map (REM)) that indicates channel conditions over a mapped area. This type of statistical model can therefore use more advanced geographic data to model the radio environment over geographic areas having different propagation characteristics.

Figure 12:
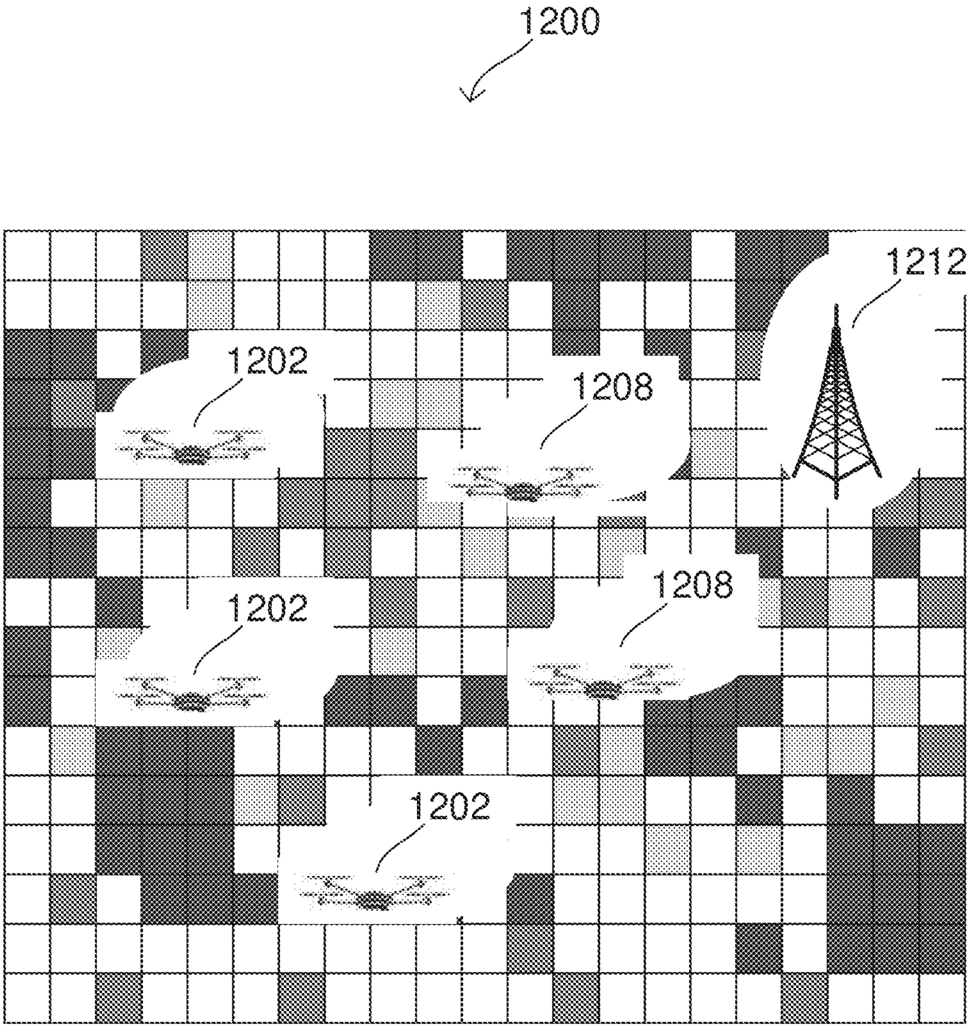
FIG. 12 shows an exemplary radio map according to some aspects.

FIG. 12 shows a basic example illustrating the concept of a radio map according to some aspects. Radio map 1200 shown in FIG. 12 assigns a channel condition rating to each of a plurality of geographic units, where lighter-shaded geographic units indicate better channel conditions (estimated) than darker-shaded geographic units. The shades of the geographic units can indicate, for example, estimated pathloss of radio signals traveling through the geographic unit, where each shade can be assigned a specific pathloss value (e.g., in dBs or a similar metric). The configuration of radio map 1200 is exemplary. Accordingly, other radio maps using uniform and non-uniform grids with different types of geographic unit shapes and sizes can likewise be used without limitation. While radio map 1200 depicts a single radio parameter (as indicated by the shading of the geographic units), this is also exemplary, and radio maps can be applied that assign multiple radio parameters to the geographic units.

Input data repository 1004 may store the underlying radio map data for such a radio map. In some aspects, input data repository 1004 may download part or all of this radio map data from a remote location, such as a remote server that stores radio map data (e.g., a REM server). In some aspects, input data repository 1004 may generate part or all of the radio map data locally (e.g., based on the input data provided by outer moving cells 702-706, backhaul moving cells 708 and 710, and the radio access network).

In some aspects, input data repository 1004 may update the radio map data based on the input data provided in stages 1102 and 1104 by outer moving cells 702-706, backhaul moving cells 708 and 710, and the radio access network. For example, input data repository 1004 may be configured to match radio measurements (of the input data) with the corresponding positions of the device that made the measurement. Input data repository 1004 may then update the radio parameters in the geographic unit of the radio map in which the position is located based on the radio measurement. This type of updating may therefore adapt the radio map data based on measurements provided by devices in the radio environment.

The input data obtained by input data repository 1004 can therefore include the input data provided by outer moving cells 702-706 and backhaul moving cells 708 and 710 as well as other input data related to the statistical model of the radio environment (e.g., for basic propagation models or radio map data). After obtaining this input data, central trajectory controller 714 may compute the coarse trajectories and initial routings for outer moving cells 702-706 and backhaul moving cells 708 and 710 in stage 1106. For example, input data repository 1004 may provide the input data to trajectory processor 1006, which may then execute the central trajectory algorithm using the input data as input.

As previously indicated, the outputs of the central trajectory algorithm may be coarse trajectories (e.g., static positions, sequences of static positions, or paths or contours) that central trajectory controller 714 assigns to outer moving cells 702-706 and backhaul moving cells 708 and 710. The outputs can also include initial routings that govern the flow of data between outer moving cells 702-706, backhaul moving cells 708 and 710, and the radio access network. In some aspects, the central trajectory algorithm may be configured to compute these coarse trajectories and initial routings to optimize an optimization criteria according to the statistical model. As previously indicated, the statistical model may provide a probabilistic characterization of the radio environment between outer moving cells 702-706, backhaul moving cells 708 and 710, and the radio access network. Accordingly, the central trajectory algorithm may evaluate the statistical model to estimate the radio environment over a range of possible coarse trajectories and/or routings, and may determine coarse trajectories and/or initial routings that optimize an optimization criteria related to the radio environment.

For example, in some aspects the optimization criteria may be a supported data rate. In this example, outer moving cells 702-706 may have minimum data rate requirements. Outer moving cells 702-706 may be generating uplink data related to sensing (e.g., sensing data generated by outer moving cells 702-706) or related to access (e.g., uplink data generated by the terminal devices served by outer moving cells 702-706), and this uplink data may have a certain minimum data rate that is capable of supporting transmission of this sensing data. If the backhaul relaying path (including a fronthaul link from outer moving cell to backhaul moving cell, and a backhaul link from backhaul moving cell to network access node) has a data rate that is at least this minimum data rate, the uplink data may be successfully transmitted to the network.

Accordingly, the central trajectory algorithm may determine coarse trajectories and initial routings in stage 1106 that increase or maximize a function of the supported data rate using the statistical model to approximate the data rate. This can use any type of suitable optimization algorithm, such as gradient descent (used herein to collectively refer to both gradient descent and ascent) or another optimization algorithm that incrementally 'steps' over different possible coarse trajectories and/or initial routings to find a coarse trajectory or initial routing that increases or maximizes the supported data rate. In some aspects, the central trajectory algorithm may increase or maximize the overall supported data rate of each backhaul relaying path outgoing from outer moving cells 702-706 (e.g., an aggregate across all backhaul relaying paths from outer moving cells 702-706 to the radio access network). In other aspects the central trajectory algorithm may increase or maximize the probability that each backhaul relaying path outgoing from outer moving cells 702-706 has a supported data rate above a predefined data rate threshold.

Additionally or alternatively, in some aspects the optimization criteria may be a link quality metric. The link quality metric can be signal strength, signal quality, signal-to-noise ratio (SNR or another related metric such as signal-to-interference-plus-noise ratio (SINR)), error rate (e.g., bit error rate (BER), block error rate (BLER), packet error rate (PER), or any other type of error rate), distance between communication devices, estimated pathloss between communication devices, or any other type of link quality metric. The central trajectory algorithm can similarly be configured to determine coarse trajectories and/or initial routings for outer moving cells 702-706 and backhaul moving cells 708 and 710 by optimizing a link quality metric as the optimization criteria. For example, the central trajectory algorithm can increase or maximize a function of the link quality metric using the statistical model to approximate the link quality metric. As in the case above, the function can be a function of the link quality metric itself (e.g., an aggregate over the backhaul relaying paths) or a function of the probability that the link quality metric is above a link quality metric threshold (e.g. a probability that each backhaul relaying path has a link quality metric above the link quality metric threshold).

Although the above examples identify individual optimization criteria, in some aspects the central trajectory algorithm may be configured to evaluate multiple optimization criteria simultaneously. For example, a weighted combination of the individual functions of the optimization criteria can be defined and subsequently used as the function to be increased or maximized with the optimization algorithm.

As the backhaul relaying paths from each outer moving cell includes both a fronthaul link (to a backhaul moving cell) and a backhaul link (from the backhaul moving cell to the network), the coarse trajectories may attempt to balance between strong fronthaul links 716-720 and strong backhaul links 722-724. For example, if the central trajectory algorithm determines coarse trajectories that place backhaul moving cells 708 and 710 very close to outer moving cells 702-706, this may yield strong fronthaul links 716-720. However, this may position backhaul moving cells 708 and 710 further from network access node 712, which may yield weaker backhaul links 722-724. The supported data rate and/or link quality metric of the backhaul relaying paths may therefore not be as high as if the central trajectory algorithm determines coarse trajectories that place backhaul moving cells 708 and 710 in the middle between outer moving cells 702-706 and network access node 712. As the central trajectory algorithm models the supported data rate and/or link quality metric with an optimization criteria, increasing or maximizing the function of the optimization criteria may yield coarse trajectories that appropriately place backhaul moving cells 708 and 710 between outer moving cells 702-706 and network access node 712.

As indicated above, the central trajectory algorithm may be configured to use the statistical model of the radio environment to approximate the function of the optimization criteria. For example, in cases where the statistical model is a basic propagation model, the central trajectory algorithm may be configured to approximate the optimization criteria using the basic propagation model, such as by using a supported data rate function that takes into consideration the relative distances between outer moving cells 702-706, backhaul moving cells 708 and 710, and the radio access network (where, for example, closer relative positions may yield higher supported data rates than far relative positions). The central trajectory algorithm may then attempt to find trajectories for outer moving cells 702-706 and backhaul moving cells 708 and 710 that increase this supported data rate function (e.g., according to gradient descent or another optimization algorithm). As there are multiple moving cells, this may include determining individual trajectories outer moving cells 702-706 and backhaul moving cells 708 and 710, where the individual trajectories (when executed together) increase the supported data rate function.

In cases where the statistical model is based on radio map data, the central trajectory algorithm may be configured to approximate the optimization criteria using a propagation model that also depends on the radio parameters for the geographic units of the radio map. The supported data rate function can therefore take into consideration the relative distances between outer moving cells 702-706, backhaul moving cells 708 and 710, and the radio access network as well as the radio parameters of the geographic units of the radio map that fall between their respective positions. The central trajectory algorithm can then likewise attempt to find trajectories for outer moving cells 702-706 and backhaul moving cells 708 and 710 that increase or maximize this supported data rate function. As indicated above, this can include determining individual trajectories for outer moving cells 702-706 and backhaul moving cells 708 and 710 that when executed together increase or maximize the supported data rate function.

In some aspects, the function of the optimization criteria may also depend on the routing, where some routings may yield higher approximated optimization criteria than others. For example, with reference to the exemplary context of FIG. 7, outer moving cell 702 may be able to achieve a higher supported data rate for its uplink data when using backhaul moving cell 708 for backhaul than compared to backhaul moving cell 710. Additionally or alternatively, backhaul moving cells 708 and 710 may be able to provide backhaul relaying paths with higher supported data rates when they relay the uplink data to a particular network access node of the radio access network. As part of stage 1106, the central trajectory algorithm may therefore also treat the routings as adjustable parameters that can be used to increase the function of the optimization criteria. The central trajectory algorithm can therefore determine initial routings in stage 1106, which can include selecting which of backhaul moving cells 708 and 710 for forward moving cells 702-706 to transmit their uplink data to and/or selecting which network access node for backhaul moving cells 708 and 710 to relay this uplink data to.

In some aspects, the central trajectory algorithm may also consider constraint parameters when determining the coarse trajectories and initial routings. For example, target areas assigned to outer moving cells 702-706 may act as constraints, where outer moving cells 702-706 are expected to perform their assigned outer tasks (sensing or routing) in certain target areas. Accordingly, in some cases the coarse trajectories assigned to outer moving cells 702-706 may be constrained to being within or near the target areas (e.g., to be proximate enough to the target area to perform the assigned outer task with outer task subsystem 820). When attempting to increase the function of the optimization criteria, the central trajectory algorithm may therefore consider, and in some aspects consider exclusively, coarse trajectories of outer moving cells 702-706 that are constrained by their respectively assigned target areas. In some aspects, backhaul moving cells 708 and 710 may also have geographical constraints that the central trajectory algorithm may consider when determining the coarse trajectories.

In some aspects, the central trajectory algorithm may determine the target areas for outer moving cells 702-706 as part of the coarse trajectory determination. For example, the central trajectory algorithm may identify an overall target area (e.g., as reported by outer moving cells 702-706 as input data) that defines the overall geographic area in which the outer moving cells 702-706 are assigned to perform their outer tasks. Instead of treating the target area of each outer moving cell as the area to which each individual outer moving cell is assigned to, the central trajectory algorithm may determine coarse trajectories for outer moving cells that increase the optimization criteria while also covering the overall target area.

After determining the coarse trajectories and initial routings in stage 1106, central trajectory controller 714 may send the coarse trajectories and initial routings to backhaul moving cells 708 and 710 and outer moving cells 702-706 in stages 1108 and 1110, respectively. For example, trajectory processor 1006 may provide the coarse trajectories and initial routings to cell interface 1002, which may then send the coarse trajectories and initial routings to its peer central interfaces 814 and 914 at outer moving cells 702-706 and backhaul moving cells 708 and 710. In some aspects, cell interface 1002 may identify the coarse trajectory and initial routing individually assigned to each of outer moving cells 702-706 and backhaul moving cells 708 and 710, and may then transmit the coarse trajectory and initial routing to each moving cell to the corresponding central interface 814 or 914 of the moving cells.

Backhaul moving cells 708 and 710 and outer moving cells 702-706 may then receive the coarse trajectories and initial routings at central interfaces 814 and 914, respectively. As shown in FIG. 11, backhaul moving cells 708 and 710 may then establish connectivity with outer moving cells 702-706 in stage 1112. For example, backhaul moving cells 708 and 710 may set up a backhaul relaying path with outer moving cells 702-706 that outer moving cells 702-706 can use to transmit and receive data with the radio access network (including network access node 712). This can include, for example, setting up fronthaul links 716-720 between outer moving cells 702-706 and backhaul moving cells 708 and 710 and setting up backhaul links 722 and 724 between backhaul moving cells 708 and 710 and the radio access network (although in some aspects the backhaul links may already be established). In some aspects, backhaul moving cells 708 and 710 may also set up a link with each other, with which they can, for example, coordinate their updated trajectories.

In some aspects, backhaul moving cells 708 and 710 and outer moving cells 702-706 may execute stage 1112 at their cell interfaces 816 and 916. For example, with reference to outer moving cell 702, its central interface 814 may receive the coarse trajectory and initial routing assigned to outer moving cell 702 in stage 1110. Central interface 814 of outer moving cell 702 may then provide the coarse trajectory to trajectory processor 818 and the initial routing to cell interface 816. The initial routing may specify that outer moving cell 702 is assigned to use one of backhaul moving cells 708 and 710, such as backhaul moving cell 708. Accordingly, cell interface 816 of outer moving cell 702 may identify that it is assigned to establish a backhaul relaying path to the radio access network via backhaul moving cell 708. Cell interface 816 of outer moving cell 702 may therefore establish connectivity with cell interface 916 of backhaul moving cell 708, such as by exchanging wireless signaling (via baseband subsystem 806 of outer moving cell 702 and baseband subsystem 906 of backhaul moving cell 708) with each other that establishes a fronthaul link between outer moving cell 702 and backhaul moving cell 708. Outer moving cells 702-706 may similarly establish connectivity with the backhaul moving cells assigned to them by their respective initial routings.

In some aspects, the central trajectory algorithm may determine coarse trajectories but not initial routings. Accordingly, outer moving cells 702-706 and backhaul moving cells 708 and 710 may be configured to determine the routings (e.g., to determine backhaul relaying paths). For example, the cell interfaces 814 of outer moving cells 702-706 may perform a discovery process to identify nearby backhaul moving cells, and may then select a backhaul moving cell to use as a backhaul relaying path. These routings may therefore be the initial routings. Outer moving cells 702-706 and backhaul moving cells 708 and 710 may then establish connectivity with each other according to these initial routings.

After establishing connectivity, outer moving cells 702-706 may perform their outer tasks while moving according to their respectively assigned coarse trajectories in stage 1114. For example, with exemplary reference to outer moving cell 702, trajectory processor 818 may provide the coarse trajectory to movement controller 824. Movement controller 824 may then provide control signals to steering and movement machinery 826 that direct steering and movement machinery 826 to move outer moving cell 702 according to its coarse trajectory. If configured to perform sensing as its outer task, one or more sensors (not explicitly shown in FIG. 8) of outer task subsystem 820 may obtain sensing data. If configured to perform access as its outer task, outer task subsystem 820 may use baseband subsystem 806 to wirelessly provide radio access to terminal devices in the coverage area of outer moving cell 702.

As previously indicated, the coarse trajectories may be static positions, sequences of static positions, or a paths or contours. If the coarse trajectory is a static position, movement controller 824 may control steering and movement machinery 826 to position outer moving cell 702 at the static position and to remain at the static position. If the coarse trajectory is a sequence of static positions, movement controller 824 may control steering and movement machinery 826 to sequentially move outer moving cell 702 to each of the sequence of static positions. The sequence of static positions can be time-stamped, and movement controller 824 may control steering and movement machinery 826 to move outer moving cell 702 to each of the sequence of static positions at the according to the time stamps. If the coarse trajectory is a path or contour, movement controller 824 may control steering and movement machinery 826 to move outer moving cell 702 along the path or contour.

As shown in FIG. 11, outer moving cells 702-706 and backhaul moving cells 708 and 710 may perform data transmission in stages 1116 and 1118. For example, outer moving cells 702-706 (e.g., at their respective cell interfaces 816) may transmit uplink data from the outer task on their respective fronthaul links 716-720 to backhaul moving cells 708 and 710 as assigned by the initial routings. Backhaul moving cells 708 and 710 may then receive the uplink data at their respective cell interfaces 916. Relay routers 920 may then identify the uplink data received at the cell interfaces 916 and transmit the uplink data to the radio access network on respective backhaul links 722 and 724 via the baseband subsystems 906. In some aspects, fronthaul moving cells 702-706 may also use the backhaul relaying paths for downlink data transmission. Accordingly, backhaul moving cells 708 and 710 may receive downlink data addressed to outer moving cells 702-706 from the radio access network at their baseband subsystems 906. Relay routers 920 may identify this downlink data and provide it to the cell interfaces 916, which may then transmit the downlink data (via baseband subsystem 906) on the fronthaul link to outer moving cells 702-706.

Similar to outer moving cells 702-706, backhaul moving cells 708 and 710 may move according to their assigned coarse trajectories during stages 1116 and 1118. Accordingly, with exemplary reference to backhaul moving cell 708, trajectory processor 918 (after receiving the coarse trajectory from central interface 914) may specify the coarse trajectory to movement controller 924. Movement controller 924 may then direct steering and movement machinery 926 to move backhaul moving cell 708 according to the coarse trajectory.

These coarse trajectories and initial routings determined by central trajectory controller 714 can be considered a high-level plan that forms the initial basis of the trajectories and routing of outer moving cells 702-706 and backhaul moving cells 708 and 710. Accordingly, in some aspects outer moving cells 702-706 and backhaul moving cells 708 and 710 may perform local optimization of the trajectories and routing. As shown in FIG. 11, outer moving cells 702-706 and backhaul moving cells 708 and 710 may perform parameter exchange in stage 1120, such as by using their cell interfaces 816 and 816 to exchange parameters over the signaling connections. These parameters may be related to the local input data used as input by trajectory processors 818 and 918 of outer moving cells 702-706 and backhaul moving cells 708 and 710 for their outer and backhaul trajectory algorithms, respectively. For example, the parameters can include similar information to the input data, such as data rate requirements of the moving cells, the positions of the moving cells, the target areas assigned to the moving cells, recent radio measurements obtained by the moving cells, and/or details about the radio capabilities of the moving cells. The parameters can also include the coarse trajectories assigned to the moving cells by the central trajectory algorithm. In some aspects, outer moving cells 702-706 and backhaul moving cells 708 and 710 may also receive parameters from other locations, such as from the radio access network (e.g., network access node 712). In some aspects, backhaul moving cells 708 and 710 may exchange parameters directly with each other.

After obtaining the parameters, cell interfaces 816 and 916 may provide the parameters to trajectory processors 818 and 918. With exemplary reference to trajectory processor 818 of outer moving cell 702, trajectory processor 818 may use the parameters as local input data for the outer trajectory algorithm. In some aspects, trajectory processor 818 may also use other information as the local input data, such as radio measurements performed by baseband subsystem 806 as well as its current coarse trajectory assigned by central trajectory controller 714. Trajectory processor 818 may then perform local optimization of its trajectory and routing in stage 1122 by executing the outer trajectory algorithm in stage 1122. Likewise, with exemplary reference to trajectory processor 918 of backhaul moving cell 708, trajectory processor 918 may use the parameters as local input data for the backhaul trajectory algorithm. Trajectory processor 918 may then perform local optimization of its trajectory and routing by executing the backhaul trajectory algorithm in stage 1122.

The outer and backhaul trajectory algorithms executed by outer moving cells 702-706 and backhaul moving cells 708 and 710 may be similar to the central trajectory algorithm executed by central trajectory controller 714. For example, in some aspects, the outer and backhaul trajectory algorithms may also function by determining trajectories and/or routings that increase or otherwise maximize an optimization criteria. In some aspects, the optimization criteria used by the outer and backhaul trajectory algorithms may be the same as the optimization criteria used by the central trajectory algorithm. In some aspects, the outer and backhaul trajectory algorithms may similarly use a statistical model of the radio environment to approximate the optimization criteria, such as a basic propagation model or a propagation model based on a radio map.

For example, in some aspects, the outer and backhaul trajectory algorithms may determine an updated trajectory and/or updated routing for the moving cell executing the trajectory algorithm that increases the optimization criteria (e.g., by incrementally stepping parameters to guide a function of the optimization criteria toward a maximum value). Accordingly, in comparison to the central trajectory algorithm, which concurrently determines coarse trajectories and/or initial routings for multiple moving cells, the outer and backhaul trajectory algorithms may separately focus on the individual moving cell executing the trajectory algorithm. For example, trajectory processor 918 of backhaul moving cell 708 may attempt to determine an updated trajectory for backhaul moving cell 708 that increases or maximizes the function of the optimization criteria based on the position of backhaul moving cell 708. As the function of the optimization criteria (e.g., supported data rate and/or link quality metric of the backhaul relaying paths) depends on both fronthaul links 716-720 and backhaul links 722 and 724, trajectory processor 918 may determine an updated trajectory that yields an optimal balance between fronthaul and backhaul links (and thus increases or maximizes the function of the optimization criteria).

In some aspects, trajectory processors 818 and 918 of the moving cells may execute stage 1122 in an alternating manner. For example, dual-phased optimization can be used, where outer moving cells 702-706 and backhaul moving cells 708 and 710 may alternate between optimizing the trajectories of outer moving cells 702-706 and the trajectories of backhaul moving cells 708-710. In this example, the trajectory processors 818 of outer moving cells 702-706 may be configured to execute the outer trajectory algorithm using their current trajectory (e.g., the coarse trajectory), current routing, and relevant parameters from stage 1120 as the local input data for the outer trajectory algorithm. The outer trajectory algorithm may be configured to, using this local input data, determine an update to its current trajectory that steps the function of the optimization criteria toward a maximum value (e.g., by some incremental step). As described for the central trajectory algorithm, this can be done using gradient descent or another optimization algorithm. The outer trajectory algorithm can also determine an updated routing (e.g., if the updated trajectory would lead to a better routing for the optimization criteria).

Accordingly, each of outer moving cells 702-706 may determine a respective updated trajectory and/or updated routing. Then, outer moving cells 702-706 may perform another round of parameter exchange by sending the updated trajectories and/or routing to backhaul moving cells 708 and 710. Backhaul moving cells 708 and 710 may then use these updated trajectories and/or routing, in addition to any other relevant parameters, as local input data for the backhaul trajectory algorithm. Trajectory processors 916 of backhaul moving cells 708 and 710 may therefore execute the backhaul trajectory algorithm using this local input data to determine updated trajectories for backhaul moving cells 708 and 710. For example, as the trajectories of outer moving cells 702-706 have changed to the updated trajectories, the backhaul trajectory algorithm may be configured to determine updated trajectories for backhaul moving cells 708 and 710 that increase (e.g., maximize) the optimization criteria given the updated trajectories of outer moving cells 702-706. The backhaul trajectory algorithm may also be configured to change the routings, e.g., to change the updated routings determined by outer moving cells 702-710 to new updated routings that optimize the updated trajectories of backhaul moving cells 708 and 710.

After backhaul moving cells 708 and 710 have determined their own updated trajectories and/or updated routings, backhaul moving cells 708 and 710 may perform another round of parameter exchange and send their updated trajectories and/or updated routings to outer moving cells 702-706. Outer moving cells 702-706 may then again execute the outer trajectory algorithm using these updated trajectories and/or updated routings from backhaul moving cells 708 and 710 to determine new updated trajectories and/or routings that increase the optimization criteria. This dual-phased optimization may continue to repeat over time. In some aspects, an aggregate metric across both outer and backhaul can be used to steer the trajectories away from diverging in one direction. In some aspects, central trajectory controller 714 may periodically re-execute the central trajectory algorithm and provide new coarse trajectories and/or new initial routings to outer moving cells 702-706 and backhaul moving cells 708 and 710. This can be viewed as a type of periodic reorganization, where central trajectory controller 714 periodically reorganizes outer moving cells 702-706 and backhaul moving cells 708 and 710 in a centralized manner.

The local optimization is not limited to such dual-phased optimization approaches. In some aspects, outer moving cells 702-706 and backhaul moving cells 708 and 710 may execute their trajectory algorithms to update their trajectories and/or routing in an alternating or round-robin fashion, e.g., one of outer moving cells 702-706 and backhaul moving cells 708 and 710 at a time or other appropriate coordination implementation. In some aspects, one of outer moving cells 702-706, referred to here as a master outer moving cell, may assume the responsibility of determining updated trajectories and/or routing for one or more (or all) of the rest of outer moving cells 702-706. Accordingly, similarly to the central trajectory algorithm that concurrently evaluated trajectories for multiple outer moving cells, the master outer moving cell may execute an outer trajectory algorithm that concurrently determines updated trajectories and/or updated routings for multiple outer moving cells (e.g., by determining updated trajectories that maximize the optimization criteria). The master outer moving cell may then transmit the updated trajectories and/or routings to the other outer moving cells, which may then move according to the updated trajectories. This can similarly be applied for backhaul moving cells, where one of backhaul moving cells 708 or 710 may assume the role of master backhaul moving cell and determine updated trajectories and/or updated routings for multiple (or all) backhaul moving cells.

In some cases, the use of local optimization may lead to better performance. For example, as previously indicated outer moving cells 702-706 and backhaul moving cells 708 and 710 may be configured to exchange parameters prior to and between rounds of local optimization. These parameters can include current radio measurements, which can be more accurate indicators of the radio environment than the basic propagation model and/or radio maps used by central trajectory controller 714. Accordingly, in some cases, the local optimization may be based on a more accurate reflection of the actual radio environment, and may therefore lead to better optimization criteria (e.g., better values of the metric being used as the optimization criteria) in practice.

Furthermore, in some aspects the use of local optimization may result in a more advantageous division of processing. For example, outer moving cells 702-706 and backhaul moving cells 708 and 710 may not be able to support the same processing power as a server-type component such as central trajectory controller 714. Accordingly, depending on their design constraints, it may not be feasible for outer moving cells 702-706 and backhaul moving cells 708 and 710 to execute a full trajectory algorithm to locally determine their trajectories from scratch. The use of local optimization may enable central trajectory controller 714 to determine a high-level plan for trajectories while also allowing outer moving cells 702-706 and backhaul moving cells 708 and 710 to make local adjustments as needed (e.g., that are only adjustments as compared to determining new trajectories from the start).

Additionally, in some cases outer moving cells 702-706 and backhaul moving cells 708 and 710 may be able to adjust their trajectories with a lower latency than would occur if central trajectory controller 714 had full control over their trajectories (e.g., without any local optimization). For example, outer moving cells 702-706 and backhaul moving cells 708 and 710 can be configured to make local adjustments to their trajectories (e.g., based on their radio measurements and other parameter exchange) without having to first send data back to central trajectory controller 714 and subsequently waiting to receive a response.

Figure 13:
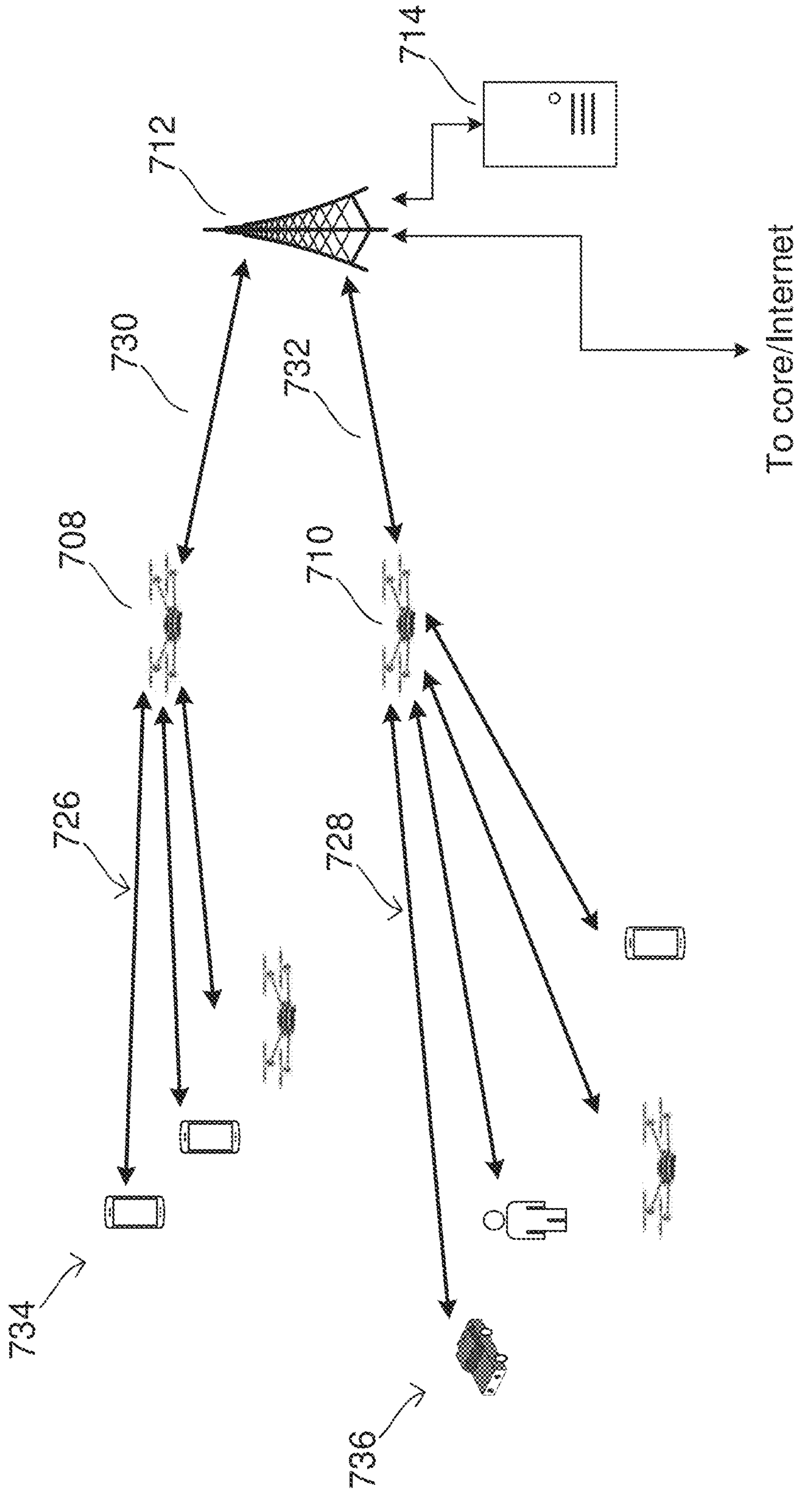
FIG. 13 shows an exemplary network scenario with backhaul moving cells according to some aspects.

In the exemplary context of FIG. 11, the central trajectory algorithm may exert positioning control over both outer moving cells 702-706 and backhaul moving cells 708 and 710. As previously indicated, other aspects of this disclosure are also directed to cases where central trajectory controller 714 exerts control over backhaul moving cells 708 and 710 but not outer moving cells 702-706. Other cases, for example, where backhaul moving cells 708 and 710 are present without any outer moving cells are also applicable. FIG. 13 shows one such example according to some aspects, where backhaul moving cells 708 and 710 may provide backhaul to various terminal devices and/or outer moving cells 734 and 736 (e.g., that are not controllable by central trajectory controller 714).

In these exemplary cases, central trajectory controller 714 may be able to provide coarse trajectories and/or routing to backhaul moving cells 708 and 710, but not to any of the served devices 734 and 736 (e.g., outer moving cells and/or terminal devices) as they may not be under the positional control of central trajectory controller 714. FIG. 14 shows exemplary message sequence chart 1400 according to some aspects, which relates to these cases. As shown in FIG. 14, central trajectory controller 714 and backhaul moving cells 708 and 710 may first perform initialization and setup in stage 1402 (e.g., in the same or similar manner as stage 1102). Central trajectory controller 714 may then compute coarse trajectories and initial routing using the input data and central trajectory algorithm in stage 1404.

As central trajectory controller 714 is only providing coarse trajectories for backhaul moving cells 708 and 810 in these aspects, the central trajectory algorithm may be different. For example, in the previous context of FIG. 11, central trajectory controller 714 could evaluate the optimization criteria using specific positions of outer moving cells 702-706 (e.g., approximate the supported data rate or link quality metric given specific locations of outer moving cells 702-706 using the statistical model of the radio environment). However, in the context of FIG. 14, the central trajectory algorithm may not be able to assume specific positions of the served devices, and may instead use statistical estimations of their positions.

For example, in some aspects, the central trajectory algorithm may use the concept of a virtual node to statistically estimate the position of served devices 734-736. For example, in some aspects input data repository 1004 of central trajectory controller 714 may be configured to collect statistical density information about served devices 734-736. In some cases, the statistical density information can be statistical geographic density information, such as basic information such as the reported positions of served devices 734-736 and/or more complex information such as a heat map indicating a density of served devices 734-736 over time. In some cases, the statistical density information can additionally or alternatively include statistical traffic density information, which indicates the geographic density of data traffic. For example, if there are only a few served devices in a given area but these served devices are generating considerable data traffic, the statistical traffic density information can indicate the increased data traffic in this area (whereas strictly geographic density information would indicate only that there are a few served devices). This statistical density information can be reported to central trajectory controller 714 by backhaul moving cells 708 and 710 (e.g., based on their own radio measurements or position reporting), from the radio access network, and/or from external network locations.

Accordingly, when executing the central trajectory algorithm in stage 1404, trajectory processor 1006 may use this statistical density information as input data. In some aspects, the central trajectory algorithm may utilize a similar optimization algorithm as described above for stage 1106. For example, this can include applying gradient descent (or another optimization algorithm) to determine coarse trajectories and/or routing for backhaul moving cells 708 and 710 that increase or maximize an optimization criteria, where the optimization criteria is represented by a function based on the statistical model of the radio environment. However, in contrast to the case of FIG. 11, the central trajectory algorithm may not have specific locations of served devices 734-736, and may instead use the statistical density information to characterize virtual served devices. For example, the central trajectory algorithm can approximate the positions of the virtual served devices using the statistical density information (e.g., the expected position of virtual served devices), and then use these positions when determining coarse trajectories and/or initial routings for backhaul moving cells 708 and 710. As served devices 734-736 are not under the positional control of central trajectory controller 714, the central trajectory algorithm may only determine coarse trajectories and/or initial routing for backhaul moving cells 708 and 710 (where the initial routings assign backhaul moving cells 708 and 710 to provide backhaul for certain of served devices 734-736). Similar to the case of FIG. 11, the optimization criteria can be, for example, supported data rate and/or link quality metric (including aggregate values and probabilities that the optimization criteria is above a predefined threshold for each backhaul relaying path).

As shown in FIG. 13, the backhaul relaying paths (on which the optimization criteria are based) may include a fronthaul link and a backhaul link. For example, backhaul moving cell 708 may have fronthaul links 726 with its served devices 734 and backhaul link 730 with network access node 712 while backhaul moving cell 708 may have fronthaul links 728 with its served devices 736 and backhaul link 732 with network access node 712. As the function of the optimization criteria depends on both fronthaul and backhaul links, the coarse trajectories determined by central trajectory controller 714 for backhaul moving cells 708 and 710 may therefore position backhaul moving cells 708 and 710 to jointly optimize fronthaul links 726-728 and backhaul links 730-732 (e.g., to yield fronthaul and backhaul links that increase or maximize the function of the optimization criteria). The coarse trajectories may therefore jointly balance between strong fronthaul and strong backhaul links.

After determining the coarse trajectories and/or initial routing in stage 1404, central trajectory controller 714 may send the coarse trajectories and/or initial routings to backhaul moving cells 708 and 710 (e.g., using signaling connections between cell interface 1002 of central trajectory controller 714 and its peer central interfaces 914 of backhaul moving cells 708 and 710). Backhaul moving cells 708 and 710 may then establish connectivity with served devices 734-736 in stage 1408 (e.g., using the initial routing provided by central trajectory controller 714, or by determining their own initial routings). If any of served devices 734-736 are outer moving cells, these served devices may perform an outer task in stage 1410. Served devices 734-736 may then transmit uplink data to backhaul moving cells 708 and 710 using fronthaul links 726-728 in stage 1412, and backhaul moving cells 708 and 710 may transmit the uplink data to the radio access network in stage 1414 on backhaul links 730 and 732. Stages 1412 and 1414 can also include transmission and relaying of downlink data from the radio access network to served devices 734-736 via the backhaul relaying path provided by backhaul moving cells 708 and 710. Backhaul moving cells 708 and 710 may move according to their respectively assigned coarse trajectories during stages 1412 and 1414.

Similar to the case of FIG. 11, the coarse trajectories and/or initial routings provided by central trajectory controller 714 may form a high-level plan that can be locally optimized. Accordingly, as shown in FIG. 14, backhaul moving cells 708 and 710 may perform parameter exchange with served devices 734-736 in stage 1416. In some aspects, served devices 734-736 may provide position reports to backhaul moving cells 708 and 710 in stage 1416, which backhaul moving cells can use to update the statistical density information of served devices 734-736. This updated statistical density information may be part of the local input data for the backhaul trajectory algorithm. The parameter exchange that forms the local input data can include any of data rate requirements of served devices 734-736, the positions of served devices 734-736, the target areas assigned to served devices 734-736, recent radio measurements obtained by served devices 734-736, and/or details about the radio capabilities of served devices 734-736.

Backhaul moving cells 708 and 710 may then perform local optimization of the trajectories and/or routing in stage 1418 by executing the backhaul trajectory algorithm on the local input data. The backhaul trajectory algorithm may calculate updated trajectories and/or updated routings based on the local input data. After determining the updated trajectories and/or updated routings, backhaul moving cells 708 and 710 may move according to the updated trajectories and/or perform backhaul relaying according to the updated routings. In some aspects, backhaul moving cells 708 and 710 may repeat stages 1412-1418 over time, and may thus repeatedly execute the backhaul trajectory algorithm using new local input data to update the trajectories and/or routings. As the local input data may reflect the actual radio environment, in some cases the local optimization can improve performance.

In some aspects, backhaul moving cells 708 and 710 may use dual-phased optimization to alternate between optimizing fronthaul links 726-728 and backhaul links 730-732. Using backhaul moving cell 708 as an example, trajectory processor 918 may alternate between determining an updated trajectory that optimizes fronthaul links 726 (e.g., based on link strength, supported data rate, and/or link quality metric) and determining an updated trajectory that optimizes backhaul links 730. By alternating between optimizing fronthaul and backhaul, trajectory processor 918 may optimize the function of the optimization criteria (which can depend on both fronthaul and backhaul links).

Various aspects of this disclosure consider one or more additional extensions to these systems. In some aspects, one or more of outer moving cells 702-706 and backhaul moving cells 708 and 710 may be configured to support multiple simultaneous radio links. Accordingly, instead of only using a single radio link for the fronthaul or backhaul link, one or more of the moving cells may be configured to transmit and/or receive using multiple radio links. In such cases, central trajectory controller 714 may have prior knowledge of the multi-link capabilities of the moving cells. The central trajectory algorithm may therefore use channel statistics representing the aggregate capacity across the multiple links when determining the coarse trajectories and/or initial routings. For example, if the data rate of a first available link of a moving cell is $R_1$ and the data rate of a second available link of the moving cell is $R_2$, the central trajectory algorithm may assume that the data rate of both links together is $R_1+R_2$ (e.g., treated independently, thus making the aggregate capacity additive). Similarly, if the moving cells support mmWave, the central trajectory algorithm can model the multiple beams from mmWave as multiple isolated links (e.g., by generating multiple antenna beams with mmWave antenna arrays).

In some aspects, the backhaul routing paths may introduce redundancy using multiple links. For example, outer moving cells 702-706 or the served devices may use multiple backhaul routing paths (e.g., with different fronthaul links and/or backhaul links), and may transmit the same data redundantly over the multiple backhaul routing paths. This could be done as packet-level redundancy.

In some aspects, outer moving cells 702-706 and/or backhaul moving cells 708 and 710 may use transmission or reception cooperation to improve radio performance. For example, the central trajectory algorithm may designate a cluster of outer moving cells or backhaul moving cells to cooperate as a single group, and can then determine coarse trajectories for the cluster to support transmit and/or receive diversity. The central trajectory algorithm can then treat the cluster as a composite node (e.g., using an effective rate representation). Once the central trajectory algorithm determines the coarse trajectory of the cluster, the moving cells in the cluster can use their outer or backhaul trajectory algorithms to adjust their trajectories so that the effective centroid location of the cluster remains constant.

In some aspects, the central, outer, and backhaul trajectory algorithms may use features described in J. Stephens et. al. "Concurrent control of mobility and communication in multi-robot system," (IEEE Transactions on Robotics, October, 2017), J. L. Ny et. al, "Adaptive communication constrained deployment of unmanned aerial vehicle," (IEEE JSAC, 2012), M. Zavlanos et. al. "Network integrity in mobile robotic network," (IEEE Trans. On Automatic Control, 2013), and/or J. Fink et. al., Motion planning for robust wireless networking," (IEEE Conf. On Robotics & Automation, 2012).

Figure 15:
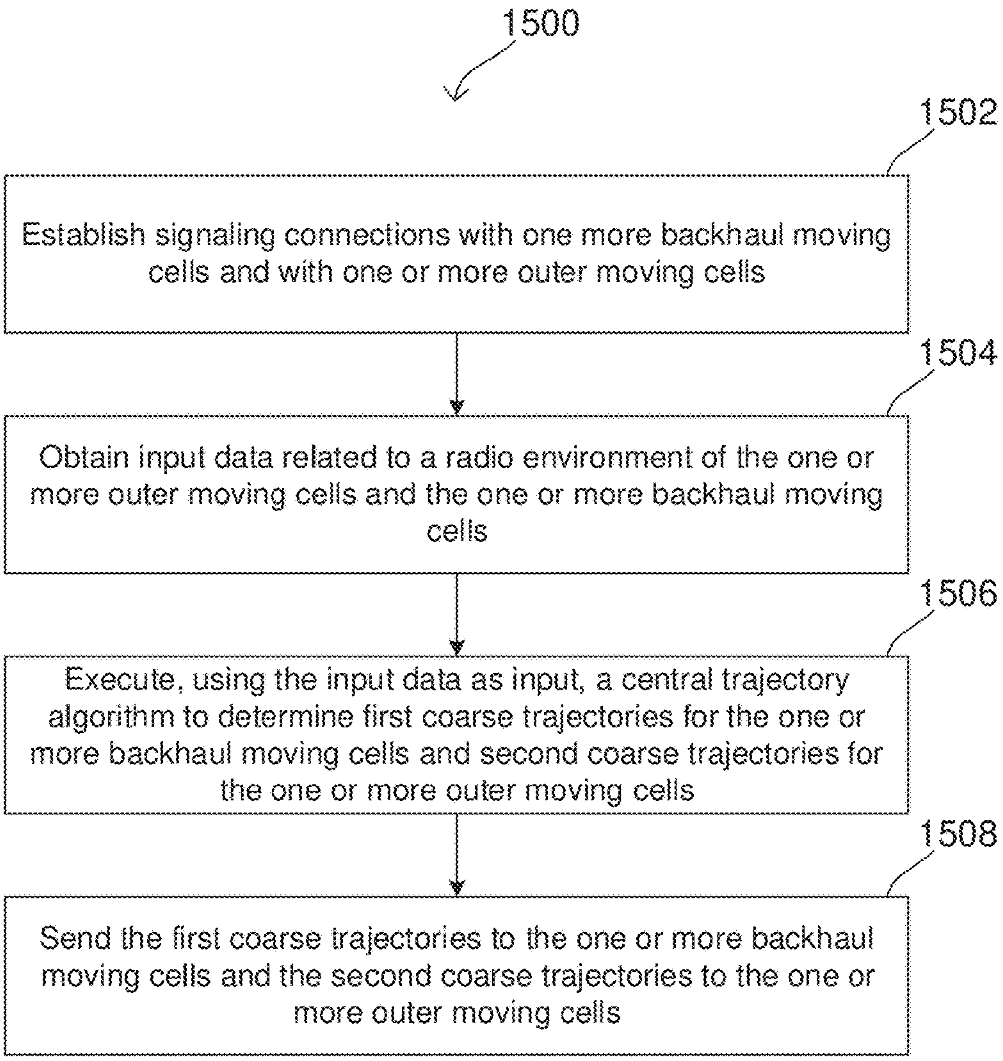
FIG. 15 shows an exemplary method for a central trajectory controller according to some aspects.

FIG. 15 shows exemplary method 1500 for managing trajectories for moving cells according to some aspects. As shown in FIG. 15, method 1500 including establishing signaling connections with one or more backhaul moving cells and with one or more outer moving cells (1502), obtaining input data related to a radio environment of the one or more outer moving cells and the one or more backhaul moving cells (1504), executing, using the input data as input, a central trajectory algorithm to determine first coarse trajectories for the one or more backhaul moving cells and second coarse trajectories for the one or more outer moving cells (1506), and sending the first coarse trajectories to the one or more backhaul moving cells and the second coarse trajectories to the one or more outer moving cells (1508).

Figure 16:
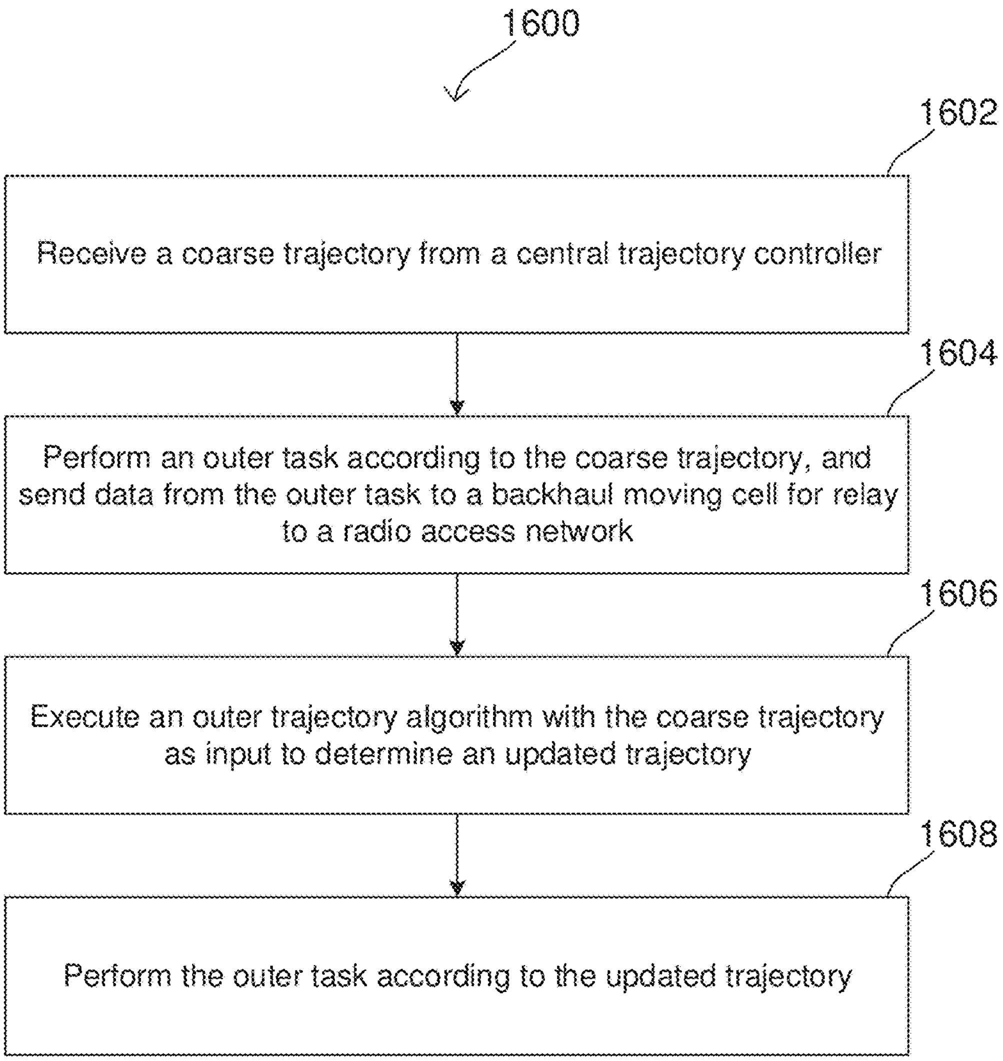
FIG. 16 shows an exemplary method for an outer moving cell according to some aspects.

FIG. 16 shows exemplary method 1600 for operating an outer moving cell according to some aspects. As shown in FIG. 16, method 1600 includes receiving a coarse trajectory from a central trajectory controller (1602), performing an outer task according to the coarse trajectory, and sending data from the outer task to a backhaul moving cell for relay to a radio access network (1604), executing an outer trajectory algorithm with the coarse trajectory as input to determine an updated trajectory (1606), and performing the outer task according to the updated trajectory (1608).

Figure 17:
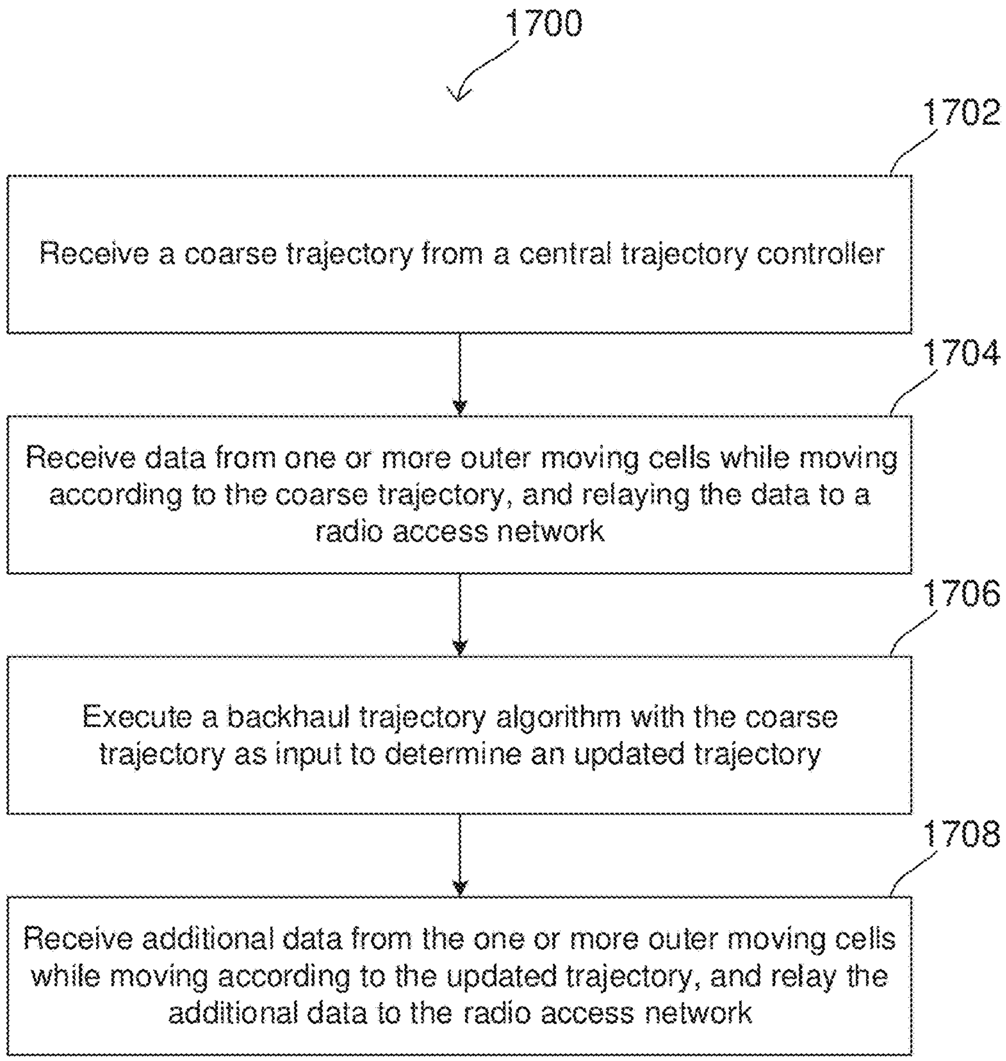
FIG. 17 shows an exemplary method for a backhaul moving cell according to some aspects.

FIG. 17 shows exemplary method 1700 for operating a backhaul moving cell according to some aspects. As shown in FIG. 17, method 1700 includes receiving a coarse trajectory from a central trajectory controller (1702), receiving data from one or more outer moving cells while moving according to the coarse trajectory, and relaying the data to a radio access network (1704), executing a backhaul trajectory algorithm with the coarse trajectory as input to determine an updated trajectory (1706), and receiving additional data from the one or more outer moving cells while moving according to the updated trajectory, and relaying the additional data to the radio access network (1708).

Figure 18:
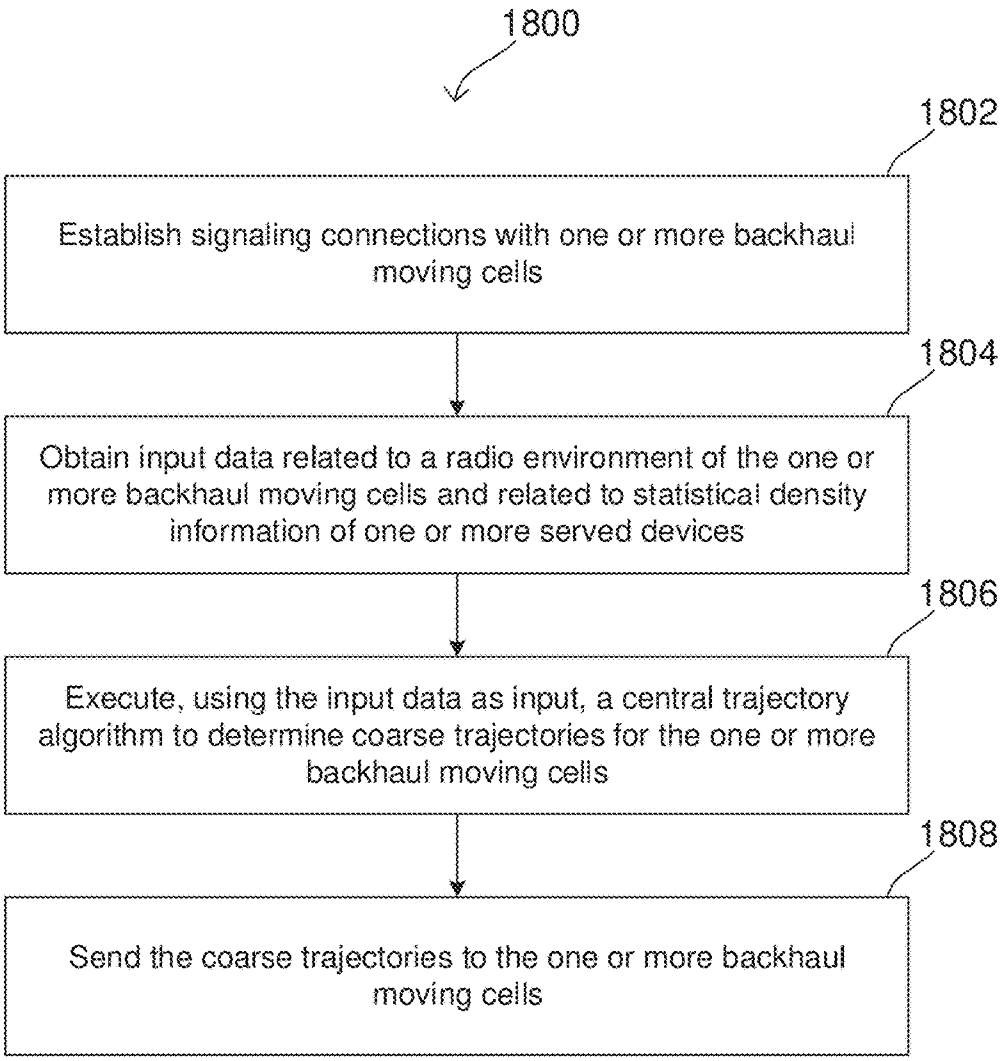
FIG. 18 shows an exemplary method for a central trajectory controller according to some aspects.

FIG. 18 shows exemplary method 1800 for managing trajectories for moving cells according to some aspects. As shown in FIG. 18, method 1800 includes establishing signaling connections with one or more backhaul moving cells (1802), obtaining input data related to a radio environment of the one or more backhaul moving cells and related to statistical density information of one or more served devices (1804), executing, using the input data as input, a central trajectory algorithm to determine coarse trajectories for the one or more backhaul moving cells (1806), and sending the coarse trajectories to the one or more backhaul moving cells (1808).

Figure 19:
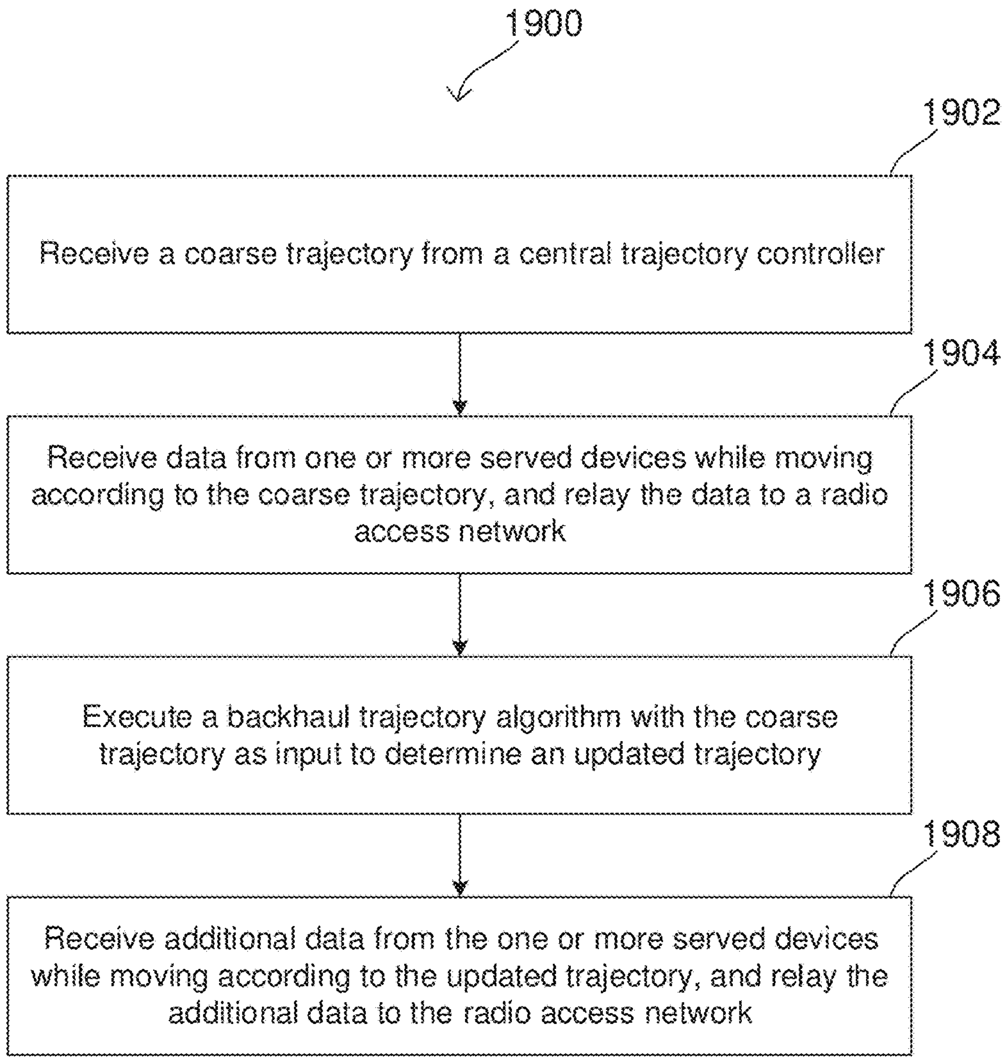
FIG. 19 shows an exemplary method for a backhaul moving cell according to some aspects.

FIG. 19 shows exemplary method 1900 for operating a backhaul moving cell according to some aspects. As shown in FIG. 19, method 1900 includes receiving a coarse trajectory from a central trajectory controller (1902), receiving data from one or more served devices while moving according to the coarse trajectory, and relaying the data to a radio access network (1904), executing a backhaul trajectory algorithm with the coarse trajectory as input to determine an updated trajectory (1906), and receiving additional data from the one or more served devices while moving according to the updated trajectory, and relaying the additional data to the radio access network (1908).

Mobile Access Nodes for Indoor Coverage

Similar techniques and trajectory algorithms can also be applied for indoor coverage use cases. For example, terminal devices may operate in private residences and commercial facilities. This can include terminal devices, such as handheld mobile phones, as well as connectivity-enable devices like televisions, printers, and appliances. In some cases, these terminal devices may follow predictable usage patterns within the indoor coverage areas. Several examples include users that congregate in a living room are of a private residence in the evening, meeting rooms that are frequently used during work hours in an office building, public transit stations that users wait at during commuting hours, or a stadium with many users of mobile access nodes.

Figure 20:
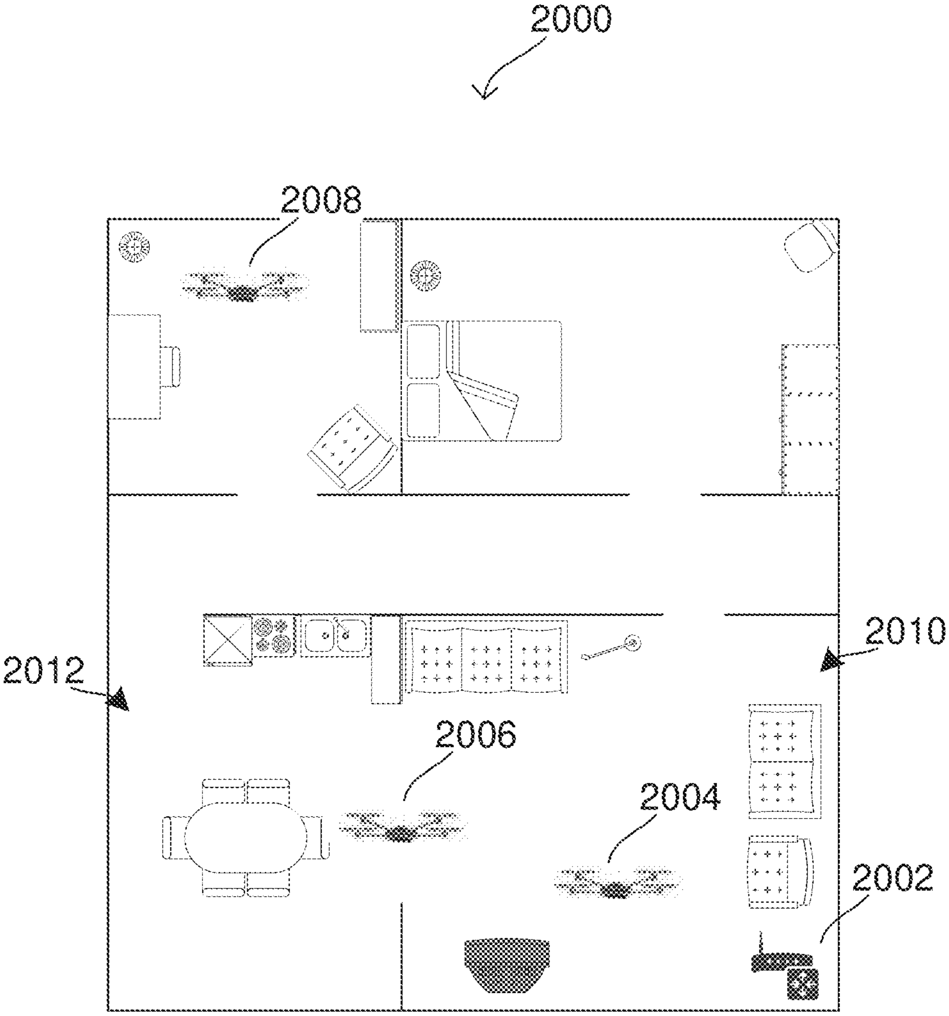
FIG. 20 shows an exemplary indoor coverage area according to some aspects.

FIG. 20 shows an exemplary scenario using building 2000 according to some aspects. In the example of FIG. 20, building 2000 may be a private residence. Users carrying terminal devices may exhibit predictable usage patterns inside building 2000. For example, the users may frequently be in building 2000 during evening hours and weekends and may leave building 2000 during work and/or school hours. Accordingly, user demand may be higher in evenings and weekends and lower during work and/or school hours. Furthermore, in some cases, the users may follow predictable usage patterns in terms of where and when they are located in building 2000. For example, the users may frequently congregate in dining room 2012 during early morning and early evening hours for breakfast and dinner. The users may also congregate in living room 2010 during late evening hours.

Users in various private and public coverage areas may similarly follow usage patterns that are predictable. Accordingly, in some aspects a network of mobile access nodes may follow trajectories that are based on these predictable usage patterns. Instead of positioning themselves in a purely responsive manner, the mobile access nodes may proactively position themselves according to where users are likely to be. In some cases, this type of trajectory control can improve coverage and service to users.

As shown in FIG. 20, mobile access nodes 2004, 2006, and 2008 can be deployed within building 2000. Mobile access nodes 2004-2008 may be configured to provide access to users within this target coverage area, and may therefore position themselves within building 2000 along trajectories that can effectively serve the users. Anchor access point 2002 may also be deployed within building 2000, and may be configured to provide control functions for mobile access nodes 2004-2008.

Figure 21:
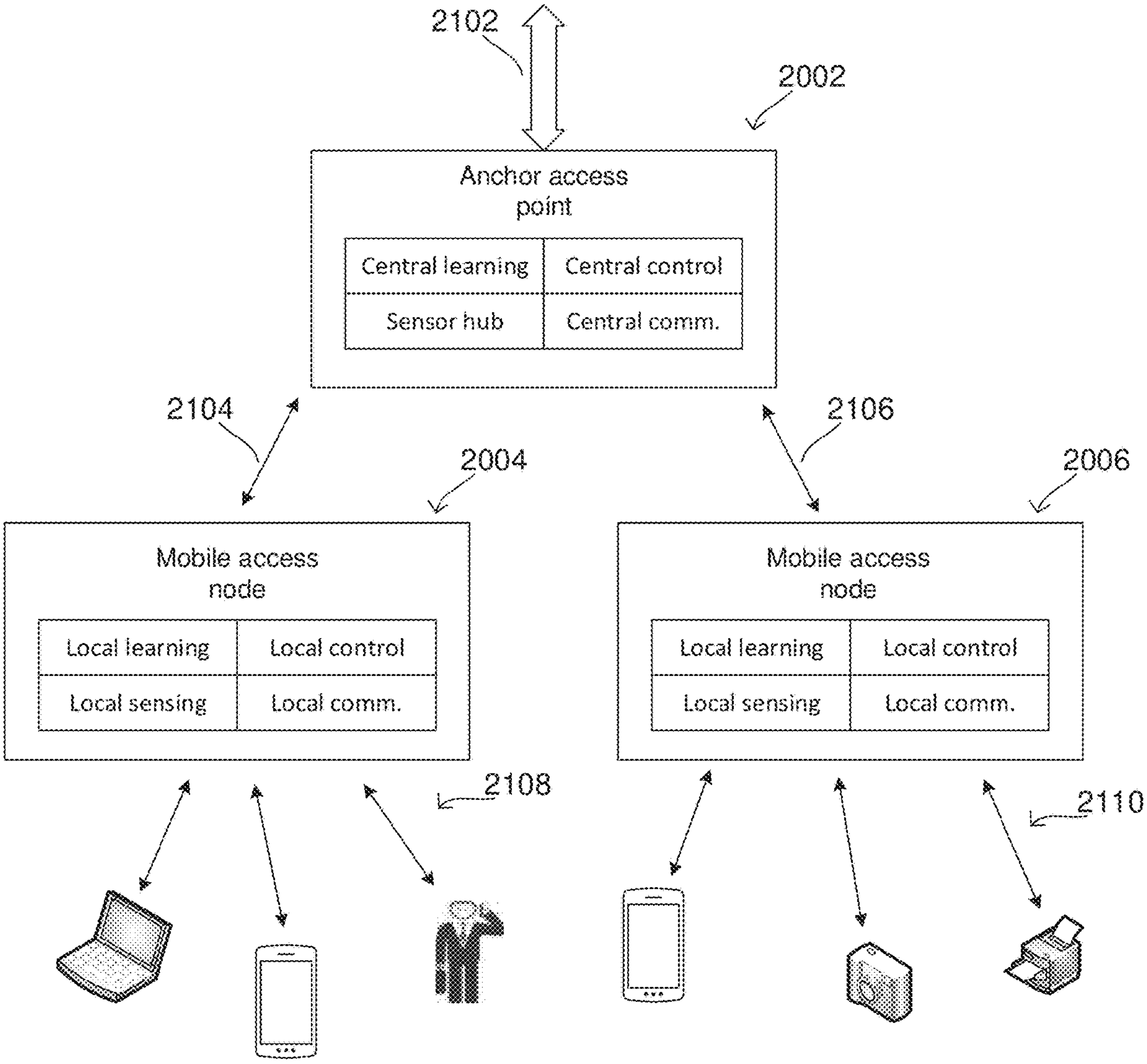
FIG. 21 shows a diagram for mobile access nodes and an anchor access point according to some aspects.

FIG. 21 shows a basic diagram illustrating the functionality of anchor access point 2002 and mobile access nodes 2004 and 2006 according to some aspects. As shown in FIG. 21, anchor access point 2002 may interface with backhaul link 2102. Backhaul link 2102 may provide anchor access point 2002 with a connection to a core network, through which anchor access point 2002 may connect with various external data networks. Backhaul link 2102 can be a wired or wireless link.

Anchor access point 2002 may interface with mobile access nodes 2004 and 2006 over anchor links 2104 and 2106. Anchor links 2104 and 2106 may be wired or wireless links. Accordingly, mobile access nodes 2004 and 2006 may be free to move and maintain anchor links 2104 and 2106 with anchor access point 2002.

As previously indicated, mobile access nodes 2004 and 2006 may provide access to various served terminal devices (e.g., users). As shown in FIG. 21, mobile access nodes 2004 and 2006 may interface with these served terminal devices over fronthaul links 2108 and 2110. Accordingly, in the downlink direction, mobile access nodes 2004 and 2006 may receive downlink data addressed to the served terminal devices from anchor access point 2002 over anchor links 2104 and 2106. Mobile access nodes 2004 and 2006 may then perform any applicable processing on the downlink data and subsequently transmit the downlink data to the served terminal devices, as appropriate, over fronthaul links 2108 and 2110. In the uplink direction, mobile access nodes 2004 and 2006 may receive uplink data originating from the served terminal devices over fronthaul links 2108 and 2110. Mobile access nodes 2004 and 2006 may then perform any applicable processing on the uplink data and then transmit the uplink data to anchor access point 2002 over anchor links 2104 and 2106.

As indicated in FIG. 21, anchor access point 2002 and mobile access nodes 2004 and 2006 may have certain functionalities related to the trajectory control. With reference to anchor access point 2002, anchor access point 2002 may provide, for example, central learning, central control, sensor hub, and central communication (the structure of which is further described below for FIG. 23). Mobile access nodes 2004 and 2006 may provide, for example, local learning, local control, local sensing, and local communication (the structure of which is further described below for FIG. 22).

Figure 22:
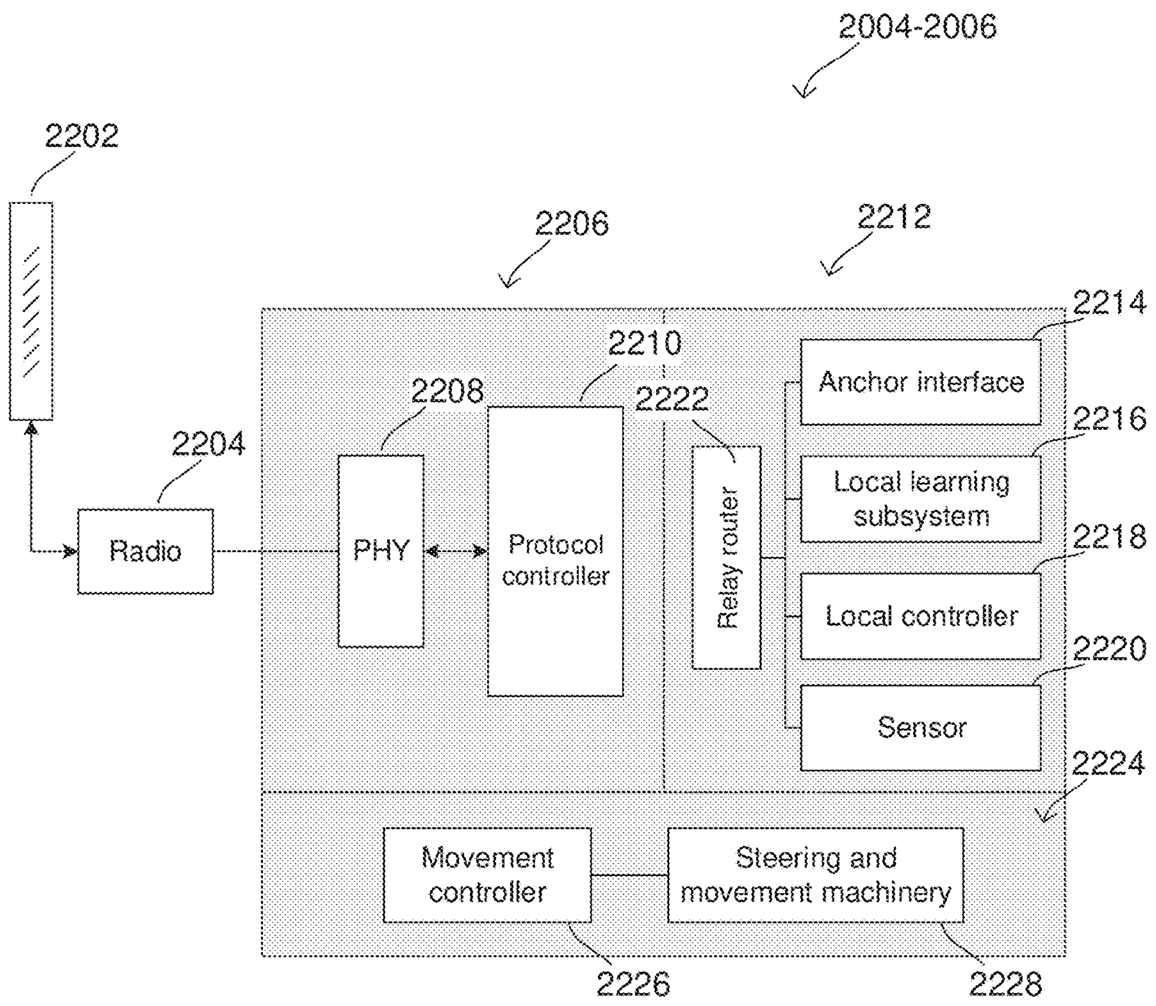
FIG. 22 shows an exemplary internal configuration of a mobile access node according to some aspects.
Figure 23:
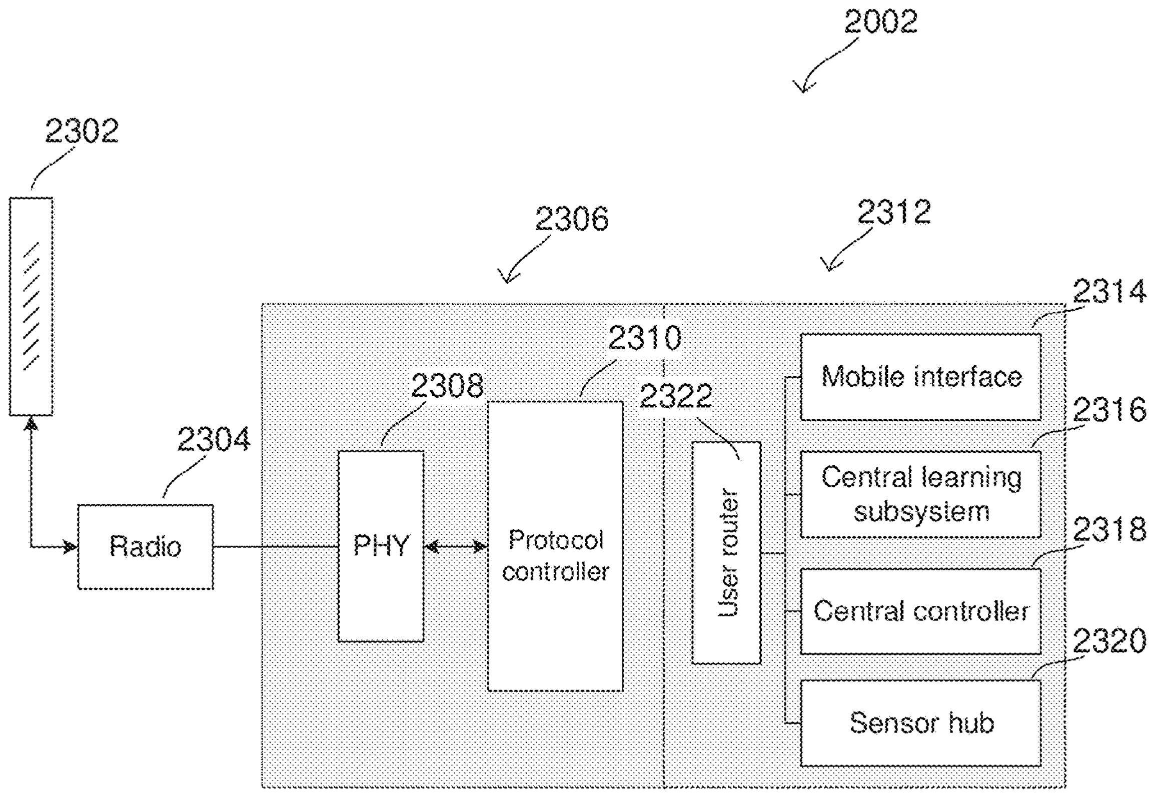
FIG. 23 shows an exemplary internal configuration of an anchor access point according to some aspects.

FIGS. 22 and 23 show exemplary internal configurations of mobile access nodes 2004 and 2006 and anchor access point 2002 according to some aspects. As shown in FIG. 22, mobile access nodes 2004 and 2006 may include antenna system 2202, radio transceiver 2204, baseband subsystem 2206 (including physical layer processor 2208 and protocol controller 2210), application platform 2212, and movement system 2224. Antenna system 2202, radio transceiver 2204, and baseband subsystem 2206 may be configured in a similar or same manner as antenna system 302, radio transceiver 304, and baseband subsystem 306 as shown and described for network access node 110 in FIG. 3. Antenna system 2202, radio transceiver 2204, and baseband subsystem 2206 may therefore be configured to perform radio communications to and from anchor access point 2002.

As shown in FIG. 22, application platform 2212 may include anchor interface 2214, local learning subsystem 2216, local controller 2218, sensor 2220, and relay router 2222. In some aspects, anchor interface 2214 may be a processor configured to communicate with a peer mobile interface of an anchor access point (e.g., mobile interface 2314 as described below for anchor access point 2002). Anchor interface 2214 may therefore be configured to transmit data to anchor access points by providing the data to baseband subsystem 2206, which may then process the data to produce RF signals. RF transceiver 2204 may then wirelessly transmit the RF signals via antenna system 2202. The anchor access point may then receive and process the wireless RF signals to recover the data at its mobile interface. Anchor interface 2214 may receive data from the peer mobile interface through the reverse of this process. Anchor interface 2214 may therefore be configured to communicate with peer mobile interfaces of anchor access points over a logical connection that uses wireless transmission for physical transport. Further references to communication between mobile access nodes 2004 and 2006 and anchor access point 2002 may involve this type of transmission between anchor interface 2214 and the peer mobile interface.

Local learning subsystem 2216 may be a processor configured for learning-based processing. For example, local learning subsystem 2216 may be configured to execute program code for a pattern recognition algorithm, which can be, for example, an artificial intelligence (AI) algorithm that uses input data about served terminal devices to recognize predictable usage patterns. This can include sensing data that indicates the positions of served terminal devices. Local learning subsystem 2216 may comprises a processor that is capable of being configured to execute a propagation modeling algorithm for predicting radio conditions and/or an access usage prediction algorithm for predicting user behavior with radio access. The operation of these algorithms is described below and in the figures.

Local controller 2218 may be a processor configured to communicate with a counterpart central controller of anchor access point 2002. As further described below, local controller 2218 may be configured to receive and carry out control instructions provided by the central controller, execute a local trajectory algorithm to determine trajectories for the mobile access nodes, and determine scheduling and resource allocations, fronthaul radio access technology selections, and/or routings.

Sensor 2220 may be a sensor configured to perform sensing and to obtain sensing data. In some aspects, sensor 2220 may be a radio measurement engine configured to obtain radio measurements as sensing data. In some aspects, sensor 2220 can be image or video sensors or any type of proximity sensor (e.g., radar sensors, laser sensors, motion sensors, etc.) that can obtain sensing data that indicates positions of the served terminal devices.

Relay router 2222 may be a processor configured to communicate with a counterpart user router of anchor access point 2002. As further described below, the user router may send relay router 2222 downlink user data for the served terminal devices, which relay router may then transmit to the served terminal devices via baseband subsystem 2206. Relay router 2222 may also receive uplink user data from the served terminal devices, and may transmit the uplink user data to the user router of anchor access point 2002.

As shown in FIG. 23, anchor access point 2002 may include antenna system 2302, radio transceiver 2304, baseband subsystem 2306 (including physical layer processor 2308 and protocol controller 2310), and application platform 2312. Antenna system 2202, radio transceiver 2204, and baseband subsystem 2206 may be configured in a similar or same manner as antenna system 302, radio transceiver 304, and baseband subsystem 306 as shown and described for network access node 110 in FIG. 3. Antenna system 2302, radio transceiver 2304, and baseband subsystem 2306 may therefore be configured to perform radio communications to and from mobile access nodes 2004 and 2006.

As shown in FIG. 23, application platform 2312 may include mobile interface 2314, central learning subsystem 2316, central controller 2318, sensor hub 2320, and user router 2322. As previously introduced regarding anchor interface 2214, mobile interface 2314 may be a processor configured to communicate with anchor interface 2214 of mobile access nodes 2004 and 2006 on a logical connection that relies on wireless transmission for transport. Mobile interface 2314 may therefore transmit and receive signaling to and from its peer anchor interfaces 2214 at mobile access nodes 2004 and 2006.

Central learning subsystem 2316 may be a processor configured to execute, for example, a pattern recognition algorithm, propagation modeling algorithm, and/or access usage prediction algorithm. These algorithms can be AI algorithms that use input data about served terminal devices to predict user density, predict radio conditions, and predict user behavior for access usage. The operation thereof is further described below and by the figures.

Central controller 2318 may be a processor configured to determine control instructions for mobile access nodes 2004 and 2006. As further described below, the control instructions can include coarse trajectories, scheduling and resource allocations, fronthaul radio access technology selections, and/or initial routings. In some aspects, central controller 2318 may be configured to execute a central trajectory algorithm to determine coarse trajectories for mobile access nodes 2004 and 2006.

Sensor hub 2320 may be a server-type component configured to collect sensing data. The sensing data can be provided, for example, by the served terminal devices, mobile access nodes 2004 and 2006, and/or other remote sensors. Sensor hub 2320 may be configured to provide this sensing data to central learning subsystem 2316.

User router 2322 may be a processor configured to interface with relay router 2222 over a logical connection. User router 2322 may be configured to identify downlink user data addressed to served terminal devices, and to identify which mobile access node to send the downlink user data to. User router 2322 may then send the downlink user data to the relay router 2222 of the corresponding mobile access node. User router 2322 may also be configured to receive uplink user data from the relay routers 2222 of mobile access nodes 2004 and 2006, and to send the uplink user data along its configured path (e.g., through the core network and/or to an external network location).

Mobile access nodes 2004 and 2006 can have different capabilities in various aspects. For example, in some aspects, mobile access nodes 2004 and 2006 can have full cell functionality, including mobility control for terminal devices, scheduling and resource allocation, and physical layer processing. Accordingly, in these aspects, mobile access nodes 2004 and 2006 can act as full-service cells. For example, with reference to FIG. 22, protocol controller 2310 may be configured to handle the full cell protocol stack for both user and control planes. This can vary depending on the radio access technology or technologies supported by mobile access nodes. For example, in the case of LTE, protocol controller 2310 can be configured with PDCP, RLC, RRC, and MAC capabilities.

In other aspects, mobile access nodes 2004 and 2006 may have limited cell functionality (e.g., less than full cell functionality). As mobile access nodes 2004 and 2006 may therefore not have full cell functionality, anchor access point 2002 may provide the remaining cell functionality. For example, the protocol controllers 2210 of mobile access nodes 2004 and 2006 may be configured to handle some protocol stack layers and functions, while protocol controller 2310 of anchor access point 2002 may be configured to handle the remaining cell functionality. The specific distribution of cell functionality between mobile access nodes 2004 and 2006 versus anchor access point 2002 can vary in different aspects. For example, in some aspects protocol controllers 2210 of mobile access nodes 2004 and 2006 may handle scheduling and resource allocation (e.g., assignment of radio resources to served terminal devices for uplink and downlink) while protocol controller 2310 of anchor access point 2002 may handle mobility control (e.g., may handle handovers and other mobility management of terminal devices connected to mobile access nodes 2004 and 2006). In other aspects, protocol controllers 2210 of mobile access nodes 2004 and 2006 may be configured to handle some user plane functions (e.g., some of the radio access technology-dependent processing on user plane data) while protocol controller 2310 of anchor access point 2310 may be configured to handle the remaining user plane functions.

In other aspects, mobile access nodes 2004 and 2006 may only handle physical layer processing while anchor access point 2002 provides protocol stack cell functionality. Accordingly, protocol controller 2310 of anchor access point 2002 may be configured to handle mobility control and scheduling and resource allocation capabilities for the terminal devices served by mobile access nodes 2004 and 2006. Protocol controller 2310 of anchor access point 2002 may also be configured to handle user plane functions above the physical layer. Mobile access nodes 2004 and 2006 may therefore be configured to perform physical layer processing (with physical layer processors 2208) on data addressed to or originating from their respective served terminal devices, while protocol controller 2310 of anchor access point 2002 may be configured to perform the remaining user plane processing.

In some of these aspects, mobile access nodes 2004 and 2006 may therefore not include protocol controllers 2210. For example, as anchor access point 2002 may be configured to handle both the control and user plane protocol stack cell functionality, mobile access nodes 2004 and 2006 may not support protocol stack cell functionality and may therefore not include protocol controllers 2210. Instead, mobile access nodes 2004 and 2006 may include physical layer processors 2208 for performing physical layer processing.

In some aspects, anchor access point 2002 may handle physical layer and protocol stack cell functionality while mobile access nodes 2004 and 2006 handle only radio processing. Accordingly, protocol controller 2310 and physical layer processor 2308 of anchor access point 2002 may perform all of the physical layer and protocol stack processing, while radio transceivers 2204 and antenna systems 2202 of mobile access nodes 2004 and 2006 may perform radio processing. In some of these aspects, mobile access nodes 2004 and 2006 may therefore not include physical layer processors 2208 and protocol controllers 2210.

In some of these aspects, mobile access nodes 2004 and 2006 may function in a similar manner to remote radio heads (RRHs). These RRHs are normally deployed in distributed base station architectures, where a centralized baseband unit (BBU) performs baseband processing (including physical and protocol stack layers) and a remotely deployed RRH performs radio processing and wireless transmission. Accordingly, in these aspects, anchor access point 2002 may function in a manner similar to the BBUs (by performing physical and protocol stack cell processing.) while mobile access nodes 2004 and 2006 function in a manner similar to the RRHs (by performing radio processing and wireless transmission).

In some aspects, this distributed architecture for anchor access point 2002 and mobile access nodes 2004 and 2006 can use distributed RAN techniques, including Cloud RAN (C-RAN). For example, in C-RAN, the baseband processing for multiple base stations can be handled at a centralized location (e.g., at centralized core network servers). Similarly, anchor access point 2002 may be configured to handle the baseband processing for mobile access nodes 2004 and 2006 while mobile access nodes 2004 and 2006 perform radio processing and transmission.

Accordingly, as described above there are numerous possibilities for the distribution of cell functionality between anchor access point 2002 and mobile access nodes 2004 and 2006. Any of these cell functionality distributions can be utilized in the various aspects of this disclosure.

Figure 24:
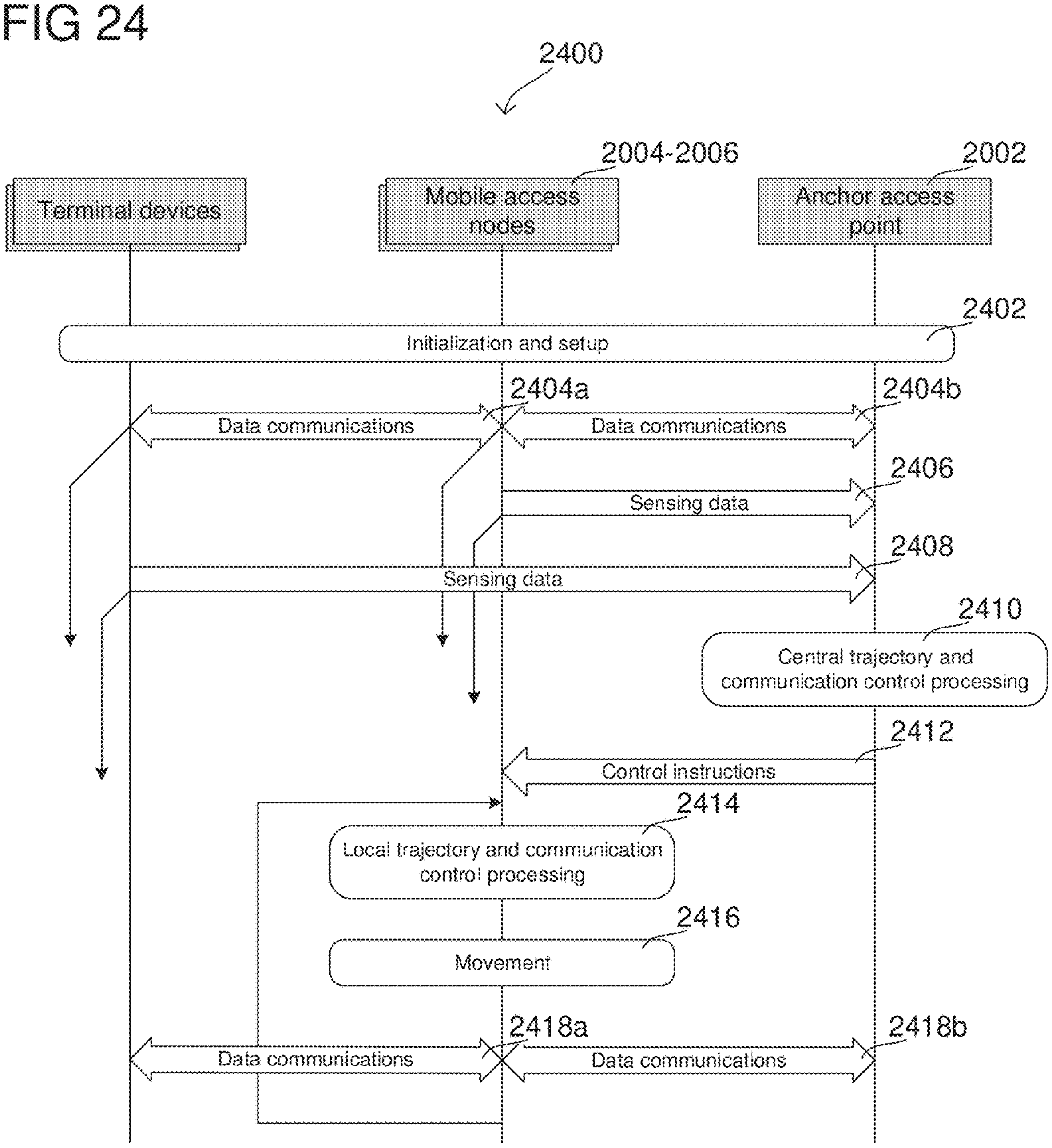
FIG. 24 shows an exemplary procedure for mobile access nodes and an anchor access point according to some aspects.

FIG. 24 shows exemplary message sequence chart 2400 illustrating the operation of anchor access point 2002 and mobile access nodes 2004-2006 according to some aspects. As shown in FIG. 24, anchor access point 2002 may first perform initialization and setup with mobile access nodes 2004-2006 and the terminal devices served by mobile access nodes 2004-2006 in stage 2402. In some aspects, stage 2402 may include a multi-phase procedure. This can include a first phase where the served terminal devices connect with mobile access nodes 2004-2006, a second phase where mobile access nodes 2004-2006 connect with anchor access point 2002, and a third phase where the served terminal devices connect with anchor access point 2002 (via mobile access nodes 2004-2006). For example, in the first phase, one or more terminal devices may connect with mobile access node 2004 by exchanging signaling (e.g., including a random access and registration procedure) with its protocol controller 2210, and one or more terminal devices may connect with mobile access node 2006 by exchanging signaling with its protocol controller 2210. In the second phase, mobile access nodes 2004 and 2006 may connect with anchor access point 2002 by exchanging signaling between their respective anchor interfaces 2214 and mobile interface 2314 of anchor access point 2002. In the third phase, the served terminal devices of mobile access nodes 2004-2006 may connect with anchor access point 2002 either by using mobile access nodes 2004-2006 as relays or by having mobile access nodes 2004-2006 register the served terminal devices with anchor access point 2002 on their behalf. For example, in some aspects the served terminal devices of mobile access node 2004 may transmit signaling, addressed to anchor access point 2002, to mobile access node 2004. Mobile access node 2004 may receive and process this signaling via its baseband subsystem 2206. Relay router 2222 of mobile access node 2004 may then relay the signaling to anchor access point 2002 by wirelessly transmitting it via baseband subsystem 2206. Anchor access point 2002 may then receive the signaling at its protocol processor 2310 and register the served terminal devices accordingly. In other aspects, the respective protocol controllers 2210 of mobile access nodes 2004 and 2006 may exchange signaling with protocol controller 2210 of anchor access point 2002 to register their respective served terminal devices.

The initialization and setup of stage 2402 may establish the wireless links between the involved devices. Accordingly, stage 2402 may establish fronthaul links 2108 and 2110 and anchor links 2104 and 2106. After the served terminal devices and mobile access nodes 2004 and 2006 are connected with anchor access point 2002, the served terminal devices may be able to use mobile access nodes 2004 and 2006 to transmit and receive user data. As shown in FIG. 24, the served terminal devices may perform data communications with mobile access nodes 2004 and 2006 in stage 2404*a*, and mobile access nodes may perform data communications with anchor access point 2002 in stage 2404*b*. For example, in the downlink direction, user router 2322 of anchor access point 2002 may receive user data addressed to a terminal device. User router 2322 may then determine which mobile access node is serving the terminal device, such as mobile access node 2004. User router 2322 may then provide the user data to baseband subsystem 2306, which may transmit the user data over the corresponding anchor link, such as anchor link 2104. Mobile access node 2004 may then wirelessly receive and process the user data at its baseband subsystem 2206, and provide the user data to relay router 2222 (which as previously indicated may have a logical connection with user router 2322). Relay router 2222 may then identify which served terminal device the user data is addressed to and subsequently transmit the user data to the served terminal device (over the corresponding fronthaul link) via baseband subsystem 2206.

In the uplink direction, a terminal device may transmit user data to its serving mobile access node, such as mobile access node 2004. Mobile access node 2004 may then wirelessly receive and process the user data via its baseband subsystem 2206, and provide the user data to relay router 2222. Relay router 2222 may then wirelessly transmit the user data to user router 2322 of anchor access point 2002 via its baseband subsystem 2206 and baseband subsystem 2306 of anchor access point 2002.

Mobile access nodes 2004 and 2006 may therefore provide access to their respective served terminal devices via the data communication of stages 2404*a* and 2404*b*. As denoted by the arrows in FIG. 24, mobile access nodes 2004 and 2006 may continue this data communication, and may therefore continue to provide access to their served terminal devices over time. As previously described, the cell functionalities of mobile access nodes 2004 and 2006 can differ in various different aspects, where some aspects may provide mobile access nodes 2004 and 2006 with full cell functionality, some aspects may provide mobile access nodes 2004 and 2006 with some but not all cell functionality, and some aspects may limit the mobile access nodes 2004 and 2006 to radio processing capabilities. Accordingly, mobile access nodes 2004 and 2006 may perform the data communications in stages 2418*a* and 2418*b* according to their cell functionality.

As mobile access nodes 2004 and 2006 are mobile, they may be able to adjust their trajectories over time to improve access performance. For example, mobile access nodes 2004 and 2006 may be able to position themselves relative to their served terminal devices to produce strong fronthaul links, which can yield higher data rates and reliability. Furthermore, as previously indicated, the served terminal devices may in some cases exhibit predictable usage patterns. This can include predictable positioning of terminal devices at specific times. For example, with reference back to FIG. 20, the served terminal devices may congregate in living room 2010 during late evening hours, or may congregate in dining room 2012 during breakfast and dinner times. Accordingly, by identifying predictable usage patterns such as these for the target coverage area, mobile access nodes 2004 and 2006 may be able to proactively position themselves in locations that can effectively provide access to their served terminal devices.

Mobile access nodes 2004 and 2006 and anchor access point 2002 may therefore attempt to determine these predictable usage patterns and subsequently use the predictable usage patterns to determine trajectories for mobile access nodes 2004 and 2006. In some aspects, mobile access nodes 2004 and 2006 and anchor access point 2002 may utilize sensing data to determine the predictable usage patterns. For example, mobile access nodes 2004 and 2006 and anchor access point 2002 may execute a pattern recognition algorithm (at local learning subsystems 2216 and central learning subsystem 2316) that uses sensing data to attempt to identify predictable usage patterns in their served terminal devices.

Accordingly, as shown in FIG. 24, mobile access nodes 2004 and 2006 may obtain and send sensing data to anchor access point 2002 in stage 2406. The sensing data can be any type of data that indicates the positions of terminal devices that are served by mobile access nodes 2004 and 2006. Sensors 2220 of mobile access nodes 2004 and 2006 may obtain the sensing data. For example, in some aspects, sensors 2220 may be radio measurement engines that are configured to measure wireless signals transmitted by the served terminal devices and to obtain corresponding radio measurements. Accordingly, the respective sensors 2220 of mobile access nodes 2004 and 2006 may be configured to obtain these radio measurements as the sensing data, and provide the radio measurements to anchor interfaces 2214. The anchor interfaces 2214 of mobile access nodes 2004 and 2006 may then transmit the radio measurements to mobile interface 2314 of anchor access point 2002, which may provide the radio measurements to sensor hub 2320. Although FIG. 24 shows sensors 2220 as part of application platform 2212, in some aspects sensors 2220 may be radio measurement engines that are part of baseband subsystem 2206.

In other aspects, sensors 2220 of mobile access nodes 2004 and 2006 may be another type of sensor that can obtain sensing data related to the positions of the served terminal devices. For example, sensors 2220 can be image or video sensors, or any type of proximity sensor (e.g., radar sensors, laser sensors, motion sensors, etc.), and can obtain sensing data that indicates positions of terminal devices and/or users potentially carrying terminal devices. Sensors 2220 may similarly send this sensing data to sensor hub 2320 of anchor access point 2318. In some aspects, sensors 2220 may include multiple types of sensors, and may send multiple types of sensing data to sensor hub 2320.

In some aspects, the served terminal devices may also send sensing data to anchor access point 2002 in stage 2408. For example, in some aspects the served terminal devices may include positional sensors (e.g., geopositional sensors, such as those based on satellite positioning systems) configured to estimate their positions, and may send the resulting position reports to sensor hub 2320. In some aspects, the served terminal devices may first send the position reports to mobile access nodes 2004 and 2006, which may then relay the position reports (e.g., via their relay routers 2222) to sensor hub 2320 of anchor access point 2002.

In some aspects, sensor hub 2320 may also maintain connections with remote sensors. These remote sensors can be deployed around the target coverage area, and may generate and send sensing data to sensor hub 2320 (e.g., via wireless or wireless links with anchor access point 2002, which can include direct links or IP-based internet links).

Sensor hub 2320 may therefore receive this sensing data that indicates the positions of the served terminal devices. As shown in FIG. 24, in some aspects mobile access nodes 2004-2006 and the served terminal devices may continue to provide sensing data to anchor access point 2002. Sensor hub 2320 may therefore collect and store the sensing data, such as in its local memory. In some aspects, the sensing data may be time-stamped. For example, sensor 2220 of mobile access nodes 2004 and 2006 may be configured to attach a timestamp to sensing data it generates. As referenced herein, these timestamps can be any information about time (e.g., are not limited to times expressed in hours in minutes). Additionally or alternatively, the served terminal devices may similarly attach timestamps to sensing data they generate and send to anchor access point 2002. Additionally or alternatively, sensor hub 2320 may attach timestamps to sensing data it receives.

As the sensing data indicates positions of served terminal devices, the timestamped sensing data may indicate positions of served terminal devices at certain times. It may therefore be possible to evaluate the timestamped sensing data to estimate predictable usage patterns by the served terminal devices. For example, referring back to the example of FIG. 20, the timestamped sensing data may indicate that the positions of the served terminal devices is probabilistically likely to be in living room 2010 during late evening hours, and probabilistically likely to be in dining room 2012 during lunch and dinner hours. Depending on the context, similar predictable usage patterns can also be derivable from the timestamped sensing data according to any type of repeated user behavior. Other examples include users congregating in office buildings during working hours (or, even more specifically, in particular offices or meeting rooms), users congregating in restaurants during mealtime hours, users congregating in shopping and retail areas during weekday evenings and weekends, users congregating in public transit areas (e.g., train or bus stations) during commuting hours, and any scenario in which users follow a repeating pattern. These predictable usage patterns may not be completely deterministic; in other words, there may not be an absolute certainty that the served terminal devices will always follow the predictable usage patterns. The predictable usage patterns instead refer to statistical data that indicates a probability that served terminal devices follow a particular usage pattern.

Figure 25:
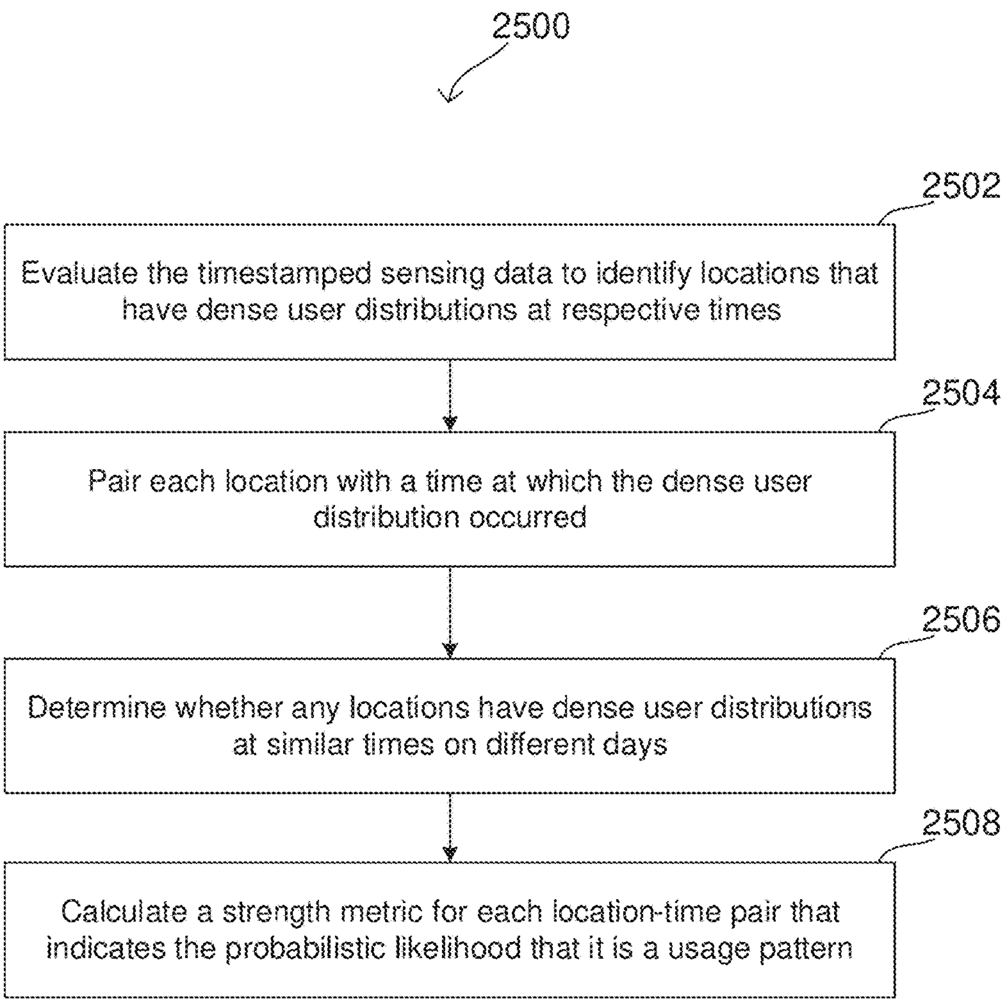
FIG. 25 shows an exemplary method for identify usage patterns according to some aspects.

Anchor access point 2002 may then perform central trajectory and communication control processing in stage 2410. For example, sensor hub 2320 may provide the timestamped sensing data to central learning subsystem 2316. Central learning subsystem 2316 may then execute the pattern recognition algorithm on the timestamped sensing data to determine the predictable usage patterns. In various aspects, the pattern recognition algorithm can be an AI algorithm, such as a machine learning algorithm, neural network algorithm, or reinforcement learning algorithm. While any such algorithm capable of recognizing usage patterns can be employed, FIG. 25 shows flow chart 2500 illustrating a basic flow of an exemplary pattern recognition algorithm according to some aspects. As shown in FIG. 25, central learning subsystem 2316 may first evaluate the timestamped sensing data to identify locations that have dense user distributions at respective times in stage 2502. For example, central learning subsystem 2316 may be configured to use the timestamped sensing data to estimate terminal device positions over time, and may then generate a time-dependent density plot with the terminal device positions (e.g., such as a heat map for user density that is plotted over time). Using the time-dependent density plot, central learning subsystem 2316 may then evaluate the user densities over time to identify certain locations (e.g., two- or three-dimensional areas within the target coverage area) that have dense user distributions at a given time (e.g., a user distribution, expressed in users per unit area, exceeding a predefined threshold).

Then, central learning subsystem 2316 may be configured to pair each location with a time at which the dense user distribution occurred in stage 2504. The time can be, for example, a window of time during which the user distribution of the location was above a predefined threshold. Central learning subsystem 2316 may add the resulting location-time pairs to a pattern database (e.g., in its local memory) that records the occurrence of dense user distributions at certain times and locations.

In some aspects, sensor hub 2320 may collect timestamped sensing data over an extended period of time, such as over multiple days, weeks, or months. Accordingly, the timestamped sensing data may indicate terminal device positions that repeat over multiple days. Central learning subsystem 2316 may therefore determine whether any of the locations have dense user distributions at similar times on different days in stage 2506. For example, central learning subsystem 2316 may evaluate the pattern database to determine whether any of the location-time pairs (from stage 2504) from different days have matching locations and times (e.g., within a tolerance to account for small differences).

These matching time-location pairs may indicate that a dense user distribution in a location at a particular time on multiple different days. This may consequently indicate a predictable usage pattern. Central learning subsystem 2316 may then calculate a strength metric for each matching time-location pair in stage 2508. The strength metric may indicate a probabilistic likelihood that the matching time-location pair is a predictable usage pattern (e.g., that there exists some non-negligible probability that the dense user distribution will be repeated). In some aspects, central learning subsystem 2316 may determine the strength metric for a given matching location-time pair based on the number of days that produced matching time-location pairs. For example, matching location-time pairs that occurred more often than other matching location-time pairs may yield higher strength metrics, as the higher occurrence rate may indicate a higher likelihood that the dense user distribution will be repeated.

In some aspects, central learning subsystem 2316 may consider days of the week when calculating the strength metrics in stage 2508. For example, as previously referenced, there may be some predictable usage patterns that occur on, for example, workdays and others that occur on weekends. There may be other predictable usage patterns that occur only on, for example, one day per week (for example, a weekly meeting in a given conference room, or a weekly television show that a family watches every week). The strength metrics for location-time pairs may therefore not only depend on whether a dense user distribution occurs a high number of days, but also whether a dense user distribution regularly occurs on a same day of the week. In some aspects, central learning subsystem 2316 may associate one or more days of the week with the location-time pairs (e.g., as recorded in the pattern database) that specify which days of the week the corresponding dense user distribution occurs.

At the output of stage 2508, central learning subsystem 2316 may therefore obtain location-time pairs with corresponding strength metrics that indicate the probabilistic likelihood that the location-time pair is a usage pattern. The combinations of associated location-time pairs, strength metrics, and days of the week may each represent a predictable usage pattern related to predicted user density.

In some aspects, central learning subsystem 2316 can perform flow chart 2500 as a continuous procedure. For example, central learning subsystem 2316 may be configured to evaluate timestamped sensing data as it arrives (or, for example, at the end of each day or other predefined interval) to determine whether any dense user distributions occurred. If so, central learning subsystem 2316 may compare the location-time pair of the dense user distribution with the location-time pairs in the pattern database, and determine whether there are any matching location-time pairs. If so, central learning subsystem 2316 may calculate a strength metric for the location-time pair and use the location-time pair, strength metric, and any associated days of the week as a predictable usage pattern.

As previously indicated, the procedure of flow chart 2500 is exemplary, and central learning subsystem 2316 may equivalently use other pattern recognition algorithms to determine the predictable usage patterns. For example, in other aspects, instead of identifying discrete patterns such as location-time pairs of dense user distributions, central learning subsystem 2316 may generate a time-dependent density plot as the predictable usage patterns, where the time-dependent density plot shows a deterministic distribution of users over time. In these aspects, central learning subsystem 2316 may evaluate the sensing data, obtained over an extended period of time, to predict user density in the target coverage area over time. As previously indicated, this can be similar to a heat map that plots the density of users in the target coverage area over time. Accordingly, in contrast to identifying discrete patterns, central learning subsystem 2316 may develop a plot of user density over time, where the density of users in a particular location and time can be predicted using the density of the time-dependent density plot. In some aspects, central learning subsystem 2316 may develop a plot of user density over time and day, where the time-dependent density plot can predict the density of users in a given location at a given time and day of the week.

The predictable usage patterns described above for FIG. 25 relate to predicted user density (e.g., where terminal devices are likely to be located at certain times). In some aspects, central learning subsystem 2316 may also incorporate predicted access usage and/or predicted radio conditions into the predictable usage patterns. For example, the sensing data collected by sensor hub 2320 can include historical usage information that details the usage of the radio access network by the served terminal devices. This historical usage information can be information such as average data rate or throughput, total amount of downloaded or uploaded data, frequency/periodicity of active access (e.g., how often the served terminal devices download or upload user data on an active access connection), or any other information that indicates how often the served terminal devices use the radio access network or how much data the served terminal devices transfer. In some aspects, baseband subsystem 2306 may be configured to collect this historical usage information (e.g., by monitoring the access connections of served terminal devices, which run through baseband subsystem 2306 via mobile access nodes 2004 and 2006) and provide this historical usage information to sensor hub 2320. In some aspects, the served terminal devices may be configured to monitor their own access usage and to report the resulting historical usage information to sensor hub 2320. In some aspects, baseband subsystems 2206 of mobile access nodes 2004 and 2006 may be configured to monitor the access usage of their respective served terminal devices and to report the resulting historical usage information to sensor hub 2320.

In some aspects, the historical usage information can be timestamped and/or geotagged. Accordingly, central learning subsystem 2316 may be able to evaluate the historical usage information over time and/or area to predict access usage by the served terminal devices. For example, central learning subsystem 2316 may be configured to execute an access usage prediction algorithm on the historical usage information to predict access usage over time and/or area. In some aspects, central learning subsystem 2316 may be configured to use a similar algorithm flow to that of flow chart 2500 to predict the access usage. For example, when the historical usage information is timestamped and geotagged, central learning subsystem 2316 may be configured to evaluate the historical usage information to identify locations from which a heavy access usage occurs at certain times (e.g., data usage exceeding a data rate or throughput threshold). Central learning subsystem 2316 may then pair the locations with a time at which the heavy access usage occurred, and subsequently determine whether any locations have heavy access usage at similar times on different days. Central learning subsystem 2316 may then calculate a strength metric for the location-time pairs, and treat the location-time pairs, strength metrics, and associated days of the week as predictable usage patterns.

In another example where the predictable usage patterns also include predicted radio conditions, the sensing data can include radio measurements that characterize the radio environment in the target coverage area. These radio measurements can be made and reported to sensor hub 2320 of anchor access point 2002 by the served terminal devices of mobile access nodes 2004 and 2006, can be made and reported by sensors 2220 of mobile access nodes 2004 and 2006, or can be made at anchor access point 2002 (e.g., at its own sensors). In some aspects, the radio measurements can be geotagged, and can therefore indicate the position of the transmitting device (that transmits the wireless signal of which the radio measurement is made) or of the receiving device (that performs the radio measurement).

Sensor hub 2320 may then provide these radio measurements to central learning subsystem 2316, which may be configured to execute a propagation modeling algorithm to predict the radio environment of the target coverage area as part of stage 2410. For example, the propagation modeling algorithm may be configured to generate a radio map (e.g., an REM) by modeling the radio environment over the geographic area of the target coverage area using the radio measurements and associated geotags. The propagation modeling algorithm can use any type of propagation modeling technique, such as a basic propagation model (e.g., free-space pathloss model, as previously described) or a propagation model based on radio maps (e.g., based on a REM, as previously described). The predicted radio conditions may also form part of the predictable usage patterns, as it may estimate the radio environment around the served terminal devices (e.g., including estimation of the radio environment in the locations of the dense user distributions). The predicted radio conditions can also be time-dependent, and can approximate radio conditions at different times of day depending on observed changes in the radio measurements over time.

Accordingly, central learning subsystem 2316 may determine predictable usage patterns that relate to user density, access usage, and/or radio conditions. With reference back to FIG. 24, anchor access point 2002 may use the predictable usage patterns as part of the central trajectory and communication control processing of stage 2410. For example, central learning subsystem 2316 may provide the predictable usage patterns to central controller 2318.

In some aspects, central controller 2318 may be configured to execute a central trajectory algorithm, using the predictable usage patterns, that determines coarse trajectories for mobile access nodes 2004 and 2006. In some aspects, this central trajectory algorithm may be the same or similar to the central trajectory algorithm previously described for central trajectory controller 714 of FIGS. 7 and 10. For example, the central trajectory algorithm may use a statistical model of the radio environment in the target coverage area, where the statistical model is based on the predicted radio conditions of the predictable usage patterns (as determined by central learning subsystem 2316). The statistical model may also approximate the positions of the users with the predicted user density of the predictable usage patterns, and may approximate access usage (e.g., the extent to which the served terminal devices use the radio access network to transfer data) with the predicted access usage of the predictable usage patterns. Using this statistical model, the central trajectory algorithm may define a function of an optimization criteria related to the radio environment. The optimization criteria can be, for example, a supported data rate for the served terminal devices, a probability that the supported data for the served terminal devices is above a predefined data rate threshold, a link quality metric, or a probability that the link quality metric for the served terminal devices is above a predefined link quality threshold.

The function of the optimization criteria may depend on the trajectories of mobile access nodes 2004 and 2006. Accordingly, the central trajectory algorithm may be configured to determine coarse trajectories for mobile access nodes 2004 and 2006 that increase (e.g., maximize) the function of the optimization criteria. This can include using gradient descent (or another optimization algorithm) to iteratively step the coarse trajectories of mobile access nodes 2004 and 2006 in the direction that maximizes the function of the optimization criteria.

As the function of the optimization criteria also depends on the locations of the served terminal devices, the predicted user density (determined by central learning subsystem 2316) may enable the central trajectory algorithm to accurately estimate the locations of the served terminal devices. For example, when the predicted user density is a location-time pair associated with certain days of the week, the statistical model may approximate the locations of the served terminal devices as being at the location at the corresponding time. Accordingly, optimization of the function of the optimization criteria can include optimizing the function of the optimization criteria under the assumption that the served terminal devices are located at the location (of the location-time pair) at the corresponding time. The central trajectory algorithm can use the strength metric to govern how strong the assumption is that the served terminal devices are located at the location at the corresponding time. For example, for location-time pairs that have a very high strength metric (e.g., users are nearly always congregated at the location at the given time on the associated days of the week), the central trajectory algorithm may place a strong assumption that users will be congregated around the location at the corresponding time (and vice versa for weaker strength metrics). The resulting central trajectories may therefore be weighted toward optimizing the function of the optimization criteria given served terminal devices located according to the location-time pairs of the predicted user density.

In another example where the predicted user density is a time-dependent density plot, the central trajectory algorithm may approximate the locations of the served terminal devices with the time-dependent density plot. Accordingly, at a given time, the time-dependent density plot may estimate that some locations of the target coverage are denser than others (e.g., that users are congregated at a certain location). Accordingly, the central trajectory algorithm may calculate the coarse trajectories with a greater assumption that the served terminal devices are positioned around the denser areas of the time-dependent density plot. The coarse trajectories may therefore be weighted towards providing access to areas of the target coverage area that have higher density in the time-dependent density plot.

Anchor access point 2002 may therefore determine coarse trajectories for mobile access nodes 2004 and 2006 as part of the central trajectory and communication control processing of stage 2410. In some aspects, central controller 2318 may also perform communication control using the predictable usage patterns. This can include determining scheduling and resource allocations for the served terminal devices, selecting radio access technologies for the served terminal devices, and/or determining initial routings for the served terminal devices. For example, in some aspects central controller 2318 may use the predictable usage patterns to determine scheduling and resource allocations for mobile access nodes 2004 and 2006 to use for their served terminal devices. Although not so limited, this can be applicable when cell functionality (such as scheduling) is handled at anchor access point 2002 (on behalf of mobile access nodes 2004 and 2006). For example, central controller 2318 may evaluate the predicted user density, predicted radio conditions, and predicted access usage to determine scheduling and resource allocations for the served terminal devices to use when transmitting and receiving to mobile access nodes 2004 and 2006. In some aspects, central controller 2318 may determine the scheduling and resource allocations as part of the central trajectory algorithm, where central controller 2318 determines the scheduling and resource allocations to optimize a function of the optimization criteria.

Central controller 2318 may also select radio access technologies for the served terminal devices to use when transmitting and receiving to and from mobile access nodes 2004 and 2006. For example, in some aspects the served terminal devices and mobile access nodes 2004 and 2006 (e.g., their respective antenna systems 2202, RF transceivers 2204, and baseband subsystems 2206) may support multiple radio access technologies. These can include cellular radio access technologies (e.g., LTE or another 3GPP radio access technology, mmWave, or any other cellular radio access technology) and/or short-range radio access technologies (e.g., WiFi, Bluetooth, or any other short-range radio access technology). As they support multiple radio access technologies, the served terminal devices and mobile access nodes 2004 and 2006 may have several different options to select from for use on fronthaul links 2108 and 2110. Central controller 2318 can therefore be configured to select which radio access technologies for the served terminal devices and mobile access nodes 2004 and 2006 to use on fronthaul links 2108 and 2110 as part of stage 2410. In some aspects, central controller 2318 may be configured to select the radio access technologies as part of the central trajectory algorithm, where central controller 2318 selects radio access technologies for the fronthaul links that optimize the function of the optimization criteria.

In some aspects, central controller 2318 may be configured to select initial routings for the served terminal devices as part of stage 2410. For example, central controller 2318 may be configured to select which mobile access node the served terminal devices should use. In the example of FIG. 20, there may be two mobile access nodes (mobile access nodes 2004 and 2006) for central controller 2318 to select between for each served terminal device. In other examples, there can be any quantity of mobile access nodes for central controller 2318 to select between for the initial routings. In some aspects, central controller 2318 may select the initial routings as part of the central trajectory algorithm, where central controller 2318 selects the initial routings to optimize the function of the optimization criteria.

In some aspects, central controller 2318 may also use external context information, in addition to the sensing data, for the processing in stage 2410. This external context information can include, for example, information about the service profile of the served terminal devices, information about the user profile of the served terminal devices, information about capabilities of the served terminal devices (e.g., supported radio access technologies, supported data rates, transmit powers, etc.), or information about the target coverage area (e.g., such as maps or locations of obstacles).

In some aspects, anchor access point 2002 may use such context information as part of the central trajectory algorithm. For example, central controller 2318 may use context information about the target coverage area, such as maps or locations of obstacles, to define the statistical model used to approximate the radio environment. For instance, the statistical model can approximate propagation based on a map of the target coverage area and the locations of obstacles within the target coverage area. In another example, central controller 2318 may be configured to use context information about the capabilities of the served terminal devices as part of the statistical model. For instance, the capabilities of the served terminal devices may relate to the transmission and reception performance of the served terminal devices, and may therefore be relevant to propagation in the statistical model. In another example, central learning subsystem 2316 may use context information about the target coverage area to determine predictable usage patterns, such as by identifying rooms in a map of the target coverage area that are associated with a predictable usage pattern (e.g., that form a location at which users congregate at a certain time). In another example, central learning subsystem 2316 may use context information about service or user profiles when determining predictable usage patterns about predicted usage access (e.g., by using a service or user profile to estimate how users will use the served terminal devices).

In some aspects, mobile access nodes 2004 and 2006 and/or the served terminal devices may provide the context information to anchor access point 2002. In other aspects, anchor access point 2002 may receive the context information from an external location, such as a core network or external data server that stores the context information.

Anchor access point 2002 may therefore determine one or more of coarse trajectories, scheduling and resource allocations, radio access technologies for fronthaul links, or initial routings as part of the central trajectory and communication control processing in stage 2410. Then, anchor access point 2002 may send corresponding control instruction to mobile access nodes 2004 and 2006 in stage 2412. For example, central controller 2318 may provide the control instructions to mobile interface 2314, which may then transmit (via its baseband subsystem 2306) the control instructions to the respective peer anchor interfaces 2214 of mobile access nodes 2004 and 2004. The control instructions may specify any of coarse trajectories, scheduling and resource allocations, fronthaul radio access technologies selections, or initial routings.

After receiving the control instructions from anchor access point 2002, anchor interfaces 2214 of mobile access nodes 2004 and 2006 may provide the control instructions to their respective local controllers 2218. Local controllers 2218 may then perform local trajectory and communication control processing in stage 2414. For example, when the control instructions include a coarse trajectory, local controller 2218 may provide the coarse trajectory to movement controller 2226. Movement controller 2226 may then control steering and movement machinery 2228 to move mobile access nodes 2004 and 2006 according to their respective coarse trajectories in stage 2416.

In some cases where the control instructions include scheduling and resource allocations, local controller 2218 may provide the scheduling and resource allocations to protocol controller 2210 of mobile access nodes 2004 and 2006. Protocol controller 2210 may then use the scheduling and resource allocations to generate scheduling and resource allocation messages for the served terminal devices. Protocol controller 2210 may then send the scheduling and resource allocation messages to the served terminal devices.

In some cases where the control instructions include fronthaul radio access technology selections, local controller 2218 may provide the fronthaul radio access technology selections to protocol controller 2210. Protocol controller 2210 may then generate a fronthaul radio access technology selection message and transmit the fronthaul radio access technology selection message to the served terminal devices.

In some cases where the control instructions include initial routings, local controller 2218 may provide the initial routings to protocol controller 2210. Protocol controller 2210 may then generate an initial routing message and transmit the initial routing message to the served terminal devices.

Mobile access nodes 2004 and 2006 may then perform data communications with the served terminal devices in stage 2422*a* and perform data communications with anchor access point 2002 in stage 2418*b*. As previously described, mobile access nodes 2004 and 2006 may, in the downlink direction, receive user data addressed to their respective served terminal devices from anchor access point 2002 over anchor links 2104 and 2106 (e.g., at their respective relay routers 2222 from user router 2322 of anchor access point 2002). Mobile access nodes 2004 and 2006 may then wirelessly transmit the user data to the served terminal devices over fronthaul links 2108 and 2110 (e.g., by relay routers 2222 wirelessly transmitting the user data via baseband subsystems 2206). In the uplink direction, mobile access nodes 2004 and 2006 may wirelessly receive user data from their served terminal devices over fronthaul links 2108 and 2110 (e.g., at baseband subsystems 2206, which may provide the user data to relay routers 2222). Mobile access nodes 2004 and 2006 may then wirelessly transmit the user data to anchor access point 2002 over anchor links 2104 and 2106 (e.g., by relay routers 2222 sending the user data to user router 2322 of anchor access point 2002 via baseband subsystems 2206). Mobile access nodes 2004 and 2006 may therefore provide access to their served terminal devices.

Mobile access nodes 2004 and 2006 may perform these data communications in stages 2418*a* and 2418*b* according to the control instructions provided by anchor access point 2002. For example, mobile access nodes 2004 and 2006 may move according to the coarse trajectories while performing the data communications (e.g., by movement controller 2226 controlling steering and movement machinery 2228 to move mobile access nodes 2004 and 2006 according to their respective coarse trajectories). Mobile access nodes 2004 and 2006 may also use the scheduling and resource allocations (included in the control instructions) to schedule communications and allocate resources for communications with the served terminal devices over fronthaul links 2108 and 2110 (e.g., at their respective protocol controllers 2210). Mobile access nodes 2004 and 2006 may also use the fronthaul radio access technology selections to control which radio access technologies are used for fronthaul links 2108 and 2110 (e.g., by protocol controllers 2210 controlling which radio access technologies are used to transmit and receive over fronthaul links 2108 and 2110). Mobile access nodes 2004 and 2006 may also use the initial routings to control which of the served terminal devices they respectively serve (e.g., by protocol controllers 2210 controlling the mobility of the served terminal devices so that the served terminal devices use the selected mobile access node for their routing).

As denoted by the arrow in FIG. 24, in some aspects mobile access nodes 2004 and 2006 may repeat stages 2414-2418*b*. For example, in some aspects, local controllers 2218 and/or local learning subsystems 2216 may be configured to update the predictable usage patterns, coarse trajectories, scheduling and resource allocations, fronthaul radio access technology selections, and/or initial routings.

For example, central controller 2318 of anchor access point 2002 may be configured to provide the predictable usage patterns to mobile access nodes 2004 and 2006 as part of the control instructions in stage 2412. As previously indicated, the predictable usage patterns may be time-dependent. For example, predicted user densities may include location-time pairs and/or time-dependent density plots that characterize predicted user density over time. Predicted radio conditions may also be defined over time, where radio conditions may differ at different times of day. Predicted access usage may similarly vary over time. Accordingly, while the initial control instructions provided by central controller 2318 in stage 2412 may be relevant for the current time, the predictable usage patterns may indicate different user densities, radio conditions, and/or access usage at different times. Accordingly, in some aspects, local controllers 2218 of mobile access nodes 2004 and 2006 may be configured to use the predictable usage patterns to update the coarse trajectories, scheduling and resource allocations, fronthaul radio access technology selections, and/or initial routings over time (e.g., to determine updated trajectories, updated scheduling and resource allocations, updated fronthaul radio access technology selections, and/or updated routings).

In one example, the predictable usage patterns may indicate a different user density at a later time, different radio conditions at the later time, and/or different access usage at the later time. Local controllers 2218 of mobile access nodes 2004 and 2006 may therefore be configured to execute a local trajectory algorithm using the different user density, radio conditions, and/or access usage, and to determine updated trajectories for mobile access nodes 2004 and 2006. In some aspects, this local trajectory algorithm may function similarly to the central trajectory algorithm used by central controller 2318. For example, the local trajectory algorithm may be configured to re-define the statistical model using the different user density, radio conditions, and/or access usage for the later time, and to then determine updated trajectories for mobile access nodes 2004 and 2006 that optimize the function of the optimization criteria (e.g., using gradient descent or another optimization algorithm). In some aspects, local controllers 2218 may also be configured to determine updated scheduling and resource allocations, fronthaul radio access technology selections, and/or routings based on the different user density, radio conditions, and/or access usage. In some aspects, the respective local controllers 2218 of mobile access nodes 2004 and 2006 may operate independently of each other, while in other aspects the respective local controllers 2218 of mobile access nodes 2004 and 2006 may operate in a collaborative manner.

After determining updated trajectories, updated scheduling and resource allocations, updated fronthaul radio access technology selections, and/or updated routings, local controllers 2218 of mobile access nodes 2004 and 2006 may control mobile access nodes 2004 and 2006 to perform data communications accordingly. For example, local controllers 2218 may provide the respective updated trajectories to movement controllers 2226, which may then respectively control steering and movement machinery 2228 to move mobile access nodes 2004 and 2006 according to the updated trajectories. Local controllers 2218 may provide the updated scheduling and resource allocations to their respective protocol controllers 2210, which may then generate and send out scheduling and resource allocation messages for their respective served terminal devices. Local controllers 2218 may likewise provide the updated fronthaul radio access technology selections and/or updated routings to their protocol controllers 2210, which may generate and send out fronthaul radio access technology selection messages and/or routing messages for their respective served terminal devices. Mobile access nodes 2004 and 2006 may then provide access to the selected terminal devices over fronthaul links 2108 and 2110 and anchor links 2104 and 2106.

In some aspects, mobile access nodes 2004 and 2006 may use their local learning subsystems 2216 to execute its own pattern recognition algorithm, and to update the predictable usage patterns (originally determined by central learning subsystem 2316). For example, the respective sensors 2220 of mobile access nodes 2004 and 2006 may be configured to continue to obtain sensing data that indicates the positions of the served terminal devices. This sensing data can be related to current, past, or future positions of the served terminal devices, and can therefore include current positions, velocity, and/or acceleration measurements. Sensors 2220 may then provide the sensing data to the respective local learning subsystems 2216 of mobile access nodes 2004 and 2006. The served terminal devices may also send sensing data (e.g., position reports) to local learning subsystem 2216). The local learning subsystems 2216 may then execute a pattern recognition algorithm with the sensing data to update the predictable usage patterns. This can include updating any of predicted user densities, predicted access usage, or predicted radio conditions. In some aspects, the pattern recognition algorithm may function similarly to the pattern recognition algorithm used by central learning subsystem 2216. For example, local learning subsystem 2216 can use the pattern recognition algorithm to adapt the predictable usage patterns according to the most recent sensing data, such as by updating the location-time pairs or their corresponding strength metrics or by updating a time-dependent density plot.

In some aspects, local learning subsystem 2216 may additionally or alternatively be configured to update predicted access usage of the predictable usage patterns based on historical usage information of the sensing data. For example, the historical usage information may indicate changes in the access usage by the served terminal devices (e.g., as users of the served terminal devices have changed their behavior, or as new served terminal devices operated by new users are now present). Accordingly, local learning subsystem 2216 may be configured to execute an access usage prediction algorithm to update the predicted access usage by the served terminal devices. As this historical usage information is more recent than the historical usage information used by central learning subsystem 2316 in stage 2410, the predicted access usage may be updated.

In some aspects, local learning subsystem 2216 may additionally or alternatively be configured to update predicted radio conditions of the predictable usage patterns based on radio measurements of the sensing data. For example, local learning subsystem 2216 may be configured to execute a propagation modeling algorithm based on recent radio measurement (e.g., obtained by sensor 2220, or reported to local learning subsystem 2216 by the served terminal devices). As the radio measurements are more recent than those originally used by central learning subsystem 2216 in stage 2410, the resulting predicted radio conditions may be updated.

Local learning subsystem 2216 may then provide these updated predictable usage patterns to local controller 2218 of mobile access nodes 2004 and 2006. Local controller 2218 may then be configured to update the control instructions based on the updated predictable usage patterns. For example, in some aspects local controller 2218 may be configured to execute a local trajectory algorithm based on the updated predictable usage patterns. This local trajectory algorithm can be similar to the outer or backhaul trajectory algorithms previously described regarding outer moving cells 702-706 and backhaul moving cells 708 and 810. Accordingly, the local trajectory algorithm may be configured to use the updated predictable usage patterns to refine the coarse trajectories of outer moving cells 2004 and 2006. For example, as the updated predictable usage patterns are different from the predictable usage patterns originally used by central controller 2316 of anchor access point 2002 to determine the coarse trajectories, there may be new or alternative trajectories that can better optimize the function of the optimization criteria. Accordingly, local controllers 2218 of mobile access nodes 2004 and 2006 may be configured to execute respective local trajectory algorithms to determine updated trajectories that optimize the function of the optimization criteria (e.g., according to gradient descent, or another optimization algorithm) based on the updated predictable usage patterns. As previously described for the central trajectory algorithm, the predicted user densities, predicted radio conditions, and predicted access usage may influence the statistical model used by the local trajectory algorithm, such as by impacting the estimated positions of served terminal devices, estimated radio environment of the target coverage area, and estimated usage of the radio access network by the served terminal devices.

In some aspects, local controllers 2218 may then use the updated predictable usage patterns to update the other control instructions, such as scheduling and resource allocations, fronthaul radio access technology selections, and/or initial routings. Local controller 2218 may use a similar procedure as described above for central controller 2318 to update the scheduling and resource allocations, fronthaul radio access technology selections, and/or initial routings based on the updated predictable usage patterns.

After updating the control instructions, mobile access nodes 2004 and 2006 may then execute data communications with the updated control instructions. This can include sending scheduling and resource allocation messages, fronthaul radio access technology selection messages, and/or updated routing messages to their respective served terminal devices (e.g., from their protocol processors 2210). The local controllers 2218 may also provide updated trajectories to movement controllers 2226, which may then control steering and movement machinery 2228 to move mobile access nodes 2004 and 2006 according to the updated trajectories.

In some cases, the use of predictable usage patterns can produce performance benefits for the served terminal devices. For example, mobile access nodes 2004 and 2006 may be able to use trajectories that are determined based on predicted locations of the served terminal devices. Accordingly, by determining trajectories that optimize a function of the optimization criteria using the predictable usage patterns to approximate user location, mobile access nodes 2004 and 2006 may be able to intelligently position themselves in a manner that effectively serves the served terminal devices. Mobile access nodes 2004 and 2006 may similarly be able to use scheduling and resource allocations, fronthaul radio access selections, and/or routings based on predictable usage patterns, which can in turn increase performance.

In some aspects, mobile access nodes 2004 and 2006 may adjust their trajectories based on their power conditions. For example, in some cases mobile access nodes 2004 and 2006 may have definite power supplies, such as rechargeable batteries, that gradually deplete over the course of their operation. Accordingly, mobile access nodes 2004 and 2006 may periodically recharge their power supplies. This can include docking at a docking charging station or using a wireless charging station. In some cases where mobile access nodes 2004 and 2006 recharge by docking at a docking charging station, mobile access nodes 2004 and 2006 may move to the docking charging station and use a short-range charging interface to recharge their power supplies (e.g., a physical charging interface such as a wire or a short-range wireless charger). In some cases where mobile access nodes 2004 and 2006 recharge with wireless charging, the wireless charging station may be directional (e.g., may directionally steer wireless charging beams). Due to the potential presence of obstacles, mobile access nodes 2004 and 2006 may recharge with the wireless charging station by moving to a location for which the wireless charging station can direct a wireless charging beam.

Mobile access nodes 2004 and 2006 may therefore periodically move to certain locations to recharge. However, this movement may disrupt their provision of access to the served terminal devices. For example, moving to a docking charging station or to a wireless charging beam may move mobile access nodes 2004 and 2006 away from their served terminal devices.

Figure 26:
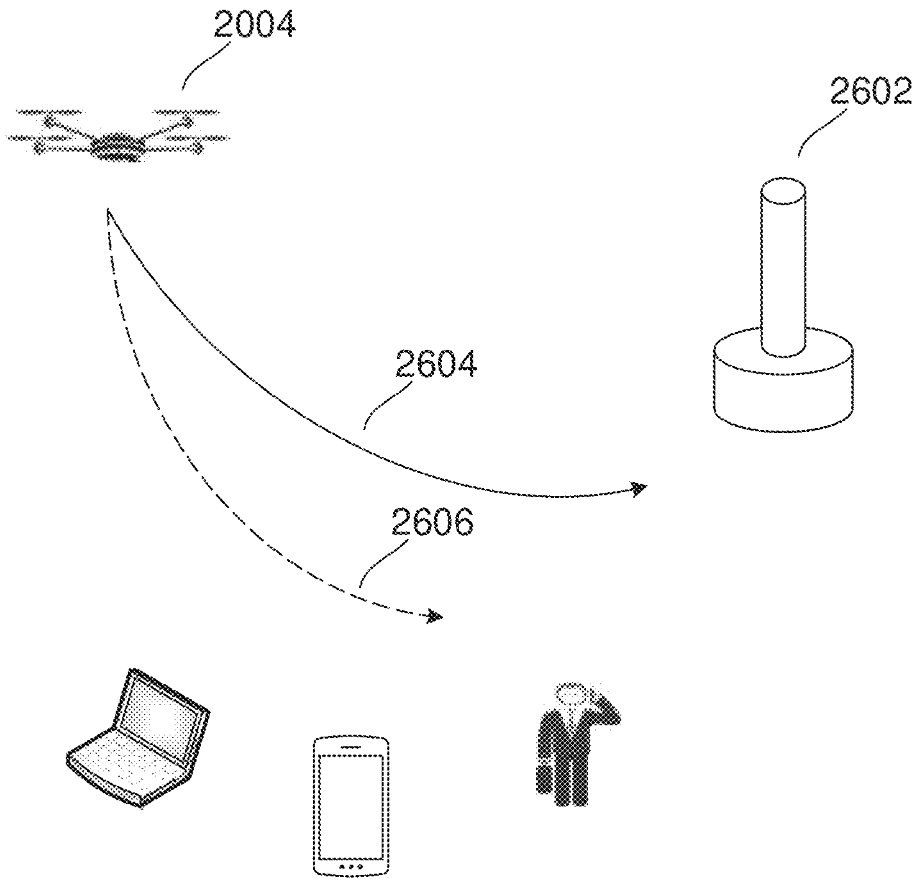
FIG. 26 shows an exemplary scenario of adjusting a trajectory of a mobile access node according to some aspects.

Accordingly, in some aspects, mobile access nodes 2004 and 2006 may be configured to adjust their trajectories to allow for recharging. FIG. 26 shows an exemplary scenario in which mobile access node 2004 may adjust its trajectory to balance between recharging and providing access to its served terminal devices. As shown in FIG. 26, mobile access node 2004 may initially be using trajectory 2606. Trajectory 2606 can be a coarse trajectory (e.g., assigned by anchor access point 2002) or an updated trajectory (e.g., updated by local controller 2218 of mobile access node 2004), and may be plotted to provide access to the served terminal devices (e.g., based on optimization of a function of an optimization criteria related to the radio environment of the served terminal devices).

During movement of mobile access node 2004 along trajectory 2606, the battery power of mobile access node 2004 may gradually deplete. Mobile access node 2004 may then determine that mobile access node 2004 should recharge its power supply. For example, in some aspects, local controller 2218 may be configured to monitor the power supply of mobile access node 2004. When local controller 2218 determines that the power supply meets a predefined condition (e.g. when the remaining battery power falls below a battery power threshold), local controller 2218 may trigger adjustment of the trajectory of mobile access node 2004 to facilitate recharging.

For example, local controller 2218 may determine new trajectory 2604. As shown in FIG. 26, new trajectory 2604 may move mobile access node 2004 towards charging station 2602. In some aspects, local controller 2218 may determine new trajectory 2604 based on the served terminal devices and charging station 2602, such as by determining new trajectory 2604 as a trajectory that optimizes a function of the optimization criteria while moving mobile access node 2004 towards charging station 2602. In some aspects, local controller 2218 may use predictable usage patterns to model the served terminal devices when determining new trajectory 2604.

In some aspects where charging station 2602 is a wireless charging station, mobile access node 2004 may be able to recharge with the wireless charging beam while still providing access to the served terminal devices. However, there may be a tradeoff between the access and recharging rate, where mobile access node 2004 may be able to provide better access (e.g., a higher data rate or other link quality metric) when positioned closer to the served terminal devices and may be able to achieve a higher recharging rate when positioned closer to charging station 2602. In some aspects, local controller 2218 may therefore use a weighted function that depends on both the optimization criteria and a recharging rate (e.g., the rate at which the power supply of mobile access node 2004). Local controller 2218 may therefore determine new trajectory 2604 as a trajectory that maximizes the weighted function. New trajectory 2604 may therefore be balanced between optimizing access versus optimizing recharging rate.

In some aspects where charging station 2602 is a docking charging station, mobile access node 2004 may move to charging station 2602 (e.g., close enough to physically dock with charging station, or within a certain distance close enough to support a short-range wireless charger) to recharge. In some cases, mobile access node 2004 may be able to continue providing access to the served terminal devices (e.g., by relaying data between the served terminal devices and anchor access point 2002) when it is docked at charging station 2602. In other aspects, mobile access node 2004 may temporarily interrupt provision of access to the served terminal devices while it is docked at charging station 2602.

In some aspects, a mobile access node that departs from its trajectory may notify other mobile access nodes of the departure. The other mobile access nodes can then adjust their trajectories to compensate for the departure of the mobile access node. This can be used when mobile access nodes depart from their trajectory to recharge or for any other reason.

Figure 27:
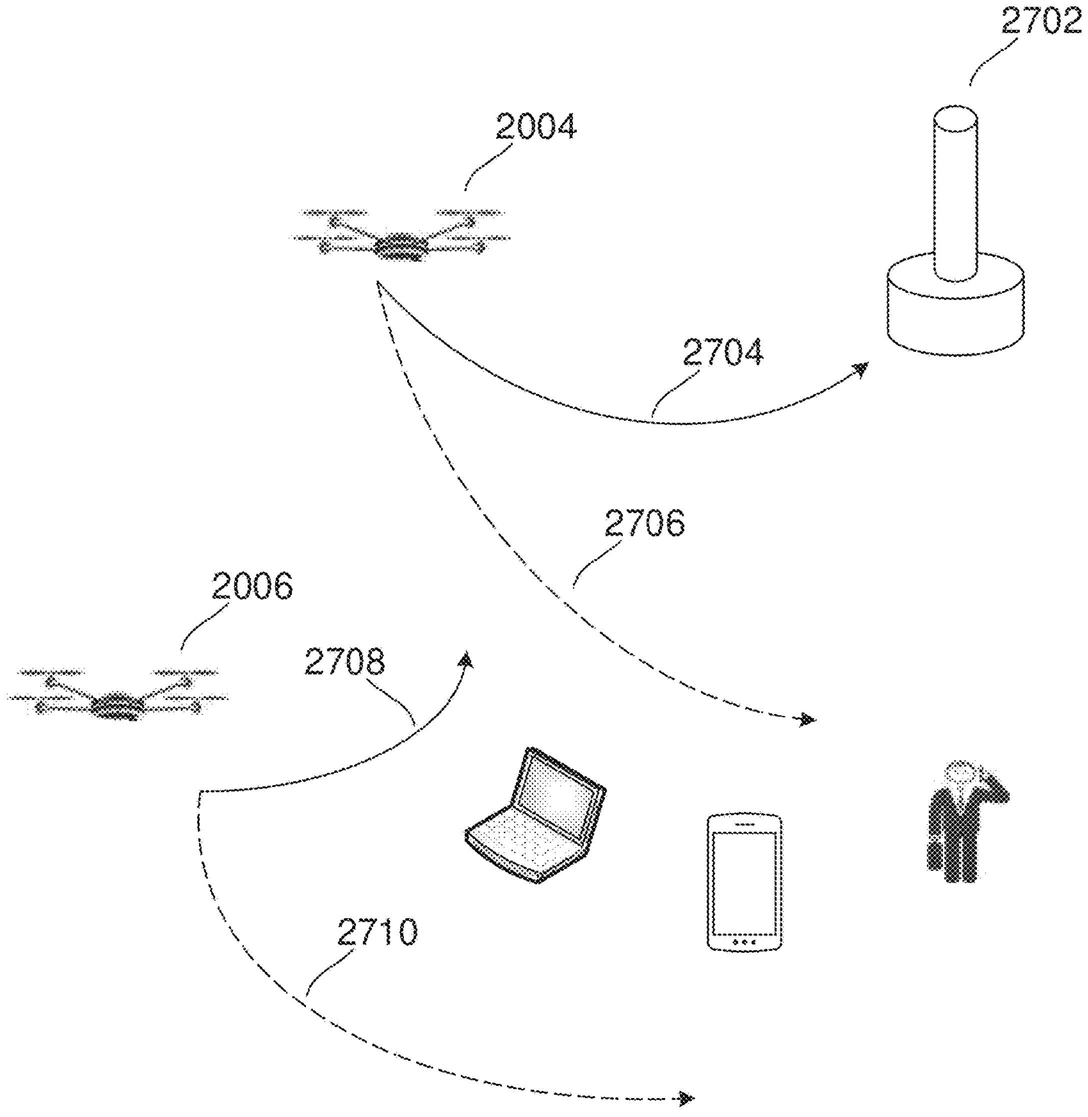
FIG. 27 shows an exemplary scenario for adjusting a trajectory of a mobile access node based on a trajectory departure according to some aspects.

FIG. 27 shows an exemplary scenario where mobile access node 2004 may notify mobile access node 2006 that it is departing from its trajectory. For example, as shown in FIG. 27, mobile access node 2004 may initially be following trajectory 2706. Mobile access node 2004 may then adjust its trajectory to new trajectory 2706 (e.g., to move mobile access node 2004 towards charging station 2702). New trajectory 2706, however, may move mobile access node 2004 away from the served terminal devices, which negatively impact their radio access. Accordingly, mobile access node 2004 may notify mobile access node 2006 (and/or one or more other mobile access nodes that are nearby) that it has adjusted its trajectory. For example, local controller 2218 of mobile access node 2004 may transmit signaling (e.g., via wireless transmission using its baseband subsystem 2206) to local controller 2218 of mobile access node 2006 that notifies mobile access node 2006 of the trajectory adjustment.

Mobile access node 2006 may then adjust its trajectory to compensate for the trajectory adjustment of mobile access node 2004. For example, local controller 2218 of mobile access node 2006 may adjust the trajectory of mobile access node 2006 from trajectory 2710 to new trajectory 2708. As shown in FIG. 27, new trajectory 2708 may move mobile access node 2006 towards trajectory 2706 that mobile access node 2004 was originally following.

In some aspects, mobile access node 2004 may notify mobile access node 2006 of the trajectory departure prior to adjusting its trajectory. For example, local controller 2218 of mobile access node 2004 may be configured to monitor the remaining battery power of the power supply of mobile access node 2004. When the remaining battery power falls below a first threshold, local controller 2218 of mobile access node 2004 may be configured to notify local controller 2218 of mobile access node 2006 that mobile access node 2004 will adjust its trajectory. Local controller 2218 of mobile access node 2006 may therefore be able to determine its new trajectory 2708 prior to mobile access node 2004 actually departing from its trajectory. Then, when the remaining battery power of mobile access node 2004 falls below a second threshold, local controller 2218 of mobile access node 2004 may notify local controller 2218 of mobile access node 2006 that mobile access node 2004 will now change its trajectory. Local controller 2218 of mobile access node 2006 may then execute new trajectory 2708.

Figure 28:
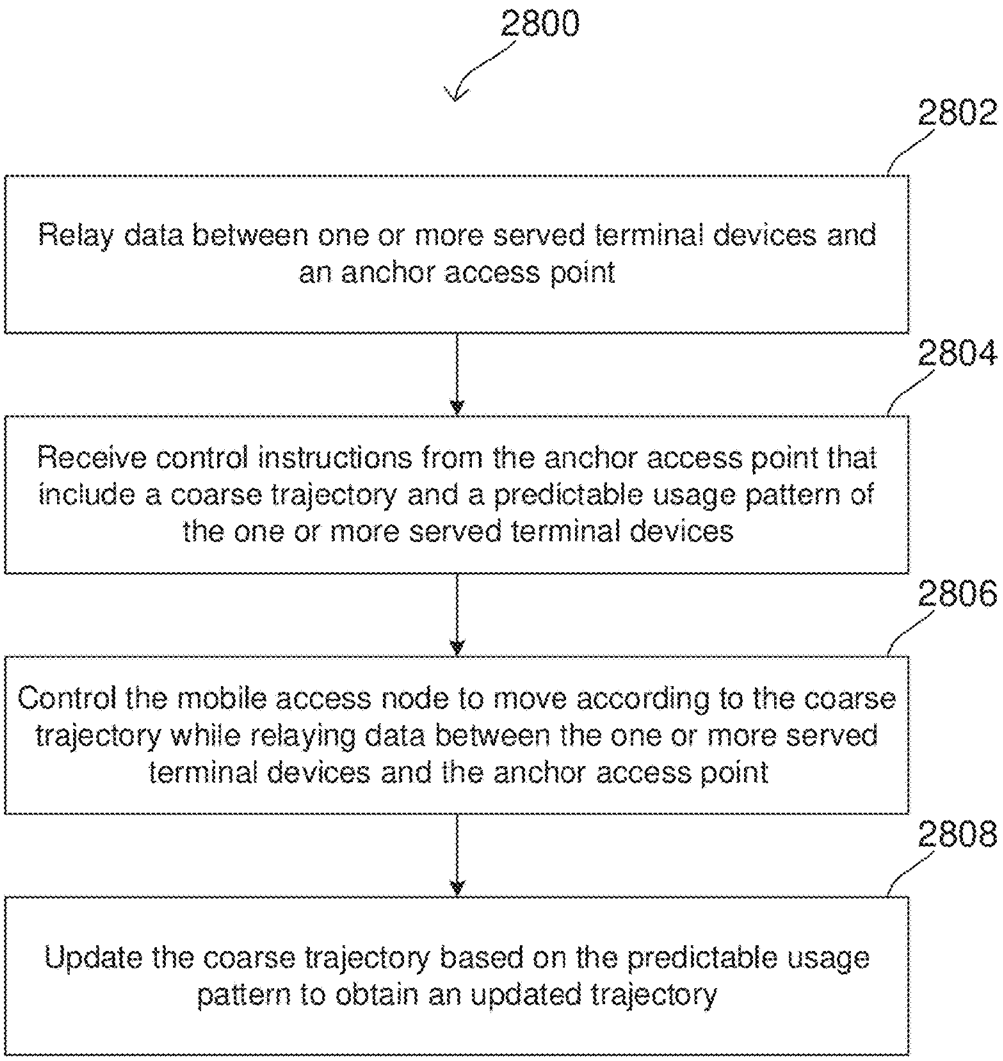
FIG. 28 shows an exemplary method for a mobile access node according to some aspects.

FIG. 28 shows method 2800 of operating a mobile access node. As shown in FIG. 28, method 2800 includes relaying data between one or more served terminal devices and an anchor access point (2802), receiving control instructions from the anchor access point that include a coarse trajectory and a predictable usage pattern of the one or more served terminal devices (2804), controlling the mobile access node to move according to the coarse trajectory while relaying data between the one or more served terminal devices and the anchor access point (2806), and updating the coarse trajectory based on the predictable usage pattern to obtain an updated trajectory (2808).

Figure 29:
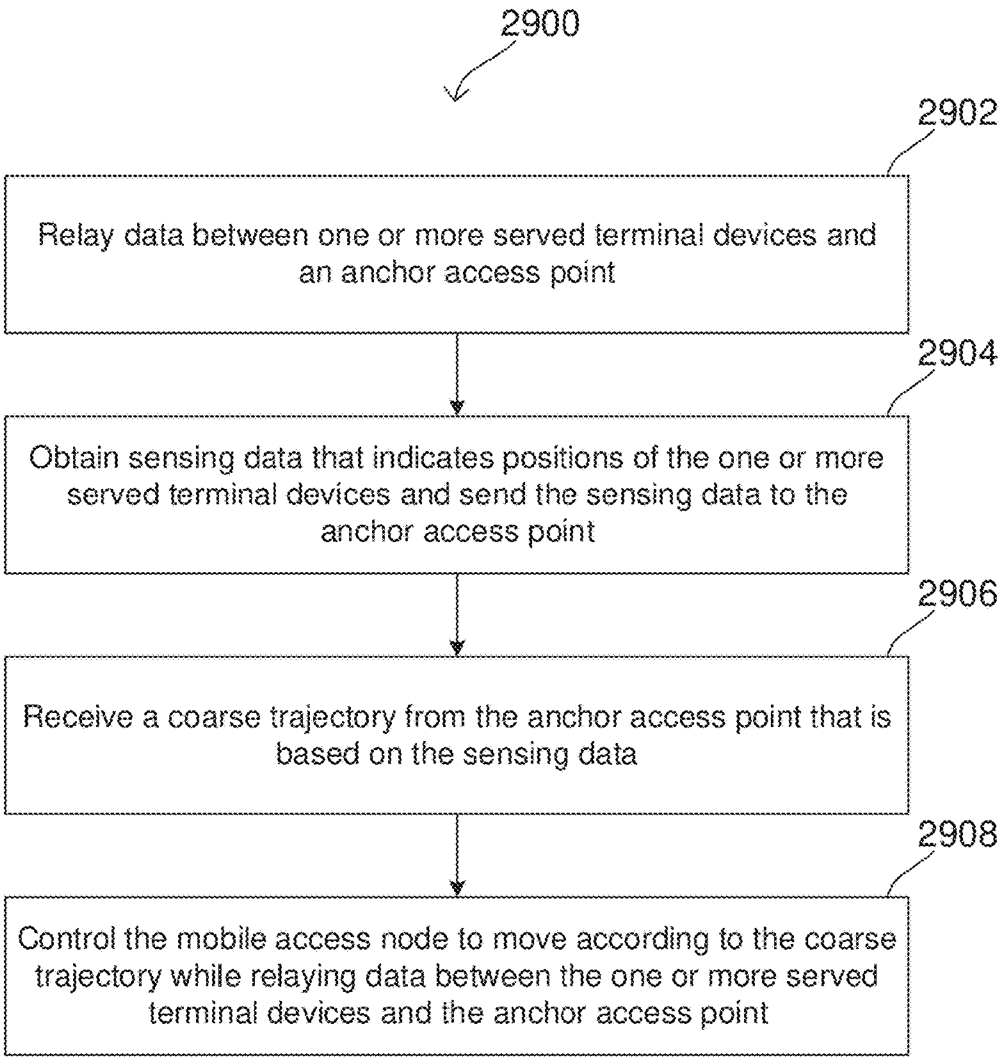
FIG. 29 shows an exemplary method for a mobile access node according to some aspects.

FIG. 29 shows method 2900 of operating a mobile access node. As shown in FIG. 29, method 2900 includes relaying data between one or more served terminal devices and an anchor access point (2902), obtaining sensing data that indicates positions of the one or more served terminal devices and sending the sensing data to the anchor access point (2904), receiving a coarse trajectory from the anchor access point that is based on the sensing data (2906), and controlling the mobile access node to move according to the coarse trajectory while relaying data between the one or more served terminal devices and the anchor access point (2908).

Figure 30:
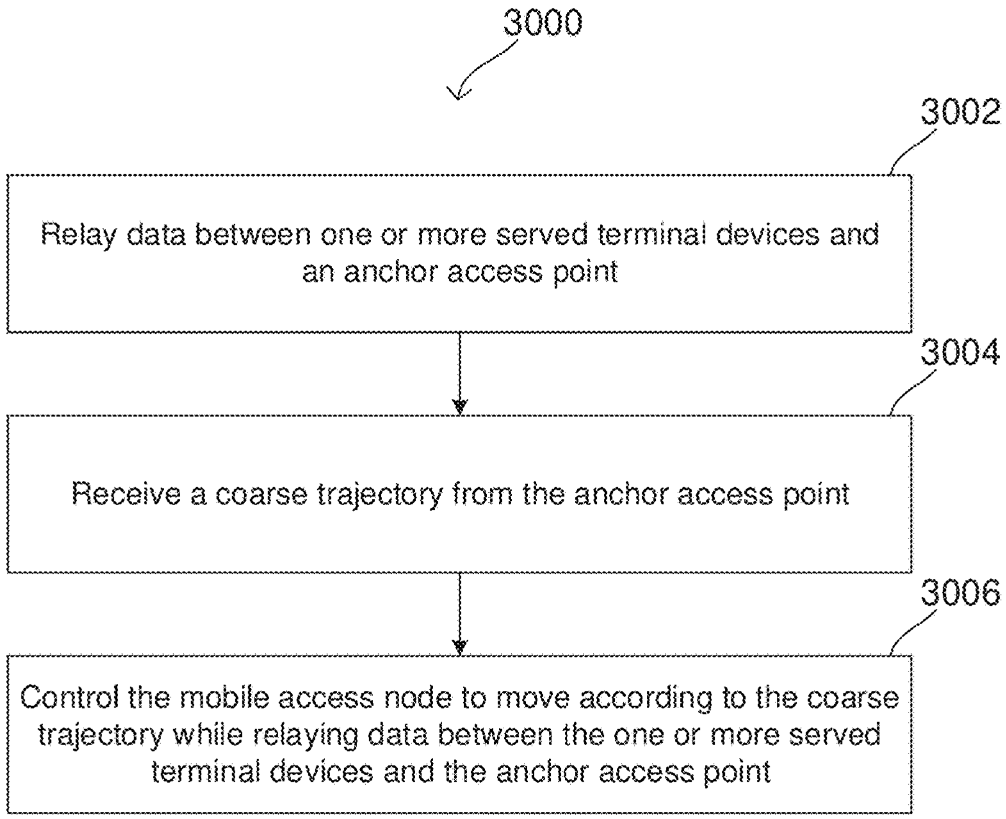
FIG. 30 shows an exemplary method for a mobile access node according to some aspects.

FIG. 30 shows method 3000 of operating a mobile access node. As shown in FIG. 30, method 3000 includes relaying data between one or more served terminal devices and an anchor access point (3002), receiving a coarse trajectory from the anchor access point (3004), and controlling the mobile access node to move according to the coarse trajectory while relaying data between the one or more served terminal devices and the anchor access point (3006).

Figure 31:
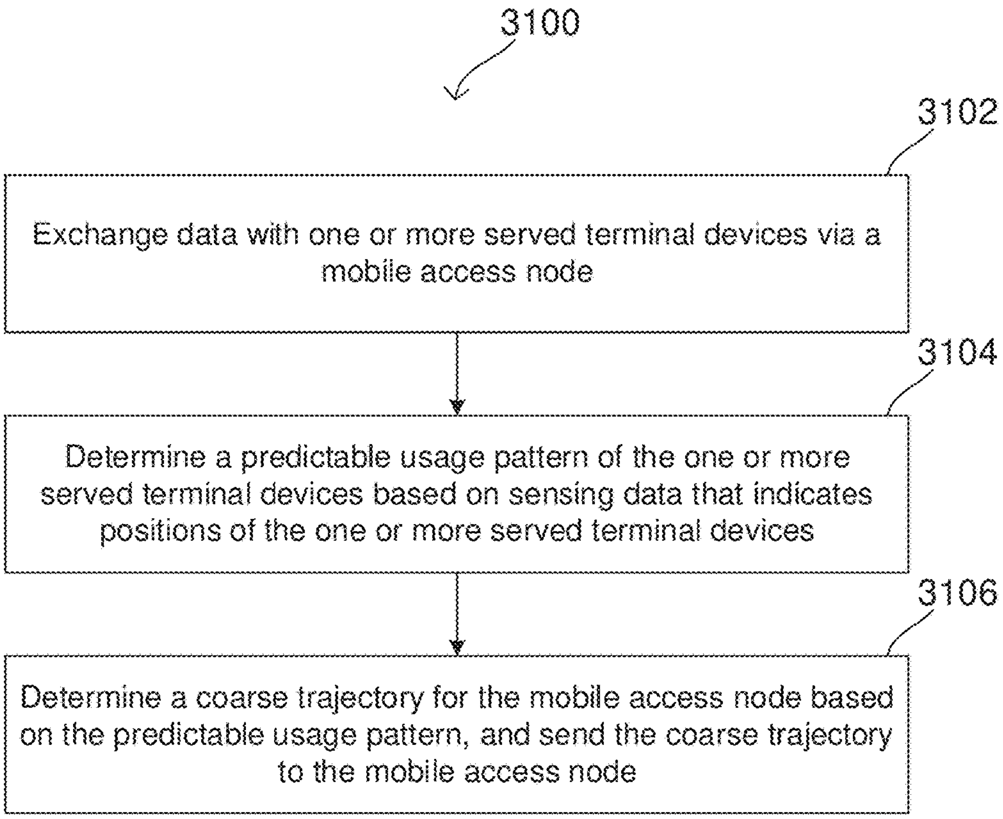
FIG. 31 shows an exemplary method for an anchor access point according to some aspects.

FIG. 31 shows exemplary method 3100 of operating an anchor access point according to some aspects. As shown in FIG. 31, method 3100 includes exchanging data with one or more served terminal devices via a mobile access node (3102), determining a predictable usage pattern of the one or more served terminal devices based on sensing data that indicates positions of the one or more served terminal devices (3104), and determining a coarse trajectory for the mobile access node based on the predictable usage pattern, and sending the coarse trajectory to the mobile access node (3106).

Outdoor Mobile Access Nodes for Indoor Coverage

Network providers have introduced the concept of customer-premises equipments (CPEs) for mobile broadband coverage. These CPEs are generally fixed devices similar to access points that are mounted on or outside of a building. The CPEs can have a backhaul link to the network, and can therefore provide radio access to various terminal devices inside of the building. These proposed CPEs are generally fixed in one location, and are therefore stationary. Accordingly, while the CPEs may improve access to indoor terminal devices due to their forward deployment, they may not be able to adapt to changing user positions and other dynamic conditions.

According to various aspects, mobile access nodes positioned outside of indoor coverage areas may utilize trajectories that can be dynamically optimized. As these mobile access nodes are both mobile and aware of dynamic conditions in the indoor coverage area, they can adapt their trajectories over time to maintain strong radio links with the terminal devices located in the indoor coverage area.

Figure 32:
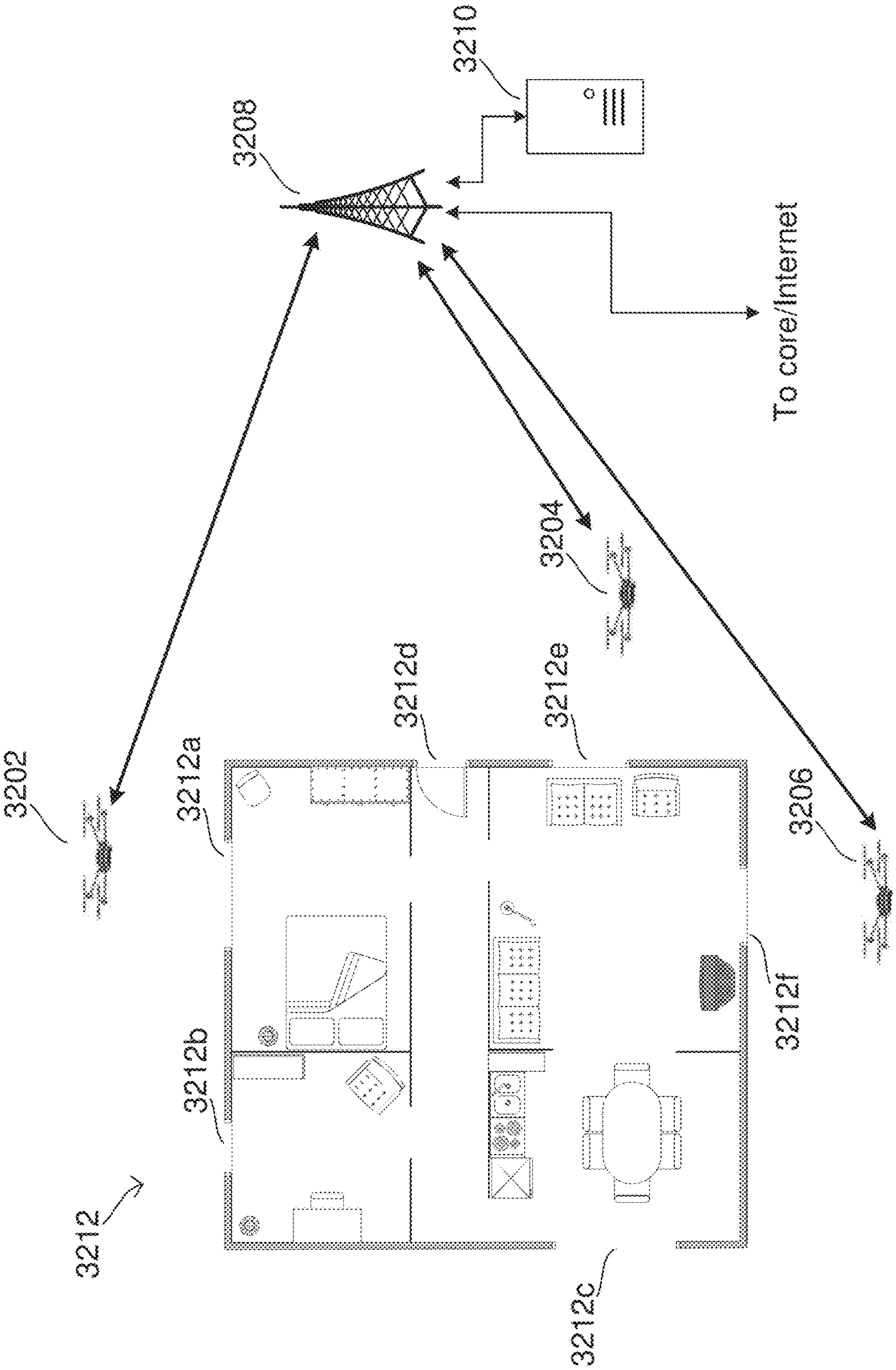
FIG. 32 shows an exemplary scenario of an indoor coverage area according to some aspects.

FIG. 32 shows an exemplary network scenario according to some aspects. As shown in FIG. 32, mobile access nodes 3202-3206 may be deployed outside of indoor coverage area 3212. Mobile access nodes 3202-3206 may be mobile CPEs or any other type of moving network access node or cell. Indoor coverage area 3212 can be, for example, a private residence, a commercial building, or any other type of indoor coverage area. Indoor coverage area 3212 can be completely or partially indoors (e.g., may or may not have walls on all sides and may or may not have a roof or other upper surface).

Mobile access nodes 3202-3206 may provide radio access to various served terminal devices located inside of indoor coverage area 3212. Mobile access nodes 3202-3206 may therefore act as relays to receive, process, and retransmit data between the served terminal devices and network access node 3208 over wireless backhaul links. Accordingly, in the uplink direction, mobile access nodes 3202-3206 may be configured to receive uplink data originating from the served terminal devices in indoor coverage area 3212. Mobile access nodes 3202-3206 may then process and retransmit the uplink data (e.g., using any type of relaying scheme) to network access node 3208 over wireless backhaul links. Network access node 3208 may then route the uplink data as appropriate, such as to external data networks via a core network to which network access node 3208 is connected to. In the downlink direction, network access node 3208 may obtain downlink data addressed to the served terminal devices in indoor coverage area 3212, such as by receiving it from the core network. Network access node 3208 may then transmit the downlink data to mobile access nodes 3202-3206 (e.g., to the mobile access node to which the destination terminal device is connected to) over wireless backhaul links. Mobile access nodes 3202-3206 may receive the downlink data addressed to their respective served terminal devices and then process and retransmit the downlink data to the corresponding served terminal devices.

The trajectories (e.g., positioning) of mobile access nodes 3202-3206 may impact the performance of the radio access provided to the served terminal devices in indoor coverage area 3212. For example, trajectories of mobile access nodes 3202-3206 that position them close to indoor coverage area 3212 may increase the link strength due to the reduced propagation distance. Furthermore, mobile access nodes 3202-3206 may be able to position themselves proximate to the actual positions of served terminal devices within indoor coverage area 3212, which can further improve link strength.

Additionally, in some cases the propagation pathloss of indoor coverage area 3212 (e.g., the outdoor-to-indoor propagation pathloss) may vary. FIG. 32 shows one example where indoor coverage area 3212 may have openings 3212*a*-3212*f* along its outer surface. Openings 3212*a*-3212*f* can be, for example, doors or windows. As openings 3212*a*-3212*f* have lower propagation pathloss than the remaining outer surface of indoor coverage area 3212 (e.g., the outer walls), wireless transmission through openings 3212*a*-3212*f* may yield higher link strength than wireless transmission through the remaining outer surface of indoor coverage area 3212. In addition to openings like doors and windows, there may be other areas of the outer surface of indoor coverage area 3212 that have lower propagation pathloss than others. For example, certain areas of the outer surface area may be made of different materials and/or have different layers (e.g., stone/brick versus sidewall, different levels of insulation, etc.), which may in turn yield different propagation pathlosses. The propagation pathloss of the outer surface may therefore vary.

Accordingly, in some aspects, mobile access nodes 3202-3206 may be configured to use trajectories that are based on information about the propagation pathloss of indoor coverage area 3212. As the varying propagation pathloss across the outer surface can produce some areas of the outer surface that have lower propagation pathloss than others, mobile access nodes 3202-3206 can position themselves in locations that can provide stronger links to served terminal devices inside of indoor coverage area 3212.

Figure 33:
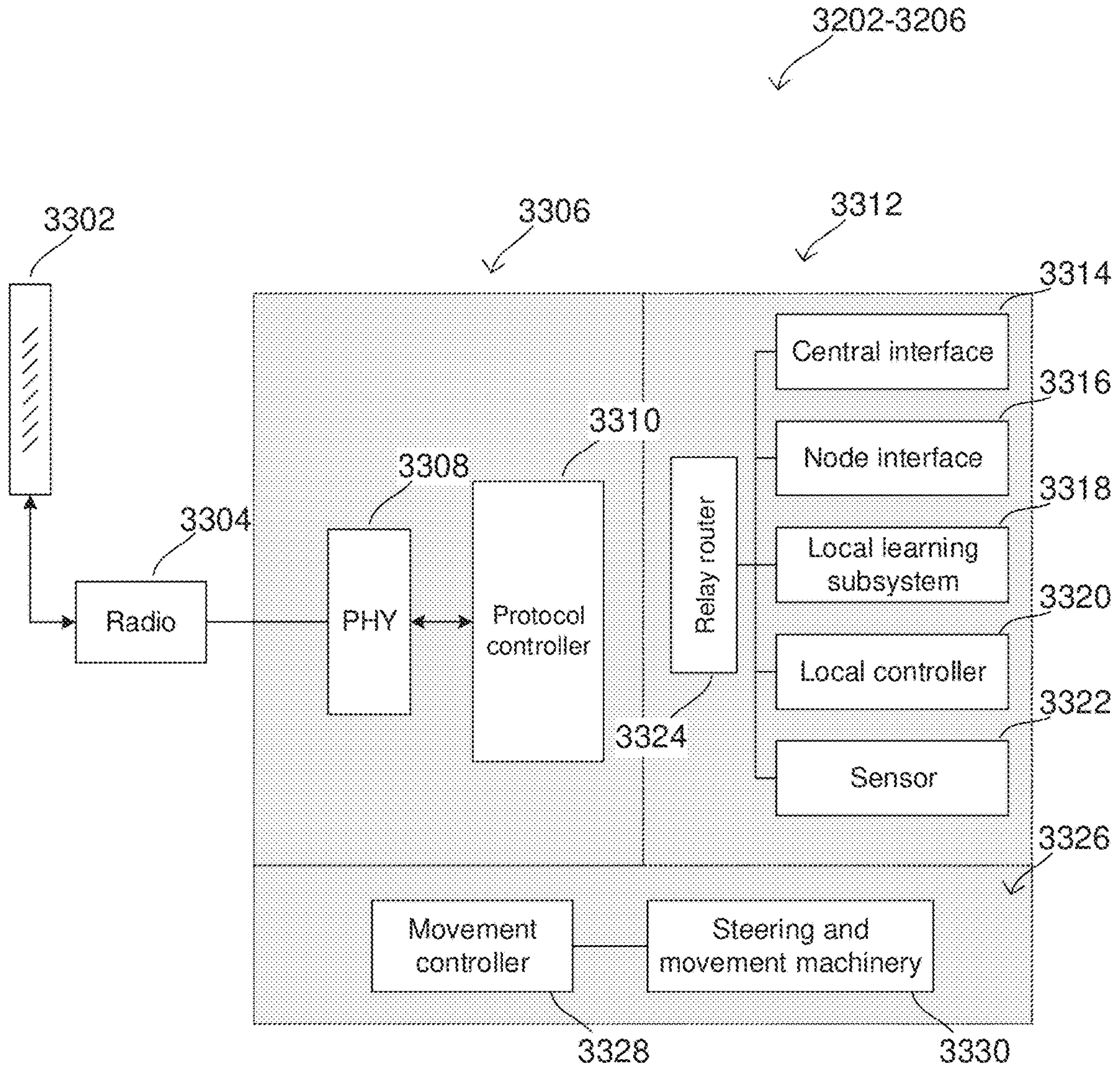
FIG. 33 shows an exemplary internal configuration of a mobile access node according to some aspects.

FIG. 33 shows an exemplary internal configuration of mobile access nodes 3202-3206 according to some aspects. While some examples in the following description may focus on describing the functionality of mobile access node 3202, these descriptions can also likewise apply to other mobile access nodes. Accordingly, in some aspects, multiple or all of mobile access nodes 3202-3206 can be configured according to any example presented using mobile access node 3202.

As shown in FIG. 32, in some aspects network access node 3208 may also interface with central trajectory controller 3210. Central trajectory controller 3210 may then be configured to determine coarse trajectories and provide the coarse trajectories to mobile access nodes 3202-3206. In other aspects, mobile access nodes 3202-3206 may be configured to determine their own trajectories, and may therefore not use a central trajectory controller to obtain coarse trajectories.

As shown in FIG. 33, mobile access node 3202 may include antenna system 3302, radio transceiver 3304, baseband subsystem 3306, application platform 3312, and movement system 3326. In some aspects, antenna system 3302, radio transceiver 3304, and movement system 3322 may be configured in the manner of antenna system 2202, radio transceiver 2204, and movement system 2224 described above for mobile access nodes 2004-2006 in FIG. 22.

As shown in FIG. 33, application platform 3312 may include central interface 3314, node interface 3316, local learning subsystem 3318, local controller 3320, sensor 3322, and relay router 3324. In some aspects, central interface 3314 may be a processor configured to maintain a signaling connection (e.g., a logical, software-level connection) with a peer node interface of central trajectory controller 3210. Central interface 3314 may therefore support a signaling connection between mobile access node 3202 and central trajectory controller 3210, where central interface 3314 may transmit and receive signaling over the signaling connection via baseband subsystem 3306. Central interface 3314 may therefore provide data addressed to central trajectory controller 3210 to baseband subsystem 3306, which may then wirelessly transmit the data (e.g., to network access node 3208, which may interface with central trajectory controller 3210). Baseband subsystem 3306 may also wirelessly receive data originating from central trajectory controller 3210 (e.g., that is wirelessly transmitted by network access node 3208), and may provide the data to central interface 3314. Further references to communications between mobile access node 3202 and central trajectory controller 3210 are understood as referring to such a communication arrangement.

Node interface 3316 may be a processor configured to maintain a signaling connection with a peer node interface of one or more other mobile access nodes, such as mobile access nodes 3204 and 3206. Node interface 3316 may therefore support a signaling connection between mobile access node 3202 and mobile access nodes 3204 and 3206, where node interface 3316 may transmit and receive signaling over the signaling connection via baseband subsystem 3306. Node interface 3316 may therefore provide data addressed to other mobile access nodes to baseband subsystem 3306, which may then wirelessly transmit the data to the other mobile access nodes. Baseband subsystem 3306 may also wirelessly receive data originating from other mobile access nodes, and may provide the data to node interface 3316. Further references to communications between mobile access node 3202 and other mobile access nodes are understood as referring to such a communication arrangement.

Local learning subsystem 3318 may be configured in the manner of local learning subsystem 2216 of FIG. 22, and may therefore be a processor configured to learning-based processing. In some local learning subsystem 3318 may be configured to execute a pattern recognition algorithm, propagation modeling algorithm, and/or an access usage prediction algorithm as described above for local learning subsystem 2216. These algorithms are described in detail below.

Local controller 3320 may be a processor configured to control the overall operation of mobile access node 3202 related to trajectories. In some aspects, local controller 3320 may be configured to receive and carry out instructions provided by central trajectory controller 3210, such as for coarse trajectories. Local controller 3320 may also be configured to execute a local trajectory algorithm to determine trajectories for mobile access node 3202.

Sensor 3322 may be configured in the manner of sensor 2220 of FIG. 22, and may therefore be a sensor configured to perform sensing and to obtain sensing data. In some aspects, sensor 3322 may be a radio measurement engine configured to obtain radio measurements as sensing data. In some aspects, sensor 2220 can be image or video sensors or any type of proximity sensor (e.g., radar sensors, laser sensors, motion sensors, etc.) that can obtain sensing data that indicates positions of the served terminal devices.

Relay router 3324 may be a processor configured to relay data between network access node 3208 and served terminal devices in indoor coverage area 3212. Accordingly, relay router 3324 may be configured to identify downlink data (received by baseband subsystem 3306 over the wireless backhaul link with network access node 3208) addressed to terminal devices served by mobile access node 3202, and to transmit the downlink data to the served terminal devices via baseband subsystem 3306. Relay router 3324 may also be configured to identify uplink data (received by baseband subsystem 3306 over wireless fronthaul links with served terminal devices) originating from the served terminal devices, and to transmit the uplink data to network access node 3208 via baseband subsystem 3306.

Figure 34:
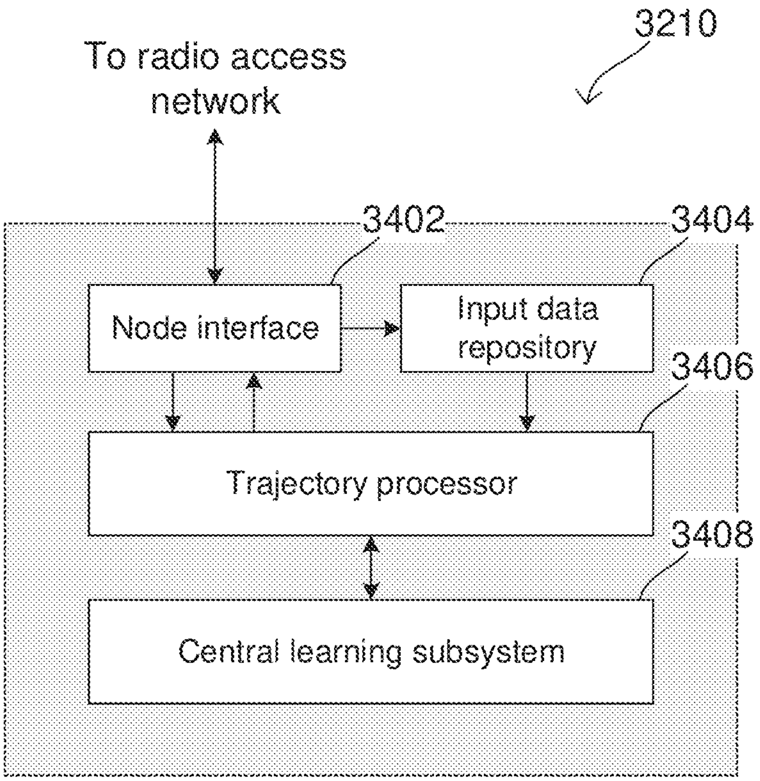
FIG. 34 shows an exemplary internal configuration of a central trajectory controller according to some aspects.

FIG. 34 shows an exemplary internal configuration of central trajectory controller 3210 according to some aspects. As shown in FIG. 34, central trajectory controller 3210 may include node interface 3402, input data repository 3404, trajectory processor 3406, and central learning subsystem 3408. In some aspects, node interface 3402 may be a processor configured to act as a peer to central interface 3314 of mobile access node 3202, and may therefore be configured to support a signaling connection between central trajectory controller 3210 and mobile access node 3202. As shown in FIG. 32, central trajectory controller 3210 may interface with network access node 3208. Node interface 3402 may therefore transmit signaling to mobile access node 3202 over this signaling connection by providing the signaling to network access node 3208, which may wirelessly transmit the signaling over the wireless backhaul link. Node interface 3402 may receive signaling from mobile access node 3202 by receiving the signaling from network access node 3208, which may in turn have initially received the signaling from mobile access node 3202 over the wireless backhaul link.

Input data repository 3404 and trajectory processor 3406 may be configured in the manner of input data repository 1004 and trajectory processor 1006 of central trajectory controller 714 in FIG. 10. Accordingly, input data repository 3404 may be a server-type component including a controller and the memory, where input data repository 3404 collects input data for a central trajectory algorithm executed by trajectory processor 3406. Trajectory processor 3406 may be configured to execute the central trajectory algorithm with the input data and to obtain coarse trajectories for mobile access nodes 3202-3206.

In some aspects, central learning subsystem 3408 may be configured in the manner of central learning subsystem 2316 of anchor access point 2002 in FIG. 23. Accordingly, central learning subsystem 3408 may be a processor configured to execute a pattern recognition algorithm, propagation modeling algorithm, and/or access usage prediction algorithm. These algorithms can be AI algorithms that use input data about served terminal devices to predict user density, predict radio conditions, and predict user behavior for access usage.

Figure 36:
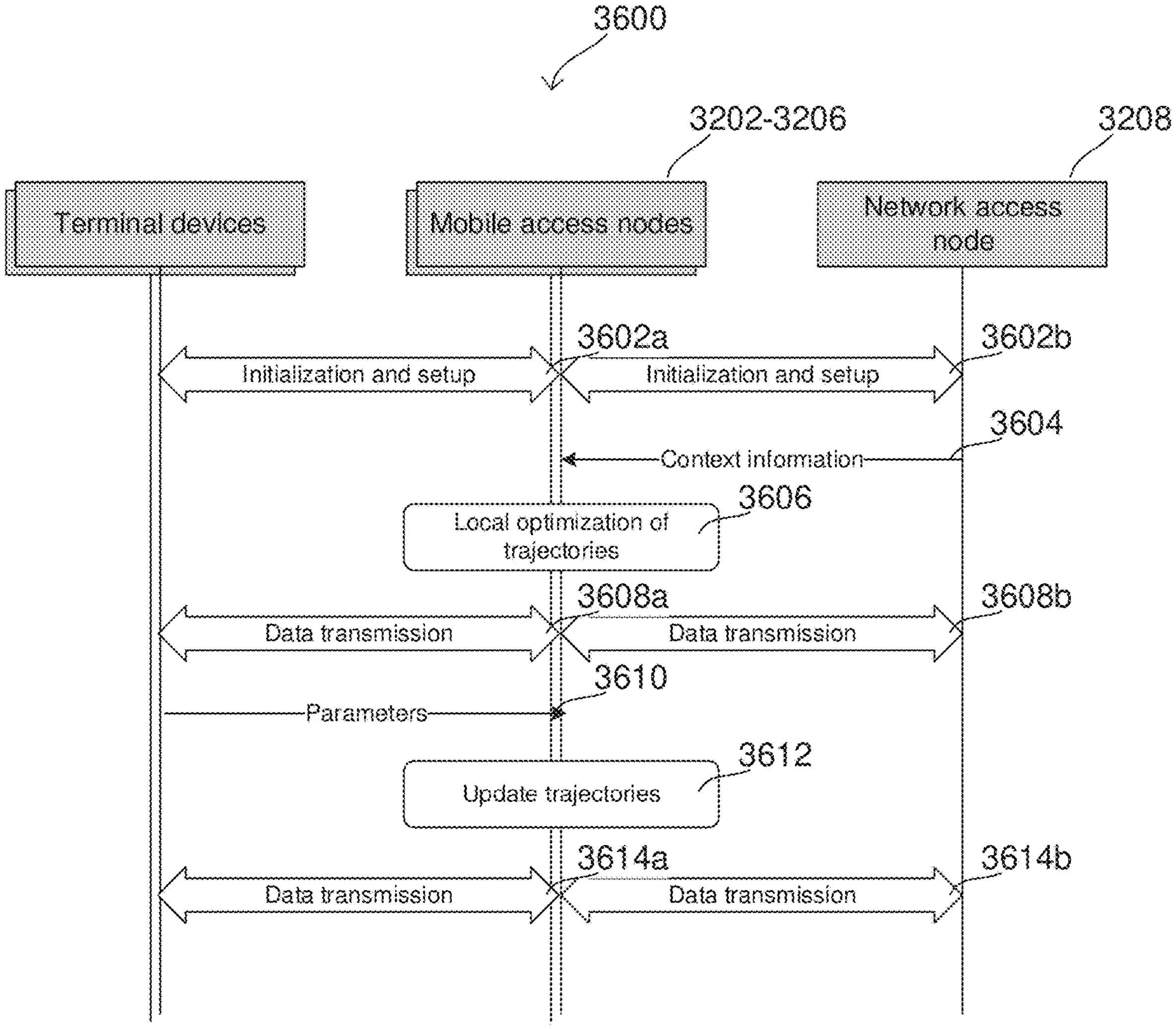
FIG. 36 shows an exemplary procedure for determining trajectories for mobile access nodes according to some aspects.

As previously indicated, in some aspects mobile access nodes 3202-3206 may operate in cooperation with central trajectory controller 3210 (e.g., may use trajectories determined in part by central trajectory controller 3210), while in other aspects mobile access nodes 3202-3206 may operate independently from a central trajectory controller (e.g., may determine their trajectories locally, optionally in cooperation with other mobile access nodes). FIG. 36 shows exemplary message sequence chart 3600 according to some aspects, which shows an example where mobile access nodes 3202-3206 may operate in coordination with central trajectory controller. In some aspects, the procedure of message sequence chart 3600 may be similar to that of message sequence chart 1400 of FIG. 14, in which central trajectory controller 714 and backhaul moving cells 708 and 710 determined coarse and updated trajectories (as well as initial routings) for various outer moving cells and/or terminal devices that were served by backhaul moving cells 708 and 710.

Accordingly, in some aspects message sequence chart 3600 may use a same or similar procedure as message sequence chart 1400 to determine coarse and updated trajectories (and, optionally, routings) for mobile access nodes 3202-3206 to serve indoor coverage area 3212. For example, mobile access nodes 3202-3206 may first perform initialization and setup with central trajectory controller 3210, which can include setting up the signaling connections between the respective central interfaces 3314 of mobile access nodes 3202-3206 and node interface 3402 of central trajectory controller 3210 (e.g., as previously described for stage 1402 of FIG. 14). Then, central trajectory controller 3210 may compute coarse trajectories and initial routing for mobile access nodes 3202-3206 in stage 3504. Similar to as described above for stage 1404, central trajectory controller 3210 may execute a central trajectory algorithm with its trajectory processor 3406. Trajectory processor 3406 may therefore use input data collected and provided by input data repository 3404 to develop a statistical model of the radio environment around indoor coverage area 3212. Then, using the statistical model to approximate the radio environment, trajectory processor 3406 (running the central trajectory algorithm) may determine coarse trajectories for mobile access nodes 3202-3206 that increase (e.g., maximize) a function of an optimization criteria. The optimization criteria can be, for example, a supported data rate for the served terminal devices, a probability that the supported data rate for all of served terminal devices is above a predefined data rate threshold, a link quality metric (e.g., SINR), or a probability that the link quality metric for all of the served terminal devices is above a predefined link quality threshold.

In some aspects, trajectory processor 3406 may balance the coarse trajectories of mobile access nodes 3202-3206 between fronthaul and backhaul. For example, the optimal position for mobile access node 3202 to provide access to served terminal devices in indoor coverage area 3212 may not be the optimal position for mobile access node 3202 to perform backhaul transmission or reception with network access node 3208. In some aspects, the function of the optimization criteria may depend on both fronthaul and backhaul (e.g., may consider both the fronthaul and backhaul link in representing the optimization criteria), and determining coarse trajectories to optimize the function of the optimization criteria may inherently consider both the fronthaul and backhaul. In other aspects, the function of the optimization criteria may, for example, only be based on the fronthaul (e.g., may represent supported data rate and/or link quality depending on the fronthaul but not the backhaul). In such cases, trajectory processor 3406 may be configured to use a dual-phase optimization approach. For example, trajectory processor 3406 may be configured to determine a coarse trajectory based on the function of the optimization criteria in the first phase, which only depends on the fronthaul. Trajectory processor 3406 may then update the coarse trajectory to improve the backhaul in the second phase (e.g., by adjusting the trajectory to optimize a function depending on the backhaul, such as to increase a function defining link strength of the backhaul link or decrease a function defining the distance between the mobile access nodes and network access node 3208). Trajectory processor 3406 may then return to the first phase to update the coarse trajectory to increase the function of the optimization criteria, and continue to alternate between the first and second phases to iteratively update the coarse trajectory. In one example, trajectory processor 3406 may perform these updates in an incremental manner, such as by updating the trajectories in limited steps with each update.

In some aspects, the central trajectory algorithm may be configured to use propagation pathloss data about indoor coverage area 3212 as input data. This propagation pathloss data can characterize the propagation pathloss on the outer surface of indoor coverage area. For example, the propagation pathloss data can be map-based data that geographically plots the propagation pathloss (e.g., with discrete values for each point or a continuous function along a line) along the outer surface of indoor coverage area 3212. This can be coordinate-based data, where the data includes coordinates along the outer surface and each coordinate is paired with a propagation pathloss value (that gives the propagation pathloss for wireless signals passing through the outer surface at the corresponding coordinate). The underlying propagation pathloss data can therefore be a set of map coordinates that are paired with a propagation pathloss value for the location corresponding to the map coordinates. The propagation pathloss data can be either two-dimensional (e.g., each coordinate having two values to identify a point on a 2D plane) or three-dimensional (e.g., each coordinate having three values to identify a point in a 3D area).

In some aspects, this map-based propagation pathloss data can be downloaded or preinstalled into central trajectory controller 3210. For example, a human operator can render the propagation pathloss data (e.g., with a computer-aided design tool, such as a mapping tool) for the outer surface of indoor coverage area 3212, and input data repository 3404 can download and store the propagation pathloss data for later use.

In other aspects, central trajectory controller 3210 may be configured to locally generate the propagation pathloss data. For example, the served terminal devices, mobile access nodes 3202-3206 (e.g., with sensor 3322 configured as a radio measurement engine), and or external sensors may perform and report radio measurements to input data repository 3404. The radio measurements can also be geotagged, such as with the location of the transmitting device for the radio measurement or the receiving device for the radio measurement. Input data repository 3404 may then provide the radio measurements to central learning subsystem 3408. Central learning subsystem 3408 may then execute a radio propagation modeling algorithm with radio measurements to estimate the propagation pathloss of the outer surface of indoor coverage area 3212 and to generate the propagation pathloss data. This can include using the geotagging information accompanying the radio measurements to estimate the propagation pathloss. For example, if a radio measurement is geotagged with both the transmitting and receiving device's locations (e.g., a location of a served terminal device and a mobile access node that performs a radio measurement on the served terminal device), the propagation modeling algorithm can determine approximately where the radio signal passed through the outer surface. Using the radio measurement and the distance between the transmitting and receiving devices (which is generally inversely proportional to signal strength), the propagation modeling algorithm can estimate the propagation pathloss at the point where the radio signal passed through the outer surface. In other cases where radio measurements are only geotagged at one side (e.g., with the location of only the transmitting device or the receiving device), the propagation modeling algorithm may still be able to estimate a region of the outer surface where the radio signal passed through the outer surface, and can thus derive propagation pathloss data from the radio measurements. The radio measurements can also be geotagged with Angle-of-Arrival (AoA) information about the angle at which the receiving device received the radio signal, which can similarly be used to estimate the point at which the radio signal passed through the outer surface. In some aspects, other context information, such as a map of indoor coverage area 3212, can be used to approximate, for example, where a served terminal device was when it transmitted a radio signal. The propagation modeling algorithm can then use this approximate location of the served terminal device to estimate the point where the radio signal passed through the outer surface, as well as the distance between the served terminal device and a mobile access node measuring the radio signal. The propagation modeling algorithm can then approximate the propagation pathloss for an approximate point on the outer surface. In some aspects, the propagation modeling algorithm can use other radio map data (e.g., such as an REM) that indicates the propagation pathlosses from other obstacles in the path between the served terminal device and the mobile access node to isolate the propagation pathloss that is due to the outer surface. In some aspects, central learning subsystem 3408 may use a large data set of such radio measurements to develop the propagation pathloss data for the outer surface of indoor coverage area 3212.

Central learning subsystem 3408 can therefore generate the propagation pathloss data as map-based data that plots propagation pathloss values along the outer surface of indoor coverage area 3212. In some aspects, central learning subsystem 3408 may use a map of indoor coverage area 3212, such as by tagging locations in the map (e.g., attaching data to the stored coordinates of these locations) that are located on the outer surface indoor coverage area 3212 with a propagation pathloss value.

Additionally or alternatively, in some aspects central learning subsystem 3408 may be configured to use propagation pathloss data that identifies low propagation pathloss areas along the outer surface of indoor coverage area 3212. In some cases, this propagation pathloss data can be less specific than the map-based propagation pathloss data, as it may only identify locations of finite number of low propagation pathloss areas instead of plotting out propagation pathloss values along the outer surface of indoor coverage area 3212. This is referred to herein as location-based propagation pathloss data. For example, with reference to FIG. 32, this location-based propagation pathloss data can identify the locations of openings 3212*a*-3212*f* as locations of low propagation pathloss areas. The underlying propagation pathloss data can therefore be map coordinates that identify the location of a low propagation pathloss area along the outer surface of indoor coverage area 3212. This location-based propagation pathloss data can be based on a map of indoor coverage area 3212, where locations (e.g., their coordinates) are tagged as being a low propagation pathloss area. Furthermore, in some aspects the low propagation pathloss areas can be paired with a propagation pathloss rating on a predefined scale, where the ratings indicate different propagation pathloss values. In an example where opening 3212*d* is a door and opening 3212*a* is a window, the coordinates for opening 3212*d* (in the propagation pathloss data) can be paired with a propagation pathloss rating that indicates more propagation pathloss than the coordinates for opening 3212*a*. These propagation pathloss ratings may be less specific than the propagation pathloss values described above for the map-based propagation pathloss data.

In some aspects, this location-based propagation pathloss data can be downloaded or preinstalled into central trajectory controller 3210. For example, a human operator can render the propagation pathloss data (e.g., with a computer-aided design tool, such as a mapping tool) for the outer surface of indoor coverage area 3212, such as by tagging a virtual map at the locations that are low propagation pathloss areas. Input data repository 3404 can then download and store the propagation pathloss data for later use.

In other aspects, central learning subsystem 3408 may execute a propagation modeling algorithm to generate the location-based propagation pathloss data. For example, similar to as described before, input data repository 3404 may collect radio measurements from around indoor coverage area 3212. Central learning subsystem 3408 may then execute the propagation modeling algorithm on the radio measurements and attempt to identify the locations of low propagation pathloss areas on the outer surface of indoor coverage area 3212. For example, as described above, central learning subsystem 3408 may be configured to estimate the positions of the transmitting and receiving devices based on the radio measurements (e.g., potentially using geotagging data), the point where the radio signal passed through the outer surface, and the distance between the transmitting and receiving devices. Using the inverse relationship between distance and signal strength, central learning subsystem 3408 may then estimate the propagation pathloss at the point on the outer surface and determine whether the point is has low propagation pathloss or not (e.g., propagation pathloss below a threshold). Central learning subsystem 3408 may do this with a large set of radio measurements, and therefore obtain determinations whether a corresponding large group of points on the outer surface have low propagation pathloss. Central learning subsystem 3408 may then evaluate the points on the outer surface that are identified as being low propagation pathloss, and identify areas of the outer surface that have a high density of points with low propagation pathloss (e.g., a density of points above a threshold) as being low propagation pathloss areas. In some aspects, central learning subsystem 3408 may also assign a propagation pathloss rating to the identified low propagation pathloss areas, where the rating can be based on the estimated propagation pathlosses of the points in the low propagation pathloss areas (e.g., based on an average or other combined metric of the estimated propagation pathlosses of the points).

The propagation pathloss data (e.g., map-based, location-based, or another type of propagation pathloss data) may therefore generally characterize propagation pathloss on the outer surface of indoor coverage area 3212. As previously indicated, in some aspects, indoor coverage area 3212 may only be partially indoors, such as a building with only three walls. In these cases, the propagation pathloss data may characterize openings resulting from partially indoor buildings (e.g., a missing wall, partially outdoor room and the like) as having a low propagation pathloss value and/or rating.

Figure 35:
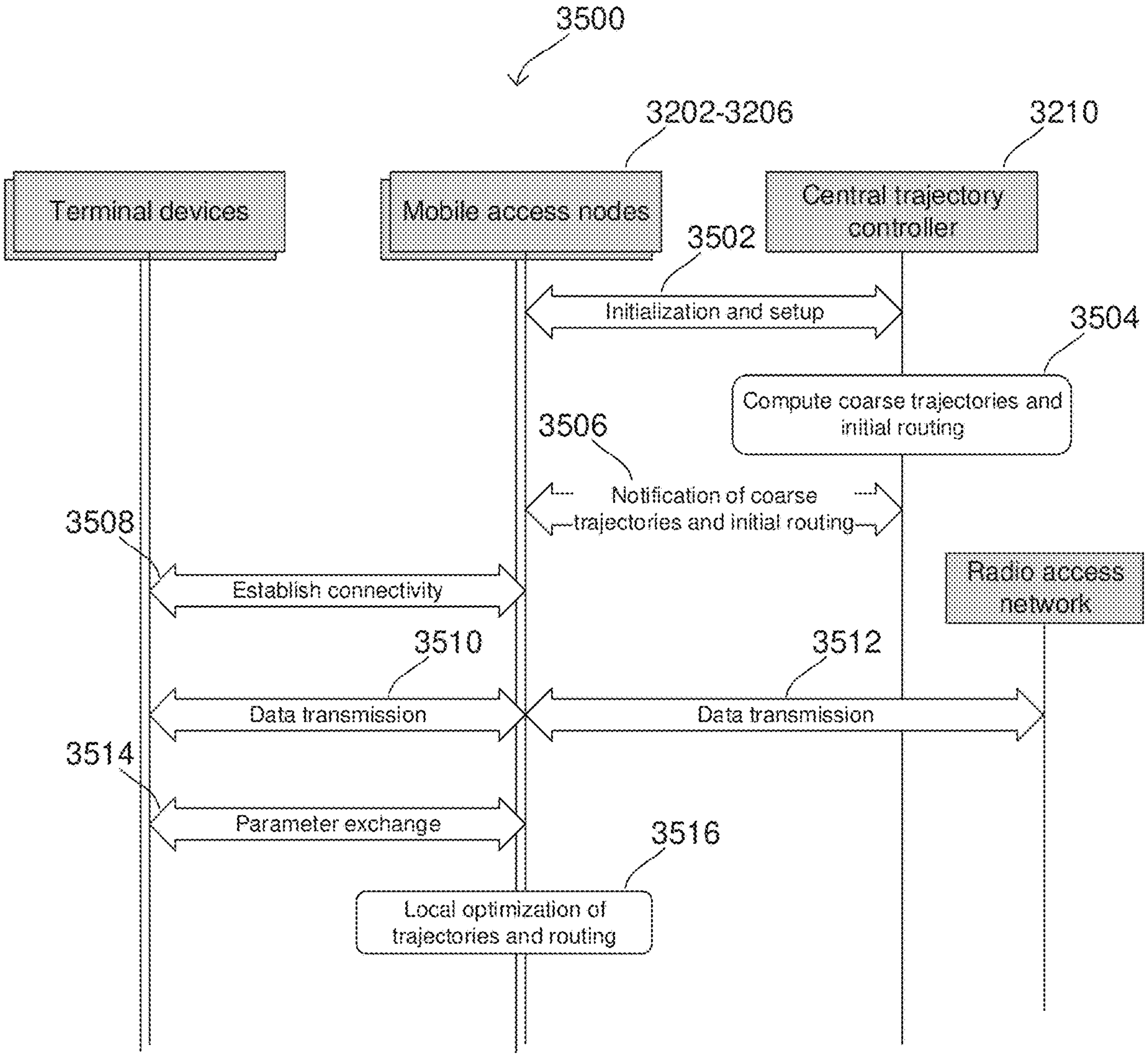
FIG. 35 shows an exemplary procedure for determining trajectories for mobile access nodes according to some aspects.

With reference back to message sequence chart 3500 in FIG. 35, the central trajectory algorithm running at trajectory processor 3406 can therefore use the propagation pathloss data as part of the statistical model to model the propagation pathloss through the outer surface during stage 3504. This can be particularly applicable when the statistical model is based on a radio map that models the radio environment over a mapped area, as the map-based or location-based propagation pathloss data can be inserted into the radio map along with other input data used to generate the radio map. Using the propagation pathloss data as part of the statistical model, trajectory processor 3406 may execute the central trajectory algorithm to determine coarse trajectories for mobile access nodes 3202-3206 that increase, which may include maximizing, the function of the optimization criteria in stage 3504. This can be done, for example, using gradient descent or another optimization approach.

As the statistical model is based on the propagation pathloss data, the coarse trajectories may help to position mobile access nodes 3202-3206 in locations from which they can serve terminal devices inside indoor coverage area 3212 with low propagation pathloss. For example, as the propagation pathloss data may provide an accurate characterization of the propagation pathlosses through the outer surface of indoor coverage area 3212, the central trajectory may be able to effectively determine coarse trajectories that yield radio links between mobile access nodes 3202-3206 that pass through low propagation pathloss areas in the outer surface. FIG. 32 shows an example of this, where mobile access nodes 3202-3206 may be able to use radio links that pass through low propagation pathloss areas (e.g., openings 3212*a*, 3212*e*, and 3212*f*). As the propagation pathloss data may characterize the propagation pathloss of the outer surface at various different positions, the statistical model may be able to accurately approximate propagation pathloss between mobile access nodes, and thus can be used by the central trajectory algorithm to determine coarse trajectories that yield radio links having lower propagation pathloss.

In some aspects central trajectory controller 3210 may also determine initial routings (e.g., assign the terminal devices to one of mobile access nodes 3202-3206) that increase the function of the optimization criteria. Central trajectory controller 3210 may determine these initial routings using any processing technique described above for central trajectory controller 714. As central trajectory controller 3210 may also determine the initial routings based on the statistical model, the initial routings may also be dependent on the propagation pathloss data. For example, as the propagation pathloss data indicates areas on the outer surface of indoor coverage area 3212 that have low propagation pathloss, central trajectory controller 3210 may be configured to determine initial routings (e.g., select which of mobile access nodes 3202-3206 to assign to relay data for each served terminal device) that yield radio links between the mobile access nodes and served terminal devices that pass through the outer surface at areas with lower propagation pathloss.

In some aspects, central trajectory controller 3210 may use predictable usage patterns as part of the statistical model in stage 3504. Accordingly, central trajectory controller 3210 can use predictable usage patterns (e.g., generated by central learning subsystem 3408) in any manner described above for FIGS. 20-31. For example, central trajectory controller 3210 may be configured to use predicted user densities, predicted radio conditions, and/or predicted usage patterns as part of the statistical model when executing the central trajectory algorithm. Central trajectory controller 3210 may therefore determine the resulting coarse trajectories and/or initial routings determined in stage 3504 based on these predictable usage patterns. In some aspects, central trajectory controller 3210 may also use predictable usage patterns determining scheduling and resource allocations and/or selecting fronthaul radio access technologies.

Stages 3508-3514 may then generally follow the procedure previously described for message sequence chart 4100, and will be explained briefly here for purposes of conciseness. As shown in FIG. 35, central trajectory controller 3210 may send the coarse trajectories and initial routings to mobile access nodes 3202-3206 in stage 3506. Mobile access nodes 3202-3206 may establish connectivity with the served terminal devices in indoor coverage area 3212 (e.g., as specified by the initial routings). Mobile access nodes 3202-3206 may then relay data between the served terminal devices and the radio access network (e.g., network access node 3208) in stages 3510*a*-3510*b* while moving according to the coarse trajectories. As central trajectory controller 3210 determined the coarse trajectories using propagation pathloss data of the outer surface of indoor coverage area 3212, mobile access nodes 3202-3206 may use trajectories that position mobile access nodes 3202-3206 in positions that yield stronger links (through the outer surface of indoor coverage area 3212) with the served terminal devices. This can therefore help improve radio performance (e.g., reduce SNR)

Mobile access nodes 3202-3206 and the served terminal devices may then perform parameter exchange in stage 3512, such as where the served terminal devices report radio measurements back to mobile access nodes 3202-3206. With mobile access node 3202 as an example, local controller 3320 of mobile access node 3302 may receive the radio measurements from the served terminal devices via baseband subsystem 3306, and store them for use as input data in the local trajectory algorithm. Mobile access nodes 3202-3206 may also perform their own radio measurements on signals received from the served terminal devices. For example, sensor 3322 may be configured as a radio measurement engine, and may provide the resulting radio measurements to local controller 3320.

Mobile access nodes 3202-3206 may then perform local optimization of trajectories and/or routing in stage 3514. In an example using mobile access node 3202, local controller 3320 may be configured to execute the local trajectory algorithm to update the coarse trajectories based on input data. The input data can include the radio measurements. In some aspects, the local trajectory algorithm may determine an updated trajectory for mobile access node 3202 that increases, which may include maximizing, a function of the optimization criteria.

In some aspects, mobile access node 3202 may use local learning subsystem 3318 to update the propagation pathloss data. For example, central trajectory controller 3210 may have previously sent the propagation pathloss data for indoor coverage area 3212 to mobile access node 3202 (e.g., during stage 3506), which mobile access node 3202 may store at local learning subsystem 3318. Mobile access node 3202 may also provide the radio measurements to local learning subsystem 3318. Local learning subsystem 3318 may then update the propagation pathloss data using the radio measurements. For example, local learning subsystem 3318 may use geotagged radio measurements to estimate the point where the radio signal passed through the outer surface of indoor coverage area 3212, the distance between the transmitting and receive devices, and the corresponding propagation pathloss of the outer surface of indoor coverage area 3212. Local learning subsystem 3318 may then use this propagation pathloss to update the propagation pathloss data, such as by updating a propagation pathloss value of map-based propagation pathloss data at coordinates at or near the point, updating a propagation pathloss rating for location-based propagation pathloss data in a low propagation pathloss area in which the point falls, and/or by adding a new low propagation pathloss area to the existing low propagation pathloss areas of location-based propagation pathloss data.

Local controller 3320 may then execute the local trajectory algorithm using the updated propagation pathloss data, such as by determining an updated trajectory that increases the function of the optimization criteria (where the function of the optimization criteria is approximated with the statistical model that is based on the updated propagation pathloss data). Mobile access nodes 3202 may then move according to the updated trajectory while providing access to the served terminal devices (e.g., by relaying data between the served terminal devices and network access node 3208).

As the propagation pathloss data and the corresponding statistical model is updated, the updated trajectory produced by the local trajectory algorithm may be different from the coarse trajectory. In some cases, the updated trajectory may yield an improved link strength. In particular, as mobile access node 3202 may have a more accurate characterization of the propagation pathloss along the outer surface of indoor coverage area 3212, mobile access node 3202 may be able to more accurately determine an updated trajectory that has a strong link to the served terminal devices through the outer surface.

In some aspects, local controller 3320 may additionally update the initial routings to obtain updated routings, and then use the updated routings to control which served terminal devices that mobile access node 3202 provides access to. In various aspects, mobile access node 3202 may also use predictable usage patterns in stage 3514 (e.g., in any manner described above). This can include using predictable usage patterns to determine scheduling and resource allocations and/or to select fronthaul radio access technologies.

In some aspects, mobile access nodes 3202-3206 may repeat part of this procedure of message sequence chart 3500. For example, central trajectory controller 3210 may be configured to periodically re-determine new coarse trajectories, and to send the new coarse trajectories to mobile access nodes 3202-3206. Mobile access nodes 3202-3206 may then move according to the coarse trajectories and subsequently update the new coarse trajectories to obtain updated trajectories. Mobile access nodes 3202-3206 may then provide access to the served terminal devices while moving according to the updated trajectories.

As previously indicated, in some aspects mobile access nodes 3202-3206 may determine their trajectories independent of a central trajectory controller. FIG. 36 shows exemplary message sequence chart 3600 according to some aspects, which illustrates an example of this process. As shown in FIG. 36, the served terminal devices may first connect to mobile access nodes 3202-3206 in stage 3602*a*. This can include any connection procedure, such as a random access connection procedure. Mobile access nodes 3202-3206 may also connect to network access node 3208 in stage 3602*a*, and may therefore establish the wireless backhaul links used by mobile access nodes 3202-3206 to relay user data between the served terminal devices and network access node 3208.

Then, network access node 3208 may send mobile access nodes 3202-3206 context information about indoor coverage area 3212 in stage 3604. In some aspects, this context information can include, for example, map data for indoor coverage area 3212, or other information about the neighborhood environment. In some aspects, the context information can include propagation pathloss data, such as map-based propagation pathloss data or location-based propagation pathloss data. Network access node 3208 may receive this context information from an external data network, such as a server that stores preconfigured context information about indoor coverage area 3212. The context information can therefore be predefined.

Mobile access nodes 3202-3206 may then determine coarse trajectories in stage 3606. As mobile access nodes 3202-3206 are operating independently of a central trajectory controller, mobile access nodes 3202-3206 may perform the processing previously described for stage 3504 for central trajectory controller 3210 in FIG. 35. Accordingly, mobile access nodes 3202-3206 may execute a local trajectory algorithm with their local controllers 3320 to determine coarse trajectories that increase, which may include maximizing, a function of an optimization criteria. Mobile access nodes 3202-3206 may use any type of trajectory-related processing described above as part of the local trajectory algorithm.

In some aspects, mobile access nodes 3202-3206 may be configured to use a dual-phased optimization, such as where local controller 3320 alternates between iteratively updating the coarse trajectory based on the fronthaul in a first phase (e.g., to increase a function of the optimization criteria that depends on the fronthaul but not the backhaul) and updating the coarse trajectory based on the backhaul in a second phase (e.g., to optimize a function dependent on the backhaul).

In some aspects, mobile access nodes 3202-3206 may use propagation pathloss data as part of the statistical model used for the local trajectory algorithm. As noted above, in some aspects, network access node 3208 may transmit the propagation pathloss data as part of the context information in stage 3604. Local controller 3320 may receive this propagation pathloss data (via baseband subsystem 3306) and save it for execution of the local trajectory algorithm. In other aspects, network access node 3208 may transmit other context information about indoor coverage area 3212 as part of the context information in stage 3604. In some aspects where network access node 3208 does not provide the propagation pathloss data, mobile access nodes 3202-3206 may be configured to locally generate the propagation pathloss data.

In an example using mobile access node 3202, mobile access node 3202 may use local learning subsystem 3318 to generate the propagation pathloss data. In some aspects, local learning subsystem 3318 may use a same or similar technique to that described above for central learning subsystem 3408 regarding stage 3504. For example, mobile access node 3202 may collect radio measurements (e.g., provided as measurement reports by the served terminal devices or network access node 3208, or locally determined by sensor 3322) at local learning subsystem 3318. Local learning subsystem 3318 may then be configured to execute a propagation modeling algorithm to determine the propagation pathloss data based on the radio measurements (which can also be geotagged). This propagation pathloss data can be map-based propagation pathloss data or location-based propagation pathloss data. In some aspects where network access node 3208 provides other context information about indoor coverage area 3212, such as map data for indoor coverage area 3212, local learning subsystem 3318 may be configured to use the map data to generate the location-based propagation pathloss data (e.g., by using the map data to plot the outer surface of indoor coverage area 3212, and tagging different points on the outer surface with propagation loss values or identifying different areas as low propagation pathloss areas).

In some aspects, one of mobile access nodes 3202-3206 may be configured to generate the propagation pathloss data with its local learning subsystem 3318, and then to send the propagation pathloss data to the other of mobile access nodes 3202-3206 (e.g., using their node interfaces 3316). In some aspects mobile access nodes 3202-3206 may be configured to distribute the processing involved in the propagation modeling algorithm amongst themselves, and to each execute a different part of the processing. Mobile access nodes 3202-3206 may then compile the resulting data together the obtain the propagation pathloss data.

In some aspects, mobile access nodes 3202-3206 may also use predictable usage patterns (e.g., predicted user densities, predicted radio conditions, and/or predictable access usage) in stage 3606 as part of the statistical model used by the local trajectory algorithm. In some aspects, mobile access nodes 3202-3206 may also determine initial routings, determine scheduling and resource allocations and/or select fronthaul radio access technologies as part of stage 3606. This can include any related processing described above.

With reference back to FIG. 35, after determining coarse trajectories in stage 3606, mobile access nodes 3202-3206 may perform data transmission with the served terminal devices and network access node 3208 in stages 3608*a*-3608*b*. Accordingly, mobile access nodes 3202-3206 may provide access to the served terminal devices in indoor coverage area 3212 by relaying data between the served terminal devices and network access node 3208. Mobile access nodes 3202-3206 may follow their respective coarse trajectories while providing access to the served terminal devices (e.g., where local controller 3320 provides the coarse trajectory to movement controller 3328, which may then control steering and movement machinery 3330 to move the mobile access node according to the coarse trajectory).

As shown in FIG. 36, the served terminal devices may report parameters back to mobile access nodes 3202-3206 in stage 3610. This can include, for example, where the served terminal devices provide radio measurements, current positions, and/or geotagged radio measurements. In some aspects, mobile access nodes 3202-3206 may perform their own radio measurements with sensor 3322. These radio measurements, current positions, and geotagged radio measurements may form input data for the local trajectory algorithm.

Then, mobile access nodes 3202-3206 may then update the coarse trajectories to obtain updated trajectories in stage 3612. In an example using mobile access node 3202, local controller 3320 may update the statistical model with the input data and then, using the updated statistical model, determine an updated trajectory for mobile access node 3202 that increases the function of the optimization criteria. In some aspects, local learning subsystem 3318 may use the input data to update the propagation pathloss data, such as by using geotagged radio measurements to update propagation pathloss values for points on the outer surface and/or to identify or update low propagation pathloss areas. Local controller 3320 may then use this updated propagation pathloss data as part of the updated statistical model, and the updated trajectory may therefore be based on the updated propagation pathloss data.

After updating their trajectories to obtain update trajectories in stage 3612, mobile access nodes 3202-3206 may perform data transmission with the served terminal devices in indoor coverage area 3212 and network access node 3208 in stages 3614*a* and 3614*b*. Mobile access nodes 3202-3206 may move according to their respective updated trajectories while relaying data between the served terminal devices and network access node 3208, and may therefore provide access to the served terminal devices.

In some aspects, mobile access nodes 3202-3206 may repeat stages 3610-3614*b*, and may continue to receive parameters from the served terminal devices, update their trajectories, and provide access to the served terminal devices by relaying data between the served terminal devices and network access node 3208. As the updated trajectories may be based on propagation pathloss data that characterizes the propagation pathloss of indoor coverage area 3212, mobile access nodes 3202-3206 may be able to use trajectories that yield strong links (e.g., with lower propagation pathloss and/or higher SNR) to the served terminal devices. Supported data rate and other link quality metrics may therefore be improved.

In some aspects, mobile access nodes 3202-3206 may be configured to perform stage 3606 in coordination with each other. For example, mobile access nodes 3202-3206 may be able to cooperate to determine their coarse trajectories. Instead of determining their individual coarse trajectories independently, mobile access nodes 3202-3206 may therefore determine their coarse trajectories dependent on the coarse trajectories of each other.

For example, in some aspects mobile access nodes 3202-3206 may determine their coarse trajectories in stage 3506 in a sequential manner. For example, mobile access node 3202 may determine its coarse trajectory first. Namely, local controller 3320 of mobile access node 3202 may define a function of an optimization criteria (e.g., related to a supported data rate or a link quality metric) and determine a coarse trajectory for mobile access node 3202 that increases (e.g., maximizes) the function of the optimization criteria. The function of the optimization criteria can be based on a statistical model of the radio environment around indoor coverage area 3212, which can use propagation pathloss data, other radio map data, radio measurements, positions of served terminal devices, and/or predictable usage patterns to approximate the radio environment.

Then, after mobile access node 3202 has determined its coarse trajectory, local controller 3320 may send the coarse trajectory to mobile access node 3204 (e.g., via node interface 3316 and baseband subsystem 3306, which may use a device-to-device link to send the signaling to mobile access node 3204). Local controller 3320 of mobile access node 3204 may then determine its own coarse trajectory while considering the coarse trajectory of mobile access node 3202. For example, as part of the statistical model, local controller 3320 may estimate the radio coverage provided to terminal devices in indoor coverage area 3212 by mobile access node 3202 (e.g., by estimating the link strength between mobile access node 3202 and different points in indoor coverage area 3212 while mobile access node 3202 follows its coarse trajectory). Then, local controller 3320 may determine a coarse trajectory for mobile access node 3204 that increases the function of the optimization criteria given the estimated radio coverage provided by mobile access node 3202 with its coarse trajectory.

Local controller 3320 of mobile access node 3204 may then send its coarse trajectory and the coarse trajectory for mobile access node 3202 to mobile access node 3206. Local controller 3320 of mobile access node 3206 may then determine its own coarse trajectory using the coarse trajectories of mobile access nodes 3204 and 3206 (e.g., by estimating radio coverage provided by mobile access nodes 3204 and 3206 to indoor coverage area 3212, and determining a coarse trajectory for mobile access node 3206 that increases a function of the optimization criteria given this estimated radio coverage). Mobile access nodes 3202-3206 may then follow the coarse trajectories while relaying data between the served terminal device and network access node 3208. Mobile access nodes 3202-3206 may also receive parameters from the served terminal devices, update their trajectories (e.g., in coordination with each other as described immediately above), and relay data while moving according to the updated trajectories.

In some aspects, mobile access nodes 3202-3206 may be assigned to different geographic areas, and may be constrained to determine trajectories within their respectively assigned geographic areas. For example, mobile access node 3202 may be assigned to a first geographic area, mobile access node 3204 may be assigned to a second geographic area, and mobile access node 3206 may be assigned to a third geographic area. The geographic areas may be different (e.g., mutually exclusive, or without substantial overlap). Accordingly, when local controller 3320 determines a trajectory (coarse or updated) for mobile access node 3202, local controller 3320 may be configured to determine a trajectory within the first geographic area that increases the function of the optimization criteria. Accordingly, instead of determining a trajectory that has no geographic bounds, local controller 3320 may be configured to determine trajectories that are constrained by the first geographic area assigned to mobile access node 3202. Mobile access nodes 3204 and 3206 may similarly be configured to determine trajectories within their respectively assigned second and third geographic areas. In some aspects, mobile access nodes 3202-3206 may perform a negotiation procedure (e.g., via signaling exchange executed by their local controllers 3320 with their cell interfaces 3314) to determine the geographic areas assigned to each of mobile access nodes 3202-3206.

In some aspects, mobile access nodes 3202-3206 may be assigned to serve different geographic areas within indoor coverage area 3212. For example, mobile access node 3202 may be assigned to serve a first geographic area within indoor coverage area 3212, mobile access node 3204 may be assigned to serve a second geographic area within indoor coverage area 3212, and mobile access node 3206 may be assigned to serve a third geographic area within indoor coverage area 3212. Using mobile access node 3202 as an example, local controller 3320 of mobile access node 3202 may be configured to determine trajectories that increase the function of the optimization criteria in the first geographic area within indoor coverage area 3212. Accordingly, mobile access nodes 3202-3206 may be configured to determine trajectories that increase the function of the optimization criteria in their respectively assigned geographic areas within indoor coverage area 3212.

In some aspects, mobile access nodes 3202-3206 may use the propagation pathloss data to control beamsteering directions for their antenna systems 3302. For example, by steering the antenna beams into indoor coverage area 3212 through low propagation pathloss areas, mobile access nodes 3202-3206 may improve link strength and consequently increase the optimization criteria.

Figure 37:
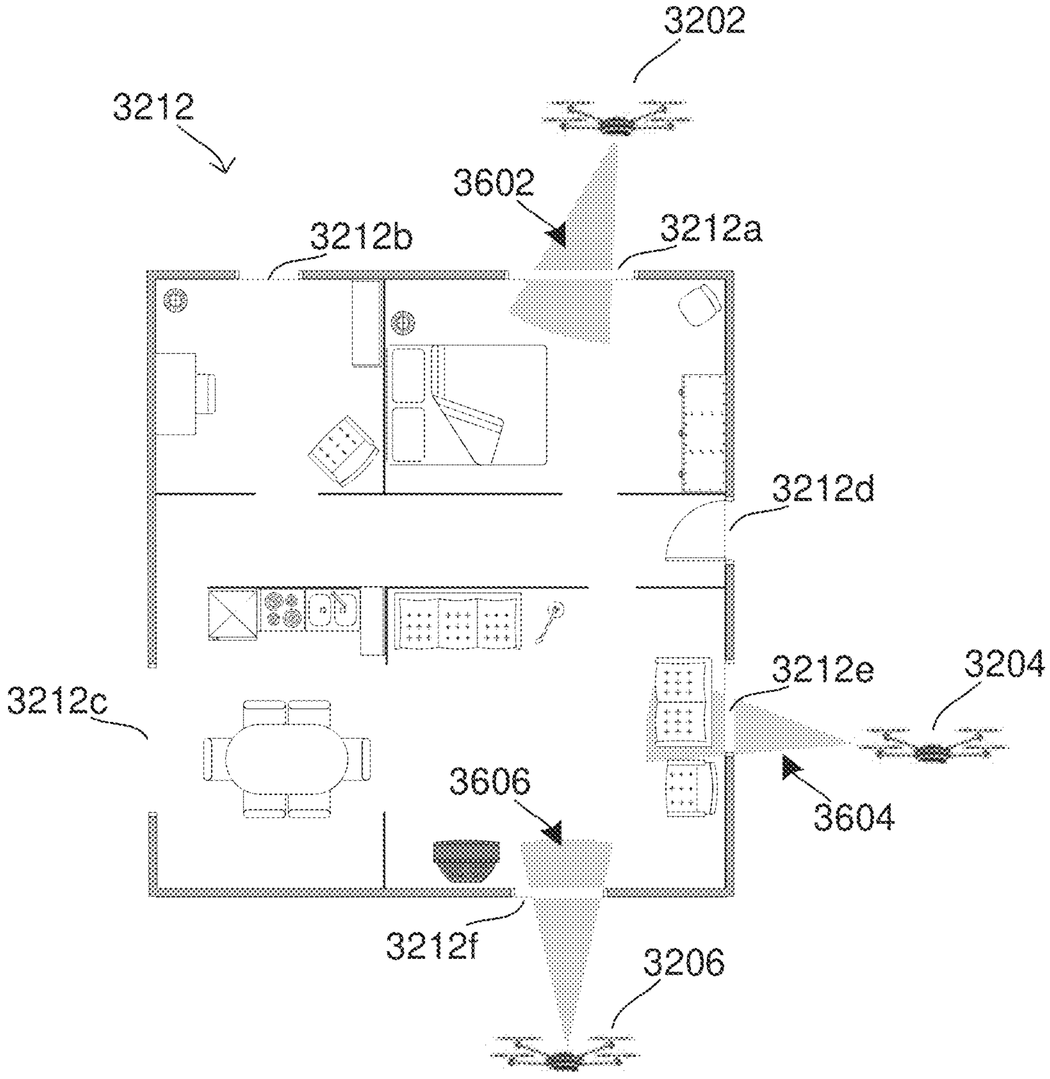
FIG. 37 shows an exemplary network scenario for beamsteering according to some aspects.

FIG. 37 shows an example using mobile access nodes 3202-3206 and indoor coverage area 3212. As shown in FIG. 37, mobile access nodes 3202-3206 may steer their antenna beams 3702-3706 (e.g., directional radiation patterns for transmission or reception that are steered and shaped by beamsteering and/or beamforming) into indoor coverage area 3212 through specific areas of the outer surface of indoor coverage area 3212. In the example shown in FIG. 37, mobile access nodes 3202-3206 may steer antenna beams 3702-3706 through low propagation pathloss areas in the outer surface (e.g., openings 3212*a*, 3212*e*, and 3212*f*). Accordingly, in some aspects mobile access nodes 3202-3206 may use beamsteering directions for antenna beams 3702-3706 that based on the propagation pathloss data. As the propagation pathloss data characterizes propagation pathloss through the outer surface, mobile access nodes 3202-3206 may be able to use beamsteering directions that yield antenna beams that pass through the outer surface at low propagation pathloss areas.

In some aspects, central trajectory controller 3210 may be configured to determine the beamsteering directions, and to provide the beamsteering directions to mobile access nodes 3202-3206. In these aspects, trajectory processor 3406 may be configured to determine the beamsteering directions, such as part of the central trajectory algorithm executed in stage 3504 of message sequence chart 3500. In other aspects, mobile access nodes 3202-3206 may be configured to determine the beamsteering directions locally (e.g., independent of a central trajectory controller). In these aspects, local controllers 3320 of mobile access nodes 3202-3206 may be configured to determine the beamsteering directions, such as part of the local trajectory algorithm executed in stage 3516 of message sequence chart 3500 or stages 3606 and 3612 of message sequence chart 3600. Both options are explained concurrently below due to the similarities in the involved processing.

As introduced above, trajectory processor 3406/local controller 3320 may determine the beamsteering directions based on the propagation pathloss data. For example, in cases where the propagation pathloss data is map-based propagation pathloss data, trajectory processor 3406/local controller 3320 may be configured to define the function of the optimization criteria as dependent on both trajectory and beamsteering direction (e.g., both trajectory and beamsteering directions unknown variables that can be adjusted). As the statistical model (from which the function of the optimization criteria is derived) is based on the propagation pathloss data, trajectory processor 3406/local controller 3320 may determine a trajectory and beamsteering direction that increases the function of the optimization criteria in consideration of the propagation pathloss data.

In many cases, beamsteering directions that yield antenna beams passing through low propagation pathloss areas of the outer surface will increase the function of the optimization criteria. For example, an antenna beam that passes through a low propagation pathloss area of the outer surface may yield a higher supported data and higher link quality metrics than an equivalent antenna beam that passes through a higher propagation pathloss area of the outer surface. Accordingly, trajectory processor 3406/local controller 3320 may determine beamsteering directions that yield antenna beams passing through low propagation pathloss areas of the outer surface, such as shown in FIG. 37.

In cases where the propagation pathloss data is location-based propagation pathloss data (e.g., that identifies the positions of low propagation pathloss areas in the outer surface), trajectory processor 3406/local controller 3320 may be configured to determine beamsteering directions that direct the antenna beams towards the low propagation pathloss areas identified in the propagation pathloss data. For example, in the case of mobile access node 3202, the propagation pathloss data may specify that there is a low propagation pathloss area where opening 3212*a* is located (e.g., may specify coordinates that identify the location opening 3212*a*). Accordingly, when selecting the beamsteering direction for mobile access node 3202, trajectory processor 3406/local controller 3320 may select a beamsteering direction that steers antenna beam 3702 through or towards opening 3212*a*. This may likewise hold for mobile access nodes 3204 and 3206 and openings 3212*e* and 3212*f*, respectively, as shown in FIG. 37.

In aspects where central trajectory controller 3210 determines the beamsteering directions, central trajectory controller 3210 may send the beamsteering directions to mobile access nodes 3202-3206 (e.g., as part of stage 3506 in FIG. 35). Using mobile access node 3202 as an example, local controller 3320 may receive signaling that indicates the beamsteering direction from central trajectory controller 3210, and then provide the beamsteering direction to baseband subsystem 3306. In aspects where mobile access nodes 3202-3206 determine the beamsteering directions locally, their respective local controllers 3320 may determine the beamsteering directions and provide them to baseband subsystem 3306.

After receiving the beamsteering directions, baseband subsystem 3306 may perform transmission and reception using the beamsteering directions to control beamsteering via antenna system 3302. This can include analog, digital, or hybrid beamsteering. In some aspects, trajectory processor 3406 may update the beamsteering directions based on updated propagation pathloss data, and may send the beamsteering directions to mobile access nodes 3202-3206. In some aspects, local controller 3320 of one or more of mobile access nodes 3202-3206 may update the beamsteering directions based on updated propagation pathloss data.

In some aspects, such as in the case of FIG. 32, there may be a fleet of mobile access nodes available to provide access to indoor coverage area 3212. Depending on the current capacity at a given time, it may be possible to provide access to the terminal devices in indoor coverage area with only part of the fleet. For example, with reference to FIG. 32, if there is a smaller number of users in indoor coverage area 3212 (e.g., during the day), it may be possible to effectively serve indoor coverage area 3212 with only mobile access node 3202. As mobile access nodes 3204 and 3206 are therefore not needed, they may be deactivated, such as by docking at a charging station to recharge for later use. When more users are present in indoor coverage area 3212, mobile access node 3204 and/or mobile access node 3206 may be reactivated (e.g., recalled from the charging stating) to help provide access to users in indoor coverage area 3212.

In some aspects, central trajectory controller 3210 may also be configured to handle these decisions regarding the number of mobile access nodes from the fleet to deploy at a given time. For example, trajectory processor 3406 can be configured to determine a number of mobile access nodes to deploy from a fleet at a given time, determine coarse trajectories for the mobile access nodes, and then send signaling to the mobile access nodes that activates them and specifies the coarse trajectories.

Figure 38:
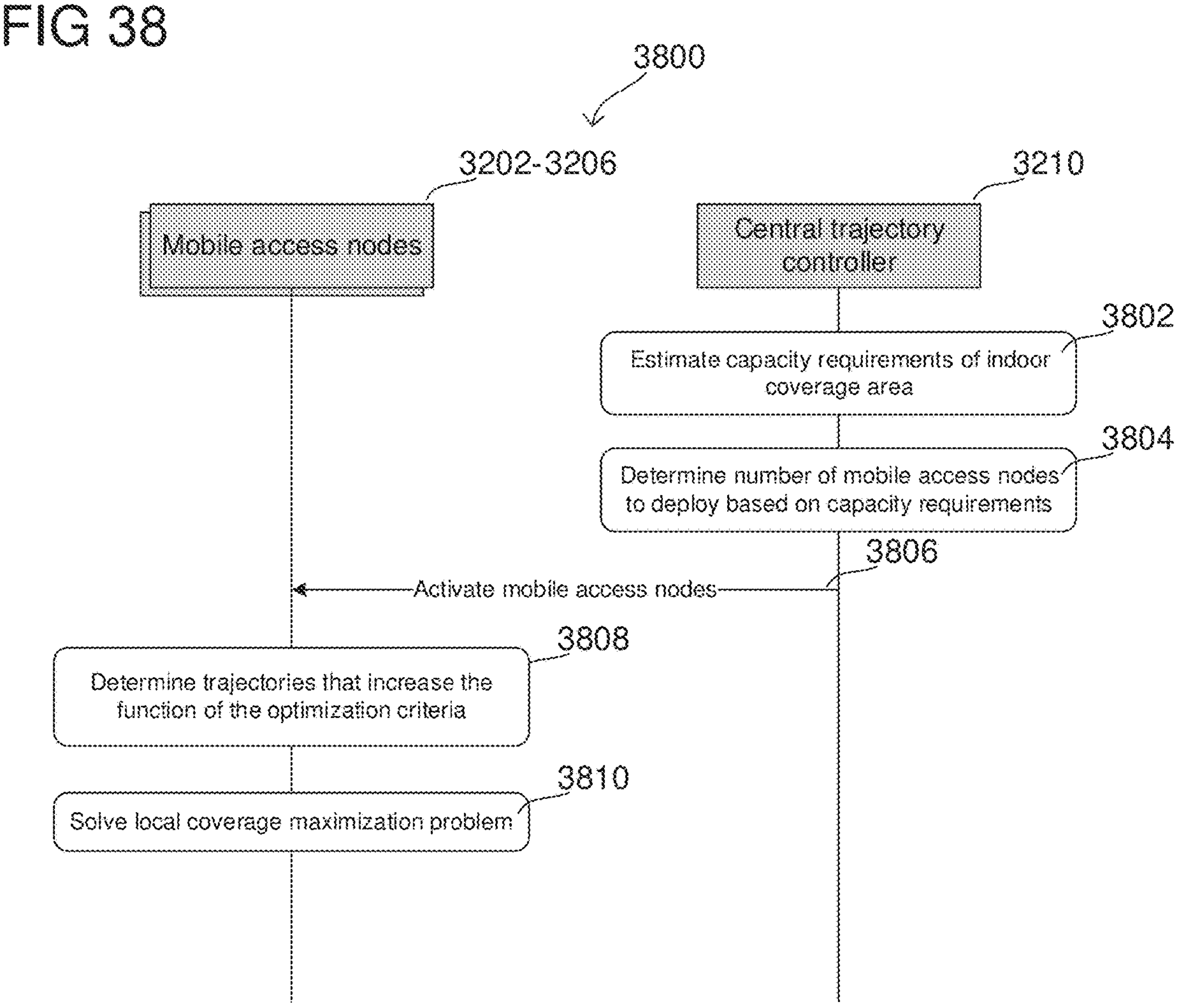
FIG. 38 shows an exemplary procedure for determining trajectories of mobile access nodes based on capacity according to some aspects.

FIG. 38 shows exemplary message sequence chart 3800, which illustrates an example of this procedure according to some aspects. As shown in FIG. 38, central trajectory controller 3210 may be configured to estimate the capacity requirements of indoor coverage area 3212 in stage 3802. Central trajectory controller 3210 may execute stage 3802 at trajectory processor 3406. For example, trajectory processor 3406 may estimate the capacity requirements of indoor coverage area 3212 based on the number of served terminal devices in indoor coverage area 3212 and/or the data usage of the served terminal devices. For example, larger numbers of served terminal devices and/or the presence of served terminal devices that have high data usage can generally increase the capacity requirements. Accordingly, when there are larger numbers of served terminal devices and/or the presence of served terminal devices that have high data usage, indoor coverage area 3212 may need radio access links with high capacity to support the served terminal devices.

In some aspects, trajectory processor 3406 may estimate the capacity requirements as a bandwidth requirement of indoor coverage area. For example, trajectory processor 3406 may use context information about indoor coverage area 3212 to estimate the bandwidth requirements for supporting the served terminal devices in indoor coverage area 3212. The context information can be, for example, information that indicates a number of served terminal devices in indoor coverage area 3212 or information that indicates overall or individual data usage of the served terminal devices. In some aspects, mobile access nodes 3202-3206 and/or network access node 3208 may collect this context information (e.g., based on observations about the communication activity of the served terminal devices) and report it to central trajectory controller 3210. Trajectory processor 3406 may then use the context information to determine the number of served terminal devices, the overall or individual data usage of the served terminal devices, and subsequently the amount of bandwidth for supporting the data usage of the served terminal devices. This determined amount of bandwidth can be the capacity requirement.

In some aspects, trajectory processor 3406 may use predictable usage patterns as part of the estimation in stage 3802. For example, central learning subsystem 3408 may have previously generated predictable usage patterns for indoor coverage area 3212 related to predicted user densities, predicted radio conditions, and/or predicted access usage. Trajectory processor 3406 may then use the predicted user densities, predicted radio conditions, and/or predicted access usage to estimate the number of served terminal devices and/or the overall or individual data usage of the served terminal devices. Trajectory processor 3406 may then estimate the capacity requirements (e.g., amount of bandwidth) based on the estimated number of served terminal devices and/or the overall or individual data usage of the served terminal devices.

In some aspects, trajectory processor 3406 may base the capacity requirements on radio conditions of indoor coverage area 3212. For example, when radio conditions are strong, the radio links between mobile access nodes 3202-3206 may have higher SINR. This higher SINR may in turn support higher data rates, and spectral usage of the available bandwidth may therefore be more efficient. Accordingly, in some cases strong radio conditions can reduce the capacity requirements (e.g., reduce the amount of bandwidth to support the served terminal devices). Trajectory processor 3406 may therefore use radio measurements (e.g., provided in the context information) and/or predicted radio conditions (e.g., part of the predictable usage patterns) to estimate the capacity requirements of indoor coverage area 3212 in stage 3802, such as by scaling the capacity requirements depending on the current or predicted radio conditions (e.g., based on current or predicted SINR).

After estimating the capacity requirements of indoor coverage area 3212 in stage 3802, trajectory processor 3406 may determine a number of mobile access nodes to deploy based on the capacity requirements in stage 3804. For example, if the capacity requirement is an amount of bandwidth, trajectory processor 3406 may determine the number of mobile access nodes as a number of mobile access nodes that can provide the amount of bandwidth. In some cases, this can be a straightforward calculation, where a mobile access node is known to provide a certain amount of bandwidth and trajectory processor 3406 selects a number of mobile access nodes that collectively provide the amount of bandwidth.

In some aspects, trajectory processor 3406 may also introduce a redundancy parameter into the determination of stage 3804. For example, as described above for FIGS. 26 and 27, in some cases mobile access nodes 3602-3208 may, for example, depart from their trajectories to recharge their power supplies. As this trajectory departure may divert mobile access nodes 3202-3206 from providing radio access to indoor coverage area 3212, it can be advantageous to deploy additional mobile access nodes that can compensate for the trajectory departures of recharging mobile access nodes.

This redundancy parameter may therefore increase the number of mobile access nodes selected for deployment in stage 3804. For example, in some aspects trajectory processor 3406 may be configured to select one additional mobile access node than would otherwise be warranted for supporting the capacity requirements (as estimated in stage 3802). In other words, the redundancy parameter may specify a number of addition mobile access nodes to deploy, and may be equal to one (or, alternatively, another quantity). In other aspects, the redundancy parameter may be a percentage, and trajectory processor 3406 may be configured to scale the number of mobile access nodes (that could satisfy the capacity requirements) by the percentage to determine the number of mobile access nodes to deploy in stage 3804.

Central trajectory controller 3210 may then in stage 3806 activate the number of mobile access nodes determined in stage 3804. For example, trajectory processor 3406 may select mobile access nodes from the fleet of available mobile access nodes equal in quantity to the number determined in stage 3804. Node interface 3402 of central trajectory controller 3210 may send signaling (via the radio access network to which central trajectory controller 3210 interfaces) to the selected mobile access nodes that instructs the selected mobile access nodes to deploy. In some aspects, central trajectory controller 3210 may also determine coarse trajectories, initial routings, scheduling and resource allocations, and/or fronthaul radio access technology selections for the selected mobile access nodes, and may also send these instructions in stage 3806.

The selected mobile access nodes (e.g., one or more of mobile access nodes 3202-3206) may then determine trajectories (e.g., coarse or updated) that increase the function of the optimization criteria in stage 3808 (e.g., at their respective local controllers 3320). Local controllers 3320 of the selected mobile access nodes may determine these trajectories in accordance with any technique described herein. For example, the optimization criteria may be a probability that the supported data rate of the radio access connections of each of the served terminal devices is above a threshold.

The selected mobile access nodes may then move according to the trajectories while relaying data between the served terminal devices and network access node 3208. In some aspects, the selected mobile access nodes may attempt to solve the local coverage maximization problem in stage 3810. This can include, at their local controllers 3320, updating their trajectories to attempt to maximize the function of the optimization criteria. In some aspects, local controllers 3320 can use particle swarm optimization, or a technique described in E. Kalantrai et. al., "On the Number and 3D Placement of Drone Base Stations in Wireless Cellular Networks."

As previously described for FIGS. 26 and 27, the selected mobile access nodes may notify central trajectory controller 3210 and/or each other when they depart from their trajectories for recharging. Their local controllers 3320 and/or trajectory processor 3406 of central trajectory controller 3210 may then determine updated trajectories for the other selected mobile access nodes to compensate for the trajectory adjustment of the recharging mobile access node.

In some aspects, central trajectory controller 3210 may be configured to update the selected mobile access nodes over time. For example, trajectory processor 3406 of central trajectory controller 3210 may continue to monitor the number of served terminal devices in indoor coverage area 3212 and/or the overall or individual data usage of the served terminal devices. Trajectory processor 3406 may then re-estimate the capacity requirements of indoor coverage area 3212, and determine an updated number of mobile access nodes to deploy based on the capacity requirements. Trajectory processor 3406 may then activate additional mobile access nodes and/or deactivate unneeded mobile access nodes depending on if the updated number of mobile access nodes is greater than or less than the previous number of mobile access nodes.

Figure 39:
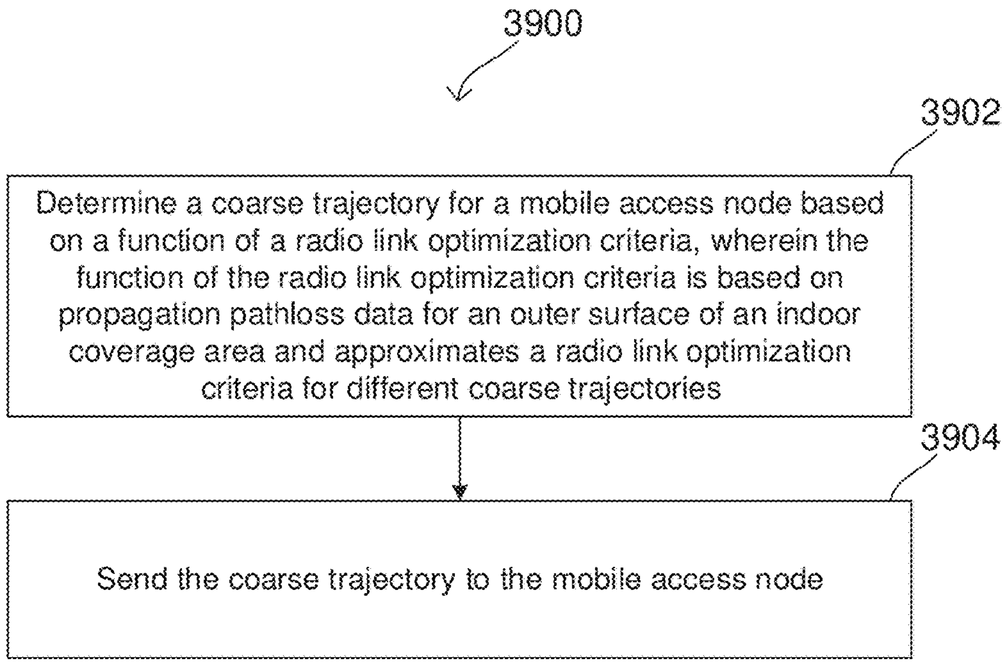
FIG. 39 shows an exemplary method for a central trajectory controller according to some aspects.

FIG. 39 shows method 3900 of operating a central trajectory controller. As shown in FIG. 39, method 3900 includes determining a coarse trajectory for a mobile access node based on a function of a radio link optimization criteria (3902), wherein the function of the radio link optimization criteria is based on propagation pathloss data for an outer surface of an indoor coverage area and approximates a radio link optimization criteria for different coarse trajectories, and sending the coarse trajectory to the mobile access node (3904).

Figure 40:
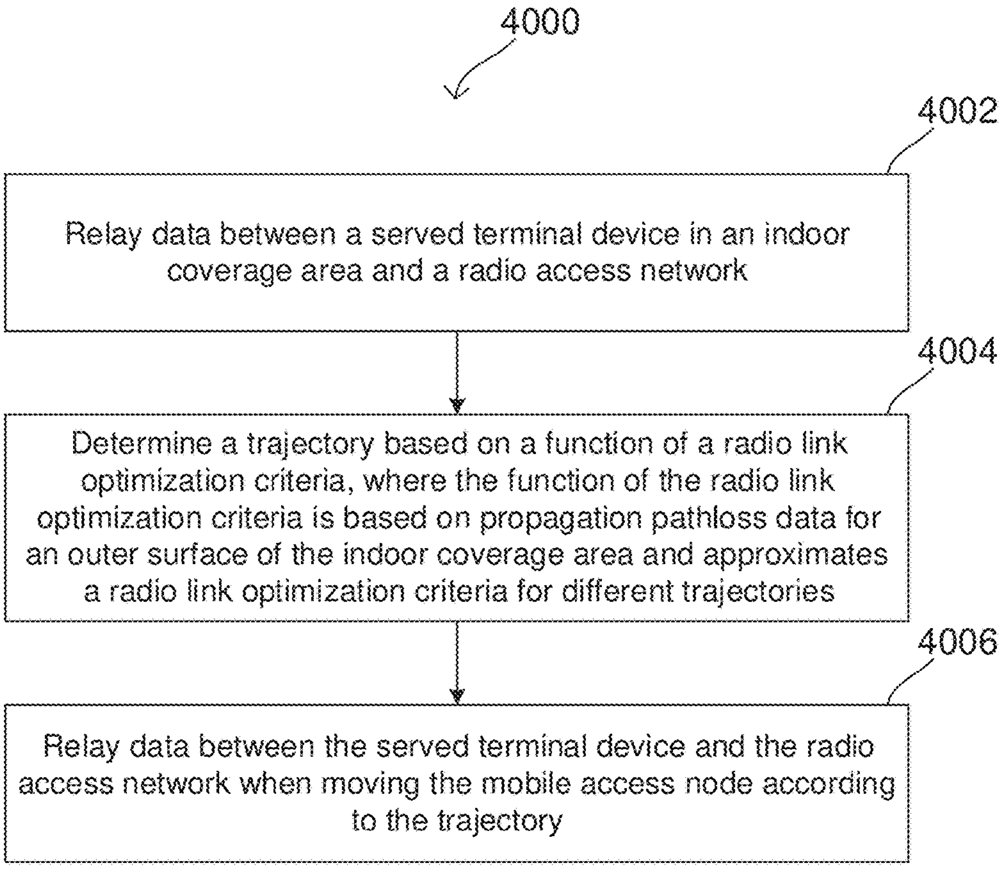
FIG. 40 shows an exemplary method for a mobile access node according to some aspects.

FIG. 40 shows method 4000 of operating a mobile access node. As shown in FIG. 40, method 4000 includes relaying data between a served terminal device in an indoor coverage area and a radio access network (4002), determining a trajectory based on a function of a radio link optimization criteria (4004), where the function of the radio link optimization criteria is based on propagation pathloss data for an outer surface of the indoor coverage area and approximates a radio link optimization criteria for different trajectories, and relaying data between the served terminal device and the radio access network when moving the mobile access node according to the trajectory (4006).

Figure 41:
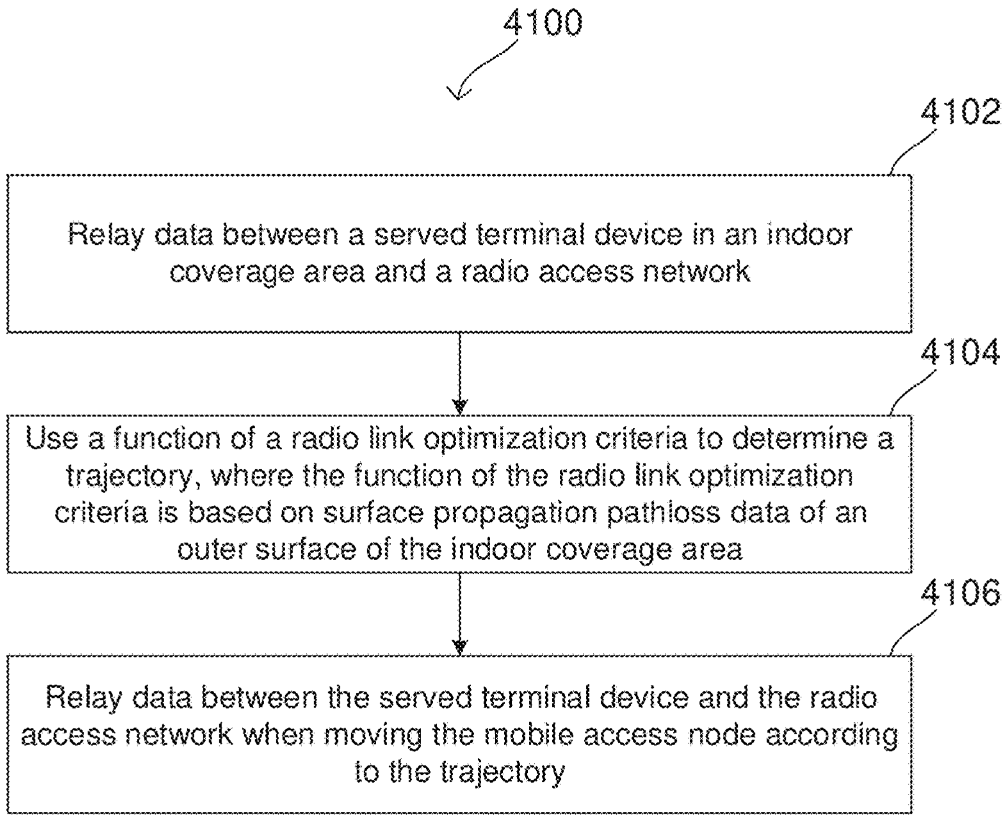
FIG. 41 shows an exemplary method for a mobile access node according to some aspects.

FIG. 41 shows method 4100 of operating a mobile access node. As shown in FIG. 41, method 4100 includes relaying data between a served terminal device in an indoor coverage area and a radio access network (4102), using a function of a radio link optimization criteria to determine a trajectory (4104), where the function of the radio link optimization criteria is based on surface propagation pathloss data of an outer surface of the indoor coverage area, and relaying data between the served terminal device and the radio access network when moving the mobile access node according to the trajectory (4106).

Figure 42:
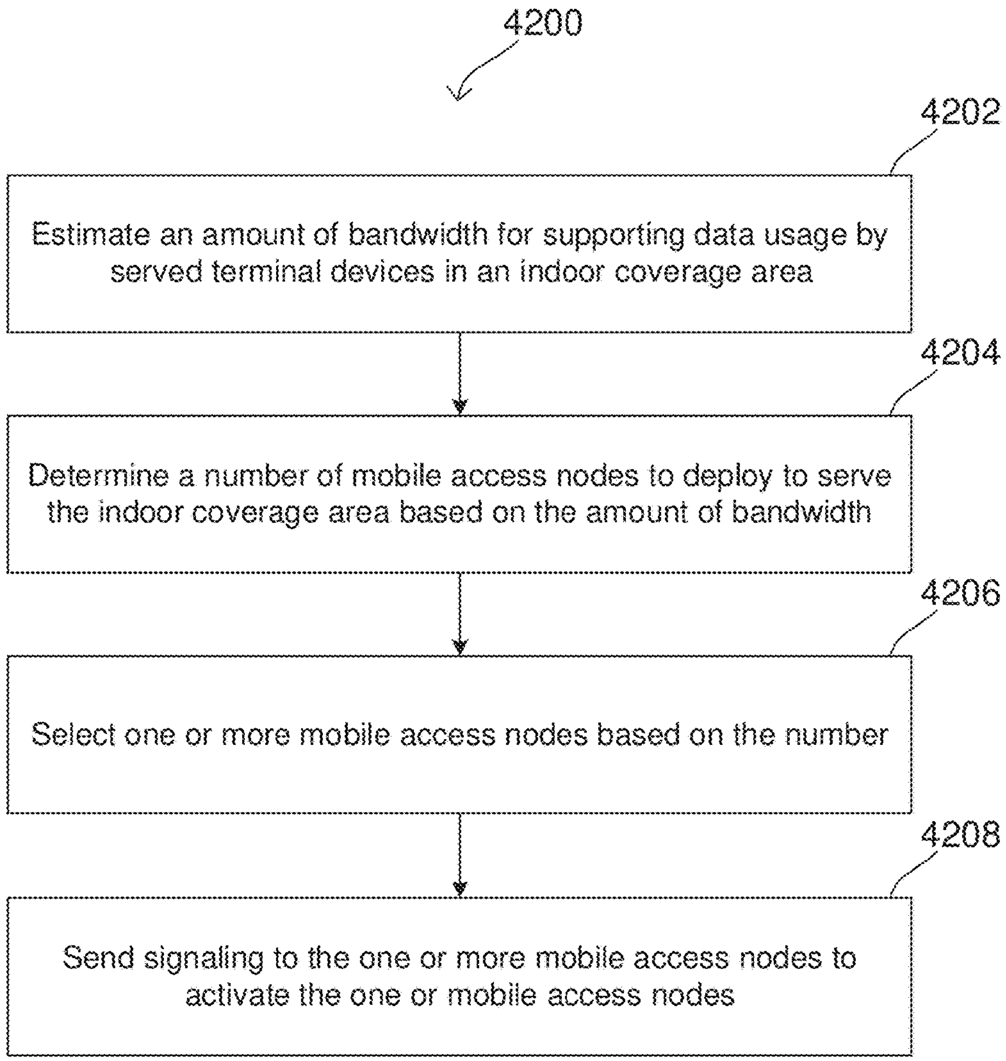
FIG. 42 shows an exemplary method for a central trajectory controller according to some aspects.

FIG. 42 shows method 4200 of operating a central trajectory controller. As shown in FIG. 42, method 4200 includes estimating an amount of bandwidth for supporting data usage by served terminal devices in an indoor coverage area (4202), determining a number of mobile access nodes to deploy to serve the indoor coverage area based on the amount of bandwidth (4204), selecting one or more mobile access nodes based on the number (4206), and sending signaling to the one or more mobile access nodes to activate the one or mobile access nodes (4208).

Function Virtualization with Virtual Networks of Terminal Devices

According to various aspects of this disclosure, groups of terminal devices may establish their own virtual networks that support virtual equipment functions (VEFs). The terminal devices can collectively pool together their individual compute, storage, and network resources to form a hardware resource pool. A virtualization layer can then map the VEFs to the various resources of the hardware resource pool, and the virtual network can thus execute the processing of the VEFs. In some aspects, the VEFs can be part of a larger processing function, where the collective execution of the VEFs by the virtual network can realize the processing function.

Figure 43:
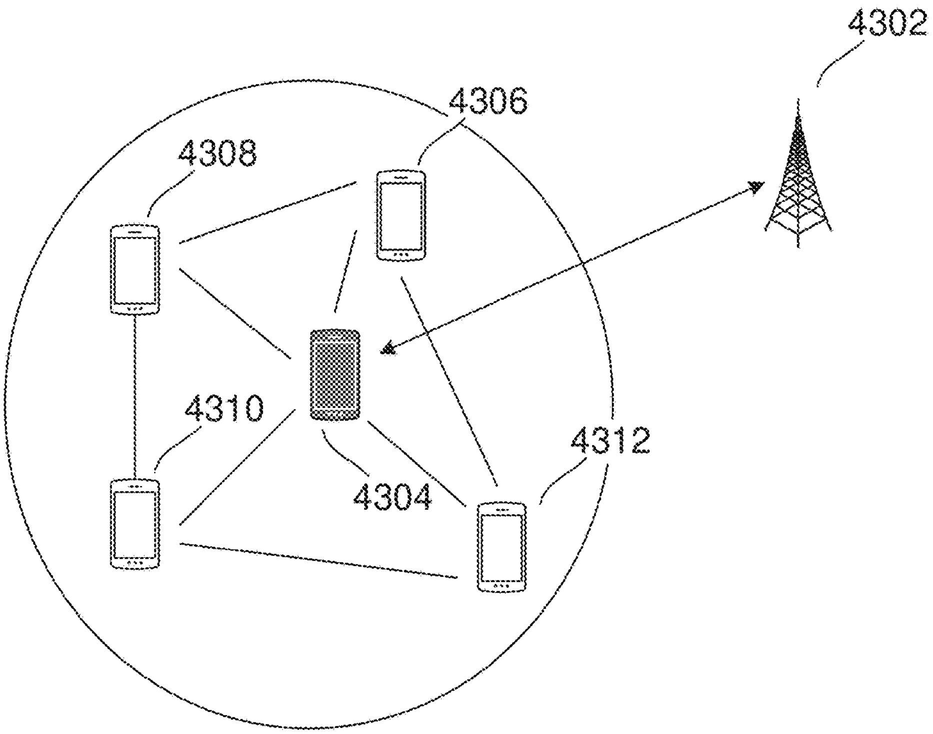
FIG. 43 shows an exemplary diagram of a virtual network according to some aspects.

FIG. 43 shows an exemplary network diagram according to some aspects. As shown in FIG. 43, terminal devices 4304-4312 may be configured to form a virtual network. Terminal devices 4304-4312 may then be configured to use this virtual network to execute various VEFs. As further described below, these VEFs can be used for various different types of processing, including network offload processing, autonomous driving, sensing and mapping operations, and virtual cells. Terminal devices 4304-4312 can logically allocate their individual compute, storage, and network resources to form a hardware resource pool. The virtual network can then use the hardware resource pool to execute the VEFs.

Figure 44:
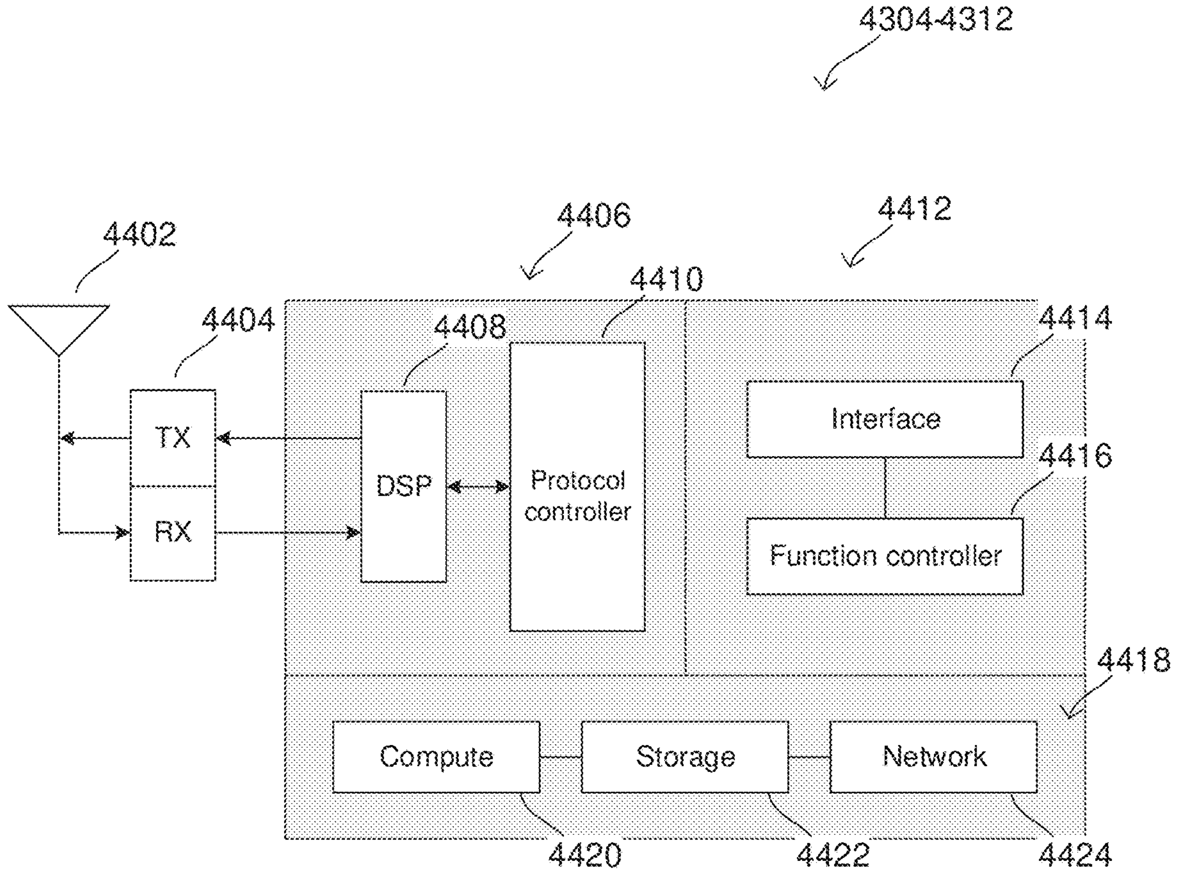
FIG. 44 shows an exemplary internal configuration of a terminal device according to some aspects.

FIG. 44 shows an exemplary internal configuration of terminal devices 4304-4312 according to some aspects. As shown in FIG. 44, terminal devices 4304-4312 may include antenna system 4402, RF transceiver 4404, baseband modem 4406 (including digital signal processor 4408 and protocol controller 4410), virtual network platform 4412 (including interface 4414 and function controller 4416), and resource platform 4418 (including compute resources 4420, storage resources 4422, and network resources 4424). Antenna system 4402, RF transceiver 4404, and baseband modem 4406 may be configured in the manner of antenna system 202, RF transceiver 204, and baseband modem 206 as shown and described for terminal device 102 in FIG. 2.

Virtual network platform 4412 may be configured to handle communications with other terminal devices in the virtual network and to control the function virtualization operations of terminal devices 4304-4312. Resource platform 4418 may include the hardware resources of terminal devices 4304-4312 that are provided for execution of VEFs by the virtual network. As shown in FIG. 44, virtual network platform 4412 may include interface 4414 and function controller 4416. Interface 4414 may be an application-layer processor (or software running on a processor) that exchanges signaling with counterpart interfaces at other terminal devices of the virtual network. Interface 4414 may therefore be configured to send signaling over a software-level logical connection that relies on baseband modem 4406 for wireless transmission at the lower layers. Interface 4414 may also exchange signaling with a counterpart interface at a function virtualization server that controls the function virtualization of the virtual network.

Function controller 4416 may be configured to control the function virtualization process. Accordingly, function controller 4416 may be configured to send and receive signaling through interface 4414, configure resource platform 4418 to perform VEFs, support a virtualization layer, and/or execute a VEF manager to allocate VEFs to other terminal devices.

Resource platform 4418 may include compute resources 4420, storage resources 4422, and network resources 4424. Compute resources 4420, storage resources 4422, and network resources 4424 may be the physical hardware resources that are available for use in executing the VEFs. For example, in some aspects compute resources 4420 may include one or more processors configured to retrieve and execute program code that defines the operations of one or more VEFs in the form of executable instructions. These processors can include any type of programmable processor (including FPGAs), and may be reprogrammable to load and execute software for different VEFs. In some aspects, storage resources 4422 may include one or more memory components that can store data for later retrieval. Network resources 4424 may include the network communication components of terminal devices 4304-4312. In some aspects, antenna system 4402, RF transceiver 4404, and baseband modem 4406 may be logically designated as part of network resources 4424, and therefore may be available for use by VEFs running at resource platform 4418.

While compute resources 4420, storage resources 4422, and network resources 4424 may physically be part of a given terminal device, they may be logically allocated to the virtual network. The virtual network may therefore be able to assign compute resources 4420, storage resources 4422, and network resources 4424 (e.g., part or all) to perform VEFs, which can include executing an entire VEF locally at a single terminal device or executing a VEF at multiple terminal devices in a cooperative manner. These concepts are further described below.

Figure 45:
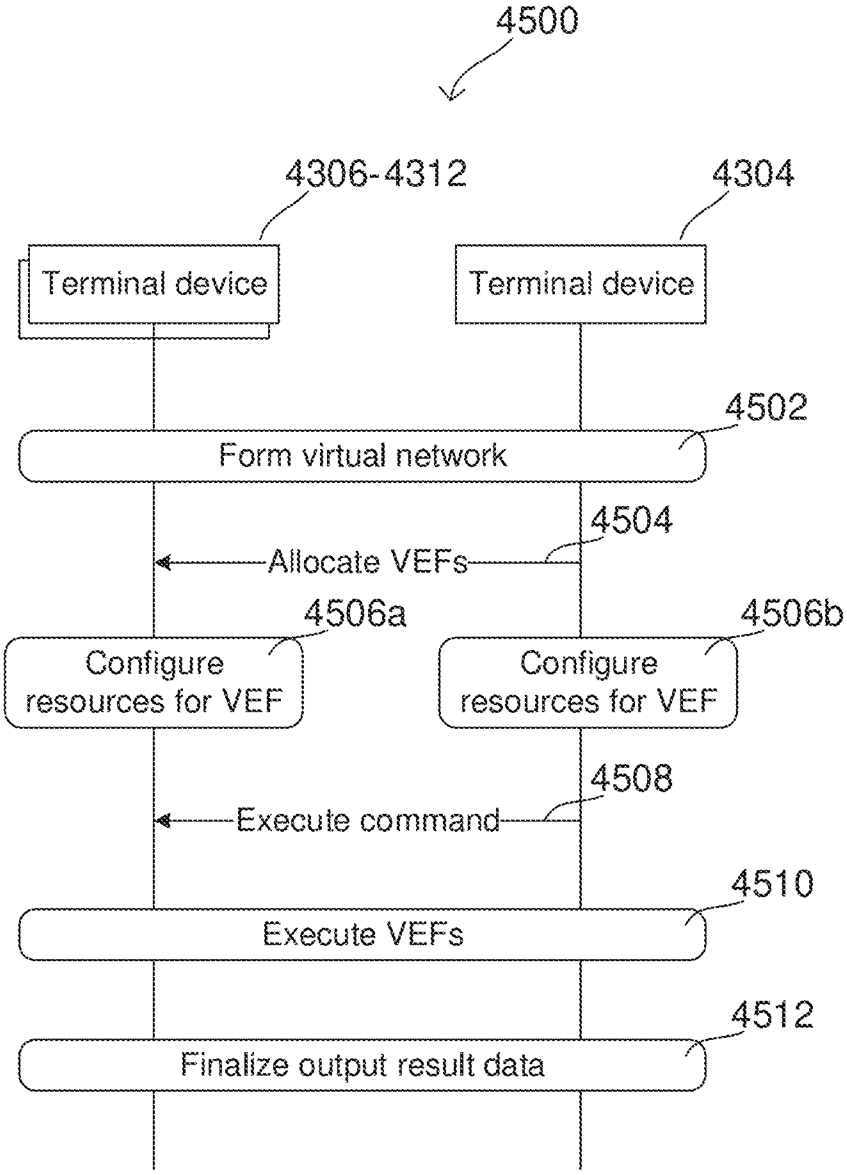
FIG. 45 shows an exemplary procedure for forming and using a virtual network according to some aspects.

FIG. 45 shows exemplary message sequence chart 4500 according to some aspects. According to various aspects, terminal devices 4304-4312 may use the process of FIG. 45 to form a virtual network and to subsequently use the virtual network to execute VEFs. As shown in FIG. 45, terminal devices 4304-4312 may first form a virtual network in stage 4502. In some aspects, this can include a predefined signaling exchange. For example, the respective interfaces 4414 of terminal devices 4304-4312 may transmit and receive discovery signals (e.g., via their respective baseband modems 4406 using a device-to-device protocol) to detect and identify nearby terminal devices. Respective interfaces 4414 of terminal devices 4304-4312 may then establish signaling connections with each other over which they can exchange signaling for communication purposes.

In some aspects, one of terminal devices 4304-4312 may act as a master terminal device that exerts centralized control over the virtual network. In the example of FIGS. 44 and 45, terminal device 4304 may assume this master terminal device role. In some aspects, terminal device 4304 may unilaterally assume the role of master terminal device (e.g., may initiate the formation of the virtual cell and assume the master terminal device role), while in other aspects terminal devices 4304-4312 may select a master terminal device as part of cluster formation in stage 4502.

As master terminal device, terminal device 4304 may be configured to control the function virtualization. For example, its function controller 4416 may be configured to execute a VEF manager that renders decisions regarding function virtualization for the virtual network. The function controller 4416 of terminal device 4304 may then be configured to send out signaling to the function controllers 4416 of terminal devices 4306-4312 (via their interfaces 4414). This signaling may include instructions which direct function controllers 4416 of terminal devices 4306-4312 how to perform the function virtualization and to allocate VEFs to terminal devices 4306-4312 (e.g., to allocate VEFs for terminal devices 4306-4312 to perform on their respective resource platforms 4418).

As previously indicated, terminal devices 4304-4312 may be configured to use the virtual network to support execution of VEFs. In some aspects, the VEFs may be part of network offload processing. For example, terminal devices 4304-4312 may be configured to handle offload processing for the radio access network (e.g., for one or more network access nodes). This can include, for example, the protocol stack processing normally handled by network access nodes. The VEFs can therefore correspond to various protocol stack processing functions. The VEFs can additionally or alternatively be part of offload processing for the core network (e.g., the core network behind the network access nodes). The VEFs can therefore correspond to core network processing functions that are normally handled by core network servers.

In other aspects, the VEFs may be part of autonomous driving processing. For example, one or more of terminal devices 4304-4312 may be a vehicular terminal device configured for autonomous driving. The VEFs may therefore be any of the component functions involved in autonomous driving (e.g., steering algorithms, image recognition, collision avoidance, route planning, or any other autonomous driving function).

In other aspects, the VEFs can be part of sensing or mapping processing. For example, one or more of terminal devices 4304-4312 may be configured to perform sensing functions (e.g., radio, image/video/audio, environmental). The VEFs can therefore be processing functions for processing the sensing data generated by these sensing functions. In another example, one or more of terminal devices 4304-4312 may be configured to perform mapping processing, such as to obtain image data to generate a 3D map. The VEFs can therefore be the processing functions involved in processing the image data to generate the corresponding 3D map data.

The processing architecture of the virtual network formed by terminal devices 4306-4312 is considered application-agnostic, and therefore the VEFs can be any type of processing functions. The use cases provided herein are therefore not limited to these specific examples.

As shown in FIG. 45, terminal device 4304 (acting as the master terminal device of the virtual network) may be configured to allocate the VEFs to terminal devices 4306-4312 in stage 4504. For example, function controller 4416 of terminal device 4304 may first be configured to select VEFs to allocate to terminal devices 4306-4312. As further described below, function controller 4416 may perform this allocation by executing a VEF manager. In this example, there may be a plurality of VEFs that form the overall processing for the virtual network. Function controller 4416 of terminal device 4304 may therefore be configured to select which of terminal devices 4306-4312 to assign each of the plurality of VEFs to. In some aspects, function controller 4416 may be configured to evaluate the available resources (e.g., of the respective resource platforms 4418 of terminal devices 4306-4312) of terminal devices 4306-4312, and to allocate the VEFs based on these available resources. For example, in some aspects, terminal devices 4304-4312 may publish their resource capabilities as part of virtual network formation in stage 4502, which may inform the other terminal devices of their resource capabilities (e.g., where terminal devices 4304-4312 have different types of compute resources 4420, storage resources 4422, and/or network resources 4424, and may therefore have different resource capabilities). As their ability to execute VEFs may depend on their respective resource capabilities, function controller 4416 of terminal device 4304 may allocate VEFs to terminal devices 4306-4312 based on their respective resource capabilities (e.g., by identifying terminal devices with resource capabilities that meet resource requirements of particular VEFs). In some aspects, function controller 4416 of terminal device 4304 may also assign VEFs to terminal device 4304, while in other aspects function controller 4416 may not assign VEFs to terminal device 4304.

When allocating the VEFs in stage 4504, function controller 4416 of terminal device 4304 may send signaling to its peer function controllers 4416 at terminal devices 4306-4312 that specify the VEFs that are allocated to terminal devices 4306-4312. Function controllers 4416 at terminal devices 4306-4312 may then configure their respective resource platforms 4418 to perform the allocated VEFs in stage 4506. As previously indicated, the VEFs may be embodied as software that can be loaded and executed at compute resources 4420 that can also involve storage and network operations provided by storage resources 4422 and network resources 4424. In some aspects, function controller 4416 of terminal device 4304 may send the software to terminal devices 4306-4312, which their respective function controllers 4416 may receive and load into compute resources 4420. In other aspects, software for multiple VEFs may be preinstalled onto compute resources 4420 of terminal devices 4306-4312 (or preloaded onto a memory component of terminal devices 4306-4312, such as in storage resources 4422). Upon receiving the signaling from terminal device 4304 that specifies the allocated VEFs, function controllers 4416 of terminal devices 4306-4312 may be configured to load the software for the respectively allocated VEFs into compute resources 4420. This may therefore configure the respective resource platforms 4418 to perform the allocated VEFs.

As previously indicated, in some aspects terminal device 4304 may also allocate itself VEFs. Accordingly, as shown in FIG. 45, function controller 4416 of terminal device 4304 may also configure its resource platform 4418 to perform the allocated VEF in stage 4506*b*.

As terminal device 4304 is acting as the master terminal device, its function controller 4416 may be configured to oversee execution of the VEFs as part of the overall execution of the function virtualization. This can include controlling the parameters and timing of VEF execution and managing the exchange of input and result data of the VEF execution. Accordingly, as shown in FIG. 45, function controller 4416 of terminal device 4304 may be configured to send an execute command to its peer function controllers 4416 at terminal devices 4306-4312 in stage 4508. The execute command may specify parameters that govern how terminal devices 4306-4312 execute their respective VEFs. The execute command can additionally or alternatively specify the timing at which terminal devices 4306-4312 are to execute their respective VEFs. The execute command can additionally or alternatively specify how input and result data of the VEF execution is to be exchanged between terminal devices 4306-4312. For example, in some aspects the VEF allocated to one of terminal devices 4306-4312 may use result data obtained by the VEF of another of terminal devices 4306-4312 as its input data. The result data can be, for example, intermediate result data (e.g., the results of calculations of the VEF prior to its final conclusion) or output result data (e.g., the final result of calculations of the VEF). Accordingly, the result command may instruct terminal devices 4306-4312 where to transmit appropriate result data and/or where to receive appropriate input data.

Terminal devices 4306-4312 may then receive the execute commands at their respective function controllers 4416. Then, terminal devices 4304-4312 may be configured to execute the VEFs with their respective resource platforms 4418 in stage 4510. For example, compute resources 4420 at each of terminal devices 4304-4312 (or, alternatively, 4306-4312) may be configured to execute the software for the VEF as previously configured in stages 4506*a* and 4506*b*. As previously indicated, this can include VEFs related to offload processing, autonomous driving, sensing or mapping, virtual cells, or VEFs related to other processing use cases. In some aspects, depending on the VEF, the involved VEF may also include operations by storage resources 4422 and network resources 4424.

As referenced above, some VEFs may involve exchange of result data, which can be specified by terminal device 4304 in the execute command in stage 4508. Accordingly, during the process of stage 4510, the VEFs at terminal devices 4304-4312 may be configured to exchange result data. For example, resource platform 4418 of one of terminal devices 4304-4312 may identify the result data to be exchanged, and may then provide the result data to the function controller 4416 of the terminal device. The function controller 4416 may then transmit the result data to its peer function controller 4416 of another of terminal devices 4304-4312 (as specified by the execute command; e.g., via their interfaces 4414). This peer function controller 4416 may then provide the result data to its compute resources 4420, which may then use the result data as input data for its VEF.

Terminal devices 4304-4312 may then finalize the output result data in stage 4512. For example, the VEFs running at respective resource platforms 4418 of terminal devices 4306-4312 may be configured to send the output result data to their respective function controllers 4416. The function controllers 4416 of terminal devices 4306-4312 may then send the output result data to terminal device 4304, where its function controller 4416 may be configured to collect the output result data from each VEF. In some aspects, function controller 4416 of terminal device 4304 may then finalize the output result data (e.g., collect or aggregate the output result data) to obtain the final data. In other aspects, function controller 4416 of terminal device 4304 may then provide the output result data from the VEFs to the VEF running at its own resource platform 4418. The VEF running at resource platform 4418 of terminal device 4304 may then finalize the output result data to obtain the final data for the VEFs. The final data can depend on the specific types of VEFs involved.

In some aspects, the virtual network of terminal devices 4304-4312 may be configured to send the final data to an external location. For example, if the VEFs are for network offload processing for the radio access network, the virtual network may send the final data to one or more network access nodes of the radio access network. In some aspects, function controller 4416 of terminal device 4304 (acting as the master terminal device) may transmit this final data to the one or more network access nodes, while in other aspects function controller 4416 of terminal device 4304 may assign the function controller 4416 of one or more of terminal devices 4306-4312 to transmit the final data (e.g., as part of the execute command in stage 4508). The network access nodes may then use the final data in place of performing their own network processing. In another example where the VEFs are for network offload processing for the core network, function controller 4416 of terminal device 4304 may transmit the final data to the relevant core network servers, or may assign a function controller 4416 of one or more of terminal devices 4306-4312 to transmit the final data to the relevant core network servers. These core network servers may then use the final data in place of performing their own network processing.

In another example where the VEFs are related to autonomous driving, one or more of terminal devices 4304-4312 may be vehicular terminal devices configured for autonomous driving. Accordingly, function controller 4416 of terminal device 4304 may send the final data (or may assign another of terminal devices 4306-4312 to send the final data) to these vehicular terminal devices, which can then use the final data to control autonomous driving functionality (e.g., to influence driving and related decisions).

In another example where the VEFs are related to sensing or mapping functions, or another application where the final data is not used within the radio access or core network, function controller 4416 of terminal device 4304 may send the final data (or assign another of terminal devices 4306-4312 to send the final data) to an external server. For example, function controller 4416 may send the final data to the external server over an Internet connection (e.g., that uses the radio access connection provided by baseband modem 4406).

Figure 46:
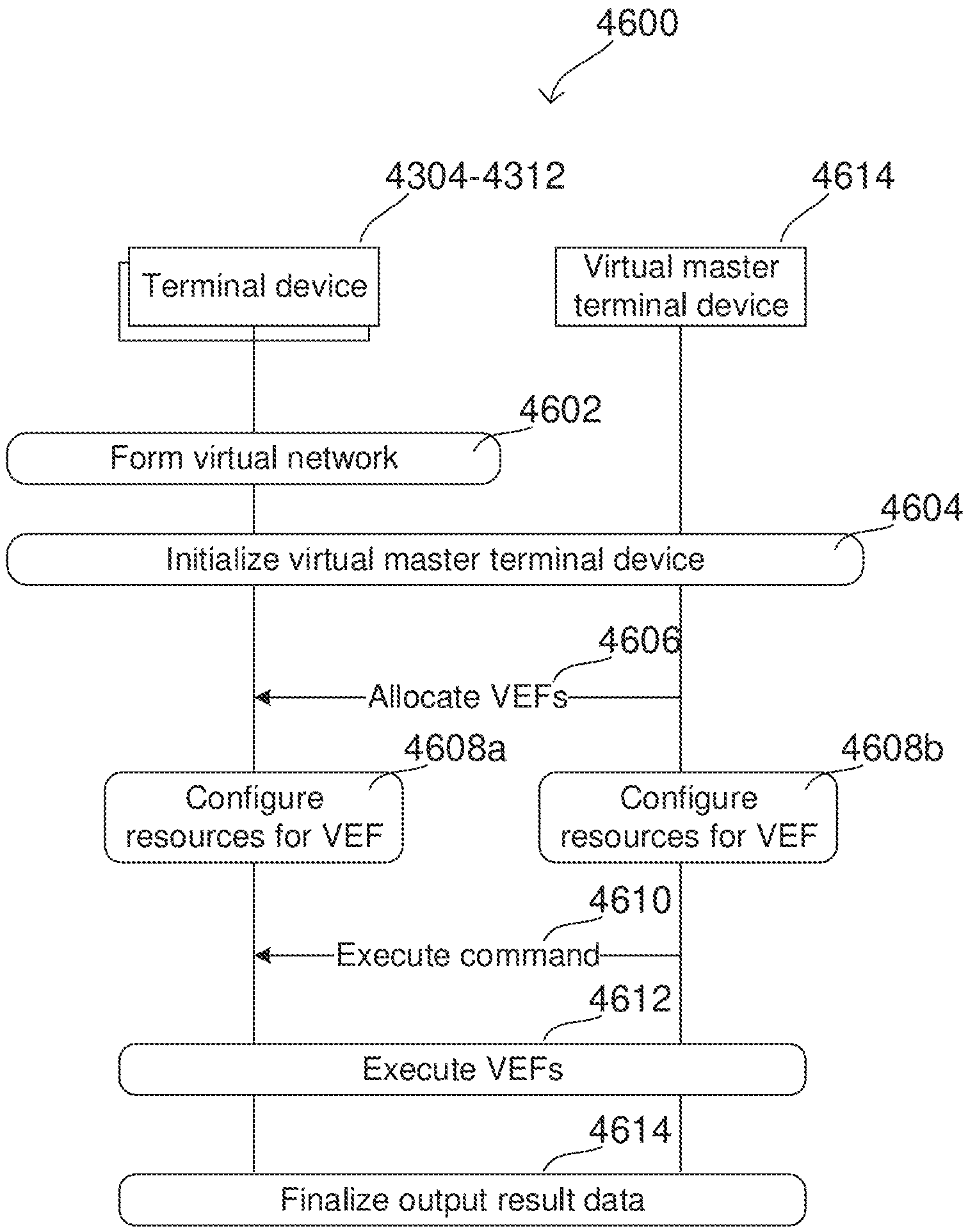
FIG. 46 shows an exemplary procedure for using a virtual network with a virtual master terminal device according to some aspects.

In some aspects, instead of designating one of terminal devices 4304-4312 as a master terminal device, the virtual network composed of terminal devices 4304-4312 may use a virtual master terminal device. FIG. 46 shows exemplary message sequence chart 4600 illustrating function virtualization according to some aspects. As shown in FIG. 46, terminal devices 4304-4312 may first form a virtual network in stage 4602. Then, instead of designating one of terminal devices 4304-4312 as a master terminal device, terminal devices 4304-4312 may initialize virtual master terminal device 4614. For example, terminal devices 4304-4312 may use function virtualization to run software that defines the operation of a master terminal device. This can include, for example, running a master terminal device VEF using the resource platform 4418 of multiple of terminal devices 4304-4312 that virtually realizes a master terminal device. Accordingly, while virtual master terminal device 4614 is executed virtually on multiple terminal devices, it may act as a separate logical entity.

In some aspects, the VEF that realizes virtual master terminal device 4614 can be configured with the same or similar functionality as described for function controller 4416 of terminal device 4304 when acting as a master terminal device in the context of FIG. 45. Accordingly, virtual master terminal device 4614 may perform stages 4606-4614 in the same or similar manner as described for terminal device 4304 and stages 4504-4512 in FIG. 45.

Figure 47:
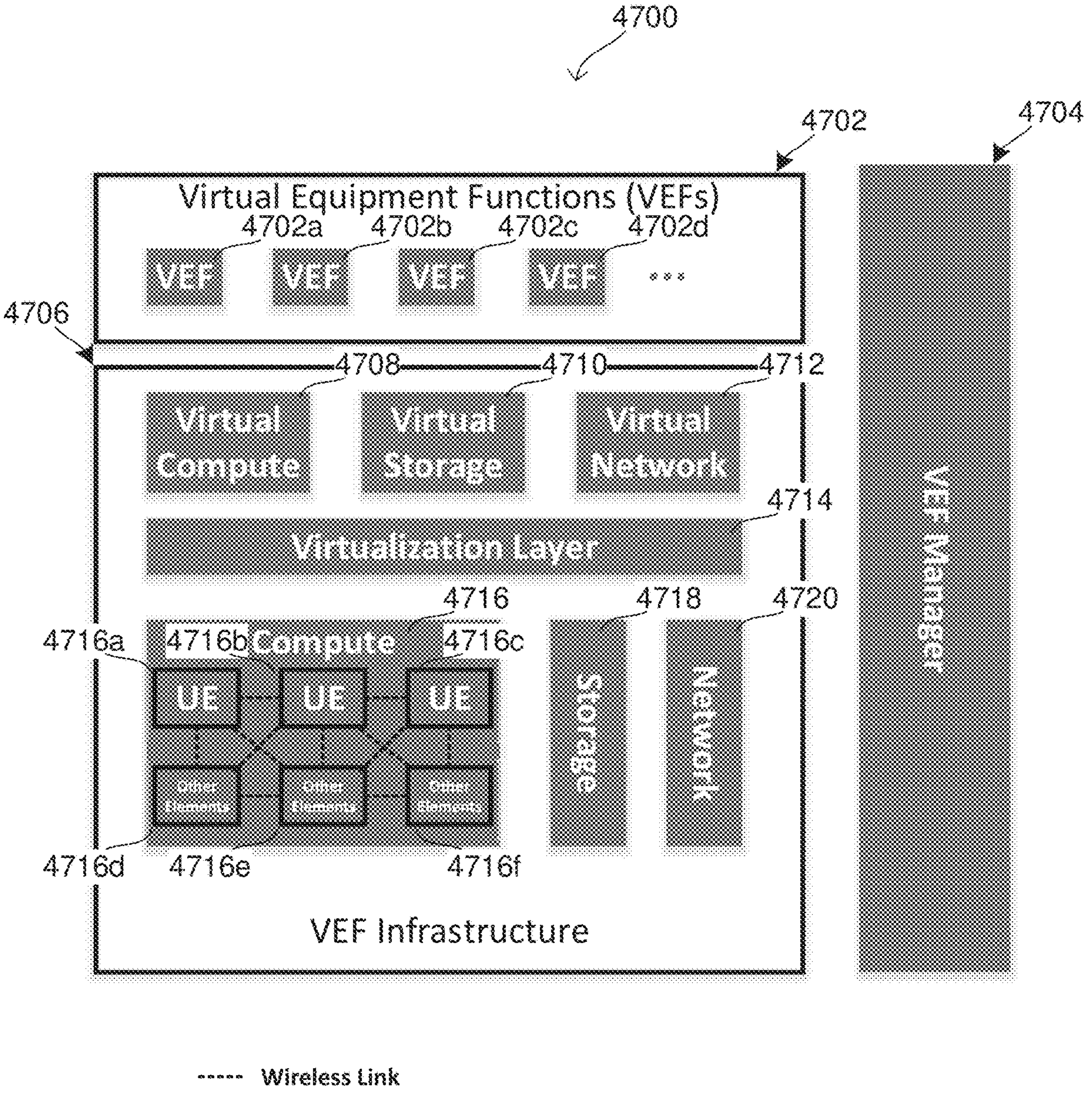
FIG. 47 shows an exemplary diagram of various VEFs for a virtual network according to some aspects.

FIG. 47 shows exemplary block diagram 4700 illustrating an example layout of this function virtualization according to some aspects. As shown in FIG. 47, block diagram 4700 is composed of three main blocks: VEFs 4702, VEF manager 4704, and VEF infrastructure 4706. VEFs 4702 includes VEF 4702*a*, VEF 4702*b*, VEF 4702*c*, and VEF 4702*d* (in addition to one or more further VEFs). As previously described, VEFs 4702 may be processing functions that are virtualized by execution of software at resource platforms 4418 of terminal devices 4304-4312.

VEF manager 4704 may be a function that includes the overarching control logic that manages allocation and execution of the VEFs. For example, as previously indicated VEF manager 4704 can be virtually realized by function controller 4416 of the master terminal device or virtual master terminal device (e.g., terminal device 4304 or virtual master terminal device 4614).

VEF infrastructure 4706 may include the compute, storage, and network resources that are logically allocated to the virtual network for executing the VEFs. Virtual compute 4708 may be the pool of compute elements collaboratively provided by terminal devices 4304-4312, virtual storage 4710 may be the pool of storage elements collaboratively provided by terminal devices 4304-4312, and virtual network 4712 may be the pool of network elements collaboratively provided by terminal devices 4304-4312. Virtualization layer 4714 may be responsible for mapping virtual compute 4618, virtual storage 4710, and virtual network 4712 to the hardware compute resources 4716, hardware storage resources 4718, and hardware network resources 4720 of terminal devices 4304-4312. In some aspects, virtualization layer 4714 may be virtually realized, for example, by function controller 4416 of the master terminal device (e.g., terminal device 4304) or by the virtual master terminal device (e.g., virtual master terminal device 4614). Hardware compute resources 4716, hardware storage resources 4718, and hardware network resources 4720 may correspond to the individual compute resources 4420, storage resources 4422, and network resources 4424 of terminal devices 4304-4312.

As shown in FIG. 47, hardware compute resources 4716 may be composed of compute elements 4716*a*-4716*f*. While the examples of FIGS. 43-46 above used terminal devices as the compute elements of the virtual network, in some aspects the virtual network may use other elements, including any one or more of, for example, user equipment (laptops, tablets, desktop PCs, or other user equipment) and/or network equipment (e.g., small cell processing power, processing power in the cloud, or other network equipment). These compute elements may therefore provide the compute resources to form the hardware compute resources 4716 with which the virtual network actually executes the VEFs. The compute elements may be configured in the manner of terminal devices 4304-4312 as shown and described in FIG.

44, and may therefore have their own baseband modem 4406, virtual network platform 4412, and resource platform 4418.

Figure 48:
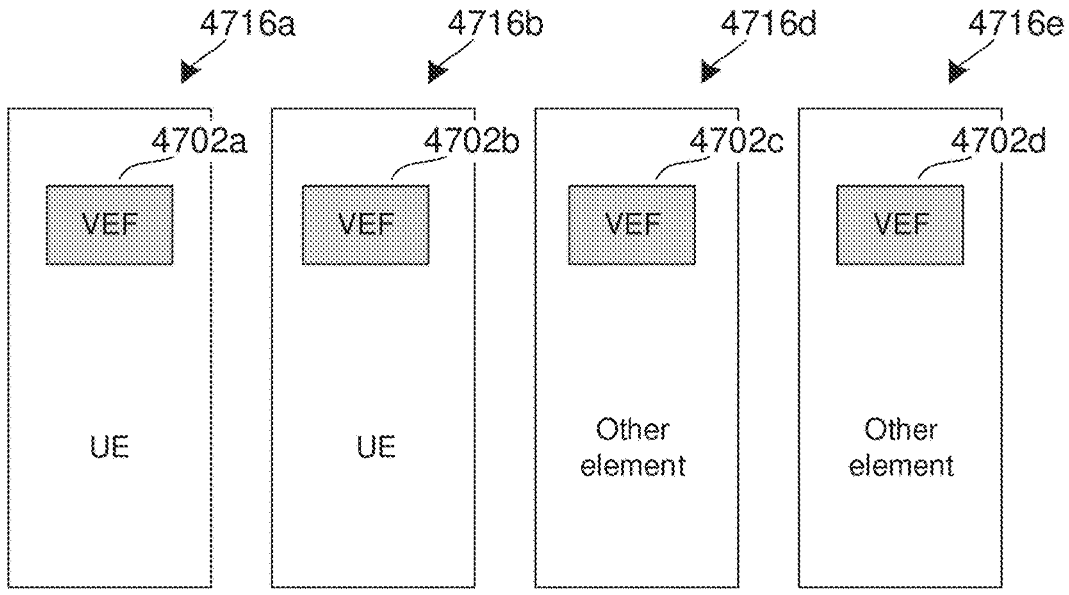
FIGS. 48 and 49 show examples of distributing VEFs in a virtual network according to some aspects.

VEF manager 4704 (e.g., running at the controller of the master terminal device or at the virtual master terminal device) may be configured to allocate VEFs to compute elements 4716*a*-4716*f* (e.g., terminal devices 4304-4312) in various different ways. FIG. 48 shows one example where VEF manager 4704 may allocate VEFs to individual compute elements. As shown in FIG. 48, VEF manager 4704 may be configured to allocate VEF 4702*a* to compute element 4716*a*, VEF 4702*b* to compute element 4716*b*, VEF 4702*c* to compute element 4716*c*, and VEF 4702*d* to compute element 4716*d*. Accordingly, compute elements 4716*a*, 4716*b*, 4716*d*, and 4716*e* may be configured to execute VEFs 4702*a*-4702*d* at their respective resource platforms 4418.

Figure 49:
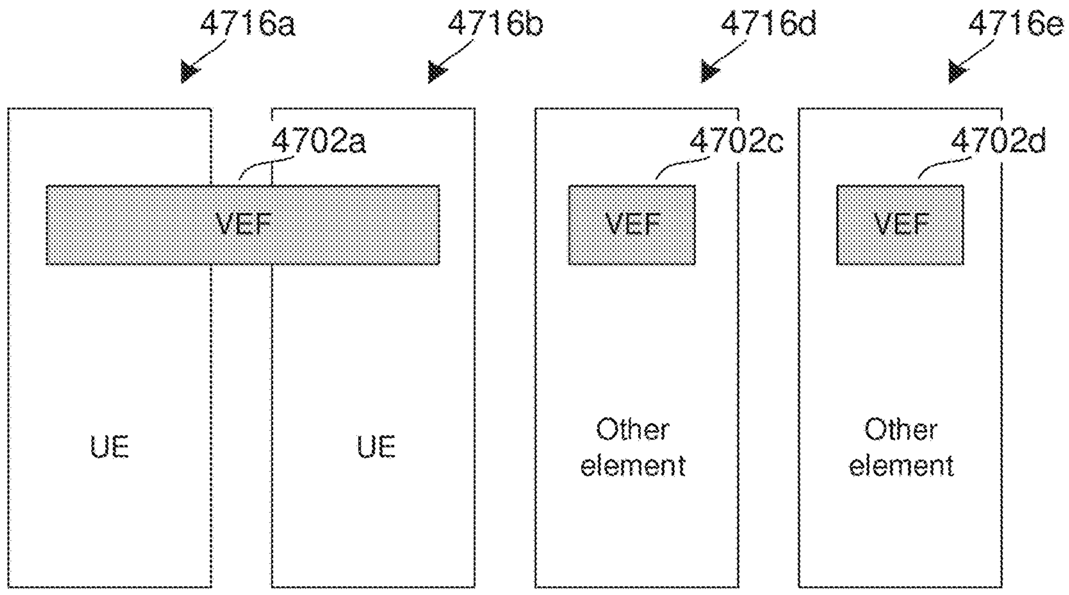

Among other cases, this allocation can be applicable when compute elements 4716*a*, 4716*b*, 4716*d*, and 4716*e* have sufficient resources (e.g., compute, storage, and/or network, as applicable) at their respective resource platforms 4418 to execute an entire VEF. This may depend on the requirements of the VEF, such as the amount of type of involved computing, storage, and/or network operations. In other cases, one or more of the compute elements may not have sufficient resources to execute an entire VEF. Accordingly, VEF manager 4704 may be configured to allocate VEFs where some VEFs are distributed across multiple compute elements. FIG. 49 shows an example according to some aspects. As shown in FIG. 49, VEF manager 4704 may be configured to allocate VEF 4702*a* to compute elements 4716*a* and 4716*b*. This may result in VEF 4702*a* being virtually distributed across the respective resource platforms 4418 of compute elements 4716*a* and 4716*b*. Accordingly, compute elements 4716*a* and 4716*b* may be configured to collaboratively execute VEF 4702*a*.

Figure 50:
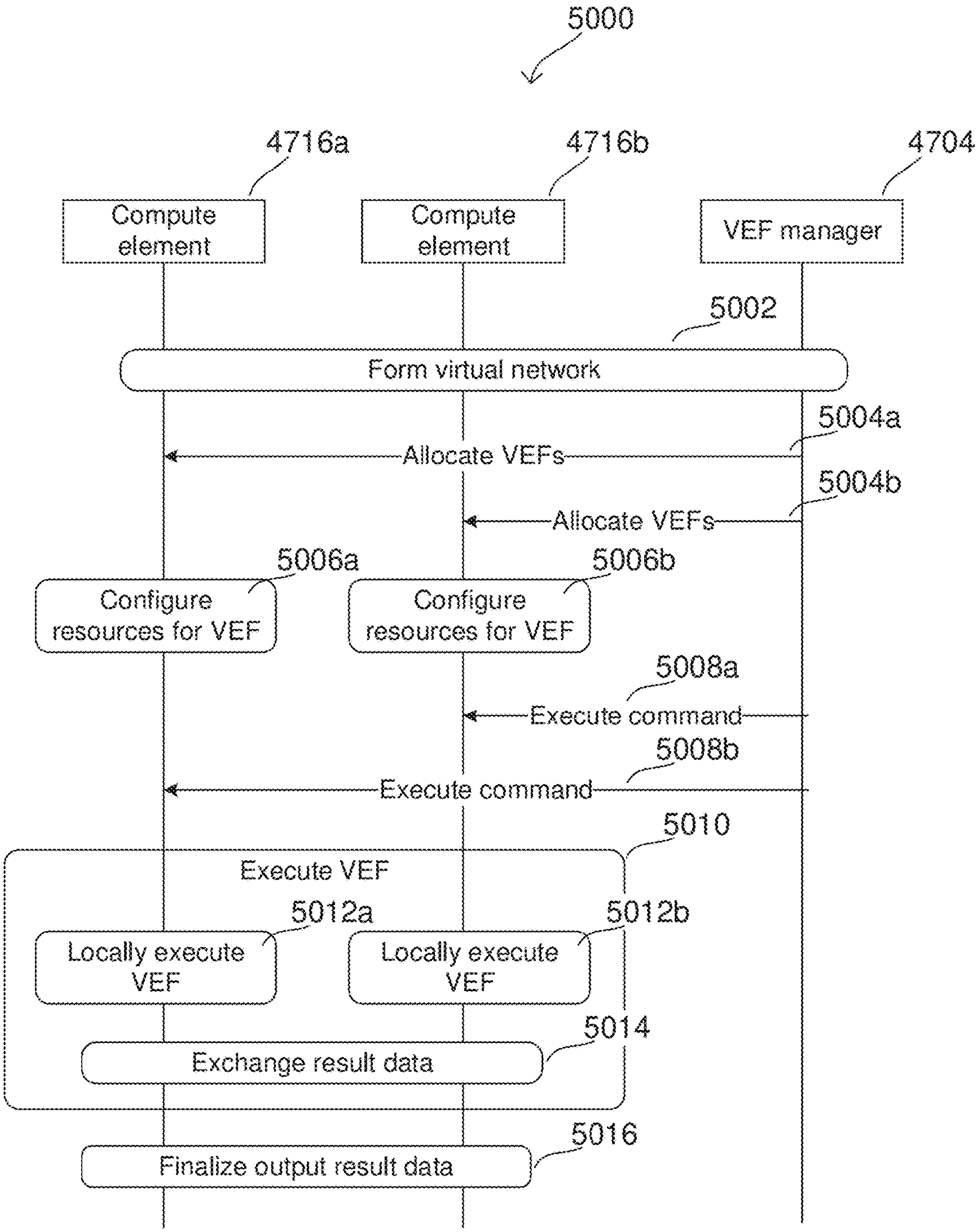
FIG. 50 shows an exemplary procedure for executing VEFs according to some aspects.

FIG. 50 shows message sequence chart 5000 illustrating this procedure according to some aspects. As shown in FIG. 50, compute elements 4716*a* and 4716*b* and VEF manager 4704 (e.g., running at a master terminal device or a virtual master terminal device) may form a virtual network in stage 5002. VEF manager 4704 may then allocate VEFs to compute elements 4716*a* and 4716*b* in stages 5004*a* and 5004*b*. As described for FIG. 49, VEF manager 4704 may allocate a single VEF (e.g., VEF 4702*a*) to compute elements 4716*a* and 4716*b*. Compute elements 4716*a* and 4716*b* may then configure their respective resource platforms 4418 to execute the VEF in stages 5006*a* and 5006*b*.

Then, VEF manager 4704 may send an execute command to compute elements 4716*a* and 4716*b* in stages 5008*a* and 5008*b*. This can alternatively be handled by another element of the VEF architecture, such as by virtualization layer 4714 (e.g., also running at a master terminal device or a virtual master terminal device).

Compute elements 4716*a* and 4716*b* may then execute the VEF in stage 5010. As shown in FIG. 50, stage 5010 may include stages 5012*a* and 5012*b* and stage 5014. In stages 5012*a* and 5012*b*, compute elements 4716*a* and 4716 may locally execute the VEF at their respective resource platforms 4418. For example, compute element 4716*a* may execute part of the overall VEF at its own resource platform 4418 while compute element 4716*b* executes another part of the overall VEF at its resource platform 4418. Compute elements 4716*a* and 4716*b* may therefore execute the VEF in a distributed manner, where each executes a separate part of the VEF. Then, in stage 5014, compute elements 4716*a* and 4716*b* may exchange result data. This can be, for example, intermediate result data, where the VEF at one of compute elements 4716*a* obtains intermediate result data that is used by the VEF at the other of compute elements 4716*b* (and vice versa). Accordingly, compute elements 4716*a* and 4716*b* may exchange such result data between their counterpart VEFs in stage 5014. Compute elements 4716*a* and 4716*b* can, for example, use device-to-device wireless links supported by their respective interfaces 4414 (handling the software-level connection) and baseband modems 4406 (handling the wireless transmission and reception via RF transceivers 4404 and antenna systems 4402) to exchange the result data in stage 5014. In some aspects, compute elements 4716*a* and 4716*b* may repeat stages 5012*a*-5012*b* and 5014, and may therefore repeatedly locally execute the VEF and exchange result data.

After execution of the VEF in stage 5010 is complete, compute elements 4716*a* and 4716*b* may finalize the output result data of the VEF to obtain final data in stage 5016. This can include aggregating together output result data obtained from local execution of the VEF to obtain final data. If applicable, compute elements 4716*a* and 4716*b* may send the final data to the appropriate destination, such as to a radio access or core network, autonomous driving systems, or a server for storing mapping or sensing data.

In some aspects, VEF manager 4704 may be configured to consider the wireless links between compute elements when allocating VEFs. For example, as described immediately above for FIG. 50, when VEF manager 4704 allocates a single VEF to multiple compute elements, the compute elements may exchange data with each other that is used to support execution of the VEF. Wireless exchange can also occur, for example, when separate VEFs at compute elements send result data to each other, such as in the case of stage 4510 as discussed above.

Figure 51:
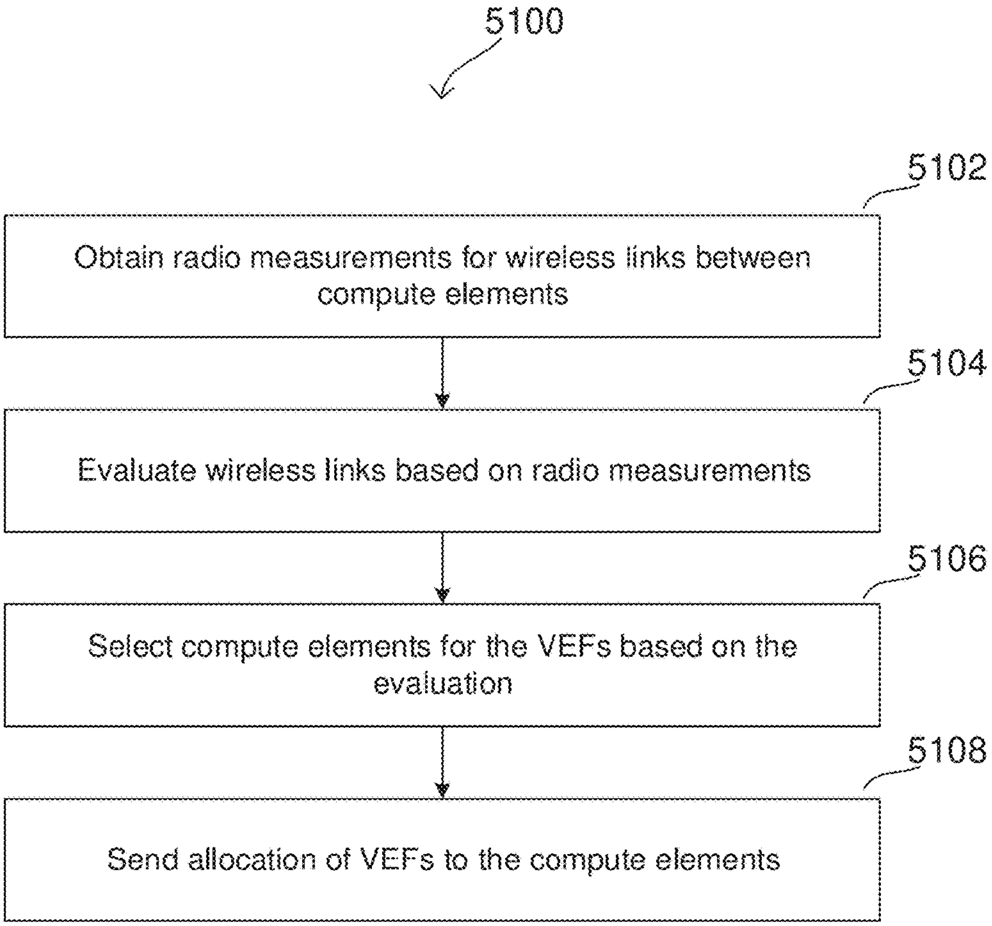
FIG. 51 shows an exemplary method of allocating VEFs according to some aspects.

VEF manager 4704 may therefore be configured to perform a VEF allocation procedure based on the wireless links. FIG. 51 shows exemplary decision chart 5100 according to some aspects, which describes such a VEF allocation procedure. As VEF manager 4704 may be realized as software (e.g., running on a function controller of a master terminal device, or running as a virtual master terminal device on the resource platform of multiple compute elements), the logic of decision chart 5100 described below can be embodied as executable instructions.

As shown in FIG. 51, VEF manager 4704 may first be configured to obtain radio measurements for the wireless links between the compute elements of the virtual network in stage 5102. For example, in the exemplary case of FIG. 43, the compute elements may be terminal devices 4304-4312. The compute elements may therefore perform radio measurements on wireless signals received from each other (e.g., with their respective baseband modems 4406), and may then report the radio measurements to VEF manager 4704.

After obtaining the radio measurements, VEF manager 4704 may evaluate the wireless links based on the radio measurements in stage 5104. For example, VEF manager 4704 may be configured to evaluate the radio measurements to identify which compute elements have the highest performance wireless links between them (e.g., have the highest signal strength, signal quality, lowest noise or interference, lowest error rate, or any other performance metric). In some aspects, VEF manager 4704 may be configured to rank the wireless links, or to assign a metric to each wireless link (e.g., defined by a pair of compute elements) that represents the performance of the wireless link.

Then, VEF manager 4704 may be configured to select compute elements for the VEFs based on the evaluation in stage 5106. In some aspects, VEF manager 4704 may examine the VEFs to determine how many wireless links should be used to support the VEFs. For example, from the plurality of VEFs that form the overall processing of the virtual network, there may be a subset of VEFs that would use multiple compute elements. This can include, for example, VEFs that are executed on multiple compute elements (e.g., as the involved processing is more than a single compute element can support), or VEFs that use result data from other counterpart VEFs. In some aspects, VEF manager 4704 may be configured to identify a number of compute elements to support each of these VEFs. In some aspects, VEF manager 4704 may be configured to compare the amount of involved processing resources for each VEF with the available processing resources of the compute elements (e.g., of their respective resource platforms), and to determine a number of compute elements for executing the VEFs. Likewise, if a particular VEF uses result data from one or more other VEFs (e.g., that are each executed on a different compute element), VEF manager 4704 may be configured to determine a number of overall involved compute elements for the particular VEF (e.g., two if the particular VEF uses result data from one other counterpart VEF). By using such evaluation, VEF manager 4704 may be configured to determine a number of compute elements involved in supporting each of the subset of VEFs.

Then, VEF manager 4704 may be configured to select compute elements for each VEF in stage 5106. For VEFs that only use a single compute element, VEF manager 4704 may consider factors such as the available resources (e.g., at their respective resource platforms 4418) of the compute elements. For VEFs that use multiple compute elements (and thus involve wireless data exchange), VEF manager 4704 may additionally consider the wireless links between compute elements when selecting in stage 5106. For example, for a given VEF that is executed across a number of compute elements, VEF manager 4704 may be configured to select compute elements (equal in quantity to the number of compute elements) that have strong wireless links for the VEF. In an example with two compute elements, VEF manager 4704 may be configured to select two of the available compute elements that have a strong wireless link (e.g., a radio measurement, relative distance, or other metric above a predefined threshold) for the VEF. VEF manager 4704 may similarly select available compute elements for VEFs that use more than two compute elements (e.g., selecting multiple compute elements that have strong wireless links with each other, or that form a sequence/chain of strong wireless links). After selecting the compute elements, VEF manager 4704 may then allocate the VEF to the compute elements in stage 5108).

For VEFs that use wireless data exchange to exchange result data with counterpart VEFs, VEF manager 4704 may similarly identify compute elements (equal in number to the quantity involved in the VEF) that have strong wireless links and assign the VEF and counterpart VEFs to these compute elements. For instance, in an example where a first VEF uses result data from a second VEF, VEF manager 4704 may identify two compute elements that have a strong wireless link between them (e.g., as quantified by a distance between them or a radio measurement of the wireless link), and then select one of the compute elements for the first VEF and select the other compute element for the second VEF. In another example where a first VEF uses result data from a second VEF and a third VEF, VEF manager 4704 may identify a first compute element and two more compute elements that have strong wireless links with the first compute element. VEF manager 4702 may then select the first compute element for the first VEF and the two more compute elements respectively for the second and third VEFs. VEF manager 4704 may similarly select compute elements for VEFs that use different numbers of compute elements for wireless data exchange. After selecting the compute elements, VEF manager 4704 may allocate the VEFs to the compute elements in stage 5108.

In some cases, this allocation of VEFs based on wireless link strength may help to improve performance. For example, instead of blindly allocating VEFs to compute elements, VEF manager 4704 may selectively allocate VEFs that use wireless data exchange to compute elements that have wireless links well-suited to handle the wireless data exchange. As strong wireless links can yield higher data rates, higher reliability, and lower error, this can improve processing efficiency and computation speed (as VEFs may be able to quickly exchange data as needed).

In some aspects, virtual networks may use VEFs to implement a virtual cell. For example, with reference to FIG. 43, terminal devices 4304-4312 may use the virtual network to virtually realize a cell using virtual cell VEFs. The virtual cell VEFs may therefore each be a function of a standard cell that has been virtually embodied as a VEF. While the resulting virtual cell can provide similar or the same cell functionality of an actual cell in providing radio access to nearby terminal devices, the underlying cell processing and radio activity can be handled by terminal devices 4304-4312 in a distributed manner using virtual cell VEFs.

For example, standard cells can perform access stratum (AS) processing for the radio access network. In the exemplary context of LTE, the AS processing can include Layers 1, 2, and 3 of the protocol stack, which includes, for example, the PHY, MAC, RLC, RRC, and PDCP entities. The underlying logic of this processing can therefore be embodied as software and virtually executed in a distributed manner as virtual cell VEFs by terminal devices 4304-4312. In addition to this cell processing, cells also perform radio activity to provide connectivity to nearby terminal devices. This radio activity includes transmission of downlink data, reception of uplink data, and various other radio operations such as transmission of reference signals and performance of radio measurements. Terminal devices 4304-4312 may also distribute this radio activity amongst themselves, and may therefore perform equivalent transmission, reception, and other radio operations with their own network resources.

Figure 52:
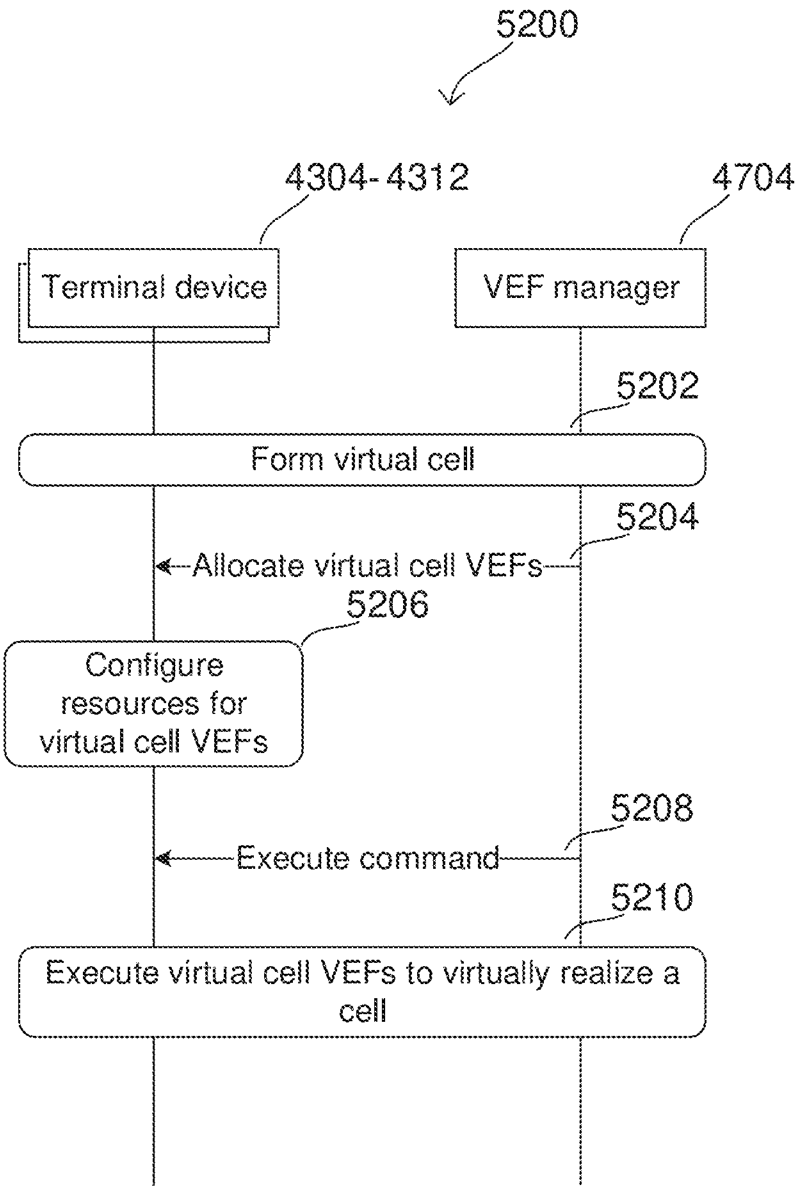
FIG. 52 shows an exemplary procedure for forming and using a virtual cell according to some aspects.

FIG. 52 shows exemplary message sequence chart 5200 according to some aspects. Message sequence chart 5200 illustrates the procedure of forming and executing a virtual cell by distributing virtual cell VEFs between terminal devices forming a virtual network. As shown in FIG. 52, the procedure of message sequence chart 5200 may be handled by VEF manager 4704. As previously indicated, VEF manager 4704 can be software running on a master terminal device (e.g., one of terminal devices 4304-4312) or on a virtual master terminal device (e.g., that is virtually realized by multiple of terminal devices 4304-4312).

Terminal devices 4304-4312 and VEF manager 4704 may first form a virtual cell in stage 5202. This procedure can be similar to the formation of a virtual network as previously described, where terminal devices 4304-4312 exchange signaling to identify each other and establish wireless links for supporting the virtual cell. Then, VEF manager 4704 may allocate VEFs to terminal devices 4304-4312 in stage 5204. As indicated above, these VEFs can include the cell processing and radio activity of a cell. For instance, in the exemplary case of an LTE cell, the LTE cell may execute downlink cell processing (e.g., AS processing) on downlink data and transmit the downlink data as downlink signals, and receive uplink signals and execute uplink cell processing to obtain uplink data from the uplink signals. The LTE cell may also perform other radio operations such as transmission of reference signals and performing radio measurements. Cells of other radio access technologies may similarly perform such cell processing and radio activity.

This cell processing and radio activity can therefore be embodied as virtual cell VEFs. For example, the cell processing for an LTE cell can include PHY, MAC, RLC, RRC, and PDCP processing. Each of these entities defines a specific type of downlink and uplink processing to be performed on downlink and uplink data. The cell processing involved in these entities can therefore be virtualized as virtual cell VEFs, where the involved processing is embodied as executable instructions of the virtual cell VEFs that define the logic of the processing entities. As previously described, these virtual cell VEFs can be executing using, for example, compute resources 4420 of the resource platforms 4418 of terminal devices 4304-4312.

The downlink and uplink transmission can also be virtualized as virtual cell VEFs that involve the use of the wireless components of terminal devices 4304-4312, e.g., baseband modem 4406, RF transceiver 4404, and antenna system 4402. In some cases, these wireless components can be logically included as part of network resources 4424 of resource platform 4418, for example, where baseband modem 4406, RF transceiver 4404, and antenna system 4402 are logically designated as part of network resources 4424 available for use in virtual cell VEFs. Accordingly, the virtual cell VEFs for radio activity can define wireless transmit and receive operations that use baseband modem 4406, RF transceiver 4404, and antenna system 4402 of terminal devices 4304-4312.

In addition to these virtual cells VEFs related to cell radio activity, the virtual cell VEFs for radio activity can also include virtual cell VEFs for backhaul radio activity. In particular, standard cells may be connected to a core network, such as via a wired connection. As terminal devices 4304-4312 form a virtual cell, terminal devices 4304-4312 may also set up a wireless backhaul link to the radio access network (e.g., to one or more nearby network access nodes). Terminal devices 4304-4312 may then receive downlink data (e.g., destined to other terminal devices served by the virtual cell) from the radio access network over the wireless backhaul link, and may transmit uplink data (e.g., from other terminal devices served by the virtual cell) to the radio access network over the wireless backhaul link. The virtual cell VEFs for radio activity may also include virtual cell VEFs that handle this wireless backhaul link.

These virtual cell VEFs for cell processing and radio activity may collectively form a set of virtual cell VEFs, the combination of which provides the cell functionality of a standard cell. Accordingly, VEF manager 4704 may allocate these virtual cell VEFs to terminal devices 4304-4312 in stage 5204. In some aspects, VEF manager 4704 may allocate the virtual cell VEFs based on the capabilities of the respective resource platforms 4418 of terminal devices 4304-4312. For example, VEF manager 4704 may be configured to select terminal devices (or sets of terminal devices) that can support high processing load on their compute resources 4420 for virtual cell VEFs that involve intensive processing. VEF manager 4704 may therefore be configured to allocate virtual cell VEFs based on the involved processing of the virtual cell VEFs and the supported processing power of terminal devices 4304-4312. In another example, VEF manager 4704 may be configured to allocate virtual cell VEFs based on the transmission or reception capabilities of terminal devices 4304-4312. For example, some of the virtual cell VEFs may involve radio activities, and therefore use wireless components to execute. The transmission and reception capabilities of terminal devices 4304-4312 may physically relate to their antenna systems 4402, RF transceivers 4404, and baseband modems 4406, which may be virtually assigned for VEF uses as network resources 4424. VEF manager 4704 may have prior knowledge of the transmission and reception capabilities of the network resources 4424 of terminal devices 4304-4312, and may therefore allocate virtual cell VEFs to terminal devices 4304-4312 based on this prior knowledge of the transmission and reception capabilities of terminal devices 4304-4312

In some aspects, VEF manager 4704 may use the procedure of decision chart 5100 to select terminal devices to allocate the virtual cell VEFs to. Accordingly, VEF manager 4704 may obtain radio measurements of the wireless links between terminal devices 4304-4312 (e.g., as locally performed by their respective baseband modems 4406 and reported by their function controllers 4416), and then select terminal devices to assign to virtual cell VEFs that involve multiple terminal devices (e.g., to execute or to wirelessly exchange result data with counterpart VEFs) based on the radio measurements.

Terminal devices 4304-4312 may then configure their respective resource platforms 4418 for the virtual cell VEFs in stage 5206. This can include, for example, receiving or downloading software that defines the virtual cell VEFs, and loading the software into resource platforms 4418. Then, VEF manager 4704 may send an execute command to terminal devices 4304-4312 in stage 5208. Terminal devices 4304-4312 may receive the execute command at their respective function controllers 4416 and proceed to execute the virtual cell VEFs to virtually realize a cell in stage 5210. Stage 5210 can be a continuous process, where terminal devices 4304-4312 continually execute their respectively allocated virtual cell VEFs to virtually realized the cell over time.

In some aspects, terminal devices 4304-4312 and VEF manager 4704 may be configured to repeat one or more of stages 5202-5210. For example, in some aspects VEF manager 4704 may be configured to re-allocate the virtual cell VEFs, such as by selecting different terminal devices to allocate virtual cell VEFs to. In another example, VEF manager 4704 may be configured to send another execute command that specifies different parameters. This can therefore change execution of the virtual cell VEFs at terminal devices 4304-4312 without re-allocating the virtual cell VEFs.

Figure 53:
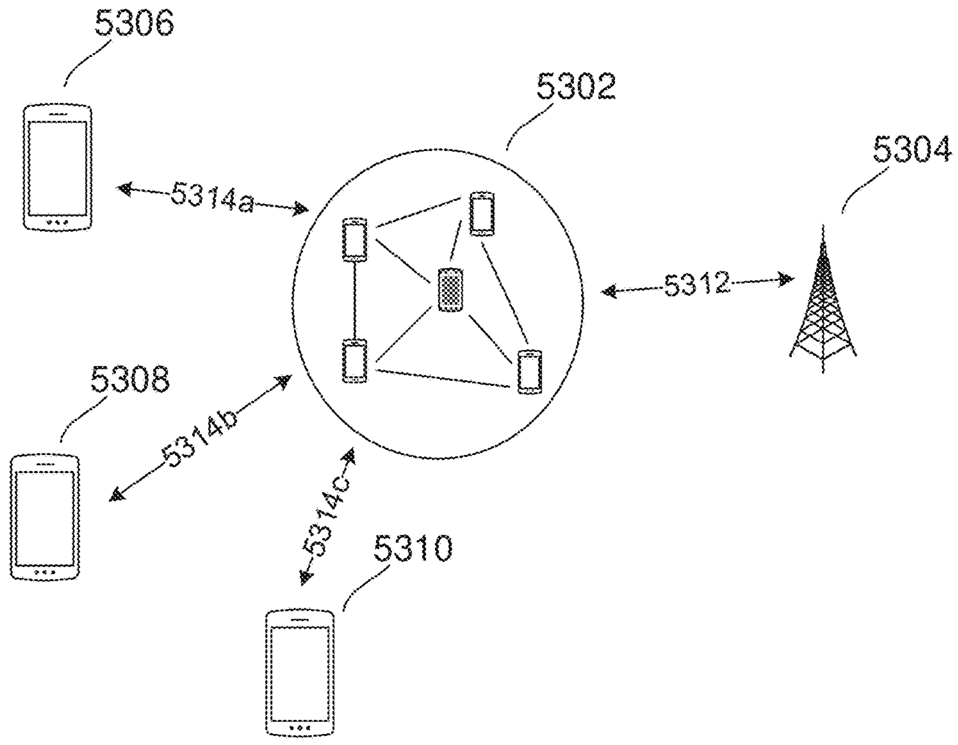
FIG. 53 shows an exemplary network diagram of a virtual cell according to some aspects.

FIG. 53 shows an exemplary network scenario illustrating a virtual cell according to some aspects. As shown in FIG. 53, terminal devices 4304-4312 may realize virtual cell 5302 by executing the corresponding virtual cell VEFs. Virtual cell 5302 may therefore act as a virtual cell to provide radio access and connectivity to terminal devices 5306-5310. Accordingly, terminal devices 5306-5310 may be able to connect to virtual cell 5302 as they would for a normal cell. For example, terminal devices 4304-4312 may execute a synchronization signal VEF that transmits synchronization signals for virtual cell 5302. Terminal devices 5306-5310 may be able to receive and detect these synchronization signals, and then attempt to connect to virtual cell 5302 using random access procedures. Virtual cell 5302 may then execute a random access VEF that handles random access procedures for terminal devices trying to connect to virtual cell 5302. After terminal devices 5306-5310 connect to virtual cell 5302, virtual cell 5302 may then provide radio access to terminal devices 5306-5310 over fronthaul links 5314*a*-5314*c*, over which virtual cell 5302 may transmit downlink data to terminal devices 5306-5310 and may receive uplink data from terminal devices 5306-5310. Terminal devices 4304-4312 forming virtual cell 5302 may perform cell processing on the downlink and uplink data using cell processing VEFs, and accordingly may virtually provide the functionality of a cell.

Additionally, as virtual cell 5302 may in some cases not have a wired connection to the core network, virtual cell 5302 may use backhaul link 5312 to connect with the core network and other external networks. As shown in FIG. 53, virtual cell 5302 may use backhaul link 5312 to wirelessly interface with network access node 5304, which may in turn have a wired connection to the core network. Virtual cell 5302 may therefore relay uplink data (e.g., originating from terminal devices 5306-5310) to network access node 5304 over backhaul link 5312, and network access node 5304 may subsequently route the uplink data through the core network as appropriate (e.g., to a core network server, or through the core network to an external network). Likewise, in the downlink direction, network access node 5304 may transmit downlink data (e.g., addressed to terminal devices 5306-5310) to virtual cell 5302 over backhaul link 5312. Virtual cell 5302 may then relay the downlink data to terminal devices 5306-5310 as appropriate.

Figure 54:
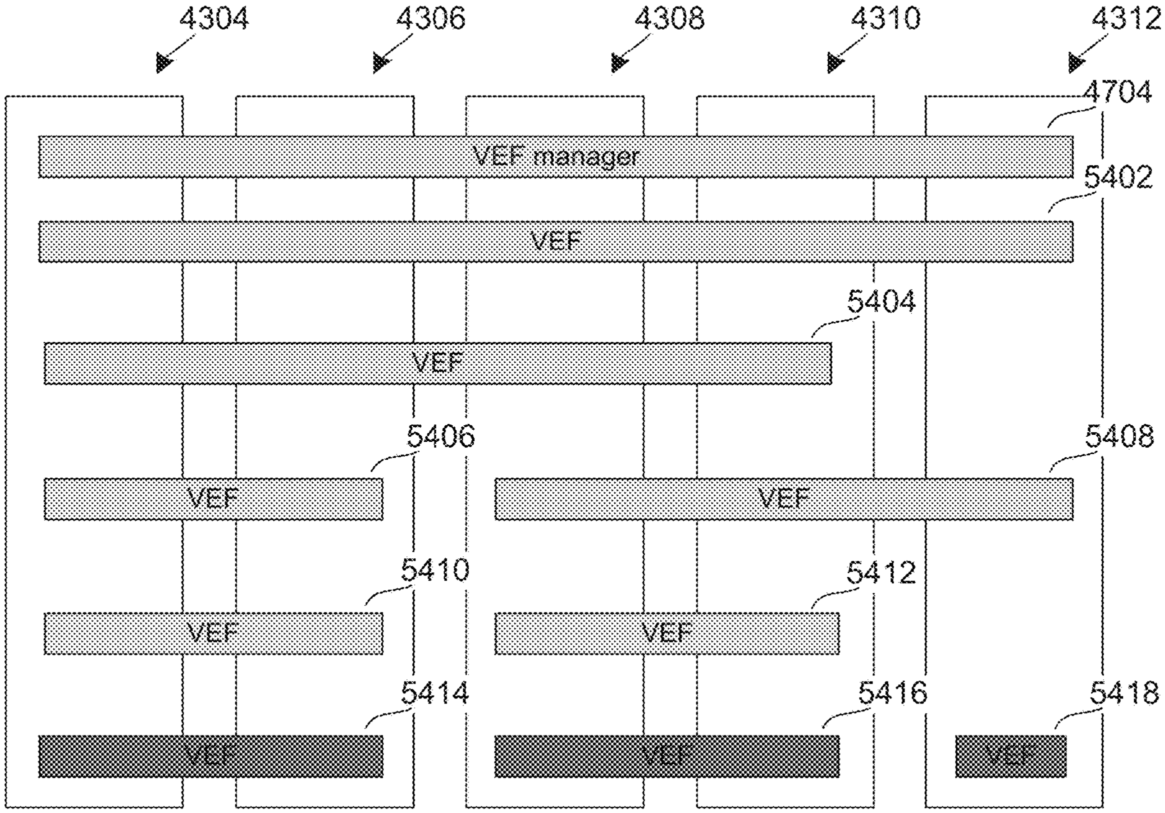
FIG. 54 shows an example illustrating allocation and execution of virtual cell VEFs at terminal devices according to some aspects.

FIG. 54 shows an example illustrating allocation and execution of virtual cell VEFs at terminal devices 4304-4312 according to some aspects. As shown in FIG. 54, terminal devices 4304 4312 may execute VEF manager 4704, which may exert primary control over virtual cell 5302. While FIG. 54 shows VEF manager 4704 being executed by terminal devices 4304-4312, in some aspects only one (e.g., a master terminal device) or only some of terminal devices 4304-4312 may execute VEF manager 4704.

VEF manager 4704 may allocate virtual cell VEFs 5402-5418 to terminal devices 4304-4312. In the example of FIG. 54, virtual cell VEFs 5402-5412 may be cell processing VEFs (as denoted by the light gray color), while virtual cell VEFs 5414-5418 may be radio activity VEFs (as denoted by the dark gray color). The number of virtual VEFs and the specific allocation of virtual cell VEFs (including the distribution between multiple terminal devices) is exemplary and can be re-arranged to any similar allocation.

Accordingly, terminal devices 4304-4312 may execute virtual cell VEFs 5402-5418 using their respective resource platforms 4418, and in doing so may virtually realize a cell. In one example using LTE, virtual VEF 5402 may be a PDCP VEF, virtual cell VEF 5404 may be an RLC VEF, virtual cell VEF 5406 may be an RRC VEF, virtual cell VEF 5408 may be a MAC VEF, virtual cell VEF 5410 may be a downlink PHY VEF, virtual cell VEF 5412 may be an uplink PHY VEF, virtual cell VEF 5414 may be a downlink transmission VEF, virtual cell VEF 5416 may be an uplink reception VEF, and virtual cell VEF 5418 may be a backhaul VEF. In various other examples, the various cell processing and radio activity functions of a cell can be distributed amongst the terminal devices forming the virtual cell using VEFs. While the example of FIG. 54 maps protocol stack and physical layer entities to virtual cell VEFs, this type of mapping is exemplary. Accordingly, in other aspects, specific subfunctions of the protocol stack and physical layer entities can be realized and distributed as an individual virtual cell VEFs. This concept is, for example, discussed above with subfunctions such as random access VEFs. In another example, MAC scheduling could be realized as its own virtual cell VEF, while MAC header encapsulation could be realized as another virtual cell VEF. This same concept can be expanded, for example, to any subfunction of a protocol stack or physical layer entity.

Figure 55:
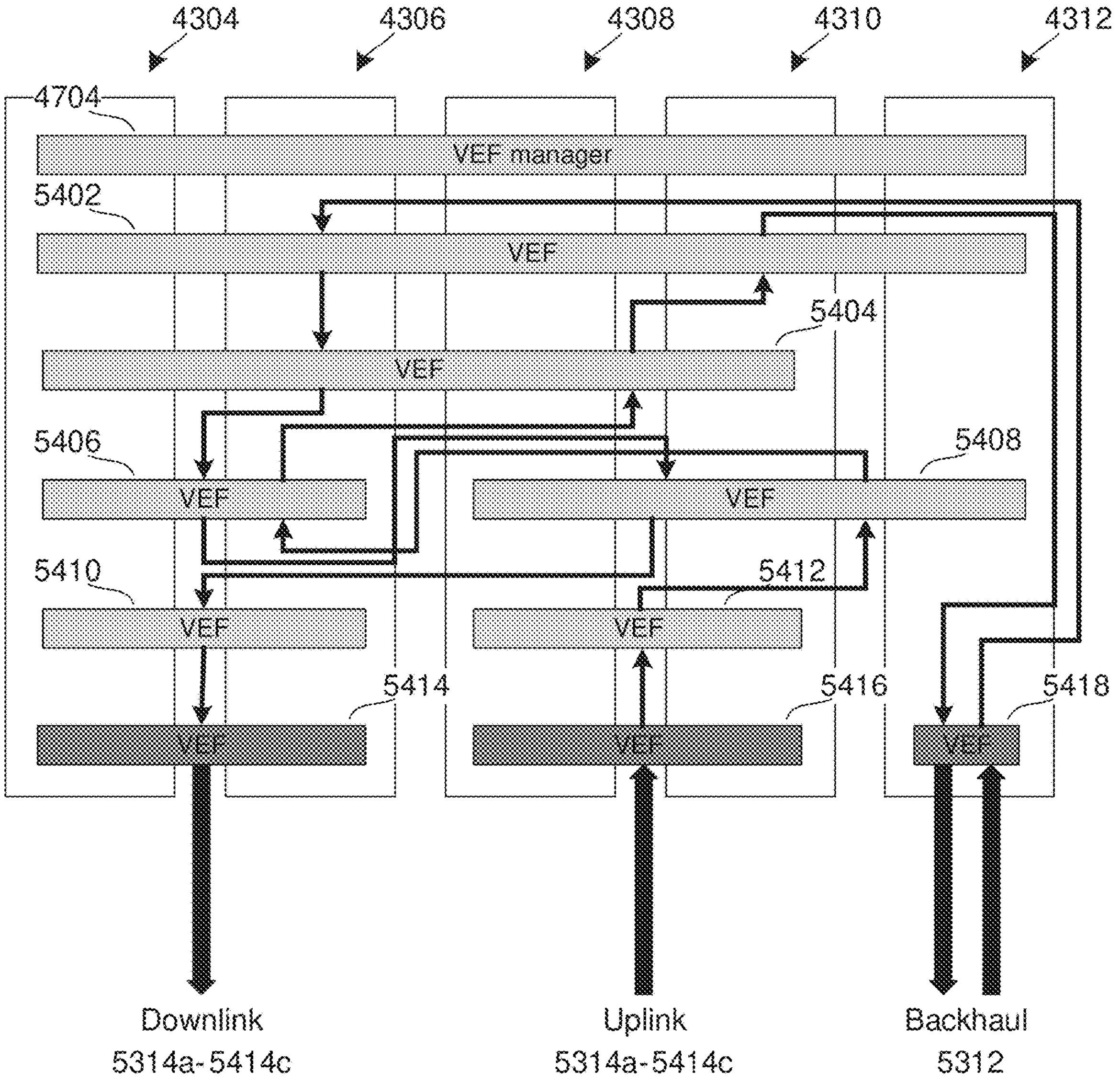
FIG. 55 shows an exemplary diagram of virtual cell VEF allocation and execution according to some aspects.

As previously indicated, in some aspects VEFs may wirelessly exchange data with each other. FIG. 55 shows an example in which virtual cell VEFs 5402-5418 may exchange uplink and downlink data with each other. For example, virtual cell VEFs 5402-5418 may include various downlink and/or uplink cell processing or radio activity functions. Accordingly, when one of virtual cell VEFs 5402-5418 finishes its processing on uplink or downlink data to obtain result data, it may send the result data to the next of virtual cell VEFs 5402-5418 along the processing path. In an example using LTE layers, when MAC VEF 5408 finishes performing MAC processing on downlink data to obtain result data (e.g., a MAC Physical Data Unit (PDU)), it may provide the result data to downlink PHY VEF 5410. Downlink PHY VEF 5410 may then perform PHY processing on the result data to obtain its own result data, which it may then send to downlink transmission VEF 5414. Downlink transmission VEF 5414 may then transmit this data over the downlink paths of fronthaul links 5314*a*-5314*b*. This same conceptual flow of information applies to the exchange of data between the various virtual cell VEFs shown in FIG. 55. The processing paths shown in FIG. 55 are exemplary, and can be fit to any allocation of virtual cell VEFs.

As the virtual cell VEFs 5402-5418 are executed at various different terminal devices, virtual cell VEFs 5402-5418 may use the wireless links between terminal devices 4304-4312 to wirelessly exchange data as appropriate. For example, once MAC VEF 5408 (e.g., running virtually at the resource platforms 4418 of terminal devices 4308-4312) obtains its result data in the downlink direction, it may wirelessly send the result data to downlink PHY VEF 4410 (e.g., running virtually at the resource platforms 4418 of terminal devices 4304 and 4306). For example, the function controller 4416 at one of terminal devices 4308-4312 may wirelessly send the result data (e.g., via its baseband modem 4406) to the controller at one of terminal devices 4304 or 4306, which may then provide the result data to its resource platform 4418 for execution of downlink PHY VEF 4410. This can be handled at the virtualization layer running at the various function controller 4416 of terminal devices 4304-4312. As previously described, virtual cell VEFs that run at multiple terminal devices can similarly wirelessly exchange data as appropriate via their function controllers 4416 and baseband modems 4406.

In some aspects, VEF manager 4704 may map certain terminal devices of the virtual cell to certain terminal devices served by the virtual cell. With reference to the example of FIG. 55, VEF manager 4704 may allocate downlink transmission VEF 5414 to terminal devices 4304 and 4306. In some aspects, downlink transmission VEF 5414 may specify that terminal device 4304 performs downlink transmission for a first set of terminal devices served by virtual cell 5302 and that terminal device 4306 performs downlink transmission for a second set of terminal devices served by virtual cell 5302. Accordingly, when executing downlink transmission VEF 5414, terminal devices 4304 and 4306 may split up downlink transmission by performing downlink transmissions to different served terminal devices.

This can also be implemented in the uplink direction where, for example, uplink reception VEF 5416 specifies that terminal device 4308 performs uplink reception for a first set of terminal devices served by virtual cell 5302 and that terminal device 4310 performs uplink reception for a second set of terminal devices served by virtual cell 5302.

This allocation of certain terminal devices of the virtual cell to certain terminal devices served by the virtual cell can also be implemented for lower-layer processing. For example, downlink transmission VEF 5414 and downlink PHY VEF 5410 may direct terminal device 4304 to perform lower-layer transmit processing (e.g., PHY processing, or PHY and MAC processing) and downlink transmission to a first set of terminal devices served by virtual cell 5302, and may also direct terminal device 4306 to perform lower-layer transmit processing (e.g., PHY processing, or PHY and MAC processing) and downlink transmission to a second set of terminal devices served by virtual cell 5302.

Downlink PHY VEF 5410 running at terminal device 4304 may, for example, perform PHY processing on MAC packets (e.g., MAC PDUs provided by MAC VEF 5408) addressed for the first set of terminal devices to produce PHY symbols. Downlink transmission VEF 5414 running at terminal device 4304 may then perform RF processing on the PHY symbols and then wirelessly transmit the resulting RF signals to the first set of terminal devices. Downlink PHY VEF 5410 and downlink transmission VEF 5414 running at terminal device 4306 may similarly perform PHY processing and downlink transmission for the second set of terminal devices.

In some aspects, uplink PHY VEF 5412 and/or uplink reception VEF 5416 may similarly divide uplink PHY processing and/or uplink transmission according to different sets of terminal devices served by virtual cell 5302. For example, uplink reception VEF 5416 running at terminal device 4308 may perform uplink reception for a first set of terminal devices while uplink reception VEF 5416 running at terminal device 4310 may perform uplink reception for a second set of terminal devices. Similarly, uplink PHY VEF 5412 running at terminal device 4308 may perform uplink PHY processing for the first set of terminal devices while uplink PHY VEF 5412 running at terminal device 4310 may perform uplink PHY processing for the second set of terminal devices.

In some aspects, VEF manager 4704 may be configured to allocate these sets of terminal devices to the terminal devices forming virtual cell 5302 as part of the virtual cell VEF allocation process of stage 5202 in FIG. 52. For example, in some aspects VEF manager 4704 may be configured to assign sets of served terminal devices to certain of terminal devices 4304-4312 based on the position and/or wireless links of terminal devices 4304-4312. For example, VEF manager 4704 may be configured to compare the positions of the served terminal devices (e.g., terminal devices 5306-5310) to the positions of terminal devices 4304-4312, and to identify those of terminal devices 4304-4312 that are close to each of terminal devices 5306-5310. Then, VEF manager 4704 may be configured to allocate downlink transmission VEF 5414 and uplink transmission VEF 5416 so terminal devices 4304-4312 perform downlink and uplink radio activity with those of terminal devices 5306-5310 that they are close to. Additionally or alternatively, VEF manager 4704 may be configured to evaluate radio measurements that characterize the wireless links between terminal devices 4304-4312 and terminal devices 5306-5310, and to allocate downlink transmission VEF 5414 and uplink transmission VEF 5416 so terminal devices 4304-4312 perform downlink and uplink radio activity with those of terminal devices 5306-5310 that they have strong wireless links with. In some cases, this can improve error rate, reduce retransmissions, and/or increase the supported data rate, as downlink and uplink transmission may occur over strong wireless links.

In some aspects, downlink transmission, uplink reception, and downlink and uplink PHY processing can be distributed between terminal devices based on radio resources. For example, in some aspects downlink PHY VEF 5410 running at terminal device 4304 may perform downlink PHY processing for a first set of time-frequency resources (e.g., resource elements (REs)) while downlink PHY VEF 5410 running at terminal device 4306 may perform downlink PHY processing for a second set of time-frequency resources. Downlink transmission VEF 5414 running at terminal device 4304 may then perform downlink transmission for the first set of time-frequency resources while downlink transmission VEF 5414 running at terminal device 4306 may perform downlink transmission for the second set of time-frequency resources.

This distribution over radio resources can similarly be applied in the uplink direction. For example, uplink reception VEF 5416 running at terminal device 4308 may perform uplink reception for a first set of time-frequency resources while uplink reception VEF 5416 running at terminal device 4310 may perform uplink reception for a second set of time-frequency resources. Similarly, uplink PHY VEF 5412 running at terminal device 4308 may perform uplink PHY processing for the first set of time-frequency resources while uplink PHY VEF 5412 running at terminal device 4310 may perform uplink PHY processing for the second set of time-frequency resources.

As previously indicated, in some aspects one of the virtual cell VEFs may be a backhaul VEF. Backhaul VEF 5418 is one such example. Backhaul VEF 5418 can be executed by a single terminal device (e.g., terminal device 4312 in the example of FIG. 54), or can be distributed and executed virtually by multiple terminal devices. Backhaul VEF 5418 may handle transmission and reception over backhaul link 5312 of virtual cell 5302. For example, as denoted in FIG. 55, in some aspects backhaul VEF 5418 may be configured to transmit uplink data (e.g., originating from the served terminal devices of virtual cell 5302) to the radio access network (e.g., to network access node 5304), and to receive downlink data (e.g., originating from the radio access network, core network, or an external network, and addressed to the served terminal devices of virtual cell 5302) from the radio access network. This can include using the wireless components (e.g., baseband modem 4406, RF transceiver 4404, and antenna system 4402, which can be virtually designated as network resources 4424) of the terminal devices executing backhaul VEF 5418 to perform wireless transmission and reception. Accordingly, virtual cell 5302 may be able to maintain a backhaul link to the core network via execution of backhaul VEF 5418. As shown in the exemplary processing flow of FIG. 55, backhaul VEF 5418 may be configured to route received downlink data to the downstream virtual cell VEFs (e.g., that are configured to perform the next stage of downlink cell processing), and to receive uplink data from the upstream virtual cell VEFs (e.g., that are configured to perform the previous stages of uplink cell processing).

In some aspects, backhaul VEF 5418 may use downlink and/or uplink aggregation. For example, with reference to the exemplary scenario of FIG. 53, virtual cell 5302 may serve multiple terminal devices 5306-5310, and may maintain a backhaul link with network access node 5304 (e.g., an anchor cell). In the downlink direction, network access node 5304 may be configured to identify different packets addressed to terminal devices 5306-5310 and to aggregate these component packets together to form an aggregated packet (e.g., that uses a single header, at a given network layer, for all of the component packets). Network access node 5304 may then transmit the aggregated packet to virtual cell 5302. Virtual cell 5302 (e.g., virtual cell VEFs 5402-5418 that virtually realize virtual cell 5302) may then separate the aggregated packet into the original component packets addressed to terminal devices 5306-5310 and the transmit the component packets to terminal devices 5306-5310. Additionally or alternatively, virtual cell 5302 may similarly use packet aggregation in the uplink direction. For example, virtual cell 5302 may receive multiple packets from terminal devices 5306-5310, and aggregate these component packets together to form an aggregated packet (e.g., with a single header for all of the component packets). Virtual cell 5302 may then transmit the aggregated packet to network access node 5304. In some cases, this use of aggregation can reduce overhead due to both the use of a single header for multiple component packets and the reduced amount of control signaling (e.g., scheduling requests/grants, buffer status reports, ACKs/NACKs, and other signaling exchange that occurs on a per-packet basis).

In some aspects, the virtual cell VEFs allocated to virtual cell 5302 may also include reference signal transmission VEFs and/or radio measurement VEFs. These virtual cell VEFs can similarly be allocated to one or more of the terminal devices forming virtual cell 5302.

In some aspects, the radio measurement VEFs may be distributed between multiple terminal devices of virtual cell 5302. Then, as these terminal devices are located at different positions, the radio measurement VEF can use radio measurements obtained at different positions to estimate propagation conditions. In one example, a master terminal device, such as terminal device 4304, may be executing backhaul VEF 5418, and may not have sufficient wireless component capabilities to concurrently perform radio measurement. Accordingly, VEF manager 4704 running at terminal device 4304 may be configured to allocate a radio measurement VEF to another terminal device of virtual cell 5302, such as terminal device 4306. Terminal device 4306 may then execute the radio measurement VEF, and may perform and obtain radio measurements to report back to terminal device 4304. Terminal device 4304 can then use these radio measurements instead of performing its own radio measurements. This same concept can be used in other cases where certain terminal devices in virtual cell 5302 use radio measurements for various tasks but are occupied with other functionality (e.g., related to execution of their allocated virtual cell VEFs) to perform them. Accordingly, allocation of radio measurement VEFs to other terminal devices in virtual cell 5302 may enable virtual cell 5302 to obtain these radio measurements by having other terminal devices in virtual cell 5302 perform the radio measurements. In some aspects, the terminal devices in virtual cell 5302 may perform a calibration procedure (which can be a calibration VEF assigned to the terminal devices by VEF manager 4704) in which the terminal devices of virtual cell 5302 compare their positions and/or locally obtained radio measurements to identify which terminal devices have correlated propagation conditions (e.g., as they are located proximate to each other and/or have similar wireless links). VEF manager 4704 may then be configured to assign terminal devices with correlated propagation conditions to perform radio measurements on behalf of each other.

As previously indicated, in some aspects VEF manager 4704 may be executed by the function controller 4416 of a master terminal device, while in other aspects VEF manager 4704 may be executed by a virtual master terminal device (e.g., that is virtualized via distributed execution of a master terminal device VEF at multiple terminal devices of virtual cell 5302). VEF manager 4704 may assume primary control over the operation of virtual cell 5302, including allocating virtual cell VEFs to the various terminal devices in virtual cell 5302. In some aspects where virtual cell 5302 has a master terminal device, the master terminal device may be configured to execute backhaul VEF 5418. The master terminal device may therefore assume backhaul responsibilities for virtual cell 5302.

In some aspects, creation and/or maintenance of virtual cells can be dynamic. For example, the creation of a virtual cell, such as in stage 5202 in FIG. 52, can be autonomous (ad-hoc) or network-triggered. In the case of autonomous creation, a triggering terminal device can initial creation of the virtual cell. For example, one of terminal devices 4304-4312 (that eventually form virtual cell 5302), such as terminal device 4304, may assume the role of the triggering terminal device. In one example, function controller 4416 of terminal device 4304 may determine that a triggering condition has been met, and may then trigger creation of a virtual cell. The triggering condition can be, for example, detection of heavy network load (e.g., where function controller 4416 of terminal device 4304 detects that network load and/or user density exceeds a predefined threshold). In another example, the triggering condition can be identification of an area that is poorly served by the radio access network (e.g., where function controller 4416 of terminal device 4304 detects that local radio measurements in the area are less than a predefined threshold).

After detecting that triggering condition is met, function controller 4416 of terminal device 4304 may transmit a virtual cell create signal. For example, function controller 4416 may control baseband modem 4406 of terminal device 4304 to transmit the virtual cell create signal, such as in the form of a wireless D2D signal (referring to any type of terminal device-to-terminal device signaling, including cellular as well as WiFi and Bluetooth, and not limited to any standard)). Other terminal devices that are configured to support virtual cells may monitor for such virtual cell create signals (e.g., by processing signals received at their respective baseband modems 4406). For example, terminal devices 4306-4312 may detect the virtual cell create signal at their respective function controllers 4416, and may therefore determine that a virtual cell is being created. Terminal devices 4304-4312 may then exchange signaling (e.g., via their respective function controllers 4416) to form the virtual cell, thus completing stage 5202. In some aspects, the triggering terminal device may assume the role of master terminal device (if applicable), while in other aspects the terminal devices may collaboratively select a master terminal device (e.g., based on the processing and/or wireless communication capabilities of the terminal devices, or based on the position of the terminal devices relative to other terminal devices).

In other cases, creation of a virtual cell can be network-triggered. For example, a network access node, such as network access node 5302, may identify that there is heavy network load or high user density, or that there is an area that has poor coverage. In some cases, network access node 5302 may then broadcast a virtual create cell signal, which one or more of terminal devices 4304-4312 may receive and subsequently begin the cell creation process previously described. In some cases, network access node 5302 may identify a terminal device, such as terminal device 4304, and send signaling to terminal device 4304 that instructs terminal device 4304 to create a virtual cell. In some cases, network access node 5302 may identify the terminal devices that should form the virtual cell, such as terminal devices 4304-4312, and then send signaling to terminal devices 4304-4312 that instructs them to form a virtual cell.

In some aspects, when creating a virtual cell, the terminal devices may exchange signaling with each other to determine the capabilities of the terminal devices. For example, when terminal devices 4304-4312 create a virtual cell and begin executing VEF manager 4704 (e.g., at a master terminal device or at a virtual master terminal device), VEF manager 4704 may receive signaling from terminal devices 4304-4312 that specifies the processing and/or communication capabilities of terminal devices 4304-4312. In some aspects, the signaling can from terminal devices 4304-4312 can also specify their positions and/or radio measurements that characterize wireless links between them. As previously indicated, VEF manager 4704 may use the information in this signaling to allocate virtual cell VEFs to terminal devices 4304-4312 in stage 5204 of FIG. 52.

Figure 56:
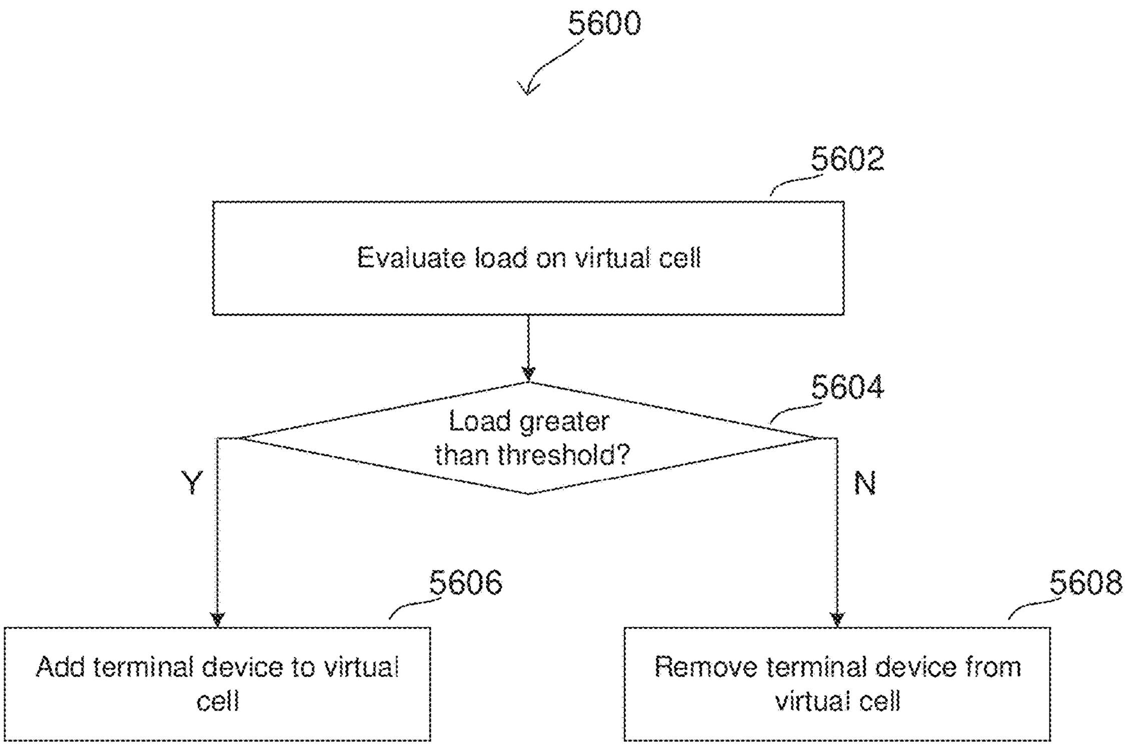
FIG. 56 shows an exemplary procedure for managing members of a virtual cell according to some aspects.

In some aspects, virtual cell 5302 may be scalable. For example, VEF manager 4704 may be configured to add or remove terminal devices from virtual cell 5302 based on the current load of virtual cell 5302. FIG. 56 shows exemplary decision chart 5600 according to some aspects, which illustrates an exemplary process of scaling virtual cell 5302. As shown in FIG. 56, VEF manager 5602 may first evaluate the load on virtual cell 5302 in stage 5602. For example, the load can be measured in the amount of processing load (e.g., expressed as a percentage of the maximum processing load that the available virtual resources of virtual cell 5302 can handle), a data rate (e.g., the amount of uplink and/or downlink data for its served terminal devices that passes through virtual cell 5302), a number of terminal devices served by virtual cell 5302, or some other metric that quantifies the load on virtual cell 5302. VEF manager 4704 may then compare the load to a threshold in stage 5604 to determine whether the load is greater than the threshold. If the load is greater than the threshold, VEF manager 4704 may be configured to add a terminal device (or multiple terminal devices) to virtual cell 5302 in stage 5606. Conversely, if the load is not greater than the threshold, VEF manager 4704 may be configured to remove a terminal device (or multiple terminal devices) from virtual cell 5302 in stage 5608.

If VEF manager 4704 decides to add a terminal device to virtual cell 5302, VEF manager 4704 may trigger transmission of a virtual cell invite signal (e.g., by allocation of a virtual cell invite VEF to one of the terminal devices of virtual cell 5302, which may then transmit the virtual cell invite signal via its baseband modem 4406). Nearby terminal devices configured to support virtual cell functionality can then detect the virtual cell invite signal, and their function controller 4416 can exchange signaling with VEF manager 4704 to arrange for the terminal device to join virtual cell 5302.

If VEF manager 4704 decides to remove a terminal device from virtual cell 5302, VEF manager 4704 may be configured to identify one of the terminal devices in virtual cell 5302, and to send the terminal device a virtual cell remove signal (e.g., by allocation of a virtual cell remove VEF to one of the terminal devices of virtual cell 5302, which may then transmit the virtual cell remove signal via its baseband modem 4406). The terminal device may then leave virtual cell 5302, and may therefore cease performing any virtual cell VEFs for virtual cell 5302.

The ability to dynamically scale the size of virtual cell 5302 can enable virtual cell 5302 to adapt to its current load and to provide sufficient resources to nearby terminal devices. Accordingly, when there is high demand for virtual cell 5302 by nearby terminal devices, virtual cell 5302 can scale up in size to meet the demand. Conversely, when there is low demand for virtual cell 5302, virtual cell 5302 can scale down in size.

In some aspects, virtual cell 5302 may additionally or alternatively be configured to split into multiple separate virtual cells. For example, in some aspects, VEF manager 4704 may be configured to trigger a virtual cell split, such as based on a triggering condition. This triggering condition can be, for example, detecting that a group of terminal devices has moved away from the rest of the terminal devices in virtual cell 5302 (e.g., based on the current positions of virtual cell 5302). VEF manager 4704 may then, for example, identify a first set of terminal devices in virtual cell 5302 to form a first virtual cell and identify a second set of terminal devices in virtual cell 5302 to form a second virtual cell. VEF manager 4704 may then send out a virtual cell split signal to the first set of terminal devices and to the second set of terminal devices that respectively assigns them to the first and second virtual cells. The first and second sets of terminal devices may then create the first and second virtual cells as assigned. This can include, for both the first and second virtual cells, exchanging signaling with each other to form the virtual cells, initializing a new VEF manager, and allocating virtual cell VEFs to the terminal devices in the new first and second virtual cells.

In some aspects, virtual cell 5302 may additionally or alternatively be configured to merge with another virtual cell. For example, VEF manager 4704 may detect that another virtual cell is proximate to virtual cell 5302, and may decide to merge with the other virtual cell. Accordingly, VEF manager 4704 may exchange signaling with a counterpart VEF manager of the other virtual cell, and may arrange for the virtual cells to merge. The terminal devices of virtual cell 5302 and the terminal devices of the other virtual cell may then exchange signaling and form the new merged cell, which can include initializing a new VEF manager for the merged cell and allocating virtual cell VEFs to the terminal devices in the merged cell.

In some aspects, virtual cell 5302 may be configured to coordinate with the radio access network. For example, in some cases, served terminal devices may handover from nearby network access nodes to virtual cell 5302. As this may normally involve inter-cell signaling, virtual cell 5302 may wirelessly exchange signaling directly from the nearby network access node involved in the handover. Alternatively, virtual cell 5302 may use backhaul link 5312 with network access node 5304 (e.g., the anchor cell), which may then forward the signaling to the network access nods involved in the handover (e.g., using a network access node-network access node interface). This can be handled by a mobility VEF that VEF manager 4704 allocates amongst the terminal devices of virtual cell 5302.

In some aspects, virtual cell 5302 may coordinate with the core network to authenticate terminal devices that connect to it. For example, when a terminal device attempts to connect with virtual cell 5302, virtual cell 5302 may verify the terminal device with the core network. In one example, virtual cell 5302 may execute a verification VEF, which may communicate with a subscriber database in the core network (e.g., using backhaul link 5312) to verify whether the terminal device is an authorized user. Virtual cell 5302 may then permit the terminal device to connect if it is an authorized user, or may reject the terminal device if it is not an authorized user.

Virtual cell 5302 may also communicate with the radio access and/or core network via backhaul link 5312 in various other scenarios. For example, virtual cell 5302 may be configured to communicate with the network when it needs to update devices and get one from the network that is doing the internal distribution by itself. In another example, virtual cell 5302 may be configured to communicate with the core network or another external network to store result data (e.g., from execution of VEFs).

In various aspects, virtual cell 5302 may be either open or closed (e.g., permanently, or can switch between being either open or closed at any given time). For example, if virtual cell 5302 is open, any terminal device (or any authorized terminal device) may be permitted to join virtual cell 5302, or may be permitted to use virtual cell 5302 as a served terminal device. If virtual cell 5302 is closed, only certain terminal devices may be permitted to join virtual cell 5302, or may be permitted to use virtual cell 5302 as a served terminal device. In some aspects where virtual cell 5302 is a closed cell, virtual cell 5302 may be configured to store authentication information that virtual cell 5302 can use (e.g., as an authorization VEF) to determine which terminal devices can join virtual cell 5302. In other aspects, virtual cell 5302 may be configured to query a subscriber database in the core network to verify whether certain terminal devices are permitted to join virtual cell 5302.

Figure 57:
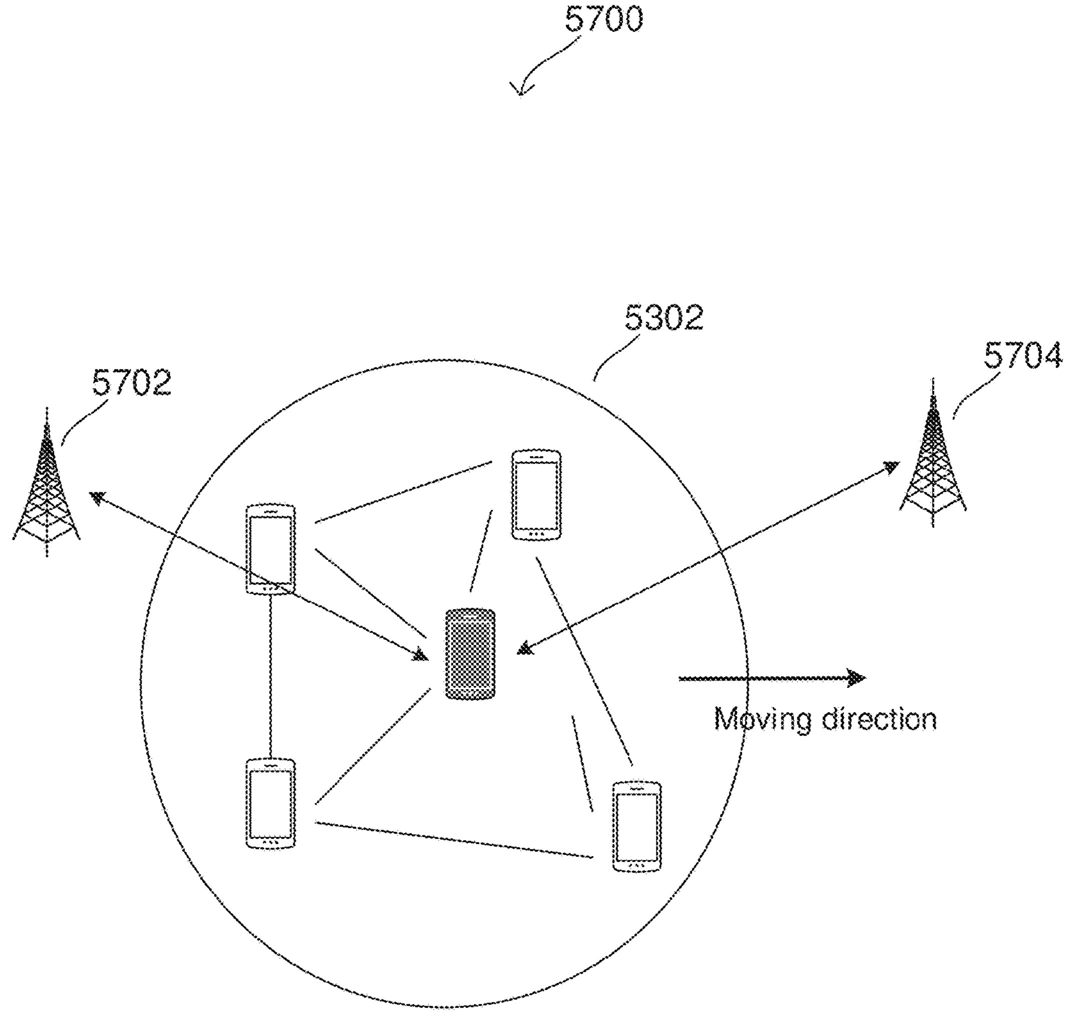
FIG. 57 shows an exemplary network scenario of handover for a virtual cell according to some aspects.

In some aspects, virtual cells can be used to optimize handover procedures. Handover procedures can involve substantial signaling, and therefore can contribute to network load. FIG. 57 shows an example in which the terminal devices of virtual cell 5302 are initially connected to network access node 5702, and are moving together and in the same direction. Rather than performing a time- and power-consuming handover procedure for each of the terminal devices to network access node 5704, virtual cell 5302 may perform a single handover procedure on behalf of all of the terminal devices (e.g., handled by a handover VEF). In some aspects, virtual cell 5302 may alternatively perform multiple handover procedures to handover the terminal devices, where at least some of the multiple handover procedures handover multiple of the terminal devices. This can likewise save time and/or power, as at least some of the handover procedures may handover multiple terminal devices in a single handover procedure.

Various examples described above refer to the use of backhaul link 5312 and/or an anchor cell (e.g., network access node 5304). In some aspects, virtual cell 5302 may operate without any backhaul link or anchor cell, and may therefore act as an independent entity. Exemplary use cases include platooning, drone swarms, and local household networks, where virtual cell 4302 may coordinate communications between its served terminal devices without transmitting or receiving external data via a backhaul link.

In some aspects, the backhaul link used by virtual cell 5302 may be a non-operator backhaul link (e.g., that falls outside of the domain of the mobile network operator). For example, in some aspects, virtual cell 5302 may use a non-cellular radio access technology, such as WiFi or satellite, for the backhaul link. For example, if one of terminal devices 4304-4312, such as terminal device 4304, in virtual cell 5302 supports WiFi or satellite communications, VEF manager 4704 may allocate a backhaul VEF to terminal device 4304. The backhaul VEF running on terminal device 4304 may therefore transmit and receive (e.g., using the WiFi or satellite wireless components of terminal device 4304 that are virtually designated as network resources 4424) using a WiFi or satellite backhaul link. In some aspects where non-operator backhaul links are used, virtual cell 5302 may use additional authentication and security features. For example, the backhaul VEF may establish a VPN with the operator network, where the non-operator backhaul link forms part of the interface. Virtual cell 5302 and the operator network may then exchange data over the VPN, which can protect the data.

In some aspects, virtual cell 5302 may be configured to implement distributed relay functionality. For example, a group of terminal devices may be located in a remote location, such as a group of standard terminal devices, vehicular terminal devices moving in a platoon, or drones operating in a swarm in a remote location. As they are in a remote location, the terminal devices may not have traditional access to the core network via cellular backhaul. Accordingly, the terminal devices may form virtual cell 5302, which both these terminal devices as well as other nearby terminal devices could use. If the terminal devices need to reach the core network and one of the terminal devices forming virtual cell 5302 supports a long-range connection (e.g., has wireless components equipped with satellite capabilities), virtual cell 5302 may use this long-range connection to access the core network.

In some aspects, virtual cell 5302 may be configured to use machine learning. For example, the terminal devices of virtual cell 5302 can use machine learning to derive new filter coefficients for the machine learning algorithm, and can the use the new filter coefficients amongst themselves. For instance, the terminal devices can exchange the filter coefficients with each other, such as in a split task setup where different terminal devices determine different filter coefficients and then exchange the filter coefficients with each other. The terminal devices can also send additional filter coefficients to the core network for storage, and can retrieve the filter coefficients at a later time (e.g., after reboot, or when a similar scenario occurs for which the stored filter coefficients are applicable).

In some aspects, the terminal devices of virtual cell 5302 may perform their respective processing functions for executing the virtual cell VEFs with asynchronous processing. Accordingly, VEF manager 4704 may allocate the virtual cell VEFs to the terminal devices so that the virtual cell VEFs at each terminal device do not depend on virtual cell VEFs being executed at other terminal devices. This can enable the terminal devices to execute their virtual cell VEFs asynchronously. Additionally, virtual cell 5302 may use asynchronous processing to split performance requirements to different CPUs, and to run the CPUs on different power values or thermal heat dissipation. Accordingly, the terminal devices can run their CPUs (for executing the virtual cell VEFs) with lower power values and/or with lower thermal heat dissipation.

In some cases, virtual cell functionality can be implemented with companion cells. These companion cells can be mobile cells that follow a particular user or user group and provide access and other services to the user or group. Groups of these companion cells can then form their own virtual cell using the techniques described herein. Other virtual cells can also add companion cells as members.

In some aspects, credit or reimbursement may be provided to terminal devices (e.g., to the user or customer that owns or uses the terminal device) in exchange for the participation of the terminal device in the virtual cell. This credit or reimbursement can be provided, for example, by a network operator. The network operator can offer incentives of greater value in exchange for greater participation in the virtual cell. For example, terminal devices that act as master terminal devices can yield the highest incentives (e.g., to offset the higher power consumption associated with being the master terminal device). This can incentivize terminal devices to act as the master terminal device and/or to participate in the virtual cell.

These virtual cells can offer a wide array of advantages in different scenarios. For example, the ability of virtual cells to dynamically create may obviate the need to deploy permanent radio access infrastructure, which is costly to deploy and maintain. The scalable nature of virtual cells can also enable efficient resource usage. Furthermore, most conventional radio access infrastructure is stationary while virtual cells are mobile. Virtual cells can also shift maintenance costs from the network operator to the users and customers.

Various exemplary uses of the proposed system can include stadium events, public meeting spaces, auditoriums, dense traffic settings (including platoons and convoys of vehicular terminal devices), factory/warehouse robots, and home and commercial private networks. Another example relates to an urban use case for cars where, for example, vehicles in the city are not only their own device, but when parked also constitute a small cell network that can provide access for passing-by pedestrians and people living nearby.

Figure 58:
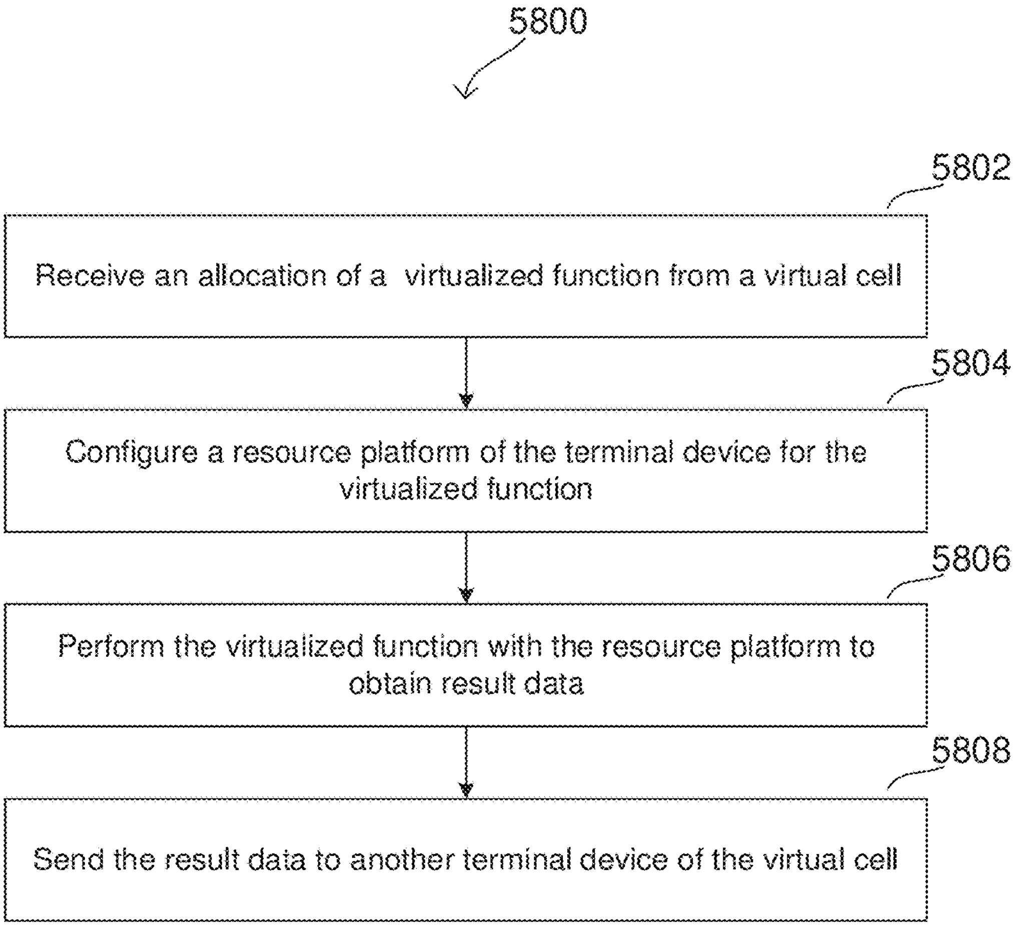
FIG. 58 shows an exemplary method of operating a terminal device according to some aspects.

FIG. 58 shows exemplary method 5800 of operating a terminal device according to some aspects. As shown in FIG. 58, method 5800 includes receiving an allocation of a virtualized function from virtual cell (5802), configuring a resource platform of the terminal device for the virtualized function (5804), performing the virtualized function with the resource platform to obtain result data (5806), and sending the result data to another terminal device of the virtual cell (5808).

Figure 59:
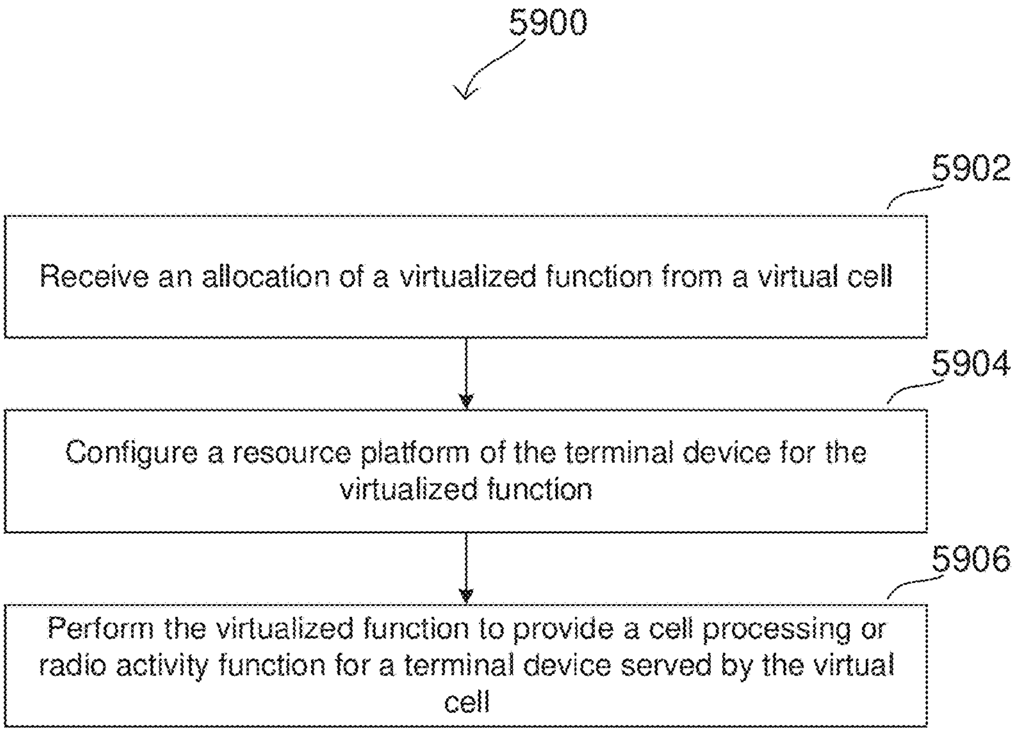
FIG. 59 shows an exemplary method of operating a terminal device according to some aspects.

FIG. 59 shows exemplary method 5900 of operating a terminal device according to some aspects. As shown in FIG. 59, method 5900 includes receiving an allocation of a virtualized function from a virtual cell (5902), configuring a resource platform of the terminal device for the virtualized function (5904), and executing the virtualized function to provide a cell processing or radio activity function for a terminal device served by the virtual cell (5906).

Figure 60:
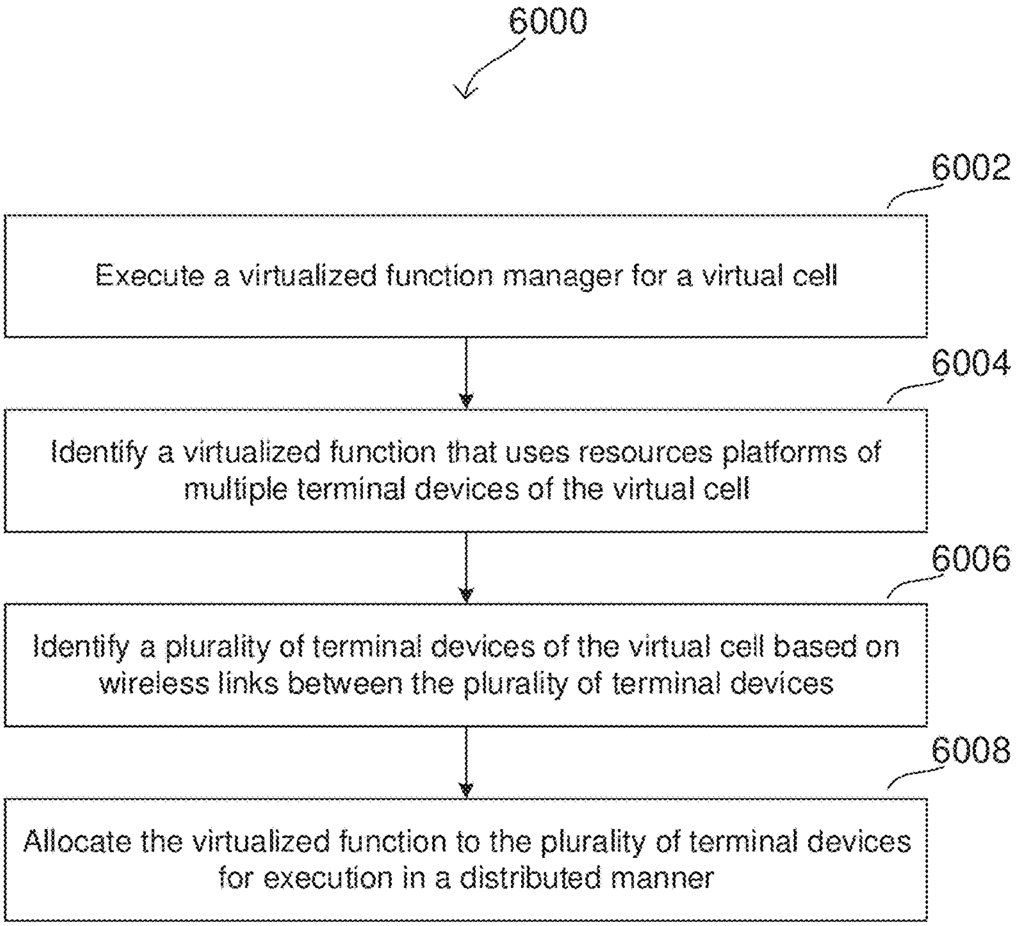
FIG. 60 shows an exemplary method of operating a terminal device according to some aspects.

FIG. 60 shows exemplary method 6000 of operating a terminal device according to some aspects. As shown in FIG. 60, method 6000 includes executing a virtualized function manager for a virtual cell (6002), identifying a virtualized function that uses resources platforms of multiple terminal devices of the virtual cell (6004), identifying a plurality of terminal devices of the virtual cell based on wireless links between the plurality of terminal devices (6006), and allocating the virtualized function to the plurality of terminal devices for execution in a distributed manner (6008).

Virtual Cells Based on Geographic Regions

In some aspects, the virtual cells described above may be tied to specific geographic regions. The virtual cells may use these geographic regions to control which terminal devices join and exit the virtual cell and to define region-specific execution of virtual cell VEFs. These geographic areas can be fixed (such as a virtual cell that is located in and serves a fixed geographic area) or dynamic (such as a mobile virtual cell that serves a moving area over time).

Figure 61:
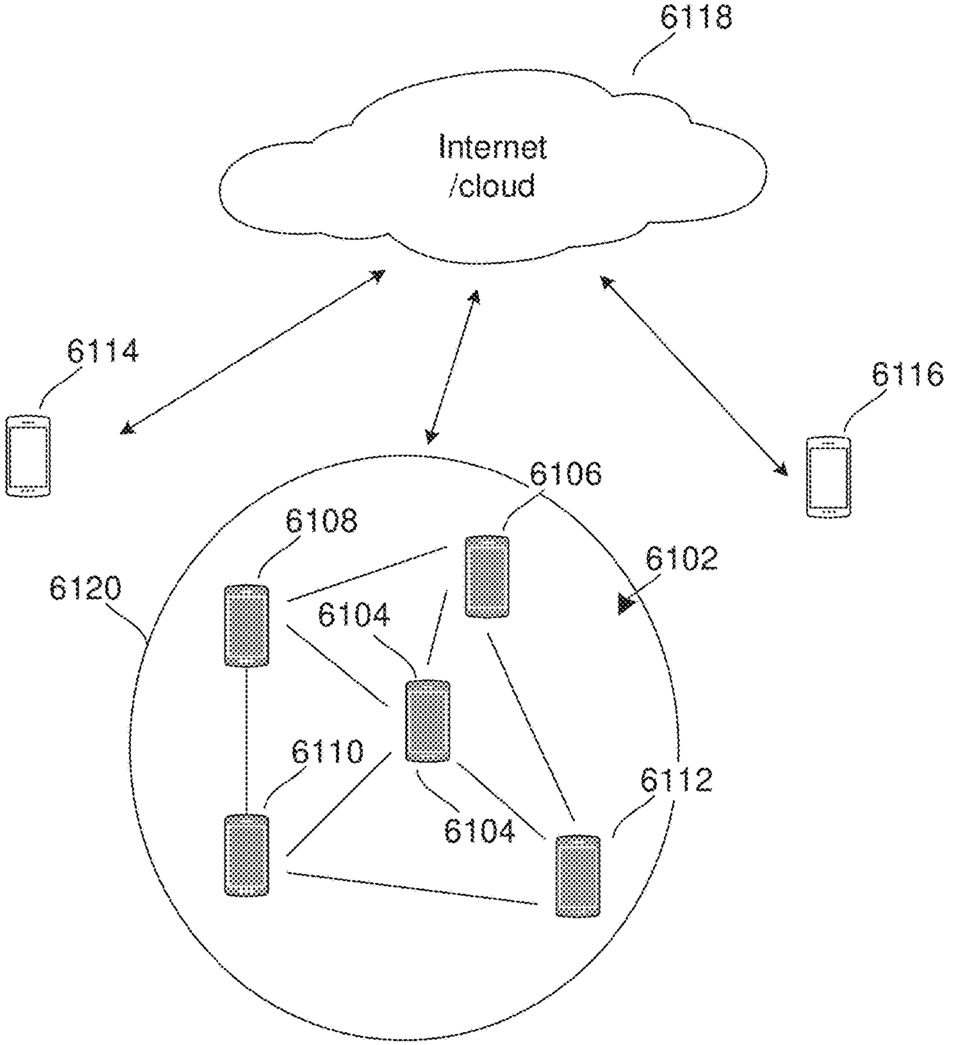
FIG. 61 shows an exemplary network scenario for a virtual cell according to some aspects.

FIG. 61 shows an exemplary network scenario with virtual cell 6102 according to some aspects. As shown in FIG. 61, virtual cell 6102 may include terminal devices 6104-6112. As previously described, virtual cell 6102 may virtually realize cell by allocating virtual cell VEFs to terminal devices 6104-6112, where the virtual cell VEFs define the cell processing and radio activity (e.g., cell functionality) of standard cells. Terminal devices 6104-6112 may then perform their respectively assigned virtual cell VEFs at their respective resource platforms 4418, and collectively may provide the cell functionality of a standard cell to nearby terminal devices. As shown in FIG. 61, virtual cell 6102 may interface with internet/cloud network 6118 (e.g., via a radio access and core network). Various other terminal devices 6114 and 6116 may also interface with internet/cloud network 6118.

Figure 62:
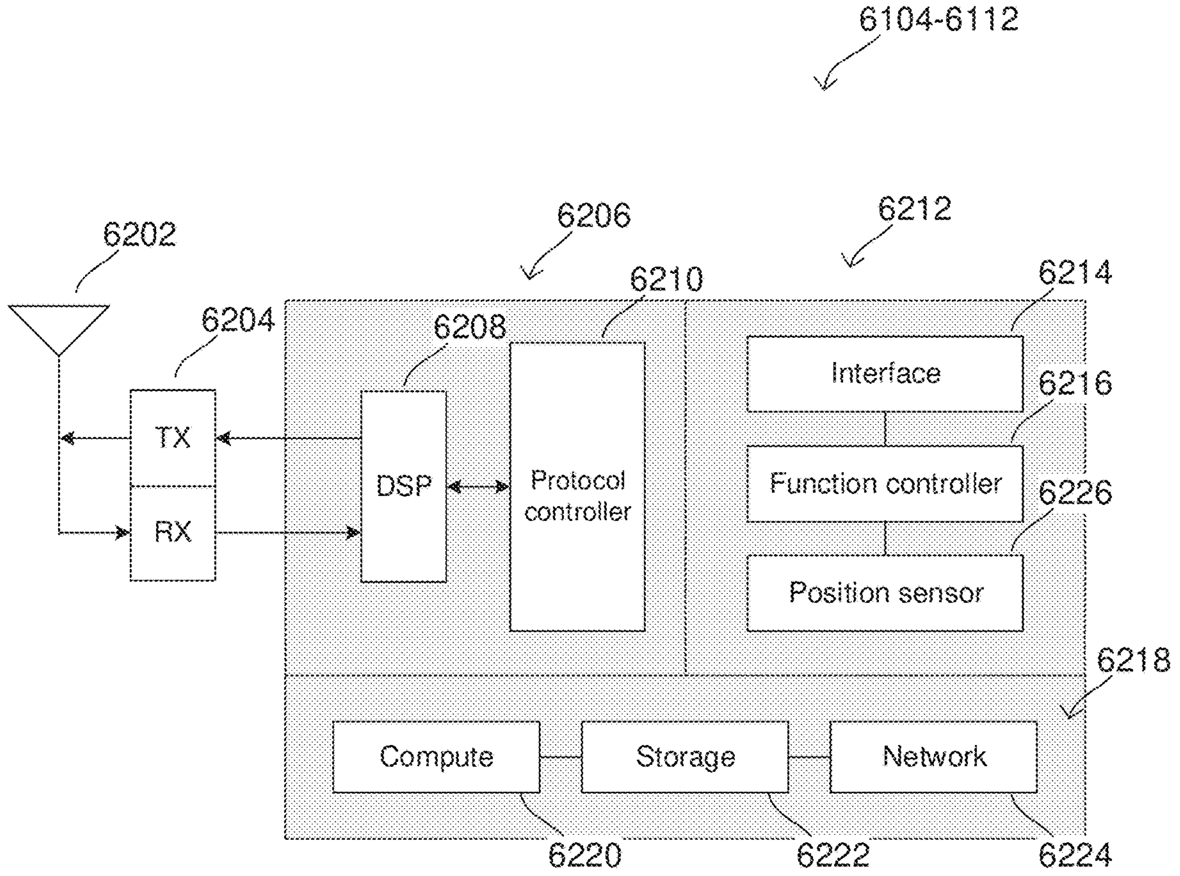
FIG. 62 shows an exemplary internal configuration of a terminal device for a virtual cell according to some aspects.

FIG. 62 shows an exemplary internal configuration of terminal devices 6104-6112. As shown in FIG. 62, terminal devices 6104-6112 may include antenna system 6202, RF transceiver 6204, baseband modem 6206, virtual network platform 6212, and resource platform 6218. Components 6202-6224 of terminal devices 6104-6112 may be configured in the same manner as components 4402-4424 of terminal devices 4304-4312 as shown and described for FIG. 44. Function controllers 6216 may therefore control the virtual cell functions while resource platform 6218 may be allocated to performing virtual cell VEFs as assigned.

Terminal devices 6104-6112 may also include position sensor 6226, which can be a component of virtual network platform 6212. Position sensor 6226 may be any type of position sensor capable of determining a position of the terminal device. In some aspects, position sensor 6226 may be a geographic positional sensor, such as a sensor that uses geographic satellite signals to determine positions (e.g., a Global Navigation Satellite System (GNSS) position sensor). In some aspects, position sensor 6226 may be a signal strength position sensor, such as a measurement engine configured to perform signal strength measurements to determine a relative distance between the terminal device and a transmitting device. As further described below, terminal devices 6104-6112 may use their respective position sensors 6226 to determine their positions for use in the geographic-dependent functions of virtual cell 6102. In some aspects, terminal devices 6104-6112 may receive their positions from elsewhere outside of the terminal devices.

Figure 63:
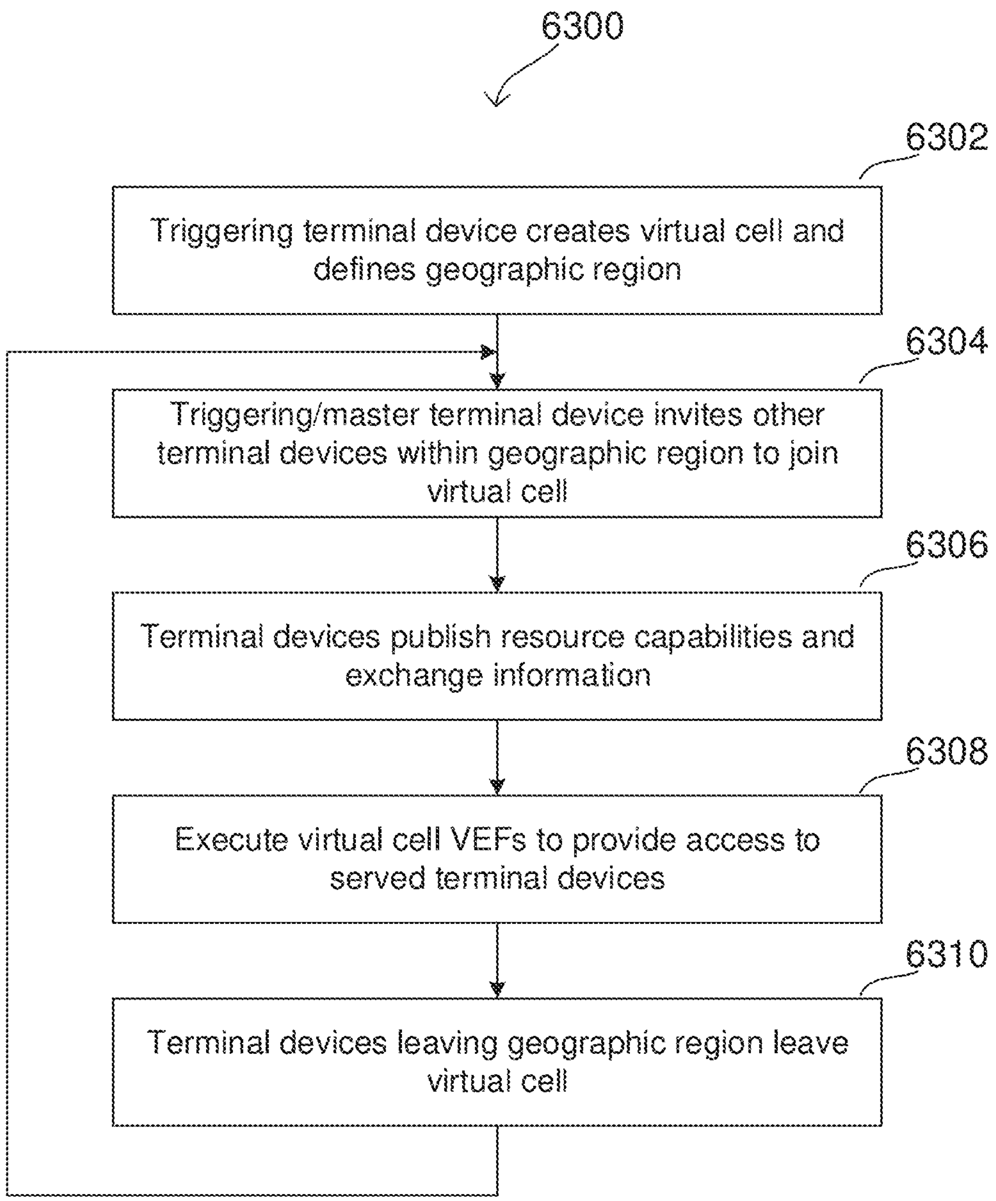
FIG. 63 shows an exemplary procedure for creating a virtual cell according to some aspects.

In some aspects, virtual cell 6102 may form based on a geographic region. As denoted in FIG. 61, terminal devices 6104-6112 may be located within geographic region 6120. FIG. 63 shows exemplary flow chart 6300 illustrating formation of virtual cell 6102 according to some aspects. As shown in FIG. 63, a triggering terminal device may first create virtual cell 6102 and definite geographic region 6120 in stage 6302. For example, one of terminal devices 6104-6112, such as terminal device 6104, may determine that a triggering condition is met (e.g., network load above a threshold, or radio coverage level below a threshold), and may subsequently decide to create virtual cell 6102.

Terminal device 6104 may perform this action at its function controller 6216 as shown in FIG. 62. After deciding to create virtual cell 6102, function controller 6216 of terminal device 6104 may be configured to define geographic region 6120 of virtual cell 6102. Geographic region 6120 may be defined by a logical boundary that is subsequently used by virtual cell 6102 to govern which terminal devices are invited to join virtual cell 6102 (e.g., to execute virtual cell VEFs as part of virtual cell 6102). In some aspects, function controller 6216 of terminal device 6104 may use a predefined region as geographic region 6120. For example, function controller 6216 may be configured to use a predefined shape (e.g., a circle, square/rectangle, or other regular or irregular shape) as geographic region 6120. After defining geographic region 6120, function controller 6216 may locally store region data that defines geographic region 6120. This region data can be, for example, a set of coordinates that define the boundaries of geographic region (e.g., that define the outer perimeter, edges, and/or corners as geographic coordinates). In some aspects, geographic region 6120 may be fixed, in which case the region data may be static (e.g., the actual geographic area constituting geographic region 6120 may not change). In other aspects, geographic region 6120 may be dynamic. For example, function controller 6216 may define geographic region 6120 as a region relative to terminal device 6104, such as a circle, square/rectangle, or other shape with terminal device 6104 positioned at the center (or any other point within geographic region 6104).

Function controller 6216 of terminal device 6104 may then invite other terminal devices within geographic region 6120 to join virtual cell 6102 in stage 6304. In some aspects, function controller 6216 may transmit a discovery signal (e.g., wirelessly via baseband modem 4406 of terminal device 6104), which nearby terminal devices may receive via their baseband modems and detect at their respective function controllers. The discovery signal may specify geographic region 6120 (e.g., may include the region data that defines geographic region 6120). Terminal devices 6106-6112 may therefore receive the discovery signal, and their position sensors 6226 may determine their respective current position and provide the respective current positions to their respective function controllers 6216. Function controllers 6216 may then use the region data and current positions to determine whether terminal devices 6106-6112 are within geographic region 6120. In an example using terminal device 6106, position sensor 6226 of terminal device 6106 may determine the current position of terminal device 6106 and provide the current position to function controller 6216. Function controller 6216 may then compare the current position to the region data of geographic region 6120 and determine whether terminal device 6106 is within geographic region 6120. For example, if the current position is a geographic position and the region data specifies a set of coordinates that define geographic region 6120, function controller 6216 may determine whether the current position falls within the boundaries of geographic region 6120 as defined by the set of coordinates. In another example, if position sensor 6226 is a measurement engine configured to perform a signal strength measurement, position sensor 6226 may perform a signal strength measurement on the discovery signal transmitted by terminal device 6104 and determine a relative distance between terminal device 6106 and terminal device 6104. If the region data specifies geographic region 6120 by a distance (e.g., a distance from terminal device 6106, thus defining geographic region 6120 as a circle centered at terminal device 6106), function controller 6216 may then determine whether the relative distance between terminal devices 6106 and 6104 is less than the distance of the region data. If so, function controller 6216 may determine that terminal device 6106 is within geographic region 6120.

Terminal devices 6106-6112 may similarly perform this operation, and may determine that they are located within geographic region 6120. Function controllers 6216 of terminal devices 6106-6112 may then transmit a discovery response signal to terminal device 6104 that indicates that terminal devices 6106-6112 are within geographic region 6120. Function controller 6216 of terminal device 6104 may then invite terminal devices 6106-6112 to join virtual cell 6102 in stage 6304, such as by exchanging further signaling with function controllers 6216 of terminal devices 6106-6112 that invite terminal devices 6106-6112 to join virtual cell 6102.

Other terminal devices, such as terminal devices 6114 and 6116, may also receive the discovery signal from terminal device 6104. However, as shown in FIG. 61, terminal devices 6114 and 6116, in some cases, may not be located within geographic region 6120. Accordingly, when their respective function controllers 6216 evaluate the region data and current positions, they may determine that terminal devices 6114 and 6116 are not located within geographic region 6120. Therefore, in some cases, terminal devices 6114 and 6116 may not respond to the discovery signal, and terminal device 6104 may not invite terminal devices 6114 and 6116 to join virtual cell 6102

In a variation of the procedure described above for stages 6302 and 6306, function controller 6216 of terminal device 6104 may transmit a discovery signal in stage 6302 as part of creating virtual cell 6102. Function controllers 6216 of terminal devices 6106-6116 may receive the discovery signal, and direct their position sensors 6226 to obtain the respective current positions of terminal devices 6106-6116. Function controllers 6216 of terminal devices 6106-6116 may transmit a discovery response signal to function controller 6216 of terminal device 6104 that specifies the current positions of terminal devices 6106-6116. Function controller 6216 may then evaluate the region data for geographic region 6120 and the respective current positions of terminal devices 6106-6116, and may determine whether terminal devices 6106-6116 are located within geographic region 6120. Function controller 6216 of terminal device 6104 may then invite the terminal devices that are within geographic region 6120 to join virtual cell 6102 (e.g., by transmitting an invite signal to terminal devices 6106-6112) in stage 6306. Function controller 6216 may not invite the terminal devices that are not in geographic region 6120 (e.g., terminal devices 6114 and 6116) to join virtual cell 6102.

Terminal devices 6104-6112 may therefore create virtual cell 6102. In some aspects, terminal device 6104 may assume the role of master terminal device, and may therefore execute a VEF manager at its function controller 6216 that manages the VEF execution of virtual cell 6102. As shown in FIG. 63, terminal devices 6104-6112 may publish their resource capabilities and exchange other information as applicable in stage 6306. For example, when terminal device 6104 is the master terminal device, function controllers 6216 of terminal devices 6106-6112 may send signaling to function controller 6216 of terminal device 6104 that specifies their resource capabilities. This can include the computing capabilities of their respective compute resources 6220 (e.g., processing power, such as expressed in floating points operations per second (FLOPs) or another quantitative metric about computing capabilities), storage capabilities of their respective storage resources 6222 (e.g., storage capacity, such as expressed in any byte-based metric), and the network capabilities of their respective network resources 6224 (e.g., supported radio access technologies, supported transmit power, supported data rates, or any other metric that quantities network or radio communication capabilities).

In other aspects, terminal devices 6104-6112 may select a master terminal device. For example, while terminal device 6104 may act as the triggering terminal device to initially create virtual cell 6102, terminal devices 6104-6112 may be configured to select a master terminal device after virtual cell 6102 is established. Accordingly, terminal devices 6104-

6112 may publish resource capabilities and exchange other information in stage 6306, and then use their resource capabilities and other information to select a master terminal device. For example, the respective function controllers 6216 of terminal devices 6104-6112 may negotiate with each other (e.g., via signaling exchange) to select, based on the respective resource capabilities, one of terminal devices 6104-6112 to be the master terminal device. In some aspects, terminal devices 6104-6112 may also exchange their current positions as part of the other information (e.g., as determined by their respective position sensors 6226), and may use their current positions to select a master terminal device. For example, terminal devices 6104-6112 may select a terminal device located in a central location relative to the other terminal devices as the master terminal device.

In some aspects, terminal devices 6104-6112 may use a virtual master terminal device, such as by executing a master terminal device VEF at the resource platforms 6218 of multiple of terminal devices 6104-6112 in a distributed manner. Further references to master terminal devices in virtual cell 6102 can therefore refer to either of the cases where one of terminal devices 6104-6112 is the master terminal device or where virtual cell 6102 uses a virtual master terminal device.

The master terminal device may then begin controlling operation of virtual cell 6102. For example, function controller 6216 of the master terminal device may use the resource capabilities of terminal devices 6104-6112 to allocate virtual cell VEFs (e.g., when running the VEF manager). Terminal devices 6104-6112 may then execute the respectively allocated virtual cell VEFs in stage 6308 to virtually realize the cell functionality of a standard cell, thus providing access to served terminal devices. Virtual cell 6102 can use any feature or functionality previously described above, such as by allocating virtual cell VEFs for the cell processing and radio activity for cells. Other terminal devices near virtual cell 6102 may therefore be able to use virtual cell 6102 in the manner of a standard cell, such as by receiving downlink data and transmitting uplink data.

Virtual cell 6102 may continue to use geographic region 6120 to influence virtual cell behavior. For example, in some aspects, terminal devices that leave geographic region 6120 may leave virtual cell 6102 in stage 6310 (e.g., cease participating in virtual cell VEF execution for virtual cell 6102). The master terminal device may then re-allocate the virtual cell VEFs previously allocated to these terminal devices. In some aspects, the master terminal device may monitor the current positions of terminal devices 6104-6112 to determine whether they are still located within geographic region 6120. For example, position sensors 6226 of terminal devices 6104-6112 may periodically determine the current positions of terminal devices 6104-6112, and function controllers 6216 of terminal devices 6104-6112 may report their respective current positions to the master terminal device. Function controller 6216 of the master terminal device may then determine whether any of terminal devices 6104-6112 are not within geographic region 6120 based on the region data. If so, function controller 6216 of the master terminal device may transmit signaling to those of terminal devices 6104-6112 that are not within geographic region 6120 to instruct them to leave virtual cell 6102. In some cases where geographic region 6120 is dynamic (e.g., changing over time), function controller 6216 of the master terminal device may compare the current positions of terminal devices 6104-6112 to the most recent region data for geographic region 6120 to determine whether any of terminal devices 6104-6112 are not within geographic region 6120.

In some aspects, terminal devices 6104-6112 may periodically check to determine whether they are still located within geographic region 6120. In some cases where geographic region 6120 is fixed, function controller 6216 of terminal devices 6104-6112 may locally store the region data (e.g., after receiving the region data in a discovery signal from the triggering terminal device). In some cases where geographic region 6120 is dynamic, function controller 6216 of the master terminal device may periodically update the region data to reflect dynamic changes in geographic region 6120. Function controller 6216 of the master terminal device may then send the region data to function controllers 6216 of terminal devices 6104-6112, which may locally store it until the master terminal device provides newer region data.

Position sensors 6226 of terminal devices 6104-6112 may then periodically determine the current positions of terminal devices 6104-6112 and provide the current positions to the respective function controllers 6216 of terminal devices 6104-6112. Function controllers 6216 of terminal devices 6104-6112 may then compare their respective current positions to the region data to determine whether terminal devices 6104-6112 are still within geographic region 6120. If, for example, terminal device 6106 is not within geographic region 6120, its function controller 6216 may transmit exit signaling to function controller 6216 of the master terminal device. Terminal device 6106 may then leave virtual cell 6102, and function controller 6216 may re-allocate the virtual cell VEFs previously allocated to terminal device 6106.

As shown in FIG. 63, stages of flow chart 6300 may repeat. For example, the master terminal device may repeat stage 6304 to invite new terminal devices that enter geographic region 6120 to join virtual cell 6102. For example, function controller 6216 of the master terminal device (and, optionally, function controllers 6216 of one or more other terminal devices in virtual cell 6102) may periodically transmit discovery signals, which other nearby terminal devices may receive and identify at their function controllers. The master terminal device and nearby terminal device may then determine whether the nearby terminal device is within geographic region 6120 (e.g., using any technique described above). If so, the master terminal device may invite the nearby terminal device to join virtual cell 6102. Function processor 6216 of the master terminal device may then, while running the VEF manager, allocate virtual cell VEFs to the nearby terminal device.

While flow chart 6300 as described above shows aspects where terminal devices leave virtual cell 6102 when they leave geographic region 6120, other aspects may use geographic region 6120 differently. For example, in some aspects, the triggering or master terminal device may invite terminal devices within geographic region 6120 to join virtual cell 6102, but may not instruct terminal devices that leave geographic region 6120 to leave virtual cell 6120. For example, virtual cell 6102 may instruct terminal devices to leave virtual cell 6102 based on another criteria (e.g., other than geographic region), such as when the connection between the terminal device and virtual cell 6120 fails (or when a signal strength or other criteria falls below a threshold).

Figure 64:
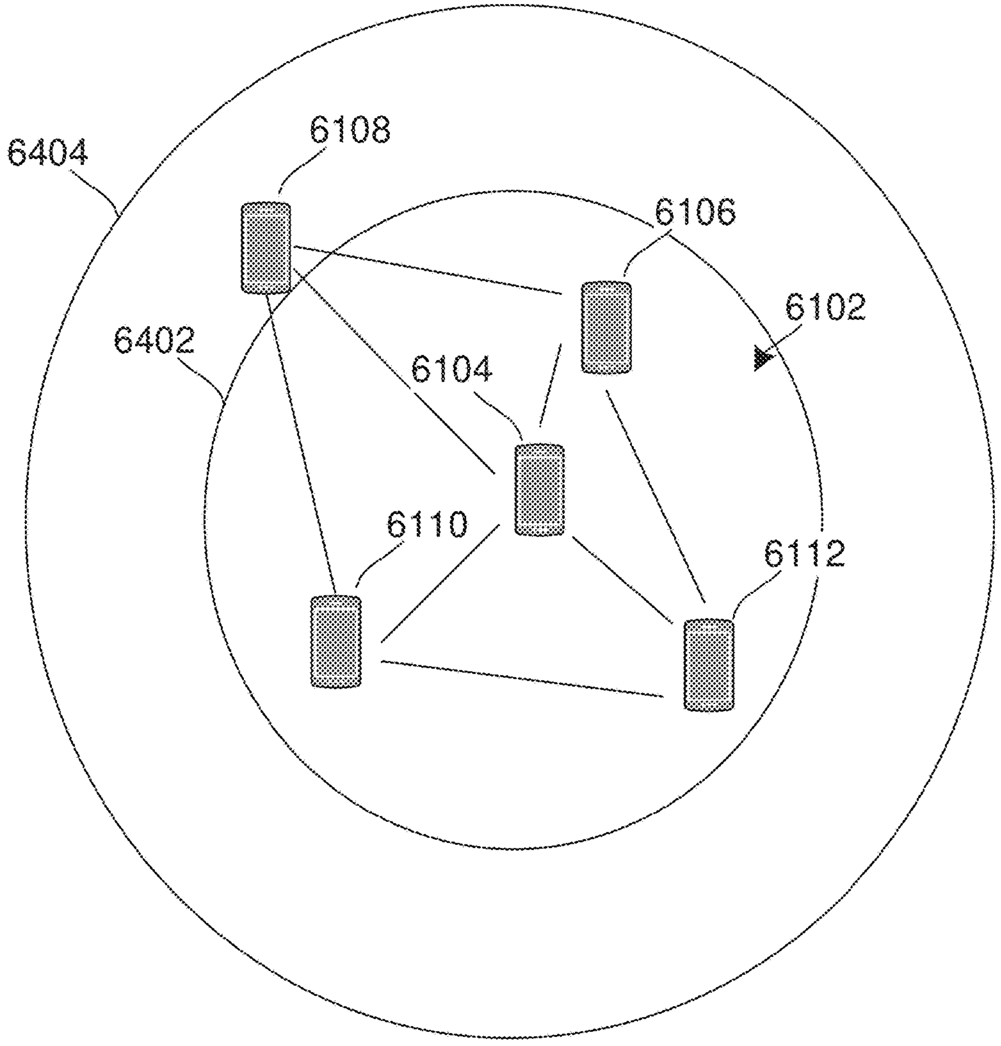
FIG. 64 shows an exemplary diagram of a virtual cell with different regions according to some aspects.

In some aspects, virtual cell 6102 may use multiple geographic regions. FIG. 64 shows an exemplary scenario where virtual cell 6102 uses two geographic regions according to some aspects. In the example of FIG. 64, virtual cell 6102 may use inner geographic region 6402 and outer geographic region 6404. Virtual cell 6102 may invite terminal devices to join virtual cell 6102 when the terminal devices enter inner geographic region 6402, and may instruct terminal devices to leave virtual cell 6102 when the terminal devices leave outer geographic region 6404. Accordingly, even if terminal device 6108 is part of virtual cell 6102 and moves outside of inner geographic region 6402, terminal device 6108 may only leave virtual cell 6102 when it leaves outer geographic region 6404.

As previously indicated, when virtual cell 6102 is active, it may provide access to various served terminal devices in its vicinity. These served terminal devices may be different from the terminal devices that form virtual cell 6102, as they may not contribute their own resources to the virtual cell. The served terminal devices may connect to and interact with virtual cell 6102 in a similar or same manner as to with a standard cell. The geographic regions that virtual cell 6102 uses to control which terminal devices join and leave may be different from the area in which served terminal devices can connect to virtual cell 6102. For example, virtual cell 6102 may provide access to an area larger than its geographic regions (e.g., may serve a larger area than is used to control which terminal devices join and leave virtual cell 6102).

Figure 65:
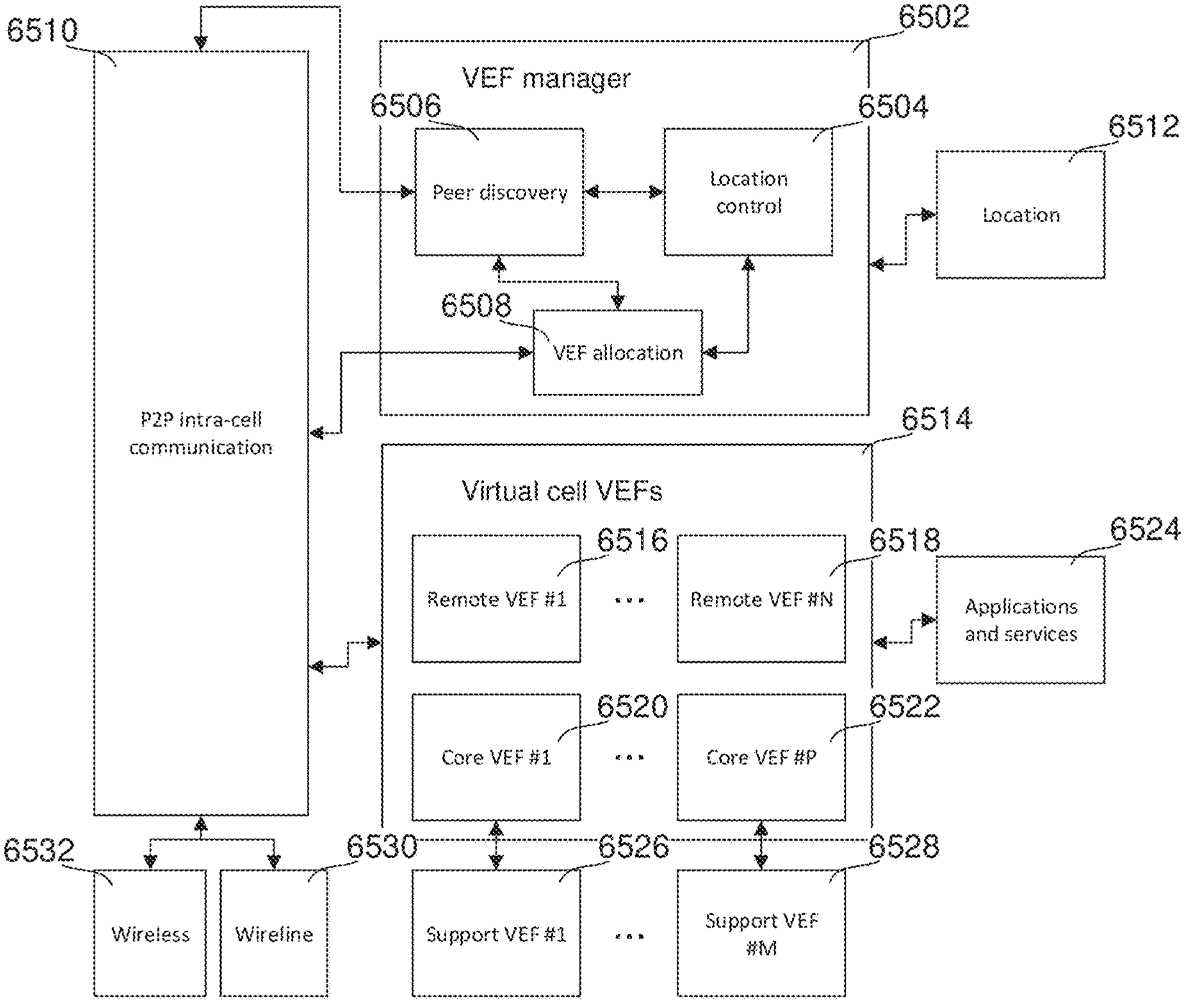
FIG. 65 shows an exemplary diagram of a virtual cell according to some aspects.

FIG. 65 shows an exemplary diagram that illustrates the logical architecture of virtual cell 6102 according to some aspects. As this architecture is logical, various elements shown in FIG. 65 may correspond to other physical components (e.g., may be logical software entities that are executed by a physical processor). As shown in FIG. 65, virtual cell 6102 may include VEF manager 6502, which is previously detailed above for virtual cells in FIGS. 43-60. As described above, VEF manager 6502 may be the logical control entity that manages operation of the virtual cell VEFs. Accordingly, as shown in FIG. 65, VEF manager 6502 may include peer discovery 6506, location control 6504, and VEF allocation 6508.

Peer discovery 6506, location control 6504, and VEF allocation 6508 may be subfunctions of VEF manager 6502, and may be configured as software for execution on a processor. In some aspects, peer discovery 6506, location control 6504, and VEF allocation 6508 may be executed by a master terminal device, such as a master terminal device that executes peer discovery 6506, location control 6504, and VEF allocation 6508 on its function controller 6216. In some aspects, the master terminal device may allocate some or all of the subfunctions of VEF manager 6502 to other terminal devices in virtual cell 6102, which may then execute the allocated subfunctions on their respective resource platforms 6218 (e.g., with compute resources 6220).

With initial reference to peer discovery 6506, peer discovery 6506 may include functionality for discovering and adding new terminal devices to virtual cell 6102. For example, as previously described, the terminal devices in virtual cell 6102 may periodically transmit discovery signals, which other nearby terminal devices may receive. In some cases where peer discovery 6506 is executed at the master terminal device, function controller 6216 of the master terminal device may control transmission of discovery signals, reception of discovery response signals from a responding terminal device, and subsequent decisions about whether to add the responding terminal device to virtual cell 6102. For example, when running peer discovery 6506, function controller 6216 of the master terminal device may periodically trigger wireless transmission of the discovery signals (e.g., via baseband modem 6206 of the master terminal device), and may then use baseband modem 6206 to monitor for reception of discovery response signals from a responding terminal device. When a discovery response signal is received, function controller 6216 may then decide whether to add the responding terminal device to virtual cell 6102. For example, the responding terminal device may include its current position in the discovery response signal, which function controller 6216 of virtual cell 6102 may use to determine whether the responding terminal device is within geographic area 6120 and should be added to virtual cell 6102. In some cases, the discovery response signal may include other information about the responding terminal device, which function controller 6216 (e.g., running peer discovery 6506) of the master terminal device may use to determine whether to add the responding terminal device to virtual cell 6102. This can include, for example, using the other information to determine whether the responding terminal device is a trusted device (e.g., based on its manufacturer, or other identify information in its subscriber identity).

In other cases, some or all of peer discovery 6506 may be executed at other terminal devices in virtual cell 6102. For example, the master terminal device may assign other terminal devices to perform transmission of discovery signals and/or reception of discovery response signals. The function controllers 6216 of these terminal devices may then use their respective baseband modems 6206 to perform this transmission and reception, and to report back reception of discovery response signals to the master terminal device (which can then decide whether to add the responding terminal devices to virtual cell 6102 or not). In some cases, the function controllers 6216 (e.g., running peer discovery 6506) of these terminal devices may also be configured to decide whether to add responding terminal devices to the virtual cell, such as by using any criteria described above for the master terminal device.

With reference to location control 6504, location control 6504 may manage the monitoring of the locations of the terminal devices that form virtual cell 6102. As shown in FIG. 65, VEF manager 6502 may receive locations 6512 as an input. Locations 6512 may include the positions of the terminal devices in virtual cell 6102 obtained by their respective position sensors 6226. These current positions may then be used by VEF manager 6502, including at location control 6504. In some cases where location control 6504 is executed at the function controller 6216 of the master terminal device, the other terminal devices in virtual cell 6102 may be configured to periodically determine their current positions with their respective position sensors 6226 and to report their current positions to the master terminal device. Function controller 6216 (running location control 6504) of the master terminal device may then evaluate the current positions and the region data for geographic region 6120 to determine whether the other terminal devices are still within geographic region 6120. If function controller 6216 of the master terminal device decides that a terminal device is not within geographic region 6120, function controller 6216 of the master terminal device may transmit exit signaling to the function controller of the other terminal device that instructs the other terminal device to exit virtual cell 6102. In some cases where location control 6504 is executed at the function controllers 6216 of the other terminal devices of virtual cell 6102, the function controllers 6216 of the other terminal devices may receive the current positions from their respective position sensors 6226. The function controllers 6216 of these terminal devices may then evaluate the current positions and region data of geographic region 6120 to determine whether these terminal devices are still within geographic region 6120. If not, the function controllers 6216 of these terminal devices may transmit exit signaling to the function controller 6216 of the master terminal device that informs the master terminal device that they will exit virtual cell 6102.

With reference to VEF allocation 6508, VEF allocation 6508 may control allocation of virtual cell VEFs to the terminal devices that form virtual cell 6102. For example, function controller 6216 of the master terminal device may be configured to execute VEF allocation 6508 and to consequently allocate virtual cell VEFs to the other terminal devices. As previously described, in some aspects function controller 6216 (e.g., running VEF allocation 6508) of the master terminal device may select terminal devices to allocate virtual cell VEFs to based on the respective resource capabilities of the terminal devices that form virtual cell 6102. Function controller 6216 may then send allocation signaling to the function controllers 6216 of the other terminal devices that allocates the respectively selected virtual cell VEFs to the other terminal devices.

As shown in FIG. 65, virtual cell 6102 may use peer-to-peer (P2P) intra-cell communication 6510 to support communications between the terminal devices that form virtual cell 6102. Intra-cell communication 6510 may refer to the logical signaling connections between the terminal devices forming virtual cell 6102, where their respective interfaces 6214 may form the lowest layer communications for the of the virtual cell application (e.g., handle the logical connections between the terminal devices for virtual cell purposes). The terminal devices may contribute their wireless communication resources (antenna systems 6202, RF transceivers 6204, and baseband modems 6206) to intra-cell communication 6510. These wireless communication resources are shown in FIG. 65 as wireless communication resources 6532, which feeds into intra-cell communication 6510. Wireline communication resources 6530 may include any wired communication connection used within virtual cell 6102, such as those provided by supporting devices that execute support VEFs 6526-6528 (as further described below).

The terminal devices forming virtual cell 6102 may use their respective antenna systems 6202, RF transceivers 6204, and baseband modems 6206 to provide intra-cell communication 6510, where the respective interfaces 6214 may form the lowest layer communications for the of the virtual cell application (e.g., handle the logical connections between the terminal devices for virtual cell purposes). The terminal devices in virtual cell 6102 may use intra-cell communication 6510 to exchange signaling related to the virtual cells, such as discovery signaling and discovery response signaling, exit signaling, allocation signaling, and any other signaling related to the operation of the virtual cell.

Virtual cell 6102 may also use virtual cell VEFs 6514, which are also described above regarding FIGS. 43-60. As previously described, virtual cell VEFs 6514 may be VEFs that realize the cell processing and/or radio activity of cells, which can include downlink transmission, uplink reception, other radio activity such as transmission of synchronization signals and radio measurement, and communication processing for radio access (e.g., AS processing). Virtual cell VEFs 6514 may be realized as software that defines computing, storage, and/or networking (e.g., including wireless transmission and reception) operations. Accordingly, after being assigned virtual cell VEFs from VEF allocation 6508, terminal devices in virtual cell 6102 may execute the respectively allocated virtual cell VEFs at their resource platforms 6218.

As shown in FIG. 65, execution of virtual cell VEFs 6514 may produce applications and services 6524. Applications and services 6524 generally refers to the applications and services that virtual cell 6102 provides to its served terminal devices. For example, as previously described, nearby terminal devices may be able to use virtual cell 6102 for access services. Virtual cell 6102 may therefore provide a radio access network available for nearby terminal devices to use to transmit and receive user data. In various exemplary cases, virtual cell 6102 may provide other applications and services as part of applications and services 6524. For example, virtual cell 6102 may provide processing offload services, where its served terminal devices may offload processing tasks to virtual cell 6102. Virtual cell 6102 may then execute the processing tasks by embodying the processing tasks as virtual cell VEFs, and allocating the processing tasks to terminal devices forming virtual cell 6102. The terminal devices may then execute the respectively allocated virtual cell VEFs to perform the processing task (e.g., using their compute resources 6220), and provide result data back to the served terminal devices. In another example, virtual cell 6102 may provide storage offload services, where its served terminal devices may provide data to virtual cell 6102 for storage and subsequent retrieval. Virtual cell 6102 may then provide the storage by allocating virtual cell VEFs to its terminal devices that specify storage of data (e.g., in storage resources 6222). The served terminal devices may then request the data from virtual cell 6102 at a later time, and virtual cell 6102 may retrieve the data from the terminal devices on which it is stored and provide the data back to the served terminal devices.

In some aspects, virtual cell 6102 may provide specialized applications and services as part of applications and services 6524. For example, virtual cell 6102 may provide offload processing related to autonomous driving uses, where the served terminal devices may be autonomous vehicles that use virtual cell 6102 to process data related to autonomous driving. Virtual cell VEFs 6514 may therefore include autonomous driving VEFs. In another example, virtual cell 6102 may, for example, provide sensing or mapping functions as part of applications and services 6524. The served terminal devices may provide data to virtual cell 6102, which virtual cell 6102 may use to generate sensing or other types of maps and store the resulting data.

In some aspects, virtual cell 6102 may use different types of virtual cell VEFs. For example, in the exemplary case of FIG. 65, virtual cell VEFs 6514 may include remote VEFs 6516-6518 and core VEFs 6520-6522. Core VEFs 6520-6522 may have greater importance than remote VEFs 6516-6518, and may therefore include the basic "core" functions that virtual cell 6102 supports at all or most times. Remote VEFs 6516-6518 may therefore be other "auxiliary" functions that virtual cell 6102 may support at some times but not at others. For example, core VEFs 6520-6522 may include cell functionality such as random access, backhaul links, device scheduling and resource allocations, control of radio resources, device mobility, and any other functions that cells generally support. Virtual cell 6102 may treat these functions as core VEFs, and may therefore generally allocate these VEFs to its terminal devices at most or all times.

Remote VEFs 6516-6518 may include other optional functionalities, such as offload processing, storage offload, support for special radio access technologies, high-bandwidth or low-latency access, or any other functionality that virtual cell 6102 can provide at some times but not at others. VEF allocation 6508 may be configured to determine whether or not to allocate remote VEFs 6516-6518 at a given time. Accordingly, VEF allocation 6508 may be configured to selectively allocate one or more of remote VEFs 6516-6518 at some times (thus providing the corresponding applications and services to the served terminal devices of virtual cell 6102) while not allocating the one or more of remote VEFs 6516-6518 at other times.

In some aspects where virtual cell 6102 uses this distinction between remote and core VEFs, VEF allocation 6508 may be configured to allocate virtual cell VEFs to terminal devices based on context information of the terminal devices. For example, as core VEFs 6520-6522 may be considered more important to the functionality of virtual cell 6102, VEF allocation 6508 may be configured to allocate core VEFs 6520-6522 to terminal device of virtual cell 6102 that are expected to remain in virtual cell 6102 for an extended period of time. Accordingly, in some cases, the terminal devices in virtual cell 6102 may be configured to report an expected duration to VEF allocation 6508 (e.g., via signaling exchange from their respective function controllers 6216), where the expected duration is any indication about the amount of time that the terminal devices will remain in virtual cell 6102. The expected durations can be based on any type of higher-layer context information, such as past user behavior, programmed navigation routes, or user-provided information. For example, VEF allocation 6508 may use past user movement behavior (e.g., data collected that details user movement) to estimate the duration of time that the user will remain in a given location, and will thus be available as a resource for virtual cell 6102. In another example, VEF allocation 6508 may obtain information about a current route that the user is traveling on, such as based on data from a navigation app that has a user-programmed route. VEF allocation 6508 may use this information about the current route to estimate the duration of time that the user will remain close to virtual cell 6102. In another example, a user may be able to input information to a terminal device that specifies their movement. VEF allocation 6508 may then use this information to estimate the duration of time that the user will remain close to virtual cell 6102.

Accordingly, VEF allocation 6508 may be configured to allocate remote VEFs 6516-6518 and core VEFs 6520-6522 to the terminal devices in virtual cell 6102 based on these expected durations, such as by weighting allocation of core VEFs 6520-6522 to terminal devices that have longer expected durations and weighting allocation of remote VEFs 6516-6518 to terminal devices that have shorted expected durations.

In other cases, VEF allocation 6508 may be configured to track the amount of time that the terminal devices have been part of virtual cell 6102. VEF allocation 6508 may then weight allocation of core VEFs 6520-6522 to terminal devices that have been part of virtual cell 6102 for longer periods of time, and weight allocation of remote VEFs 6516-6518 to terminal devices that have been part of virtual cell 6102 for shorter periods of time. For example, VEF allocation 6508 may locally store a timestamp specifying when terminal devices in virtual cell 6102 joined virtual cell 6102 (e.g., at the time of creation of virtual cell 6102, or at a later time when a terminal device joined virtual cell 6102). VEF allocation 6508 may be configured to use these timestamps to determine how long terminal devices have been part of virtual cell 6102. In some aspects, VEF allocation 6508 may rank the terminal devices of virtual cell 6102 according to how long they have been part of virtual cell 6102, and may then allocate core VEFs 6520-6522 to higher-ranked terminal devices and allocate remote VEFs 6516-6518 to lower-ranked terminal devices.

In addition to the resources of terminal devices, in some aspects virtual cell 6102 may also be able to use resources of other nearby devices. This can include base stations, access points, edge servers, and any other support device stationed in the vicinity of virtual cell 6102 and make their compute, storage, and/or network resources available to virtual cell 6102. Accordingly, virtual cell 6102 may be configured to allocate support VEFs 6526-6528 to these supporting devices. The supporting devices may then execute support VEFs 6526-6528 with their own respective compute, storage, and/or network resources. In some cases, the supporting devices may have greater compute, storage, and/or network resources than the individual terminal devices of virtual cell 6102. The supporting devices running support VEFs 6526-6528 may be logically considered part of virtual cell 6102, and may therefore communicate with the terminal devices in virtual cell 6102 using intra-cell communication 6510. The supporting devices may therefore contribute their own wireless resources (e.g., radio components of base stations and access points) as part of wireless communication resources 6532. In some, the supporting devices may have wireline connections (e.g., wired interfaces between network access nodes), which they may contribute as part of wireline communication resources 6530.

Figure 66:
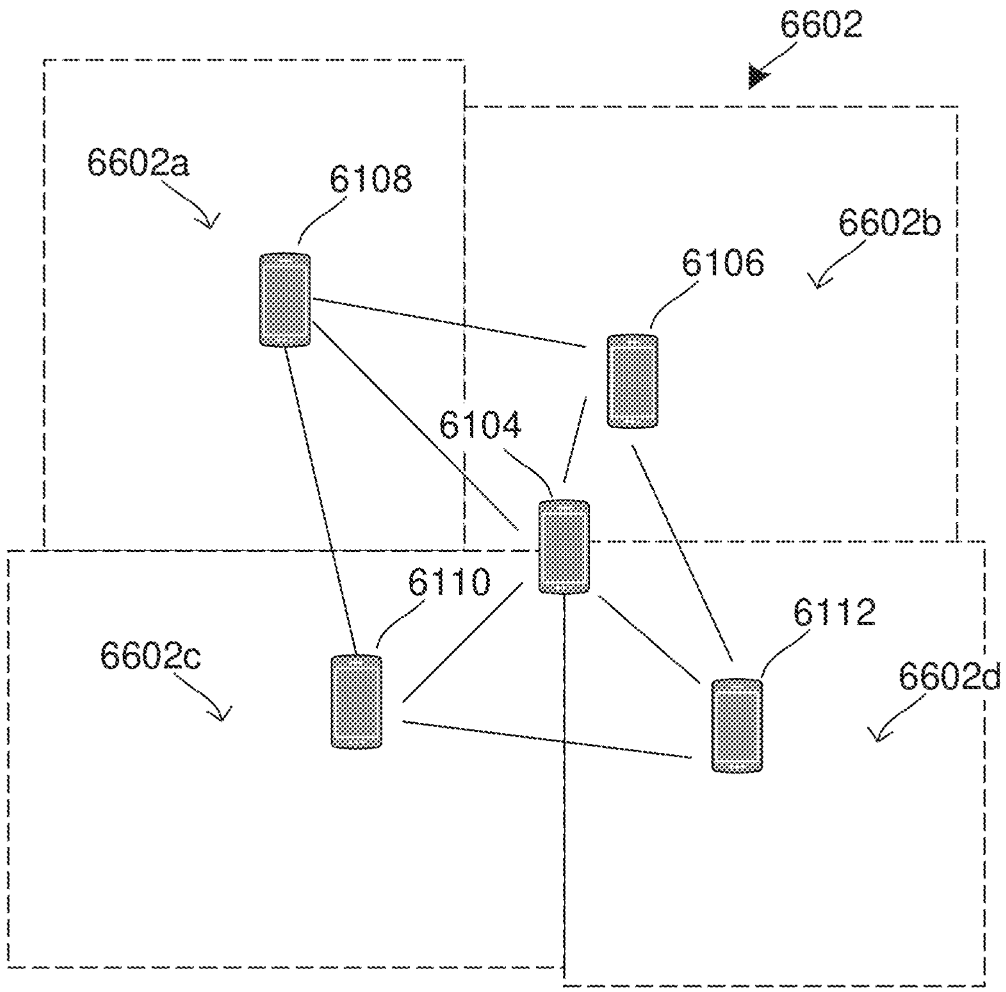
FIG. 66 shows an example where a virtual cell is divided into multiple subareas according to some aspects.

Some aspects described above use geographic regions to define the area in which terminal devices that form virtual cell 6102 are located. In some aspects, virtual cell 6102 may additionally or alternatively use geographic regions to define the coverage area of virtual cell 6102. FIG. 66 shows one example where virtual cell 6102 may divide its coverage area 6602 into subareas 6602*a*-6602*d*. For example, VEF allocation 6508 (e.g., running at function controller 6216 of the master terminal device, e.g., terminal device 6104) may allocate virtual cell VEFs for cell functionality in subarea 6602*a* to terminal device 6108, allocate virtual cell VEFs for cell functionality in subarea 6602*b* to terminal device 6106, allocate virtual cell VEFs for cell functionality in subarea 6602*c* to terminal device 6110, and allocate virtual cell VEFs for cell functionality in subarea 6602*d* to terminal device 6112.

Figure 67:
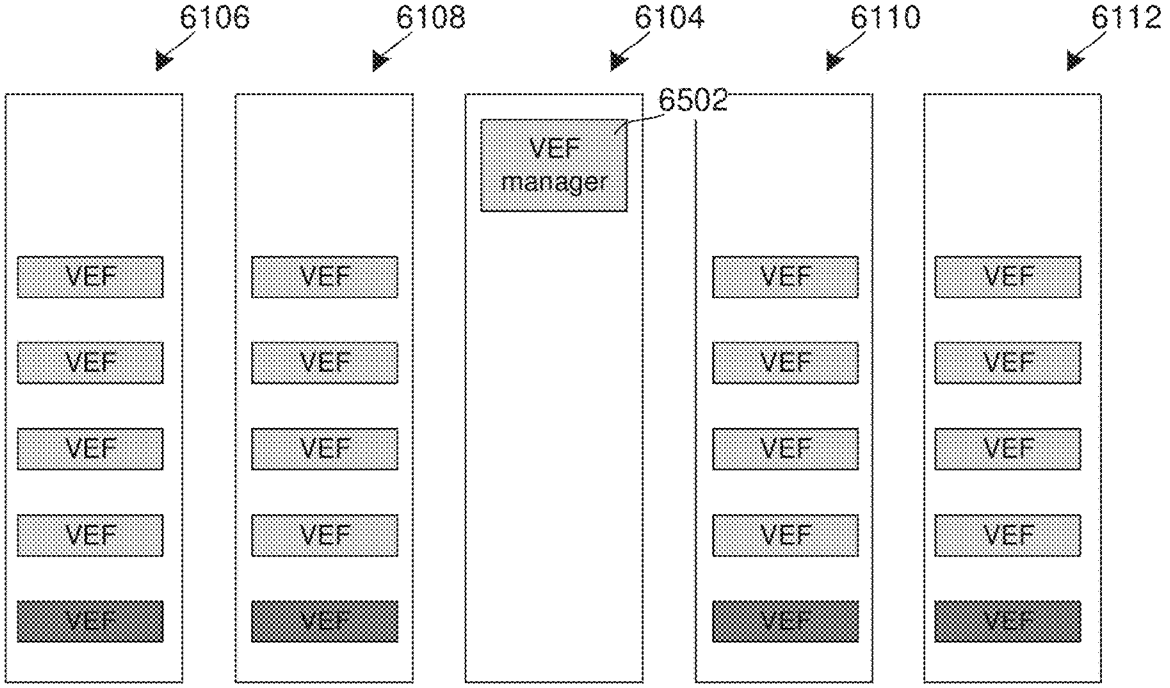
FIGS. 67 and 68 show examples of virtual cell VEF allocation according to some aspects.
Figure 68:
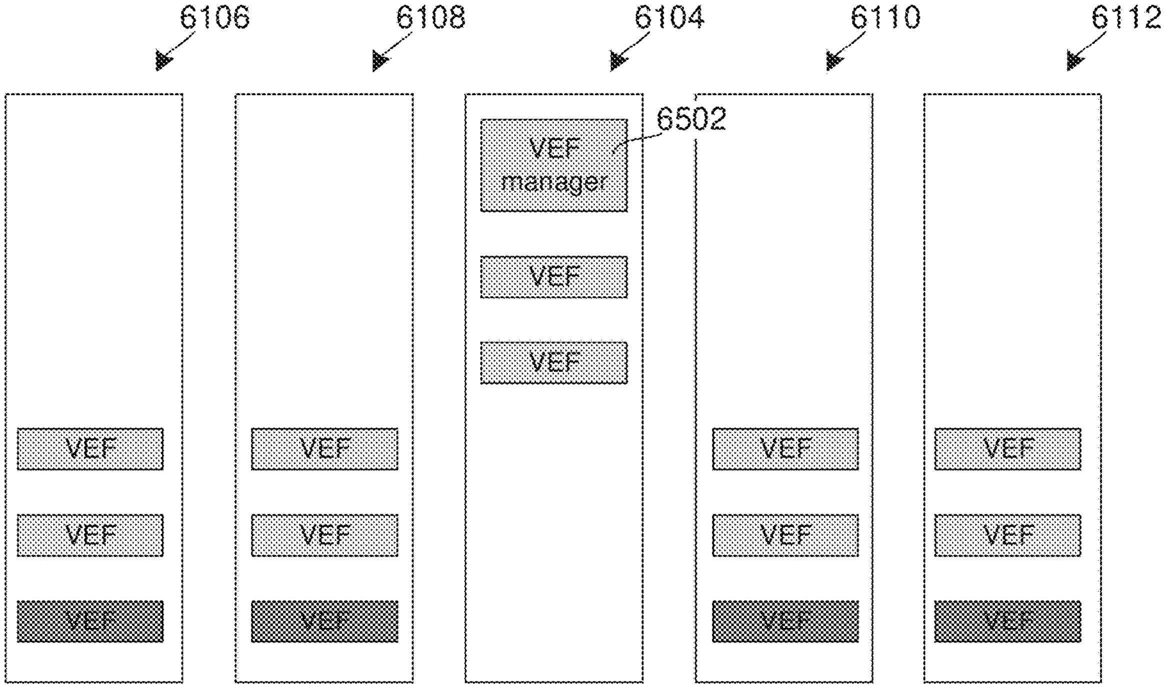

FIGS. 67 and 68 show two examples of virtual cell VEF allocations within the context of the example of FIG. 66. As shown in FIG. 67, master terminal device 6104 may run VEF manager 6502, which may perform the VEF allocation. In particular, VEF manager 6502 may assign the entire cell functionality (e.g., all AS layers, including radio transmission and reception) for subarea 6602*a* to terminal device 6108 (e.g., the terminal device assigned to that subarea), the entire cell functionality for subarea 6602*b* to terminal device 6106, the entire cell functionality for subarea 6602*c* to terminal device 6110, and the entire cell functionality for subarea 6602*d* to terminal device 6112. This can include assigning virtual cell VEFs that make up the entire cell processing and radio activity for a given subarea to a single terminal device in virtual cell 6102. Terminal devices 6106-6112 may then act as cells and provide access service to served terminal devices within their respectively assigned subareas.

In the example of FIG. 68, VEF manager 6502 may allocate virtual cell VEFs for radio activity and some lower-layer cell processing functions (e.g., PHY and MAC) respectively to terminal devices 6106-6112 for their corresponding subareas. Accordingly, terminal devices 6106-6112 may handle radio activity and lower-layer cell processing functions locally for their assigned subareas, while the remaining cell processing functions are handled elsewhere. In the example shown in FIG. 68, VEF manager 6502 may allocate virtual cell VEFs for the remaining cell processing functions to terminal device 6104. This is exemplary, and in various other aspects VEF manager 6502 may allocate virtual cell VEFs for the remaining cell processing functions to other terminal devices in virtual cell 6102.

Figure 69:
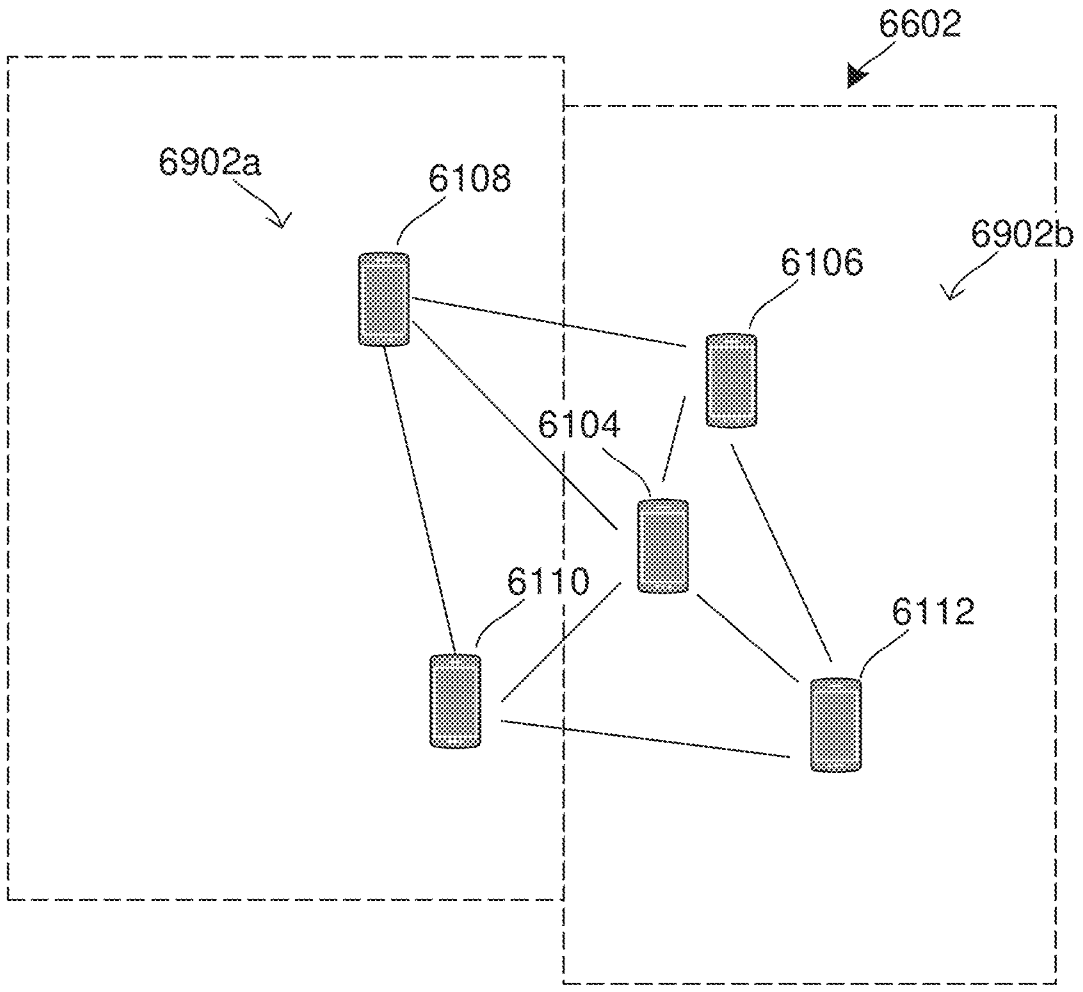
FIG. 69 shows an exemplary division of a virtual cell coverage area according to some aspects.
Figure 70:
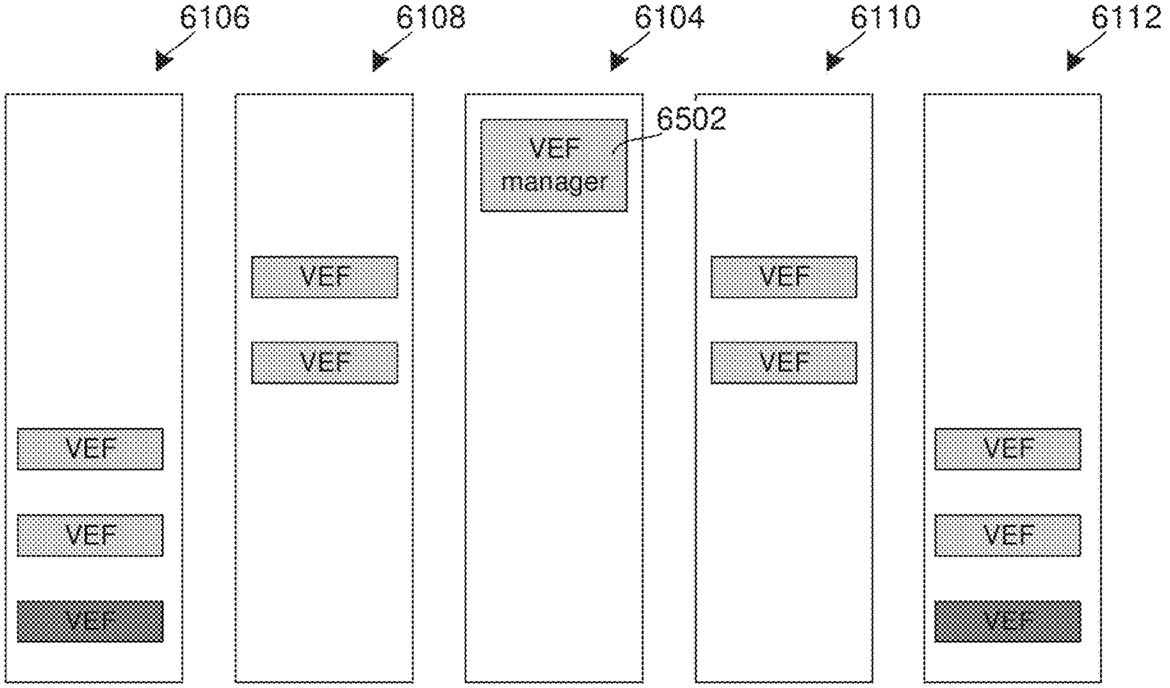
FIGS. 70 and 71 show examples of virtual cell VEF allocation according to some aspects.
Figure 71:
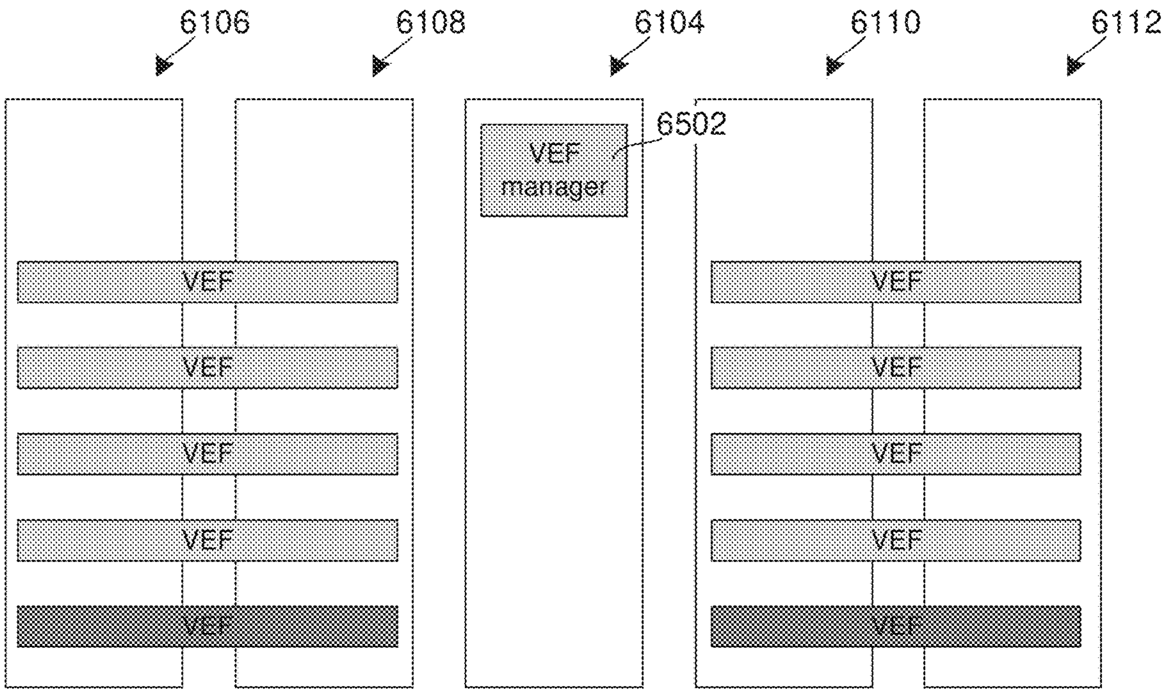

FIGS. 69-71 show additional examples of assignment of subareas and corresponding virtual cell VEFs to terminal devices in virtual cell 6102. As shown in FIG. 69, VEF manager 6502 may logically divide coverage area 6602 of virtual cell 6102 into subareas 6602*a* and 6602*b*. As shown in FIG. 70 VEF manager 6502 may then allocate virtual cell VEFs for radio activity and lower-layer cell processing functions for subarea 6602*a* to terminal device 6106, and may allocate virtual cell VEFs for the remaining cell processing functions for subarea 6602*a* to terminal device 6108. Likewise, VEF manager 6502 may allocate virtual cell VEFs for radio activity and lower-layer cell processing functions for subarea 6602*b* to terminal device 6112, and may allocate virtual cell VEFs for the remaining cell processing functions for subarea 6602*b* to terminal device 6110.

Alternatively, in the example of FIG. 71, VEF manager 6502 may allocate virtual cell VEFs for the entire cell functionality (radio activity and cell processing) for subarea 6802*a* to terminal devices 6106 and 6108 to execute in a distributed manner, and may allocate virtual cell VEFs for the entire cell functionality for subarea 6802*b* to terminal devices 6110 and 6112 to execute in a distributed manner.

In some aspects, VEF allocation 6508 of VEF manager 6502 may use the current positions of terminal devices 6106-6112 (e.g., provided as input in the form of location 6512 in FIG. 65) to select which terminal devices to assign to certain subareas of coverage area 6602 of virtual cell 6102. For example, VEF allocation 6508 may determine the current positions (e.g., most recently determined or reported positions) of the terminal devices currently in virtual cell 6102 (e.g., terminal devices 6106-6112). In some cases, VEF allocation 6508 may first divide coverage area 6602 of virtual cell 6102 into subareas (or, alternatively, the subareas may be predefined, such any uniform division of coverage area 6602 into subareas), and may then allocate virtual cell VEFs to terminal devices 6106-6112 for the cell functionality in the subareas based on the current positions of terminal devices 6106-6112. This can be, for example, based on the proximity of terminal devices 6106-6112 to the subareas.

In some aspects, VEF allocation 6508 may divide coverage area 6602 of virtual cell 6102 into subareas based on the current positions of terminal devices 6106-6112. For example, VEF allocation 6508 may logically divide coverage area 6602 into subareas that are located around the current positions of terminal devices 6106-6112, and then allocate virtual cell VEFs to terminal devices 6106-6112 for cell functionality in these resulting subareas.

Figure 72:
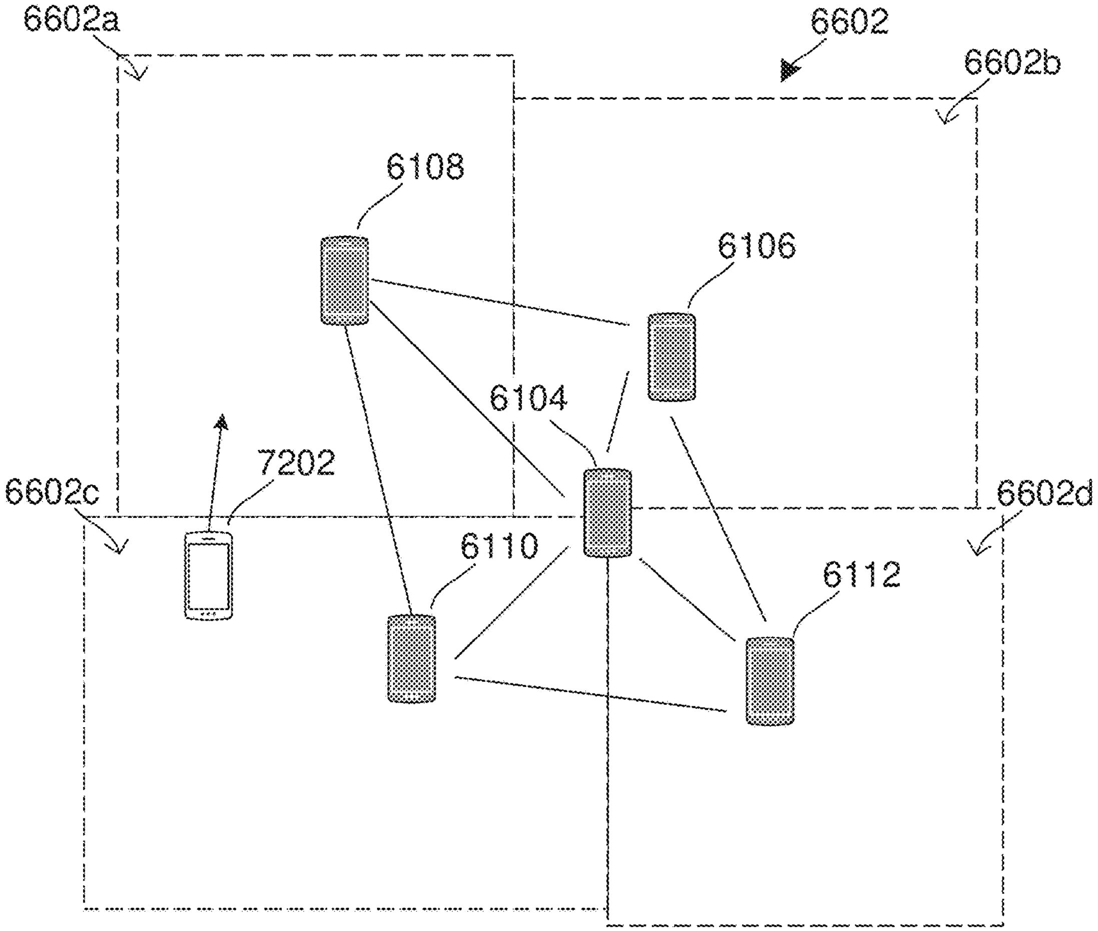
FIG. 72 shows an example of mobility for served terminal devices of virtual cells according to some aspects.

In some aspects, virtual cell 6104 may provide mobility functionality to served terminal devices as they move through different subareas of coverage area 6602. This mobility functionality may therefore enable served terminal devices to handover to particular terminal devices in virtual cell 6102, where the handover can depend on the movement of the served terminal devices and the specific subareas that the terminal devices of virtual cell 6102 are assigned to. FIG. 72 shows an example related to this mobility functionality according to some aspects. As shown in FIG. 72, coverage area 6602 may be divided into coverage areas 6602*a*-6602 (in the manner previously shown for FIG. 66), which may be respectively assigned to terminal devices 6108, 6106, 6110, and 6112. Served terminal device 7202 may be connected to virtual cell 6102, and may initially be located in subarea 6602*c*. Accordingly, terminal device 6110 may provide access services to served terminal device 6110.

Figure 73:
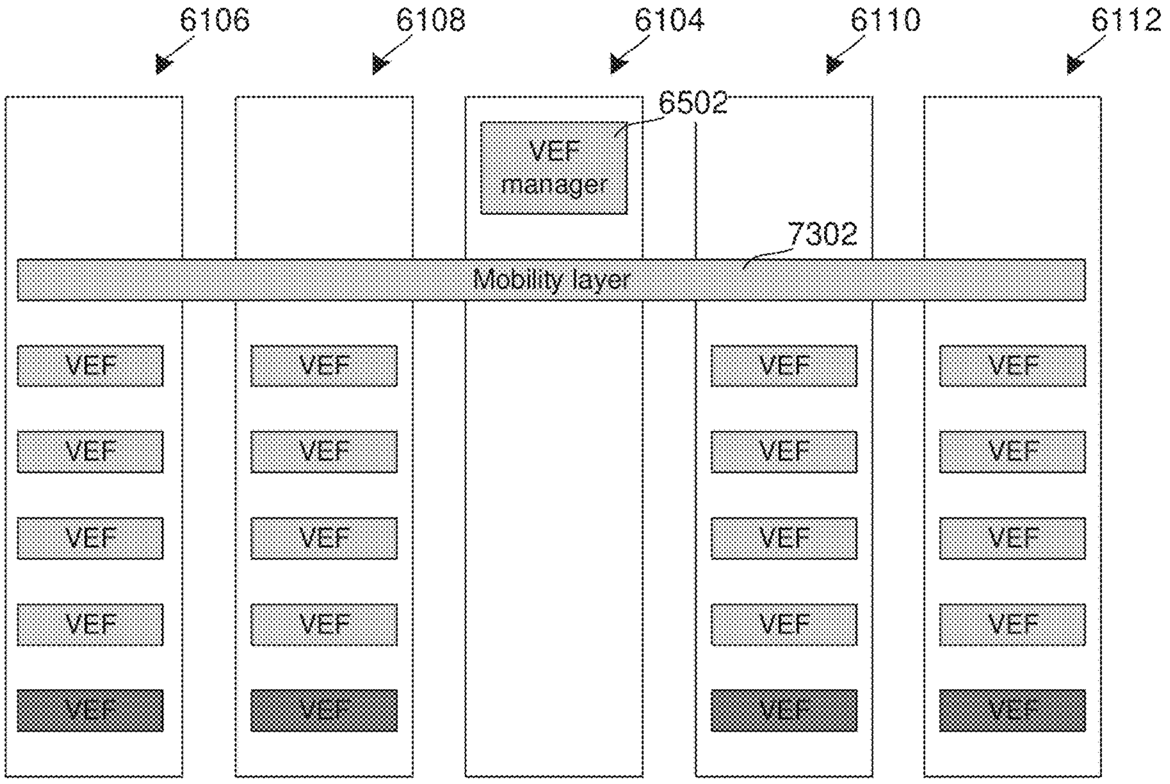
FIG. 73 shows an exemplary virtual cell VEF allocation with a mobility layer according to some aspects.

As shown in FIG. 72, served terminal device 7202 may move from subarea 6602*c* to subarea 6602*a*. As terminal device 6108 is assigned to subarea 6602*a*, terminal device 6108 may need to take over access services for served terminal device 7202 (e.g., processing and transmission of downlink data, reception and processing of uplink data, paging, etc.). Accordingly, virtual cell 6102 may use a mobility layer to handle these scenarios. FIG. 73 shows an example according to some aspects where terminal devices 6104-6112 may execute mobility layer 7302. In some aspects, terminal devices 6104-6112 may execute mobility layer 7302 as software at their respective resource platforms 6218. For example, terminal devices 6104-6112 may each execute a local section of mobility layer 7302 at their respective resource platforms 6218, where the local sections of mobility layer 7302 may communicate with each other over a logical connection. As terminal devices 6104-6112 may execute mobility layer 7302 in a distributed manner, mobility layer 7302 may act as a logical connection between terminal devices 6104-6112, and may therefore enable terminal devices 6104-6112 to negotiate mobility decisions for served terminal devices.

In some aspects, virtual cell 6102 may use a procedure similar to a handover for mobility between subareas of virtual cell 6102. For example, served terminal device 7202 may provide measurement reports and/or position reports to terminal device 6110 during operation. The measurement reports may be based on measurements performed by served terminal device 7202 on terminal device 6110 and/or other terminal devices forming virtual cell 6102 (e.g., terminal devices 6104, 6106, 6108, and 6112)

The local section of mobility layer 7302 running at terminal device 6110 may evaluate the measurement reports and/or position and decide whether served terminal device 7202 should be transferred to another terminal device of virtual cell 6102 (e.g., as served terminal device 7202 has moved to another subarea). For example, if the measurement reports are based on measurements by served terminal device 7202 of terminal device 6110, and the measurement reports indicate weak measurements (e.g., less than a threshold), the local section of mobility layer 7302 running at terminal device 6110 may decide to transfer served terminal device 7202 to another terminal device of virtual cell 6102. In some aspects, the local section of mobility layer 7302 at terminal device 6110 may then request a position report from served terminal device 7202, and use the resulting position report to determine which subarea served terminal device 7202 is in.

In another example, served terminal device 7202 may be configured to periodically send position reports to served terminal device 6110. The local section of mobility layer 7302 at terminal device 6110 may then determine whether the current position of served terminal device 7202 is within subarea 6602*c* and, if not, determine which subarea of coverage area 6602 served terminal device 7202 is located in.

In the example of FIG. 72, the local section of mobility layer 7302 at terminal device 6110 may determine that served terminal device 7202 is located in subarea 6602*a*. Accordingly, the local section of mobility layer 7302 at terminal device 6110 may communicate with the local section of mobility layer 7302 at terminal device 6108 to arrange a transfer of served terminal device 7202 from terminal device 6110 to terminal device 6108. In some aspects, this can be a seamless procedure, where terminal device 6108 may be able to take over the access services for served terminal device 7202 without an interruption and/or without extra signaling between served terminal device 7202 and virtual cell 6102. In other aspects, access service for served terminal device 7202 may be temporarily suspended and/or served terminal device 7202 may exchange extra signaling with terminal devices 6110 and/or 6108 to facilitate the transfer.

Figure 74:
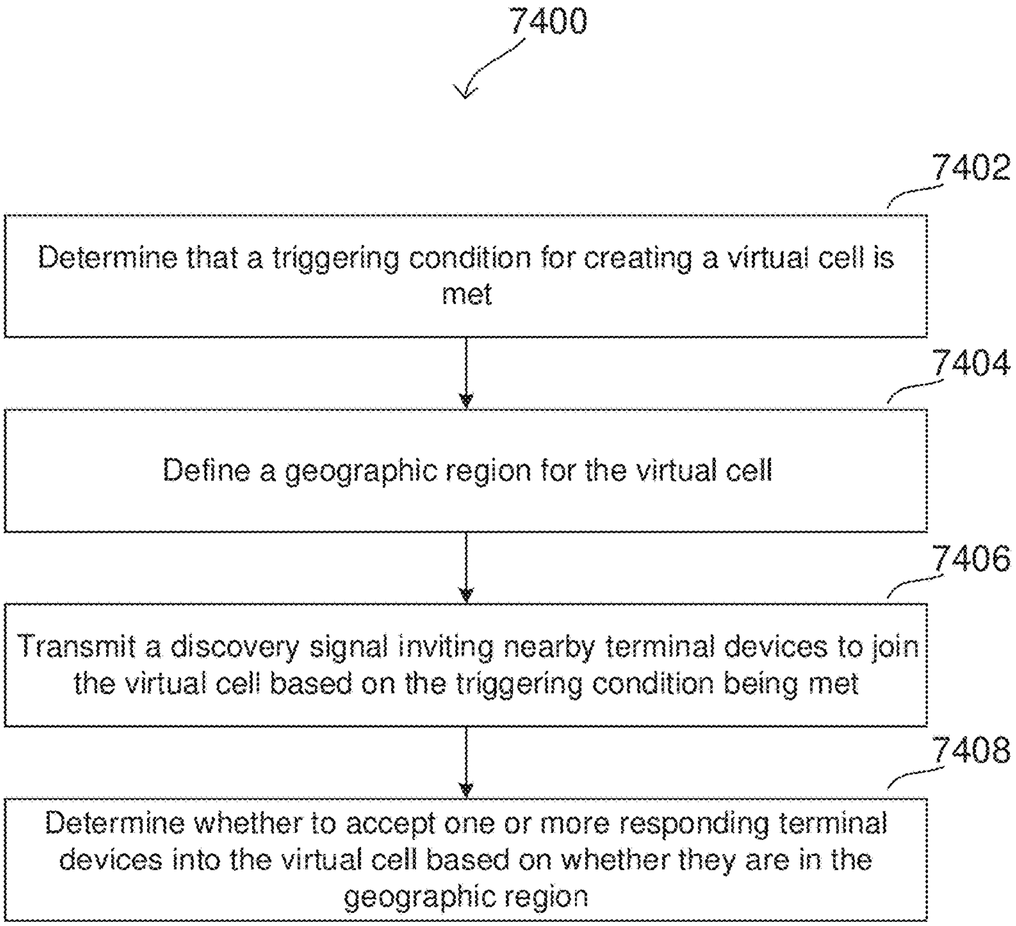
FIGS. 74-79 show exemplary methods of operating communication devices according to some aspects.

FIG. 74 shows exemplary method 7400 of operating a communication device according to some aspects. As shown in FIG. 74, method 7400 includes determining that a triggering condition for creating a virtual cell is met (7402), defining a geographic region for the virtual cell (7404), transmitting a discovery signal inviting nearby terminal devices to join the virtual cell based on the triggering condition being met (7406), and determining whether to accept one or more responding terminal devices into the virtual cell based on whether they are in the geographic region (7408).

Figure 75:
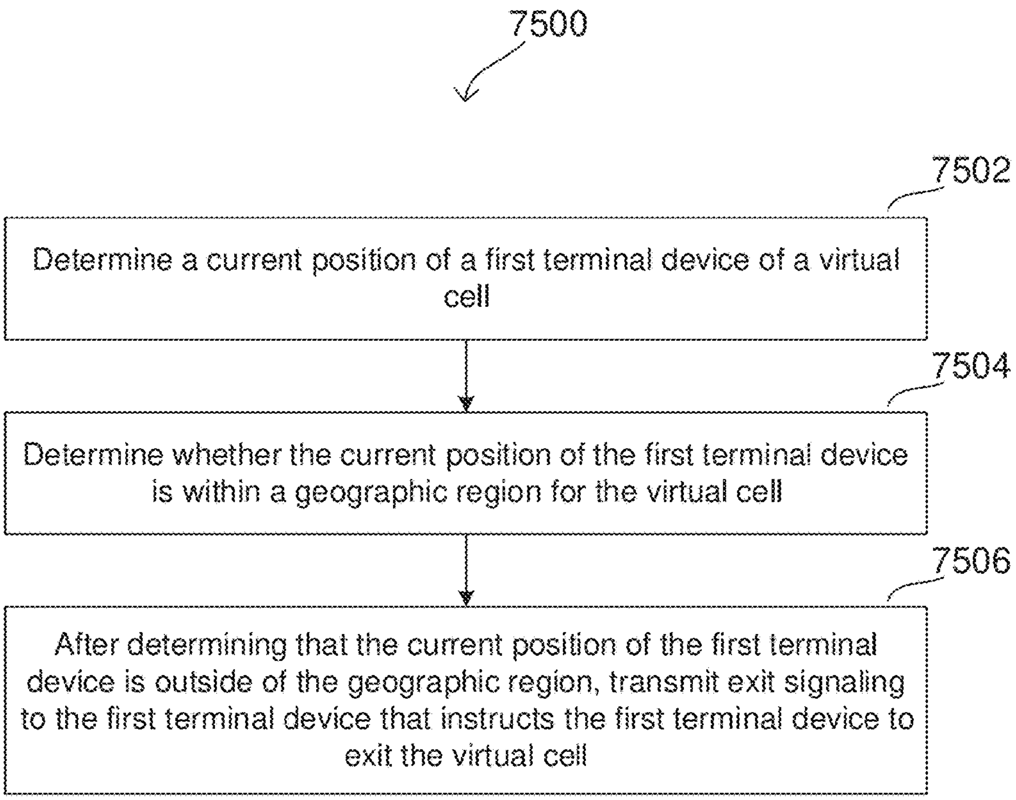

FIG. 75 shows exemplary method 7500 of operating a communication device according to some aspects. As shown in FIG. 75, method 7500 includes determining a current position of a first terminal device of a virtual cell (7502), determining whether the current position of the first terminal device is within a geographic region for the virtual cell (7504), and after determining that the current position of the first terminal device is outside of the geographic region, transmitting exit signaling to the first terminal device that instructs the first terminal device to exit the virtual cell (7506).

Figure 76:
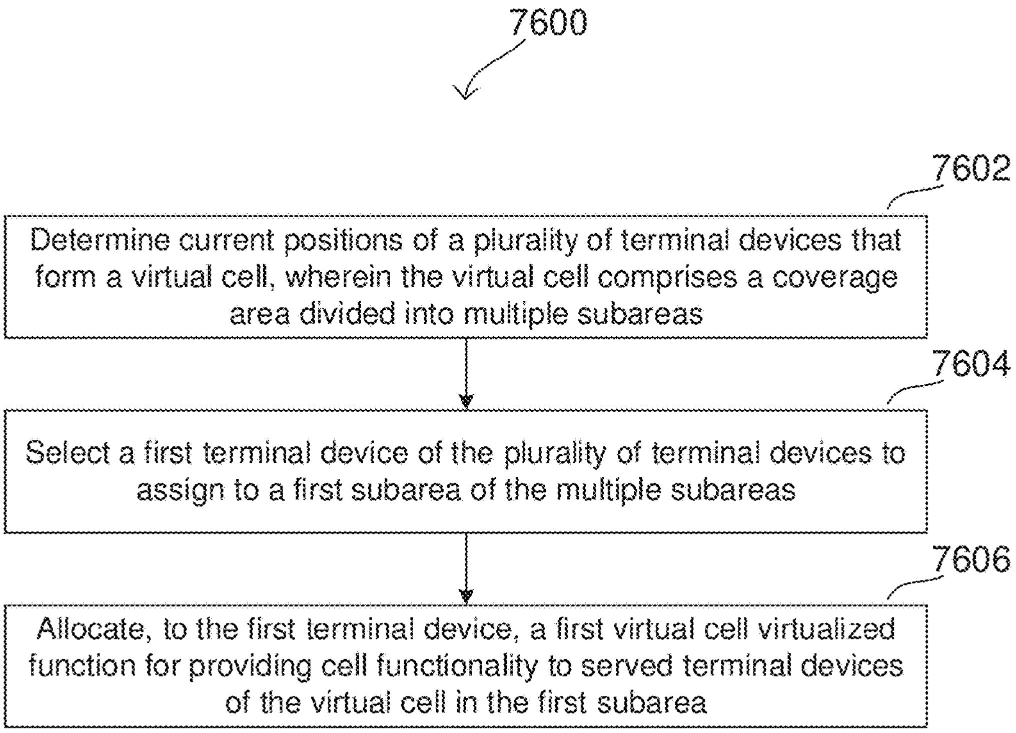

FIG. 76 shows exemplary method 7600 of operating a communication device according to some aspects. As shown in FIG. 76, method 7600 includes determining current positions of a plurality of terminal devices that form a virtual cell (7602), wherein the virtual cell comprises a coverage area divided into multiple subareas, selecting a first terminal device of the plurality of terminal devices to assign to a first subarea of the multiple subareas (7604), and allocating, to the first terminal device, a first virtual cell virtualized function for providing cell functionality to served terminal devices of the virtual cell in the first subarea (7606).

Figure 77:
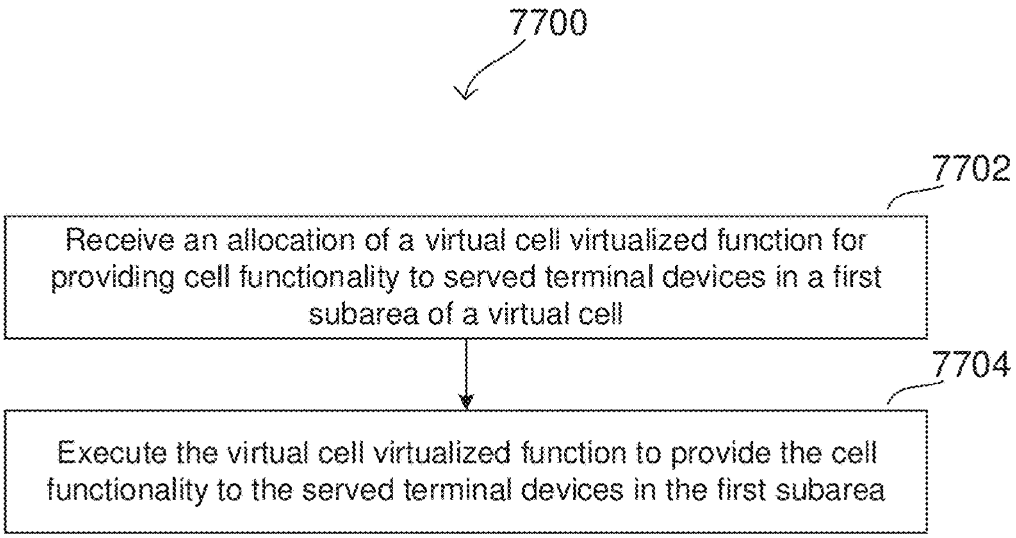

FIG. 77 shows exemplary method 7700 of operating a communication device according to some aspects. As shown in FIG. 77, method 7700 includes receiving an allocation of a virtual cell virtualized function for providing cell functionality to served terminal devices in a first subarea of a virtual cell (7702), and executing the virtual cell virtualized function to provide the cell functionality to the served terminal devices in the first subarea (7704).

Figure 78:
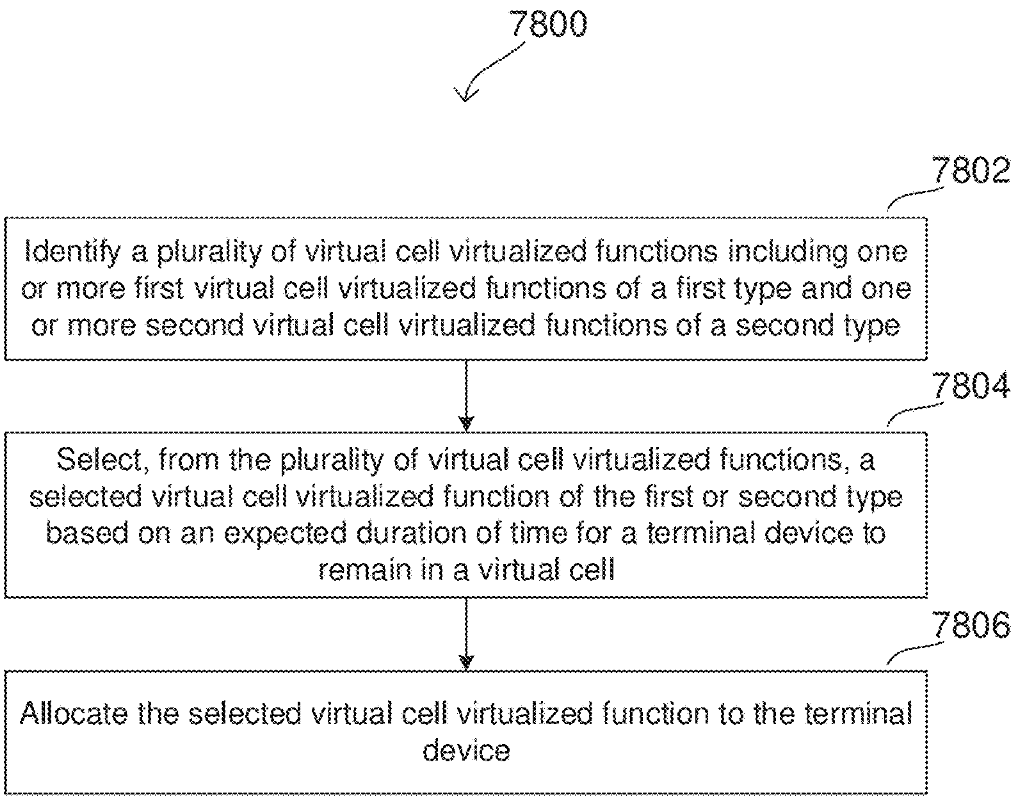

FIG. 78 shows exemplary method 7800 of operating a communication device according to some aspects. As shown in FIG. 78, method 7800 includes identifying a plurality of virtual cell virtualized functions including one or more first virtual cell virtualized functions of a first type and one or more second virtual cell virtualized functions of a second type (7802), selecting, from the plurality of virtual cell virtualized functions, a selected virtual cell virtualized function of the first or second type based on an expected duration of time for a terminal device to remain in a virtual cell (7804), and allocating the selected virtual cell virtualized function to the terminal device (7806).

Figure 79:
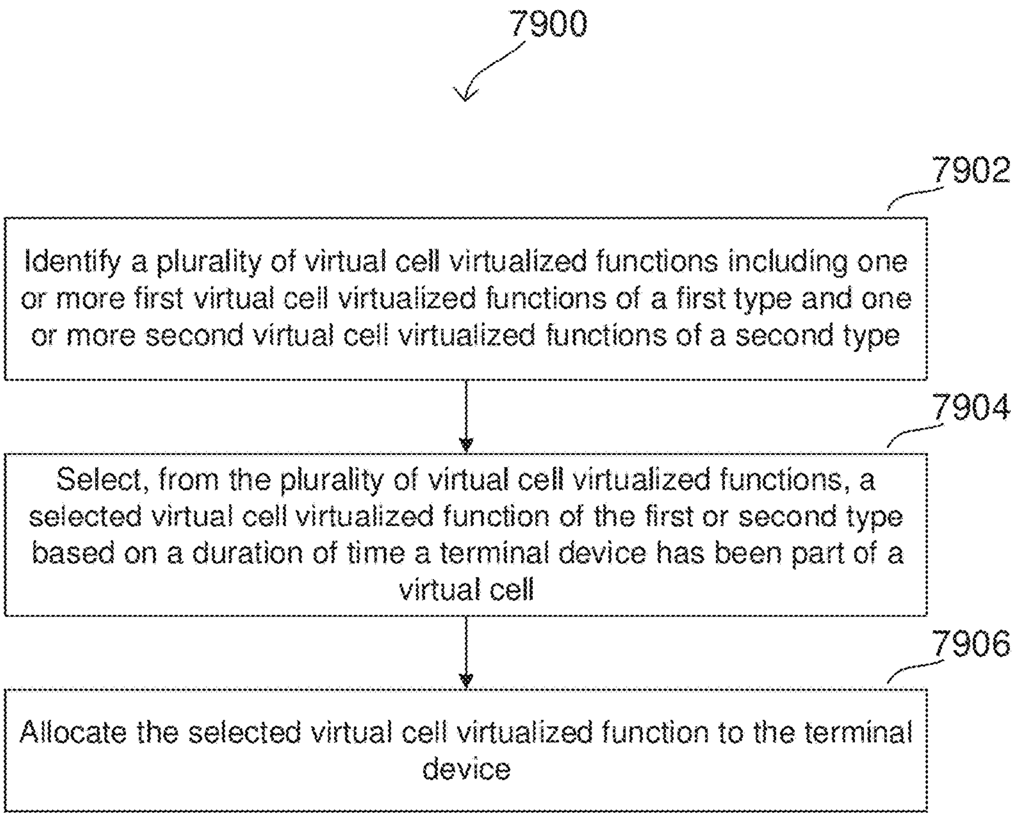

FIG. 79 shows exemplary method 7900 of operating a communication device according to some aspects. As shown in FIG. 79, method 7900 includes identifying a plurality of virtual cell virtualized functions including one or more first virtual cell virtualized functions of a first type and one or more second virtual cell virtualized functions of a second type (7902), selecting, from the plurality of virtual cell virtualized functions, a selected virtual cell virtualized function of the first or second type based on a duration of time a terminal device has been part of a virtual cell (7904), and allocating the selected virtual cell virtualized function to the terminal device (7906).

Dynamic Local Server Processing Offload

Cloud servers can be used for both data storage and intensive processing. When a local network, such as one comprised of Internet of Things (IoT) devices, generates raw data, the local network may send the raw data to a cloud server (e.g., via an Internet backhaul link). The cloud server may then process the raw data and subsequently store the resulting processed data. In some cases, a customer can then remotely query and access the processed data via the cloud server at a later time, while in other cases the cloud server may send the processed data back to the local network for local use.

While such usage of cloud servers may offer greater storage and processing capacity compared to storage and processing at the local network, the data transferred to and stored in the cloud sever may be considerable in size. Data transfer and storage costs can therefore become expensive for customers, in particular when considering the potentially massive expansion of IoT device usage. Furthermore, when the processed data is used back at the local network, there may be a high latency involved in the round-trip transfer of data to and from the cloud server.

Recognizing these issues with cloud server usage, various aspects of this disclosure provide methods and devices for dynamic local server processing offload. As described below regarding various aspects of this dynamic local server processing offload, a traffic filter can be positioned along the user plane in the local network, and can be configured to filter the raw data generated at the local network to identify certain target data. The traffic filter can then route the target data to a local server of the local network, which can then process the target data and send the processed data to the cloud server. In some cases, the processed data can be smaller in size than the raw data (e.g., due the compressive nature of the local processing), which can reduce the amount of data transferred to the cloud server over Internet backhaul. Additionally, in some aspects where the processed data is used locally in the local network, the local server can provide it directly back to the appropriate devices in the local network, which can avoid the round-trip transfer to and from the cloud. The control of the offload filtering and processing can be controlled locally, such as by the local server, or externally, such as by the cloud server. The control of offload filtering and processing and can be based on various dynamic parameters related to, for example, processing load, data transfer costs, latency demands, and temperature of processing platforms. The offload processing can also be dynamically scaled over time based on changes in these dynamics parameters. The offload processing can therefore adapt to varying conditions.

Figure 80:
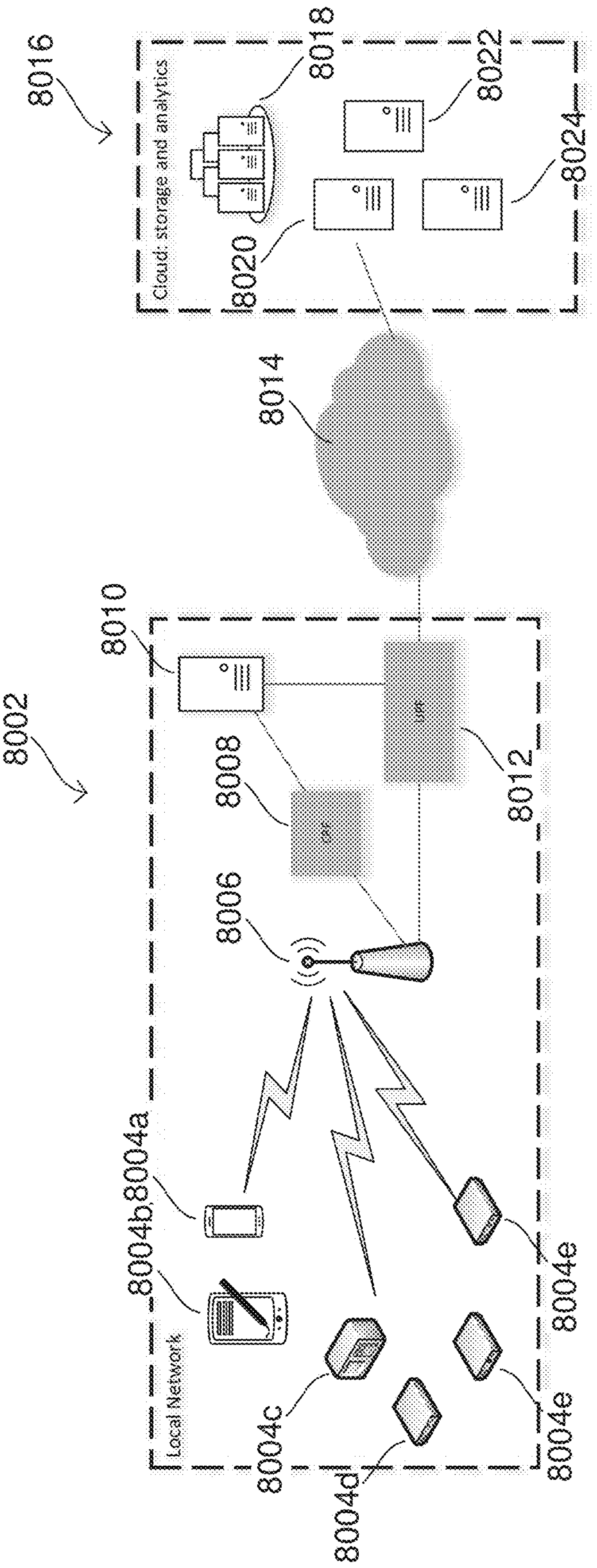
FIG. 80 shows an exemplary diagram of dynamic local server processing offload according to some aspects.

FIG. 80 shows an exemplary network diagram showing this dynamic local server processing offload according to some aspects. As shown in FIG. 80, local network 8002 may interface with cloud network 8002 over backhaul 8014. Local network 8002 may include various terminal devices 8004*a*-8004*f* that may wirelessly connect to and communicate with network access node 8006. Network access node

8006 may therefore provide a radio access network for terminal devices 8004*a*-8004*f* to transmit and receive user and control plane data on. Network access node 8006 and terminal devices 8004*a*-8004*f* may be configured to use any type of radio access technology, and accordingly may be configured to perform physical layer and protocol stack functions according to the appropriate radio access technology. In some aspects, terminal devices 8004*a*-8004*f* may be configured in the manner shown for terminal device 102 in FIG. 2. In some aspects, network access node 8006 may be configured in the manner shown for network access node 110 in FIG. 3.

Local network 8002 may also include control plane function (CPF) server 8008, user-plane function (UPF) server 8012, and local server 8010. As shown in FIG. 80, network access node 8006 may interface with CPF server 8008, UPF server 8012, and local server 8010 within local network 8002. Network access node 8006 may transmit user data to cloud network 8016 via UPF server 8012, which may perform routing functions on user data (e.g., to route user data to the proper data network). UPF server 8012 may transfer this user data to cloud network 8016 over backhaul 8014. Cloud network 8016 may include various cloud servers, including data center 8018 and cloud servers 8020, 8022, and 8024. Data center 8018 and cloud servers 8020-8024 may be configured to perform storage and processing functions, and in some aspects may interface with various networks in addition to local network 8002.

In some aspects, local network 8002 may generate raw data for storage or processing. For example, terminal devices 8004*a*-8004*f* may generate raw data including sensing data (e.g., temperature, humidity, camera/video, audio, image, or any other data generally used for monitoring, sensing, or surveillance purposes) and/or operational data (e.g., position, battery power, current task/route, diagnostic, or communication data). In some aspects, terminal devices 8004*a*-8004*f* may be IoT devices configured to perform sensing in an operating area, such as IoT sensing devices configured to generate temperature, humidity, camera/video, audio, image, radar, light, or any other similar type of data. These IoT devices may also generate operational data that details their current operational status, including data that describes their position, battery power, current task/route, diagnostic status, current communication status (e.g., current serving cell, active bearers, current data requirements and resource usage, current radio conditions), and past communication history (e.g., past serving cells, past data requirements and resource usage, past radio conditions).

This sensing and operational data may be useful for various different purposes. One exemplary use case is a factory or warehouse setting where terminal devices 8004*a*-8004*f* are robotic devices and/or sensing devices. Accordingly, the raw data generated by terminal devices 8004*a*-8004*f* can be processed to determine the current scenario in the factory or warehouse, such as where certain objects are located (e.g., objects stored in a warehouse, or parts used in an assembly line), what the current environment is (e.g., temperature), what the progress of certain tasks is (e.g., progress on loading a freight vehicle with objects for transport, progress on building a device on an assembly line), whether and where any errors are occurring, and other types of information about the current scenario in the factory or warehouse. Other examples are described below.

As the raw data can be considerable in size, and therefor expensive to transfer to cloud network 8016 for processing, local network 8002 may use dynamic local server processing offload. Accordingly, local network 8002 may have a traffic filter along the user plane (e.g., at network access node 8006 or UPF server 8012), which can examine the raw data generated by terminal devices 8004*a*-8104*f* according to a filter template. The traffic filter can then select a subset of the raw data that matches the filter template, and can route this target data to local server 8010. Local server 8010 can then process the target data with a processing function to obtain processed data. Depending on the particular intended use of the processed data (e.g., what the processed data is being used for, which can vary depending on the particular use case), local server 8010 can then send the processed data back to various locations in local network 8002 (e.g., to terminal devices 8004*a*-8004*f*, or to other devices operating in local network 8002, such as assembly machines or factory robots) for local use and/or can send the processed data to cloud network 8016. In some cases, this dynamic local server processing offload can help to reduce latency, namely by avoiding the round-trip to and from cloud network 8016 when the processed data is used locally. Furthermore, as in many cases the processed data is smaller in size than the raw data (due to the effects of processing), the dynamic local server processing offload can help to reduce the amount of data transferred to and/or stored in cloud network 8016. This can in turn reduce cost and the processing load on the various cloud servers in cloud network 8016.

Figure 81:
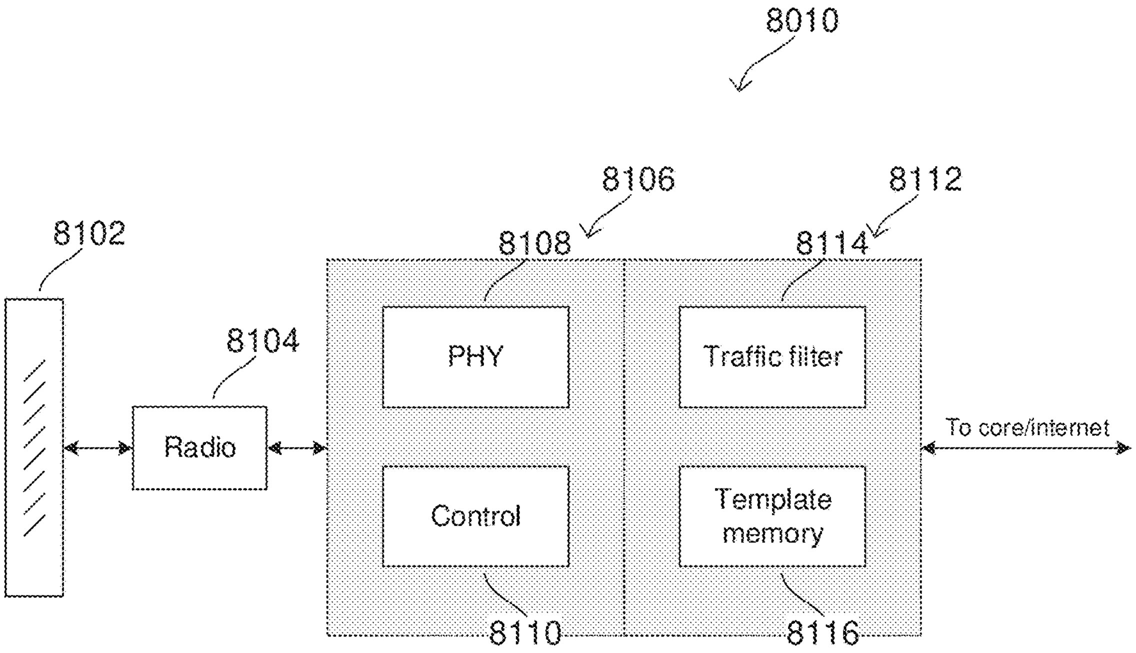
FIG. 81 shows an exemplary internal configuration of a network access node according to some aspects.

FIGS. 81-84 shows exemplary internal configurations of network access node 8006, local server 8010, UPF server 8012, and cloud server 8020 according to some aspects. With initial reference to FIG. 81, FIG. 81 shows an exemplary internal configuration of network access node 8006 according to some aspects. As shown in FIG. 81, network access node 8006 may include antenna system 8102, radio transceiver 8104, baseband subsystem 8106 (including physical layer processor 8108 and controller 8110), and application platform 8112 (including traffic filter 8114 and template memory 8116). Antenna system 8102, radio transceiver 8104, baseband subsystem 8106 may be respectively configured in the manner described above for antenna system 302, radio transceiver 304, baseband subsystem 306 of network access node 110 in FIG. 3. Application platform 8112 may be dedicated to the dynamic local server processing offload, and may handle functions related to the filtering and routing of user plane data. As previously indicated, in some aspects network access node 8010 may apply a traffic filter to user plane data (e.g., generated by terminal devices 8004*a*-8004*f*) to select some of the user plane data that matches a filter template. Accordingly, traffic filter 8114 may be a filter (e.g., a software filter) configured to tap user plane data (e.g., transport or application layer) passing through network access node 8010. Traffic filter 8114 may apply a filter template stored in template memory 8116 to the user plane data to select user plane data that matches the filter template, and may then route this target data accordingly. For example, traffic filter 8114 may be configured to perform packet inspection (e.g., Deep Packet Inspection (DPI)) on a stream of packets containing raw data, and to identify one or more characteristics of each data packet (e.g., based on header information). Traffic filter 8114 may then be configured to determine whether any of the one or more characteristics of each data packet match one or more parameters of the filter template (e.g., based on a 5-tuple or other filtering mechanism, as further described below). If so, traffic filter 8114 may classify the packet as target data, and route the target data to local server 8010. If not, traffic filter 8114 may classify the packet as other data, and may route the other data along its originally configured path (e.g., on an end-to-end bearer to cloud server 8020).

Figure 82:
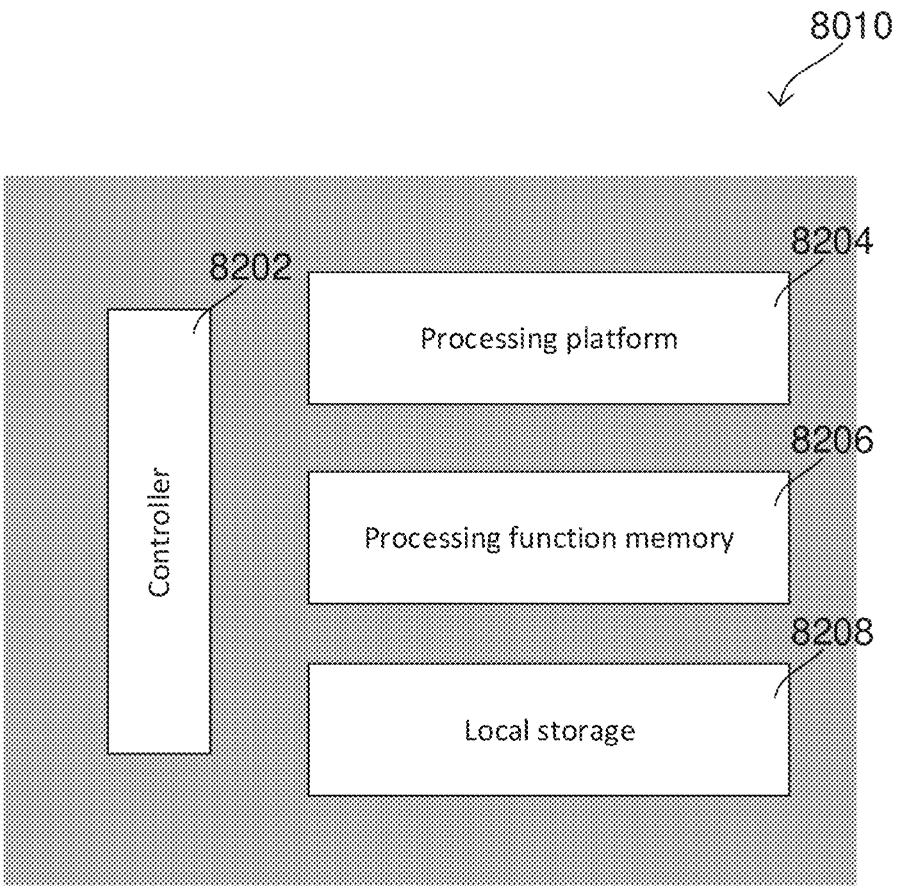
FIG. 82 shows an exemplary internal configuration of a local server according to some aspects.

FIG. 82 shows an exemplary internal configuration of local server 8010 according to some aspects. As shown in FIG. 82, local server 8010 may include controller 8202, processing platform 8204, processing function memory 8206, and local storage 8208. Controller 8202 may be a processor configured to execute program code that defines the control logic of local server 8010, which can include instructing processing platform 8204 to perform certain processing and handling communications with other network nodes. In some aspects, controller 8202 may also be configured to render decisions for the dynamic local server processing offload, such as deciding on a processing offload configuration (as further described below).

Processing platform 8204 may include one or more processors configured to perform processing functions (for example, the local processing functions as part of the dynamic local server processing offload). In some aspects, processing platform 8204 may include one or more hardware accelerators configured with digital hardware logic to perform dedicated processing tasks (where processing platform 8204 may hand off these dedicated processing tasks for execution by the hardware accelerators). Processing function memory 8206 may be a memory configured to store the software for one or more processing functions, which processing platform 8204 may retrieve and execute with its processing resources. Local storage 8208 may be a memory configured to store various data, which local server 8010 may retain for later access by other devices of local network 8002.

Figure 83:
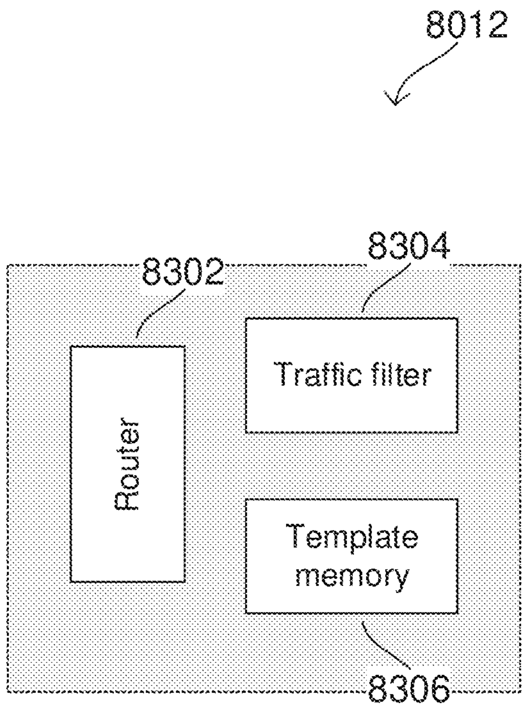
FIG. 83 shows an exemplary internal configuration of a user plane server according to some aspects.

FIG. 83 shows an exemplary internal configuration of UPF server 8012 according to some aspects. As shown in FIG. 83, UPF server 8012 may include router 8302, traffic filter 8304, and template memory 8306. As previously indicated, UPF server 8012 may be positioned on the user plane between network access node 8010 and backhaul 8014, and may be responsible for routing user plane data along the appropriate routing paths (e.g., according to the configured bearers for the user plane data). Router 8302 may be configured to handle this routing functionality. Traffic filter 8304 may be configured to tap user plane data passing through UPF server 8012 and to apply a filter template stored in template memory 8306 to the user plane data. Traffic filter 8304 may select the user plane data that matches the filter template (for example, using the parameter-based process described above for traffic filter 8114) as target data, and may then route the target data to local server 8010 while routing other data along its originally configured path (for example, to cloud server 8020).

Figure 84:
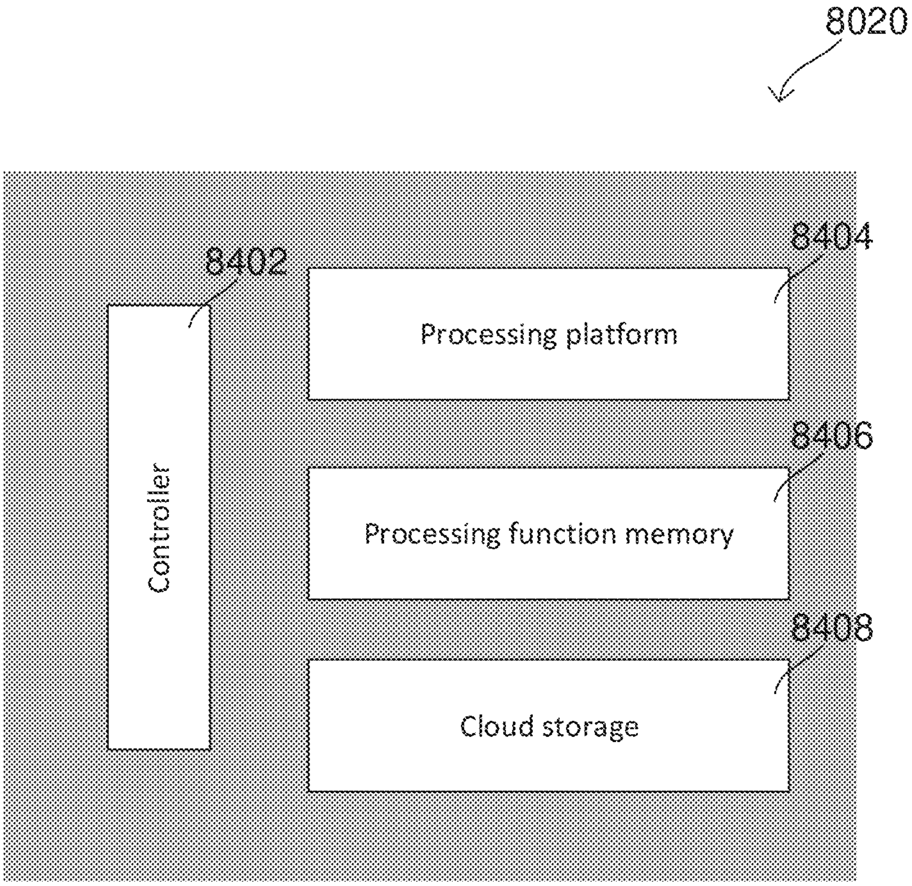
FIG. 84 shows an exemplary internal configuration of a cloud server according to some aspects.

FIG. 84 shows an exemplary internal configuration of cloud server 8020 according to some aspects. As shown in FIG. 84, cloud server 8020 may include controller 8402, processing platform 8404, processing function memory 8406, and cloud storage 8408. Controller 8402 may be a processor configured to execute program code that defines the control logic of cloud server 8020, including deciding which processing to perform at processing platform 8404 and handling communications with other network nodes. In some aspects, controller 8402 may be configured to render decisions for the dynamic server processing offload, such as deciding on a processing offload configuration (as further described below). Processing platform 8404 may include one or more processors configured to perform processing functions (for example, cloud processing functions). In some aspects, processing platform 8404 may include one or more hardware accelerators configured with digital hardware logic to perform dedicated processing tasks (where processing platform 8404 may hand off these dedicated processing tasks for execution by the hardware accelerators). Processing function memory 8406 may be a memory configured to store the software for one or more processing functions, which processing platform 8404 may retrieve and execute with its processing resources. Cloud storage 8408 may be a memory configured to store various data, which cloud server 8020 may retain for later access by other devices of local network 8002.

The operation and interaction of these components for dynamic local server processing offload will now be described. FIG. 85 shows exemplary message sequence chart 8500 illustrating the processing and flow of information for dynamic local server processing offload according to some aspects. As shown in FIG. 85, the dynamic local server processing offload may involve cloud server 8020 (or, alternatively, any other cloud server in cloud network 8016), local server 8010, a traffic filter 8114/8304 executed at network access node 8006 or UPF server 8012, and terminal devices 8004*a*-8004*f*.

At stage 8502, cloud server 8020 (e.g., controller 8402) may determine the processing offload configuration, which may define the amount and type of local server processing that local server 8010 will perform as part of the dynamic local server offload processing. The processing offload configuration can include, for example, an amount of processing for local server 8010 to perform, the type of target data for local server 8010 to perform the processing on, and/or a processing function (e.g., the type of analytics) for local server 8010 to perform on the target data.

Accordingly, in some aspects controller 8402 of cloud server 8020 may determine an amount of processing for local server 8010 to perform in stage 8502. There may generally be a tradeoff between the amount of local processing done at local server 8010 and the amount of data transferred and/or stored in cloud server 8020, where more processing of the raw data by local server 8010 may result in a smaller amount of data transferred to cloud server 8020 (as the processed data may be smaller in size than the raw data). Cloud server 8020 may therefore consider this tradeoff when determining the amount of processing for local server 8010 to perform. In some aspects, controller 8402 may execute a decision algorithm to determine the amount of processing for local server 8010. For example, controller 8402 may identify the current processing load (e.g., CPU usage) of local server 8010, a current temperature of local server 8010, and/or a throughput of data that needs to be processed. Controller 8202 of local server 8010 can periodically report this information to controller 8402 of cloud server 8020. In some aspects, controller 8402 may provide these parameters as input parameters to the decision algorithm, which may use a predefined computation that calculates an amount of processing for local server 8010 to perform based on the inputs. In some aspects, the decision algorithm may determine whether any of the parameters are above certain thresholds. For example, controller 8402 may determine whether the current processing load of local server 8010 (e.g., of processing platform 8204) is above a load threshold, determine whether the current temperature of local server 8010 (e.g., of processing platform 8204) is above a temperature threshold, and/or determine whether the throughput of data is above a throughput threshold. Controller 8402 may then determine the amount of processing based on whether any (or which of) the input parameters are above their respective thresholds. In some aspects, controller 8402 may also consider its own processing load and temperature (e.g., of processing platform 8404) when determining the amount of processing, such as by using its own processing load and temperature as input parameters to the decision algorithm.

In some aspects, controller 8402 of cloud server 8020 may also select a processing function for local server 8010 to perform in stage 8502. For example, depending on the use case, there may be numerous different processing functions that local server 8010 can perform on the raw data. With reference to the exemplary factory and warehouse use cases introduced above, the processing function can include various types of processing on sensing and/or operational data to determine a current scenario of the factory or warehouse, such as evaluating the sensing and/or operational data to determine where certain objects are located, what the current environment is (e.g., temperature), what the progress of certain tasks is, whether and where any errors are occurring, and other types of information about the current scenario in the factory or warehouse. In some aspects, the processing function selected by controller 8402 may be dependent on the amount of processing selected for local server 8002 by controller 8402. For example, if the amount of processing selected by controller 8402 is low, the processing function may consequently involve a low amount of processing (and vice versa for high amounts of processing). Further examples of use cases and processing functions are discussed below regarding stage 8518.

In some aspects, controller 8402 of cloud server 8020 may also select the type of target data that local server 8010 will perform the processing function on. The target data can be a specific subset of the raw data, and can therefore depend on the processing function. For example, if the processing function involves processing image, video, and/or positional raw data provided by terminal devices **8004*a*-8004*f* to determine where certain objects are located, cloud server 8020 may select image, video, and/or positional raw data as the target data. In another example, if the processing function involves processing temperature, humidity and/or pressure raw data provided by terminal devices 8004*a*-8004*f* to monitor the environment of the operating area, cloud server 8020 may select temperature, humidity and/or pressure raw data as the target data. In another example, if the processing function involves processing diagnostic raw data provided by terminal devices 8004*a*-8004*f* (e.g., where terminal devices 8004*a*-8004*f* are connectivity-enabled assembly line or factory machines) to monitor for errors or malfunction, cloud server 8020 may select diagnostic raw data as the target data. In another example, if the processing function involves processing raw data from specific terminal devices, such as only from terminal device 8004*a*, cloud server 8020 may select raw data originating from terminal device 8004*a*** as the target data. The type of target data involved in the processing function may also impact the amount of processing. For example, various types of target data may have different processing costs, where image, video, and gaming data can have high processing cost, audio can have medium processing cost, and data for statistical analysis can have low processing cost.

In some aspects, cloud server 8020 may select which type of target data to offload to local server 8010 for processing based on underlying requirements of the data. For example, in a vehicular use case, latency-sensitive data (e.g., data related to security and safety use cases, such as processing of warning message of vehicles, control of traffic light, assistance for vehicle overtaking or road cross over) can be assigned as target data to local server 8010 for local processing. As it is processed locally within the local network 8002, a round trip to cloud server 8020 for processing can be avoided. Other latency-tolerant data, such as data related to parking management or image processing for vehicle count, has lower latency requirements and can be offloaded to cloud server 8020. Controller 8402 of cloud server 8020 may use a similar division of latency-sensitive vs. latency-critical data to decide which raw data to assign as target data for processing at local server 8010 and which to process at cloud server 8020 for various other applicable use cases.

Another example in which latency-sensitive raw data can be processed locally is a production chain use case, such as a production chain for automobiles, motors, engines, processors, and other manufactured goods that are made with a complex or sensitive procedure. In this use case, terminal devices **8004*a*-8004*f* may be sensors that continuously monitor the temperature, humidity, position of pieces, humidity, vibration level, air component readings, position and angle for arms and digits of factory robots performing the assembly, and various other parameters relevant to the production. These monitored parameters may be sensitive, and the raw data may need to be quickly processed and reacted to, such as to stop the assembly in case of error and/or to send warning message to a maintenance team if an abnormal event is observed. Accordingly, controller 8402 of cloud server 8020 may select this data as target data for offload to local server 8010 for processing. Other raw data such as piece counts, warehouse stock maintenance, and security video may have more tolerant latency demands (e.g., may not need a very short reaction time). Controller 8402 may therefore decide to exclude this data from the target data that will be offloaded to local server 8010**.

In some aspects, controller 8402 of cloud server 8020 may also determine a filter template based on the target data in stage 8502. The filter template may be a set of parameters that can be used to identify the target data when applied to a stream of raw data. Accordingly, when a traffic filter (e.g., traffic filter 8114 of network access node 8010 or traffic filter 8304 of UPF server 8012) applies the filter template to a stream of raw data, the traffic filter may be able to select and extract the raw data that matches the target data (e.g., that matches the filter template) from the stream of raw data. For example, the parameters of the filter template can identify a specific data type, such as image, video, positional, temperature, humidity, pressure, and/or diagnostic data as introduced in the above examples. In another example, the parameters of the filter template can identify a specific origin and/or destination of the raw data (for example, based on network addresses in packet headers, such as based on a 5-tuple). The filter template can therefore be used by a traffic filter to isolate the target data from the other raw data. This is described in detail below for stage 8512.

After determining the processing offload configuration in stage 8502, cloud server 8020 may be configured to send signaling to local network 8002 that specifies the processing offload configuration in stages 8504 and 8506. In some aspects, controller 8402 of cloud server 8020 may be configured to handle communication tasks between network nodes, and accordingly may be configured to transmit the processing function to local network 8002 (e.g., over a logical connection that uses backhaul 8014 for transport). For example, as shown in FIG. 85, cloud server 8020 may provide the processing function to local server 8010 in stage 8504 (e.g., may send signaling that specifies the processing function). Local server 8020 may then configure itself to perform the processing function. For example, in some aspects local server 8010 may be preconfigured to perform a plurality of preinstalled processing functions. Accordingly, the plurality of preinstalled processing functions may be loaded into processing function memory 8206 prior to execution of message sequence chart 8500 (e.g., as part of an offline configuration process, or a periodic update procedure that loads new and/or update preinstalled processing functions into processing function memory 8206). Accordingly, in some cases cloud server 8020 may select the processing function from the plurality of preinstalled processing functions in stage 8502, and may send signaling that includes an identifier that identifies the processing function to local server 8010 in stage 8504. Controller 8202 of local server 8010, which may be configured to handle communications with other network nodes, may receive the identifier of the processing function and may identify the processing function from the plurality of preinstalled processing functions. Controller 8202 may then instruct processing platform 8204 to retrieve and load the processing function from processing function memory 8206, thus configuring local server 8010 to perform the processing function.

In some aspects, cloud server 8020 may send the software for the processing function to local server 8010. For example, in some cases local server 8010 may not be configured with preinstalled processing functions, or cloud server 8020 (e.g., controller 8402) may select a processing function that is not one of the preinstalled processing functions of local server 8010. Accordingly, in some cases local server 8010 may not initially have the software for the processing function. After selecting the processing function in stage 8502, controller 8402 of cloud server 8020 may therefore retrieve the software for the processing function and send signaling that includes the software for the processing function to local server 8010. For example, cloud server 8020 may store its own plurality of processing functions in processing function memory 8406 that cloud server 8020 can retrieve and provide to local server 8010. Controller 8202 of local server 8010 may then receive the software for the processing function, and may provide it directly to processing platform 8204 and/or may provide it to processing function memory 8206 for storage. In some aspects where the procedure of message sequence chart 8500 is repeated multiple times, processing function memory 8206 of local server 8010 may store the software for the various processing functions provided by cloud server 8020, and accordingly may be able to locally retrieve the software for the stored processing functions (which may thus be considered preinstalled processing functions once stored in processing function memory 8206) without downloading it from cloud server 8020.

In some aspects, cloud server 8020 may send an identifier for the processing function to local server 8010 in stage 8504. Controller 8202 of local server 8010 may then download the software for the processing function from another location, such as an external data network. Accordingly, in these various aspects cloud server 8020 may indicate the processing function to local server 8010 in stage 8504 and local server 8010 may configure itself to perform the processing function.

As previously indicated, local network 8010 may include a traffic filter, located at network access node 8006 and/or UPF server 8012, that is configured to apply a filter template for selecting target data from the raw data to route to local server 8010. In aspects where the traffic filter is located at network access node 8006, the traffic filter may be traffic filter 8114 as shown in FIG. 81. In aspects where the traffic filter is located at UPF server 8012, the traffic filter may be traffic filter 8304 as shown in FIG. 83. Although the traffic filter can be located at different network locations in different aspects, the operation of the traffic filter can generally be the same. As shown in FIG. 85, cloud server 8020 (e.g., controller 8402) may provide the filter template to traffic filter 8114/8304 in stage 8506. Traffic filter 8114/8304 may then store the filter template in its template memory (e.g., template memory 8116 for traffic filter 8114 or template memory 8306 for traffic filter 8304), where it is available for traffic filter 8114/8304 to use for subsequent filtering. In some aspects, template memory 8116 or 8306 may store a plurality of preinstalled filter templates, and cloud server 8020 may send signaling to traffic filter 8114/8304 that identifies the filter template from the plurality of preinstalled filter templates.

The filter template may be a set of parameters that identifies a specific target data from the raw data (e.g., a specific subset of the raw data), and can be used to isolate the target data from the other raw data. As shown in FIG. 85, terminal devices **8004*a*-8004*f* may be generating raw data in stage 8508, where the raw data can be various different types of sensing and/or operational data. In some cases, stage 8508 may be a continuous procedure, where terminal devices 8004*a*-8004*f* continuously generate raw data. Terminal devices 8004*a*-8004*f* may then send the raw data through the local network on the user plane in stage 8510, such as by transmitting the raw data to network access node 8006 over the radio access network of local network 8002** using the appropriate communication protocols.

As traffic filter 8114/8304 is placed on the user plane in local network 8102, traffic filter 8114/8304 may have access to the raw data transmitted by terminal devices **8004*a*-8004*f*. In some aspects, terminal devices 8004*a*-8004*f* may be configured to transmit the raw data on an end-to-end bearer (e.g., application and/or transport layer) between terminal devices 8004*a*-8004*f* and cloud server 8020. In these aspects, the positioning of traffic filter 8114/8304 on the user plane may enable traffic filter 8114/8304 to intercept the raw data on the end-to-end bearer. Accordingly, traffic filter 8114/8304 may intercept the raw data on the end-to-end bearer, and may then apply the filter template to the raw data to identify raw data that matches the filter template in stage 8512. For example, where the filter template defines one or more parameters that identify the target data, traffic filter 8114/8304 may evaluate the raw data to determine whether properties of the raw data match the one or more parameters. In some aspects, traffic filter 8114/8304 may utilize packet inspection (e.g., DPI) to evaluate packets of the raw data to determine whether the packets match the one or more parameters. In various aspects, the one or more parameters may identify a specific type of raw data (e.g., any one or more of the specific categories of sensing or operational data), a terminal device or a type of terminal device from which the raw data originates, a location of the terminal device from which the raw data originates, etc. In some aspects, this information may be included in packet headers, and traffic filter 8114/8304 may utilize packet inspection to evaluate the information in the packet headers. If the information in the packet headers matches the parameters of the filter template, traffic filter 8114/8304** may classify packets as target data.

In some aspects, the filter template can be based on 5-tuples (or some other or similar set of parameters of the same or another size): source IP address, destination IP address, source port, destination port, and protocol type. Accordingly, controller 8402 may define one or more of these 5-tuples that identify specific data flows originating from one or more of terminal devices **8004*a*-8004*f*, and may indicate these identified 5-tuples in the filter template. Traffic filter 8114/8304 may then be configured to reference the 5-tuples in the filter template (e.g., stored in the template memory) when performing packet inspection on packets. Traffic filter 8114/8304** may be configured to identify packets that match one of the 5-tuples and to classify these packets as target data.

Additionally or alternatively to 5-tuples, the filter template and corresponding filtering by traffic filter 8114/8304 can be based on bearer ID (e.g., where the data is sent and/or on which flow), quality flow indicator (e.g., in a Service Data Adaptation Protocol (SDAP) header), protocol header at session layer, a device ID for the device from which the packets originate, a location of the device from which the packets originate, a service ID from the session or application layer, and/or packet size.

Traffic filter 8114/8304 may therefore select raw data that matches the filter template as the target data, and may then route the target data to local server 8010 for local processing. Traffic filter 8114/8304 may also route other data of the raw data to cloud server 8020. In some cases, the target data and the other data may be mutually exclusive (e.g., where the other data is all of the raw data except for the target data). In other cases, the target data and the other data may overlap, such as where some of the raw data is used for both local processing at local server 8010 and for cloud processing at cloud server 8020.

As shown in FIG. 85, local server 8010 may then receive the target data from traffic filter 8114/8304 (e.g., at controller 8202). Local server 8010 may then apply the processing function to the target data in stage 8518. As previously indicated, local server 8010 may have loaded the processing function into processing platform 8204 (either by loading a preinstalled processing function from processing function memory 8206, or by receiving the software for the processing function from cloud server 8020 or another external location). Controller 8202 of local server 8010 may therefore route the target data to processing platform 8204, which may execute the processing function on the target data to obtain processed data. In some cases, the processing function may encompass part or all of the processing that would otherwise be performed on the raw data by a cloud server when using cloud processing. However, as local server 8010 may perform the processing function within local network 8002, this architecture may avoid sending all the raw data to cloud network 8016 over backhaul 8014.

This disclosure recognizes numerous different exemplary processing functions that can be performed by processing platform 8204 on the target data in stage 8518. These exemplary processing functions can depend on the purpose and/or deployment conditions of local network 8002, such as the type of operating area (e.g., a factory or warehouse) that local network 8002 is serving. In some cases, the processing function performed by processing platform 8204 can be related to analytics or big data. Various examples of processing functions can include, without limitation:

- Processing raw video, image, or audio data provided by the terminal devices for monitoring or sensing purposes in the operating area. This can be used for object recognition (e.g., to track objects or identify their positions), surveillance (e.g., to identify permitted persons/objects vs. intruders), etc.
- Processing raw position data (e.g., spatial position or movement (velocity or acceleration data)) to determine positions of the terminal devices in the operating area.
- Processing environmental data, such as temperature, humidity, wind, and/or pressure, for some operating area with sensitive or controlled environmental conditions.
- Factory or warehouse monitoring. For example, tracking the locations of objects in a warehouse and/or monitoring the movement of factory robots/workers in the warehouse. Additionally or alternatively, tracking the movement of parts and components in a factory, or monitoring the assembly progress.
- Shopping mall monitoring. For example, tracking the goods movement from shelves to payment, detecting when goods or missing triggering automatically new orders or refill of the shelves, tracking date, stay duration in the shelves, controlling payment compared to the number of good leaving the shelves to detect fraud.
- Monitoring of transport control data in a train station of airport, controlling data from sensors and vehicle to coordinate traffic and detect potential issue. For example, this processing can assist the supervision and maintenance of the traffic, such as by checking fuel level, need for restocking, light control, spare part availability.
- Hospital monitoring check for equipment status, medicament storage condition, and restocking needs.
- Local server in a vehicle processing data from multiple sensors such as camera or laser equipment in front, rear or side of the car, motor engine control data, tire pressure, speed, braking information, route followed by the vehicle and sending to the cloud only a summary or statistic of the processed data or sending the data only when matching some reporting criteria such as threshold or predefined value.
- Local server in a road side unit, processing data received from vehicle using for instance V2X signaling or processing data received from various sensor installed near the street such as camera or speed control unit or processing data received from traffic sign or display or from parking area.
- Processing of event and information to send statistic results to a cloud (for instance average value, periodicity, . . . ) or to send data to the cloud when the value of the processed data is above or below some threshold or is having certain value.
- Various types of analytics related to any of the above examples.
- Any combination of these or others.

After applying the processing function on the target data and obtaining the processed data, local server 8010 may in some cases send the processed data to the cloud server in stage 8520. For example, controller 8202 of local server 8010 may send the processed data to cloud server 8020 via UPF server 8012 and/or backhaul 8014. In some aspects, the processing function executed by local server 8010 may only be part of the overall scheduled processing for the target data. Accordingly, cloud server 8020 may be configured to perform the remainder of the overall scheduled processing on the processed data to obtain output data. For example, controller 8402 may instruct processing platform 8404 to load the remaining processing function (constituting the remainder of the overall scheduled processing) from processing function memory 8406. Alternatively, controller 8402 may be configured to download the remaining processing function from an external network, such as over the Internet. Once loaded, processing platform 8404 may be configured to execute the remaining processing function on the processed data to obtain the output data. In other aspects, the processing function performed by local server 8010 may be the entirety of the overall scheduled processing for the target data, and the processed data may thus be the output data.

In some aspects, cloud server 8020 may be configured to provide cloud storage by storing the output data, such as at cloud storage 8408. This can enable a customer (e.g., a person or computerized entity that uses the output data) to remotely query the cloud server for the output data. Accordingly, the customer may remotely connect to cloud server and request the output data (e.g., all or part of the output data), in response to which controller 8402 may retrieve the requested output data from cloud storage 8408 and send the requested output data back to the customer. This can be applicable, without loss of generality, to cases where the data is analytics data, which the customer can use to manage a particular enterprise located at the operating area (for example, a factory, warehouse, or other type of enterprise).

In some aspects, the processed and/or output data may be used within local network 8002. For example, the processed and/or output data may be used by terminal devices 8004*a*-8004*f*, and/or by other connectivity-enabled devices operating on local network 8002. For instance, terminal devices 8004*a*-8004*f* can refine their sensing and/or operational behavior based on the processed and/or output data. In another example, other connectivity-enabled devices in local network 8002, such as warehouse robots or smart assembly line devices, may use the processed and/or output data to improve their operation and/or adapt to changes in the operating area.

In cases where the processed data (e.g., the data obtained by local server 8010) is used in local network 8002, local server 8010 may be configured to provide the processed data back to local network 8002 directly (e.g., without sending the processed data outside of local network 8002). For example, local server 8010 (e.g., controller 8202) may be configured to transmit the processed data to network access node 8006, which may then wirelessly transmit the processed data to the appropriate devices of local network 8002. As the processed data may not leave local network 8002, this can avoid the latency involved in a round-trip transfer to and from cloud server 8020 for cloud processing. This can, without limitation, be useful in cases where the raw data and/or processed data is time-sensitive, such as when the raw data is used to monitor for errors and emergencies, or to avoid collisions.

For example, when using raw data to monitor the conditions of an environment-sensitive environment, or to track factory parts or worker robots, it can be beneficial to respond quickly to the raw data. Accordingly, traffic filter 8114/8304 can identify the target data in the raw data that is used for this processing, and then route the target data to local server 8010. Local server 8010 can then apply the processing function to obtain the processed data, and then feed the processed data directly back into local network 8002. For example, if the processing function involves processing raw temperature and/or humidity data do determine whether the environment of the operating area is inside a controlled range. If the processing function determines that the temperature or humidity is outside of the controlled range, local server 8010 can provide instructions (e.g., wirelessly via network access node 8006) to appropriate devices in local network 8002 that can manage the environment (e.g., humidifiers/de-humidifiers, heaters, and/or coolers), which can then operate to bring the environment back within the controlled range. In another example, if a factory or warehouse product moves into the wrong location, or is a factory robot is on a collision course, the processing function may detect the error. Local server 8010 may then provide instructions (e.g., via wirelessly via network access node 8006) to appropriate devices in local network 8002 that can remedy or avoid the error, such as by instructing a factory robot or smart assembly line device to move the product to the correct location or by instructing the factory robot to correct its course.

In cases where the output data is used by local network 8002, cloud server 8020 may be configured to transmit the output data back to local network 8002 over backhaul 8014. In some cases, cloud server 8020 (e.g., controller 8402) may be configured to transmit the output data directly to the appropriate devices in local network 8002 that use the output data, such as over an end-to-end bearer with the appropriate devices. In some cases, cloud server 8020 may be configured to send the output data to network access node 8006, which may then be configured to determine the appropriate devices to which the output data should be sent.

In some cases, cloud server 8020 may be configured to send the output data to local server 8010, where controller 8202 may be configured to evaluate the output data and determine where the output data should be sent. For example, controller 8202 may identify the appropriate devices of local network 8002 to which the output data should be sent, and may then send the output data to the identified appropriate devices. In some aspects, controller 8202 may determine the output data is scheduled for further processing, and may provide the output data to processing platform 8204. Processing platform 8204 may then execute another processing function on the output data (e.g., different from the processing function of stage 8518), and may provide the resulting data to controller 8202. Controller 8202 may then identify the appropriate devices and transmit the resulting data to the appropriate devices.

In some aspects, the processing offload configuration for the dynamic local server processing offload can be dynamic. For example, as shown in FIG. 85, controller 8402 of cloud server 8020 may be configured to determine an updated processing offload configuration in stage 8522. For instance, controller 8402 may determine that the amount and/or type of processing performed by local server 8010 should be updated (as further described below). Accordingly, controller 8402 may select an updated processing function and/or determine an updated filter template 8526 for the updated processing offload configuration in stage 8522. A shown in FIG. 85, controller 8402 may then send the updated processing function (e.g., the software or an identifier) to local server 8010 in stage 8524, and may send the updated filter template to traffic filter 8114/8304 in stage 8526. Terminal devices 8004*a*-8004*f*, local server 8010, and traffic filter 8114/8304 may then repeat the procedure of stages 8508-8520 with the updated processing function and updated filter template. The amount of processing, type of processing, and/or type of target data can therefore change over time.

In some aspects, cloud server 8020 may be configured to trigger these updates to the processing offload configuration based on dynamic parameters. As previously described, in some aspects cloud server 8020 may be configured to determine an amount of processing for local server 8010 to perform based on one or more input parameters, including processing load of local server 8010, temperature of local server 8010, and the throughput of data. In some aspects, controller 8402 of cloud server 8020 may be configured to track these input parameters over time, and to adapt the amount of processing for local server 8010 according to changes in these input parameters. In some aspects, cloud server 8020 may monitor these input parameters and input them into the decision algorithm, which may then output an updated amount of processing for local server 8010 to perform. Controller 8402 of cloud server 8020 may then update the processing function and filter template to reflect the change in the amount of processing for local server 8010, and may obtain an updated processing function and updated filter template.

In other aspects, controller 8402 may monitor the input parameters and compare the input parameters to thresholds to determine whether to update the processing offload configuration. For example, controller 8402 may compare the current processing load of local server 8010, current temperature of local server 8010, current processing load of cloud server 8020, current temperature of cloud server 8020, and/or throughput of data to corresponding thresholds, and may decide whether to update the processing offload configuration based on whether any of the input parameters are above their corresponding thresholds. For instance, if the current processing load or current temperature of local server 8010 is above its corresponding threshold, controller 8402 may decide to reduce the amount of processing assigned to local server 8010. In another example, if the current processing load or current temperature of cloud server 8020 is above its corresponding threshold, controller 8402 may decide to increase the amount of processing assigned to local server 8010 (which can reduce the processing burden on cloud server 8020). Controller 8402 may be configured to determine an updated processing function and updated filter template based on such decisions to increase or decrease the amount of processing assigned to local server 8010.

In some cases, controller 8402 of cloud server 8020 can base these determinations on the occurrence of peak times that involve a larger amount of processing. In one example, local server 8010 may be used to process data of many sensors, such as cameras, that are monitoring an operating area. During nighttime, there may be less people in the operating area, and special nighttime sensors (such as night-vision or thermal cameras) may be switched on to enable low-light surveillance. The processing involved for monitoring these special nighttime sensors may be more demanding than for daytime sensors, and nighttime may therefore be a peak time. In another example, local server 8010 may be used to process sensing data related to a commercial center or warehouse to which delivery vehicles arrive to deliver goods. If the delivery vehicles arrive at a certain time of day, such as in the morning, there may be corresponding peak times when there is more data to be processed. In another example, local server 8010 may be part of a roadside unit (RSU). If the RSU is playing the role of a gateway and uses sensing data from multiple sensors (such as cameras and radar sensors) to control a digital sign or other traffic signal, the RSU may have greater processing demands during rush hour when there are more vehicles on the road (e.g., morning hours before work, and evening hours right after work). There may therefore be peak times during rush hour. During these peak times, as well as other peak times unique to various other applicable use cases, controller 8402 may adapt the processing offload configuration to shift processing to cloud server 8020. Controller 8402 may therefore determine updated processing functions and filter templates that involve more processing at cloud server 8020.

In some aspects, controller 8402 may additionally or alternatively be configured to adapt the processing offload configuration based on the current demands of local network 8002. For example, in some cases local network 8002 can have varying latency demands, where during some periods local network 8002 has strict latency demands for receiving processed and/or output data while in other periods local network 8002 has tolerant latency demands. Accordingly, during periods where local network 8002 has strict latency demands, controller 8402 of cloud server 8020 may be configured to shift the processing offload towards local network 8002 (e.g., may select a processing function that involves more processing at local server 8010). This may enable local server 8010 to perform more processing and consequently quickly feed processed data back into local network 8002 as needed. Conversely, during periods where local network 8002 has tolerant latency demands, controller 8402 may be able to shift the processing offload back to cloud server 8020.

Controller 8402 may be configured to consider various additional or alternative dynamic parameters when deciding whether to adapt the processing offload configuration. For example, controller 8402 may consider the cost to transmit the data from local network 8002 to cloud server 8020, the amount of raw data local network 8002 is transmitting to cloud server 8020, the power consumption of local server 8010 (e.g., by shifting processing offload to cloud server 8020 when the power resources of local server 8010 are low). These criteria may vary over time, and controller 8402 may consequently monitor them over time (e.g., by monitoring its own status and/or by receiving reports from local server 8010) and determine appropriate adaptations to the processing offload configuration as needed.

In an example regarding cost as a dynamic parameter, a company may pay a network provider based on the amount of data transferred (e.g., over backhaul 8014). The cost may optionally depend on the network load, data transfer may have a higher cost when network load is high (e.g., of backhaul 8014) and lower cost when network load is low. The cost of data transfer can also vary based on other factors. Controller 8402 may therefore adapt the amount of processing done at local server 8010 based on the cost of data transfer at a given time, where controller 8402 may shift more processing (by determining a corresponding updated processing function and updated filter template) to local server 8010 when cost is high and shift more processing to cloud server 8020 when cost is low.

In an example using power consumption as a dynamic parameter, power consumption may play a role when local network 8002 is operating on a definite power source, such as a battery. This can occur, for example, when an indefinite power source is temporarily unavailable, such as for ad hoc camp establishment (e.g., for safety, area exploration, temporary installation). In such cases, controller 8402 may evaluate and compare the relative amount of energy consumption of local vs. cloud processing. For example, controller 8402 may estimate the amount of energy consumption for local server 8010 to perform the processing function on the raw data and to transmit the target data (assumed to be smaller in size), and also estimate the amount of energy consumption for local network 8002 to transmit the larger amount of raw data (e.g., without local processing). Controller 8402 may use historical data of energy consumption reported by local network 8002 to perform these estimations, and may consider the amount of data being generated by local network 8002 to compute the estimates using the historical data as a model of the energy consumption. Controller 8402 may then adapt the amount of processing assigned to local server 8010 to minimize energy consumption (e.g., using a gradient descent algorithm that attempts to find the minimum energy consumption with the amount of processing done locally vs. at the cloud being the variables.

This analysis can also depend on the type of processing function, such as whether the processing function is for audio, video, or data statistics. The analysis can also depend on the radio access technology used for data transfer, such as LTE, 2G, WLAN, BT, LORA, Sigfox, or another type of radio access technology.

Figure 86:
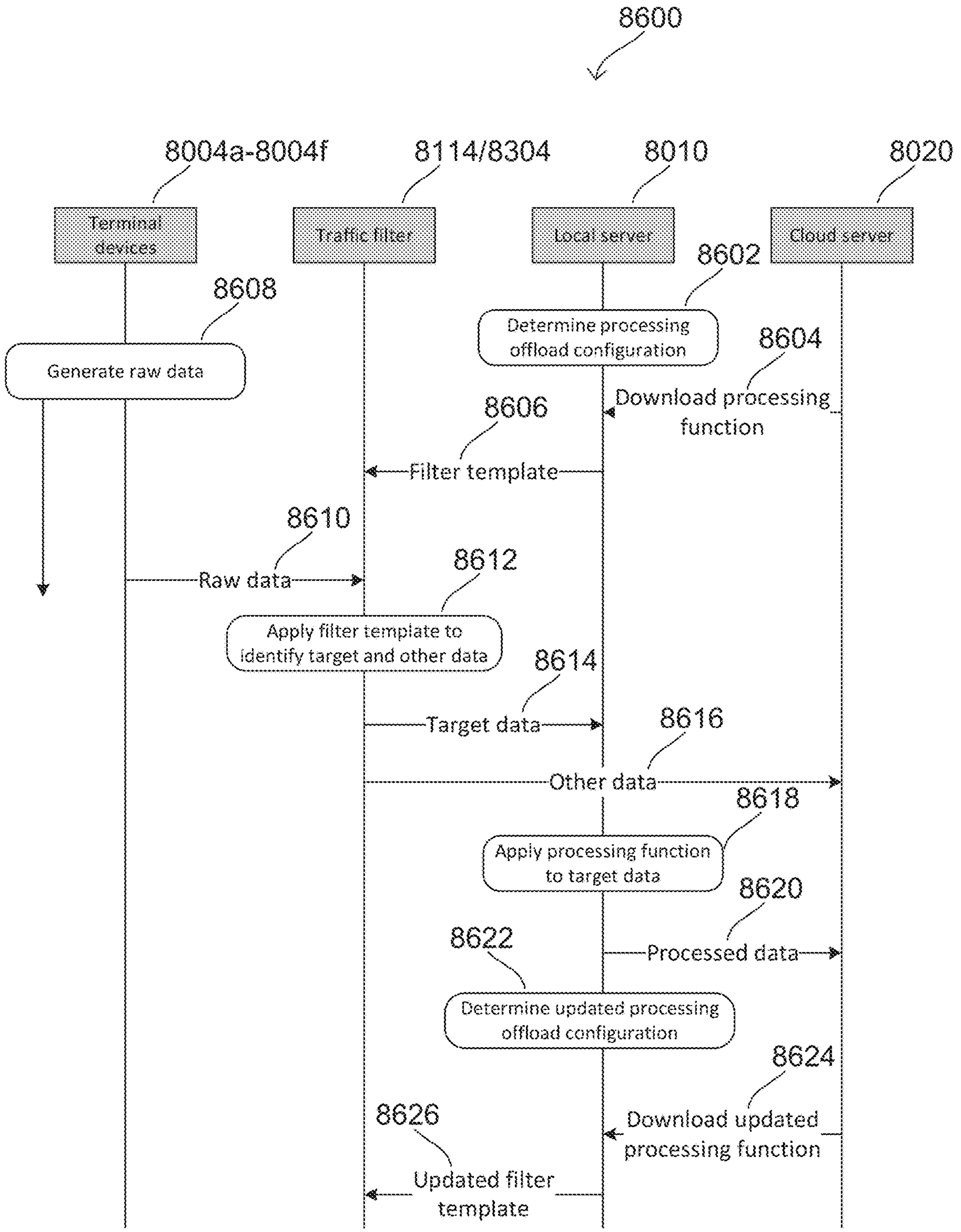
FIG. 86 shows an exemplary procedure for dynamic local server processing offload according to some aspects.

In the exemplary setting of FIG. 85 described above, cloud server 8020 may be configured to determine the processing offload configuration for the dynamic local server processing offload. In other aspects, local server 8010 may be configured to determine the processing offload configuration, and controller 8202 may of local server 8010 may therefore be configured to perform any decision-making described above for controller 8402 (e.g., for stages 8502 and 8518). FIG. 86 shows exemplary message sequence chart 8600, which depicts some aspects where local server 8010 is configured to determine the processing offload configuration. As shown in FIG. 86, controller 8202 of local server 8010 may be configured to determine the processing offload configuration in stage 8602. This can include selecting a processing function for local server 8010 to execute and/or determining a filter template. In some cases, local server 8010 may already have the processing function stored on processing function memory 8206 as a preinstalled processing function, and controller 8202 may instruct processing platform 8204 to load the software for the processing function from processing function memory 8206. In other cases, such as that shown in FIG. 86, local server 8010 may not already have the processing function stored at processing function memory 8206. Controller 8202 may therefore download the software for the processing function in stage 8604, such as from cloud server 8020 (which may, for example, have the software for the processing function stored at its processing function memory 8206) or from an external network (e.g., over the Internet). This can include receiving signaling that includes the software for the processing function. Controller 8202 may then provide the software for the processing function to processing function memory 8206 for storage and later retrieval, or may provide the software for the processing function directly to processing platform 8204.

Controller 8202 may therefore configure local server 8010 to perform the processing function, such as by loading the software for the processing function into processing platform 8204. Controller 8202 may also send signaling to traffic filter 8114/8304 in stage 8606 that specifies the filter template (e.g., signaling that includes the filter template, or signaling that identifies the filter template from a plurality of preinstalled filter templates). Terminal devices 8004*a*-8004*f*, traffic filter 8114/8304, local server 8010, and cloud server 8020 may then perform stages 8608-8622 in the manner described above for stages 8508-8522 in FIG. 85. Similar to the case of controller 8402 of cloud server 8020 in FIG. 85, controller 8202 of local server 8010 may be configured to determine an updated processing offload configuration in stage 8622. For example, controller 8202 may monitor one or more dynamic parameters and adapt the processing offload configuration, and may select an updated processing function and an updated filter template. Controller 8202 may execute this functionality in any manner described above for controller 8402. Controller 8202 may then download the updated data processing function in stage 8624, if needed, and send the updated filter template to traffic filter 8114/8304 in stage 8626.

As shown in the exemplary setting of FIG. 80, in some cases local network 8002 may optionally also include CPF server 8008. In some aspects, CPF server 8008 may be responsible for propagating the processing offload configuration, as selected by cloud server 8020, within local network 8002. For example, controller 8402 of cloud server 8020 may maintain a control signaling interface with CPF server 8008 through which controller 8402 may exert control over the dynamic local serving processing offload in local network 8002. For instance, instead of having a signaling interface with local server 8010 and/or traffic filter 8114/8304 (for example, that could be used to send processing functions and/or filter templates), controller 8402 may use the control signaling interface with CPF server 8008 to send the processing offload configuration (e.g., including the processing functions and/or filter templates for the selected processing offload configuration) to CPF server 8008. CPF server 8008 may then be configured to provide the processing function to local server 8010 (e.g., via a signaling interface between CPF server 8008 and controller 8202 of local server 8010) and/or to provide the filter template to traffic filter 8114/8304 (e.g., via a signaling interface between CPF server 8008 and network access node 8006 and UPF server 8012). Local server 8010 and traffic filter 8114/8304 may then apply the processing function and/or filter template in the manner described above.

Some of the aspects described above use an architecture where the traffic filter sits on the user plane in either network access node 8006 or UPF server 8012, which can enable the traffic filter to tap raw data on the user plane and re-route target data to local server 8020. Additionally or alternatively, the traffic filter may be implemented locally at terminal devices 8004*a*-8004*f*. Accordingly, the traffic filter may evaluate the raw data before it is sent from terminal devices 8004*a*-8004*f* to identify the target data (e.g., raw data that matches the one or more parameters that define the filter template). The traffic filter can then send the target data to local server 8010 (for example, over a special bearer that the traffic filter establishes with controller 8202 of local server 8010).

Figure 87:
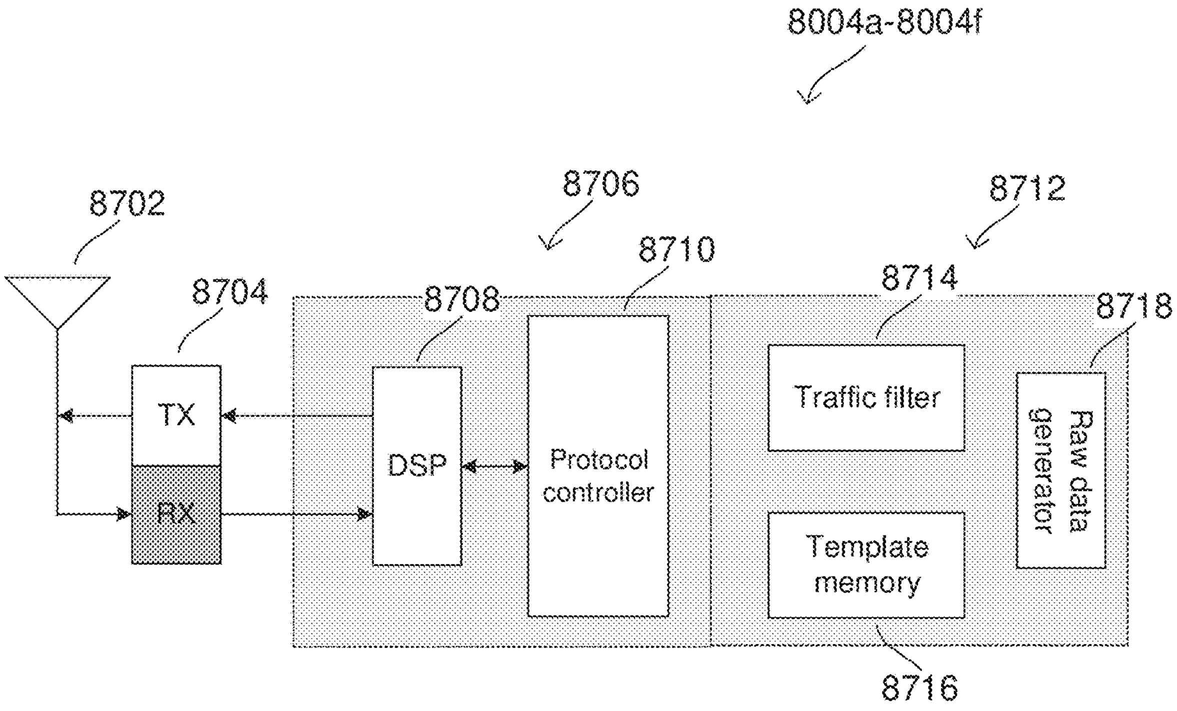
FIG. 87 shows an exemplary internal configuration of a terminal device according to some aspects.

FIG. 87 shows an exemplary internal configuration of terminal devices 8004*a*-8004*f* according to some aspects. As shown in FIG. 87, terminal devices 8004*a*-8004*f* may include antenna system 8702, RF transceiver 8704, and baseband modem 8706 (including digital signal processor 8708 and protocol controller 8710), which may be respectively configured in the manner of antenna system 202, RF transceiver 204, and baseband modem 206 of terminal device 102 shown in FIG. 2.

Terminal devices 8004*a*-8004*f* may further include application platform 8712. As shown in FIG. 87, application platform 8712 may include traffic filter 8714, template memory 8716, and raw data generator 8718. Similar to that described above for traffic filters 8114 and 8304, traffic filter 8714 may be a filter (e.g., a software filter) configured to evaluate raw data to identify target data (from the raw data) that matches one or more parameters of a filter template. For example, traffic filter 8714 may be configured to perform packet inspection (e.g., DPI) on a stream of packets containing raw data, and to identify one or more characteristics of each data packet (e.g., based on header information). Traffic filter 8714 may then be configured to determine whether any of the one or more characteristics of each data packet match one or more parameters of the filter template. If so, traffic filter 8714 may classify the packet as target data, and route the target data to local server 8010. If not, traffic filter 8714 may classify the packet as other data, and may route the other data along its originally scheduled path (e.g., on an end-to-end bearer to cloud server 8020). Template memory 8716 may be configured to store the filter template.

Raw data generator 8718 may include one or more components configured to generate the raw data. The components that make up raw data generator 8718 may vary depending on the particular use case of the raw data. For example, raw data generator 8718 can include any one or more of: image or video cameras, microphones, gyroscopes/accelerometers/speedometers, signal-based geopositional sensors (e.g., using Global Navigation Satellite System (GNSS)), thermometers, humidity sensors, wind sensors, barometers, laser or radar sensors, automotive sensors (e.g., for monitoring tire pressure, engine conditions, brakes, route, etc.), or wireless communication circuitry that receives signals from other devices (for example, where raw data generator 8718 receives sensing or monitoring data from other devices that raw data generator 8718 subsequently uses as raw data). In some aspects where the raw data is related to communications by baseband modem 8706, such as where the raw data relates to radio conditions experienced by baseband modem 8706, raw data generator 8718 may interface with baseband modem 8706. Baseband modem 8706 may then provide the raw data to raw data generator 8718 over the interface.

Traffic filter 8714 may be configured to operate a similar or same manner as traffic filters 8114 and 8304 as previously described. For example, local server 8010 (e.g., controller 8202) or cloud server 8020 (e.g., controller 8402, which can be directly or via CPF server 8008) may send the filter template to traffic filter 8714. The filter template may be sent wirelessly, where the local server 8010 or cloud server 8020 sends the filter template to network access node 8006, and network access node 8006 wirelessly transmits the filter template as baseband data to baseband modem 8706. Baseband modem 8706 may then receive and process the baseband data to obtain the filter template, and may provide the filter template to template memory 8716.

Traffic filter 8714 may then be configured to access template memory 8716 and configure itself according to the filter template. Traffic filter 8714 may then monitor the raw data produced by raw data generator 8718 and evaluate the raw data according to the filter template. Traffic filter 8714 may then identify the target data as the raw data that matches the filter template, and the other data as raw data that does not match the filter template. Traffic filter 8714 may then send the target data on a special bearer between traffic filter 8714 and local server 8010 (e.g., controller 8202), and may send the other data on, for example, an end-to-end bearer with cloud server 8020 (e.g., controller 8402). The special bearer and the end-to-end bearer may use wireless transmission for lower layer transport, and accordingly traffic filter 8714 may provide the target data and raw data to baseband modem 8706 for wireless transmission to network access node 8006.

In an exemplary use case focused on wireless communications, local server 8010 may be configured to assist network access node 8006 with managing its radio access network. For example, local server 8010 may be configured to perform analytics to optimize its scheduling and resource allocations. In this example, network access node 8006 may be configured to use deterministic scheduling to manage radio access by terminal devices 8004*a*-8004*f*. Accordingly, network access node 8006 may send out resource allocations to terminal devices 8004*a*-8004 (e.g., to those of terminal devices 8004*a*-8004*f* that in a radio connected state) during each scheduling interval. Terminal devices 8004*a*-8004*f* may then transmit and receive on the available radio resources according to the resources allocated to each in their respective resource allocations.

In some cases, the transmission or reception activity by terminal devices 8004*a*-8004*f* may follow a pattern over time. For example, some IoT devices may be configured to perform radio activity in a deterministic manner, such as a sensor or image camera that is configured to wirelessly report a reading or image every X ms, or a video camera that wirelessly provides a continuous stream of video data. In these and other similar cases, there may be some underlying deterministic pattern in the radio activity by terminal devices 8004*a*-8004*f*. Accordingly, instead of providing resource allocations in response to scheduling requests and buffer status reports, it can be beneficial for network access node 8006 to provide resource allocations that follow the deterministic patterns of the radio activity by terminal devices 8004*a*-8004*f*. In some aspects, local server 8010 may therefore be configured to perform a processing function on operational data (e.g., raw data) of network access node 8006 and/or terminal devices 8004*a*-8004*f* to identify deterministic patterns in the radio activity of terminal devices 8004*a*-8004*f*. Local server 8010 may then provide instructions (e.g., in the form of processed data) to network access node 8006 that informs network access node 8006 how to improve its scheduling and resource allocations. As network access node 8006 can therefore tailor its scheduling and resource allocations to the deterministic patterns of radio activity exhibited by terminal devices 8004*a*-8004*f*, this can improve performance and resource usage efficiency.

Figure 88:
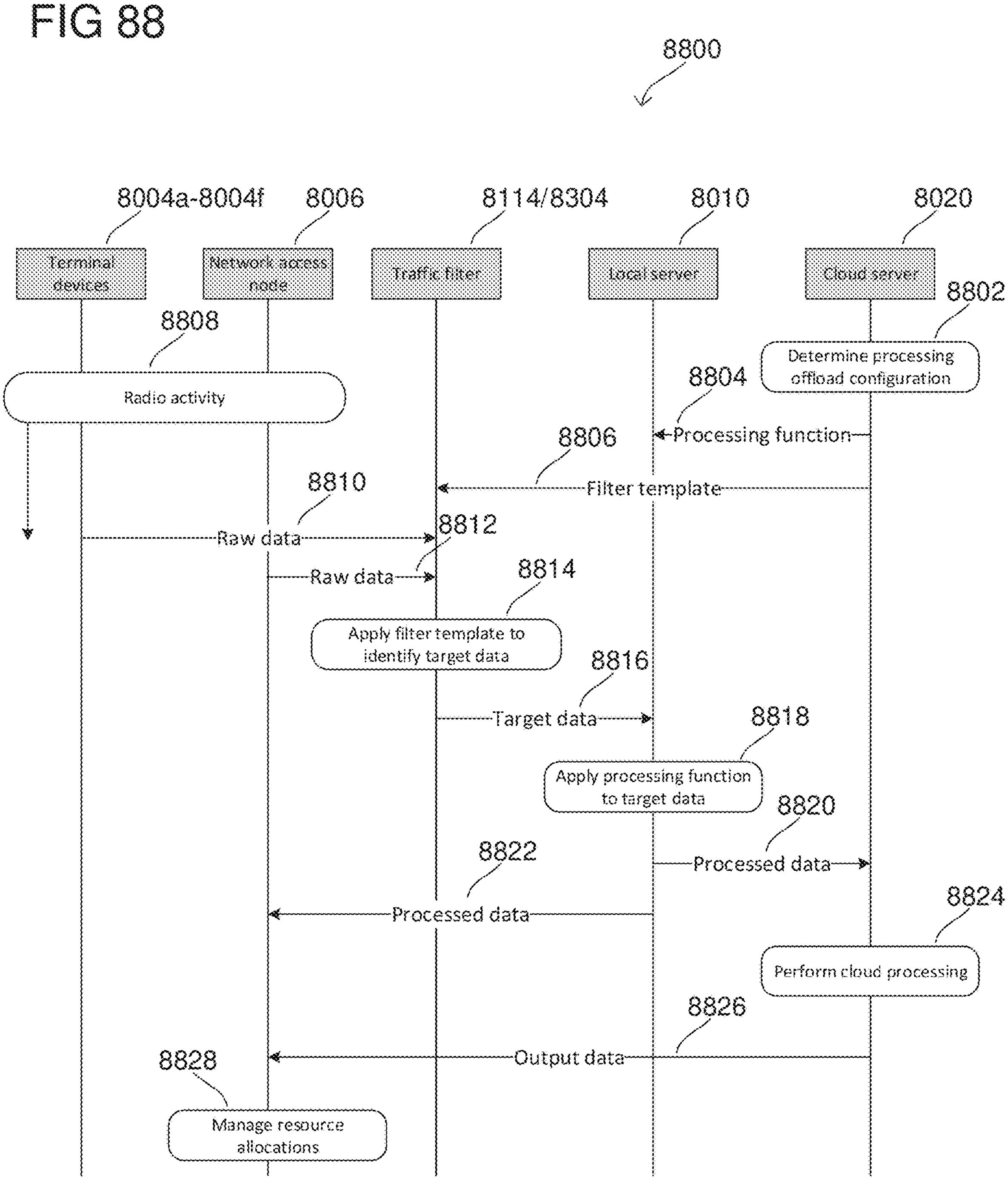
FIG. 88 shows an exemplary procedure for dynamic local server processing offload according to some aspects.

In some aspects, this wireless communication-focused use case of dynamic local server processing offload may be handled in cooperation by local server 8010 and cloud server 8020 (e.g., using processing by both local server 8010 and cloud server 8020), while in other aspects this use case can be handled within local network 8002 (e.g., independent of cloud servers and using processing by local server 8010). FIG. 88 shows exemplary message sequence chart 8800 describing some aspects where the wireless communication-focused use case is handled in cooperation by local server 8010 and cloud server 8020. As shown in FIG. 88, cloud server 8020 (e.g., controller 8402) may first determine the processing offload configuration in stage 8802, and may then send signaling to local server 8010 that specifies the processing function in stage 8804 and send signaling to traffic filter 8114/8304 in stage 8806 that specifies the filter template. In this use case, the processing function can be related to pattern recognition analytics, and can process raw data to identify patterns in radio resource usage. Although not explicitly shown in FIG. 88, in some aspects local server 8010 (e.g., controller 8202) may alternatively be configured to determine the processing offload configuration in stage 8802. Traffic filter 8114/8304 may be located in either network access node 8006 or UPF server 8012. In some cases it may be advantageous for traffic filter 8114/8304 to be located in network access node 8006 due to the increased involvement of network access node 8006 in this use case.

As shown in FIG. 88, terminal devices 8004*a*-8004*f* may perform radio activity on the radio access network provided by network access node 8006 in stage 8808. This can include downlink transmissions, such as where network access node 8006 schedules downlink transmissions to terminal devices 8004*a*-8004*f* by transmitting resource allocations to terminal devices 8004*a*-8004*f* identifying the radio resources (time and frequency) for the downlink transmissions and then transmits the downlink transmission according to the resource allocations. This can also include uplink transmissions, where terminal devices 8004*a*-8004*f* request uplink resources from network access node 8006 (e.g., with scheduling requests and/or buffer status reports) and then receive resource allocations from network access node 8006 that identify the radio resources that terminal devices 8004*a*-8004*f* can use to transmit the uplink transmissions.

As it is related to current communication status and/or previous communication history, this information related to the downlink and uplink scheduling may be considered operational data. Terminal devices 8004*a*-8004*f* and network access node 8006 may therefore generate and retain this raw data. For example, in aspects where terminal devices 8004*a*-8004*f* are configured in the manner shown in FIG. 2, a baseband modem 206 (e.g., a protocol stack running on protocol controller 210) of terminal devices 8004*a*-8004*f* may generate scheduling requests and/or buffer status reports (for uplink transmissions) and may receive resource allocations (for uplink and downlink transmissions). In some aspects, baseband modem 206 may then wirelessly transmit this raw data to traffic filter 8114/8304 in stage 8810.

Similarly, in aspects where network access node 8006 is configured in the manner shown in FIG. 3, a baseband subsystem 306 (e.g., a protocol stack running on protocol controller 310) may generate resource allocations (for uplink and downlink transmissions) and may receive scheduling requests and/or buffer status reports. Accordingly, baseband subsystem 306 may send this raw data to traffic filter 8114/8304 in stage 8812. Although FIG. 88 shows a case in which both terminal devices 8004*a*-8004*f* and network access node 8006 provide raw data to traffic filter 8114/8304, in other aspects only one of terminal devices 8004*a*-8004*f* and network access node 8006 may provide the raw data to traffic filter 8114/8304.

Traffic filter 8114/8304 may then apply the filter template to the raw data in stage 8814 to identify target data. The target data may be the raw data that is relevant to the pattern recognition analytics of the processing function. For example, not all of the raw data provided by terminal devices 8004*a*-8004*f* and network access node 8006 may relate to the pattern recognition analytics. In one example, the processing function may be configured to recognize only one of downlink radio resource usage patterns but not uplink radio resource usage patterns (or vice versa). Accordingly, the filter template may specify that only raw data relating to downlink transmissions is matching. Traffic filter 8114/8304 may therefore identify raw data relating to downlink transmissions as target data, while identifying the remaining data as other data.

After identifying the target data, traffic filter 8114/8304 may send the target data to local server 8010 in stage 8816. As the other data may not have further relevance (as it may relate to uplink or downlink transmissions that have already occurred), traffic filter 8114/8304 may discard the other data. Local server 8010 (e.g., controller 8202) may then apply the processing function to the target data in stage 8818. For example, this can include applying pattern recognition analytics to the target data to identify a deterministic pattern in the radio resource usage by terminal devices 8004*a*-8004*b*, such as to identify a regular periodicity at which one or more (or each of) terminal devices 8004*a*-8004*b* is transmitting or receiving.

As the use case shown in FIG. 88 involves a setting where cloud server 8020 also participates in the processing, local server 8010 may send the resulting processed data to cloud server 8020 in stage 8820. In some aspects, the processed data may be usable by network access node 8006 without further cloud processing, and local server 8020 may also send the processed data to network access node 8006.

Cloud server 8020 may then perform the cloud processing on the processed data in stage 8824 to obtain output data. For example, the processing function performed by local server 8010 in stage 8818 may only be part of the pattern recognition analytics, and cloud server 8020 may therefore perform the remaining part of the pattern recognition analytics in stage 8824. Cloud server 8020 may then provide the output data to network access node 8006 in stage 8826.

Network access node 8006 may therefore receive the output data (optionally in addition to the processed data, if applicable), and may then manage resource allocations in stage 8828 based on the output and/or processed data. For example, the pattern recognition analytics may yield processed and/or output data that identifies a particular deterministic pattern of radio resource usage. In one example of identifying a deterministic pattern, the processed and/or output data may identify a regular periodicity at which one of terminal devices 8004*a*-8004*f* perform uplink or downlink communications. Network access node 8006 (e.g., a scheduler entity of the protocol stack running at protocol controller 310) may therefore schedule uplink and or downlink resource allocations in advance according to the regular periodicity. For example, if processed and/or output data identifies that terminal device 8004*a* performs an uplink transmission (or receives a downlink transmission) every X ms, network access node 8006 may allocate resources to terminal device 8004*a* every X ms (e.g., may allocate radio resources with the regular periodicity).

In another example of identifying a deterministic pattern, such as one using a factory or warehouse setting, terminal devices 8004*a*-8004*f* may be sensors that send sensing data in a periodic manner and/or with a constant size. For example, terminal devices 8004*a*-8004*f* may be temperature sensors, and may perform a temperature measurement every 30s (e.g., with its raw data generator 8718 configured as a thermometer). Terminal devices 8004*a*-8004*f* send a corresponding packet of raw data every 30s that contains its device/sensor identify, a timestamp, and the temperature measurement. As terminal devices 8004*a*-8004*f* may be configured similarly, they may therefore send raw data with the same or similar packet size and periodicity (e.g., following a same or similar deterministic pattern). Local server 8010 may be configured to identify this regular periodicity and packet size, such as by either performing pattern recognition analytics on the data sent by terminal devices 8004*a*-8004*f* and/or with predefined knowledge about the sensor configuration of terminal devices 8004*a*-8004*f* (e.g., that indicates how often terminal devices 8004*a*-8004*f* will be reporting and/or the packet size). Network access node 8006 may therefore be able to reserve periodic resources and automatically allocate transmission grants for terminal devices 8004*a*-8004*f*. Terminal devices 8004*a*-8004*f* may therefore not need to request for resources, which can reduce control signaling overhead and yield higher radio resource efficiency. This concept of terminal devices with fixed radio activity periodicity and/or packet size can be expanded to any use case.

Additionally, local server 8010 may be configured to determine whether terminal devices 8004*a*-8004*f* are at a fixed location, (e.g., by evaluating position reports provided by terminal devices 8004*a*-8004*f* to determine their positions over time, such as GNSS position reports). If so, local server 8010 may instruct network access node 8006 (by sending it the processed data) to disable mobility management for those of terminal devices 8004*a*-8004*f* that are at a fixed location. In some aspects, local server 8010 may also instruct network access node 8006 to simplify the power control algorithm for those of terminal devices 8004*a*-8004*f* that are at a fixed location, as the uplink transmission power assigned to non-moving terminal devices can be held constant (assuming no change in environment).

Figure 89:
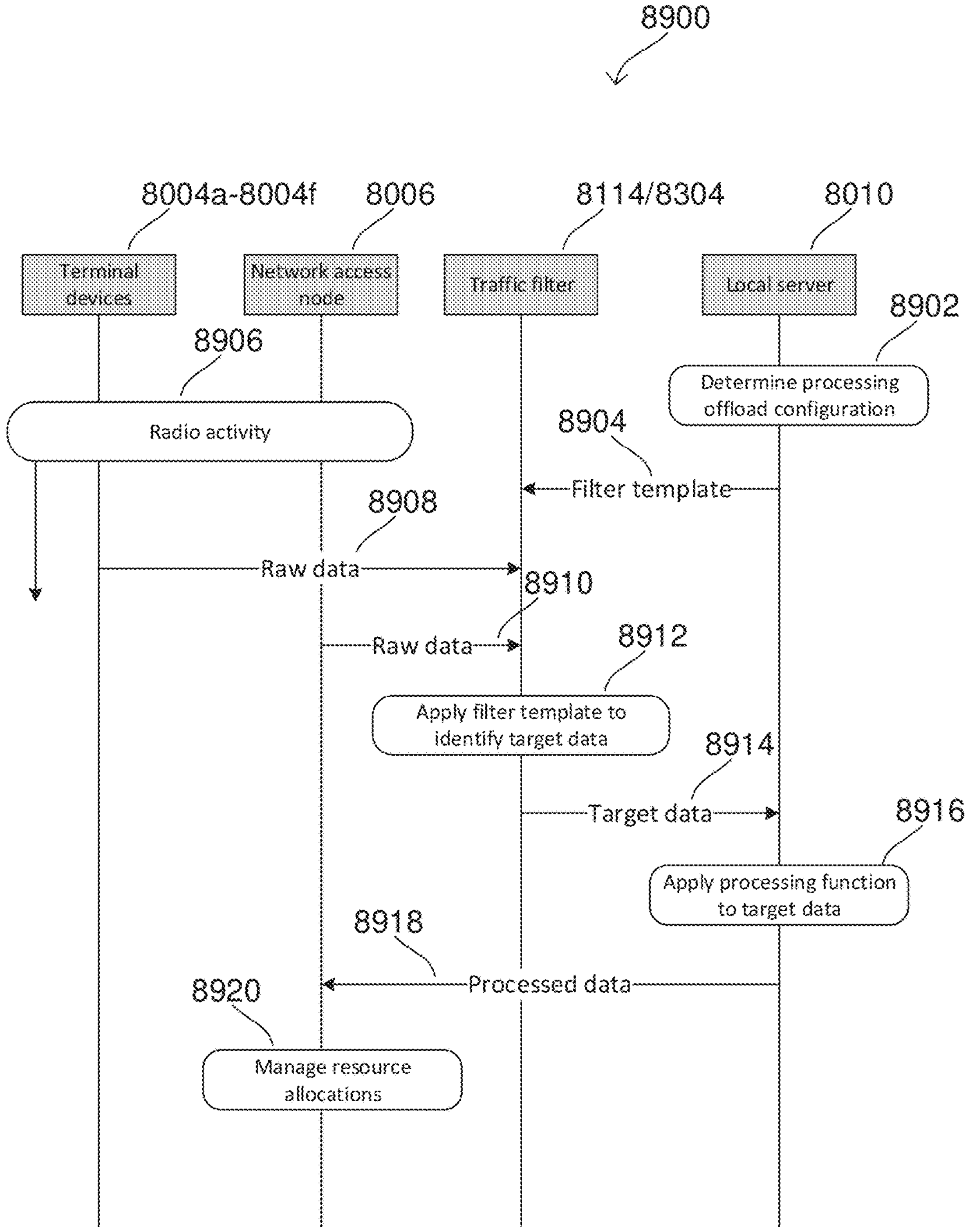
FIG. 89 shows an exemplary procedure for dynamic local server processing offload according to some aspects.

FIG. 89 shows exemplary message sequence chart 8900 according to some aspects where the dynamic local server processing offload is handled within local network 8002 (e.g., independent of cloud processing). As shown in FIG. 89, local server 8010 may first determine the processing offload configuration in stage 8902. Local server 8010 may then configure itself to perform the processing function (e.g., for pattern recognition analytics), which can include loading software for the processing function into processing platform 8204 from processing function memory or downloading the software for the processing function into processing platform 8204 from an external network. Local server 8010 may also send signaling to traffic filter 8114/8304 in stage 8904 that specifies the filter template.

Terminal devices 8004*a*-8004*f* and network access node 8006 may perform radio activity in stage 8906, and may send the raw data to traffic filter 8114/8304 in stages 8908 and 8912. Traffic filter 8114/8304 may then apply the filter template to the raw data to identify the target data in stage 8912, and may send the target data to local server 8010 in stage 8914.

Local server 8010 may then apply the processing function to the target data in stage 8916, and may obtain processed data. As previously indicated, the processing function may relate to pattern recognition analytics, and the processed data may indicate deterministic patterns of radio resource usage by one or more (or each) of terminal devices 8004*a*-8004*f*. Local server 8010 may then send the processed data to network access node 8006 in stage 8918. Network access node 8006 may then use the processed data in stage 8920 to manage resource allocations for terminal devices 8004*a*-8004*f*, such as by allocating resources according to a regular periodicity indicated in the processed data.

In the aspects described above for FIGS. 88 and 89, the target data may include operational data that is relevant to uplink and downlink radio resource usage by terminal devices 8004*a*-8004*f*, where the processing function may be configured to identify deterministic patterns in radio resource usage. In other aspects, terminal devices 8004*a*-8004*f* and/or network access node 8006 may provide target data to local server 8010 (e.g., via a traffic filter) that local server 8010 can use to identify the position and/or radio conditions of terminal devices 8004*a*-8004*f*. For example, local server 8010 may receive target data that includes measurement reports and/or position reports for terminal devices 8004*a*-8004*f*. Local server 8010 may then be configured to apply a processing function to this target data that is configured to optimize the radio coverage provided by network access node 8006 to terminal devices 8004*a*-8004*f*.

Accordingly, with reference to FIGS. 88 and 89, cloud server 8020 or local server 8010 may select the processing offload configuration, including the processing function and the filter template, and configure local server 8010 to perform the processing function and traffic filter 8114/8304 to perform filtering with the filter template. Terminal devices 8004*a*-8004*f* and network access node 8006 may then perform radio activity and report raw data to traffic filter 8114/8304. The raw data can include measurement reports by terminal devices 8004*a*-8004*f* and network access node 8006, such as signal strength measurements, signal quality measurements, channel estimates, measured throughput, measured latency, and/or measured error rate. The raw data can also include communication reports that detail parameters related to the configured transmit power and/or configured modulation and coding scheme. The raw data can also include position reports for terminal devices 8004*a*-8004*f*.

Traffic filter 8114/8304 may receive this raw data, and may apply the filter template to the raw data to identify the target data. In some aspects, the filter template may specify particular terminal devices, and traffic filter 8114/8304 may therefore identify raw data originating from these terminal devices as target data. In other aspects, such as where the processing function applies to specific types of the raw data (e.g., to specific measurements), the filter template may identify these specific types of raw data. Traffic filter 8114/8304 may therefore identify raw data of these specific types as the target data.

Traffic filter 8114/8304 may then provide the target data to local server 8010. Local server 8010 may then apply the processing function to the target data to obtain the processed data. In use cases where the dynamic local server processing offload is handled internally within local network 8002, local server 8010 may then provide the processed data back to network access node 8006. In use cases where the dynamic local server processing offload also uses cloud processing, local server 8010 may provide the processed data to cloud server 8020. Cloud server 8020 may then perform cloud processing on the processed data to obtain output data, which cloud server 8020 may then send back to network access node 8006.

Network access node 8006 may then use the processed and/or output data to manage its radio coverage. For example, the various raw data provided by terminal devices 8004*a*-8004*f* may relate to the radio conditions at various different positions around network access node 8006. The processing function may therefore be configured to evaluate this position-dependent radio coverage, and to attempt to identify adaptations that could improve the position-dependent radio coverage. In one example, the processing function may relate to radio environment maps (REMs), which map out radio conditions on a geographic map. The processing function may therefore be configured to generate an REM based on the raw data, such as by mapping out measurements by position and/or interpolating between the measurements at different positions to smooth the REM. The processing function may also be configured to generate processed or output data that uses the REM to identify adaptations to-improve the position-dependent radio coverage. For example, given an REM, the processing function may be configured to decide on a particular beamforming pattern, downlink transmit powers, uplink and downlink transmit powers, modulation and coding schemes, to enable or disable measurement report and cell reselection capability from a terminal device, precoding matrices, or any other parameter that network access node 8006 can use to impact radio coverage. Accordingly, the processed or output data may specify any of these parameters to network access node 8006. Network access node 8006 may then use the parameters specified in the output data to adjust its radio activity (optionally also the radio activity of terminal devices 8004*a*-8004*f*, such as by assigning a new parameter for terminal devices 8004*a*-8004*f* to use). In some cases, this can help to improve radio coverage provided by network access node 8006 to terminal devices 8004*a*-8004*f*. This can also be performed in a continuous process, where terminal devices 8004*a*-8004*f* and network access node 8006 continuously provide raw data to local server 8010 and/or cloud server 8020, and local server 8010 and/or cloud server 8020 provide processed and/or output data back to network access node 8006 that specifies parameters for improving radio coverage based on the recent raw data.

In various other aspects, message sequence charts 8800 and 8900 may also update the processing offload configuration over time (e.g., by cloud server 8020 and/or local server 8010). In some aspects, message sequence charts 8800 and 8900 may not include a traffic filter, and terminal devices 8004*a*-8004*f* and/or network access node 8006 may transmit their raw data directly to local server 8010. In other aspects, terminal devices 8004*a*-8004*f* and/or network access node 8006 may include the traffic filter. The traffic filter may evaluate the raw data generated by baseband modem 206 and baseband subsystem 306, respectively, and identify the target data from the raw data. The traffic filter may then send the target data to local server 8010.

Figure 90:
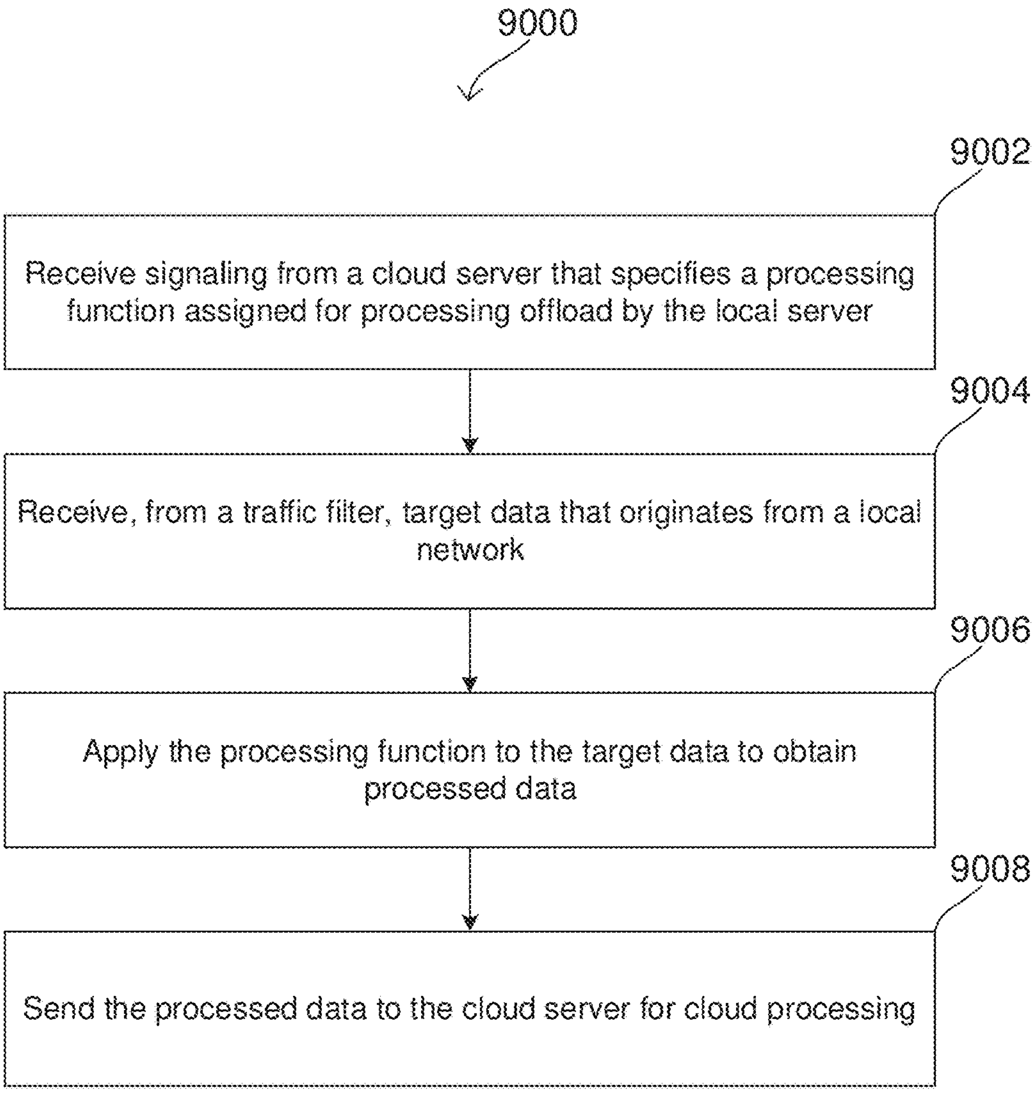
FIGS. 90-93 show exemplary methods for performing processing functions at a local server according to some aspects.

FIG. 90 shows exemplary method 9000 of performing processing at a local server according to some aspects. As shown in FIG. 90, method 9000 includes receiving signaling from a cloud server that specifies a processing function assigned for processing offload by the local server (9002), receiving, from a traffic filter, target data that originates from a local network (9004), applying the processing function to the target data to obtain processed data (9006), and sending the processed data to the cloud server for cloud processing (9008).

Figure 91:
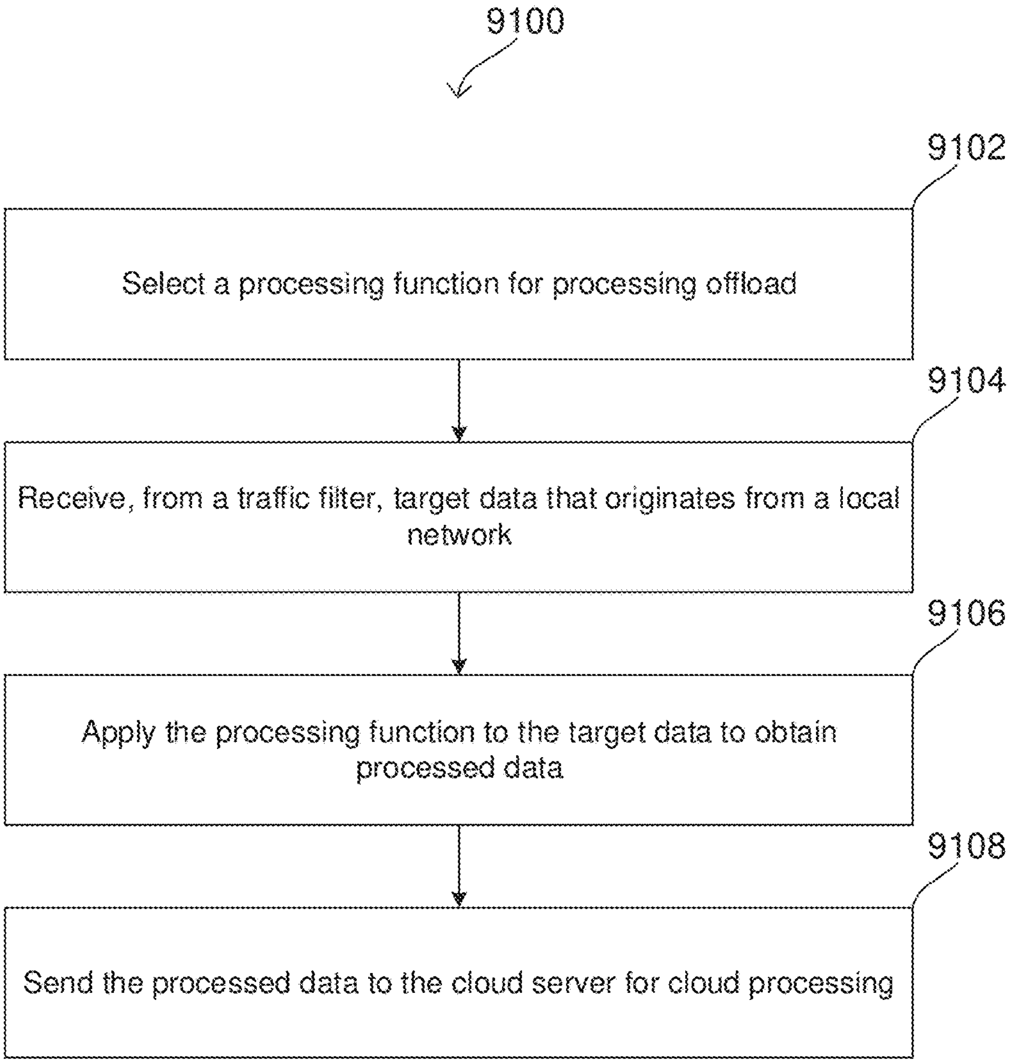

FIG. 91 shows exemplary method 9100 for performing processing functions at a local server according to some aspects. As shown in FIG. 91, method 9100 includes selecting a processing function for processing offload (9102), receiving, from a traffic filter, target data that originates from a local network (9104), applying the processing function to the target data to obtain processed data (9106), and sending the processed data to the cloud server for cloud processing (9108).

Figure 92:
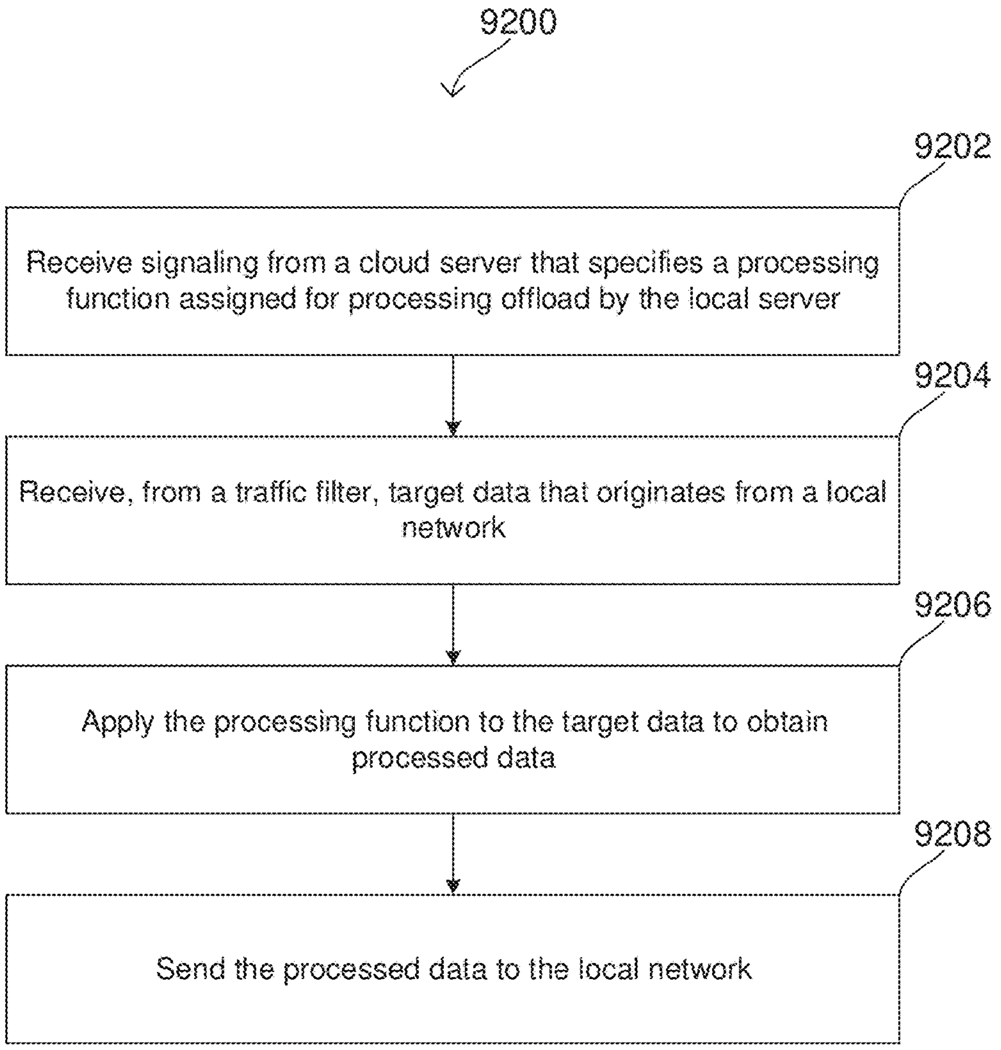

FIG. 92 shows exemplary method 9200 for performing processing functions at a local server according to some aspects. As shown in FIG. 92, method 9200 includes receiving signaling from a cloud server that specifies a processing function assigned for processing offload by the local server (9202), receiving, from a traffic filter, target data that originates from a local network (9204), applying the processing function to the target data to obtain processed data (9206), and sending the processed data to the local network (9208).

Figure 93:
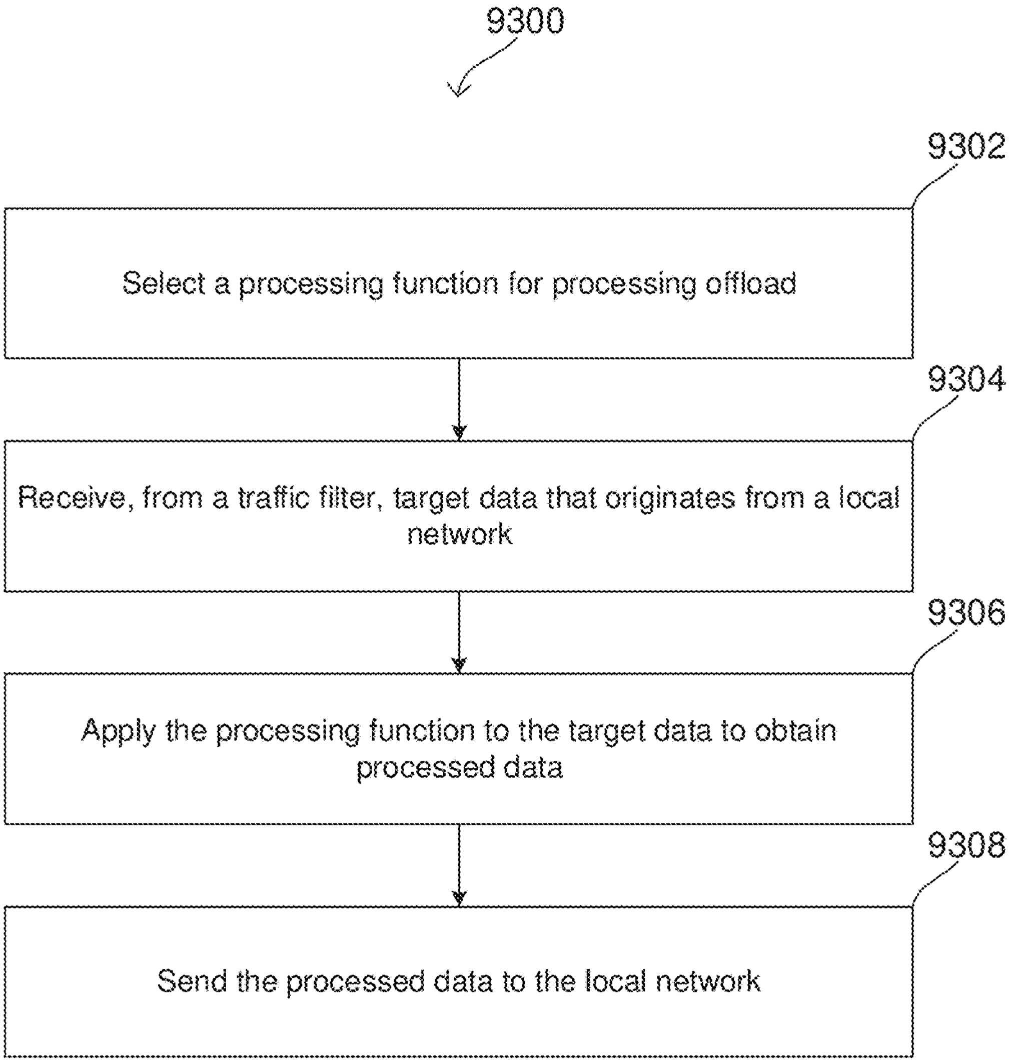

FIG. 93 shows exemplary method 9300 for performing processing functions at a local server according to some aspects. As shown in FIG. 93, method 9300 includes selecting a processing function for processing offload (9302), receiving, from a traffic filter, target data that originates from a local network (9302), applying the processing function to the target data to obtain processed data (9304), and sending the processed data to the local network (9306).

Figure 94:
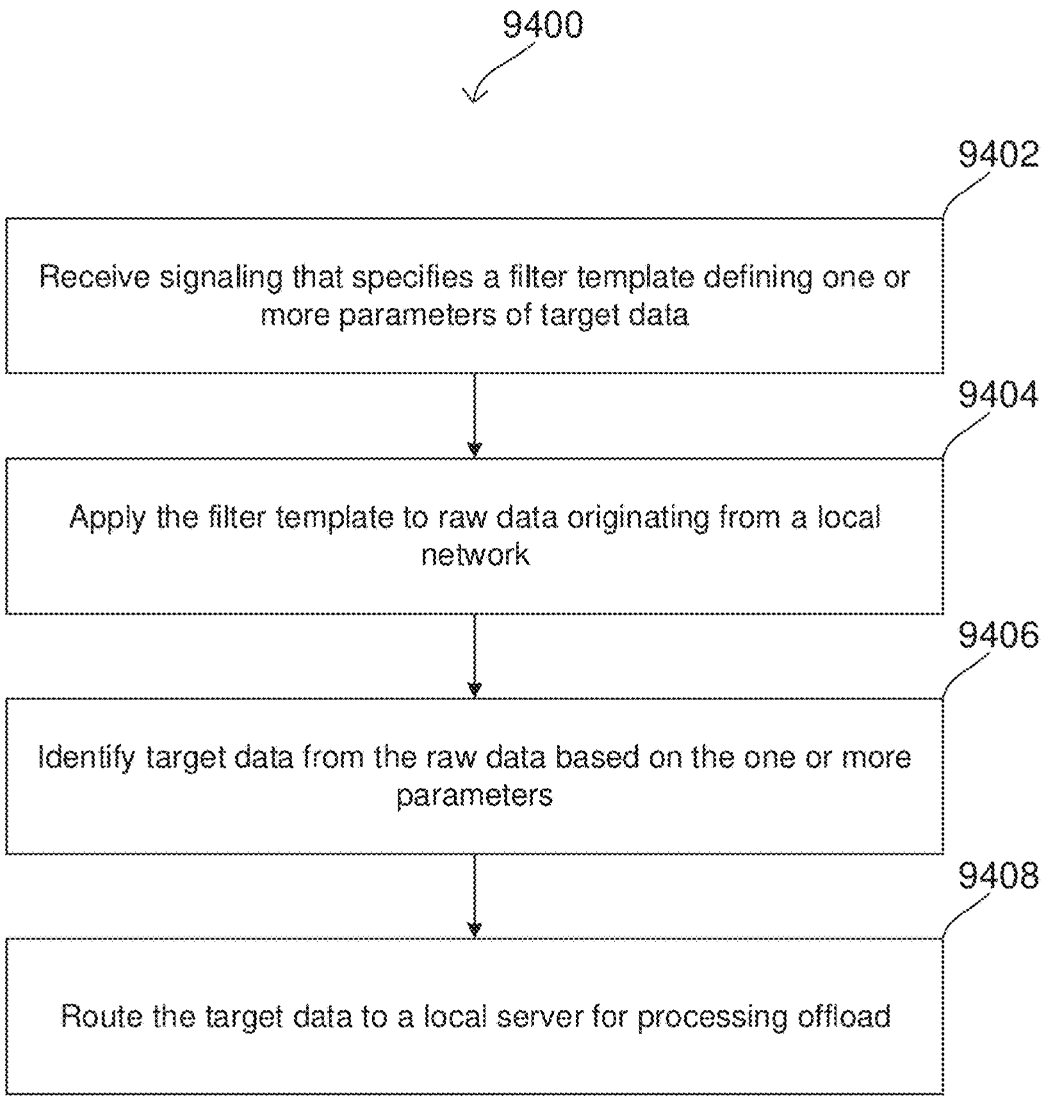
FIG. 94 shows an exemplary method for filtering and routing data according to some aspects.

FIG. 94 shows exemplary method 9400 for filtering and routing data according to some aspects. As shown in FIG. 94, method 9400 includes receiving signaling that specifies a filter template defining one or more parameters of target data (9402), applying the filter template to raw data originating from a local network (9404), identifying target data from the raw data based on the one or more parameters (9406), and routing the target data to a local server for processing offload (9408).

Figure 95:
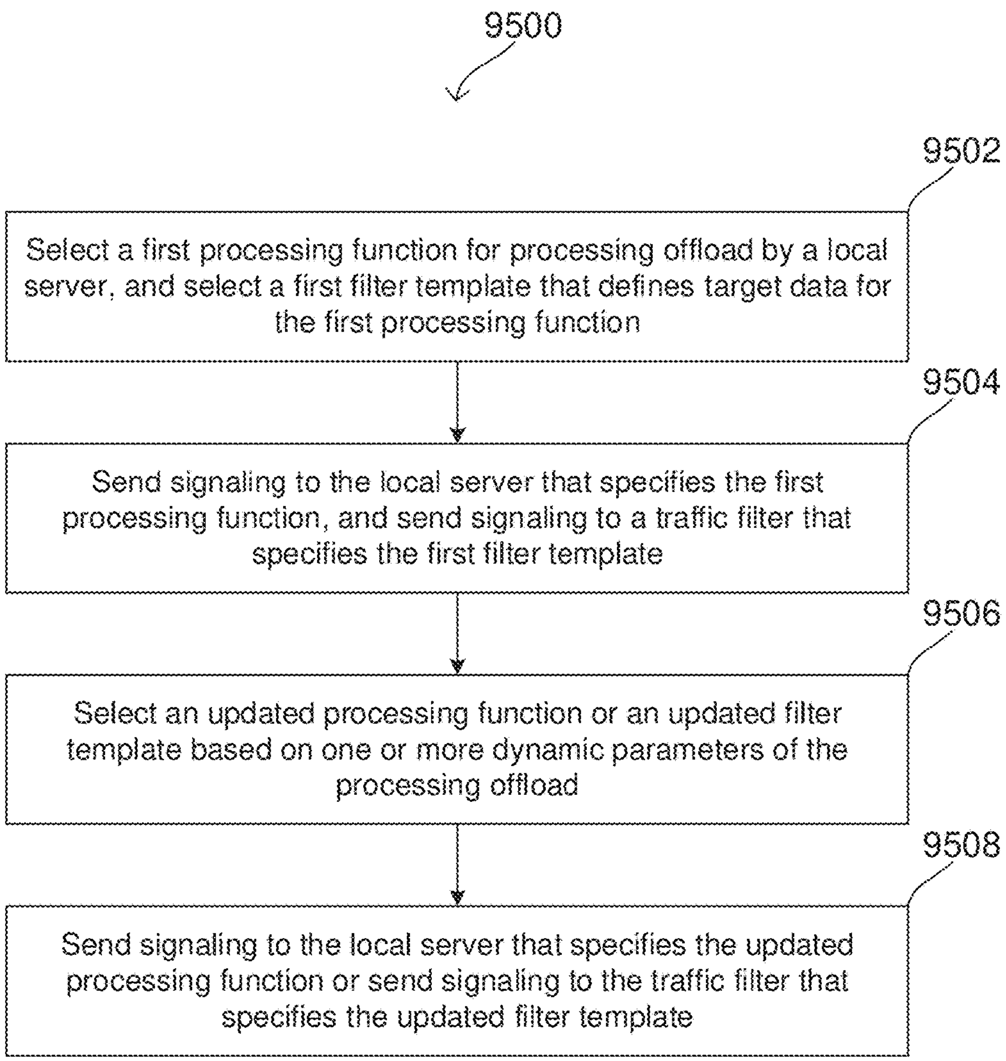
FIGS. 95 and 96 show exemplary methods for execution at a cloud server according to some aspects

FIG. 95 shows exemplary method 9500 for execution at a cloud server according to some aspects. As shown in FIG. 95, method 9500 includes selecting a first processing function for processing offload by a local server, and selecting a first filter template that defines target data for the first processing function (9502), sending signaling to the local server that specifies the first processing function, and sending signaling to a traffic filter that specifies the first filter template (9504), selecting an updated processing function or an updated filter template based on one or more dynamic parameters of the processing offload (9506), and sending signaling to the local server that specifies the updated processing function or sending signaling to the traffic filter that specifies the updated filter template (9508).

Figure 96:
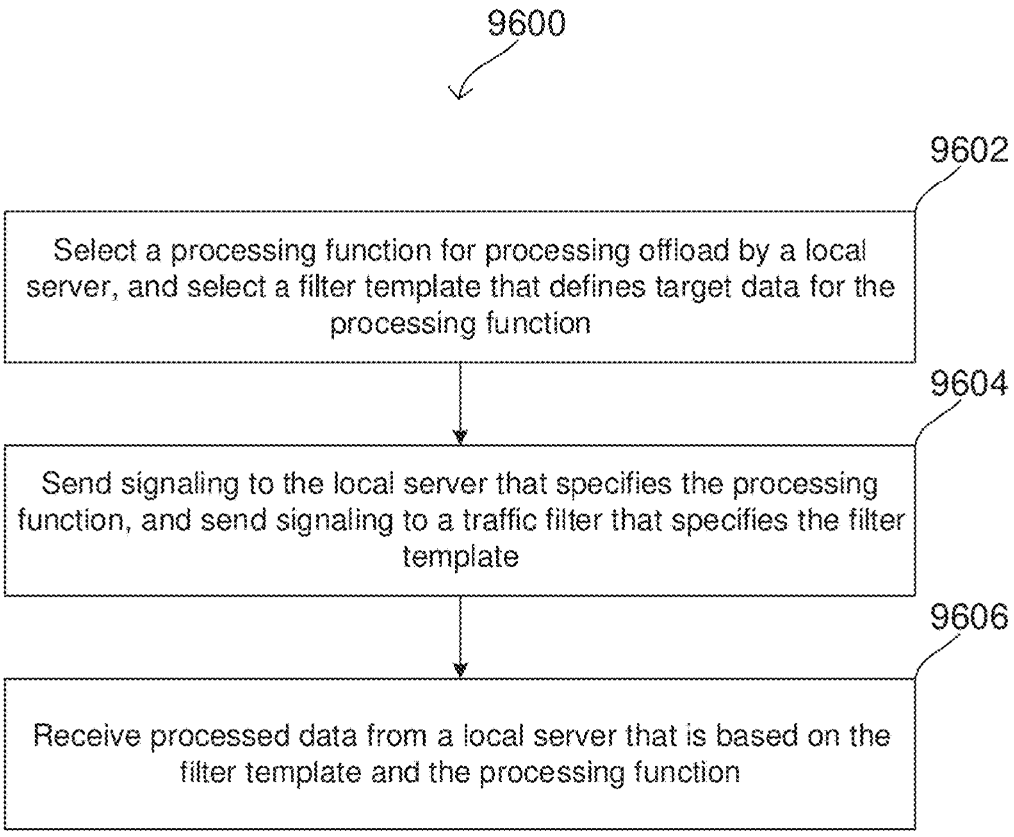

FIG. 96 shows exemplary method 9600 for execution at a cloud server according to some aspects. As shown in FIG. 96, method 9600 includes selecting a processing function for processing offload by a local server, and selecting a filter template that defines target data for the processing function (9602), sending signaling to the local server that specifies the processing function, and sending signaling to a traffic filter that specifies the filter template (9604), and receiving processed data from a local server that is based on the filter template and the processing function (9606).

In one or more further exemplary aspects of the disclosure, one or more of the features described above in reference to FIGS. 80-89 may be further incorporated into any of methods 9000-9600.

Computationally-Aware Cell Association

The introduction of small cells into existing mobile broadband networks has yielded various heterogeneous network (HetNet) architectures. One example is a two-tier heterogeneous network that includes a first tier of macro network access nodes (e.g., macro cells or macro base stations) and a second tier of micro base stations (e.g., small cells, femtocells, home and eNodeBs).

Mobile broadband networks have also begun to incorporate edge computing services to help support application layer functions. For example, Mobile Edge Computing (MEC) servers can be deployed at or near network access nodes (e.g., co-located with a network access node). These MEC servers can add extra processing and/or storage for both terminal devices and network access nodes to use. For example, a particular terminal device application running at a terminal device can interface with a peer application hosted at a MEC server, where the peer application may perform processing for the terminal device application. For example, in an uplink case, the terminal device application may send data to the peer application at the MEC server, which may then perform processing on the data according to the particular type of application. In a downlink case, the peer application at the MEC server may receive data (e.g., from a core or internet network) and may process the data before sending it to the terminal device application. A terminal device associated with a particular network access node can therefore have the co-located MEC server perform application layer processing for its own terminal device applications.

These terminal device applications may have different data rate and computational capacity demands depending on the type of application. For example, object recognition algorithms based on cameras and sensors at a vehicular terminal device may involve a considerable amount of uplink data transfer as well as a large amount of processing. Such applications may therefore have high uplink data rate and computational capacity demands. Other applications like data sharing applications (e.g., for sharing map or environment data between a fleet of terminal devices) may have high uplink and downlink data rate demands but not necessarily have high computational capacity demands. Another example is predictive analysis algorithms like those used for vehicular collision avoidance, which may have low data rate demands but high computational capacity demands.

Terminal devices may use the MEC servers co-located with their serving network access node to run the peer application counterpart to its terminal device application. However, the data rate and computational capacities of network access nodes may not be universal in some cases. For example, some network access nodes may have strong channels (e.g., high SINR) with a given terminal device, and may therefore be able to support terminal device applications with higher data rate demands (as the terminal devices may be able to transfer data to the co-located MEC servers at a high rate). Some network access nodes may also be co-located with MEC servers that have higher computational capacity than others, and may therefore be better suited to supporting terminal device applications with higher computational capacity demands.

These disparities between the capabilities of network access nodes can arise in any type of network, and can be particularly prominent in heterogeneous networks. For example, in a two-tier heterogeneous network with macro and micro network access nodes, macro network access nodes may be deployed at cell sites with large cabinet areas that can house large MEC servers with high computational capacity. In contrast, the smaller scale of micro network access nodes may limit the size of their co-located MEC servers, and the macro MEC servers (co-located with macro network access nodes) may consequently have greater computational capacity than the micro MEC servers (co-located with micro network access nodes). These disparities can also be seen in non-tiered network cases, or when the various network access nodes in a given tier have different capabilities.

Accordingly, as recognized by this disclosure, there may be certain scenarios where the demands of a terminal device application may make certain network access nodes (e.g., a certain tier of network access nodes, or certain individual network access nodes) more suitable for the terminal device application than others. However, the existent cell association procedures (i.e., techniques to select which network access nodes to associate with) focus primarily on radio propagation criteria. For example, some cell association procedures focus on the received signal power (e.g., received signal strength), such as where a terminal device is configured to associate with the network access node corresponding to the highest received signal power (or, alternatively, the first detected network access node providing a received signal power greater than a minimum threshold). Accordingly, even if a terminal device is executing a terminal device application with certain data rate/computational capacity demands, the cell association procedure may fail to consider whether network access nodes are co-located with MEC servers that can meet the application demands.

Accordingly, some aspects provide a cell association function that considers data rate and computational capacity demands of terminal device applications when selecting network access nodes for a terminal device to associate with. This can be particularly advantageous in cases where MEC servers have different computational capacities, as this may render some network access nodes (e.g., co-located with high capacity MEC servers) better choices than others. This cell association function can also consider the differing uplink and downlink demands of terminal device applications, and can possibly select a different uplink network access node and downlink network access node for the terminal device (e.g., uplink and downlink decoupling). This can be technically advantageous, for example, to provide a radio access connection to a terminal device application that is able to meet its data rate and computational capacity demands. This can in turn help reduce or avoid scenarios where a terminal device application suffers from excessive latency or insufficient data rate.

Figure 97:
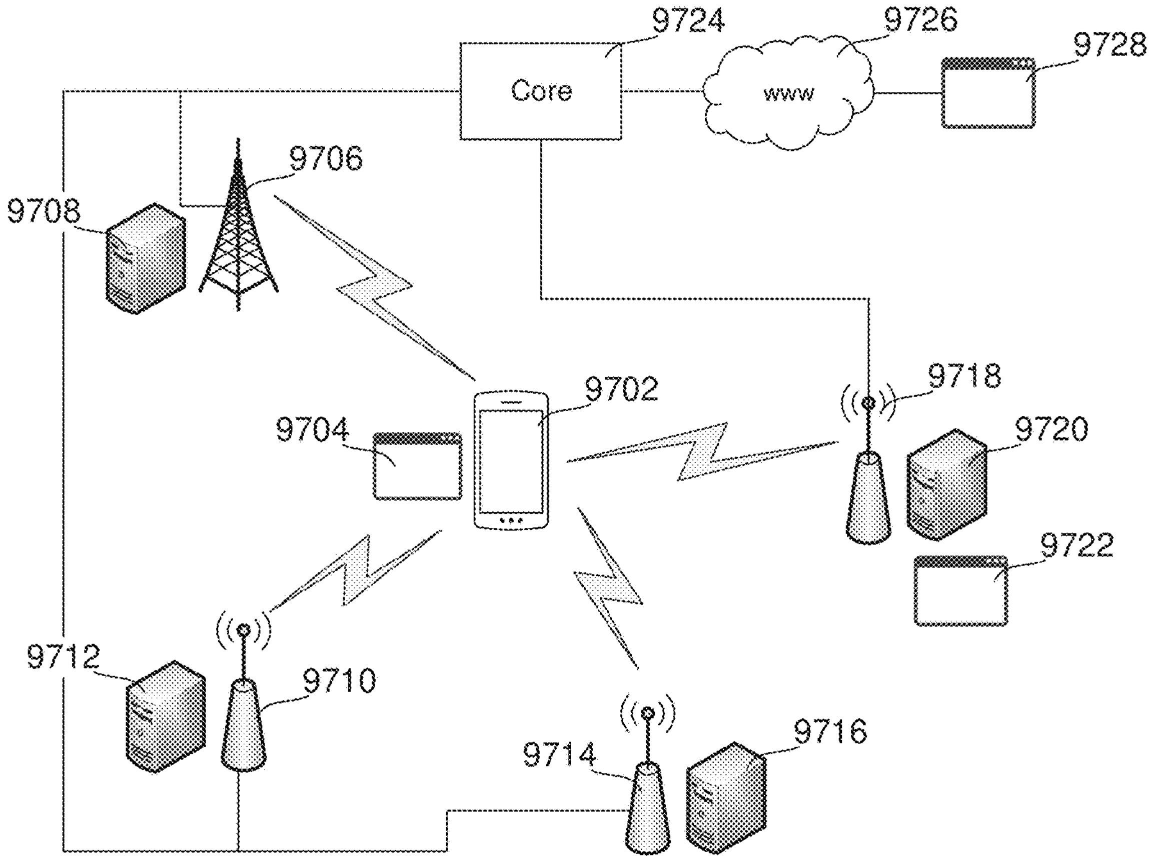
FIG. 97 shows an exemplary network configuration for a cell association function according to some aspects.

FIG. 97 shows an exemplary network configuration related to the cell association function according to some aspects. As shown in FIG. 97, terminal device 9702 (e.g., handheld, vehicular, stationary, or any type of terminal device) may be running terminal device application 9704 (e.g., executed by an application processor of terminal device 9702 as part of an application layer). Various network access nodes may be within the vicinity of terminal device 9702. For example, as shown in FIG. 97, macro network access node 9706, micro network access node 9710, micro network access node 9714, and micro network access node 9718 may be located within the vicinity of terminal device 9702. The example of FIG. 97 therefore shows a two-tiered network: a first tier of macro network access nodes (including macro network access node 9706) and a second tier of micro network access nodes (including micro network access node 9710, micro network access node 9714, and micro network access node 9718). The number of network access nodes of each shown tier in FIG. 97 is exemplary, and there can be any number of first tier network access nodes (macro network access node) and any number of second tier network access nodes (micro network access nodes, also known as femtocells). The locations of the first and second tier network access nodes can be respectively obtained by the independent homogeneous point-processes $\Phi_M$ (for macro network access nodes) and $\Phi_F$ (for micro network access nodes/femtocells). These point processes $\Phi_M$ and $\Phi_F$ can be based on the respective density parameters $\lambda_M$ and $\lambda_F$, where density parameter $\lambda_k$ gives the number of tier-k, k={M,F} network access nodes deployed per unit area. While FIG. 97 shows only a single terminal device, this is only for ease of exposition, and there may also be a plurality of randomly placed terminal devices with positions governed by independent homogeneous point process $\Phi_U$ based on density parameter $\lambda_U$.

In the example of FIG. 97, the various first and second tier network access nodes may have co-located MEC servers. In particular, macro network access node 9706 may have macro MEC server 9708, micro network access node 9710 may have micro MEC server 9712, micro network access node 9714 may have micro MEC server 9716, and micro network access node 9718 may have micro MEC server 9720. These MEC servers may be available for terminal devices to offload processing for terminal device applications. For example, as shown in FIG. 97, micro MEC server 9720 may host peer application 9722, which may be a counterpart application to terminal device application 9704. Accordingly, terminal device 9702 may offload processing to micro MEC server 9720, which micro MEC server 9720 may perform in the form of peer application 9722. In some aspects, peer application 9722 may be the application layer end point. In some aspects, terminal device application 9704 and host peer application 9722 may also be linked with remote application 9728, which may be executed within internet network 9726 (to which micro network access node 9718 interfaces via core network 9724). In some aspects, macro MEC server 9708, micro MEC server 9712, micro MEC server 9716, and micro MEC server 9720 may run on top of a virtualized environment, such as together with Network Function Virtualization (NFV) functions (e.g., sharing the same cloud resources).

As previously introduced, in some aspects the macro MEC servers co-located with macro network access nodes may have greater computational capacity than the micro MEC servers co-located with micro network access nodes. For example, the computational capacity (e.g., total processing power) of macro MEC servers can be denoted as $C_M$ (e.g., expressed in CPU cycles/second) while the computational capacity of micro MEC servers can be denoted as $C_F$, where $C_M > C_F$. This example assumes that the computational capacity of macro MEC servers is uniform (e.g., all macro MEC servers have the same computational capacity $C_M$) and that the computational capacity of micro MEC servers is likewise uniform (e.g., all micro MEC servers have the same computational capacity $C_F$). In some aspects, macro and micro network access nodes may also exhibit other inter-tier disparities, such as where the total transmit power $P_M$ of a macro network access node is greater than the total transmit power $P_F$ of a micro network access node.

In addition to this tiered case that assumes uniform capabilities in a given tier, there may be other cases where different network access nodes have different capabilities. For example, in some tiered cases, the network access nodes in a given tier may have different transmit power and/or computational capacity capabilities. Network access nodes in non-tiered cases may similarly exhibit individual transmit power and/or computational capacity capabilities.

Depending on the type of application, terminal device application 9704 may have certain data rate and computational capacity demands. For example, if terminal device application 9704 transmits or receives a considerable amount of data, the radio access connection of terminal device 9702 may be able to support the data rate demands of terminal device 9704 if it has sufficient SINR. Similarly, if terminal device application 9704 involves a considerable amount of processing (e.g., in the form of peer application 9722), the MEC server that is hosting peer application 9722 may be able to support the computational capacity demands if it has sufficient computational capacity.

Accordingly, in various aspects, the cell association function that decides on cell associations for terminal device 9702 may bias the cell association towards a particular network access node over others based on the relative data rate and computational capacity capabilities of the network access nodes and their co-located MEC hosts, respectively. In particular, the cell association function may, for example, use bias values (e.g., precomputed bias value obtained by a bias control server, as further detailed below) assigned to the network access nodes that reflect the capability of the network access nodes to meet the data rate and computational capacity demands of terminal device application 9704. As further described below, the cell association function may use these bias values to adjust the received powers of the network access nodes as seen at the terminal device (e.g., measured or estimated received power), and may then use the resulting biased received powers to select a network access node for the terminal device to associate with. As the cell association function uses the bias values as part of the selection, the cell association function can select for association a network access node that can meet an average (e.g., in the spatial deployment domain) data rate performance, and that has a MEC server that can provide an average (e.g., in the spatial deployment domain) computational performance (e.g., in floating point operations per second (FLOPs), hence, satisfying a total processing delay constraint (e.g., in seconds).

Figure 98:
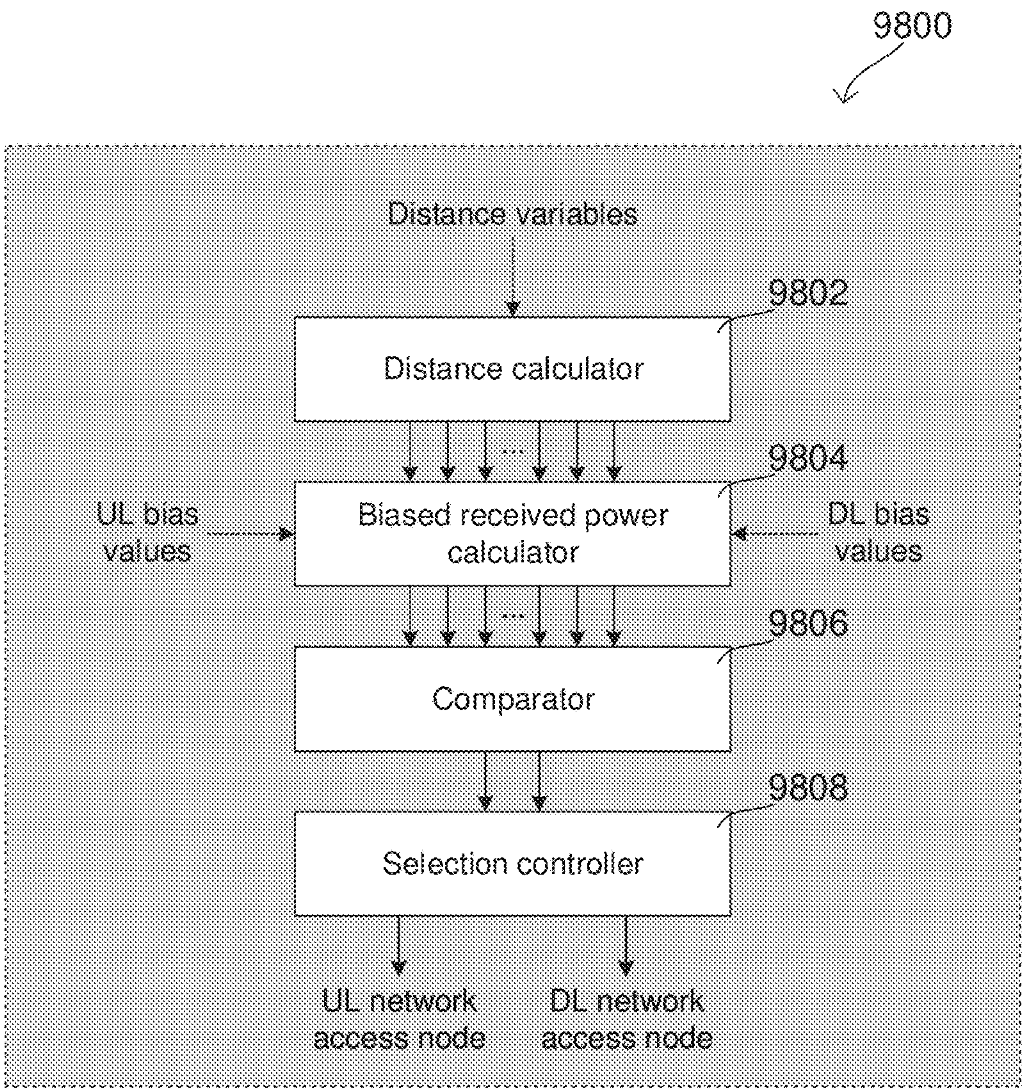
FIG. 98 shows an exemplary internal configuration of cell association controller according to some aspects.

FIG. 98 shows an exemplary internal configuration of cell association controller 9800 according to some aspects. Cell association controller 9800 may be configured to execute the cell association function and select target network access nodes for a terminal device to associate with. In some aspects, cell association controller 9800 may be configured to select a single network access node for the terminal device to associate with (e.g., to use in both the uplink and downlink directions). In some aspects, cell association controller 9800 may be configured to select an uplink network access node and a downlink network access node for the terminal device to associate with.

In some aspects, the cell association function may be executed at terminal device 9702. This can be applicable, for example, in cell selection cases, where terminal device 9702 executes the cell association function to select a network access node (e.g., a downlink network access node) to camp on during radio idle mode. In these aspects, terminal device 9702 may be configured in the manner of terminal device 102 of FIG. 2, and may therefore include antenna system 202, RF transceiver 204, baseband modem 206, application processor 212, and memory 214. As previously described regarding FIG. 2, protocol controller 210 may be configured to handle protocol stack functions for terminal device 102. Accordingly, protocol controller 210 may include cell association controller 9800 as an internal component. When terminal device 102 is selecting a network access node to associate with, cell association controller 9800 may execute the cell association function (e.g., as part of the terminal device protocol stack) to determine a target network access node for terminal device 102 to associate with. Protocol controller 210 may then associate with the target network access node (e.g., by camping on the target network access node using antenna system 202, RF transceiver 204, and digital signal processor 208 to receive signals from the target network access node). Application processor 212 of terminal device 102 may then establish a signaling connection with the MEC server co-located with the target network access node, and may instantiate peer application 9722 at the MEC server. Application processor 212 may then run terminal device application 9704, and may send and receive data with peer application 9722 (running on the co-located MEC server) via the target network access node.

In some aspects, the cell association function can be executed at the network. For example, a network access node or core network node can execute the cell association function to select a target network access node, and can then transmit signaling to terminal device 9702 that specifies the target network access node. In an example where the cell association function is executed at a network access node, the network access node may be configured in the manner of network access node 110 of FIG. 3. The network access node may therefore include antenna system 302, radio transceiver 304, and baseband subsystem 306. In this example, cell association controller 9800 may be an internal component of protocol controller 310, and may therefore execute the cell association function as part of the network access node protocol stack. For example, the network access node may initially be serving a particular terminal device, such as terminal device 9702. When terminal device 9702 eventually becomes eligible for handover to another network access node, cell association controller 9800 may execute the cell association function to select a target network access node for terminal device 9702 to handover to. Cell association controller 9800 may then report the target network access node to protocol controller 310 of the network access node, which may then send signaling to terminal device 9702 that identifies the target network access node. Protocol controller 210 of terminal device 9702 may receive this signaling and subsequently perform a handover to the target network access node.

In an example where the cell association function is executed in the core network, cell association controller 9800 may be deployed as a core network server. For example, with reference to FIG. 97, cell association controller 9800 may be positioned within core network 9724. Cell association controller 9800 may then execute the cell association function to select target network access nodes for terminal devices to handover to. In an example where cell association controller 9800 selects a target network access node for terminal device 9702 to handover to, cell association controller 9800 may send signaling to terminal device 9702 (e.g., via a radio access connection provided by a network access node) that identifies the target network access node. Protocol controller 210 of terminal device 9702 may receive this signaling and subsequently perform a handover to the target network access node.

There are therefore different options in terms of the placement of cell association controller 9800 in a given network, such as the exemplary options described herein The operation of cell association controller 9800 described below is considered applicable for any of these options, regardless of the specific placement of cell association controller 9800.

As previously indicated, the cell association function executed by cell association controller 9800 may consider the application demands (e.g., data rate and computational capacity) of terminal device application 9704 when considering which target network access nodes to select for terminal device 9702. In particular, when terminal device 9702 is operating in a multi-tiered heterogeneous network, the nearby network access nodes may have different capabilities based on their tier (e.g., where the macro tier has a higher computational capacity $C_M$ than the computational capacity $C_F$ of the micro tier), which may render certain tiers better for certain terminal device applications than others. The cell association function may therefore bias selection of the target network access nodes to certain tiers jointly based on the capabilities of the tiers and the application demands of terminal device application 9704.

For example, terminal device 9702 may be located at the origin of a two-dimensional plane, and may be running terminal device application 9704. Terminal device 9702 may offload a processing task of $c_{UE}$ CPU cycles to a MEC server (e.g., a macro MEC server or a micro MEC server) in the form of a peer application to terminal device application 9704. As previously indicated, various terminal device applications may have differing data rate and computational capacity demands based on the specific type of application. The data rate demands can further be divided into downlink data rate demands and uplink data rate demands. For example, a particular terminal device application may have certain uplink data rate demands related to the amount of data it transfers in the uplink direction to the peer application running on a MEC server, and may also have certain downlink data rate demands related to the amount of data it receives in the downlink direction from the peer application running on the MEC server. The computational capacity demands of the terminal device application may relate to the processing latency of the processing by the peer application.

Accordingly, using the uplink demands as an example, terminal device application 9704 may be characterized by an uplink SINR demand for data transmission $\gamma_{UL,th}$ (e.g., in decibels—(dB)) and a total delay demand $t_{delay,th}$ (e.g., in seconds) related to the execution of the offloaded task. Further developing this model, the total delay demand can be expressed as $$t_{delay} = t_{delay}^{exe} + t_{delay}^{trans} \tag{1}$$

$$\text{where } t_{delay}^{exe} = \frac{c_{UE}}{\kappa C_l}(\text{seconds})$$

denotes the time for the peer application (e.g., peer application 9722) to execute at a MEC server of tier-l (where l={M,F} for the macro and micro/femtocells), K represents the fraction of available computational resources at the MEC server, and $C_l$ (in CPU cycles/second) denotes the computational capacity of the MEC server. Furthermore, $$t_{delay}^{trans}$$

represents the radio transmission delay, which can be expressed $$t_{delay}^{trans} = \frac{d_{UE}}{R_{l,UL}R,\ l,\ UL}(\text{seconds})$$

where $d_{UE}$ stands for the number of input bits to be transmitted (e.g., the code to be executed at the MEC server) and $R_{l,UL}$ represents the uplink data rate when terminal device 9702 is associated with a tier-l network access node (e.g., macro or micro network access node).

This uplink data rate $R_{l,UL}$ can further be expressed as $$R_{l,UL} = W_l \log_2(1 + \gamma_{UL,th}) Prob\{SINR_{l,UL} > \gamma_{UL,th}\} \tag{2}$$

where $W_l$ (Hertz) denotes the bandwidth allocated to tier-l network access nodes and the probability term Prob $\{SINR_{l,UL} > \gamma_{UL,th}\}$ is the probability with which terminal device 9702 can achieve the targeted SINR demand $\gamma_{UL,th}$. This probability term is also known as the coverage probability in various stochastic geometry literatures.

Given these uplink demands $\gamma_{UL,th}$ and $t_{delay,th}$ of terminal device application 9704, certain tiers of network access nodes may be better suited for terminal device 9702 to be associated with. For example, a tier of network access nodes with a dense distribution according to density parameter $\lambda_l$ may be more likely to have network access nodes that are proximate to terminal device 9702, which can improve SINR and thus yield a higher data rate. In another example, a tier of network access nodes with a higher transmit power $P_l$ may also be able to yield higher SINRs and resulting data rates. Furthermore, a tier of network access nodes that are co-located with MEC servers with high computational capacity $C_l$ may be able to better support terminal device applications with strict delay demands $t_{delay,th}$.

Accordingly, given these various inter-tier differences, cell association controller 9800 may be configured to use precomputed bias to bias the received power of the network access nodes (e.g., the received signal strength from the network access nodes seen at the terminal device) in a given tier when considering the network access nodes for association. The bias value for a given tier may depend on whether (and to what degree) the capabilities of the network access nodes in the tier meet the data rate and latency demands of terminal device application 9704. Accordingly, a tier with a higher bias value can be considered to be a better candidate for association than tiers with lower bias values (e.g., may have data rate and/or computational capacity capabilities that are likely to meet the data rate and latency demands of terminal device application 9704). Depending on the relative bias values for each tier, cell association controller 9800 may bias, or 'weight,' the selection of a target network access node towards a particular tier. The bias value $B_l$ (dB) for each tier can be precomputed, and then provided to cell association controller 9800 for runtime execution of the cell association function. This is further described below.

As previously indicated, in some cases there may be individual disparities between the capabilities of network access nodes (e.g., within tiers in a tiered case, or between individual network access nodes in a non-tiered case). Accordingly, cell association controller 9800 may be configured, for example, to use precomputed bias values that are assigned to specific network access nodes, where various network access nodes have different bias values based on their individual data rate and computational capacity capabilities.

This use of the bias values by cell association controller 9800 will therefore be described first, followed by a description that details how the bias values can be precomputed. Accordingly, the description immediately below assumes that the bias values (e.g., per tier, or per individual network access node) are precomputed and available to cell association controller 9800.

As shown in FIG. 98, cell association controller 9800 may include distance determiner 9802, biased received power determiner 9804, comparator 9806, and selection controller 9808. In some aspects, the functionality of cell association controller 9800 described below may be embodied as executable instructions. Accordingly, distance determiner 9802, biased received power determiner 9804, comparator 9806, and selection controller 9808 may each be an instruction set that defines their respective operations in program code. Cell association controller 9800 may therefore be a processor configured to execute each of distance determiner 9802, biased received power determiner 9804, comparator 9806, and selection controller 9808. In other aspects, one or more of distance determiner 9802, biased received power determiner 9804, comparator 9806, and selection controller 9808 may be separate processors configured to execute instruction sets that define their respective functionality as program code. In other aspects distance determiner 9802, biased received power determiner 9804, comparator 9806, and selection controller 9808 may be digital hardware circuitry components that each include digital hardware logic that defines their respective functionalities.

As previously introduced, cell association controller 9800 may be configured to, for a given terminal device, determine target network access nodes for the terminal device (running a terminal device application) to associate with. For example, cell association controller 9800 may be configured to use uplink and downlink bias values to determine biased uplink and downlink received powers for a plurality of candidate network access nodes, and to select an uplink network access node and a downlink network access node for the terminal device to associate with based on the biased uplink and downlink received powers. In some aspects, cell association controller 9800 may also select which of the uplink and/or the downlink network access node to host the peer application on.

Figure 99:
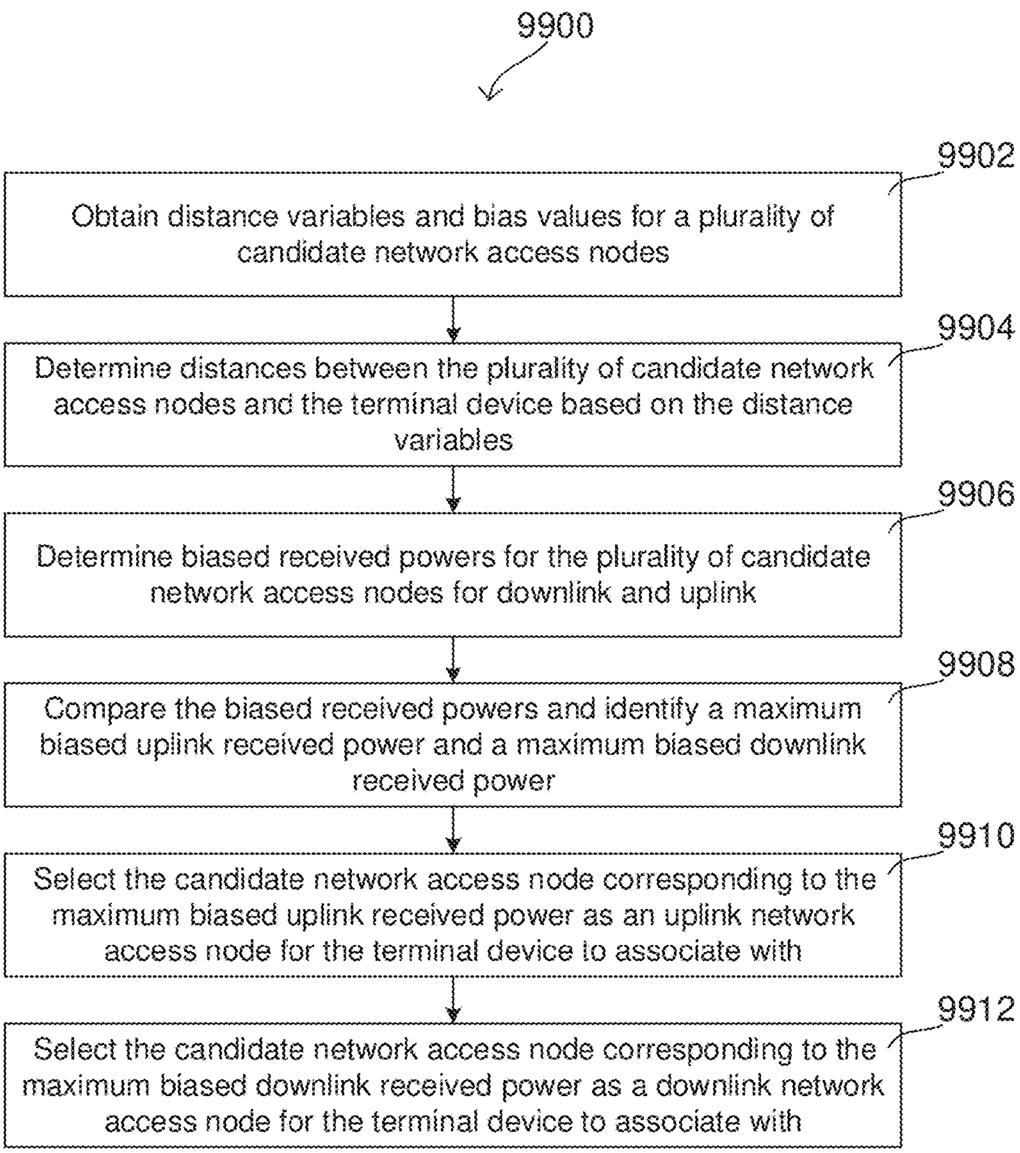
FIGS. 99 and 100 show exemplary procedures for a cell association function according to some aspects.

FIG. 99 shows exemplary flow chart 9900 according to some aspects, which illustrates this procedure used by cell association controller 9800 to determine the target network access nodes for a given terminal device to associate with.

As shown in FIG. 99, cell association controller 9800 may first obtain distance variables and bias values for a plurality of candidate network access nodes in stage 9902. In some aspects, the distance variables may be location information that can be used to determine the distance between the plurality of candidate network access nodes and terminal device 9702. For instance, using FIG. 97 as an example, cell association controller 9800 may receive the locations of network access nodes 9706, 9710, 9714, and 9718 as the distance variables of the plurality of candidate network access nodes in stage 9902. In some aspects where cell association controller 9800 is located in the network (e.g., at a network access node or at a core network server), cell association controller 9800 may query a network database that stores the locations of network access nodes, which may send the locations of the plurality of candidate network access nodes to cell association controller 9800. In some aspects where cell association controller 9800 is located in a terminal device, e.g., terminal device 9702, cell association controller 9800 may request the locations from a network database, which may then send the locations to terminal device 9702 over the radio access network. In some aspects, the distance variables may also include the location of terminal device 9702 (which can be used to determine the distance between the plurality of candidate network access nodes and terminal device 9702). Accordingly, if cell association controller 9800 is located in the network, terminal device 9702 may determine and report its position to cell association controller 9800. If cell association controller 9800 is located in terminal device 9702, the current position of terminal device 9702 will be locally available (e.g., by a geo-position sensor of terminal device 9702).

In other aspects, the distance variables may be actual radio measurements. For example, the distance variables may be received power measurements obtained by terminal device 9702 for the plurality of candidate network access nodes (e.g., by terminal device 9702 measuring the received power of signals received from the plurality of candidate network access nodes) and/or may be received power measurements obtained by the plurality of candidate network access nodes for terminal device 9702 (e.g., by the plurality of candidate network access nodes measuring the received power of signals received from terminal device 9702). Terminal device 9702 and/or the plurality of candidate network access nodes may obtain these received power measurements and send them to cell association controller 9800.

With reference to the bias values that cell association controller 9800 receives in stage 9902, in some aspects these bias values may include uplink and downlink bias values that are assigned to network access nodes per tier (e.g., per-tier bias values). In other aspects, the bias values may include uplink and downlink bias values that are unique to individual network access nodes (e.g., per-node bias values). Starting with the per-tier case using the example of FIG. 97, the bias values may include uplink bias values $B_{M,UL}(\gamma_{UL,th}, t_{delay,th})$ for macro network access nodes (e.g., network access nodes in the macro tier, including macro network access node 9706), downlink bias values $B_{M,DL}(\gamma_{DL,th}, t_{delay,th})$ for macro network access nodes, uplink bias values $B_{F,UL}(\gamma_{UL,th}, t_{delay,th})$ for micro network access nodes (e.g., network access nodes in the micro tier, including micro network access nodes 9710, 9714, and 9718), and downlink bias values $B_{F,DL}(\gamma_{DL,th}, t_{delay,th})$ for micro network access nodes. As denoted by the data rate and latency demands $\gamma_{DL,th}/\gamma_{UL,th}$ and $t_{delay,th}$ in the parentheses, the uplink and downlink bias values may be precomputed specifically based on the application demands of terminal device application 9704. These parentheses terms are dropped in the following description for simplicity.

Accordingly, when cell association controller 9800 executes the cell association function for another terminal device application (e.g., for terminal device 9702, or for another terminal device that is running a different terminal device application with different data rate and latency demands), the bias values may be different. For example, if the other terminal device application has higher uplink data rate demands than terminal device application 9704, the uplink bias values used by cell association controller 9800 may be higher for tiers of network access nodes that have higher data rate capabilities (and vice versa for tiers of network access nodes that have lower data rate capabilities). These differences in bias values may likewise hold for terminal device applications with lower uplink data rate demands, terminal device applications with higher/lower downlink data rate demands, and terminal device applications with higher/lower latency demands. In such cases, the uplink and downlink bias values used by cell association controller 9800 may be relatively higher for network access nodes that are better-suited to support the terminal device application than for network access nodes that are lesser-suited to support the terminal device application.

In this per-tier case, it may be assumed that all of the network access nodes in a given tier (e.g., located anywhere, or all of the network access nodes in particular tier that are located within a specific geographic area) have uniform data rate and computational capacity capabilities, and therefore have the same uplink and downlink bias values (e.g., the network access nodes in the macro tier all have bias values $B_{M,DL}$ and $B_{M,UL}$, and the network access nodes in the micro tier all have bias values $B_{F,DL}$ and $B_{F,UL}$). While the bias values within a given tier are the same, different tiers may be assumed to have different capabilities, and thus have different bias values. This can be expanded to other cases where there are more than two-tiers, and the network access nodes in each tier likewise have uniform uplink and downlink bias values. The bias values may therefore be based on the capability of the network access nodes in each tier to meet the data rate and latency demands of the terminal device application (e.g., to support the terminal device application by running the peer application).

In contrast, in the per-node case, network access nodes may have individual bias values. For example, a first network access node of the plurality of candidate network access nodes may have bias values $B_{1,UL}$ and $B_{1,ULDL}$, a second network access node of the plurality of candidate network access nodes may have bias values $B_{2,UL}$ and $B_{2,ULDL}$, a third network access node of the plurality of candidate network access nodes may have bias values $B_{3,UL}$ and $B_{3,ULDL}$, and so forth. This can be the case where, for example, there are not any tier assignments, or where there are tier assignments but the data rate and computational capabilities are not uniform across the network access nodes of each tier. The individual bias values assigned to each given candidate network access node may, therefore, be based on the individual data rate and computational capacities of the candidate network access node to meet the data rate and latency demands of the terminal device application (e.g., to support the terminal device application).

In either case of per-tier or per-node bias values, each of the plurality of candidate network access nodes may correspond to specific bias values. For example, each candidate network access node may either belong to a particular tier to which bias values are uniformly assigned or may be individually assigned bias values unique to the candidate network access node. Accordingly, in either case cell association controller 9800 may be able to identify the uplink and downlink bias values for any particular candidate network access node.

Cell association controller 9800 may use this information obtained in stage 9902 as input data for the cell association function. As shown in FIG. 98, distance determiner 9802 may receive the distance variables of the terminal device and the plurality of candidate network access nodes as its input while biased received power determiner 9804 may receive the uplink and downlink bias values as its input. Then, in stage 9904, distance determiner 9802 may determine the distances between the plurality of candidate network access nodes and the terminal device based on the distance variables. For example, if the distance variables include locations of terminal device 9702 and the plurality of candidate network access nodes, distance determiner 9802 may perform a two-point distance calculation using the location of the terminal device and each of the plurality of candidate network access nodes in stage 9904, and obtain the distance between the terminal device and each of the plurality of candidate network access nodes. Using the example of FIG. 97, distance determiner 9802 may determine the distance between terminal device 9702 and each of network access nodes 9706, 9710, 9714, and 9718. In another example, if the distance variables include radio measurements such as received power measurements (e.g., RSSI), distance determiner 9802 may be configured to determine the distance between terminal device 9702 and the plurality of candidate network access nodes by estimating the distance based on the received power measurements (e.g., using a free-space pathloss model to estimate a distance based on a received power).

Distance determiner 9802 may then provide the distances to biased received power determiner 9804. As shown in FIG. 98, biased received power determiner 9804 may also receive the uplink bias values and downlink bias values for the plurality of candidate network access nodes (e.g., per-tier or per-node bias values). Biased received power determiner 9804 may then be configured to determine biased received powers for the plurality of candidate network access nodes for uplink and downlink in stage 9906.

For example, in some aspects, biased received power determiner 9804 may be configured to determine a biased receive power for each of the plurality of candidate network access nodes for the uplink and downlink. For example, for a given candidate network access node n, biased received power determiner 9804 may identify its uplink bias value $B_{n,UL}$ and downlink bias value $B_{n,DL}$. The bias values $B_{n,UL}$ and $B_{n,DL}$ can be either a per-tier bias value (that is uniform across network access nodes in a tier to which the candidate network access node n) or a per-node bias value (that is unique to the candidate network access node n). Biased received power determiner 9804 may then determine a biased downlink received power for the candidate network access node by calculating $B_{n,DL}\|x^*\|^{-\alpha}$, where $\alpha$ is the pathloss coefficient (e.g. $\alpha$=3.8 or 4 for free-space propagation), $\|x^*\|$ is the distance between the candidate network access node and terminal device 9702 (assuming terminal device 9702 is at the origin and x gives the position of the candidate network access node on a two-dimensional plane, e.g., where $x \in \Phi_k$ is a point x of a tier-k network access node is located in a tiered case), and $B_{n,DL}$ is the shortened version of downlink bias value $B_{n,DL}(\gamma_{DL,th}, t_{delay,th})$ that is based on the downlink data rate demand $\gamma_{DL,th}$ and the latency demand $t_{delay,th}$ of terminal device application 9704. The term $\|x^*\|^{-\alpha}$ may therefore represent the received signal power (e.g., an estimated received signal power), and multiplying the received signal power by the bias value $B_{n,DL}$ may therefore yield a biased received signal power. Biased received power determiner 9804 may likewise determine a biased uplink received power for the candidate network access node by calculating $B_{n,UL}\|x^*\|^{-\alpha}$ using the uplink bias value $B_{n,UL}$ (short for $B_{n,UL}(\gamma_{UL,th}, t_{delay,th})$).

After determining the biased uplink and downlink received powers for the plurality of candidate network access nodes in stage 9906, biased received power determiner 9804 may provide the biased uplink and downlink received powers to comparator 9806. Comparator 9806 may then, in stage 9908, compare the biased uplink and downlink received powers to identify a maximum biased uplink received power and a maximum biased downlink received power. Comparator 9806 may perform this separately for uplink and downlink. For example, the comparator may compare the biased uplink received powers for the plurality of candidate network access nodes to identify a maximum biased uplink received power, and separately compare the biased downlink received powers for the plurality of candidate network access nodes to identify a maximum downlink biased received power.

After identifying the maximum biased uplink received power and the maximum biased downlink receive power, comparator 9806 may specify the maximum biased uplink and downlink received powers to selection controller 9808. Selection controller 9808 may then in stage 9910 select the candidate network access node corresponding to the maximum biased uplink received power as an uplink network access node for terminal device 9702 to associate with, and in stage 9912 select the candidate network access node corresponding to the maximum biased downlink received power as a downlink network access node for terminal device 9702 to associate with.

In some aspects, selection controller 9808 may then send control signaling to terminal device 9702 or to the radio access network (e.g., to a current serving network access node) that indicates the uplink and downlink network access nodes. Terminal device 9702 may then connect with the uplink and downlink network access nodes (e.g., via reselection or handover in coordination with the radio access network). Terminal device 9702 may subsequently instantiate peer application 9722 at the uplink and/or downlink network access nodes, and terminal device application 9704 may begin transmitting or receiving data with peer application 9722 via the uplink and/or downlink network access nodes.

The above description for FIGS. 98 and 99 can generally apply for per-tier and per-node bias values. In particular, as biased received power determiner 9804 can determine which uplink and downlink bias value corresponds to each of the plurality of candidate network access nodes, biased received power determiner 9804 can identify the appropriate bias values for use in determining the biased uplink and downlink received signal powers (e.g., by multiplying the received signal power (derived from the distance) by the bias value). Comparator 9806 may then compare the biased uplink received powers for each candidate network access node to identify a maximum uplink received power, and to compare the biased downlink received powers for each candidate network access node to identify a maximum downlink received power.

In some aspects where per-tier bias values are used, cell association controller 9800 may alternatively be configured to use specialized logic to select the uplink and downlink network access nodes. In particular, as the network access nodes in a given tier will share the same bias value (e.g., for uplink and downlink), the candidate network access node with the shortest distance to terminal device 9702 will have the highest biased received powers (e.g., in downlink and uplink, as the received power term $\|x^*\|^{-\alpha}$ will be the highest in the tier while the bias values will be the same).

Accordingly, in some aspects cell association controller 9800 may be configured to identify the candidate network access node in each tier with the shortest distance, determine the biased uplink and downlink received powers for these candidate network access nodes (e.g., determine the biased uplink and downlink received powers only for these candidate network access nodes), and then identify the uplink and downlink network access nodes from these biased uplink and downlink received powers.

Figure 100:
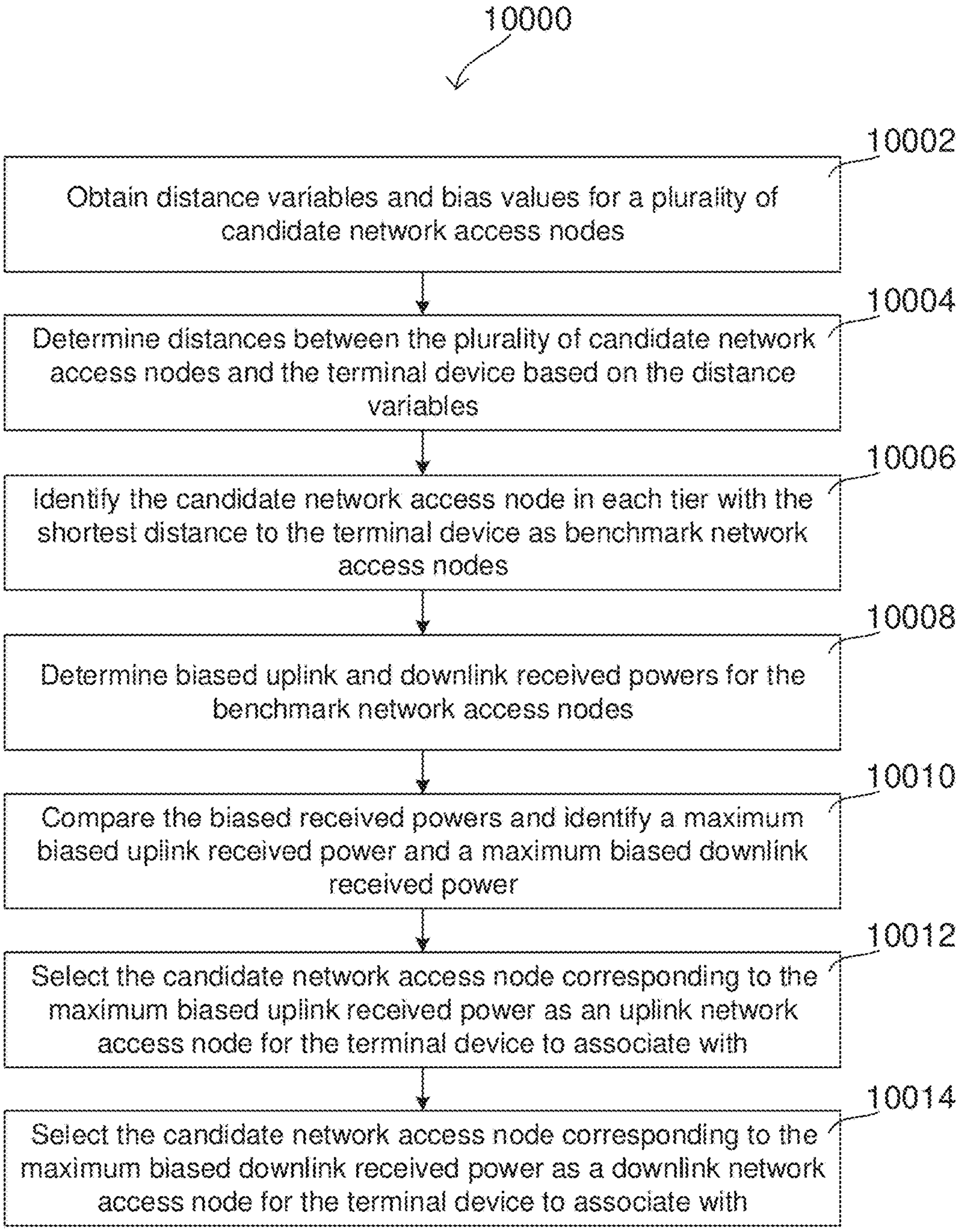

FIG. 100 shows exemplary flow chart 10000 according to some aspects, which illustrates an example of this specialized logic. Likewise to the case of flow chart 9900 in FIG. 99, cell association controller 9800 may be configured to execute the procedure of flow chart 10000 as part of the cell association function. As shown in FIG. 100, distance determiner 9802 may obtain distance variables for the plurality of candidate network access nodes and biased received power determiner 9804 may obtain bias values for the plurality of network access nodes in stage 10002. As this is a per-tier case, each tier of network access nodes may have an uplink bias value and a downlink bias value (e.g., that is shared between all network access nodes of a given tier). Accordingly, in some aspects biased received power determiner 9804 may obtain an uplink bias value and a downlink bias value for each tier in stage 10002.

Distance determiner 9802 may then determine distances between the plurality of candidate network access nodes and terminal device 9702 based on the distance variables in stage 10004. Distance determiner 9802 may perform stage 10004 in the same manner described above for stage 9904.

Distance determiner 9802 may then, in stage 10006, identify the candidate network access node in each tier that is at the shortest distance from terminal device 9702 as a benchmark network access node. As distance determiner 9802 performs this for each tier, distance determiner 9802 may identify one candidate network access node as a benchmark network access node per tier. For example, using point process $\Phi_k$ for the positions x of network access nodes in a given tier-k, distance determiner 9802 may be configured to identify $$\min_{x\in\Phi_k}\|x\|$$

(e.g., the network access node location x in $\Phi_k$ with the shortest distance to location of terminal device 9702 at the origin). Distance determiner 9802 may then take the candidate network access node for tier-k with position x satisfying $$\min_{x\in\Phi_k}\|x\|$$

as the benchmark network access node for tier-k. Distance calculator 9802 may then provide the distances for the benchmark network access nodes to biased received power determiner 9804 (and, for example, may not provide to comparator 9806 distances for the remaining candidate network access nodes that are not benchmark network access nodes).

Biased received power determiner 9804 may then determine biased uplink and downlink received powers for the benchmark network access nodes in stage 10008. Biased received power determiner 9804 may perform stage 10008 in the same manner described above for stage 9906. For example, for each benchmark network access node, biased received power determiner 9804 may identify which tier it belongs to, identify the uplink and downlink bias values for the tier, and determine a biased uplink and downlink received power based on the uplink and downlink bias values and the distance between the benchmark network access node and terminal device 9702. For example, biased received power determiner 9804 may determine the uplink biased receive power by calculating $B_{k,UL}\|x^*\|^{-\alpha}$ using the uplink bias value $B_{k,UL}$ for tier-k to which the benchmark candidate network access belongs and position x* of the benchmark network access node, and may determine downlink biased receive power by calculating $B_{k,DL}\|x^*\|^{-\alpha}$ using the downlink bias value $B_{k,DL}$ for tier-k and position x* of the benchmark network access node.

Biased received power determiner 9804 may then provide the biased uplink and downlink received powers for the benchmark network access nodes to comparator 9806. Comparator 9806 may then in stage 10010 compare the biased received powers and identify a maximum biased uplink received power and a maximum biased downlink received power. Comparator 9806 may provide these identified maximum biased uplink and downlink received powers to selection controller 9808. Selection controller 9808 may then select the candidate network access node (a benchmark network access node) corresponding to the maximum biased uplink received power as an uplink network access node for terminal device 9702 to associate with in stage 10012, and may also select the candidate network access node (a benchmark network access node) corresponding to the maximum biased downlink received power as a downlink network access node for terminal device 9702 to associate with in stage 10014.

Selection controller 9808 may then notify terminal device 9702 and/or the radio access network of the uplink and downlink network access nodes (e.g., by sending control signaling). Terminal device 9702 may then be able to connect to the uplink and downlink network access nodes and begin using their co-located MEC servers to host the peer application to terminal device application 9704.

Accordingly, even though a particular candidate network access node may be located closest to terminal device 9702 (e.g., have the smallest $\|x\|$ and thus the highest received signal power $\|x\|^{-\alpha}$), it may belong to a tier that has a lower bias value than other tiers (e.g., as the network access nodes of the other tiers may have data rate and/or computational capacity capabilities that better meet the application demands of terminal device application 9704) or may have a per-node bias value that is lower than those for other candidate network access nodes. Depending the case-specific distances and bias values, cell association controller 9800 can therefore ultimately select another candidate network access node as the uplink or downlink network access node (e.g., if the other candidate network access node has a bias value that causes its biased uplink or downlink received power to be larger).

Cell association controller 9800 may therefore bias selection of uplink and downlink network access nodes towards certain tiers and/or individual network access nodes that are better suited to support a particular terminal device application (e.g., that have data rate and/or computational capacity capabilities that meet the data rate and/or latency demands of the terminal device application). As previously indicated, the bias values may be precomputed for specific terminal device applications. In some cases, this biasing many enable cell association controller 9800 to select uplink and downlink network access nodes that meet the data rate and/or latency demands of the terminal device application. This may improve performance, as the terminal device may be able to run the terminal device application with a reduced probability of violating data rate and/or latency demands.

In a variation of flow chart 9900, in some aspects biased received power determiner 9804 may determine the biased uplink and downlink received powers based on actual received power measurements. For example, as previously indicated, in some aspects the distance variables may include radio measurements, such as received power measurements performed by terminal device 9702 for the plurality of candidate network access nodes or performed by the plurality of candidate network access nodes for terminal device 9702. Instead of estimating the distance based on the received power measurement and then determining a biased received power based on the estimated distance, distance calculator 17102 may provide the received power measurements to biased received power determiner 9804. Biased received power determiner 9804 may then determine the biased uplink and downlink received powers by applying the uplink and downlink bias values to the received power measurements. Cell association controller 9800 may use these biased uplink and downlink received powers in the same manner described above.

The below pseudocode describes a non-limiting example of the cell evaluation function in the uplink direction as executed cell association controller 9800. This example may relate to a per-node case, such as where individual network access nodes have unique bias values/capabilities. As this is the uplink direction, the uplink bias values $B_{l,UL}$ are used. Cell association controller 9800 can execute similar pseudocode for the downlink direction by using the downlink bias values $B_{l,DL}$ Input: $\gamma_{th}$, $t_{delay,th}$, // Parameters characterizing the QoS class
$N_1$, $N_2$, // Number of network access nodes for tier-1 and tier-2 at a given area
$C_1$, $C_2$ // Computational capacity of a M-MEC and a m-MEC server, respectively
Output: Index of associated network access node (macro or micro)
1. Compute $\{B_{1,UL}, B_{2,UL}\}$ // Design bias values for the two tiers which are QoS //class-dependent and computational capacity-aware
2 Compute distances $\{x_{j,I}\}$, I=1,2, j=1,..., $N_I$ // These distances coincide with the //locations of the network access nodes as the terminal //device is assumed to be located at the origin (0,0)
3. Assoc_BS := 0; // Initialization -continued

```
4. For (I=1:2) // Tier index
5.     For (j=1:N_I) // Index of network access node belonging to tier-I
6.         x* := x_j,I; // x* refers to the distance between terminal device and the
       //focused network access node
7.         If (CellRule( ) is true) then //cell association criterion focusing
               //on the j-th network access node of
           //tier-I (BS_j,I)
8.             Assoc_BS := BS_j,I;
9.             break; // Once criterion CellRule( ) is satisfied the "best"
       //access node for association is found
10.        End_if
11.    End_for
12. End_for
13. If (Assoc_BS == 0) then
14.    Outage := true;    //Because of either low BS deployment densities and/or
       //due to excessive QoS requirements γ_th and t_delay,th.    //In
other words, no MBS and no FBS will be able to    //satisfy the QoS
requirements
15. End_if
```

where the function CellRule( ) refers to the cell evaluation rule expressed as $$B_{I,DLUL}(\gamma_{DLUL,th}, t_{delay,th})\|x*\|^{-\alpha} \geq B_{k,DLUL}(\gamma_{DLUL,th}, t_{delay,th})\left\{\min_{x\in\Phi_k}\|x\|\right\}^{-\alpha} \quad (3)$$

The below pseudocode shows another non-limiting example of the logic that cell association controller 9800 can use to identify an uplink and/or downlink network access node for terminal device 9702 to associate with.

```
Input: N //number of network access nodes
  B_n //vector of bias values for each network access node BS_n, n=1:N
  X_n // vector of distances between terminal device and network access nodes
  P // initial benchmark biased receive power (can be set to zero, or set to a minimum    // value)
Assoc_BS = 0 //initialize network access selection to null
For n=1:N //loop over each of the N network access nodes
  if(B_n||X_n||^(-alpha) >= P) //check if biased received power for focused network access
    //node is greater than benchmark biased receive power
        Assoc_BS=B_n //if so, set the current value of the selected network access node
        //to be the focused network access node
        P= B_n||X_n||^(-alpha) //set the biased receive power for the focused network
      //access node as the new benchmark biased receive power.    //The
biased received power for the next focused network    //access node will therefore be
compared to this value
  end if
End for
If (Assoc_BS == 0) //check if any network access nodes were selected
  Outage = true //when P is initialized to some minimum value, and none of the
  //candidate BSs have biased receive power that is bigger than P,    //Assoc_BS will
be null. The function can then declare an outage event,    //as not network access node had
sufficient transmit power. Conversely,    //if any candidate network access node has biased
receive power bigger    //than P, it will be set as the new selected network access node (in the
                    //loop)
End If
```

As shown above, this pseudocode may initialize a benchmark biased received power P, which can be set to 0 or to another desired minimum value. The pseudocode may then loop over each candidate network access node and determine its biased received power based on its individual bias value. The pseudocode may then compare its biased received power to P. If the focused network access node has biased received power greater than or equal to P, the pseudocode may store the focused network access node as the selected network access node and store its biased received power as the new P. Once the pseudocode loops through all candidate network access nodes, it can check whether any candidate network access node is stored as the selected network access node (e.g., whether any candidate network access node had biased received power greater than P). If so, this selected network access node will be the candidate network access node with the highest biased received signal power. If not, the pseudocode can declare an outage event, as no candidate network access node had biased received power greater than P.

Figure 101:
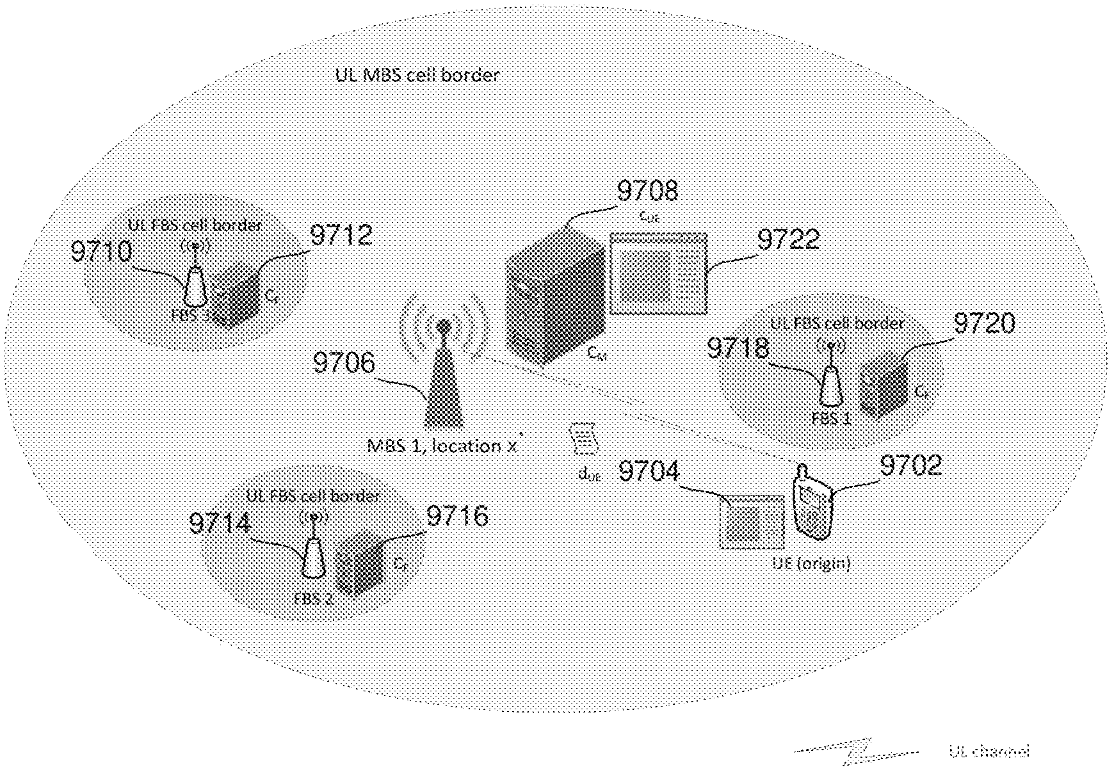
FIGS. 101-103 show various exemplary network scenarios for cell association according to some aspects.
Figure 102:
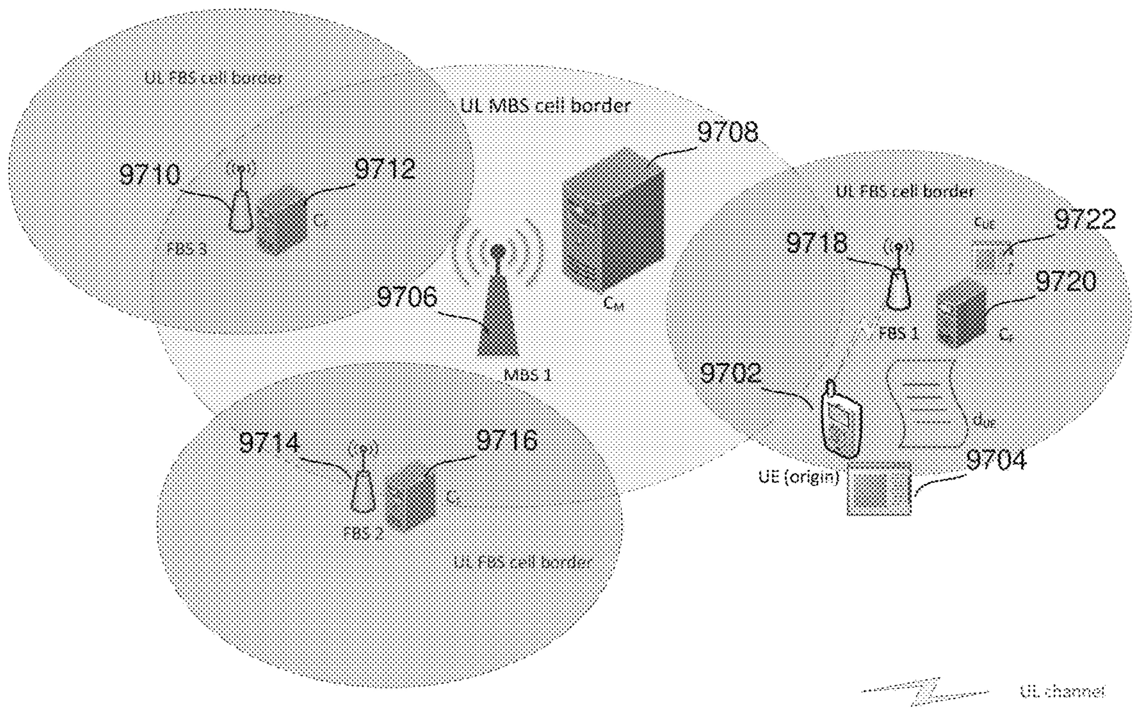
Figure 103:
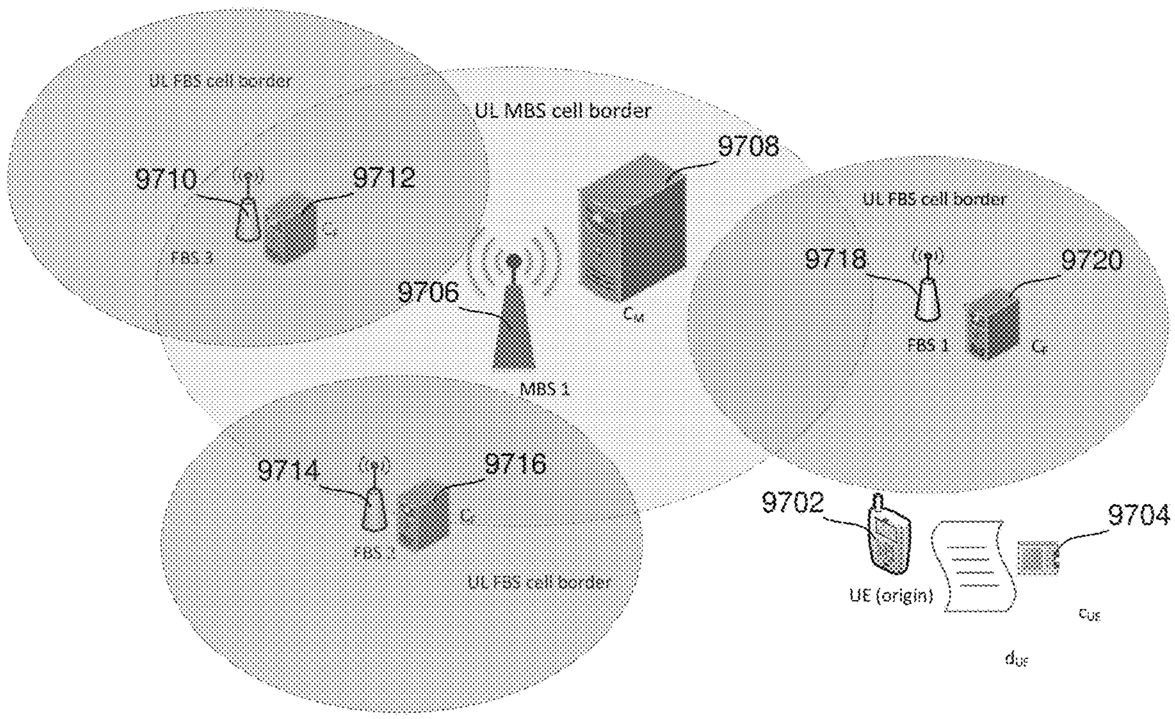

FIGS. 101-103 show several different examples according to various aspects that illustrate execution of the cell association function by cell association controller 9800. These examples relate to the scenario of FIG. 97, where terminal device 9702 is executing terminal device application 9704 with peer application 9722 that is executed on a MEC server co-located with a network access node. Using uplink as an example (that can likewise be applied for downlink), cell association controller 9800 may select an uplink network access node for terminal device 9702 to associate with. This uplink network access node will therefore host peer application 9722. These examples assume a per-tier case, where uplink bias values $B_{M,UL}$ and $B_{F,UL}$ (for macro network access nodes and micro network access nodes, respectively) have been pre-computed based on the uplink data rate demands $\gamma_{UL,th}$ and latency demands $t_{delay,th}$ of terminal device application 9704 (as further described later).

Starting with FIG. 101, terminal device application 9704 may have 1) a short amount of input data $d_{UE}$ for remote application execution as peer application 9722, and 2) a large number of computational operations $c_{UE}$ (e.g., a demanding computational task). As previously described for FIGS. 98-100, cell association controller 9800 may determine biased uplink received power for macro network access node 9706 and micro network access nodes 9710, 9714, and 9718. Cell association controller 9800 may use the uplink bias value $B_{M,UL}$ for tier-M for macro network access node 9706 and uplink bias value $B_{F,UL}$ for tier-F micro network access nodes 9710, 9714, and 9718.

The coverage areas shown in FIG. 101 are depicted as biased coverage areas that scale with the biased received signal power. The size of the biased coverage areas is therefore an exemplary visual representation of the biased received signal powers of the various network access nodes. Accordingly, as shown in FIG. 101, macro network access node 9706 may have a large uplink bias value $B_{M,UL}$ (e.g., due to the large computational capacity enough to satisfy the latency demand of terminal device application 9704), and this may result to a large biased coverage area and biased received signal powers. Micro network access nodes 9710, 9714, and 9718 may have smaller uplink bias values $B_{F,UL}$, and thus may have smaller biased coverage areas and biased received signal powers. Accordingly, as shown in FIG. 101, terminal device 9702 may fall within the biased coverage area of macro network access node 9706 but not within the biased coverage areas of any of micro network access nodes 9710, 9714, and 9718.

After determining the biased uplink coverage areas, cell association controller 9800 may evaluate the plurality of candidate network access nodes, e.g., candidate network access nodes 9706, 9710, 9714, and 9718. Accordingly, cell association controller 9800 may identify which of candidate network access nodes 9706, 9710, 9714, and 9718 has the largest biased uplink received signal power.

In the case of FIG. 101, macro network access node 9706 may have the largest biased uplink received signal power. Cell association controller 9800 may therefore select macro network access node 9706 as the uplink network access node for terminal device 9702 to associate with. Cell association controller 9800 may also perform a similar evaluation in the downlink direction to select a downlink network access node.

Continuing to the example of FIG. 102, terminal device application 9704 may have a considerable amount of input data $d_{UE}$ to send for execution by peer application 9722. However, the computational capacity demands $c_{UE}$ of peer application 9722 may be relatively small (e.g., a lightweight computational task). Compared to the example of FIG. 101, the uplink bias values $B_{M,UL}$ and $B_{F,UL}$ may be less biased towards macro network access nodes (e.g., as computational capacity is a less important resource for satisfying the latency demand of terminal device application 9704 whereas the uplink data rate is more important towards satisfying such demand).

Accordingly, as shown by the biased coverage areas depicted in FIG. 102, terminal device 9702 may be located within the biased coverage area of micro network access node 9718 but outside of the biased coverage areas of macro network access node 9706 and micro network access nodes 9710 and 9714. Given the positioning shown in FIG. 102 and the previously introduced relationship between biased received power and depicted biased coverage area, cell association controller 9800 may therefore determine that micro network access node 9718 has the highest biased uplink received power. Cell association controller 9800 may therefore select micro network access node 9718 as the uplink network access node for terminal device 9702 to associate with.

According to the example of FIG. 102, there may be a considerable amount of input data $d_{UE}$ and a small computational capacity demand $c_{UE}$. However, as shown in FIG. 103 the density of macro and micro network access nodes may not be sufficient for terminal device 9702 to be located within the biased coverage area of any network access node. As terminal device 9702 is only closest to the biased coverage area of micro network access node 9718, cell association controller 9800 may determine that none of macro network access node 9706, micro network access node 9710, or micro network access node 9714 have high enough biased received power to meet the data rate and/or computational capacity demands of terminal device application 9704. For example, selection controller 9808 may be configured to compare the maximum biased uplink received power to a biased received power threshold. If the maximum biased uplink received power is less than the biased received power threshold, selection controller 9808 may be configured to declare an outage event, as no candidate network access node may have a biased uplink received power that is greater than the biased received power threshold. Accordingly, while micro network access node 9718 may have the maximum biased uplink received power and may be the preferred network access node for association, cell association controller 9800 may declare an outage event due to the QoS violation.

The examples illustrated above describe various aspects related to uplink and downlink decoupling, namely, where cell association controller 9800 may be configured to select an uplink network access node and a downlink network access node based on the biased received powers. In some cases (depending on the distance variables and bias values), cell association controller 9800 may be configured to select the same network access node as both the uplink and downlink network access node. In these cases, terminal device 9702 may therefore use the same network access node for both uplink and downlink communications.

Additionally, as there is only one network access node, terminal device 9702 may use the MEC server co-located with the network access node to host peer application 9722. Accordingly, terminal device application 9704 may send uplink data to peer application 9722 by sending it to the network access node over the uplink channel, and may receive downlink data from peer application 9722 by receiving it from the network access node over the downlink channel.

This case where there is only one network access node is a special case within the more general context of uplink and downlink decoupling. Accordingly, in other cases, cell association controller 9800 may select different network access node as the uplink and downlink network access nodes. There may therefore be two options for hosting peer application 9722: in the MEC server co-located with the uplink network access node, or in the MEC server co-located with the downlink network access node.

In some aspects, cell association controller 9800 may be configured to select which MEC server to host peer application 9722 at, namely between the MEC server co-located with the uplink network access node (the uplink MEC server) and the MEC server co-located with the downlink network access node (the downlink MEC server). In other aspects, cell association controller 9800 may be configured to select the uplink and downlink network access nodes and allow terminal device 9702 to decide which MEC server to use.

In aspects where cell association controller 9800 is configured to select the MEC server for hosting peer application 9722, selection controller 9808 may be configured to handle the selection. Accordingly, after selecting the uplink and downlink network access node (e.g., in stages 9910-9912 and 10012-10014 of FIGS. 99 and 100), selection controller 9808 may select to host peer application 9722 at either the uplink MEC server or the downlink MEC server.

In some aspects, selection controller 9808 may be configured to use a downlink-to-uplink traffic ratio (DL/UL traffic ratio) to decide whether to host peer application 9722 at the uplink MEC server or the downlink MEC server. For example, when the average DL/UL traffic ratio is greater than 1 (i.e., there is more downlink than uplink traffic, e.g., greater than 1.1), it can be advantageous for peer application 9722 be executed at the downlink MEC server (co-located with the downlink network access node). Conversely, when the average DL/UL traffic ratio is less than 1 (e.g., there is more uplink than downlink traffic), it can be advantageous for peer application 9722 to be executed at the uplink MEC server (co-located with the uplink network access node). In another example, when the average DL/UL traffic ratio is around 1, it can be advantageous to run two instances of peer application 9722 at both MEC servers co-located with the downlink and uplink network access nodes.

Accordingly, cell association controller 9800 may also be configured to select the MEC server for hosting peer application 9722 based on the DL/UL traffic ratio. As indicated above, selection controller 9808 may be configured to determine whether the average DL/UL traffic ratio of terminal device application 9704 is greater than 1 (e.g., greater than 1.1), less than 1 (e.g., less than 0.9), or about 1 (e.g., between 0.9 and 1.1). If selection controller 9808 determines that the average DL/UL traffic radio is greater than 1 (or, e.g., greater than 1.1), selection controller 9808 may select the downlink MEC for hosting peer application 9722. Selection controller 9808 may then instruct terminal device 9702 and/or the downlink network access node (e.g., by sending control signaling) to host peer application 9722 at the downlink MEC server.

If selection controller 9808 determines that the average DL/UL traffic ratio is less than 1 (or, e.g., less than 0.9), selection controller 9808 may select the uplink MEC server for hosting peer application 9722. Selection controller 9808 may then instruct terminal device 9702 and the uplink network access node (e.g., by sending control signaling) to host peer application 9722 at the uplink MEC.

Figure 104:
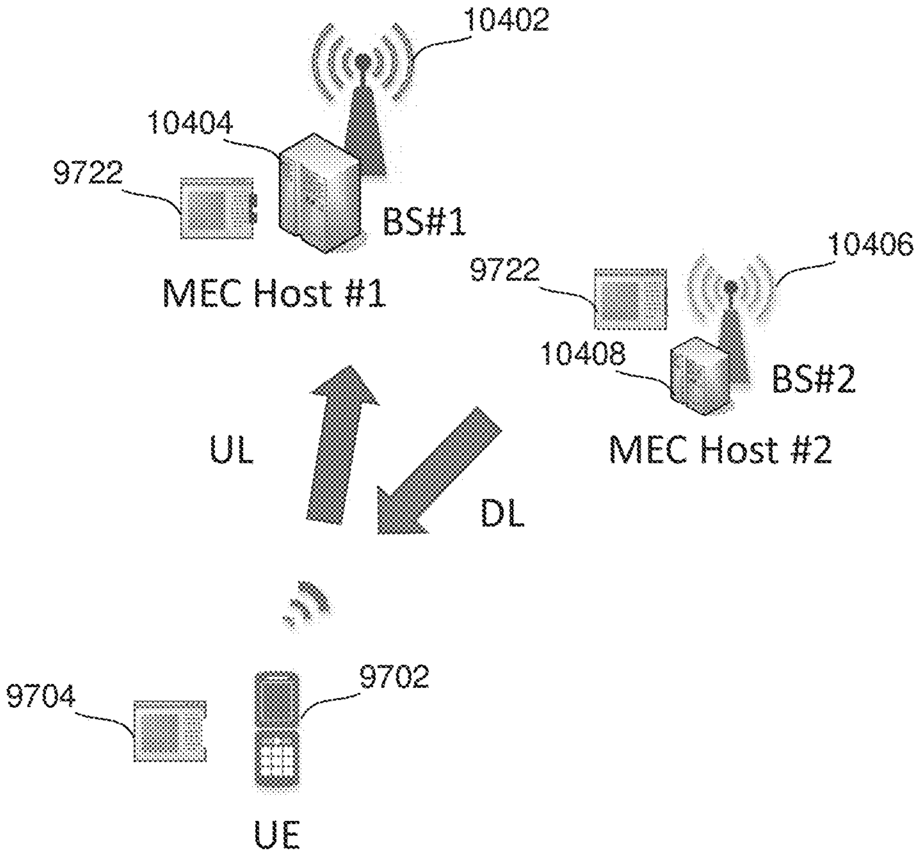
FIGS. 104-106 show exemplary selections of MEC servers according to some aspects.
Figure 105:
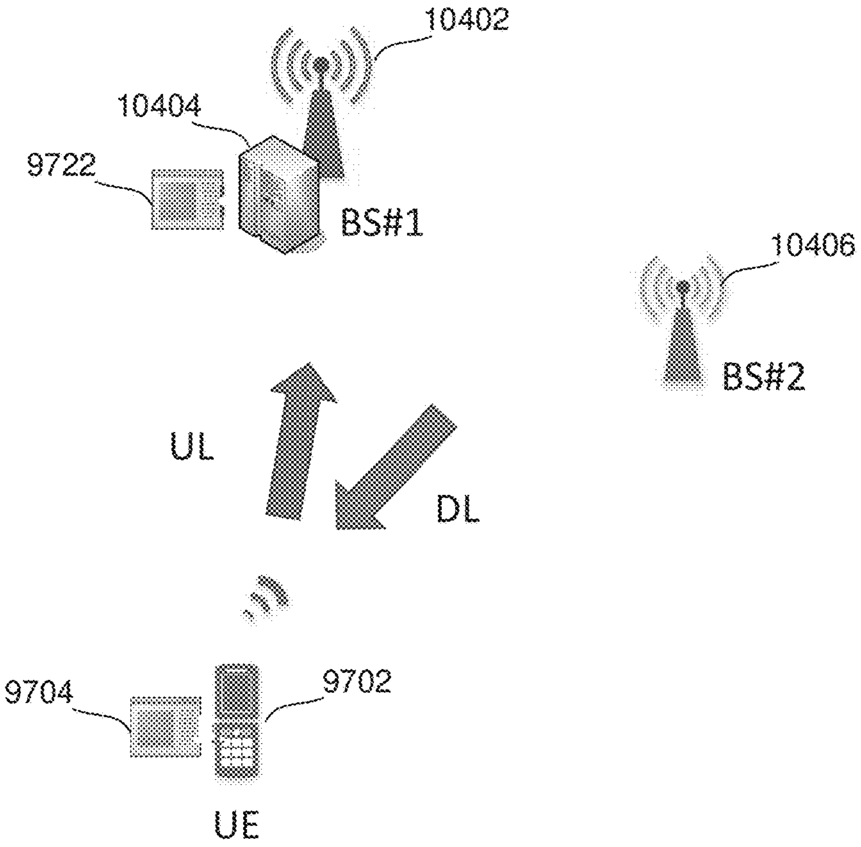
Figure 106:
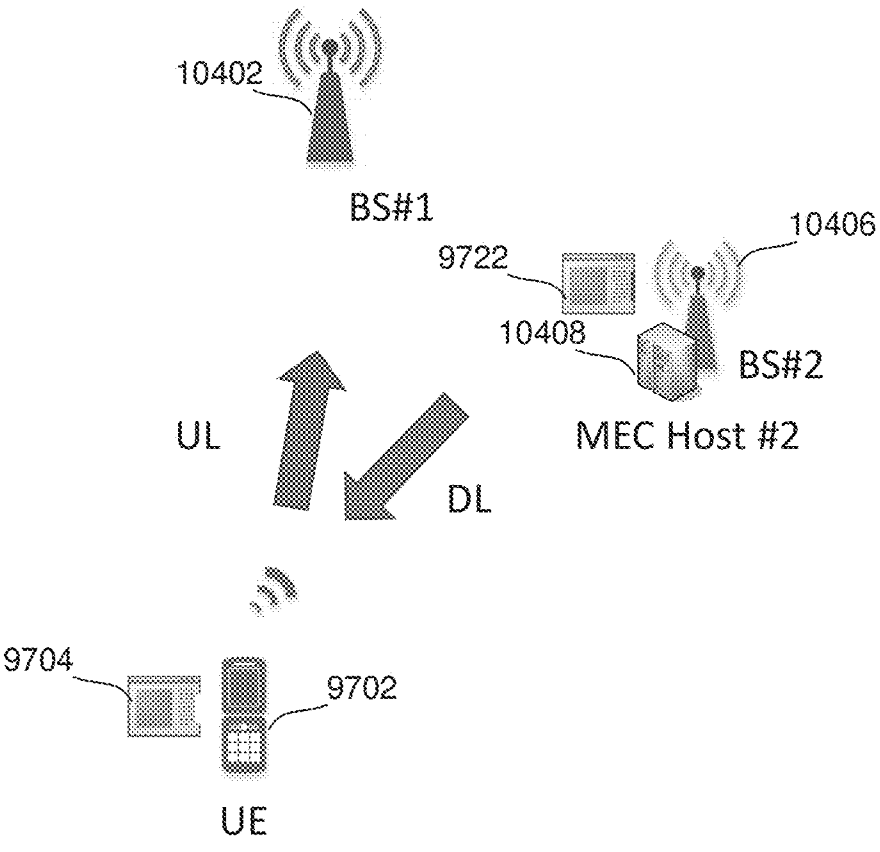

If selection controller 9808 determines that the average DL/UL traffic ratio is about 1 (e.g., between 0.9 and 1.1), selection controller 9808 may select both the downlink and uplink MEC servers for hosting peer application 9722. Selection controller 9808 may then instruct terminal device 9702 and both the downlink and uplink network access nodes (e.g., by sending control signaling) to host peer application 9722 at both the downlink and uplink MEC servers FIGS. 104-106 show several examples of hosting peer application 9722 at the downlink and/or uplink MEC servers. In the example of FIG. 104, cell association controller 9800 may select network access node 10402 (e.g., either macro or micro, depending on the results of the cell evaluation function) as the uplink network access node and may select network access node 10406 as the downlink network access node. Cell association controller 9800 may also determine that the DL/UL traffic ratio is about 1 (e.g., between 0.9 and 1.1), and may therefore select for both MEC server 10404 (the uplink MEC server, i.e., co-located with uplink network access node 10402) and MEC server 10408 (the downlink MEC server, i.e., co-located with downlink network access node 10406) to host peer application 9722. Accordingly, as shown in FIG. 104, MEC server 10404 may host a first instance of peer application 9722 while MEC server 10408 may host a second instance of peer application 9722. Terminal device application 9704 running at terminal device 9702 may therefore transmit uplink data (on an application-layer connection) to uplink network access node 10402, which the first instance of peer application 9722 running at MEC server 10404 may process in the uplink direction. In the downlink direction, MEC server 10408 may transmit downlink data addressed to terminal device application 9704, and the second instance of peer application 9722 running at MEC server 10408 may process the downlink data. The second instance of peer application 9722 may then send the resulting data to terminal device application 9704 running on terminal device 9702.

In the example of FIG. 105, the cell association controller may similarly select network access node 10402 as the uplink network access node and network access node 10406 as the downlink network access node. However, the DL/UL ratio may be less than 1 (e.g., terminal device application 9704 may be uplink-only, or may involve more uplink traffic than downlink traffic). Accordingly, cell association controller 9800 may instruct MEC server 10404 (the uplink MEC server) to host peer application 9722. Terminal device application 9704 running at terminal device 9702 may therefore send uplink data to network access node 10402, and peer application 9722 running at MEC server 10404 may process the uplink data. In cases where the resulting data is used at terminal device application 9704, peer application 9722 may either 1) send the resulting data to an external server, such as one running remote application 9728, which may then send the resulting data to terminal device application 9704 via network access node 10406, or 1) if there is a direct interface between network access node 10402 and network access node 10406, send the resulting data directly to network access node 1046010406 over the direct interface, which may then transmit the resulting data to terminal device 9702.

In the example of FIG. 106, cell association controller 9800 may similarly select network access node 10402 as the uplink network access node and network access node 10406 as the downlink network access node. However, the DL/UL ratio may be greater than 1 (e.g., terminal device application 9704 may be downlink-only, or may involve more downlink traffic than uplink traffic). Accordingly, cell association controller 9800 may instruct MEC server 10408 (the downlink MEC server, e.g., co-located with network access node 10406) to host peer application 9722. Accordingly, peer application 9722 may process downlink data for terminal device application 9704, and network access node 10406 may then send the downlink data to terminal device 9704.

Figure 107:
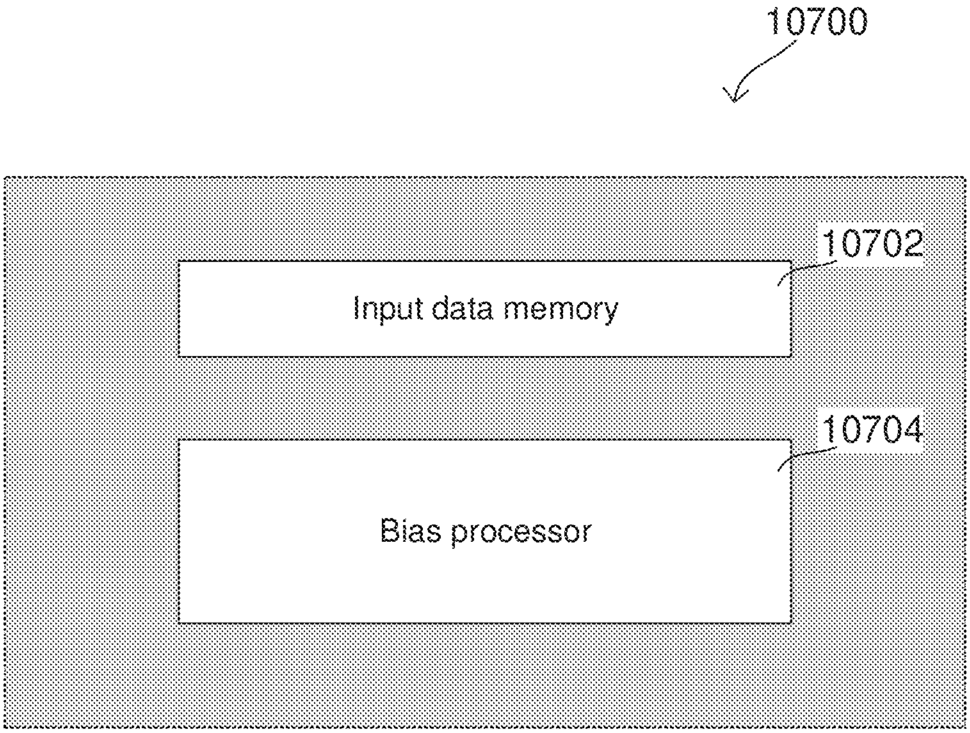
FIG. 107 shows an exemplary internal configuration of a bias control server according to some aspects.

As previously indicated, the bias values for various tiers and/or for individual network access nodes can be designed to reflect their capability to meet the data rate and latency demands of terminal device application 9704. For example, a bias control server can be deployed in the network that can calculate the bias values for cell association controller 9800 to use for execution of the cell association function. FIG. 107 shows an exemplary internal configuration of bias control server 10700 according to some aspects. Bias control server 10700 may be deployed for example, as part of the core network, part of a MEC server, or part of an external cloud/internet server. Bias control server 10700 may be configured to compute bias values, such as by computing the bias values offline (e.g., for later use for cell association controller 9800) and/or by updating the bias values over time (e.g., and providing the updated bias values $B_l$ to cell association controller 9800).

As shown in FIG. 107, bias control server 10700 may include input data memory 10702 and bias processor 10704. Input data memory 10702 may be a memory configured to collect input parameters relevant to the bias values, and to provide the input parameters to bias processor 10704. Bias processor 10704 may be a processor configured to execute program code that defines computation of the bias values. This functionality is described in full below.

Figure 108:
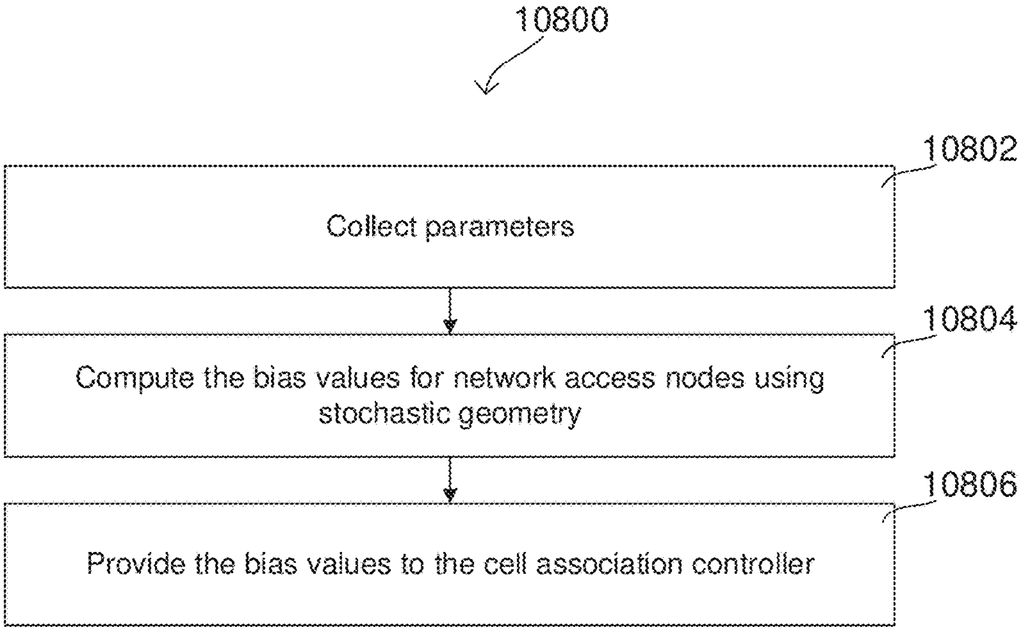
FIG. 108 shows an exemplary procedure for determining bias values according to some aspects.

FIG. 108 shows flow chart 10800 according to some aspects, which describes calculation of bias values by bias control server 10700. As previously indicated, bias values may be precomputed based on a specific terminal device application (e.g., based on the particular uplink and downlink data rate and latency demands of the terminal device application). Accordingly, flow chart 10800 describes a procedure for calculating bias values for a given terminal device application. Bias control server 10700 can therefore calculate bias values tailored for different terminal device applications by executing flow chart 10800 multiple times with different data rate and latency demands for the different terminal device applications.

The following example uses calculation of uplink bias values for terminal device application 9704. Bias control server 10700 may use the same procedure for calculation of downlink bias values using input parameters that relate to the downlink demands of terminal device application 9704. As shown in FIG. 108, input data memory 10702 may first collect parameters relevant to the bias values in stage 10802. For example, input data memory 10702 may collect first parameters about uplink data rate and computational capacity demands of terminal device application 9704, and may collect second parameters about capabilities of network access nodes. For example, the first parameters can include the QoS requirements (e.g., data rate, latency) associated with terminal device application 9704. For example, terminal device application 9704 may be pre-assigned to a certain QoS class (e.g., such as a QoS Class Indicator (QCI) in LTE or Type of Service (TS) and Differentiated Services Code Point (DSCP) fields in IP). This QoS class may have predefined QoS requirements, and may therefore indicate an uplink data rate or SINR demand $\gamma_{th}$ (e.g., in downlink and/or uplink) and/or a task completion latency $t_{delay,th}$. Input data memory 10702 may also collect information about the amount of uplink data to be offloaded, $d_{UE}$ (e.g., as in FIGS. 101-103), which may be relevant to the data rate demands. Input data memory 10702 may collect such first parameters in stage 10802, such as by receiving QoS information from a core network server.

Input data memory 10702 may also collect, for example, second parameters that relate to information about the deployment densities of network access nodes in each tier in stage 10802. This can apply for a per-tier case. For example, as previously introduced, the network access nodes in a given tier-l may be distributed according to a given point process $\Phi_l$ that is based on a density parameter $\lambda_l$. Input data memory 10702 may collect this density information for each tier, such as by receiving this information from a core network server or other location that stores information about the deployments of network access nodes for a given network.

Input data memory 10702 may collect second parameters about the computational capacities of the MEC servers co-located with the network access nodes in stage 10802. If for a per-tier case, the MEC server co-located with each network access node in a given tier-l may be assumed to have the same computational capacity $C_l$. If for a per-node case, the MEC server co-located with each network access node may have a unique computational capacity. This information about computational capacities may also be provided to input data memory 10702 from a core network server or other location that stores information about the capabilities of network access nodes in a given network.

After collecting these parameters in stage 10802, input data memory 10702 may provide the parameters to bias processor 10704. Bias processor 10704 may then compute the uplink bias values using stochastic geometry tools in stage 10804. As previously indicated, the bias value for a given tier or given individual network access node may reflect the capability of the given tier-l or individual network access node of meeting the data rate and latency demands of terminal device application 9702. Bias processor 10704 may therefore use stochastic geometry tools to probabilistically model the distribution of network access nodes and to model whether or not the network access nodes and their co-located MEC servers are able to meet the data rate and computational capacity demands of terminal device application 9704. Bias processor 10704 may compute higher uplink bias values for tiers and/or network access nodes that are more likely, according to results obtained by stochastic geometry-based performance analysis, of meeting the demands of terminal device application 9704. In some aspects, bias processor 10704 may design per-tier and/or per-QOS bias values for multi-tier networks, where different bias values are determined for different tiers and for different QOS parameters of various applications. After computing the uplink bias values in stage 10804, bias processor 10704 may provide the uplink bias values to cell association controller 9800, which may execute the cell association function to select an uplink network access node for terminal device 9702 using the uplink bias values $B_l$.

Two examples related to computation of uplink bias values by bias processor 10704 will now be described with reference to FIGS. 101 and 102. These examples related to a per-tier case where there is a tier-M of macro network access nodes and a tier-F of micro network access nodes. In the first example using FIG. 101, terminal device application 9704 may have a small amount of uplink data $d_{UE}$ to send for processing by peer application 9722 but may have a large computational capacity demand $c_{UE}$ (e.g., a demanding computational task for peer application 9722). As there is only a small amount of uplink data $d_{UE}$ for uplink transmission, terminal device 9702 may only have moderate uplink SINR demands $\gamma_{UL,th}$. Accordingly, focusing on the task latency demand $t_{delay,th}$, this SINR demand $\gamma_{UL,th}$ will in principle increase $$t_{delay}^{trans}$$

(per Equation (1)) due to the correspondingly low uplink data rate. However, for small amounts of data $d_{UE}$, the transmission delay can be considered negligible, and the main part of the delay will be the execution delay $$t_{delay}^{exe}.$$

Bias processor 10704 may therefore compute the bias values $B_{UL}(\gamma_{UL,th}, t_{delay,th})$, k={M,F} so that cell association controller 9800 (when executing the cell association function) biases the selection towards macro network access nodes. In some cases, this can be important when the deployment density $\lambda_F$ of macro network access nodes is comparable to the deployment density $\lambda_M$ of macro network access nodes and/or the computational capacity $C_M$ of macro MEC servers is much larger than the computational capacity $C_F$ of micro MEC servers (e.g., $C_M >> C_F$).

In the second example using FIG. 102, terminal device application 9704 may have a considerable amount of uplink data $d_{UE}$ to send for processing by peer application 9722, and may have light computational capacity demand $c_{UE}$ (e.g., a small computational task). Accordingly, while the processing demand $c_{UE}$ takes a moderate to small value, terminal device 9702 may have a more demanding uplink data rate/SINR demand $\gamma_{UL,th}$ to control $$t_{delay}^{trans}.$$

Accordingly, bias processor 10704 may design bias values $B_k(\gamma_{UL,th}, t_{delay,th})$, k={M,F} so that the cell association controller 9800 is biased towards selecting a closest micro network access node (e.g., micro network access node 9720 given the exemplary location of terminal device 9702 in FIG. 102) when it executes the cell association function. Accordingly, even though macro network access nodes may be co-located with macro MEC servers with larger computational capacity $C_M$ than the micro MEC servers co-located with micro network access nodes, the considerable data rate demands $\gamma_{UL,th}$ of terminal device application 9704 may mean that a closest micro network access node may be a more suitable choice. Design of bias values $B_l$ by bias processor 10704 that bias toward selecting a closest micro network access nodes may therefore be advantageous in this example.

In some aspects, bias processor 10704 may also consider energy consumption of terminal device 9702, such as where Single-Input Single-Output (SISO) communication is used with the aim of achieving the data rate/SINR demand $\gamma_{UL,th}$ in an energy efficient manner. Bias processor 10704 may therefore also compute the bias values $B_l$ so that the cell association function is shaped towards minimizing energy consumption of terminal device 9702.

Figure 109:
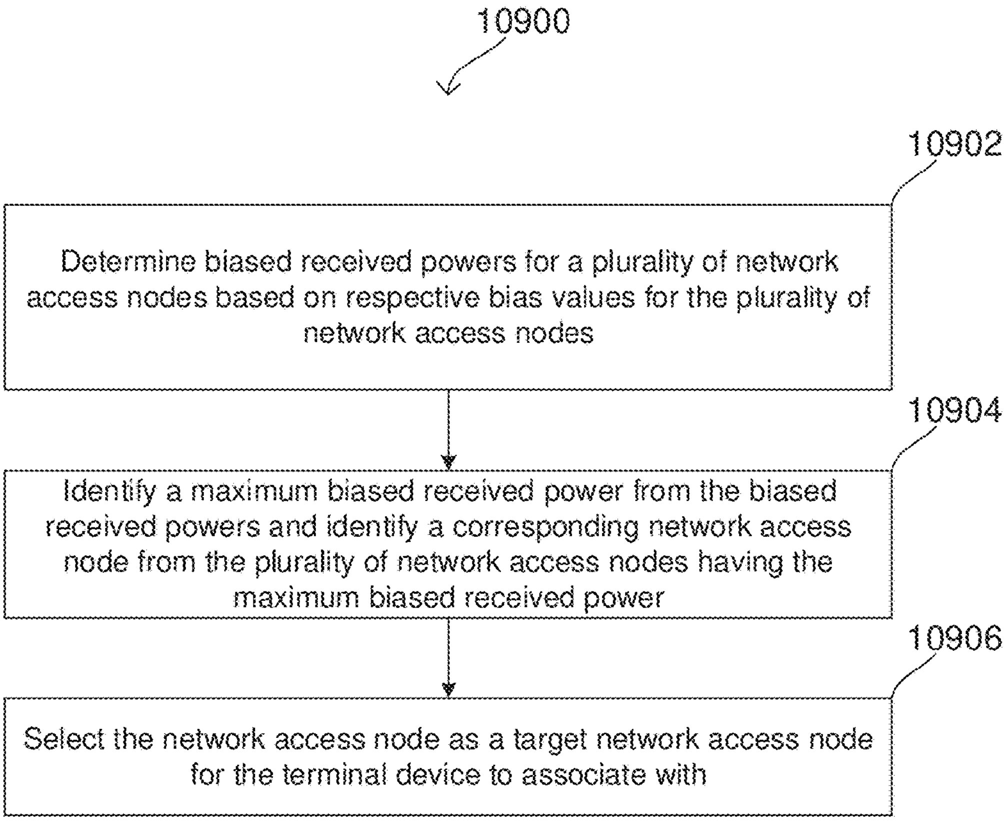
FIGS. 109 and 110 show exemplary procedures for controlling cell association according to some aspects.

FIG. 109 shows exemplary method 10900 of controlling cell association according to some aspects. As shown in FIG. 109, method 10900 includes determining biased received powers for a plurality of network access nodes based on respective bias values for the plurality of network access nodes (10902), identifying a maximum biased received power from the biased received powers and identifying a corresponding network access node of the plurality of network access nodes having the maximum biased received power (10906), and selecting the network access node as a target network access node for the terminal device to associate with (10908).

Figure 110:
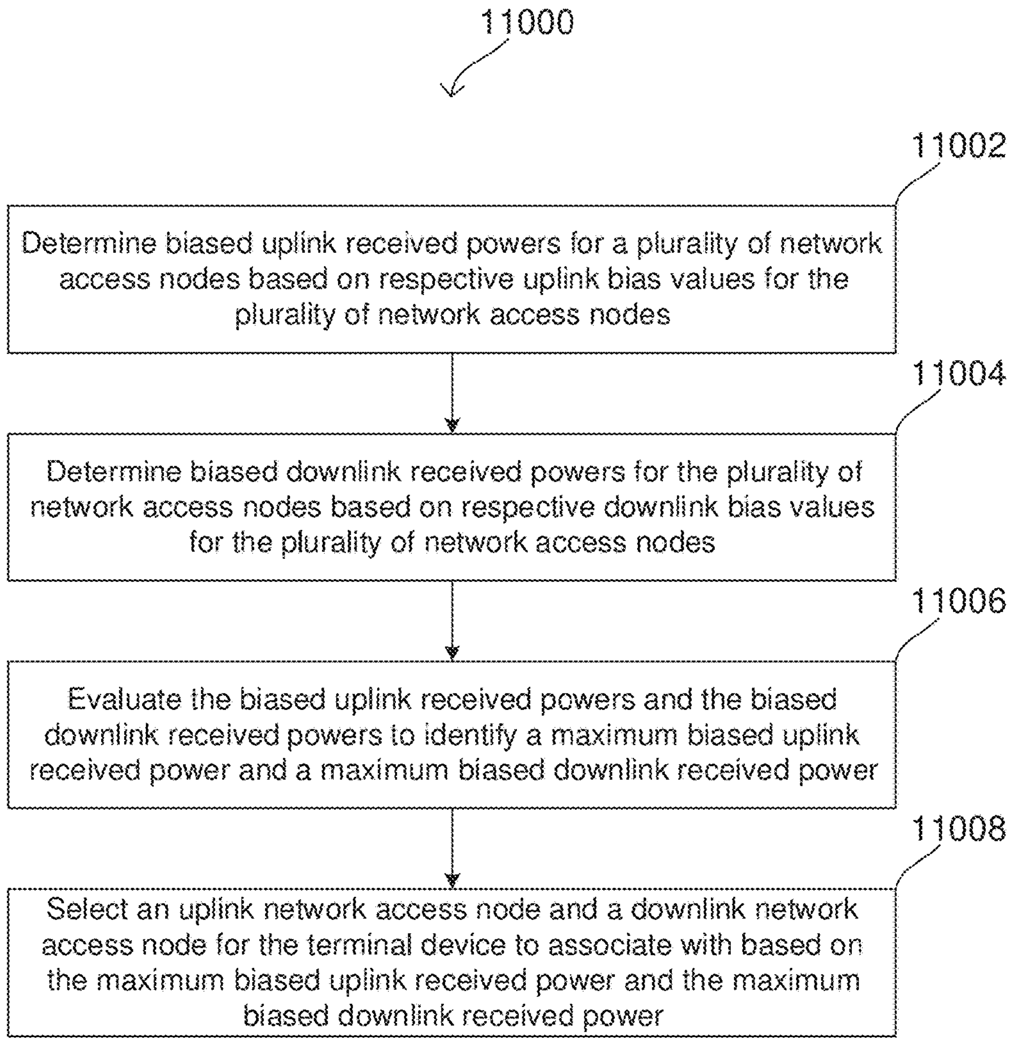

FIG. 110 shows exemplary method 11000 of controlling cell association according to some aspects. As shown in FIG. 110, method 11000 includes determining biased uplink received powers for a plurality of network access nodes based on respective uplink bias values for the plurality of network access nodes (11002), determining biased downlink received powers for the plurality of network access nodes based on respective downlink bias values for the plurality of network access nodes (11004), evaluating the biased uplink received powers and the biased downlink received powers to identify a maximum biased uplink received power and a maximum biased downlink received power (11006), and selecting an uplink network access node and a downlink network access node for the terminal device to associate with based on the maximum biased uplink received power and the maximum biased downlink received power (11008).

FIG. 111 shows exemplary method 11100 of determining bias values according to some aspects. As shown in FIG. 111, method 11100 includes obtaining first parameters related to data rate and latency demands of a terminal device application and obtaining second parameters related to data rate and computational capacity capabilities of a plurality of network access nodes (11102), and determining bias values for the plurality of network access nodes based on an evaluation of the first parameters and the second parameters, wherein the bias values are based on a capability of the plurality of network access nodes to support the terminal device application (11104).

Improved Access Control for Communication Systems

Communication systems, such as Carrier-Sense Multiple Access (CSMA) based systems, where communication devices may communicate via a shared channel without centralized access control, may rely on Listen Before Talk (LBT) protocols to control communication via the shared channel. In such systems, a communication device intending to transmit data via the shared channel may first have to listen to the shared channel to determine if data transmission from different communication devices is ongoing and the shared channel is occupied. In other words, when a different communication device uses the channel for data transmission, the communication device may not be able to transmit data itself. In such situations, the communication device may have to again listen to the channel e.g. after a predefined time. The communication device may then transmit its data, when the channel is not occupied by a data transmission from a different communication device.

In such communication systems, in particular when a large number of communication devices may intend to use a single shared channel at equal times, situations may occur where essentially all communication devices may have to wait for the shared channel to become free for their own data transmission. In other words, in particular in situations when multiple communication devices may intend to use a shared channel for data communication, LBT protocols may not be optimal for controlling access to a shared channel by said multiple communication devices. Such situations may be non-optimal, in particular when users intending to transmit data of higher priority, e.g. in an extreme case data for an emergency call, may have to wait an undesirably long time before their data can be transmitted.

In view of this, various aspects of the present disclosure provide a communication device configured to generate and transmit (or broadcast) an own scheduling message and configured to receive a scheduling message for at least one further communication device. In accordance with various aspects, the communication device is further configured to process the generated and the received scheduling messages to determine at least one scheduling parameter for a transmission of data. Thus, in various aspects, by processing scheduling messages for the communication device and e.g. for multiple other communication devices, scheduling parameters for each communication device may be determined at each communication device and an overall scheduling may be determined for a group of communication devices. Such overall scheduling may in certain aspects be determined in accordance with priority information included in each scheduling message. In this way, it may in various aspects become possible to ensure early communication of high priority data, such as e.g. data for an emergency call.

Figure 112:
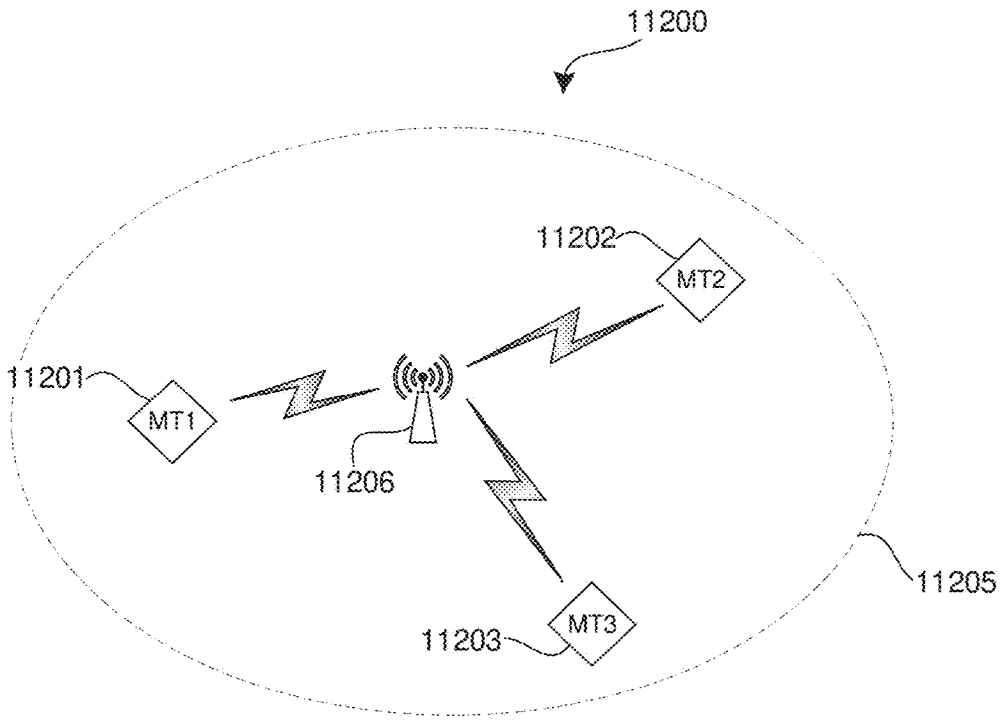
FIG. 112 shows an exemplary radio communication network employing CSMA according to some aspects.

FIG. 112 shows exemplary radio communication network 11200 according to some aspects, which may include terminal devices 11201 to 11203 and network access node 11206. As shown in FIG. 112, the communication system 11200 includes a terminal device MT1 11201, a terminal device MT2 11202, and a terminal device MT3 11203, distributed in an area 11205. The number of terminal devices is used only for illustrative purposes and is not limited to the example number of three. The terminal devices 11201 to 11203 may be configured as described above for terminal device 102 and examples of terminal devices 11201 to 11203 may include in particular mobile terminals such as cellular phones, tablets, computers, vehicular communication devices, and the like. The communication system 11200 further includes an access node 11206, which may for example be a WLAN or WiFi access point (AP) configured for example in accordance with an IEEE 802.11 standard. Exemplarily, the communication network 11200 may employ a carrier-sense multiple access (CSMA) scheme for managing communication between the terminal devices 11201 to 11203 while a channel for communication of data between terminal devices 11201 to 11203 may be usable for data transmission of a single one of the terminal devices 11201 to 11203 at a time.

Figure 113:
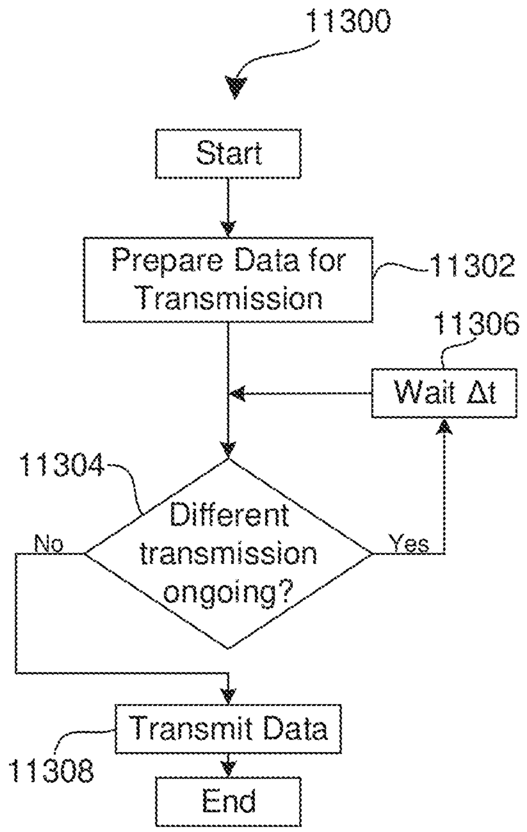
FIG. 113 shows an exemplary method according to which terminal devices may communicate following a CSMA scheme according to some aspects.

FIG. 113 shows an exemplary method 11300 according to which terminal devices 11201 to 11203 may communicate following a CSMA scheme. As illustrated, in stage 11302, terminal device 11201 (described exemplarily for terminal devices 11201 to 11203) prepares user data for transmission, e.g. processes data in accordance with formatting protocols related to the physical layer. Thereafter, in stage 11305, terminal device 11201 listens to a channel which may be established between the terminal device 11201 and terminal devices 11202, 11203 via access node 11206, and which the terminal devices 11201, 11202, 11203 may share for communication of data between the terminal devices 11201, 11202, 11203. In other words, in stage 11305, terminal device 11201 is configured to sense if data transmission between any other terminal devices is ongoing via the channel. Such channel may e.g. be a dedicated frequency or frequency range and may e.g. correspond to a subrange of a global frequency range of a communication system. By listening to the channel in this way, terminal device 11201 determines if the shared channel is occupied or free to be used. In the shown example, the shared channel is occupied when one of the terminal devices 11202 or 11203 uses the channel for data transmission such that terminal device 11201 cannot transmit data itself during the time the data transmission is ongoing.

If the channel is occupied by a data transmission from a different terminal device, the terminal device 11201 may wait for a period of time Δt, e.g. a random Back-Off Time, in stage 11306 before listening again to the shared channel (stage 11305). If the channel is free to be used, the terminal device 11201 may transmit in stage 11309 the data prepared in stage 11302 after optionally having transmitted a Request to Send (RTS) message to the access node 11206 and having optionally received a Clear to Send message (CTS) from the access node 11206. Such RTS message and such CTS messages are examples for control information that may be exchanged between the terminal devices 11201 to 11203 and access node 11206. The above CSMA scheme may in aspects be referred to as listen before talk (LBT) scheme.

In accordance with various aspects of the present disclosure, communication devices such as for example terminal devices as discussed above are configured to generate a scheduling message, e.g. a Packet Request Header (PRH), and are configured to receive a scheduling message, e.g. a PRH, for at least one further communication device. In aspects, the scheduling message (which may in certain aspects be a separate message or a header or preamble of a message including further data) for the at least one further communication device is received by the communication device from the at least one further communication device. In various aspects, the communication device is configured to process the generated scheduling message and the received scheduling message to determine at least one scheduling parameter for a transmission of data and is configured to transmit the data in accordance with the determined at least one scheduling parameter. The scheduling messages may thus allow an efficient scheduling ensuring that even in the case of multiple communication devices potentially trying to access a common shared channel or resource, each communication device may be assigned for example a communication resource (e.g. a frequency or frequency range) for data transmission within a time interval.

In various aspects, the scheduling parameter defines a time interval or transmission time interval during which the communication device may transmit the data. To this end, the scheduling parameter may for example define a start time and a length of such time interval. The scheduling parameter may alternatively or in addition define a frequency resource, e.g. a single frequency or a frequency range, for transmission of the data.

In various aspects, the scheduling message may comprise first priority information, e.g. a global priority information or a primary priority information. In aspects, first priority information may include or be a value representing the first priority information. In these aspects, the communication device may be configured to determine the scheduling parameter based on a comparison of first priority information of the generated scheduling message with first priority information of the received scheduling message. The first priority information may be determined by the communication device for a type of data to be transmitted. Alternatively or in addition, the first priority information may be predefined for a type of data to be transmitted, e.g. by a standard and/or in a lookup table stored at the communication device or at a different network node such as at an access node with which the communication device may communicate. For example, a type of data may define the data to be data for an emergency call or normal voice communication. In this case, a first priority of data for an emergency call may be higher than a first priority for normal voice communication. A first priority may generally correspond to a first priority value and a first priority value of data for an emergency call may have a higher value as a corresponding value for voice communication. Further types of data transmission to which respective first priorities may be assigned may include (but are not limited to) conversational voice, conversational video, non-conversational video, vehicle-to-everything (V2X) messages, vehicle-to-vehicle (V2V) messages, or further different messages. Assignment of respective first priorities/first priority values to these types of communication may be predefined by a standard and/or stored in a corresponding table in each communication device.

In various aspects, the communication device may be configured to transmit the generated scheduling message to the at least one further communication device within a scheduling time interval during which the communication device is configured to receive the scheduling message. Thereby, according to various aspects, a transmission time during which the communication device is configured to transmit the generated scheduling message at least partially or fully overlaps with a reception time during which the communication device is configured to receive the scheduling message. In other words, the communication device and the at least one further communication device may for example be configured to communicate scheduling messages essentially simultaneously, i.e. within said scheduling time interval, e.g. using a full duplex scheme. In various aspects, the communication device is configured to transmit the generated scheduling message to the at least one further communication device using at least one communication frequency and wherein the first receiver is configured to receive the scheduling message using the same at least one communication frequency. In the case that scheduling messages, e.g. PRHs, at least partially overlap in time and overlap in frequency can in various aspects be that scheduling messages may automatically collide and interfere at each communication device thus enabling reconstruction of each scheduling message at each communication device in an efficient way, e.g. using interference cancellation processing schemes. In various aspects, the communication device may be configured to operate in a full duplex operation mode at least during the scheduling time interval.

In various aspects, the communication devices may for example form a system of distributed communication devices where an assignment of communication resources, e.g. time intervals and/or frequencies for transmission of data is performed by exchanging scheduling messages between the communication devices and by locally processing own generated and different received scheduling messages at each communication device. In these aspects, each communication device may e.g. broadcast a scheduling message, e.g. a Packet Request Header (PRH), and may receive a scheduling message, e.g. a PRH, from at least one further communication device essentially at the same time, i.e. within a scheduling time interval preceding e.g. respective time intervals for data transmission assigned to each communication device.

In various aspects, a scheduling message may further comprise second priority information. In these aspects, the communication device may be configured to determine the scheduling parameter based on a comparison of second priority information of the generated scheduling message with second priority information of the received scheduling message when the first priority information of the generated scheduling message coincides with or matches the first priority information of the received scheduling message.

For example, if in these aspects the communication device and the at least one further communication device intend to communicate data of a same type, e.g. both communication devices intend to communicate data for voice communication, the first priority information, e.g. the first priority value, of the generated scheduling message may match, i.e. be equal to, the first priority information, e.g. the first priority value, of the received scheduling message. A scheduling message may in these aspects further comprise said second priority information, and the communication device may be configured to determine the scheduling parameter based on a comparison of second priority information of the generated scheduling message with second priority information of the received scheduling message. An effect of the second priority information may be that a conflict can be avoided if first priority information of respective scheduling messages is equal. In alternative aspects, such conflict may be resolved differently, e.g. by assigning different frequency resources to respective communication devices within a common transmission time interval.

The second priority information may be an offset value, or a random variable or a number. Such value, variable or number may for example be chosen from a range 0 to 1023, for example from a range 0 to 2047, for example from a range 0 to 4094, for example from a range 0 to 8191, for example from a range 0 to 16383, for example from a range 0 to 32767, or generally from a range 0 to $2^N-1$, N being chosen in accordance e.g. with the size of a group of communication devices and e.g. predefined in a standard, N being e.g. an empirical value. In other words, these ranges or different ranges may be chosen or predefined for example in accordance with a number of communication devices typically forming a respective distributed system of communication devices. In aspects a range may for example be dynamically set by and for each communication device in accordance with a current number of communication devices and/or may be defined by a standard and/or may be stored in a dedicated memory of a communication device. In various aspects, the second priority information may be generated by the communication device for the generated scheduling message or may be selected by the communication device for the generated scheduling message from a table stored at the communication device. For example, a random number may used as second priority value or a number may be chosen based on a user ID, a terminal ID, or the like. In addition or alternatively, the second priority parameter may be set semi-statically in accordance with details in relation to the communication device. For example, a communication device roaming in a network of a different contractor may be assigned a fixed lower value of said priority parameter or offset value during the time it is roaming in the network of the different contractor. During this time, the communication device may also be assigned a restricted range of the random number, e.g. from 0 to 2047 (i.e. 0 to $(2^N-1)/2$) as opposed to a range of e.g. 0 to 4095 (i.e. 0 to $(2^N-1)$) assigned to a communication device being in a network of its own contractor. In various aspects, in addition or alternatively, the second priority information may be communicated between the communication device and the at least one further communication device using further scheduling messages after processing of first scheduling messages communicated between the communication device and the at least one further communication device yielded matching first priority information of the first scheduling messages.

Figure 114:
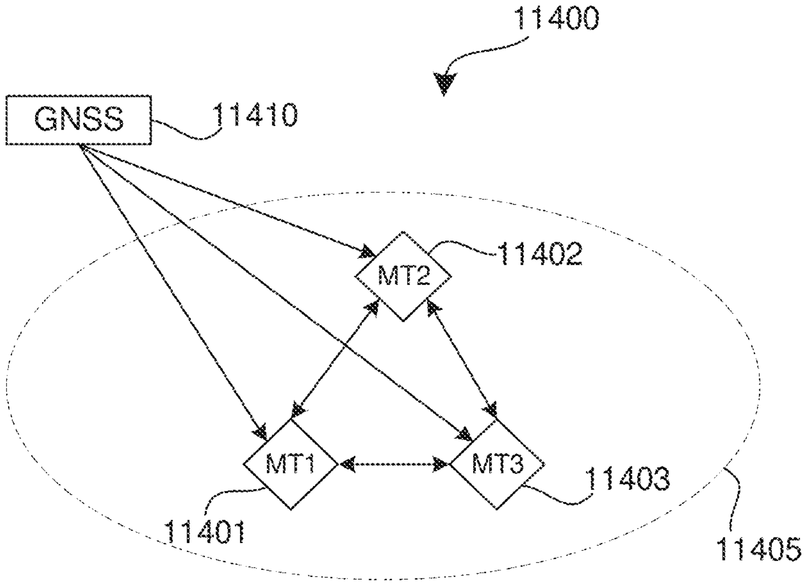
FIG. 114 shows an exemplary radio communication network relating to full duplex communication according to various aspects of the present disclosure.

FIG. 114 shows exemplary radio communication network 11400 according to various aspects of the present disclosure, which may include communication devices 11401 to 11403. As shown in FIG. 114, the communication system 11400 includes a communication device MT1 11401, a communication device MT2 11402, and a communication device MT3 11403, distributed in an area 11405. Area 11405 may for example be a geographical area determined by combined geographical transmission/reception ranges of communication devices 11401 to 11403. The number of communication devices is used only for illustrative purposes and is not limited to the example number of three. The communication devices 11401 to 11403 may be configured as described above for communication device 102 and examples of communication devices 11401 to 11403 may include in particular mobile terminals such as cellular phones, tablets, computers, vehicular communication devices, and the like. As shown in FIG. 114, the communication devices 11401 to 11403 may in various aspects be configured to communicate with a satellite 11410, e.g. included in a global navigation satellite system (GNSS). Global navigation satellite systems include exemplarily (but are not limited to) the Global Positioning System (GPS), GLONASS, Galileo, the BeiDou Navigation Satellite System, the BeiDou-2 GNSS.

In various aspects, the communication device is configured to receive a clock signal defining the scheduling time interval. For example, the clock signal may be configured to define a start time of the scheduling time interval. In various aspects, the communication device is configured to receive the clock signal from satellite 11410 illustrated in FIG. 114. In FIG. 114, arrows between GNSS satellite 11410 and each communication device 11401 to 11403 exemplarily illustrate transmission of the clock signal. Arrows between respective ones of the communication devices 11401 to 11403 exemplarily illustrate transmission of scheduling messages and subsequent transmission of data between the communication devices 11401 to 11403.

Figure 115:
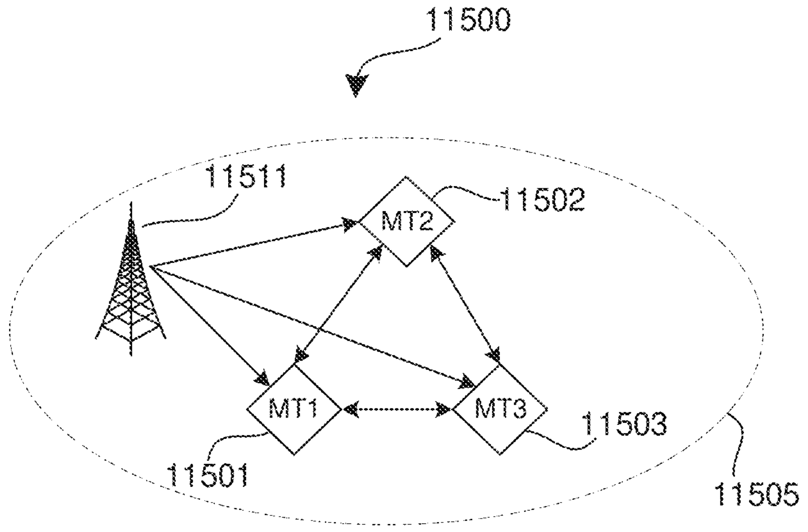
FIG. 115 shows a further exemplary radio communication network relating to full duplex communication according to various aspects of the present disclosure.

FIG. 115 shows exemplary radio communication network 11500 according to various aspects of the present disclosure, which may include communication devices 11501 to 11503. As shown in FIG. 115, the communication system 11500 includes a communication device MT1 11501, a communication device MT2 11502, and a communication device MT3 11503, distributed in an area 11505. The number of communication devices is used only for illustrative purposes and is not limited to the example number of three. The communication devices 11501 to 11503 may be configured as described above for communication device 11502 and examples of communication devices 11501 to 11503 may include in particular mobile terminals such as cellular phones, tablets, computers, vehicular communication devices, and the like. As shown in FIG. 115, alternatively or in addition to the case shown in FIG. 114, in various aspects the communication devices 11501 to 11503 may be configured to communicate with a base station 11511 of a communication network which may be an access node 110 as disclosed in the context of FIG. 3. Area 11505 may for example be a geographical area determined by combined geographical transmission/reception ranges of communication devices 11501 to 11503 or may be a geographical area covered by base station 11511.

In various aspects, the communication device is configured to receive the clock signal from a base station of a communication network such as e.g. base station 11511, the clock signal defining the scheduling time interval. In FIG. 115, arrows between base station 11511 and each communication device 11501 to 11503 exemplarily illustrate transmission of the clock signal. Arrows between respective ones of the communication devices 11501 to 11503 exemplarily illustrate transmission of scheduling messages and subsequent transmission of data between the communication devices 11501 to 11503.

In various aspects, the base station 11511 may provide said clock signal to communication devices 11501 to 11503, while scheduling messages and subsequent data traffic is exchanged between the communication devices 11501 to 11503 directly (as illustrated in FIG. 115). Alternatively or in addition, in certain aspects, the scheduling messages and/or said data traffic can be relayed via base station 11511 to be exchanged between communication devices 11501 to 11503. In various aspects, communication device 11501 may further access a network such as the Internet and/or mobile communication networks via base station 11511 and may communicate scheduling messages and subsequent data with the communication devices 11502 to 11503 directly (or relayed by the base station 11511).

In various aspects, the base station 11511 may further provide control information to the communication devices 11501 to 11503 while assignment e.g. of transmission time intervals for data transmission and/or communication resources for data transmission is performed among the communication devices 11501 to 11503 by exchange of scheduling messages. In aspects, control information provided by the base station 1011 may include control messages such as RTS and CTS messages. In aspects, such control information from base station 11511 may include control information to assist decoding of scheduling messages at each communication device 11501 to 11503. For example, in these aspects, such control information may include information regarding a number of terminals e.g. present in area 11505. For example, in these aspects, such control information may include information regarding resource allocation of the scheduling messages, e.g. information on which frequency or within which frequency range the scheduling messages are broadcasted by each communication device.

Figure 116:
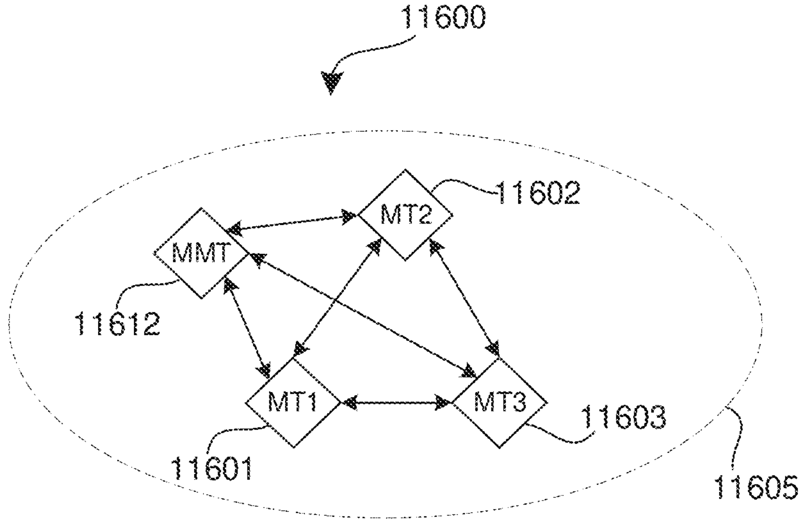
FIG. 116 shows a further exemplary radio communication network relating to full duplex communication according to various aspects of the present disclosure.

FIG. 116 shows exemplary radio communication network 11600 according to various aspects of the present disclosure, which may include communication devices 11601 to 11603 and master communication device 11612. As shown in FIG. 116, the communication system 11600 includes a communication device MT1 11601, a communication device MT2 11602, a communication device MT3 11603, and a master communication device MMT 11612, distributed in an area 11605. The master communication device 11612 may correspond to communication devices 11601 to 11603. The communication devices 11601 to 11603 and master communication device 11612 may be configured as described above for communication device 102 and examples of communication devices 11601 to 11603 and for master communication device 11612 may include in particular mobile terminals such as cellular phones, tablets, computers, vehicular communication devices, and the like. Area 11605 may for example be a geographical area determined by combined geographical transmission/reception ranges of communication devices 11601 to 11603 and 11612. The number of communication devices is used only for illustrative purposes and is not limited to the example number of four.

As shown in FIG. 116, the communication devices 11601 to 11603 may in various aspects be configured to communicate with master communication device 11612, which in these aspects may take the functions of satellite 11410 and/or of base station 11511. In various aspects, the communication device is configured to receive the clock signal from at least one communication device, i.e. from the master communication device 11612, the clock signal defining the scheduling time interval. In these aspects, master communication device 11612 is configured to transmit said clock signal to communication devices 11601 to 11603. In FIG. 116, arrows between master communication device 11612 and each communication device 11601 to 11603 exemplarily illustrate transmission of the clock signal. Arrows between respective ones of the communication devices 11601 to 11603 and master communication device 11612 exemplarily illustrate transmission of scheduling messages and subsequent transmission of data between the communication devices 11601 to 11603. In addition to clock signals, the master communication device 11612 may be configured to transmit control information to communication devices 11601 to 11603 corresponding to the control information described above in the context of base station 11511.

In various aspects, communication devices may be configured in accordance with communication devices 11601 to 11603 and/or in accordance with communication devices 11501 to 11503 and/or in accordance with communication devices 11401 to 11403 and may communicate with satellite 11410, base station 11511, and/or master communication device 11612 for example depending on availability of satellite 11410 and/or base station 11511 and/or master communication device 11612 and/or for example depending on signal strength of signals received from satellite 11410 and/or base station 11511 and/or master communication device 11612.

For example, if both satellite 11410 and base station 11511 are available, the communication device may be configured to prioritize communication with the base station 11511 (reception of clock signal and/or reception of the above described control information) over communication with the satellite 11410 (reception of clock signal), or vice versa. Depending on availability, the communication device may also switch from communication with the satellite 11410 to communication with the base station 11511. For example, the communication device may switch from communication with one of satellite 11410 or base station 11511 to communication with the other one of satellite 11410 or base station 11511 depending on signal strength of a received signal, e.g. a received clock signal. Further, for example, if neither base station 11511 not satellite 11410 is available for communication or signal strength of respectively received signals is below a predefined threshold, the communication device may switch to reception of clock signals from master communication device 11612.

In various aspects, a communication device may be configured to take functions of master communication device 11612 based on corresponding control information received from a node such as base station 11511. For example, base station 11511 may transmit a corresponding control signal to one communication device selected from a group of communication devices, when communication quality for the group of communication devices with the base station 11511 degrades, e.g. when signal strength of clock signals received by the group of communication devices falls below a threshold. Such situation may for example occur in the case that a group of communication devices (e.g. vehicular communication devices) moves away from the base station 11511. Degradation of communication quality may be determined at the base station 11511 based on measurement reports received from at least one communication device and/or at at least one communication device, e.g. based on a received signal-to-interference-plus-noise ratio (SINR).

In alternative aspects, a communication device may be configured to take the functions of master communication device 11612 following a corresponding message exchange within a group of communication devices. For example, corresponding messages may be triggered within a radio discovery procedure when communication devices within a group of communication devices are in proximity (e.g. within area 11605), and each communication device can be discovered by other communication devices within said group. A communication device within said group may be configured to take the functions of master communication device 11612 for example based on capability to transmit clock signals to other communication devices. Alternatively or in addition, further priority information corresponding e.g. to the second priority information may be exchanged to determine a communication device to take the functions of master communication device 11612 within said group of communication devices.

Figure 117:
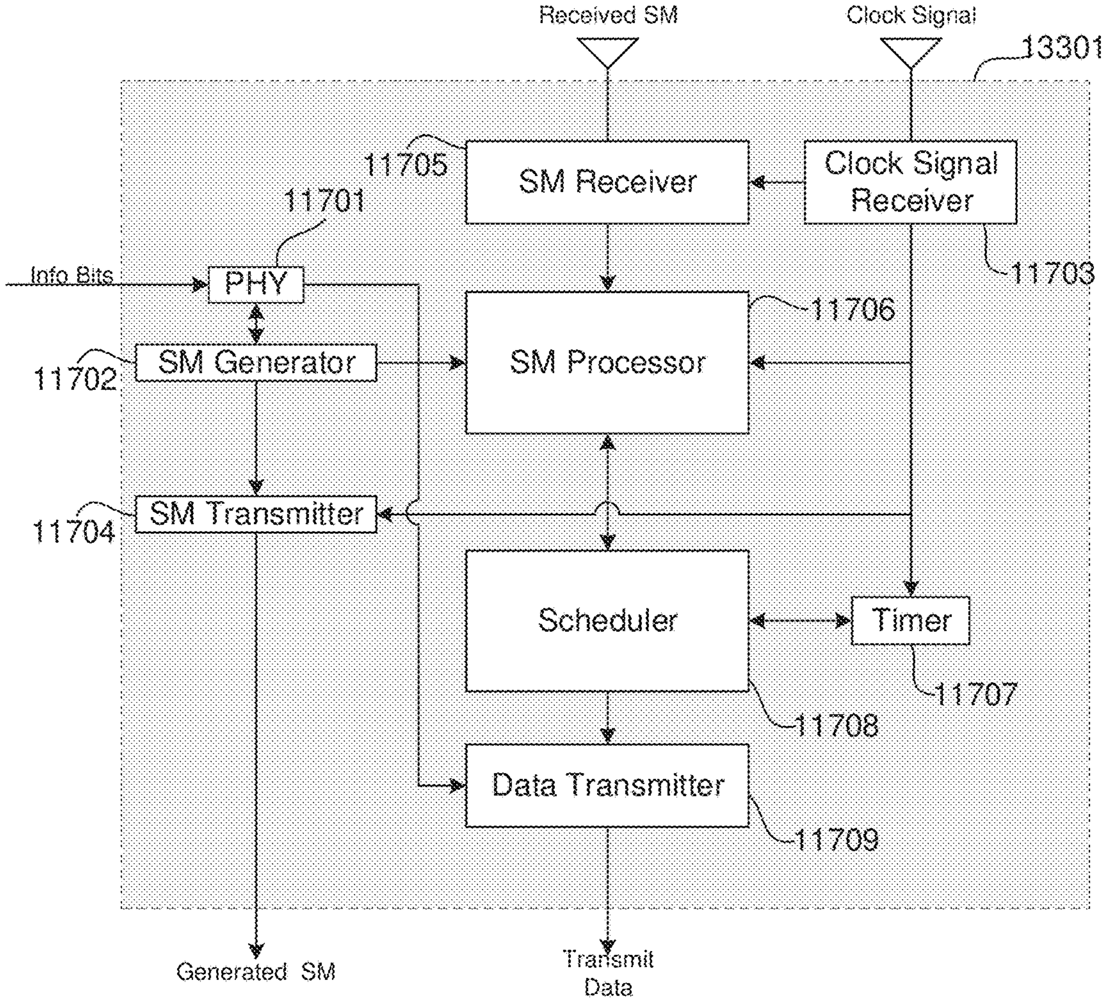
FIG. 117 shows an exemplary internal configuration of a communication device in accordance with various aspects of the present disclosure.

FIG. 117 shows an exemplary internal configuration of a communication device 11401 in accordance with various aspects of the present disclosure. Communication devices 11402, 11403, 11501, 11502, 11503, 11601, 11502, 11603 and 11612 may be configured in an equal or similar manner. The communication device 11401 of FIG. 117 may correspond to the terminal device 102 shown in FIG. 2. As the illustrated depiction of FIG. 117 is focused on aspects in relation to transmission, reception and processing of scheduling messages, for purposes of conciseness, FIG. 117 may not expressly show certain other components of terminal device 102. As shown in FIG. 117, in some aspects, the communication device 11401 may include a digital signal processing subsystem 11701, a scheduling message (SM) generator 11702, a scheduling message (SM) transmitter 11704, a scheduling message (SM) receiver 11705, a scheduling message (SM) processor 11706, a scheduler 11708, a data transmitter 11709, a clock signal receiver 11703 and a timer 11707. Each of digital signal processing subsystem 11701, scheduling message generator 11702, scheduling message transmitter 11704, scheduling message receiver 11705, scheduling message processor 11706, scheduler 11708, data transmitter 11709, clock signal receiver 11703 and timer 11707 may be incorporated in or may for example be part of the baseband modem 206 of the terminal device 102 shown in FIG. 2. Each of digital signal processing subsystem 11701, scheduling message generator 11702, scheduling message transmitter 11704, scheduling message receiver 11705, scheduling message processor 11706, scheduler 11708, data transmitter 11709, clock signal receiver 11703 and timer 11707 may be structurally realized as hardware (e.g., as one or more digitally-configured hardware circuits, such as ASICs, FPGAs, or another type of dedicated hardware circuit), as software (e.g., one or more processors configured to retrieve and execute program code that defines arithmetic, control, and/or I/O instructions and is stored in a non-transitory computer-readable storage medium), or as a mixed combination of hardware and software. While digital signal processing subsystem 11701, scheduling message generator 11702, scheduling message transmitter 11704, scheduling message receiver 11705, scheduling message processor 11706, scheduler 11708, data transmitter 11709, clock signal receiver 11703 and timer 11707 are shown separately in FIG. 117, this depiction generally serves to highlight the operation of the communication device 11401 on a functional level. Digital signal processing subsystem 11701, scheduling message generator 11702, scheduling message transmitter 11704, scheduling message receiver 11705, scheduling message processor 11706, scheduler 11708, data transmitter 11709, clock signal receiver 11703 and timer 11707 can therefore each be implemented as separate hardware and/or software components, or one or more of digital signal processing subsystem 11701, scheduling message generator 11702, scheduling message transmitter 11704, scheduling message receiver 11705, scheduling message processor 11706, scheduler 11708, data transmitter 11709, clock signal receiver 11703 and timer 11707 can be combined into a unified hardware and/or software component (for example, a hardware-defined circuitry arrangement including circuitry to perform multiple functions, or a processor configured to execute program code that defines instructions for multiple functions).

Figure 118:
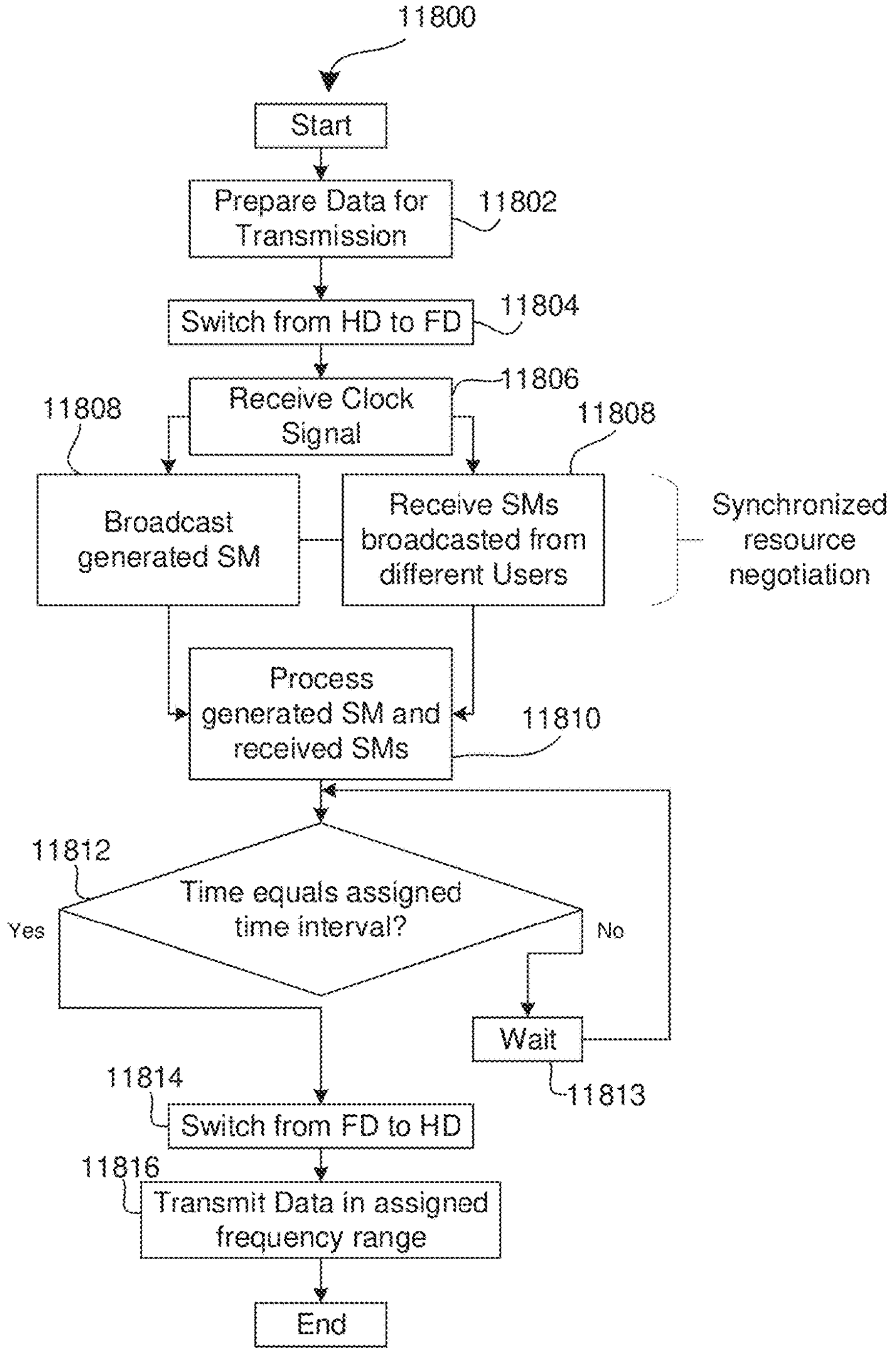
FIG. 118 shows an exemplary method, which a communication device may execute using the internal configuration of FIG. 117 in accordance with some aspects.

FIG. 118 shows exemplary method 11800, which communication device 11401 may execute using the internal configuration shown in FIG. 117. The communication device 11401 may prepare information bits of data for transmission in a next transmission time interval (a transmission time interval following an exchange and a processing of scheduling messages) in stage 11802 using the digital signal processing subsystem 11701. Data preparation may in certain aspects involve procedures following formatting protocols related to the physical (PHY) layer such as data protection using forward error correction (FEC), mapping of encoded data to predefined modulation symbols, e.g. QPSK or QAM modulation symbols, or the like. In certain aspects, a communication device may in an optional stage 11804 switch a transmission mode from a half duplex (HD) mode to a full duplex (FD) mode so that each communication device 11401 may transmit data and may essentially at the same time (e.g. within a common time interval) receive data. Stage 11804 (and stage 11814) may be optional e.g. if a communication device does not need to switch to a full duplex mode.

In stage 11806, a clock signal received via clock signal receiver 11703 may initiate a resource negotiation stage 11808 between the communication devices 11401, 11402, 11403, which may correspond to a scheduling time interval. As described, the clock signal can be a signal from a global navigation satellite system (GNSS) 11410. During the resource negotiation stage or scheduling interval 11808, each communication device 11401 may broadcast a scheduling message (generated scheduling message) generated with scheduling message generator 11702 via scheduling message transmitter 11704 while it may receive scheduling messages (received scheduling messages) from each other communication device 11402, 11403 using scheduling message receiver 11704.

In certain aspects, the communication device may be configured to transmit the generated scheduling message to the at least one further communication device using at least one communication frequency and the communication device may be configured to receive the scheduling message using the same at least one communication frequency. For example, all communication devices 11401, 11402, 11403 may communicate all scheduling messages within a scheduling time interval using a common frequency range. Using the common frequency range, the scheduling messages may collide and interfere. In various aspects, the communication device may be configured to perform interference cancellation processing to reconstruct the received scheduling message from a received signal. For example, a received signal may be a combined signal comprising the generated scheduling message from the communication device itself (e.g. as a self-transmitted scheduling message) and the received scheduling message from a different communication device. The self-transmitted scheduling message may be a scheduling message transmitted by the communication device and received by a receiver of the communication device itself at the same time. The received signal may be a combined signal comprising a plurality of scheduling messages from the communication device and from a plurality of respective different communication devices. Using interference cancellation processing, the communication device may reconstruct each of the scheduling messages received from each respective one of the different communication devices. In various aspects, the communication device may be configured to perform successive interference cancellation to first cancel self-transmitted scheduling messages (e.g. PRHs) and then decode and cancel the second strongest received scheduling message (e.g. PRH), and any subsequent scheduling messages e.g. ordered by a respective signal strength. In various aspects, successive interference cancellation may be performed until a stop criterion is reached, e.g. when a maximum number of iterations is reached or when a quality measurement (e.g. a cyclic redundancy check) is below a predefined threshold).

In various aspects, a transmission format of each scheduling message may be predefined, and upon processing the generated scheduling message and the received scheduling message, the communication device may be configured to reconstruct the received scheduling message from a received signal based on a respective predefined format of the received scheduling message. For example, such predefined format of the scheduling messages may be predefined by a standard and/or may be stored in a corresponding memory of the communication device. Such predefined format of the scheduling message (which may in certain aspects be a separate message or a header or preamble of a message including further data) may facilitate reconstruction of scheduling messages via interference cancellation.

In certain aspects, for example the scheduling message receiver 11704 of each communication device 11401 may apply in particular successive interference cancellation and may thus decode and subtract a stronger scheduling message out of a combined received signal including all scheduling messages from the combined signal to extract a weaker scheduling message from the combined data signal. Further, in certain aspects, using e.g. knowledge of said predefined scheduling message formats, the scheduling message receiver 11704 of each communication device 11401 may attempt to decode all scheduling messages in parallel and may determine if decoding of a scheduling message has been successful or not using e.g. CRC. The communication device 11401 may then apply dedicated interference cancellation using the scheduling messages that have passed the CRC to recover those scheduling messages that have not passed the CRC. In various aspects, channel coding redundancy is applied to each scheduling message for protection. In certain aspects, a higher degree of redundancy may be applied to scheduling message including a higher first priority. For example, a scheduling message for a communication device that intends to transmit data of an emergency message or call may include a highest first priority and may be provided with a corresponding highest degree of redundancy.

In certain aspects, communication devices may broadcast scheduling messages in predefined or dynamically chosen subranges of a global frequency range. In these aspects, collisions of scheduling messages are restricted to the respective subranges and corresponding communication devices may apply interference cancellation processing within these subranges to reconstruct respective scheduling messages. The subrange may e.g. be predefined by a standard and stored for each communication device in a corresponding memory.

Subsequent to the resource negotiation stage 11808, a scheduling message processor 11706 of each communication device 11401 may locally process the received scheduling messages and its own (the generated) scheduling message in stage 11810 by applying a dedicated algorithm. The algorithm can in certain aspects be predefined by a standard and can be stored in a local memory of each communication device 11401. By applying the dedicated algorithm, the scheduling message processor 11706 may determine a scheduling parameter. In certain aspects, the scheduling parameter may define a transmission time interval and the communication device may be configured to transmit the data during the transmission time interval. In certain aspects, in addition or alternatively, the scheduling parameter may define a frequency resource and the communication device may be configured to transmit the data using the frequency resource.

In certain aspects, the scheduling message processor 11706 may thus determine resource assignment for the communication device 11401 to be used in a transmission interval following the resource negotiation stage 11808. Based on the scheduling parameter, e.g. the assigned frequency resources and the assigned time interval, a scheduler 11708 may schedule transmission of data in said transmission time interval for the communication device 11401. Data transmission may thus be performed in a shared channel, e.g. a predefined frequency band by one communication device only within an assigned transmission time interval, or more than one communication device may transmit data within said transmission time interval using respectively assigned frequency resources. The scheduling parameter may include a start time and a length of the time interval for each communication device or the length may be a predefined value fixed by a standard and may be stored e.g. in a local memory of each communication device 11401.

In various aspects, scheduling messages of each communication device 11401, 11402, 11403 may be transmitted in a predefined subrange of a global frequency range. The subrange may e.g. be predefined by a standard and may be stored for each communication device 11401, 11402, 11403 in a corresponding memory. In certain aspects, the scheduling messages communicated within the subrange of the frequency range can include control information to assign the same or different frequency ranges within the global frequency range, including the entire global frequency range, to communication devices for data transmission in an assigned time interval. In certain aspects, a subrange of a global frequency range within which a scheduling message may be broadcasted by a communication device may be dynamically chosen for the communication device for each resource negotiation stage.

Referring back to FIGS. 117 and 118, having processed the own (generated) and the received scheduling messages in stage 11810, the scheduling message processor 11706 may in certain aspects pass the determined scheduling parameter to the scheduler 11708 which determines if the own communication device 11401 is scheduled for data transmission at stage 11812. The scheduler 11708 may for example refer to a timer 11707 started in synchrony with a received clock signal, e.g. at reception of the clock signal or at another suitable point in time, e.g. when the scheduling parameter is passed from the scheduling message processor 11706 to the scheduler 11708. The timer 11707 may be started at the point in time, e.g. when the scheduling parameter is passed from the scheduling message processor 11706 to the scheduler 11708 for a duration indicating a start of a time interval assigned to communication device 11401 for data transmission. In certain aspects, a timer being in synchrony with a clock signal may ensure that all communication devices 11401, 11402, 11403 refer to a common time.

In certain aspects, if the scheduler 11708 determines that the time e.g. indicated by the timer (e.g. upon expiry of said timer) corresponds to a start of an assigned transmission time interval, a mode of communication device 11401 may be switched from a full duplex mode to a half duplex mode at stage 11814. Subsequently, communication device 11401 may transmit data at stage 11816 using data transmitter 11709 during the time interval assigned by the resource assignment. If the time does not yet equal start of the assigned time interval, the scheduler 11708 may in aspects perform waiting processing at stage 11813, e.g. may start timer 11707 again, or may wait until timer 11707 is expired.

Figure 119A:
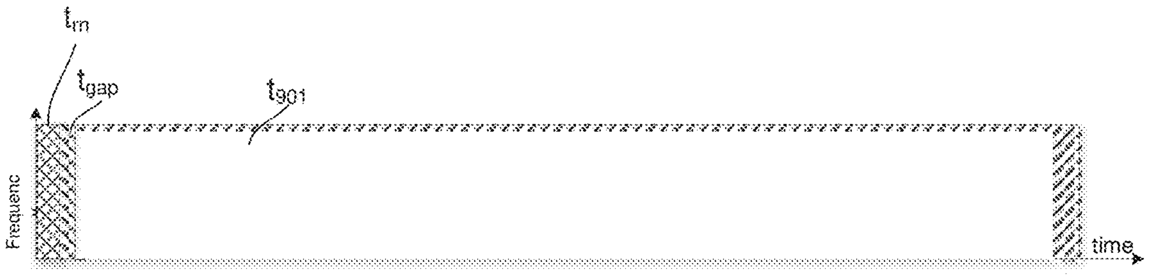
FIGS. 119A and 119B show exemplary timing diagrams in accordance with certain aspects.
Figure 119B:
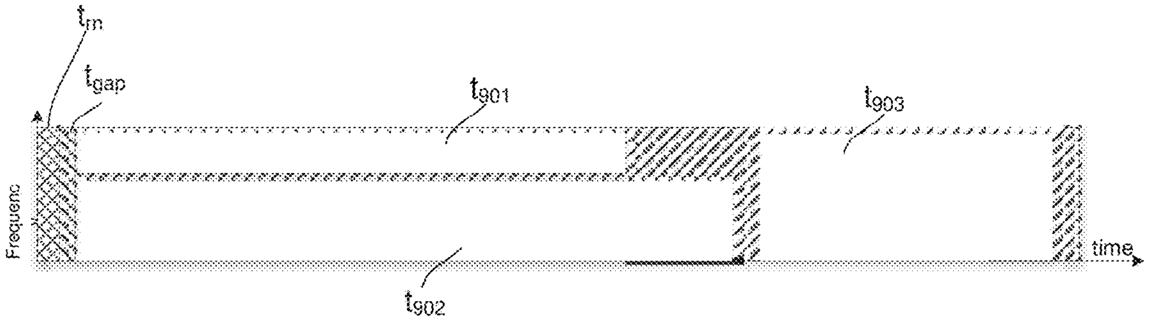

FIGS. 119A and 119B show timing diagrams in accordance with certain aspects. As shown, e.g. initiated by a global clock signal, the communication devices 11401, 11402, 11403 may first perform resource negotiation in time interval $t_m$ (resource negotiation stage 11808) in full duplex mode. During this resource negotiation $t_m$, each communication device may receive multiple scheduling messages from different communication devices while at the same time broadcasting an own (generated) scheduling message. Even though only one negotiation session is exemplarily shown, in various aspects, further negotiations may be employed. For example, in a first negotiation session, scheduling messages may be exchanged among a plurality of communication devices to arrive at an assignment of time intervals for data transmission for each communication device. In a further negotiation session, scheduling messages may be exchanged among communication devices to assign frequency resources to each communication device. In addition or alternatively, for example, in a first resource negotiation session, first priorities may be compared and if necessary (if first priorities are found to be matching), second priorities may be compared in a subsequent resource negotiation session. A further negotiation session (in advance or subsequently) may determine a communication device to take the functions of master communication device 11612.

In aspects, after having run a dedicated algorithm locally over the generated and the received scheduling messages, each communication device may perform processing for scheduling its own data transmission in accordance with assigned resources during a switching gap $t_{gap}$. During the switching gap $t_{gap}$, communication devices may in certain aspects switch from a full duplex mode to a half duplex mode. Following the switching gap $t_{gap}$, the communication devices may transmit data in accordance with the resource assignment in a data communication session, which may precede a further resource negotiation session.

In FIGS. 119A and 119B, data communication sessions are denoted as $t_{11401}$, $t_{11402}$ and $t_{11403}$, respectively indicating data communication sessions for communication devices 11401, 11402 and 11403. As shown in FIG. 119A, the scheduling parameter may define a time interval within a global frequency range (the y-axis in the figure indicates frequency, the x-axis indicates time) only to a the communication device 11401 for data transmission. Following this time interval, a further communication device may be assigned a further time interval for data transmission or the time interval may be flowed by a new resource negotiation session among all communication devices. In the latter case, in certain aspects, e.g. a first priority and/or the second priority for the communication device that has already transmitted data (communication device 11401 in FIG. 119A) may be restricted.

Further, shown in FIG. 119B, the scheduling parameter may define respective subranges of the global frequency range to respective communication devices (communication devices 11401 and 11402 in 119B) within a common time interval (within this time interval, data transmission times for each communication device may differ as indicated by the respective lengths of $t_{11401}$, $t_{11402}$ along the x-axis).

Subsequent to said interval, a time interval $t_{11403}$ during which a further communication device (communication devices 11403 in 119B) is assigned the global frequency range for data transmission. As illustrated, in certain aspects e.g. a first priority may be set such that data communication types requiring less bandwidth have a higher priority, which in certain aspects may have the effect that more communication devices may gain a quick access to a communication channel.

Figure 120A:
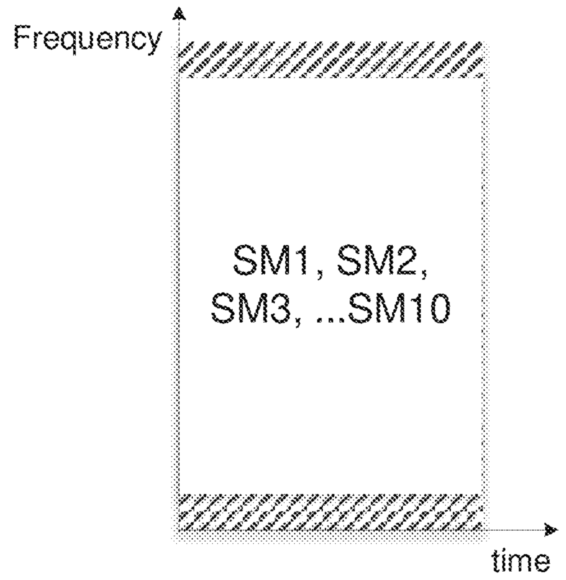
FIGS. 120A and 120B, illustrate exemplary frequency resources that may in certain aspects be used for broadcasting scheduling messages.
Figure 120B:
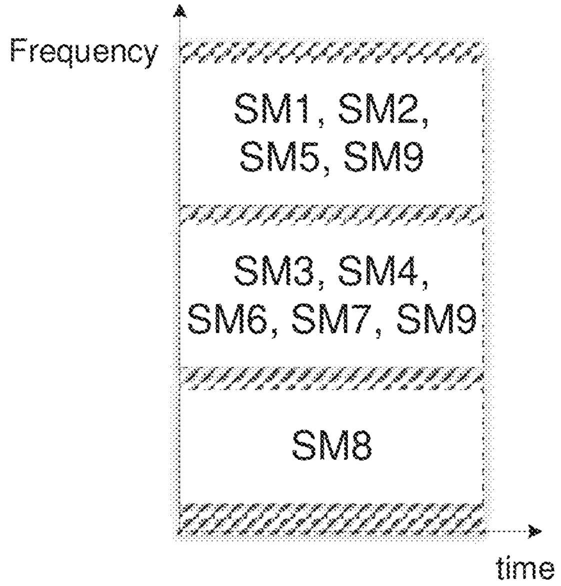

FIGS. 120A and 120B, illustrate frequency resources that may in certain aspects be used for broadcasting scheduling messages. According to an aspect illustrated in the FIG. 120A, an exemplary number of ten communication devices within a group of distributed communication devices broadcasts respective scheduling messages SM1, SM2, . . . SM10 using a common frequency range, the scheduling messages being separated e.g. by code division multiplexing (CDM). In this aspect, all scheduling messages SM1, SM2, . . . SM10 collide in the frequency domain and each communication device may reconstruct each of the scheduling messages received from the other communication devices e.g. applying interference cancellation techniques such as successive interference cancellation.

In certain aspects as exemplarily illustrated in FIG. 120B, each communication device may select a random subrange of a global frequency range to transmit a scheduling message. In certain aspects, each communication device may apply a blind search to determine a range of possible frequency resources. For example, a communication device may initially not be aware of frequency locations of all scheduling messages. The communication device may attempt to decode a number of possible frequency ranges until a decoding result passes e.g. a cyclic redundancy check (CRC). In this way, a communication device not initially aware of frequency ranges used for broadcast of scheduling messages may apply blind decoding to determine and decode existing scheduling messages. In such aspects, e.g. scheduling messages SM1 and SM3 shown in FIG. 120B do not collide so that interference is reduced. Therefore, in such aspects, less interference per subrange of the global frequency range may facilitate decoding of scheduling messages within said subrange. A resource assignment for a subsequent data transmission can in these aspects be restricted to the respective subrange, i.e. a communication device broadcasting SM1 in the shown subrange may also transmit the scheduled data using the same subrange. Alternatively, subranges for subsequent data transmission may be negotiated using the scheduling messages.

As discussed above, in various aspects of the present disclosure, a scheduling message may define a transmission time interval and/or a frequency range to be used for data transmission. In further aspects, the generated scheduling message may comprises information on a transmission power, a modulation scheme, and/or a coding rate for transmission of the data by the communication device. Accordingly, in these aspects the received scheduling message may comprise information on a transmission power, a modulation scheme, and/or a coding rate for a transmission of data by the at least one further communication device. The processor is then configured to determine the scheduling parameter based on a comparison of the information on the transmission power, the modulation scheme, and/or the coding rate of the generated scheduling message with the information on the transmission power, the modulation scheme, and/or the coding rate of the received scheduling message.

In other words, in various aspects, each scheduling message may include in addition or alternatively to a transmission time interval and/or a frequency resource transmission parameters such as transmission power, modulation scheme, coding rate, which a corresponding communication device intends to apply in the subsequent data transmission. Further, each scheduling message may alternatively or in addition include as transmission parameter an indication of a number of transmission layers, i.e. data streams with dedicated codewords (data block with error protection) a communication device configured for Multiple Input Multiple Output (MIMO) communication intends to transmit concurrently in an assigned time interval.

Such transmission parameters may be employed by each communication device e.g. for assisting interference cancellation and may also be employed in determining the resource assignment. For example, the transmission parameters may be used by the local algorithm used by each communication device for processing of the scheduling messages to derive an optimal resource allocation for a subsequent data transmission. For example, in certain aspects multiple data transmissions may be performed in a time/frequency grid during the data communication session. In such aspects, for example a number of resource blocks assigned to data transmission of a communication device may be determined based on a coding rate the communication device intends to use for the data transmission and therefore includes into the scheduling message. In further aspects, for example a communication device, which has a significantly higher (or lower) transmission power than the other communication devices within a common area (e.g. area 11405) may be assigned no transmission time interval in order to avoid power imbalance at the receiver side.

As described above, in various aspects, scheduling messages are broadcasted essentially synchronously by a plurality of communication devices in a common scheduling time interval e.g. using a common frequency range. The scheduling messages thus colliding can be reconstructed at each communication device using dedicated interference cancellation schemes.

In alternative aspects, transmission of scheduling messages among communication devices within a plurality of communication devices may be unsynchronized within a common frequency range. In these aspects, scheduling messages may collide with ongoing data transmission. In these aspects, scheduling message processor 11706 of a communication device 11401 receiving a scheduling message from a different communication device while transmitting data different from a scheduling message (data transmission and scheduling message reception in a full duplex mode) may apply dedicated whitening/filtering algorithms to decode the received scheduling message. In these aspects, scheduling messages may be provided with a sufficient amount of redundant bits such that scheduling messages can be reconstructed at the communication devices.

In these aspects, a scheduler 11708 of each communication device may further take into account ongoing data traffic in a frequency range within which a communication device intends to transmit data by employing a CSMA listen before talk scheme as illustrated in FIG. 113. In other words, in these unsynchronized aspects, a communication device being scheduled to transmit data in a certain frequency range based on a scheduling message negotiation, may listen to the frequency range until ongoing data transmission is terminated before starting its own data transmission.

Figure 121:
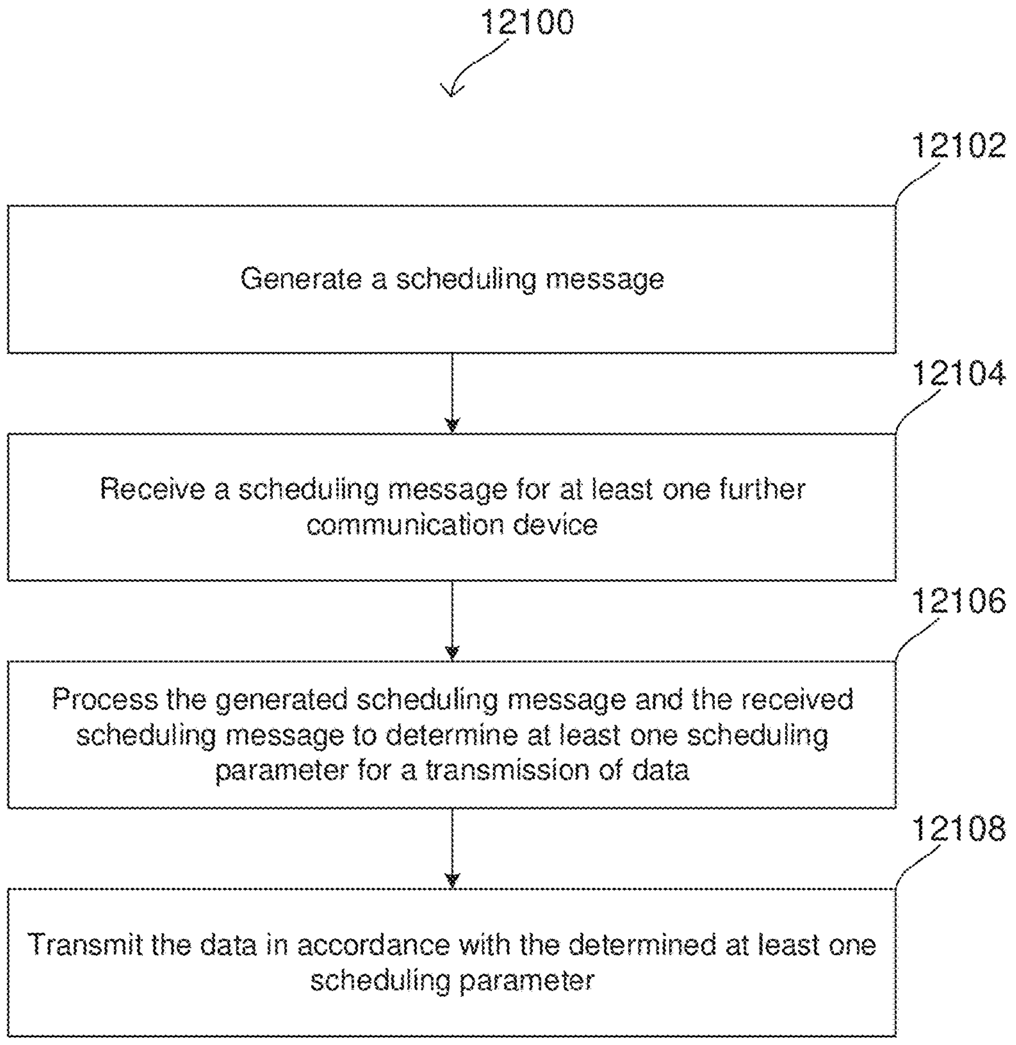
FIG. 121 shows an exemplary method for a communication device according to some aspects.

FIG. 121 shows exemplary method 12100 for a communication device according to some aspects. As shown in FIG.

121, method 12100 includes generating a scheduling message (12102), receiving a scheduling message for at least one further communication device (12104), processing the generated scheduling message and the received scheduling message to determine at least one scheduling parameter for a transmission of data (12106), and transmitting the data in accordance with the determined at least one scheduling parameter (12108).

Full-Duplex Small Cell Based with Extreme Fast Link Adaptation

Currently methods for LTE link adaptations are performed in a very coarse manner because of the time duration between the channel state estimation and the channel state feedback is too long due to the large propagation delay, the UE reporting delay in frequency division duplex (FDD), and/or the Tx/Rx duplexing delay in time division duplex (TDD).

In some aspects, devices are configured to transmit uplink and downlink signals (e.g., reference signals) on the same time-frequency resources for preserving channel reciprocity and avoiding processing delays in order to perform a more robust and efficient link adaptation within a channel coherence time. Terminal devices and/or network access nodes may be configured to immediately perform channel estimation and begin pre-equalization as soon as reference signals are received since each of the respective communication devices will be able to use its own transmitted reference signal as a self-interferer in interference cancellation. Accordingly, a number of benefits may be realized, such as improved and/or faster link adaptation, pre-code selection, and sub-band selection.

Network access nodes, especially those deployed as small cell base stations, may make use of the full duplexing for link adaptation between the respective network access node and connected terminal devices. This full duplex mode (FD) mode (including a partial FD mode, wherein only pilots/reference symbols are duplexed) may be implemented from the terminal device to the network access node, and/or vice versa, depending on the communication network design.

In the context of small cells, the FD modes provide enhanced benefits due to the small propagation delay (e.g., minor timing advance) which may be attributed to the relatively small distance between the small cell network access node and the connected terminal devices. Small cells may be seen as being similar to WiFi access points, but they use LT E communication technology and have a range of roughly about 50 m to 100m. As a result, the uplink and the downlink paths are much smaller. In FD, the transmit and receive chains may be configured to be operate in the same carrier frequency.

FIGS. 122-125 show exemplary scenarios implementing FD methods in some aspects, for example, with respect to communication network 100 showing a network access node 110 (e.g., a small cell network access node) and a terminal device 102.

Figure 122:
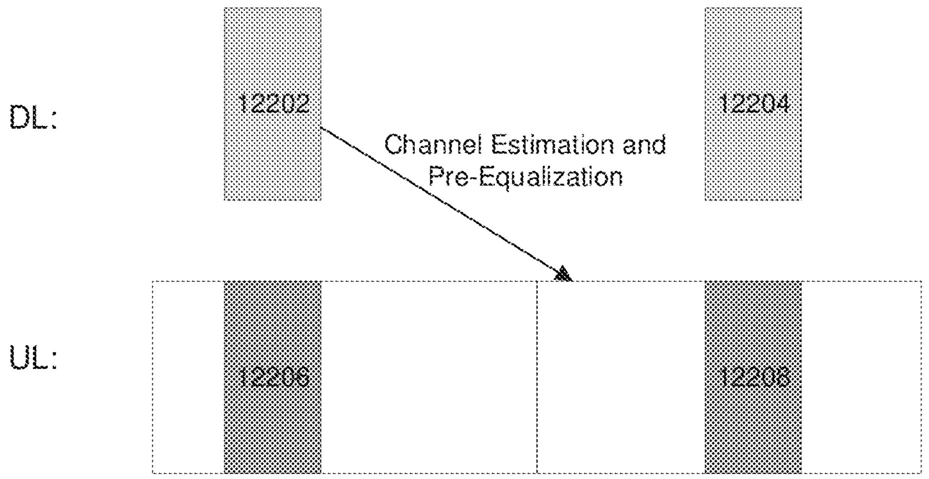
FIGS. 122-125 show exemplary illustrations implementing full duplex (FD) methods in some aspects.

FIG. 122 shows a first exemplary scenario implementing FD methods in some aspects of this disclosure. In FIG. 122, the downlink (DL) pilot symbols (12202 and 12204) are transmitted from the network access node to the terminal device (e.g., UE) and the uplink (UL) pilot symbols (12206 and 12208) are transmitted from the terminal device to the network access node. The resources not occupied by the pilot/reference symbols, e.g., the space between 12206 and 12208, may be reserved for communicating other data or information.

In FIG. 122, the pilot symbols are full duplexed, so that the transmissions and the receptions are performed at the same time at the terminal device side. The DL pilots and the UL pilots may be transmitted as orthogonal reference sequences to minimize the TX/RX co-interference (e.g., demodulation reference signal (DMRS)) and may be time/frequency overlapped only for the pilot symbols.

The terminal device may be configured to make use of the DL pilots (12202 and 12204) to perform a channel estimate and may use this information to pre-equalize data sent in the UL. Based on the channel estimates determined directly from the DL pilots (12202 and 12204), the terminal device may pre-equalize the UL data symbols or may perform other link adaptations, e.g., pre-coding or sub-band selection, for more efficient and robust signaling with the network access node. Accordingly, one of the only delays the terminal device may experience, therefore, is the Rx signal processing delay, thereby facilitating the pre-equalization to be performed within a channel coherence time. A similar scheme may be implemented from the network access node point of view, and in V2V and/or D2D communications in short ranges.

In some aspects, by implementing the FD mode at the small cell level, the pre-equalization may be performed by the small cell network access node, thereby simplifying the terminal device receiver design. Accordingly, the benefits of the FD methods and devices described herein may be most readily apparent in scenarios where devices are in close proximity to each other, e.g., at the small cell level, D2D, V2V, etc., due to the better performance gains which may be attributed to lower UL and DL interference.

Figure 123:
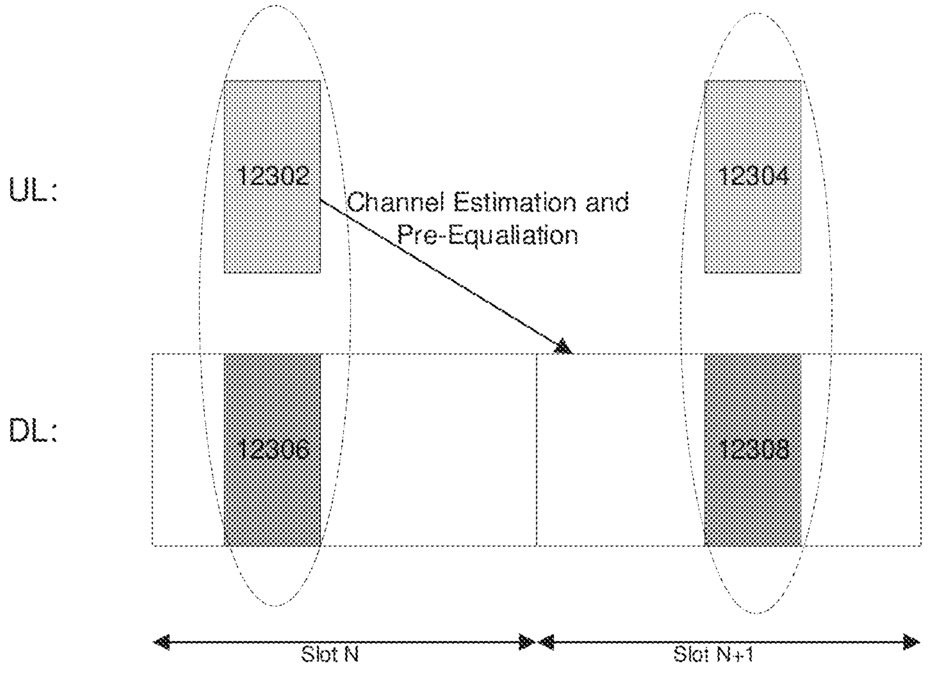

FIG. 123 shows another exemplary scenario implementing FD methods in some aspects of this disclosure where devices are in close proximity to one another, e.g., small cell, D2D, V2V. As shown in FIG. 123, the timing advance is virtually non-existent, e.g., almost 0, and there is a small power Δ between the TX and the RX. The UL reference symbols (12302 and 12304) and the DL reference symbols (12306 and 12308) may be orthogonal sequences to further mitigate the transmission self-interference, e.g., the transmitting devices may code division multiplex (CDM) the reference symbols. The network access node transmits 12306 and 12308 while simultaneously receiving 12302 and 12304, respectively, in order to estimate the channel transmission profile, H. Based on the channel estimate H from the reception of 12302, the network access node may be configured to pre-equalize all symbols transmitted in the DL in the slot N+1.

In some aspects, the devices may be further configured to perform a pre-equalization. For example, with respect to FIG. 123, the network access node may boost the transmission power for deep faded sub-carriers, thereby improving the signal to noise ratio (SNR) for the receiver. Current conventional receiver side based equalization cannot achieve this. Furthermore, the network access node may be configured to perform phase pre-equalization, including phase rotation to account for frequency offset errors. This simplifies the receiving device's baseband design and power consumption because the terminal device can potentially skip the channel estimation and equalization and directly proceed to demodulation of the received symbols. Additionally, the terminal device may use subsequent DL pilots symbols (e.g., 12308 in FIG. 123) to further improve channel estimations to help maintain or improve performance. And, because the pre-equalization is performed within the channel coherent time for the FD mode in devices which are in close proximity, delays experienced are attributed to digital signal processing delays.

The schemes described with respect to FIG. 123 may also be applied from the terminal device to the network access node, or between terminal devices operating in D2D and V2V communications.

Figure 124:
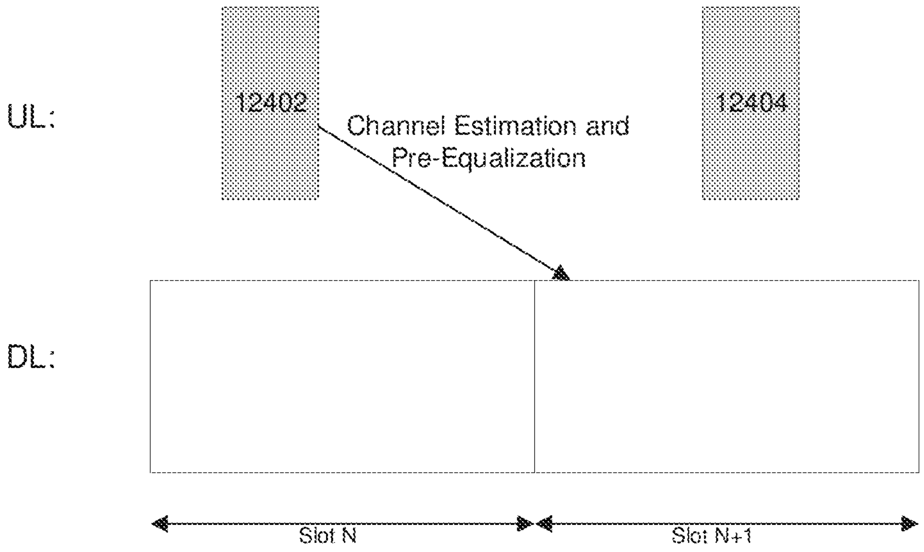

FIG. 124 shows another exemplary scenario implementing FD methods in some aspects of this disclosure, extended from FIG. 123. In FIG. 124, the UL reference symbols (12402 and 12404) are time and frequency overlapped (e.g., FD) with a subset of DL data symbols in Slots N and N+1. As shown in FIG. 124, the network access point does not transmit reference symbols in the DL, instead using its resources from transmitting DL data payloads to increase Dl throughput. The network access node may be configured to perform a similar pre-equalization procedure to the DL data symbols as described with respect to FIG. 123, where the network access node pre-equalizes the data symbols instead of the respective pilot symbols, wherein the only latency is caused by the digital signal processing delay. The terminal device DL receiver can thereby skip the channel estimation and equalization, and instead fully rely on the pre-equalized data for subsequent demodulation.

Figure 125:
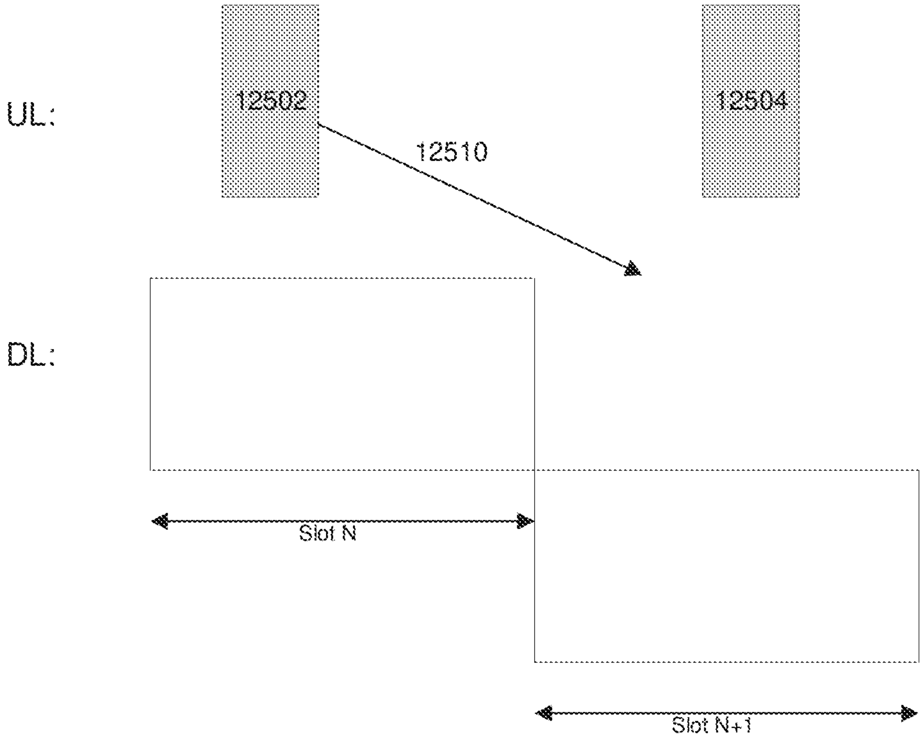

FIG. 125 shows an exemplary scenario implementing FD methods in some aspects of this disclosure.

In FIG. 125, the terminal device transmits UL reference symbols 12502 and 12504, which are time and frequency overlapped with a subset of DL data symbols. The UL data is transmitted in wideband, so that the network access node can estimate all the sub-band channels and select the best sub-band channel for transmitting the DL data. The network access node uses the received UL reference symbols for DL channel estimation and pre-equalization of DL data symbols, and also may further configured to use the received UL reference symbols to estimate the DL Channel Quality Indicator (CQI) and use it to optimize the DL modulation and coding scheme (MCS) and DL-sub band selection 12510. The MCS may be performed according to a MSC index, e.g., BPSK (binary phase-shift keying) modulation types, QPSK (quadrature phase-shift keying) modulation types, 16-QAM (quadrature amplitude modulation), 64-QAM, etc., on different spatial streams, varying coding rates (e.g., 1/2, 2/3, 3/4, 5/6), and different data rates (which may depend on the channel).

In some aspects, the description in FIG. 122-125 may be extended to a plurality of terminal devices, where there is a power difference between the reference signals from each of the multiple terminal devices and the network access node. Accordingly, the terminal devices may be configured to implement an iterative interference cancellation scheme in order to cancel reference signals from other terminal devices, so that the strongest interference reference signal from another terminal device is cancelled first to produce a first interference cancellation product signal, and after this first cancellation (i.e. first iteration of the interference cancellation), then the next strongest interference reference signal from another terminal device is cancelled (i.e. second iteration of the interference cancellation) from the first interference cancellation product signal of the first cancellation. This iterative interference cancellation scheme may be repeated for reference signals from other terminal devices in order of diminishing interference for a predetermined number of iterations (e.g. any integer greater than 1).

Figure 126:
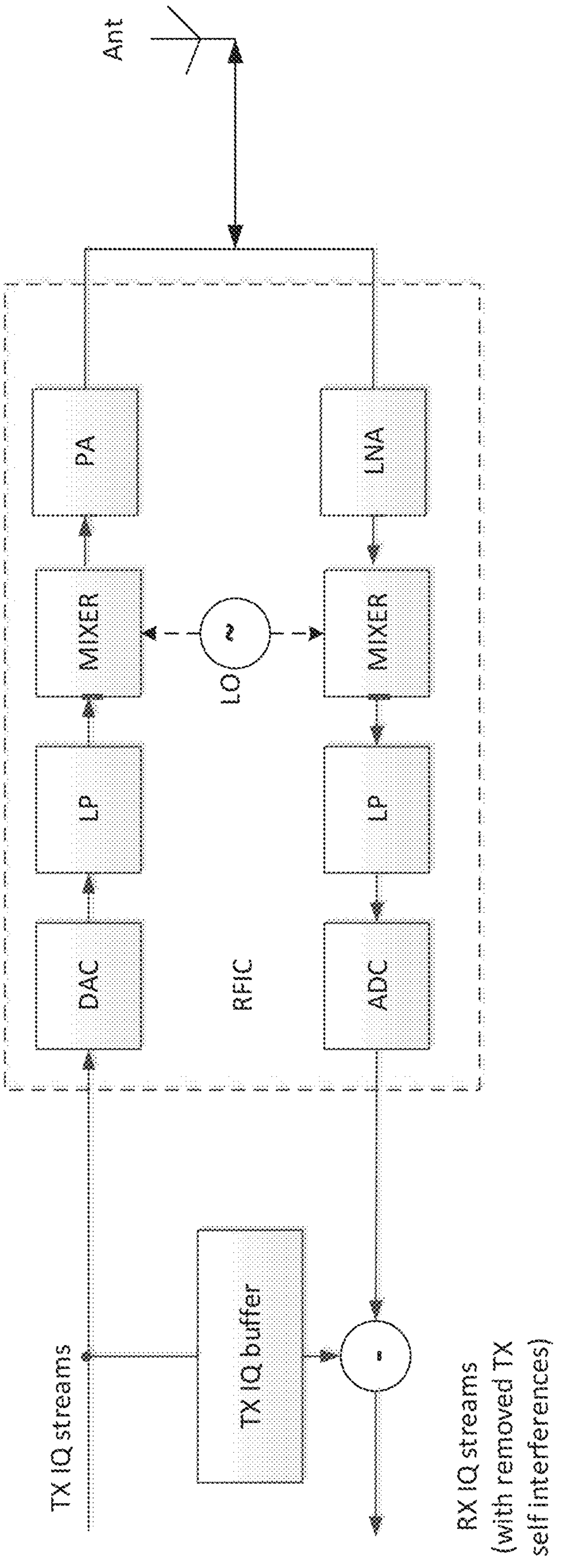
FIG. 126 shows an exemplary device configuration for low power Δ between transmitter and receiver for FD in some aspects.
Figure 127:
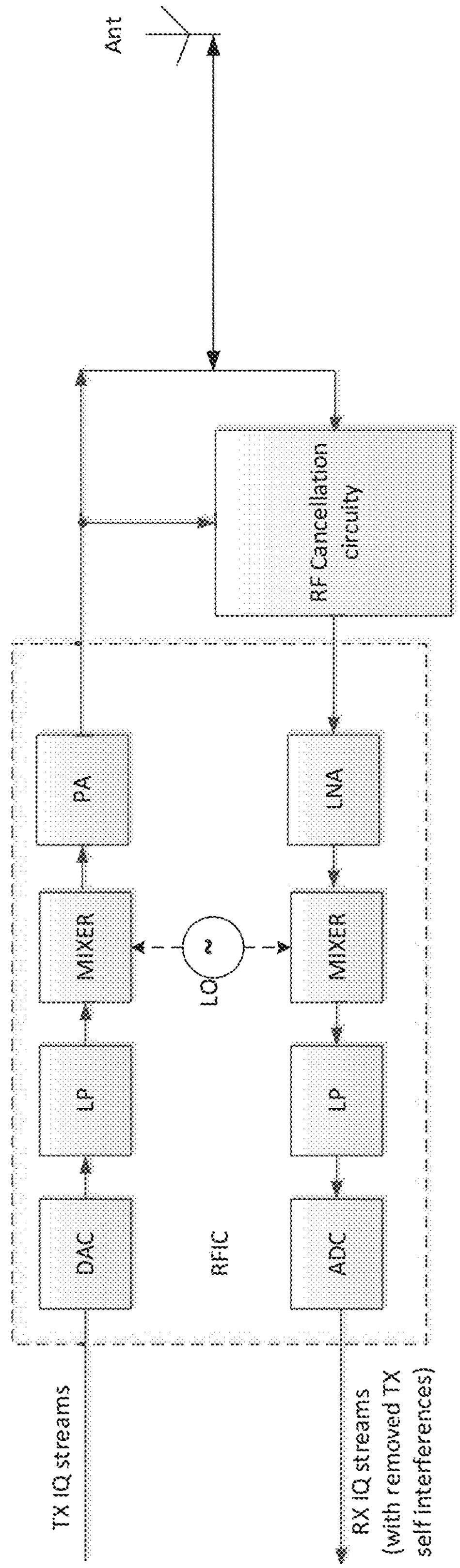
FIG. 127 shows an exemplary device configuration for high power Δ between transmitter and receiver for FD in some aspects.

FIGS. 126 and 127 show device configurations 12600 and 12700 for implementing the FD methods in some aspects of this disclosure. These configurations are exemplary in nature and may thus be simplified for purposes of this disclosure.

Device configuration 12600 shows a digital transmission self-interference cancellation configuration for FD, when the transmission and the reception has a lower power Δ, e.g., below 60 dBs. Device configuration 12700 shows a digital transmission self-interference cancellation configuration for FD, when the transmission and the reception has a higher power Δ, e.g., above 60 dBs.

The RF transmit (TX) chains in both configurations may include a digital to analog converter (DAC), a low-pass filter (LP), a mixer (MIXER), and a power amplifier (PA). The RF receive (RX) chains may include a low noise amplifier (LNA), a mixer, a LP, and an analog to digital converter (ADC). A local oscillator (LO) is also included to use with the MIXERs to modify the frequency of the signals.

Furthermore, configuration 12600 may include a transmit IQ buffer for reducing interference from the transmit chain from the received signal, while configuration 12700 may include radio frequency (RF) cancellation circuitry for reducing the transmit interference from the received signals.

In some aspects, a plurality of communication devices may be configured to align their power levels for V2X multicast/broadcast in order to facilitate FD (including the partial FD) operation between communication devices and/or network access nodes, or between terminal devices communicating in D2D and/or VRX scenarios. The clusters of power-aligned terminal devices may be grouped for each of respective network access node (e.g., small cell network access node), which may be either static or mobile (e.g., located in a vehicle). This process may include a node request (e.g., from a terminal device, or a vehicular communication device) to be part of a full duplex (FD) cluster, generation of a cluster ID (if not already generated) or acquisition of an already generated cluster ID, and allocation of the node to the cluster ID. A number of nodes (e.g., other terminal devices, vehicular communication devices, infrastructure nodes such as road side units, etc.) may be allocated to a same cluster ID, wherein all of the nodes of the same cluster ID are within close proximity relative to each other in order to match their power levels for FD.

Figure 128:
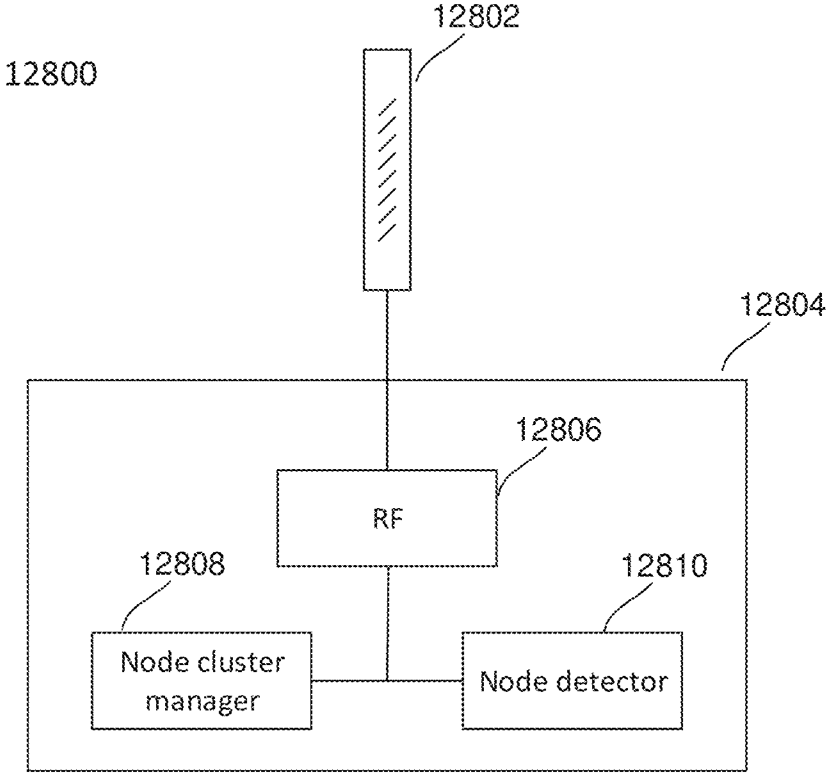
FIG. 128 shows an exemplary configuration of a terminal device in some aspects.

FIG. 128 shows an exemplary configuration of a terminal device configured to be a member of a cluster in some aspects. As shown in FIG. 128, the terminal device may include an antenna system 12802 and a communication arrangement 12804, wherein the antenna system may be configured in the manner of antenna systems described within this disclosure (e.g., FIG. 2, 5, 6). The communication arrangement 12804 may include an RF transceiver 12806 (which may operate in a similar manner as described in, for example, FIG. 2, 5, 6), node cluster manager 12808, and/or node detector 12810. Node cluster manager 12808 and node detector 12810 may be a physical layer, protocol stack, or application layer components, and, although not specifically limited to any particular implementation, may be part of one or more of a digital signal processor or controller of communication arrangement 12804 (e.g., as in digital signal processor 604 and controller 606 of vehicular communication device 500).

The node cluster manager 12808 may be a processor configured to retrieve (e.g., from a local memory) and execute program code that algorithmically defines the management of node clusters in the form of one or more executable instructions. For example, the program code executed by node cluster manager 12808 may include a node management subroutine which may define a procedure for creating and/or receiving a cluster ID from another communication device (or the network if within network coverage) and determining parameters for the management of the cluster, e.g., minimum power levels, GNSS position data, etc.

The node cluster detector 12808 may be a processor configured to retrieve (e.g., from a local memory) and execute program code that algorithmically defines the detection of other nodes in the form of one or more executable instructions. For example, the program code executed by node detector 12808 may include a detection subroutine which may define a procedure by which a node may detect other nodes and/or clusters in order to generate a new cluster or join an already existing cluster and/or may also include a detection subroutine for a node of an already formed cluster to detect closely located nodes for inviting to the formed cluster. This may include, at least, the transmission or broadcasting of its cluster ID.

Figure 129:
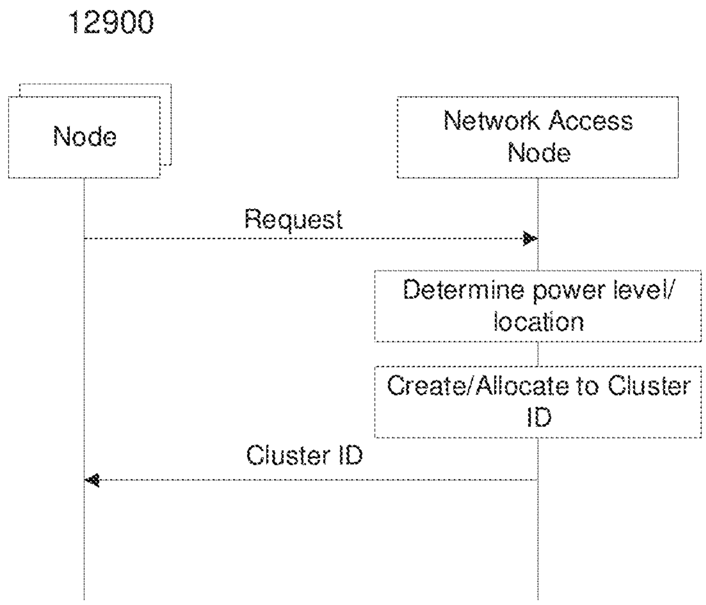
FIG. 129 shows an exemplary Message Sequence Chart (MSC) for Cluster ID creation/allocation in some aspects.

If there is network coverage, the network can handle the creation of the cluster ID and the allocation of nodes (including terminal devices) to a respective cluster ID, as shown in a message sequence chart 12900 in FIG. 129. A node may send a request to the network access node, which may determine the power level attributed to the node based on the request. Based on the determined power level and/or location of the node, the network may either create a cluster ID if no cluster ID exists for the determined power level, or allocate the node to an already created cluster ID based on determined power levels and/or location. Other nodes may be added to the cluster ID upon sending respective requests to the network and the network determining that the node meets the requirements (e.g., power levels and/or location via GNSS) for joining a cluster. Alternatively, the network may initiate the assignment of a node to a cluster by identifying a node within a cluster ID's coverage area using power levels and/or location (e.g., via GNSS) and sending a transmission to the node, including the cluster ID, with instructions for joining the respective cluster.

If there is no network coverage, e.g., in V2X communications, several options for the devices to negotiate the appropriate power levels to use in communications may be implemented wherein a master node assumes the responsibilities of the network as shown in FIG. 129. In a first option similar to discovery in D2D communications, there is an exchange in signaling between devices where there is a message response to the creation of a cluster ID by a master node, e.g., a terminal device or a vehicular communication device. The master node may then assign the cluster ID and send out invitations to closely located nodes to join the cluster, or each node may be configured to determine which cluster provides the best fit based on measured power levels (e.g., closest to its own power levels) and independently join the appropriate cluster. Other options may include utilizing geographic information (e.g., each terminal device may receive its positioning from GNSS and/or map) in order to form a cluster of closely located terminal devices. Further signaling (e.g., user ID and its geographic information) may be transmitted and included in the broadcasting signals associated with each respective user ID/geographic information. Accordingly, the master node may not be required in some aspects.

In some aspects, the FD mode is used for selection of a pre-coding matrix indicator (PMI) at the network access node. In current LTE communications, the calculation of the PMI is performed subject to a very long delay since the network access node has to send a signal to the terminal device, the terminal device performs a measurement on the signal, and reports the measurement back to the network access node, which then applies the appropriate PMI values in subsequent DL transmissions. This process may result in a delay, such as at least 8 ms. By implementing the FD mode in some aspects of this disclosure, the terminal device may immediately derive the PMI after receiving the FDed pilots (e.g., as seen in FIG. 122). Similarly, the channel quality indicator (CQI) may be determined by the network access node based on the UL pilots and apply it directly to the DL signals (e.g., as seen in FIG. 125).

In some aspects, the devices may be configured to determine whether or not the FD mode may be enable/disabled, or if the switch to another FD group may be required. The device may include hardware and/or software configured to detect the quality of the FD communications, and if the FD communication results in an error, the device may identify the source of the error (e.g., by identifying in which terminal device the error occurs), and exclude the terminal device from the FD group, e.g., cluster. In some aspects, the identified terminal device may be transferred to another FD group (e.g., with a different cluster ID) where its communication properties may prove a better fit, e.g., similar power levels and/or operating frequencies.

Figure 130:
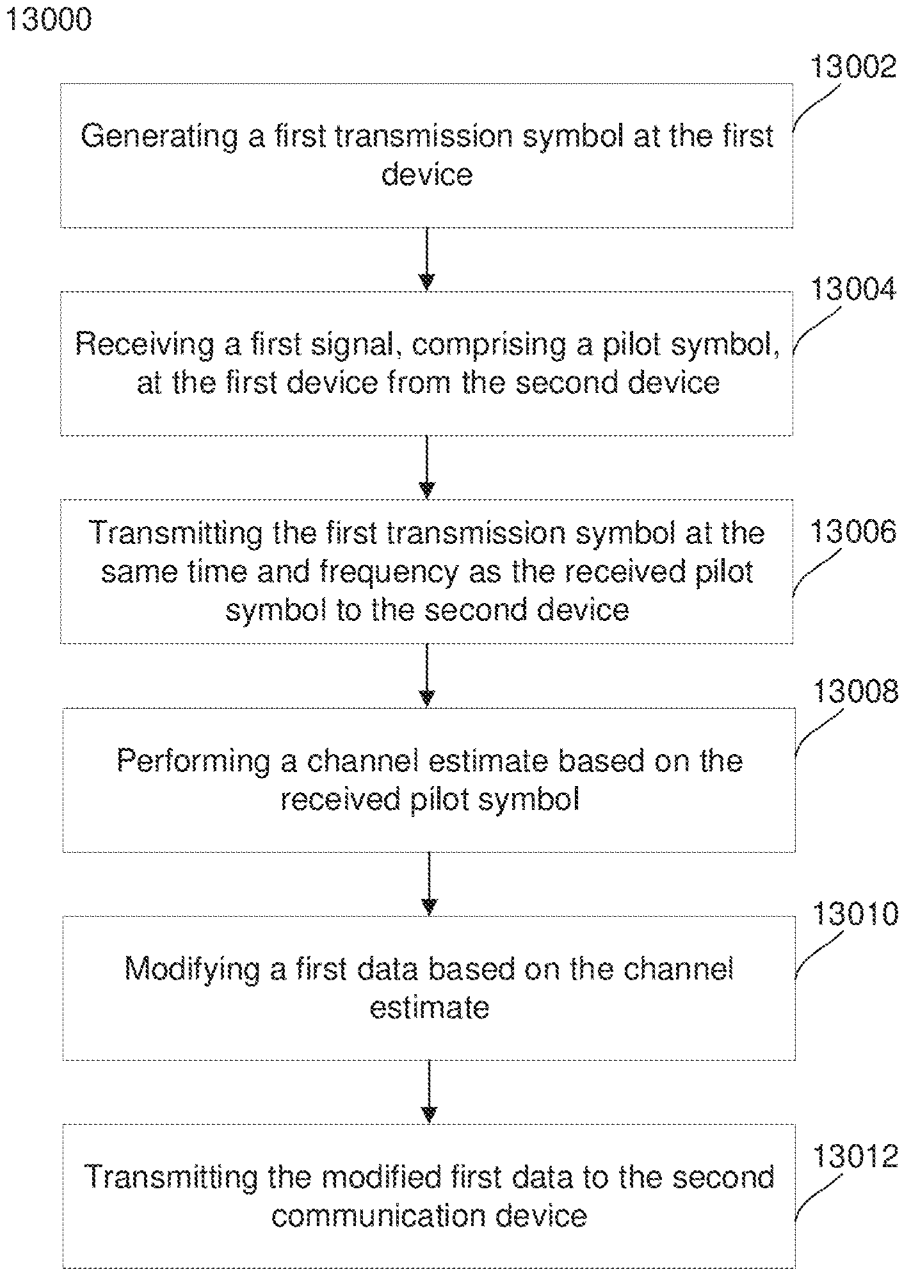
FIG. 130 shows an exemplary flowchart describing a method for communicating between a first device and a second device in some aspects.

FIG. 130 shows a flowchart 13000 describing a method for communicating between a first device and a second device in some aspects.

The method shown in flowchart 13000 may include: generating a first transmission symbol at the first device 13002; receiving a first signal, comprising a pilot symbol, at the first device from the second device 13004; transmitting the first transmission symbol at the same time and frequency as the received pilot symbol to the second device 13006; performing a channel estimate at the first device based on the received pilot symbol 13008; modifying a first data based on the channel estimate 13010; and transmitting the modified first data to the second communication device 13012.

Figure 131:
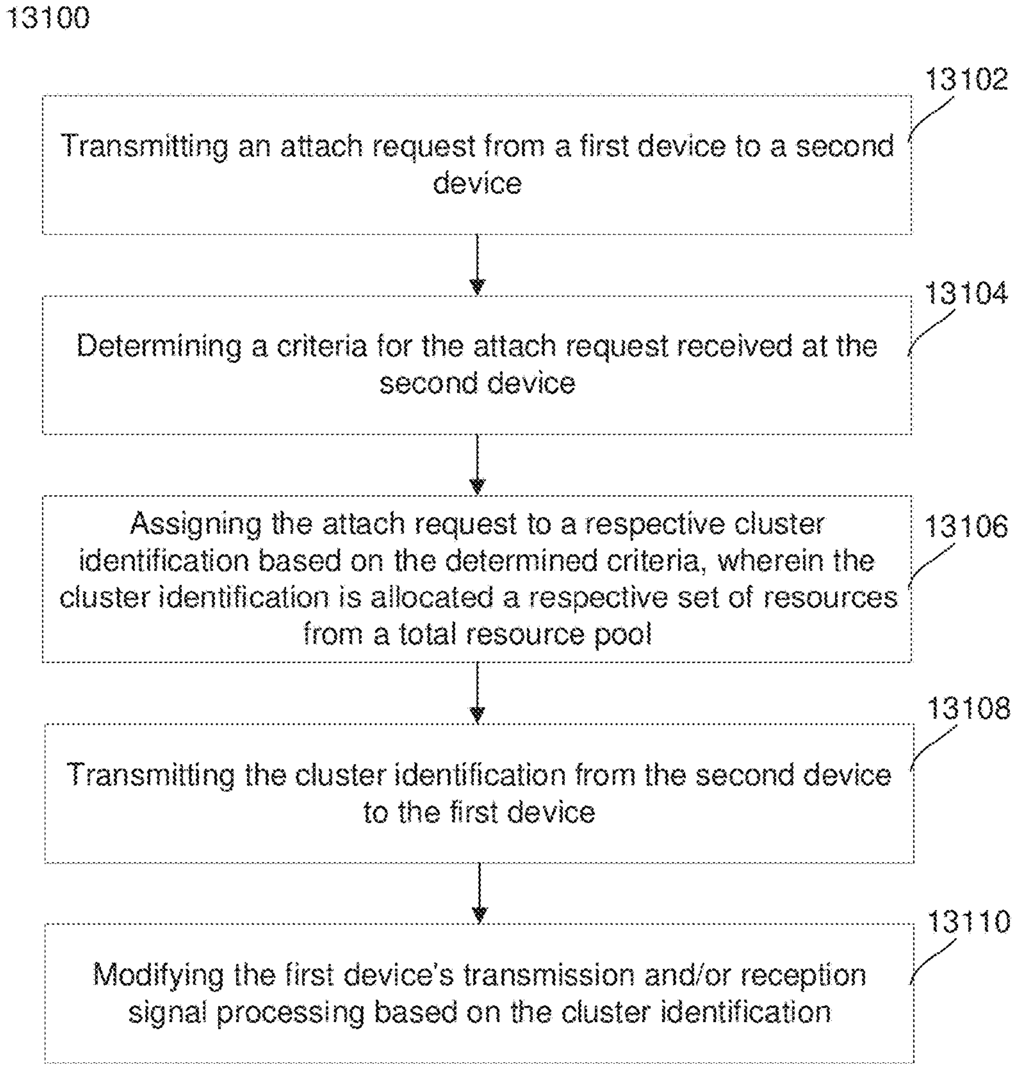
FIG. 131 shows an exemplary flowchart describing a method for wireless communications in some aspects.

FIG. 131 shows a flowchart 13100 describing a method for wireless communications in some aspects.

The method shown in flowchart 13100 may include: transmitting an attach request from a first device to a second device 13102; determining a criteria for the attach request received at the second device 13104; assigning the attach request to a respective cluster identification based on the determined criteria, wherein the cluster identification is allocated a respective set of resources from a total resource pool 13106; transmitting the cluster identification from the second device to the first device 13108; and modifying the first device's transmission and/or reception signal processing based on the cluster identification 13110. In some aspects, the device state information includes location information and/or information for determining a power of the signaling between the first device and the second device. In some aspects, the modified first device's signal processing may include the first device transmitting signals at a specified time and/or frequency.

Low Cost Broadcasting Repeaters

V2X is a multi-user broadcasting system, meaning that each user has to demodulate the signals broadcasted from multiple users at the same time, wherein each signal may have different time, frequency, and/or power offsets. As a result, there may be a wide range of varying signals (which are generally frequency-multiplexed) in a particular area at any given moment that a user may need to decode. In V2X or other geographic-dependent scenarios (e.g., installation of small cells within macro cells), there is a need to provide for more efficient broadcasting in order to reduce the interference between signals. Furthermore, it is advantageous to do so while maintaining a simple receiver design to reduce costs. Current conventional methods use dynamic beamforming arrangements, which are costly due to the multiple RF transmission antennas which may need strict clock synchronization, complex front-end hardware, and geographical mapping.

To help address the aforementioned issues, an efficient broadcasting infrastructure including low-complexity broadcasting repeaters (LBR) is implemented to relay signals between terminal devices and/or other network components, e.g., network access nodes. Broadcasted signals are received by these repeaters, which may be distributed around/along an area of interest (e.g., a road) and have fixed antenna patterns for relaying received signals. In some aspects, small cells may be deployed using repeaters in order to minimize interference with existing infrastructure, e.g., macro cells. As a result, the costs attributed to dynamic beamforming may be reduced or altogether eliminated. Furthermore, these repeaters will provide for better regulation of power, time, and frequency and simplify V2X reception, since all of the Tx terminal devices may be configured with similar power levels and frequency offset.

FIG. 132 illustrates problems identified in V2X communications in some aspects of this disclosure. A problem case scenario is shown in 13200, while 13250 illustrates the frequency, time, and power imbalance from the different broadcasting vehicles in 13200. The different shadings in 13250 represent different power levels.

As can be seen from 13200 and 13250, each of the users (e.g., vehicles) broadcast their V2X signals with imbalances in frequency, time, and power between each of the broadcasted signals. For the four users, the overall time and frequency resource pool of the broadcasted signals is shown on the right in 13250, which illustrates the multiple unbalanced parameters, which results in an increased complexity in processing for the Rx demodulators for each of the users. There are various time offsets between the users, resulting in a non-optimal fast Fourier transform (FFT) window for common frequency domain processing. Also, the frequency offsets may result in inter-resource block interference, e.g., as seen between User 3 and User 4 in 13250. Furthermore, the varying levels of received power levels of the signals between the users (shown by the different levels of shading) prevents a simple, optimal Automatic Gain Control (AGC) setting to satisfy the signals received from the other users.

FIG. 133 shows an exemplary network configuration 13300 and frequency, time, and power graph 13350 in some aspects. LBRs 13302*a*-13302*e* are arranged along the particular area of interest, in this exemplary case, a stretch of road, and are configured to receive signals broadcast from vehicles, and use their fixed antenna patterns to repeat the received signals towards each LBRs respective area of interest (shown by the dashed lines).

By implementing a network of LBRs 13302*a*-13302*e*, a terminal device (e.g., in this scenario, any one of vehicular communication devices shown in 13300) may only need to transmit its signal to a nearby LBR. The location of each respective LBR of the LBR network may be strategically chosen at launch in order for the LBR network to provide full coverage of the area of interest. Since the vehicular communication device only needs to transmit its signal to the nearest LBR, a much lower power is needed when compared to broadcasting the V2X signal to a wider range of area. The LBR receives the transmitted signal from each of the one or more vehicular communication devices, and repeats the signal to its respective area (e.g., portion of road) and/or other LBRs depending on its fixed antenna configuration. There is no need for dynamic beamforming at either the vehicular communication device or the LBR since the vehicle may be configured to transmit the short-range broadcast to the nearest LBR, and the LBR repeats this signal to other devices in the area (as well as LBRs within its network) according to its fixed antenna pattern. Accordingly, at deployment, each of LBRs' 13302*a*-13302*e* location and antenna patterns are chosen and specifically shaped to the area of interest, e.g., in 13300, with the energy focused on the road.

Figure 134:
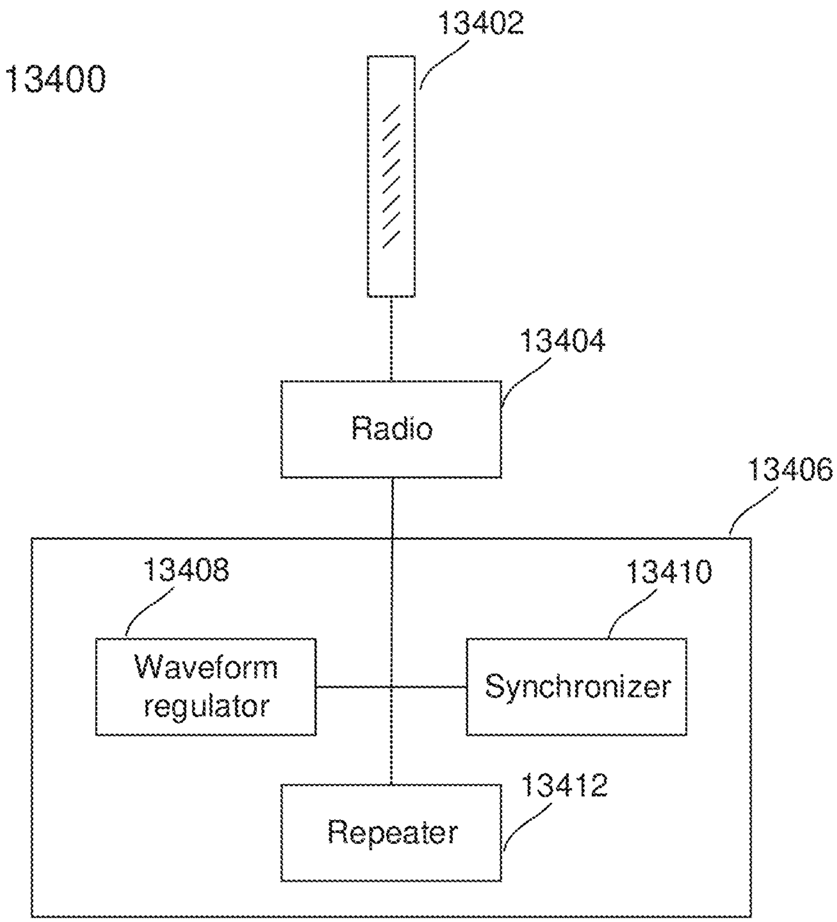
FIG. 134 shows an exemplary internal configuration for a low-complexity broadcasting repeater (LBR) in some aspects.

FIG. 134 shows an exemplary internal LBR configuration 13400 in some aspects. It is appreciated that configuration 13400 is exemplary in nature and may therefore be simplified for purposes of this explanation, e.g., each LBR will have a power source although not explicitly shown. LBR 13400 may correspond to each of LBRs 13302*a*-13302*e* shown in FIG. 133.

LBR 13400 may be configured at low complexity, with circuitry configured for physical layer signal repetitions (to repeat the received signals from the terminal devices) and minimal waveform regulation circuitry for balancing frequency/time/power offsets between the different received signals.

LBR 13400 is fitted with an antenna 13402 capable of receiving signals and transmitting signals in a fixed transmission signal pattern. The fixed reception and/or transmission signal pattern may be set at deployment by setting the antenna array in a manner which causes constructive interference in the LBR's area of interest.

LBR 13400 may also include radio transceiver 13404 that may perform transmit and receive RF processing to convert outgoing baseband samples from signal processing subsystem 13406 into analog radio signals to provide to antenna system 13402 for radio transmission and to convert incoming analog radio signals received from antenna system 13402 into baseband samples to provide to signal processing subsystem 13406.

LBR 13400 may also include signal processing subsystem 13406 for waveform regulation circuitry 13408 configured to harmonize time, frequency, and/or power offsets from multiple vehicular communication devices before relaying the signals. This simplifies the V2X Rx design at the receiver side, while also providing for improved link robustness. Furthermore, because LBR 13400 is stationary, the maximum Doppler Shift is reduced by 50%, further simplifying V2X Rx design while increasing link robustness. The LBRs may be regulated/pre-allocated in terms of power, time, and/or frequency, and they may provide for easier relaying of regulated/synchronized signals since the LBRs are fixed head of time.

Waveform regulator 13408 may be structurally realized with hardware (e.g., with one or more digitally-configured hardware circuits or FPGAs, rectifiers, capacitors, transformers, resistors, etc.), as software (e.g., as one or more processors executing program code defining arithmetic, control, and I/O instructions stored in a non-transitory computer-readable storage medium), or as a combination of hardware and software, in order to harmonize a plurality of signals received at the LBR 13400 from other terminal devices. Waveform regulator 13408 may include a time offset corrector for correcting or adjusting a time offset among the plurality of signals. This may include first performing a time offset estimation which may include correlating the received frames in the plurality of signals with a known standard pattern at the LBR 13400, e.g., Primary and Secondary Synchronization Signals (PSS and SSS) in LTE, and performing the time offset correction based on the time offset estimation. Waveform regulator 13408 may include a frequency offset corrector for correcting the frequency offset among the plurality of signals. The frequency offset corrector may be configured to perform a frequency modulation of the signals including frequency offset estimation and frequency offset compensation. Waveform regulator 13408 may include a power offset correct for determining and resolving the power offset among the plurality of signals, e.g., with a power equalizer. In this manner, the LBR 13400 is configured to repeat the plurality of signals, which were received with differing levels of power, at a constant (e.g., equal) power level.

LBR 13400 may also include synchronizer 13410. In some aspects, various synchronization options for the LBRs are provided. The synchronization may be performed by a base station, e.g., eNB, (13304 in FIG. 133) serving the area where the LBRs 13302*a*-13302*e* are located, e.g., the eNB may transmit the synchronization signals in the MIB and/or SIBs. The LBRs may be configured to receive the synchronization signals from the base station and relay them to their respective areas of interest. The synchronizer 13410 may be configured to receive and repeat the synchronization signals received from the base station to its designated area of interest (e.g., according to its fixed antenna pattern).

In another aspect, the LBRs may be outfitted with Global Navigation Satellite System (GNSS) circuitry and be configured to synchronize resources based on GNSS signals. In this aspect, the synchronizer 13410 may include GNSS circuitry (e.g., GPS) for processing GNSS signals to use as the synchronization source.

LBR 13400 may also include a repeater 13412 configured to repeat the signals which have been regulated by the waveform regulator 13408 and send the signals to antenna 13402 for broadcasting according to the LBRs fixed antenna pattern.

In another aspect, the synchronization may be performed by synchronization subframes communicated between the terminal devices (e.g., vehicles) themselves, e.g., via the PC5 interface in LTE D2D communications. When a terminal device is reserving a resource, the terminal device may only be reserving it for a certain amount of time, e.g., when moving to another area, the terminal device may need to realign and synchronize with the respective LBR in that area. In order to help avoid this, the terminal device itself could serve as the synchronization source between a plurality of LBRs, where at least one terminal device in each area served by an LBR maintains synchronization in its transmissions, e.g., the LRB would repeat the transmissions, but the original transmissions from the terminal devices would be better managed. This would increase the complexity of the signal processing at each of the terminal devices, since the LBRs would serve as repeaters of the terminal device monitored synchronization.

In some aspects, a synchronization option in which the LBRs act as the synchronization source is provided. The LBR may be configured to broadcast the synchronization signal based on its own internal timing, e.g., based on the LBR's own internal clock. The terminal devices will then use this synchronization signal for frequency and time alignment for its communications with other devices. In this aspect, all of the terminal devices in the area may use the LBR as the synchronization source. The LBR may be configured to assign the highest synchronization priority for GNSS, and accordingly, be configured to search for a GNSS signal first in a hierarchy for synchronization. If synchronization via GNSS fails, the LBR may be configured to use other synchronization sources, e.g., a base station, its own internal timing, etc.

Accordingly, an LBR may serve as the synchronization source for the particular area (e.g., highway segment), and provide for resource selection in the geographic area for the terminal devices located within its area. LBRs may be configured to communicate (either wirelessly or via direct physical interface) with proximate LBRs in order to maintain synchronization of terminal devices moving along a path. If the LBRs are within communication range of each other, then they can automatically measure the delta in the time alignment.

In some aspects, the type of synchronization signal may specify the synchronization source, e.g., via GNSS or LBR timing. In any case, the LBRs are configured to receive and/or generate the synchronization subframes and repeat them to their respective areas and/or other LBRs. In this sense, the terminal devices may not be able to distinguish that the synchronization originates from an LBR instead of the eNB and/or other terminal devices.

In some aspects, the LBRs may be configured to identify a destination of a message (e.g., received from a terminal device) or "how far" the message should be transmitted, and transmit the message to proximate LBRs accordingly. In this manner, the LBRs may be configured to exchange information with each other through wireless communication signals or via a physical interface forming a network of LBRs.

Figure 135:
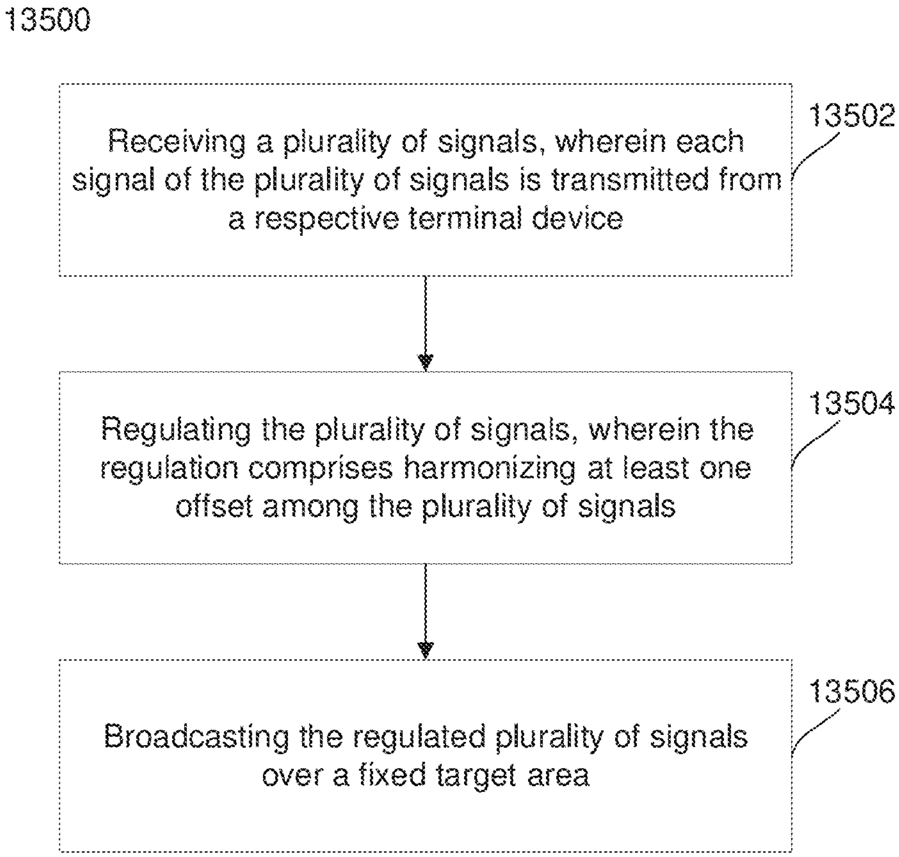
FIG. 135 shows an exemplary flowchart describing a method for wireless communications in some aspects.

FIG. 135 shows a flowchart 13500 describing a method for wireless communications in some aspects of this disclosure.

The method may include receiving plurality of signals, wherein each signal of the plurality of signals is transmitted from a respective terminal device 13502; regulating the plurality of signals, wherein the regulation comprises harmonizing at least one offset among the plurality of signals 13504; and broadcasting the regulated plurality of signals over a fixed target area 13506.

In some aspects, the LBRs may also be used in initial small cell deployment. Small cells are typically deployed long after macro cells are deployed, and therefore, may cause interference in the macro cell beyond the geographical area of interest of the small cell.

Figure 136:
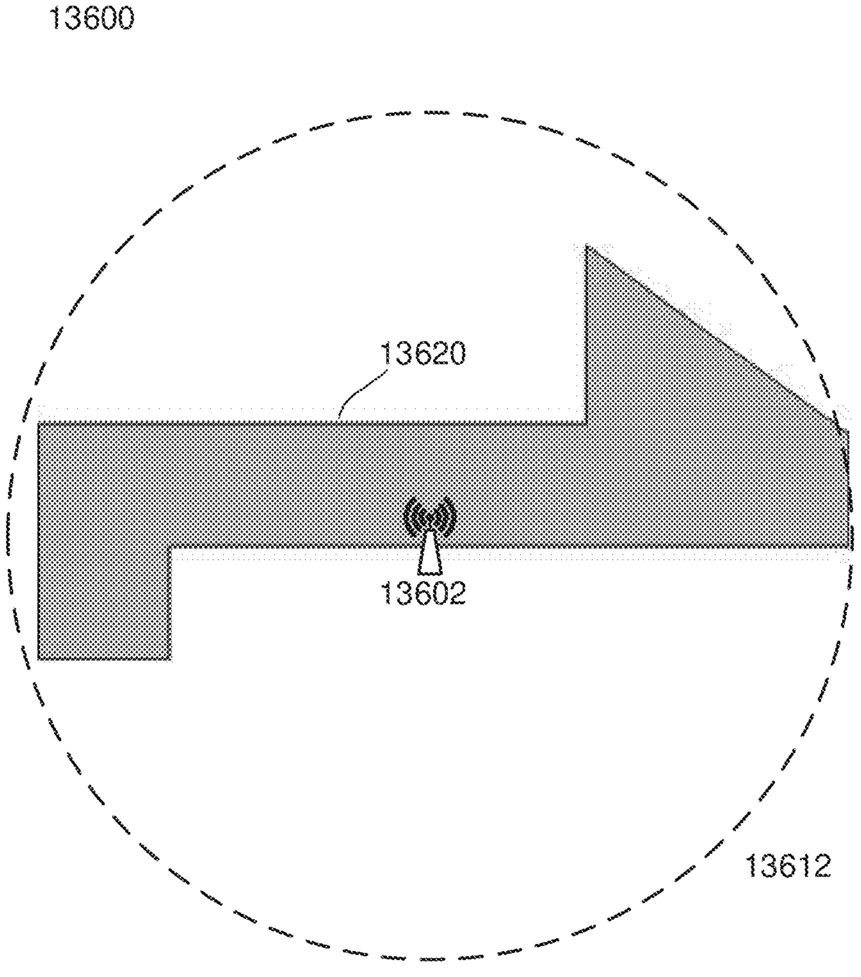
FIG. 136 shows an exemplary small cell deployment problem scenario in some aspects.

FIG. 136 illustrates a small cell deployment problem scenario 13600. A small cell base station 13602 may deployed with a coverage area 13612 ranging up to 200 m (e.g., for a pico cell) extending radially from the small cell. However, the small cell station 13602 may be deployed to cover a specific target area 13620, e.g., an office corridor and its offices. Accordingly, current conventional small cell deployment methods may cause small cell interference with an already deployed macro cell, for example, well beyond the target area 13620. This unnecessary interference beyond the small cell's target area is shown as the area within 13612 and outside of target area 13620. Typically, in order to mitigate or avoid this interference problem beyond the boundaries of the target area 13620, the macro cell and its associated coverage area would have to be re-planned within the network, which is costly.

By employing small cells with a plurality of remote radio heads (RRHs), e.g., LBRs, the small cell may be deployed with energy focused specific to the target area, as shown in configurations 13700 and 13750 in FIG. 137.

As shown in 13700 and 13750, RRHs may be used to cover the areas of interest of the small cells while minimizing, or eliminating altogether, the interference macro cells outside of the area of interest. In this sense, there would be multiple RRHs associated with a common small cell, where the RRHs have a lower transmission power than a normally deployed single small cell station. The RRHs may be configured to transmit omnidirectionally (e.g., LBRS 13702*a-c*), or in a fixed beamforming pattern (e.g., LBRS

13752*a-c*). While shown in a two-dimensional perspective, the small cell deployment discussed herein may be applied to a three-dimensional setting as well (e.g., for drones and other devices).

One of the RRHs may be outfitted as the base station of the small cell. The small cell base station may be configured to coordinate communications across all of the RRHs and communicate with the main network, or there may be a separate network access node (not pictured) configured to communicate with the RRHs and the main core network. Each of the RRHs are configured to transmit the same waveform, but may not need to be clock synchronized, since they may be functioning more as a waveform repeater for the small cell which shapes the waveforms to the target area 13620. The small cell base station (e.g., small cell network access node) may be configured as the synchronization source for the small cell communication arrangement of the RRHs.

Another benefit of deploying the small cells with RRHs is for better coverage and spectral efficiency resulting from multipath behavior of the plurality of RRHs, e.g., multiple instances of similar signals (from each of the RRHs) arriving at the UE at different times from different locations.

In some aspects, the terminal device will transmit its uplink (UL) signals to all of the RRHs of the small cell, providing receive diversity at the small cell. Each of the RRHs would provide the received signals to the base station of the small cell, which locally processes the signals. Alternatively, the terminal device may be configured to transmit the UL signals in a highly directional manner to a single RRH (e.g., the closest one), which then forwards the signal to the base station of the small cell for further processing.

In some aspects, RRHs deployed in the small cell may be configured to be enable/disabled based on where terminal devices within the small cell are located. The RRHs and/or the small cell base station may be configured with a detection mechanism, for example, if a certain RRH has not received signals from a UE after a predetermined amount of time, the small cell may disable/power down that particular RRH. In another example, the UE could provide feedback to the small cell that details the current reception, and then the small cell could enable/disable the RRHs based on the feedback. In some aspects, the small cell may adapt the RRHs to try to generate a single path (vs. multipath) at the UE, thereby allowing for a simpler design at the Rx side.

The small cell base station, therefore, may be configured to receive signals from one or more terminal devices via the distributed RRHs, and may be configured to observe which paths have the highest energy (e.g., the RRH with the highest Rx power) in order to decide which RRHs may be enabled/disabled accordingly. By dynamically enabling/disabling (or tuning) the RRHs, the small cell station may further reduce interference with other previously deployed stations (e.g., for macro cells) even within the target area 13620.

From the UE side, small cell deployment using a plurality of RRHs would be similar to a large single-frequency network (SFN). However, large propagation effects will not be needed to be taken into account due to shorter guard intervals. In some aspects, a UE may be configured with a detection mechanism in order to identify if it falls within a small cell employing multiple RRHs. For example, in high-Doppler scenarios, the UE may be configured to trigger multipath transmission and/or reception with the RRHs. Further, depending on which RRH has the highest Rx energy from the UE, the UE may be configured to request the right to a specific service, e.g., operating at an increased communication distance to a particular RRH if high-speed detected.

In some aspects, depending on the capabilities of the terminal device, a terminal device may be configured to operate as a small cell station (e.g., if configured as an LTE hotspot), and be configured to operate closely located RRHs in the manners described above. In some aspects, the terminal devices themselves could serve as temporary RRHs configured to provide additional coverage within the target area.

Such relays may also execute "transformation" (or "translation") services from one radio access technology (RAT) to another. For example, a IEEE 802.11p based DSRC/ITS-G5 signal may be received by a relay, the data content may be extracted and put into a LTE C-V2X packet and then re-transmitted in the modified radio standard (or in both, C-V2X as well as DSRC/ITS-G5).

Figure 138:
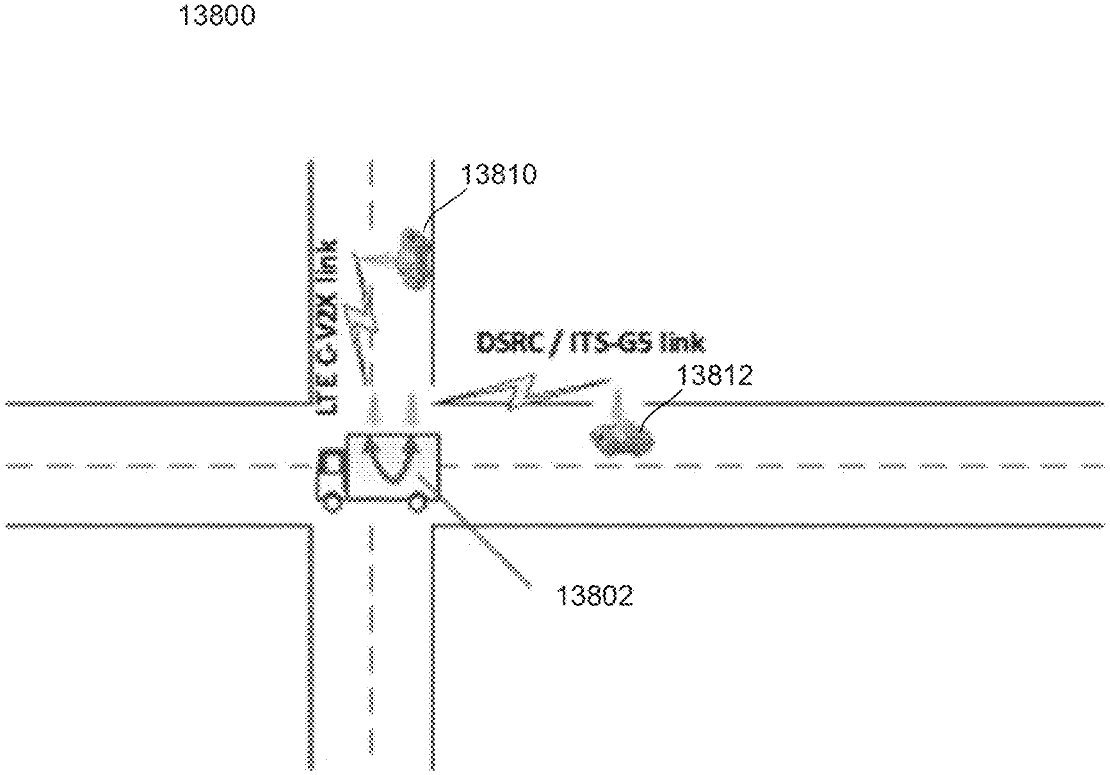
FIG. 138 shows an exemplary scenario in which a node may be configured as a relay to execute transformation/translation services between different RATs in some aspects.

FIG. 138 shows an exemplary scenario 13800 in which a node may be configured as a relay to execute transformation/translation services between different RATs in some aspects. It is appreciated that 13800 is exemplary in nature and may thus be simplified for purposes of this explanation. While shown as being a vehicular communication device FIG. 138, the following description of node 13802 may also be implemented in stationary infrastructure elements, such as eNBs, RSUs, RRHs, or LBRs, etc. Node 13802 therefore may be configured to operate in several RAT technologies in order to serve other terminal devices, e.g., vehicular communication device 13810 operating under the LTE C-V2X protocol and vehicular communication device 13812 operating under the DSRC/ITS-G5 protocol, and provide a relay point of communication between the other devices. While shown as a terrestrial vehicle on a road in FIG. 138, the ensuing description with respect to node 13802 may also be applied to other vehicular communication devices, e.g. drones.

Figure 139:
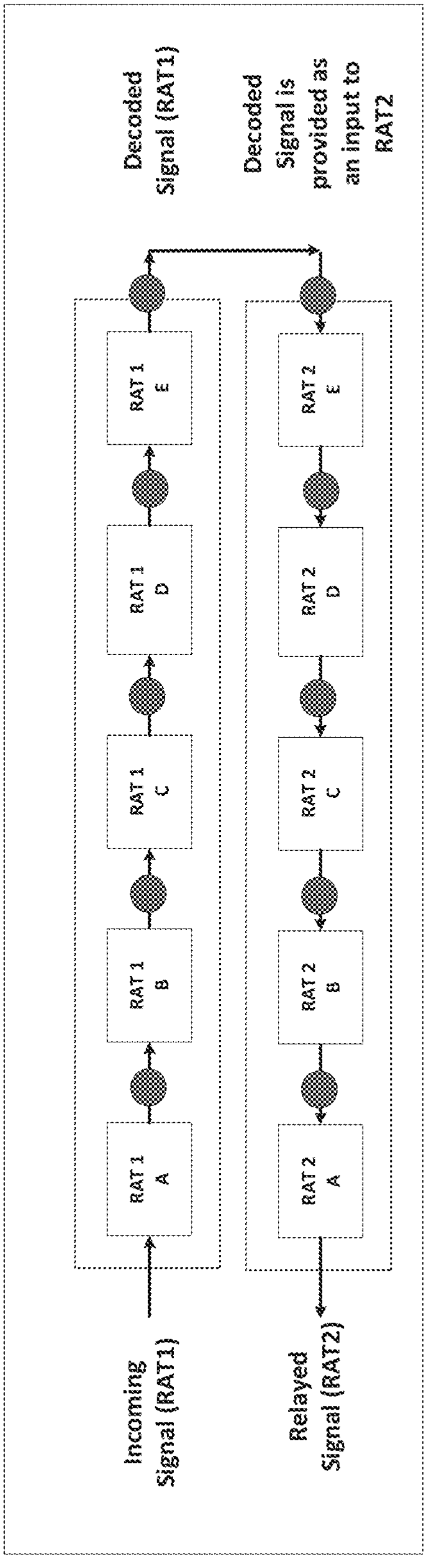
FIG. 139 shows an exemplary internal configuration for a terminal device in some aspects.

In some aspects, if such a translation is required, node 13802 is configured to implement the full RX/TX chains of the respective technologies as illustrated in the FIG. 139 (in this example, RAT 1 is DSRC/ITS-G5 and RAT 2 is LTE C-V2X, or vice versa):

Since the processing of RAT2 is expected to be repetitive is many cases, e.g., the similar preamble symbols, pilot tones, etc. are typically inserted in the same way, it may be possible to simplify the processing. Any part of the RAT2 frame which is always similar is pre-processed and its corresponding output samples (typically the inputs to the DAC of RF transceiver, e.g., 204 in FIG. 2) are stored in a look-up table, which may be stored in a local memory component of the baseband modem (e.g., 206 in FIG. 2). Those parts which actually require processing of the input data (typically operations such as channel encoding, etc.) will be processed. The results of the processed data are then inserted into parts of the pre-buffered frame which are left empty for that purpose. Each of blocks A-E for RAT1 and RAT2 in FIG. 139 represent a processing block for the respective RAT, and may include any of the signal processing functions described herein, including analog and digital RF front-end processing circuitry to produce digital baseband samples and to produce analog radio frequency signals to provide to antenna, such as Low Noise Amplifiers (LNAs), filters, RF demodulators (e.g., RF IQ demodulators)), and analog-to-digital converters (ADCs); Power Amplifiers (PAs), filters, RF modulators (e.g., RF IQ modulators), and digital-to-analog converters (DACs). Blocks A-E may also represent a processing component for baseband modem functions, as error detection, forward error correction encoding/decoding, channel coding and interleaving, channel modulation/demodulation, physical channel mapping, radio measurement and search, frequency and time synchronization, antenna diversity processing, power control and weighting, rate matching/de-matching, retransmission processing, interference cancelation, and any other physical layer processing functions. While five processing blocks are shown in each chain for RAT1 and RAT2, it is appreciated that this is done for exemplary purposes and that the disclosure herein covers any number of processing units as needed for the signal processing described herein.

Figure 140:
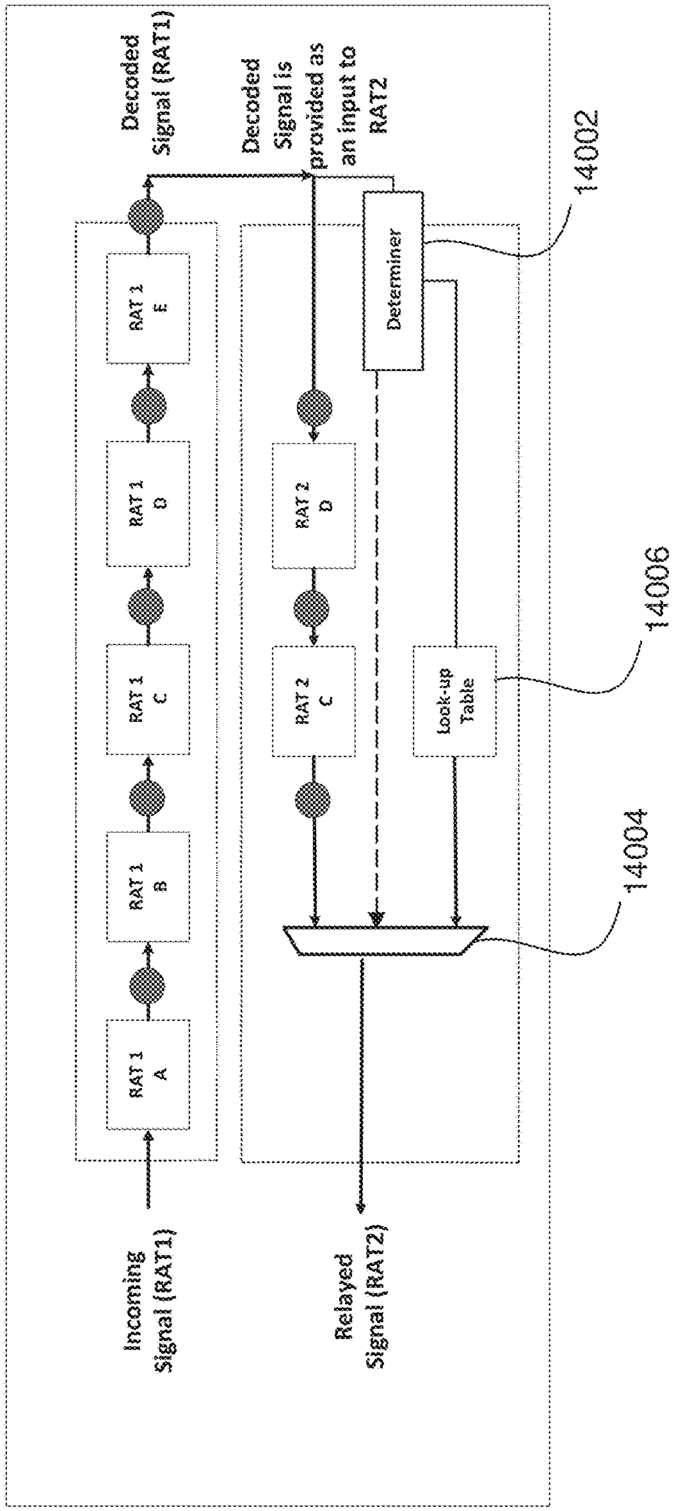
FIG. 140 shows an exemplary internal configuration for a device configured to process different RAT signals in some aspects.

FIG. 140 illustrates an exemplary device internal configuration 14000 for processing different RAT signals in some aspects. Internal configuration 140000 assumes that the only required processing occurs in block C and D of RAT2 and all the remaining operations lead to output samples that are always identical and can thus be stored in a look-up table as previously described (e.g., preamble symbols, pilot tones, etc.). A determiner 14002 suitably manages the Multiplexer 14004 in order to determine which inputs (results of processing elements or outputs of the look-up table 14006) should be taken.

FIG. 141 shows a flowchart 14100 describing a method for deploying a small cell communication arrangement in some aspects of this disclosure.

The method may include deploying a small cell network access node configured to provide access to a network 14102; and deploying a plurality of remote radio heads (RRHs) in communication with the small cell network access node, wherein each of the plurality of RRHs is configured to serve as an interface for terminal devices in a respective target area of the small cell with the small cell network access node 14104.

Figure 142:
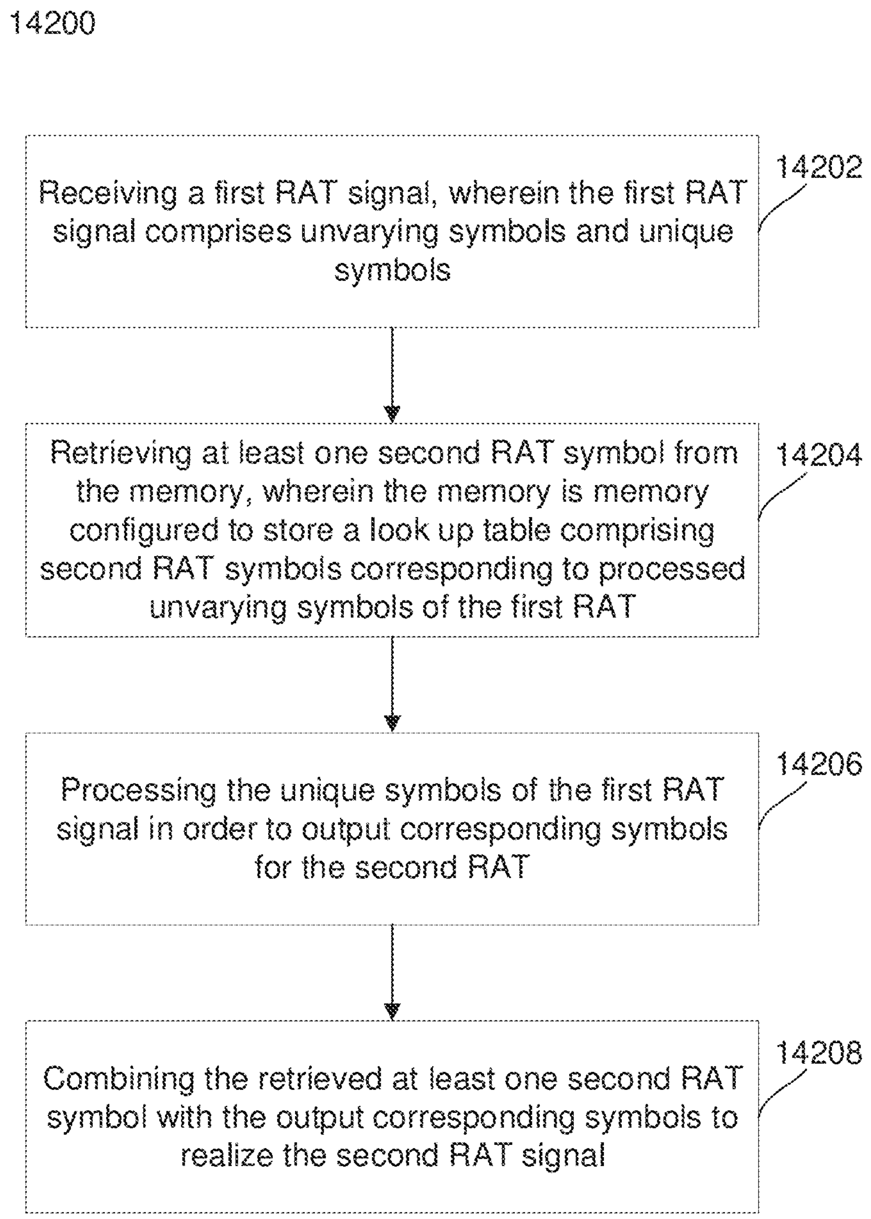
FIG. 142 shows an exemplary flowchart describing a method for translating a first radio access technology (RAT) signal into a second RAT signal in some aspects.

FIG. 142 shows a flowchart 14200 describing a method for translating a first radio access technology (RAT) signal into a second RAT signal in some aspects of this disclosure.

The method may include receiving a first RAT signal, wherein the first RAT signal comprises unvarying symbols and unique symbols 14202; retrieving at least one second RAT symbol from the memory, wherein the memory is memory configured to store a look up table comprising second RAT symbols corresponding to processed unvarying symbols of the first RAT 14204; processing the unique symbols of the first RAT signal in order to output corresponding symbols for the second RAT 14206; and combining the retrieved at least one second RAT symbol with the output corresponding symbols to realize the second RAT signal 14208.

Small Cell Assistant UE In-Field Calibration

Generally, small cell stations include high-grade radio frequency (RF) components for communicating with terminal devices. Furthermore, the small cells may be configured to detect good channel conditions with one or more terminal devices camped within its coverage. Terminal devices are vulnerable to aging effects of their components over their lifetime, resulting in degradation of performance. For example, the degradation of the modem transistors leads to decreased switching speeds, and eventually, circuit failures. As the modem transistor scales to smaller geometries, the natural aging process of terminal device components accelerates, further impacting performance.

Methods for in-field calibration of terminal device hardware are non-existent as modem calibration is done in factory prior to device deployment. Since the calibrations are done prior to device deployment, these solutions do not account for the in-field aging effects on the modem hardware.

In some aspects, a calibration mechanism configures a small cell to test terminal device RF components in order to mitigate the aging effects of terminal device modem hardware. The mechanism may include estimating the offset of one or more modem RF components, and providing a corrective step to eliminate/mitigate the offset. Optionally, the mechanism may include determining a level of aging for different components in order to implement a link selection algorithm to select the best link for communications. As a result, the lifetime of terminal device hardware may be extended.

Small cells stations target a smaller amount, but typically a more consistent identity of users (e.g., employees in an office setting), compared to macro cells. Because of this, small cells may not be as "busy" as macro cells, e.g., the small cells may have a time budget to provide customized services to its terminal devices. Furthermore, due to the closer proximity of the small cell stations to their users, the small cells provide increased Line-of-Sight (LoS) at high signal-to-interference-plus-noise ratio (SINR) which may be exploited for terminal device calibration.

The small cell may be configured to broadcast calibration information, for example, in system information blocks (SIBs). This information may include parameters for triggering a switch to calibration mode (e.g., depending on SINR, terminal device status and/or position/movement, load monitoring information from the small cell and/or terminal device, etc.) and may further include specific calibration signal information, e.g., resources on which the calibration signals will be transmitted. Cell specific and static calibration (e.g., supported calibration modes by a small cell) may be suitable for transmission over SIBs, while terminal device specification calibration information (e.g., selected calibration modes, calibration parameters, etc.) may be configured by RRC (re-)configurations (for semi-static cases) or Downlink Control Indicator (DCI) from physical downlink control channel (PDCCH) (for dynamic cases) to the terminal device.

In some aspects, the terminal device and/or small cell are configured to detect appropriate channel scenarios to calibrate the terminal device. Parameters for detecting the calibration scenarios may include signal conditions meeting a certain threshold (e.g., signal quality above a predetermined value), determining when the small cell is not "busy" based on load monitoring, determining terminal device positioning and movement (e.g., proximity to the small cell station and/or whether the terminal device is moving or stationary), etc. In addition, the terminal device may use embedded sensors, such as proximity sensor, gyroscope, and accelerometer, to further determine if the terminal device has an ideal line of sight with the small cell. For example, using a gyroscope sensor, the terminal device can determine its location and space and verify the antenna is well positioned with respect to the small cell station. In another example, using a proximity sensor, the terminal device can assess that it is located in an optimal open space and not within a pocket or jacket that may disturb the communication.

Figure 143:
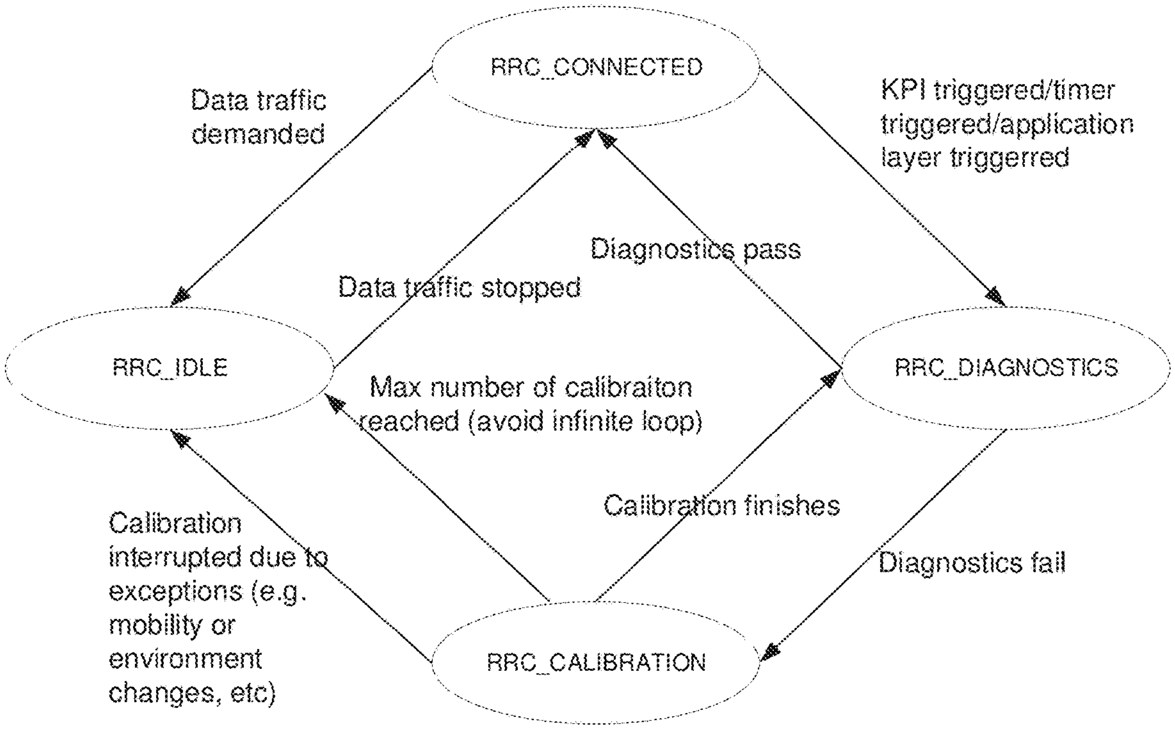
FIG. 143 shows an exemplary RRC state transition chart in some aspects.

FIG. 143 shows an RRC state transition chart 14300 in some aspects of this disclosure. It is appreciated that RRC state transition chart 14300 is exemplary in nature and may thus be simplified for purposes of this explanation.

Two RRC modes are introduced: RRC_DIAGNOSTICS mode and RRC_CALIBRATION mode. In some aspects, these two modes may be merged into a single mode performing the processes described herein.

The RRC_DIAGNOSTICS mode may be triggered by the small cell to one or multiple terminal devices in order to enforce a diagnostic check at the terminal device (e.g., check filter shapes, out-of-band radiation, carrier frequency stability, etc.). In the RRC_DIAGNOSTIC mode, the small cell is used as a testing equipment to test the terminal device RF unit and decide whether it needs to go to RRC_CALIBRATION mode. In the RRC_CALIBRATION mode, the small cell can be further used as calibration equipment to calibrate the terminal device RF if the diagnostics fail.

Once the terminal device and/or small cell determines that the appropriate conditions are met, the terminal device may be configured to switch from RRC_CONNECTED mode to a RRC_DIAGNOSTICS mode. Such conditions may be triggered from measured key performance indicators (KPIs) or the application layer may trigger the switch to RRC_DIAGNOSTICS. Other conditions for triggering a calibration of the terminal device may include the use of timers (e.g., a timer to trigger a calibration after a certain period of time with respect to a previous calibration. The KPIs may include frequency offset errors estimated by the terminal device RX or small cell RX, error vector magnitude (EVM) measurements by the terminal device RX or small cell RX, Spur measurement in terminal device downlink RX, or the like.

In RRC_DIAGNOSTIC, the terminal device may run a self-diagnostic test, and report the results back to the small cell. This report may include a detailed report of the diagnostic test results, or it may simply indicate whether or not calibration is required. If a component of the respective terminal device fails this diagnostics test (e.g., KPIs fall below a quality threshold), the RRC_CALIBRATION mode is triggered for calibrating the terminal device.

Figure 144:
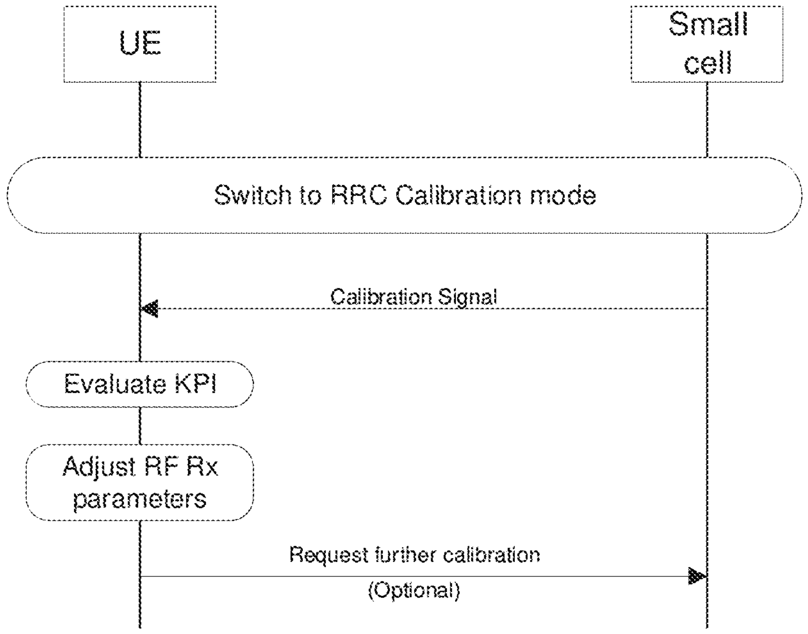

FIG. 144 is an exemplary message sequence chart (MSC) 14400 showing a terminal device (e.g., UE) RX calibration in some aspects.

Upon failure of the diagnostics test in RRC_DIAGNOSTICS mode, a switch to the RRC_CALIBRATION is triggered. For terminal device receive (RX) calibration, the small cell transmits one or more calibration reference signals to the terminal device. These calibration reference signals may have different waveforms than those in normal operations, e.g., single tones, dual tones, dual carriers, etc. The terminal device may be configured to iteratively adjust the RF RX parameters based on the real-time evaluations of the KPIs for the received calibration signals until the KPI requirement threshold is met. RF RX parameters may include S-parameters for the antenna tuner (e.g., S11, S12, S22, etc.), LO frequency tuning, analog gain values (which may be frequency band dependent and/or temperature dependent), or the like. Optionally, the terminal device can also be configured to request the small cell to modify the calibration reference signals based on UE requirements (e.g., calibration for different frequencies). While one calibration signal is shown in MSC 14400, it is appreciated that in most cases, there will be multiple iterations of RF parameter adjustments in order to find the best KPI. If the calibration is interrupted (e.g., due to mobility or environment changes), a switch to RRC_IDLE may be triggered (as shown in FIG. 143). A robust protocol is implemented to handle exceptions, e.g., calibration is interrupted by mobility/bad channel conditions. For example, after the calibration process is finished with KPI passing a criteria, a certificate can be issued to the terminal device and then the terminal device is allowed to store all the updated RF parameters into its nonvolatile memory. Otherwise, if an exception is detected in the middle of calibration process (detected by time-outs or handshaking protocols) which shows that calibration is interrupted, the terminal device can discard the new RF parameters and reverts back to RRC_IDLE.

While in RRC_CALIBRATION mode, the terminal device and/or small cell may be configured to run a maximum number of calibrations, and upon reaching this number, the terminal device may switch to RRC_IDLE mode in order to avoid running calibrations on an infinite loop (as shown in FIG. 143).

In some aspects for terminal device Rx calibration, the small cell may be configured to transmit a plurality of calibration signals to the terminal device so that the terminal device may iteratively evaluate the KPIs for each of the calibration signals and adjust the RF RX parameters accordingly. For example, the small cells are configured to transmit the calibration signals in series so as to allow the terminal device to evaluate the KPIs and adjust the RF RX parameters for a first calibration signal prior to the small cell transmitting a second calibration signal of the series. Furthermore, once the terminal device has adjusted its RX parameters so that the KPI threshold is met, the terminal device may be configured to transmit a calibration complete signal to the small cell in order to trigger a switch back to RRC normal/idle mode.

Figure 145:
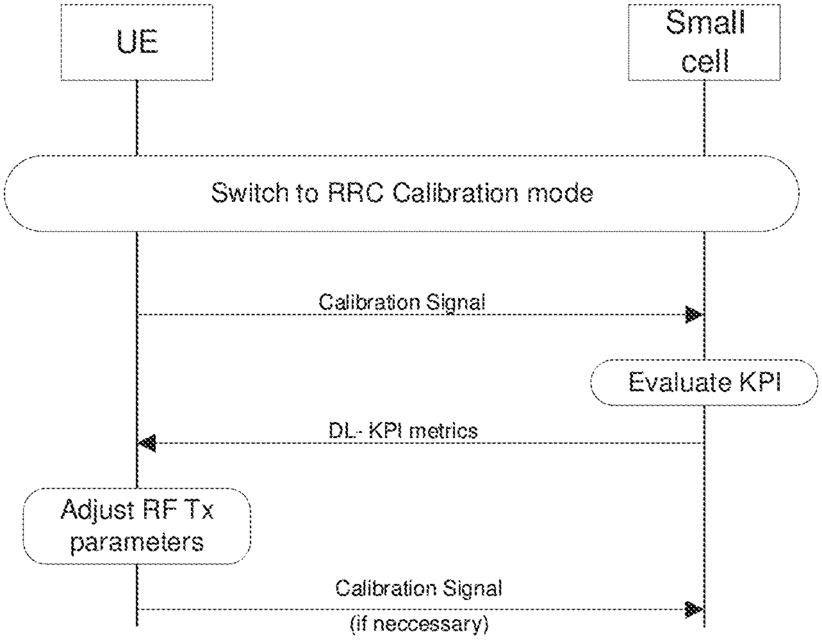

FIG. 145 is an exemplary message sequence chart (MSC) 14500 showing a terminal device (e.g., UE) TX calibration in some aspects.

For terminal device transmit (Tx) calibration in RRC_CALIBRATION mode, the terminal device is configured to transmit one or more calibration reference signals to the small cell, which is then configured to evaluate the KPI metrics for the received calibration signal and provide feedback of the KPIs through downlink (DL) to the terminal device. The terminal device then iteratively adapts the RF TX parameters accordingly until the KPI threshold is met. Adjustable RF TX parameters may include TX power offset, TX DC-DC path-delay (used for envelope tracking), TX power amplifier (PA) distortion measurement (used for digital pre-distortion). Similarly with respect to MSC 14400, while one calibration signal is shown in MSC 14500, it is appreciated that in most cases, there will be multiple iterations of RF TX parameter adjustments in order to achieve the best KPI. Also in RRC_CALIBRATION mode, the terminal device and/or small cell may be configured to run a maximum number of calibrations, and upon reaching this number, the terminal device may switch to RRC_IDLE mode in order to avoid running calibrations on an infinite loop (as shown in FIG. 143)

Once the KPI threshold for the calibration is satisfied, either the terminal device or the small cell may be configured to terminate the calibration process. For example, from the terminal device side, upon receiving the DL with KPI metrics that meet the KPI threshold, the terminal device may be configured to transmit a calibration complete signal to the small cell, thereby terminating the calibration and switching back to RRC_IDLE mode (or RRC_CONNECTED mode).

In some aspects, the terminal device Rx and/or Tx calibration may be performed in at least two operations: offset determination and offset correction; alternatively, a third operation may be added so that the three operations are: offset determination, determination of the malfunctioning source component, and offset correct. The offset determination is determined by the evaluation of the KPIs of the calibration reference signals (e.g., frequency shift due to oscillator aging, etc.). The offset determination (or the determination of the malfunctioning source component) may, for example, search for one or more faulty hardware components (e.g., degraded low noise amplifiers, aged power amplifiers, over-drifted oscillators, faulty decoders, etc.). The offset correction is performed by adjusting the necessary parameters in order to meet a KPI threshold, e.g., tuning of the oscillator, rerouting a degraded power amplifier to another power amplifier, etc.

While the detection of the aging effect of device components is typically used in order to mitigate a problematic behavior of a device, this detection may also be exploited in the offset determination operation for other purposes.

In an example, this detection may be exploited if the aging effects of critical components are too large, e.g., a large frequency shift due to oscillator aging, the entire TX path may be shut down (or in severe case, the entire equipment) in order to avoid damage to other components.

In another example, this detection may be exploited if the aging effects of critical components are too large, e.g., large frequency shift due to oscillator aging, the choice of frequency bands to be used may be limited. For example, if there are neighboring safety critical applications, the determined aging components will not be allowed to operate in direct neighboring frequency bands to such safety critical frequency bands.

In a further example, a request to the "other end" of the TX/RX chain (e.g., the target RX in case of TX functions being executed by the aging device; or the target TX in case of RX functions being executed by the aging device) to implement some mitigation. For example, in case of a frequency shift by ΔF due to oscillator aging, the other end may be asked to apply the negative shift −ΔF in order to mitigate the shift effects for the TX/RX chain. Alternatively, parts of the effects may be handled by the "other end" of the TX/RX chain and the remaining parts by the aging device. For example, in case of a frequency shift by ΔF due to oscillator aging, the other end may be asked to apply the negative shift −ΔF/2 in order to mitigate the shift effects for the TX/RX chain and the remaining shift of −ΔF/2 may be done by the aging device itself.

If a malfunctioning source component is determined (e.g., due to aging effects), it may be replaced. This replacement may be done according to several options as shown in the following figures.

Figure 146:
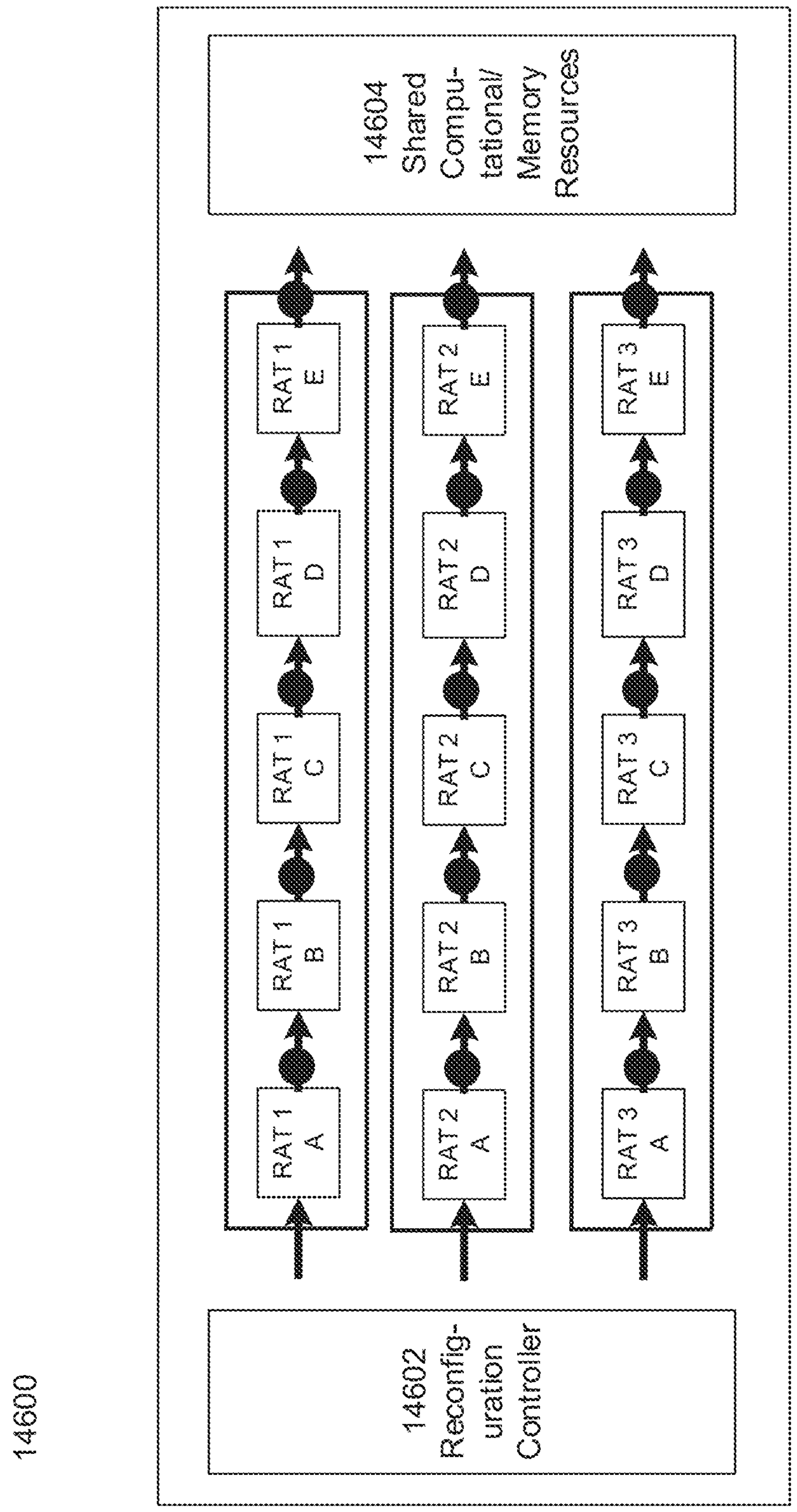
Figure 147:
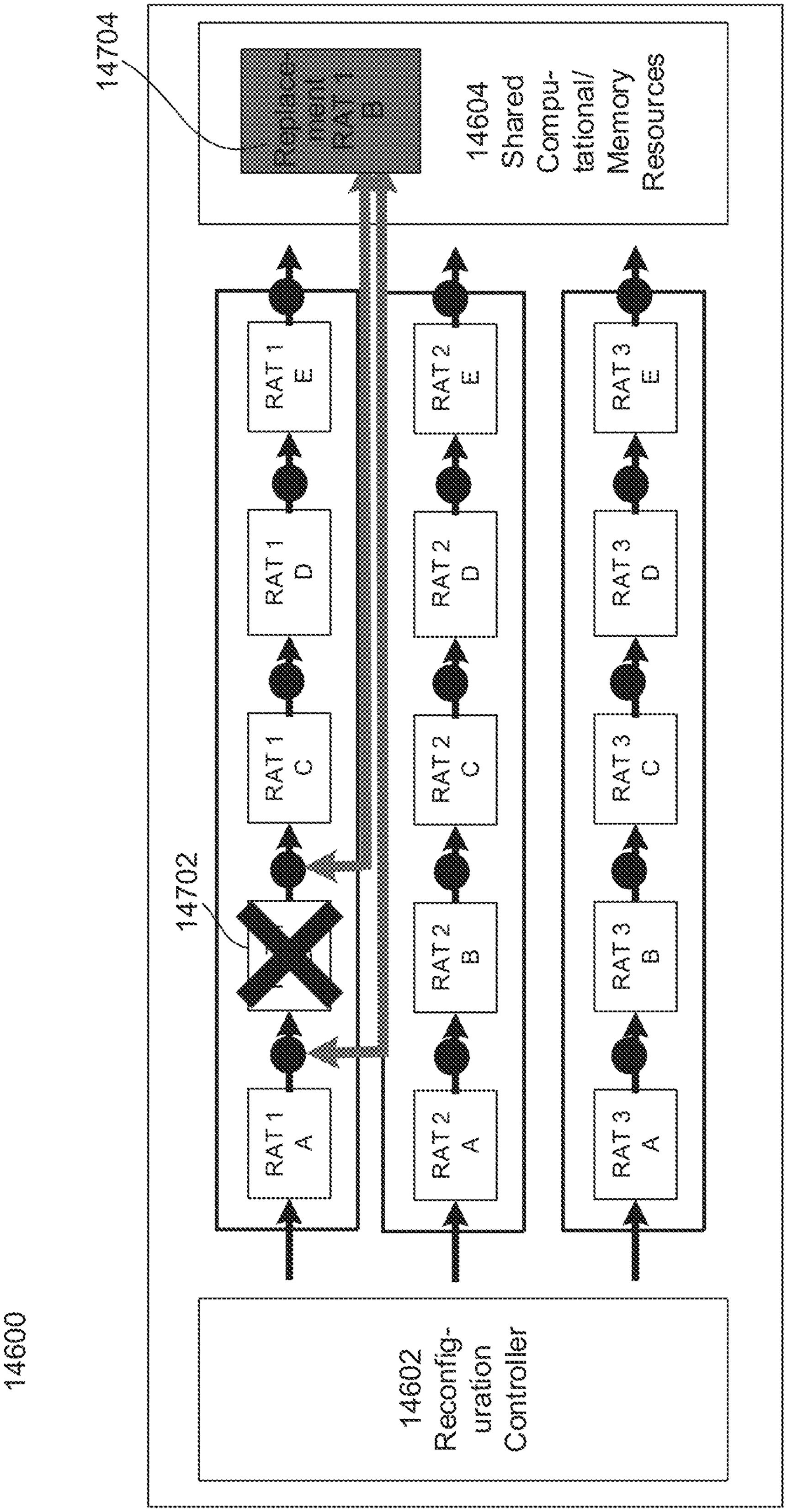

FIGS. 146 and 147 show diagrams for an exemplary software reconfiguration based replacement of defective source components in a terminal device 14600 in some aspects.

The terminal device 14600 may include original components which support one or more RATs, e.g., three RATs are illustrated in FIGS. 146 and 147: RAT 1, RAT 2, RAT 3. A number of RAT-specific components (analog and/or digital) may be included to support each RAT (e.g., for RAT 1: RAT 1 A, RAT 1, B, . . . , RAT 1 E) as described herein, e.g., RF transceiver 204 and baseband modem 206 description in FIG. 2. For example, each of these RAT-specific components may be, for example, a cyclic redundancy check (CRC) generator/checker, channel encoder/decoder, interleaver/de-interleaver, constellation mapper/demapper, modulator/demodulator, encryption/decryption units, MIMO processors, etc.

Reconfigurable Controller 14602 may be configured to receive the diagnostic and/or calibration data from the tests run on RRC_DIAGNOSTIC and/or RRC_CALIBRATION modes in order to identify faulty components. For example, if RAT 1 fails its diagnostics test in RRC_DIAGNOSTICS mode, and the subsequent calibration in RRC_CALIBRATION mode identifies that RAT 1 B is the faulty component after performing the terminal device TX/RX parameter adjustments, e.g., there is too much phase noise injected, there is a frequency shift due to an aging oscillator, there are memory access problems, insufficient/degraded power amplification, etc.

Upon identification of the faulty component, e.g., RAT 1 B in FIG. 147, the Reconfiguration Controller 14602 may be configured to replace the functionality of the components via rerouting the inputs and outputs, respectively, to a shared computational memory resource module 14604. In this respect, a key feature of this disclosure is properly defining the inputs/outputs, e.g., "bypass points," of the specific components, shown as circles in the figures. Bypass points may be located at the input/output of a particular component performing a specific operation, e.g., fast Fourier transform (FFT), turbo encoder, decoder, interleaver, MIMO encoder/decoder, etc. The shared computation memory resource module 14604 may include FPGAs, DSPs, or other components, some of which may be initially unused, but over time, may be activated to implement updates or new features. Over the lifetime of the equipment, the Reconfiguration Controller 14602 may replace the identified faulty RAT components with software blocks installed onto the reconfigurable computational resources by rerouting the inputs/outputs of the component to the shared computational memory resource module 14604.

Figure 148:
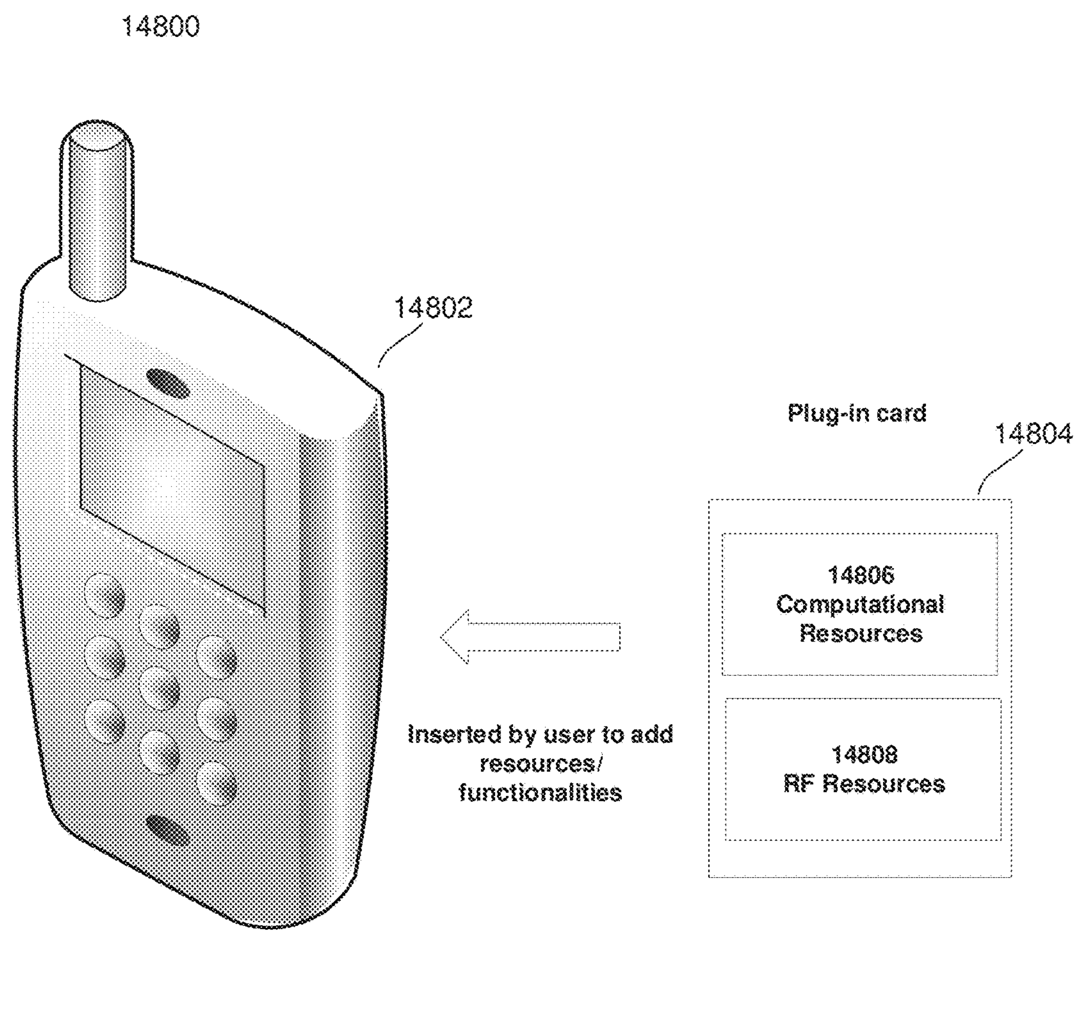

FIG. 148 shows an exemplary diagram 14800 illustrating hardware replacement of defective source components in a terminal device 14802 in some aspects.

Figure 149:
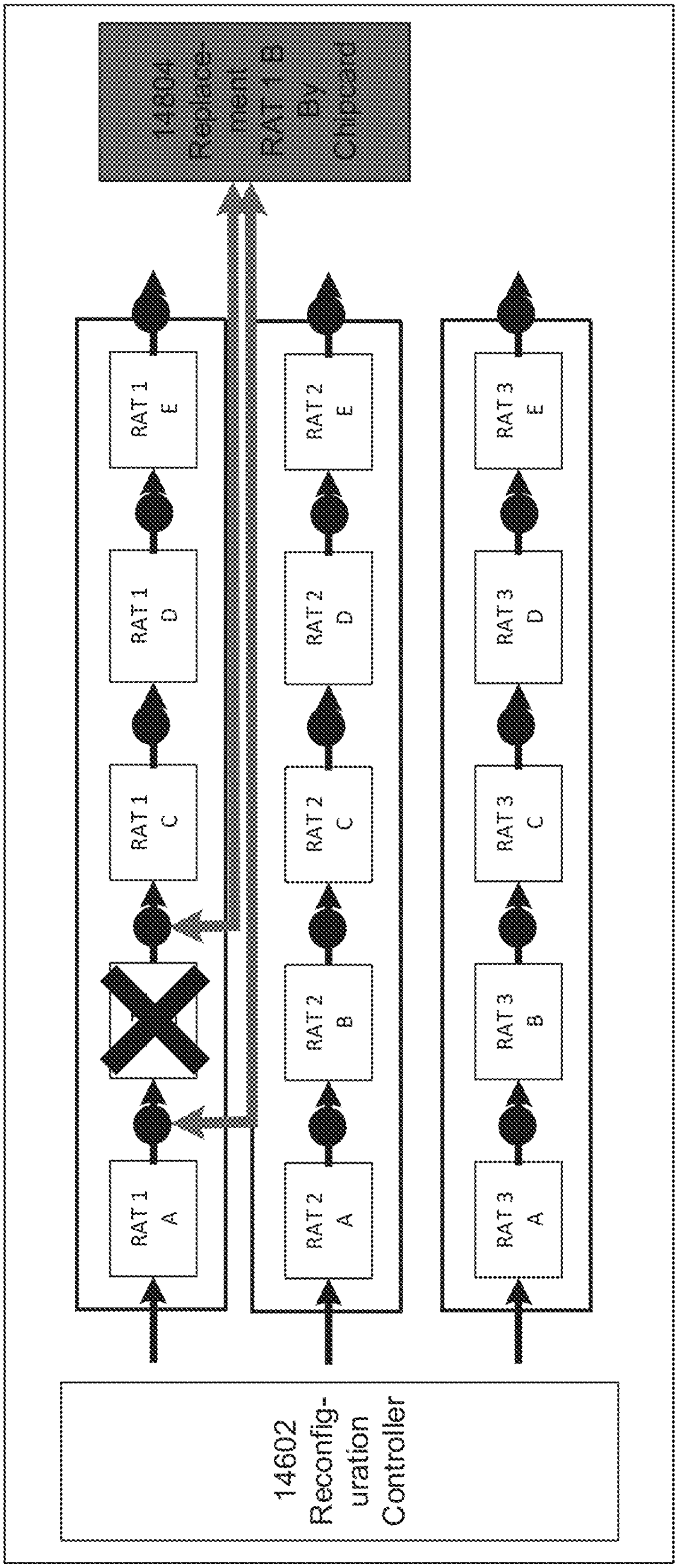

The terminal device, for example a UE or any other device, includes a plug-in slot where a plug-in card 14804 can be inserted providing new computational resources 14806 (e.g., memory or processing) and/or RF resources 14808 that can be used in order to replace malfunctioning components. Then, such a replacement of functionalities is done similar to the SW reconfiguration case illustrated in FIGS. 147 and 148. The difference is that the new components are not necessarily executed as software code loaded in the shared computational memory resource module 14604, but actual hardware components (such as a new oscillator, a new filter, etc.) are provided by the plug-in card 14804 and will replace the aging component(s) as shown in FIG. 149. The Reconfigurable Controller 14602 functions as described above with respect to FIGS. 147 and 148.

In some aspects, a combination of the aspects shown in FIG. 147-149 may be achieved. The plug-in card 14804 provides additional computational/memory resources for the execution of software code. Then, the aforementioned process is executed on these new resources made available through the plug-in card.

In some aspects, communications of radio link control (RLC) messages may be chosen based on the aging of different RAT hardware options, e.g., RAT 1, RAT 2, or RAT 3 shown in FIGS. 146-147 and 149. The KPIs taken during the calibration stages for the different RAT hardware may be stored and taken into account when deciding which options to elect when handling different signals. For example, in V2X communications, the terminal device may choose between sidelink communications, V2X communications, etc. Depending on the aging based performance degradation of some of the RAT link choices, the terminal device is configured to select the best RAT choice possible. For example, if a DSRC sidelink hardware is degraded due to aging, the terminal device is configured to select LTE C-V2X sidelink or V2I/V2N to transmit a communication instead.

The aging levels of different RAT hardware may be classified into one of a plurality of levels based on their respective KPIs. These levels may include one or more of the following: low aging (e.g., good for use), medium aging (e.g., attempt other RAT hardware options, especially for higher priority safety features), high aging (e.g., may be limited to non-safety features), and severe aging (e.g., not suitable for use). Accordingly, a terminal device may be configured with a link selection algorithm including programmable instructions retrieved from a memory and executable by a processor to implement a process which takes the aging levels of different RAT components into account in order to select the most appropriate option for transmitting a communication.

In some aspects, the small cells may be configured to verify with the network (e.g., via a macro cell) that the small cell is both trustworthy and working properly in order to perform the terminal device calibration mechanisms of this disclosure. The small cell may be configured to trigger a testing mechanism with the macro cells, wherein the macro cell tests the small cell to ensure that its calibration signal processing components are functioning properly. This testing may be triggered based on a timer (e.g., with respect to a previous testing) or based on an amount of terminal device calibration procedures the small cell has performed. This testing may be similar to that described above between the terminal device and the small cell (e.g., an iterative testing process between the small cell and the macro cell) and once the small cell passes the testing process, the small cell may receive a certification to communicate with terminal devices that it is approved to perform calibration. The small cell may be configured to broadcast its calibration capabilities to nearby terminal devices. In some aspects, certain small cells may be authorized to perform certain types of calibration (e.g., for a specific RAT frequency) and broadcast to terminal devices the calibrations that they are configured and authenticated to perform.

Figure 150:
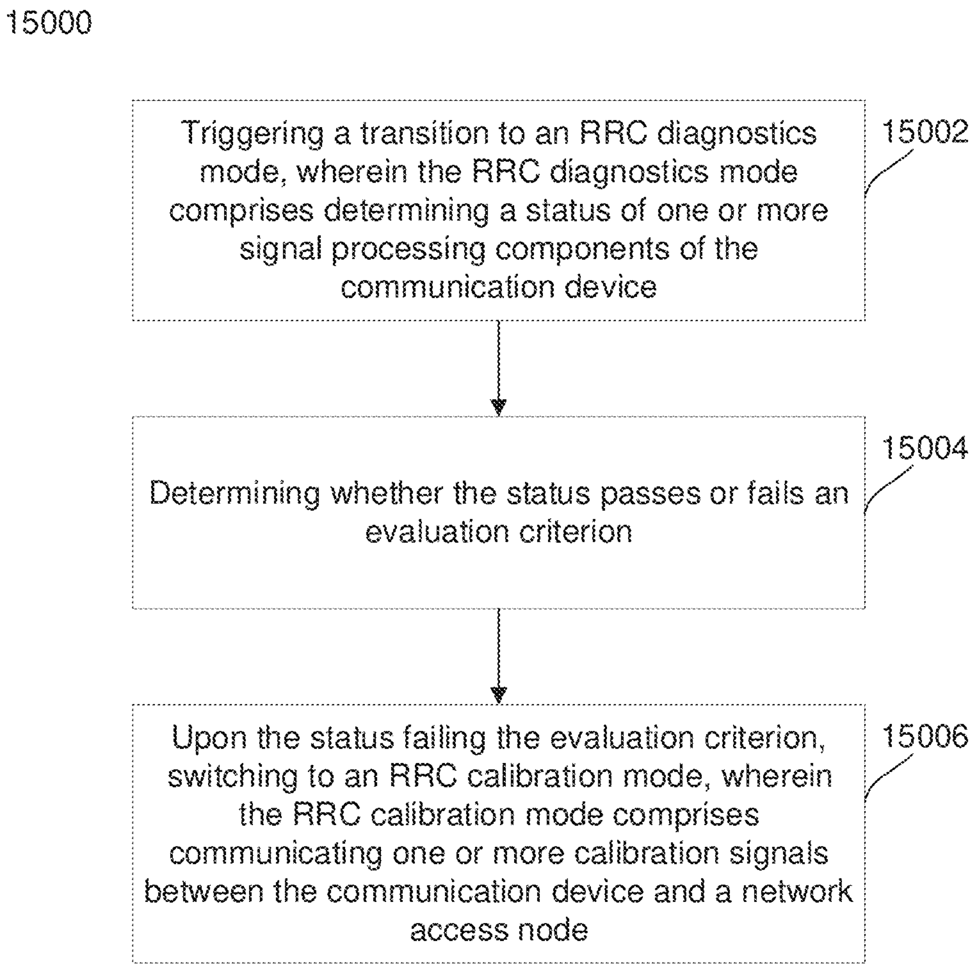

FIG. 150 shows a flowchart 15000 describing a method for calibrating a communication device in some aspects.

The method may include triggering a transition to an RRC diagnostics mode, wherein the RRC diagnostics mode comprises determining a status of one or more signal processing components of the communication device 15002; determining whether the status passes or fails an evaluation criterion 15004; upon the status failing the evaluation criterion, switching to an RRC calibration mode, wherein the RRC calibration mode comprises communicating one or more calibration signals between the communication device and a network access node 15006.

Figure 151:
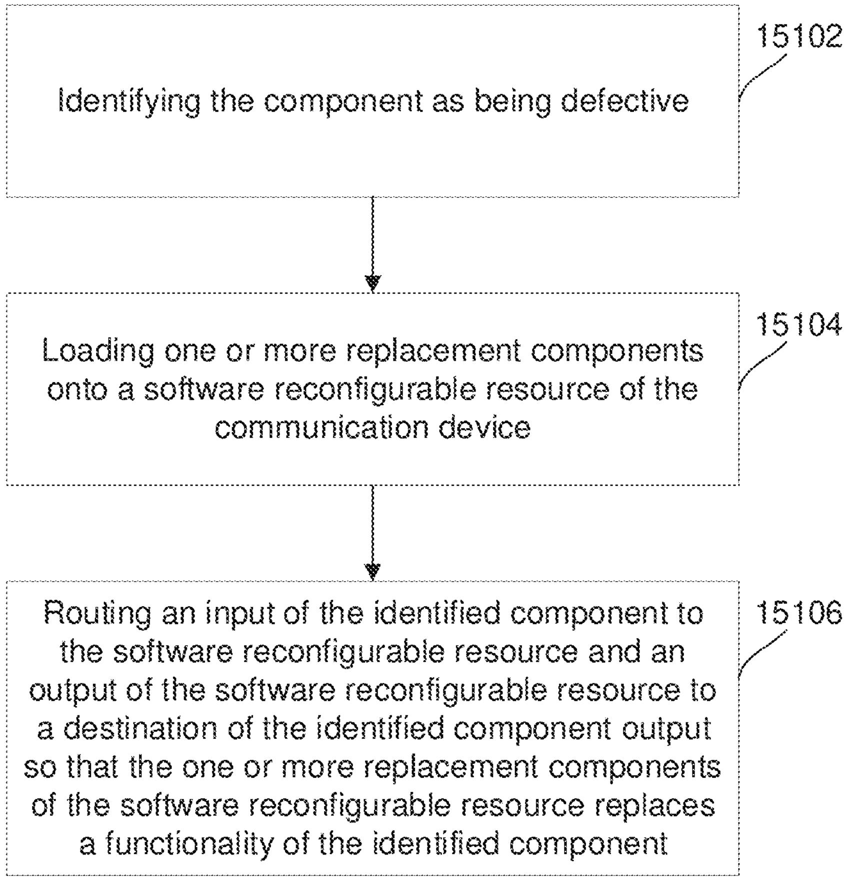

FIG. 151 shows an exemplary flowchart 15100 describing replacing a component of a communication device in some aspects.

The method may include: identifying the component as being defective according to the processes described in this disclosure (e.g., FIGS. 143 and 150) 15102; loading one or more replacement components onto a software reconfigurable resource of the communication device 15104; and routing an input of the identified component to the software reconfigurable resource and an output of the software reconfigurable resource to a destination of the identified component output so that the one or more replacement components of the software reconfigurable resource replaces a functionality of the identified component 15106.

Figure 152:
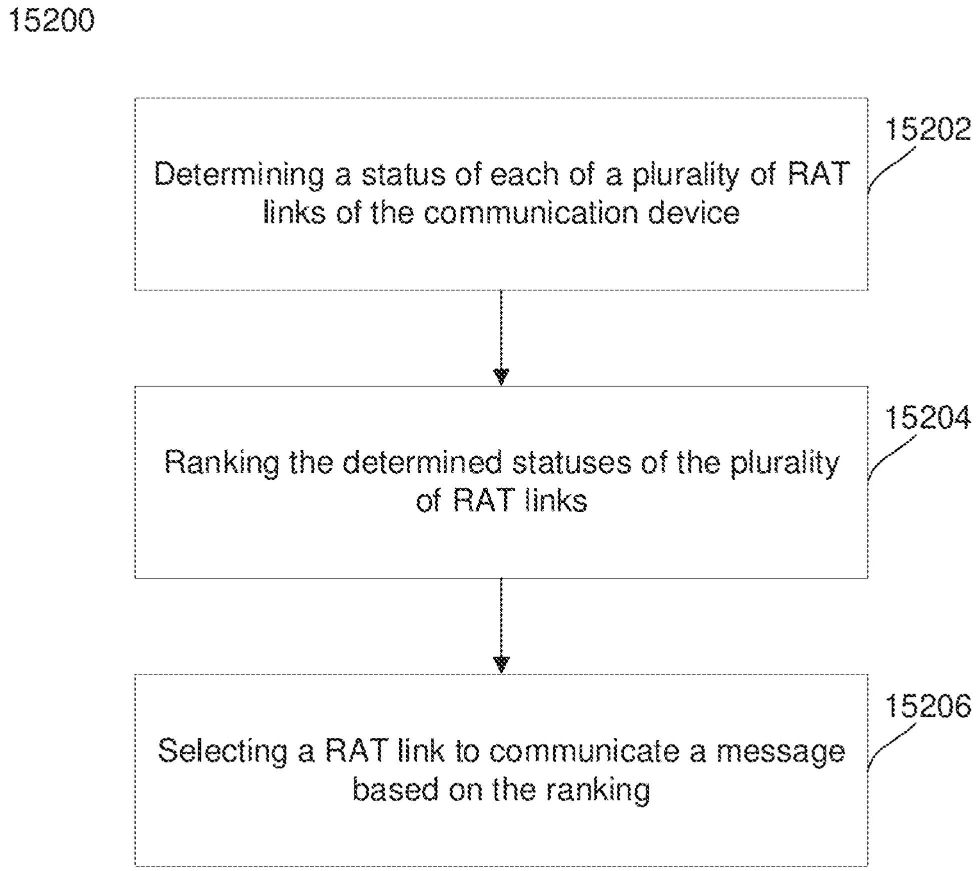

FIG. 152 shows an exemplary flowchart 15200 describing a method for selecting a RAT link for transmitting a message (i.e. link selection algorithm) in some aspects. The communication device may support a plurality of RAT links, e.g., is capable of communicating according to several RAT protocols, e.g., LTE, CDMA, WiFi, etc.

The method may include determining a status of each of a plurality of RAT links of the communication device 15202, ranking the determined statuses of the plurality of RAT links 15204; and selecting a RAT link to communicate a message based on the ranking 15206. The status of each of the plurality of RAT links may be determined based on KPIs, and the ranking of the plurality of RAT links may include, for example, ranking the plurality of RAT links based on each of the RAT link's respective status.

Customized Services/Radio Resources Optimization for Specific Users in Small Cells Small cells typically have a number of users which are camped on the small cell at routine times, e.g., employees in an office during office hours, residents in a residential building after work, etc. These users may use the resources from the small cell in a regular manner, and in some cases, the small cell may not be configured to provide these users with the necessary resources as required. In some aspects of this disclosure, the small cells are configured to account for user or user groups usage patterns in order to provide customized services and/or radio resources.

Conventional small cells, including those not configured based on the disclosure herein, serve all users equally and the small cell configuration is based on instantaneous load measurements. Typically, past observations on the behavior of a user or user Group are not taken into account. However, according to some aspects of this disclosure, knowledge of the behavior and typical requirements of specific users and/or user groups may substantially support small cell configurations in terms of efficiency, power consumption, etc. Since conventional small cells do not exploit this knowledge, their final configuration will typically be less efficient.

In some aspects of this disclosure, regular (in the ensuing description, regular when used to describe a user and/or device means routine or consistent) small cell users are identified and provided with customized services and/or radio resources in order to provide a better user experience. The small cells are configured to identify these users based on user criteria and provide the identified users with the appropriate resources, link adaptation, and/or customized services based on acquired user historical information. This may include the small cells being configured to identify a subset of users and dynamically provide these services based on user activity. Furthermore, identified users may reserve small cell radio resources in anticipation in order to provide a better user experience. By identifying regular users and using their past behavior, small cells may provide optimal resource allocation, link adaptation, and/or customized services.

The small cells are configured to learn terminal device behavior in order to provide more reliable resource scheduling, link adaptation, and/or customized services for the identified regular terminal devices. When a terminal device attaches to a small cell, the small cell registers the terminal device with the network (e.g., RRC connection, RACH procedure, NAS attach, etc.), and the small cell is further configured to identify the terminal device as a "regular" based on user criteria. The small cell may identify a respective terminal device as a regular terminal device if the small cell has observed a routine pattern of the respective terminal device camping on the small cell. This may include time information including identifying start times, end times, durations, etc. for which the terminal device has camped on the small cell, and may further include usage information including patterns of resource usage by the terminal device. Using this observed behavior, the small cell may be able to identify regular terminal devices in order to provide these terminal devices with optimized resource scheduling.

The classification of users may be done on a per-user basis or a per-user group basis.

For classification done on a per-user basis, the classification can either be determined by the small cell itself or by the user (e.g., via the terminal device). If it is determined by the user, the user may choose a certain "User Category" out of a set of predetermined user categories or the user can define a new category. Such user categories may, for example, be as follows: a) user requiring low latency, b) user requiring high data rate, c) user requiring Transmission Control Protocol (TCP) traffic, d) user requiring User Datagram Protocol (UDP) traffic, e) user substantially occupies the medium, f) user only sporadically occupies the medium, g) user typically uses a Video service, h) user typically visits Internet web pages, i) user is a professional user, j) user is a private user, k) user is of low commercial value (for delivering publicity, etc.), I) user is of medium commercial value, m) user is of high commercial value, etc. These categories may be combined, depending on the user determination. It is appreciated that the above list is not exhaustive in nature and is intended to illustrate the wide range of possible user categories.

Depending on the one or more categories chosen by the user, the small cell will adapt its operation correspondingly. In case that the user defines a novel user category himself, such a category may include options such as peak data rate requirements, average data rate requirements, peak latency requirements, average latency requirements, how often is the user accessing the medium, etc.

If the classification is done by the small cell, the small cell will observe typical user behavior such as peak data rate requirements, average data rate requirements, peak latency requirements, average latency requirements, how often is the user accessing the medium, etc. and store the observations in a memory, e.g., a local memory, on the cloud, etc. Depending on those observations, the small cell will assign a user category to the target user, such as one or more of the categories listed in above or other categories such as a low-end user (e.g., minimal resources needed), a medium user, a high-end user (e.g., resource heavy user), etc. Once this category allocation is done, it can be optionally provided to the user. The user may exploit the category, request a change of category, accept the category, reject the category and request and a new evaluation, etc. The category allocation may be shared (by the small cell and/or by the user) with other small cells and/or other network entities in order to ensure an (a-priori) optimum configuration for the user while he is using a new or different small cell (or other network element). In some aspects, this category may be communicated to the new or different small cell (or other network element) in anticipation of the user arriving at the new small cell, e.g., based on tracked user movement. Accordingly, the small cell may pertain to a network of small cells which may be further configured to share user information so that information for an identified regular user of one small cell may be shared with another small cell to govern its own communication with the user.

If the classification is done on a per-user-group basis, a target user is first characterized (following, for example, the classification approach outlined above for the classification on a per-user basis). Then, the small cell may identify one or multiple (either pre-defined or newly defined) user-group classes to which the user may fit, e.g., based on its identified user category. The user is then allocated to this group and the small cell implements the appropriate network changes and/or network strategies (such as resource allocation, e.g., higher or lower bandwidth, media accelerators, etc.) may be performed on the user-group level, not on a user level. Once this User-Group allocation is done, it can be optionally provided to each of the users. The user may exploit the allocation, request a change of allocation, accept the allocation, reject the allocation and request a new evaluation, etc. The allocation may be shared (by the small cell and/or by the user) with other small cells and/or other network entities in order to ensure an (a-priori) optimum configuration for the user while he is using a new or different small cell (or other network element) or even before the user is arriving at a new or different small cell (or other network element) as described above.

Based on the criteria observed by the small cell for the identified regular users, the small cell may be able to forecast usage characteristics, and assign resources and/or set link adaption accordingly. When a user's terminal device initially attaches to the small cell, the small cell may use information derived from past sessions to communicate with the terminal device. The small cell may provide a semi-static link adaptation based on the historical information for one or more of its regular identified terminal devices (users) instead of a real-time link adaption. For example, in the office setting, a user may spend most of its time in a specific location (a particular office), and the small cell may use past link-adaptation parameters (modulation, coding, other signal and protocol parameters) from when the user was in the specific location in order to transmit and/or receive signals to/from the user's terminal device.

In some aspects, a small cell is configured to observe the requirements for a specific user and/or user-group in a session. The optimum configuration for the user/user group network requirements is determined and stored in a database. The database may contain information elements such as:

+User/User Group ID+Configuration Requirements/Preferences+

Accordingly, in the user/user group's next session on the small cell (or, alternatively, another small cell which has access to the (shared) database), the database information is retrieved and the previously determined optimum configuration may immediately be applied. Over time, the user/user group behavior may change, at which point the user/user group may be re-classified to a different user/user group category and/or the configuration preferences/requirements for current category may be modified and updated in the database.

The access to the database may be authorized to other small cells and other network elements. This authorization may be done by a 3rd party who receives the authorization by an authorized small cell or by the user itself (upon request by a small cell to access the database or by a trigger issued by the user, e.g., by instructing a small cell or other network element to access to the database).

FIG. 153 shows an exemplary Message Sequence Chart (MSC) 15300 with a corresponding small cell network 15350 in some aspects.

In MSC 15300, one or more terminal devices attach and register with the small cell. The small cell is configured to identify the terminal device as a regular user based on a user criteria, e.g., based on pass user behavior and sessions on the small cell. According to the user criteria, the small cell is able to determine the terminal device's usage characteristics and allocates resources, services, and/or link adaptation based on the terminal device's past usage characteristics. This may include, for example, identifying the terminal device and retrieving its user category (or similarly, identifying the user group and retrieving the user group category) and the category's operating characteristics (e.g., bandwidth, usage rates, latency requirements, etc.) from the database.

In some aspects, the small cell may be configured with a terminal device priority determiner that may prioritize the allocation of resources to regular users over non-regular users (e.g., the white terminal devices in 15350), but may still allocate resources to non-regular users. In this manner, while prioritizing the assignment of resources and/or providing customized services to the regular users, the small cell is still configured to provide resources for non-regular users that attach to the small cell in order to meet wireless protocol standards.

For example, in small cell network 15350, each of the black terminal devices may be identified as regular users by the small cell. The small cell may therefore be configured to retrieve each of the terminal device's user categories from its database and provide each of the terminal devices with resources respective to its user category as described above. For example, for downlink, based on terminal device feedback from the previous session, the small cell is configured to learn the terminal device resource usage characteristics and set scheduling policies accordingly, e.g., longer downlink periods to identified regular terminal devices that consume more data. In uplink, for example, the small cell may set a schedule with the terminal device for the terminal device to manage its power control in a manner that provides for higher uplink throughput.

In another aspect, the small cell may collectively identify the black terminal devices as pertaining to a specific user group category, and accordingly, the small cell may be configured to assign resources to the users in the user group pursuant to the information retrieved from that user group's category from the database. The small cell is configured to identify one or more terminal devices as regular terminal devices and observe their behavior to recognize the performance of repetitive tasks, and implement a dynamic provisioning of accelerators for these tasks. For example, if the small cell identifies a group of terminal devices which are uploading photos, the small cell is configured to assign one or more media accelerators tailored for this operation. The small cell identifies calculation patterns for the identified repetitive task, and caches the calculations and/or outputs for future use. The small cell is configured to identify these repeated tasks and provide a configuration core (e.g., FPGA, or the like) to provide the necessary resources for the dedicated accelerator tasks. Additionally, the small cell may be configured to assign resources based on a priority scheme. This priority scheme may initially be set, but the small cell may be configured to adapt the priority scheme based on the resource usage of its identified regular users. For example, the small cell may be configured to prioritize the assignment of resources for videoconferencing over music streaming in an office setting.

Figure 154:
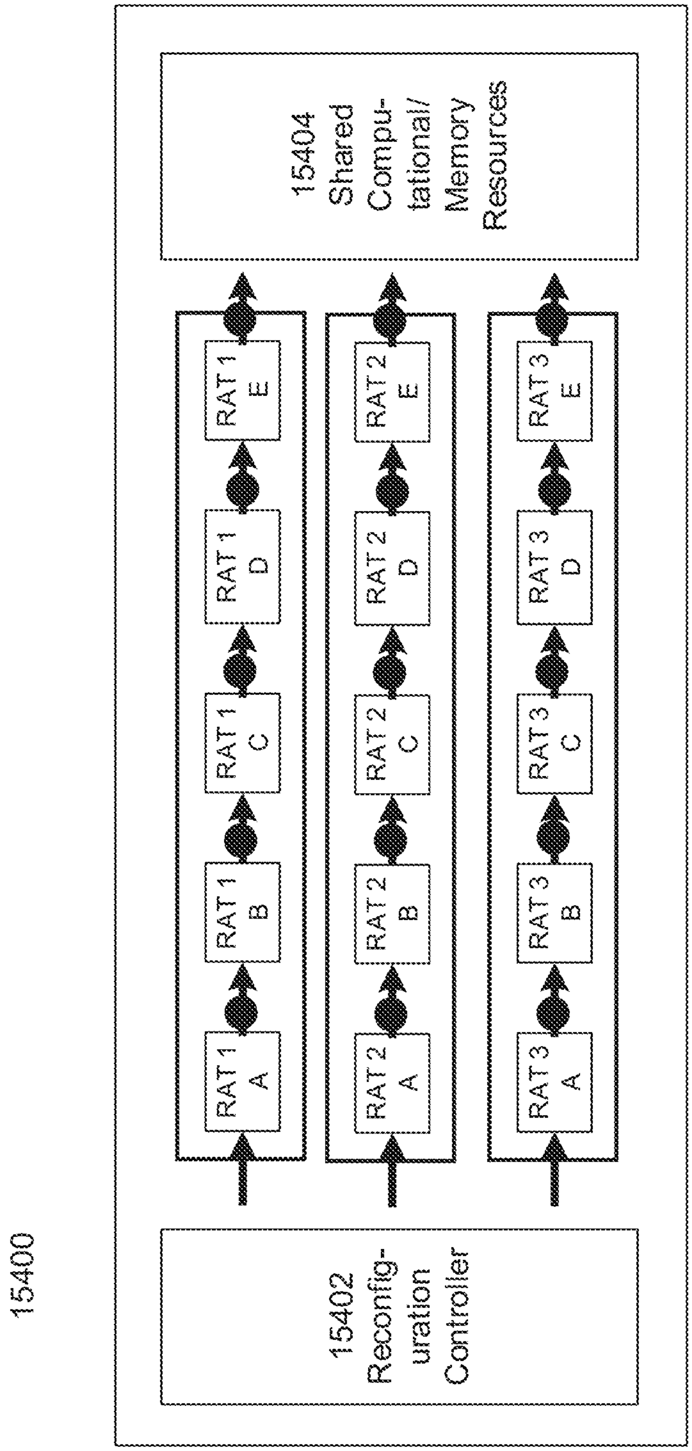

In order to achieve these tasks, the small cell may be provided with "spare" computational resources, such as memory resources, DSP resources, FPGA resources and/or other processing resources. Additionally, these resources may be available remotely (for example in the Cloud), in a neighboring Small Cell (through sharing of resources for example) or in user terminal devices. As the small cell observes behaviors of its regular users, the small cell may be configured to use these computational resources in order to provide for a more tailored service to its regular users. FIGS. 154 and 155 provide exemplary illustrations for this principle. It is appreciated that FIGS. 154 and 155 may only include small cell elements necessary for purposes of this explanation.

Initially, the small cell 15400 is configured with spare/shared computational/memory resources 15404, which may be unused by the original transmission/reception chains, shown as RAT 1, RAT 2, and RAT 3, each shown with five (A-E) analog/digital processing components. Each of these analog/digital processing components may be configured to perform a RAT-specific task, for example, including any of the signal processing functions described herein, including analog and digital RF front-end processing circuitry to produce digital baseband samples and to produce analog radio frequency signals to provide to antenna, such as Low Noise Amplifiers (LNAs), filters, RF demodulators (e.g., RF IQ demodulators)), and analog-to-digital converters (ADCs); Power Amplifiers (PAs), filters, RF modulators (e.g., RF IQ modulators), and digital-to-analog converters (DACs). Blocks A-E may also represent a processing component for baseband modem functions, as error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. While five processing blocks are shown in each chain for RAT 1-3, it is appreciated that this is done for exemplary purposes and that the disclosure herein covers any number of processing units needed for the signal processing.

The small cell includes a reconfiguration controller 15402 which is configured to identify regular users into respective user/user group categories and provide resources based on the necessary requirements for the user/user group categories. When a particular requirement is identified, the reconfiguration controller 15402 is configured to use the spare/shared computational/memory resources 15404 to introduce a new feature to support the particular requirement. For example, in diagram 15500, the reconfiguration controller 15402 identifies that an accelerator 15502 is needed between processing blocks A and B of RAT 1, and configure a processing core (e.g., FPGA, DSP, or the like) available from the spare/shared computational/memory resources 15404 to provide this function accordingly.

Alternatively, as shown in 15550, the reconfiguration controller 15402 may be configured to fully replace a component 15552, e.g., an outdated/faulty accelerator, with a new accelerator 15554. The reconfiguration controller 15402 is configured available processing cores (e.g., FPGA) from the spare/shared computational/memory resources 15404 to provide a replacement accelerator 15554, and reroutes the inputs and outputs (using bypass point shown by the dark circles) of the faulty component 15552 to the replacement component 15554 accordingly.

In some aspects, the small cell is configured to allow regular users to reserve or request resources from the small cell in advance. For example, a regular user may want to use video resources from the small cell, and the small cell may be configured to allocate the appropriate resources for the terminal device in order to avoid real-time adaption since the resources and link-adaptation can be set in advance at the time of the reservation or request.

In some aspects, the small cell may be configured as a neural network, and may adapt its resources to best serve the identified users which it regularly serves. For example, the small cell may be configured to take as inputs the identified regular users, their usage of resources, time information, etc. in order to output the resources to be allocated at a specific schedule.

In some aspects, based on the identified locations of the regular users, the small cell may be configured to modify its broadcasting mode. For example, the small cell may be configured to pool information from a group of closely located, regular users in order to broadcast data to the group.

For a network of small cells, each small cell may be tailored specific to a particular service (e.g., one small cell for videoconferencing, another for music streaming, another for voice traffic, etc.) and be configured to direct identified users to the appropriate small cell configured to provide the required services. Each specialized small cell can optimize the air resource allocation and the transmission parameters. For instance, a small cell specialized for high throughput can allocate the complete bandwidth to an identified user, therefore enabling high throughput and also reducing the interface so that no other user is served in parallel. It can also pre-allocate resource for acknowledgment packet such as TCP high (TCP is sensitive to delay or drop of TCP ACK). In another example, a small cell specialized for voice over IP call can have periodic resource pre-reserved. The small cell configures semi-persistent scheduling (SPS) for all users connected to the small cell. This allows for better usage of the radio resources as the control signaling is reduced to its minimum (no scheduling request required for each new terminal device transmission). This also simplifies the processing from the radio scheduler of the small cell, enabling a better dimension of the required hardware.

A network of small cells may further be configured to share user information so that information for an identified regular user of one small cell may be shared with another small cell to govern its own communication with the user.

Figure 156:
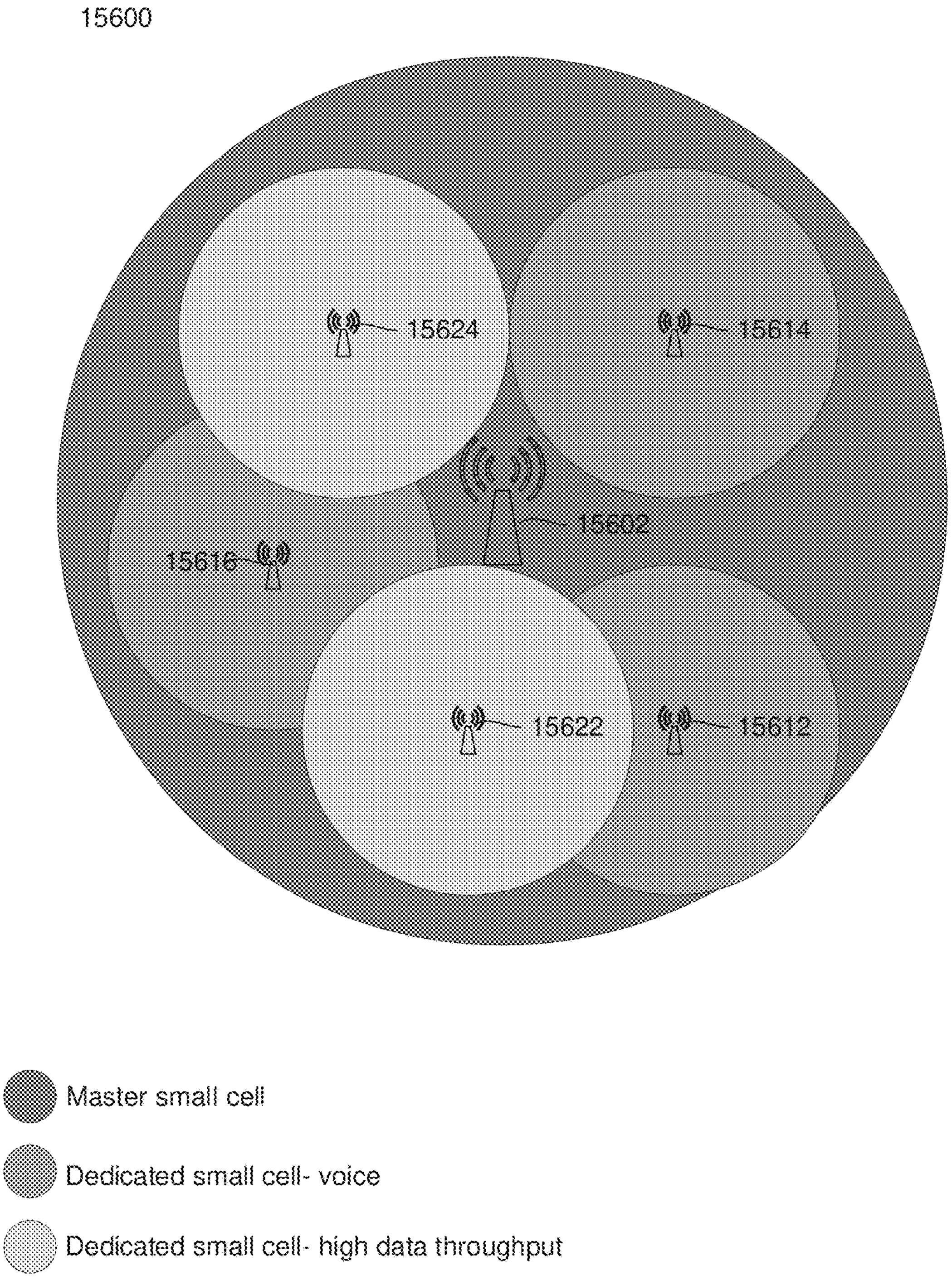

FIG. 156 shows an exemplary small cell network 15600 with a plurality of specialized small cells in some aspects.

Small cell network includes a master cell 15602, which among other things (e.g., providing basic coverage to users camped on it), may be responsible for the coordination of the specialized small cells. The master cell 15602 may offer a larger coverage as shown in 15600 and may redirect terminal devices to a specialized small cell according to the terminal devices needs.

Two types of dedicated specialized small cells are shown in 15600: dedicated small cells for voice services 15612-15616 and dedicated small cells for high data throughput 15622-15624. It is appreciated that other types of dedicated small cells may be implemented, such as dedicated small cells for a particular media type, etc. The dedicated small cells for voice services 15612-15616 may be configured to optimize radio resource scheduling particular to voice data, while the dedicated small cells for high data throughput 15622-15624 may be configured to optimize scheduling for high data throughput (e.g., enhanced bandwidth, more transmission time intervals (TTI)).

As such, the master cell 15602 may be configured with a controller configured to identify a request from a user and identify the respective small cell to which the request is sent.

Figure 157:
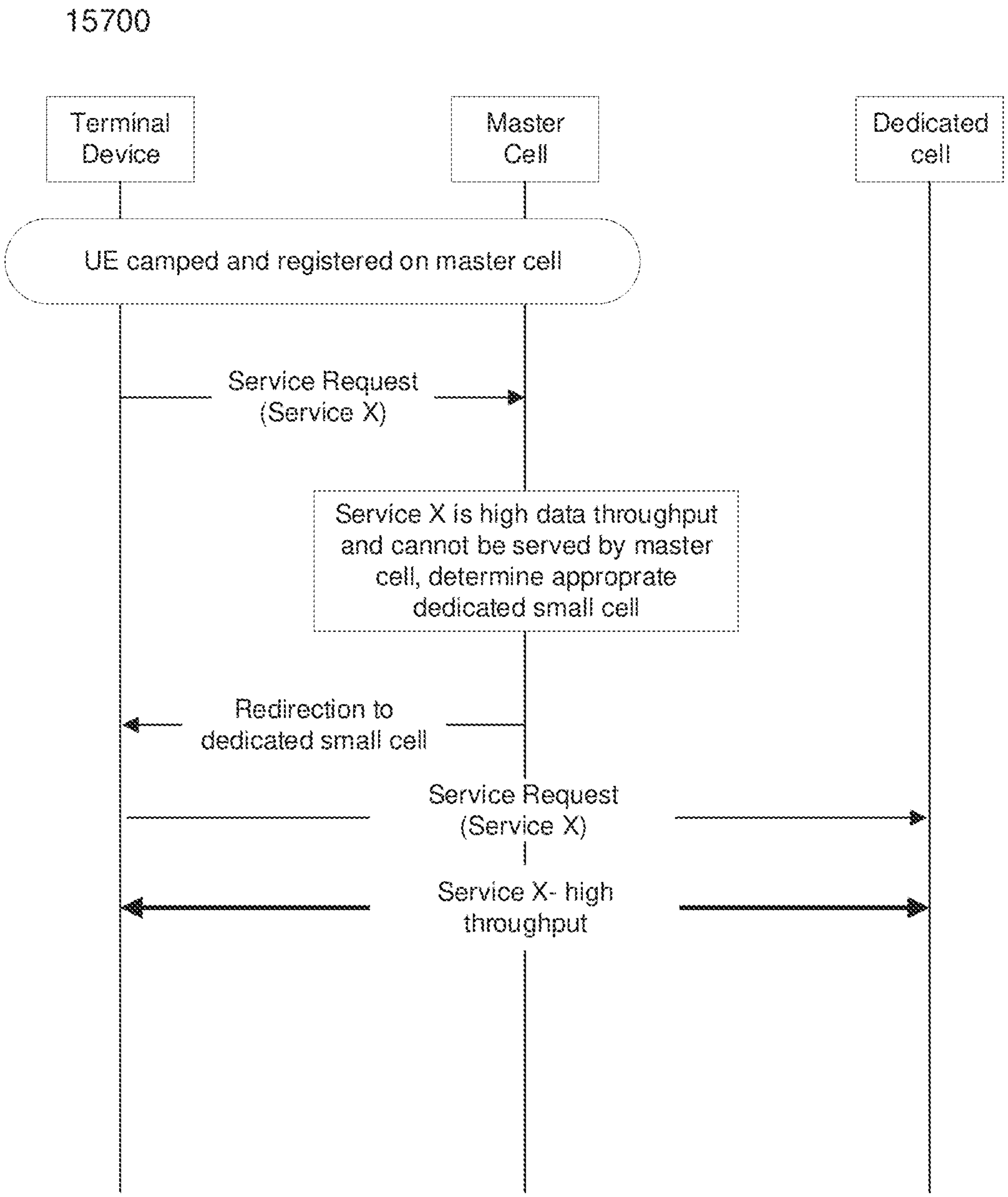

FIG. 157 shows an exemplary MSC 15700 for the signaling of a small cell network in some aspects.

Upon the terminal device sending the Master Cell a service request, e.g., for Service X, the Master Cell identifies that the request identifies a high data throughput requirement which the Master Cell may not be able to serve. Accordingly, the Master Cell identifies the dedicated cell for this type of request, and redirects the terminal device to the appropriate Dedicated cell. The terminal device redirects its Service Request for Service X to the Dedicated cell, which initiates the session. The Dedicated cell may be configured to provide resource scheduling optimized for high throughput, e.g., reserving the full bandwidth for one terminal device for one or more Transmission Time Intervals (TTIs).

FIG. 158 shows a flowchart 15800 describing a method for a network access node to interact with users in some aspects.

The method may include identifying one or more regular users based on user criteria 15802; determining usage characteristics of the identified one or more regular users 15804; and allocating resources of the network access node, providing a specific service, or performing a link adaptation based on the usage characteristics 15806.

FIG. 159 shows a flowchart 15900 describing management of a network access node arrangement including a master network access node and one or more dedicated network access nodes in some aspects.

The method may include receiving, at the master network access node, a service request from a terminal device 15902; identifying, at the master network access node, a respective dedicated network access from the one or more dedicated network access nodes configured to provide the request service 15904; and redirect the terminal device to the respective dedicated network access node 15906. In some aspects, the master network access node may require that each of the dedicated network access nodes report the services that they are optimized at in order to join the arrangement. Alternatively, the dedicated network access nodes may automatically report this at deployment. In any case, the master network access node is configured with a database with its dedicated network access nodes and their respective capabilities.

Personalization of Small Cells Through Software Reconfiguration

Mobile devices can be personalized through Apps from an App Store. However, small cells have not previously been able to be personalized. Because small cells are often owned and/or operated by private entities (e.g., in an office, residence, vehicle, etc.), it may be beneficial to personalize these small cells specific to their usage.

In some aspects, two different types of Apps for small cell reconfiguration are provided: i) Non-Radio Apps (such as Android Apps) providing video games, tools, etc. and ii) Radio Apps introducing changes of radio features, such as the addition of a novel Radio Access Technology (RAT), replacement of a component through a software version of the same component (e.g., to resolve vulnerabilities of communication components).

Manufacturers may propose updates or modifications on demand which may be provided i) through SW updates or ii) through HW changes in combination with SW updates. Methods offered to the small cell users may be elementary updates (e.g., updates by manufacturers) which are applied to a given type of equipment. The availability of such updates may be hard to anticipate and may not be based on the small cell's users' needs.

In some aspects of this disclosure, tailoring of the features of the small cell to the needs of the small cell user is achieved. Accordingly, the small cell can thus be adapted to the specific needs of a user in real-time. The small cells are fitted with software reconfigurable resources in order to allow users to personalize them specific to their needs. A user can choose software components (e.g., Apps) which are then uploaded and installed on the small cell or a network of small cells. Such Apps can provide features on a single, multiple or all ISO layers, such as an Application Layer operation and/or Lower Radio Layers for software reconfiguration components provided by third parties (e.g., via an App store).

FIG. 160 shows a diagram highlighting differences between reconfiguring a single terminal device 16002 compared to reconfiguring a small cell 16004 in some aspects.

For the single terminal device 16002, there is typically only one user configuring his/her terminal device according to his/her needs, e.g., there is a "One-to-One" relationship.

For the small cell 16004, there is typically one small cell serving a plurality of users which have typically different (and, in some cases, opposite) interests. A small cell configuration is thus typically a trade-off which serves the interests of all connected users in the more appropriate possible way. Theoretically, if an unlimited number of reconfiguration resources would be available, all requirements could be met. In practice, however, those resources (such as computational resources, memory resources, etc.) are limited and a reasonable share, e.g., weighing mechanism, must be applied. In contrast to the single terminal device 16002 example, for a small cell, there is a "One-to-Many" relationship.

FIG. 161 shows an exemplary small cell architecture 16100 according to some aspects.

The small cell 16100 may be configured to be personalized so that it may add specific capabilities and/or functions. The small cell 16100 includes fixed, hardwired (ASIC type) functionalities 16102, which may include, for example, signal processing components for one or more RATs, e.g., LTE. Small cell 16100 also includes software reconfigurable resources 16104 and memory resources 16106 configured to provide users with the ability to modify the small cell's application layer and/or radio functions specific to their needs.

FIG. 162 shows an exemplary overall system architecture 16200 for providing updates to the small cell according to some aspects.

A Radio Apps source code database containing source code for the radio APPs may be provided to a front-end compiler which compiles the source code Apps either from the Radio Apps source code database or the Radio Library. These apps are compiled in the native object code of at least one processing element of the small cell. The configcode of the compiled Apps may be tested on a shadow radio platform prior to being combined with other Apps in the Radio Programming Interface to form a Radio Apps package, which is then made available to the small cell via the Radio Apps Store.

The Small Cell Resources and Execution Environment may include a Unified Radio Application Interface including one or more of the Radio Apps configcodes. It may further include: an RVM computing platform configured to receive the configcodes from the Radio Apps store; a Radio Library configured to store the source code for the Radio Apps; and a backend compiler. Accordingly, the source code is compiled into programs in the native object code of a processing element the RVM computing platform by the backend compiler. The object code programs provided by the backend compiler may be stored in the Radio Library for use by one of the hardware (HW) radio platform processors to implement a substitute component for one or more of the existing components of the RF part.

The small cell may include software reconfigurable resources (e.g., FPGAs, DSPs, etc.) accessible to the radio processing component (as well as to other components, such as a baseband modem) and be able to use these resources in order to modify radio functionality of the small cell, e.g., to improve latency, throughput, etc. Specific resources may be limited to specific OSI layers (such as physical layer, MAC layer, Application layer, etc.) or they may be available to any layer as a pool. Different terminal devices with different radio frequency (RF) capabilities (e.g., LTE, LTE+WiFi, Bluetooth, etc.) may camp on the small cell at any given time, and the small cell may be configured to detect these different RF capabilities (e.g., "Information" in MSC above), and download the most suitable package to provide to its users. In some aspects, the small cell may be configured to analyze the calculation capabilities of its coverage in order to request/download an appropriate package from the network. The small cell may balance the calculation power allocated to a certain radio standard (e.g., LTE) with respect to the user(s) requirements. For example, if one or more users asks for super-loading on LTE, the small cell may be configured to allocate more of its signaling resources to LTE.

In some aspects, the small cell may dynamically adapt its RF capabilities to its users. For example, the small cell may provide extensions to radio protocol standards in the form of non-standard, proprietary extensions, e.g., new channel coding schemes, turbo coding, etc. In another example, for a small cell in a vehicle, the small cell may be configured to detect a new communication standard if the vehicle enters into a new area (e.g., a foreign country, an area served by currently unsupported RAT, or the like), and download the appropriate software in order to modify its radio functionalities to meet the new communication standard.

The radio layer of the small cell, may therefore, have a highly flexible manner of implementing new functionalities. Initially, the small cell's radio layer processing capabilities may not be fully realized so that the small cell may first receive information/requests from its users in order to install and modify its RF capabilities specific to its users. The small cell may use discontinuous reception cycles (DRX) and offload App layer processing in the order to modify the lower levels of its Radio layers.

FIG. 163 shows an exemplary small cell priority determiner 16300 in some aspects of this disclosure.

Because a small cell has limited storage/computation power, and different users may have different preferences, the small cell may be configured with a priority determiner 16300 in order to determine which software to install from the number of user requests. Initially, the small cell may have sufficient resources to satisfy all requests, and therefore, the priority determiner 16300 may initially not be needed.

However, as resources become depleted, the small cell is configured to implement a prioritization scheme to ensure that higher priority software is downloaded and installed over lower priority software. In some aspects, the small cell may be configured with a priority assignor 16302 to assign priority levels to its users. These priority levels may be based on a user's frequency of use of the small cell, user ranking based on user importance, etc. In some aspects, the type of software requests may also be assigned a priority in order to prioritize software of higher importance. For example, related to vehicular communication device scenarios, higher priority may be assigned to software which provides for better communications at high speeds when the vehicle is on a highway. Or, requests related to safety features may be prioritized over requests related to gaming, for example. In another aspect, the priority assignor 16302 may be configured to assign a higher priority to repeat requests from multiple users. In sum, the priority assignor 16302 is configured to receive user requests and assign each request a respective priority level (e.g., based on weighing factors).

The priority determiner 16300 may further include a priority sorter 16304 configured to sort the requests according to their assigned priority. The priority sorter 16304 may further be configured to compare the requests against already installed software wherein the software of the requests can replace the already installed software. For example, if a request for a newer version of an already installed feature is received, the small cell may delete the older version and install the newer version in its place. The priority determiner 16300 may further include a submitter 16306 configured to submit the approved, higher priority requests for downloading the related software/applications/radio functions from an Application Store via the network.

In some aspects, the small cells may be configured with a resource recycler. The resource recycler may be configured to identify lesser used software/applications/radio functions installed on the software reconfigurable resources and uninstall them in order to free resources for software of newly received requests.

FIG. 164 is an exemplary MSC 16400 describing a signaling process for a small cell network in some aspects of this disclosure.

One or more users (e.g., terminal devices) may either submit a request for a particular resource/service, or, the small cell may obtain user criteria from information received from the user or by monitoring the user behavior. After receiving the requests and/or determining the information from an obtained user criteria, the small cell may prioritize the requests as described with respect to FIG. 163. However, if the small cell has sufficient resources to handle all of the requests, the prioritization may not be needed, and all of the requests may be transmitted to the network. Upon receiving the requests, the network may identify the appropriate application/software in its Radio App library and transmit the necessary executable code to the small cell. The small cell then downloads the information received from the network in order to install the functionalities from the user request(s) forwarded to the network. This may include applications and/or radio functionalities to install a new feature and/or update/modify an existing feature. The small cell may be configured to relay at least a portion of this information to a user, so that the user may also download the necessary software code for executing the desired application/functionality. Accordingly, the small cell may be configured to execute the new functionality entirely on its own, or with split execution with the user and/or network.

In some aspects, the downloaded software/application/radio function may be distributed between the terminal device, the small cell, and/or the cloud. This split application may be partially executed on each of the small cell and the terminal device, or other network components. For example, if there is communication with a Mobile Edge Computing (MEC) node and/or a Road Side Unit (RSU), certain features of the requested download could be split among the different network elements, e.g., part of the application functionality is installed in the MEC/RSU, part on the small cell, part on a terminal device, and/or part is installed on the core network.

In some aspects, the request to install new software/applications/radio functions may come from someone other than the user. For example, if one or more users are part of a user subscription service, a service provider may trigger the installation. The core network, therefore, must be able to identify which small cell the user is connected to so that it can perform the software upgrade to the correct small cell.

Other examples for small cell software modifications may include software that better integrates the small cell into a cloud infrastructure in order to off-load operations to the cloud, e.g., message redistribution tasks; new security features such as advanced encryption; and maintenance features to correct detected vulnerabilities.

In some aspects, the small cell is configured to distinguish between data that is intended for the network (e.g., in formal communications) and the type of data that is intendent for a local cloud, e.g., data that is relevant to newly installed applications. The small cell may include pact filters that allow the small cell to identify the destination of a data (e.g., similar to Traffic Flow Templates (TFTs)). These filters may be configurable, so that the appropriate filter is enabled when a certain application is enabled in the small cell, e.g., using a particular packet filter to find game data when a gaming application is active. The small cell may be configured to identify which applications are active in order to activate the appropriate filters.

In some aspects, the small cells may be fitted with additional hardware to support the handling of new functions. For example, the small cell may be fitted with a modular addition for memory or a modular front end (e.g., including FPGAs, DSPs, etc.) for signal processing.

FIG. 165 shows an exemplary flowchart 16500 describing a method for configuring a network access node in some aspects. The network access node may be a small cell network access node.

The method may include receiving a plurality of download requests from one or more users 16502; assigning a priority to each of the download requests 16504; sorting the download requests based on their assigned priorities 16506; submitting one or more download requests to the network based on the sorting 16508; receiving executable code from the network in response to the one or more download requests 16510; and downloading the executable code on a non-transitory computer-readable media of the network access node and reconfiguring the network access node based on the downloaded executable code 16512.

Small Cell Hierarchy for V2X, Mobile Vs Static Small Cells

In a V2X environment, a terminal device, e.g., a vehicular communication device, may be connected to a plurality of different types of other nodes, such as mobile edge computing (MEC), RSUs, small cell network access nodes (both mobile and stationary), and a macro cell network access node. The number of nodes, and the type of node, that a terminal device is connected to, however, may be constantly changing due to a constantly evolving environment. Accordingly, nodes which at one point were readily available for handling communications, e.g., handing distributed processing, message distribution tasks, may no longer be viable candidates for such communications. Or, a change in the vehicular communication devices environment may have introduced a new node which may be better equipped for such communications.

In some aspects of this disclosure, terminal devices are configured to receive and/or create a hierarchy of nodes differentiating between a node's mobility, coverage area, and processing capabilities.

FIG. 166 shows an exemplary V2X network environment 16600 in some aspects.

Vehicular communication device 16604 may be traveling in the same direction as vehicular communication devices 16602 and 16606. In some aspects, vehicular communication devices 16604 may be configured to form a vehicle cluster 16610 in order to collaboratively handle certain tasks. The vehicular communication devices of cluster 16610 may coordinate to manage access to channel resources that can be shared between multiple vehicular radio communication technologies, such as DSRC, LTE V2V/V2X, and any other vehicular radio communication technologies. The vehicular communication devices of a cluster may coordinate with one another via exchange of cluster signaling. As used herein, a cluster of devices may be any logical association of devices which devices can join, generate, leave, or terminate, and exchange data specific to the cluster with each other. One of the vehicles within cluster 16610 may assume the role of cluster head, and be configured to initiate the cluster and management of cluster resources.

Alternatively, the formation of the cluster 16610 may not be required. In some aspects, vehicular communication device 16604 may be configured to detect other nodes, e.g., vehicular communication devices 16602 and 16606, with a similar movement pattern to the vehicular communication device's 16604 own movement, e.g., the distance between the devices remains substantially constant. This may be achieved by signaling including positioning data (e.g., GNSS) between the devices, velocity data, Doppler Shift detection, etc. Accordingly, the vehicular communication device 16604 may be configured to communicate with vehicular communication devices 16602 and 16606 at a different level than other nodes, e.g., 16660-16665, 16620, 16630.

Other vehicular communication devices 16620 and 16630 may be within range of vehicular communication device 16604, but, compared to vehicular communication devices 16602 and 16606, the duration of time for which vehicular communication device 16604 may communicate with vehicular communication devices 16620 and 16630 is much shorter. Additionally, infrastructure elements 16660 and 16665 may be within range of vehicular communication device 16604. These other infrastructure elements 16660 and 16665 may be any one of fixed network infrastructure elements, e.g., RSU, a fixed small cell network access node, traffic lights, etc. Vehicular communication device 16604 may also fall within range of macro cell network access node 16650, which may provide network access and/or offload processing capabilities for vehicular communication device 16604 over a wide area than other nodes, albeit at some cost.

In some aspects, terminal devices (e.g., vehicular communication devices) are configured to adapt in this evolving environment by implementing a hierarchal setup to account for mobility to satisfy latency and coverage requirements. Furthermore, the terminal devices may be configured to modify the hierarchal setup in real-time. For example, mobile edge computing (MEC) nodes, e.g., which may be installed directly on other vehicular communication devices; mobile small cells, e.g., also in vehicular communication devices; static small cells, e.g., via RSUs, small cell network access nodes; and the broader cell network (e.g., via macro cells) may be included in the hierarchy.

In some aspects, nodes determined to be "mobile" may be included at the one level of the hierarchy, and nodes determined to be "static" may be at another level at the hierarchy, and the core mobile network may be at another level. Nodes may include a wide variety of Access Points (APs), such as small cells, MECs, RSUs, other terminal devices such as UEs or vehicular communication devices, etc.

Furthermore, the term static and mobile may be used relative to a fixed point (e.g., mobile meaning anything in motion, static meaning at fixed positions). In other aspects, it may be used to describe movement relative to the terminal device.

FIG. 167 shows a diagram 16700 describing an exemplary hierarchical setup in some aspects. FIG. 168A shows an exemplary internal configuration for a hierarchy determiner 16804 of a terminal device in some aspects. Hierarchy determiner 16804 may be included in a baseband modem (e.g., corresponding 206 in FIG. 2) or a radio communication arrangement (e.g., corresponding to 504 in FIG. 5) of a terminal device.

Hierarchy determiner 16804 may include a node detector 16812 configured to detect other nodes within its communication range and distinguish between different types of nodes based on several factors. These factors may include a mobility factor, coverage factor, and a processing capability factor. The mobility factor may include information of another node's movement pattern. In this manner, the terminal device would be able to distinguish between mobile nodes and static nodes. For example, a mobile node (e.g., a vehicular communication device) may transmit information including velocity information and/or location information, which the terminal device may use to classify it as a mobile node. Also, the terminal device may detect another node's mobility based on a speed estimation performed relative to the other node's transmitter.

Hierarchy determiner 16804 may include with a node detector 16812 which may be operatively coupled to an antenna 16802 (which may correspond to antenna 202 or antenna system 506 in FIGS. 2 and 5, respectively) and be configured to detect other nodes within the terminal device's 16800 communication range. Node detector Furthermore, hierarchy determiner 16804 may include a hierarchy sorter 16814 configured to distinguish mobile nodes into mobile nodes with a different movement pattern and mobile nodes with a similar movement pattern. Mobile nodes with a similar movement pattern, e.g., vehicles traveling in the same direction as the terminal device, may be detected by the node detector 16812 based on their relative velocity to the terminal device and/or location information. The hierarchy sorter 16814 may determine that another node (e.g., vehicle) has a similar movement pattern based on a history of signaling with the other node, e.g., Rx signal strength remains constant for a certain duration of time.

In some aspects, vehicles within a same cluster are identified as having a similar movement pattern to that of the terminal device. Vehicles traveling in a different direction, for example, are identified as having a different movement pattern.

If the terminal device is in motion, therefore, the mobile nodes may be distinguished to be relative to the terminal device's movement (e.g., mobile nodes traveling in the same direction as the terminal device, which may include traveling in a same cluster) and classified by the hierarchy sorter 16814 accordingly.

Static nodes are those nodes whose position is fixed, e.g., infrastructure such as RSUs, fixed small cell network access nodes, longer range base stations, etc. These types of nodes may be further classified into two categories: long range and short range. Long range nodes may include macro cell base stations, for example, while short range nodes may include RSU, for example.

In some aspects, once the hierarchy 16700 is assembled by the hierarchy sorter 16814, the task/message distributor 16816 is configured to interact with a node at a certain level of the hierarchy 16700 in order to distribute processing tasks, message distribution tasks, or the like, depending on latency, coverage, and/or processing requirements. For example, the hierarchy determiner 16804 may be configured to interact with the lowest level of hierarchy 16700, including, for example, interacting with mobile nodes first. The task/message distributor 16816 may be configured to first distribute tasks to mobile nodes with a similar movement pattern. However, if communications using this level of the hierarchy is not possible (e.g., relative mobility between two vehicles abruptly increases, data processing requirements not met, etc.), the hierarchy determiner 16804 may be configured to use another level of the hierarchy 16700 in order to secure a more stable link, but perhaps at some cost, e.g., reduced capacity. In another example, the task/message distributor 16816 may distribute a message immediately to a long range static node of the hierarchy if a coverage requirement for the task demands maximum coverage for the message.

The terminal device 16800 may be a vehicular communication device moving at high speeds on a highway. This terminal device may be caravanning with several other terminal devices (e.g., vehicles). The task/message distributor 16814 may attempt to initially distribute processing and/or messaging tasks with a mobile node (e.g., other vehicle with a similar movement pattern) based on the hierarchy 16700 assembled by the hierarchy sorter 16814, but if it is unable to, it may then attempt to perform the task using a static node of the hierarchy 16700 assembled by the hierarchy sorter 16814. However, resorting to the use of the static node may come at a cost, e.g., additional signal processing due to changing channel conditions, e.g., increased Doppler Effect.

In some aspects, depending on certain requirements, e.g., throughput, latency, or the like, the hierarchy determiner 16804 may be configured to bypass the hierarchy assembled by the hierarchy sorter 16814. For example, if a particular communication is latency critical and needs to be communicated immediately to the core network, the hierarchy determiner 16804 can go directly to the core network level of the hierarchy 16700 in order to help avoid potential latency losses in communicating between the different hierarchy levels. In another example, if there is low latency between closely located vehicles, the lowest level of latency may be obtained by communicating with a node of a lower hierarchy (e.g., a vehicular communication device configured as an MEC node and with a similar movement pattern) if in close geographic proximity.

Furthermore, the hierarchy sorter 16814 may be configured to assemble the hierarchy 16700 based on the processing capabilities of the other nodes. For example, if there are multiple nodes with a similar movement pattern (e.g., other vehicles moving in the same direction in a traffic jam), the hierarchy sorter 16814 may be configured to include this processing information in the hierarchy and the task/message distributor 16816 may be configured to distribute processing and message tasks based on this processing information, e.g., one node may have higher processing capabilities at a particular time than another node.

In some aspects, nodes may be added and/or removed from the hierarchy 16700. Long range cell nodes can be considered to be static and available most of the time, but short range nodes could come and go from a terminal device's communication range, e.g., an RSU. Mobile nodes, e.g., vehicular communication devices, may be moving in opposite directions, or they may change their movement patterns relative to the terminal device 16800. The node detector 16812 detects these changes in the terminal device's environment, and forwards this information to the hierarchy sorter 16814, which modifies the hierarchy 16700 accordingly. For example, the dynamic management and modification of the hierarchy 16700 may be altered due to a change in environment, e.g., high traffic scenario, where the movement of the terminal device 16800 is greatly reduced.

The hierarchy determiner 16804 may determine the hierarchy 16700 in a number of different options. In a first option, a network may communicate a hierarchy to the terminal device 16800. The hierarchy sorter 16814 may then modify the hierarchy, especially with regards to nodes detected by the node detector 16812, e.g., the mobile nodes as they come into and out of the terminal device's range, e.g., other vehicles. The hierarchy determiner 16804 may estimate the speed relative to other nodes' transmitters with the node detector 16812, and the hierarchy sorter 16814 may add each respective node to either the mobile or static node level of the hierarchy accordingly.

In another aspect, the hierarchy determiner 16804 may be configured to determine the hierarchy in a distributed manner with other devices, e.g., mobile nodes with similar movement patterns. In V2X broadcasting communications, each terminal device may decode signals from multiple node transmitters, and be configured to add each node based on its relative movement, e.g., there is no need for coordination from a centralized controller. The hierarchy determiner 16804 may assemble/modify the hierarchy tree itself (or modify one received from an outside source) by detecting nodes in its surroundings.

In some aspects, terminal devices in the V2X environment, such as those in a cluster of vehicles or mobile nodes which have been determined to have a similar movement pattern, may be able to handle the determination of the hierarchies collaboratively. Accordingly, the tasks related to the assembly and/modification of the hierarchy for a particular cluster of vehicles may be distributed across all vehicles of the cluster.

In some aspects, different predetermined hierarchies may be arranged on a geographic grid which may be communicated to the terminal device 16800 as it passes through a particular area. For example, if a terminal device has a programmed route which it will follow (e.g., using a vehicle's GPS navigation system), the hierarchy determiner 16804 may receive an "initial" hierarchy to use at each of a plurality of points along the route, which may include information for the static node level of the hierarchy, e.g., a list including the core network and static infrastructure elements (e.g., RSUs, static small cell stations, etc.), and the hierarchy sorter 16814 may be configured to add nodes detected by the node detector 16812 to the "mobile node" level accordingly.

In another exemplary option, terminal devices may communicate hierarchies between themselves. For example, for vehicular communication devices traveling in opposite directions, each vehicular communication device may communicate a hierarchy to the other as they pass each other, since one vehicular communication device's past location will become the passing vehicular communication device's future location. Accordingly, the vehicular communication devices may share knowledge of infrastructure elements with other vehicular communication devices going towards that direction. Each vehicular communication device may still be able to modify the hierarchy, including at the mobile node level, e.g., other mobile nodes with similar movement patterns that the passing vehicle would not have information about.

FIG. 168B shows an exemplary MSC 16850 describing a method for identifying capabilities of one or more small cells for determining a small cell hierarchy in some aspects.

The terminal device may query one or more small cells for each of their respective capabilities, i.e. 16852 to Small cell #1 through 16854 to Small Cell #N (where N is an integer greater than 1), after detecting the one or more small cells (e.g., via the Node Detector). A terminal device may submit this query about a small cell's corresponding capabilities while it is attached to a small cell or prior to attaching to a small cell.

Each of the respective small cells may then reply to the query by providing their capabilities 16856 and 16858. Each of these may include a "capabilities identifier," wherein the "capability identifier" for each small cell may include at least one of the following: latency of the small cell for information processing, coverage area of the small cell, service capabilities of the small cell (e.g. interoperability services providing translation capabilities between IEEE 802.11p based DSRC and LTE C-V2X services), access conditions of the small cell (e.g. open access (for all), access restricted to specific user groups), a mobility factor of the small cell (e.g. fixed small cell or mobile small cell, magnitude of mobility, etc.). Small cells #1 and #N may be organized on a single hierarchy level or on different hierarchy levels.

When a service is requested from a small cell (e.g. simple redistribution of messages, interoperability services such as translating messages from IEEE 802.11p based DSRC to LTE C-V2X and vice versa, or the like), a "budget identifier" may be attached to the message. If this "budget identifier" is attached to the message, it may include information such as the latency budget, the transmission power budget, and/or information security requirements.

The latency budget may include information indicating how much processing time is available for the infrastructure/network to execute the task. For example, this may include how much processing time is available to execute interoperability services such as translating messages between two communication protocols, e.g. from IEEE 802.11p based DSRC and LTE C-V2X. The latency budget typically includes the overall processing and information management/forwarding time across all elements of the small cell hierarchy.

The transmission budget may include information indicating how much output power should be available in the small cell (or other network access node/infrastructure element) to redistribute the message. This requirement may also be expressed as a minimum and/or a maximum coverage area.

The information security requirements may include information indicating the requirements that need to be met in the processing of data/signals/information. For example, there may be legal standards in certain countries, or some information elements (e.g. identifying specific users and/or vehicles, etc.) may only be processed within a specific geographic range of the users (i.e. data must be processed in the immediate proximity of the user and may not be forwarded to a remote server for further processing).

The terminal device, i.e. through the hierarchy determiner 16804, may be configured to follow the corresponding budget and other requirements in order to choose (i.e. distribute the messages and/or tasks) between the small cells, infrastructure elements, and the network in the hierarchy based on the received capabilities and its requirements 16860.

FIG. 168C shows an exemplary diagram describing a process for meeting latency requirements in some aspects. It is appreciated that FIG. 168C is exemplary in nature and may thus be simplified for purposes of this explanation.

Following the requirements/information of the identified "capability identifier" and/or "budget identifier," the processing through the small cell/infrastructure element/core network hierarchy may be chosen.

In FIG. 168C, a high power small cell may need to be identified in order to provide a specific service, e.g. interoperability services such as translating messages from IEEE 802.11p based DSRC to LTE-C2V or vice versa. In the scheme shown on the left (for device 16862), the latency budget requirements are not met since the processing/management of data through the complex hierarchy takes too much time. However, in the scheme shown on the right (for device 16864), the latency budget requirements are met, and the processing and management of data though the complex hierarchy is performed in an acceptable amount of time. The processing paths throughout the hierarchy are shown as 16866 and 16868 for terminal devices 16862 and 16864, respectively.

By identifying the "capability identifier" of each of the small cells and by attaching a "budget identifier" to its message, the terminal device on the right (i.e. vehicular communication device of 16864) is able to implement a hierarchy which provides the necessary processing requirements in order to perform a task within a suitable amount of time.

Furthermore, as shown in FIG. 168C, a single small cell may receive a request and provide the answer to the user (as shown for 16862) or one small cell may receive a request and a different small cell may provide the answer (as shown in 16864). The approach taken in 16864 may provide the additional benefit of being able to operate in a method similar to a Full Duplex operation, e.g. while the first small cell is still receiving data, the available parts of the frame are immediately processed and the answer is immediately provided to the user. In this manner, while the user is sending data to the first small cell, the second small cell may begin to transmit data in response to the user submitted data following a short processing delay. This principle is further detailed in FIG. 168D.

By transmitting and receiving signals from two different small cells, 16874 and 16876, respectively, the terminal device 16872 (which may correspond to device 16864 in FIG. 168C) may more evenly distribute the processing of the data across the small cells so that the processing delay 16888 is shortened. The receiving small cell 16874 may receive the incoming frame 16878 indicating data to be processed by the small cells, and immediately begin the processing/distribution of the processing of the data. The transmitting small cell 16876 may begin to transmit the outgoing frame 16880 immediately back to the terminal device 16872 following a short processing delay 16888 while the remaining data is still being processed. In some aspects, in order to simplify the user receiver requirements (in this case, a vehicular communication device) since simultaneous transmission and reception is a technologically challenging risk (due to interference issues), the terminal device 16872 is able to exploit the different locations of the small cells. This may result in different path angles at which the communications are being transmitted and received, and these different path angles may be used to mitigate interference. The terminal device 16872 may be configured to employ a respective antenna beamforming for the transmit path and a different antenna beamforming for the receive path, such as to provide sufficient signal diversification between the two paths.

16882 shows the times during which the terminal device is only transmitting data, 16884 shows the time during which the terminal device is transmitting and receiving data simultaneously, and 16886 shows the time during which the terminal device is only receiving data.

FIG. 169 shows a flowchart 16900 describing a method for creating a hierarchy of nodes to use in wireless communications in some aspects.

The method of flowchart 16900 may include detecting a plurality of nodes 16902; determining at least one of a mobility factor, coverage area factor, or a processing capability factor, for each node of the plurality of nodes 16904; sorting the plurality of nodes into a hierarchy based on its at least one determined factor 16906; and communicating with at least a first node of the plurality of nodes based on the hierarchy 16908.

Dynamic Selection of Compression Modes

Terminal devices may transmit and receive data streams that include user-plane data. FIG. 170 shows a basic example according to some aspects, where terminal device 17002 may transmit or receive a data stream with server 17006 via a radio access channel provided by network access node 17004. In the uplink direction, terminal device 17002 may generate the data stream (e.g., on the user-plane in application or baseband layers), and may transmit the data stream to network access node 17004 in the form of wireless signals over a radio access channel. Network access node 17004 may receive the wireless signals and subsequently send the data stream to server 17006, which may act as the endpoint of the data stream (e.g., the end of a software-level signaling connection between terminal device 17002 and server 17006). Server 17006 can be located in any network location, such as at network access node 17004 (e.g., part of network access node 17004), in an edge network next to network access node 17004 (e.g., in an edge computing server, such as a MEC server, that interfaces with network access node 17004), in the core network behind network access node 17004, or in an external internet network to which the core network connects. In the downlink direction, server 17006 may generate the data stream and send the data stream to network access node 17004. Network access node 17004 may then transmit the data stream in the form of wireless signals to terminal device 17002 over the radio access connection. Terminal device 17002 may receive and process the wireless signals to obtain the data stream.

Terminal device 17002 and server 17006 may therefore use a software-level signaling connection to transfer the data stream in the downlink and/or uplink direction, where the software-level signaling connection may use the radio access channel (between terminal device 17002 and network access node 17004) for wireless transport at the physical layer. However, the ability of the radio access channel to transport the data stream (in the form of wireless signals after processing, RF mixing, amplification, and wireless transmission) may depend on its channel strength. For example, stronger radio access channels (e.g., having higher SNR) may be able to support higher data rates than weaker radio access channels (e.g., having lower SNR). Accordingly, if the radio access channel is weak it may not be able to support a high data rate. Depending on the strength of the radio access channel (e.g., characterized by its SNR or other channel metric), terminal device 17002 and server 17006 may thus use data compression to transfer the data stream. For example, terminal device 17002 and server 17006 may compress the data stream according to a compression format (e.g., an audio compression format such as MP3, a video compression format, or any other type of compression format) and transfer the data stream in the compression format (e.g., a compressed data stream that includes the data stream after it has been compressed with the compression format). As the compressed data stream is condensed compared to the uncompressed data stream, it can be transferred over the radio access channel with a lower data rate.

Issues with data rate can also be related to spectrum bandwidth. For example, radio access channels with higher bandwidth (e.g., allocated more frequency resources/spectrum) may be able to support higher data rates than others. Accordingly, if the radio access channel has lower bandwidth, terminal device 17002 and server 17006 may compress the data stream with a compression format (thus condensing the size of the data stream) and then transfer the compressed data stream at a lower data rate over the radio access channel. Compression can also help with data storage, as compressed data may be condensed in size compared to uncompressed data. The compressed data will therefore take up less storage space when stored in a memory.

While the use of compression may assist terminal device 17002 and server 17006 in transferring the data stream when the data rate of the radio access channel is limited, compression may also present some drawbacks, especially in dynamic (realtime) application where data is exchanged between terminal device 17002 and server 17006 in real-time. For example, the processing involved in compression and decompression may lead to higher power usage. For example, terminal device 17002 may use a digital processor (e.g., a baseband or application processor, depending on which layer the compression/decompression is performed) to compress and decompress the data stream. In an example where terminal device 17002 is transmitting the data stream in a compression format, the digital processor of terminal device 17002 may perform compression processing on the data stream to apply the compression format to the data stream. This compression processing may consume power at the digital processor, thus causing battery drain at terminal device 17002. This can likewise hold in the downlink direction, where server 17006 may send the data stream to terminal device 17002 in a compression format. The digital processor of terminal device 17002 may perform decompression processing on the data stream to revert the compression format (and obtain the data stream in its initial format). This decompression processing may similarly consume power at the digital processor and lead to battery drain.

In addition to power usage, compression and decompression processing may also introduce latency. For example, when terminal device 17002 receives the data stream in a compression format, its digital processor may first perform decompression processing on the data stream before terminal device 17002 can actually use the data stream (e.g., process and react to the information in the data stream, such as for an application-layer usage). This may introduce processing latency, as terminal device 17002 may not be able to use the data stream until the decompression processing is complete. These issues with latency can also be seen at server 17006, as it may likewise perform decompression processing on the data stream (after receiving the data stream from terminal device 17002) before it can use the information in the data stream. This compression-related latency can be particularly problematic in latency-sensitive applications, such as autonomous driving or factory robot control, which may have low latency tolerance as the information in the data stream is immediately used (e.g., to avoid collisions or manage an assembly line).

Accordingly, various aspects of this disclosure provide a dynamic compression format selection system with spectrum offload. For example, in some aspects, a terminal device may initially be transmitting or receiving a data stream in a first compression format on primary spectrum. The terminal device may then identify secondary spectrum and use both the primary and secondary spectrum to transfer the data stream in a second compression format with reduced latency and/or power consumption than the first compression format. Even if the second compression format increases the data rate demands of the data stream (e.g., if it has lower compression efficiency than the first compression format), the introduction of the secondary spectrum may provide enough extra bandwidth for the terminal device to meet the increased data rate demands. This can apply for cases where the second compression format involves is a compressed compression format and where the second compression format is an uncompressed compression format (e.g., where the data stream is transferred in its uncompressed form). As the second compression format has lower power usage (e.g., at the digital processors involved in compression/decompression) and/or processing latency than the first compression format, the terminal device may be able to reduce its power usage and/or reduce latency in the data stream. This can be particular true for cases where the second compression format is an uncompressed compression format, as the terminal device may be able to avoid performing any compression/decompression processing for the data stream, thus leading to large reduction in power saving and latency.

FIG. 171 shows an exemplary internal configuration of terminal device 17100 according to some aspects. As shown in FIG. 171, terminal device 17100 may include controller 17102, stream application 17104, digital compression processor 17106, router 17108, transceivers 17110 and 17112, and antennas 17114 and 17116 (e.g., single antennas or antenna arrays for beamforming or MIMO). The following description provides an introduction for each of these components, followed by a detailed description of their operation. With initial reference to controller 17102, controller 17102 may be a processor (e.g., a special-purpose processor) configured to control selection of a compression format for a data stream. Controller 17102 may therefore be configured with control logic (e.g., in the form of executable instructions) that defines detection of triggering conditions, selection of compression formats, and control of data stream routing as described below.

Stream application 17104 may be an application that generates and/or receives the data stream. For example, in an uplink case, stream application 17104 may generate the data stream as an uplink stream of user data addressed to server 17006. In a downlink case, stream application may receive the data stream as a downlink stream of user data. In some aspects, stream application 17104 may be an application-layer application (e.g., running on an application processor of terminal device 17100) that generates or receives an application-layer data stream (e.g., audio, voice, video, file, realtime streaming, gaming, or any other type of data stream). In other aspects, stream application 17104 may be a baseband-layer application (e.g., running on a baseband modem of terminal device 17100) that generates or receives a baseband-layer data stream, such as a voice data stream for voice communications or a video data stream for video communications (e.g., 2D or 3D).

Digital compression processor 17106 may be a digital processor configured to perform compression and/or decompression processing on the data stream. Digital compression processor 17106 can be an application-layer component (e.g., part of an application processor of terminal device 17100) or a baseband component (e.g., part of a baseband modem of terminal device 17100). In various aspects, digital compression processor 17106 may be configured to only perform compression (e.g., if the data stream is an uplink data stream), to only perform decompression (e.g., if the data stream is a downlink data stream), or to perform both compression and decompression (e.g., if the data stream is a bidirectional data stream). Digital compression processor 17106 may be configured to perform compression/decompression processing according to multiple compression formats, such as by compressing a data stream into a first and second compression format and/or decompressing a data stream from a first and second compression format. The compression format that digital compression processor 17106 applies or reverts may be controlled by a compression selection signal provided by controller 17102. In the uplink direction, digital compression processor 17106 may receive the data stream from stream application 17104, compress the data stream into a compression format, and provide the data stream (in the compression format) to router 17108. In the downlink direction, digital compression processor 17106 may receive the data stream in a compression format from router 17108, decompress the data stream out of the compression format, and provide the data stream (in an uncompressed compression format) to stream application 17004.

Router 17108 may be a processor (e.g., a special-purpose processor) configured to route the data stream between digital compression processor 17106 and transceivers 17110 and 17112. For example, in the uplink direction, router 17108 may receive the data stream (in a compression format) from digital compression processor 17106, and may route the data stream to one or both of transceivers 17110 and 17112 depending on a routing selection signal provide by controller 17102. In some aspects where router 17108 routes the data stream to transceivers 17110 and 17112, e.g., in the uplink direction, router 17108 may split the data stream (in the compression format) into first and second parts. Router 17108 may then route the first part to transceiver 17110 and the second part to transceiver 17112. In the downlink direction, router 17108 may be configured to receive first and second parts of the data stream, recombine the first and second parts, and provide the data stream to digital compression processor 17106. In some aspects, router 17108 may also perform baseband modem processing functions (e.g., protocol stack and physical layer functions), such as to apply baseband processing on the data stream (in the compression format) to prepare the data stream for transmission by transceivers 17110 and 17112, and to receive the data stream from transceivers 17110 and 17112 and revert counterpart baseband processing applied to the data stream by the radio access network. Router 17108 can therefore represent the baseband layers of terminal device 17100.

Transceivers 17110 and 17112 may be RF transceivers and/or mmWave transceivers with mmWave Front End modules configured in the manner of RF transceiver 204 of terminal device 102 in FIG. 2. Antennas 17114 and 17116 may be antennas configured in the manner of antenna system 202 of terminal device 102 in FIG. 2 (e.g., a single antenna or a beamforming array, such as for a mmWave system operating, for example, above 23 GHz). Transceiver 17110 may be configured to, in the uplink direction, convert digital data (received from router 17108, e.g., digital data in the data stream) into analog RF signals and to wirelessly transmit the analog RF signals via antenna 17114. Transceiver 17110 may be configured to, in the downlink direction, wirelessly receive analog RF signals via antenna 17114 and to convert the analog RF signals into digital data for router 17108. Similarly, transceiver 17112 may be configured to, in the uplink direction, convert digital data (received from router 17108, e.g., digital data in the data stream) into analog RF signals and to wirelessly transmit the analog RF signals via antenna 17116. Transceiver 17112 may be configured to, in the downlink direction, wirelessly receive analog RF signals via antenna 17116 and to convert the analog RF signals into digital data for router 17108. In some aspects, transceiver 17110 may be designed for radio transmission and reception on first spectrum (e.g., primary spectrum, such as a frequency band below 23 GHz or below 6 GHz), such as where transceiver 17110 includes a power amplifier tuned for amplification of signals in the first spectrum. In some aspects, transceiver 17112 may be designed for radio transmission and reception on second spectrum (e.g., secondary spectrum, such as in a frequency band above 23 GHz), such as where transceiver 17112 includes a power amplifier tuned for amplification of signals in the second spectrum.

Various aspects of dynamic compression selection will now be described for FIGS. 172-177. With initial reference to FIGS. 172-173, FIGS. 172-174 show a first example of dynamic compression selection using two network access nodes. As shown for scenario 17200 in FIG. 172, terminal device 17100 may initially be connected with network access node 17202 over a first radio access channel. Network access node 17202 may interface with server 17206) where server 17206 may be located with network access node 17202, in an edge network next to network access node 17202, in a core network behind network access node 17202, or in an external internet network connected to the core network. Network access node 17204 may also interface with server 17206, and may be located proximate to terminal device 17100, such as operating in a frequency band above 23 GHz with a frequency bandwidth above 100 MHz up to several GHz bandwidth.

FIG. 173 shows message sequence chart 17300 according to some aspects, which describes a procedure for dynamic compression selection in the uplink direction in the example of FIG. 172. Terminal device 17100 may generate and compress a data stream in a first compression format (C1) in stage 17302. For example, stream application 17104 may generate the data stream as an uplink stream of user data addressed to server 1720417206 (e.g., where there is a software-level signaling connection with endpoints at stream application 17104 and server 906). Digital compression processor 17106 may then apply a first compression format to the data stream, where controller 17102 may provide a compression selection signal to digital compression processor 17106 that specifies the first compression format.

Terminal device 17100 may then wirelessly transmit the data stream (in the first compression format) on primary spectrum (S1, e.g., first spectrum) to network access node 17202 in stage 17304*a*. For example, digital compression processor 17106 may then provide the data stream (in the first compression format) to router 17108. Controller 17102 may provide a routing selection signal to router 17108 that specifies wireless transmission of the data stream on the primary spectrum. Router 17108 may therefore route the data stream to transceiver 17110, which may transmit the data stream via antenna 17114 in the form of wireless signals on the primary spectrum. This may wirelessly transmit the data stream to network access node 17202 over the first radio access channel.

Network access node 17202 may then wirelessly receive the wireless signals that include the data stream, and may process the wireless signals to obtain the data stream (in the first compression format). Network access node 17202 may then send the data stream to server 17206 in stage 17304*b*.

Server 17206 may receive the data stream and decompress the data stream to revert the first compression format. Server 17206 may therefore recover the data stream in its initial form, thus completing transfer of the data stream over the software-level signaling connection between stream application 17104 and server 17206.

As previously introduced, the use of compression may condense the data stream, thus reducing its data rate and/or memory storage demands when it is wirelessly transmitted over the radio access channel between terminal device 17100 and network access node 17202. However, this use of compression may also increase power usage at terminal device 17100 as digital compression processor 17106 may draw battery power to perform the compression processing of stage 17302. This use of compression may additionally or alternatively add latency to transfer of the data stream, as there may be processing latency when digital compression processor 17106 applies the first compression format to the data stream in stage 17302 and when server 17206 reverts the first compression format in 17306. Accordingly, when compression is used it may take server 17206 a longer duration of time (e.g., measured from when the stream is generated by stream application 17104) to obtain the data stream in its initial form.

This added power usage and/or latency can become problematic over time. For example, power usage at terminal device 17100 may deplete its battery power. In another example, the data stream may be used for latency-sensitive uses, such as for autonomous driving, factory robot control, M2M, or other applications where information is dynamically exchanged between terminal device 17100 and 17206 multiple times and requires a fast response with low latency. Accordingly, if there is excessive latency (e.g., an unacceptable duration of time passes from the point when the data stream is generated to when server 17206 obtains the data stream in its initial form), the performance of the application may suffer.

Accordingly, terminal device 17100 may be configured to detect a triggering condition in stage 17308. In some aspects, the triggering condition can be related to a power status of terminal device 17100 or a latency parameter of the data stream. For example, as shown in FIG. 171, controller 17102 may receive control variables as input, which controller 17102 may monitor and detect the triggering condition based on. In one example, the control variables may include a power status of terminal device 17100. The power status can be, for example, a remaining battery power level of a battery power supply of terminal device 17100 or a power-saving mode indicator. In cases where the power status is a remaining battery power level, controller 17102 may be configured to monitor the remaining battery power level and to determine whether the remaining battery power level is below a battery power level threshold (e.g., by periodically comparing the remaining battery power level to the predefined battery power level threshold). If controller 17102 determines that the remaining battery power level is less than the battery power level threshold, controller 17102 may detect that the triggering condition has occurred in stage 17308. In some aspects, the battery power level threshold may be predefined and/or fixed. In other aspects, the battery power level threshold may be dynamic. For example, in some cases server 17206 may be configured to calculate the battery power level threshold and send the battery power level threshold to terminal device 17100. Server 17206 may calculate this battery power level threshold, for example, based on a power consumption scenario of terminal device 17100. In one example of this, terminal device 17100 may be performing a particular task, such as transmission and/or reception of the data stream or an unrelated task. Server 17206 may then, with knowledge of this task, estimate the power consumption at terminal device 17100 to complete the task (e.g., using a power consumption model for terminal device 17100, which can be common across terminal devices or can be specific to terminal device 17100, e.g., based on a user profile of terminal device 17100). Server 17206 may then determine the battery power level threshold based on the estimated power consumption, and send the battery power level threshold to terminal device 17100. In some cases, server 17206 may update the battery power level threshold over time (e.g., dynamically recalculate) and send updated battery power level threshold to terminal device 17100. Controller 17102 may then use this as the battery power level threshold to which to compare the remaining battery power level.

In cases where the power status is a power-saving mode indicator (e.g., when a user of terminal device 17100 manually triggers a power-saving mode), controller 17102 may determine whether the power-saving mode indicator specifies that a power-saving mode is enabled. If controller 17102 determines that the power-saving mode is enabled, controller 17102 may detect that the triggering condition has occurred.

In another example, the control variables can additionally or alternatively include a latency parameter of the data stream. The latency parameter can be a measured latency, such as where server 17206 measures the latency of the data stream and sends a measurement report including the measured latency back to terminal device 17100 (e.g., on the software-level signaling connection). Controller 17102 may therefore monitor the measured latency and determine whether the measured latency is above a predefined latency threshold (e.g., by periodically comparing the measured latency to the predefined latency threshold). If controller 17102 determines that the measured latency is greater than the predefined latency threshold, controller 17102 may detect that the triggering condition has occurred in stage 17308.

After detecting the triggering condition, controller 17102 may attempt to adjust transfer of the data stream to reduce power usage and/or reduce latency. In particular, controller 17102 may attempt to switch to a more power-efficient or lower-latency compression format, and to introduce additional bandwidth that can support any resulting increase in data rate demands. This introduction of this additional bandwidth may enable terminal device 17100 to use a compression format that has lower compression efficiency but also lower power usage and/or latency than the first compression format. Accordingly, even though a higher data may be needed to continue to transfer the data stream (e.g., if it is not compressed to the same degree as with the first compression rate), the added bandwidth may enable terminal device 17100 to continue to successfully transfer the data stream over the radio access channel.

In the example of FIGS. 172-174, terminal device 17100 may use a second network access node, e.g., network access node 17204, to transfer the data stream on the secondary spectrum. This is shown in scenario 17208 of FIG. 172, where terminal device 17100 may establish a second radio access channel with network access node 17204 on the secondary spectrum, and use this second radio access channel to send part of the data stream.

Terminal device 17100 may therefore identify a second compression format (C2) and may identify secondary spectrum (S2, e.g., second spectrum) for the second radio access channel in stage 17310. In some aspects, the primary spectrum may be licensed spectrum, while the secondary spectrum may be unlicensed or shared spectrum. For example, controller 17102 may identify the secondary spectrum from a pool of spectrum that is available to terminal device 17100 for use (e.g., that terminal device 17100 is permitted to use per various wireless standards, spectrum allocations by networks, and/or spectrum licensing) and that terminal device 17100 supports use of. For example, as previously introduced, transceiver 17112 may be configured to perform wireless transmission and reception in the secondary spectrum, and the secondary spectrum may therefore be in the pool of spectrum from which controller 17102 identifies the secondary spectrum from.

In some aspects, terminal device 17100 may first perform a cell search to detect network access node 17204. Terminal device 17100 may then connect to network access node 17204 and determine the secondary spectrum based on the spectrum available for a radio access channel with network access node 17204. For example, once connected to network access node 17204, network access node 17204 may send terminal device 17100 a resource allocation that assigns spectrum to terminal device 17100. Terminal device 17100 may then identify some or all of this assigned spectrum as the secondary spectrum.

In some aspects, the primary spectrum may be in a first frequency band while the secondary spectrum may be in a second frequency band. For example, the primary spectrum may be in an LTE or 5G NR licensed band, while controller 17102 may identify the secondary spectrum from the unlicensed Industry, Scientific, and Medical (ISM) band. In another example, the primary spectrum may be in a licensed mmWave band (e.g., 24-34 GHz) while controller 17102 may identify the secondary spectrum from an unlicensed mmWave band (e.g., 57-71 GHz). In some aspects, the first radio access channel (with network access node 17202) on the primary spectrum may use a different radio access technology than the second radio access channel (with network access node 17204) on the secondary spectrum.

With reference to selection of the second compression format in stage 17310, the second compression format may have a lower compression efficiency than the first compression format (e.g., may not condense the data stream and/or reduce the data rate demands of the data stream to the same degree as the first compression format). In some aspects, the second compression format may have a lower power usage (e.g., by digital compression processor 17106) than the first compression format and/or may have a lower latency (e.g., lower processing latency when applied to the data stream by digital compression processor 17106) than the first compression format. In some aspects, the second compression format may be an uncompressed compression format (e.g., where digital compression processor 17106 does not apply compression to the data stream), while in other aspects the second compression format may be a compressed compression format (e.g., where digital compression processor 17106 applies compression to the data stream).

In some aspects, controller 17102 may select the second compression format based on a prescribed response for detection of the triggering condition. For example, controller 17102 may be configured to select the same second compression format whenever the triggering condition is detected in stage 17308. In some aspects, controller 17102 may be configured to detect a plurality of triggering conditions that are each matched to a prescribed compression format. For example, controller 17102 may use a plurality of triggering conditions that are each defined by a different predefined threshold (e.g., a predefined remaining battery power level or measured latency threshold). When controller 17102 detects, for example, a first triggering condition of the plurality of triggering conditions in stage 17308, controller 17102 may identify the prescribed compression format for the first triggering condition as the second compression format. In this example, the triggering conditions and second compression rates may be ordered and paired according to their values. For example, the first triggering condition may use a first predefined remaining battery power level threshold while a second triggering dentition may use a second predefined remaining battery power level threshold that is lower than the first predefined remaining battery power level. The second triggering condition may therefore be paired with a prescribed compression format that has lower power usage than the prescribed compression format paired with the first triggering condition. Accordingly, when the remaining battery power is lower, controller 17102 may be configured to select a second compression format that has lower power usage. Triggering conditions for measured latency can be organized in a similar manner. For example, the first triggering condition may use a first predefined latency threshold while a second triggering dentition may use a second predefined latency threshold that is higher than the first predefined remaining battery power level. The second triggering condition may therefore be paired with a prescribed compression format that has lower latency than the prescribed compression format paired with the first triggering condition.

In some aspects, controller 17102 may be configured to first select the second compression format in stage 17310 and then identify the secondary spectrum based on the second compression format. For example, as previously indicated, the second compression format may have a lower compression efficiency than the first compression format. When terminal device 17100 is transmitting the data stream in the first compression format in stage 17304*a*, the data stream may have a first data rate demand. As the second compression format has lower compression efficiency, the data stream in the second compression format may have a second data rate demand that is higher than the first data rate demand (as there is more data to transfer). Controller 17102 may therefore be configured to determine the second data rate demand (e.g., based on the compression efficiency of the second compression format) and to select an amount of spectrum sufficient to meet the data rate demand as the secondary spectrum. As terminal device 17100 may continue to use the primary spectrum when transmitting the data stream in the second compression format, controller 17102 may therefore be configured to select secondary spectrum that, when combined with the primary spectrum, has sufficient bandwidth to meet the second data rate demand (e.g., to support transfer of the data stream in the second compression format). In some aspects, controller 17102 may determine, based on the second data rate demand, a total amount of spectrum for meeting the data rate demand, determine a difference between the total amount of spectrum and the size of the primary spectrum, and select an amount of spectrum greater than or equal to the difference as the secondary spectrum.

In some aspects, terminal device 17100 may exchange control signaling with server 17206 when selecting the second compression format. For example, in some aspects controller 17102 may select the second compression format and subsequently send control signaling to server 17206 (e.g., over the software-level signaling connection) that specifies the second compression format. Controller 17102 can send this control signaling before terminal device 17100 transmits the data stream in the second compression format or can send the control signaling with the data stream in the second compression format (e.g., as header or other control information accompanying the data stream in the second compression format). Server 17206 may therefore know what compression format to revert when receiving the data stream. In other aspects, controller 17102 and server 17206 may exchange control signaling to negotiate the second compression format. For example, controller 17102 may send control signaling that specifies a proposed compression format. Server 17206 may respond with control signaling that accepts the proposed compression format as the second compression format or with control signaling that denies the proposed compression format as the second compression format. Controller 17102 may then propose another compression format in subsequent control signaling, and according to one aspect may continue re-proposing compression formats until server 17206 accepts the proposed compression format.

After selecting the second compression format and secondary spectrum in stage 17310, terminal device 17100 may begin compressing the data stream with the second compression format and splitting the data stream (in the second compression format) into parts in stage 17312. For example, controller 17102 may provide a compression selection signal to digital compression processor 17106 that instructs digital compression processor 17106 to apply the second compression format to the data stream. Controller 17102 may also provide a routing selection signal that instructs router 17108 to split the data stream (in the second compression format) into a first part and a second part, and to send the first part to transceiver 17110 and the second part to transceiver 17112.

Digital compression processor 17106 may then apply the second compression format to the data stream (e.g., to the data in the data stream that stream application 17104 is currently generating). In cases where the second compression format is a compressed compression format, digital compression processor 17106 may perform compression on the data stream to produce the data stream in the second compression format (e.g., where the data stream is condensed in size compared to its initial format). In cases where the second compression format is an uncompressed compression format, digital compression processor 17106 may not perform compression on the data stream to produce the data stream in the second compression format, and may instead pass the data stream through in uncompressed form.

After applying the second compression format to the data stream (e.g., applying a compressed or uncompressed compression format), digital compression processor 17106 may provide the data stream (in the second compression format) to router 17108. Router 17108 may then split the data stream into a first part and a second part, and send the first part to transceiver 17110 and the second part to transceiver 17112. This may be a continuous procedure, where router 17108 continuously separates the data in the data stream into the first and second parts over time. In some aspects, the first and second parts may be equal in size (e.g., where router 17108 sends approximately the same amount of data from the data stream to transceiver 17110 as to transceiver 17112). In some aspects, router 17108 may be configured to split the data stream into the first and second parts according to a target separation ratio. For example, router 17108 may split the data stream into the first and second parts where the ratio between the first and second parts is equal to the target separation ratio. In another example, controller 17102 may select a target separation ratio, such as to optimize transmission of the data stream over the first and second radio access channels. For instance, controller 17102 may determine a target separation ratio that reduces (e.g., optimizes) the overall streaming time including the transmission time and compression/decompression latency time. Controller 17102 can determine this target separation ratio based on available data rate and latency of the first and second radio access channels (from terminal device 17100 to network access node 17202 and from terminal device 17100 to network access node 17204, respectively).

Terminal device 17100 may then wirelessly transmit the first part of the data stream (in the second compression format) on the primary spectrum to network access node 17202 via transceiver 17110 in stage 17314*a*. Terminal device 17100 may also wirelessly transmit the second part of the data stream (in the second compression format) on the secondary spectrum to network access node 17204 via transceiver 17112 in stage 17316*a*. Accordingly, as terminal device uses both the primary and secondary spectrum, terminal device 17100 may continue to be able to transmit the data stream even if the second compression format has lower compression efficiency than the first compression format. Furthermore, as the second compression format has a lower power usage and/or latency than the first compression format, terminal device 17100 may be able to reduce its power usage (e.g., for its digital processors) and/or reduce the latency of the data stream.

As shown in FIG. 173, network access node 17202 may wirelessly receive the first part of the data stream on the primary spectrum (on the first radio access channel), and may then send the first part of the data stream to server 17206 in stage 17314*b*. Network access node 17204 may similarly wirelessly receive the second part of the data stream on the secondary spectrum (on the second radio access channel) and send the second part of the data stream to server 17206.

Server 17206 may receive the first and second parts of the data stream from network access nodes 17202 and 17204. Server 17206 may then recombine the first and second parts to obtain the data stream in the second compression format in stage 17318. Server 17206 may then revert the second compression format to obtain the data stream in its initial format (e.g., as generated by stream application 17104). For example, if the second compression format is a compressed compression format, server 17206 may apply decompression processing on the data stream to revert the second compression format. If the second compression format is an uncompressed compression format, server 17206 may not apply decompression processing on the data stream as it is already in its initial format.

In some aspects, network access nodes 17202 and 17204 may send the data stream (in the second compression format) to server 17206 in stages 17314*b* and 17316*b* while the data stream is separated. In other aspects, one of network access nodes 17202 or 17204 (e.g., network access node 17202) may send the part of the data stream it received (e.g., the first part), the other network access node (e.g., network access node 17204). This network access node (e.g., network access node 17204) may then recombine the first and second parts to obtain the data stream in the second compression format, and may then send the data stream to server 17206. In such cases, server 17206 may then revert the second compression format in stage 17318 (e.g., may not perform recombination of the first and second parts).

This identification and addition of secondary spectrum may enable terminal device 17100 to reduce its power usage and/or reduce the latency of the data stream while still being able to transfer the data stream (e.g., to meet the data rate demands of the data stream and/or to optimize the overall stream time, which equals data transmission time plus compression/decompression processing latency). In some aspects, terminal device 17100 may perform the procedure of message sequence chart 17300 in a continuous fashion. For example, controller 17102 may be configured to periodically check the control variables to determine whether the triggering condition is still satisfied (e.g., whether the remaining battery power level is still below the predefined remaining battery power level threshold and/or the measured latency of the data stream is still above the predefined latency threshold). If controller 17102 determines that the triggering condition is no longer satisfied (or, e.g., that another triggering condition is satisfied), controller 17102 may switch back to the first compression format (or, e.g., switch to another compression format). Controller 17102 may release the second spectrum and the second radio access connection, and then begin sending the data stream in the first compression format to network access node 17202 on the primary spectrum.

As previously indicated, FIG. 174 shows message sequence chart 17400 detailing the example of FIG. 172 in the downlink direction. Accordingly, instead of applying the compression format and sending the data stream in the compression format to server 17206, terminal device 17100 may be configured to receive the data stream in the compression format from server 17206 and revert the compression format to obtain the data stream in its initial form. Accordingly, server 17206 may be configured to generate the data stream as a stream of user data addressed to stream application 17104. As shown in FIGS. 172 and 174, server 17206 may initially apply the first compression format to the data stream in stage 17402 and send the data stream (in the first compression format) to network access node 17202 in stage 17404*b*. Network access node 17202 may then wirelessly transmit the data stream over the first radio access channel (on the primary spectrum) to terminal device 17100 in stage 17404*a*.

Terminal device 17100 may receive the wireless signals that include the data stream at antenna 17114 and transceiver 17110, and may then revert the first compression format in stage 17406. For example, after processing the analog radio frequency signals provided by antenna 17114, transceiver 17110 may provide the data stream (in the first compression format) to router 17108. As terminal device 17108 is currently receiving the data stream over the first radio access channel (e.g., and not the second radio access channel), controller 17102 may provide a routing selection signal to router 17108 that specifies that the data stream is unified (e.g., that recombination of a first and second parts is unnecessary). Router 17108 may therefore provide the data stream (in the first compression format) to digital compression processor 17106, which may revert the first compression format (e.g., as instructed by the compression selection signal by controller 17102) to obtain the data stream in its initial format (e.g., as generated by server 17206). Digital compression processor 17106 may then provide the data stream to stream application 17104, thus completing transfer of the data stream over the software-level signaling connection.

Then, in stage 17408 terminal device 17100 may detect the triggering condition. For example, controller 17102 may detect the triggering condition in a same or similar manner as in stage 17308 of message sequence chart 17300. For example, controller 17102 may receive control variables as input, such as a remaining battery power level of terminal device 17100, a measured latency of the data stream, and/or a power-saving mode indicator. Controller 17102 may then evaluate the control variables to determine whether the triggering condition (or, e.g., which of a plurality of triggering conditions) is met. In some cases where the control variables include a measured latency of the data stream, stream application 17104 may be configured to measure the latency of the data stream as it receives it over the software-level connection, and to provide this measured latency to controller 17102 as one of the control variables.

After detecting the triggering condition, terminal device 17100 may identify the second compression format and the secondary spectrum in stage 17410. Similar to the case of FIG. 173, terminal device 17100 may use a second radio access channel with network access node 17204 that is on the secondary spectrum. Accordingly, terminal device 17100 may detect and connect to network access node 17204 to set up the second radio access channel. In various aspects, controller 17102 may identify the second compression format and the secondary spectrum using any functionality described for stage 17310 in message sequence chart 17300.

Terminal device 17100 may then send control signaling to server 17206 (e.g., over the software-level signaling connection) in stage 17412 that specifies the second compression format and network access node 17204. For example, controller 17102 may send this control signaling to server 17206. This may inform server 17206 of the second compression format (e.g., a compressed or uncompressed compression format) as well as the second network access node, e.g., network access node 17204, that terminal device 17100 is using for the second spectrum.

Server 17206 may then apply the second compression format to the data stream and subsequently split the data stream into first and second parts in stage 17414. Server 17206 may then send the first part to network access node 17202 in stage 17416*b*, and the second part to network access node 17204 in stage 17418*b*. Network access node 17202 may then wirelessly transmit the first part of the data stream to terminal device 17100 over the first radio access channel on the primary spectrum in stage 17416*a*. Network access node 17204 may likewise wirelessly transmit the second part of the second stream to terminal device 17100 over the second radio access channel on the secondary spectrum in stage 17418*a*.

Terminal device 17100 may receive the wireless signals from network access nodes 17202 and 17204 that include the first and second parts of the data stream (in the second impression format). Terminal device 17100 may then recombine the first and second parts to obtain the data stream in the second compression format and subsequently revert the second compression format in stage 17420 to obtain the data stream in its initial format. For example, transceiver 17110 may receive the first part of the data stream on the first radio access channel via antenna 17114, and may provide the first part of the data stream to router 17108. Transceiver 17112 may likewise receive the second part of the data stream on the second radio access channel via antenna 17116, and may provide the second part of the data stream to router 17108. Router 17108 may then recombine the first and second parts of the data stream to obtain the data stream in the second compression format (e.g., as instructed by the routing selection signal from controller 17102). Router 17108 may provide the data stream to digital compression processor 17106.

Digital compression processor 17106 may then revert the second compression format (e.g., as instructed by the compression selection signal from controller 17102). For example, if the second compression format is a compressed compression format, digital compression processor 17106 may perform decompression processing on the data stream to revert the second compression format. If the second compression format is an uncompressed compression format, digital compression processor 17106 may revert the second compression format by allowing the data stream to pass through without decompression processing.

Digital compression processor 17106 may therefore obtain the data stream in its initial format (e.g., as generated by server 17206). Digital compression processor 17104 may then provide the data stream to stream application 17104, thus completing transfer of the data stream over the software-level signaling connection.

Similar to that described above for message sequence chart 17300, in some aspects terminal device 17100 may perform the procedure of message sequence chart 17400 continuously over time. For example, depending on whether the control variables still meet the triggering condition, controller 17102 may switch back to the first compression format (and, for example, release the second spectrum and the second radio access connection) or may switch to another compression format (e.g., in the case of a plurality of triggering conditions).

This use of dynamic compression format selection in the downlink may yield similar advantages to the uplink case. For example, terminal device 17100 may be able to reduce its power usage by switching to a second compression format with lower power usage (e.g., when terminal device 17100 has a remaining battery power level below a threshold or is in a power-saving mode) and/or to reduce the latency of the data stream (e.g., where stream application 17104 is a latency-sensitive application) by switching to a second compression format with lower latency. As terminal device 17100 may introduce additional bandwidth via introduction of the second spectrum, terminal device 17100 may still be able to support transfer of the data stream even if the second compression format has lower compression efficiency (and thus a higher data rate demand).

These examples described above for FIGS. 172-174 relate to a case including where terminal device 17100 transfers the data stream on a second radio access channel with a second network access node. FIGS. 175-177 show an exemplary case according to some aspects where terminal device 17100 may transfer the data stream on secondary spectrum with the same network access node as the primary spectrum. As shown in scenario 17500 of FIG. 175, terminal device 17100 may initially transfer the data stream in a first compression format with network access node 17502 on the primary spectrum, and may subsequently in scenario 17506 switch to transferring the data stream in a second compression format with network access node 17502 on the primary and secondary spectrum.

FIG. 176 shows exemplary message sequence chart 17600 according to some aspects, which depicts the uplink case. Terminal device 17100, network access node 17502, and server 17504 may perform stages 17602-17608 in the same manner of stages 17302-17308 of message sequence chart 17300. Terminal device 17100 may therefore transmit the data stream in the first compression format to server 17504 via network access node 17502, and subsequently detect a triggering condition.

After detecting the triggering condition, terminal device 17100 may identify the second compression format and the secondary spectrum. However, instead of identifying secondary spectrum with another network access node, terminal device 17100 may identify secondary spectrum that terminal device 17100 can use to transmit the data stream to network access node 17502. For example, terminal device 17100 may establish a second radio access channel with network access node 17502 on the secondary spectrum. Accordingly, in this example network access node 17502 may support radio access channels on both the primary and the secondary spectrum (e.g., using separate antennas and/or transceivers). Terminal device 17100 may use any technique described above for stage 17310 in message sequence chart 17300 to identify the second compression format and the secondary spectrum.

Then, in stage 17612 terminal device 17100 may apply the secondary compression format (e.g., with digital compression processor 17106) to the data stream and split the data stream into first and second parts (e.g., with router 17108) in stage 17612.

Terminal device 17100 may then wirelessly transmit the first part of the data stream on the primary spectrum over the first radio access channel with network access node 17502 in stage 17614*a* (e.g., with transceiver 17110 and antenna 17114), and may wirelessly transmit the second part of the data stream on the secondary spectrum over the second radio access channel with network access node 17502 in stage 17616*a* (e.g., with transceiver 17112 and antenna 17116). In some aspects, stages 17614*a* and 17616*a* may occur at the same time, and in other aspects stages 17614*a* and 17616*a* may occur at different times.

Network access node 17502 may then receive the first and second parts of the data stream on the first and second radio access channels, and may send the first and second parts of the data stream to server 17504 in stages 17614*b* and 17616*b*. Server 17504 may then receive the first and second parts of the data stream (in the second compression format), recombine the first and second parts, and revert the second compression format in stage 17618 to obtain the data stream in its initial format. In some aspects, network access node 17502 may recombine the first and second parts of the data stream before sending the data stream to server 17504. In such cases, sever 17504 may not recombine the first and second parts of the data stream before reverting the second compression format. In some aspects, terminal device 17100 may continuously repeat this procedure, such as to switch back to the first compression format or to switch other compression formats.

Such cases where terminal device 17100 transmits the first and second parts of the data stream can offer the same or similar advantages to the case of FIGS. 172-174. Accordingly, terminal device 17100 may be able to reduce its power usage and/or reduce the latency of the data stream while still meeting the data rate demands of the data stream.

FIG. 177 shows exemplary message sequence chart 17700 illustrating the downlink case according to some aspects. Accordingly, similar to as in message sequence chart 17400 of FIG. 174, terminal device 17100 may initially receive the data stream in the first compression format from server 17504 via network access node 17502. Terminal device 17100, network access node 17502, and server 17504 may therefore perform stages 17702-17708 in the same manner of stages 17402-17408 of message sequence chart 17400. After detecting the triggering condition in stage 17708, Terminal device 17100 may identify secondary spectrum and establish a second radio access channel with network access node 17502. Terminal device 17100 may identify secondary spectrum and the second compression format in the same manner as any technique described above for stage 17410.

Terminal device 17100 may then send control signaling to server 17504 in stage 17712 that specifies that terminal device 17100 will receive the data stream (in the second compression format) in first and second parts from network access node 17502. Server 17504 may therefore apply the second compression format to the data stream and split the data stream into first and second parts in stage 17714. Server 17504 may then send the first and second parts to network access node 17502 in stages 17716*b* and 17718*b*.

Network access node 17502 may then wirelessly transmit the first part of the data stream to terminal device 17100 on the first radio access channel on the primary spectrum in stage 17716*a*. Network access node 17502 may also wireless transmit the second part of the data stream to terminal device 17100 on the second radio access channel on the secondary spectrum in stage 17718*a*. Terminal device 17100 may then receive the first and second parts of the data stream (e.g., via antennas 17114 and 17116 and transceivers 17110 and 17112), recombine the first and second parts (e.g., with router 17108), and revert the second compression format to obtain the data stream in its initial format in stage 17720. In some aspects, server 17504 may not split the data stream into two parts in stage 17714, and may send the data stream (in the second compression format) to network access node 17502. Network access node 17502 may then split the data stream into first and second parts and wirelessly transmit the first and second parts to terminal device 17100 in stages 17716*a* and 17718*a*. In some aspects, terminal device 17100 may perform the procedure of message sequence chart 17700 in a continuous manner, and may switch back to the first compression format or switch to another compression format depending on whether the triggering conditions is still met (or, which of a plurality of triggering conditions are met). Terminal device 17100 may therefore also be able to reduce its power usage and/or the latency of the data stream using dynamic compression selection in a downlink case of FIG. 175.

While described above with primary and secondary spectrum (e.g., first and second spectrum), aspects of this disclosure can also use more than two radio access channels on different spectrum (e.g., with one, two, or more than two network access nodes).

Additionally, in some aspects terminal device 17100 may be configured to use different compression formats for the first and second parts of the data stream. FIG. 178 shows an exemplary internal configuration of terminal device 17100 according to some aspects, which depicts one example of this use of different compression formats for the first and second parts of the data stream. As shown in FIG. 178, router 17108 may be positioned to separate the data stream into the first and second parts (or, e.g., to recombine in the downlink direction), and provide them respectively to digital compression processor 17106*a* and digital compression processor 17106*b*. Digital compression processor 17106*a* may then apply a second compression format to the first part and provide the first part (in the second compression format) to transceiver 17110 for wireless transmission on the primary spectrum. Digital compression processor 17106*a* may then apply a third compression format (e.g., different from the first and second compression formats) to the second part of the data stream and provide the second part (in the third compression format) to transceiver 17112 for wireless transmission on the secondary spectrum. In some aspects, controller 17102 may be configured to determine a target separation ratio that specifies the relative sizes of the first part and second part (e.g., the distribution of the data stream between the first radio access channel and the second radio access channel). In some cases, controller 17102 can determine the target separation ratio based on, for example, the data rate and/or latency of the first and second radio access channels, and can determine a target separation ratio that reduces (e.g., optimizes) the overall streaming time (equal to the transmission time plus the compression/decompression processing latency). Controller 17102 may provide this target separation ratio to router 17108, which may then split the data stream into the first and second parts according to the target separation ratio. In one example, the first radio access channel may be a sub-6 GHz band, and digital compression processor 17106*a* may apply a compressed compression format due to the lower data rates supported by the sub 6-GHz band, while the second radio access channel may be a high frequency band (e.g., above 23 GHz) and digital compression processor 17106*a* may use an uncompressed compression format.

The second and third compression formats may have different power usage, latency, and/or compression efficiency characteristics, but may have lower power usage and/or latency than the first compression format. Accordingly, terminal device 17100 may be able to use different compression formats for the primary and secondary spectrum and still reduce latency and/or power consumption compared to the first compression format.

The functionality of controller 17102 is described above as being implemented in a terminal device. This functionality, including evaluation of control variables, selection of secondary spectrum, and selection of a second compression format, can additionally or alternatively be complemented in another location. For example, in some aspects a network access node may be configured in the manner of network access node 110 shown in FIG. 3, and may include controller 17102 in its protocol controller 310. Controller 17102 may therefore evaluate the control variables, select the secondary spectrum, and select second compression formats, and may send control signaling to terminal devices and/or servers that specify the secondary spectrum and second compression formats. In other aspects, controller 17102 may be implemented in an edge network server, a core network server, or at an external Internet server (e.g., as part of server 17206 or 17504 or as a separate external Internet server). Controller 17102 may likewise evaluate the control variables, select the secondary spectrum, and select second compression formats, and may send control signaling to terminal devices and/or servers that specify the secondary spectrum and second compression formats.

FIG. 179 shows exemplary method 17900 of transferring a data stream at a communication device according to some aspects. As shown in FIG. 179, method 17900 includes transmitting or receiving a data stream in a first compression format with first spectrum (17902), detecting a triggering condition based on a power status of the communication device or a latency parameter of the data stream, and selecting a second compression format and second spectrum (17904), and transmitting or receiving the data stream in the second compression format with the first and second spectrum (17906).

FIG. 180 shows exemplary method 18000 of transferring a data stream at a communication device. As shown in FIG. 180, method 18000 includes transmitting or receiving a data stream in a first compression format with first spectrum (18002), detecting a triggering condition based on a power status of the communication device or a latency parameter of the data stream, and selecting an uncompressed compression format and second spectrum (18004), and transmitting or receiving the data stream in the uncompressed compression format with the first and second spectrum (18006).

FIG. 181 shows exemplary method 18100 of transferring a data stream at a communication device according to some aspects. As shown in FIG. 181, method 18100 includes transmitting or receiving a data stream in a first compression format with first spectrum (18102), detecting a triggering condition based on a power status of the communication device or a latency parameter of the data stream (18104), and transmitting or receiving a first part of the data stream with a second compression format on the first spectrum and transmitting or receiving a second part of the data stream with a third compression format on second spectrum (18106).

Dynamic Modulation Scheme Selection with Battery Power Status

Some radio access technologies may employ adaptive modulation scheme selection. In one example, LTE networks utilize variable modulation schemes to adapt the modulation scheme for uplink and downlink communications. Accordingly, a network access node may be able to adaptively assign a modulation scheme to a served terminal device, such as by selecting an appropriate modulation scheme based on the current radio access channel between the network access node and the served terminal device.

The use of different modulation schemes by a terminal device may impact performance. In particular, terminal devices may be able to achieve higher data rates with higher-order modulation schemes. For example, a terminal device using a Quadrature Amplitude Modulation (QAM) scheme, such as 16-QAM, may be able to encode more data into each modulation symbol (e.g., 4 bits per modulation symbol) than a terminal device using a Phase Shift Keying (PSK) modulation scheme, such as Binary PSK (BPSK e.g., 1 bit per modulation symbol). Terminal devices may therefore be able to achieve progressively higher data rates based on whether they use BPSK, Quadrature PSK (QPSK), 8-PSK, 32-QAM, 64-QAM, 128-QAM, 256-QAM, and any other higher-order scheme (listed here in increasing order of bits per symbol/data rate).

However, as recognized by this disclosure, some modulation schemes may be less power efficient than other modulation schemes. For example, hybrid amplitude-phase modulation schemes such as QAM schemes may be less power efficient than modulation schemes based purely on phase modulation (e.g., BPSK). By extension, higher-order modulation schemes (e.g., 64-QAM) may be less power efficient than lower-order modulation schemes (e.g., QPSK). Such differences in power efficiency can arise from the extra power that is expended by the power amplifier (PA) when transmitting modulation symbols from more complex symbol constellations. For instance, the amplitude differences in the various symbols of a QAM constellation can result in power efficiency of only about 15% at the power amplifier, while the same power amplifier may be able to operate at around 50% when using a purely phase-based modulation such as BPSK. Higher-order QAM schemes may use a higher power backoff from the point of maximum power added efficiency (PAE) of the power amplifier. Power amplifier can be very linear at low efficiency power amplifier is very linear, which can therefore allow for higher-order modulation schemes. By contrast, at high efficiency the power amplifiers can be very nonlinear in terms of amplitude to phase distortion (AM-PM) and gain expansion. This power amplifier nonlinearity can be measured and characteristic by the error vector magnitude (EVM) of the modulation constellation diagram, which characterizes the error between the ideal modulation symbol (on the modulation constellation diagram) and the actual transmitted symbol.

In some cases, low power efficiency can become particularly problematic for terminal devices, many of which operate on battery power that gradually depletes over time. A terminal device using a QAM scheme may expend battery power at a faster rate than when using a PSK scheme. This power expenditure can be aggravated at mmWave frequencies, where the PAE is particularly low due to the decreased gain of transistors and increased loss in passive devices (e.g., coils, transformers, transmission lines, capacitors) with increasing frequency.

Accordingly, various aspects of this disclosure introduce the battery power status of a terminal device as a control variable for the modulation scheme selection function. As further described herein, a network access node can therefore be configured to evaluate the battery power status of a terminal device and subsequently render modulation scheme decisions based on the battery power status. In some aspects, this modulation scheme selection function can be expanded to consider other control variables (e.g., in addition to battery power status) when selecting modulation schemes for terminal devices. For example, in some aspects a network access node may also select a modulation scheme for a terminal device based on a distance between the network access node and the terminal device. In particular, terminal devices that are located further from a network access node may use a higher transmit power than terminal devices that are proximate to the network access node. However, use of this higher transmit power may also lead to faster battery depletion at the terminal device. Accordingly, as described below for some aspects, the network access node may therefore be configured to select a modulation scheme for the terminal device based on its distance to the network access node, such as by selecting a more power efficient modulation scheme for a terminal device that has low remaining battery power and is far from the network access node.

Various aspects may introduce further control variables into the modulation scheme selection function, such as network access node power usage and terminal device temperature. In some aspects, the network access node may also consider the data rate demands of a data stream that the terminal device is transmitting, as the use of more power efficient modulations schemes may also reduce the maximum data rate. In some of these aspects, the network access node may also consider the availability of spectrum offload, such as whether the terminal device is able to initiate a second radio access channel on secondary spectrum that could also be used to transfer the data stream, where the secondary spectrum offering a larger bandwidth that allows for high data rate with a lower order modulation scheme. Such aspects are further described herein.

FIG. 182 shows an example of a network communication scenario according to some aspects. As shown in FIG. 182, terminal device 18202 may be transmitting data to network access node 18204 using a first radio access channel and a first modulation scheme. In some aspects, terminal device 18202 may be configured in the manner of terminal device 102 as shown in FIG. 2, and accordingly may include antenna system 202, RF transceiver 204, and baseband modem 206. When transmitting to network access node 18204, baseband modem 206 may generate modulation symbols (e.g., representing user or control data from higher layers) according to a modulation scheme, e.g., a first modulation scheme. Baseband modem 206 may provide these modulation symbols to RF transceiver 204, which may apply digital-to-analog conversion (DAC), RF mixing, and amplification to transmit the modulation symbols in the form of wireless signals via antenna system 202.

As previously indicated, the type of modulation scheme may impact the power usage of RF transceiver 204. For example, the power amplifier of RF transceiver 204 may expend more power (e.g., be less power efficient) when the modulation scheme is a hybrid amplitude-phase modulation scheme (e.g., any QAM scheme) than when the modulation scheme is a phase-shifting modulation scheme (e.g., any PSK scheme) or a frequency modulation (FM) scheme. Likewise, the power amplifier of RF transceiver 204 may be less power efficient when the modulation scheme is a higher-order modulation scheme. This can be problematic when terminal device 18202 is powered by a battery power supply, as the remaining battery power level may gradually deplete as terminal device 18202 operates. Battery drain may therefore be higher in scenarios when the power amplifier is operating in a low power efficiency state, such as when terminal device 18202 is using a QAM or higher-order modulation (e.g. 16-QAM, 64-QAM, 256-QAM) scheme, which can require a higher power backoff from the point of maximum PAE of the power amplifier in the transmitter.

Accordingly, in some aspects network access node 18204 may be configured to consider the battery power status of terminal device 18202 as a control variable in its modulation scheme selection function (e.g., when selecting a modulation scheme for terminal device 18202 to use in the uplink direction). FIG. 183 shows an exemplary internal configuration of network access node 18204, which will be used to describe the modulation scheme selection function according to some aspects. As shown in FIG. 183, network access node 18204 may include antenna system 18302, communication subsystem 18308 (including transmitter 18304 and receiver 18306), and scheduler 18310. In some aspects, antenna system 18302 may be configured in the manner of antenna system 302 previously described for network access node 110 of FIG. 3. Transmitter 18304 and receiver 18306 of communication subsystem 18308 may therefore be configured to transmit and receive wireless signals via antenna system 302. Transmitter 18304 may be a transmitter including various transmission components of network access node 18204. This can include, for example, an RF transceiver with a power amplifier, physical layer transmission circuitry and controllers, and/or baseband subsystem transmission components. Receiver 18306 may be a receiver including various reception components of network access node 18204. This can include, for example, an RF transceiver with a low-noise amplifier, physical layer reception circuitry and controllers, and/or baseband subsystem reception components. Communication subsystem 18308 can therefore include any one or more of RF components, physical layer components, or baseband subsystem components, and is not specifically limited to exclusively including any one of these types of components.

Scheduler 18310 may be a special-purpose processor configured to evaluate one or more control variables that network access node 18204 uses for the modulation scheme selection function. As described below for various aspects, these control variables can include a battery power status of a terminal device, a distance of the terminal device from network access node 18204, a temperature of the terminal device, a charging status of the terminal device, power amplifier characteristics of the terminal device, data rate demands of a data stream of the terminal device, spectrum offload information for the terminal device, and/or power usage of network access node 18204. Schedule 18310 may therefore be configured to evaluate one or more of these control variables and to select a modulation scheme for the terminal device based on the control variables.

FIG. 184 shows exemplary message sequence chart 18400 according to some aspects, which illustrates an exemplary procedure of the modulation scheme selection function. As shown in FIG. 184, terminal device 18202 may first determine its battery power status in stage 18402. In some aspects, the battery power status can be a remaining battery power level. For example, in some aspects where terminal device 18202 is configured in the manner of terminal device 102 described above for FIG. 2, application processor 212 may determine a remaining battery power level of the battery power supply of terminal device 18202. Application processor 212 may then specify the remaining battery power level to protocol controller 210 of terminal device 18202. Protocol controller 210 may then generate a battery power status report that includes the remaining battery power level.

In other aspects, the battery power status can be a power-saving mode indicator. For example, in some aspects a user may have the option to selectively enable a power-saving mode for terminal device 18202. This may be an application-layer function, and application processor 212 of terminal device 18202 may therefore detect when the user enables or disables the power-saving mode. When the user enables the power-saving mode, application processor 212 may provide a power-saving mode indicator to protocol controller 210 that specifies that the power-saving mode is enabled. Protocol controller 210 of terminal device 18202 may then generate a battery power status report that includes the power-saving mode indicator. In some aspects, there may be multiple power-saving modes (e.g., in addition to a standard power mode), where each of the power-saving modes targets a different level of power-savings. In such cases, the power-saving mode indicator may indicate which of the power-saving modes is enable (out of the multiple power-saving modes).

In some aspects, the battery power status can be an estimated battery power usage. For example, terminal device 18202 may be transmitting a particular data stream with a finite size or duration. Accordingly, protocol controller 210 of terminal device 18202 may estimate the battery power that will be expended in transmitting the data stream. In some cases, protocol controller 210 may be configured to estimate multiple battery power usages, such as by estimating a different battery power usage for transmitting the data stream with different modulation schemes. Protocol controller 210 may be configured to perform this estimation, for example, based on power amplifier characteristics of the power amplifier in RF transceiver 204. For example, the power amplifier characteristics may be a priori information that characterizes the efficiency of the power amplifier (e.g., PAE). The power amplifier characteristics may, in some aspects, specify different power efficiencies at different frequencies and/or at different modulation schemes, which protocol controller 210 may use to estimate the battery power usage. Protocol controller 210 may generate a battery power status report that includes this estimated battery power usage.

In some aspects, the battery power status can include multiple of a remaining battery power level, a power-saving mode indicator, or an estimated battery power usage. Accordingly, protocol controller 210 of terminal device 18202 may generate a battery power status report that includes multiple or all of the remaining battery power level, the power-saving mode indicator, and the estimated battery power usage.

After generating the battery power status report, terminal device 18202 may send the battery power status report to network access node 18204 in stage 18404. For example, protocol controller 210 may wirelessly transmit the battery power status report via digital signal processor 208, RF transceiver 204, and antenna system 202. Network access node 18204 may then receive the battery power status report via antenna system 18302 and receiver 18306. Receiver 18306 may then provide the battery power status report to scheduler 18310, which may read the battery power status report to determine the battery power status (e.g., a remaining battery power level and/or a power-saving mode indicator).

Network access node 18204 may then execute the modulation scheme selection function to select a modulation scheme for terminal device 18202 based on the battery power status in stage 18406. In one example, terminal device 18202 may initially be assigned a first modulation scheme. Scheduler 18310 may therefore select a second modulation scheme for terminal device 18202 based on the battery power status. For example, in some aspects where the battery power status is a remaining battery power level, scheduler 18310 may compare the remaining battery power level to a threshold (e.g., that is selected to indicate low remaining battery power at terminal device 18202, such as 10%, 20%, or another selected level). In some aspects, the threshold can be predefined, while in other aspects the threshold can be dynamically adjusted or selected (e.g., based on user settings, scheduled device operations, or another criteria related to remaining battery power level). If scheduler 18310 determines that the remaining battery power level is less than the threshold, scheduler 18310 may be configured to select a second modulation scheme for terminal device 18202 that is more power efficient than the first modulation scheme (e.g., that has lower modulation order than the first modulation scheme, or is a PSK modulation scheme compared to a first modulation scheme that is a QAM scheme). Accordingly, when the remaining battery power level of terminal device 18202 is low (e.g., less than the threshold), scheduler 18310 may be configured to select a power-efficient modulation scheme. In some aspects, scheduler 18310 may be configured to maintain the first modulation scheme for terminal device 18202 (e.g., not to select a second modulation scheme) if the remaining battery power level is greater than the threshold.

In some aspects, scheduler 18310 may be configured to use a predefined mapping to select the modulation scheme in stage 18406. For example, the predefined mapping may map different battery power statuses to respective modulation schemes. Accordingly, scheduler 18310 may apply the predefined mapping to identify a modulation scheme to which the battery power status of terminal device 18202 maps, and may then select this modulation scheme as the modulation scheme in stage 18406. In one example where the battery power status is a remaining battery power level, the predefined mapping may map different ranges of remaining battery power levels to respective modulation schemes. The predefined mapping may progressively map lower ranges of remaining battery power level to more power-efficient modulation schemes (e.g., to modulation schemes with lower modulation order). For example, the predefined mapping may map a lowest range of remaining battery power levels (e.g., 10% or less) to a BPSK scheme, a second-lowest range of remaining battery power levels to a QPSK scheme, a third-lowest range of remaining battery power levels to an 8-PSK scheme, a fourth-lowest range of remaining battery power levels to a 16-QAM scheme, a fifth-lowest range of remaining battery power levels to a 32-QAM scheme, and a sixth-lowest range of remaining battery power levels to a 64-QAM scheme. Scheduler 18310 may therefore identify the range of the predefined mapping in which the remaining battery level falls and identify the respective modulation scheme to which it is mapped. Scheduler 18310 may then select this modulation scheme as the modulation scheme for terminal device 18202. Accordingly, scheduler 18310 may select the modulation scheme based on whether the remaining battery power level satisfies a predefined condition, such as which modulation scheme the remaining battery power level maps to according to the predefined mapping (e.g., which range of the predefined mapping the remaining battery power level maps to). In some aspects, this predefined mapping can be implemented as a lookup table.

As the predefined mapping maps lower remaining battery power levels to more power efficient modulation schemes, scheduler 18310 may be configured to select a more power efficient modulation scheme when terminal device 18202 has low remaining battery power. Accordingly, this introduction of remaining battery power level of terminal device 18202 as a control variable to the modulation scheme selection function may help prolong the battery life of terminal device 18202.

As previously indicated, in some cases the battery power status (e.g., included in the battery power status report) may be a power-saving mode indicator. This power-saving mode indicator may indicate whether a power-saving mode is enabled at terminal device 18202 (or, in the case of multiple power-saving modes, which power-saving mode is enabled). In some aspects, scheduler 18310 may be configured to select a first modulation scheme when the power-saving mode indicator specifies that the power-saving mode is enabled and to select a second modulation scheme when the power-saving mode indicator specifies that the power-saving mode is not enabled (e.g., equivalent logic to a lookup table with two entries). The first modulation scheme may have a higher power efficiency than the second modulation scheme, which may therefore result in terminal device 18202 being assigned a more power efficient modulation scheme when the power-saving mode is enabled.

In one example, terminal device 18202 may initially be assigned a first modulation scheme. Scheduler 18310 may then be configured to select a second modulation scheme for terminal device 18202 based on the power-saving mode indicator in stage 18406. For example, scheduler 18310 may be configured to determine whether the power-saving mode indicator indicates that the power-saving mode at terminal device 18202 is enabled. If scheduler 18310 determines that the power-saving mode is enabled, scheduler 18310 may be configured to select a second modulation scheme for terminal device 18202 that is more power efficient than the first modulation scheme (e.g., that has lower modulation order than the first modulation scheme, or is a PSK modulation scheme compared to a first modulation scheme that is an QAM scheme). Accordingly, when the power-saving mode is enabled, scheduler 18310 may be configured to select a power-efficient modulation scheme. In some aspects, if scheduler 18310 determines that the power-saving mode indicator indicates that the power-saving mode is not enabled, scheduler 18310 may be configured to maintain the first modulation scheme for terminal device 18202 (e.g., not to select a second modulation scheme).

In some aspects, such as where the power-saving mode indicator indicates which of multiple power-saving modes is enabled at terminal device 18202, scheduler 18310 may be configured to use a predefined mapping that maps each power-saving mode to a prescribed modulation scheme. The predefined mapping may map power-saving modes that have higher targeted power-savings (e.g., to prolong battery live the longest/to slow battery depletion the most) to modulation schemes that have the highest power-efficiency. Scheduler 18310 may therefore select more power efficient modulation schemes when a user of terminal device 18202 has selected a power-saving mode with higher targeted power saving. In some aspects, this predefined mapping can be implemented as a lookup table.

In some aspects where the battery power status report includes an estimated battery power usage, scheduler 18310 may select a second modulation scheme for terminal device 18202 based on the estimated battery power usage. In one example, the battery power status report may include both a remaining battery power level and an estimated battery power usage (estimated by protocol controller 210 of terminal device 18202). The estimated battery power usage may indicate the estimated amount of battery power that terminal device 18202 will expend while transmitting the data stream with a first modulation scheme. Scheduler 18310 may then evaluate the remaining battery power level and the estimated battery power usage, and select a second modulation scheme for terminal device 18202 based on the remaining battery power level and the estimated battery power usage. In one example, scheduler 18310 may determine an estimated remaining battery power level as the difference between the remaining battery power level and the estimated battery power usage. If this estimated remaining battery power level is less than a threshold (e.g., 0%, meaning terminal device 18202 is estimated to use all of its battery power to transmit the data stream with the first modulation scheme, or another threshold, such as 10%, 20%, etc.), scheduler 18310 may select a second modulation scheme that is more power-efficient than the first modulation scheme (e.g., a lower-order modulation scheme than the second modulation scheme). In another example, scheduler 18310 may compare the estimated battery power usage to a threshold, and may select a second modulation scheme that is more power-efficient than the first modulation scheme if the estimated battery power usage is greater than a threshold. In another example, scheduler 18310 may use a predefined mapping that maps different estimated battery power usages to different modulation schemes to select the second modulation scheme, where the predefined mapping may map higher estimated battery power usages to lower-order modulation schemes. In another example where the battery power status report includes multiple estimated battery power usages that are each estimated for a different modulation scheme (as estimated by protocol controller 210 of terminal device 18202), scheduler 18310 may select the second modulation scheme based on the multiple estimated battery power usages. For instance, scheduler 18310 may identify the highest estimated battery power usage that is less than a predefined threshold, and select the corresponding modulation scheme (used by protocol controller 210 to determine the estimated battery power usage) as the second modulation scheme. In some aspects, scheduler 18310 may determine the estimated battery power usage locally (e.g., based on power amplifier characteristics provided by protocol controller 210 of terminal device 18202 in the battery power status report), and may then apply any of these techniques locally with the estimated battery power usage to select the second modulation scheme.

In some aspects, scheduler 18310 may select a modulation scheme for terminal device 18202 based on a user profile of terminal device 18202. For example, scheduler 18310 may have a user profile for terminal device 18202 that is individually specific to terminal device 18202, such as based on past user behavior of terminal device 18202. In one example, these user profiles can be based on cognitive neural networks, which scheduler 18310 or another network component (e.g., in the cloud or part of the core network) may use to develop the user profiles for multiple terminal devices based on observed behavior for each terminal device. The user profiles may be based on power usage, and may therefore indicate future power usage of terminal device 18202 based on its past behavior. In some aspects, scheduler 18310 may use the user profile to select a second modulation scheme for terminal device 18202, such as by identifying terminal device 18202 (e.g., based on device identity) and retrieving the user profile for terminal device 18202. In one example, the user profile may indicate that terminal device 18202 has a high estimated battery power usage (e.g., in an upcoming period of time, such as over the next hour, several hours, or day). Scheduler 18310 may then select a second modulation scheme that is more power efficient than the first modulation scheme.

In some aspects, scheduler 18310 may also consider a link quality of the radio access channel between terminal device 18202 and network access node 18204. For example, protocol controller 210 of terminal device 18202 may generate and transmit a measurement report to network access node 18204. Scheduler 18310 may then select the modulation scheme based on the battery power status and the link quality in stage 18406. This can help to avoid scenarios where terminal device 18202 uses a modulation scheme that has high order in low link quality scenarios (e.g., as higher-order modulation schemes may perform sub-optimally when there is low SNR). In some aspects, scheduler 18310 may be configured to use a predefined mapping, such as a two-dimensional lookup table, that maps remaining battery power level and link quality to prescribed modulation schemes (e.g., that maps pairs of remaining battery power levels and link qualities to prescribed modulation schemes). Accordingly, given the remaining battery power level and the link quality, scheduler 18310 may use the predefined mapping to identify the prescribed modulation scheme that is mapped to the remaining battery power level and the link quality. This predefined mapping may map progressively higher link qualities to higher-order modulation schemes (e.g., less power-efficient modulation schemes) and progressively lower remaining battery power levels to more power efficient modulation schemes (e.g., higher-order modulation schemes).

In some aspects, scheduler 18310 may be configured to likewise use a predefined mapping, such as a two-dimensional lookup table, that maps a power-saving mode and a link quality to a prescribed modulation scheme. For example, the predefined mapping may map power-saving modes with progressively higher targeted power saving to progressively more power-efficient modulation schemes, and map progressively higher link qualities to progressively less power-efficient modulation schemes.

Various examples above describe implementation of the selection logic of the modulation scheme selection function with predefined mappings such as lookup tables. This is only one example of selection logic that can be used by scheduler 18310 to select the modulation scheme in stage 18406 based on the battery power status. For example, in some aspects scheduler 18310 may use a modulation scheme selection equation (e.g., a predefined equation) that has input variables for battery power status (e.g., a variable in the modulation scheme selection equation for remaining battery power level and/or a variable in the modulation scheme selection equation for a power-saving mode indicator) and/or for link quality (e.g., a variable in the modulation scheme equation for a link quality metric, such as SNR). The output variable of the modulation scheme selection equation may be a modulation scheme. In some aspects, the modulation scheme selection equation may include predefined weights assigned to the input variables, where an input variable with a larger weight may cause the value of the input variable to have a greater impact on the output variable (e.g., have greater impact in selecting a particular modulation scheme). For example, in some cases remaining battery power level may be a key control variable, and the modulation scheme selection equation may therefore define a higher weight for the remaining battery power level (and/or for any other key control variable). Scheduler 18310 may therefore in stage 18406 evaluate the modulation scheme selection equation by using the actual values for these input variables and obtaining a modulation scheme as the output variable. Scheduler 18310 may then select this modulation scheme in stage 18406.

Scheduler 18310 may be configured to select the modulation scheme based on the battery power status in stage 18406 according to any of these variations. In some aspects, terminal device 18202 may have initially been assigned a first modulation scheme, and scheduler 18310 may select a second modulation scheme in stage 18406 (e.g., that is more power-efficient than the first modulation scheme). After selecting the modulation scheme for terminal device 18202, scheduler 18310 may generate a modulation scheme assignment message that specifies the modulation scheme in stage 18408. Scheduler 18310 may then transmit the modulation scheme assignment message to terminal device 18202 in stage 18410 (e.g., via transmitter 18306 and antenna system 18302).

Terminal device 18202 may then receive the modulation scheme assignment message and begin transmitting according to the modulation scheme specified in the modulation scheme assignment message in stage 18412. For example, protocol controller 210 of terminal device 18202 may read the modulation scheme assignment message and identify the modulation scheme. Protocol controller 210 may then instruct digital signal processor 208 of terminal device 18202 to use the modulation scheme for transmission. Digital signal processor 208 may then apply the modulation scheme when mapping data blocks to modulation symbols for uplink transmission to network access node 18204. Network access node 18204 may then receive data with receiver 18306 that is modulated according to the modulation scheme.

Accordingly, in scenarios where terminal device 18202 has low remaining battery power level or is in a power-saving mode, scheduler 18310 may be configured to assign a more power efficient modulation scheme to terminal device 18202 (e.g., according to the mappings in the lookup table). The power amplifier of RF transceiver 204 in terminal device 18202 may therefore amplify signals generated with a more power efficient modulation scheme, which will in turn improve the power efficiency of the power amplifier.

This can therefore help to reduce power consumption at terminal device 18202 and to likewise improve its battery life.

In some aspects, the modulation scheme selection function may introduce further control variables (e.g., in addition to battery power status and/or link quality). FIG. 185 shows exemplary message sequence chart 18500 according to some aspects, which describes an exemplary usage of other control variables in the modulation scheme selection function. As shown in FIG. 185, terminal device 18202 may determine its battery power status and send a battery power status report in stages 18502 and 18504 (e.g., in the same manner described above for stages 18402 and 18404 in FIG. 184).

Terminal device 18202 may also send an additional control variable report (or multiple additional control variables reports) to network access node in stage 18506, which may include other control variables. In one example, the additional control variable report can include a current position of terminal device 18202. For example, protocol controller 210 of terminal device 102 may obtain a current position of terminal device 18202 (e.g., via a satellite-based positioning function, as a positioning function based on GNSS) and may include the current position in the additional control variable report when sending it to network access node 18204. In another example, the additional control variable report can include a signal strength measurement by terminal device 18202. For example, digital signal processor 208 of terminal device 18202 may perform a signal strength measurement on a signal received from network access node 18204, and may provide the signal strength measurement to protocol controller 210. Protocol controller 210 may then include the signal strength measurement as a control variable in the additional control variable report in stage 18506.

In another example, the additional control variable report can additionally or alternatively include a temperature measurement of terminal device 18202. For example, protocol controller 210 of terminal device 102 may obtain a temperature measurement of terminal device 18202 (e.g., with a thermometer or other temperature sensor of terminal device 18202), and may include the temperature measurement in the additional control variable report when sending it to network access node 18204. In various aspects, the temperature measurement can, for example, be a current temperature, a current temperature of a specific component of terminal device 18202 (e.g., its power amplifier), or a slope/rate-of-change over recent temperature measurements. In some aspects, protocol controller 210 may also include a temperature threshold as one of the control variables, such as a temperature threshold that indicates a maximum permissible temperature level for terminal device 18202.

The charging status can indicate whether terminal device 18202 is currently charging its battery power supply. In one example, application processor 212 may have application-layer information that indicates whether the battery power supply is charging or not, and may report the corresponding charging status to protocol controller 210. Protocol controller 210 may then include the charging status in the additional control variable report.

In another example, the additional control variable report can include power amplifier characteristics of terminal device 18202. These power amplifier characteristics may indicate PAE metrics of the power amplifier of terminal device 18202, such as different PAE metrics for different modulation schemes and/or different frequency bands. This information may be known a priori at protocol controller 210, and protocol controller 210 may therefore include these power amplifier characteristics in the additional control variable report.

In another example, the additional control variable report can include data stream parameters that describe a data stream that terminal device 18202 is transmitting. For example, application processor 212 of terminal device 18202 may be transmitting a data stream of user data (e.g., to an external internet server that acts as an application endpoint for the data stream), where the data stream may have certain Quality of Service (QoS) parameters. In one example, the data stream may have a data rate demand (e.g., a minimum data rate), which application processor 212 may specify to protocol controller 210. Protocol controller 210 may then include the data rate demand in the additional control variable report.

In another example, the additional control variable report can include spectrum offload information that indicates whether terminal device 18202 supports spectrum offload. For example, in some aspects terminal device 18202 may be configured to support multiple radio access channels on multiple bands. This can include where RF transceiver 204 of terminal device 18202 includes a first transceiver configured for operation on first spectrum (e.g., primary spectrum) and a second transceiver configured for operation on second spectrum (e.g., secondary spectrum). As terminal device 18202 is therefore able to support multiple radio access channels on multiple bands (e.g., at least the first and second spectrum), protocol controller 210 may include spectrum offload information in the additional control variable report that indicates that terminal device 18202 to supports spectrum offload.

In some aspects, terminal device 18202 may send the battery power status report and the additional control variable report to network access node 18204 in the same message. In other aspects, terminal device 18202 may send the battery power status report and the additional control variable report to network access node 18204 in different messages. In some aspects where terminal device 18204 sends multiple types of additional control variables (e.g., multiple of a current position, temperature, power amplifier characteristics, charging status, data stream parameters, and/or spectrum offload information), terminal device 18204 may be configured to send multiple additional control variable reports in stage 18506.

Network access node 18204 may then collect control variables in stage 18508. For example, scheduler 18310 may receive the battery power status report and additional control variable report from terminal device 18202, and may read the battery power status report and additional control variable report to identify the control variables (e.g., any of remaining battery power level, power-saving mode indicator, power amplifier characteristics, temperature, charging status, current position, and/or signal strength).

In some aspects, scheduler 18310 may read the current position of terminal device 18202 from the additional control variable report, and may then determine the distance between terminal device 18202 and network access node 18204 based on the current position (e.g., by determining the difference between the current position of terminal device 18202 and the position of network access node 18204). Scheduler 18310 may then use this distance as a control variable. In some aspects, scheduler 18310 may read the signal strength measurement of terminal device 18202, and may estimate the distance between terminal device 18202 and network access node 18204 based on the signal strength measurement. Scheduler 18310 may also use this distance as a control variable. In other cases, scheduler 18310 may be configured to estimate the position of terminal device 18202 locally, such as by using triangulation in coordination with other network access nodes (e.g., in small cell using mm-Wave and beamforming), and may use this position for terminal device 18202.

In some cases, network access node 18204 may collect other control variables. In one example, the control variables can also include a power usage level of network access node 18204. For example, scheduler 18310 may be configured to determine a power usage level of network access node 18204 (e.g., a metric that quantities the power usage of network access node 18204 over an interval of time), and to use this power usage level as a control variable in stage 18508.

Scheduler 18310 may then select a modulation scheme for terminal device 18202 based on the control variables in stage 18510. As indicated above, the control variables can include any of a battery power status (e.g., remaining battery power level and/or power-saving mode indicator), a link quality metric, a current position, a signal strength measurement, a distance, a temperature measurement, power amplifier characteristics, charging status, data stream parameters, and/or spectrum offload information. Scheduler 18310 may therefore apply selection logic for the modulation scheme selection function to select a modulation scheme based on the control variables.

In various aspects, scheduler 18310 may be configured to select the modulation scheme from a predefined set of modulation schemes. As previously described, the modulation schemes may vary in terms of power efficiency, where higher-order and QAM schemes may be less power efficient (but have support data rates) than lower-order and PSK schemes. As the control variables may relate to various power-efficiency concerns of terminal device 18202, scheduler 18310 may be configured to select the modulation scheme based on the power-efficiency characteristics indicated by the control variables.

In some aspects, scheduler 18310 may be configured to use a predefined mapping between the control variables and a set of modulation schemes to select the modulation scheme in stage 18510. For example, the set of modulation schemes may include the modulation schemes available for use, such as a set including BPSK, QPSK, 8-PSK, 16-QAM, 32-QAM, and 64-QAM (and, optionally, higher orders of QAM). Accordingly, scheduler 18310 may use a predefined mapping that maps different values of the control variables to specified modulation schemes. In some aspects, this predefined mapping can be embodied as a multi-dimensional lookup table, such as where each dimension corresponds to a different control variable and input of the control variables for each dimension maps to a particular modulation scheme (e.g., an entry of the lookup table that is mapped to the particular values of the control variables, where the particular values represent a predefined condition). Accordingly, scheduler 18310 may start with the control variables (e.g., any of remaining battery power level, power-saving mode indicator, estimated battery power usage, a link quality metric, a current position, a signal strength measurement, a distance, power amplifier characteristics, a temperature measurement, charging status, data stream parameters, and/or spectrum offload information), and may use the values of the control variables to identify a corresponding entry of the lookup table that is mapped to the values of the control variables and contains one of the set of modulation schemes. Scheduler 18310 may then select this modulation scheme in stage 18510.

In some aspects, the predefined mapping may be configured to select more power-efficient modulation schemes when the control variables have certain values (e.g., meet a predefined condition). For example, scheduler 18310 may be configured to select a more power-efficient modulation scheme when a remaining battery power level is a first value than when the remaining battery power level is a second value greater than the first value (e.g., the predefined mapping may map lower remaining battery power levels to more power-efficient modulation schemes). In another example, scheduler 18310 may be configured to select a more power-efficient modulation scheme when a power-saving mode indicator specifies that a power-saving mode is enabled than when the power-saving mode indicator specifies that the power-saving mode is not enabled (e.g., the predefined mapping may map power-saving modes with higher targeted power savings to more power-efficient modulation schemes). In another example, scheduler 18310 may be configured to select a more power-efficient modulation scheme when an estimated battery power usage is a first value than when the estimated battery power usage is a second value less than the first value (e.g., the predefined mapping may map higher estimated battery power usages to more power-efficient modulation schemes). In another example, scheduler 18310 may be configured to select a more power-efficient modulation scheme (e.g., a lower-order modulation scheme) when a link quality metric (e.g., an SNR) is a first value than when the link quality metric is a second value that is greater than the first value (e.g., the predefined mapping may map lower link quality metrics to more power-efficient modulation schemes).

In another example, scheduler 18310 may be configured to select a more power-efficient modulation scheme when a distance (between terminal device 18202 and network access node 18204) is a first distance than when the distance is a second distance that is less than the first distance (e.g., the predefined mapping may map higher distances to more power-efficient modulation schemes). For example, when terminal device 18202 is located further from network access node 18204, terminal device 18202 may be able to reach network access node 17384 when terminal device 18202 uses a higher transmit power. However, using a higher transmit power may lead to more battery usage, and may therefore deplete the battery of terminal device 18202. When high transmit power is used concurrently with a less power-efficient modulation scheme, terminal device 18202 may experience considerable battery depletion. Accordingly, by selecting a more power-efficient modulation scheme for terminal device 18202 when it is located further from network access node 18204, scheduler 18310 may help terminal device 18202 to reduce power usage and extend battery life. In some aspects, scheduler 18310 may use a link quality metric, such as SNR, in the same manner. For example, conditions with low SNRs (for the radio access channel between terminal device 18202 and network access node 18204) may warrant higher uplink transmit powers by terminal device 18202 (e.g., similar to increasing distance). Accordingly, scheduler 18310 may be configured to select a more power-efficient modulation scheme when a link quality metric (between terminal device 18202 and network access node 18204) is a first value than when the distance is a second value that is greater than the first distance (e.g., the predefined mapping may map lower SNRs to more power-efficient modulation schemes).

In another example, scheduler 18310 may be configured to select a more power-efficient modulation scheme when a temperature measurement (of terminal device 18202) is a first value than when the temperature measurement is a second value less than the first value (e.g., the predefined mapping may map higher temperature measurement to more power-efficient modulation schemes). For example, use of less power-efficient modulation schemes by terminal device 18202 can increase its temperature, which can damage terminal device 18202 if high enough. Accordingly, scheduler 18310 may be configured to select more power-efficient modulation schemes for terminal device 18202 when its temperature is high. This can in turn help terminal device 18202 to manage its temperature and avoid damaging high temperatures.

In another example, scheduler 18310 may be configured to select a more power-efficient modulation scheme when a charging status of terminal device 18202 indicates that the battery power supply is not charging than when the charging status of terminal device 18202 indicates that the battery power supply is charging (e.g., the predefined mapping may map enabled charging statuses to less power-efficient modulation schemes). In one exemplary scenario, terminal device 18202 may be at low power (e.g., 10% remaining battery power level), for which scheduler 18310 would normally trigger a switch to a lower-order modulation scheme (e.g., from 16-QAM to QPSK). However, if terminal device 18202 is currently charging its battery power supply, there may not be a need to switch to a lower-order/more power-efficient modulation scheme. Accordingly, scheduler 18310 may determine not to switch to the lower-order modulation scheme as the charging status indicates that terminal device 18202 is charging. As remaining at the higher-order modulation scheme may slow the charging rate, this can be viewed as a tradeoff between higher throughput versus faster battery power charging rate.

In another example, scheduler 18310 may be configured to select modulation schemes based on the power amplifier characteristics in the battery power status report. For example, the power amplifier characteristics may indicate that the PAE of the power amplifier terminal device 18202 when operating with different modulation schemes (e.g., where lower-order modulation schemes may yield higher PAEs than higher-order modulation schemes). The power amplifier characteristics may also indicate the PAE of the power amplifier of terminal device 18202 at different frequencies (e.g., where operation at higher frequencies may yield lower PAE). Scheduler 18310 may therefore use these power amplifier characteristics to select the modulation scheme for terminal device 18202.

In another example, scheduler 18310 may be configured to select a more power-efficient modulation scheme when a data rate demand (of a data stream that terminal device 18202 is transmitting) is a first value than when the data rate demand is a second value greater than the first value (e.g., the predefined mapping may map higher data rate demands to less power-efficient modulation schemes). As less power-efficient modulation schemes are higher-order modulation schemes, less power-efficient modulation schemes may be able to support higher data rates than more power-efficient modulation schemes. If the data stream is rate-sensitive (e.g., has a higher data rate demand), scheduler 18310 may be configured to select a less power-efficient modulation scheme that can provide sufficient modulation order to support transfer of the data stream.

In some aspects, scheduler 18310 (and the predefined mapping) may select the modulation scheme in stage 18510 based on multiple control variables (e.g., using a multi-dimensional lookup table or a similar predefined mapping that maps values for multiple control variables to a single modulation scheme). These examples therefore reflect the general correspondence between high and low values of each control variable and whether the resulting selected modulation scheme is more or less power-efficient.

After selecting the modulation scheme in stage 18510, scheduler 18310 may generate a modulation scheme assignment message in stage 18512 that specifies the modulation scheme selected in stage 18510. Scheduler 18310 may then transmit the modulation scheme to terminal device 18202 in stage 18514 using transmitter 18304. Terminal device 18202 may then receive and read the modulation scheme assignment message to identify the modulation scheme. Terminal device 18310 may then transmit to network access node 18204 using the modulation scheme in stage 18516.

As previously indicated, the control variables can include data rate parameters and spectrum offload information of terminal device 18202. Scheduler 18310 can therefore in some aspects assign a modulation scheme to terminal device 18202 accompanied by an instruction to use spectrum offload. For example, when scheduler 18310 assigns a more power-efficient modulation scheme to terminal device 18202, this can reduce the data rate of the radio access channel between terminal device 18202 and network access node 18204 (e.g., as the more power-efficient modulation scheme may have lower-order, and thus not be able to encode as much data into each modulation symbol). In some cases, the data stream that terminal device 18202 is transmitting may have data rate demands that are higher than the supported data rate of the radio access channel when using the selected modulation scheme.

Accordingly, in such cases scheduler 18310 can be configured to assign a more-power efficient modulation scheme to terminal device 18202 along with an instruction to establish a second radio access channel on second spectrum with spectrum offload. For example, terminal device 18202 may initially be transmitting the data stream to network access node 18204 on a first radio access channel on first spectrum. Per the assignment by scheduler 18310 to use spectrum offload, terminal device 18202 may establish a second radio access channel on second spectrum with network access node 18202. Terminal device 18202 may then split the data stream into a first part and a second part, and to transmit the first part on the first spectrum and to transmit the second part on the second spectrum. The added bandwidth introduced by the second radio access channel may therefore enable terminal device 18202 to transmit the data stream with a sufficient data rate to continue to meet its data rate demands. In some aspects, the second spectrum may be shared or unlicensed spectrum (e.g., on the unlicensed 60 GHz mmWave band or on an ISM band) while the first spectrum may be on licensed spectrum (e.g., on a licensed LTE or 5G NR or mmWave band, e.g., the 28 GHz band=24-33 GHz, or the 39 GHz band=37-43.3 GHZ and even up to 45 GHz).

FIG. 186 shows an exemplary procedure according to some aspects that scheduler 18310 can use as part of stage 18510 when considering the availability of spectrum offloading at terminal device 18202. As previously indicated, scheduler 18310 may collect the control variables in stage 18508, where the control variables may include data rate parameters and spectrum offload information for terminal device 18202. Accordingly, in stage 18510*a* scheduler 18310 may determine whether spectrum offload is supported by terminal device 18202. For example, the spectrum offload information may specify whether terminal device 18202 supports spectrum offloading (e.g., whether terminal device 18202 can support multiple radio access channels on different spectrum). In some cases, the spectrum offload information may specify which spectrum terminal device 18202 can perform spectrum offload on (e.g., which bands terminal device 18202 can use for spectrum offload) and/or the amount of spectrum that terminal device 18202 can perform spectrum offload with on a potential second radio access channel.

If scheduler 18310 determines that spectrum offload is supported by terminal device 18310, scheduler 18310 may proceed to stage 18510*b*. As spectrum offload is available, scheduler 18310 may be select a first modulation scheme for terminal device 18202 and generate an instruction for terminal device 18202 to use the first modulation scheme with spectrum offload.

In some aspects, scheduler 18310 may select the first modulation scheme and generate the instruction for spectrum offload based on a data rate parameter included in the control variables. For example, the data rate parameter may indicate a data rate demand of the data stream being transmitted by terminal device 18202 on the first radio access channel to network access node 18204.

In some aspects, scheduler 18310 may first determine an overall bandwidth available to terminal device 18202 when using spectrum offload. This can be based on the relations between frequency, bandwidth, and modulation scheme (e.g., where frequency is inversely proportional to PAE, bandwidth and modulation scheme are directly proportional to data rate, and modulation scheme order is inversely proportional to PAE). As previously indicated, the spectrum offload information may indicate an amount of spectrum that terminal device 18202 can perform spectrum offload with on a potential second radio access channel, and scheduler 18310 can therefore determine the overall bandwidth of the first radio access channel and the potential second radio access channel. Based on the overall bandwidth, scheduler 18310 may select a modulation scheme (as the first modulation scheme) that would achieve at least the data rate demand of the data stream when used for the first and second radio access channels. In some aspects, scheduler 18310 may be configured to select the most power-efficient modulation scheme (as the first modulation scheme) that would also achieve at least the data rate demand of the data stream when used for the first and second radio access channels. Accordingly, scheduler 18310 may be able to select a power-efficient modulation scheme for terminal device 18202 that would still enable terminal device 18202 to transmit the data stream when used with spectrum offload. Even though the power-efficient modulation scheme may have a lower data rate, the introduction of the second radio access channel may provide added bandwidth that can compensate for the lower data rate.

After selecting the first modulation scheme, scheduler 18310 may also generate an instruction for spectrum offload that instructs terminal device 18202 to use the second spectrum to establish the second radio access channel. Scheduler 18310 may then proceed to stage 18512, where scheduler 18310 may generate a modulation scheme assignment message that identifies the first modulation scheme. Scheduler 18310 may include the instruction for spectrum offload in the modulation scheme assignment message. Scheduler 18310 may then transmit the modulation scheme assignment message with transmitter 18304 to terminal device 18202 in stage 18514. Terminal device 18202 may then read the modulation scheme assignment message and identify the first modulation scheme and the instruction to perform spectrum offload. Terminal device 18202 may then begin transmitting using the first modulation scheme with spectrum offload in stage 18516. For example, terminal device 18202 may be configured to split the data stream into first and second parts, modulate the first part with the first modulation scheme and transmit the modulated first part on the first radio access channel on the first spectrum, and modulate the second part with the second modulation scheme and transmit the modulated second part on the second radio access channel on the second spectrum. Terminal device 18202 may, for example, use any feature of spectrum offload described above for FIGS. 170-180. Accordingly, even if the first modulation scheme is lower-order (e.g., lower data rate) than a modulation scheme which terminal device 18202 was previously using, terminal device 18202 may still transmit the data stream while meeting its data rate demands by using spectrum offload. As the first modulation scheme may be more power-efficient than the previous modulation scheme, terminal device 18202 may be able to reduce power usage at its power amplifier and thus conserve battery power.

With reference to FIG. 186, if scheduler 18310 determines that terminal device 18310 does not support spectrum offload in stage 18510*a*, scheduler 18310 may proceed to stage 18510*c*. As terminal device 18202 may in some cases not have the option of adding bandwidth by establishing a second radio access channel with second spectrum, scheduler 18310 may in some cases not be able to assign the first modulation scheme to terminal device 18202 (e.g., as the first modulation scheme has lower-order). In some aspects, scheduler 18310 may select the most power-efficient modulation scheme that still achieves the data rate demands of the data stream when used for the first radio access channel (e.g., as no second radio access channel is available) in stage 18510*c*. As only the first radio access channel can be used to transmit the data stream, the second modulation scheme may have higher-order than the first modulation scheme. As the second modulation scheme is higher-order than the first modulation scheme, it may also be less power-efficient. After selecting the second modulation scheme, scheduler 18310 may proceed to stage 18512 to generate the modulation scheme assignment message that identifies the second modulation scheme. Scheduler 18310 may then transmit the modulation scheme assignment message to terminal device 18202 in stage 18514, after which terminal device 18202 may transmit the data stream using the second modulation scheme in stage 18516.

Application of spectrum offload by terminal device 18202 may therefore enable scheduler 18310 to select more power-efficient modulation schemes even when the data stream has data rate demands. This can help conserve battery power at terminal device 18202, as the use of more power-efficient modulation schemes can help reduce the power usage by its power amplifier.

In some aspects, scheduler 18310 may collect and consider other control variables as part of the modulation scheme selection function in stages 18508-18512. For example, in various aspects, scheduler 18310 may be configured to use control variables including any of: a manufacturer of terminal device 18202, a model of terminal device 18202, an identification of one or more components of terminal device 18202, one or more frequency bands supported by terminal device 18202, one or more modulation schemes supported by terminal device 18202, power amplifier characteristics of a power amplifier of terminal device 18202 at different frequencies, power amplifier characteristics of a power amplifier of terminal device 18202 at different modulation schemes, one or more radio access communication technologies supported by terminal device 18202, a movement direction of terminal device 18202, a movement speed of terminal device 18202, an elevation of terminal device 18202, a destination of terminal device 18202, a point of interest (POI) to terminal device 18202, an estimated time before terminal device 18202 leaves the coverage area of network access node 18204 information about network access node 18204, information about a network that network access node 18202 is part of, information about a connection of terminal device 18202, user input information, information about an application of terminal device 18202, a manufacturer of one or more components of network access node 18204, a model of one or more components of network access node 18204, one or more frequency bands supported by network access node 18204, one or more modulation schemes supported by network access node 18204, one or more radio access technologies supported by network access node 18204, capacity information of network access node 18204, information about one or more power resources of network access node 18204, CSI feedback information for terminal device 18202, a received signal strength indicator (RSSI), a reference signal receive power (RSRP), a reference signal receive quality (RSRQ), a channel quality indicator (CQI), a packet loss rate (PLR), a bit error rate (BER), a block error rate (BLER), signal to noise ratio (SNR), a downlink throughput, an uplink throughput, a signal to noise ratio (S/N), a carrier to noise ratio (C/N), an interference to noise ratio (Q/N), a handover duration, a handover success rate, minutes of user per dropped call (MOU), and/or other key performance indicators (KPIs), a type of connection of terminal device 18202, a link quality of the connection, a throughput of the connection, a latency of the connection, a redundancy of the connection, and/or one or more target service parameters of terminal device 18202 (e.g., a target latency, a target data throughput, and/or a target error rate). Any one or more of these control variables may be implemented as part of the predefined mapping, where the predefined mapping may output different modulation schemes based on their value.

In one specific example, scheduler 18310 may base selection of a second modulation scheme for terminal device 18202 on transmission power (e.g., an estimated transmission power based on a distance or a link quality metric), battery power status, power amplifier characteristics, and an estimated duration of data exchange (e.g., based on the length of the data stream being transmitted by terminal device 18202). Scheduler 18310 may therefore obtain these control variables and, for example, apply a predefined mapping to select a second modulation scheme for terminal device 18202 (e.g., where the predefined mapping maps different values of each of these control variables to different modulation schemes).

Various aspects described above reference a modulation scheme selection function for a single terminal device. In some aspects, scheduler 18310 may also be configured to apply the modulation scheme selection function to select modulation schemes for a plurality of terminal devices. FIG. 187 shows an example according to some aspects, where network access node 18204 may be serving terminal device 18202 in addition to terminal devices 18702-18704. Scheduler 18310 of network access node 18204 may therefore be configured to select respective modulation schemes for each of terminal devices 18202, 18702, and 18704.

In some aspects, scheduler 18310 may be configured to select the respective modulation scheme for each of terminal devices 18202, 18702, and 18704 in an independent manner. For example, scheduler 18310 may collect different sets of control variables for each of terminal devices 18202, 18702, and 18704, and separately apply the procedure of message sequence chart 18400 or 18500 to select respective modulation schemes for terminal devices 18202, 18702, and 18704 based on their respective sets of control variables.

In other aspects, scheduler 18310 may be configured to select the respective modulation schemes for terminal devices 18202, 18702, and 18704 (e.g., for multiple terminal devices) in a a combined procedure. FIG. 188 shows exemplary message sequence chart 18800 according to some aspects, which describes a modulation scheme selection function applied to multiple terminal devices. As shown in FIG. 188, terminal devices 18202, 18702, and 18704 may each send a battery power status report (e.g., indicating their own respective battery power status) and/or additional control variable reports in stages 18804-18806. Network access node 18204 may then collect the control variables in stage 18808.

Then, scheduler 18310 may select respective modulation schemes for terminal devices 18202, 18702, and 18704 based on the control variables in stage 18810. Instead of independently determining a modulation scheme for each of terminal devices 18202, 18702, and 18704 based on their respective control variables, scheduler 18310 may concurrently consider the impact of assigning various modulation schemes to terminal devices 18202, 18702, and 18704. For example, scheduler 18310 may treat the assignment of modulation schemes to terminal devices 18202, 18702, and 18704 as the distribution of a fixed set of resources amongst a plurality of terminal devices. As there may be a fixed set of resources that can be distributed, scheduler 18310 may select the modulation scheme for a given terminal device based on the modulation schemes assigned to other terminal devices. The number of terminal devices to which scheduler 18310 assigns modulation schemes can be scalable to any number.

Scheduler 18310 may then in stage 18812 generate respective modulation scheme assignment messages for each of terminal devices 18202, 18702, and 18704 that identify the modulation schemes respectively selected for terminal devices 18202, 18702, and 18704. Scheduler 18310 may then send the modulation scheme assignment messages to terminal devices 18202, 18702, and 18704 with transmitter 19204 in stage 18814. Terminal devices 18202, 18702, and 18704 may then each transmit using their respectively assigned modulation schemes in stage 18816.

Various aspects described above include scheduler 18310 (and its modulation scheme selection function) as part of a network access node. In other aspects, scheduler 18310 may be deployed as part of a core network server that interfaces with network access node 18204. For example, with reference to FIG. 183, scheduler 18310 may be located in the core network, and may provide modulation scheme assignment messages to network access node 18204 for network access node 18204 to transmit to terminal device 18202.

In some aspects, the modulation scheme selection function may be implemented in a terminal device, such as terminal device 18202. For instance, using the example where terminal device 18202 is configured in the manner of terminal device 102 as in FIG. 2, protocol controller 210 may be configured to select a modulation scheme based on control variables, and to send a request to network access node 18204 to use the modulation scheme via transceiver 204. Terminal device 18202 may then be configured to use the modulation scheme if network access node 18204 accepts the request.

FIG. 189 shows exemplary message sequence chart 18900 according to some aspects, which shows one such example where terminal device 18202 executes the modulation scheme selection function. As in the case of FIGS. 184, 185, and 188, the selection function may use the battery power status of terminal device 18202 as a control variable. Terminal device 18202 may therefore determine its battery power status in stage 18902. For example, application processor 212 of terminal device 18202 may report a remaining battery power level and/or a power-saving mode indicator to protocol controller 210. Protocol controller 210 may then use this battery power status as a control variable.

In some aspects, protocol controller 210 may also collect other control variables in stage 18904. For example, protocol controller 210 may determine or estimate a distance between terminal device 18202 and network access node 18204 (e.g., using a current position of terminal device 18202 and the position of network access node 18204, or by estimating the distance with a signal strength measurement by digital signal processor 208), and use this distance as a control variable. In various other examples, protocol controller 210 may collect any of a temperature of terminal device 18202, charging status of terminal device 18202, power amplifier characteristics of a power amplifier of terminal device 18202, data rate demands, and/or spectrum offload information for terminal device 18202 as control variables in stage 18904.

Protocol controller 210 may then select a modulation scheme based on the control variables in stage 18906. For example, as previously described above for stages 18406 of FIG. 184 and stage 18510 of FIG. 185, protocol controller 210 may be configured to use a predefined mapping (e.g., a lookup table) or other selection logic (e.g., a modulation scheme selection equation) to select a modulation scheme based on the control variables. Protocol controller 210 may therefore use any functionality described above to select the modulation scheme based on the control variables in stage 18906. In various examples, protocol controller 210 may be configured to select more power-efficient modulation schemes when the remaining battery power level is lower, when the power-saving mode indicator is enabled, when the distance is larger, and/or when the temperature is higher. In some aspects, it may be advantageous for the modulation scheme selection function to be executed at terminal device 18202 to select modulation schemes based on temperature, as temperature fluctuations may be rapid and the latency involved in executing the modulation scheme selection function at network access node 18204 may be too high.

Protocol controller 210 may then generate a modulation scheme request message in stage 18908, and may send the modulation scheme request message to network access node 18204 via transceiver 204. Scheduler 18310 of network access node 18204 may receive and read the modulation scheme request message, and may determine whether to accept or reject the modulation scheme request message. In the example of FIG. 189, scheduler 18310 may accept the modulation scheme request message (e.g., may accept the request by terminal device 18202 to use the modulation scheme), and may therefore send a modulation scheme accept message to terminal device 18202 in stage 18912.

Protocol controller 210 may receive and read the modulation scheme accept message, and may therefore determine that network access node 18204 has accepted the modulation scheme request message. Protocol controller 210 may then control digital signal processor 208 of terminal device 18202 to transmit using the modulation scheme in stage 18914.

In one example of message sequence chart 18900, protocol controller 210 may be configured to compare a remaining battery power level of terminal device 18202 to a threshold as part of stage 18906, and to select a modulation scheme based on whether the remaining battery power level is less than the threshold. For example, the threshold can be predetermined (e.g., a predetermined remaining battery power level that indicates low power, such as 10%, 20%, etc.), or can be user-determined (e.g., a user-selected remaining battery power level that indicates low power). If protocol controller 210 determines that the remaining battery level is less than the threshold in stage 18906, protocol controller 210 may be configured to select a more power-efficient modulation scheme to request in stage 18906. For example, if terminal device 18202 is initially using a QAM scheme, such as 16-QAM, 32-QAM, or 64-QAM, protocol controller 210 may select a PSK modulation scheme if the remaining battery power level is below the threshold, such as QPSK or BPSK. This can therefore help reduce power consumption and extend battery life at terminal device 18202 in scenarios where the remaining battery power level is low (e.g., less than the threshold).

In another example, protocol controller 210 may be configured to determine whether a power-saving mode indicator is enabled or disabled in stage 18906. If the power-saving mode indicator is enabled (e.g., meaning that the power-saving mode is on), protocol controller 210 may be configured to select a more power-efficient modulation scheme to request in stage 18906. For example, when protocol controller 210 determines that the power-saving mode is enabled, protocol controller 210 may switch from a QAM scheme to a PSK scheme. This can likewise help reduce power consumption and extend battery life at terminal device 18202 when the power-saving mode is enabled.

In some aspects, various examples described may also be implemented in the downlink direction, such as where scheduler 18310 selects a downlink modulation scheme for network access node 18204 to use to transmit to terminal device 18202. Any example described above can therefore be implemented with the power efficiency of the power amplifier of network access node 18204 and/or the power usage of network access node 18204. This can be useful, for example, when the network operator of network access node 18204 wishes to reduce power usage (e.g., to reduce costs), and/or when network access node 18204 is battery powered. For example, downlink modulation scheme selection function can be executed at scheduler 18310 when network access node 18204 is a temporary base station or access node deployed by a drone or balloon, a network access node deployed in the field for emergency purposes when grid power is unavailable, or a network access node deployed to increase connectivity at venues or events in stadiums were pre-existing network access nodes are insufficient to handle the temporary surge in connectivity demands.

FIG. 190 shows exemplary method 19000 of operating a network access node according to some aspects. As shown in FIG. 190, method 19000 includes obtaining a battery power status for a terminal device with a first modulation scheme (19002), selecting a second modulation scheme for the terminal device if the battery power status meets a predefined condition (19004), and sending a modulation scheme assignment message to the terminal device that identifies the second modulation scheme (19006).

FIG. 191 shows exemplary method 19100 operating a terminal device according to some aspects. As shown in FIG. 191, method 19100 includes determining a battery power status of the terminal device while the terminal device is assigned a first modulation scheme (19102), selecting a second modulation scheme for the terminal device if the battery power status meets a predefined condition (19104), and sending a modulation scheme request message to a network access node that requests assignment of the second modulation scheme to the terminal device (19106).

FIG. 192 shows exemplary method 19200 of operating a network access node according to some aspects. As shown in FIG. 192, method 19200 includes obtaining a plurality of control variables for a terminal device with a first modulation scheme (19202), selecting a second modulation scheme based on a predefined mapping that maps control variables to modulation schemes (19204), wherein the one or more control variables include a battery power status, and sending a modulation scheme assignment message identifying the second modulation scheme to the terminal device (19206).

Configurable, Self-Calibrating and Self Correcting Baseband Modem

Vehicular communication devices and terminal device platforms may face distinct challenges due to their respective differences. One such difference arises from the arrangement of one or more components within a vehicular communication device, such as vehicular communication device 500. In at least one aspect, one or more components may be embedded within vehicular communication device 500. For instance, one or components may be embedded within the vehicular housing of vehicle communication device 500, near the window(s) and/or outside of the vehicular housing for increased radio frequency (RF) sensitivity. The placement of one or more components of vehicular communication device 500 may thus contribute to the difficulty in performing service on vehicular communication device 500. It would thus be beneficial to provide a non-invasive solution to service vehicular communication devices without damage thereto.

Another difference stems from the life cycle of a vehicular communication device, which may be designed to outlast that of a terminal device platform. In view of this consideration, vehicular communication devices may benefit from a more flexible design. In some aspects, V2X technology may be based on one or more communication protocols (e.g., 3GPP LTE). While both vehicular communication devices and terminal device platforms may benefit from upgrades as additional technological advances are introduced, the number of upgrades is likely to be greater for vehicular communication devices in view of their expected life cycles.

In light of these factors, auto manufacturers and the auto industry are faced with the task of determining the best way to upgrade vehicular communication devices without waiting for individuals to bring their vehicular communication devices in for service and without damage to their vehicular communication devices.

In some aspects, one or more components may be disposed (e.g., built) into a serviceable position of vehicular communication device 500 to address issues relating its location. According to at least one aspect, the serviceable position of the vehicular communication device 500 may be visible or hidden. One or more trim pieces may, in some aspects, be added to protect a portion of vehicle communication device 500. For further protection, a panel or cover may also be included to protect and/or hide at least a portion vehicle communication device 500 in accordance with at least one aspect.

One or more components of terminal device 102 or vehicular communication device 500 may, in some aspects, be added, removed and/or replaced to facilitate maintenance. According to at least one aspect, a component of terminal device 102 and/or vehicular communication device 500 may include hardware, software, or some combination thereof. When a component, for instance, stops working as intended, is no longer desired, and/or becomes outdated, for example, it may be removed or replaced with one or more components. By providing a mechanism for interchanging components, various hardware and/or software functionalities may be integrated into terminal device 102 and/or vehicular communication device 500.

Despite the ability to service terminal device 102 and/or vehicular communication device 500 without damage thereto, owners may be tasked with the inconvenience of bringing their terminal device 102 and/or vehicular communication device 500 in for service.

As provided herein, a wireless baseband modem of terminal device 102 and/or vehicular communication device 500 may, in some aspects, diagnose, calibrate performance, and/or obtain one or more components therein or functionalities thereof. According to at least one aspect, the wireless baseband modem may be re-configured with new radio communication technologies by virtue of an over-the-air (OTA) update.

In some aspects, an OTA update may be used for distributing data over an air interface to update one or more target devices. According to at least one aspect, the target device may be terminal device 102, and/or a vehicular communication device 500, for example. This data may, in some aspects, include one or more parameters, data structures, tables, libraries, threads, instructions, sub-routines, procedures, functions, routines, applications, software, operating systems and/or any portion(s) thereof, for example. Additional features may thus be introduced for integration with the vehicle itself or vehicular communication device.

By providing a mechanism for calibration and correction, owners may reduce the frequency of bringing their terminal devices and/or vehicular communication device into a service facility for support. Furthermore, terminal devices and/or vehicular communication devices may be configured to download at least a portion of support for new radio communication technologies and/or various types of value-added features.

FIG. 193 shows an exemplary internal configuration of radio communication arrangement 504 and antenna system 506 of a vehicular communication device 500 according to some aspects. As shown in FIG. 193, radio communication arrangement 504 may include a baseband integrated circuit 19302, a baseband RF integrated interface circuit 19304, RF integrated circuit 19306, RF integrated circuit 19308, envelope tracking (ET) integrated circuit 19310, ET integrated circuit 19312, LNA bank 19314, LNA bank 19316, PA integrated circuit 19318, PA integrated circuit 19320, duplexer 19322, and duplexer 19324. Although a baseband integrated circuit 19302, a baseband RF integrated interface circuit 19304, RF integrated circuit 19306, RF integrated circuit 19308, ET integrated circuit 19310, ET integrated circuit 19312, LNA bank 19314, LNA bank 19316, PA integrated circuit 19318, PA integrated circuit 19320, duplexer 19322, and duplexer 19324 are illustrated in radio communication arrangement 504, some aspects may employ additional or fewer baseband integrated circuits, baseband RF integrated circuits, RF integrated circuits, ET integrated circuits, LNA banks, PA integrated circuits, duplexers and/or other elements.

With continued reference to FIG. 193, RF integrated circuit 19306 may, in some aspects, be configured for a first set of frequency bands, whereas RF integrated circuit 19308 may be configured for a second set of frequency bands. According to at least one aspect, the first set of frequency bands may be the same set of frequency bands as the second set of frequency bands. The first set of frequency bands may, in some aspects, be mutually exclusive from the second set of frequency bands. In at least one aspect, the first set of frequency bands may overlap, at least in part, in frequency with the second set of frequency bands.

With continued reference to FIG. 193, antenna system 506 may include antenna tuner 19326. Although antenna tuner 19326 is illustrated in antenna system 506, some aspects may employ additional or fewer antenna tuners and/or other elements. As previously described with respect to FIG. 6, antenna system 506 may also include a single antenna, an antenna array that includes multiple antennas, an analog antenna combination and/or beamforming circuitry.

The performance of one or more components within vehicular communication device 500 may change over time. In some aspects, the performance of one or more components of vehicular communication device 500 may degrade based on a variety of factors. According to at least one aspect, these factors may include may include a mechanical condition of on e or more components of vehicular communication device 500, an electrical condition of one or more components of vehicular communication device 500, an environmental condition of one or more components of vehicular communication device 500, and/or a state condition of one or more components of vehicular communication device 500, for example.

In some aspects, one or more components of vehicular communication device 500 may result in a degradation in performance, a fault occurrence and/or a failure based on one or more of these factors.

A mechanical condition of one or more components of vehicular communication device 500 may, in some aspects, be based on a compression load, a tension load, a shear load, a bending load and/or a torsion load, for example.

In some aspects, an electrical condition of one or more components of vehicular communication device 500 may be based on an overcurrent, an overvoltage, an undervoltage, an overcurrent, an undercurrent, a short circuit, an open circuit, a reverse bias, an electromagnetic force (EMF) and/or an electrostatic discharge (ESD), for example.

An environmental condition of one or more components of vehicular communication device 500 may, in some aspects, be based on a chemical reaction (e.g., corrosion), a temperature, a barometric pressure, a presence of a gas, a presence of a vapor, and/or a presence of liquid, for example.

In some aspects, a state condition of the one or more components of vehicular communication device 500 may be based on an active condition, an "ON" condition, a passive condition, an "OFF" condition, an error condition, a resource utilization, and/or a quiescent condition, for example.

A component of terminal device 102 and/or vehicular communication device 500 may, in some aspects, include hardware, software, or some combination thereof. In some aspects, a component of a vehicular communication device may include a processor, a processor core, a microprocessor, an integrated circuit, a controller, a FPGA, a clock, an oscillator (e.g., crystal), an LNA, a PA, a baseband modem, tuner, RF front end, a memory, an interface, a switch, and/or a software-defined radio (SDR) component implemented as a processor to execute software-defined instructions, for example, or any portion(s) thereof.

In some aspects, one or more components of terminal device 102 and/or vehicular communication device 500 may include one or more algorithms to compensate for one or more of the factors listed above. According to at least one aspect, some built-in calibration and automatic correction methods may not adequately alleviate the quantity and/or extent of factors encountered for the duration for which the components of terminal device 102 and/or vehicular communication device 500 are designed.

While certain aspects are specifically described herein in the context of a vehicular communication device 500, it should be noted that a terminal device 102 and a terminal device implemented 102 as a vehicular communication device 500 may face some similar challenges due to overlapping design constraints. For instance, one or more components of a vehicular communication device 500 may, in some aspects, be configured in accordance with one or more communication protocols of radio communication network 100. According to at least one aspect, the number of external RF font end components in a cellular modem of a vehicular communication device 500 may increase with respect to the number of frequency bands supported by the radio communication network 100. In this regard, a TX feedback receiver may, in some aspects, be added within the cellular modem to communicate in accordance with one or more communication protocols of the radio communication network 100. In at least one aspect, the additional TX feedback receiver may be configured to perform closed loop power control to achieve a power ramping time within 1 ms (70 μs for LTS sounding reference signals (SRS)). While the preceding example is merely illustrative in nature, the added hardware complexity may contribute to the effect of aging on one or more components of a vehicular communication device 500. Accordingly, conventional diagnostics performed on vehicular communication device 500 or even terminal device 102 may be insufficient in detecting the effect(s) of aging because such diagnostics occur prior to mass deployment.

In view of the foregoing, providing a framework for in-field diagnostics, in-field calibration, and/or OTA updates may be beneficial. In some aspects, an in-field diagnostic process may detect one or more issues (e.g., hardware, software, hardware and/or software, among others) within a terminal device 102. A detected issue may, for instance, be attributable to one or more components of a terminal device 102, such as a failing RF front-end component, a drift in the clock of a local frequency oscillator, for example. According to at least one aspect, an in-field calibration process and/or an OTA update may be performed to compensate for an issue detected through the in-field diagnostic process. As a result, the added burden of, for instance, uninstalling a component and sending it back to the factory can be avoided.

Terminal device 102 and/or vehicular communication device 500 may be configured to interface with one or more devices for in-field diagnostics, in-field calibration, and/or OTA update. FIG. 194 shows an exemplary configuration in accordance with some aspects where terminal device 102 interface with one or more devices 19400. As shown in FIG. 194, for instance, terminal device 102 may be configured to communicate with network access node 110, terminal device 104, and/or itself. Although terminal device 102 may interface with network access node 110, terminal device 104, and/or itself as shown in FIG. 194, some aspects may employ additional or fewer interfaces with network access nodes, terminal devices, and/or other devices. Although terminal device 102 is illustrated in FIG. 194, terminal device 102 may, for instance, be implemented as vehicular communication device 500.

In some aspects, the one or more devices 19400 may include a terminal device, a vehicular communication device, a network access node, a core-network entity, an authentication entity, an Internet of Things (IoT) device, a road side unit (RSU), a drone, an IoT fuel pump, an electric-vehicle charging station, automotive service/repair station equipment, and/or network service provider equipment, among others. According to at least one aspect, the one or more devices 19400 may be included in the radio communication network 100. Additionally or alternatively, the one or more devices 19400 may be included on an external data network. As further described herein, the one or more devices 19400 may, in some aspects, be "certified" to facilitate in-field diagnostics and/or in-field compensatory measures.

Terminal device 102 and the one or more devices 19400 may, in some aspects, be configured to communicate via one or more of the radio communication technologies described herein. According to at least one aspect, terminal device 102 may be configured to communicate with network access node 110 through interface 19402. Interface 19402 may, for instance, include an uplink communication channel and/or a downlink communication channel. In some aspects, terminal device 102 may be configured to communicate with terminal device 104 through interface 19404. Interface 19404 may, for example, include a peer-to-peer communication link, such as 3GPP sidelink based D2D, V2V communications, Bluetooth, Bluetooth Low Energy (BTLE), WiFi Direct, among others.

Terminal device 102 may, in some aspects, be configured to communicate with itself via interface 19406. Interface 19406 may, for instance, include an internal TX-RX feedback path, an external feedback loop, among others. According to at least one aspect, the transmitter and receiver of terminal device 102 may be configured to operate (e.g., concurrently) on the same carrier frequency. By operating on the same frequency, the transmitted signals may, in some aspects, be routed into the receiver within the same hardware platform of terminal device 102.

With continued reference to FIG. 194, an in-field diagnostic, in-field calibration and/or an OTA update of terminal device 102 and/or vehicular communication device 500 may be performed without the inconvenience of going to a service or repair facility. In some aspects, an in-field diagnostic, an in-field calibration, and/or an OTA update may be implemented by executing one or more run-time processes. According to at least one aspect, terminal device 102 may be configured to execute at least a portion of an in-field diagnostic process, an in-field calibration process, and/or an OTA update process of terminal device 102. The one or more devices 19400 may, in some aspects, be configured to facilitate at least a portion of the in-field diagnostic process, an in-field calibration process, and/or OTA update process of terminal device 102. In at least one aspect, terminal device 102 and the one or more devices 19400 may be configured to collectively perform at least a portion of an in-field diagnostic process, an in-field calibration process, and/or an OTA update process of terminal device 102, or any portion(s) thereof.

In some aspects, an authentication procedure may be performed in accordance with at least one of an in-diagnostic process, an in-field calibration process, and/or an OTA update process. According to at least one aspect, terminal device 102 and/or vehicular communication device 500 may be configured to perform at least a portion of the authentication procedure. One or more devices 19400 may, in some aspects, be configured to perform at least a portion of the authentication procedure. In at least one aspect, the terminal device 102 or vehicular communication device 500 may be configured to collectively perform at least a portion of the authentication procedure with the one or more devices 19400.

Authentication may, in some aspects, include the verification of authentication information. According to at least one aspect, the authentication information may include a subscriber identity information, a certificate, a make of the terminal device, a model of the terminal device, a year of the terminal device, a color of the vehicular communication device, identification of one or more aftermarket parts installed in the vehicular communication device, an identity of the one or more devices, a version number of the data to be sent to the vehicular communication device, and/or a version of the data stored on the vehicular communication device.

The timing at which authentication is performed may vary. In some aspects, authentication may be performed prior to an in-field diagnostic process, an in-field calibration process, and/or an OTA update process. According to at least one aspect, authentication may be performed after an in-field diagnostic process, an in-field calibration process, and/or an OTA update process. Authentication may, in some aspects, be performed during an in-field diagnostic process, an in-field calibration process, and/or an OTA update process.

In some aspects, an in-field diagnostic process, in-field calibration process and/or an OTA update process of terminal device 102 and/or vehicular communication device 500 may be performed in an unsupervised mode of operation and/or a supervised mode of operation. According to at least one aspect, terminal device 102 may be configured to execute at least a portion of in-field diagnostic process, and/or an in-field calibration process in an unsupervised mode of operation. Terminal device 102 may, in some aspects, be configured to execute at least a portion of in-field diagnostic process, an in-field calibration process, and/or an OTA update process in a supervised mode of operation. In at least one aspect, the one or more devices 19400 may be configured to facilitate at least a portion of the in-field diagnostic process, an in-field calibration process, and/or OTA update process of terminal device 102 in a supervised mode of operation.

An unsupervised mode of operation may, in some aspects, be performed without the assistance of the one or more devices 19400. According to at least one aspect, however, the unsupervised mode of operation may include some form of communication with the one or more devices 19400. In some aspects, the terminal device 102 may be configured exchange one or more messages with the radio communication network 100 in the unsupervised mode of operation concurrently with the in-field diagnostic process and/or an in-field calibration process of terminal device 102. In at least one aspect, the one or more messages may include, for instance, a measurement report to a network access node 110 during an idle state connection therewith.

In some aspects, the supervised mode of operation may, for instance, be performed with the assistance of the one or more devices 19400. According to at least one aspect, the one or more devices 19400 may be configured to control at least a portion of the in-field diagnostic process, an in-field calibration process, and/or an OTA update process of terminal device 102 in the supervised mode of operation. The one or more devices 19400 may, in some aspects, be configured to issue one or more instructions to terminal device 102 in the supervised mode of operation concurrently with the in-field diagnostic process, an in-field calibration process of terminal device 102, and/or OTA update process.

An in-field diagnostic process, an in-field calibration process, and/or OTA update process of terminal device 102 and/or vehicular communication device 500 may, in some aspects, be a software-defined radio (SDR) component implemented by one or more processors configured to at least a portion of execute software-defined instructions. Although certain aspects herein may describe an in-field diagnostic process, an in-field calibration process and/or an OTA update process from the perspective of a terminal device 102, the in-field diagnostic process, an in-field calibration process, and/or an OTA update process or any portion(s) thereof, may be executed in the terminal device 102, vehicular communication device 500 and/or the one or more devices 19400, individually or collectively. In some aspects, one or more processors of terminal device 102 (e.g., digital signal processor 208, controller 210, application processor 212, among others) and/or the one or more devices 19400 (e.g., radio transceiver 304, physical layer processor 308, protocol controller 310, among others) may be configured to execute at least a portion of the in-field diagnostic process, an in-field calibration process, and/or an OTA update process of a device under test (e.g., terminal device 102, vehicular communication device 500, among others).

FIG. 195 shows an exemplary flow diagram 19500 for a device under test (e.g., terminal device 102, vehicular communication device 500, among others) according to some aspects. As shown in FIG. 195, flow diagram 19500 may begin with a determination as to whether one or more events are detected 19502. If it is determined that one or more events are not detected, the process may restart. If, however, it is determined that one or more events are detected, an in-field diagnostic process of the device under test may be performed 19504. After the in-field diagnostic process is completed, a result of the in-field diagnostic process may be analyzed 19506. Upon analysis the result of the in-field diagnostic process 19506, it is determined as to whether one or more countermeasures are to be performed 19508. If it is determined in the affirmative, one or more countermeasures for the device under test may be performed 19510. After performing the one or more countermeasures for the device under test 19510, one or more countermeasures for the device under test may be logged 19512. Upon logging the one or more countermeasures of the device under test 19512, the process may restart.

As previously noted, flow diagram 19500 may begin with a determination as to whether one or more events are detected 19502. In some aspects, this determination may provide for the detection of a variety of events. According to at least one aspect, the one or more events may include a temporal event, a performance event, a geographic event, a connection event, a power event, and/or a notification event, among others.

In some aspects, a temporal event may be based on a temporal value, a counter value, a clock value, a time of day, a temporal duration, a clock duration, a timer expiration, a countdown timer, a scheduled time, a random time, and/or an age of a device under test, among others, or any component or portion(s) thereof.

A performance event may, in some aspects, be based on a received signal strength indicator (RSSI), a reference signal receive power (RSRP), a reference signal receive quality (RSRQ), a channel quality indicator (CQI), a packet loss rate (PLR), a bit error rate (BER), a block error rate (BLER), signal to noise ratio (SINR), a downlink throughput, an uplink throughput, a signal to noise ratio (S/R), a carrier to noise ratio (C/N), an interference to noise ratio (C/N), a handover duration, a handover success rate, minutes of user per dropped call (MOU), and/or other key performance indicators (KPls), among others.

In some aspects, a geographic event may be based on a location, a boundary, and/or proximity thereto, among others. According to at least one aspect, a location may be based on a location of the device under test (e.g., home), a location of where an in-field diagnostic for the device under test was previously performed (e.g., completed), a point of interest input by a user, and/or a proximity to the one or more devices 19400. The location may, in some aspects, be based on a location determined by a navigational system (e.g., global positioning system (GPS)), the device under test, and/or the one or more devices 19400. In at least one aspect, the boundary may be a physical boundary, a political boundary, and/or any other type of boundary.

A connection event may, in some aspects, be based on a communication connection. In some aspects, a connection event may include an identifier of an entity of the communication connection (e.g., a network access node), a duration to synchronize to a known network access node for which synchronization was previously successful, a failure to synchronize with a network access node for which synchronization was previously successful, a duration of an established communication connection, a type of communication connection, a link quality of an established communication connection, a throughput of an established communication connection, an identity of one or more entities participating in the communication connection, and/or a status designation (e.g., cluster head) of one or more entities participating in the communication connection. According to at least one aspect, a device under test may be configured to determine an identifier of a network access node by a Cell ID and/or location information (e.g., GPS coordinates). The device under test may, in some aspects, be configured to determine that a synchronization failure occurred in the absence of detecting a primary synchronization signal or secondary synchronization signal from a network access node (e.g., after a predetermined duration).

In some aspects, a power event may be based on a power supply level, a backup power supply level, an amount of estimated battery time remaining in the device under test and/or the one or more devices 19400.

A notification event may, in some aspects, be based on a notification from radio communication network 100, a notification from a manufacturer and/or another entity. According to at least one aspect, radio communication network 100 may determine data (e.g., an OTA update) is available for the device under test. In some aspects, the radio communication network 100 may match an identity of the device under test with the data to be transmitted thereto.

In some aspects, the detection of one or more events may be performed in various manners. According to at least one aspect, the device under test may be configured to determine whether the one or more events are detected. The one or more devices 19400 may, in some aspects, be configured to determine whether the one or more events are detected. In at least one aspect, the device under test and the one or more devices 19400 may be configured to collectively determine whether one or more events are detected.

In some aspects, the determination as to whether one or more events are detected may include determining whether one or more events have occurred, are presently occurring, and/or are likely to occur in the future. According to at least one aspect, the one or more events may, in some aspects, be based on device under test and/or the one or more devices 19400. The one or more events may, in some aspects, be based on whether one or more events have occurred, are present occurring and/or are likely occur in the device under test. In at least one aspect, the one or more events may, in some aspects, be based on whether one or more events have occurred, are present occurring and/or are likely occur in the one or more devices 19400.

According to at least one aspect, the device under test may be configured to determine whether the one or more events are detected. The one or more devices 19400 may, in some aspects, be configured to determine whether the one or more events are detected. In at least one aspect, the device under test and the one or more devices 19400 may be configured to collectively determine whether one or more events are detected.

With continued reference to FIG. 195, in some aspects, the process may restart if it is determined that one or more events are not detected. In some aspects, the determination as to whether one or more events are detected may be performed at various times, such as periodically. According to at least some aspects, the determination as to whether one or more events are detected may operate in a continuous manner. The determination as to whether one or more events are detected may, in some aspects, be triggered upon one or more conditions (e.g., signaling from the radio communication network) being met.

With continued reference to FIG. 195, in some aspects, a determination that one or more events are detected may trigger the performance of an in-field diagnostic process 19504 of the device under test. Although the determination that one or more events is detected are described to trigger the performance of an in-field diagnostic process, this determination may trigger an in-field calibration process and/or an OTA update process in some aspects.

In some aspects, various forms of signaling may be utilized for an in-field diagnostics process. According to at least one aspect, the one or more signals for the in-field diagnostics process may include utilization of one or more reference signals. The one or more reference signals may, in some aspects, be standardized signals and/or non-standardized signals. In at least one aspect, the one or more reference signals may include one or more waveforms (e.g., sine wave, cosine wave, pulse wave, square wave, among others) in which the amplitude, phase, frequency, start and/or stop of the one or more reference signals may be varied over time. According to some aspects, the amplitude, phase, frequency, start and/or stop may be constant or variable for a predetermined duration.

The one or more references signals may, in some aspects, include an encoded bit sequence which is known to the receiver. According to at least one aspect, the one or more references signals may be transmitted on a specific resource block, which is known to the receiver. In some aspects, the specific resource block may be defined by a position in time and frequency. In at least one aspect, the receiver may be configured to measure one or more errors in the transmitted one or more reference signals.

In some aspects, various devices may be configured to transmit one or more signals for an in-field diagnostics process. According to at least one aspect, the device under test may be configured to transmit the one or more signals for an in-field diagnostics process. One or more devices 19400 may, in some aspects, be configured to transmit the one or more signals for an in-field diagnostics process. In at least one aspect, the device under test and the one or more devices 19400 may be configured to collectively transmit the one or more signals for an in-field diagnostics process.

As previously noted, the one or more signals for an in-field diagnostics process may, in some aspects, be transmitted by the device under test. According to at least one aspect, a transceiver of the device under test may be configured to transmit one or more signals for an in-field diagnostics process. In some aspects, the device under test may be configured to transmit the one or more reference signals to the one or more devices 19400. In at least one aspect, the device under test may be configured to transmit the one or more reference signals to network access node 110 and/or radio communication network 100.

In some aspects, one or more signals may be received for an in-field diagnostics process. According to at least one aspect, the device under test may be configured to receive the one or more signals for an in-field diagnostics process. One or more devices 19400 may, in some aspects, be configured to receive the one or more signals for an in-field diagnostics process. In at least one aspect, the device under test and the one or more devices 19400 may be configured to collectively receive the one or more signals for an in-field diagnostics process.

In some aspects, the one or more signals for an in-field diagnostics process may be transmitted by one or more devices 19400. According to at least one aspect, a receiver of the device under test may be configured to receive one or more signals for an in-field diagnostics process. The device under test may, in some aspects, be configured to receive the one or more references signals from the one or more devices 19400. In at least one aspect, the device under test may be configured to receive the one or more reference signals from network access node 110 and/or terminal device 104. While the one or more signals have been described in the context of an in-field diagnostics process, above-described signaling for an in-field diagnostic process may also be applicable to some aspects of an in-field calibration process.

The device under test may, in some aspects, be configured to perform at least a portion of one or more measurements of the one or more signals. In at least one aspect, the device under test may be configured to perform at least a portion of one or more measurements of the one or more reference signals. The device under test may, in some aspects, be configured to report the one or more measurements for analysis. In at least one aspect, the device under test may be configured to report the one or more measurements to the one or more devices 19400.

The one or more devices 19400 may, in some aspects, be configured to perform at least a portion of one or more measurements of the one or more signals. In at least one aspect, the one or more devices 19400 may be configured to perform at least a portion of one or more measurements of the one or more reference signals. The one or more devices 19400 may, in some aspects, be configured to report the one or more measurements for analysis.

With continued reference to FIG. 195, in some aspects, a result of the in-field diagnostic process may be analyzed 19506 after the in-field diagnostic process is completed. In some aspects, one or measurements may be compared to one or more performance metrics. According to at least one aspect, the device under test may be configured to compare the one or more measurements with the one or more performance metrics. One or more devices 19400 may, in some aspects, be configured to compare the one or more measurements with the one or more performance metrics. In at least one aspect, the device under test and the one or more devices 19400 may be configured to collectively compare the one or more measurements with the one or more performance metrics.

With continued reference to FIG. 195, in some aspects, it is determined as to whether one or more countermeasures are to be performed 19508 upon analyzing one or more result of the in-field diagnostic process 19506. In some aspects, the device under test may be configured to determine whether one or more countermeasures are to be performed based on the one or more measurements. According to at least one aspect, the one or more devices 19400 may, in some aspects, be configured to determine whether one or more countermeasures are to be performed based on the one or more measurements. The device under test and the one or more devices 19400 may, in some aspects, be configured to collectively determine whether one or more countermeasures are to be performed based on the one or more measurements. In at least one aspect, one or more countermeasures may be performed when the one or more measurements fails to meet one or more prescribed criteria (e.g., predetermined threshold).

In some aspects, the device under test may be configured to determine whether one or more countermeasures are to be performed based on a comparison between the one or more measurements with the one or more performance metrics. According to at least one aspect, the one or more devices 19400 may, in some aspects, be configured to determine whether one or more countermeasures are to be performed based on a comparison between the one or more measurements with the one or more performance metrics. The device under test and the one or more devices 19400 may, in some aspects, be configured to collectively determine whether one or more countermeasures are to be performed based on a comparison between the one or more measurements with the one or more performance metrics. In at least one aspect, one or more countermeasures may be performed when the one or more measurements fails to meet one or more performance metrics (e.g., predetermined performance metric ranges).

With continued reference to FIG. 195, in some aspects, one or more countermeasures for the device under test may be performed 19510 upon a determination thereof. In some aspects, the device under test may be configured to perform at least a portion of one or more countermeasures for the device under test. According to at least one aspect, the one or more devices 19400 may, in some aspects, be configured to perform at least a portion of one or more countermeasures for the device under test. The device under test and the one or more devices 19400 may, in some aspects, be configured to collectively perform at least a portion of one or more countermeasures for the device under test.

Various countermeasures may, in some aspects, be performed for the device under test. According to at least one aspect, the one or more countermeasures may include the adjustment of one or more parameters and/or characteristics for one or more components of the device under test. For instance, one or more coefficients may, in some aspects, be updated for one or more components for the device under test. In at least one aspect, the one or more coefficients may include “performance” or “aging” coefficients (e.g., offsets) to counter age or environmental degradation.

In some aspects, the one or more countermeasures may include the correction of a frequency, time, and/or protocol, for example. The one or more countermeasures may, for instance, include adding a frequency offset to a reference clock, removing a frequency offset to a reference clock, adding a power gain for transmission, removing a power gain for transmission, adding a power gain for reception, removing a power gain for reception, changing a support band, changing a frequency, changing a modulation scheme, and/or changing a multiple input multiple output (MIMO) configuration, for example. In at least one aspect, the frequency offset may be an additional frequency offset or a portion of a frequency offset. According to some aspects, the reference clock may be a crystal oscillator. The changing of a support band, a frequency, a modulation scheme, and/or a MIMO configuration may be performed by the device under test to disable one or more configurations therein, which fail to meet one or more prescribed conditions.

Additionally or alternatively, one or more countermeasures may include the changing of a preference (e.g., priority) for one or more of the radio communication technologies described herein. In some aspects, the device under test and/or the one or more devices 19300 may be configured to change the preference for one or more radio communication technologies when one or more performance metrics are not satisfied. According to at least one aspect, a default preference list for one or more radio communication technologies (e.g., LTE>3G>GSM) may be adapted to an alternative preference list for one or more radio communication technologies (e.g., GSM>3G>LTE) when one or more performance metrics (e.g., predetermined threshold, predetermined ranges, among others) associated with the default priority of radio communication technology are not satisfied. Although a particular number of radio communication technologies and specific methodology for indicating a preference thereof are described, more or fewer radio communication technologies may be included, different radio communication technologies may be implemented and/or different methodologies for indicating a preference for one or more radio communication technologies may be employed. The device under test may, in some aspects, be equipped with one or more redundant components. According to at least one aspect, the one or more countermeasures may include identifying one or more components of the vehicular communication device or any portion(s) thereof to be replaced for failing to meet one or more prescribed conditions, notifying one or more components of the device under test or any portion(s) thereof to be replaced, disabling one or more components of the device under test or any portion(s) thereof, identifying one or more redundant components of the device under test, and/or activating one or more redundant components of the device under test in favor of one or more disabled components of the device under test or any portion(s) thereof, for example.

In some aspects, the one or more redundant components of the device under test may be separate and distinct (e.g., mutually exclusive) from the one or more disabled components of the device under test. According to at least one aspect, the one or more redundant components of the device under test may be include one or more components of the one or more disabled components of the device under test. The number of the one or more redundant components of the device under test may, in some aspects, be greater than or equal to the one or more disabled components of the device under test. In at least one aspect, the number of the one or more redundant components of the device under test may be less than or equal to the one or more disabled components of the device under test.

Various other countermeasures may, in some aspects, be determined based on the one or more measurements. According to at least one aspect, the one or more countermeasures may include performing an OTA update, reporting an updated capability of the device under test, reporting an updated performance of the device under test, and/or requesting an antenna change, for example.

Various downloadable features may, in some aspects, be made available to the device under test through an OTA update. According to at least one aspect, one or more downloadable features may be made available by various entities, including a manufacturer (e.g., vehicular communication device manufacturer), the radio communication network 100, the component provider, the device under test and/or the user (e.g., owner), among others. In some aspects, the downloadable features may be either be mandatory (e.g., required) or optional (e.g., enhanced performance).

The one or more downloadable features may, in some aspects, be designed for the device under test. According to at least one aspect, the device under test may be provisioned with an OTA update based on a radio communication technology. In some aspects, the device under test may be configured to update at least a portion of one or more radio communication technologies supported by the device under test via an OTA update. In at least one aspect, the device under test may be configured to receive at least a portion of one or more radio communication technologies not already supported by the device under test via an OTA update.

In the vehicular context, for instance, the one or more downloadable features may, in some aspects, be designed for vehicular communication device 500. According to at least one aspect, vehicular communication device 500 may be provisioned with an OTA update, for example, based on data received therefrom. In some aspects, vehicular communication device 500 may be configured to provision the performance of vehicular communication device 500 for different users based on the OTA update. In at least one aspect, steering and movement system 502 may be provisioned with an OTA update to optimize various types of performance (e.g., sport, comfort, among others).

With continued reference to FIG. 195, one or more countermeasures for the device under test may be logged upon performance thereof. In some aspects, the device under test may be configured to log at least a portion of the one or more countermeasures in a memory (e.g., memory 214). According to some aspects, the one or more devices 19400 may be configured to log at least a portion of the one or more countermeasures in a memory (e.g., a local memory). After logging the one or more countermeasures of the device under test 19512, the process may return to the determination as to whether one or more events are detected 19502.

FIG. 196 shows an exemplary flow diagram 19600 for a device under test (e.g., terminal device 102, vehicular communication device 500, among others) according to some aspects. As shown in FIG. 196, flow diagram 19600 may begin with a determination of one or more initial conditions 19602. Upon determining the one or more initial conditions 19602, a determination as to whether one or more events are detected 19502. If it is determined that one or more events are not detected, the process may return to determining whether one or more events are detected 19502. If it is determined that one or more events are detected, an in-field diagnostic process of the device under test may be performed 19504. After the in-field diagnostic process is completed, a result of the in-field diagnostic process may be analyzed 19506. Upon analyzing the result of the in-field diagnostic process 19506, it is determined as to whether one or more countermeasures are to be performed 19508. If it is determined that one or more countermeasures are to be performed, one or more countermeasures for the device under test may be performed 19510. If it is determined that an error occurs in performing the one or more countermeasures 19604, then a notification of the error is provided 19606. If, however, it is determined that no errors occur in performing the one or more countermeasures, then a conformance test 19608 may be performed. Subsequent to performing the one or more countermeasures for the device under test 19510, one or more countermeasures for the device under test may be logged 19512. After logging the one or more countermeasures of the device under test 19512, the process may return to the determination as to whether one or more events are detected 19502.

A description of the processes from FIG. 195 is hereby incorporated by reference to FIG. 196. In some aspects, flow diagram 19600 of FIG. 196 may begin with one or more initial conditions being set 19602. According to at least one aspect, the device under test may be configured to determine one or more initial conditions for in-field diagnostic process. The one or more devices 19400 may, in some aspects, be configured to determine one or more initial conditions of an in-field diagnostic. In at least one aspect, the device under test and the one or more devices 19400 may be configured to collectively determine one or more initial conditions of an in-field diagnostic.

Various initial conditions may be set for an in-field diagnostic process. In some aspects, one or more initial conditions may include a baseline performance of the device under test (e.g., model specific performance, generic performance, historical performance, among others), a location of where an-field diagnostic process is to be performed (e.g., home, a location where an in-field diagnostic was previously completed for the device under test, among others), and/or a timing information for performing an in-field diagnostic process (e.g., time since the last in-field-diagnostic process), among others.

With continued reference to FIG. 196, a determination may be made as to whether an error occurred 19604 in connection with the performance of one or more countermeasures 19510. In some aspects, the device under test may be configured to determine whether an error occurred during the performance of one or more countermeasures. According to at least one aspect, the one or more devices 19400 may be configured to determine whether an error occurred during the performance of one or more countermeasures. The device under test and the one or more devices 19400 may, in some aspects, be configured to collectively determine whether an error occurred during the performance of one or more countermeasures.

Various types of errors may occur during the performance of one or more countermeasures. In some aspects, an error may include a hardware error, a software error, a hardware/software error, a missing function, a wrong function, corrupted data file(s), error recovery from hardware, outdated constant(s), incorrect variable(s), and/or version identification errors, among others.

With continued reference to FIG. 196, a notification of error is provided 19606 based on its detection. In some aspects, the device under test may be configured to provide a notification of a detected error. According to at least one aspect, the one or more devices 19400 may be configured to provide a notification of a detected error. The device under test and the one or more devices 19400 may, in some aspects, be configured to collectively provide a notification of a detected error. In at least one aspect, notification of a detected error may be provided to various entities including one or more components (e.g., GUI) of the device under test, one or more devices 19400, among others.

With continued reference to FIG. 196, a notification of error is provided 19606 in response to detection. In some aspects, the device under test may be configured to provide a notification of a detected error. According to at least one aspect, the one or more devices 19400 may be configured to provide a notification of a detected error. The device under test and the one or more devices 19400 may, in some aspects, be configured to collectively provide a notification of a detected error. In at least one aspect, notification of a detected error may be provided to various entities including one or more components of the device under test (e.g., GUI), one or more devices 19400, among others.

With continued reference to FIG. 196, a conformance test 19608 of the device under test may, in some aspects, be performed when it is determined that no errors and/or non-critical errors were detected in performing the one or more countermeasures. In some aspects, conformance testing may include the in-field diagnostic process of the device under test 19504 or any portion(s) thereof. According to some aspects, conformance testing may focus on the one or more components of the device under test to which one or more countermeasures were applied. Thus, a conformance test may, in some aspects, provide a confirmation that the one or more countermeasures addressed one or more issues detected thorough the in-field diagnostic process.

FIG. 197 shows a process 19700 for performing a conformance test of a device under test (e.g., terminal device 102, vehicular communication device 500, among others) according to some aspects. As shown in FIG. 197, process 19700 may begin with a determination that one or more components of the device under test are to be augmented 19702. In some aspects, augmentation may include any of the countermeasures described herein, for example those described with respect to FIG. 195. Upon determining that one or more components of a device under test is to be augmented, one or more components may be notified 19704. According to at least one aspect, the one or more components to be augmented may be disabled in response to receiving such a notification. After the one or more components of the device under test are augmented, a conformance test of the one or more components may be performed 19706. As noted above, conformance testing of the one or more component of the device under test may include the in-field diagnostic process described herein, for example those described with respect to FIG. 195 or any portion(s) thereof.

FIG. 198 shows a process 19800 for performing an OTA update process for terminal device 102 and/or vehicular communication device 500 according to some aspects. As shown in FIG. 198, process 19800 may begin with a determination as to whether one or more OTA updates are available 19802. In some aspects, terminal device 102 and/or vehicular communication device 500 may be configured to request whether or not an OTA update is available. According to some aspects, the one or more devices 19400 may be to determine whether an OTA update is available for terminal device 102 and/or vehicular communication device 500 based on an identification information associated therewith. Upon determining its availability, an OTA update for terminal device 102 and/or vehicular communication device 500 may be performed 19804 using any of the methods described herein. After performing the OTA update, an action may be performed based on the update 19806. For instance, a conformance test may, in some aspects, be performed for one or more components, which are associated with the OTA update. In at least one aspect, one or more signals may be transmitted and/or received by terminal device 102 and/or vehicular communication device 500 in response to the OTA update. According to some aspects, terminal device 102 and/or vehicular communication device 500 may be configured to send a confirmation message to a provider of the OTA update (e.g., one or more devices 19400).

FIG. 199 is an exemplary message sequence chart 19900 showing the exchange of messages between device under test (e.g., terminal device 102, vehicular communication device 500, among others) and the radio communication network 100. As shown in FIG. 199, the device under test may be configured initiate a test sequence 19902. In some aspects, this may include providing a message to the radio communication network 100 in response to detecting one or more events. According to at least one aspect, the detection of one or more events may, for instance, be performed according to one or more aspects described herein, for example those described in connection with FIG. 195. Responsive thereto, the radio communication network 100 may, in some aspects, be configured to provide one or more reference signals 19904 to the device under test over a downlink communication channel. In response to receiving the one or more reference signals 19904, the device under test may be configured to analyze the one or more reference signals and determine if one or more countermeasures are to be performed 19906. In at least one aspect, the analysis of one or more reference signals and/or determination as to whether one or more countermeasures are to be applied may, for instance, be performed according to one or more aspects described herein, for example those described in connection with FIG. 195.

With continued reference to FIG. 199, the device under test may be configured to send one or more reference signals 19908 to the radio communication network 100 in response to this analysis and determination 19906. Upon receipt, the radio communication network 100 may be configured to perform an analysis of the one or more reference signals from the device under test 19910. An analysis result may be reported 19912 by the radio communication network 100 upon such a determination. The device under test may be configured to evaluate the analysis result from the radio communication network 100 and determine if one or more countermeasures should be applied 19914. As previously noted, the analysis of one or more reference signals and/or determination as to whether one or more countermeasures are to be applied may, for instance, be performed according to one or more aspects described herein, for example those described in connection with FIG. 195.

FIG. 200 shows an exemplary method 20000 for communicating over a radio communication network in accordance with some aspects. In method 20000 for communicating over a radio communication network, the method includes identifying one or more components to be modified 20002, applying one or more countermeasures based on the identification of the one or more components to be modified 20004, and communicating based on the performed one or more countermeasures 20006.

FIG. 201 shows an exemplary method 20100 for communicating over a radio communication network in accordance with some aspects. In method 20100 for communicating over a radio communication network, the method includes applying one or more countermeasures based on an identification of one or more components to be modified 20102, and communicating based on the performed one or more countermeasures 20104.

In-Field Diagnostics and Calibration

Vehicular communication devices have emerged into the market with data connection rates provided by next-generation broadband networks. Equipped with next-generation data connection rates, vehicular communication devices may be configured to access road infrastructure data to promote safety, energy efficiency and/or enhanced user experience, among others. In addition to supporting next-generation data connection rates, one or more components of a vehicular communication device (e.g., cellular modem) may facilitate the introduction of advanced telematics and connected infotainment features. Thus, smartphone connectivity may be provided to users for a wide array of connected devices, including their car.

Unlike conventional components designed for smartphones, the lifecycle of the components in a vehicular communication device may be designed to exceed that of some consumer electronics. This difference suggests the effect of aging on components within a vehicular communication device merits consideration. For example, the degradation of modem transistors over time may lead to decreased switching speeds, or even to component failures. Further, as transistors are scaled to smaller geometries, speed and transistor density increase, whereas active power per transition may decrease. Coupled with the aging effect, however, the probability that a component could exhibit adverse performance or even experience a catastrophic failure increases with scaling.

Another technical problem lies in hardware complexity. A component, such as a cellular modem, in a vehicular communication device may target a higher data rate and shorter latency that that of legacy modems (e.g., FM, DVB, DAB, WiFi). In view of this added complexity, one or more components of a vehicular communication may susceptible to the effects of aging.

FIG. 193 shows an exemplary internal configuration of radio communication arrangement 504 and antenna system 506 of a vehicular communication device 500 according to some aspects. As shown in FIG. 193, radio communication arrangement 504 may include a baseband integrated circuit 19302, a baseband RF integrated interface circuit 19304, RF integrated circuit 19306, RF integrated circuit 19308, envelope tracking (ET) integrated circuit 19310, ET integrated circuit 19312, LNA bank 19314, LNA bank 19316, PA integrated circuit 19318, PA integrated circuit 19320, duplexer 19322, and duplexer 19324. Although a baseband integrated circuit 19302, a baseband RF integrated interface circuit 19304, RF integrated circuit 19306, RF integrated circuit 19308, ET integrated circuit 19310, ET integrated circuit 19312, LNA bank 19314, LNA bank 19316, PA integrated circuit 19318, PA integrated circuit 19320, duplexer 19322, and duplexer 19324 are illustrated in radio communication arrangement 504, some aspects may employ additional or fewer baseband integrated circuits, baseband RF integrated circuits, RF integrated circuits, ET integrated circuits, LNA banks, PA integrated circuits, duplexers and/or other elements.

With continued reference to FIG. 193, RF integrated circuit 19306 may, in some aspects, be configured for a first set of frequency bands, whereas RF integrated circuit 19308 may be configured for a second set of frequency bands. According to at least one aspect, the first set of frequency bands may be the same set of frequency bands as the second set of frequency bands. The first set of frequency bands may, in some aspects, be mutually exclusive from the second set of frequency bands. In at least one aspect, the first set of frequency bands may overlap, at least in part, in frequency with the second set of frequency bands.

With continued reference to FIG. 193, antenna system 506 may include antenna tuner 19326. Although antenna tuner 19326 is illustrated in antenna system 506, some aspects may employ additional or fewer antenna tuners and/or other elements. As previously described with respect to FIG. 6, antenna system 506 may also include a single antenna, an antenna array that includes multiple antennas, an analog antenna combination and/or beamforming circuitry.

While certain aspects are described herein in the context of a vehicular communication device 500, it should be noted that a terminal device 102 and a terminal device implemented 102 as a vehicular communication device 500 may face similar challenges due to overlapping design constraints. For instance, one or more components of a vehicular communication device 500 may, in some aspects, be configured in accordance with one or more communication protocols of radio communication network 100. According to at least one aspect, the number of external RF font end components in a cellular modem of a vehicular communication device 500 may increase with respect to the number of frequency bands supported by the radio communication network 100. In this regard, a TX feedback receiver may, in some aspects, be added within the cellular modem to communicate in accordance with one or more communication protocols of the radio communication network 100. In at least one aspect, the additional TX feedback receiver may be configured to perform closed loop power control to achieve a power ramping time within 1 ms (70 μs for LTS sounding reference signals (SRS)). While the preceding example is merely illustrative in nature, the added hardware complexity may contribute to the effect of aging on one or more components of a vehicular communication device 500. Accordingly, conventional diagnostics performed on vehicular communication device 500 or even terminal device 102 insufficient in detecting the effect(s) of aging because such diagnostics occur prior to mass deployment.

In view of the foregoing, in some aspects, providing a framework for in-field diagnostics and in-field calibration may be beneficial. In some aspects, an in-field diagnostic process may detect one or more issues (e.g., hardware, software, hardware and/or software, among others) within a terminal device 102. A detected issue may, for instance, be attributable to one or more components of a terminal device 102, such as a failing RF front-end component, a drift in the clock of a local frequency oscillator, among others. According to at least one aspect, an in-field calibration process may be performed to compensate for an issue detected through the in-field diagnostic process. An in-field calibration process may, in some aspects, address one or more issues that are detected through an in-field diagnostic process. As a result, the added burden of, for instance, uninstalling a component and sending it back to the factory can be avoided.

Terminal device 102 may be configured to interface with one or more devices for in-field diagnostics and/or in-field calibration. FIG. 194 shows an exemplary configuration in accordance with some aspects where terminal device 102 interface with one or more devices 19400. As shown in FIG. 194, for instance, terminal device 102 may be configured to communicate with network access node 110, terminal device 104, and/or itself. Although terminal device 102 may interface with network access node 110, terminal device 104, and/or itself as shown in FIG. 194, some aspects may employ additional or fewer interfaces with network access nodes, terminal devices, and/or other devices.

In some aspects, the one or more devices 19400 may include a terminal device, a vehicular communication device, a network access node, a core-network entity, an authentication entity, an Internet of Things (IoT) device, a road side unit (RSU), a drone, an IoT fuel pump, an electric-vehicle charging station, automotive service/repair station equipment, and/or network service provider equipment, among others. According to at least one aspect, the one or more devices 19400 may be included in the radio communication network 100. Additionally or alternatively, the one or more devices 19400 may be included on an external data network. As further described herein, the one or more devices 19400 may, in some aspects, be "certified" to facilitate in-field diagnostics and/or in-field compensatory measures.

Terminal device 102 and the one or more devices 19400 may, in some aspects, be configured to communicate via one or more of the radio communication technologies described herein. According to at least one aspect, terminal device 102 may be configured to communicate with network access node 110 through interface 19402. Interface 19402 may, for instance, include an uplink communication channel and/or a downlink communication channel. In some aspects, terminal device 102 may be configured to communicate with terminal device 104 through interface 19404. Interface 19404 may, for example, include a peer-to-peer communication link, such as 3GPP sidelink based D2D, V2V communications, Bluetooth, BTLE, WiFi Direct, among others.

Terminal device 102 may, in some aspects, be configured to communicate with itself via interface 19406. Interface 19406 may, for instance, include an internal TX-RX feedback path, an external feedback loop, among others. According to at least one aspect, the transmitter and receiver of terminal device 102 may be configured to operate (e.g., concurrently) on the same carrier frequency. By operating on the same frequency, the transmitted signals may, in some aspects, be routed into the receiver within the same hardware platform of terminal device 102.

In some aspects, an in-field diagnostic and/or an in-field calibration may be implemented by executing one or more run-time processes. According to at least one aspect, terminal device 102 may be configured to execute at least a portion of an in-field diagnostic process and/or an in-field calibration process of terminal device 102. For instance, terminal device 102 may, in some aspects, be configured to execute at least a portion of in-field diagnostic process and/or an in-field calibration process in an unsupervised mode of operation. In at least one aspect, the one or more devices 19400 may be configured to facilitate at least a portion of the in-field diagnostic process and/or an in-field calibration process of terminal device 102. According to some aspects, the one or more devices 19400 may, for instance, be configured to execute at least a portion of the in-field diagnostic process and/or an in-field calibration process of terminal device 102 in a supervised mode of operation.

An unsupervised mode of operation may, in some aspects, be performed without the assistance of the one or more devices 19400. According to at least one aspect, however, the unsupervised mode of operation may include some form of communication with the one or more devices 19400. In some aspects, the terminal device 102 may be configured exchange one or more messages with the radio communication network 100 in the unsupervised mode of operation concurrently with the in-field diagnostic process and/or an in-field calibration process of terminal device 102. In at least one aspect, the one or more messages may include an intra-frequency measurement report to a network access node 110 during an idle state connection therewith.

In some aspects, the supervised mode of operation may, for instance, be performed with the assistance of the one or more devices 19400. According to at least one aspect, the one or more devices 19400 may be configured to control at least a portion of the in-field diagnostic process and/or an in-field calibration process of terminal device 102 in the supervised mode of operation. The one or more devices 19400 may, in some aspects, be configured to issue one or more instructions to terminal device 102 in the supervised mode of operation concurrently with the in-field diagnostic process and/or an in-field calibration process of terminal device 102.

An in-field diagnostic process and/or an in-field calibration process of terminal device 102 may, in some aspects, be a software-defined radio (SDR) component implemented by one or more processors configured to execute software-defined instructions. Although certain aspects herein may describe the in-field diagnostic process and/or an in-field calibration process from the perspective of a terminal device 102, the in-field diagnostic process and/or an in-field calibration process, or any portion(s) thereof, may be executed in the terminal device 102 and the one or more devices 19400, individually or collectively. In some aspects, one or more processors of terminal device 102 (e.g., digital signal processor 208, controller 210, application processor 212, among others) and/or the one or more devices 19400 (e.g., radio transceiver 304, physical layer processor 308, protocol controller 310, among others) may be configured to execute at least a portion of the in-field diagnostic process and/or an in-field calibration process of terminal device 102.

FIG. 202 shows an exemplary in-field diagnostic process 20200 of a device under test (e.g., terminal device 102) according to some aspects. As shown in FIG. 202, in-field diagnostic process 20200 may include the detection of one or more events 20202 associated with the device under test. Upon detecting one or more events 20202 associated with the device under test, the in-field diagnostic process 20200 may further include the execution of one or more test signals 20204. After executing one or more test signals 20204, the in-field diagnostic process 20200 may further include an evaluation of the result(s) of the one or more test signals 20206. In response to evaluating the result(s) of the one or more test signals 20206, the in-field diagnostic process 20200 may further include an update to the status of one or more components 20208 of the device under test. Upon updating the status of the one or more components 20208 of the device under test, the in-field diagnostic process 20200 may further include a determination of whether one or more in-field diagnostic process criteria is satisfied 20210. If it is determined that the in-field diagnostic process criteria is satisfied 20210, the in-field diagnostic process 20200 may be completed 20212. If, however, it is determined that the in-field diagnostic process criteria is not satisfied 20210, the in-field diagnostic process 20200 may further include the selection of one or more additional test signals for execution 20212. Upon selecting one or more additional test signals for execution 20212, the in-field diagnostic process criteria 20200 may transition to the execution of one or more test signals 20204.

In some aspects, the detection of one or more events 20202 may be based one or more conditions, factors, triggers and/or events described herein. According to at least one aspect, the detection of one or more events 20202 may be based on a timing (e.g., countdown timer, time stamp, among others) since a last diagnostic and/or calibration was performed. The detection of one or more events 20202 may, in some aspects, be based on one or more key performance indicators (e.g., RSSI, PLR, PER, BER, BLER, MoU, among others). For instance, one or more key performance indicators may be compared against one or more predetermined criteria to determine whether one or more events 20202 has occurred, is occurring, and/or is likely to occur in the future. In at least one aspect, the detection of one or more events 20202 may be determined based on a user's input. By way of illustrative example, terminal device 102 may be configured to detect an event has occurred in response to a user's input to initiate a diagnostic process of terminal device 102. According to some aspects, the detection of one or more events 20202 may be based on the one or more devices 19400. Terminal device 102 may be configured to detect an event has occurred based on information from terminal device 104 and/or network access node 110. When terminal device 102 is implemented as a vehicular communication device 500, the terminal device 102 may, in some aspects, be configured to detect an event has occurred based on information from a data center of a manufacturer of the vehicular communication device 500. According to at least one aspect, the data center may monitor (e.g., periodically) one or more KPI of the terminal device 102 and trigger one or more events 20202 therein based on a comparison against one or more predetermined criteria (e.g., KPI is greater than or equal to a threshold).

One or more test signals may be executed 20204 as a part of the in-field diagnostic 20200 of the device under test. Before execution may occur, the one or more test signals may be obtained from a memory. According to at least one aspect, the memory may be local to terminal device 102 (e.g., pre-loaded to memory 214) and/or external to terminal device 102. The memory may, in some aspects, be local to the one or more devices 19400 and/or external to the one or more devices 19400. In at least one aspect, terminal device 102 may be configured to obtain the one or more test signals by transmitting a request to terminal device 104, network access node 110, one or more internal servers within the radio communication network 100, and/or one or more external servers to the radio communication network 100, among others. According to some aspects, the one or more devices 19400 may be configured to obtain the one or more test signals by transmitting a request to terminal device 102, one or more internal servers within the radio communication network 100, and/or one or more external servers to the radio communication network 100, among others.

In some aspects, terminal device 102 and/or the one or more devices 19400 may be configured to execute the one or more test signals. According to at least one aspect, the execution of one or more test signals may include processing, transmitting and/or receiving one or more test signals. The one or more test signals may, in some aspects, be implemented in accordance with a standardized communication protocol (e.g., 3G, LTE, among others) or a non-standardized approach.

Terminal device 102 and/or the one or more devices 19400 may, for instance, be configured to define at least one aspect of the one or more test signals in a standardized and/or non-standardized approach. According to at least one aspect, the one or more test signals may include one or more waveforms (e.g., sine wave, cosine wave, pulse wave, square wave, among others) in which the amplitude, phase, frequency, start and/or stop of the one or more test signals may be varied over time. In some aspects, terminal device 102 may have more flexibility in defining the one or more test signals in the non-standardized approach when the one or more test signals are received through the internal TX-RX feedback path because the one or more signals are not transmitted over the air interface.

After executing one or more test signals 20204, the in-field diagnostic process 20200 may further include an evaluation of the result(s) of the one or more test signals 20206. In some aspects, terminal device 102 and/or the one or more devices 19400 may be configured to perform at least a portion of the evaluation of the one or more test signals 20204. According to at least one aspect, terminal device 102 and/or the one or more devices 19400 may be configured to transmit and/or receive one or more measurements of the one or more test signals 20206. The terminal device 102 and/or the one or more devices 19400 may, in some aspects, be configured to compare the one or more measurements (e.g., spur, spectrum mask, spectrum flatness, frequency offset, error vector magnitude (EVR), adjacent channel leakage ratio (ACLR) derivation, among others) to one or more predetermined criteria (e.g., thresholds, waveforms, among others).

In some aspects, the one or more test signals may be organized and included within one or more test patterns to facilitate the comparison of their respective results. FIG. 203 shows an exemplary evaluation 20300 in accordance with some aspects where various test patterns are designed to test the performance of one or more components of terminal device 102. As shown in FIG. 203, evaluation 20300 includes an evaluation of test pattern 20302, test pattern 20304, test pattern 20306, and test pattern 20308. Although test pattern 20302, test pattern 20304, test pattern 20306, and test pattern 20308 are illustrated in FIG. 203, some aspects may employ additional or fewer test patterns.

Each test pattern may be configured to test the performance of one or more components of terminal device 102. In FIG. 203, test pattern 20302 is illustrated as being configured to test the performance of LNA 19314 and PA 19318, whereas test pattern 20304 is depicted as being configured to test the performance of LNA 19314 and PA 19320. By way of contrast, test pattern 20306 is shown in FIG. 203 to test the performance of LNA 19316 and PA 19318, whereas test pattern 20308 is graphically representative of testing the performance of LNA 19316 and PA 19320. While each of the test patterns illustrated in FIG. 203 is configured to test two components of the terminal device 102, some aspects may employ additional or fewer components of terminal device 102 being tested by each test pattern.

A result of evaluating the one or more test signals may take various forms. In some aspects, the one or more test signals may result in a hard decision (e.g., pass decision or fail decision), or a soft decision (e.g., probabilistic expression) for one or more components of terminal device 102. According to at least one aspect, a hard decision may represent a binary decision and/or have a degree of certainty associated therewith. A pass decision may, in some aspects, represent a decision between a pass decision and a fail decision. In one illustrative example, a hard decision may be associated with a first degree of certainty (e.g., 75%) that one or more components of terminal device 102 passed a particular test. In at least one aspect, a soft decision may be associated with a second degree of certainty (e.g., 50%) that one or more components of terminal device 102 passed a particular test. According to some aspects, a fail decision may be associated with a third degree of certainty (e.g., 25%) that one or more components of terminal device 102 has passed a particular test. Although certain aspects herein describe three types of decisions resulting from the one or more test signals, some aspects may employ additional or fewer types of decisions.

In some aspects, each of the degrees of certainty may represent or be expressed as a value (e.g., numerical percentage), a plurality of values, a range of values, a plurality of ranges of values, and/or mathematical equation, for example. When expressed as a value, for instance, the first degree of certainty may be greater than or equal to the second degree of certainty, whereas the second degree of certainty may be greater than or equal to the third degree of certainty. According to at least one aspect, one or more results may be combined (e.g., added, subtracted, multiplied, filtered by a step function, among others) in order to narrow down which component(s) of terminal device 102 is at fault. In at least one aspect, terminal device 102 and/or the one or more devices 19400 may be configured to evaluate the result(s) of the one or more test signals 20206 based on data associated with a single result or a combined set of results (e.g., using a look-up table). In this fashion, a single result or a plurality of results may be used to inform a decision about a component of terminal device 102.

With continued reference to FIG. 203, the unshaded portions surrounding test pattern 20302 and test pattern 20304 are illustrative of a pass decision. In contrast, the shaded portions surrounding test pattern 20306 and pattern 20308 are illustrative of a fail decision. As shown in FIG. 203, LNA 19314 is illustrated as receiving a pass decision for test pattern 20304 and test pattern 20306. PA 19318 is depicted as receiving a pass decision for test pattern 20302 and a fail decision for test pattern 20306. PA 19320 is shown to receive a pass decision for test pattern 20304 and a fail decision for test pattern 20308. LNA 19316 is graphically represented as receiving a fail decision for test pattern 20306 and a fail decision for test pattern 20308. Based on these test patterns, terminal device 102 and/or the one or more devices 19400 may be configured to determine that LNA 19316 is the most likely to be a fault.

In response to evaluating the result(s) of the one or more test signals 20206, the in-field diagnostic process 20200 may further include an update to the status of one or more components 20208. With continued reference to FIG. 203, terminal device 102 and/or the one or more devices 19400 may, in some aspects, be configured to update the status of one or more components of terminal device 102. According to at least one aspect, the status of LNA 19316 may be updated with a fail decision (e.g., fault), whereas LNA 19314, PA 19318 and/or PA 19320 may updated with a pass decision. Additionally or alternatively, the status of each of these components may be updated with a respective degree of certainty of passing one or more these test patterns.

Upon updating the status of the one or more components 20208 of the device under test, the in-field diagnostic process 20200 may further include a determination of whether one or more in-field diagnostic process criteria is satisfied 20210. In some aspects, the in-field diagnostic process criteria may include determining whether a predefined number of the one or more components of the device under test have been evaluated. In this regard, terminal device 102 and/or the one or more devices 19400 may be configured to determine whether a degree of certainty associated with one or more components of terminal device 102 satisfies a predetermined condition (e.g., threshold).

In some aspects, the in-field diagnostic process criteria may include determining whether a predetermined number of iterations of the diagnostic process has been reached. According to at least one aspect, terminal device 102 may be configured to receive a user's input indicative of the predetermined number of iterations of the diagnostic process. Additionally or alternatively, this information may be determined based on a remaining battery power level of the device under test, a remaining battery power level of the one or more devices 19400, a manufacture of the device under test, a network operator, and/or an entity on an external data network.

If it is determined that the in-field diagnostic process criteria is satisfied 20210, the in-field diagnostic process 20200 may be completed 20212. In some aspects, terminal device 102 may be designated as "certified" if one or more test patterns are passed. According to at least one aspect, the terminal device 102 may be configured to facilitate the in-field diagnostic process of an "uncertified" terminal device. This certification process may be implemented by one or more aspects described herein.

If, however, it is determined that the in-field diagnostic process criteria is not satisfied 20210, the in-field diagnostic process 20200 may further include the selection of one or more additional test signals for execution 20214. In some aspects, it may be inefficient to execute all available test patterns before subsequently evaluating and/or combining on e or more results thereof. For instance, such an inefficiency could arise when the number of available test patterns is extraordinarily large. According to at least one aspect, a sub-set of test patterns may instead be first executed and evaluated to reduce the search space of component candidates at fault. Based on these results, terminal device 102 and/or the one or more devices 19400 may be configured to select one or more additional test signals in order to test the performance one or more components of terminal device 102 within the reduced search space. The in-field diagnostic process 20200 may be repeated until one or more diagnostic process criteria is satisfied 20210.

As previously mentioned, terminal device 102 and/or one or more devices 19400 may be configured to execute at least a portion of an in-field calibration process of terminal device 102. In some aspects, the in-field calibration process of terminal device 102 may be performed in response to the completion of the in-field diagnostic process 20200 of terminal device 102.

FIG. 204 shows an exemplary internal configuration of radio communication arrangement 504 and antenna system 506 of implemented as vehicular communication device 500 according to some aspects. As shown in FIG. 204, radio communication arrangement 504 may include a baseband integrated circuit 19302, RF integrated circuit 19306, ET integrated circuit 19310, PA integrated circuit 19318, switch 20402, duplexer 19322, and duplexer 19324. Although a baseband integrated circuit 19302, ET integrated circuit 19310, PA integrated circuit 19318, switch 20402, duplexer 19322 are illustrated in radio communication arrangement 504, some aspects may employ additional or fewer baseband integrated circuits, RF integrated circuits, ET integrated circuits, PA integrated circuits, switches, duplexers and/or other elements.

In some aspects, the effect of aging on ET integrated circuit 19310 may result in one or more delays on the amplitude modulation (AM) path. This may, in some aspects, degrade the quality of the transmit (TX) signal upon amplification. In at least one aspect, vehicular communication device 500 may be configured to perform an in-field calibration process 20400 to address the effect of aging on ET integrated circuit 19310. For instance, vehicular terminal device 500 may be configured to determine a new delay compensation setting for the ET integrated circuit 19310.

As shown in FIG. 204, in-field calibration process 20400 may be performed by one or more components of the vehicular communication device 500. In some aspects, the RF integrated circuit 19306 may be configured to adjust a delay compensation setting 20404 of the ET 19310. According to at least one aspect, switch 20402 may be configured to route the TX signal back through the RX path in an internal TX-RX feedback path 20406. The RF integrated circuit 19306 may, in some aspects, be further configured to receive the TX signal and measure one or more characteristics (e.g., spur, EVR, ACLR derivation, among others) of the received TX signal 20408. In at least one aspect, the RF integrated circuit 19306 may be configured to evaluate the one or more measured characteristics of the received TX signal, and generate a new delay compensation setting 20410 of the ET 19310 based on the evaluation. According to some aspects, the in-field diagnostic calibration process 20400 may be performed iteratively until the one or more measurements satisfies one or more prescribed criteria (e.g., predetermined thresholds).

Once the recalibration process of a device is completed (e.g., successful), the device may, in some aspects, be configured to repeat a diagnostic process (e.g., in-field diagnostic process 20200) as a verification step. As previously mentioned, a device (e.g., terminal device 102, vehicular communication device 500, among others) may be designated as "certified" if one or more test patterns are passed of the in-field diagnostic process. According to at least one aspect, terminal device 102 may, for instance, be configured to generate a certificate upon completing an in-field diagnostic and/or an in-field calibration. Additionally or alternatively, terminal device 102 may be configured to receive a certificate from the one or more devices 19400 (e.g., external server) based on an evaluation the results of the in-field diagnostic and/or the in-field calibration. Upon certification, the terminal device 102 may be configured to facilitate at least a portion of an in-field diagnostic process and/or of an in-field calibration process of an "uncertified" terminal device in a supervised mode of operation.

FIG. 205 shows an exemplary network configuration 20500 in accordance with some aspects where terminal device 102 and one or more devices 19400 are certified. As shown in FIG. 205, network configuration 20500 includes network access node 110, terminal device 102, and terminal device 104, and terminal device N. Although a network access node 110, terminal device 102, and terminal device 104, and terminal device N are illustrated in network configuration 20500, some aspects may employ additional or fewer network access nodes, terminal devices and/or other elements. For instance, one or more devices 19300 may be configured to act as an intermediary to relay (e.g., pass-through), monitor (e.g., scan for one or more viruses), verify (e.g., perform a redundant operation or authenticate) and/or modify (e.g., update, correct, or the like) data exchanged between network access node 110, terminal device 102, terminal device 104, and/or terminal device N.

In some aspects, network access node 110 may be configured to perform at least a portion of an in-field diagnostic and/or in-field calibration of terminal device 102 in a supervised mode of operation 20502. According to at least one aspect, terminal device 102 may be configured to receive a certificate from the network access node 110 based on completion of the in-field diagnostic and/or the in-field calibration. Additionally or alternatively, terminal device 102 may be configured to change its status to "certified" 20504 based on completion of the in-field diagnostic and/or the in-field calibration.

Upon certification, terminal device 102 and/or network access node 110 may, in some aspects, be configured to perform at least a portion of an in-field diagnostic and/or an in-field calibration of terminal device 104 in a supervised mode of operation 20506. According to at least one aspect, terminal device 104 may be configured to receive a certificate from terminal devices 102 and/or network access node 110 based on completion of the in-field diagnostic and/or the in-field calibration. Additionally or alternatively, terminal device 104 may be configured to change its status to "certified" 20508 based on completion of the in-field diagnostic and/or the in-field calibration.

Although network access node 110, terminal device 102, terminal device 104, and terminal device N are illustrated in a series configuration, some aspects may employ other configurations. In some aspects, the above-described certification procedure, or any portion(s) thereof, may be performed in a sequential and/or parallel manner. According to at least one aspect, terminal device 102 may be configured to perform an in-field diagnostic, or any portion(s) thereof, of terminal device N, whereas terminal device 104 may be configured to perform an in-field calibration, or any portion(s) thereof, of terminal device N, or vice versa. Some portion(s) of the in-field diagnostic of terminal device N may, in some aspects, be separate in time (e.g., mutually exclusive) or overlap in time (e.g., concurrent processes, or the like) from the in-field calibration of terminal device N. Eventually, terminal device N may be configured to change its status to "certified" 20510 based on completion of the in-field diagnostic and/or the in-field calibration of terminal device N. The aforementioned processes may not only offload some of the burden on finite resources of the radio communication network 100, they may, in some aspects, reduce the amount of calibration equipment provided by a network operator.

The supervised mode of operation may, in some aspects, provide a certain degree of assurance that a supervisor device (e.g., master) passed an in-field diagnostic and/or in-field calibration (e.g., within a predetermined period). Through this interaction, a device under test (e.g., terminal device 102) may receive a tested baseline for RF parameters to facilitate an in-field diagnostic and/or an in-field calibration in a supervised mode. In at least one aspect, the supervised mode of operation may further provide a mechanism to more easily detect certain issues, such as oscillator drift and frequency offset.

In some aspects, the one or more devices 19400 may be verified before a supervised mode of operation may be established. According to at least one aspect, the one or more devices 19400 may be configured to receive a certificate after an in-field diagnostic process and/or an in-field calibration is performed on the one or more devices 19400. The terminal device 102 may be configured to receive a copy of this certificate from the one or more devices 19400 to verify the supervised mode of operation may be established. This certificate may be valid for a predetermined period (e.g., from issuance) and/or valid for a predefined number (e.g., 2) of uses in a supervised mode of operation.

Another technical problem may be the challenge of predicting the types of faults which may occur during the life time of a device. In at least one aspect, an in-field diagnostic process and/or an in-field calibration process may be reconfigured such that their respective algorithms may be updated through software. (e.g., by an OTA update process described herein) According to some aspects, a software-designed check entity (SDCE) may implemented as one or more processors of, for instance, terminal device 102, which are configured to execute software-defined instructions in order to download one or more updates from the radio communication network 100 or from an external data network. The one or more updates may, in some aspects, include an update to the in-field diagnostic process and/or the in-field calibration process of terminal device 102. Upon execution, the software defined instructions may further be configured to generate one or more test signals and analyze the results received therefrom. In this regard, two implementations are shown in FIGS. 206 and 207.

FIG. 206 shows an exemplary internal configuration 20600 of radio communication arrangement 504 in accordance with some aspects. As shown in FIG. 206, blocks A-E may represent one or more components of the transmission path, whereas blocks F-J represent one or more components of the reception path. In some aspects, SDCE 20602 may be configured to communicate with one or more of blocks A-E of the transmission path and one or more of blocks F-J of the reception path. According to at least one aspect, switch 20402 may be configured to route the TX signal to the RX path by way of an internal TX-RX feedback path 20406. SDCE 20602 may, in some aspects, be configured to generate one or more test signals and analyze the results therefrom for various combinations of the one or more blocks A-E of the transmission path and the one or more blocks F-J of the reception path. In at least one aspect, SDCE 20602 may be configured to apply one or more updated in-field diagnostic process and/or one or more updated in-field calibration processes to blocks A-F.

FIG. 207 shows an exemplary internal configuration 20700 of radio communication arrangement 504 in accordance with some aspects. As shown in FIG. 207, blocks A-E may represent one or more components of the transmission path, whereas blocks F-J represent one or more components of the reception path. In some aspects, SDCE 20702 may be configured to communicate with an input to blocks A-E of the transmission path and an output of blocks F-J of the reception path. According to at least one aspect, switch 20402 may be configured to route the TX signal to the RX path by way of an internal TX-RX feedback path 20406. Provided this configuration, SDCE 20602 may, in some aspects, be configured to generate one or more test signals for and analyze the results received from an input to blocks A-E of the transmission path and an output of blocks F-J of the reception path. In at least one aspect, SDCE 20602 may be configured to apply one or more updated in-field diagnostic process and/or one or more updated in-field calibration processes to blocks A-F.

In some aspects, the in-field diagnostic process and/or in-field calibration process may be implemented without a change to one or more communication protocols (e.g., 3GPP) of the radio communication network 100 when self-diagnostic and/or self-calibration are applied. According to at least one aspect, various actions may be taken by the device under test to ensure compatibility with the one or more communication protocols. The device under test (e.g., terminal device 102) may, in some aspects, be configured to terminate one or more connections with one or more other devices (e.g., one or more devices 19400). In at least one aspect, certain connections with the one or more devices 19400 may be maintained in an assistance mode of operation to facilitate at least a portion of the in-field diagnostic process and/or the in-field calibration process.

Communication protocol (e.g., 3GPP) support may, in some aspects, be implemented through one or more new modes of operation: (i) RRC_DIAGNOSTICS mode; and (ii) RRC_CALIBRATION mode. According to at least one aspect, RRC_DIAGNOSTICS mode may be triggered by the radio communication network 100 via a single communication link (e.g., direct link), a plurality of communication links (e.g., multi-cast link), and/or a broadcast link to check of the characteristics (e.g., filter shape, out-of-band (OOB) radiation, carrier frequency stability, among others) of one or more devices of the radio communication network 100. Depending upon the results of in-field diagnostic, a device under test may, in some aspects, be configured to perform an internal re-calibration or a re-calibration enforced by the radio communication network 100 through the RRC_CALIBRATION mode. In at least one aspect, divergent characteristics (e.g., as a result of aging effects) may be addressed through one or more in-field re-calibration processes.

In some aspects, a target device may be in a "FULLY_OPERATIONAL" (or alternatively "CERTIFIED") mode (or UE category). According to at least one aspect, the radio communication network 100 may be configured to enforce the status of a device to "CALIBRATION_REQUIRED" (or alternatively "LIMITED_CERTIFICATION" or "UNCERTIFIED") when the requirement for a re-calibration is detected. This status may, in some aspects, force the device under test to operate with limited communication functionality. In at least one aspect, limit communication functionality may be limited to those which are required to execute the calibration and to exchange the corresponding data (e.g., transmission of diagnostics/calibration results and/or reception of triggers for initiating the calibration) with the radio communication network 100. According to some aspects, voice communication and/or data communication may not be permitted when the device under test is operating in the "CALIBRATION_REQUIRED" mode.

FIG. 208 is an exemplary message sequence chart 20800 showing the exchange of messages between terminal device 102 and the radio communication network 100. In some aspects, terminal device 102 may interface with the radio communication network 100 through network access node 110. As shown in FIG. 208, one or more components of the radio communication network 100 may be configured to detect one or more events 20802. According to at least one aspect, the detection of one or more events 20802 may, for instance, be performed according to one or more aspects described in connection with FIG. 202.

In response to one or more events being detected 20802 by the radio communication network 100, the radio communication network 100 may, in some aspects, be configured to instruct the terminal device 102 enter the RRC_DIAGNOSTIC mode 20804 over a downlink communication channel. According to at least one aspect, this instruction may specify the manner in which terminal device 102 is to report to the radio communication network 100. Terminal device 102 may, in some aspects, be configured to perform an in-field diagnostic process (e.g., in-field diagnostic process 20200) and provide a diagnostic report 20808 to the radio communication network 100 after entering the RRC_DIAGNOSTIC mode 20806.

Upon receipt, the radio communication network 100 may, in some aspects, evaluate the received diagnostic report and determine whether calibration is required. According to at least one aspect, the radio communication network 100 may be configured to instruct the terminal device 102 to end the RRC_DIAGNOSTIC mode 20812 when no calibration is required 20810. In some aspects, the terminal device 102 may be configured to end the RRC_DIAGNOSTIC mode 20814 in response to the receipt of this instruction.

FIG. 209 is an exemplary message sequence chart 20900 showing the exchange of messages between terminal device 102 and the radio communication network 100. In some aspects, terminal device 102 may interface with the radio communication network 100 through network access node 110. As shown in FIG. 209, one or more components of the radio communication network 100 may be configured to detect one or more events 20802. According to at least one aspect, the detection of one or more events 20802 may, for instance, be performed according to one or more aspects described in connection with FIG. 202.

In response to one or more events being detected 20802 by the radio communication network 100, the radio communication network 100 may, in some aspects, be configured to instruct the terminal device 102 enter the RRC_DIAGNOSTIC mode 20804 over a downlink communication channel. According to at least one aspect, this instruction may specify the manner in which terminal device 102 is to report to the radio communication network 100. Terminal device 102 may, in some aspects, be configured to perform an in-field diagnostic process and provide a diagnostic report 20808 to the radio communication network 100 after entering the RRC_DIAGNOSTIC mode 20806.

Upon receipt, the radio communication network 100 may, in some aspects, evaluate the received diagnostic report and determine whether calibration is required. According to at least one aspect, the radio communication network 100 may be configured to instruct the terminal device 102 to enter the RRC_CALIBRATION mode 20904 when it is determined that calibration is required 20902. According to at least one aspect, terminal device 102 may be configured to enter the RRC_CALIBRATION mode 20906 in responsive to the receipt of this instruction. An in-field calibration process of terminal device 102 may be performed (e.g., in-field calibration process 20400) and an updated diagnostic report 20908 may be provided to the radio communication network 100.

Upon receipt, the radio communication network 100 may, in some aspects, evaluate the updated diagnostic report and determine whether further calibration is required. According to at least one aspect, the radio communication network 100 may be configured to instruct the terminal device 102 to enter the RRC_DIAGNOSTIC mode 20912 when further calibration is required 20910, thereby returning the process back to 20804.

FIG. 210 is an exemplary message sequence chart 21000 showing the exchange of messages between terminal device 102 and the radio communication network 100. In some aspects, terminal device 102 may interface with the radio communication network 110 through network access node 110. As shown in FIG. 210, one or more components of the radio communication network 100 may be configured to detect one or more events 20802. According to at least one aspect, the detection of one or more events 20802 may, for instance, be performed according to one or more aspects described in connection with FIG. 202.

In response to one or more events being detected 20802 by the radio communication network 100, the radio communication network 100 may, in some aspects, be configured to instruct the terminal device 102 enter the RRC_DIAGNOSTIC mode 20804 over a downlink communication channel. According to at least one aspect, this instruction may specify the manner in which terminal device 102 is to report to the radio communication network 100. Terminal device may, in some aspects, be configured to perform an in-field diagnostic process and provide a diagnostic report 20808 to the radio communication network 100 after entering the RRC_DIAGNOSTIC mode 20806.

Upon receipt, the radio communication network 100 may, in some aspects, evaluate the received diagnostic report and determine whether calibration is required. According to at least one aspect, the radio communication network 100 may be configured to instruct the terminal device 102 to enter the RRC_CALIBRATION mode 20904 when it is determined that calibration is required 20902. According to at least one aspect, terminal device 102 may be configured to enter the RRC_CALIBRATION mode 20906 in responsive to the receipt of this instruction. An in-field calibration process (e.g., in-field calibration process 20400) of terminal device 102 may be performed and an updated diagnostic report 20908 may be provided to the radio communication network 100.

Upon receipt, the radio communication network 100 may, in some aspects, evaluate the updated diagnostic report and determine whether further calibration is required. According to at least one aspect, the radio communication network 100 may be configured to instruct the terminal device 102 to end the RRC_CALIBRATION mode 21004 when no further calibration is required 21002. In some aspects, the terminal device 102 may be configured to end the RRC_CALIBRATION mode 21006 in response to the receipt of this instruction.

Certain V2X functionalities and systems, in the context of automotive systems, may be based on the principles of functional safety. Other V2X functionalities and systems, however, are less likely to be inclusive of such principles. In some aspects, functional safety considerations may depend upon whether a certain function or service may lead to an unacceptable risk of physical injury, or to impairment or damage to the health of people either directly, indirectly or not a t all. By way of an illustrative comparison, some aspects of automated emergency breaking features may, for instance, fall within the scope of functional safety guidelines for compliance, whereas one or more entertainment features are less likely to fall within the guidelines.

To inform an in-field diagnostic process and/or an in-field calibration process about functional safety, metadata may be associated with one or more functions, services, components, building blocks, for example, to provide functional safety information. In some aspects, a first functional safety tag (e.g., red tag) may indicate that one or more functional safety principles merits consideration. According to at least one aspect, the first functional safety tag may indicate that auditing of a feature is required, and/or inclusion of redundancy for this feature is required, for example. A second functional safety tag (e.g. green tag) may, in some aspects, indicate that one or more functional safety principles do not merits consideration. As an alternative to providing the second functional safety tag, the absence of any functional safety tag may implicitly indicate that one or more functional safety principles do not apply.

Compliance with one or more functional safety requirements may present the added technical challenge of determining which in-field diagnostic processes and/or the in-field calibration processes could result in a malfunction or similar may lead to "unacceptable risk" or the like. In some aspects, further granularity may be added to differentiate one or more functions, services, components, building blocks, among others.

In some aspects, the first functional safety tag (e.g., red tag) may further indicate that no modification is allowed. By way of illustrative example, a result of the in-field diagnostic process and/or the in-field calibration process may include a selection from among pre-defined and pre-tested configurations (e.g. filtered configurations). Additionally or alternatively, one or more redundancy components may be added to a terminal device to ensure that if one or more components of the terminal device is not working as intended, then a selection may be made among the one or more redundancy components. Through this process, the terminal device may operate within one or more performance metrics.

The first functional safety tag (e.g., red tag) may, in some aspects, further indicate that modification(s) are permitted within one or more strictly-defined boundaries. According to at least one aspect, these types of boundaries may be covered or defined by the functional safety framework and its compliance statements. In some aspects, modifications may be limited to specific reconfiguration steps in specific components. By way of illustrative example, a filter in the RF front-end may be configured to adapt out-of-band (OOB) emission masks or the like. Accordingly, the in-field diagnostic and/or in-field calibration features may be applied within the one or more pre-defined boundaries. In at least one aspect, a single redundancy component may left available in a terminal device to ensure that if one or more specific components of a terminal device are not working as intended, at least one redundancy component is available. Through this interaction, at least one redundancy component should be available if the in-field calibration process fails to address one or more issues detected through the in-field diagnostic process.

When a second functional safety tag (e.g. green tag) is present, and/or in the absence of a functional safety tag, the terminal device may be configured to select any remedy to address one or more issues detected through the in-field diagnostic process.

FIG. 211 shows an exemplary method 21100 for communicating over a radio communication network in accordance with some aspects. In method 21100 for communicating over a radio communication network, the method includes performing at least a portion of a calibration process based on an identification of one or more components to be modified 21102, and communicating based on a result of the calibration process 21104.

FIG. 212 shows an exemplary method 21200 for communicating over a radio communication network in accordance with some aspects. In method 21200 for communicating over a radio communication network, the method includes identifying one or more components to be modified 21202, performing at least a portion of a calibration process based on the identification of the one or more components to be modified 21204, and communicating based on a result of the calibration process 21206.

Power Resource Optimization for Airborne Application Delivery Systems

Unmanned aerial vehicles (UAV) present opportunities for airborne applications of various technologies. An airborne vehicle, however, often has a limited power source, and power that otherwise would have been used for aviation purposes may be redirected to other applications on board the UAV. Therefore, there can be a trade-off between providing power to aviation systems and application systems on a UAV. Optimization of the power resource may allow the quality of service of an application system on a UAV to be improved while maintaining flight capabilities of the UAV.

As used herein an "unmanned aerial vehicle" or "UAV" may be an airborne vehicle that does not have a pilot in the UAV. The UAV may be autonomously piloted and/or remotely piloted. The UAV may also be assisted piloted aviation, semi-autonomously piloted or autonomously piloted except when interrupted by a human/machine, among others. The UAV may be a fixed wing vehicle or a rotating wing vehicle, or a combination thereof. The UAV may be propelled by a thrust system, e.g., using rotors, propellers, jet engines, rockets, or any combination thereof. The UAV may be powered by a fuel system or may be electrically powered with a battery system.

As used herein, an "aviation system" may include any system that controls flight of the UAV. The aviation system may be understood as including components and/or systems that are responsible for the aeronautical and navigational aspects of the UAV. For example, the aviation system may control navigation, flight measurement systems (e.g., airspeed, altitude, pitch-bank, weather, compass, among others), flight control surfaces and/or rotating flight controls, propulsion and/or lift systems, take-off and/or landing systems, among others.

As used herein, an "application system" may be a secondary system on the UAV that provides an additional application for the UAV excluding the aviation system. The application system may interact with objects or targets external to the UAV. For example, the application may include a telecommunications system that communicates with one or more network access nodes and/or one or more terminal devices; a sensing system, e.g., a video sensing system that uses optical technologies to identify and/or track objects, or sensing with local sensors (e.g., audio, video, image, position, radar, light, environmental, or any other type of sensing component) to obtain sensing data; among others.

FIG. 213 shows a UAV 21301. UAV 21301 may include an application system 21310, an aviation system 21320, a processor 21330, and a power source 21340. Processor 21330 may control interactions between systems on UAV 21301, e.g., arbitrate power resources between application system 21310 and aviation system 21320, control information flow between application system 21310 and aviation system 21320, control UAV-wide actions, etc. Power source 21340 may provide power to the systems of the UAV. Power source 21340 may include a battery. The battery may be charged by an onboard fuel source, e.g., an auxiliary power unit, and/or the battery may be charged by an onboard passive charging system. In addition, the battery may be charged by an external power source, e.g., the battery may be charged from a terrestrial charging station and/or may be charged mid-flight by another vehicle.

UAV 21301 may include flight control surfaces 21322. The flight control surfaces 21322 may be controlled by the aviation system 21320. Flight control surfaces 21322 may include structures for flight and flight control. For example, flight control surfaces 21322 may include one or more fixed wings, one or more rotatable wings (which may be powered, e.g., a helicopter, or unpowered, e.g., an auto-gyro), one or more rudders, one or more flaps, one or more elevators, one or more ailerons, one or more trim tabs, one or more canards, one or more propulsion systems (e.g., one or more propellers, one or more rotors, one or more jet engines, etc.), among others.

FIG. 214 shows UAV 21401A and UAV 21401B. UAV 21401A and UAV 21401B may be similar to UAV 21301, but may also include a flight structure 21324, which may be controlled by aviation system 21320. Flight structure 21324 may be retractable and may be deployed to aid in the flight of UAV 21401A and 21401B. For example, flight structure 21324 may produce additional lift in addition to flight control surfaces 21322, e.g., flight structure 21324 may be one or more airfoils. Additionally or alternatively, flight structure 21324 may produce additional propulsion in addition to flight control surfaces 21322. For example, flight structure 21324 may increase a cross-sectional area and/or employ an airfoil, e.g., a sail, of UAV 21401A and/or UAV 21401B in a tailwind in order to harness the tailwind to aid in propulsion.

UAV 21401A may deploy flight structures 21324, which may be fixed wings. The wings may enable UAV 21401A to produce more lift. Alternatively, when travelling into a headwind, or at an airspeed above a threshold, it may be beneficial to reduce the parasitic drag of the UAV (e.g., drag associated with movement of the UAV body through a fluid medium), therefore, the flight structures 21324 may be retracted.

UAV 21401B may deploy flight structure 21324, which may be a sail. The sail may aid in propulsion of UAV 21401B with a tailwind. The sail may be retracted above a certain airspeed. The airspeed for retracting the sail may be based on the airspeed of the vehicle, e.g., the drag from the sail may outweigh the benefits of propulsion of the sail at a particular airspeed.

Although UAV 21401A and 21401B depict a UAV with one type of flight structure 21324, a UAV may have multiple types of flight structures 21324, e.g., including both wings and a sail.

The UAVs discussed above may include an application system 21310 that may interact with one or more targets. For example, the targets may be terminal devices and application system 21310 may be a mobile access point that communicates with the terminal devices. Thus, there may be a zone in which the mobile access node can communicate with the terminal devices at a minimum level that may ensure some level of communication. This zone may, e.g., be based on a maximum radio range of the mobile access point. Within the zone, the application system should be able to interact with each of the one or more targets at a minimum threshold level.

In order to optimize the interaction between application system 21310 and the one or more targets, there may be an optimal position for the UAV to be in within the zone. In the example of a mobile access point, the optimal position for the UAV may be based on providing a signal quality above a particular threshold for the terminal devices. The threshold may ensure a predetermined level of signal quality greater than that which may define the zone.

FIG. 215 shows a target location 21510 and target zone 21512. FIG. 215 also depicts that a target location 21510 and target zone 21512 may change over time. In particular, FIG. 215 depicts that a target zone 21512 may increase and/or decrease over time.

As an example, UAV 21301 may have a mobile access point as an application system 21310. Target location 21510 may be an optimal position for the mobile access point of application system 21310 to communicate with terminal devices 102 and 500. Target zone 21512 may depict a three-dimensional zone in which the mobile access point may communicate with terminal devices 102 and 500 at a minimum threshold level. Target zone 21512 may be defined by the location of the terminal devices 102 and 500.

Terminal devices 102 and 500 may be mobile, e.g., they may change position over time. The terminal devices may remain relatively stationary, not ever translating target zone 21512, e.g., the terminal devices may be stationary at an event, such as a sports event in a stadium, or they may travel a relatively greater distance.

As shown here in solid lines, target location 21510 may be a position "p1" and at an altitude "a1". Indicated with a dashed and dotted line, terminal device 500 may change position with terminal devices 102 remaining stationary. The dashed line depicts a revised target zone 21512 within which the mobile access point may provide a minimum threshold level of signal quality. Likewise, due to the revised target zone 21512, the target location 21510 may adjust to a new position "p2" and altitude "a2". UAV 21301 may then move to the revised target location 21510.

While a UAV 21301 may communicate with a single terminal device, it may be more efficient for a UAV 21301 to communicate with multiple terminal devices. If a target zone 21512 has a large number of terminal devices, one or more additional UAVs 21301 may be assigned to the target zone 21512 in order to reduce the communication burden of a single UAV 21301. The additional UAVs 21301 may be reassigned elsewhere if the communication requirements are reduced, therefore, the number of UAVs 21301 in a target zone 21512 may be dynamic.

FIG. 216 shows a translational aspect of target zone 21512. At an initial time, terminal devices 102 and 500 may be in positions defining target zone 21512 at a distance "d1". The terminal devices 102 and 500 may all be mobile and may all change positions by travelling to some distance "d2", so that the target zone 21512 is also translated to "d2". UAV 21301 may travel within the target zone 21512, thereby tracking the terminal devices 102 and 500. Terminal devices 102 and 500 may be tracked by the signal strength of communications with UAV 21301.

A target zone 21512 may also be predefined, e.g., UAV 21301 may follow terminal devices along a predetermined route, e.g., a transportation route or a parade route, such as a road, a train track, a shipping route, a passenger flight route, among others.

Although FIG. 215 shows the boundary size of target zone 21512 changing and FIG. 216 shows translation of the target zone 21512, the target zone 21512 may vary both in terms of boundary size and translation depending on the movement of the targets, e.g., the mobile terminals.

In general, UAV 21301 may fly in the target location 21510 in order to optimize communication quality with terminal devices 102 and 500. However, the power used for the aviation system 21320 to maintain flight in target location 21510 and the power used for the application system 21310 for communications to the terminal devices 102 and 500 may exceed the capabilities of power source 21340. A compromise position or flight path may then be determined to match the requirements application system 21310 and aviation system 21320. Additionally or alternatively, in order to save power without degrading signal quality beyond a threshold level, UAV 21301 may adopt a different position for flight or a flight path that required less power than the target location 21510. Additionally or alternatively, UAV 21301 may simply land within target zone 21512 and redirect all power to application system 21310, as power may no longer be required for aviation system 21320 once the UAV 21301 has landed.

In particular, it may require more energy for UAV 21301 to fly in the target location 21510 when there are high winds, e.g., having a ground speed of zero and remain relatively stationary in the air. The winds may have a gradient over altitude. Thus, within target zone 21512, it may be more efficient to allow UAV 21301 to drift with a wind in a high wind speed region and then fly to a region with a lower wind speed to make up the ground lost when drifting with the high speed wind.

Accordingly, a flight path may be determined within the target zone 21512 that maintains a predetermined signal quality threshold between a signal quality level at an extreme of the target zone 21512 and a signal quality level at the target location 21510. The flight path may include a first path 21701 in which the UAV 21301 drifts with a headwind 21710 that has a first velocity and a second path 21702 in which the UAV 21301 heads against a headwind 21720 that has a second velocity that is less than the first velocity. Target location 21510 may be located along first path 21701.

On first path 21701, UAV 21301 may simply drift with the wind. For example, UAV 21301 may have rotating wings, which may only exert enough force to maintain an altitude of UAV 21301 without any propulsion. Alternatively, UAV 21301 may propel itself against the wind so that the UAV 21301 drifts backwards slower than the velocity of the headwind. Along second path 21702, UAV 21301 may travel against headwind 21720.

In another example, UAV 21301 may enter the flight path when video sensing, as attempting to fly against a headwind can cause jitters in the camera degrading the sensing quality. Therefore, by entering the flight path, the jitters may be reduced.

As shown in FIG. 217, the entire flight path may be within target zone 21512. Along first path 21701, UAV 21301 may travel from one end of target zone 21512 to another end and along second path 21702 travel against headwind 21720 again to the other end of target zone 21512. The length of first path 21701 and/or second path 21702 may be an entire length of target zone 21512 or may be based on maintaining a predetermined signal quality threshold with terminal devices within target zone 21512, e.g., the lengths of the path may be less than an entire length of target zone 21512. As first path 21701 and second path 21702 may be at different altitudes, the flight path may also include an ascent path 21703 between first path 21701 and second path 21702 and a descent path 21704 between first path 21701 and second path 21702.

Drag on UAV 21301 may require a large amount of energy and power to overcome. The drag on UAV 21301 may be proportional to an airspeed of UAV 21301. Thus, in comparison to maintaining a stationary position at target location 21510 and fighting against headwind 21710, UAV 21301 may drift with the headwind 21710, thus having a lower airspeed at the same altitude as the target location 21510. Along path 21702, UAV 21301 may fight against headwind 21720, which may have a lower velocity than headwind 21710, and, as long as UAV 21301 does not travel along second path 21702 at a velocity with an airspeed greater than that of remaining stationary at target location 21510, the overall energy output along the flight path would be less than remaining stationary at target location 21510. In particular, in some cases, when the difference in altitude is less than the length of first path 21701 and/or second path 21702, the energy output of UAV 21301 in ascending path 21303 and descending path 21304 may not exceed the output savings from flying along the flight path in comparison to remaining stationary fighting against the headwind in target location 21510.

In addition, the flight path may have a plurality of UAVs 21301 cyclically travelling along it. Therefore, the rate at which a UAV 21301 may pass through target location 21510 may be increased. Communications with a high priority or large data payload may be communicated when a UAV 21301 is in and/or around target location 21510 to ensure optimal communication.

In another aspect, a UAV 21301 of the plurality of UAVs 21301 may communicate a high priority or large data payload communication with a terminal device if the terminal device is located at a position that is near to a UAV 21301 on the flight path. While target location 21510 may be an optimal position for communication to all terminal devices within target zone 21512, communication with an individual terminal device may be optimal at another position on the flight path.

In another aspect, second path 21702 may pass along a charging station so that during the flight path, a UAV 21301 may land and/or dock with the charging station in order to charge and/or refuel the power source 21340. This may also be beneficial as a UAV 21301 need not expend power for flight to and from a charging and/or refueling station if it is generally in a stationary position.

To minimize power and energy output of UAV 21301, the vehicle may fly at a ground speed with a constant magnitude along first path 21701 and second path 21702, e.g., a negative ground speed of "x" drifting with headwind 21710 along first path 21701 and a positive ground speed of "x" heading against headwind 21720 along second path 21702. The magnitude of the ground speed may be equal to one-half the difference between the first velocity of headwind 21710 and the second velocity of headwind 21720.

This ground speed magnitude may be based on the convex relation between drag on an object and velocity, e.g., the relation is not linear. Thus, the average power required may be higher than the power of the average velocity.

In an aspect of the disclosure, assume the energy and/or power required to overcome drag for flight is proportional to the square of the velocity, e.g., airspeed. Therefore, power is equal to the square of the airspeed times a constant:

$$P = cv^2$$

where P is power, c is a constant, and v is the airspeed. The average power spent is then proportional to:

$$P = P_h + P_l + P_r + P_s \propto (v_h - v_d)^2 + (v_l + v_d)^2 + \alpha(v_l^2 + v_d^2) + \alpha(v_h^2 + v_d^2)$$

Here, $P_h$, $P_l$, $P_r$, and $P_s$ are the powers during flight at high altitude (first path 21701) and low altitude (second path 21702) and during rising (ascent path 21703) and sinking (descent path 21704). The first velocity of headwind 21710 may be $v_h$, the second velocity of headwind 21720 may be $v_l$, and the ground speed of UAV 21301 may be $v_d$. The variable α takes into account the times/distances travelling vertically and horizontally differ, and is a ratio of the height (altitude) over the width (distance of first path 21701 and/or second path 21702)

$$\alpha = \frac{h}{w}$$

Airspeed is calculated by the ground speed of UAV 21301 minus the wind speed. During horizontal travel, e.g., travel along first path 21701 and second path 21702, the ground speed is, therefore, either added or subtracted from the respective wind speed, depending on whether traveling with a headwind or a tailwind. During vertical travel, the wind speed and the vertical speed are added using the Pythagorean theorem. The power to raise the UAV 21301 against gravity is neglected because this energy is later available when the UAV 21301 sinks.

Thus, in order to minimize power, the proportional relationship of the power is considered and simplified. The derivative of this relationship is taken to determine the minimum:

$$\begin{aligned} P &\propto (v_h - v_d)^2 + (v_l + v_d)^2 + \alpha(v_l^2 + v_d^2) + \alpha(v_h^2 + v_d^2) \\ &= v_h^2 + v_l^2 + 2v_l v_d - 2v_h v_d + 2v_d^2 + \alpha(v_l^2 + v_h^2) + 2\alpha v_d^2 \end{aligned}$$

-continued $$= 2(1+\alpha)v_d^2 - 2(v_h - v_l)v_d + v_h^2 + v_l^2 + \alpha(v_l^2 + v_h^2)$$

$$\frac{dP}{dv_d} \propto 4(1+\alpha)v_d - 2(v_h - v_l) = 0$$

$$v_d = \frac{v_h - v_l}{2 + 2\alpha} = \frac{v_h - v_l}{2 + 2^h/_w} = \frac{(v_h - v_l)}{2}\frac{w}{w+h}$$

Thus, for the case in which h may be neglected in relation to w, the optimum ground speed may be the average of the first velocity of headwind 21710 and the second velocity of headwind 21720, because the airspeed of UAV 21301 may be equal on first path 21701 and second path 21702. Due to the convex relationship of power and velocity, this may ensure the least average power. If h may not be neglected, then the optimal ground speed of UAV 21301 may be lower, because the power required for ascent and descent also need to be considered. Tus it may be best to accept a higher average power on the horizontal legs to reduce the power needed on the vertical legs.

In another aspect of the disclosure, assume the energy and/or power required to overcome drag for flight is proportional to the cube of the velocity, e.g., airspeed. Therefore, power is equal to the cube of the airspeed times a constant:

$$P = cv^3$$

where P is power, c is a constant, and v is the airspeed. The average power spent is then proportional to:

$$P = P_h + P_l + P_r + P_s \propto (v_h - v_d)^3 + (v_l + v_d)^3 + \alpha\sqrt{v_l^2 + v_d^2}^3 + \alpha\sqrt{v_h^2 + v_d^2}^3$$

Here, $P_h$, $P_l$, $P_r$, and $P_s$ are the powers during flight at high altitude (first path 21701) and low altitude (second path 21702) and during rising (ascent path 21703) and sinking (descent path 21704). The first velocity of headwind 21710 may be $v_h$, the second velocity of headwind 21720 may be $v_l$, and the ground speed of UAV 21301 may be $v_d$. The variable α takes into account the times/distances travelling vertically and horizontally differ, and is a ratio of the height (altitude) over the width (distance of first path 21701 and/or second path 21702):

$$\alpha = \frac{h}{w}$$

Airspeed is calculated by the ground speed of UAV 21301 minus the wind speed. During horizontal travel, e.g., travel along first path 21701 and second path 21702, the ground speed is, therefore, either added or subtracted from the respective wind speed, depending on whether traveling with a headwind or a tailwind. During vertical travel, the wind speed and the vertical speed are added using the Pythagorean theorem. The power to raise the UAV 21301 against gravity is neglected because this energy is later available when the UAV 21301 sinks.

Thus, in order to minimize power, the proportional relationship of the power is considered and simplified. The derivative of this relationship is taken to determine the minimum:

$$P \propto (v_h - v_d)^3 + (v_l + v_d)^3 + \alpha(v_l^2 + v_d^2)^{3/2} + \alpha(v_h^2 + v_d^2)^{3/2}$$

$$\frac{dP}{dv_d} \propto -3(v_h - v_d)^2 + 3(v_l + v_d)^2 + \frac{3}{2}\alpha\sqrt{v_l^2 + v_d^2} + \frac{3}{2}\alpha\sqrt{v_h^2 + v_d^2} = 0$$

$$-(v_h - v_d)^2 + (v_l + v_d)^2 + \frac{1}{2}\alpha\sqrt{v_l^2 + v_d^2} + \frac{1}{2}\alpha\sqrt{v_h^2 + v_d^2} = 0$$

This equation may be difficult to consider in closed form, accordingly, a simplification with α=0 results in:

$$-(v_h - v_d)^2 + (v_l + v_d)^2 = 0$$

$$(v_h - v_d)^2 = (v_l + v_d)^2$$

$$(v_h - v_d) = \pm(v_l + v_d)$$

$$(v_h - v_d) = \pm(v_l + v_d)$$

Assuming the positive result is the minimum:

$$v_d = \frac{v_h - v_l}{2}$$

Again, this result minimizes the power of a convex function, and again if α≠0, correction terms may need to be considered, which would reduce $v_d$.

In another aspect of the disclosure, power may be assumed to be the square of the difference to an optimal speed plus a constant, e.g., assume a Taylor expansion around the minimum and only consider the square component.

Thus, power consumption of a fixed wing aircraft may be approximated by a power law such as:

$$P = P_0 + c(v - v_0)^2$$

with suitable constants c, $P_0$, and $v_0$, where v is the airspeed and $v_0$ is the airspeed requiring at least power $P_0$. The average power expended is then proportional to:

$$P = P_h + P_l + P_r + P_s \propto P_0/c + (v_h - v_d - v_0)^2 + (v_l + v_d - v_0)^2 + \alpha\left(\sqrt{(v_l^2 + v_d^2)} - v_0\right)^2 + \alpha\left(\sqrt{(v_h^2 + v_d^2)} - v_0\right)^2$$

Here, $P_h$, $P_l$, $P_r$, and $P_s$ are the powers during flight at high altitude (first path 21701) and low altitude (second path 21702) and during rising (ascent path 21703) and sinking (descent path 21704). The first velocity of headwind 21710 may be $v_h$, the second velocity of headwind 21720 may be $v_l$, and the ground speed of UAV 21301 may be $v_d$. The variable α takes into account the times/distances travelling vertically and horizontally differ, and is a ratio of the height (altitude) over the width (distance of first path 21701 and/or second path 21702):

$$\alpha = \frac{h}{w}$$

Airspeed is calculated by the ground speed of UAV 21301 minus the wind speed. During horizontal travel, e.g., travel along first path 21701 and second path 21702, the ground speed is, therefore, either added or subtracted from the respective wind speed, depending on whether traveling with a headwind or a tailwind. During vertical travel, the wind speed and the vertical speed are added using the Pythagorean theorem. The power to raise the UAV 21301 against gravity is neglected because this energy is later available when the UAV 21301 sinks.

In order to minimize the power, it is then calculated:

$$P \propto \frac{P_0}{c} + (v_h - v_d - v_0)^2 + (v_l + v_d - v_0)^2 + \alpha\left(\sqrt{(v_l^2 + v_d^2)} - v_0\right)^2 + \alpha\left(\sqrt{(v_h^2 + v_d^2)} - v_0\right)^2 = \frac{P_0}{c} + v_h^2 + v_l^2 + 2v_l v_d - 2v_h v_d - v_h v_0 - v_l v_0 + 2v_d^2 + 2v_0^2 + \alpha(v_l^2 + v_h^2) + 2\alpha v_d^2 + 2\alpha v_0^2 - 2\alpha v_0\sqrt{(v_l^2 + v_d^2)} - 2\alpha v_0\sqrt{(v_h^2 + v_d^2)} = 2(1+\alpha)v_d^2 - 2(v_h - v_l)v_d - 2\alpha v_0\sqrt{(v_l^2 + v_d^2)} - 2\alpha v_0\sqrt{(v_h^2 + v_d^2)} + \text{constant}(v_d)$$

In order to make this formula tractable, $$\sqrt{(v_l^2 + v_d^2)}$$

is developed into a Taylor series with $v_d$:

$$\sqrt{(v_l^2 + v_d^2)} = v_l + \frac{1}{2}v_d^2\left[\frac{d^2\sqrt{(v_l^2 + v_d^2)}}{dv_d^2}\right]_{v_d=0} + \ldots = v_l + \frac{1}{2}v_d^2\left[\frac{d}{v_d}\left(\frac{1}{2}\frac{1}{2\sqrt{(v_l^2 + v_d^2)}}2v_d\right)\right]_{v_d=0} + \ldots = v_l + \frac{1}{2}v_d^2\left[\left(\frac{\sqrt{(v_l^2 + v_d^2)} - v_d\frac{1}{2\sqrt{(v_l^2 + v_d^2)}}}{(v_l^2 + v_d^2)}\right)\right]_{v_d=0} + \ldots = v_l + \frac{1}{2}v_d^2\left[\frac{1}{v_l}\right] + \ldots = v_l + \frac{v_d^2}{2v_l} + \ldots$$

This is simplified to:

$$P \propto 2(1+\alpha)v_d^2 - 2(v_h - v_l)v_d - \alpha v_0\frac{v_d^2}{v_l} - \alpha v_0\frac{v_d^2}{v_h} + \text{constant}(v_d)$$

$$v_d = \frac{v_h - v_l}{2 + 2\alpha - \frac{\alpha v_0}{v_l} - \frac{\alpha v_0}{v_h}} = \frac{v_h - v_l}{2 + 2^h/_w\left(1 - \frac{v_0}{2v_l} - \frac{v_0}{2v_h}\right)}$$

Taking the derivative to find the minimum:

$$\frac{dP}{dv_d} \propto 2\left(2 + 2\alpha - \frac{\alpha v_0}{v_l} - \frac{\alpha v_0}{v_h}\right)v_d - 2(v_h - v_l) = 0$$

-continued $$v_d = \frac{v_h - v_l}{2 + 2\alpha - \frac{\alpha v_0}{v_l} - \frac{\alpha v_0}{v_h}} = \frac{v_h - v_l}{2 + 2^h/_w\left(1 - \frac{v_0}{2v_l} - \frac{v_0}{2v_h}\right)}$$

This result may be similar to a pure square law, but includes a modified correction term in the denominator. The modified correction term may be dependent on the height to width ratio and the wind speed relative to the optimum speed. If $v_0=0$, then the formula simplifies to that of a pure square law. Similarly, if $v_0$ is much greater than $v_l$ and $v_h$, then the formula may also simplify to that of a pure square law. Otherwise, the optimum speed may be higher, which is because at $v_0$ (instead of at a speed of zero) the minimum power is achieved. This may result from the power required to ascend and descend on the vertical legs against the induced air drag, which may be assumed to be less in this model in comparison to the pure square law.

This assumption may be reasonable as a rotating wing aircraft may generate lift by pushing down surrounding air, thus passing downward an impulse from the weight of the aircraft to the air. As the rotor covers a given area the volume of air being pushed downwards is proportional to this area A and the speed of the downward movement of the air is designated s. The mass being pushed down per second is proportional to the volume of the air times the air density ρ. The impulse imparted to the air comes from the acceleration of the mass of the air from a speed of zero to the final downward speed s. This change of impulse over time may be proportional to the lift force F:

$$F = \frac{dImpulse}{dt} = m * \frac{\Delta v}{\Delta t} = \rho As * s = \rho As^2$$

Solving for s, the equation is:

$$s = \sqrt{\frac{F}{\rho A}}$$

The energy required to accelerate the air to speed s may be ½ ms², and thus, the power P may be:

$$P = \frac{1/2\ \text{ms}^2}{t} = \frac{1}{2}\frac{m}{t} * s^2 = \frac{1}{2}\rho As * s^2 = \frac{1}{2}\rho As^3 = \frac{1}{2}\rho A\sqrt{\frac{F}{\rho A}}^3 = \frac{1}{2}\sqrt{\frac{F^3}{\rho A}} \propto F^{3/2}$$

The power may be proportional to the force to the power of 3/2, e.g., slightly more than linear. The required force may depend on the determined flight path, while the remaining factors may be constant for any given UAV (A) at a given location (ρ).

The force F may include the weight of the UAV $F_g$ and the air drag $F_d$, which may typically increase with the square of the airspeed, $$F_d = \beta v_{air}^2.$$

Therefore, the required power may depend on the total force need, which may be the vector addition of $F_g$ and $F_d$. If horizontal movement is assumed, then $F_g \perp F_d$, which may result in:

$$F = \sqrt{F_g^2 + F_d^2} \text{ and}$$

$$P \propto \sqrt{F_g^2 + F_d^2}^{\frac{3}{2}} = \left(F_g^2 + F_d^2\right)^{\frac{3}{4}} = \left(F_g^2 + \beta^2 v_{air}^4\right)^{3/4}$$

Otherwise, for vertical travel, then $F_g \| F_d$ and $F = F_g \pm F_d$, with selection of the positive or negative component depending on whether the forces are in the same or opposite direction, resulting in:

$$F = F_g \pm F_d \text{ and}$$

$$P \propto \sqrt{F_g \pm F_d}^3 = \sqrt{F_g \pm \alpha v_{air}^2}^3$$

In total, the required power is proportional to:

$$P = P_h + P_l + P_r + P_s \propto$$

$$P \propto$$

$$\left(F_g^2 + \beta^2 (v_h - v_d)^4\right)^{\frac{3}{4}} + \left(F_g^2 + \beta^2 (v_l + v_d)^4\right)^{\frac{3}{4}} + \sqrt{F_g + \beta v_d^2}^3 + \sqrt{F_g - \beta v_d^2}^3$$

Thus, it may generally be observed that if h is negligible against w, then the ground speed of the UAV 21301 may be half the difference of the wind speeds. In this case, the speed against the wind may be the same on the first path 21701 as on the second path 21702, which may minimize the total or average power (assuming power and velocity has a convex relationship).

If, however, w is negligible in comparison to h, then the UAV ground speed may tend to 0, as it may require too much output to move vertically. In intermediate cases the ground speed of UAV 21301 may be reduced with one-half the difference of the first velocity of headwind 21710 and the second velocity of headwind 21720.

In comparison to the flight path depicted in FIG. 217, the flight path in FIG. 218 may have a rounded rather than rectangular profile. In first path 21801 and second path 21802, UAV 21301 may have require less output to head against a headwind. First path 21801 and 21802 may be within target zone 21512.

During first path 21801, UAV 21301 may drift with a headwind 21710 and during second path 21802, UAV 21301 may head against a headwind 21720. Headwind 21710 may have a greater velocity along any point of first path 21801 than the velocity of headwind 21720 along any point of second path 21802. For example, during ascent path 21703, UAV 21301 is fighting against the gradient of the headwind, so that UAV 21301 may at some point be ascending and countering the headwind to have a ground speed of zero, which requires a greater output than drifting with the headwind. Therefore, in the ascending and descending phases of first path 21801 and second path 21802, UAV 21301 may require less output to counter a headwind. At no point along first path 21801 and second path 21802 should UAV 21301 achieve a ground speed of zero at the same altitude as the target location 21510. Second path 21802 may transition into first path 21801 at the midpoint of the minimum altitude of 21802 and the maximum altitude 21801. Additionally or alternatively, the transition point may be selected at a predetermined altitude. The predetermined altitude may be based on the energy and/or power output required to head against or drift with the wind.

Similar to a rounded profile, UAV 21301 may travel a trapezoidal profile or other non-rectangular profile so that when UAV 21301 is ascending into higher velocity winds, it need not counter the headwind to maintain a groundspeed of zero. Therefore, first path 21801 may have a profile with a section that is slanted and rising to a section with a constant altitude and again a final section slanted and falling, while the second path 21802 may have a vertical descent and a vertical ascent connected by a constant altitude horizontal section. Second path 21802 may transition into first path 21801 at the midpoint of the minimum altitude of 21802 and the maximum altitude 21801. Additionally or alternatively, the transition point may be selected at a predetermined altitude. The predetermined altitude may be based on the energy and/or power output required to head against or drift with the wind.

In comparison to the flight paths in FIG. 217 and FIG. 218, the flight path in FIG. 219 may be at the same altitude or an altitude within a negligible altitude difference, which may be indicated by the axes x and y, with altitude the axis perpendicular to the x-y plane. The differential wind velocities may be due to aerodynamic effects over ground surfaces or other objects. For example, wind deflecting around an object may accelerate the air (jet effect), which may be exploited by UAV 21301.

Therefore, UAV 21301 may drift with a headwind 21910 that has a first velocity in a first path 21901 and may head against a headwind 21920 that has a second velocity less than the first velocity. First path 21901 and second path 21902 may be within target zone 21512. First path 21901 may be at a substantially similar altitude as second path 21902. To reach the first path 21901 and the second path 21902, UAV 21301 may fly along connecting paths 21903. Alternatively, first path 21901 and second path 21902 may have a non-rectangular flight profile, such as the rounded or trapezoidal vertical flight profile discussed above, although here, the flight profile may be considered on an x-y plane with at one altitude or substantially similar altitudes.

In addition, UAV 21301 may fly along a flight path that may vary in both altitude and in the x-y plane so that the flight path may include aspects of the flight paths in FIG. 217 and FIG. 218, as well as FIG. 219.

Method 22000 may be a method of flying an unmanned aerial vehicle (UAV) 21301 for station-keeping relative to a target zone, the method may include: determining a target zone 21512 based on one or more targets; determining a flight path for the UAV 21301 within the target zone 21512, the flight path including: a first path 21701 in which the UAV 21301 drifts with a headwind 21710 that has a first velocity and a second path 21702 in which the UAV 21301 heads against a headwind 21720 that has a second velocity that is less than the first velocity; and flying the UAV 21301 along the flight path.

The UAV 21301 may include an application system 21310, which may include a mobile access point 110 and/or may include a sensing system. The one or more targets may change location over time.

Method 22000 may further include operating the application system 21310 with the one or more targets. The target zone 21512 may be based on a maximum range of the application system 21310 operating with the one or more targets. The target zone 21512 may further include a target location 21510 based on an optimal range of the application system operating with the one or more targets.

Method 22000 may further include flying the UAV 21301 along the first path 21701 with a ground speed based on one-half the difference of the first velocity and the second velocity. The first path 21701 may be a first attitude and the second path 21702 may be at second altitude lower than the first altitude. The flight path may include an ascent path to the first altitude and a descent path to the second altitude. The flight path may have a charging and/or refueling station located along the flight path. The functions of method 22000 may also be performed by the means described above in relation to UAV 21301.

Method 22100 may be a method of flying an unmanned aerial vehicle (UAV) 21301 including a mobile access point 110 along a flight path, the method including: determining a target zone 21512 based on one or more terminal devices 102 and/or 500 that are configured to communicate with the mobile access point 110; determining a flight path for the UAV within the target zone 21512, the flight path including: a first path 21701 in which the UAV 21301 drifts with a headwind 21710 that has a first velocity and a second path 21702 in which the UAV 21301 heads against a headwind 21720 that has a second velocity that is less than the first velocity; and flying the UAV 21301 along the flight path.

The target zone 21512 may be based on a maximum communication range of the mobile access point 110. The target zone may be based on a communication quality parameter for communications with the one or more terminal devices 102 and/or 500. Target Zone 21512 may further include a target location 21510 based on a predefined threshold of a communication quality parameter threshold for communications with the one or more terminal devices 102 and/or 500. The communication quality parameter may be based on a signal strength indicator and/or a signal quality indicator. The one or more terminal devices may change location overtime, and thus, the target zone 21512 may change shape and/or position over time.

In method 22100, the UAV 21301 may be flown along the flight path with a ground speed based on one-half the difference of the first velocity and the second velocity. The first path 21701 may be at a first altitude and the second path 21702 may be at a second altitude lower than the first altitude. The flight path may further include an ascent path 21703 to the first altitude and a descent path 21704 to the second altitude. The first path 21701 and/or the second path 21702 may have a greater horizontal distance than a vertical distance of the ascent path 21703 and/or the descent path 21704. A charging station may be located along the flight path. Method 22100 may further include communicating with the one or more terminal devices 102 and/or 500 in the target zone 21512. The functions of method 22100 may also be performed by the means described above in relation to UAV 21301.

An unmanned aerial vehicle (UAV), e.g., UAV 21301, may include an application system 21310 including a mobile access point 110 configured to communicate with one or more terminal devices 102 and/or 500; a processor 21330 configured to: determine at target zone 21512 based on the one or more terminal devices 102 and/or 500; determine a flight path for the UAV within the target zone 21512, the flight path including: a first path 21701 for the UAV in which the UAV drifts with a headwind 21710 that has a first velocity and a second path 21702 in which the UAV heads against a headwind 21720 that has a second velocity that is less than the first velocity; and an aviation system 21320 configured to fly the UAV along the flight path.

The target zone 21512 may be based on a maximum communication range of the mobile access point 110. The target zone 21512 may be based on a communication quality parameter for communications with the one or more terminal devices 102 and/or 500. Target Zone 21512 may further include a target location 21510 based on a predefined threshold of a communication quality parameter threshold for communications with the one or more terminal devices 102 and/or 500. The communication quality parameter may be based on a signal strength indicator and/or a signal quality indicator. The one or more terminal devices may change location overtime, and thus, the target zone 21512 may change shape and/or position over time.

The aviation system 21320 may be configured to fly the UAV along the flight path with a ground speed based on one-half the difference of the first velocity and the second velocity. The first path 21701 may be at a first altitude and the second path 21702 may be at a second altitude lower than the first altitude. The flight path may further include an ascent path 21703 to the first altitude and a descent path 21704 to the second altitude. The first path 21701 and/or the second path 21702 may have a greater horizontal distance than a vertical distance of the ascent path 21703 and/or the descent path 21704. A charging station may be located along the flight path. Application system 21320 may communicate with the one or more terminal devices 102 and/or 500 in the target zone 21512. The UAV may include a flight structure 21324 configured to be extended or retracted based on an airspeed of the UAV.

In another aspect of the disclosure, a plurality of UAVs 21301 may reduce aviation system 21320 requirements by flying in a flight formation, as shown in FIG. 222, which may allow for more allocation of power source 21340 to application system 21310. The flight formation may reduce an aviation system load on a particular UAV 21301. For example, the drag on a UAV 21301 in the flight formation may be reduced and/or a UAV 21301 may benefit from upwash in the flight formation. Upwash may be an upward motion of air due to airflow over an airfoil.

The flight formation and the position of a UAV 21301 in the flight formation may be based on application system 21310 consumption requirements and aviation system requirements 21320 from power source 21340 of a UAV 21301. Therefore, for a particular UAV 21301 of the plurality of UAVs 21301, the individual application system 21310 energy consumption requirement may be determined and the individual aviation system 21320 energy consumption requirement may be determined. The application system 21310 energy consumption requirement may be based on the instantaneous, e.g., at a particular time, and/or expected or estimated energy consumption of the application system 21310. The energy consumption may, for example, be based on a number of terminal devices communicating with a mobile access point of application system 21310. Additionally or alternatively, the energy consumption may, for example, be based on a type of communication with one or more terminal devices. Thus, a type of communication may require a higher data rate or a constant connection, e.g., video or audio streaming in comparison to data for e-mail or loading a webpage. In addition, various application systems 21310 of a UAV 21301 may have differing energy consumption requirements. For example, an application system 21310 for communication with terminal devices may be different than an application system 21310 for sensing, e.g., sensing with local sensors (e.g., audio, video, image, position, radar, light, environmental, or any other type of sensing component) to obtain sensing data.

The aviation system 21320 energy consumption requirements may be determined instantaneously, e.g., at a particular time, or may be an expected or estimated. The aviation system 21320 energy consumption requirements may be based on the power required for flight of UAV 21301. For example, various UAVs 21301 may have different weights; a heavier UAV may require more power for aviation than a lighter UAV. Additionally or alternatively, various UAVs 21301 may utilize different flight control surfaces 21322, so that a particular UAV 21301 may require a higher energy consumption for flight than another UAV 21301 with a differing flight control surface system 21322.

Accordingly, the individual application system 21310 requirements for the plurality of UAVs 21301 may be determined and the individual aviation system 21320 requirements for the plurality of UAVs 21301 may also be determined. The individual UAVs 21301 may then be ranked on energy consumption requirements based on the determined information.

A flight formation may then be determined based on the energy consumption requirements. The flight formation may include a UAV 21301 with the lowest application system 21310 energy consumption requirement flying in a position 22210 of the flight formation requiring the highest aviation system 21320 energy consumption requirement. Therefore, the UAV 21301 with the lowest application system 21310 energy consumption requirement may allocate more power to its aviation system 21320.

The position 22210 may be a lead position in the flight formation. The UAV 21301 in the position 22210 may have the highest drag position in the flight formation, and may require then the greatest output of energy for its aviation system 21320.

The other UAVs 21301 may then be placed in a position 22220 in the flight formation. Position 22220 may be a secondary position or a "wingman" position. The UAV 21301 in a position 22220 may benefit aerodynamically from its position relative to the UAV 21301 in position 22210. For example, the UAV 21301 in position 22220 may experience reduced drag behind a UAV 21301 in position 22210 by drafting or remaining in the slipstream of the UAV 21301 in position 22210. Furthermore, the UAV 21301 in position 22220 may receive a lift force from upwash of the UAV 21301 in position 22210. The plurality of UAVs 21301 may communicate with each other to maintain the flight formation, as may be shown by the dashed line.

As shown in FIG. 222, UAV 21301 in position 22210 may require the greatest energy output for its aviation system 21320. For example, position 22210 may be a lead position flying into a headwind 22200. The UAV 21301 in position 22210 may be communicating with a single terminal device 102.

The UAV 21301 in position 22220 may benefit aerodynamically from its position relative to UAV 21301 in position 22210, and may have a higher application system 21310 energy consumption requirement than the UAV 21301 in position 22210. For example, The UAV 21301 in position 22220 may be communicating with a terminal device 102 and a terminal device 500.

The plurality of UAVs 21301 may determine the energy consumptions requirements of the individual UAVs 21301 cooperatively by communicating amongst themselves, as well as determining the flight formation. Alternatively, the plurality of UAVs 21301 may have a lead UAV 21301 or an external flight formation controller that may be designated to determine the individual energy consumption requirements and the flight formation. For example, the individual UAVs 21301 may transmit measurements or the determined energy consumption requirements and then may receive a designated position in the flight formation.

FIG. 223 shows an exemplary flight formation of UAVs 21301. The UAV 21301 in position 22310 may require the greatest energy consumption for its aviation system 21320, for example, flying in the lead position into a headwind 22300, and the least energy consumption for communicating with terminal device 102. UAV 21301 in position 22310 may have a unicast communication configuration with terminal device 102.

The UAVs 21301 in positions 22320 may have a reduced energy consumption for their respective aviation systems 21320 in comparison with UAV 21301 in position 22310, but an increased energy consumption for their respective applications systems 21310 in comparison with UAV 21301 in position 22310. For example, the second UAV 21301 in position 22320 directly behind position 22310 may have a multicast communication configuration with two terminal devices 102 and a terminal device 500. The fourth and final UAV 21301 in position 22320 may have a unicast communication configuration with two terminal devices 102.

UAV 21301 in position 22330 may be tasked with measurement and sensing for the plurality of UAVs 21301 in the flight formation. Thus, UAV 21301 in position 22330 may perform sensing and measurements that are then transmitted to the other UAVs 21301 in the flight formation.

Although the UAVs 21301 in FIG. 223 are depicted as having distinct tasks, e.g., communications, measurements, and/or sensing, multiple tasks may be performed by a single UAV 21301 in the flight formation. In addition, the positions of the UAVs 21301 in the flight formation are not fixed, but may be adjusted dynamically based on varying energy consumption requirements.

FIG. 224 shows an exemplary flight formation. The plurality of UAVs 21301 may be in a "flying-v" formation. A UAV 21301 may be in a position 22410 leading the plurality of UAVs 21301. Positions 22420 may be filled with the other UAVs 21301 of the plurality of UAVs 21301, which may be slightly behind and laterally offset from each other in order to benefit from the upwash of another UAV 21301 slightly ahead and laterally offset from it.

Method 22500 may include a method of controlling a flight formation of a plurality of unmanned aerial vehicles (UAVs) 21301 each including an application system 21310, an aviation system 21320, and a power source 21340, the method including: determining individual application system 21310 energy consumption requirements for the plurality of UAVs 21301; determining individual aviation system 21320 energy consumption requirements for the plurality of UAVs 21301; determining a flight formation for the plurality of UAVs 21310, the flight formation comprising a UAV 21301 with the lowest application system 21310 energy consumption requirement flying in a position of the flight formation requiring the highest aviation system 21320 energy consumption requirement; and arranging the plurality of UAVs 21301 in the flight formation.

Method 22500 may include adjusting positions of the plurality of UAVs 21301 within the flight formation based on changing individual application system energy consumption requirements of the plurality of UAVs 21301. The applications system may include a mobile access point 21310 and/or a sensing system. The flight formation may include the plurality of UAVs 21301 in a line in a direction of flight. The flight formation may include the plurality of UAVs 21301 in a V-shape. The functions of method 22500 may also be performed by the means described above in relation to UAV 21301.

A flight formation controller for a plurality of unmanned aerial vehicles (UAVs) each comprising an application system 21310, an aviation system 21320, and a power source 21340, the flight formation controller comprising: a receiver configured to receive individual application system 21310 energy consumption requirements for the plurality of UAVs 21301 and individual aviation system 21320 energy consumption requirements for the plurality of UAVs 21301; a processor configured to determine a flight formation for the plurality of UAVs 21301, the flight formation comprising a UAV 21301 with the lowest application system 21310 energy consumption requirement flying in a position of the flight formation requiring the highest aviation system 21320 energy consumption requirement; and a transmitter to send information indicating the flight formation to the plurality of UAVs 21301.

The controller of the flight formation controller may be configured to adjust positions of the plurality of UAVs 21301 within the flight formation based on changing individual application system energy consumption requirements of the plurality of UAVs 21301. The applications system may include a mobile access point 21310 and/or a sensing system. The flight formation may include the plurality of UAVs 21301 in a line in a direction of flight. The flight formation may include the plurality of UAVs 21301 in a V-shape.

An unmanned aerial vehicle (UAV) may include: an aviation system 21320 configured to control flight of the UAV; an application system 21310 comprising an application device, the application system configured to control the application device; a power source 21340 configured to provide energy for the aviation system 21320 and the application system 21310; a transmitter to send individual application system 21310 energy consumption requirements for the UAV and individual aviation system 72 energy consumption requirements for the UAV; a receiver configured to receive information indicating a flight formation for a plurality of UAVs that includes the UAV, with the flight formation comprising a UAV with the lowest application system 21310 energy consumption requirement flying in a position of the flight formation requiring the highest aviation system 21320 energy consumption requirement; and the aviation system 21320 further configured to control the UAV to take position in the flight formation based on the information indicating the flight formation.

The receiver may be further configured to receive an indication to adjust position of the UAV within the flight formation based on changing individual application system 21310 energy consumption requirements of the plurality of UAVs. The application device may include a mobile access point 110 and/or a sensing system. The flight formation may include the plurality of UAVs 21301 in a line in a direction of flight. The flight formation may include the plurality of UAVs 21301 in a V-shape.

In another aspect of the disclosure a UAV 21301 may be configured as a relay 22601 for a network access node 22610, which is shown in FIG. 226. Network access node 22610 may be substantially the same or similar to network access node 110, but may additionally be configured to communicate with a relay 22601, which may be a UAV 21301.

The UAV 21301 may track a terminal device 102, e.g., within a target zone 21512, so that terminal device 102 may remain connected when leaving a cell of network access node 22610, e.g., it may not require a handover when leaving the cell. The handover may effectively be shifted to a different level of network hierarchy.

Thus, in some cases, the handover is less critical from the point of view of terminal device 102. UAV 21301, configured as a relay 22601, (relay 22601 and UAV 21301 may be used interchangeably for this aspect of the disclosure) may establish communication with terminal device 102, while the terminal device 102 is being served by network access node 22610 until the terminal device 102 travels a predefined distance or enters coverage of another network access node. Relay 22601 may thus bridge a critical area in a gap (e.g., no man's land) between stationary network access nodes.

Thus, a relay 22601 may initially be positioned at an edge or border area of the coverage of network access node 22610, where they may be ready for a handover of a terminal device 102, e.g., from network access node 22610 to relay 22601. As an example, the relay 22601 may track terminal devices 102 and/or 500, which may travel along predetermined routes, e.g., train tracks or roads, etc., and may bridge a gap between network access nodes, and afterwards return to a position awaiting another terminal device 102 and/or 500 to travel along the route. The relay may, for example, remain stationary in position, or follow a lower energy consumption flight path as discussed above, or may land at a charging and/or refueling station 22640 along the predetermined route.

As may be shown in FIG. 226, a terminal device 102 may be within a coverage area 22612 of a network access node 22610. Terminal device 102 may be communicating with network access node 22610. Relay 22601 may also be communicating with network access node 22610. As terminal device 102 nears the edge of coverage area 22612, UAV 21301 may be configured as a relay 22601 between terminal device 102 and network access node 22610. For example, UAV 21301 may be in a better position to communicate with network access node 22610 and/or have a mobile access point 110 that may have a more powerful transceiver compared to terminal device 102. Additionally or alternatively, relay 22601 may communicate with the network via other network access nodes.

As terminal device 102 leaves the coverage area 22612, relay 22601 may maintain communication with terminal device 102 and track it, e.g., relay 22601 may remain within a target zone 21512 of terminal device 102. From the point of view of terminal device 102, it is still within the coverage area 22612 of network access node 22610, as it has not been required to execute a handover to another network access node 22610.

An exemplary handover is shown in FIG. 227. Terminal device 102 may initially be in coverage area 22612 of network access node 22610. Relay 22601 may be hovering in an energy efficient location, may be charging and/or refueling at a station 22640, or may be landed.

Terminal device 102 may move to an edge of coverage area 22612.

In anticipation of a handover, relay 22601 may move towards terminal device 102 if not already positioned nearby or within communication range. Relay 22601 may communicate with network access node 22610 in preparation of handover of the terminal device 102 from direct communication with the network access node 22610 to relay 22601.

Terminal device 102 may be handed over to relay 22601, which forwards data between the terminal device 102 and network access node 22610.

The terminal device 102 may then move out of coverage area 22612, but may remain in communication with relay 22601. Relay 22601 is in communication with network access node 22610.

Terminal device 102 may move closer to network access node 22620 and its coverage area 22622. Relay 22601 may track terminal device 102, e.g., flying within a target zone 21512 based on terminal device 102 (or a plurality of terminal devices 102 and/or 500), and may continue communications with network access node 22610.

When close enough to network access node 22620, relay 22601 hands over from network access node 22610 to network access node 22620 and now forwards data between terminal device 102 and network access node 22620. At this point, terminal device 102 still does not experience a hand over.

Terminal device 102 may enter an edge area of coverage area 22622, but may remain in communication with relay 22601. Upon reaching a certain threshold level signal from network access node 22620, terminal device 102 may finally hand over to network access node 22620 and disengage from relay 22601.

Relay 22601 may move to an energy efficient position, fly and/or land in a position to track another terminal device, or fly to a charging and/or refueling station 22640. Alternatively, relay 22601 may return to a position within network access node 22610.

In an aspect of the disclosure, there may be a plurality of UAVs 21301 configured as relays 22601 that may travel between network access nodes tracking terminal devices. After functioning as a relay 22601 for a terminal device, relay 22601 may fly to another network access node that has no UAVs 21301 or requires more.

The network may control the execution of handovers and dispatch of UAVs 21301 configured as relays 22601. Relay 22601 may communicate information relating to location and status of both terminal devices and other UAVs 21301. Additionally or alternatively, a relay 22601 may be configured to control the execution of a handover, or another network system may receive the information relating to location and statuses and control the handovers, e.g., at a charging and/or refueling station 22640, which may function as a control unit or dispatcher.

The handovers may reuse legacy signaling to effect the handovers from network access nodes 22610 and 22620 and relay 22601, e.g., relay nodes in LTE-A. For example, the X2 interface may be reused (or the X2 interface via the mobile access point 110 in the relay 22601) for administrating handovers and for measurements related to terminal device 102. Handover criteria such as signal strength indicators, e.g., received signal strength indicator (RSSI), and/or signal quality indicators, e.g., signal-to-noise ratio (SNR), signal-to-interference-plus-noise ratio (SINR), reference signal received quality (RSRQ), reference signal received power (RSRP), etc., may also be used for handovers from network access nodes 22610 and 22620 to and from relay 22601.

Method 22800 may be a method of flying an unmanned aerial vehicle (UAV) 21301 including a mobile access point 110 along a flight path, the method 22800 including: configuring the mobile access point 110 as a relay 22601 for a network access node 22610 and to communicate with one or more terminal devices 102 and/or 500; handing over communication of the one or more terminal devices 102 and/or 500 from the network access node 22610 to the mobile access point 110; determining a target zone 21512 based on the one or more terminal devices 102 and/or 500; determining a flight path for the UAV 21301 within the target zone 21512; and flying the UAV 21301 along the flight path.

UAV 21301 may follow the one or more terminal devices 102 and/or 500 within the target zone 21512 to a coverage area 22622 of a further network access node 22620. Method 22800 may further include flying the UAV 21301 back to the network access node 22610 after escorting the one or more terminal devices 102 and/or 500 to the coverage area 22622 of the further network access node 22620.

The one or more terminals 102 and/or 500 may travel along a predefined route, which may be based on a terrestrial transportation route over land and/or water. The predefined route may be based on an aviation transportation route. The predefined route may be based on an astronautic transportation route.

The target zone 21512 may be based on a maximum communication range of the mobile access point 110. The target zone 21512 may be based on a communication quality parameter for communications with the one or more terminal devices 102 and/or 500. The target zone 21512 may further include a target location 21510 based on a predefined threshold of a communication quality parameter for communications with the one or more terminal devices 102 and/or 500. The communication quality parameter may be based on a signal strength indicator and/or a signal quality indicator. The one or more terminals 102 and/or 500 may change position over time.

Method 22800 may further include flying the UAV 21301 along the flight path with a ground speed based on one-half the difference of the first velocity and the second velocity. The first path 21701 may be at a first altitude and the second path 21702 may be at a second altitude. The flight path may further include an ascent path 21603 to 21703 of the first altitude and a descent path 21704 to the second altitude. The first path 21701 and/or the second path 21702 may have a greater horizontal distance than a vertical distance of the ascent path 21703 and/or the descent path 21704. A charging station for the UAV 21301 may be located along the flight path. Method 22800 may further include communicating with the one or more terminal devices 102 and/or 500 in the target zone 21512. The functions of method 22800 may also be performed by the means described above in relation to UAV 21301.

An unmanned aerial vehicle (UAV) may include: a mobile access point 110 configured as a relay 22601 for a network access node 22610 and may be configured to communicate with one or more terminal devices 102 and/or 500; the processor may be configured to: determine a target zone 21512 based on the one or more terminal devices 102 and/or 500 and determine a flight path for the UAV within the target zone 21512; and an aviation system 21320 configured to fly the UAV along the flight path.

The UAV may follow the one or more terminal devices 102 and/or 500 within the target zone 21512 to a coverage area 22622 of a further network access node 22620. Processor 21330 may be configured to control the aviation system 21320 to fly the UAV back to the network access node 22610 after escorting the one or more terminal devices 102 and/or 500 to the coverage area 22622 of the further network access node 22620.

The one or more terminals 102 and/or 500 may travel along a predefined route, which may be based on a terrestrial transportation route over land and/or water. The predefined route may be based on an aviation transportation route. The predefined route may be based on an astronautic transportation route.

The target zone 21512 may be based on a maximum communication range of the mobile access point 110. The target zone 21512 may be based on a communication quality parameter for communications with the one or more terminal devices 102 and/or 500. The target zone 21512 may further include a target location 21510 based on a predefined threshold of a communication quality parameter for communications with the one or more terminal devices 102 and/or 500. The communication quality parameter may be based on a signal strength indicator and/or a signal quality indicator. The one or more terminals 102 and/or 500 may change position over time.

Processor 21330 may be configured to control the aviation system 21320 to fly the UAV along the flight path with a ground speed based on one-half the difference of the first velocity and the second velocity. The first path 21701 may be at a first altitude and the second path 21702 may be at a second altitude. The flight path may further include an ascent path 21703 of the first altitude and a descent path 21704 to the second altitude. The first path 21701 and/or the second path 21702 may have a greater horizontal distance than a vertical distance of the ascent path 21703 and/or the descent path 21704. A charging station for the UAV may be located along the flight path.

A network access node 22610 may be configured to communicate with one or more terminals 102 and/or 500, the network access node 22610 may include: an unmanned aerial vehicle (UAV) 21301, the UAV 21301 including: a mobile access point 110 configured as a relay 22601 for the network access node 22610 and configured to communicate with the one or more terminal devices 102 and/or 500; a processor 21330 configured to: determine a target zone 21512 based on the one or more terminal devices 102 and/or 500 and determine a flight path for the UAV 21301 within the target zone 21512; and an aviation system 21320 configured to fly the UAV 21301 along the flight path; the network access node 22610 including: a transceiver configured to communicate with the one or more terminals 102 and/or 500; a network access node processor configured to hand over communication of the one or more terminal devices 102 and/or 500 to the UAV 21301.

UAV 21301 may follow the one or more terminal devices 102 and/or 500 within the target zone 21512 to a coverage area 22622 of a further network access node 22620. Processor 21330 may be configured to control the aviation system 21320 to fly the UAV 21301 back to the network access node 22610 after escorting the one or more terminal devices 102 and/or 500 to the coverage area 22622 of the further network access node 22620.

The one or more terminals 102 and/or 500 may travel along a predefined route, which may be based on a terrestrial transportation route over land and/or water. The predefined route may be based on an aviation transportation route. The predefined route may be based on an astronautic transportation route.

The target zone 21512 may be based on a maximum communication range of the mobile access point 110. The target zone 21512 may be based on a communication quality parameter for communications with the one or more terminal devices 102 and/or 500. The target zone 21512 may further include a target location 21510 based on a predefined threshold of a communication quality parameter for communications with the one or more terminal devices 102 and/or 500. The communication quality parameter may be based on a signal strength indicator and/or a signal quality indicator. The one or more terminals 102 and/or 500 may change position over time.

Processor 21330 may be configured to control the aviation system 21320 to fly the UAV 21301 along the flight path with a ground speed based on one-half the difference of the first velocity and the second velocity. The first path 21701 may be at a first altitude and the second path 21702 may be at a second altitude. The flight path may further include an ascent path 21703 to the first altitude and a descent path 21704 to the second altitude. The first path 21701 and/or the second path 21702 may have a greater horizontal distance than a vertical distance of the ascent path 21703 and/or the descent path 21704. A charging station for the UAV 21301 may be located along the flight path.

In an aspect of the disclosure, a network access node 110, network access node 120, and a network access node 130 may be configured in a two dimensional resource allocation as shown in FIG. 229. In this example of FIG. 229, the coverage areas may be distributed along a horizontal plane. However, as shown in FIG. 230, resource allocation may be extended in a third dimension, e.g., altitude, with UAVs 21301 that may include a mobile access point 110. Therefore, each UAV 21301 may have a coverage zone 23010, 23020, 23030, 23040, 23050, 23060, 23070, and 23080, respectively. A UAV 21301 may fly along a flight path as described above within the coverage zone.

In addition, the designation for UAVs 21301 in a particular coverage zone may be dynamic. For example, UAV 21301 may be tracking a terminal device 102 in coverage zone 23080. The terminal device may travel into coverage zone 23070 and the UAV 21301 from coverage zone 23070 with it. The UAV 21301 in coverage zone 23070, however, may not be communicating with any terminal devices. Accordingly, the UAV 21301 from coverage zone 23080 may take over coverage zone 23070, while the UAV 21301 originally in coverage zone 23070 may take over coverage zone 23080.

Thus, a coverage zone 23010-23080 may include a region defined by a length, a width, and an altitude. The coverage zone may include a UAV 21301 with a mobile access point 110 for communication with one or more terminal devices 102 and/or 500. The UAV 21301 may fly along a flight path within a coverage zone 23010-23080.

In an aspect of the disclosure, FIG. 231 shows a UAV 23101. UAV 23101 may be substantially similar to UAV 21301, and may include additional features. UAV 23101 may include flight control surfaces 21322. UAV 23101 may include a rotatable structure 23110 including an airfoil 23120, e.g., one or more airfoils 23120. Although two airfoils 23120 are shown in FIG. 231, UAV 23101 may have any number of airfoils 23120. A generator 23130 may be coupled with the rotatable structure 23110. Generator 23130 may be coupled to a battery 23140. Battery 23140 may be part of power source 21340. Rotatable structure 23110 may be configured to generate electricity that charges battery 23140 when air passing over airfoil 23120 causes rotatable structure 23110 and generator 23130 to generate electricity.

Rather than (and/or in addition to) a UAV 21301 flying to a charging and/or refueling station 22640 as discussed above, a UAV 23101 may be able to charge itself. As shown in FIG. 232, UAV 23101 may determine a flight path including a descent 23204. UAV 23101 may then fly along the descent 23204 at a velocity that air passing over the airfoil 23120 turns rotatable structure 23110 and generator 23130 to generate electricity, which may be stored in battery 23140. As an example, if UAV 23101 is flying along a flight path described above including a first path 21701 at a first altitude and a second path 21702 at a second altitude, UAV 23101 may further extend its flight time by charging battery 23140 during descent path 21704.

Method 23300 of FIG. 233 is a method of charging an unmanned aerial vehicle (UAV). The UAV including a rotatable structure 23110 including an airfoil 23120; a generator 23130 coupled with the rotatable structure 23110; a battery 23140 coupled with the generator 23130, the rotatable structure 23110 configured to generate electricity that charges the battery 23140 when air passing over the airfoil 23120 causes the rotatable structures 23110 and the generator 23130 to rotate, the method 23300 including: determining a flight path for the UAV including a descent 23204; flying the UAV in the descent 23204 along the flight path at a velocity that air passing over the airfoil 23120 turns the rotatable structure 23110 and the generator 23130 to generate electricity; and storing the electricity in the battery 23140. The functions of method 23300 may also be performed by the means described above in relation to UAV 23101.

Additionally or alternatively, UAV 23101 may be fixed to a structure 23410 in a wind as shown in FIG. 234. Structure 23410 may be a fixed structure or may be a cable-like structure. For example, UAV 23101 may have fixed-wing or autogyro flight control surfaces 21322 so that a wind 23400 may keep UAV 23101 aloft, e.g., like a kite. Wind 23400 may also generate electricity via rotatable structure 23110 and generator 23130. In another example, structure 23410 may be a fixed structure and may be able to support the weight of UAV 23101, so that it may be fixed in place and wind 23400 passing over rotatable structure 22120 and generator 23130 may generate electricity to charge UAV 23101. In another aspect of the disclosure, UAV 21301 may be attached to structure 23410, which may include two cables so that UAV 21301 may be charged by the cables.

While attached to structure 23410, UAV 21301 and/or UAV 23101 may use its flight controls 21322 to drive towards positions that would inaccessible for a kite.

Once charged, UAV 23101 and/or UAV 21301 may detach from structure 23410. Structure 23410 may be transferred to another UAV 21301 and/or UAV 23101, so that it does not fall to the ground.

Method 23500 of FIG. 235 is a method of charging an unmanned aerial vehicle (UAV). The UAV including a rotatable structure 23110 including an airfoil 23120; a generator 23130 coupled with the rotatable structure 23110; a battery 23140 coupled with the generator 23130, the rotatable structure 23110 configured to generate electricity that charges the battery 23140 when air passing over the airfoil 23120 causes the rotatable structures 23110 and the generator 23130 to rotate, the method 23500 including: fixing the UAV to a structure 23410 in a wind 23400 with air passing over the airfoil 23120 that turns the rotatable structure 23110 and the generator 23130 to generate electricity; and storing the electricity in the battery 23140. The functions of method 23500 may also be performed by the means described above in relation to UAV 23101.

Additionally or alternatively, as shown in FIG. 236, a UAV 23101 may be fixed to another UAV 23601, which may be a UAV 21301 or a UAV 23101, by a structure 23610. Structure 23610 may be flexible or rigid. For example, structure 23610, may be a chain-like structure or a cable. Structure 23610 may be a rod or bar. UAV 23601 may then transport UAV 23101, e.g., towing or pushing, so that air causes rotatable structure 23110 and generator 23130 to turn and generate electricity. UAV 23101 may produce lift with its flight control surfaces 21322 or may passively fly, e.g., if UAV 23101 has fixed wings or has an autogyro rotor and is being transported by UAV 23601 or UAV 23101 is supported by UAV 23601. UAV 23601 and UAV 23101 may be in a flight formation and have energy consumption requirements as discussed above.

Method 23700 of FIG. 236 237 is a method of charging an unmanned aerial vehicle (UAV). The UAV including a rotatable structure 23110 including an airfoil 23120; a generator 23130 coupled with the rotatable structure 23110; a battery 23140 coupled with the generator 23130, the rotatable structure 23110 configured to generate electricity that charges the battery 23140 when air passing over the airfoil 23120 causes the rotatable structures 23110 and the generator 23130 to rotate, the method 23500 including: fixing the UAV 23101 to a further UAV 23601; transporting the UAV 23101 with the further UAV 23601 with air passing over the airfoil 23120 that turns the rotatable structure 23110 and the generator 23130 to generate electricity; and storing the electricity in the battery 23140. UAV 23101 may be coupled to further UAV 23601 via a structure 23610. The functions of method 23700 may also be performed by the means described above in relation to UAV 23101.

Improved Service Recovery after Network Failure

There are various possible network scenarios where standardized terminal device behavior may cause lengthy delays in recovering voice or data services. As an example, the 3GPP LTE standard mandates certain procedural behaviors that could cause long delays when a terminal device tries to regain circuit-switched (CS), packet-switched (PS), or evolved packet-switched (EPS) services. While LTE is used an example in the following description, the aspects described herein can also be applied to other radio access technologies that involve the same or similar terminal device behavior.

One LTE scenario that could cause long service recovery times involves Non-Access Stratum (NAS) signaling procedures. For example, when a terminal device in idle mode moves into a new Tracking Area (TA), the 3GPP standard dictates that the terminal device should temporarily attach to the network using a random access procedure and send a Tracking Area Update (TAU) to the Mobility Management Entity (MME) of the new TA. However, in some scenarios there may be a network failure (e.g., radio access failure/disconnection or core network failure) that prevents completion of the TAU. When this occurs, the 3GPP standard mandates that the NAS on the terminal device (e.g., the NAS software running as part of the protocol stack) should start a timer (e.g., timer T3411 with a duration of 10 s) and temporarily suspend further TAU attempts. As the terminal device is expected to wait until the timer expires before attempting again, this can introduce long delays before the TAU can be completed. This same issue can also arise for other NAS signaling procedures, such as Location Area Updates (LAUs), Routing Area Updates (RAUs), Attach procedures, and Service Request procedures. Delays involved in Attach and Service Request procedures can be particularly problematic, as a user of the terminal device may not be able to use the terminal device for data transfer until the NAS signaling procedure is completed.

This 3GPP-mandated behavior regarding the use of a timer before performing another procedure attempt may also be sub-optimal in scenarios where fake cells are present. These fake cells are unauthorized equipment (e.g., set up by an unsanctioned or malicious entity) that act like standard network access nodes by broadcasting synchronization signals and system information and exchange other radio access signaling with terminal devices. However, as they are unauthorized, fake cells are not actually connected to the core network and should be avoided due to their potentially malicious intent.

Accordingly, when a terminal device attempts to use a fake cell for the radio access connection to perform a core network signaling procedure (e.g., a NAS signaling procedure), the terminal device may detect a network failure due to the fake cell's inability to fully function as a network access node. If the fake cell causes a radio access failure/disconnection (e.g., does not respond to random access attempts or releases the radio access connection), the terminal device may initiate a timer per the 3GPP standard and wait until the timer has expired before re-attempting the NAS signaling procedure. As the fake cell may still be unable to carry out the NAS signaling procedure, the subsequent attempt will also fail, which will then prompt re-initiation of the timer. This procedure can continue until the terminal devices reaches a threshold number of attempts (e.g., a maximum attempt count specified by the 3GPP), after which the terminal device may be expected to disable LTE for an extended duration timer (e.g., 3GPP timer T3402). If the fake cell causes a core network failure (e.g., by sending reject messages), the terminal device may block the TA that the fake cell is broadcasting (thus preventing the terminal device from attempting the NAs signaling procedure on another network access node in this TA) or may start an extended duration timer (e.g., 3GPP timers T3402, T3302, or T3212).

There can also be long service recovery times when a temporary Out-of-Coverage (OOC) scenario causes the LTE system to reach a threshold number of registration attempts, which per the LTE standard triggers initiation of an extended duration timer (e.g., 3GPP timer T3402). However, in some scenarios LTE service may become available before the extended duration timer expires, and the terminal device may therefore waste considerable time before attempting to establish LTE service. For example, when a user carrying a terminal device enters an elevator or drives through a tunnel, there may be a temporary outage of LTE service that causes the LTE system of the terminal device to reach the threshold number of connection attempts. Even if the user exits the elevator or tunnel shortly thereafter, as per the 3GPP standard the LTE system may wait the full duration of the timer (e.g., 12 minutes in the case of T3402) before attempting to establish LTE service.

These scenarios can be particularly problematic when a user attempts to use voice or data services while the LTE system is waiting for a timer to expire before completing a given core network signaling procedure. Accordingly, as recognized by this disclosure and described below, various aspects may provide specialized procedures that improve service recovery time and enable a terminal device to complete a core network signaling procedure at an earlier time.

FIG. 238 shows an exemplary internal configuration of terminal device 23800 according to some aspects. As shown in FIG. 238, terminal device 23800 may include antenna system 23802, RF transceiver 23804, and baseband modem 23806. Antenna system 23802 and RF transceiver 23804 may be configured in the manner of antenna system 202 and RF transceiver 204 of terminal device 102 in FIG. 2. Accordingly, in the receive direction, antenna system 23802 may receive wireless radio signals and transduce the wireless radio signals into analog radio signals. RF transceiver 23804 may then perform radio processing on the analog radio signals to obtain baseband data (e.g., IQ samples), which RF transceiver 23804 may provide to baseband modem 23806 for baseband processing. In the transmit direction, baseband modem 23806 may provide baseband data to RF transceiver 23804, which may perform radio processing on the baseband data to obtain analog radio signals. RF transceiver 23804 may then provide the analog radio signals to antenna system 23802, which may then wirelessly transmit the analog radio signals.

Baseband modem 23806 may be configured with the same or similar functionality described above for baseband modem 206 of terminal device 102 in FIG. 2. Accordingly, baseband modem 23806 may be configured to perform physical layer and protocol stack processing on baseband data provided by RF transceiver 23804 to recover user data (e.g., transport or application layer data) contained in the wireless radio signals initially received by antenna system 23802, and to perform protocol stack and physical layer processing on user data to obtain baseband data (e.g., IQ samples) for wireless transmission by RF transceiver 23804 and antenna system 23802.

As shown in FIG. 238, baseband modem 23806 may include radio access processor 23808 and core signaling controller 23812. In some aspects, radio access processor 23808 may be configured to handle the Access Stratum (AS) processing and signaling of baseband modem 23806, which refers to the processing and signaling involved in transmitting and receiving data over the radio access network (e.g., to network access nodes). Accordingly, in some aspects radio access processor 23808 may be configured to retrieve from a memory and execute program code that defines AS functionality as executable instructions. In some aspects, radio access processor 23808 may include digital signal processing circuitry (e.g., hardware accelerators for physical layer processing tasks).

In some aspects, core signaling controller 23812 may be configured to handle the non-Access Stratum (NAS) processing and signaling of baseband modem 23806, which refers to the control signaling exchanged between terminal device 23800 and various core network nodes (e.g., Mobility Management Entities (MME) in LTE, Mobile Switching Center (MSC) and Serving GPRS Support Node (SGSN) in UMTS, and any other similar core network node in another radio access technology). Accordingly, in some aspects, core signaling controller 23812 may be configured to retrieve from a memory and execute program code that defines NAS functionality as executable instructions.

As introduced above, there may be several scenarios where service recovery time can be improved. FIG. 239 shows an exemplary first scenario according to some aspects. As shown in FIG. 239, terminal device 23800 may be located in the coverage area of network access nodes 23902 and 23904 (e.g., may be within radio connection range of network access nodes 23902 and 23904). In this scenario, network access nodes 23902 and 23904 may belong to the same network tracking area 23900. In an exemplary LTE context, network tracking area 23900 may be a Tracking Area (TA), which may be assigned a specific Tracking Area Code (TAC) by the network operator.

FIG. 240 shows exemplary message sequence chart 24000, which illustrates exemplary operation of terminal device 23800 in the first scenario according to some aspects. As shown in FIG. 240, radio access processor 23808 may first be camped on network access node 23902 in stage 24002. Core signaling controller 23812 may then trigger a core network signaling procedure in stage 24004. For example, as radio access processor 23808 may initially be in a radio idle mode (e.g., RRC Idle), and core signaling controller 23812 may trigger the core network signaling procedure to perform a network tracking area update (e.g., TAU, RAU, LAU), to perform a network attach procedure, or to establish a voice or data session. Exemplary core network signaling procedures can therefore include TAUs, RAUs, LAUs, Attach procedures, and/or Service Requests.

The core network signaling procedure may therefore involve signaling exchange between core signaling controller 23812 and a core network node, such as a Mobility Management Entity (MME), Serving GPRS Support Node (SGSN), or Mobile Switching Center (MSC). As this signaling exchange may use the radio access network for wireless transport, core signaling controller 23812 may request radio access connection establishment from radio access processor 23808 (e.g., an RRC Connection Establishment Request) in stage 24006.

Radio access processor 23808 may therefore attempt to establish a radio access connection with network access node 23902 in stage 24008. For example, radio access processor 23808 may attempt a random access procedure with network access node 23902 as part of an attempt to establish a radio access connection with which core signaling controller 23812 can execute the core network signaling procedure. However, in the case of FIG. 240, the radio access connection establishment may fail. This can occur, for example, due to a random access failure. Accordingly, radio access processor 23808 may report the radio access connection establishment failure to core signaling controller 23812 in stage 24010. Core signaling controller 23812 may therefore detect that the radio access connection establishment failed in stage 24012. Core signaling controller 23812 may then update a failed cell list by adding network access node 23902 (e.g., storing identity information of network access node 23902 in a list that contains identity information of network access nodes that have failed). Core signaling controller 23812 may also increment a connection attempt counter that tracks the number of failed connection attempts (e.g., may increment the connection attempt counter from 0 to 1). As further described below, core signaling controller 23812 may use the connection attempt counter to track failed radio access connection establishment attempts, and to stop further radio access connection establishment attempts when the connection attempt counter reaches a threshold number of connection attempts.

Core signaling controller 23812 may also start a timer in stage 24016, where the timer may track the time since the last radio access connection establishment failure. In some aspects, the timer may be a standard-mandated timer. For example, in the case of LTE, the 3GPP standard mandates that the NAS start timer T3411 when a random access connection establishment failure occurs as part of a NAS signaling procedure. As specified by the 3GPP, the NAS is to temporarily suspend NAS signaling procedures on the failed cell until timer T3411 expires (e.g., 10 seconds).

However, instead of refraining from all core network signaling procedures until the timer expires, terminal device 23800 may begin searching for other network access nodes that could potentially be used for the core network signaling procedure. As shown in FIG. 240, radio access processor 24014 may trigger a cell search in stage 24014 and begin searching for any other network access nodes that are detectable. For example, radio access processor 23808 may be configured to instruct cell searcher 23810 to perform a cell search. Cell searcher 23810, which may be a processor or digital hardware circuit configured to receive and process signals to detect pilot signals transmitted by network access nodes, may then be configured to perform the cell search (e.g., by receiving and processing baseband data provided by RF transceiver 23804 to detect any pilot signals and identifying the corresponding network access node that transmitted the pilot signal).

Cell searcher 23810 may then detect network access nodes and report the network access nodes to radio access processor 23808. Radio access processor 23808 may then evaluate the network access nodes to determine whether they meet cell selection criteria (e.g., a set of thresholds regarding radio measurement that define whether a network access node can be selected). In the example of FIG. 240, radio access processor 23808 may detect one or more available network access nodes, including network access node 23904. As previously indicated, network access node 23904 may also be a part of network tracking area 23900. Radio access processor 23808 may then report network access node 23904 as a detected network access node to core signaling controller 23812 in stage 24018.

After receiving the indication that network access node 23904 has been detected, core signaling controller 23812 may evaluate network access node 23904 based on a connection attempt counter and based on the failed cell list in stage 24020. For example, core signaling controller 23812 may check the failed cell list to determine whether network access node 23904 is in the failed cell list (e.g., where a radio access connection establishment procedure for the current core network signaling procedure has already failed with network access node 23904). As network access node 23902 is the only network access node in the failed cell list, core signaling controller 23812 may determine that network access node 23904 is not in the failed cell list. Core signaling controller 23812 may also check whether a connection attempt counter has reached a threshold number of connection attempts. This threshold number of connection attempts can be, for example, three, four, or five. As this is the first connection attempt (since the initial radio access connection establishment failure in stage 24008), core signaling controller 23812 may determine that the connection attempt counter has not reached the threshold number of connection attempts (e.g., may only be 1).

Accordingly, as network access node 23904 is not in the failed cell list and the connection attempt counter has not reached the threshold number of connection attempts, core signaling controller 23812 may request for radio access processor 23808 to attempt another radio access connection establishment through network access node 23904. As the timer may suspend radio access connection establishment attempts for network access node 23902 (e.g., but not other network access nodes), radio access processor 23808 may be able to attempt another radio access connection establishment with network access node 23904 in stage 24024. In the exemplary scenario of FIG. 240, this radio access connection establishment may be successful. Accordingly, network access node 23904 may respond with a radio access connection setup in stage 24026, and radio access processor 23808 may send back a radio access connection setup complete in stage 24028.

Radio access processor 23808 may then inform core signaling controller 23812 that the radio access connection establishment was successful in stage 24030. As terminal device 23800 may now have an active radio access connection, core signaling controller 23812 may be able to perform the core network signaling procedure. Core signaling controller 23812 may therefore reset the failed cell list (e.g., clear any network access nodes from the failed cell list that failed during this core network signaling procedure) in stage 24032 and perform the core network signaling procedure with the core network through network access node 23904

(e.g., using network access node 23904 for the radio access connection to interface with the core network) in stage 24034. For example, if the core network signaling procedure is a TAU, core signaling controller 23812 may exchange NAS signaling with an MME of the core network that indicates a new TA (e.g., that identifies network tracking area 23900). If the core network signaling procedure is an attach procedure or service request, core signaling controller 23812 may exchange NAS signaling with the MME to complete the attach or to complete the service request. Various other core network signaling procedures, for any radio access technology, are similarly applicable.

When a core network signaling procedure fails due to a radio access failure/disconnection with a first network access node, terminal device 23800 may therefore keep its AS running at radio access processor 23808 and continue searching for available network access nodes. Accordingly, if radio access processor 23808 detects an available second network access node, terminal device 23800 may attempt to use the second network access node to establish the radio access connection. Instead of waiting for the timer to expire, terminal device 23800 may thus be able to use the second network access node to establish a radio connection and subsequently perform the core network signaling procedure. In some cases, this may enable terminal device 23800 to perform the core network signaling procedure at an earlier time. This can be particular noticeable to a user when they are attempting to use terminal device 23800 for a voice or data session, as terminal device 23800 may be able to complete the core network signaling procedure and initiate the voice or data session sooner.

FIGS. 241A and 241B show exemplary message sequence chart 24100 according to some aspects, which further describes the functionality of terminal device 23800 in the first scenario (core network signaling procedure failure due to radio access failure/disconnection). As previously indicated regarding FIG. 240, core signaling controller 23812 may be configured to maintain a failed cell list (containing identity information for network access nodes that have previously failed for the current core network signaling procedure) and a connection attempt counter (that counts the number of radio access connection establishment attempts for the current core network signaling procedure). FIGS. 241A and 241B further illustrate the use of this failed cell list and connection attempt counter by core signaling controller 23812.

As shown in FIG. 241A, core signaling controller 23812 and radio access processor 23808 may perform stages 24102-24124 in the same manner of stages 24002-24024, respectively. Accordingly, after core signaling controller 23812 evaluates network access node 23902 in stage 24120 and determines that network access node 23902 is not in the failed cell list and that the connection attempt counter is less than the threshold number of connection attempts, radio access processor 23808 may attempt a radio access connection establishment with network access node 23904 in stage 24124. However, in contrast to stage 24024, the radio access connection establishment attempt may fail in stage 24124. Radio access processor 23808 may therefore notify core signaling controller 23812 of the radio access connection establishment failure in stage 24126. After detecting the radio access connection establishment failure in stage 24128, core signaling controller 23812 may in stage 24130 update the failed cell list (e.g., add identity information for network access node 23904 into the failed cell list that specifies that a radio access connection establishment attempt failed for network access node 23904 during the current core network signaling procedure) and connection attempt counter (e.g., increment from 1 to 2 due to the failed radio access connection establishment attempts for network access nodes 23902 and 23904). Core signaling controller 23812 may also start the timer (e.g., restart the timer that was initiated in stage 24116, e.g. T3402).

Radio access processor 23808 may continue to search for available network access nodes with cell searcher 23810, and may accordingly detect network access node 23906 (not explicitly shown in FIG. 239). Radio access processor 23808 may report network access node 23906 to core signaling controller 23812 in stage 24132.

Core signaling controller 23812 may then evaluate network access node 23906 with the connection attempt counter and the failed cell list in stage 24134. For example, core signaling controller 23812 may compare the connection attempt counter (e.g., its current value) to the threshold number of connection attempts, and determine that the connection attempt counter is less than the threshold number of connection attempts. Core signaling controller 23812 may also check the failed cell list to determine whether network access node 23906 is included within the failed cell list, and may subsequently determine that network access node 23906 is not included within the failed cell list.

Continuing to FIG. 241B (which shows the remainder of message sequence chart 24100), core signaling controller 23812 may then request radio access connection establishment with network access node 23906 from radio access processor 23808. Radio access processor 23808 may then attempt radio access connection establishment in stage 24136. However, as shown in FIG. 241B, the radio access connection establishment with network access node 23906 may also fail. Radio access processor 23808 may report the radio access connection establishment failure to core signaling controller 23812 in stage 24138.

Core signaling controller 23812 may therefore detect the radio access connection establishment failure in stage 24140, and subsequently update the failed cell list (e.g., add network access node 23906 to the failed cell list) and update the connection attempt counter (e.g., increment from 2 to 3) in stage 24142. Core signaling controller 23812 may also restart the timer in stage 24142.

In the example of message sequence chart 24100, the threshold number of connection attempts may be three. Accordingly, following the radio access connection establishment attempt failure for network access node 23906, the connection attempt counter may reach the threshold number of connection attempts. Therefore, when radio access processor 23808 reports another detected network access to core signaling controller 23812 in stage 24144, core signaling controller 23812 may determine that the connection attempt counter has reached the threshold number of connection attempts when it evaluates the detected network access node in stage 24146. Instead of request radio access connection establishment from radio access processor 23808, core signaling controller 23812 may wait for the timer to expire before attempting another radio access connection establishment in stage 24148. For example, as radio access connection establishment has already failed the threshold number of times, this may mean that terminal device 23800 is in a low signal coverage area. This in turn can indicate that subsequent radio access connection establishment attempts would also fail, and it may be preferable to conserve battery power and wait until the timer expires (e.g., 10 s) before attempting another radio access connection establishment.

In a variation on the process of message sequence chart 24100, radio access processor 23808 may re-detect network access node 23902 in stage 24132, and report network access node 23902 to core signaling controller 23812 in stage 24132. Accordingly, when core signaling controller 23812 compares the network access node 23902 with the failed cell list in stage 24134, core signaling controller 23812 may determine that network access node 23902 has already been involved in a failed radio access connection establishment attempt for the current core network signaling procedure. Core signaling controller 23812 may therefore decide not to request radio access connection establishment for network access node 23902 from radio access processor 23808, and may instead wait until radio access processor 23808 detects another cell or the timer expires. Core signaling controller 23812 may not increment the connection attempt counter in this case (as no radio access connection establishment attempt was actually made).

In some aspects, core signaling controller 23812 may be configured to use a failed cell list but no connection attempt counter (e.g., may continue to attempt radio access connection establishment on network access nodes detected by radio access processor 23808 for an unlimited number of times). In other aspects, core signaling controller 23812 may be configured to use a connection attempt counter but no failed cell list (e.g., may limit radio access connection establishment attempts to the threshold number of attempts, but may allow repeated radio access connection establishment attempts on the same network access node).

In summary, when confronted with the first scenario where there is a core network signaling procedure failure due to radio access failure or disconnection (e.g., random access failure or RRC connection release), terminal device 23800 may be configured to look for other available network access nodes and to attempt radio access connection establishment on these network access nodes before the timer expires. This can improve service recovery time, as terminal device 23800 may be able to complete the core network signaling procedure at an earlier time.

As previously introduced, there may also be scenarios where core network signaling procedures fail due to core network failures. FIG. 242 shows an exemplary second scenario according to some aspects. As opposed to the first scenario, this second scenario (core network signaling procedure failure due to core network failure) may therefore involve a failure in the core network. With reference to FIG. 242, terminal device 23800 may be located in the coverage area of network access nodes 24204 and 24206. Network access nodes 24204 and 24206 may be located in different network tracking areas, where network access node 24204 is part of network tracking area 24200 and network access node 24206 is part of network tracking area 24202.

Using the 3GPP LTE standard as an example, an LTE terminal device may receive a NAS signaling rejection for certain core network signaling procedures. For example, a terminal device may send a TAU to an MME using a first LTE cell (or, alternatively, for UMTS, the terminal device may send a RAU to an SGSN or a LAU to an MSC using a first UMTS cell). The terminal device may then receive a TAU Reject with a temporary rejection cause, such as cause #17 (Network Failure). This temporary core network failure can be, for example, due to the terminal device's existing subscription services (e.g., where lower priority users are rejected), network congestion, or network maintenance. As further described below, the temporary core network failure can also be due to a fake cell. Per the 3GPP standard, a terminal device that detects a temporary core network failure (e.g., by receiving a rejection that specifies a temporary cause from the core network in response to a core network signaling procedure) is directed to start a timer (e.g., timer T3411) and to suspend further attempts at the core network signaling procedure in the affected network tracking area until the timer expires. For example, as each network tracking area in LTE is served by a particular MME, a terminal device following the 3GPP standard should suspend attempts at core network signaling procedures with the MME that is experiencing the temporary core network failure until the timer expires. As long as the first LTE cell continues to have good signal strength (e.g., satisfying the camping criteria), the terminal device will wait while camped on the first LTE cell, and then reattempt the core network signaling procedure with the MME through the first LTE cell.

FIG. 243 shows exemplary message sequence chart 24300 according to some aspects, which shows functionality of terminal device 23800 for the second scenario. As shown in FIG. 243, radio access processor 23808 may first be camped on network access node 23902 in stage 24302. Core signaling controller 23812 may then trigger a core network signaling procedure in stage 24304, and may attempt the core network signaling procedure in stage 24306. Although not explicitly shown in FIG. 243, stage 24306 can include the radio access connection establishment attempt procedure of stages 24106-24108 in FIG. 241A. As opposed to message sequence charts 24000 and 24100, where there was a radio access failure, the radio access connection establishment in stage 24306 may be successful (e.g., radio access processor 23808 may successfully enter radio connected mode with network access node 23902).

However, the core signaling procedure in stage 24306 may fail due to a core network failure. For example, after core signaling controller 23812 sends core network signaling to a core network node (e.g., to an MME), the core network node may respond by sending back core network signaling that specifies a temporary core network failure (e.g., a TAU Reject with cause #17). In some radio access technologies, this core network failure may impact the entire area that the core network node serves (e.g., the entire network tracking area, or the set of network access nodes served by the core network node). For example, in the exemplary LTE case where an MME serves all LTE cells in a given TA, a temporary core network failure may mean that core network signaling procedures through any LTE cell in the TA will fail.

Accordingly, while terminal device 23800 may not be able to immediately complete the core network signaling procedure with a network access node in network tracking area 24200 (and per the standard may have to wait for the timer to expire before reattempting the core network signaling procedure in network tracking area 24200), terminal device 23800 may be able to attempt and complete the core network signaling procedure with a network access node in another network tracking area. This could therefore allow terminal device 23800 to complete the core network signaling procedure at an earlier time, and potentially allow the user to access voice or data services earlier.

As shown in FIG. 243, core signaling controller 23812 may add network tracking area 24200 to a failed network tracking area list in stage 24308. The failed network tracking area list may therefore identify the network tracking areas (e.g., TAs) that have been involved in failed attempt for the current core network signaling procedure. Core signaling controller 23812 may also in stage 24308 start a timer that tracks the time since the last temporary core network failure (e.g., 3GPP timer T3411). Depending on the standard, this timer may define the amount of time that terminal device 23800 is expected to wait before re-attempting a core network signaling procedure in the network tracking area.

As shown in FIG. 243, radio access processor 23808 may trigger a cell search with cell searcher 23808 in stage 24310. Cell searcher 23808 may therefore report detected network access nodes back to radio access processor 23808, which may evaluate the detected network access nodes against a selection criteria (e.g., set of thresholds) to determine whether any of the detected network access nodes are viable for radio access connection. In the example of FIG. 243, cell searcher 23808 may detect and report network access node 23904, which radio access processor 23808 may determine meets the selection criteria. Radio access processor 23808 may therefore report network access node 23904 to core signaling controller 23812 in stage 24312. Radio access processor 23808 may also determine the network tracking area of network access node 23904, such as by receiving (via RF transceiver 23804) and processing system information broadcasted by network access node 23904 to identify a network tracking area specified in the system information Core signaling controller 23812 may then evaluate network access node 23904 with the failed network tracking area list. As previously indicated, a temporary core network failure may signify that core network signaling procedures will fail if attempted on any network access node in the affected network tracking area. Accordingly, core signaling controller 23812 may check the failed network tracking area list to determine whether the network tracking area of network access node 23904 is in the failed network tracking list. If, for example, a core network signaling procedure attempt had also failed while using a network access node in the same tracking area, core signaling controller 23812 may determine that the network tracking area of network access node 23904 is listed in the failed network tracking area list. Core signaling controller 23812 may therefore decide not to attempt the core network signaling procedure through network access node 23904.

In the example of FIG. 242, network access node 23904 may be in tracking area 24202, which may not have been involved in a core network failure for the core network signaling procedure. Accordingly, as tracking area 24202 is not in the network tracking area list, core signaling controller 23812 may determine in stage 24314 that the core network signaling procedure can be attempted through network access node 23904. Core signaling controller 23812 may therefore attempt the core network signaling procedure in stage 24316 (e.g., by establishing a radio access connection with network access node 23904 via radio access processor 23808 and using the radio access connection to send signaling to the core network node as part of the core network signaling procedure). This may occur before the timer (started in stage 24308) expires. For example, as the duration of the timer may only specify a time during which further core signaling procedure attempts are suspended for the network tracking area involved in a core network failure, core signaling controller 23812 may be able to attempt core signaling procedures through network access nodes in other network tracking areas.

As shown in FIG. 243, the core network signaling procedure in stage 24316 may be successful. As core signaling controller 23812 may have performed the core network signaling procedure before the timer expires, terminal device 23800 may be able to complete the core network signaling procedure at an earlier time. After completing the core network signaling procedure in stage 24316, core signaling controller 23812 may reset the failed network tracking area list in stage 24318 (e.g., clear all entries).

In some aspects, core signaling controller 23812 may also use a procedure attempt counter when operating in the second scenario. This procedure attempt counter may function in a similar manner to the connection attempt counter described above for message sequence charts 24000 and 24100. Accordingly, core signaling controller 23812 may increment the procedure attempt counter each time that a core network signaling procedure (e.g., on a network access node from a new network tracking area that is not in the failed network tracking area list) fails. When radio access processor 23808 reports detected network access nodes (e.g., as in stage 24312), core signaling controller 23812 may be configured to determine whether the procedure attempt counter is less than the threshold number of connection attempts. If so (and if the network tracking area of the detected network access node is not in the failed network tracking area list), core signaling controller 23812 may attempt the core network signaling procedure on the detected network access node. If not, core signaling controller 23812 may not attempt the core network signaling procedure, and may wait until the timer expires before attempting the core network signaling procedure again.

In some aspects, the functionality of terminal device 23800 described above may also be advantageous in cases where fake cells are deployed. As previously introduced, these fake cells can be unauthorized equipment that is deployed by potentially malicious entities (e.g., to eavesdrop or steal user information). These fake cells may be able to perform cell radio activity that may be largely indistinguishable from real cells. For example, fake cells may broadcast valid synchronization signals and be able to exchange other radio access signaling with terminal devices. However, as they are unauthorized, fake cells may not interface with the operator's core network, and terminal devices may therefore not be able to use fake cells to transmit or receive user data via the core network. Due to their potentially indistinguishable radio access behavior, a terminal device may not be able to detect whether it is connected to a fake cell. This can be problematic, as the terminal device may get stuck on a fake cell.

FIG. 244 shows an example involving fake cells according to some aspects. In the example of FIG. 244, terminal device 23800 may initially be camped on fake cell 24402. Terminal device 23800 may also be within the coverage area of network access node 24404. Network access node 24404 may be part of network tracking area 24400. Although fake cell 24402 is not actually part of the network, fake cell 24402 may broadcast falsified system information that indicates that it is part of network tracking area 24400.

By using the functionality of message sequence charts 24000 and 24100 described above for the first scenario, terminal device 23800 may be able to reduce the negative impacts of fake cell 24402. For example, core signaling controller 23812 may trigger a core network signaling procedure (e.g., as in stages 24004 and 24104 of message sequence charts 24000 and 24100). As terminal device 23800 is initially camped on fake cell 24402, radio access processor 23808 may then attempt radio access connection establishment with fake cell 24402.

As fake cell 24402 is not actually part of the network, terminal device 23800 will not be able to complete the core network signaling procedure through fake cell 24402. Depending on its configured functionality, fake cell 24402 may be configured to handle the radio access connection establishment attempt by terminal device 23800 in various different ways. In a first case, fake cell 24402 may cause a radio access failure when radio access processor 23808 attempts radio access connection establishment. For example, fake cell 24402 may not respond to random access attempts (e.g., RACH preambles transmitted by radio access processor 23808), or may temporarily allow radio access processor 23808 to establish a radio access connection (e.g., an RRC connection), but may release (e.g., terminate) the radio access connection soon after it is established. This behavior by fake 24402 will cause a radio access failure.

Accordingly, terminal device 23800 may use the functionality for the first scenario (core network signaling procedure failure due to radio access failure) to resolve the issue caused by fake cell 24402. In particular, core signaling controller 23812 may detect the radio access connection establishment failure, and then initiate the functionality for the first scenario. Radio access processor 23808 may trigger a cell search to detect network access nodes. With reference to FIG. 244, terminal device 23800 may also be within the coverage area of network access node 24404. Radio access processor 23808 may therefore detect network access node 24404 with cell searcher 23810, and report network access node 24404 to core signaling controller 23812. Following the procedure of message sequence charts 24000 and 24100, core signaling controller 23812 may evaluate network access node 24404 with the failed cell list and connection attempt counter to determine whether a radio access connection establishment attempt should be made with network access node 24404. As network access node 24404 is a valid cell, the radio access connection establishment attempt may be successful (alternatively, core signaling controller 23812 may continue with the process of message sequence chart 24100 starting at stage 24128). Core signaling controller 23812 may therefore be able to complete the core network signaling procedure via network access node 24404.

Accordingly, as core signaling controller 23812 can identify another network access node, core signaling controller 23812 may switch off of fake cell 24402 and proceed with network access node 24404. As previously indicated, core signaling controller 23812 may not be aware whether fake cell 24402 is fake or valid. Terminal device 23800 may therefore be able to use this functionality for the first scenario irrespective of whether the initial network access node is fake or valid.

The first case of fake cell behavior in the scenario of FIG. 244 may therefore cause a radio access failure when terminal device 23800 attempts the core network signaling procedure. In a second case of fake cell behavior, fake cell 24402 may send rejection messages with permanent or temporary rejection causes. For example, fake cell 24402 may allow radio access connection establishment, but may respond with a rejection message when core signaling controller 23812 attempts the core network signaling procedure. Using LTE as an example, after core signaling controller 23812 sends NAS signaling, fake cell 24402 may respond with a registration/service rejection message a permanent cause, such as #3 "Illegal UE," #6 "Illegal ME," #7 "EPS services not allowed," #8"EPS services and non-EPS services not allowed, or an "Authentication reject" (e.g., which can cause the terminal device to invalidate the SIM for packet services and, for example, to start timer T3247 for a duration drawn randomly between 30-60 mins) Per the 3GPP standard, core signaling controller 23812 may be expected to bar the network tracking area of fake cell 24402 and trigger a search for other network tracking areas (e.g., first within the camped PLMN and subsequently on other PLMNs, if applicable). However, as previously introduced, fake cell 24402 may be able to broadcast falsified system information that indicates that fake cell 24402 is part of network tracking area 24400. Accordingly, if following the LTE standard, core signaling controller 23812 may bar all network access nodes in network tracking area 24400, and may therefore not attempt the core network signaling procedure on network access node 24404 (even though it is a valid cell).

In another example of the second case of fake cell behavior using LTE, fake cell 24402 may respond with a registration/service rejection message with a temporary cause, such as causes #95, #96, #97, #99, or #111 (e.g., with no integrity protection). Per the LTE standard, terminal device 23800 may be expected to set the counter to a maximum number of attempts, and start an extended duration timer (e.g., T3402, T3302, or T3312), which may lead to an absence of service for an extended duration of time. For example, T3402 and T3302 may default to 12 minutes, while T3212 can be specified by the network (and can therefore be set to a several hour duration by fake cell 24402).

In some cases, fake cells may also have advanced functionality that enables them to change their broadcasted cell identifies (e.g., potentially even in sync with a cell search procedure used by terminal devices). For example, fake cell 24402 may be able to change its cell identity, and may therefore be able to appear to a terminal device as different cells at different times. In other cases, there may be multiple fake cells that each use a different cell identity. These types of fake cell activity, in particular when combined with the second case of fake cell activity behavior involving core network failures, may cause issues for terminal devices.

Accordingly, in some aspects terminal device 23800 may be able to mitigate the negative impact by using a specialized fake cell mitigation procedure. FIG. 245 shows exemplary message sequence chart 24500 illustrating this specialized fake cell mitigation procedure according to some aspects. As shown in FIG. 245, radio access processor 23808 may initially be camped on fake cell 24402 (which radio access processor 23808 may not be able to differentiate from valid cells). Core signaling controller 23812 may then trigger a core network signaling procedure in stage 24504. As radio access processor 23808 is camped on fake cell 24402, radio access processor 23808 may establish a radio access connection with fake cell 24402. However, when core signaling controller 23812 attempts to send core network signaling for the core network signaling procedure through fake cell 24402, fake cell 24402 may cause a core network failure in stage 24506 by responding with a rejection message that specifies a temporary cause with no integrity protection. For example, in the case of LTE, fake cell 24402 may respond with a registration/service rejection message with a temporary cause, such as causes #95, #96, #97, #99, or #111 (e.g., with no integrity protection).

Core signaling controller 23812 may then in stage 24508 add fake cell 24402 to a potential fake cell list and increment a procedure attempt counter (e.g., from 0 to 1) that tracks the number of procedure attempts for the core network signaling procedure. Core signaling controller 24508 may also start a timer in stage 24508 that tracks the amount of time since a core network failure with a temporary cause. The timer can be mandated by the standard (e.g., 3GPP timer T3411) as a duration of time that a terminal device has to wait before re-attempting a core network signaling procedure following a core network failure.

Core signaling controller 23812 may then request for radio access processor 23808 to perform a cell search for all cells in stage 24510. More specifically, in some aspects core signaling controller 23812 may request for radio access processor 23808 to detect all network access nodes (that satisfy the selection criteria and are on the camped network, e.g., the camped PLMN) except those on potential fake cell list, and to randomly select one of the detected network access nodes to report back to core signaling controller 23812. Core signaling controller 23812 may also request for radio access processor 23808 to, if no suitable network access nodes are detected (e.g., none that satisfy the selection criteria and are on the camped network), report back the currently camped cell, e.g., fake cell 24402.

Radio access processor 23808 may then trigger the cell search at cell searcher 23810 in stage 24512. Cell searcher 23810 may report back the network access nodes identified during the search, and radio access processor 23808 may determine whether any of the network access nodes satisfy the selection criteria, are on the camped network, and are not on the potential fake cell list. If there are any such network access nodes, radio access processor 23808 may randomly select a network access node in stage 24514. If there are not, radio access processor 23808 may select the current network access node, e.g., fake cell 24402, in stage 24514.

Radio access processor 23808 may then report the selected network access node to core signaling controller 23812 in stage 24516. Core signaling controller 23812 may then evaluate the selected network access node in stage 24518 with the potential fake cell list and the procedure attempt counter. For example, core signaling controller 23812 may determine whether the selected network access node is on the potential fake cell list, and determine whether the procedure attempt counter is less than the threshold number of procedure attempts (e.g., 3, 4, or 5). In the example of FIG. 245, radio access processor 23808 may randomly select network access node 24404 to report to core signaling controller 23812 as the selected network access node. Core signaling controller 23812 may therefore determine that the selected network access node is not on the potential fake cell list, and may also determine that the procedure attempt counter is less than the threshold number of procedure attempts. Core signaling controller 23812 may then attempt and successfully complete the core network signaling procedure with network access node 24404 in stage 24520, e.g., before the timer expires. Core signaling controller 23812 may then reset the potential failed cell list in stage 24522.

Instead of selecting a network access node that best satisfies a selection criteria (e.g., that has the highest signal strength) or the network access node that is found first, radio access processor 23808 may use a randomized selection procedure in stage 24514. Accordingly, even if fake cell 24402 is using an advanced cell identity switching technique, or if there are multiple fake cells, radio access processor 23808 may potentially avoid selecting a fake cell in stage 24514 by randomizing the selection. Therefore, when fake cells are configured with the second case of fake cell behavior (e.g., causing core network failures for core network signaling procedures), terminal device 23800 may have some robustness against fake cell behavior (as it may be able to re-select off of fake cells and attempt the core network signaling procedure on another network access node). This can also provide faster service recovery, as core signaling controller 23812 may successfully complete the core network signaling procedure in stage 24520 before the timer expires.

In other scenarios, the connection attempt counter may have reached the threshold number of connection attempts. Accordingly, core signaling controller 23812 may determine in stage 24518 that the core signaling procedure should not be attempted immediately. Core signaling controller 23812 may therefore wait until the timer expires and subsequently attempt the core network signaling procedure on the selected network access node, e.g., network access node 24404.

In other scenarios, radio access processor 23808 may not be able to detect any other network access nodes that meet the selection criteria, are on the camped network, and are not on the potential fake cell list. Accordingly, radio access processor 23808 may report the current network access node, e.g., fake cell 24402, back to core signaling controller 23812 in stage 24516 as the selected network access node. Core signaling controller 23812 may therefore determine that the selected network access node is on the potential fake cell list in stage 24518, and consequently that the core network signaling procedure should not be attempted immediately. Core signaling controller 23812 may therefore wait until the timer expires and subsequently attempt the core network signaling procedure on the selected network access node, e.g., fake cell 24402. As the core network signaling procedure will be re-attempted on a fake cell, it will presumable fail again. However, as the duration of the timer has now passed, radio access processor 23808 may be able to detect more network access nodes and may therefore be able to randomly select another network access node (other than fake cell 24402). Core signaling controller 23812 may then be able to successfully complete the core network signaling procedure with this selected network access node.

FIG. 246 shows another example according to some aspects. Although similar to the case of FIG. 246, fake cell 24402 may cause a core network failure by rejecting the core network signaling procedure with a permanent cause (e.g., permanent cause without integrity protection). Terminal device 23800 may therefore follow a different procedure, in particular when the applicable standard (e.g., LTE) specifies a different procedure for core network failures with permanent causes.

As shown in FIG. 246, radio access processor 24602 may likewise begin camped on fake cell 24502 in stage 24602. Core signaling controller 23812 may then trigger a core network signaling procedure through fake cell 24402 in stage 24604. Fake cell 24402 may cause a core network failure by rejecting the core network signaling procedure with a permanent cause in stage 24606. For example, in the case of LTE, fake cell 24402 may respond with a registration/service rejection message specifying a permanent cause, such as #3 “Illegal UE,” #6 “Illegal ME,” #7 “EPS services not allowed,” #8 “EPS services and non-EPS services not allowed,” or an “Authentication reject” Per the 3GPP standard, core signaling controller 23812 may be expected to bar the entire network tracking area of fake cell 24402 (e.g., network tracking area 24400, which also includes network access node 24404), and/or to invalidate the SIM for packet services.

However, core signaling controller 23812 and radio access processor 23808 may then execute the same or similar procedure in stages 24608-24616 as specified above for stages 24508-24514. Accordingly, core signaling controller 23812 may add fake cell 24402 to the potential fake cell list, increment the procedure attempt counter, and start the timer in stage 24608. Core signaling controller 23812 may then request a cell search from radio access processor 23808 in stage 24610. Radio access processor 23808 may then perform a cell search with cell searcher 23810 in stage 24612. If radio access processor 23808 detects network access nodes that satisfy the selection criteria, are on the camped network, and are not on the potential fake cell list, radio access processor 23808 may randomly select a network access node in stage 24614. If radio access processor 23808 does not detect any such network access nodes, radio access processor may select the current network access node, e.g., fake cell 24402, in stage 24614.

Radio access processor 23808 may then report the selected network access node to core signaling controller 23812 in stage 24616. Core signaling controller 23812 may then evaluate the selected network access node with the potential fake cell list and the procedure attempt counter in stage 24518. In the example of FIG. 246, radio access processor 23808 may select network access node 24404 as the selected network access node. Core signaling controller 23812 may thus determine that network access node 24404 is not on the potential fake cell list and that the procedure attempt counter is less than the threshold number of connection attempts. Core signaling controller 23812 may then attempt and successfully complete the core network signaling procedure through network access node 24404 in stage 24620, and may reset the potential fake cell list in stage 24622.

In other scenarios, core signaling controller 23812 may determine that the procedure attempt counter has reached the threshold number of procedure attempts in stage 24618. In some aspects, core signaling controller 23812 may then consider the SIM of terminal device 23800 invalid (e.g., as specified per 3GPP handling for CS/PS and CS&PS services; for example, where terminal device 23800 may start a timer (e.g., T3245, with random duration drawn between 12-48 hours) and, on expiry, consider the SIM as valid again for CS/PS services). In other scenarios, radio access processor 23808 may not be able to detect any other network access nodes in stage 24614 that satisfy the selection criteria, are on the camped network, and are not on the potential fake cell list. Radio access processor 23808 may therefore report the current network access node, e.g., fake cell 24402, as the selected network access node in stage 24616. Core signaling controller 23812 may then proceed according to the standard, such as by barring the network tracking area of fake cell 24402. Accordingly, similarly to the case of message sequence chart 24500, terminal device 23800 may be able to complete the core signaling procedure before the timer expires, and may therefore in some cases mitigate the negative impacts of fake cells.

In some aspects, the functionality of terminal device 23800 described in FIG. 243 for in the second scenario (core network signaling procedure failure due to core network failure) may also be advantageous when fake cells are present. FIG. 247 shows an example similar to FIG. 242 where one of the network access nodes is replaced by a fake cell. As shown in FIG. 247, terminal device 23800 may be located within the coverage areas of fake cell 24704 and network access node 24706. Fake cell 24704 may be broadcasting falsified system information that indicates that it is part of network tracking area 24700. Network access node 24706 may be a part of tracking area 24702.

In the example of FIG. 247, radio access processor 23808 may initially be camped on fake cell 24704 (but may not be aware that fake cell 24704 is a fake cell). Core signaling controller 23812 may then trigger a core network signaling procedure. However, fake cell 24704 may cause a core network failure (e.g., by responding with a rejection message with a permanent or temporary cause). Terminal device 23800 may then follow the functionality for the second scenario described in message sequence chart 24300. Accordingly, core signaling controller 23812 may add network tracking area 24700 to the failed network tracking area list and start the timer (for counting down until a subsequent attempt of a core network signaling procedure can be made). After radio access processor 23808 detects and reports network access node 24706, core signaling controller 23812 may determine that network access node 24706 is part of network tracking area 24702, which is not in the failed network tracking area list. Core signaling controller 23812 may then attempt the core network signaling procedure with network access node 24706 (e.g., before the timer expires). As network access node 24706 is a valid cell, the core network signaling procedure may be successful. Core signaling controller 23812 may therefore be able to complete the core network signaling procedure at an earlier time.

This functionality of terminal device 23800 may therefore improve performance in the first and/or second scenarios, as well as when there are fake cells present. This can enable terminal device 23800 to complete core network signaling procedures at an earlier time, and thus enable a user to access voice or data services at an earlier time.

Various aspects of this disclosure can also provide improved service recovery for multi-mode terminal devices after network failure. For example, many terminal devices support multiple radio access technologies and therefore be multi-mode terminal devices. A common example is a multi-mode terminal device that supports LTE as well as UMTS and GSM. As LTE offers higher data rates and overall better performance, LTE may be considered the primary radio access technology (e.g., preferred over UMTS and GSM) while UMTS and GSM may be legacy radio access technologies.

As previously described, a terminal device using LTE may be expected to follow the 3GPP standard. However, as recognized by this disclosure, some procedures defined in the 3GPP standard may be sub-optimal in certain scenarios. One such scenario is when a multi-mode terminal device attempting registration on an LTE cell experiences a random access failure, such as due to weak LTE coverage. The 3GPP standard dictates that, in this scenario, "If the attach attempt counter is equal to 5, then the UE shall delete any LAI, TMSI, ciphering key sequence number and list of equivalent PLMNs and set the update status to U2 NOT UPDATED. A UE operating in CS/PS mode 1 of operation shall select GERAN or UTRAN radio access technology and proceed with appropriate MM or GMM specific procedures. NOTE: The UE supporting A/Gb mode or Iu mode can disable the E-UTRA capability as specified in sub-clause 4.5" (3GPP TS 24.301, Section 5.5.1.3.6, "Abnormal cases in the UE"). Accordingly, once the terminal device has attempted to attach to an LTE cell five times (e.g., when the attach attempt counter reaches five), the terminal device should temporarily suspend LTE attach attempts and switch to a legacy radio access technology (e.g., UMTS or GSM).

However, 3GPP standard specifies that, should this happen, LTE attach attempts should be suspended for a general default value of 12 minutes (e.g., the default 12 min duration of timer T3402). This is an extended duration of time during which the higher performance LTE service will not be available to a user. Accordingly, the user may only be able to use legacy radio access technologies during this time, which have slower data rates and generally lower performance. The terminal device may therefore become 'stuck' on the legacy radio access technologies, and further attempts to attach to LTE will be suspended until the timer expires (e.g., until timer T3402 expires) even if LTE service actually becomes available at an earlier time.

The following use cases describe this issue in further detail. In a first use case, a terminal device may camp on an LTE cell but may be in a weak LTE coverage area (e.g., as the terminal device is in an elevator, tunnel, parking garage, or other field location with weak coverage). When the terminal device attempts LTE registration (e.g., to obtain an active connection, such as for voice or data services), the random access procedure will fail and will continue to fail up to the threshold number of registration attempts (e.g., the maximum attempt count). Per the 3GPP standard, the terminal device may disable LTE for the specified timer duration (e.g., 12 minutes), and may switch to the legacy UMTS/GSM radio access technologies to try to register. The terminal device may eventually be able to camp on and register with a legacy UMTS/GSM network (e.g., after the terminal device exits the weak coverage area). However, even though the terminal device may re-enter a strong LTE coverage area, the terminal device may continue to wait until the timer expires before reattempting LTE registration. The terminal device will therefore become stuck on the legacy network and the user will not be able to utilize the higher performance capabilities of LTE.

In a second use case, a terminal device may initially camp on an LTE cell but may be in a weak coverage area, such as in a first network tracking area of the LTE network. The terminal device may continually attempt LTE registration, but the registration attempts may fail and the terminal device may reach the threshold number of registration attempts. The terminal device may then, per the 3GPP standard, disable LTE for the timer duration and revert to the legacy UMTS/GSM radio access technologies. After camping and establishing a connection with the legacy UMTS/GSM network, the terminal device may continue to wait until the timer expires before reattempting LTE registration. Accordingly, even when the terminal device moves into a second network tracking area of the LTE network that has strong LTE coverage, the terminal device will remain stuck on the legacy UMTS/GSM network until the timer expires.

Accordingly, various aspects of this disclosure present an improved approach that can help a multi-mode terminal device regain service for a primary radio access technology at an earlier time (e.g., instead of waiting for the timer to expire without reattempting registration beforehand). While some examples described herein may refer to LTE, these aspects can be applied for any primary radio access technology (e.g., a preferred or highest performance radio access technology supported by a multi-mode terminal device) of a multi-mode terminal device.

FIG. 248 shows an exemplary internal configuration of terminal device 24800 according to some aspects. As shown in FIG. 248, terminal device 24800 may include antenna system 24802, RF transceiver 24804, and baseband modem 24806. Antenna system 23802 and RF transceiver 23804 may be configured in the manner of antenna system 202 and RF transceiver 204 of terminal device 102 in FIG. 2. Accordingly, in the receive direction, antenna system 24802 may receive wireless radio signals and transduce the wireless radio signals into analog radio signals. RF transceiver 24804 may then perform radio processing on the analog radio signals to obtain baseband data (e.g., IQ samples), which RF transceiver 24804 may provide to baseband modem 24806 for baseband processing. In the transmit direction, baseband modem 24806 may provide baseband data to RF transceiver 24804, which may perform radio processing on the baseband data to obtain analog radio signals. RF transceiver 24804 may then provide the analog radio signals to antenna system 24802, which may then wirelessly transmit the analog radio signals.

Baseband modem 24806 may be configured with the same or similar functionality described above for baseband modem 206 of terminal device 102 in FIG. 2. Accordingly, baseband modem 24806 may be configured to perform physical layer and protocol stack processing on baseband data provided by RF transceiver 24804 to recover user data (e.g., transport or application layer data) contained in the wireless radio signals initially received by antenna system 24802, and to perform protocol stack and physical layer processing on user data to obtain baseband data (e.g., IQ samples) for wireless transmission by RF transceiver 24804 and antenna system 24802.

Terminal device 24800 may be a multi-mode terminal device, and may therefore support a plurality of radio access technologies. As shown in FIG. 248, baseband modem 24806 may include primary radio access processor 24808 (including cell searcher 24810), primary core signaling controller 24812, legacy radio access processor 24814, and legacy core signaling controller 24816. Primary radio access processor 24808 and primary core signaling controller 24812 may therefore be responsible for the baseband functionality (e.g., physical layer and protocol stack processing) of a primary radio access technology of terminal device 24800 (e.g., LTE). Legacy radio access processor 24814 and legacy core signaling controller 24816 may be responsible for the baseband functionality (e.g., physical layer and protocol stack processing) of a legacy radio access technology of terminal device 24800 (e.g., UMTS or GSM). In some aspects, baseband modem 24806 may include one or more additional legacy radio access processors and legacy core signaling controllers to support the baseband functionality of one or more additional legacy radio access technologies. The term primary radio access technology system therefore refers to the combination of primary radio access processor 24808 and primary core signaling controller 24812, while the term legacy radio access technology system refers to the combination of legacy radio access processor 24814 and legacy core signaling controller 24816.

Similar to as described above for radio access processor 23808 in FIG. 238, primary radio access processor 24808 and legacy radio access processor 24814 may be configured to handle AS processing and signaling for their respective radio access technologies. Similar to as described above for core signaling controller 23812, primary core signaling controller 24812 and legacy core signaling controller 24816 may be configured to handle NAS processing and signaling for their respective radio access technologies. While FIG. 248 shows antenna system 24802 as a single component, in some aspects antenna system 24802 may include one or more antennas for the primary radio access technology system to use and one or more antennas for the legacy radio access technology to use. Additionally or alternatively, while FIG. 248 shows RF transceiver 24804 as a single component, in some aspects radio transceiver 24804 may include a first RF transceiver for the primary radio access technology system to use and a second RF transceiver for the legacy radio access technology to use.

As previously introduced, in some aspects terminal device 24800 may be configured to use an improved approach to recover service for a primary radio access technology following a radio access failure. FIGS. 249 and 250A-250B illustrate examples of this functionality according to some aspects. Starting with FIG. 249, the primary radio access technology system (including primary radio access processor 24808 and primary core signaling controller 24812) may begin by camping on a network access node of the primary network in stage 24902. This can be done by primary radio access processor 24808, which as previously indicated may be configured to handle AS processing and signaling (which includes radio access connections). Then, the primary radio access technology system may trigger a registration attempt (e.g., to eventually perform a core network signaling procedure, such as a TAU or a service request for a voice or data session) in stage 24904. Accordingly, primary core signaling controller 24812 may perform a first registration attempt in stage 24904. However, in the example of FIG. 249, terminal device 24800 may initially be in a weak coverage area of the primary network (e.g., in an elevator, in a tunnel, in a parking garage or other area with weak coverage), and the registration attempt may fail due to a radio access failure. For example, when radio access processor 24808 attempts a random access procedure, the random access procedure may fail. This will in turn cause the registration procedure by primary core signaling controller 24812 to fail.

Primary core signaling controller 24812 may continue to perform registration attempts in stages 24906-24912, which may each also fail. Primary core signaling controller 24812 may keep a registration attempt counter that increments for each registration attempt. If the threshold number of registration attempts is, for example, five, primary core signaling controller 24812 may determine in stage 24914 that the threshold number of registration attempts has been reached.

In the example of FIG. 249, terminal device 24800 may be following a standard (e.g., the LTE standard) that dictates that the primary radio access technology should be disabled for the duration of a timer (e.g., T3402 with a default duration of 12 minutes) before any further registration attempts are made. Accordingly, as shown in FIG. 249, primary core signaling controller 24812 may start the timer in stage 24916. Primary core signaling controller 24812 may also updated a failed network tracking area list in stage 24914, such as by adding the network tracking area of the camped network access node of the primary network (to which the registration attempts in stages 24904-24912 were made) to the failed network tracking area list. The failed network tracking area list may therefore identify the network tracking areas on which registration attempts have failed.

Primary core signaling controller 24812 may then disable radio activity the primary radio access technology system. For example, primary core signaling controller 24812 may disable primary radio access processor 24808, which may therefore suspend further radio activity by the primary radio access technology system until further notice. This can include disabling frequency scans and cell searches.

As registration with the primary radio access technology has failed, the legacy radio access technology system (including legacy radio access processor 24814 and legacy core signaling controller 24816) may camp on a network access node the legacy network (e.g., UMTS or GSM) in stage 24918. This can be performed by legacy radio access processor 24814. The legacy radio access technology system may then attempt and successfully perform registration in stage 24920.

In some cases, it may take the legacy radio access technology system a duration of time to successfully complete registration in stage 24920. For example, if terminal device 24800 is initially in a weak coverage area, such as an elevator, legacy radio access processor 24814 may not be able to immediately complete a random access procedure with the legacy network. Accordingly, it may take several attempts and/or a duration of time for legacy core signaling controller 24816 to complete registration on the legacy network.

However, the fact that legacy core signaling controller 24816 has successfully registered may indicate that coverage conditions have also improved for the primary network. Accordingly, as shown in FIG. 249, primary core signaling controller 24812 may detect that the legacy radio access technology system has registered on the legacy network, and may re-enable the primary radio access technology system (e.g., re-enable its radio activity). Primary core signaling controller 24812 may therefore re-enable the primary radio access technology system before the timer expires. As radio activity for the primary radio access technology system is re-enabled, primary radio access processor 24808 may trigger a cell search with cell searcher 24810. Cell searcher 24810 may then detect network access nodes in stage 24924 and report the network access nodes to primary radio access processor 24808. Primary radio access processor 24808 may identify a network access node that satisfies the selection criteria and report the network access node to primary core signaling controller 24812.

Primary core signaling controller 24812 may then evaluate the network access node with the failed network tracking area list in stage 24926. For example, primary core signaling controller 24812 may determine whether the network tracking area of the network access node is on the failed network tracking area list. In the example of FIG. 249, the network tracking area of the network access node is not on the failed network tracking area list. Primary core signaling controller 24812 may therefore attempt registration again in stage 24928, which include a random access attempt by primary radio access processor 24808. This can occur before the timer (started in stage 24916) expires. As shown in FIG. 249, the random access attempt and registration attempt may be successful.

The primary radio access technology system therefore may complete the registration before the timer expires. Accordingly, compared to the standard case where a terminal device waits until the timer expires before attempting any further registrations on the primary network, terminal device 24800 may be able to complete registration at an earlier time. Terminal device 24800 may therefore use successful registration by the legacy radio access technology system as a triggering condition to attempt another registration on the primary network (e.g., assuming such a registration has not already been attempted in the same network tracking area). This can be particularly beneficial in cases where terminal device 24800 is in a weak coverage area such as an elevator, tunnel, or parking garage, as successful registration on the legacy network may indicate that registration can also be complete on the primary network (as the temporarily weak coverage conditions have likely passed).

In a variation of the example of FIG. 249, the registration attempt on the primary network with the network access node in stage 24928 may also fail. In some cases, primary core signaling controller 24812 may then add the network tracking area of the network access node to the failed network tracking area list, re-start the timer, and disable the primary radio access technology system (e.g., disable its radio activity). Then, when the legacy radio access technology system eventually registers on the legacy network, the primary radio access technology system may again try to identify a network access node that satisfies the selection criteria and is in a network tracking area that is not on the failed network tracking area list. The primary radio access technology system may then attempt the registration procedure using this network access node.

In some aspects, terminal device 24800 may be configured to only perform one registration attempt on the primary network while the timer is running. FIGS. 250A and 250B show exemplary message sequence chart 25000, which illustrate this procedure according to some aspects. As shown in FIG. 250A, the primary radio access technology system and the legacy radio access technology system may perform stages 25002-25014 in the same manner as stages 24902-24914 in FIG. 249. However, as terminal device 24800 may be configured to perform only one registration attempt on the primary network when the timer is running, primary core signaling controller 24812 may not use a failed network tracking area list. Accordingly, in stage 25016 primary core signaling controller 24812 may start the timer and disable the primary radio access technology system (but not update or use a failed network tracking area list). The primary radio access technology system and legacy radio access technology system may then perform stages 25018-25024 in the manner of stages 24918-24924 of FIG. 249.

After primary radio access processor 24808 reports a network access node in the primary network to primary core signaling controller 24812 in stage 25024, primary signaling controller 24812 may perform a registration attempt through the network access node in stage 25026 (e.g., before the timer expires, and without evaluating the network access node with a failed network tracking area list). In some cases, the registration attempt may succeed, and the primary radio access technology system may therefore complete registration on the primary network. In the example of FIGS. 250A and 250B, the registration attempt in stage 25026 may fail, and subsequent registration attempts up to stage 25028 may also fail. Primary core signaling controller 24812 may therefore determine that the threshold number of registration attempts has been reached in stage 25030.

Primary core signaling controller 24812 may therefore start the timer and disable the primary radio access technology system in stage 25032. The legacy radio access network system may camp on and successfully register with the legacy network in stages 25034 and 25036. As primary core signaling controller 24812 may be configured to only use one subsequent registration attempt following an initial failure (e.g., that is triggered by a successful registration by the legacy radio access technology system on the legacy network), primary core signaling controller 24812 may keep the primary radio access technology system disabled until the timer expires in stage 25038. Primary core signaling controller 24812 may re-attempt registration after this occurs.

Accordingly, this functionality may enable terminal device 24800 to re-establish service for a primary radio access technology (e.g., LTE) at an earlier time (e.g., before the timer expires). As described above, primary core signaling controller 24812 may use successful registration by the legacy radio access technology as a trigger for re-attempting registration on the primary network. This can be particularly useful when terminal device 24800 is temporarily in a weak coverage area (e.g., an elevator, tunnel, parking garage or the like), as a successful registration by the legacy radio access technology can indicate that a successful registration is also possible for the primary radio access technology.

FIG. 251 shows exemplary flow chart 25100 further illustrating this functionality of terminal device 24800 according to some aspects. As shown in FIG. 251, primary core signaling controller 24812 may first attempt to register on the primary network in stage 25102. If the radio access connection by primary radio access processor 24808 is successful in stage 25104, primary core signaling controller 24812 may complete the registration and register with the primary network in stage 25106. If the radio access connection fails in stage 25104 (e.g., a failure of the random access procedure by primary radio access processor 24808), primary core signaling controller 24812 may determine whether the threshold number of registration attempts has been reached. If not, primary core signaling controller 24812 may increment the registration attempt counter and return to stage 25102 to re-attempt registration on the primary network. If the threshold number of registration attempts has been reached, primary core signaling controller 24812 may disable the primary radio access technology system and start the timer in stage 25110. Legacy core signaling controller 24816 may then attempt to register on the legacy network in stage 25110. If registration on the legacy network is not successful, legacy core signaling controller 24816 may re-attempt to register on the legacy network in stage 25114, and may follow any other applicable standardized procedures for legacy network registration failure.

If the registration on the legacy network is a success, primary core signaling controller 24812 may detect the successful registration on the legacy network in stage 25116. Primary core signaling controller 24812 may use this as a triggering condition to enable the primary radio access technology system and attempt to register on the primary network again in stage 25118. If the registration on the primary network is successful (e.g., there is no radio access failure, such as a random access procedure failure), primary core signaling controller 24812 may register with the primary network in stage 25122.

Conversely, if the registration on the primary network is not successful (e.g., due to a random access procedure, radio access connection release (e.g., RRC release), or other radio access failure), primary core signaling controller 24812 may add the network tracking area of the network access node (through which registration in stage 25120 was attempted) to the failed network tracking area list in stage 25124. Primary core signaling controller 24812 may keep the primary radio access technology enabled in stage 25126 while legacy core signaling controller 24816 may camp and register on the legacy network.

Primary core signaling controller 24812 may continue attempting to camp and register on network access nodes of the primary network that are in network tracking areas that are not in the failed network tracking area in stage 25128. For example, radio access processor 24808 may detect a network access node in the primary network that satisfies the selection criteria, and may report the network access node to primary core signaling controller 24812. Primary core signaling controller 24812 may determine whether the network access node is in the failed network tracking area list. If not, primary core signaling controller 24812 may attempt to register on the primary network through the network access node. If so, or if primary radio access processor 24808 does not detect any network access nodes that satisfy the selection criteria, primary core signaling controller 24812 may wait until the timer expires to re-attempt registration on the primary network.

FIG. 252 shows an exemplary network scenario according to some aspects where this functionality may enable terminal device 24800 to re-establish service for its primary radio access technology at an earlier time. As shown in FIG. 252, terminal device 24800 may start out in a weak coverage area at time 25202. Accordingly, the primary radio access technology system may not be able to register on the primary network, and may suspend further attempts and start a timer at time 25204.

Terminal device 24800 may eventually move into stronger coverage at time 25206, at which point the legacy radio access technology system may successfully register on the legacy network. The primary radio access technology system may detect this successful registration, and may trigger a registration attempt on the primary network (before the time expires). The registration may be successful, and terminal device 24800 may become registered on the primary network at time 25208.

FIG. 253 shows exemplary method 25300 of operating a communication device according to some aspects. As shown in FIG. 253, method 25300 includes attempting to initiate a first core network signaling procedure through a first network access node (25302), detecting a radio access failure or disconnection for the first core network signaling procedure (25304), starting a timer for a second core network signaling procedure (25306), detecting a second network access node (25308), and attempting to initiate the second core network signaling procedure through the second network access node before the timer expires in response to detecting the second network access node (25310).

FIG. 254 shows exemplary method 25400 of operating a communication device according to some aspects. As shown in FIG. 254, method 25400 includes attempting to initiate a first core network signaling procedure through a first network access node (25402), detecting a core network failure for the first core network signaling procedure (25404), detecting a second network access node (25406), determining whether the second network access node is in a same network tracking area as the first network access node (25408), and attempting to initiate a second core network signaling procedure through the second network access node in response to determining that the second network access node is not in the same network tracking area (25410).

FIG. 255 shows exemplary method 25500 of operating a communication device according to some aspects. As shown in FIG. 255, method 25500 includes attempting to initiate a first core network signaling procedure through a first network access node (25502), detecting a core network failure for the first core network signaling procedure (25504), identifying one or more network access nodes (25506), randomly selecting a second network access node from the one or more network access nodes (25508), and attempting to initiate a second core network signaling procedure through the second network access node (25510).

FIG. 256 shows exemplary method 25600 of operating a communication device according to some aspects. As shown in FIG. 256, method 25600 includes performing a threshold number of failed connection attempts for a first radio access technology (25602), starting a timer for a subsequent connection attempt for the first radio access technology (25604), detecting that a second radio access technology has successfully registered (25606), and performing the subsequent connection attempt for the first radio access technology before the timer expires in response to detecting that the second radio access technology has successfully registered (25608).

CONCLUSION

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

The following examples pertain to further aspects of this disclosure:

Example 1 is a central trajectory controller including a cell interface configured to establish signaling connections with one or more backhaul moving cells and to establish signaling connections with one or more outer moving cells, an input data repository configured to obtain input data related to a radio environment of the one or more outer moving cells and the one or more backhaul moving cells, and a trajectory processor configured to determine, based on the input data, first coarse trajectories for the one or more backhaul moving cells and second coarse trajectories for the one or more outer moving cells, the cell interface further configured to send the first coarse trajectories to the one or more backhaul moving cells and to send the second coarse trajectories to the one or more outer moving cells.

In Example 2, the subject matter of Example 1 can optionally include wherein the input data includes information about data rate requirements of the one or more outer moving cells, positions of the one or more outer moving cells or the one or more backhaul moving cells, a target area assigned to the one or more outer moving cells for outer tasks, radio measurements by the one or more outer moving cells or the one or more backhaul moving cells, or the radio capabilities of the one or more outer moving cells or the one or more backhaul moving cells.

In Example 3, the subject matter of Example 1 or 2 can optionally include wherein the input data includes radio map data for the radio environment.

In Example 4, the subject matter of Example 3 can optionally include wherein the input data repository is configured to generate the radio map data or to receive the radio map data from an external network.

In Example 5, the subject matter of any one of Examples 1 to 4 can optionally include wherein the first coarse trajectories are based on a statistical model of the radio environment, and wherein the trajectory processor is configured to determine the first and second coarse trajectories by optimizing a function of an optimization criteria as approximated by the statistical model.

In Example 6, the subject matter of Example 5 can optionally include wherein the statistical model is a propagation model that approximates the radio environment.

In Example 7, the subject matter of Example 5 can optionally include wherein the statistical model is a propagation model that approximates the radio environment based on a radio map.

In Example 8, the subject matter of any one of Examples 5 to 7 can optionally include wherein the optimization criteria is an aggregate supported data rate of backhaul relaying paths between the one or more outer moving cells and a radio access network via the one or more backhaul moving cells, or is a probability that the supported data rate of each of the backhaul relaying paths is above a predefined data rate threshold.

In Example 9, the subject matter of any one of Examples 5 to 7 can optionally include wherein the optimization criteria is an aggregate link quality metric of backhaul relaying paths between the one or more outer moving cells and a radio access network via the one or more backhaul moving cells, or is a probability that the link quality metric of each of the backhaul relaying paths is above a predefined link quality metric threshold.

In Example 10, the subject matter of any one of Examples 5 to 9 can optionally include wherein the trajectory processor is configured to determine the first and second coarse trajectories to optimize the function of the optimization criteria as approximated by the statistical model by optimizing the function of the optimization criteria using gradient descent.

In Example 11, the subject matter of any one of Examples 1 to 10 can optionally include wherein the central trajectory controller is further configured to determine initial routings between the one or more outer moving cells and a radio access network via the one or more backhaul moving cells.

Example 12 is a method for managing trajectories for moving cells, the method including establishing signaling connections with one more backhaul moving cells and with one or more outer moving cells, obtaining input data related to a radio environment of the one or more outer moving cells and the one or more backhaul moving cells, determining, based on the input data, first coarse trajectories for the one or more backhaul moving cells and second coarse trajectories for the one or more outer moving cells, and sending the first coarse trajectories to the one or more backhaul moving cells and the second coarse trajectories to the one or more outer moving cells.

In Example 13, the subject matter of Example 12 can optionally include wherein the input data includes information about data rate requirements of the one or more outer moving cells, positions of the one or more outer moving cells or the one or more backhaul moving cells, a target area assigned to the one or more outer moving cells for outer tasks, radio measurements by the one or more outer moving cells or the one or more backhaul moving cells, or the radio capabilities of the one or more outer moving cells or the one or more backhaul moving cells.

In Example 14, the subject matter of Example 12 or 13 can optionally include wherein the input data includes radio map data for the radio environment.

In Example 15, the subject matter of Example 14 can optionally further include generating the radio map data or receiving the radio map data from an external network.

In Example 16, the subject matter of any one of Examples 12 to 15 can optionally include wherein the first coarse trajectories and the second coarse trajectories are based on a statistical model of the radio environment, wherein determining the first and second coarse trajectories comprises determining the first and second trajectories to optimize a function of an optimization criteria as approximated by the statistical model.

In Example 17, the subject matter of Example 16 can optionally include wherein the statistical model is a propagation model that approximates the radio environment.

In Example 18, the subject matter of Example 16 can optionally include wherein the statistical model is a propagation model that approximates the radio environment based on a radio map.

In Example 19, the subject matter of any one of Examples 16 to 18 can optionally include wherein the optimization criteria is an aggregate supported data rate of backhaul relaying paths between the one or more outer moving cells and a radio access network via the one or more backhaul moving cells, or is a probability that the supported data rate of each of the backhaul relaying paths is above a predefined data rate threshold.

In Example 20, the subject matter of any one of Examples 16 to 18 can optionally include wherein the optimization criteria is an aggregate link quality metric of backhaul relaying paths between the one or more outer moving cells and a radio access network via the one or more backhaul moving cells, or is a probability that the link quality metric of each of the backhaul relaying paths is above a predefined link quality metric threshold.

In Example 21, the subject matter of any one of Examples 16 to 20 can optionally include wherein determining the first and second coarse trajectories to optimize the function of the optimization criteria as approximated by the statistical model includes optimizing the function of the optimization criteria using gradient descent.

In Example 22, the subject matter of any one of Examples 12 to 21 can optionally include wherein determining the first coarse trajectories further includes determining initial routings between the one or more outer moving cells and a radio access network via the one or more backhaul moving cells.

Example 23 is a method for operating an outer moving cell, the method including receiving a coarse trajectory from a central trajectory controller, performing an outer task when the outer moving cell establishes a position according to the coarse trajectory, and sending data from the outer task to a backhaul moving cell for relay to a radio access network, determining an updated trajectory based on the coarse trajectory, and performing the outer task when the outer moving cell establishes a position according to the updated trajectory.

In Example 24, the subject matter of Example 23 can optionally include wherein performing the outer task includes performing sensing on a target area.

In Example 25, the subject matter of Example 24 can optionally include wherein the data is sensing data.

In Example 26, the subject matter of Example 23 can optionally include wherein performing the outer task includes providing access to a target area.

In Example 27, the subject matter of Example 26 can optionally include wherein the data is uplink data from devices in the target area.

In Example 28, the subject matter of any one of Examples 23 to 27 can optionally further include receiving one or more parameters from the backhaul moving cell, wherein determining the updated trajectory includes determining the updated trajectory based on the coarse trajectory and the one or more parameters.

In Example 29, the subject matter of Example 28 can optionally include wherein the one or more parameters relate to a radio environment between the outer moving cell and the backhaul moving cell.

In Example 30, the subject matter of Example 28 or 29 can optionally include wherein the one or more parameters include information about the position of the backhaul moving cell, radio measurements by the backhaul moving cell, radio capabilities of the backhaul moving cell, or a coarse trajectory assigned to the backhaul moving cell.

In Example 31, the subject matter of any one of Examples 23 to 30 can optionally include wherein determining the updated trajectory is based on a statistical model of the radio environment between the outer moving cell and the backhaul moving cell, and wherein determining the updated trajectory includes determining the updated trajectory to optimize a function of an optimization criteria as approximated by the statistical model.

In Example 32, the subject matter of Example 31 can optionally include wherein the statistical model is a propagation model that approximates the radio environment.

In Example 33, the subject matter of Example 31 can optionally include wherein the statistical model is a propagation model that approximates the radio environment based on a radio map.

In Example 34, the subject matter of any one of Examples 31 to 33 can optionally include wherein the optimization criteria is a supported data rate of a backhaul relaying path between the outer moving cell and the radio access network via the backhaul moving cell, or is a probability that the supported data rate of the backhaul relaying path is above a predefined data rate threshold.

In Example 35, the subject matter of any one of Examples 31 to 33 can optionally include wherein the optimization criteria is a link quality metric of a backhaul relaying path between the outer moving cell and the radio access network via the backhaul moving cell, or is a probability that the link quality metric of the backhaul relaying path is above a predefined link quality metric threshold.

In Example 36, the subject matter of any one of Examples 31 to 35 can optionally include wherein determining the updated trajectory to optimize the function of the optimization criteria includes optimizing the function of the optimization criteria using gradient descent.

In Example 37, the subject matter of any one of Examples 23 to 36 can optionally further include receiving an updated trajectory of the backhaul moving cell from the backhaul moving cell, determining a second updated trajectory based on the updated trajectory, and performing the outer task according to the second updated trajectory.

Example 38 is an outer moving cell including a central interface configured to receive a coarse trajectory from a central trajectory controller, an outer task engine configured to perform an outer task when the outer moving cell establishes a positions according to the coarse trajectory, a cell interface configured to send data from the outer task to a backhaul moving cell for relay to a radio access network, and a trajectory processor configured to determine an updated trajectory based on the coarse trajectory.

In Example 39, the subject matter of Example 38 can optionally further include steering and movement machinery configured to position the outer moving cell according to the coarse trajectory, and to position the outer moving cell according to the updated trajectory.

In Example 40, the subject matter of Example 38 or 39 can optionally include wherein the outer task engine is configured to perform the outer task when the outer moving cell establishes a position according to the updated trajectory.

In Example 41, the subject matter of any one of Examples 38 or 40 can optionally include wherein the outer task engine includes one or more sensors, and wherein the data from the outer task is sensing data.

In Example 42, the subject matter of Example 38 or 39 can optionally include wherein the outer task engine is configured to provide access to terminal devices, and wherein the data from the outer task is uplink data from the terminal devices.

In Example 43, the subject matter of any one of Examples 38 to 42 can optionally include wherein the cell interface is further configured to receive one or more parameters from the backhaul moving cell, wherein the trajectory processor is configured to determine the updated trajectory based on the coarse trajectory and the one or more parameters.

In Example 44, the subject matter of Example 43 can optionally include wherein the one or more parameters relate to a radio environment between the outer moving cell and the backhaul moving cell.

In Example 45, the subject matter of Example 43 or 44 can optionally include wherein the one or more parameters include information about the position of the backhaul moving cell, radio measurements by backhaul moving cell, or radio capabilities of the backhaul moving cell, or a coarse trajectory assigned to the backhaul moving cell.

In Example 46, the subject matter of any one of Examples 38 to 45 can optionally include wherein the updated trajectory is based on a statistical model of the radio environment between the outer moving cell and the backhaul moving cell, and wherein the trajectory processor is configured to determine the updated trajectory with the coarse trajectory by determining the updated trajectory to optimize a function of an optimization criteria as approximated by the statistical model.

In Example 47, the subject matter of Example 46 can optionally include wherein the statistical model is a propagation model that approximates the radio environment.

In Example 48, the subject matter of Example 46 can optionally include wherein the statistical model is a propagation model that approximates the radio environment based on a radio map.

In Example 49, the subject matter of any one of Examples 46 to 48 can optionally include wherein the optimization criteria is a supported data rate of a backhaul relaying path between the outer moving cell and the radio access network via the backhaul moving cell, or is a probability that the supported data rate of the backhaul relaying path is above a predefined data rate threshold.

In Example 50, the subject matter of any one of Examples 46 to 48 can optionally include wherein the optimization criteria is a link quality metric of a backhaul relaying path between the outer moving cell and the radio access network via the backhaul moving cell, or is a probability that the link quality metric of the backhaul relaying path is above a predefined link quality metric threshold.

In Example 51, the subject matter of any one of Examples 46 to 50 can optionally include wherein the trajectory processor is configured to determine the updated trajectory to optimize the function of the optimization criteria by optimizing the function of the optimization criteria using gradient descent.

In Example 52, the subject matter of any one of Examples 38 to 51 can optionally include wherein the cell interface is configured to receive an updated trajectory of the backhaul moving cell from the backhaul moving cell, the trajectory processor is further configured to determine a second updated trajectory based on the updated trajectory of the backhaul moving cell, and the steering and movement machinery is further configured to move the outer moving cell according to the second updated trajectory while the outer task engine performs the outer task.

Example 53 is a method for operating a backhaul moving cell, the method including receiving a coarse trajectory from a central trajectory controller, receiving data from one or more outer moving cells when the backhaul moving cell establishes a position according to the coarse trajectory, and relaying the data to a radio access network, determining an updated trajectory based on the coarse trajectory, and receiving additional data from the one or more outer moving cells when the backhaul moving cell establishes a position according to the updated trajectory, and relaying the additional data to the radio access network.

In Example 54, the subject matter of Example 53 can optionally further include receiving one or more parameters from the one or more outer moving cells, wherein determining the updated trajectory includes determining the updated trajectory based on the coarse trajectory and the one or more parameters.

In Example 55, the subject matter of Example 54 can optionally include wherein the one or more parameters relate to a radio environment between the backhaul moving cell and the one or more outer moving cells.

In Example 56, the subject matter of Example 54 or 55 can optionally include wherein the one or more parameters include information about the positions of the one or more outer moving cells, radio measurements by the one or more outer moving cells, radio capabilities of the one or more outer moving cells, or coarse trajectories assigned to the one or more outer moving cells.

In Example 57, the subject matter of any one of Examples 53 to 56 can optionally include wherein determining the updated trajectory is based on a statistical model of the radio environment between the backhaul moving cell and the one or more outer moving cells, and wherein determining the updated trajectory includes determining the updated trajectory to optimize a function of an optimization criteria as approximated by the statistical model.

In Example 58, the subject matter of Example 57 can optionally include wherein the statistical model is a propagation model that approximates the radio environment.

In Example 59, the subject matter of Example 57 can optionally include wherein the statistical model is a propagation model that approximates the radio environment based on a radio map.

In Example 60, the subject matter of any one of Examples 57 to 59 can optionally include wherein the optimization criteria is an aggregated supported data rate of backhaul relaying paths between the one or more outer moving cells and the radio access network via the backhaul moving cell, or a probability that the supported data rate of each of the backhaul relaying paths is above a predefined data rate threshold.

In Example 61, the subject matter of any one of Examples 57 to 59 can optionally include wherein the optimization criteria is an aggregated link quality metric of backhaul relaying paths between the one or more outer moving cells and the radio access network via the backhaul moving cell, or a probability that the link quality metric of each of the backhaul relaying paths is above a predefined link quality metric threshold.

In Example 62, the subject matter of any one of Examples 57 to 61 can optionally include wherein determining the updated trajectory to optimize the function of the optimization criteria includes optimizing the function of the optimization criteria using gradient descent.

In Example 63, the subject matter of any one of Examples 53 to 62 can optionally further include receiving updated trajectories of the one or more outer moving cells from the one or more outer moving cells, determining a second updated trajectory based on the updated trajectories of the one or more outer moving cells, and receiving second additional data from the one or more outer moving cells when the backhaul moving cell establishes a position according to the second updated trajectory, and relaying the second additional data to the radio access network.

Example 64 is a backhaul moving cell including a central interface configured to receive a coarse trajectory from a central trajectory controller, a cell interface configured to receive data from one or more outer moving cells when the backhaul moving cell establishes a position according to the coarse trajectory, a relay router configured to relay the data to a radio access network, and a trajectory processor configured to determine an updated trajectory based on the coarse trajectory.

In Example 65, the subject matter of Example 64 can optionally further include steering and movement machinery configured to position the backhaul moving cell according to the updated trajectory while the cell interface receives additional data from the one or more outer moving cells.

In Example 66, the subject matter of Example 64 to 65 can optionally include wherein the cell interface is further configured to receive one or more parameters from the one or more outer moving cells, and wherein the trajectory processor is configured to determine the updated trajectory based on the coarse trajectory and the one or more parameters.

In Example 67, the subject matter of Example 66 can optionally include wherein the one or more parameters relate to a radio environment between the backhaul moving cell and the one or more outer moving cells.

In Example 68, the subject matter of Example 66 or 67 can optionally include wherein the one or more parameters include information about the positions of the one or more outer moving cells, radio measurements by the one or more moving outer cells, radio capabilities of the one or more outer moving cells, or coarse trajectories assigned to the one or more outer moving cells.

In Example 69, the subject matter of any one of Examples 64 to 68 can optionally include wherein the updated trajectory based on a statistical model of the radio environment between the backhaul moving cell and the one or more outer moving cells, and wherein the trajectory processor is configured to determine the updated trajectory by determining the updated trajectory to optimize a function of an optimization criteria as approximated by the statistical model.

In Example 70, the subject matter of Example 69 can optionally include wherein the statistical model is a propagation model that approximates the radio environment.

In Example 71, the subject matter of Example 69 can optionally include wherein the statistical model is a propagation model that approximates the radio environment based on a radio map.

In Example 72, the subject matter of any one of Examples 69 to 71 can optionally include wherein the optimization criteria is an aggregated supported data rate of backhaul relaying paths between the one or more outer moving cells and the radio access network via the backhaul moving cell, or a probability that the supported data rate of each of the backhaul relaying paths is above a predefined data rate threshold.

In Example 73, the subject matter of any one of Examples 69 to 72 can optionally include wherein the optimization criteria is an aggregated link quality metric of backhaul relaying paths between the one or more outer moving cells and the radio access network via the backhaul moving cell, or a probability that the link quality metric of each of the backhaul relaying paths is above a predefined link quality metric threshold.

In Example 74, the subject matter of any one of Examples 69 to 73 can optionally include wherein the trajectory processor is configured to determine the updated trajectory to optimize the function of the optimization criteria by optimizing the function of the optimization criteria using gradient descent.

In Example 75, the subject matter of any one of Examples 64 to 74 can optionally include wherein the cell interface is further configured to receive updated trajectories of the one or more outer moving cells from the one or more outer moving cells, the trajectory processor is further configured to determine a second updated trajectory based on the updated trajectories of the one or more outer moving cells, the cell interface is further configured to receive second additional data from the one or more outer moving cells when the backhaul moving cell establishes a position according to the second updated trajectory, and the relay router is configured to relay the second additional data to the radio access network.

Example 76 is a central trajectory controller including a cell interface configured to establish signaling connections with one or more backhaul moving cells, an input data repository configured to obtain input data related to a radio environment of the one or more backhaul moving cells and related to statistical density information of one or more served devices, and a trajectory processor configured to determine, based on the input data, coarse trajectories for the one or more backhaul moving cells, the cell interface further configured to send the coarse trajectories to the one or more backhaul moving cells.

In Example 77, the subject matter of Example 76 can optionally include wherein the statistical density information is statistical geographic density information or statistical traffic density information of the one or more served devices.

In Example 78, the subject matter of Example 76 or 77 can optionally include wherein the one or more served devices include forward moving cells or terminal devices.

In Example 79, the subject matter of any one of Examples 76 to 78 can optionally include wherein the trajectory processor is configured to determine the coarse trajectories for the one or more backhaul moving cells by optimizing a function of an optimization criteria with a statistical model that uses the statistical density information to approximate the one or more served devices.

Example 80 is a method for managing trajectories for moving cells, the method including establishing signaling connections with one or more backhaul moving cells, obtaining input data related to a radio environment of the one or more backhaul moving cells and related to statistical density information of one or more served devices, determining, based on the input data, determine coarse trajectories for the one or more backhaul moving cells, and sending the coarse trajectories to the one or more backhaul moving cells.

In Example 81, the subject matter of Example 80 can optionally include wherein the statistical density information includes statistical geographic density information or statistical traffic density information of the one or more served devices.

In Example 82, the subject matter of Example 80 or 81 can optionally include wherein the one or more served devices include forward moving cells or terminal devices.

In Example 83, the subject matter of any one of Examples 80 to 82 can optionally include wherein determining the coarse trajectories for the one or more backhaul moving cells includes optimizing a function of an optimization criteria with a statistical model that uses the statistical density information to approximate the one or more served devices.

Example 84 is a method for operating a backhaul moving cell, the method including receiving a coarse trajectory from a central trajectory controller, receiving data from one or more served devices when backhaul moving cell establishes a position according to the coarse trajectory, and relaying the data to a radio access network, determining an updated trajectory based on the coarse trajectory, and receiving additional data from the one or more served devices while positioning the backhaul moving cell according to the updated trajectory, and relaying the additional data to the radio access network.

In Example 85, the subject matter of Example 84 can optionally include wherein the one or more served devices include outer moving cells or terminal devices.

In Example 86, the subject matter of Example 84 or 85 can optionally include wherein determining the updated trajectory includes optimizing a function of an optimization criteria with a statistical model that uses statistical density information to approximate the one or more served devices.

In Example 87, the subject matter of Example 86 can optionally include wherein the statistical density information includes statistical geographic density information or statistical traffic density information of the one or more served devices.

Example 88 is a backhaul moving cell including a central interface configured to receive a coarse trajectory from a central trajectory controller, a cell interface configured to receive data from one or more served devices when the backhaul moving cell establishes a position itself according to the coarse trajectory, a relay router configured to relay the data to a radio access network, and a trajectory processor configured to determine an updated trajectory based on the coarse trajectory.

In Example 89, the subject matter of Example 88 can optionally further include steering and movement machinery configured to position the backhaul moving cell according to the updated trajectory while the cell interface receives additional data from the one or more served devices.

In Example 90, the subject matter of Example 88 or 89 can optionally include wherein the one or more served devices include outer moving cells or terminal devices In Example 91, the subject matter of any one of Examples 88 to 90 can optionally include wherein the trajectory processor is configured to determine the updated trajectory by optimizing a function of an optimization criteria with a statistical model that uses statistical density information to approximate the one or more served devices.

In Example 92, the subject matter of Example 91 can optionally include wherein the statistical density information includes statistical geographic density information or statistical traffic density information of the one or more served devices.

Example 93 is a central trajectory controller including means for establishing signaling connections with one more backhaul moving cells and with one or more outer moving cells, means for obtaining input data related to a radio environment of the one or more outer moving cells and the one or more backhaul moving cells, means for determining, based on the input data, first coarse trajectories for the one or more backhaul moving cells and second coarse trajectories for the one or more outer moving cells, and means for sending the first coarse trajectories to the one or more backhaul moving cells and the second coarse trajectories to the one or more outer moving cells.

Example 94 is an outer moving cell including means for receiving a coarse trajectory from a central trajectory controller, means for performing an outer task when the outer moving cell establishes a position according to the coarse trajectory, means for sending data from the outer task to a backhaul moving cell for relay to a radio access network, means for determining an updated trajectory based on the coarse trajectory, and means for performing the outer task when the outer moving cell establishes a position according to the updated trajectory.

Example 95 is a backhaul moving cell including means for receiving a coarse trajectory from a central trajectory controller, means for receiving data from one or more outer moving cells when the backhaul moving cell establishes a position according to the coarse trajectory, means for relaying the data to a radio access network, means for determining an updated trajectory based on the coarse trajectory, means for receiving additional data from the one or more outer moving cells when the backhaul moving cell establishes a position according to the updated trajectory, and means for relaying the additional data to the radio access network.

Example 96 is a central trajectory controller including means for establishing signaling connections with one or more backhaul moving cells, means for obtaining input data related to a radio environment of the one or more backhaul moving cells and related to statistical density information of one or more served devices, means for determining, based on the input data, coarse trajectories for the one or more backhaul moving cells, and means for sending the coarse trajectories to the one or more backhaul moving cells.

Example 97 is a backhaul moving cell including means for receiving a coarse trajectory from a central trajectory controller, means for receiving data from one or more served devices when the backhaul moving cell establishes a position according to the coarse trajectory, means for relaying the data to a radio access network, means for determining an updated trajectory based on the coarse trajectory, means for receiving additional data from the one or more served devices when the backhaul moving cell establishes a position according to the updated trajectory, and means for relaying the additional data to the radio access network.

Example 98 is a non-transitory computer readable medium storing instructions that when executed by a processor cause the processor to perform the method of any one of Examples 12 to 37, 53 to 63, 80 to 87.

Example 99 is a device including a processor, a memory storing instructions that, when executed by the processor, cause the processor to perform the method of any one of Examples 12 to 37, 53 to 63, 80 to 87.

Example 100 is a mobile access node including a relay router configured to relay data between one or more served terminal devices and an anchor access point, a local controller configured to receive control instructions from the anchor access point that include a coarse trajectory and a predictable usage pattern of the one or more served terminal devices, and a movement controller configured to control the mobile access node to move based on the coarse trajectory when the relay router relays data between the one or more served terminal devices and the anchor access point, wherein the local controller is further configured to update the coarse trajectory based on the predictable usage pattern to obtain an updated trajectory.

In Example 101, the subject matter of Example 100 can optionally include where the movement controller is further configured to control the mobile access node to move based on the updated trajectory when the relay router relays data between the one or more served terminal devices and the anchor access point.

In Example 102, the subject matter of Example 100 or 101 can optionally further include steering and movement machinery, wherein the movement controller is configured to control the steering and movement machinery to move the mobile access node.

In Example 103, the subject matter of any one of Examples 100 to 102 can optionally further include a baseband subsystem, a radio transceiver, and an antenna system, where the relay router is configured to relay the data as wireless signals via the baseband subsystem, the radio transceiver, and the antenna system.

In Example 104, the subject matter of any one of Examples 100 to 103 can optionally include wherein the predictable usage pattern indicates a predicted user density of the one or more served terminal devices over time, and wherein the updated trajectory corresponds to a different time of the predictable usage pattern than the coarse trajectory.

In Example 105, the subject matter of any one of Examples 100 to 103 can optionally include wherein the predictable usage pattern indicates a predicted user density of the one or more served terminal devices over time, and wherein the local controller is configured to determine the updated trajectory based on the predictable usage pattern by determining a user density with the predictable usage pattern, defining a function of an optimization criteria based on the user density, and determining a trajectory that maximizes the function of the optimization criteria as the updated trajectory.

In Example 106, the subject matter of Example 105 can optionally include wherein the function of the optimization criteria is part of a statistical model of the radio environment, and wherein the user density approximates positions of the one or more served terminal devices in the statistical model.

In Example 107, the subject matter of any one of Examples 100 to 106 can optionally further include a sensor configured to obtain sensing data indicating positions of the one or more served terminal devices, and to send the sensing data to the anchor access point, wherein the predictable usage pattern is based on the sensing data.

In Example 108, the subject matter of any one of Examples 100 to 107 can optionally further include a local learning subsystem, wherein the local learning subsystem is configured to update the predictable usage pattern to obtain an updated predictable usage pattern and wherein the local controller is configured to determine the updated trajectory based on the updated predictable usage pattern.

In Example 109, the subject matter of Example 108 can optionally further include a sensor configured to obtain sensing data indicating positions of the one or more served terminal devices, wherein the local learning subsystem is configured to update the predictable usage pattern based on the sensing data.

In Example 110, the subject matter of any one of Examples 100 to 109 can optionally include wherein the predictable usage pattern relates to a predicted user density, predicted radio conditions, or predicted access usage.

Example 111 is a mobile access node including a relay router configured to relay data between one or more served terminal devices and an anchor access point, a sensor configured to obtain sensing data indicating positions of the one or more served terminal devices and to send the sensing data to the anchor access point, a local controller configured to receive a coarse trajectory from the anchor access point that is based on the sensing data, and a movement controller configured to control the mobile access node to move based on the coarse trajectory when the relay router relays data between the one or more served terminal devices and the anchor access point.

In Example 112, the subject matter of Example 111 can optionally include wherein the local controller is further configured to receive a predictable usage pattern of the one or more served terminal devices from the anchor access point, and is configured to update the coarse trajectory based on the predictable usage pattern to obtain an updated trajectory.

In Example 113, the subject matter of Example 112 can optionally include wherein the movement controller is further configured to control the mobile access node to move based on the updated trajectory when the relay router relays data between the one or more served terminal devices and the anchor access point.

In Example 114, the subject matter of any one of Examples 111 to 113 can optionally further include steering and movement machinery, wherein the movement controller is configured to control the steering and movement machinery to move the mobile access node.

In Example 115, the subject matter of any one of Examples 111 to 114 can optionally further include a baseband subsystem, a radio transceiver, and an antenna system, where the relay router is configured to relay the data as wireless signals via the baseband subsystem, the radio transceiver, and the antenna system.

In Example 116, the subject matter of any one of Examples 111 to 115 can optionally include wherein the sensing data includes radio measurements, and wherein the sensor includes a radio measurement engine configured to obtain the radio measurements by measuring wireless signals transmitted by the one or more served terminal devices.

In Example 117, the subject matter of any one of Examples 111 to 116 can optionally include wherein the sensor includes a video sensor, an image sensor, or a positional sensor.

Example 118 is a mobile access node including a relay router configured to relay data between one or more served terminal devices and an anchor access point, a local controller configured to receive a coarse trajectory from the anchor access point, and a movement controller configured to control the mobile access node to move based on the coarse trajectory when relaying data between the one or more served terminal devices and the anchor access point.

Example 119 is an anchor access point including a user router configured to exchange data with one or more served terminal devices via a mobile access node, a central learning subsystem configured to determine a predictable usage pattern of the one or more served terminal devices based on sensing data indicating positions of the one or more served terminal devices, and a central controller configured to determine a coarse trajectory for the mobile access node based on the predictable usage pattern, and to send the coarse trajectory to the mobile access node.

In Example 120, the subject matter of Example 119 can optionally further include a baseband subsystem, a radio transceiver, and an antenna system, where the user router is configured to exchange the data by wirelessly communicating the data as wireless signals via the baseband subsystem, the radio transceiver, and the antenna system.

In Example 121, the subject matter of Example 119 or 120 can optionally further include a sensor hub configured to receive the sensing data from the one or more served terminal devices, the mobile access node, or an external sensor.

In Example 122, the subject matter of any one of Examples 119 to 121 can optionally include wherein the sensing data indicates positions of the one or more served terminal devices over a period of time, and wherein the predictable usage pattern is based on a predicted user density over time derived from the sensing data.

In Example 123, the subject matter of any one of Examples 119 to 122 can optionally include wherein the predictable usage pattern indicates a predicted user density of the one or more served terminal devices, and wherein the central learning subsystem is configured to perform pattern recognition on the sensing data to learn the predicted user density of the one or more served terminal devices.

In Example 124, the subject matter of Example 122 or 123 can optionally include wherein the predicted user density is a time-dependent density plot that characterizes user density over time.

In Example 125, the subject matter of Example 122 or 123 can optionally include wherein the predicted user density is a set of location-time pairs that identify locations and times at which heavy user density occurs.

In Example 126, the subject matter of any one of Examples 119 to 121 can optionally include wherein the predictable usage pattern indicates predicted radio conditions in a target coverage area, and wherein the central learning subsystem is configured to perform propagation modeling on the sensing data to learn the predicted radio conditions in the target coverage area.

In Example 127, the subject matter of any one of Examples 119 to 121 can optionally include wherein the predictable usage pattern indicates predicted access usage of the one or more served terminal devices, and wherein the central learning subsystem is configured to predict access usage on the sensing data to learn the predicted access usage.

In Example 128, the subject matter of any one of Examples 119 to 127 can optionally include wherein the central controller is configured to determine the coarse trajectory for the mobile access node by using the predictable usage pattern to model the one or more served terminal devices as part of a statistical model of a radio environment, and determining the coarse trajectory to maximize a function of an optimization criteria, where the function of the optimization criteria is based on the statistical model.

Example 129 is a mobile access node including means for relaying data between one or more served terminal devices and an anchor access point, means for receiving control instructions from the anchor access point that include a coarse trajectory and a predictable usage pattern of the one or more served terminal devices, means for controlling the mobile access node to move based on the coarse trajectory when the means for relaying relays data between the one or more served terminal devices and the anchor access point, and means for updating the coarse trajectory based on the predictable usage pattern to obtain an updated trajectory.

Example 130 is a mobile access node including means for relaying data between one or more served terminal devices and an anchor access point, means for obtaining sensing data indicating positions of the one or more served terminal devices and sending the sensing data to the anchor access point, means for receiving a coarse trajectory from the anchor access point that is based on the sensing data, and means for controlling the mobile access node to move based on the coarse trajectory when the means for relaying relays data between the one or more served terminal devices and the anchor access point.

Example 131 is a mobile access node including means for relaying data between one or more served terminal devices and an anchor access point, means for receiving a coarse trajectory from the anchor access point, and means for controlling the mobile access node to move based on the coarse trajectory when the means for relaying relays data between the one or more served terminal devices and the anchor access point.

Example 132 is an anchor access point including means for exchanging data with one or more served terminal devices via a mobile access node, means for determining a predictable usage pattern of the one or more served terminal devices based on sensing data indicating positions of the one or more served terminal devices, means for determining a coarse trajectory for the mobile access node based on the predictable usage pattern and sending the coarse trajectory to the mobile access node.

Example 133 is a method of operating a mobile access node, the method including relaying data between one or more served terminal devices and an anchor access point, receiving control instructions from the anchor access point that include a coarse trajectory and a predictable usage pattern of the one or more served terminal devices, controlling the mobile access node to move based on the coarse trajectory when relaying data between the one or more served terminal devices and the anchor access point, and updating the coarse trajectory based on the predictable usage pattern to obtain an updated trajectory.

In Example 134, the subject matter of Example 133 can optionally further include controlling the mobile access node to move based on the updated trajectory when relaying data between the one or more served terminal devices and the anchor access point.

In Example 135, the subject matter of Example 133 or 134 can optionally include wherein controlling the mobile access node to move includes controlling steering and movement machinery of the mobile access node to move the mobile access node.

In Example 136, the subject matter of any one of Examples 133 to 135 can optionally include wherein relaying the data between the one or more served terminal devices and the anchor access point includes relaying the data as wireless signals.

In Example 137, the subject matter of any one of Examples 133 to 136 can optionally include wherein the predictable usage pattern indicates a predicted user density of the one or more served terminal devices over time, and wherein the updated trajectory corresponds to a different time of the predictable usage pattern than the coarse trajectory.

In Example 138, the subject matter of any one of Examples 133 to 136 can optionally include wherein the predictable usage pattern indicates a predicted user density of the one or more served terminal devices over time, and wherein determining the updated trajectory based on the predictable usage pattern includes determining a user density with the predictable usage pattern, defining a function of an optimization criteria based on the user density, and determining a trajectory that maximizes the function of the optimization criteria as the updated trajectory.

In Example 139, the subject matter of any one of Examples the function of can optionally include optimization criteria is part of a statistical model of the radio environment and wherein the user density approximates positions of the one or more served terminal devices in the statistical model.

In Example 140, the subject matter of any one of Examples 133 to 139 can optionally further include obtaining sensing data indicating positions of the one or more served terminal devices, and sending the sensing data to the anchor access point, wherein the predictable usage pattern is based on the sensing data.

In Example 141, the subject matter of any one of Examples 133 to 140 can optionally further include updating the predictable usage pattern to obtain an updated predictable usage pattern, wherein determining the updated trajectory includes determining the updated trajectory based on the updated predictable usage pattern.

In Example 142, the subject matter of Example 141 can optionally further include obtaining sensing data indicating positions of the one or more served terminal devices, wherein updating the predictable usage pattern includes updating the predictable usage pattern based on the sensing data.

In Example 143, the subject matter of any one of Examples 133 to 142 can optionally include wherein the predictable usage pattern relates to a predicted user density, prediction radio conditions, or predicted access usage.

Example 144 is a method of operating a mobile access node, the method including relaying data between one or more served terminal devices and an anchor access point, obtaining sensing data indicating positions of the one or more served terminal devices and sending the sensing data to the anchor access point, receiving a coarse trajectory from the anchor access point that is based on the sensing data, and controlling the mobile access node to move based on the coarse trajectory when relaying data between the one or more served terminal devices and the anchor access point.

In Example 145, the subject matter of Example 144 can optionally further include receiving a predictable usage pattern of the one or more served terminal devices from the anchor access point, and updating the coarse trajectory based on the predictable usage pattern to obtain an updated trajectory.

In Example 146, the subject matter of Example 145 can optionally further include controlling the mobile access node to move based on the updated trajectory when relaying data between the one or more served terminal devices and the anchor access point.

In Example 147, the subject matter of any one of Examples 144 to 146 can optionally include wherein controlling the mobile access node to move includes controlling steering and movement machinery of the mobile access node to move the mobile access node.

In Example 148, the subject matter of any one of Examples 144 to 147 can optionally include wherein relaying the data between the one or more served terminal devices and the anchor access point includes relaying the data as wireless signals.

In Example 149, the subject matter of any one of Examples 144 to 148 can optionally include wherein the sensing data includes radio measurements, and wherein obtaining the sensing data includes measuring wireless signals transmitted by the one or more served terminal devices.

Example 150 is a method of operating a mobile access node, the method including relaying data between one or more served terminal devices and an anchor access point, receiving a coarse trajectory from the anchor access point, and controlling the mobile access node to move based on the coarse trajectory when relaying data between the one or more served terminal devices and the anchor access point.

Example 151 is a method of operating an anchor access point, the method including exchanging data with one or more served terminal devices via a mobile access node, determining a predictable usage pattern of the one or more served terminal devices based on sensing data indicating positions of the one or more served terminal devices, and determining a coarse trajectory for the mobile access node based on the predictable usage pattern, and sending the coarse trajectory to the mobile access node.

In Example 152, the subject matter of Example 151 can optionally include wherein exchanging the data with the one or more served terminal devices via the mobile access node includes wirelessly communicating the data as wireless signals.

In Example 153, the subject matter of Example 151 or 152 can optionally further include receiving the sensing data from the one or more served terminal devices, the mobile access node, or an external sensor.

In Example 154, the subject matter of any one of Examples 151 to 153 can optionally include wherein the sensing data indicates positions of the one or more served terminal devices over a period of time, and wherein the predictable usage pattern is based on a predicted user density over time derived from the sensing data.

In Example 155, the subject matter of any one of Examples 151 to 154 can optionally include wherein the predictable usage pattern indicates a predicted user density of the one or more served terminal devices, the method further including performing pattern recognition on the sensing data to learn the predicted user density of the one or more served terminal devices.

In Example 156, the subject matter of Example 154 or 155 can optionally include wherein the predicted user density is a time-dependent density plot that characterizes user density over time.

In Example 157, the subject matter of Example 154 or 155 can optionally include wherein the predicted user density is a set of location-time pairs that identify locations and times at which heavy user density occurs.

In Example 158, the subject matter of any one of Examples 151 to 153 can optionally include wherein the predictable usage pattern indicates predicted radio conditions in a target coverage area, the method further including performing propagation modeling on the sensing data to learn the predicted radio conditions in the target coverage area.

In Example 159, the subject matter of any one of Examples 151 to 153 can optionally include wherein the predictable usage pattern indicates predicted access usage of the one or more served terminal devices, the method further including performing access usage prediction on the sensing data to learn the predicted access usage.

In Example 160, the subject matter of any one of Examples 151 to 159 can optionally include wherein determining the coarse trajectory for the mobile access node includes using the predictable usage pattern to model the one or more served terminal devices as part of a statistical model of a radio environment, and determining the coarse trajectory to maximize a function of an optimization criteria, where the function of the optimization criteria is based on the statistical model.

Example 161 is a non-transitory computer readable medium storing instructions that when executed by a processor cause the processor to perform the method of any one of Examples 133 to 160.

Example 162 is a communication device including a processor, and a memory storing instructions that when executed by the processor cause the communication device to perform the method of any one of Examples 133 to 160.

Example 163 is a central trajectory controller including a trajectory processor configured to determine a coarse trajectory for a mobile access node based on a function of a radio link optimization criteria, wherein the function of the radio link optimization criteria approximates a radio link optimization criteria for different coarse trajectories and is based on propagation pathloss data for an outer surface of an indoor coverage area, and a node interface configured to send the coarse trajectory to the mobile access node.

In Example 164, the subject matter of Example 163 can optionally include wherein the function of the radio link optimization criteria is based on a statistical model of a radio environment around the indoor coverage area, and wherein the propagation pathloss data characterizes propagation pathloss of radio signals passing through the outer surface in the statistical model.

In Example 165, the subject matter of Example 163 or 164 can optionally further include a central learning subsystem configured to receive radio measurements originating from around the indoor coverage area, and to update the propagation pathloss data based on the radio measurements to obtain updated propagation pathloss data.

In Example 166, the subject matter of Example 165 can optionally include wherein the trajectory processor is configured to determine an updated trajectory for the mobile access node based on the updated propagation pathloss data, and wherein the node interface is configured to send the updated trajectory to the mobile access node.

In Example 167, the subject matter of Example 163 or 164 can optionally further include a central learning subsystem configured to receive radio measurements originating from around the indoor coverage area, and to generate the propagation pathloss data based on the radio measurements.

In Example 168, the subject matter of Example 167 can optionally include wherein the radio measurements are paired with geotagged location information about a transmitting or receiving device for the radio measurements, and wherein the central learning subsystem is configured to generate the propagation pathloss data by estimating the propagation pathloss at location on the outer surface based on the radio measurements and the geotagged location information.

In Example 169, the subject matter of any one of Examples 163 to 168 can optionally include wherein the trajectory processor is configured to determine the coarse trajectory by determining a coarse trajectory that increases the function of the optimization criteria.

In Example 170, the subject matter of any one of Examples 163 to 169 can optionally include wherein the function of the radio link optimization criteria is a statistical expression that approximates a supported data rate of radio links between served terminal devices in the indoor coverage area and the mobile access node, approximates a probability that the supported data rate of each of the radio links is above a supported data rate threshold, approximates a link quality metric of radio links between the served terminal devices and the mobile access node, or approximates a probability that the link quality metric of each radio link is above a link quality metric threshold.

In Example 171, the subject matter of any one of Examples 163 to 170 can optionally include wherein the node interface is configured to use a signaling connection through a radio access network to send the coarse trajectory to the mobile access node.

Example 172 is a mobile access node including a relay router configured to relay data between a served terminal device in an indoor coverage area and a radio access network, and a local controller configured to determine a trajectory based on a function of a radio link optimization criteria, where the function of the radio link optimization criteria is based on propagation pathloss data for an outer surface of the indoor coverage area and approximates a radio link optimization criteria for different trajectories, the relay router further configured to relay data between the served terminal device and the radio access network while the mobile access node moves according to the trajectory.

In Example 173, the subject matter of Example 172 can optionally further include one or more antennas, a radio frequency (RF) transceiver, and a baseband modem, where the relay router is configured to transmit and receive data as wireless signals via the one or more antennas, the RF transceiver, and the baseband modem.

In Example 174, the subject matter of Example 172 can optionally further include a movement controller and steering and movement machinery, where movement controller is configured to control the steering and movement machinery to move the mobile access node according to the trajectory while the relay router relays data between the served terminal device and the radio access network.

In Example 175, the subject matter of any one of Examples 172 to 174 can optionally include wherein the function of the radio link optimization criteria is based on a statistical model of a radio environment around the indoor coverage area, and wherein the propagation pathloss data characterizes propagation pathloss of radio signals passing through the outer surface in the statistical model.

In Example 176, the subject matter of any one of Examples 172 to 175 can optionally further include a local learning engine configure to receive radio measurements from around the indoor coverage area, and to update the propagation pathloss data based on the radio measurements to obtain updated propagation pathloss data.

In Example 177, the subject matter of Example 176 can optionally include wherein the local controller is configured to determine an updated trajectory for the mobile access node based on the updated propagation pathloss data, and wherein the relay router is configured to relay data between the served terminal device and the radio access network while the mobile access node moves according to the updated trajectory.

In Example 178, the subject matter of any one of Examples 172 to 175 can optionally further include a local learning engine configured to receive radio measurements originating from around the indoor coverage area, and to generate the propagation pathloss data based on the radio measurements.

In Example 179, the subject matter of Example 178 can optionally include wherein the radio measurements are paired with geotagged location information about a transmitting or receiving device for the radio measurements, and wherein the central learning subsystem is configured to generate the propagation pathloss data by estimating the propagation pathloss at allocation on the outer surface based on the radio measurements and the geotagged location information.

In Example 180, the subject matter of any one of Examples 172 to 179 can optionally include wherein the local controller is configured to determine the trajectory by determining a trajectory that increases the function of the optimization criteria.

In Example 181, the subject matter of any one of Examples 172 to 180 can optionally include wherein the function of the radio link optimization criteria is a statistical expression that approximates a supported data rate of radio links between served terminal devices in the indoor coverage area and the mobile access node, approximates a probability that the supported data rate of each of the radio links is above a supported data rate threshold, approximates a link quality metric of radio links between the served terminal devices and the mobile access node, or approximates a probability that the link quality metric of each radio link is above a link quality metric threshold.

In Example 182, the subject matter of any one of Examples 172 to 181 can optionally include wherein the local controller is further configured to determine a beamsteering direction based on the propagation pathloss data, the mobile access node further including one or more antennas configured to wirelessly transmit the data for the relay router according to the beamsteering direction.

In Example 183, the subject matter of Example 182 can optionally include wherein the local controller is configured to determine the beamsteering direction by determining a beamsteering direction that increases the function of the optimization criteria.

In Example 184, the subject matter of Example 182 can optionally include wherein the propagation pathloss data identifies one or more low propagation pathloss areas of the outer surface, and wherein the local controller is configured to determine the beamsteering direction by determining a beamsteering direction that yields an antenna beam that passes through one of the one or more low propagation pathloss areas.

Example 185 is a mobile access node including a relay router configured to relay data between a served terminal device in an indoor coverage area and a radio access network, and a local controller configured to use a function of a radio link optimization criteria to determine a trajectory, where the function of the radio link optimization criteria is based on surface propagation pathloss data of an outer surface of the indoor coverage area, the relay router further configured to relay data between the served terminal device and the radio access network while the mobile access node moves according to the trajectory.

Example 186 is a central trajectory controller including a trajectory processor configured to estimate an amount of bandwidth for supporting data usage by served terminal devices in an indoor coverage area, determine a number of mobile access nodes to deploy to serve the indoor coverage area based on the amount of bandwidth, and select one or more mobile access nodes based on the number, and a node interface configured to send signaling to the one or more mobile access nodes to activate the one or mobile access nodes.

In Example 187, the subject matter of Example 186 can optionally include wherein the trajectory processor is configured to estimate the amount of bandwidth for supporting the data usage based on context information that indicates a number of served terminal devices in the indoor coverage area or that indicates overall or individual data usage by served terminal devices in the indoor coverage area.

In Example 188, the subject matter of Example 186 or 187 can optionally include wherein the trajectory processor is configured to determine the number of mobile access nodes to deploy based on the amount of bandwidth and a redundancy parameter that increases the number of mobile access nodes to deploy.

In Example 189, the subject matter of any one of Examples 186 to 188 can optionally include wherein the trajectory processor is configured to select the one or more mobile access nodes from a fleet of mobile access nodes available for serving the indoor coverage area.

In Example 190, the subject matter of any one of Examples 186 to 189 can optionally include wherein the trajectory processor is configured to select the one or more mobile access nodes by selecting mobile access nodes equal in quantity to the number of mobile access nodes.

In Example 191, the subject matter of any one of Examples 186 to 190 can optionally include wherein the node interface is configured to use a signaling connection through a radio access network to send the signaling to the one or more mobile access nodes.

Example 192 is a central trajectory controller including a trajectory processor configured to estimate an capacity requirement of served terminal devices in an indoor coverage area, determine a number of mobile access nodes to deploy to serve the indoor coverage area based on the amount of bandwidth, and select one or more mobile access nodes based on the number, and a node interface configured to send signaling to the one or more mobile access nodes to activate the one or mobile access nodes.

Example 193 is a method of operating a central trajectory controller, the method including determining a coarse trajectory for a mobile access node based on a function of a radio link optimization criteria, wherein the function of the radio link optimization criteria is based on propagation pathloss data for an outer surface of an indoor coverage area and approximates a radio link optimization criteria for different coarse trajectories, sending the coarse trajectory to the mobile access node.

In Example 194, the subject matter of Example 193 can optionally include wherein the function of the radio link optimization criteria is based on a statistical model of a radio environment around the indoor coverage area, and wherein the propagation pathloss data characterizes propagation pathloss of radio signals passing through the outer surface in the statistical model.

In Example 195, the subject matter of Example 193 or 194 can optionally further include receiving radio measurements originating from around the indoor coverage area and updating the propagation pathloss data based on the radio measurements to obtain updated propagation pathloss data.

In Example 196, the subject matter of Example 195 can optionally further include determining an updated trajectory for the mobile access node based on the propagation pathloss data and sending the updated trajectory to the mobile access node.

In Example 197, the subject matter of Example 193 or 194 can optionally further include receiving radio measurements originating from around the indoor coverage area and generating the propagation pathloss data based on the radio measurements.

In Example 198, the subject matter of Example 197 can optionally include wherein the radio measurements are paired with geotagged location information about a transmitting or receiving device for the radio measurements, wherein generating the propagation pathloss data based on the radio measurements includes estimating the propagation pathloss at location on the outer surface based on the radio measurements and the geotagged location information.

In Example 199, the subject matter of any one of Examples 193 to 198 can optionally include wherein determining the coarse trajectory includes determining a coarse trajectory that increases the function of the optimization criteria.

In Example 200, the subject matter of any one of Examples 193 to 199 can optionally include wherein the function of the radio link optimization criteria is a statistical expression that approximates a supported data rate of radio links between served terminal devices in the indoor coverage area and the mobile access node, approximates a probability that the supported data rate of each of the radio links is above a supported data rate threshold, approximates a link quality metric of radio links between the served terminal devices and the mobile access node, or approximates a probability that the link quality metric of each radio link is above a link quality metric threshold.

In Example 201, the subject matter of any one of Examples 193 to 200 can optionally include wherein sending the coarse trajectory to the mobile access node includes sending the coarse trajectory on a signaling connection through a radio access network to the mobile access node.

Example 202 is a method of operating a mobile access node, the method including relaying data between a served terminal device in an indoor coverage area and a radio access network, determining a trajectory based on a function of a radio link optimization criteria, where the function of the radio link optimization criteria is based on propagation pathloss data for an outer surface of the indoor coverage area and approximates a radio link optimization criteria for different trajectories, relaying data between the served terminal device and the radio access network while moving the mobile access node according to the trajectory.

In Example 203, the subject matter of Example 202 can optionally include wherein moving the mobile access node according to the trajectory includes controlling steering and movement machinery of the mobile access node to move the mobile access node.

In Example 204, the subject matter of Example 202 or 203 can optionally include wherein the function of the radio link optimization criteria is based on a statistical model of a radio environment around the indoor coverage area, and wherein the propagation pathloss data characterizes propagation pathloss of radio signals passing through the outer surface in the statistical model.

In Example 205, the subject matter of any one of Examples 202 to 204 can optionally further include receiving radio measurements originating from around the indoor coverage area and updating the propagation pathloss data based on the radio measurements to obtain updated propagation pathloss data.

In Example 206, the subject matter of Example 205 can optionally further include determining an updated trajectory for the mobile access node based on the updated propagation pathloss data, and relaying data between the served terminal device and the radio access network while moving the mobile access node according to the updated trajectory.

In Example 207, the subject matter of any one of Examples 202 to 204 can optionally further include receiving radio measurements originating from around the indoor coverage area and generating the propagation pathloss data based on the radio measurements.

In Example 208, the subject matter of Example 207 can optionally include wherein the radio measurements are paired with geotagged location information about a transmitting or receiving device for the radio measurements, wherein generating the propagation pathloss data includes estimating the propagation pathloss at allocation on the outer surface based on the radio measurements and the geotagged location information.

In Example 209, the subject matter of any one of Examples 202 to 208 can optionally include wherein determining the trajectory includes determining a trajectory that increases the function of the optimization criteria.

In Example 210, the subject matter of any one of Examples 202 to 209 can optionally further include determining a beamsteering direction based on the propagation pathloss data, wherein relaying the data between the served terminal device and the radio access network includes wirelessly transmitting the data according to the beamsteering direction.

In Example 211, the subject matter of Example 210 can optionally include wherein determining the beamsteering direction includes determining a beamsteering direction that increases the function of the optimization criteria.

In Example 212, the subject matter of Example 210 can optionally include wherein the propagation pathloss data identifies one or more low propagation pathloss areas of the outer surface, and wherein determining the beamsteering direction includes determining a beamsteering direction that yields an antenna beam that passes through one of the one or more low propagation pathloss areas.

Example 213 is a method of operating a mobile access node, the method including relaying data between a served terminal device in an indoor coverage area and a radio access network, using a function of a radio link optimization criteria to determine a trajectory, where the function of the radio link optimization criteria is based on surface propagation pathloss data of an outer surface of the indoor coverage area, and relaying data between the served terminal device and the radio access network while moving the mobile access node according to the trajectory.

Example 214 is a method of operating a central trajectory controller, the method including estimating an amount of bandwidth for supporting data usage by served terminal devices in an indoor coverage area, determining a number of mobile access nodes to deploy to serve the indoor coverage area based on the amount of bandwidth, selecting one or more mobile access nodes based on the number, and sending signaling to the one or more mobile access nodes to activate the one or mobile access nodes.

In Example 215, the subject matter of Example 214 can optionally include wherein estimating the amount of bandwidth includes estimating the amount of bandwidth for supporting the data usage based on context information that indicates a number of served terminal devices in the indoor coverage area or that indicates overall or individual data usage by served terminal devices in the indoor coverage area.

In Example 216, the subject matter of Example 214 or 215 can optionally include wherein determining the number of mobile access nodes to deploy includes determining the number of mobile access nodes to deploy based on the amount of bandwidth and a redundancy parameter that increases the number of mobile access nodes to deploy.

In Example 217, the subject matter of any one of Examples 214 to 216 can optionally include wherein selecting the one or more mobile access nodes includes selecting the one or more mobile access nodes from a fleet of mobile access nodes available for serving the indoor coverage area.

In Example 218, the subject matter of any one of Examples 214 to 217 can optionally include wherein selecting the one or more mobile access nodes includes selecting mobile access nodes equal in quantity to the number of mobile access nodes.

In Example 219, the subject matter of any one of Examples 214 to 218 can optionally include wherein sending the signaling to the one or more mobile access nodes includes sending the signaling to the one or more mobile access nodes over a signaling connection through a radio access network.

Example 220 is a non-transitory computer readable medium storing instructions that when executed by one or more processors cause the one or more processors to perform the method of any one of Examples 193 to 219.

Example 221 is a device including one or more processors, and a memory storing instructions that when executed by the one or more processors cause the one or more processors to perform the method of any one of Examples 193 to 219.

Example 222 is a central trajectory controller including determining means configured to determine a coarse trajectory for a mobile access node based on a function of a radio link optimization criteria, wherein the function of the radio link optimization criteria is based on propagation pathloss data for an outer surface of an indoor coverage area and approximates a radio link optimization criteria for different coarse trajectories, sending means configured to send the coarse trajectory to the mobile access node.

Example 223 is a mobile access node including relaying means configured to relay data between a served terminal device in an indoor coverage area and a radio access network, and determining means configured to determine a trajectory based on a function of a radio link optimization criteria, where the function of the radio link optimization criteria is based on propagation pathloss data for an outer surface of the indoor coverage area and approximates a radio link optimization criteria for different trajectories, the relaying means further configured to relay data between the served terminal device and the radio access network while moving the mobile access node according to the trajectory.

Example 224 is a mobile access node including relaying means configured to relay data between a served terminal device in an indoor coverage area and a radio access network, and determining means configured to use a function of a radio link optimization criteria to determine a trajectory, where the function of the radio link optimization criteria is based on surface propagation pathloss data of an outer surface of the indoor coverage area, the relaying means further configured to relay data between the served terminal device and the radio access network while moving the mobile access node according to the trajectory.

Example 225 is a central trajectory controller including estimating means configured to estimate an amount of bandwidth for supporting data usage by served terminal devices in an indoor coverage area, determining means configured to determine a number of mobile access nodes to deploy to serve the indoor coverage area based on the amount of bandwidth, selecting means configured to select one or more mobile access nodes based on the number, and sending means configured to send signaling to the one or more mobile access nodes to activate the one or mobile access nodes.

Example 226 is a terminal device including a resource platform including hardware resources for computing, storage, or networking, a function controller configured to receive an allocation of a virtualized function from a virtual cell, and to configure the resource platform for the virtualized function, the resource platform configured to perform the virtualized function to obtain result data, and to send the result data to another terminal device of the virtual cell.

In Example 227, the subject matter of Example 226 can optionally include wherein the virtualized function is a virtualized function for the virtual cell.

In Example 228, the subject matter of Example 226 can optionally include wherein the resource platform includes compute resources, storage resources, or network resources that are logically designated as part of a resource pool for the virtual cell.

In Example 229, the subject matter of Example 226 or 228 can optionally include wherein the function controller is configured to configure the resource platform for the virtualized function by loading software onto one or more processors of the resource platform.

In Example 230, the subject matter of any one of Examples 226 to 229 can optionally further include a baseband modem, wherein the function controller is configured to wirelessly receive the allocation via the baseband modem.

In Example 231, the subject matter of any one of Examples 226 to 230 can optionally include wherein the virtualized function is a cell processing virtualized function or a radio activity virtualized function.

In Example 232, the subject matter of any one of Examples 226 to 231 can optionally include wherein the virtualized function is an uplink or downlink processing virtualized function, and wherein the resource platform is configured to send the result data to another uplink or downlink processing virtualized function running of the another terminal device.

In Example 233, the subject matter of any one of Examples 226 to 232 can optionally include wherein the function controller is configured to receive the allocation of the virtualized function from a virtualized function manager of the virtual cell.

Example 234 is a terminal device including a resource platform including hardware resources for computing, storage, or networking, a function controller configured to receive an allocation of a virtualized function from a virtual cell, and to configure the resource platform for the virtualized function, the resource platform configured to perform the virtualized function to provide a cell processing function or a radio activity function for a terminal device served by the virtual cell.

In Example 235, the subject matter of Example 234 can optionally include wherein the virtualized function is a virtualized function for the virtual cell.

In Example 236, the subject matter of Example 234 can optionally include wherein the virtualized function is a downlink processing virtualized function, and wherein the resource platform is configured to process downlink data, addressed to the terminal device, according to the downlink processing virtualized function to obtain result data.

In Example 237, the subject matter of Example 236 can optionally include wherein the resource platform is configured to send the result data to another downlink processing virtualized function of the virtual cell.

In Example 238, the subject matter of Example 237 can optionally include wherein the other downlink processing virtualized function is executable at another terminal device of the virtual cell.

In Example 239, the subject matter of Example 236 can optionally include wherein the downlink processing virtualized function is a downlink physical layer processing virtualized function, and wherein the resource platform is configured to wirelessly transmit the result data to the terminal device.

In Example 240, the subject matter of Example 234 can optionally include wherein the virtualized function is an uplink processing virtualized function, and wherein the resource platform is configured to process uplink data, originating from the terminal device, according to the uplink processing virtualized function to obtain result data.

In Example 241, the subject matter of Example 240 can optionally include wherein the resource platform is configured to send the result data to another uplink processing virtualized function of the virtual cell.

In Example 242, the subject matter of Example 241 can optionally include wherein the other uplink processing virtualized function is running at another terminal device of the virtual cell.

In Example 243, the subject matter of Example 240 can optionally include wherein the resource platform is configured to wirelessly transmit the result data to a radio access network over a backhaul link.

In Example 244, the subject matter of any one of Examples 234 to 243 can optionally include wherein the virtualized function is also allocated to a resource platform of another terminal device of the virtual cell, and wherein the resource platform is configured to perform the virtualized function in cooperation with the resource platform of the other terminal device.

In Example 245, the subject matter of any one of Examples 234 to 244 can optionally include wherein the resource platform includes compute resources, storage resources, or network resources that are logically designated as part of a resource pool for the virtual cell.

In Example 246, the subject matter of any one of Examples 234 to 244 can optionally further include a baseband modem, wherein the function controller is configured to wirelessly receive the allocation via the baseband modem.

In Example 247, the subject matter of any one of Examples 234 to 246 can optionally further include a radio frequency transceiver and one or more antennas.

Example 248 is a terminal device including a resource platform including hardware resources for computing, storage, or networking, a controller configured to receive an allocation of a virtualized function from a virtual cell, and to configure the resource platform for the virtualized function, the resource platform configured to perform the virtualized function in cooperation with a resource platform of another terminal device of the virtual cell.

Example 249 is a terminal device including a function controller configured to identify a virtualized function that uses resource platforms of multiple terminal devices of a virtual cell, identify a plurality of terminal devices of the virtual cell based on wireless links between the plurality of terminal devices, and allocate the virtualized function to the plurality of terminal devices for execution in a distributed manner.

In Example 250, the subject matter of Example 249 can optionally include wherein the virtualized function is configured for distributed execution at resource platforms of multiple terminal devices, or is configured to use result data from a counterpart virtualized function executable on another terminal device.

In Example 251, the subject matter of Example 249 or 250 can optionally include wherein the function controller is configured to evaluate radio measurements that characterize the wireless links between the plurality of terminal devices, and to identify the plurality of terminal devices based on a strength of the radio measurements.

In Example 252, the subject matter of Example 249 or 250 can optionally include wherein the function controller is configured to evaluate positions of the plurality of terminal devices, and to identify the plurality of terminal devices based on a relative proximity indicated by their positions.

In Example 253, the subject matter of any one of Examples 249 to 252 can optionally include wherein the function controller is configured to determine a number of terminal devices that the virtualized function uses, and to select a plurality of terminal devices of the virtual cell equal in quantity to the number as the plurality of terminal devices.

In Example 254, the subject matter of any one of Examples 249 to 253 can optionally further include a baseband modem, wherein the function controller is configured to transmit an allocation of the virtualized function to the plurality of terminal devices via the baseband modem.

Example 255 is a terminal device including a function controller configured to communicate with terminal devices of a virtual cell, a resource platform configured to execute a master terminal device virtualized function for the virtual cell in cooperation with a resource platform of another terminal device of the virtual cell, identify a virtualized function that uses resource platforms of multiple terminal devices of the virtual cell, identify a plurality of terminal devices of the virtual cell based on wireless links between the plurality of terminal devices, and allocate the virtualized function to the plurality of terminal devices for execution in a distributed manner.

Example 256 is a terminal device including a function controller configured to identify a virtualized function that uses resource platforms of multiple terminal devices of a virtual network, identify a plurality of terminal devices of the virtual network based on wireless links between the plurality of terminal devices, and allocate the virtualized function to the plurality of terminal devices for execution in a distributed manner.

Example 257 is a terminal device including a function controller configured to communicate with terminal devices of a virtual network, and a resource platform configured to execute a master terminal device virtualized function for the virtual network in cooperation with a resource platform of another terminal device of the virtual network, identify a virtualized function that uses resource platforms of multiple terminal devices of the virtual network, identify a plurality of terminal devices of the virtual network based on wireless links between the plurality of terminal devices, and allocate the virtualized function to the plurality of terminal devices for execution in a distributed manner.

Example 258 is a terminal device including a function controller configured to identify, for each of a plurality of virtualized functions, one or more terminal devices of a virtual cell, allocate each of the plurality of virtualized functions to the corresponding one or more terminal devices.

Example 259 is a terminal device including a function controller configured to exchange signaling with one or more terminal devices to join a virtual network, and to receive an allocation for a virtualized function from a virtualized function manager of the virtual network, and a resource platform configured to virtually perform the virtualized function in cooperation with a resource platform of another terminal device of the virtual network.

Example 260 is a virtual cell including a plurality of terminal devices including function controllers and resource platforms, a virtualized function manager configured to allocate a plurality of virtualized functions between the plurality of terminal devices, wherein the plurality of terminal devices are configured to provide radio access to one or more served terminal devices by performing the respectively allocated virtualized functions at their respective resource platforms.

Example 261 is a method of operating a terminal device, the method including receiving an allocation of a virtualized function from a virtual cell, configuring a resource platform of the terminal device for the virtualized function, performing the virtualized function with the resource platform to obtain result data, and sending the result data to another terminal device of the virtual cell.

In Example 262, the subject matter of Example 261 can optionally include wherein the resource platform includes compute resources, storage resources, or network resources that are logically designated as part of a resource pool for the virtual cell.

In Example 263, the subject matter of Example 261 or 262 can optionally include wherein configuring the resource platform for the virtualized function includes loading software onto one or more processors of the resource platform.

In Example 264, the subject matter of any one of Examples 261 to 263 can optionally include wherein receiving the allocation includes wirelessly receiving the allocation via a baseband modem of the terminal device.

In Example 265, the subject matter of any one of Examples 261 to 264 can optionally include wherein the virtualized function is a cell processing virtualized function or a radio activity virtualized function.

In Example 266, the subject matter of any one of Examples 261 to 265 can optionally include wherein the virtualized function is an uplink or downlink processing virtualized function, and wherein sending the result data includes sending the result data to another uplink or downlink processing virtualized function running on the other terminal device.

Example 267 is a method of operating a terminal device, the method including receiving an allocation of a virtualized function from a virtual cell, configuring a resource platform of the terminal device with software for performing the virtualized function, and performing the virtualized function to provide a cell processing function or a radio activity function for a terminal device served by the virtual cell.

In Example 268, the subject matter of Example 267 can optionally include wherein the virtualized function is a downlink processing virtualized function, and wherein performing the virtualized function includes processing downlink data, addressed to the terminal device, according to the downlink processing virtualized function to obtain result data.

In Example 269, the subject matter of Example 268 can optionally further include sending the result data to another downlink processing virtualized function of the virtual cell.

In Example 270, the subject matter of Example 269 can optionally include wherein the other downlink processing virtualized function is running at another terminal device of the virtual cell.

In Example 271, the subject matter of Example 268 can optionally include wherein the downlink processing virtualized function is a downlink physical layer processing virtualized function, the method further including wirelessly transmitting the result data to the terminal device.

In Example 272, the subject matter of Example 267 can optionally include wherein the virtualized function is an uplink processing virtualized function, and wherein performing the virtualized function includes processing uplink data, originating from the terminal device, according to the uplink processing virtualized function to obtain result data.

In Example 273, the subject matter of Example 272 can optionally further include sending the result data to another uplink processing virtualized function of the virtual cell.

In Example 274, the subject matter of Example 272 can optionally include wherein the other uplink processing virtualized function is running at another terminal device of the virtual cell.

In Example 275, the subject matter of Example 272 can optionally further include wirelessly transmitting the result data to a radio access network over a backhaul link.

In Example 276, the subject matter of any one of Examples 267 to 275 can optionally include wherein the virtualized function is also allocated to a resource platform of another terminal device of the virtual cell, and wherein performing the virtualized function includes performing the virtualized function in cooperation with the resource platform of the other terminal device.

In Example 277, the subject matter of any one of Examples 267 to 276 can optionally include wherein the resource platform includes compute resources, storage resources, or network resources that are logically designated as part of a resource pool for the virtual cell.

In Example 278, the subject matter of any one of Examples 267 to 277 can optionally include wherein receiving the allocation includes wirelessly receiving the allocation via a baseband modem of the terminal device.

Example 279 is a method of operating a terminal device, the method including receiving an allocation of a virtualized function from a virtual cell, configuring a resource platform of the terminal device with software for performing the virtualized function, performing the virtualized function in cooperation with a resource platform of another terminal device of the virtual cell.

Example 280 is a method of operating a terminal device, the method including executing a virtualized function manager for a virtual cell, identifying a virtualized function that uses resources platforms of multiple terminal devices of the virtual cell, identifying a plurality of terminal devices of the virtual cell based on wireless links between the plurality of terminal devices, and allocating the virtualized function to the plurality of terminal devices for execution in a distributed manner.

In Example 281, the subject matter of Example 280 can optionally include wherein the virtualized function is configured to distributed execution at resource platforms of multiple terminal devices, or is configured to use result data from a counterpart virtualized function executable on another terminal device.

In Example 281, the subject matter of Example 280 or 281 can optionally include wherein identifying the plurality of terminal devices includes evaluating radio measurements that characterize the wireless links between the plurality of terminal devices, and identifying the plurality of terminal devices based on a strength of the radio measurements.

In Example 283, the subject matter of Example 280 or 281 can optionally include wherein identifying the plurality of terminal devices includes evaluating positions of the plurality of terminal devices, and identifying the plurality of terminal devices based on a relative proximity indicated by their positions.

In Example 284, the subject matter of any one of Examples 280 to 283 can optionally include wherein identifying the plurality of terminal devices includes determining a number of terminal devices that the virtualized function, and selecting a plurality of terminal devices of the virtual cell equal in quantity to the number as the plurality of terminal devices.

In Example 285, the subject matter of any one of Examples 280 to 284 can optionally include wherein allocating the virtualized function to the plurality of terminal devices includes wirelessly transmitting an allocation of the virtualized function to the plurality of terminal devices via a baseband modem of the terminal device.

Example 286 is a method of operating a terminal device, the method including communicating with terminal devices of a virtual cell, executing a master terminal device virtualized function for the virtual cell in cooperation with a resource platform of another terminal device of the virtual cell, identifying a virtualized function that uses resource platforms of multiple terminal devices of the virtual cell, identifying a plurality of terminal devices of the virtual cell based on wireless links between the plurality of terminal devices, and allocating the virtualized function to the plurality of terminal devices for execution in a distributed manner.

Example 287 is a method of operating terminal device, the method including executing a virtualized function manager for a virtual network, identifying a virtualized function that uses resource platforms of multiple terminal devices of the virtual network, identifying a plurality of terminal devices of the virtual network based on wireless links between the plurality of terminal devices, and allocating the virtualized function to the plurality of terminal devices for execution in a distributed manner.

Example 288 is a method of operating a terminal device, the method including communicating with terminal devices of a virtual network, executing a master terminal device virtualized function for the virtual network in cooperation with a resource platform of another terminal device of the virtual network, identifying a virtualized function that uses resource platforms of multiple terminal devices of the virtual network, identifying a plurality of terminal devices of the virtual network based on wireless links between the plurality of terminal devices, and allocating the virtualized function to the plurality of terminal devices for execution in a distributed manner.

Example 289 is a method of operating a terminal device, the method including executing a virtualized function manager for a virtual cell, identifying, for each of a plurality of virtualized functions, one or more terminal devices of the virtual cell, and allocating each of the plurality of virtualized functions to the corresponding one or more terminal devices.

Example 290 is a method of operating a terminal device, the method including exchanging signaling with one or more terminal devices to join a virtual network, receiving an allocation for a virtualized function from a virtualized function manager of the virtual network, and virtually performing the virtualized function in cooperation with a resource platform of another terminal device of the virtual network.

Example 291 is a method of operating a virtual cell, the method including allocating a plurality of virtualized functions between a plurality of terminal devices, performing the respectively allocated virtualized functions at the plurality of terminal devices, and providing radio access to one or more served terminal devices via execution of the virtualized functions.

Example 292 is a non-transitory computer readable medium storing instructions that when executed by a processor causes the processor to perform the method of any one of Examples 261 to 291.

Example 293 is a device including a processor, and a memory storing instructions that when executed by the processor cause the processor to perform the method of any one of Examples 261 to 291.

Example 294 is a terminal device including means for receiving an allocation of a virtualized function from a virtual cell, means for configuring a resource platform of the terminal device for the virtualized function, means for performing the virtualized function with the resource platform to obtain result data, and means for sending the result data to another terminal device of the virtual cell.

Example 295 is a terminal device including means for receiving an allocation of a virtualized function from a virtual cell, means for configuring a resource platform of the terminal device for the virtualized function, and means for performing the virtualized function to provide a cell processing function or a radio activity function for a terminal device served by the virtual cell.

Example 296 is a terminal device including means for receiving an allocation of a virtualized function from a virtual cell, means for configuring a resource platform of the terminal device with for the virtualized function, and means for performing the virtualized function in cooperation with a resource platform of another terminal device of the virtual cell.

Example 297 is a terminal device including means for executing a virtualized function manager for a virtual cell, means for identifying a virtualized function that uses resources platforms of multiple terminal devices of the virtual cell, means for identifying a plurality of terminal devices of the virtual cell based on wireless links between the plurality of terminal devices, and means for allocating the virtualized function to the plurality of terminal devices for execution in a distributed manner.

Example 298 is a terminal device including means for communicating with terminal devices of a virtual cell, means for executing a master terminal device virtualized function for the virtual cell in cooperation with a resource platform of another terminal device of the virtual cell, means for identifying a virtualized function that uses resource platforms of multiple terminal devices of the virtual cell, means for identifying a plurality of terminal devices of the virtual cell based on wireless links between the plurality of terminal devices, and means for allocating the virtualized function to the plurality of terminal devices for execution in a distributed manner.

Example 299 is a terminal device including means for executing a virtualized function manager for a virtual network, means for identifying a virtualized function that uses resource platforms of multiple terminal devices of the virtual network, means for identifying a plurality of terminal devices of the virtual network based on wireless links between the plurality of terminal devices, and means for allocating the virtualized function to the plurality of terminal devices for execution in a distributed manner.

Example 300 is a terminal device including means for communicating with terminal devices of a virtual network, means for executing a master terminal device virtualized function for the virtual network in cooperation with a resource platform of another terminal device of the virtual network, means for identifying a virtualized function that uses resource platforms of multiple terminal devices of the virtual network, means for identifying a plurality of terminal devices of the virtual network based on wireless links between the plurality of terminal devices, and means for allocating the virtualized function to the plurality of terminal devices for execution in a distributed manner.

Example 301 is a terminal device including means for executing a virtualized function manager for a virtual cell, means for identifying, for each of a plurality of virtualized functions, one or more terminal devices of the virtual cell, and means for allocating each of the plurality of virtualized functions to the corresponding one or more terminal devices.

Example 302 is a terminal device including means for exchanging signaling with one or more terminal devices to join a virtual network, means for receiving an allocation for a virtualized function from a virtualized function manager of the virtual network, and means for virtually performing the virtualized function in cooperation with a resource platform of another terminal device of the virtual network.

Example 303 is a communication device including a function controller configured to determine that a triggering condition for creating a virtual cell is met, and to define a geographic region for the virtual cell, and a baseband modem configured to transmit a discovery signal to invite nearby terminal devices to join the virtual cell if the triggering condition is met, the function controller further configured to determine whether to accept one or more responding terminal devices into the virtual cell based on whether the one or more responding terminal devices are in the geographic region.

In Example 304, the subject matter of Example 303 can optionally further include one or more antennas and a radio frequency (RF) transceiver, wherein the baseband modem is configured to wirelessly transmit the discovery signal via the RF transceiver and the one or more antennas.

In Example 305, the subject matter of Example 303 or 304 can optionally include wherein the function controller is configured to determine that the triggering conditions is met by determining that a network load exceeds a threshold, or determining that an area has poor radio access coverage.

In Example 306, the subject matter of any one of Examples 303 to 305 can optionally include wherein the geographic region is a fixed area or a predefined area.

In Example 307, the subject matter of any one of Examples 303 to 305 can optionally include wherein the geographic region is a dynamic area that changes over time.

In Example 308, the subject matter of any one of Examples 303 to 307 can optionally include wherein the baseband modem is further configured to, after transmitting the discovery signal, receive discovery response signals from the one or more responding terminal devices.

In Example 309, the subject matter of Example 308 can optionally include wherein the discovery response signals include a current position of the one or more responding terminal devices, and wherein the function controller is configured to determine whether the one or more responding terminal devices are within the geographic region based on the current positions.

In Example 310, the subject matter of Example 309 can optionally include wherein the function controller is configured to accept into the virtual cell those of the one or more responding terminal devices that provide current positions within the geographic region.

In Example 311, the subject matter of Example 308 can optionally include wherein receipt of the discovery response signals indicates that the one or more responding terminal devices are within the geographic region, and wherein the function controller is configured to accept the one or more responding terminal devices into the virtual cell.

In Example 312, the subject matter of any one of Examples 303 to 311 can optionally include wherein the function controller is further configured to, after the virtual cell is created, allocate one or more virtual cell virtualized functions to the one or more responding terminal devices.

In Example 313, the subject matter of any one of Examples 303 to 311 can optionally include wherein the function controller is configured to receive an allocation of a virtual cell virtualized function from a virtualized function manager of the virtual cell, the communication device further including a resource platform configured to execute the virtual cell virtualized function to provide cell functionality of the virtual cell.

Example 314 is a communication device including a function controller configured to determine a current position of a first terminal device of a virtual cell, and to determine whether the current position of the first terminal device is within a geographic region for the virtual cell, and a baseband modem configured to, if the current position of the first terminal device outside of the geographic region, transmit exit signaling to the first terminal device for the first terminal device to exit the virtual cell.

In Example 315, the subject matter of Example 314 can optionally further include one or more antennas and a radio frequency (RF) transceiver, wherein the baseband modem is configured to wirelessly transmit the exit signaling via the RF transceiver and the one or more antennas.

In Example 316, the subject matter of Example 314 or 315 can optionally include wherein the function controller is configured to re-allocate a virtual cell virtualized function, that was previously allocated to the first terminal device, to a second terminal device of the virtual cell.

In Example 317, the subject matter of any one of Examples 314 to 316 can optionally include wherein the function controller is configured to determine the current position of the first terminal device by receiving a position report from the first terminal device that indicates the current position of the first terminal device.

In Example 318, the subject matter of any one of Examples 314 to 317 can optionally include wherein the function controller is configured to locally store region data that defines boundaries of the geographic region, and to determine whether the first terminal device is in the geographic region by evaluating the region data and the current position.

Example 319 is a communication device including one or more processors configured to determine current positions of a plurality of terminal devices that form a virtual cell, wherein the virtual cell includes a coverage area divided into multiple subareas, select a first terminal device of the plurality of terminal devices to assign to a first subarea of the multiple subareas, and allocate, to the first terminal device, a first virtual cell virtualized function for providing cell functionality to served terminal devices of the virtual cell in the first subarea.

In Example 320, the subject matter of Example 319 can optionally further include one or more antennas, a radio frequency (RF) transceiver, and a baseband modem, wherein the one or more processors are configured to allocate the first virtual cell virtualized function to the first terminal device by wirelessly transmitting signaling to the first terminal device that allocates the first virtual cell virtualized function the first terminal device.

In Example 321, the subject matter of Example 319 or 320 can optionally include wherein the one or more processors are configured to determine the current positions of the plurality of terminal devices by receiving position reports from the plurality of terminal devices that indicate their respective current positions.

In Example 322, the subject matter of any one of Examples 319 to 321 can optionally include wherein the one or more processors are further configured to logically divide the coverage area into the multiple subareas based on the current positions of the plurality of terminal devices.

In Example 323, the subject matter of any one of Examples 319 to 321 can optionally include wherein the one or more processors are configured to select the first terminal device by determining, based on its current position, that the first terminal device is in the first subarea.

In Example 324, the subject matter of any one of Examples 319 to 323 can optionally include wherein the one or more processors are configured to allocate a plurality of virtual cell virtualized functions, including the first virtual cell virtualized function, to the first terminal device that relate to radio activity, lower-layer cell processing, and upper-layer cell processing for served terminal devices in the first subarea.

In Example 325, the subject matter of any one of Examples 319 to 323 can optionally include wherein the first virtual cell virtualized function relates to radio activity or lower-layer cell processing.

In Example 326, the subject matter of any one of Examples 319 to 323 can optionally include wherein the one or more processors are configured to select a second terminal device of the plurality of terminal devices to assign to a second subarea of the multiple subareas, and to allocate, to the second terminal device, a second virtual cell virtualized function for providing cell functionality to served terminal devices of the virtual cell in the second subarea.

In Example 327, the subject matter of any one of Examples 319 to 323 can optionally include wherein the one or more processors are further configured to select a second terminal device of the plurality of terminal devices to assign to the first subarea, and to allocate, to the second terminal device, a second virtual cell virtualized function for providing other cell functionality to served terminal devices of the virtual cell in the first subarea.

In Example 328, the subject matter of Example 327 can optionally include wherein the first virtual cell virtualized function relates to radio activity or lower-layer cell processing, and the second virtual cell virtualized function relates to upper-layer cell processing.

Example 329 is a communication device including a function controller configured to receive an allocation of a virtual cell virtualized function for providing cell functionality to served terminal devices in a first subarea of a virtual cell, and a resource platform configured to execute the virtual cell virtualized function to provide the cell functionality to the served terminal devices in the first subarea.

In Example 330, the subject matter of Example 329 can optionally include wherein a coverage area of the virtual cell is logically divided into a plurality of subareas including the first subarea.

In Example 331, the subject matter of Example 329 or 330 can optionally include wherein the resource platform includes one or more processors for computing functionality, a memory for storage functionality, or wireless communication components for network functionality.

In Example 332, the subject matter of any one of Examples 329 to 331 can optionally include wherein the virtual cell virtualized function includes software that defines radio activity or cell processing for the virtual cell, wherein the resource platform is configured to execute the software.

In Example 333, the subject matter of any one of Examples 329 to 332 can optionally include wherein the virtual cell virtualized function defines radio activity for the virtual cell, and wherein the resource platform is configured to perform transmissions to served terminal devices in the first subarea or to receive transmissions from served terminal devices in the first subarea when executing the virtual cell virtualized function.

In Example 334, the subject matter of any one of Examples 329 to 332 can optionally include wherein the function controller is further configured to receive an allocation of one or more virtual cell virtualized functions and the resource platform is configured to execute the one or more virtual cell virtualized functions to provide other cell functionality to served terminal devices in the first subarea.

In Example 335, the subject matter of Example 334 can optionally include wherein cell functionality of the virtual cell virtualized function and the one or more virtual cell virtualized functions includes radio activity, lower-layer cell processing, and upper-layer cell processing.

In Example 336, the subject matter of any one of Examples 329 to 335 can optionally include wherein one or more processors of the resource platform are configured to determine that a served terminal device has moved from the first subarea to a second subarea to which another communication device of the virtual cell is assigned, and transfer cell functionality for the first terminal device from the communication device to the other communication device.

Example 337 is a communication device including one or more processors configured to identify a plurality of virtual cell virtualized functions including one or more first virtual cell virtualized functions of a first type and one or more second virtual cell virtualized functions of a second type, select, from the plurality of virtual cell virtualized functions, a selected virtual cell virtualized function of the first or second type based on an expected duration of time for a terminal device to remain in a virtual cell, and allocate the selected virtual cell virtualized function to the terminal device.

In Example 338, the subject matter of Example 337 can optionally further include one or more antennas, a radio frequency (RF) transceiver, and a baseband modem, where the one or more processors are configured to allocate the selected virtual cell virtualized function to the terminal device by wirelessly transmitting signaling to the terminal device that allocates the selected virtual cell virtualized function to the terminal device.

In Example 339, the subject matter of Example 337 or 338 can optionally include wherein the one or more processors are configured to receive signaling from the terminal device that indicates the expected duration.

In Example 340, the subject matter of any one of Examples 337 to 339 can optionally include wherein the one or more first virtual cell virtualized functions provide basic functionality of the virtual cell and the one or more second virtual cell virtualized functions provide auxiliary functionality of the virtual cell.

In Example 341, the subject matter of Example 340 can optionally include wherein the one or more processors are weighted towards selecting a selected virtual cell virtualized function of the first type for longer expected durations, and weighted towards selecting a selected virtual cell virtualized function of the second type for shorter expected durations.

Example 342 is a communication device including one or more processors configured to identify a plurality of virtual cell virtualized functions including one or more first virtual cell virtualized functions of a first type and one or more second virtual cell virtualized functions of a second type, select, from the plurality of virtual cell virtualized functions, a selected virtual cell virtualized function of the first or second type based on a duration of time a terminal device has been part of a virtual cell, and allocate the selected virtual cell virtualized function to the terminal device.

In Example 343, the subject matter of Example 342 can optionally include wherein the one or more processors are configured to use a timestamp specifying when the terminal device joined the virtual cell to determine the duration of time that the terminal device has been part of the virtual cell.

In Example 344, the subject matter of Example 342 or 343 can optionally include wherein the one or more processors are configured to rank a plurality of terminal devices, including the terminal device, based on the durations of time that the plurality of terminal devices have been part of the virtual cell, and to allocate the plurality of virtual cell virtualized functions to the plurality of terminal devices based on the ranking.

In Example 345, the subject matter of Example 344 can optionally include wherein the ranking is from highest durations of time to lowest and the one or more first virtual cell virtualized functions provide basic functionality of the virtual cell and the one or more second virtual cell virtualized functions provide auxiliary functionality of the virtual cell, and wherein the one or more processors are configured to allocate the one or more first virtualized functions to higher-ranked terminal devices in the ranking and to allocate the one or more second virtualized functions to lower-ranked terminal devices in the ranking.

Example 346 is a method of operating a communication device, the method including determining that a triggering condition for creating a virtual cell is met, defining a geographic region for the virtual cell, transmitting a discovery signal to invite nearby terminal devices to join the virtual cell if the triggering condition is met, and determining whether to accept one or more responding terminal devices into the virtual cell based on whether the one or more responding terminal devices are in the geographic region.

In Example 347, the subject matter of Example 346 can optionally include wherein transmitting the discovery signal includes wirelessly transmitting the discovery signal via an RF transceiver and one or more antennas.

In Example 348, the subject matter of Example 346 or 347 can optionally include wherein determining that the triggering condition is met includes determining that a network load is above a threshold, or determining that a radio coverage level is below a threshold.

In Example 349, the subject matter of any one of Examples 346 to 348 can optionally include wherein the geographic region is a fixed area or a predefined area.

In Example 350, the subject matter of any one of Examples 346 to 348 can optionally include wherein the geographic region is a dynamic area that changes over time.

In Example 351, the subject matter of any one of Examples 346 to 350 can optionally further include after transmitting the discovery signal, receiving discovery response signals from the one or more responding terminal devices.

In Example 352, the subject matter of Example 351 can optionally include wherein the discovery response signals include a current position of the one or more responding terminal devices, and wherein determining whether the one or more responding terminal devices are within the geographic region includes determining whether the one or more responding terminal devices are within the geographic region based on the current positions.

In Example 353, the subject matter of Example 352 can optionally further include accepting into the virtual cell those of the one or more responding terminal devices that provide current positions within the geographic region.

In Example 354, the subject matter of Example 351 can optionally include wherein receipt of the discovery response signals indicates that the one or more responding terminal devices are within the geographic region, the method further including accepting the one or more responding terminal devices into the virtual cell.

In Example 355, the subject matter of any one of Examples 346 to 354 can optionally further include after the virtual cell is created, allocating one or more virtual cell virtualized functions to the one or more responding terminal devices.

In Example 356, the subject matter of any one of Examples 346 to 354 can optionally further include receiving an allocation of a virtual cell virtualized function from a master terminal device of the virtual cell, and executing the virtual cell virtualized function to provide cell functionality to one or more served terminal devices of the virtual cell.

Example 357 is a method of operating a communication device, the method including determining a current position of a first terminal device of a virtual cell, determining whether the current position of the first terminal device is within a geographic region for the virtual cell, and after determining that the current position of the first terminal device is outside of the geographic region, transmitting exit signaling to the first terminal device for the first terminal device to exit the virtual cell.

In Example 358, the subject matter of Example 357 can optionally include wherein transmitting the exit signaling to the first terminal device includes wirelessly transmitting the exit signaling via a radio frequency (RF) transceiver and one or more antennas of the communication device.

In Example 359, the subject matter of Example 357 or 358 can optionally further include after transmitting the exit signaling, re-allocating a virtual cell virtualized function to a second terminal device of the virtual cell, where the virtual cell virtualized function was previously allocated to the first terminal device.

In Example 360, the subject matter of any one of Examples 357 to 359 can optionally include wherein determining the current position of the first terminal device includes receiving a position report from the first terminal device that indicates the current position of the first terminal device.

In Example 361, the subject matter of any one of Examples 357 to 360 can optionally include wherein determining whether the first terminal device is outside of the geographic region includes evaluating stored region data defining boundaries of the geographic area and the current position to determine whether the current position is within the boundaries of the geographic area.

Example 362 is a method of operating a communication device, the method including determining current positions of a plurality of terminal devices that form a virtual cell, wherein the virtual cell includes a coverage area divided into multiple subareas, selecting a first terminal device of the plurality of terminal devices to assign to a first subarea of the multiple subareas, and allocating, to the first terminal device, a first virtual cell virtualized function for providing cell functionality to served terminal devices of the virtual cell in the first subarea.

In Example 363, the subject matter of Example 362 can optionally include wherein allocating the first virtual cell virtualized function to the first terminal device includes wirelessly transmitting signaling to the first terminal device that allocates the first virtual cell virtualized function to the first terminal device.

In Example 364, the subject matter of Example 362 or 363 can optionally include wherein determining the current positions of the plurality of terminal devices includes receiving position reports from the plurality of terminal devices that indicate their respective current positions.

In Example 365, the subject matter of any one of Examples 362 to 364 can optionally further include logically dividing the coverage area into the multiple subareas based on the current positions of the plurality of terminal devices.

In Example 366, the subject matter of any one of Examples 362 to 364 can optionally include wherein selecting the first terminal device includes determining, based on the current position of the first terminal device, that the first terminal device is in the first subarea.

In Example 367, the subject matter of any one of Examples 362 to 366 can optionally further include allocating a plurality of virtual cell virtualized functions, including the first virtual cell virtualized function, to the first terminal device that relate to radio activity, lower-layer cell processing, and upper-layer cell processing for served terminal devices in the first subarea.

In Example 368, the subject matter of any one of Examples 362 to 366 can optionally include wherein the first virtual cell virtualized function relates to radio activity or lower-layer cell processing.

In Example 369, the subject matter of any one of Examples 362 to 366 can optionally further include selecting a second terminal device of the plurality of terminal devices to assign to a second subarea of the multiple subareas, and allocating, to the second terminal device, a second virtual cell virtualized function for providing cell functionality to served terminal devices of the virtual cell in the second subarea.

In Example 370, the subject matter of any one of Examples 362 to 366 can optionally further include selecting a second terminal device of the plurality of terminal devices to assign to the first subarea, and allocating, to the second terminal device, a second virtual cell virtualized function for providing other cell functionality to served terminal devices of the virtual cell in the first subarea.

In Example 371, the subject matter of Example 370 can optionally include wherein the first virtual cell virtualized function relates to radio activity or lower-layer cell processing, and the second virtual cell virtualized function relates to upper-layer cell processing.

Example 372 is a method of operating a communication device, the method including receiving an allocation of a virtual cell virtualized function for providing cell functionality to served terminal devices in a first subarea of a virtual cell, and executing the virtual cell virtualized function to provide the cell functionality to the served terminal devices in the first subarea.

In Example 373, the subject matter of Example 372 can optionally include wherein a coverage area of the virtual cell is logically divided into a plurality of subareas including the first subarea.

In Example 374, the subject matter of Example 372 or 373 can optionally include wherein executing the virtual cell virtualized function to provide the cell functionality includes executing the virtual cell virtualized function on a resource platform including one or more processors for computing functionality, a memory for storage functionality, or wireless communication components for network functionality.

In Example 375, the subject matter of any one of Examples 372 to 374 can optionally include wherein the virtual cell virtualized function includes software that defines radio activity or cell processing for the virtual cell, and wherein executing the virtual cell virtualized function includes performing the radio activity or cell processing for the virtual cell.

In Example 376, the subject matter of any one of Examples 372 to 375 can optionally include wherein the virtual cell virtualized function defines radio activity for the virtual cell, and wherein executing the virtual cell virtualized function includes performing transmission to served terminal devices in the first subarea or receiving transmission from served terminal devices in the first subarea.

In Example 377, the subject matter of any one of Examples 372 to 375 can optionally further include receiving an allocation of one or more virtual cell virtualized functions, and executing the one or more virtual cell virtualized functions to provide other cell functionality to served terminal devices in the first subarea.

In Example 378, the subject matter of Example 377 can optionally include wherein the cell functionality of the virtual cell virtualized function and the one or more virtual cell virtualized functions includes radio activity, lower-layer cell processing, and upper-layer cell processing for served terminal devices in the first subarea.

In Example 379, the subject matter of any one of Examples 372 to 377 can optionally further include determining that a served terminal device has moved from the first subarea to a second subarea to which another communication device of the virtual cell is assigned, and transferring cell functionality for the first terminal device from the communication device to the other communication device.

Example 380 is a method of operating a communication device, the method including identifying a plurality of virtual cell virtualized functions including one or more first virtual cell virtualized functions of a first type and one or more second virtual cell virtualized functions of a second type, selecting, from the plurality of virtual cell virtualized functions, a selected virtual cell virtualized function of the first or second type based on an expected duration of time for a terminal device to remain in a virtual cell, and allocating the selected virtual cell virtualized function to the terminal device.

In Example 381, the subject matter of Example 380 can optionally include wherein allocating the selected virtual cell virtualized function to the terminal device includes wirelessly transmitting signaling to the terminal device via one or more antennas, a radio frequency (RF) transceiver, and a baseband modem of the communication device.

In Example 382, the subject matter of Example 380 or 381 can optionally further include receiving signaling from the terminal device that indicates the expected duration.

In Example 383, the subject matter of any one of Examples 380 to 382 can optionally include wherein the one or more first virtual cell virtualized functions provide basic functionality of the virtual cell and the one or more second virtual cell virtualized functions provide auxiliary functionality of the virtual cell.

In Example 384, the subject matter of Example 383 can optionally include wherein selecting the selected virtual cell virtualized function is weighted towards selecting a selected virtual cell virtualized function of the first type for longer expected durations, and weighted towards selecting a selected virtual cell virtualized function of the second type for shorter expected durations.

Example 385 is a method of operating a communication device, the method including identifying a plurality of virtual cell virtualized functions including one or more first virtual cell virtualized functions of a first type and one or more second virtual cell virtualized functions of a second type, selecting, from the plurality of virtual cell virtualized functions, a selected virtual cell virtualized function of the first or second type based on a duration of time a terminal device has been part of a virtual cell, and allocating the selected virtual cell virtualized function to the terminal device.

In Example 386, the subject matter of Example 385 can optionally further include determining the duration of time that the terminal device has been part of the cell using a timestamp specifying when the terminal device joined the virtual cell.

In Example 387, the subject matter of Example 385 or 386 can optionally further include ranking a plurality of terminal devices, including the terminal device, based on the durations of time that the plurality of terminal devices have been part of the virtual cell, and allocating the plurality of virtual cell virtualized functions to the plurality of terminal devices based on the ranking.

In Example 388, the subject matter of Example 387 can optionally include wherein the ranking is from highest durations of time to lowest and the one or more first virtual cell virtualized functions provide basic functionality of the virtual cell and the one or more second virtual cell virtualized functions provide auxiliary functionality of the virtual cell, the method further including allocating the one or more first virtualized functions to higher-ranked terminal devices in the ranking and allocating the one or more second virtualized functions to lower-ranked terminal devices in the ranking.

Example 389 is a non-transitory computer readable medium storing instructions that when executed by one or more processors cause the one or more processors to perform the method of any one of Examples 346 to 388.

Example 390 is a device including one or more processors, and a memory including instructions that when executed by the one or more processors cause the one or more processors to perform the method of any one of Examples 346 to 388.

Example 391 is a communication device including means for determining that a triggering condition for creating a virtual cell is met, and to define a geographic region for the virtual cell, means for transmitting a discovery signal to invite nearby terminal devices to join the virtual cell if the triggering condition being met, and means for determining whether to accept one or more responding terminal devices into the virtual cell based on whether the one or more responding terminal devices are in the geographic region.

Example 392 is a communication device including means for determining a current position of a first terminal device of a virtual cell, means for determining whether the current position of the first terminal device is within a geographic region for the virtual cell, and means for transmitting exit signaling to the first terminal device for the first terminal device to exit the virtual cell if the current position of the first terminal device outside of the geographic region.

Example 393 is a communication device including means for determining current positions of a plurality of terminal devices that form a virtual cell, wherein the virtual cell includes a coverage area divided into multiple subareas, means for selecting a first terminal device of the plurality of terminal devices to assign to a first subarea of the multiple subareas, and means for allocating, to the first terminal device, a first virtual cell virtualized function for providing cell functionality to served terminal devices of the virtual cell in the first subarea.

Example 394 is a communication device including means for receiving an allocation of a virtual cell virtualized function for providing cell functionality to served terminal devices in a first subarea of a virtual cell, and means for executing the virtual cell virtualized function to provide the cell functionality to the served terminal devices in the first subarea.

Example 395 is a communication device including means for identifying a plurality of virtual cell virtualized functions including one or more first virtual cell virtualized functions of a first type and one or more second virtual cell virtualized functions of a second type, means for selecting, from the plurality of virtual cell virtualized functions, a selected virtual cell virtualized function of the first or second type based on an expected duration of time for a terminal device to remain in a virtual cell, and means for allocating the selected virtual cell virtualized function to the terminal device.

Example 396 is a communication device including means for identifying a plurality of virtual cell virtualized functions including one or more first virtual cell virtualized functions of a first type and one or more second virtual cell virtualized functions of a second type, means for selecting, from the plurality of virtual cell virtualized functions, a selected virtual cell virtualized function of the first or second type based on a duration of time a terminal device has been part of a virtual cell, and means for allocating the selected virtual cell virtualized function to the terminal device.

Example 397 is a method for performing processing at a local server, the method including receiving signaling from a cloud server that specifies a processing function assigned for processing offload by the local server, receiving, from a traffic filter, target data that originates from a local network, applying the processing function to the target data to obtain processed data, and sending the processed data to the cloud server for cloud processing.

In Example 398, the subject matter of Example 397 can optionally include wherein the signaling includes software for the processing function, the method further including loading the software into a processing platform for execution.

In Example 399, the subject matter of Example 397 can optionally include wherein the signaling includes an identifier that identifies the processing function from a plurality of processing functions, the method further including retrieving software for the processing function from a memory and loading the software into a processing platform for execution.

In Example 400, the subject matter of any one of Examples 397 to 399 can optionally further include receiving further processed data from the cloud server, and applying an additional processing function on the further processed data.

In Example 401, the subject matter of Example 400 can optionally include wherein the processing function, the cloud processing, and the additional processing function each constitute part of an overall scheduled processing for the target data.

In Example 402, the subject matter of any one of Examples 397 to 401 can optionally further include receiving an updated processing function from the cloud server, receiving additional target data from the traffic filter, applying the updated processing function to the additional target data to obtain additional processed data, and sending the processed data to the cloud server for additional cloud processing.

In Example 403, the subject matter of any one of Examples 397 to 402 can optionally include wherein the target data is filtered raw data originating from the local network.

In Example 404, the subject matter of any one of Examples 397 to 403 can optionally include wherein the target data is filtered raw data generated by one or more terminal devices from the local network.

In Example 405, the subject matter of any one of Examples 397 to 404 can optionally include wherein the target data is sensing data or operational data generated by one or more terminal devices from the local network.

In Example 406, the subject matter of any one of Examples 397 to 405 can optionally include wherein the processing function includes part of an overall scheduled processing for the target data, and wherein the cloud processing includes a remaining part of the overall scheduled processing for the target data.

In Example 407, the subject matter of Example 406 can optionally include wherein the cloud processing is the remainder of the overall scheduled processing for the target data.

In Example 408, the subject matter of any one of Examples 397 to 407 can optionally further include sending the processed data to the local network.

Example 409 is a method for performing processing functions at a local server, the method including selecting a processing function for processing offload, receiving, from a traffic filter, target data that originates from a local network, applying the processing function to the target data to obtain processed data, and sending the processed data to the cloud server for cloud processing.

In Example 410, the subject matter of Example 409 can optionally further include selecting a filter template that identifies the target data, and sending the filter template to the traffic filter.

In Example 411, the subject matter of Example 410 can optionally include wherein the target data is raw data that matches the filter template.

In Example 412, the subject matter of Example 410 or 411 can optionally include wherein selecting the filter template includes selecting one or more parameters that define the target data.

In Example 413, the subject matter of any one of Examples 409 to 412 can optionally further include selecting an updated processing function based on one or more dynamic parameters of the processing offload, applying the updated processing function to additional target data to obtain additional processed data, and sending the additional processed data to the cloud server for cloud processing.

In Example 414, the subject matter of Example 413 can optionally further include selecting an updated filter template based on the one or more dynamic parameters, sending the updated filter template to the traffic filter, wherein the additional target data matches the filter template.

The method of any one of Examples 409 to 414, further including sending the processed data to the local network.

In Example 416, the subject matter of any one of Examples 409 to 415 can optionally include wherein selecting the processing function includes selecting the processing function from a plurality of preinstalled processing functions stored on a processing function memory, the method further including to loading software for the processing function from the processing function memory into the one or more processors.

Example 417 is a method for performing processing functions at a local server, the method including receiving signaling from a cloud server that specifies a processing function assigned for processing offload by the local server, receiving, from a traffic filter, target data that originates from a local network, applying the processing function to the target data to obtain processed data, and sending the processed data to the local network.

Example 418 is a method for performing processing functions at a local server, the method including selecting a processing function for processing offload, receiving, from a traffic filter, target data that originates from a local network, applying the processing function to the target data to obtain processed data, and sending the processed data to the local network.

Example 419 is a local server including a controller configured to receive signaling from a cloud server that specifies a processing function assigned for processing offload by the local server, and to receive target data from a traffic filter that originates from a local network, a processing platform including one or more processors and configured to apply the processing function to the target data to obtain processed data, the controller configured to send the processed data to the cloud server for cloud processing.

In Example 420, the subject matter of Example 419 can optionally include wherein the signaling includes software for the processing function, the processing platform configured to load the software into the one or more processors.

In Example 421, the subject matter of Example 419 can optionally further include a processing function memory configured to store a plurality of preinstalled processing functions, wherein the signaling includes an identifier that identifies the processing function from the plurality of preinstalled processing functions and the processing platform is configured to load the software from the processing function memory into the one or more processors.

In Example 422, the subject matter of any one of Examples 419 to 421 can optionally include wherein the controller is configured to receive further processed data from the cloud server, and wherein the processing platform is configured to apply an additional processing function on the further processed data.

In Example 423, the subject matter of Example 422 can optionally include wherein the processing function, the cloud processing, and the additional processing function each constitute part of an overall scheduled processing for the target data.

In Example 424, the subject matter of any one of Examples 419 to 423 can optionally include wherein the controller is further configured to receive an updated processing function from the cloud server and to receive additional target data from the traffic filter, wherein the processing platform is further configured to apply the updated processing function to the additional target data to obtain additional processed data, and wherein the controller is further configured to send the processed data to the cloud server for additional cloud processing.

In Example 425, the subject matter of any one of Examples 419 to 424 can optionally include wherein the target data is filtered raw data originating from the local network.

In Example 426, the subject matter of any one of Examples 419 to 425 can optionally include wherein the target data is sensing data or operational data originating at one or more terminal devices from the local network.

In Example 427, the subject matter of any one of Examples 419 to 426 can optionally include wherein the processing function includes part of an overall scheduled processing for the target data, and wherein the cloud processing includes a remaining part of the overall scheduled processing for the target data.

In Example 428, the subject matter of Example 427 can optionally include wherein the cloud processing is the remainder of the overall scheduled processing for the target data.

In Example 429, the subject matter of any one of Examples 419 to 428 can optionally include wherein the controller is further configured to send the processed data to the local network.

Example 430 is a local server including a controller configured to select a processing function for processing offload, and to receive, from a traffic filter, target data that originates from a local network, and a processing platform including one or more processors and configured to apply the processing function to the target data to obtain processed data, the controller further configured to send the processed data to the cloud server for cloud processing.

In Example 431, the subject matter of Example 430 can optionally include wherein the controller is further configured to select a filter template that identifies the target data, and to send the filter template to the traffic filter.

In Example 432, the subject matter of Example 431 can optionally include wherein the target data is raw data that matches the filter template.

In Example 433, the subject matter of Example 431 or 432 can optionally include wherein the controller is configured to select the filter template by selecting one or more parameters that define the target data.

In Example 434, the subject matter of any one of Examples 430 to 433 can optionally include wherein the controller is further configured to select an updated processing function based on one or more dynamic parameters of the processing offload, wherein the processing platform is further configured to apply the updated processing function to additional target data to obtain additional processed data, and wherein the controller is further configured to send the additional processed data to the cloud server for cloud processing.

In Example 435, the subject matter of any one of Examples the controller is can optionally be configured to select an updated filter template based on the one or more dynamic parameters, and to send the updated filter template to the traffic filter, wherein the additional target data matches the filter template.

In Example 436, the subject matter of any one of Examples 430 to 435 can optionally include wherein the controller is further configured to send the processed data to the local network.

In Example 437, the subject matter of any one of Examples 430 to 436 can optionally include wherein the controller is configured to select the processing function from a plurality of preinstalled processing functions stored on a processing function memory, and wherein the processing platform is configured to load software for the processing function from the processing function memory into the one or more processors.

Example 438 is a local server including a controller configured to receive signaling from a cloud server that specifies a processing function assigned for processing offload by the local server, and to receive, from a traffic filter, target data that originates from a local network, and a processing platform including one or more processors and configured to apply the processing function to the target data to obtain processed data, the controller further configured to send the processed data to the local network.

Example 439 is a local server including a controller configured to select a processing function for processing offload, and to receive, from a traffic filter, target data that originates from a local network, and a processing platform including one or more processors and configured to apply the processing function to the target data to obtain processed data, the controller further configured to send the processed data to the local network.

Example 440 is a device including a template memory configured to store a filter template that defines one or more parameters of target data, a traffic filter configured to apply the filter template to raw data originating from a local network, to identify target data from the raw data based on the one or more parameters, and to route the target data to a local server for processing offload.

In Example 441, the subject matter of Example 440 can optionally further include an antenna, a radio transceiver, and a baseband system, and configured as a network access node of the local network.

In Example 442, the subject matter of Example 441 can optionally include wherein the network access node is a small cell.

In Example 443, the subject matter of Example 440 can optionally further include a router and configured as a server.

In Example 444, the subject matter of Example 440 can optionally further include an antenna, a radio transceiver, and a baseband modem, and configured as a terminal device.

In Example 445, the subject matter of Example 440 can optionally be configured as an integrated circuitry component for a terminal device, a network access node, or a server.

In Example 446, the subject matter of any one of Examples 440 to 445 can optionally include wherein the raw data is user plane data originating from one or more terminal devices of the local network.

In Example 447, the subject matter of any one of Examples 441 to 446 can optionally include wherein the raw data is sensing or operational data generated by one or more terminal devices of the local network.

In Example 448, the subject matter of any one of Examples 440 to 447 can optionally include wherein the traffic filter is configured to receive signaling from a server that specifies the filter template.

In Example 449, the subject matter of Example 448 can optionally include wherein the signaling includes the one or more parameters of the filter template and the template memory is configured to store the one or more parameters of the filter template.

In Example 450, the subject matter of Example 448 can optionally include wherein the signaling identifies the filter template from a plurality of filter templates stored in the template memory In Example 451, the subject matter of any one of Examples 448 to 450 can optionally include wherein the server is the local server or a cloud server.

In Example 452, the subject matter of any one of Examples 440 to 451 can optionally include wherein the traffic filter is configured to apply the filter template to the raw data and identify the target data from the raw data by performing packet inspection on packets of the raw data to identify one or more characteristics of the packets, and determining whether the one or more characteristics of the packets match the one or more parameters of the filter template, and classifying packets having one or more characteristics that match the one or more parameters as target data.

In Example 453, the subject matter of any one of Examples 440 to 452 can optionally include wherein the one or more parameters of the filter template identify a specific type of raw data, identify a specific geographic area, or identify specific devices from which the raw data originates.

In Example 454, the subject matter of any one of Examples 440 to 453 can optionally include wherein the traffic filter is further configured to identify the target data and other data from the raw data, and to route the other data to a cloud server.

In Example 455, the subject matter of any one of Examples 440 to 454 can optionally include wherein the template memory is configured to receive and store an updated filter template that defines one or more updated parameters of target data, and wherein the traffic filter is configured to apply the updated filter template to additional raw data originating from the local network, to identify additional target data from the raw data based on the one or more updated parameters, and to route the additional target data to the local server for processing offload.

Example 456 is a method for filtering and routing data, the method including receiving signaling that specifies a filter template defining one or more parameters of target data, applying the filter template to raw data originating from a local network, identifying target data from the raw data based on the one or more parameters, and routing the target data to a local server for processing offload.

In Example 457, the subject matter of Example 456 can optionally include wherein the raw data is user plane data originating from one or more terminal devices of the local network.

In Example 458, the subject matter of Example 456 or 457 can optionally include wherein the raw data is sensing or operational data generated by one or more terminal devices of the local network.

In Example 459, the subject matter of any one of Examples 456 to 458 can optionally include wherein receiving the signaling includes receiving the signaling from a local server or a cloud server.

In Example 460, the subject matter of any one of Examples 456 to 459 can optionally include wherein the signaling includes the one or more parameters of the filter template, the method further including storing the one or more parameters of the filter template in a template memory.

In Example 461, the subject matter of any one of Examples 456 to 459 can optionally include wherein the signaling identifies the filter template from a plurality of filter templates stored in the template memory.

In Example 462, the subject matter of any one of Examples 456 to 461 can optionally include wherein applying the filter template to the raw data and identifying the target data includes performing packet inspection on packets of the raw data to identify one or more characteristics of the packets, determining whether the one or more characteristics of the packets match the one or more parameters of the filter template, and classifying packets having one or more characteristics that match the one or more parameters as target data.

In Example 463, the subject matter of any one of Examples 456 to 462 can optionally include wherein the one or more parameters of the filter template identify a specific type of raw data, identify a specific geographic area, or identify specific devices from which the raw data originates.

In Example 464, the subject matter of any one of Examples 456 to 463 can optionally further include identifying other data from the raw data, and routing the other data to a cloud server.

In Example 465, the subject matter of any one of Examples 456 to 464 can optionally further include receiving signaling that specifies an updated filter template defining one or more updated parameters of target data, applying the update filter template to additional raw data originating from the local network, identifying additional target data from the raw data based on the one or more updated parameters, and routing the additional target data to the local server for processing offload.

Example 466 is a method for execution at a cloud server, the method including selecting a first processing function for processing offload by a local server, and selecting a first filter template that defines target data for the first processing function, sending signaling to the local server that specifies the first processing function, and sending signaling to a traffic filter that specifies the first filter template, selecting an updated processing function or an updated filter template based on one or more dynamic parameters of the processing offload, and sending signaling to the local server that specifies the updated processing function or sending signaling to the traffic filter that specifies the updated filter template.

In Example 467, the subject matter of Example 466 can optionally further include monitoring a processing load of the local server, wherein selecting the updated processing function includes selecting the updated processing function based on the processing load.

In Example 468, the subject matter of Example 467 can optionally include wherein selecting the updated processing function based on the processing load includes determining whether the processing load is above a predefined threshold, and selecting the updated processing function to have a lower processing load than the first processing function if the processing load is above the threshold.

In Example 469, the subject matter of Example 466 can optionally further include monitoring a processing load of the cloud server, wherein selecting the updated processing function includes selecting the updated processing function based on the processing load.

In Example 470, the subject matter of Example 469 can optionally include wherein selecting the updated processing function based on the processing load includes determining whether the processing load is above a predefined threshold, and selecting the updated processing function to have a higher processing load than the first processing function if the processing load is above the threshold.

In Example 471, the subject matter of any one of Examples 466 to 470 can optionally include wherein selecting the updated processing function includes selecting an updated processing function based on a cost of transmitting data over a backhaul link, an amount of data being generated at a local network that includes the local server, or a power consumption of the local server.

In Example 472, the subject matter of any one of Examples 466 to 471 can optionally include wherein sending the signaling to the local server that specifies the first processing function includes sending signaling including software for the first processing function to the local server.

In Example 473, the subject matter of any one of Examples 466 to 471 can optionally include wherein sending the signaling to the local server that specifies the first processing function includes sending signaling including an identifier that identifies the first processing function from a plurality of processing functions.

In Example 474, the subject matter of any one of Examples 466 to 473 can optionally include wherein sending the signaling to the traffic filter that specifies the first template includes sending signaling including one or more parameters of the filter template to the traffic filter.

In Example 475, the subject matter of any one of Examples 466 to 473 can optionally include wherein sending the signaling to the traffic filter that specifies the first template includes sending signaling including an identifier that identifies the filter template from a plurality of filter templates.

In Example 476, the subject matter of any one of Examples 466 to 475 can optionally include wherein the first filter template defines one or more parameters of target data that can filter target data from other data.

In Example 477, the subject matter of any one of Examples 466 to 476 can optionally further include receiving processed data from the local server that includes target data processed according to the first processing function, the method further including performing cloud processing on the processed data to obtain output data.

In Example 478, the subject matter of Example 477 can optionally further include sending the output data to a local network that includes the local server.

In Example 479, the subject matter of Example 477 or 478 can optionally further include receiving other data that is not target data as defined by the filter template from the traffic filter.

Example 480 is a cloud server including a controller configured to select a first processing function for processing offload by a local server and select a first filter template that defines target data for the first processing function, send signaling to the local server that specifies the first processing function and send signaling to a traffic filter that specifies the first filter template, select an updated processing function or an updated filter template based on one or more dynamic parameters of the processing offload, and send signaling to the local server that specifies the updated processing function or send signaling to the traffic filter that specifies the updated filter template.

In Example 481, the subject matter of Example 480 can optionally include wherein the controller is further configured to monitor a processing load of the local server, and configured to select the updated processing function by selecting the updated processing function based on the processing load.

In Example 482, the subject matter of Example 481 can optionally include wherein the controller is configured to select the updated processing function based on the processing load by determining whether the processing load is above a predefined threshold, and selecting the updated processing function to have a lower processing load than the first processing function if the processing load is above the threshold.

In Example 483, the subject matter of Example 480 can optionally include wherein the controller is further configured to monitor a processing load of the cloud server, and is configured to select the updated processing function by selecting the updated processing function based on the processing load.

In Example 484, the subject matter of Example 483 can optionally include wherein the controller is configured to select the updated processing function based on the processing load by determining whether the processing load is above a predefined threshold, and selecting the updated processing function to have a higher processing load than the first processing function if the processing load is above the threshold.

In Example 485, the subject matter of any one of Examples 480 to 484 can optionally include wherein the controller is configured to select the updated processing function by selecting an updated processing function based on a cost of transmitting data over a backhaul link, an amount of data being generated at a local network that includes the local server, or a power consumption of the local server.

In Example 486, the subject matter of any one of Examples 480 to 485 can optionally include wherein the controller is configured to send the signaling to the local server that specifies the first processing function by sending signaling including software for the first processing function to the local server.

In Example 487, the subject matter of any one of Examples 480 to 485 can optionally include wherein the controller is configured to send the signaling to the local server that specifies the first processing function by sending signaling including an identifier that identifies the first processing function from a plurality of processing functions.

In Example 488, the subject matter of any one of Examples 480 to 487 can optionally include wherein the controller is configured to send the signaling to the traffic filter that specifies the first template by sending signaling including one or more parameters of the filter template to the traffic filter.

In Example 489, the subject matter of any one of Examples 480 to 487 can optionally include wherein the controller is configured to send the signaling to the traffic filter that specifies the first template by sending signaling including an identifier that identifies the filter template from a plurality of filter templates.

In Example 490, the subject matter of any one of Examples 480 to 489 can optionally include wherein the first filter template defines one or more parameters of target data that can filter target data from other data.

In Example 491, the subject matter of any one of Examples 480 to 490 can optionally include wherein the controller is further configured to receive processed data from the local server that includes target data processed according to the first processing function, the cloud server further including a processing platform including one or more processors and configured to perform cloud processing on the processed data to obtain output data.

In Example 492, the subject matter of Example 491 can optionally include wherein the controller is further configured to send the output data to a local network that includes the local server.

In Example 493, the subject matter of Example 491 or 492 can optionally include wherein the controller is further configured to receive other data that is not target data as defined by the filter template from the traffic filter.

Example 494 is a method for execution at a cloud server, the method including selecting a processing function for processing offload by a local server, and selecting a filter template that defines target data for the processing function, sending signaling to the local server that specifies the processing function, and sending signaling to a traffic filter that specifies the filter template, and receiving processed data from a local server that is based on the filter template and the processing function.

Example 495 is a cloud server including a controller configured to select a processing function for processing offload by a local server, and select a filter template that defines target data for the processing function, send signaling to the local server that specifies the processing function, and send signaling to a traffic filter that specifies the filter template, and receive processed data from a local server that is based on the filter template and the processing function.

Example 496 is a non-transitory computer readable medium storing instructions that when executed by one or more processors cause the one or more processors to perform the method of any one of Examples 397 to 418, 456 to 479, or 494.

Example 497 is a device including one or more processors, and a memory storing instructions that when executed by the one or more processors cause the one or more processors to perform the method of any one of Examples 397 to 418, 456 to 479, or 494.

Example 498 is a device including means for receiving signaling from a cloud server that specifies a processing function assigned for processing offload by the local server, means for receiving, from a traffic filter, target data that originates from a local network, means for applying the processing function to the target data to obtain processed data, and means for sending the processed data to the cloud server for cloud processing.

Example 499 is a local server including means for selecting a processing function for processing offload, means for receiving, from a traffic filter, target data that originates from a local network, means for applying the processing function to the target data to obtain processed data, and means for sending the processed data to the cloud server for cloud processing.

Example 500 is a local server including means for receiving signaling from a cloud server that specifies a processing function assigned for processing offload by the local server, means for receiving, from a traffic filter, target data that originates from a local network, means for applying the processing function to the target data to obtain processed data, and means for sending the processed data to the local network.

Example 501 is a local server including means for selecting a processing function for processing offload, means for receiving, from a traffic filter, target data that originates from a local network, means for applying the processing function to the target data to obtain processed data, and means for sending the processed data to the local network.

Example 502 is a communication device including means for receiving signaling that specifies a filter template defining one or more parameters of target data, means for applying the filter template to raw data originating from a local network, means for identifying target data from the raw data based on the one or more parameters, and means for routing the target data to a local server for processing offload.

Example 503 is a cloud server including means for selecting a first processing function for processing offload by a local server, and means for selecting a first filter template that defines target data for the first processing function, means for sending signaling to the local server that specifies the first processing function, and means for sending signaling to a traffic filter that specifies the first filter template, means for selecting an updated processing function or an updated filter template based on one or more dynamic parameters of the processing offload, and means for sending signaling to the local server that specifies the updated processing function or sending signaling to the traffic filter that specifies the updated filter template.

Example 504 is a cloud server including means for selecting a processing function for processing offload by a local server, and selecting a filter template that defines target data for the processing function, means for sending signaling to the local server that specifies the processing function, and sending signaling to a traffic filter that specifies the filter template, and means for receiving processed data from a local server that is based on the filter template and the processing function.

Example 505 is a communication device including a biased received power determiner configured to determine biased received powers for a plurality of network access nodes based on respective bias values for the plurality of network access nodes, a comparator configured to identify a maximum biased received power from the biased received powers, and to identify a corresponding network access node of the plurality of network access nodes having the maximum biased received power, and a selection controller configured to select the network access node as a target network access node for the terminal device to associate with.

In Example 506, the subject matter of Example 505 can optionally include wherein the respective bias values are based on a capability of the plurality of network access nodes to support a terminal device application of the terminal device.

In Example 507, the subject matter of Example 505 can optionally further include a distance determiner configured to determine a distance between the terminal device and each of the plurality of network access nodes.

In Example 508, the subject matter of Example 507 can optionally include wherein the biased received power determiner is configured to determine the biased received power for a first network access node of the plurality of network access nodes based on the distance between the terminal device and the first network access node.

In Example 509, the subject matter of Example 505 can optionally further include a distance determiner configured to determine a distance between the terminal device and each of a plurality of candidate network access nodes, wherein the plurality of candidate network access nodes include candidate network access nodes of a first tier and candidate network access nodes of a second tier, identify a benchmark network access node from the plurality of candidate network access nodes for each of the multiple tiers having a minimum distance to the terminal device, and provide the benchmark network access nodes to the biased received power determiner as the plurality of network access nodes.

In Example 510, the subject matter of Example 509 can optionally include wherein each of the multiple tiers is assigned a respective one of the bias values.

In Example 511, the subject matter of any one of Examples 505 to 508 can optionally include wherein the biased received power determiner is configured to determine the biased received power for a first network access node of the plurality of network access nodes based on a distance between the first network access node and the terminal device, and the respective bias value for the first network access node.

In Example 512, the subject matter of Example 511 can optionally include wherein the biased received power determiner is configured to determine the biased received power for the first network access node by estimating a received power based on the distance, and biasing the received power with the respective bias value for the first network access node.

In Example 513, the subject matter of any one of Examples 505 to 512 can optionally include wherein the comparator is configured to identify the maximum biased received power by comparing the biased received powers to identify a biased received power with a highest value.

In Example 514, the subject matter of any one of Examples 505 to 513 can optionally include wherein the target network access node is a downlink network access node for the terminal device to associate with, and wherein the biased received power determiner is further configured to determine uplink biased received powers for the plurality of network access nodes based on respective uplink bias values for the plurality of network access nodes, wherein the comparator is configured to identify a maximum biased uplink received power from the biased receive powers and identify a second target network access node from the plurality of network access nodes having the maximum biased uplink received power, and wherein the selection controller is configured to select the second target network access node as an uplink network access node to for the terminal device to associate with.

In Example 515, the subject matter of any one of Examples 505 to 513 can optionally include wherein the target network access node is an uplink network access node for the terminal device to associate with, and wherein the biased received power determiner is further configured to determine downlink biased received powers for the plurality of network access nodes based on respective downlink bias values for the plurality of network access nodes, the comparator is configured to identify a maximum biased downlink received power from the biased receive powers and identify a second target network access node from the plurality of network access nodes having the maximum biased downlink received power, and the selection controller is configured to select the second target network access node as a downlink network access node for the terminal device to associate with.

In Example 516, the subject matter of any one of Examples 505 to 515 can optionally include wherein the respective bias value for a first network access node of the plurality of network access nodes is based on data rate and computational capacity capabilities of the first network access node.

In Example 517, the subject matter of any one of Examples 505 to 515 can optionally include wherein the respective bias value for a first network access node of the plurality of network access nodes is based on data rate and computational capacity capabilities of the first network access node in comparison to data rate and latency demands of the terminal device application.

In Example 518, the subject matter of any one of Examples 505 to 515 can optionally include wherein the respective bias value for a first network access node of the plurality of network access nodes is based on a computational capacity of an edge computing server co-located with the first network access node.

In Example 519, the subject matter of any one of Examples 505 to 518 can optionally include wherein the selection controller is further configured to transmit control signaling to the terminal device or the target network access node to instruct the terminal device to associate with the target network access node.

Example 520 is a communication device including a biased received power determiner configured to determine biased uplink received powers for a plurality of network access nodes based on respective uplink bias values for the plurality of network access nodes, and to determine biased downlink received powers for the plurality of network access nodes based on respective downlink bias values for the plurality of network access nodes, a comparator configured to evaluate the biased uplink received powers and the biased downlink received powers to identify a maximum biased uplink received power and a maximum biased downlink received power, and a selection controller configured to select an uplink network access node and a downlink network access node for the terminal device to associate with based on the maximum biased uplink received power and the maximum biased downlink received power.

In Example 521, the subject matter of Example 520 can optionally include wherein the respective uplink bias values are based on a capability of the plurality of network access nodes to support the terminal device in an uplink direction and wherein the respective downlink bias values are based on a capability of the plurality of network access nodes to support the terminal device application in a downlink direction.

In Example 522, the subject matter of Example 520 can optionally include wherein the comparator is configured to evaluate the biased uplink received powers and the biased downlink received powers by comparing the biased uplink received powers to identify the maximum biased uplink received power, and comparing the biased downlink received powers to identify the maximum biased downlink received power.

In Example 523, the subject matter of Example 522 can optionally include wherein the selection controller configured to select the uplink network access node and the downlink network access node for the terminal device to associate with by selecting the network access node from the plurality of network access nodes having the maximum biased uplink received power as the uplink network access node, and selecting the network access node from the plurality of network access nodes having the maximum biased downlink received power as the downlink network access node.

In Example 524, the subject matter of any one of Examples 520 to 523 can optionally further include a distance determiner configured to determine a distance between the terminal device and the plurality of network access nodes, wherein the biased received power determiner is configured to determine the biased uplink received powers and the biased downlink received powers based on the distances.

In Example 525, the subject matter of any one of Examples 520 to 523 can optionally further include a distance determiner configured to determine a distance between the terminal device and each of a plurality of candidate network access nodes, wherein the plurality of candidate network access nodes include candidate network access nodes of a first tier and candidate network access nodes of a second tier, identify a benchmark network access node from the plurality of candidate network access nodes for each of the multiple tiers having a minimum distance to the terminal device, and provide the benchmark network access nodes to the biased received power determiner as the plurality of network access nodes.

In Example 526, the subject matter of any one of Examples 520 to 525 can optionally include wherein the respective uplink and downlink bias values for a first network access node of the plurality of network access nodes are based on data rate and computational capacity capabilities of the first network access node.

In Example 527, the subject matter of any one of Examples 520 to 525 can optionally include wherein the respective uplink and downlink bias values for a first network access node of the plurality of network access nodes are based on data rate and computational capacity capabilities of the first network access node in comparison to data rate and latency demands of the terminal device application.

In Example 528, the subject matter of any one of Examples 520 to 525 can optionally include wherein the respective uplink and downlink bias values for a first network access node of the plurality of network access nodes are based on a computational capacity of an edge computing server co-located with the first network access node.

In Example 529, the subject matter of any one of Examples 520 to 528 can optionally include wherein the selection controller is further configured to transmit control signaling to the terminal device to instruct the terminal device to associate with the uplink network access node and the downlink network access node.

In Example 530, the subject matter of any one of Examples 520 to 529 can optionally include wherein the uplink network access node is co-located with first edge computing server and the downlink network access node is co-located with a second edge computing sever, and wherein the selection controller is configured to select, based on a downlink-to-uplink traffic ratio of the terminal device application, the first edge computing server or the second edge computing server for hosting a peer application to the terminal device application.

Example 531 is a terminal device including the communication device of any one of Examples 505 to 530.

Example 532 is a network access node including the communication device of any one of Examples 505 to 530.

Example 533 is a core network server including the communication device of any one of Examples 505 to 530.

Example 534 is a server device including an input data memory configured to obtain first parameters related to data rate and latency demands of a terminal device application and to obtain second parameters related to data rate and computational capacity capabilities of a plurality of network access nodes, and a bias processor configured to determine bias values for the plurality of network access nodes based on an evaluation of the first parameters and the second parameters, wherein the bias values are based on a capability of the plurality of network access nodes to support the terminal device application.

In Example 535, the subject matter of Example 531 can optionally include wherein the bias processor is configured to determine the bias values for the plurality of network access nodes using stochastic geometry.

In Example 536, the subject matter of Example 531 or 532 can optionally include wherein the first parameters include information about Quality of Service (QoS) requirements of the terminal device application.

In Example 537, the subject matter of Example 531 or 532 can optionally include wherein the second parameters include information about deployment densities of the plurality of network access nodes or about the computational capacity of edge computing servers co-located with the plurality of network access nodes.

In Example 538, the subject matter of any one of Examples 531 to 534 can optionally include wherein the plurality of candidate network access nodes include network access nodes of a first tier and network access nodes of a second tier, and wherein the bias processor is configured to determine same bias values for the network access nodes of the first tier and same bias values for the network access nodes of the second tier.

In Example 539, the subject matter of any one of Examples 531 to 534 can optionally include wherein the bias processor is configured to determine a bias value for a first network access node of the plurality of network access nodes based on the data rate and computational capacity capabilities of the first network access node.

Example 540 is a method of controlling cell association, the method including determining biased received powers for a plurality of network access nodes based on respective bias values for the plurality of network access nodes, identifying a maximum biased received power from the biased received powers and identifying a corresponding network access node of the plurality of network access nodes having the maximum biased received power, and selecting the network access node as a target network access node for the terminal device to associate with.

In Example 541, the subject matter of Example 540 can optionally include wherein the respective bias values are based on a capability of the plurality of network access nodes to support a terminal device application of a terminal device.

In Example 542, the subject matter of Example 540 can optionally further include determining a distance between the terminal device and each of the plurality of network access nodes.

In Example 543, the subject matter of Example 542 can optionally include wherein determining the biased received powers includes determining a biased received power for a first network access node of the plurality of network access nodes based on the distance between the terminal device and the first network access node.

In Example 544, the subject matter of Example 540 can optionally further include determining a distance between the terminal device and each of a plurality of candidate network access nodes, wherein the plurality of candidate network access nodes include candidate network access nodes of a first tier and candidate network access nodes of a second tier, identifying a benchmark network access node from the plurality of candidate network access nodes for each of the multiple tiers having a minimum distance to the terminal device, and providing the benchmark network access nodes to the biased received power determiner as the plurality of network access nodes.

In Example 545, the subject matter of Example 544 can optionally include wherein each of the multiple tiers is assigned a respective one of the bias values.

In Example 546, the subject matter of any one of Examples 540 to 543 can optionally include wherein determining the biased received powers includes determining a biased received power for a first network access node of the plurality of network access nodes based on a distance between the first network access node and the terminal device, and the respective bias value for the first network access node.

In Example 547, the subject matter of Example 546 can optionally include wherein determining the biased received power for the first network access node includes estimating a received power based on the distance and biasing the received power with the respective bias value for the first network access node.

In Example 548, the subject matter of any one of Examples 540 to 547 can optionally include wherein identifying the maximum biased received power includes comparing the biased received powers to identify a biased received power with a highest value.

In Example 549, the subject matter of any one of Examples 540 to 548 can optionally include wherein the target network access node is a downlink network access node for the terminal device to associate with, the method further including determining uplink biased received powers for the plurality of network access nodes based on respective uplink bias values for the plurality of network access nodes, identifying a maximum biased uplink received power from the biased receive powers and identifying a second target network access node from the plurality of network access nodes having the maximum biased uplink received power, and selecting the second target network access node as an uplink network access node for the terminal device to associate with.

In Example 550, the subject matter of any one of Examples 540 to 548 can optionally include wherein the target network access node is an uplink network access node for the terminal device to associate with, the method further including determining downlink biased received powers for the plurality of network access nodes based on respective downlink bias values for the plurality of network access nodes, identifying a maximum biased downlink received power from the biased receive powers and identifying a second target network access node from the plurality of network access nodes having the maximum biased downlink received power, and selecting the second target network access node as a downlink network access node for the terminal device to associate with.

In Example 551, the subject matter of any one of Examples 540 to 550 can optionally include wherein the respective bias value for a first network access node of the plurality of network access nodes is based on data rate and computational capacity capabilities of the first network access node.

In Example 552, the subject matter of any one of Examples 540 to 550 can optionally include wherein the respective bias value for a first network access node of the plurality of network access nodes is based on data rate and computational capacity capabilities of the first network access node in comparison to data rate and latency demands of the terminal device application.

In Example 553, the subject matter of any one of Examples 540 to 550 can optionally include wherein the respective bias value for a first network access node of the plurality of network access nodes is based on a computational capacity of an edge computing server co-located with the first network access node.

In Example 554, the subject matter of any one of Examples 540 to 550 can optionally further include transmitting control signaling to the terminal device or the target network access node to instruct the terminal device to associate with the target network access node.

Example 555 is a method of controlling cell association, the method including determining biased uplink received powers for a plurality of network access nodes based on respective uplink bias values for the plurality of network access nodes, determining biased downlink received powers for the plurality of network access nodes based on respective downlink bias values for the plurality of network access nodes, evaluating the biased uplink received powers and the biased downlink received powers to identify a maximum biased uplink received power and a maximum biased downlink received power, and selecting an uplink network access node and a downlink network access node for the terminal device to associate with based on the maximum biased uplink received power and the maximum biased downlink received power.

In Example 556, the subject matter of Example 555 can optionally include wherein the respective uplink bias values are based on a capability of the plurality of network access nodes to support the terminal device in an uplink direction and wherein the respective downlink bias values are based on a capability of the plurality of network access nodes to support the terminal device application in a downlink direction.

In Example 557, the subject matter of Example 555 can optionally include wherein evaluating the biased uplink received powers and the biased downlink received powers includes comparing the biased uplink received powers to identify the maximum biased uplink received power, and comparing the biased downlink received powers to identify the maximum biased downlink received power.

In Example 558, the subject matter of Example 557 can optionally include wherein selecting the uplink network access node and the downlink network access node for the terminal device to associate with includes selecting the network access node from the plurality of network access nodes having the maximum biased uplink received power as the uplink network access node, and selecting the network access node from the plurality of network access nodes that corresponds to the maximum biased downlink received power as the downlink network access node.

In Example 559, the subject matter of any one of Examples 555 to 558 can optionally further include determining a distance between the terminal device and the plurality of network access nodes, wherein the determining the biased uplink received powers and the biased downlink received powers includes determining the biased uplink received powers and the biased downlink received powers based on the distances.

In Example 560, the subject matter of any one of Examples 555 to 558 can optionally further include determining a distance between the terminal device and each of a plurality of candidate network access nodes, wherein the plurality of candidate network access nodes include candidate network access nodes of a first tier and candidate network access nodes of a second tier, identifying a benchmark network access node from the plurality of candidate network access nodes for each of the multiple tiers having a minimum distance to the terminal device, and providing the benchmark network access nodes to the biased received power determiner as the plurality of network access nodes.

In Example 561, the subject matter of any one of Examples 555 to 560 can optionally include wherein the respective uplink and downlink bias values for a first network access node of the plurality of network access nodes are based on data rate and computational capacity capabilities of the first network access node.

In Example 562, the subject matter of any one of Examples 555 to 560 can optionally include wherein the respective uplink and downlink bias values for a first network access node of the plurality of network access nodes are based on data rate and computational capacity capabilities of the first network access node in comparison to data rate and latency demands of the terminal device application.

In Example 563, the subject matter of any one of Examples 555 to 560 can optionally include wherein the respective uplink and downlink bias values for a first network access node of the plurality of network access nodes are based on a computational capacity of an edge computing server co-located with the first network access node.

In Example 564, the subject matter of any one of Examples 555 to 563 can optionally further include transmitting control signaling to the terminal device to instruct the terminal device to associate with the uplink network access node and the downlink network access node.

In Example 565, the subject matter of any one of Examples 520 to 529 can optionally include wherein the uplink network access node is co-located with first edge computing server and the downlink network access node is co-located with a second edge computing sever, the method further including selecting, based on a downlink-to-uplink traffic ratio of the terminal device application, the first edge computing server or the second edge computing server for hosting a peer application to the terminal device application.

Example 566 is a method of determining bias values, the method including obtaining first parameters related to data rate and latency demands of a terminal device application and obtaining second parameters related to data rate and computational capacity capabilities of a plurality of network access nodes, and determining bias values for the plurality of network access nodes based on an evaluation of the first parameters and the second parameters, wherein the bias values are based on a capability of the plurality of network access nodes to support the terminal device application.

In Example 567, the subject matter of Example 566 can optionally include wherein determining the bias values for the plurality of network access nodes includes using stochastic geometry to determine the bias values.

In Example 568, the subject matter of Example 566 or 567 can optionally include wherein the first parameters include information about Quality of Service (QoS) requirements of the terminal device application.

In Example 569, the subject matter of Example 566 or 567 can optionally include wherein the second parameters include information about deployment densities of the plurality of network access nodes or about the computational capacity of edge computing servers co-located with the plurality of network access nodes.

In Example 570, the subject matter of any one of Examples 566 to 569 can optionally include wherein the plurality of candidate network access nodes include network access nodes of a first tier and network access nodes of a second tier, and wherein determining the bias values includes determining same bias values for the network access nodes of the first tier and same bias values for the network access nodes of the second tier.

In Example 571, the subject matter of any one of Examples 566 to 569 can optionally include wherein determining the bias values includes determining a bias value for a first network access node of the plurality of network access nodes based on the data rate and computational capacity capabilities of the first network access node.

Example 572 is a non-transitory computer readable medium storing instructions that when executed by one or more processors cause the one or more processors to perform the method of any one of Examples 540 to 571.

Example 573 is a device including one or more processors, and a memory storing instructions that when executed by the one or more processors cause the one or more processors to perform the method of any one of Examples 540 to 571.

Example 574 is a communication device including determining means configured to determine biased received powers for a plurality of network access nodes based on respective bias values for the plurality of network access nodes, comparing means configured to identify a maximum biased received power from the biased received powers, and to identify a corresponding network access node of the plurality of network access nodes having the maximum biased received power, and selecting means configured to select the network access node as a target network access node for the terminal device to associate with.

Example 575 is a communication device including determining means configured to determine biased uplink received powers for a plurality of network access nodes based on respective uplink bias values for the plurality of network access nodes, and to determine biased downlink received powers for the plurality of network access nodes based on respective downlink bias values for the plurality of network access nodes, comparing means configured to evaluate the biased uplink received powers and the biased downlink received powers to identify a maximum biased uplink received power and a maximum biased downlink received power, and selecting means configured to select an uplink network access node and a downlink network access node for the terminal device to associate with based on the maximum biased uplink received power and the maximum biased downlink received power.

Example 576 is a server device including collecting means configured to obtain first parameters related to data rate and latency demands of a terminal device application and to obtain second parameters related to data rate and computational capacity capabilities of a plurality of network access nodes, and processing means configured to determine bias values for the plurality of network access nodes based on an evaluation of the first parameters and the second parameters, wherein the bias values are based on a capability of the plurality of network access nodes to support the terminal device application.

The subject matter of Example 577 is a communication device including a first receiver configured to receive a scheduling message for at least one further communication device, a processor configured to generate a scheduling message and process the generated scheduling message and the received scheduling message to determine at least one scheduling parameter for transmit data, and a transmitter configured to transmit the data based on the at least one scheduling parameter.

In Example 578, the subject matter of Example 577 can optionally include wherein each scheduling message includes first priority information, and the processor is configured to determine the scheduling parameter based on a comparison of first priority information of the generated scheduling message with first priority information of the received scheduling message.

In Example 579, the subject matter of any one of Examples 577 to 578 can optionally include wherein the transmitter is configured to transmit the generated scheduling message to the at least one further communication device within a scheduling time interval during which the first receiver is configured to receive the scheduling message.

In Example 580, the subject matter of Example 579 can optionally include wherein a transmission time during which the transmitter is configured to transmit the generated scheduling message at least partially or fully overlaps with a reception time during which the first receiver is configured to receive the scheduling message.

In Example 581, the subject matter of any one of Examples 579 to 580 can optionally further include a second receiver configured to receive a clock signal defining the scheduling time interval.

In Example 582, the subject matter of Example 581 can optionally include wherein the second receiver is configured to receive the clock signal from at least one of a group consisting of a satellite, a base station of a communication network, and at least one further communication device.

In Example 583, the subject matter of any one of Examples 577 to 582 can optionally include wherein the transmitter is configured to transmit the generated scheduling message to the at least one further communication device using at least one communication frequency and wherein the first receiver is configured to receive the scheduling message using the same at least one communication frequency.

In Example 584, the subject matter of any one of Examples 579 to 583 can optionally include the communication device being configured to operate in a full duplex operation mode at least during the scheduling time interval.

In Example 585, the subject matter of any one of Examples 577 to 584 can optionally include wherein a transmission format of each scheduling message is predefined, and wherein upon processing the generated scheduling message and the received scheduling message, the processor is configured to reconstruct the received scheduling message from a signal received by the first receiver based on a respective predefined format of the received scheduling message.

In Example 586, the subject matter of Example 585 can optionally include wherein the processor is configured to perform interference cancellation processing to reconstruct the received scheduling message from the signal received by the first receiver.

In Example 587, the subject matter of any one of Examples 578 to 586 can optionally include wherein each scheduling message further includes second priority information, and the processor is configured to determine the scheduling parameter based on a comparison of second priority information of the generated scheduling message with second priority information of the received scheduling message when the first priority information of the generated scheduling message matches the first priority information of the received scheduling message.

In Example 588, the subject matter of any one of Examples 578 to 587 can optionally include wherein the first priority information is determined by the communication device for a type of data to be transmitted or is predefined for a type of data to be transmitted.

In Example 589, the subject matter of any one of Examples 587 to 588 can optionally include wherein the second priority information is an offset value determined for each scheduling message.

In Example 590, the subject matter of any one of Examples 587 to 589 can optionally include wherein the processor is configured to generate the second priority information for the generated scheduling message.

In Example 591, the subject matter of any one of Examples 577 to 590 can optionally include wherein the at least one scheduling parameter defines a transmission time interval and the transmitter is configured to transmit the data during the transmission time interval.

In Example 592, the subject matter of any one of Examples 577 to 591 can optionally include wherein the at least one scheduling parameter defines a frequency resource and the transmitter is configured to transmit the data using the frequency resource.

In Example 593, the subject matter of any one of Examples 577 to 592 can optionally include wherein the generated scheduling message includes information on a transmission power for transmit data from the communication device and the received scheduling message includes information on a transmission power for transmit data from the at least one further communication device, and the processor is configured to determine the scheduling parameter based on a comparison of the information on the transmission power of the generated scheduling message with the information on the transmission power of the received scheduling message.

In Example 594, the subject matter of any one of Examples 577 to 593 can optionally include wherein the generated scheduling message includes information on a modulation scheme for transmit data from the communication device and the received scheduling message includes information on a modulation scheme for transmit data from the at least one further communication device, and the processor is configured to determine the scheduling parameter based on a comparison of the information on the modulation scheme of the generated scheduling message with the information on the modulation scheme of the received scheduling message.

In Example 595, the subject matter of any one of Examples 577 to 594 can optionally include wherein the generated scheduling message includes information on a coding rate for transmit data from the communication device and the received scheduling message includes information on a coding rate for transmit data from the at least one further communication device, and the processor is configured to determine the scheduling parameter based on a comparison of the information on the coding rate of the generated scheduling message with the information on the coding rate of the received scheduling message.

The subject matter of Example 596 is a communication method for a communication device, the method including generating a scheduling message, receiving a scheduling message for at least one further communication device, processing the generated scheduling message and the received scheduling message to determine at least one scheduling parameter for transmit data, and transmitting the data based on the at least one scheduling parameter.

In Example 597, the subject matter of Example 596 can optionally include wherein each scheduling message includes first priority information, and the processing includes determining the scheduling parameter based on a comparison of first priority information of the generated scheduling message with first priority information of the received scheduling message.

In Example 598, the subject matter of any one of Examples 596 to 597 can optionally further include transmitting the generated scheduling message to the at least one further communication device within a scheduling time interval during which the scheduling message for the at least one further communication device is received.

In Example 599, the subject matter of Example 598 can optionally include wherein transmitting the generated scheduling message is performed during a transmission time and receiving the scheduling message is performed during a reception time, the transmission time and the reception time at least partially or fully overlapping.

In Example 600, the subject matter of any one of Examples 598 to 599 can optionally further include receiving a clock signal defining the scheduling time interval.

In Example 601, the subject matter of Example 600 can optionally further include receiving the clock signal from at least one of a group consisting of a satellite, a base station of a communication network, and at least one further communication device.

In Example 602, the subject matter of any one of Examples 596 to 601 can optionally include wherein transmitting the generated scheduling message to the at least one further communication device is performed using at least one communication frequency and wherein receiving the scheduling message is performed using the same at least one communication frequency.

In Example 603, the subject matter of any one of Examples 598 to 602 can optionally further include operating the communication device in a full duplex operation mode at least during the scheduling time interval.

In Example 604, the subject matter of any one of Examples 596 to 603 can optionally include wherein a transmission format of each scheduling message is predefined, and wherein processing the generated scheduling message includes reconstructing the received scheduling message from a received signal based on a respective predefined format of the received scheduling message.

In Example 605, the subject matter of Example 604 can optionally include wherein the processing includes performing interference cancellation processing to reconstruct the received scheduling message from the received signal.

In Example 606, the subject matter of any one of Examples 597 to 605 can optionally include wherein each scheduling message further includes second priority information, and the processing includes determining the scheduling parameter based on a comparison of second priority information of the generated scheduling message with second priority information of the received scheduling message when the first priority information of the generated scheduling message matches the first priority information of the received scheduling message.

In Example 607, the subject matter of any one of Examples 597 to 606 can optionally further include generating the first priority information for a type of data to be transmitted or selecting a predefined first priority information for a type of data to be transmitted.

In Example 608, the subject matter of any one of Examples 606 to 607 can optionally further include determining the second priority information as an offset value for each scheduling message.

In Example 609, the subject matter of any one of Examples 606 to 608 can optionally further include generating the second priority information for the generated scheduling message.

In Example 610, the subject matter of any one of Examples 596 to 609 can optionally include wherein the at least one scheduling parameter defines a transmission time interval and transmitting the data is performed during the transmission time interval.

In Example 611, the subject matter of any one of Examples 596 to 610 can optionally include wherein the at least one scheduling parameter defines a frequency resource and transmitting the data is performed using the frequency resource.

In Example 612, the subject matter of any one of Examples 596 to 611 can optionally include wherein the generated scheduling message includes information on a transmission power for transmit data from the communication device and the received scheduling message includes information on a transmission power for transmit data from the at least one further communication device, and the processing includes determining the scheduling parameter based on a comparison of the information on the transmission power of the generated scheduling message with the information on the transmission power of the received scheduling message.

In Example 613, the subject matter of any one of Examples 596 to 612 can optionally include wherein the generated scheduling message includes information on a modulation scheme for transmit data from the communication device and the received scheduling message includes information on a modulation scheme for transmit data from the at least one further communication device, and the processing includes determining the scheduling parameter based on a comparison of the information on the modulation scheme of the generated scheduling message with the information on the modulation scheme of the received scheduling message.

In Example 614, the subject matter of any one of Examples 596 to 613 can optionally include wherein the generated scheduling message includes information on a coding rate for transmit data from the communication device and the received scheduling message includes information on a coding rate for transmit data from the at least one further communication device, and the processing includes determining the scheduling parameter based on a comparison of the information on the coding rate of the generated scheduling message with the information on the coding rate of the received scheduling message.

The subject matter of Example 615 is a communication device including one or more processors configured to generate a scheduling message, receive a scheduling message for at least one further communication device, process the generated scheduling message and the received scheduling message to determine at least one scheduling parameter for transmit data, and transmit the data in accordance with the determined at least one scheduling parameter.

In Example 616, the subject matter of Example 615 can optionally include wherein each scheduling message includes first priority information, and the one or more processors are configured to determine the scheduling parameter based on a comparison of first priority information of the generated scheduling message with first priority information of the received scheduling message.

In Example 617, the subject matter of any one of Examples 615 to 616 can optionally include wherein the one or more processors are configured to transmit the generated scheduling message to the at least one further communication device within a scheduling time interval during which the one or more processors are configured to receive the scheduling message.

In Example 618, the subject matter of Example 617 can optionally include wherein a transmission time during which the one or more processors are configured to transmit the generated scheduling message at least partially or fully overlaps with a reception time during which the one or more processors are configured to receive the scheduling message.

In Example 619, the subject matter of any one of Examples 617 to 618 can optionally include wherein the one or more processors are further configured to receive a clock signal defining the scheduling time interval.

In Example 620, the subject matter of Example 619 can optionally include wherein the one or more processors are configured to receive the clock signal from at least one of a group consisting of a satellite, a base station of a communication network, and at least one further communication device.

In Example 621, the subject matter of any one of Examples 615 to 620 can optionally include wherein the one or more processors are configured to transmit the generated scheduling message to the at least one further communication device using at least one communication frequency and wherein the one or more processors are configured to receive the scheduling message using the same at least one communication frequency.

In Example 622, the subject matter of any one of Examples 617 to 621 can optionally include wherein the one or more processors are configured to cause the communication device to operate in a full duplex operation mode at least during the scheduling time interval.

In Example 623, the subject matter of any one of Examples 615 to 622 can optionally include wherein a transmission format of each scheduling message is predefined, and wherein upon processing the generated scheduling message and the received scheduling message, the one or more processors are configured to reconstruct the received scheduling message from a signal received by the first receiver based on a respective predefined format of the received scheduling message.

In Example 624, the subject matter of Example 623 can optionally include wherein the one or more processors are configured to perform interference cancellation processing to reconstruct the received scheduling message from the signal received by the one or more processors.

In Example 625, the subject matter of any one of Examples 616 to 624 can optionally include wherein each scheduling message further includes second priority information, and the one or more processors are configured to determine the scheduling parameter based on a comparison of second priority information of the generated scheduling message with second priority information of the received scheduling message when the first priority information of the generated scheduling message matches the first priority information of the received scheduling message.

In Example 626, the subject matter of any one of Examples 616 to 625 can optionally include wherein the first priority information is determined by the communication device for a type of data to be transmitted or is predefined for a type of data to be transmitted.

In Example 627, the subject matter of any one of Examples 616 to 626 can optionally include wherein the second priority information is an offset value determined for each scheduling message.

In Example 628, the subject matter of any one of Examples 625 to 627 can optionally include wherein the one or more processors are configured to generate the second priority information for the generated scheduling message.

In Example 629, the subject matter of any one of Examples 615 to 628 can optionally include wherein the at least one scheduling parameter defines a transmission time interval and the one or more processors are configured to transmit the data during the transmission time interval.

In Example 630, the subject matter of any one of Examples 615 to 629 can optionally include wherein the at least one scheduling parameter defines a frequency resource and the one or more processors are configured to transmit the data using the frequency resource.

In Example 631, the subject matter of any one of Examples 615 to 630 can optionally include wherein the generated scheduling message includes information on a transmission power for transmit data from the communication device and the received scheduling message includes information on a transmission power for transmit data from the at least one further communication device, and the one or more processors are configured to determine the scheduling parameter based on a comparison of the information on the transmission power of the generated scheduling message with the information on the transmission power of the received scheduling message.

In Example 632, the subject matter of any one of Examples 615 to 631 can optionally include wherein the generated scheduling message includes information on a modulation scheme for transmit data from the communication device and the received scheduling message includes information on a modulation scheme for transmit data from the at least one further communication device, and the one or more processors are configured to determine the scheduling parameter based on a comparison of the information on the modulation scheme of the generated scheduling message with the information on the modulation scheme of the received scheduling message.

In Example 633, the subject matter of any one of Examples 615 to 632 can optionally include wherein the generated scheduling message includes information on a coding rate for transmit data from the communication device and the received scheduling message includes information on a coding rate for transmit data from the at least one further communication device, and the one or more processors are configured to determine the scheduling parameter based on a comparison of the information on the coding rate of the generated scheduling message with the information on the coding rate of the received scheduling message.

Example 634 is a network access node including a scheduler configured to obtain a battery power status for a terminal device with a first modulation scheme and to select a second modulation scheme for the terminal device if the battery power status satisfies a predefined condition, and a transmitter configured to send a modulation scheme assignment message to the terminal device that identifies the second modulation scheme.

In Example 635, the subject matter of Example 634 can optionally include wherein the battery power status is a remaining battery power level for the terminal device.

In Example 636, the subject matter of Example 635 can optionally include wherein the scheduler is configured to select the second modulation scheme for the terminal device by determining if the remaining battery power level is less than a threshold, and selecting a modulation scheme having a lower modulation order than the first modulation scheme as the second modulation scheme.

In Example 637, the subject matter of Example 634 can optionally include wherein the battery power status is a power-saving mode indicator that indicates whether a power-saving mode of the terminal device is enabled.

In Example 638, the subject matter of Example 637 can optionally include wherein the scheduler is configured to select the second modulation scheme for the terminal device by determining whether the power-saving mode indicator indicates that the power-saving mode is enabled, and selecting a modulation scheme having a lower modulation order than the first modulation scheme as the second modulation scheme in response to determining that the power-saving mode indicator indicates that the power-saving mode is enabled.

In Example 639, the subject matter of Example 634 can optionally include wherein the scheduler is configured to select the second modulation scheme for the terminal device if a control variable satisfies a predefined condition.

In Example 640, the subject matter of Example 639 can optionally include wherein the additional control variable is a distance between the terminal device and the network access node.

In Example 641, the subject matter of Example 640 can optionally include wherein the scheduler is configured to select the second modulation scheme for the terminal device by determining whether distance is greater than a predefined threshold, and selecting a modulation scheme having a lower modulation order than the first modulation scheme as the second modulation scheme in response to determining that the distance is greater than the predefined threshold.

In Example 642, the subject matter of Example 639 can optionally include wherein the additional control variable is a temperature of the terminal device.

In Example 643, the subject matter of any one of Examples 634 to 641 can optionally include wherein the first modulation scheme is a quadrature amplitude modulation scheme and the second modulation scheme is a phase-shift keying modulation scheme.

In Example 644, the subject matter of any one of Examples 634 to 643 can optionally include wherein the second modulation scheme has a lower modulation order than the first modulation scheme.

In Example 645, the subject matter of any one of Examples 634 to 644 can optionally include wherein the scheduler is configured to obtain the battery power status for the terminal device by receiving a battery power status report from the terminal device that indicates the battery power status.

In Example 646, the subject matter of any one of Examples 634 to 645 can optionally include wherein the scheduler is configured to select the second modulation scheme for the terminal device by selecting the second modulation scheme based on a predefined mapping that maps different battery power statuses to respective modulation schemes.

In Example 647, the subject matter of Example 646 can optionally include wherein the predefined mapping maps lower remaining battery power levels to modulation schemes with lower modulation order.

In Example 648, the subject matter of any one of Examples 634 to 645 can optionally include wherein the battery power status is one of a plurality of control variables for a predefined mapping that maps different battery power statuses to a plurality of predefined modulation schemes, and wherein the scheduler is configured to select the second modulation scheme for the terminal device by selecting the second modulation scheme based on the predefined mapping.

In Example 649, the subject matter of Example 648 can optionally include wherein the plurality of control variables include a distance between the terminal device and the network access node, a temperature of the terminal device, or a charging status of the terminal device.

In Example 650, the subject matter of any one of Examples 634 to 649 can optionally include wherein the scheduler is configured to send an instruction to the terminal device to use a first radio access channel and a second radio access channel to transmit a data stream to the network access node with the second modulation scheme.

In Example 651, the subject matter of Example 650 can optionally include wherein the first radio access channel is on first spectrum and the second radio access channel is on second spectrum.

In Example 652, the subject matter of Example 650 can optionally include wherein the first radio access channel is on licensed spectrum and the second radio access channel is on unlicensed spectrum.

In Example 653, the subject matter of any one of Examples 634 to 652 can optionally further include a receiver configured to receive modulated data from the terminal device using the second modulation scheme.

Example 654 is a terminal device including a protocol controller configured to determine a battery power status for the terminal device while the terminal device is assigned a first modulation scheme, and to select a second modulation scheme for the terminal device if the battery power status satisfies a predefined condition, and a transceiver configured to send a modulation scheme request message to a network access node that requests assignment of the second modulation scheme to the terminal device.

In Example 655, the subject matter of Example 654 can optionally include wherein the battery power status is a remaining battery power level.

In Example 656, the subject matter of Example 655 can optionally include wherein the protocol controller is configured to select the second modulation scheme for the terminal device by determining whether the remaining battery power level is less than a threshold, and selecting a modulation scheme having a lower modulation order than the first modulation scheme as the second modulation scheme in response to determining that the remaining battery power level is less than threshold.

In Example 657, the subject matter of Example 654 can optionally include wherein the battery power status is a power-saving mode indicator that indicates whether a power-saving mode of the terminal device is enabled.

In Example 658, the subject matter of Example 657 can optionally include wherein the protocol controller is configured to select the second modulation scheme for the terminal device by determining whether the power-saving mode indicator indicates that the power-saving mode is enabled, and selecting a modulation scheme having a lower modulation order than the first modulation scheme in response to determining that the power-saving mode indicator indicates that the power-saving mode is enabled.

In Example 659, the subject matter of any one of Examples 654 to 658 can optionally include wherein the protocol controller is configured to select the second modulation scheme for the terminal device if a control variable satisfies a predefined condition.

In Example 660, the subject matter of Example 659 can optionally include wherein the additional control variable is a distance between the terminal device and a network access node.

In Example 661, the subject matter of Example 659 can optionally include wherein the additional control variable is a temperature of the terminal device.

In Example 662, the subject matter of Example 659 can optionally include wherein the additional control variable is a charging status of the terminal device.

In Example 663, the subject matter of any one of Examples 654 to 661 can optionally include wherein the first modulation scheme is a quadrature amplitude modulation scheme and the second modulation scheme is a phase-shift keying modulation scheme.

In Example 664, the subject matter of any one of Examples 654 to 663 can optionally include wherein the second modulation scheme has a higher modulation order than the first modulation scheme.

In Example 665, the subject matter of any one of Examples 654 to 664 can optionally include wherein the transceiver is further configured to receive a modulation scheme accept message from the network access node in response to the modulation scheme request message, the terminal device further including a digital signal processor configured to modulate data with the second modulation scheme and provide the data to the transceiver for wireless transmission to the network access node.

In Example 666, the subject matter of Example 665 can optionally include the transceiver further configured to transmit the data to the network access node.

Example 667 is a network access node including a scheduler configured to obtain a plurality of control variables for a terminal device with a first modulation scheme and to select a second modulation scheme based on a predefined mapping that maps control variables to modulation schemes, wherein the one or more control variables include a battery power status, and a transmitter configured to send a modulation scheme assignment message identifying the second modulation scheme to the terminal device.

In Example 668, the subject matter of Example 667 can optionally include wherein the predefined mapping maps different values of control variables to respective modulation schemes of a plurality of modulation schemes.

In Example 669, the subject matter of Example 667 or 668 can optionally include wherein the plurality of control variables include a temperature of the terminal device, a distance between the terminal device and the network access node, or a charging status of the terminal device.

In Example 670, the subject matter of any one of Examples 667 to 669 can optionally include wherein the battery power status is a remaining battery power level of the terminal device or a power-saving mode indicator that indicates whether a power-saving mode of the terminal device is enabled.

Example 671 is a method of operating a network access node, the method including obtaining a battery power status for a terminal device with a first modulation scheme, selecting a second modulation scheme for the terminal device if the battery power status satisfies a predefined condition, and sending a modulation scheme assignment message to the terminal device that identifies the second modulation scheme.

In Example 672, the subject matter of Example 671 can optionally include wherein the battery power status is a remaining battery power level for the terminal device.

In Example 673, the subject matter of Example 672 can optionally include wherein selecting the second modulation scheme for the terminal device includes determining whether remaining battery power level is less than a threshold, and selecting a modulation scheme having a lower modulation order than the first modulation scheme as the second modulation scheme in response to determining that the remaining battery power level is less than threshold.

In Example 674, the subject matter of Example 671 can optionally include wherein the battery power status is a power-saving mode indicator that indicates whether a power-saving mode of the terminal device is enabled.

In Example 675, the subject matter of Example 674 can optionally include wherein selecting the second modulation scheme for the terminal device includes determining whether power-saving mode indicator indicates that the power-saving mode is enabled, and selecting a modulation scheme having a lower modulation order than the first modulation scheme as the second modulation scheme in response to determining that the power-saving mode indicator indicates that the power-saving mode is enabled.

In Example 676, the subject matter of Example 671 can optionally include wherein selecting the second modulation scheme for the terminal device includes selecting the second modulation scheme if a control variable satisfies a predefined condition.

In Example 677, the subject matter of Example 676 can optionally include wherein the additional control variable is a distance between the terminal device and the network access node.

In Example 678, the subject matter of Example 677 can optionally include wherein selecting the second modulation scheme for the terminal device includes determining whether distance is greater than a predefined threshold, and selecting a modulation scheme having a lower modulation order than the first modulation scheme as the second modulation scheme in response to determining that the distance is greater than the predefined threshold.

In Example 679, the subject matter of Example 676 can optionally include wherein the additional control variable is a temperature of the terminal device.

In Example 680, the subject matter of Example 676 can optionally include wherein the additional control variable is a charging status of the terminal device.

In Example 681, the subject matter of any one of Examples 671 to 680 can optionally include wherein the first modulation scheme is a quadrature amplitude modulation scheme and the second modulation scheme is a phase-shift keying modulation scheme.

In Example 682, the subject matter of any one of Examples 671 to 681 can optionally include wherein the second modulation scheme has a lower modulation order than the first modulation scheme.

In Example 683, the subject matter of any one of Examples 671 to 682 can optionally include wherein obtaining the battery power status for the terminal device includes receiving a battery power status report from the terminal device that indicates the battery power status.

In Example 684, the subject matter of any one of Examples 671 to 683 can optionally include wherein selecting the second modulation scheme for the terminal device includes selecting the second modulation scheme based on a predefined mapping that maps different battery power statuses to respective modulation schemes.

In Example 685, the subject matter of Example 684 can optionally include wherein the predefined mapping maps lower remaining battery power levels to modulation schemes with lower modulation order.

In Example 686, the subject matter of any one of Examples 671 to 683 can optionally include wherein the battery power status is one of a plurality of control variables for a predefined mapping that maps different battery power statuses to a plurality of predefined modulation schemes, and selecting the second modulation scheme for the terminal device includes selecting the second modulation scheme based on the predefined mapping.

In Example 687, the subject matter of Example 686 can optionally include wherein the plurality of control variables include a distance between the terminal device and the network access node, a temperature of the terminal device, or a charging status of the terminal device.

In Example 688, the subject matter of any one of Examples 671 to 687 can optionally further include sending an instruction to the terminal device to use a first radio access channel and a second radio access channel to transmit a data stream to the network access node with the second modulation scheme.

In Example 689, the subject matter of Example 688 can optionally include wherein the first radio access channel is on first spectrum and the second radio access channel is on second spectrum.

In Example 690, the subject matter of Example 688 can optionally include wherein the first radio access channel is on licensed spectrum and the second radio access channel is on unlicensed spectrum.

In Example 691, the subject matter of any one of Examples 671 to 690 can optionally further include receiving modulated data from the terminal device using the second modulation scheme.

Example 692 is a method of operating a terminal device, the method including determining a battery power status of the terminal device while the terminal device is assigned a first modulation scheme, selecting a second modulation scheme for the terminal device if the battery power status satisfies a predefined condition, and sending a modulation scheme request message to a network access node that requests assignment of the second modulation scheme to the terminal device.

In Example 693, the subject matter of Example 692 can optionally include wherein the battery power status is a remaining battery power level.

In Example 694, the subject matter of Example 693 can optionally include wherein selecting the second modulation scheme for the terminal device includes determining whether the remaining battery power level is less than a threshold, and selecting a modulation scheme having a lower modulation order than the first modulation scheme as the second modulation scheme in response to determining that the remaining battery power level is less than threshold.

In Example 695, the subject matter of Example 692 can optionally include wherein the battery power status is a power-saving mode indicator that indicates whether a power-saving mode of the terminal device is enabled.

In Example 696, the subject matter of Example 695 can optionally include wherein selecting the second modulation scheme for the terminal device includes determining whether the power-saving mode indicator indicates that the power-saving mode is enabled, and selecting a modulation scheme having a lower modulation order than the first modulation scheme in response to determining that the power-saving mode indicator indicates that the power-saving mode is enabled.

In Example 697, the subject matter of any one of Examples 692 to 696 can optionally include wherein the selecting the second modulation scheme for the terminal device includes selecting the second modulation scheme if a control variable satisfies a predefined condition.

In Example 698, the subject matter of Example 697 can optionally include wherein the additional control variable is a distance between the terminal device and a network access node.

In Example 699, the subject matter of Example 697 can optionally include wherein the additional control variable is a temperature of the terminal device.

In Example 700, the subject matter of Example 697 can optionally include wherein the additional control variable is a charging status of the terminal device.

In Example 701, the subject matter of any one of Examples 692 to 700 can optionally include wherein the first modulation scheme is a quadrature amplitude modulation scheme and the second modulation scheme is a phase-shift keying modulation scheme.

In Example 702, the subject matter of any one of Examples 692 to 701 can optionally include wherein the second modulation scheme has a lower modulation order than the first modulation scheme.

In Example 703, the subject matter of any one of Examples 692 to 702 can optionally further include receiving a modulation scheme accept message from the network access node in response to the modulation scheme request message, and transmitting data to the network access node with the second modulation scheme.

Example 704 is a method of operating a network access node, the method including obtaining a plurality of control variables for a terminal device with a first modulation scheme, selecting a second modulation scheme based on a predefined mapping that maps control variables to modulation schemes, wherein the one or more control variables include a battery power status, and sending a modulation scheme assignment message identifying the second modulation scheme to the terminal device.

In Example 705, the subject matter of Example 704 can optionally include wherein the predefined mapping maps different values of control variables to respective modulation schemes of a plurality of modulation schemes.

In Example 706, the subject matter of Example 704 or 705 can optionally include wherein the plurality of control variables include a temperature of the terminal device, a distance between the terminal device and the network access node, or a charging status of the terminal device.

In Example 707, the subject matter of any one of Examples 704 to 706 can optionally include wherein the battery power status is a remaining battery power level of the terminal device or a power-saving mode indicator that indicates whether a power-saving mode of the terminal device is enabled.

Example 708 is a non-transitory computer readable medium storing instructions that when executed by one or more processors cause the one or more processors to perform the method of any one of Examples 671 to 707.

Example 709 is a device including one or more processors, and a memory storing instructions that when executed by the one or more processors cause the device to perform the method of any one of Examples 671 to 707.

Example 710 is a network access node including scheduling means configured to obtain a battery power status for a terminal device with a first modulation scheme and to select a second modulation scheme for the terminal device if that the battery power status satisfies a predefined condition, and transmitting means configured to send a modulation scheme assignment message to the terminal device that identifies the second modulation scheme.

Example 711 is a terminal device including controlling means configured to determine a battery power status for the terminal device while the terminal device is assigned a first modulation scheme, and to select a second modulation scheme for the terminal device if the battery power status satisfies a predefined condition, and transmitting means configured to send a modulation scheme request message to a network access node that requests assignment of the second modulation scheme.

Example 712 is a network access node including scheduling means configured to obtain a plurality of control variables for a terminal device with a first modulation scheme and to select a second modulation scheme based on a predefined mapping that maps control variables to modulation schemes, wherein the one or more control variables include a battery power status, and transmitting means configured to send a modulation scheme assignment message identifying the second modulation scheme to the terminal device.

Example 713 is a communication device including a router configured to transmit or receive a data stream in a first compression format with first spectrum, and a controller configured to detect a triggering condition based on a power status of the communication device or a latency parameter of the data stream, and to select a second compression format and second spectrum, the router further configured to transmit or receive the data stream in the second compression format with the first spectrum and the second spectrum.

In Example 714, the subject matter of Example 713 can optionally include wherein the power status is a remaining battery power level of the communication device, and wherein the controller is configured to detect the triggering condition by comparing the remaining battery power level to a battery power level threshold and detecting the triggering condition if the remaining battery power level is less than the battery power level threshold.

In Example 715, the subject matter of Example 713 can optionally include wherein the power status is a power-saving mode indicator that indicates whether a power-saving mode of the communication device is enabled, and wherein the controller is configured to detect the triggering condition if the power-saving mode indicator indicates that the power-saving mode is enabled.

In Example 716, the subject matter of Example 713 can optionally include wherein the latency parameter of the data stream is a measured latency of the data stream, and wherein the controller is configured to detect the triggering condition by comparing the measured latency to a predefined latency threshold and detecting the triggering condition if the measured latency is greater than the predefined latency threshold.

In Example 717, the subject matter of any one of Examples 713 to 716 can optionally include wherein the router is configured to transmit or receive the data stream in the second compression format with the first spectrum and the second spectrum by receiving the data stream in the second compression format, splitting the data stream into a first part and a second part, transmitting the first part via a first transceiver that operates on the first spectrum, and transmitting the second part via a second transceiver that operates on the second spectrum.

In Example 718, the subject matter of any one of Examples 713 to 716 can optionally include wherein the router is configured to transmit or receive the data stream in the second compression format with the first spectrum and the second spectrum by receiving a first part of the data stream in the second compression format from a first transceiver that operates on the first spectrum, receiving a second part of the data stream in the second compression format from a second transceiver that operates on the second spectrum, and recombining the first part and the second part to obtain the data stream in the second compression format.

In Example 719, the subject matter of Example 717 or 718 can optionally further include the first transceiver and the second transceiver.

In Example 720, the subject matter of Example 719 can optionally further include a first antenna and a second antenna, wherein the first transceiver is configured to wirelessly transmit and receive with the first antenna on the first spectrum and the second transceiver is configured to wirelessly transmit and receive with the second antenna on the second spectrum.

In Example 721, the subject matter of any one of Examples 713 to 720 can optionally further include a digital compression processor configured to receive the data stream from a stream application before the router transmits or receives the data stream in the second compression format, apply the second compression format to the data stream, and provide the data stream in the second compression format to the router.

In Example 722, the subject matter of Example 721 can optionally include wherein the second compression format is an uncompressed compression format, and wherein the digital compression processor is configured to apply the second compression format to the data stream by allowing the data stream to pass through without compression processing.

In Example 723, the subject matter of Example 721 or 722 can optionally further include the stream application, wherein the stream application is configured to generate the data stream in its initial format.

In Example 724, the subject matter of any one of Examples 713 to 720 can optionally further include a digital compression processor configured to receive the data stream from the router in the second compression format after the router receives the data stream in the second compression format, and to revert the second compression format.

In Example 725, the subject matter of Example 724 can optionally include wherein the second compression format is an uncompressed compression format, and wherein the digital compression processor is configured to revert the second compression format by allowing the data stream to pass through without decompression processing.

In Example 726, the subject matter of Example 724 or 725 can optionally further include a stream application, wherein the digital compression processor is configured to provide the data stream to the stream application after reverting the second compression format.

In Example 727, the subject matter of any one of Examples 713 to 726 can optionally include wherein transfer of the data stream in the second compression format has a higher data rate demand than transfer of the data stream in the first compression format, and wherein the controller is configured to identify the second spectrum based on the higher data rate demand.

In Example 728, the subject matter of any one of Examples 713 to 727 can optionally include wherein the second compression format is an uncompressed compression format.

In Example 729, the subject matter of any one of Examples 713 to 727 can optionally include wherein the second compression format is a compressed compression format.

In Example 730, the subject matter of any one of Examples 713 to 729 can optionally include wherein the second compression format is more power efficient than the first compression format.

In Example 731, the subject matter of any one of Examples 713 to 730 can optionally include wherein the second compression format has lower latency than the first compression format.

In Example 732, the subject matter of any one of Examples 713 to 731 can optionally include wherein the second compression format has lower compression efficiency than the first compression format.

Example 733 is a communication device including a router configured to transmit or receive a data stream in a first compression format with first spectrum, and a controller configured to detect a triggering condition based on a power status of the communication device or a latency parameter of the data stream, and to select an uncompressed compression format and second spectrum, the router further configured to transmit or receive the data stream in the uncompressed compression format with the first spectrum and the second spectrum.

In Example 734, the subject matter of Example 733 can optionally include wherein the router is configured to transmit or receive the data stream in the uncompressed compression format with the first spectrum and the second spectrum by receiving the data stream in the uncompressed compression format, splitting the data stream into a first part and a second part, transmitting the first part via a first transceiver that operates on the first spectrum, and transmitting the second part via a second transceiver that operates on the second spectrum.

In Example 735, the subject matter of Example 734 can optionally include wherein the router is configured to transmit or receive the data stream in the uncompressed compression format with the first spectrum and the second spectrum by receiving a first part of the data stream in the uncompressed compression format from a first transceiver that operates on the first spectrum, receiving a second part of the data stream in the uncompressed compression format from a second transceiver that operates on the second spectrum, and recombining the first part and the second part to obtain the data stream in the uncompressed compression format.

In Example 736, the subject matter of Example 734 or 735 can optionally further include the first transceiver and the second transceiver.

In Example 737, the subject matter of Example 736 can optionally further include a first antenna and a second antenna, wherein the first transceiver is configured to wirelessly transmit and receive with the first antenna on the first spectrum and the second transceiver is configured to wirelessly transmit and receive with the second antenna on the second spectrum.

In Example 738, the subject matter of any one of Examples 733 to 737 can optionally further include a digital compression processor configured to receive the data stream from a stream application before the router transmits or receives the data stream in the first compression format, apply the first compression format to the data stream, and provide the data stream in the first compression format to the router.

In Example 739, the subject matter of Example 738 can optionally further include the stream application, wherein the stream application is configured to generate the data stream in its initial format.

In Example 740, the subject matter of any one of Examples 733 to 737 can optionally further include a digital compression processor configured to receive the data stream from the router in the first compression format after the router receives the data stream in the first compression format, and to revert the first compression format.

In Example 741, the subject matter of Example 740 can optionally further include a stream application, wherein the digital compression processor is configured to provide the data stream to the stream application after reverting the first compression format.

Example 742 is a terminal device including a first transceiver configured to transmit and receive on first spectrum, a second transceiver configured to transmit and receive on second spectrum, a router configured to transmit or receive a data stream in a first compression format on the first spectrum via the first transceiver, and a controller configured to detect a triggering condition based on a power status of the communication device or a latency parameter of the data stream, and to select a second compression format, the router further configured to transmit or receive the data stream in the second compression format with the first spectrum and the second spectrum with the first transceiver and the second transceiver.

Example 743 is a terminal device including a first transceiver configured to transmit and receive on first spectrum, a second transceiver configured to transmit and receive on second spectrum, a router configured to transmit or receive a data stream in a first compression format on the first spectrum via the first transceiver, and a controller configured to detect a triggering condition based on a power status of the communication device or a latency parameter of the data stream, and to select an uncompressed compression format, the router further configured to transmit or receive the data stream in the uncompressed compression format with the first spectrum and the second spectrum with the first transceiver and the second transceiver.

Example 744 is a method of transferring a data stream at a communication device, the method including transmitting or receiving a data stream in a first compression format with first spectrum, detecting a triggering condition based on a power status of the communication device or a latency parameter of the data stream, and selecting a second compression format and second spectrum, and transmitting or receiving the data stream in the second compression format with the first spectrum and the second spectrum.

In Example 745, the subject matter of Example 744 can optionally include wherein the power status is a remaining battery power level of the communication device, and wherein detecting the triggering condition includes comparing the remaining battery power level to a battery power level threshold and detecting the triggering condition if the remaining battery power level is less than the battery power level threshold.

In Example 746, the subject matter of Example 744 can optionally include wherein the power status is a power-saving mode indicator that indicates whether a power-saving mode of the communication device is enabled, and wherein detecting the triggering condition includes detecting the triggering condition if the power-saving mode indicator indicates that the power-saving mode is enabled.

In Example 747, the subject matter of Example 744 can optionally include wherein the latency parameter of the data stream is a measured latency of the data stream, and wherein detecting the triggering condition includes comparing the measured latency to a predefined latency threshold and detecting the triggering condition if the measured latency is greater than the predefined latency threshold.

In Example 748, the subject matter of any one of Examples 744 to 747 can optionally further include applying the second compression format to the data stream to obtain the data stream in the second compression format, wherein transmitting or receiving the data stream in the second compression format with the first spectrum and the second spectrum includes splitting the data stream into a first part and a second part, transmitting the first part via a first transceiver that operates on the first spectrum, and transmitting the second part via a second transceiver that operates on the second spectrum.

In Example 749, the subject matter of Example 748 can optionally include wherein the second compression format is an uncompressed compression format, and wherein applying the second compression format to the data stream includes allowing the data stream to pass through without compression processing.

In Example 750, the subject matter of Example 748 or 749 can optionally further include generating the data stream at the stream application.

In Example 751, the subject matter of any one of Examples 744 to 747 can optionally include wherein transmitting or receiving the data stream in the second compression format with the first spectrum and the second spectrum includes receiving a first part of the data stream in the second compression format from a first transceiver that operates on the first spectrum, receiving a second part of the data stream in the second compression format from a second transceiver that operates on the second spectrum, and recombining the first part and the second part to obtain the data stream in the second compression format.

In Example 752, the subject matter of Example 751 can optionally further include reverting the second compression format to obtain the data stream.

In Example 753, the subject matter of Example 752 can optionally include wherein the second compression format is an uncompressed compression format, and wherein reverting the second compression format includes allowing the data stream to pass through without decompression processing.

In Example 754, the subject matter of any one of Examples 744 to 753 can optionally include wherein transfer of the data stream in the second compression format has a higher data rate demand than transfer of the data stream in the first compression format, and wherein the controller is configured to identify the second spectrum based on the higher data rate demand.

In Example 755, the subject matter of any one of Examples 744 to 754 can optionally include wherein the second compression format is an uncompressed compression format.

In Example 756, the subject matter of any one of Examples 744 to 754 can optionally include wherein the second compression format is a compressed compression format.

In Example 757, the subject matter of any one of Examples 744 to 756 can optionally include wherein the second compression format is more power efficient than the first compression format.

In Example 758, the subject matter of any one of Examples 744 to 757 can optionally include wherein the second compression format has lower latency than the first compression format.

In Example 759, the subject matter of any one of Examples 744 to 758 can optionally include wherein the second compression format has lower compression efficiency than the first compression format.

Example 760 is a method of transferring a data stream at a communication device, the method including transmitting or receiving a data stream in a first compression format with first spectrum, detecting a triggering condition based on a power status of the communication device or a latency parameter of the data stream, and selecting an uncompressed compression format and second spectrum, and transmitting or receiving the data stream in the uncompressed compression format with the first spectrum and the second spectrum.

In Example 761, the subject matter of Example 760 can optionally include wherein transmitting or receiving the data stream in the uncompressed compression format with the first spectrum and the second spectrum includes splitting the data stream into a first part and a second part, transmitting the first part via a first transceiver that operates on the first spectrum, and transmitting the second part via a second transceiver that operates on the second spectrum.

In Example 762, the subject matter of Example 761 can optionally further include generating the data stream at a stream application of the communication device before splitting the data stream.

In Example 763, the subject matter of Example 761 or 762 can optionally further include applying the first compression format to the data stream before transmitting or receiving the data stream in the first compression format.

In Example 764, the subject matter of Example 761 can optionally include wherein transmitting or receiving the data stream in the uncompressed compression format with the first spectrum and the second spectrum includes receiving a first part of the data stream in the uncompressed compression format from a first transceiver that operates on the first spectrum, receiving a second part of the data stream in the uncompressed compression format from a second transceiver that operates on the second spectrum, and recombining the first part and the second part to obtain the data stream in the uncompressed compression format.

In Example 765, the subject matter of Example, can optionally include including reverting the first compression format after receiving the data stream in the first compression format.

Example 766 is a non-transitory computer readable medium storing instructions that when executed by one or more processors cause the one or more processors to perform the method of any one of Examples 744 to 765.

Example 767 is a device including one or more processors, and a memory storing instructions that when executed by the one or more processors cause the one or more processors to perform the method of any one of Examples 744 to 765.

Example 768 is a communication device including one or more processors configured to transmit or receive a data stream in a first compression format with first spectrum, detect a triggering condition based on a power status of the communication device or a latency parameter of the data stream, and select a second compression format and second spectrum, and transmit or receive the data stream in the second compression format with the first spectrum and the second spectrum.

Example 769 is a communication device including one or more processors configured to transmit or receive a data stream in a first compression format with first spectrum, detect a triggering condition based on a power status of the communication device or a latency parameter of the data stream, and select an uncompressed compression format and second spectrum, and transmit or receive the data stream in the uncompressed compression format with the first spectrum and the second spectrum.

Example 770 is a communication device including means for transmitting or receiving a data stream in a first compression format with first spectrum, means for detecting a triggering condition based on a power status of the communication device or a latency parameter of the data stream, and selecting a second compression format and second spectrum, and means for transmitting or receiving the data stream in the second compression format with the first spectrum and the second spectrum.

Example 771 is a communication device including means for transmitting or receiving a data stream in a first compression format with first spectrum, means for detecting a triggering condition based on a power status of the communication device or a latency parameter of the data stream, and selecting an uncompressed compression format and second spectrum, and means for transmitting or receiving the data stream in the uncompressed compression format with the first spectrum and the second spectrum.

Example 772 is a method of flying an aerial vehicle for station-keeping relative to a target zone, the method including determining a target zone based on one or more targets, determining a flight path for the aerial vehicle within the target zone, the flight path including a first path in which the aerial vehicle follows a same direction as a headwind having a first velocity and a second path in which the aerial vehicle moves in a direction against a headwind having a second velocity less than the first velocity, and flying the aerial vehicle along the flight path.

In Example 773, the subject matter of Example 772 can optionally include wherein the aerial vehicle includes an application system.

In Example 774, the subject matter of any one of Examples 772 or 773 can optionally include wherein the one or more targets change location over time.

In Example 775, the subject matter of any one of Examples 772-774 can optionally further include operating the application system with the one or more targets.

In Example 776, the subject matter of any one of Examples 772-775 can optionally include wherein the target zone is based on a maximum range of the application system operating with the one or more targets.

In Example 777, the subject matter of any one of Examples 772-776 can optionally include wherein the target zone further includes a target location based on an optimal range of the application system operating with the one or more targets.

In Example 778, the subject matter of any one of Examples 772-777 can optionally further include flying the aerial vehicle along the flight path with a ground speed based on one-half the difference of the first velocity and the second velocity.

In Example 779, the subject matter of any one of Examples 772-778 can optionally include wherein the first path is at a first altitude and the second path is at a second altitude lower than the first altitude.

In Example 780, the subject matter of any one of Examples 772-779 can optionally include wherein the flight path further includes an ascent path to the first altitude and a descent path to the second altitude.

In Example 781, the subject matter of any one of Examples 772-780 can optionally include wherein the first path and/or the second path has a greater horizontal distance than a vertical distance of the ascent path and/or the descent path.

In Example 782, the subject matter of any one of Examples 772-781 can optionally include wherein a charging station for the aerial vehicle is located along the flight path.

In Example 783, the subject matter of any one of Examples 772-782 can optionally include wherein the application system includes a mobile access point.

In Example 784, the subject matter of any one of Examples 772-783 can optionally include wherein the application system includes a sensing system.

Example 785 is a method of flying an aerial vehicle including a mobile access point along a flight path, the method including determining a target zone based on one or more terminal devices that are configured to communicate with the mobile access point, determining a flight path for the aerial vehicle within the target zone, the flight path including a first path in which the aerial vehicle follows a same direction as a headwind having a first velocity and a second path in which the aerial vehicle moves in a direction against a headwind having a second velocity less than the first velocity, and flying the aerial vehicle along the flight path.

In Example 786, the subject matter of Example 785 can optionally include wherein the target zone is based on a maximum communication range of the mobile access point.

In Example 787, the subject matter of any one of Examples 785 or 786 can optionally include wherein the target zone is based on a communication quality parameter for communications with the one or more terminal devices.

In Example 788, the subject matter of any one of Examples 785-787 can optionally include wherein the target zone further includes a target location based on a predefined threshold of a communication quality parameter threshold for communications with the one or more terminal devices.

In Example 789, the subject matter of any one of Examples 787 or 788 can optionally include wherein the communication quality parameter is based on a signal strength indicator.

In Example 790, the subject matter of any one of Examples 787-789 can optionally include wherein the communication quality parameter is based on a signal quality indicator.

In Example 791, the subject matter of any one of Examples 785-790 can optionally include wherein the one or more terminal devices change location over time.

In Example 792, the subject matter of any one of Examples 785-791 can optionally further include flying the aerial vehicle along the flight path with a ground speed based on one-half the difference of the first velocity and the second velocity.

In Example 793, the subject matter of any one of Examples 785-792 can optionally include wherein the first path is at a first altitude and the second path is at a second altitude lower than the first altitude.

In Example 794, the subject matter of any one of Examples 785-793 can optionally include wherein the flight path further includes an ascent path to the first altitude and a descent path to the second altitude.

In Example 795, the subject matter of any one of Examples 785-794 can optionally include wherein the first path and/or the second path has a greater horizontal distance than a vertical distance of the ascent path and/or the descent path.

In Example 796, the subject matter of any one of Examples 785-795, wherein a charging station for the aerial vehicle is located along the flight path.

In Example 797, the subject matter of any one of Examples 785-796 can optionally further include communicating with the one or more terminal devices in the target zone.

Example 798 is an aerial vehicle including an application system including a mobile access point configured to communicate with one or more terminal devices, a processor configured to determine a target zone based on the one or more terminal devices, determine a flight path for the aerial vehicle within the target zone, the flight path including first path in which the aerial vehicle follows a same direction as a headwind having a first velocity and a second path in which the aerial vehicle moves in a direction against a headwind having a second velocity less than the first velocity, and an aviation system configured to fly the aerial vehicle along the flight path.

In Example 799, the subject matter of Example 798 can optionally include wherein the target zone is based on a maximum communication range of the mobile access point.

In Example 800, the subject matter of any one of Examples 798 or 799 can optionally include wherein the target zone is based on a communication quality parameter for communications with the one or more terminal devices.

In Example 801, the subject matter of any one of Examples 798-800 can optionally include wherein the target zone further includes a target location based on a predefined threshold of a communication quality parameter threshold for communications with the one or more terminal devices.

In Example 802, the subject matter of any one of Examples 800 or 801 can optionally include wherein the communication quality parameter is based on a signal strength indicator.

In Example 803, the subject matter of any one of Examples 800-802 can optionally include wherein the communication quality parameter is based on a signal quality indicator.

In Example 804, the subject matter of any one of Examples 798-803 can optionally include wherein the one or more terminal devices change location over time.

In Example 805, the subject matter of any one of Examples 798-804 can optionally include wherein the aviation system is further configured to fly the aerial vehicle along the flight path with a ground speed based on one-half the difference of the first velocity and the second velocity.

In Example 806, the subject matter of any one of Examples 798-805 can optionally include wherein the first path is at a first altitude and the second path is at a second altitude lower than the first altitude.

In Example 807, the subject matter of any one of Examples 798-806 can optionally include wherein the flight path further includes an ascent path to the first altitude and a descent path to the second altitude.

In Example 808, the subject matter of any one of Examples 798-807 can optionally include wherein the first path and/or the second path has a greater horizontal distance than a vertical distance of the ascent path and/or the descent path.

In Example 809, the subject matter of any one of Examples 798-808 can optionally include wherein a charging station for the aerial vehicle is located along the flight path.

In Example 810, the subject matter of any one of Examples 798-809 can optionally further include a flight structure configured to be extended or retracted based on an airspeed of the aerial vehicle.

Example 811 is an aerial vehicle for station-keeping relative to a target zone, the aerial vehicle including a means for determining a target zone based on one or more targets, a means for determining a flight path for the aerial vehicle within the target zone, the flight path including a first path in which the aerial vehicle follows a same direction as a headwind having a first velocity and a second path in which the aerial vehicle moves in a direction against a headwind having a second velocity less than the first velocity, and a means for flying the aerial vehicle along the flight path.

In Example 812, the subject matter of Example 811 can optionally further include a means for interacting with the one or more targets.

In Example 813, the subject matter of any one of Examples 811 or 812 can optionally include wherein the one or more targets change location over time.

In Example 814, the subject matter of any one of Examples 811-813 can optionally include wherein the target zone is based on a maximum range of the application system operating with the one or more targets.

In Example 815, the subject matter of any one of Examples 811-814 can optionally include wherein the target zone further includes a target location based on an optimal range of the application system operating with the one or more targets.

In Example 816, the subject matter of any one of Examples 811-815 can optionally further include a means for flying the aerial vehicle along the flight path with a ground speed based on one-half the difference of the first velocity and the second velocity.

In Example 817, the subject matter of any one of Examples 811-816 can optionally include wherein the first path is at a first altitude and the second path is at a second altitude lower than the first altitude.

In Example 818, the subject matter of any one of Examples 811-817 can optionally include wherein the flight path further includes an ascent path to the first altitude and a descent path to the second altitude.

In Example 819, the subject matter of any one of Examples 811-818 can optionally include wherein the first path and/or the second path has a greater horizontal distance than a vertical distance of the ascent path and/or the descent path.

In Example 820, the subject matter of any one of Examples 811-819 can optionally include wherein a charging station for the aerial vehicle is located along the flight path.

Example 821 is an aerial vehicle including a communications means along a flight path, the method including a means for determining a target zone based on one or more terminal devices that are configured to communicate with the communications means, a means for determining a flight path for the aerial vehicle within the target zone, the flight path including a first path in which the aerial vehicle follows a same direction as a headwind having a first velocity and a second path in which the aerial vehicle moves in a direction against a headwind having a second velocity less than the first velocity, and a means for flying the aerial vehicle along the flight path.

In Example 822, the subject matter of Example 821 can optionally include wherein the target zone is based on a maximum communication range of the communications means.

In Example 823, the subject matter of any one of Examples 821 or 822 can optionally include wherein the target zone is based on a communication quality parameter for communications with the one or more terminal devices.

In Example 824, the subject matter of any one of Examples 821-823 can optionally include wherein the target zone further includes a target location based on a predefined threshold of a communication quality parameter threshold for communications with the one or more terminal devices.

In Example 825, the subject matter of any one of Examples 823 or 824 can optionally include wherein the communication quality parameter is based on a signal strength indicator.

In Example 826, the subject matter of any one of Examples 823-825 can optionally include wherein the communication quality parameter is based on a signal quality indicator.

In Example 827, the subject matter of any one of Examples 821-826 can optionally include wherein the one or more terminal devices change location over time.

In Example 828, the subject matter of any one of Examples 821-827 can optionally further include a means for flying the aerial vehicle along the flight path with a ground speed based on one-half the difference of the first velocity and the second velocity.

In Example 829, the subject matter of any one of Examples 821-828 can optionally include wherein the first path is at a first altitude and the second path is at a second altitude lower than the first altitude.

In Example 830, the subject matter of any one of Examples 821-829 can optionally include wherein the flight path further includes an ascent path to the first altitude and a descent path to the second altitude.

In Example 831, the subject matter of any one of Examples 821-830 can optionally include wherein the first path and/or the second path has a greater horizontal distance than a vertical distance of the ascent path and/or the descent path.

In Example 832, the subject matter of any one of Examples 821-831 can optionally include wherein a charging station for the aerial vehicle is located along the flight path.

In Example 833, the subject matter of any one of Examples 821-832 can optionally further include a means for communicating with the one or more terminal devices in the target zone.

Example 834 is a method of controlling a flight formation of a plurality of aerial vehicles each including an application system, aviation system, and a power source, the method including determining individual application system energy consumption requirements for the plurality of aerial vehicles, determining individual aviation system energy consumption requirements for the plurality of aerial vehicles, determining a flight formation for the plurality of aerial vehicles, the flight formation including an aerial vehicle with the lowest application system energy consumption requirement flying in a position of the flight formation requiring the highest aviation system energy consumption requirement, and arranging the plurality of aerial vehicles in the flight formation.

In Example 835, the subject matter of Example 834 can optionally include including adjusting positions of the plurality of aerial vehicles within the flight formation based on changing individual application system energy consumption requirements of the plurality of aerial vehicles.

In Example 836, the subject matter of Example 834 can optionally include wherein the application system includes a mobile access point.

In Example 837, the subject matter of any one of Examples 834 or 835 can optionally include wherein the application system includes a sensing system.

In Example 838, the subject matter of any one of Examples 834 or 835 can optionally include wherein the flight formation includes the plurality of aerial vehicles in a line in a direction of flight.

In Example 839, the subject matter of any one of Examples 834 or 835 can optionally include wherein the flight formation includes the plurality of aerial vehicles in a V-shape.

Example 840 is a means for controlling a flight formation of a plurality of aerial vehicles each including an application system, aviation system, and a power source, the method including a means for determining individual application system energy consumption requirements for the plurality of aerial vehicles, a means for determining individual aviation system energy consumption requirements for the plurality of aerial vehicles, a means for determining a flight formation for the plurality of aerial vehicles, the flight formation including an aerial vehicle with the lowest application system energy consumption requirement flying in a position of the flight formation requiring the highest aviation system energy consumption requirement, and a means for arranging the plurality of aerial vehicles in the flight formation.

In Example 841, the subject matter of Example 840 can optionally include including adjusting positions of the plurality of aerial vehicles within the flight formation based on changing individual application system energy consumption requirements of the plurality of aerial vehicles.

In Example 842, the subject matter of Example 840 can optionally include wherein the application system includes a mobile access point.

In Example 843, the subject matter of any one of Examples 840 or 841 can optionally include wherein the application system includes a sensing system.

In Example 844, the subject matter of any one of Examples 840 or 842 can optionally include wherein the flight formation includes the plurality of aerial vehicles in a line in a direction of flight.

In Example 845, the subject matter of any one of Examples 840 or 842 can optionally include wherein the flight formation includes the plurality of aerial vehicles in a V-shape.

Example 846 is a flight formation controller for a plurality of aerial vehicles each including an application system, aviation system, and a power source, the flight formation controller including a receiver configured to receive individual application system energy consumption requirements for the plurality of aerial vehicles and individual aviation system energy consumption requirements for the plurality of aerial vehicles, a processor configured to determine a flight formation for the plurality of aerial vehicles, the flight formation including an aerial vehicle with the lowest application system energy consumption requirement flying in a position of the flight formation requiring the highest aviation system energy consumption requirement, and a transmitter to send information indicating the flight formation to the plurality of aerial vehicles.

In Example 847, the subject matter of Example 846 can optionally include wherein the processor is further configured to adjust positions of the plurality of aerial vehicles within the flight formation based on changing individual application system energy consumption requirements of the plurality of aerial vehicles.

In Example 848, the subject matter of Example 846 can optionally include wherein the application system includes a mobile access point.

In Example 849, the subject matter of any one of Examples 846 or 847 can optionally include wherein the application system includes a sensing system.

In Example 850, the subject matter of any one of Examples 846 or 847 can optionally include wherein the flight formation includes the plurality of aerial vehicles in a line in a direction of flight.

In Example 851, the subject matter of any one of Examples 846 or 847 can optionally include wherein the flight formation includes the plurality of aerial vehicles in a V-shape.

Example 852 is an aerial vehicle including an aviation system configured to control flight of the aerial vehicle, an application system including an application device, the application system configured to control the application device, a power source configured to provide energy for the aviation system and the application system, a transmitter to send individual application system energy consumption requirements for the aerial vehicle and individual aviation system energy consumption requirements for the aerial vehicle, a receiver configured to receive information indicating a flight formation for a plurality of aerial vehicles that includes the aerial vehicle, with the flight formation including an aerial vehicle with the lowest application system energy consumption requirement flying in a position of the flight formation requiring the highest aviation system energy consumption requirement, and the aviation system further configured to control the aerial vehicle to take position in the flight formation based on the information indicating the flight formation.

In Example 853, the subject matter of Example 852 can optionally include wherein the receiver is further configured to receive an indication to adjust position of the aerial vehicle within the flight formation based on changing individual application system energy consumption requirements of the plurality of aerial vehicles.

In Example 854, the subject matter of Example 852 can optionally include wherein the application device includes a mobile access point.

In Example 855, the subject matter of any one of Examples 852 or 853 can optionally include wherein the application device includes a sensing system.

In Example 856, the subject matter of any one of Examples 852 or 853 can optionally include wherein the flight formation includes the plurality of aerial vehicles in a line in a direction of flight.

In Example 857, the subject matter of any one of Examples 852 or 853 can optionally include wherein the flight formation includes the plurality of aerial vehicles in a V-shape.

Example 858 is a method of flying an aerial vehicle including a mobile access point along a flight path, the method including configuring the mobile access point as a relay for a network access node and to communicate with one or more terminal devices, handing over communication of the one or more terminal devices from the network access node to the mobile access point, determining a target zone based on the one or more terminal devices, determining a flight path for the aerial vehicle within the target zone, and flying the aerial vehicle along the flight path.

In Example 859, the subject matter of Example 858 can optionally include wherein the aerial vehicle follows the one or more terminal devices within the target zone to a coverage area of a further network access node.

In Example 860, the subject matter of any one of Examples 858-859 can optionally further include flying the aerial vehicle back to the network access node after escorting the one or more terminal devices to the coverage area of the further network access node.

In Example 861, the subject matter of any one of Examples 858-860 can optionally include wherein the one or more terminals travel along a predefined route.

In Example 862, the subject matter of Example 861 can optionally include wherein the predefined route is based on a terrestrial transportation route.

In Example 863, the subject matter of any one of Examples 861 or 862 can optionally include wherein the terrestrial transportation route is over land.

In Example 864, the subject matter of any one of Examples 861-863 can optionally include wherein the terrestrial transportation route is over water.

In Example 865, the subject matter of any one of Examples 861-864 can optionally include wherein the predefined route is based on an aviation transportation route.

In Example 866, the subject matter of any one of Examples 861-865 can optionally include wherein the predefined route is based on an astronautic transportation route.

In Example 867, the subject matter of any one of Examples 858-866 can optionally include wherein the target zone is based on a maximum communication range of the mobile access point.

In Example 868, the subject matter of any one of Examples 858-867 can optionally include wherein the target zone is based on a communication quality parameter for communications with the one or more terminal devices.

In Example 869, the subject matter of any one of Examples 858-868 can optionally include wherein the target zone further includes a target location based on a predefined threshold of a communication quality parameter for communications with the one or more terminal devices.

In Example 870, the subject matter of any one of Examples 868 or 869 can optionally include wherein the communication quality parameter is based on a signal strength indicator.

In Example 871, the subject matter of any one of Examples 868-870 can optionally include wherein the communication quality parameter is based on a signal quality indicator.

In Example 872, the subject matter of any one of Examples 858-871 can optionally include wherein the one or more terminal devices change location overtime.

In Example 873, the subject matter of any one of Examples 858-872 can optionally further include flying the aerial vehicle along the flight path with a ground speed based on one-half the difference of the first velocity and the second velocity.

In Example 874, the subject matter of any one of Examples 858-873 can optionally include wherein the first path is at a first altitude and the second path is at a second altitude lower than the first altitude.

In Example 875, the subject matter of any one of Examples 858-874 can optionally include wherein the flight path further includes an ascent path to the first altitude and a descent path to the second altitude.

In Example 876, the subject matter of any one of Examples 858-875 can optionally include wherein the first path and/or the second path has a greater horizontal distance than a vertical distance of the ascent path and/or the descent path.

In Example 877, the subject matter of any one of Examples 858-876 can optionally include wherein a charging station for the aerial vehicle is located along the flight path.

In Example 878, the subject matter of any one of Examples 858-877 can optionally further include communicating with the one or more terminal devices in the target zone.

Example 879 is an aerial vehicle including a mobile access point configured to fly along a flight path, the aerial vehicle including a means for configuring the mobile access point as a relay for a network access node and to communicate with one or more terminal devices, a means for handing over communication of the one or more terminal devices from the network access node to the mobile access point, a means for determining a target zone based on the one or more terminal devices, a means for determining a flight path for the aerial vehicle within the target zone, and a means for flying the aerial vehicle along the flight path.

In Example 880, the subject matter of Example 879 can optionally include wherein the aerial vehicle follows the one or more terminal devices within the target zone to a communication area of a further network access node.

In Example 881, the subject matter of any one of Examples 879-880 can optionally further include flying the aerial vehicle back to the network access node after escorting the one or more terminal devices to the communication area of the further network access node.

In Example 882, the subject matter of any one of Examples 879-881 can optionally include wherein the one or more terminals travel along a predefined route.

In Example 883, the subject matter of Example 882 can optionally include wherein the predefined route is based on a terrestrial transportation route.

In Example 884, the subject matter of any one of Examples 882 or 883 can optionally include wherein the terrestrial transportation route is over land.

In Example 885, the subject matter of any one of Examples 882-884 can optionally include wherein the terrestrial transportation route is over water.

In Example 886, the subject matter of any one of Examples 882-885 can optionally include wherein the predefined route is based on an aviation transportation route.

In Example 887, the subject matter of any one of Examples 882-886 can optionally include wherein the predefined route is based on an astronautic transportation route.

In Example 888, the subject matter of any one of Examples 879-887 can optionally include wherein the target zone is based on a maximum communication range of the mobile access point.

In Example 889, the subject matter of any one of Examples 879-888 can optionally include wherein the target zone is based on a communication quality parameter for communications with the one or more terminal devices.

In Example 890, the subject matter of any one of Examples 879-889 can optionally include wherein the target zone further includes a target location based on a predefined threshold of a communication quality parameter threshold for communications with the one or more terminal devices.

In Example 891, the subject matter of any one of Examples 889 or 890 can optionally include wherein the communication quality parameter is based on a signal strength indicator.

In Example 892, the subject matter of any one of Examples 889-891 can optionally include wherein the communication quality parameter is based on a signal quality indicator.

In Example 893, the subject matter of any one of Examples 879-892 can optionally include wherein the one or more terminal devices change location over time.

In Example 894, the subject matter of any one of Examples 879-893 can optionally further include a means for flying the aerial vehicle along the flight path with a ground speed based on one-half the difference of the first velocity and the second velocity.

In Example 895, the subject matter of any one of Examples 879-894 can optionally include wherein the first path is at a first altitude and the second path is at a second altitude lower than the first altitude.

In Example 896, the subject matter of any one of Examples 879-895 can optionally include wherein the flight path further includes an ascent path to the first altitude and a descent path to the second altitude.

In Example 897, the subject matter of any one of Examples 879-896 can optionally include wherein the first path and/or the second path has a greater horizontal distance than a vertical distance of the ascent path and/or the descent path.

In Example 898, the subject matter of any one of Examples 879-897 can optionally include wherein a charging station for the aerial vehicle is located along the flight path.

Example 899 is an aerial vehicle including a mobile access point configured as a relay for a network access node and configured to communicate with one or more terminal devices, a processor configured to determine a target zone based on the one or more terminal devices and determine a flight path for the aerial vehicle within the target zone, and an aviation system configured to fly the aerial vehicle along the flight path.

In Example 900, the subject matter of Example 899 can optionally include wherein the target zone follows the one or more terminal devices to a communication area of a further network access node.

In Example 901, the subject matter of any one of Examples 899-900 can optionally include wherein the processor is further configured to control the aviation system to fly the aerial vehicle back to the network access node after escorting the one or more terminal devices to the communication area of the further network access node.

In Example 902, the subject matter of any one of Examples 899-901 can optionally include wherein the one or more terminals travel along a predefined route.

In Example 903, the subject matter of Example 902 can optionally include wherein the predefined route is based on a terrestrial transportation route.

In Example 904, the subject matter of any one of Examples 902 or 903 can optionally include wherein the terrestrial transportation route is over land.

In Example 905, the subject matter of any one of Examples 902-904 can optionally include wherein the terrestrial transportation route is over water.

In Example 906, the subject matter of any one of Examples 902-905 can optionally include wherein the predefined route is based on an aviation transportation route.

In Example 907, the subject matter of any one of Examples 902-906 can optionally include wherein the predefined route is based on an astronautic transportation route.

In Example 908, the subject matter of any one of Examples 899-907 can optionally include wherein the target zone is based on a maximum communication range of the mobile access point.

In Example 909, the subject matter of any one of Examples 899-908 can optionally include wherein the target zone is based on a communication quality parameter for communications with the one or more terminal devices.

In Example 910, the subject matter of any one of Examples 899-909 can optionally include wherein the target zone further includes a target location based on a predefined threshold of a communication quality parameter threshold for communications with the one or more terminal devices.

In Example 911, the subject matter of any one of Examples 909 or 910 can optionally include wherein the communication quality parameter is based on a signal strength indicator.

In Example 912, the subject matter of any one of Examples 909-911 can optionally include wherein the communication quality parameter is based on a signal quality indicator.

In Example 913, the subject matter of any one of Examples 899-912 can optionally include wherein the one or more terminal devices change location over time.

In Example 914, the subject matter of any one of Examples 899-913 can optionally include wherein the processor is further configured to control the aviation system to fly the aerial vehicle along the flight path with a ground speed based on one-half the difference of the first velocity and the second velocity.

In Example 915, the subject matter of any one of Examples 899-914 can optionally include wherein the first path is at a first altitude and the second path is at a second altitude lower than the first altitude.

In Example 916, the subject matter of any one of Examples 899-915 can optionally include wherein the flight path further includes an ascent path to the first altitude and a descent path to the second altitude.

In Example 917, the subject matter of any one of Examples 899-916 can optionally include wherein the first path and/or the second path has a greater horizontal distance than a vertical distance of the ascent path and/or the descent path.

In Example 918, the subject matter of any one of Examples 899-917 can optionally include wherein a charging station for the aerial vehicle is located along the flight path.

Example 919 is a network access node configured to communicate with one or more terminals, the network access node including an aerial vehicle, the aerial vehicle including a mobile access point configured as a relay for the network access node and configured to communicate with the one or more terminal devices, a processor configured to determine a target zone based on the one or more terminal devices and determine a flight path for the aerial vehicle within the target zone, and an aviation system configured to fly the aerial vehicle along the flight path, the network access node further including a transceiver configured to communicate with the one or more terminals, a network access node processor configured to hand over communication of the one or more terminal devices to the aerial vehicle.

In Example 920, the subject matter of Example 919 can optionally include wherein the target zone follows the one or more terminal devices to a communication area of a further network access node.

In Example 921, the subject matter of any one of Examples 919-920 can optionally include wherein the processor is further configured to control the aviation system to fly the aerial vehicle back to the network access node after escorting the one or more terminal devices to the communication area of the further network access node.

In Example 922, the subject matter of any one of Examples 919-921 can optionally include wherein the one or more terminals travel along a predefined route.

In Example 923, the subject matter of Example 922 can optionally include wherein the predefined route is based on a terrestrial transportation route.

In Example 924, the subject matter of any one of Examples 922 or 923 can optionally include wherein the terrestrial transportation route is over land.

In Example 925, the subject matter of any one of Examples 922-924 can optionally include wherein the terrestrial transportation route is over water.

In Example 926, the subject matter of any one of Examples 922-925 can optionally include wherein the predefined route is based on an aviation transportation route.

In Example 927, the subject matter of any one of Examples 922-926 can optionally include wherein the predefined route is based on an astronautic transportation route.

In Example 928, the subject matter of any one of Examples 919-927 can optionally include wherein the target zone is based on a maximum communication range of the mobile access point.

In Example 929, the subject matter of any one of Examples 919-928 can optionally include wherein the target zone is based on a communication quality parameter for communications with the one or more terminal devices.

In Example 930, the subject matter of any one of Examples 919-929 can optionally include wherein the target zone further includes a target location based on a predefined threshold of a communication quality parameter threshold for communications with the one or more terminal devices.

In Example 931, the subject matter of any one of Examples 929 or 930 can optionally include wherein the communication quality parameter is based on a signal strength indicator.

In Example 932, the subject matter of any one of Examples 929-931 can optionally include wherein the communication quality parameter is based on a signal quality indicator.

In Example 933, the subject matter of any one of Examples 919-932 can optionally include wherein the one or more terminal devices change location over time.

In Example 934, the subject matter of any one of Examples 919-933 can optionally include wherein the processor is further configured to control the aviation system to fly the aerial vehicle along the flight path with a ground speed based on one-half the difference of the first velocity and the second velocity.

In Example 935, the subject matter of any one of Examples 919-934 can optionally include wherein the first path is at a first altitude and the second path is at a second altitude lower than the first altitude.

In Example 936, the subject matter of any one of Examples 919-935 can optionally include wherein the flight path further includes an ascent path to the first altitude and a descent path to the second altitude.

In Example 937, the subject matter of any one of Examples 919-936 can optionally include wherein the first path and/or the second path has a greater horizontal distance than a vertical distance of the ascent path and/or the descent path.

In Example 938, the subject matter of any one of Examples 919-937 can optionally include wherein a charging station for the aerial vehicle is located along the flight path.

Example 939 is an aerial vehicle including a rotatable structure including an airfoil, a generator coupled with the rotatable structure, a battery coupled with the generator, the rotatable structure configured to generate electricity that charges the battery when air passing over the airfoil causes the rotatable structure and the generator to rotate.

Example 940 is a method of charging an aerial vehicle including a rotatable structure including an airfoil, a generator coupled with the rotatable structure, a battery coupled with the generator, the rotatable structure configured to generate electricity that charges the battery when air passing over the airfoil causes the rotatable structure and the generator to rotate, the method including determining a flight path for the aerial vehicle including a descent, flying the aerial vehicle in the descent along the flight path at a velocity that air passing over the airfoil turns the rotatable structure and the generator to generate electricity, and storing the electricity in the battery.

Example 941 is an aerial vehicle including a rotatable structure including an airfoil, a generator coupled with the rotatable structure, a battery coupled with the generator, the rotatable structure configured to generate electricity that charges the battery when air passing over the airfoil causes the rotatable structure and the generator to rotate, the aerial vehicle including a means for determining a flight path for the aerial vehicle including a descent, a means for flying the aerial vehicle in the descent along the flight path at a velocity that air passing over the airfoil turns the rotatable structure and the generator to generate electricity, and a means for storing the electricity in the battery.

Example 942 is a method of charging an aerial vehicle including a rotatable structure including an airfoil, a generator coupled with the rotatable structure, a battery coupled with the generator, the rotatable structure configured to generate electricity that charges the battery when air passing over the airfoil causes the rotatable structure and the generator to rotate, the method including fixing the aerial vehicle to a structure in a wind with air passing over the airfoil that turns the rotatable structure and the generator to generate electricity, and storing the electricity in the battery.

Example 943 is an aerial vehicle including a rotatable structure including an airfoil, a generator coupled with the rotatable structure, a battery coupled with the generator, the rotatable structure configured to generate electricity that charges the battery when air passing over the airfoil causes the rotatable structure and the generator to rotate, the aerial vehicle including a means for fixing the aerial vehicle to a structure in a wind with air passing over the airfoil that turns the rotatable structure and the generator to generate electricity, and a means for storing the electricity in the battery.

Example 944 is a method of charging an aerial vehicle including a rotatable structure including an airfoil, a generator coupled with the rotatable structure, a battery coupled with the generator, the rotatable structure configured to generate electricity that charges the battery when air passing over the airfoil causes the rotatable structure and the generator to rotate, the method including fixing the aerial vehicle to a further aerial vehicle, transporting the aerial vehicle with the further aerial vehicle with air passing over the airfoil that turns the rotatable structure and the generator to generate electricity, and storing the electricity in the battery.

Example 945 is an aerial vehicle including a rotatable structure including an airfoil, a generator coupled with the rotatable structure, a battery coupled with the generator, the rotatable structure configured to generate electricity that charges the battery when air passing over the airfoil causes the rotatable structure and the generator to rotate, the aerial vehicle including a means for fixing the aerial vehicle to a further aerial vehicle, a means for transporting the aerial vehicle with the further aerial vehicle with air passing over the airfoil that turns the rotatable structure and the generator to generate electricity, and a means for storing the electricity in the battery.

Example 946 is a non-transitory computer readable medium storing instructions that when executed by one or more processors cause the one or more processors to perform the method of any one of Examples 772 to 797, 834 to 839, 858 to 878, 940, 942, or 944.

Example 947 is a device including one or more processors, and a memory storing instructions that when executed by the one or more processors cause the one or more processors to perform the method of any one of Examples 772 to 797, 834 to 839, 858 to 878, 940, 942, or 944.

In Example 948, a communication device, including a receiver configured to receive a first signal, comprising a pilot symbol, from a second communication device; a generator configured to generate a first transmission symbol, wherein the first transmission symbol is transmitted, via the transmitter, at the same time and frequency as the received pilot symbol; a channel estimator configured to perform a channel estimate based on the received pilot symbol; a link adapter configured to modify a first data based on the channel estimate; and a transmitter is configured to transmit the modified first data to the second communication device.

In Example 949, the subject matter of Example 948 may include wherein the first transmission symbol is a transmission pilot symbol.

In Example 950, the subject matter of Example 948 may include wherein the first transmission symbol is a data symbol.

In Example 951, the subject matter of Examples 948-950 may include wherein modifying the first data comprises pre-equalizing the first data.

In Example 952, the subject matter of Examples 948-951 may include wherein modifying the first data comprises pre-coding the first data.

In Example 953, the subject matter of Example 952 may include wherein pre-coding the first data comprises coding the first data according to a modulation and coding scheme (MCS) index.

In Example 954, the subject matter of Examples 948-953 may include wherein modifying the first data comprises selecting a sub-frequency carrier band to transmit the pre-equalized first data.

In Example 955, the subject matter of Examples 948-954 may include the generator configured to generate the first transmission symbol to be orthogonal to the pilot symbol.

In Example 956, the subject matter of Examples 948-955 may include an interference reducer configured to reduce an interference in the received pilot symbol resulting from the transmission of the first transmission symbol.

In Example 957, the subject matter of Example 956 may include wherein the channel estimator is configured to perform the channel estimate based on the received pilot symbol with the reduced interference.

In Example 958, a communication arrangement including a first communication device configured to transmit a downlink signal comprising one or more downlink pilot symbols; a second communication device configured to receive a first downlink pilot symbol of the one or more downlink pilot symbols; transmit a first uplink symbol at the same time and frequency as the first downlink pilot symbol; perform a channel estimation based on the received first downlink pilot symbol; modify a data based on the channel estimation; and transmit the modified data to the first communication device.

In Example 959, the subject matter of Example 958 may include wherein the first communication device is a small cell network access node.

In Example 960, the subject matter of Examples 958-959 may include wherein the second communication device is a user terminal device.

In Example 961, the subject matter of Examples 958-960 may include wherein the first uplink symbol is an uplink pilot symbol.

In Example 962, the subject matter of Examples 958-961 may include wherein the first uplink symbol is an uplink data symbol.

In Example 963, the subject matter of Examples 958-962 may include wherein modifying the data comprises pre-equalizing the first data.

In Example 964, the subject matter of Examples 958-963 may include wherein modifying the data comprises pre-coding the data.

In Example 965, the subject matter of Example 964 may include wherein the pre-coding comprises coding the data according to a modulation and coding scheme (MCS) index.

In Example 966, the subject matter of Examples 958-965 may include wherein modifying the data comprises selecting a sub-frequency carrier band to transmit the pre-equalized data.

In Example 967, the subject matter of Examples 958-966 may include the second communication device configured to transmit the first uplink symbol so that it is orthogonal to the first downlink pilot symbol.

In Example 968, the subject matter of Examples 958-967 may include the second communication device further configured to reduce an interference in the received first downlink pilot symbol resulting from the transmission of the first uplink symbol.

In Example 969, the subject matter of Example 968 may include wherein the channel estimation is performed based on the received first downlink pilot symbol with the reduced interference.

In Example 970, a method for a first device to communicate with a second device, the method including: generating a first transmission symbol at the first device; receiving a first signal, comprising a pilot symbol, at the first device from the second device; transmitting the first transmission symbol at the same time and frequency as the received pilot symbol to the second device; performing a channel estimate based on the received pilot symbol at the first device; modifying a first data based on the channel estimate at the first device; and transmitting the modified first data to the second communication device.

In Example 971, the subject matter of Example 970 may include wherein the first transmission symbol is a transmission pilot symbol.

In Example 972, the subject matter of Example 970 may include wherein the first transmission symbol is a data symbol.

In Example 973, the subject matter of Examples 970-972 may include wherein modifying the first data comprises pre-equalizing the first data.

In Example 974, the subject matter of Examples 970-973 may include wherein modifying the first data comprises pre-coding the first data.

In Example 975, the subject matter of Example 974 may include wherein the pre-coding comprises coding the first data according to a modulation and coding scheme (MCS) index.

In Example 976, the subject matter of Examples 970-975 may include wherein modifying the first data comprises selecting a sub-frequency carrier band to transmit the pre-equalized first data.

In Example 977, the subject matter of Examples 970-976 may include generating the first transmission symbol to be orthogonal to the pilot symbol.

In Example 978, the subject matter of Examples 970-977 may include reducing an interference in the received pilot symbol resulting from the transmission of the first transmission symbol.

In Example 979, the subject matter of Example 978 may include wherein performing the channel estimate is based on the received pilot symbol with the reduced interference.

In Example 980, a communication device including a receiver configured to one or more attach requests from one or more other communication devices; a processor configured to determine a criteria from the one or more attach requests; and assign at least one of the one or more attach requests to a respective cluster identification based on its determined criteria, wherein the cluster identification is allocated a respective set of resources from a total resource pool; a transmitter configured to transmit the cluster identification to at least one of the one or more other communication devices.

In Example 981, the subject matter of Example 980 may include wherein the communication device is a network access node.

In Example 982, the subject matter of Example 981 may include wherein the network access node is a small cell network access node.

In Example 983, the subject matter of Examples 980-982 may include wherein the criteria comprises a power level.

In Example 984, the subject matter of Examples 980-983 may include wherein the criteria comprises a location.

In Example 985, the subject matter of Examples 980-984 may include wherein the respective cluster identification is generated in response to the determined criteria.

In Example 986, the subject matter of Examples 980-984 may include wherein the respective cluster identification is retrieved from a previously generated cluster identification.

In Example 987, a communication device including a processor configured to generate an attach request to another communication device, wherein the attach request comprises a device state information; transmit the attach request to the other communication device; receive a cluster identification from the other communication device, wherein the cluster identification is based on the device state information; and modify its transmission and/or reception signal processing based on the cluster identification.

In Example 988, the subject matter of Example 987 may include a transceiver.

In Example 989, the subject matter of Examples 987-988 may include wherein the device state information comprises a location information.

In Example 990, the subject matter of Examples 987-989 may include wherein the device state information comprises an information for determining a signal power.

In Example 991, the subject matter of Examples 987-990 may include wherein the signal processing comprises transmitting signals at a specified time and/or frequency.

In Example 992, a method for wireless communication, the method including transmitting an attach request from a first device to a second device; determining a criteria for the attach request received at the second device; assigning the attach request to a respective cluster identification based on the determined criteria, wherein the cluster identification is allocated a respective set of resources from a total resource pool; transmitting the cluster identification from the second device to the first device; and modifying the first device's transmission and/or reception signal processing based on the cluster identification.

In Example 993, the subject matter of Example 992 may include wherein the device state information comprises a location information.

In Example 994, the subject matter of Examples 992-993 may include wherein the device state information comprises an information for determining a signal power.

In Example 995, the subject matter of Examples 992-994 may include wherein the signal processing comprises transmitting signals at a specified time and/or frequency.

In Example 996, one or more non-transitory computer-readable media storing instructions thereon that, when executed by at least one processor, direct the at least one processor to perform a method according to Examples 970-979 or 992-995.

In Example 997, a device including a processor; and a memory storing instructions that when executed by the processor cause the processor to perform the method of any one of Examples 970-979 or 992-995.

In Example 998, a communication device including means for receiving a first signal, comprising a pilot symbol, from a second communication device; means for transmitting; means for generating a first transmission symbol, wherein the first transmission symbol is transmitted, via the transmitting means, at the same time and frequency as the received pilot symbol; means for performing channel estimate based on the received pilot symbol; and means for modifying a first data based on the channel estimate; wherein the means for transmitting transmits the modified first data to the second communication device.

In Example 999, a communication device including an antenna configured to receive a plurality of signals, wherein each signal of the plurality of signals is transmitted from a respective terminal device; and a waveform regulator configured to regulate the plurality of signals, wherein the regulation comprises harmonizing at least one offset among the plurality of signals; wherein the antenna is configured with a fixed antenna pattern for broadcasting the harmonized plurality of signals over a target area.

In Example 1000, the subject matter of Example 999 may include wherein the waveform regulator includes a time offset corrector configured to correct a time offset in the plurality of signals.

In Example 1001, the subject matter of Example 1000 may include wherein the time offset corrector is configured to correlate each of the plurality of signals with a standard pattern.

In Example 1002, the subject matter of Example 1001 may include wherein the standard pattern is a Primary Synchronization Signal (PSS) and/or a Secondary Synchronization Signal (SSS).

In Example 1003, the subject matter of Examples 999-1002 may include wherein the waveform regulator includes a frequency offset corrector configured to correct a frequency offset in the plurality of signals.

In Example 1004, the subject matter of Example 1003 may include wherein the frequency offset corrector includes a frequency offset estimator.

In Example 1005, the subject matter of Examples 1003-1004 may include wherein the frequency offset corrector includes a frequency offset compensator.

In Example 1006, the subject matter of Examples 999-1005 may include wherein the waveform regulator includes a power offset corrector configured to correct a power offset in the plurality of signals.

In Example 1007, the subject matter of Example 1006 may include wherein the power offset corrector includes a power level determiner configured to determine a power level of each of the plurality of signals and a power equalizer configured to equalize the determined power levels.

In Example 1008, a communication arrangement including a plurality of communication devices, wherein each communication device of the plurality of communication devices includes: an antenna configured to receive a plurality of signals, wherein each signal of the plurality of signals is transmitted from a respective terminal device; a waveform regulator configured to regulate the plurality of signals, wherein the regulation comprises harmonizing at least one offset among the plurality of signals; wherein the antenna is configured with a fixed antenna pattern for broadcasting the harmonized plurality of signals over a respective target area.

In Example 1009, the subject matter of Example 1008 may include wherein the respective target area of each communication device of the plurality of communication devices covers a respective portion of an overall area of interest.

In Example 1010, the subject matter of Examples 1008-1009 may include wherein the respective target areas of each communication device comprises at least one proximately located other communication device of the plurality of communication devices.

In Example 1011, the subject matter of Examples 1008-1010 may include wherein the waveform regulator comprises a time offset corrector configured to correct a time offset in the plurality of signals.

In Example 1012, the subject matter of Examples 1008-1011 may include wherein the time offset corrector is configured to correlate each of the plurality of signals with a standard pattern.

In Example 1013, the subject matter of Example 1012 may include wherein the standard pattern is a Primary Synchronization Signal (PSS) and/or a Secondary Synchronization Signal (SSS).

In Example 1014, the subject matter of Examples 1008-1013 may include wherein the waveform regulator comprises a frequency offset corrector configured to correct a frequency offset in the plurality of signals.

In Example 1015, the subject matter of Example 1014 may include wherein the frequency offset corrector comprises a frequency offset estimator.

In Example 1016, the subject matter of Examples 1014-1015 may include wherein the frequency offset corrector comprises a frequency offset compensator.

In Example 1017, the subject matter of Examples 1008-1016 may include wherein the waveform regulator comprises a power offset corrector configured to correct a power offset in the plurality of signals.

In Example 1018, the subject matter of Example 1017 may include wherein the power offset corrector comprises a power level determiner configured to determine a power level of each of the plurality of signals.

In Example 1019, a method for wireless communications, the method including receiving plurality of signals, wherein each signal of the plurality of signals is transmitted from a respective terminal device; regulating the plurality of signals, wherein the regulation comprises harmonizing at least one offset among the plurality of signals; and broadcasting the regulated plurality of signals over a fixed target area.

In Example 1020, the subject matter of Example 1019 may include correcting a time offset in the plurality of signals.

In Example 1021, the subject matter of Example 1020 may include wherein correcting the time offset comprises correlating each of the plurality of signals with a standard pattern.

In Example 1022, the subject matter of Example 1021 may include wherein the standard pattern is a Primary Synchronization Signal (PSS) and/or a Secondary Synchronization Signal (SSS).

In Example 1023, the subject matter of Examples 1019-1022 may include correcting a frequency offset in the plurality of signals.

In Example 1024, the subject matter of Example 1023 may include wherein correcting the frequency offset comprises estimating the frequency offset among the plurality of signals.

In Example 1025, the subject matter of Examples 1023-1024 may include wherein correcting the frequency offset comprises compensating for the estimated frequency offset among the plurality of signals.

In Example 1026, the subject matter of Examples 1019-1025 may include correcting a power offset in the plurality of signals.

In Example 1027, the subject matter of Example 1026 may include wherein correcting the power offset comprises determining a power level of each of the plurality of signals and equalizing the power of the plurality of signals.

In Example 1028, one or more non-transitory computer-readable media storing instructions thereon that, when executed by at least one processor, direct the at least one processor to perform a method according to Examples 1019-1027.

In Example 1029, a device including: a processor; and a memory storing instructions that when executed by the processor cause the processor to perform the method of any one of Examples 1019-1027.

In Example 1030, a communication device including means for receiving a plurality of signals, wherein each signal of the plurality of signals is transmitted from a respective terminal device; means for regulating the plurality of signals, wherein the regulation comprises harmonizing at least one offset among the plurality of signals; and means for broadcasting the harmonized plurality of signals over a target area.

In Example 1031, a small cell communication arrangement including a small cell network access node configured to provide access to a network; a plurality of remote radio heads (RRHs) in communication with the small cell network access node, wherein each of the plurality of RRHs is configured to serve as an interface for terminal devices in a respective target area of the small cell with the small cell network access node.

In Example 1032, the subject matter of Example 1031 may include wherein each of the plurality of RRHs comprises an antenna configured to with a fixed pattern to cover the RRHs respective target area.

In Example 1033, the subject matter of Examples 1031-1032 may include wherein the small cell network access node is configured as a synchronization source for the plurality of RRHs.

In Example 1034, the subject matter of Example 1031 may include wherein the small cell network access node is configured to enable or disable one or more of the plurality of RRHs based on a detected activity in the one or more of the plurality of RRHs respective target area.

In Example 1035, a method for deploying a small cell communication arrangement, the method including deploying a small cell network access node configured to provide access to a network; deploying a plurality of remote radio heads (RRHs) in communication with the small cell network access node, wherein each of the plurality of RRHs is configured to serve as an interface for terminal devices in a respective target area of the small cell with the small cell network access node.

In Example 1036, a communication device for translating a first radio access technology (RAT) signal into a second RAT signal, the communication device including a receiver configured to receive a first RAT signal, wherein the first RAT signal comprises unvarying symbols and unique symbols; a memory configured to store a look up table comprising second RAT symbols corresponding to processed unvarying symbols of the first RAT; a processor configured to: retrieve at least one second RAT symbol from the memory; process the unique symbols of the first RAT signal in order to output corresponding symbols for the second RAT; and combine the retrieved at least one second RAT symbol with the output corresponding symbols to generate the second RAT signal.

In Example 1037, the subject matter of Example 1036 may include a transmitter configured to transmit the second RAT signal.

In Example 1038, a method for translating a first radio access technology (RAT) signal into a second RAT signal, the method including: receiving a first RAT signal, wherein the first RAT signal comprises unvarying symbols and unique symbols; retrieving at least one second RAT symbol from the memory, wherein the memory is memory configured to store a look up table comprising second RAT symbols corresponding to processed unvarying symbols of the first RAT; processing the unique symbols of the first RAT signal in order to output corresponding symbols for the second RAT; and combining the retrieved at least one second RAT symbol with the output corresponding symbols to generate the second RAT signal.

In Example 1039, the subject matter of Example 1038 may include transmitting the second RAT signal.

In Example 1040, one or more non-transitory computer-readable media storing instructions thereon that, when executed by at least one processor, direct the at least one processor to perform a method according to Examples 1038-1039.

In Example 1041, a device including: a processor; and a memory storing instructions that when executed by the processor cause the processor to perform the method of any one of Examples 1038-1039.

In Example 1042, a communication device for translating a first radio access technology (RAT) signal into a second RAT signal, the communication device including: means for receiving a first RAT signal, wherein the first RAT signal comprises unvarying symbols and unique symbols; means for retrieving at least one second RAT symbol from the memory, wherein the memory is memory configured to store a look up table comprising second RAT symbols corresponding to processed unvarying symbols of the first RAT; means for processing the unique symbols of the first RAT signal in order to output corresponding symbols for the second RAT; and means for combining the retrieved at least one second RAT symbol with the output corresponding symbols to generate the second RAT signal.

In Example 1043, a communication device including a processor configured to trigger a transition to an RRC diagnostics mode, wherein the RRC diagnostics mode comprises determining a status of one or more signal processing components of the communication device; determine if the status passes or fails an evaluation criterion; if the status fails the evaluation criterion, switch to an RRC calibration mode, wherein the RRC calibration mode comprises communicating one or more calibration signals between the communication device and a network access node.

In Example 1044, the subject matter of Example 1043 may include the processor further configured to measure a performance criteria of the one or more signal processing components based on the one or more calibration signals.

In Example 1045, the subject matter of Example 1044 may include, the processor further configured to adjust one or more radio frequency parameters of the one or more signal processing components based on measured performance criteria.

In Example 1046, the subject matter of Example 1045 may include the processor further configured to repeat the communicating of the one or more calibration signals, the measuring of the performance criteria, and the adjusting of the one or more radio frequency parameters until a condition is met.

In Example 1047, the subject matter of Example 1046 may include wherein the condition is passing the evaluation criterion.

In Example 1048, the subject matter of Examples 1043-1047 may include wherein the communicating of the one or more calibration signals comprises receiving, at the communication device, the calibration signals from the network access node.

In Example 1049, the subject matter of Example 1048 may include wherein the one or more radio frequency parameters comprises radio reception parameters.

In Example 1050, the subject matter of Example 1049 may include wherein the radio reception parameters comprises at least one of: S-parameters for an antenna tuner of the communication device, low oscillator frequency tuning, or analog gain values.

In Example 1051, the subject matter of Examples 1043-1047 may include wherein the communicating of the one or more calibration signals comprises transmitting, from the communication device, the calibration signals to the network access node.

In Example 1052, the subject matter of Example 1051 may include wherein the one or more radio frequency parameters comprises radio transmission parameters.

In Example 1053, the subject matter of Examples 1051-1052 may include wherein the radio transmission parameters comprises at least one of: a transmit power offset, a transmit DC-DC path-delay, or a transmit power amplifier distortion value.

In Example 1054, the subject matter of Examples 1043-1053 may include the processor further configured to identify the one or more signal processing components wherein calibration of the one or more signal processing components fails the RRC calibration mode.

In Example 1055, the subject matter of Example 1054 may include the processor configured to replace the one or more signal processing components.

In Example 1056, the subject matter of Examples 1043-1055 may include wherein the RRC diagnostics mode is triggered by the network access node.

In Example 1057, the subject matter of Examples 1043-1055 may include wherein the RRC diagnostics mode is triggered by the communication device.

In Example 1058, the subject matter of Examples 1043-1057 may include wherein the RRC diagnostics mode is triggered by a timer.

In Example 1059, the subject matter of Examples 1043-1057 may include wherein the RRC diagnostics mode is triggered by an application layer.

In Example 1060, the subject matter of Examples 1043-1057 may include wherein the RRC diagnostics mode is triggered by a key performance indicator (KPI).

In Example 1061, the subject matter of Example 1060 may include wherein the KPI is at least one of: a frequency offset error estimated by the communication device or the network access node, an error vector magnitude (EVM) measurement by a communication device receiver or a network access node receiver, or a Spur measurement in the communication device downlink reception with the network access node.

In Example 1062, the subject matter of Examples 1043-1061 may include wherein the network access node is a small cell network access node.

In Example 1063, a method for calibrating a communication device, the method including triggering a transition to an RRC diagnostics mode, wherein the RRC diagnostics mode comprises determining a status of one or more signal processing components of the communication device; determining if the status passes or fails an evaluation criterion; if the status fails the evaluation criterion, switching to an RRC calibration mode, wherein the RRC calibration mode comprises communicating one or more calibration signals between the communication device and a network access node.

In Example 1064, the subject matter of Example 1063 may include measuring a performance criteria of the one or more signal processing components based on the one or more calibration signals.

In Example 1065, the subject matter of Example 1064 may include adjusting one or more radio frequency parameters of the one or more signal processing components based on measured performance criteria.

In Example 1066, the subject matter of Example 1065 may include repeating the communicating of the one or more calibration signals, the measuring of the performance criteria, and the adjusting of the one or more radio frequency parameters until a condition is met.

In Example 1067, the subject matter of Example 1066 may include wherein the condition is passing the evaluation criterion.

In Example 1068, the subject matter of Examples 1063-1067 may include wherein the communicating of the one or more calibration signals comprises receiving, at the communication device, the calibration signals from the network access node.

In Example 1069, the subject matter of Example 1068 may include wherein the one or more radio frequency parameters comprises radio reception parameters.

In Example 1070, the subject matter of Example 1069 may include wherein the radio reception parameters comprises at least one of: S-parameters for an antenna tuner of the communication device, low oscillator frequency tuning, or analog gain values.

In Example 1071, the subject matter of Examples 1063-1067 may include wherein the communicating of the one or more calibration signals comprises transmitting, from the communication device, the calibration signals to the network access node.

In Example 1072, the subject matter of Example 1071 may include wherein the one or more radio frequency parameters comprises radio transmission parameters.

In Example 1073, the subject matter of Examples 1071-1072 may include wherein the radio transmission parameters comprises at least one of: a transmit power offset, a transmit DC-DC path-delay, or a transmit power amplifier distortion value.

In Example 1074, the subject matter of Examples 1063-1073 may include identifying the one or more signal processing components wherein calibration of the one or more signal processing components fails the RRC calibration mode.

In Example 1075, the subject matter of Example 1074 may replacing the one or more signal processing components.

In Example 1076, the subject matter of Examples 1063-1075 may include wherein the RRC diagnostics mode is triggered by the network access node.

In Example 1077, the subject matter of Examples 1063-1075 may include wherein the RRC diagnostics mode is triggered by the communication device.

In Example 1078, the subject matter of Examples 1063-1077 may include wherein the RRC diagnostics mode is triggered by a timer.

In Example 1079, the subject matter of Examples 1063-1077 may include wherein the RRC diagnostics mode is triggered by an application layer.

In Example 1080, the subject matter of Examples 1063-1077 may include wherein the RRC diagnostics mode is triggered by a key performance indicator (KPI).

In Example 1081, the subject matter of Example 1080 may include wherein the KPI is at least one of: a frequency offset error estimated by the communication device or the network access node, an error vector magnitude (EVM) measurement by a communication device receiver or a network access node receiver, or a Spur measurement in the communication device downlink reception with the network access node.

In Example 1082, the subject matter of Examples 1063-1081 may include wherein the network access node is a small cell network access node.

In Example 1083, one or more non-transitory computer-readable media storing instructions thereon that, when executed by at least one processor, direct the at least one processor to perform a method according to Example 1063-1082.

In Example 1084, a device including a processor; and a memory storing instructions that when executed by the processor cause the processor to perform the method of any one of Examples 1063-1082.

In Example 1085, a communication device including means for triggering a transition to an RRC diagnostics mode, wherein the RRC diagnostics mode comprises determining a status of one or more signal processing components of the communication device; means for determining if the status passes or fails an evaluation criterion; means for, if the status fails the evaluation criterion, switching to an RRC calibration mode, wherein the RRC calibration mode comprises communicating one or more calibration signals between the communication device and a network access node.

In Example 1086, a communication device comprising a plurality radio access technology (RAT) links and a processor configured to: determine a status of each of a plurality of RAT links of the communication device; rank the determined statuses of the plurality of RAT links; and select a RAT link to communicate a message based on the ranking In Example 1087, a method for selecting a radio access technology (RAT) link from a plurality of RAT links of a communication device to communicate a message, the method including determining a status of each of a plurality of RAT links of the communication device; ranking the determined statuses of the plurality of RAT links; and selecting the RAT link to communicate the message based on the ranking.

In Example 1088, one or more non-transitory computer-readable media storing instructions thereon that, when executed by at least one processor, direct the at least one processor to perform a method according to Example 1087.

In Example 1089, a device including: a processor; and a memory storing instructions that when executed by the processor cause the processor to perform the method of Example 1087.

In Example 1090, a communication device including means for determining a status of each of a plurality of RAT links of the communication device; means for ranking the determined statuses of the plurality of RAT links; and means for selecting the RAT link to communicate the message based on the ranking.

In Example 1091, a communication device including an identifier configured to identify one or more regular users based on a user criteria; a determiner configured to determine usage characteristics of the identified one or more regular users; and an adjuster configured to allocate resources of the communication device, provide a specific service, or perform a link adaptation based on the usage characteristics.

In Example 1092, the subject matter of Example 1091 may include wherein the user criteria comprises past user communication behavior with the communication device.

In Example 1093, the subject matter of Example 1092 may include wherein past user behavior comprises timing information including at least one of a start time, an end time, a frequency, or a duration which the identified one or more users is in communication with the communication device.

In Example 1094, the subject matter of Examples 1092-1093 may include wherein past user behavior comprises usage information comprising at least one of latency requirements, data rate requirements, data traffic type requirements, or data type.

In Example 1095, the subject matter of Examples 1091-1094 may include the identifier configured to group a plurality of identified users into a user group.

In Example 1096, the subject matter of Example 1095 may include wherein the adjuster configured to allocate resources of the communication device, provide the specific service, or perform the link adaptation in a similar manner to all of the identified users in the user group.

In Example 1097, the subject matter of Examples 1091-1096 may include wherein the past user behavior comprises a location information.

In Example 1098, the subject matter of Example 1097 may include wherein the adjuster is configured to perform the link adaptation based on the location information.

In Example 1099, the subject matter of Examples 1091-1098 may include a user monitor configured to monitor the identified user behavior and track any changes to the user criteria.

In Example 1100, the subject matter of Example 1099 may include wherein the determiner is configured to determine updated usage characteristics based on tracked changes to the user criteria.

In Example 1101, the subject matter of Example 1100 may include wherein the adjuster is configured to allocate resources of the communication device, provide a specific service, or perform a link adaptation based on the updated usage characteristics.

In Example 1102, the subject matter of Example 1091-1101 may include wherein the communication device is a small cell network access node.

In Example 1103, the subject matter of Example 1102 may include wherein the small cell network access node is configured to store the user criteria and usage characteristics in a database.

In Example 1104, the subject matter of Example 1103 may include wherein the small cell network access node is configured to share the database with other network access nodes.

In Example 1105, the subject matter of Examples 1102-1104 may include wherein the small cell network access node comprises software reconfigurable resources.

In Example 1106, the subject matter of Example 1105 may include wherein the software reconfigurable resources include field programmable gate arrays (FPGAs) and/or Digital Signal Processors (DSPs).

In Example 1107, the subject matter of Examples 1105-1106 may include wherein the adjuster is configured to program the software reconfigurable resources with executable code in order to allocate resources of the communication device, provide a specific service, or perform a link adaptation based on the usage characteristics.

In Example 1108, a method for a network access node to interact with users, the method including: identifying one or more regular users based on a user criteria; determining usage characteristics of the identified one or more regular users; and allocating resources of the network access node, providing a specific service, or performing a link adaptation based on the usage characteristics.

In Example 1109, the subject matter of Example 1108 may include wherein the user criteria comprises past user communication behavior with the communication device.

In Example 1110, the subject matter of Example 1109 may include wherein past user behavior comprises timing information including at least one of a start time, an end time, a frequency, or a duration which the identified one or more users is in communication with the communication device.

In Example 1111, the subject matter of Examples 1109-1110 may include wherein past user behavior comprises usage information comprising at least one of latency requirements, data rate requirements, data traffic type requirements, or data type.

In Example 1112, the subject matter of Examples 1108-1111 may include the identifier configured to group a plurality of identified users into a user group.

In Example 1113, the subject matter of Example 1112 may include wherein the adjuster configured to allocate resources of the communication device, provide the specific service, or perform the link adaptation in a similar manner to all of the identified users in the user group.

In Example 1114, the subject matter of Examples 1108-1113 may include wherein the past user behavior comprises a location information.

In Example 1115, the subject matter of Example 1114 may include wherein the adjuster is configured to perform the link adaptation based on the location information.

In Example 1116, the subject matter of Examples 1108-1115 may include monitoring the identified user behavior; and tracking any changes to the user criteria.

In Example 1117, the subject matter of Example 1116 may include determining updated usage characteristics based on tracked changes to the user criteria.

In Example 1118, the subject matter of Example 1117 may include allocating resources of the communication device, providing a specific service, or performing a link adaptation based on the updated usage characteristics.

In Example 1119, the subject matter of Examples 1108-1118 may include storing the user criteria and usage characteristics in a database.

In Example 1120, the subject matter of Examples 1108-1119 may include wherein the network access node is a small cell network access node.

In Example 1121, the subject matter of Example 1120 may include wherein the small cell network access node is configured to share the database with other network access nodes.

In Example 1122, the subject matter of Examples 1120-1121 may include wherein the small cell network access node comprises software reconfigurable resources.

In Example 1123, the subject matter of Example 1122 may include wherein the software reconfigurable resources include field programmable gate arrays (FPGAs) and/or Digital Signal Processors (DSPs).

In Example 1124, the subject matter of Examples 1122-1123 may include programming the software reconfigurable resources with executable code in order to allocate resources of the communication device, provide a specific service, or perform a link adaptation based on the usage characteristics.

In Example 1125, one or more non-transitory computer-readable media storing instructions thereon that, when executed by at least one processor, direct the at least one processor to perform a method according to any one of Examples 1108-1124.

In Example 1126, a device including a processor; and a memory storing instructions that when executed by the processor cause the processor to perform the method of any one of Examples 1108-1124.

In Example 1127, a communication device including means for identifying one or more regular users based on a user criteria; means for determining usage characteristics of the identified one or more regular users; and means for allocating resources of the network access node, providing a specific service, or performing a link adaptation based on the usage characteristics.

In Example 1128, a network access node arrangement, including one or more dedicated network access nodes, wherein each dedicated network access node is configured to provide a specific optimized service; a master node configured to: receive a service request from a terminal device; identify a respective dedicated network access node from the one or more dedicated network access nodes configured to provide the request service; and redirect the terminal device to the respective dedicated network access node.

In Example 1129, a method wireless communication in a network access node arrangement comprising a master network access node and one or more dedicated network access nodes, the method including receiving, at the master network access node, a service request from a terminal device; identifying, at the master network access node, a respective dedicated network access from the one or more dedicated network access nodes configured to provide the request service; and redirecting the terminal device to the respective dedicated network access node.

In Example 1130, a network access node including: a receiver configured to receive a plurality of download requests from one or more users; a processor configured to assign a priority to each of the download requests; and sort the download requests based on their assigned priorities; and a transmitter configured to transmit one or more download requests to the network based on the sort; wherein the receiver is configured to receive executable code from the network in response to the one or more download requests, and wherein the processor is configured to download the executable code on a non-transitory computer-readable media of the network access node.

In Example 1131, the subject matter of Example 1130 may include the processor configured to retrieve the executable code and execute the executable code in response to a signal received from at least one of the one or more users.

In Example 1132, the subject matter of Examples 1130-1131 may include the processor configured to relay a portion of the executable code to the at least one of the one or more users.

In Example 1133, the subject matter of Example 1132 may include wherein the executable code is executed jointly by the processor and the at least one of the one or more users.

In Example 1134, the subject matter of Examples 1130-1133 may include wherein the network access node is a small cell network access node.

In Example 1135, the subject matter of Examples 1130-1134 may include wherein the executable code comprises code for an application.

In Example 1136, the subject matter of Examples 1130-1134 may include wherein the executable code comprises code for modifying a radio frequency (RF) capability of the network access node.

In Example 1137, the subject matter of Examples 1130-1134 may include wherein the executable code comprises code for modifying a signal processing component of the network access node.

In Example 1138, the subject matter of Examples 1130-1134 may include wherein the executable code comprises code for new channel coding schemes or turbo coding.

In Example 1139, the subject matter of Examples 1130-1138 may include wherein the assignor is configured to assign download requests comprising a safety information a higher priority than other download requests.

In Example 1140, the subject matter of Examples 1130-1139 may include wherein the assignor is configured to assign a higher priority to repeated download requests.

In Example 1141, the subject matter of Examples 1130-1140 may include wherein the assignor is configured to assign the priority to each of the download requests based on a status of the user who submitted the request.

In Example 1142, the subject matter of Example 1141 may include wherein the status of the user is based at least in part on a frequency which the user access the network access node In Example 1143, a method for configuring a network access node, the method including receiving a plurality of download requests from one or more users; assigning a priority to each of the download requests; sorting the download requests based on their assigned priorities; transmitting one or more download requests to the network based on the sort; receiving executable code from the network in response to the one or more download requests; and downloading the executable code on a non-transitory computer-readable media of the network access node and reconfiguring the network access node based on the downloaded executable code.

In Example 1144, the subject matter of Example 1143 may include retrieving the executable code and executing the executable code in response to a signal received from at least one of the one or more users.

In Example 1145, the subject matter of Examples 1143-1144 may include relaying a portion of the executable code to the at least one of the one or more users.

In Example 1146, the subject matter of Example 1145 may include wherein the executable code is executed jointly by the processor and the at least one of the one or more users.

In Example 1147, the subject matter of Examples 1143-1146 may include wherein the network access node is a small cell network access node.

In Example 1148, the subject matter of Examples 1143-1147 may include wherein the executable code comprises code for an application.

In Example 1149, the subject matter of Examples 1143-1147 may include wherein the executable code comprises code for modifying a radio frequency (RF) capability of the network access node.

In Example 1150, the subject matter of Examples 1143-1147 may include wherein the executable code comprises code for modifying a signal processing component of the network access node.

In Example 1151, the subject matter of Examples 1143-1147 may include wherein the executable code comprises code for new channel coding schemes or turbo coding.

In Example 1152, the subject matter of Examples 1143-1151 may include assigning download requests comprising a safety information a higher priority than other download requests.

In Example 1153, the subject matter of Examples 1143-1152 may include assigning a higher priority to repeated download requests.

In Example 1154, the subject matter of Examples 1143-1153 may include assigning the priority to each of the download requests based on a status of the user who submitted the request.

In Example 1155, the subject matter of Example 1154 may include wherein the status of the user is based at least in part on a frequency which the user access the network access node.

In Example 1156, one or more non-transitory computer-readable media storing instructions thereon that, when executed by at least one processor, direct the at least one processor to perform a method according to any one of Examples 1143-1155.

In Example 1157, a device including a processor; and a memory storing instructions that when executed by the processor cause the processor to perform the method of any one of Examples 1143-1155.

In Example 1158, a network access node including means for receiving a plurality of download requests from one or more users; means for assigning a priority to each of the download requests; means for sorting the download requests based on their assigned priorities; means for transmitting one or more download requests to the network based on the sorting; means for receiving executable code from the network in response to the one or more download requests; and means for downloading the executable code on a non-transitory computer-readable media of the network access node and reconfiguring the network access node based on the downloaded executable code.

In Example 1159, a communication device including a node detector configured to detect a plurality of nodes, wherein each node comprises a candidate for communications with the communication device; a processor configured to determine at least one of a mobility factor, coverage area factor, or a processing capability factor, for each node of the plurality of nodes; sort the plurality of nodes into a hierarchy based on its at least one determined factor; and communicate with at least a first node of the plurality of nodes based on the hierarchy.

In Example 1160, the subject matter of Example 1159 may include wherein the mobility factor is a node's movement.

In Example 1161, the subject matter of Example 1160 may include wherein the node's movement is used to determine whether a respective node is either a static node or a mobile node.

In Example 1162, the subject matter of Example 1161 may include wherein static nodes are fixed network infrastructure elements.

In Example 1163, the subject matter of Examples 1161-1162 may include wherein static nodes are further sorted into long range static nodes or short range static nodes based on the coverage area factor.

In Example 1164, the subject matter of Example 1163 may include wherein the coverage area factor comprises a node's communication range.

In Example 1165, the subject matter of Examples 1163-1164 may include wherein long range static nodes comprise macro cell network access nodes.

In Example 1166, the subject matter of Examples 1163-1165 may include wherein short range static nodes comprise Road Side Units (RSUs) or fixed small cell network access nodes.

In Example 1167, the subject matter of Example 1161 may include wherein mobile nodes comprise vehicular communication devices.

In Example 1168, the subject matter of Example 1167 may include wherein the mobility factor is used to determine whether a node has a similar movement pattern or a different movement pattern to that of the communication device.

In Example 1169, the subject matter of Example 1168 may include wherein the mobility factor comprises at least one of a velocity information, location information, or a Doppler Shift detection.

In Example 1170, the subject matter of Examples 1159-1169 may include wherein the hierarchy comprises a static node level and a mobile node level.

In Example 1171, the subject matter of Example 1170 may include wherein the static node level comprises long rage static nodes and short range static nodes.

In Example 1172, the subject matter of Examples 1170-1171 may include wherein the mobile node level comprises mobile nodes with a similar movement pattern to that of the communication device and mobile nodes with a different movement pattern to that of the communication device.

In Example 1173, the subject matter of Examples 1159-1172 may include wherein the hierarchy is modified based on one or more additional nodes detected by the node detector and each of the one or more additional nodes corresponding mobility factor, coverage area factor, and/or processing capability factor.

In Example 1174, a method for a communication device to perform wireless communications, the method including detecting a plurality of nodes; determining at least one of a mobility factor, coverage area factor, or a processing capability factor, for each node of the plurality of nodes; sorting the plurality of nodes into a hierarchy based on its at least one determined factor; and communicating with at least a first node of the plurality of nodes based on the hierarchy.

In Example 1175, the subject matter of Example 1174 may include wherein the mobility factor is a node's movement.

In Example 1176, the subject matter of Example 1175 may include classifying a respective node as a static node or a mobile node based on the respective node's movement.

In Example 1177, the subject matter of Example 1176 may include wherein static nodes are fixed network infrastructure elements.

In Example 1178, the subject matter of Examples 1176-1177 may include sorting static nodes into long range static nodes or short range static nodes based on the coverage area factor.

In Example 1179, the subject matter of Example 1178 may include wherein the coverage area factor comprises a node's communication range.

In Example 1180, the subject matter of Examples 1178-1179 may include wherein long range static nodes comprise macro cell network access nodes.

In Example 1181, the subject matter of Examples 1178-1180 may include wherein short range static nodes comprise Road Side Units (RSUs) or fixed small cell network access nodes.

In Example 1182, the subject matter of Example 1176 may include wherein mobile nodes comprise vehicular communication devices.

In Example 1183, the subject matter of Example 1182 may include determining whether a node has a similar movement pattern or a different movement pattern to that of the communication device based on the using the mobility factor.

In Example 1184, the subject matter of Example 1183 may include wherein the mobility factor comprises at least one of a velocity information, location information, or a Doppler Shift detection.

In Example 1185, the subject matter of Example 1174-1184 may include wherein the hierarchy comprises a static node level and a mobile node level.

In Example 1186, the subject matter of Example 1185 may include wherein the static node level comprises long rage static nodes and short range static nodes.

In Example 1187, the subject matter of Examples 1185-1186 may include wherein the mobile node level comprises mobile nodes with a similar movement pattern to that of the communication device and mobile nodes with a different movement pattern to that of the communication device.

In Example 1188, the subject matter of Examples 1174-1187 may include wherein the hierarchy is modified based on one or more additional nodes detected by the node detector and each of the one or more additional nodes corresponding mobility factor, coverage area factor, and/or processing capability factor.

In Example 1189, one or more non-transitory computer-readable media storing instructions thereon that, when executed by at least one processor, direct the at least one processor to perform a method according to any one of Examples 1174-1188.

In Example 1190, a device including a processor; and a memory storing instructions that when executed by the processor cause the processor to perform the method of any one of Examples 1174-1188.

In Example 1191, a communication device including means for detecting a plurality of nodes; means for determining at least one of a mobility factor, coverage area factor, or a processing capability factor, for each node of the plurality of nodes; means for sorting the plurality of nodes into a hierarchy based on its at least one determined factor; and means for communicating with at least a first node of the plurality of nodes based on the hierarchy.

Example 1192 is a communication device connected to a radio communication network, the communication device including one or more processors configured to apply one or more countermeasures based on an identification to modify one or more components; and a transceiver configured to communicate based on the performed one or more countermeasures.

In Example 1193, the subject matter of Example 1192 can optionally include the one or more processors being further configured to determine an occurrence of one or more events.

In Example 1194, the subject matter of Example 1193 can optionally include the one or more processors being further configured to identify the one or more components based on the occurrence of one or more events.

Example 1195 is a communication device connected to a radio communication network, the communication device including one or more processors configured to identify one or more components, and apply one or more countermeasures based on the identification to modify the one or more components; and a transceiver configured to communicate based on the performed one or more countermeasures.

In Example 1196, the subject matter of Example 1195 can optionally include the one or more processors being further configured to determine an occurrence of one or more events.

In Example 1197, the subject matter of Example 1196 can optionally include the one or more processors being configured to identify the one or more components based on the occurrence of the one or more events.

In Example 1198, the subject matter of any one of Examples 1192 to 1197 can optionally include the communication device being implemented as a terminal device.

In Example 1199, the subject matter of any one of Examples 1192 to 1198 can optionally include the communication device being implemented as a vehicular communication device In Example 1200, the subject matter of any one of Examples 1192 to 1197 can optionally include the communication device being implemented as a network access node.

In Example 1201, the subject matter of any one of Examples 1192 to 1200 can optionally include the one or more processors being further configured to initiate a diagnostic process in response to the occurrence of the one or more events.

In Example 1202, the subject matter of Example 1201 can optionally include the one or more processors being further configured to determine one or more initial conditions prior to initiating the diagnostic process.

In Example 1203, the subject matter of any one of Examples 1192 to 1202 can optionally include the one or more countermeasures includes disabling a component among the one or more components.

In Example 1204, the subject matter of Example 1203 can optionally include the one or more countermeasures includes activating a redundancy component in place of the disabled component.

In Example 1205, the subject matter of any one of Examples 1192 to 1204 can optionally include the one or more countermeasures includes an over-the-air update to modify the one or more components.

In Example 1206, the subject matter of any one of Examples 1192 to 1205 can optionally include the one or more countermeasures includes a calibration process to modify the one or more components In Example 1207, the subject matter of Example 1206 can optionally include the calibration process includes updating one or more parameters to modify the one or more components.

In Example 1208, the subject matter of any one of Examples 1192 to 1207 can optionally include the one or more processors being further configured to test a conformance of one or more components after applying the one or more countermeasures.

In Example 1209, the subject matter of any one of Examples 1206 to 1208 can optionally include the diagnostic process being implemented as a self-diagnostic process and/or the calibration process being implemented as a self-calibration process.

In Example 1210, the subject matter of any one of Examples 1201 to 1209 can optionally include the transceiver being further configured to provide a result of the diagnostic process to the radio communication network.

In Example 1211, the subject matter of any one of Examples 1201 to 1210 can optionally include the transceiver being further configured to provide a result of the diagnostic process to a terminal device.

In Example 1212 is a method for communication over a radio communication network, the method including applying one or more countermeasures based on an identification to modify one or more components; and communicating based on the performed one or more countermeasures.

In Example 1213, the subject matter of Example 1212, further including determining an occurrence of one or more events.

In Example 1214, the subject matter of Example 1213 can optionally include identifying the one or more components based on the occurrence of one or more events.

In Example 1215 is a method for communicating over a radio communication network, the method including identifying one or more components; applying one or more countermeasures based on the identification to modify the one or more components; and communicating based on the performed one or more countermeasures.

In Example 1216, the subject matter of Example 1215 further including determining an occurrence of one or more events.

In Example 1217, the subject matter of Example 1216 can optionally include identifying one or more components by identifying the one or more components based on the occurrence of the one or more events.

In Example 1218, the subject matter of any one of Examples 1212 to 1217 can optionally include the one or more components being included in a terminal device.

In Example 1219, the subject matter of any one of Examples 1212 to 1218 can optionally include the one or more components being included in a vehicular communication device In Example 1220, the subject matter of any one of Examples 1212 to 1217 can optionally include the one or more components being identified by a network access node.

In Example 1221, the subject matter of any one of Examples 1212 to 1220, further including initiating a diagnostic process in response to the occurrence of the one or more events.

In Example 1222, the subject matter of Example 1221, further including determining one or more initial conditions prior to initiating the diagnostic process.

In Example 1223, the subject matter of any one of Examples 1212 to 1222 can optionally include applying the one or more countermeasures includes disabling a component among the one or more components.

In Example 1224, the subject matter of Example 1223 can optionally include applying the one or more countermeasures includes activating a redundancy component in place of the disabled component.

In Example 1225, the subject matter of any one of Examples 1212 to 1224 can optionally include applying the one or more countermeasures includes applying an over-the-air update to modify the one or more components.

In Example 1226, the subject matter of any one of Examples 1212 to 1225 can optionally include applying the one or more countermeasures includes performing at least a portion of a calibration process to modify the one or more components.

In Example 1227, the subject matter of Example 1226 can optionally include performing at least a portion of the calibration process includes updating one or more parameters to modify the one or more components.

In Example 1228, the subject matter of any one of Examples 1212 to 66, further including testing a conformance of one or more components after applying the one or more countermeasures.

In Example 1229, the subject matter of any one of Examples 1226 to 1228 can optionally include at least one of the diagnostic process being implemented as a self-diagnostic process and/or the calibration process being implemented as a self-calibration process.

In Example 1230, the subject matter of any one of Examples 1221 to 1229, further including providing a result of the diagnostic process to the radio communication network.

In Example 1231, the subject matter of any one of Examples 1221 to 1230, further including providing a result of the diagnostic process to a terminal device.

In Example 1232 is a non-transitory computer readable medium storing instructions that when executed by a processor cause the processor to perform the method of: applying one or more countermeasures based on an identification to modify one or more components; and communicating based on the performed one or more countermeasures.

Example 1233 is a non-transitory computer readable medium storing instructions that when executed by a processor cause the processor to perform the method of: identifying one or more components; applying one or more countermeasures based on the identification to modify the one or more components; and communicating based on the performed one or more countermeasures.

Example 1234 is a non-transitory computer readable medium storing instructions that when executed by a processor cause the processor to perform the method of any one of Examples 1212 to 1231.

Example 1235 is a non-transitory computer readable medium storing instructions that when executed by processing circuitry of a computing device cause the computing device to perform the method of any one of Examples 1212 to 1231.

Example 1236 is a device including a processor; and a memory storing instructions that when executed by the processor cause the processor to perform the method of: applying one or more countermeasures based on an identification to modify one or more components; and communicating based on the performed one or more countermeasures.

Example 1237 is a device including a processor; and a memory storing instructions that when executed by the processor cause the processor to perform the method of: identifying one or more components; applying one or more countermeasures based on the identification to modify the one or more components; and communicating based on the performed one or more countermeasures.

Example 1238 is a device including a processor; and a memory storing instructions that when executed by the processor cause the processor to perform the method of any one of Examples 1212 to 1231.

Example 1239 is a communication device connected to a radio communication network, the communication device including means for applying one or more countermeasures based on an identification to modify one or more components; and means for communicating based on the performed one or more countermeasures.

Example 1240 is a communication device connected to a radio communication network, the communication device including means for identifying one or more components, and means for applying one or more countermeasures based on the identification to modify the one or more components; and means for communicating based on the performed one or more countermeasures.

Example 1241 is a communication device connected to a radio communication network, the communication device including one or more processors configured to perform at least a portion of a calibration process based on an identification to modify one or more components; and a transceiver configured to communicate based on a result of the calibration process.

In Example 1242, the subject matter of Example 1241 can optionally include the one or more processors being further configured to select between an unsupervised mode of operation and a supervised mode of operation based on whether a certificate is provided.

In Example 1243, the subject matter of Example 1242 can optionally include the one or more processors being further configured to identify the one or more components in accordance with the selected mode of operation.

Example 1244 is a communication device connected to a radio communication network, the communication device including one or more processors configured to identify one or more components, and perform at least a portion of a calibration process based on the identification to modify the one or more components; and a transceiver configured to communicate based on a result of the calibration process.

In Example 1245, the subject matter of Example 1244 can optionally include the one or more processors being further configured to select between an unsupervised mode of operation and a supervised mode of operation based whether a certificate is provided.

In Example 1246, the subject matter of Example 1245 can optionally include the one or more processors being configured to identify the one or more components in accordance with the selected mode of operation.

In Example 1247, the subject matter of any one of Examples 1241 to 1246 can optionally include the communication device being implemented as a terminal device.

In Example 1248, the subject matter of any one of Examples 1241 to 1247 can optionally include the communication device being implemented as a vehicular communication device In Example 1249, the subject matter of any one of Examples 1241 to 1246 can optionally include the communication device being implemented as a network access node.

In Example 1250, the subject matter of any one of Examples 1241 to 1249 can optionally include the one or more processors being further configured to initiate a diagnostic process based on one or more triggering conditions.

In Example 1251, the subject matter of Example 1250 can optionally include the transceiver being further configured to receive a diagnostic notification, and the received diagnostic notification indicates the communication device is to initiate to the diagnostic process.

In Example 1252, the subject matter of Example 1251 can optionally include the received diagnostic notification being from a terminal device, and the one or more processors being further configured to perform at least a portion of the diagnostic process based on the received diagnostic notification.

In Example 1253, the subject matter of Example 1251 can optionally include the received diagnostic notification being from the radio communication network, and the one or more processors being further configured to perform at least a portion of diagnostic process based on the received diagnostic notification.

In Example 1254, the subject matter of any one of Examples 1250 to 1253 can optionally include the transceiver being further configured to transmit one or more reference signals in accordance with the diagnostic process.

In Example 1255, the subject matter of any one of Examples 1250 to 1254 can optionally include the transceiver being further configured to receive one or more reference signals in accordance with the diagnostic process.

In Example 1256, the subject matter of any one of Examples 1250 to 1255 can optionally include the transceiver being further configured to receive a result of the diagnostic process based a comparison of the one or more reference signals, and the result of the diagnostic process includes the identification of the one or more components.

In Example 1257, the subject matter of any one of Examples 1250 to 1255 can optionally include the one or more processors being further configured to determine a result of the diagnostic process based on a comparison of the one or more received reference signals; and the result of the diagnostic process includes the identification of the one or more components.

In Example 1258, the subject matter of any one of Examples 1250 to 1257 can optionally include the diagnostic process being implemented as a self-diagnostic process.

In Example 1259, the subject matter of any one of Examples 1256 to 1258 can optionally include the transceiver being further configured to transmit the result of the diagnostic process to the radio communication network.

In Example 1260, the subject matter of any one of Examples 1256 to 1259 can optionally include the transceiver being further configured to transmit the result of the diagnostic process to the terminal device.

In Example 1261, the subject matter of any one of Examples 1256 to 1260 can optionally include the one or more processors being configured perform at least a portion of the calibration process in response to determining the result of the diagnostic process.

In Example 1262, the subject matter of any one of Examples 1241 to 1261 can optionally include the transceiver being configured to receive a calibration notification, and the received calibration notification indicates the communication device is to initiate the calibration process.

In Example 1263, the subject matter of Example 1262 can optionally include the received calibration notification being from a terminal device, and the one or more processors being configured to perform at least a portion of calibration process based on the received calibration notification.

In Example 1264, the subject matter of Example 1262 can optionally include the received calibration notification being from the radio communication network, and the one or more processors being configured to perform at least a portion of calibration process based on the received calibration notification.

In Example 1265, the subject matter of any one of Examples 1241 to 1264 can optionally include the transceiver being further configured to receive a result of the calibration process, and the result of the calibration process includes an adjustment to one or more parameters associated with the one or more components.

In Example 1266, the subject matter of any one of Examples 1241 to 1264 can optionally include the one or more processors being further configured to determine a result of the calibration process, and the result of the calibration process includes an adjustment to one or more parameters associated with the one or more components.

In Example 1267, the subject matter of any one of Examples 1265 or 1266 can optionally include the one or more processors being further configured to update the one or more parameters associated with the one or more components based on the adjustment.

Example 1268 is a method for communicating over a radio communication network, the method including performing at least a portion of a calibration process based on an identification to modify one or more components; and communicating based on a result of the calibration process.

In Example 1269, the subject matter of Example 1268, further including selecting between an unsupervised mode of operation and a supervised mode of operation based on whether a certificate is provided.

In Example 1270, the subject matter of Example 1269, further including identifying one or more components in accordance with the selected mode of operation.

Example 1271 is a method for communicating over a radio communication network, the method including identifying one or more components; performing at least a portion of a calibration process based on the identification to modify the one or more components; and communicating based on a result of the calibration process.

In Example 1272, the subject matter of Example 1271, further including selecting between an unsupervised mode of operation and a supervised mode of operation based whether a certificate is provided.

In Example 1273, the subject matter of Example 1272 can optionally include identifying one or more components by identifying one or more components in accordance with the selected mode of operation.

In Example 1274, the subject matter of any one of Examples 1268 to 1273, further including initiating a diagnostic process based on one or more triggering conditions.

In Example 1275, the subject matter of Example 1274, further including receiving a diagnostic notification to initiate the diagnostic process.

In Example 1276, the subject matter of any one of Examples 1274 or 1275, further including performing at least a portion of the diagnostic process based on the received diagnostic notification, and can optionally include the received diagnostic notification being from a terminal device.

In Example 1277, the subject matter of any one of Examples 1274 or 1275, further including performing at least a portion of the diagnostic process based on the received diagnostic notification, and can optionally include the received diagnostic notification being from the radio communication network.

In Example 1278, the subject matter of any one of Examples 1274 to 1277, further including transmitting one or more reference signals in accordance with the diagnostic process.

Example 1279, the subject matter of any one of Examples 1274 to 1278, further including receiving one or more reference signals in accordance with the diagnostic process.

In Example 1280, the subject matter of any one of Examples 1274 to 1279, further including receiving a result of the diagnostic process based a comparison of the one or more reference signals, and can optionally include the result of the diagnostic process includes the identification of the one or more components.

In Example 1281, the subject matter of any one of Examples 1274 to 1279, further including comparing the one or more received reference signals; and determining a result of the diagnostic process based on a comparison of the one or more received reference signals, and can optionally include the result of the diagnostic process includes the identification of the one or more components.

In Example 1282, the subject matter of any one of Examples 1274 to 1281 can optionally include the diagnostic process being implemented as a self-diagnostic process.

In Example 1283, the subject matter of any one of Examples 1280 to 1282, further including providing the result of the diagnostic process to the radio communication network.

In Example 1284, the subject matter of any one of Examples 1280 to 1283, further including providing the result of the diagnostic process to the terminal device.

In Example 1285, the subject matter of any one of Examples 1280 to 1284 can optionally include performing at least a portion of the calibration process by performing at least a portion of the calibration process in response to determining the result of the diagnostic process.

In Example 1286, the subject matter of any one of Examples 1268 to 1285, further including receiving a calibration notification to initiate the calibration process.

In Example 1287, the subject matter of Example 1286 can optionally include the received calibration notification being from a terminal device, and performing at least a portion of the calibration process by performing at least a portion of the calibration process based on the received calibration notification.

In Example 1288, the subject matter of Example 1286 can optionally include the received calibration notification being from the radio communication network, and performing at least a portion of the calibration process by performing at least a portion of the calibration process based on the received calibration notification.

In Example 1289, the subject matter of any one of Examples 1280 to 1288, further including receiving the result of the calibration process, and can optionally include the result of the calibration process includes an adjustment to one or more parameters associated with the one or more components.

In Example 1290, the subject matter of any one of Examples 1280 to 1288, further including determining the result of the calibration process, and can optionally include the result of the calibration process includes an adjustment to one or more parameters associated with the one or more components.

In Example 1291, the subject matter of any one of Examples 1289 or 1290, further including updating the one or more parameters associated with the one or more components based on the adjustment.

Example 1292 is a non-transitory computer readable medium storing instructions that when executed by a processor cause the processor to perform the method of: performing at least a portion of a calibration process based on an identification to modify one or more components; and communicating based on a result of the calibration process.

Example 1293 is a non-transitory computer readable medium storing instructions that when executed by a processor cause the processor to perform the method of: identifying one or more components; and performing at least a portion of a calibration process based on the identification to modify the one or more components; and communicating based on a result of the calibration process.

Example 1294 is a non-transitory computer readable medium storing instructions that when executed by a processor cause the processor to perform the method of any one of Examples 1268 to 1291.

Example 1295 is a non-transitory computer readable medium storing instructions that when executed by processing circuitry of a computing device cause the computing device to perform the method of any one of Examples 1268 to 1291.

Example 1296 is a device including a processor; and a memory storing instructions that when executed by the processor cause the processor to perform the method of: performing at least a portion of a calibration process based on an identification to modify one or more components; and communicating based on a result of the calibration process.

Example 1297 is a device including a processor; and a memory storing instructions that when executed by the processor cause the processor to perform the method of:

identifying one or more components; performing at least a portion of a calibration process based on the identification to modify the one or more components; and communicating based on a result of the calibration process.

Example 1298 is a device including a processor; and a memory storing instructions that when executed by the processor cause the processor to perform the method of any one of Examples 1268 to 1291.

Example 1299 is a communication device connected to a radio communication network, the communication device including means for performing at least a portion of a calibration process based on an identification to modify one or more components; and means for communicating based on a result of the calibration process.

Example 1300 is a communication device connected to a radio communication network, the communication device including means for identifying one or more components, and means for performing at least a portion of a calibration process based on the identification to modify the one or more components; and means for communicating based on a result of the calibration process.

Example 1301 is a communication device comprising: a core signaling controller configured to attempt to initiate a first core network signaling procedure through a first network access node, detect a radio access failure or disconnection for the first core network signaling procedure, and start a timer for a second core network signaling procedure; and a radio access processor configured to detect a second network access node, the core signaling controller further configured to attempt to initiate the second core network signaling procedure through the second network access node before the timer expires in response to detecting the second network access node.

In Example 1302, the subject matter of Example 1301 can optionally include further comprising one or more antennas and a radio frequency transceiver.

In Example 1303, the subject matter of Example 1301 can optionally include configured as a baseband modem for a terminal device.

In Example 1304, the subject matter of any one of Examples 1301 to 1303 can optionally include wherein the radio access processor comprises a cell searcher configured to perform a cell search and to report the second network access node to the radio access processor.

In Example 1305, the subject matter of any one of Examples 1301 to 1304 can optionally include wherein the core signaling controller is configured to perform non-Access Stratum (NAS) processing and signaling and the radio access processor is configured to perform Access Stratum (AS) processing and signaling.

In Example 1306, the subject matter of any one of Examples 1301 to 1305 can optionally include wherein the timer has a standardized duration.

In Example 1307, the subject matter of any one of Examples 1301 to 1306 can optionally include wherein the timer has a standardized timer that defines a duration of time to suspend core network signaling procedures after a radio access failure or disconnection.

In Example 1308, the subject matter of any one of Examples 1301 to 1307 can optionally include wherein the core signaling controller is configured to determine whether the detected network access node is in a failed cell list of network access nodes that caused a radio access failure or disconnection for core network signaling procedures.

In Example 1309, the subject matter of Example 1308 can optionally include where in the core signaling controller is further configured to, after detecting the radio access failure or disconnection for the first core network signaling procedure through the first network access node, adding identity information of the first network access node to the failed cell list.

In Example 1310, the subject matter of any one of Examples 1301 to 1308 can optionally include wherein the core signaling controller is further configured to increment a connection attempt counter after detecting the radio access failure or disconnection of the first core network signaling procedure, and to determine that the connection attempt counter is less than a threshold number of connection attempts before attempting to initiate the second core network signaling procedure through the second network access node.

In Example 1311, the subject matter of any one of Examples 1301 to 1310 can optionally include wherein the core network signaling procedure is a non-Access Stratum (NAS) signaling procedure for Long Term Evolution (LTE).

Example 1312 is a communication device comprising: a core signaling controller configured to attempt to initiate a first core network signaling procedure through a first network access node and to detect a core network failure for the first core network signaling procedure; and a radio access processor configured to detect a second network access node, the core signaling controller configured to determine whether the second network access node is in a same network tracking area as the first network access node and to attempt to initiate a second core network signaling procedure through the second network access node in response to determining that the second network access node is not in the same network tracking area.

In Example 1313, the subject matter of Example 1312 can optionally include further comprising one or more antennas and a radio frequency transceiver.

In Example 1314, the subject matter of Example 1312 can optionally include configured as a baseband modem for a terminal device.

In Example 1315, the subject matter of any one of Examples 1312 to 1314 can optionally include wherein the radio access processor comprises a cell searcher configured to perform a cell search and to report the second network access node to the radio access processor.

In Example 1316, the subject matter of any one of Examples 1312 to 1315 can optionally include wherein the core signaling controller is configured to determine not to attempt the second core network signaling procedure through the second network access node if the second network access node is in the same network tracking area.

In Example 1317, the subject matter of any one of Examples 1312 to 1316 can optionally include wherein the core signaling controller is configured to add a network tracking area of the first network access node to a failed network tracking area list after detecting the core network failure for the first core network signaling procedure.

In Example 1318, the subject matter of Example 1317 can optionally include wherein the core signaling controller is configured to determine whether a tracking area of the second network access node is in the failed network tracking area list, and configured to attempt the second core network signaling procedure through the second network access node in response to determining that the tracking area of the second network access node is not in the failed network tracking area list.

In Example 1319, the subject matter of any one of Examples 1312 to 1318 can optionally include wherein the first and second core network signaling procedures are non-Access Stratum (NAS) signaling procedures for Long Term Evolution (LTE).

In Example 1320, the subject matter of any one of Examples 1312 to 1319 can optionally include wherein the core signaling controller is configured to start a timer after the first core network signaling procedure through the first network access node fails, and wherein the core signaling controller is configured to attempt the second core network signaling procedure through the second network access node before the timer expires.

In Example 1321, the subject matter of Example 1320 can optionally include wherein the timer has a standardized duration.

In Example 1322, the subject matter of Example 1320 can optionally include wherein the timer is a standardized timer that defines a duration of time to suspend core network signaling procedures after a temporary core network failure.

Example 1323 is a communication device comprising: a core signaling controller configured to attempt to initiate a first core network signaling procedure through a first network access node and to detect a core network failure for the first core network signaling procedure; and a radio access processor configured to identify one or more network access nodes and to randomly select a second network access node from the one or more network access nodes, the core signaling controller configured to attempt to initiate a second core network signaling procedure through the second network access node.

In Example 1324, the subject matter of Example 1323 can optionally include further comprising one or more antennas and a radio frequency transceiver.

In Example 1325, the subject matter of Example 1324 can optionally include configured as a baseband modem for a terminal device.

In Example 1326, the subject matter of any one of Examples 1323 to 1325 can optionally include wherein the radio access processor comprises a cell searcher configured to detect a plurality of available network access nodes.

In Example 1327, the subject matter of Example 1326 can optionally include wherein the radio access processor is configured to identify the one more network access nodes from the plurality of available network access nodes based on which of the plurality of available network access nodes satisfy a selection criteria.

In Example 1328, the subject matter of Example 1326 can optionally include wherein the radio access processor is configured to identify the one more network access nodes from the plurality of available network access nodes based on which of the plurality of available network access nodes satisfy a selection criteria and are not on a potential fake cell list.

In Example 1329, the subject matter of Example 1328 can optionally include wherein the core signaling controller is configured to add the first network access node to the potential fake cell list after detecting the core network failure of the first core network signaling procedure through the first network access node In Example 1330, the subject matter of any one of Examples 1323 to 1327 can optionally include wherein the core signaling controller is configured to add the first network access node to a potential fake cell list after detecting the core network failure of the first core network signaling procedure through the first network access node In Example 1331, the subject matter of Example 1330 can optionally include wherein core signaling controller is configured to determine that the second network access node is not on the potential fake cell list before attempting the core second network signaling procedure through the second network access node.

In Example 1332, the subject matter of Example 1330 can optionally include wherein the radio access processor is configured to identify the one or more network access nodes based on the potential fake cell list.

In Example 1333, the subject matter of any one of Examples 1323 to 1332 can optionally include wherein the first and second core network signaling procedures are non-Access Stratum (NAS) signaling procedures for Long Term Evolution (LTE).

In Example 1334, the subject matter of any one of Examples 1323 to 1333 can optionally include wherein the core signaling controller is configured to start a timer after detecting the core network failure of the first core network signaling procedure, and wherein the core signaling controller is configured to attempt the second core network signaling procedure through the second network access node before the timer expires.

In Example 1335, the subject matter of Example 1334 can optionally include wherein the timer has a standardized duration.

In Example 1336, the subject matter of Example 1334 can optionally include wherein the timer is a standardized timer that defines a duration of time to suspend core network signaling procedures after a core network failure.

Example 1337 is a communication device comprising: a primary radio access processor configured to perform a threshold number of failed connection attempts for a first radio access technology; a primary core signaling controller configured to start a timer for a subsequent connection attempt for the first radio access technology, detect that a second radio access technology is successfully registered, and to perform the subsequent connection attempt for the first radio access technology before the timer expires if the second radio access technology is successfully registered.

In Example 1338, the subject matter of Example 1337 can optionally include further comprising one or more antennas and a radio frequency transceiver.

In Example 1339, the subject matter of Example 1337 can optionally include configured as a baseband modem for a terminal device.

In Example 1304, the subject matter of any one of Examples 1337 to 1339 can optionally include further comprising: a legacy radio access processor configured to perform radio access processing and signaling for the second radio access technology; and a legacy core signaling controller configured to perform processing and signaling involved in communications between the communication device and core network nodes for the second radio access technology.

In Example 1341, the subject matter of Example 1340 can optionally include wherein the legacy core signaling controller is configured to perform a registration procedure to register the communication device with a network of the second radio access technology.

In Example 1342, the subject matter of any one of Examples 1337 to 1341 can optionally include wherein the primary radio access processor is configured to perform radio access processing and signaling for the first radio access technology, and wherein the primary core signaling controller is configured to perform processing and signaling involved in communications between the communication device and core network nodes for the first radio access technology.

In Example 1343, the subject matter of any one of Examples 1337 to 1342 can optionally include wherein the primary core signaling controller is configured to perform the subsequent connection attempt for the first radio access technology with a first network access node of the first radio access technology, and to add a network tracking area of the first network access node to a failed network tracking area list if the subsequent connection attempt fails.

In Example 1344, the subject matter of Example 1343 can optionally include wherein the primary core signaling controller is configured to, if the subsequent connection attempt with the first network access node fails, determine that a second network access node of the first radio access technology is in a network tracking area that is not in the failed network tracking area list, and perform another connection attempt for the first radio access technology with the second network access node.

In Example 1345, the subject matter of any one of Examples 1337 to 1344 can optionally include wherein the timer has a standardized duration.

In Example 1346, the subject matter of any one of Examples 1337 to 1344 can optionally include wherein the timer is a standardized timer that defines a duration of time to suspend connection attempts after a radio access failure or disconnection of a connection attempt.

In Example 1347, the subject matter of any one of Examples 1337 to 1346 can optionally include wherein the first radio access technology is Long Term Evolution (LTE) and the second radio access technology is Global System for Mobile communications (GSM) or Universal Mobile Telecommunications System (UMTS).

Example 1348 is a method of operating a communication device, the method comprising: attempting to initiate a first core network signaling procedure through a first network access node; detecting a radio access failure or disconnection for the first core network signaling procedure; starting a timer for a second core network signaling procedure; detecting a second network access node; and attempting to initiate the second core network signaling procedure through the second network access node before the timer expires in response to detecting the second network access node.

In Example 1349, the subject matter of Example 1348 can optionally include wherein detecting the second network access node comprises performing a cell search to detect the second network access node.

In Example 1350, the subject matter of Example 1348 or 1349 can optionally include wherein the timer has a standardized duration.

In Example 1351, the subject matter of any one of Examples 1348 to 1350 can optionally include wherein the timer is a standardized timer that defines a duration of time to suspend core network signaling procedures after a radio access failure or disconnection.

In Example 1352, the subject matter of any one of Examples 1348 to 1351 can optionally include further comprising: before attempting the second core network signaling procedure through the second network access node, determining whether the detected network access node is in a failed cell list of network access nodes that have been involved in a radio access failure or disconnection for core network signaling procedures.

In Example 1353, the subject matter of Example 1352 can optionally include further comprising: after detecting the radio access failure or disconnection for the first core network signaling procedure through the first network access node, adding identity information of the first network access node to the failed cell list.

In Example 1354, the subject matter of any one of Examples 1348 to 1353 can optionally include further comprising: incrementing a connection attempt counter after the first core network signaling procedure through the first network access node fails; and determining that the connection attempt counter is less than a threshold number of connection attempts before attempting the second core network signaling procedure through the second network access node.

In Example 1355, the subject matter of any one of Examples 1348 to 1354 can optionally include wherein the core network signaling procedure is a non-Access Stratum (NAS) signaling procedure for Long Term Evolution (LTE).

Example 1356 is a method of operating a communication device, the method comprising: attempting to initiate a first core network signaling procedure through a first network access node; detecting a core network failure for the first core network signaling procedure; detecting a second network access node; determining whether the second network access node is in a same network tracking area as the first network access node; and attempting to initiate a second core network signaling procedure through the second network access node in response to determining that the second network access node is not in the same network tracking area.

In Example 1357, the subject matter of Example 1356 can optionally include wherein detecting the second network access node comprises performing a cell search to detect the second network access node.

In Example 1358, the subject matter of Example 1356 or 1357 can optionally include further comprising determining not to attempt the second core network signaling procedure through the second network access node if the second network access node is in the same network tracking area.

In Example 1359, the subject matter of any one of Examples 1356 to 1358 can optionally include further comprising adding a network tracking area of the first network access node to a failed network tracking area list after the second core network signaling procedure through the first network access node fails.

In Example 1360, the subject matter of Example 1359 can optionally include further comprising: determining whether a tracking area of the second network access node is in the failed network tracking area list; and attempting the second core network signaling procedure through the second network access node in response to determining that the tracking area of the second network access node is not in the failed network tracking area list.

In Example 1361, the subject matter of any one of Examples 1356 to 1360 can optionally include wherein the first and second core network signaling procedures are non-Access Stratum (NAS) signaling procedures for Long Term Evolution (LTE).

In Example 1362, the subject matter of any one of Examples 1356 to 1361 can optionally include further comprising: starting a timer after the first core network signaling procedure through the first network access node fails, wherein attempting to initiate the second core network signaling procedure through the second network access node comprises attempting to initiate the second core network signaling procedure through the second network access node before the timer expires.

In Example 1363, the subject matter of Example 1362 can optionally include wherein the timer has a standardized duration.

In Example 1364, the subject matter of Example 1362 can optionally include wherein the timer is a standardized timer that defines a duration of time to suspend core network signaling procedures after a temporary core network failure.

Example 1365 is a method of operating a communication device, the method comprising: attempting to initiate a first core network signaling procedure through a first network access node; detecting a core network failure for the first core network signaling procedure; identifying one or more network access nodes; randomly selecting a second network access node from the one or more network access nodes; and attempting to initiate a second core network signaling procedure through the second network access node.

In Example 1366, the subject matter of Example 1365 can optionally include further comprising detecting a plurality of available network access nodes, wherein identifying the one or more network access nodes comprises identifying the one more network access nodes from the plurality of available network access nodes based on which of the plurality of available network access nodes satisfy a selection criteria.

In Example 1367, the subject matter of Example 1365 can optionally include further comprising detecting a plurality of available network access nodes, wherein identifying the one or more network access nodes comprises identifying the one more network access nodes from the plurality of available network access nodes based on which of the plurality of available network access nodes satisfy a selection criteria and are not on a potential fake cell list.

In Example 1368, the subject matter of Example 1367 can optionally include further comprising: after detecting the core network failure of the first core network signaling procedure through the first network access node, adding the first network access node to the potential fake cell list.

In Example 1369, the subject matter of Example 1365 or 1366 can optionally include further comprising: after detecting the core network failure of the first core network signaling procedure through the first network access node, adding the first network access node to a potential fake cell list.

In Example 1370, the subject matter of Example 1369 can optionally include further comprising determining that the second network access node is not on the potential fake cell list before attempting the second core network signaling procedure through the second network access node.

In Example 1371, the subject matter of Example 1369 can optionally include wherein the radio access processor is configured to identify the one or more network access nodes based on the potential fake cell list.

In Example 1372, the subject matter of any one of Examples 1365 to 1371 can optionally include wherein the core network signaling procedure is a non-Access Stratum (NAS) signaling procedure for Long Term Evolution (LTE).

In Example 1373, the subject matter of any one of Examples 1365 to 1372 can optionally include further comprising: start a timer after detecting the core network failure of the first core network signaling procedure, and wherein the core signaling controller is configured to attempt the second core network signaling procedure through the second network access node before the timer expires.

In Example 1374, the subject matter of Example 1373 can optionally include wherein the timer has a standardized duration.

In Example 1375, the subject matter of Example 1373 can optionally include wherein the timer is a standardized timer that defines a duration of time to suspend core network signaling procedures after a core network failure.

Example 1376 is a method of operating a communication device, the method comprising: performing a threshold number of failed connection attempts for a first radio access technology; starting a timer for a subsequent connection attempt for the first radio access technology; detecting that a second radio access technology is successfully registered; and performing the subsequent connection attempt for the first radio access technology before the timer expires if the second radio access technology is successfully registered.

In Example 1377, the subject matter of Example 1376 can optionally include further comprising performing a registration procedure for the second radio access technology to register the communication device with a network of the second radio access technology.

In Example 1378, the subject matter of Example 1376 or 1377 can optionally include wherein performing the subsequent connection attempt for the first radio access technology comprises performing the subsequent connection attempt with a first network access node of the first radio access technology, the method further comprising adding a network tracking area of the first network access node to a failed network tracking area list if the subsequent connection attempt fails.

In Example 1379, the subject matter of Example 1378 can optionally include further comprising: if the subsequent connection attempt with the first network access node fails, determining that a second network access node of the first radio access technology is in a network tracking area that is not in the failed network tracking area list; and performing another connection attempt for the first radio access technology with the second network access node.

In Example 1380, the subject matter of any one of Examples 1376 to 1379 can optionally include where the timer has a standardized duration.

In Example 1381, the subject matter of any one of Examples 1376 to 1379 can optionally include wherein the timer is a standardized timer that defines a duration of time to suspend connection attempts after a radio access failure or disconnection of a connection attempt.

In Example 1382, the subject matter of any one of Examples 1376 to 1381 can optionally include wherein the first radio access technology is Long Term Evolution (LTE) and the second radio access technology is Global System for Mobile communications (GSM) or Universal Mobile Telecommunications System (UMTS).

Example 1383 is a non-transitory computer readable medium storing instructions that when executed by one or more processors cause the one or more processors to perform the method of any one of Examples 1348 to 1382.

Example 1384 is a device comprising: one or more processors; and a memory storing instructions that when executed by the one or more processors cause the one or more processors to perform the method of any one of Examples 1348 to 1382.

Example 1385 is a communication device comprising: means for attempting to initiate a first core network signaling procedure through a first network access node; means for detecting a radio access failure or disconnection for the first core network signaling procedure; means for initiating a time for a second core network signaling procedure; means for detecting a second network access node; and means for attempting to initiate the second core network signaling procedure through the second network access node before the timer expires in response to detecting the second network access node.

Example 1386 is a communication device comprising: means for attempting to initiate a first core network signaling procedure through a first network access node; means for detecting a core network failure for the first core network signaling procedure; means for detecting a second network access node; means for determining whether the second network access node is in a same network tracking area as the first network access node; and means for attempting to initiate a second core network signaling procedure through the second network access node in response to determining that the second network access node is not in the same network tracking area.

Example 1387 is a communication device comprising: means for attempting to initiate a first core network signaling procedure through a first network access node; means for detecting a core network failure for the first core network signaling procedure; means for identifying one or more network access nodes; means for randomly selecting a second network access node from the one or more network access nodes; and means for attempting to initiate a second core network signaling procedure through the second network access node.

Example 1388 is a communication device comprising: means for performing a threshold number of failed connection attempts for a first radio access technology; means for starting a timer for a subsequent connection attempt for the first radio access technology; means for detecting that a second radio access technology is successfully registered; and means for performing the subsequent connection attempt for the first radio access technology before the timer expires if the second radio access technology is successfully registered.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A device comprising:

a template memory, configured to store a filter template that defines one or more parameters of target data; and a traffic filter, configured to apply the filter template to raw data originating from a local network;

identify target data from the raw data based on the one or more parameters of the filter template; and route the target data to a local server for processing offload;

wherein the traffic filter is configured to receive signaling from a server that specifies the filter template; and wherein the signaling comprises the one or more parameters of the filter template and the template memory is configured to store the one or more parameters of the filter template;

wherein the raw data is user plane data originating from one or more terminal devices of the local network;

wherein the traffic filter is configured to apply the filter template to the raw data and identify the target data from the raw data by:

performing packet inspection on packets of the raw data to identify one or more characteristics of the packets, and determining whether the one or more characteristics of the packets match the one or more parameters of the filter template, and classifying packets having one or more characteristics that match the one or more parameters as target data.

2. The device of claim 1, further comprising an antenna, a radio transceiver, and a baseband system, and configured as a network access node of the local network.

3. The device of claim 2, wherein the network access node is a small cell.

4. The device of claim 2, wherein the raw data is sensing or operational data generated by one or more terminal devices of the local network.

5. The device of claim 1, wherein the signaling identifies the filter template from a plurality of filter templates stored in the template memory.

6. The device of claim 2, wherein the one or more parameters of the filter template are configured to identify a specific type of raw data, identify a specific geographic area, or identify specific devices from which the raw data originates.

7. The device of claim 2, wherein the traffic filter is further configured to identify the target data and other data from the raw data, and to route the other data to a remote server.

8. The device of claim 2, wherein the template memory is configured to receive and store an updated filter template that defines one or more updated parameters of target data, and wherein the traffic filter is configured to apply the updated filter template to additional raw data originating from the local network, to identify additional target data from the raw data based on the one or more updated parameters, and to route the additional target data to the local server for processing offload.

9. A device comprising:

a template memory, configured to store a filter template that defines one or more parameters of target data; and a traffic filter, configured to apply the filter template to raw data originating from a local network;

identify target data from the raw data based on the one or more parameters of the filter template; and route the target data to a local server for processing offload;

wherein the traffic filter is configured to receive signaling from a server that specifies the filter template; and wherein the signaling comprises the one or more parameters of the filter template and the template memory is configured to store the one or more parameters of the filter template;

wherein the template memory is configured to receive and store an updated filter template that defines one or more updated parameters of target data, and wherein the traffic filter is configured to apply the updated filter template to additional raw data originating from the local network, to identify additional target data from the raw data based on the one or more updated parameters, and to route the additional target data to the local server for processing offload.

10. The device of claim 9, further comprising an antenna, a radio transceiver, and a baseband system, and configured as a network access node of the local network.

11. The device of claim 9, wherein the network access node is a small cell.

12. The device of claim 9, wherein the raw data is sensing or operational data generated by one or more terminal devices of the local network.

13. The device of claim 9, wherein the signaling identifies the filter template from a plurality of filter templates stored in the template memory.

14. The device of claim 10, wherein the one or more parameters of the filter template are configured to identify a specific type of raw data, identify a specific geographic area, or identify specific devices from which the raw data originates.

* * * * *